US011431561B2

(12) United States Patent
Smith et al.

(10) Patent No.: US 11,431,561 B2
(45) Date of Patent: Aug. 30, 2022

(54) INTERNET OF THINGS

(71) Applicant: INTEL CORPORATION, Santa Clara, CA (US)

(72) Inventors: Ned M. Smith, Beaverton, OR (US); Keith Nolan, Mullingar (IE); Mark Kelly, Leixlip (IE); Gregory Burns, Seattle, WA (US); Michael Nolan, Maynooth (IE); John Brady, Celbridge (IE); Cliodhna Ni Scanaill, Broadford (IE); Niall Cahill, Galway (IE); Thiago Macieira, Hillsboro, OR (US); Zheng Zhang, Portland, OR (US); Glen J. Anderson, Beaverton, OR (US); Igor Muttik, Aylesbury (GB); Davide Carboni, London (GB); Eugene Ryan, Glasnevin (IE); Richard Davies, Dublin (IE); Toby M. Kohlenberg, Portland, OR (US); Maarten Koning, Bloomfield (CA); Jakub Wenus, Maynooth (IE); Rajesh Poornachandran, Portland, OR (US); William C. Deleeuw, Beaverton, OR (US); Ravikiran Chukka, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/466,978

(22) PCT Filed: Dec. 28, 2017

(86) PCT No.: PCT/US2017/068683

§ 371 (c)(1),
(2) Date: Jun. 5, 2019

(87) PCT Pub. No.: WO2018/125989

PCT Pub. Date: Jul. 5, 2018

(65) Prior Publication Data

US 2019/0349426 A1 Nov. 14, 2019

Related U.S. Application Data

(60) Provisional application No. 62/441,070, filed on Dec. 30, 2016.

(51) Int. Cl.
*H04L 29/08* (2006.01)
*H04L 41/0806* (2022.01)
(Continued)

(52) U.S. Cl.
CPC ...... *H04L 41/0806* (2013.01); *G06F 16/1824* (2019.01); *G06F 16/1834* (2019.01);
(Continued)

(58) Field of Classification Search
None
See application file for complete search history.

(56) References Cited

U.S. PATENT DOCUMENTS 6,058,383 A 5/2000 Narasimhalu et al.
8,356,067 B2 1/2013 Trantow
(Continued)

FOREIGN PATENT DOCUMENTS

CN 105404701 3/2016
EP 2566204 A1 3/2013
(Continued)

OTHER PUBLICATIONS

International Search Report for related PCT Application PCT/US2017068806 with a completion date of Mar. 14, 2018 and dated Mar. 21, 2018, 3 pages.
(Continued)

*Primary Examiner* — Edan Orgad
*Assistant Examiner* — Emmanuel K Maglo
(74) *Attorney, Agent, or Firm* — Hanley, Flight, & Zimmerman, LLC

(57) ABSTRACT

The Internet can be configured to provide communications to a large number of Internet-of-Things (IoT) devices.
(Continued)

600

Devices can be designed to address the need for network layers, from central servers, through gateways, down to edge devices, to grow unhindered, to discover and make accessible connected resources, and to support the ability to hide and compartmentalize connected resources. Network protocols can be part of the fabric supporting human accessible services that operate regardless of location, time, or space. Innovations can include service delivery and associated infrastructure, such as hardware and software. Services may be provided in accordance with specified Quality of Service (QoS) terms. The use of IoT devices and networks can be included in a heterogeneous network of connectivity including wired and wireless technologies.

27 Claims, 275 Drawing Sheets

(51) Int. Cl.

| | |
|---|---|
| ***H04L 67/10*** | (2022.01) |
| ***H04L 67/12*** | (2022.01) |
| ***H04W 4/70*** | (2018.01) |
| ***G06F 16/182*** | (2019.01) |
| ***H04L 9/08*** | (2006.01) |
| ***H04L 9/32*** | (2006.01) |
| ***H04L 45/00*** | (2022.01) |
| ***H04L 67/104*** | (2022.01) |
| ***H04L 69/18*** | (2022.01) |
| ***H04W 4/08*** | (2009.01) |
| ***H04W 84/22*** | (2009.01) |
| ***H04L 41/12*** | (2022.01) |
| ***H04L 69/22*** | (2022.01) |
| ***H04L 61/4505*** | (2022.01) |
| ***H04L 61/5069*** | (2022.01) |
| ***H04L 67/1087*** | (2022.01) |
| ***H04L 67/562*** | (2022.01) |
| ***H04W 12/69*** | (2021.01) |
| *H04W 84/18* | (2009.01) |

(52) U.S. Cl.

CPC .......... *H04L 9/0825* (2013.01); *H04L 9/3239* (2013.01); *H04L 41/12* (2013.01); *H04L 45/20* (2013.01); *H04L 61/1505* (2013.01); *H04L 61/2069* (2013.01); *H04L 67/10* (2013.01); *H04L 67/104* (2013.01); *H04L 67/1046* (2013.01); *H04L 67/1093* (2013.01); *H04L 67/12* (2013.01); *H04L 67/2809* (2013.01); *H04L 69/18* (2013.01); *H04L 69/22* (2013.01); *H04W 4/08* (2013.01); *H04W 4/70* (2018.02); *H04W 12/69* (2021.01); *H04W 84/22* (2013.01); *H04L 2209/38* (2013.01); *H04L 2209/56* (2013.01); *H04W 84/18* (2013.01)

(56) References Cited

U.S. PATENT DOCUMENTS

| | | | | |
|---|---|---|---|---|
| 8,996,459 | B2 | 3/2015 | Arthursson | |
| 10,182,361 | B1 * | 1/2019 | Moon | H04L 27/2601 |
| 10,425,414 | B1 * | 9/2019 | Buckingham | H04L 63/083 |
| 2004/0081203 | A1 | 4/2004 | Sodder et al. | |
| 2007/0233881 | A1 | 10/2007 | Nochta et al. | |
| 2012/0210066 | A1 | 8/2012 | Joshi et al. | |
| 2013/0346842 | A1 * | 12/2013 | Koara | G05B 19/048 715/211 |
| 2014/0095867 | A1 * | 4/2014 | Smith | G06F 21/602 713/164 |
| 2014/0161079 | A1 * | 6/2014 | Noh | H04W 84/12 370/329 |
| 2015/0156266 | A1 | 6/2015 | Gupta | |
| 2015/0244690 | A1 | 8/2015 | Mossbarger | |
| 2016/0007325 | A1 * | 1/2016 | Seok | H04L 5/0007 370/329 |
| 2016/0021661 | A1 * | 1/2016 | Yerramalli | H04W 74/08 370/329 |
| 2016/0100396 | A1 * | 4/2016 | Seok | H04B 7/0617 370/329 |
| 2016/0113009 | A1 * | 4/2016 | Seok | H04B 7/0697 370/329 |
| 2016/0182497 | A1 | 6/2016 | Smith | |
| 2016/0191345 | A1 | 6/2016 | Despotovic et al. | |
| 2016/0212246 | A1 * | 7/2016 | Seok | H04L 69/22 |
| 2016/0217176 | A1 * | 7/2016 | Haviv | G06F 16/174 |
| 2016/0275461 | A1 | 9/2016 | Sprague et al. | |
| 2016/0345349 | A1 * | 11/2016 | Ferdowsi | H04W 72/1268 |
| 2016/0379212 | A1 | 12/2016 | Bowman et al. | |
| 2016/0380968 | A1 * | 12/2016 | Sarwar | H04L 61/3025 709/245 |
| 2017/0033984 | A1 * | 2/2017 | Lear | H04L 67/34 |
| 2017/0046638 | A1 * | 2/2017 | Chan | H04L 63/0876 |
| 2017/0048048 | A1 * | 2/2017 | Seok | H04L 1/1671 |
| 2017/0063566 | A1 * | 3/2017 | Seminario | H04L 63/029 |
| 2017/0064708 | A1 * | 3/2017 | Noh | H04L 5/0023 |
| 2017/0180380 | A1 * | 6/2017 | Bagasra | H04W 12/08 |
| 2017/0352027 | A1 * | 12/2017 | Zhang | G06Q 20/065 |
| 2018/0035351 | A1 * | 2/2018 | Kodaypak | H04W 76/12 |
| 2018/0117446 | A1 * | 5/2018 | Tran | A42B 3/0433 |
| 2018/0160429 | A1 * | 6/2018 | Seok | H04L 1/0045 |
| 2018/0183676 | A1 * | 6/2018 | Lindsey | H04L 12/4641 |
| 2019/0035018 | A1 * | 1/2019 | Nolan | H04L 9/0637 |
| 2019/0349426 | A1 | 11/2019 | Smith et al. | |

FOREIGN PATENT DOCUMENTS

| | | | |
|---|---|---|---|
| JP | 2006253837 | | 9/2006 |
| JP | 2007202036 | | 8/2007 |
| JP | 2007264922 | | 10/2007 |
| JP | 2014082624 | | 5/2014 |
| WO | 0065800 | A1 | 11/2000 |
| WO | 2004073281 | A2 | 8/2004 |
| WO | 2009141385 | A2 | 11/2009 |
| WO | 2012018130 | | 2/2012 |
| WO | 2015126734 | A1 | 8/2015 |
| WO | 2015130752 | A1 | 9/2015 |
| WO | 2017066002 | A1 | 4/2017 |
| WO | 2018125989 | A2 | 7/2018 |
| WO | 2018126029 | A2 | 7/2018 |
| WO | 2018126065 | A1 | 7/2018 |
| WO | 2018126075 | A1 | 7/2018 |
| WO | 2018126076 | A1 | 7/2018 |
| WO | 2018126077 | A1 | 7/2018 |

OTHER PUBLICATIONS

Kim et al; "Increasing Web Server Throughput with Network Interface Data Caching"; Computer Systems Laboratory , Rice University Houston Texas; Operating Systems Review, vol. 36 No. 5; ACM Oct. 2002.

International Search Report for related PCT Application PCT/US2017068830 with a completion date of Mar. 14, 2018 and dated Mar. 22, 2018, 2 pages.

Ergen et al; "MAC Protocol Engine for Sensor Networks" Global Telecommunications Conference Nov. 2009 GLOBECOM, Piscataway New Jersey Abstract only. 1 page.

International Search Report for related PCT Application PCT/US2017/068828 with a completion date of Mar. 22, 2018 and dated Mar. 29, 2018, 3 pages.

Hardjono et al; "Cloud-Based Commissioning of Constrained Devices using Permissioned Blockchains" Proceedings of ACM IoT Privacy, Trust & Security—IoTPTS 2016 Xi'an, China, May 2016, 8 pages.

International Search Report for related PCT Application PCT/US2017/068743 with a completion date of Jun. 28, 2018 and dated Jul. 6, 2018, 6 pages.

Hardjono et al; "Anonymous Identities for Permissioned Blockchains" (DRAFT v06C—Jan. 24, 2016—Please Do Not Distribute) 16

(56) References Cited

OTHER PUBLICATIONS pages, retrieved from the internet on May 31, 2019 https://pdfs.semanticscholar.org/2ef6/d571f3d0a9927fbe29363a8038b0d148f881.pdf.
Hardjono et al; "Verifiable Anonymous Identities and Access Control in Permissioned Blockchains" Draft Apr. 17, 2016, retrieved from the internet on May 31, 2019 https://arxiv.org/pdf/1903.04584.pdf 9 pages.
Antonopoulos, Andreas M. "Mastering Bitcoin: Unlocking Digital Cryptocurrencies" Chapter 9, Dec. 20, 2014 O'Reilly Publishing,Tokyo Japan.
International Search Report for related PCT Application PCT/US2017068683 with a completion date of Jul. 4, 2018 and dated Jul. 7, 2018, 7 pages.
International Search Report for related PCT Application PCT/US2017/068832 with a completion date of Mar. 15, 2018 and dated May 17, 2018, 4 pages.
Fromknecht et al;:"A Decentralized Public Key Infrastructure with Identity Retention" Published in IACR Cryptology ePrint Archive Nov. 2014, 16 pages.
Fromknecht et al; "CertCoin:A NameCoin Based Decentralized Authentication System 6.857 Class Project" May 2014, retrieved from the Internet on Jun. 3, 2019 https://courses.csail.mit.edu/6.857/2014/files/19-fromknecht-velicann-yakoubov-certcoin.pdf 19 pages.
European Patent Office, "Communication pursuant to Article 94(3) EPC", issued in connection with EP patent application No. 17835976.6, dated Oct. 26, 2020 (6 pages).
Hardjono et al., "Verifiable Anonymous Identities and Access Control in Permissioned Blockchains," Draft Apr. 17, 2016, submitted Mar. 11, 2019, arXiv:1903.04584v1 [cs.CR] (9 pages).
Intellectual Property India, "Examination Report," issued in connection with Indian Patent Application No. 201947022378, dated Jan. 6, 2021, 6 pages.
European Patent Office, "Communication pursuant to Article 94(3) EPC", issued in connection with European Patent Application No. 17835976.6, dated Jun. 11, 2021, (4 pages).
Taiwan Intellectual Property Office, "Notice of Allowance," issued in connection with Taiwanese Patent Application No. 106146289, dated Feb. 11, 2022, 3 pages. English version Included.
European Pa I Ent Office, "Communication pursuant to Article 94(3) EPC," issued in connection with European Patent Application No. 17 835 796.6, dated Mar. 17, 2022, 5 pages.
International Bureau, "International Preliminary Report on Patentability," issued in connection with International Patent Application No. PCT/US2017/068683, dated Jul. 2, 2019, 11 pages.
Taiwanese Patent Office, "Office Action," issued in connection with application No. 106146289, dated Oct. 5, 2021, 24 pages. Machine Translation Included.
Taiwanese Patent Office, "Search Report," issued in connection with application No. 106146289, dated Sep. 24, 2021, 3 pages. English Translation Included.
Japanese Patent Office, "Notice of Reasons for Refusal," issued in connection with Japanese Application No. 2019-535869, dated Dec. 21, 2021, 10 pages. Machine Translation Included.
Shigenori Ohashi et al., "A Registration Method for Digital Content Management Systems Utilizing Blockchains", The Institute of Electronics Information and Communication Engineers, dated May 27, 2016, 10 pages. English Abstract Included.

* cited by examiner

100

200

300

400

500

600

700

1000

1100

1200

1300

1600

1700

2000

2100

2400

2500

2600

2700

3100

3200

3300

3400

3500

3600

3700

3800

4100

4200

4300

4400

4700

4800

5100

5200

5300

5400

5800

5900

6000

6100

6200

6300

6600

6700

6800

7100

7200

7300

7500

7600

7700

8100

8200

8300

8400

8700

8800

8900

9100

9300

9600

9700

9800

9900

10200

10300

10600

10700

11000

11100

11200

11500

11600

11700

12100

12200

12300

12400

12500

12800

12900

13000

13300

13400

13700

13800

13900

14200

14300

14400

14700

14800

14900

15200

15500

15600

15700

15800

16100

16200

16500

16600

16900

17002

Floating Service

17000

| Feature | How Important? | Host #1 | Host #2 | Host #3 |
|---|---|---|---|---|
| Availability > 98% | Required (10) | 10 | 5 | 10 |
| AES Present | Preferable (7) | 3 | 7 | 7 |
| SGX Present | Not Needed (0) | 0 | 0 | 0 |
| TXT Present | Preferable (5) | 0 | 0 | 5 |
| Disk Space > 10Gb | Required (10) | 4 | 10 | 10 |
| Memory > 16Gb | Required (10) | 5 | 10 | 10 |
| Response Time <3 sec | Desirable (8) | 0 | 3 | 0 |
| Multinode = Yes | Preferable (5) | 0 | 5 | 5 |
| Tenancy = Shared | Don't Mind (2) | 2 | 1 | 2 |
| ... | | | | |
| ... | | | | |
| Cost (per hr) | | 0.004 | 0.012 | 0.014 |
| Possible? | | Rejected | Possible | Acceptable |
| Decision Score (Value) | | 0.00016667 | 0.00029268 | 0.000285714 |

| Node/ Location' | Type | Bin | % Non Events | % of Events | WoE $log_n$(% Non-Events / % Events) | Div | Cacq ($IC) |
|---|---|---|---|---|---|---|---|
| 001/FS-URI | RAW-CO2 | 1 | 5% | 6% | -0.0952 | 0.0005 | 0.5 |
| 001/FS-URI | RAW-CO2 | 2 | 12% | 10% | 0.2002 | 0.0045 | 0.5 |
| 001/FS-URI | RAW-CO2 | 3 | 13% | 12% | 0.1522 | 0.0029 | 0.5 |
| 001/FS-URI | RAW-CO2 | 4 | 16% | 15% | 0.0774 | 0.0009 | 0.5 |
| 001/FS-URI | RAW-CO2 | 5 | 17% | 16% | 0.0401 | 0.0003 | 0.5 |
| 001/FS-URI | RAW-CO2 | 6 | 16% | 16% | -0.0236 | 0.0001 | 0.5 |
| 001/FS-URI | RAW-CO2 | 7 | 38% | 12% | 1.1379 | 0.2926 | 0.5 |
| 001/FS-URI | RAW-CO2 | 8 | 5% | 7% | -0.4123 | 0.0095 | 0.5 |
| 001/FS-URI | RAW-CO2 | 9 | 5% | 6% | -0.2123 | 0.0025 | 0.5 |
| | Total: | | | | | 0.3138 | |

INTERNET OF THINGS

CROSS REFERENCE TO RELATED APPLICATIONS

Pursuant to 35 U.S.C. § 371, this application is the United States National Stage Application of International Patent Application No. PCT/US2017/068683, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016, and which both are incorporated herein by reference.

This application is related to International Patent Application No. PCT/US2017/068806, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068806, filed on Jun. 5, 2019.

This application is related to International Patent Application No. PCT/US2017/068828, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068828, filed on Jun. 5, 2019.

This application is related to International Patent Application No. PCT/US2017/068830, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068830, filed on Jun. 5, 2019.

This application is related to International Patent Application No. PCT/US2017/068832, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068832, filed on Jun. 5, 2019.

This application is related to International Patent Application No. PCT/US2017/068743, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068743, filed on Jun. 5, 2019.

TECHNICAL FIELD

The present techniques relate generally to Internet of Things (IoT) devices. More specifically the present techniques relate to devices that can perform remote sensing and actuation functions.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

BRIEF DESCRIPTION OF THE DRAWINGS

FIG. 120 is a block diagram of a non-transitory, machine readable medium including code to direct a processor to share resources across domains in accordance with some embodiments.

FIG. 121(A) is a schematic drawing of the hierarchical policy management system used in many current computer networks in accordance with some embodiments.

FIG. 121(B) is a schematic drawing of policy management in a peer-to-peer (P2P) network, such as an IoT mesh network in accordance with some embodiments.

FIG. 122 is a schematic diagram of systems in nodes to implement a distributed policy management system in accordance with some embodiments.

FIG. 123(A) is a ladder diagram of an example method of a new non-configured node attempting to discover policies on a network, for example, from a peer node in accordance with some embodiments.

FIG. 123(B) is a ladder diagram of an example method of a new non-configured node discovering policies from a configured node in accordance with some embodiments.

FIG. 124 is a ladder diagram of an example method of a configured node communicating with a node having an updated policy to update the policies of the configured node in accordance with some embodiments.

FIG. 125 is a ladder diagram of an example method showing the concatenation of policies obtained from different nodes by the configured node in accordance with some embodiments.

FIG. 126 is a block diagram of an example of components that may be present in an IoT device for the distributed management of policies in accordance with some embodiments.

FIG. 127 is a block diagram of a non-transitory, machine readable medium including code to direct a processor to manage policies in an IoT network in cooperation with other IoT devices in accordance with some embodiments.

FIG. 128 is a drawing of a power plug device that may be used to improve the availability of an IoT device in accordance with some embodiments.

FIG. 129 is a plot of a global state transition based on self-adaptation for the power plug device in accordance with some embodiments.

Figure 130:
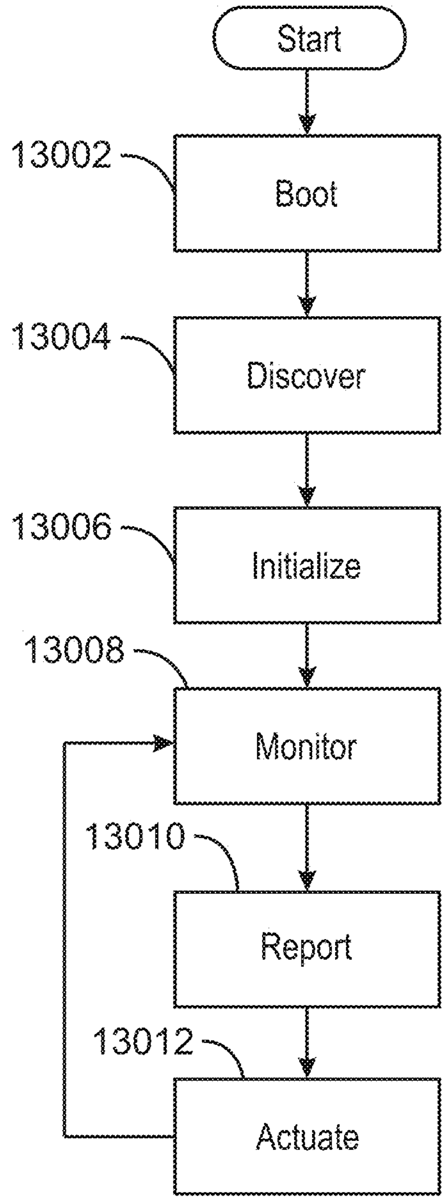

FIG. 130 is a process flow diagram of an example method for using a power plug device to increase the reliability of an IoT device in accordance with some embodiments.

Figure 131:
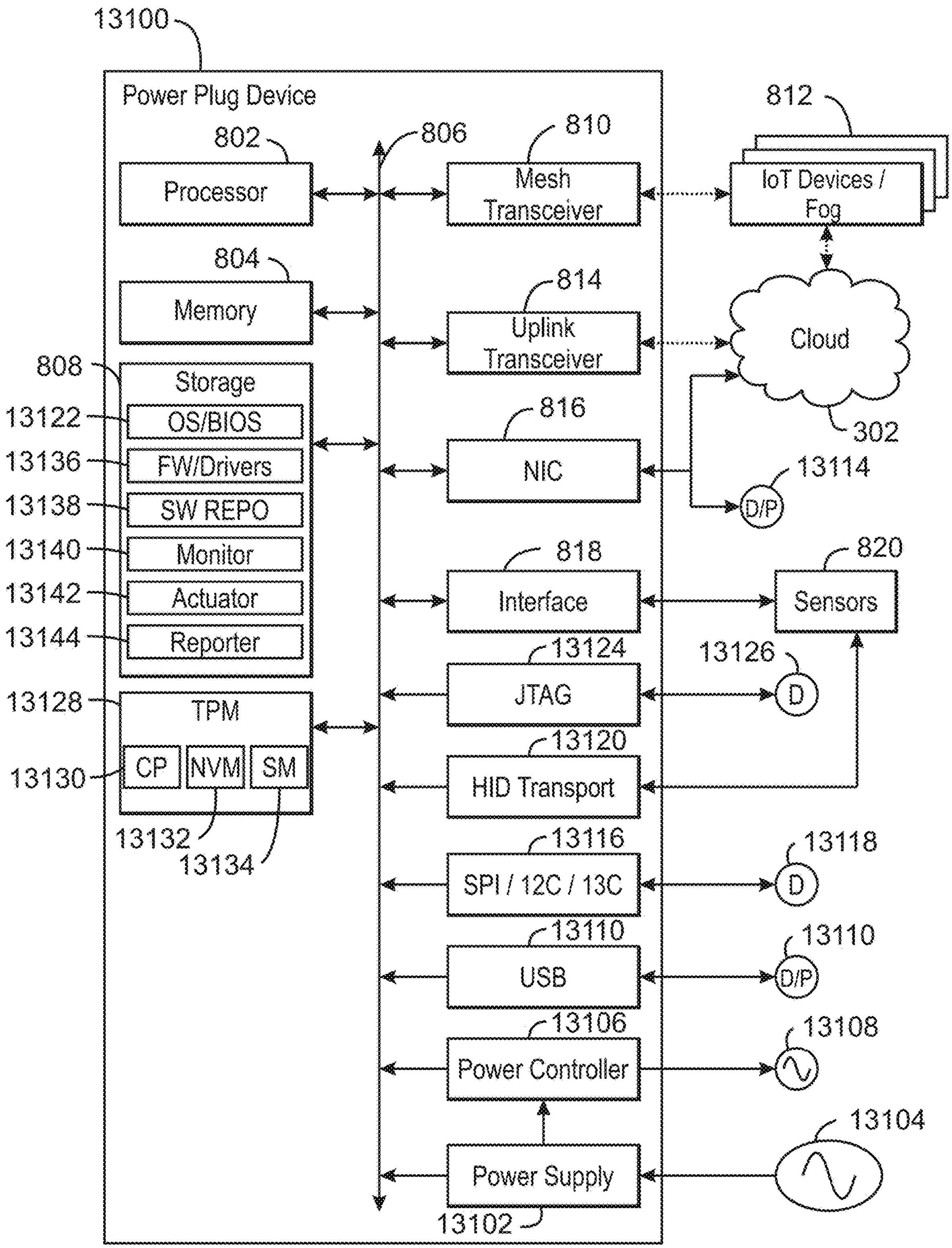

FIG. 131 is a block diagram of an example of components that may be present in a power plug device for increasing the availability of an IoT device in accordance with some embodiments.

Figure 132:
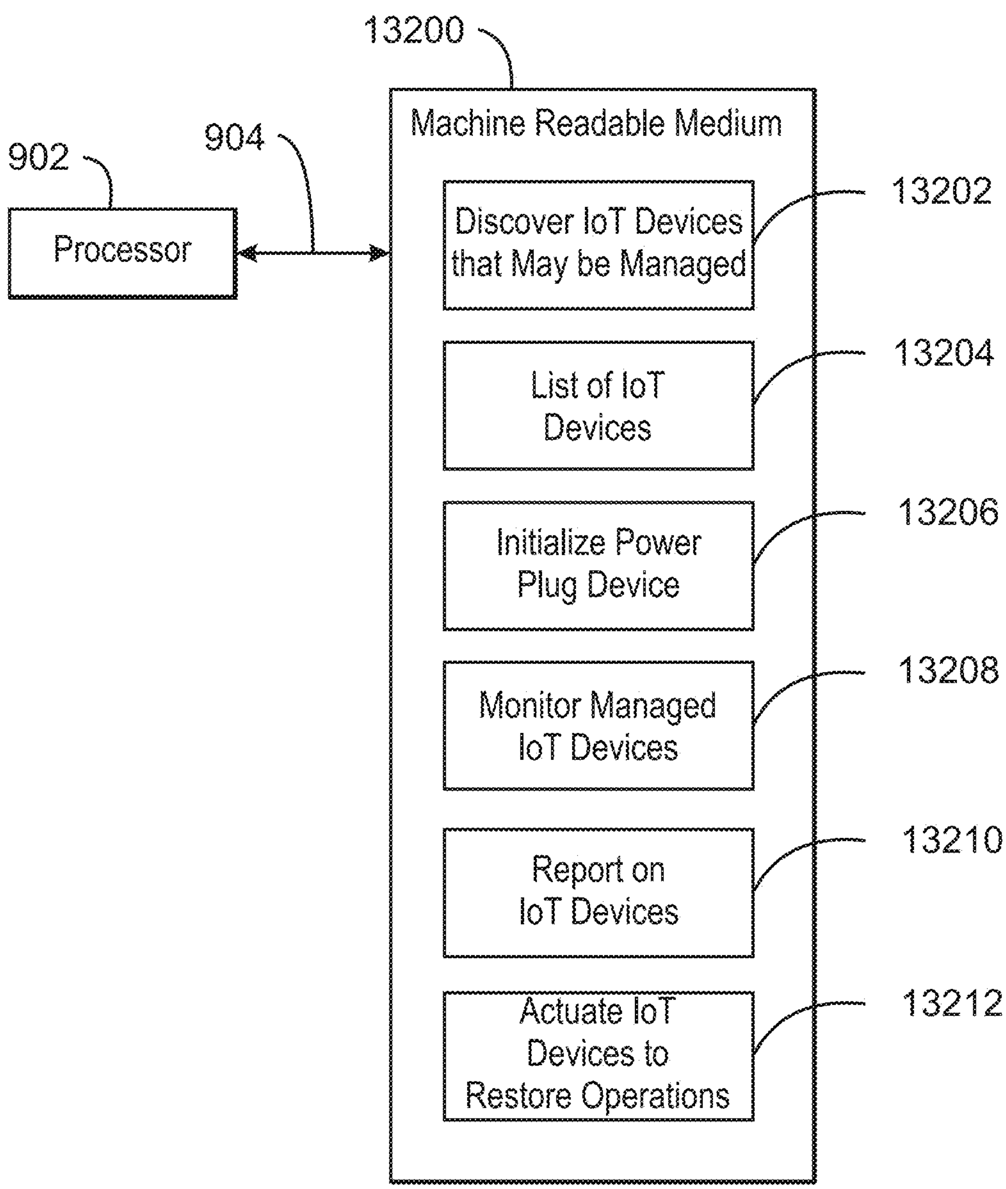

FIG. 132 is a block diagram of a non-transitory, machine readable medium including code to direct a processor to increase the availability of an IoT device in accordance with some embodiments.

Figure 133:
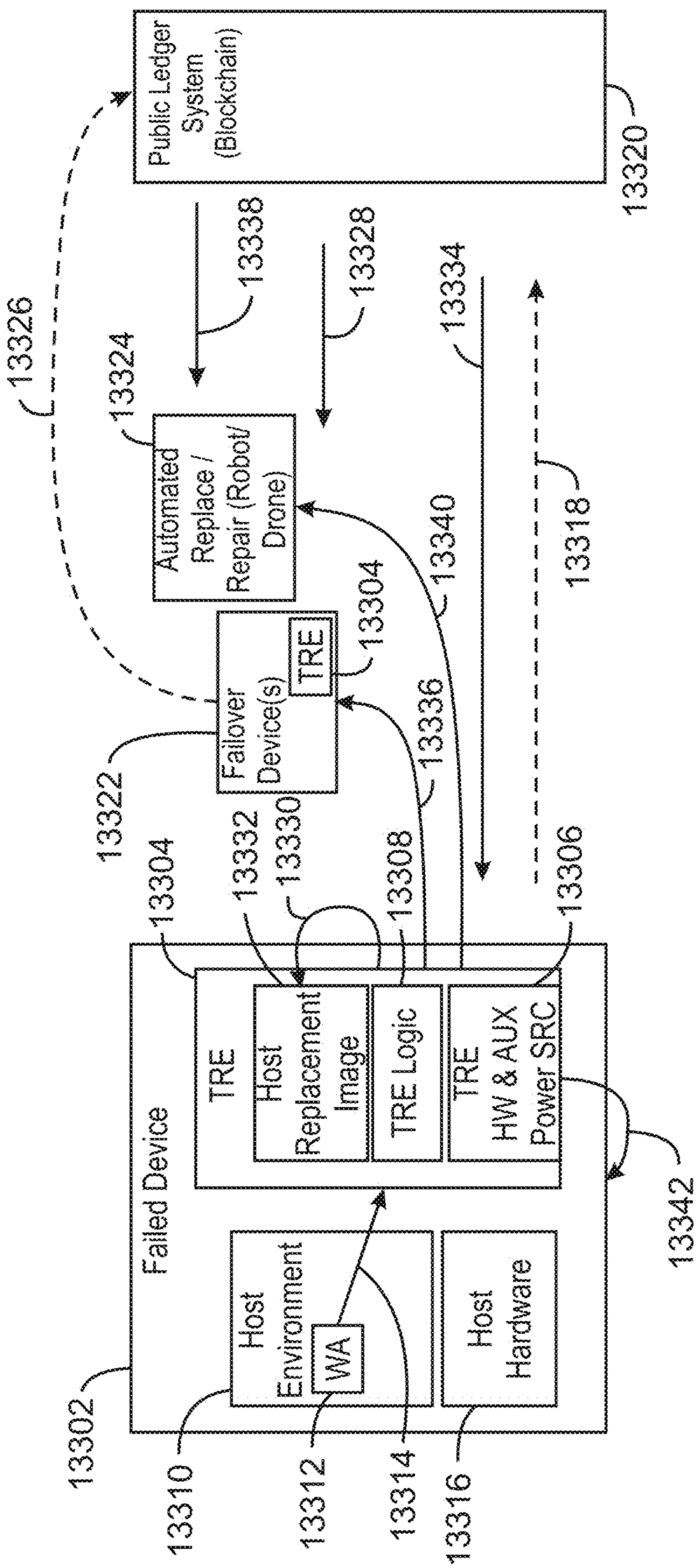

FIG. 133 is a schematic diagram of a failover mechanism for a failed device in accordance with some embodiments.

Figure 134:
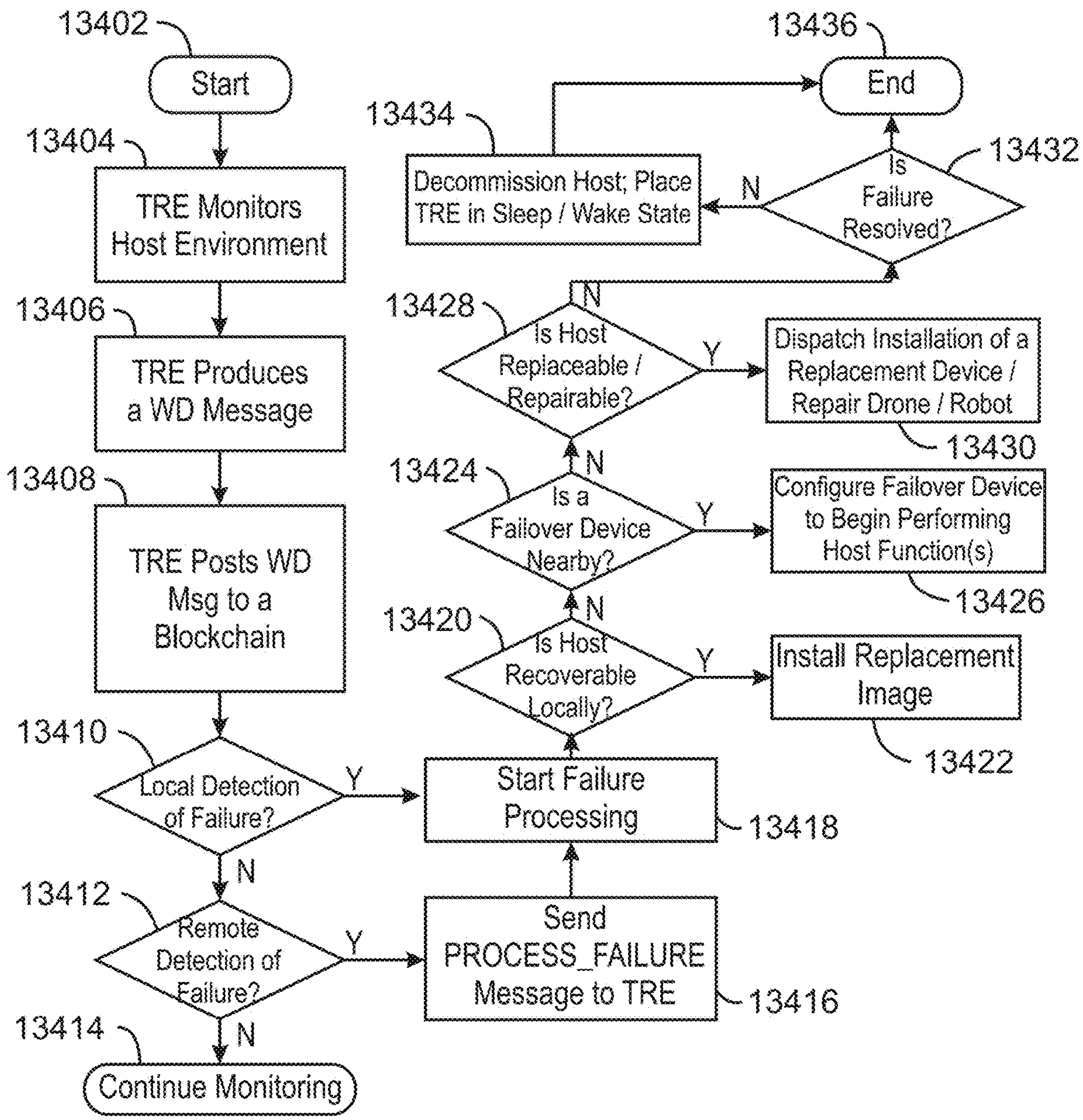

FIG. 134 is a process flow diagram of an example method for implementing a failover mechanism using a trusted reliability engine (TRE) in accordance with some embodiments.

Figure 135:
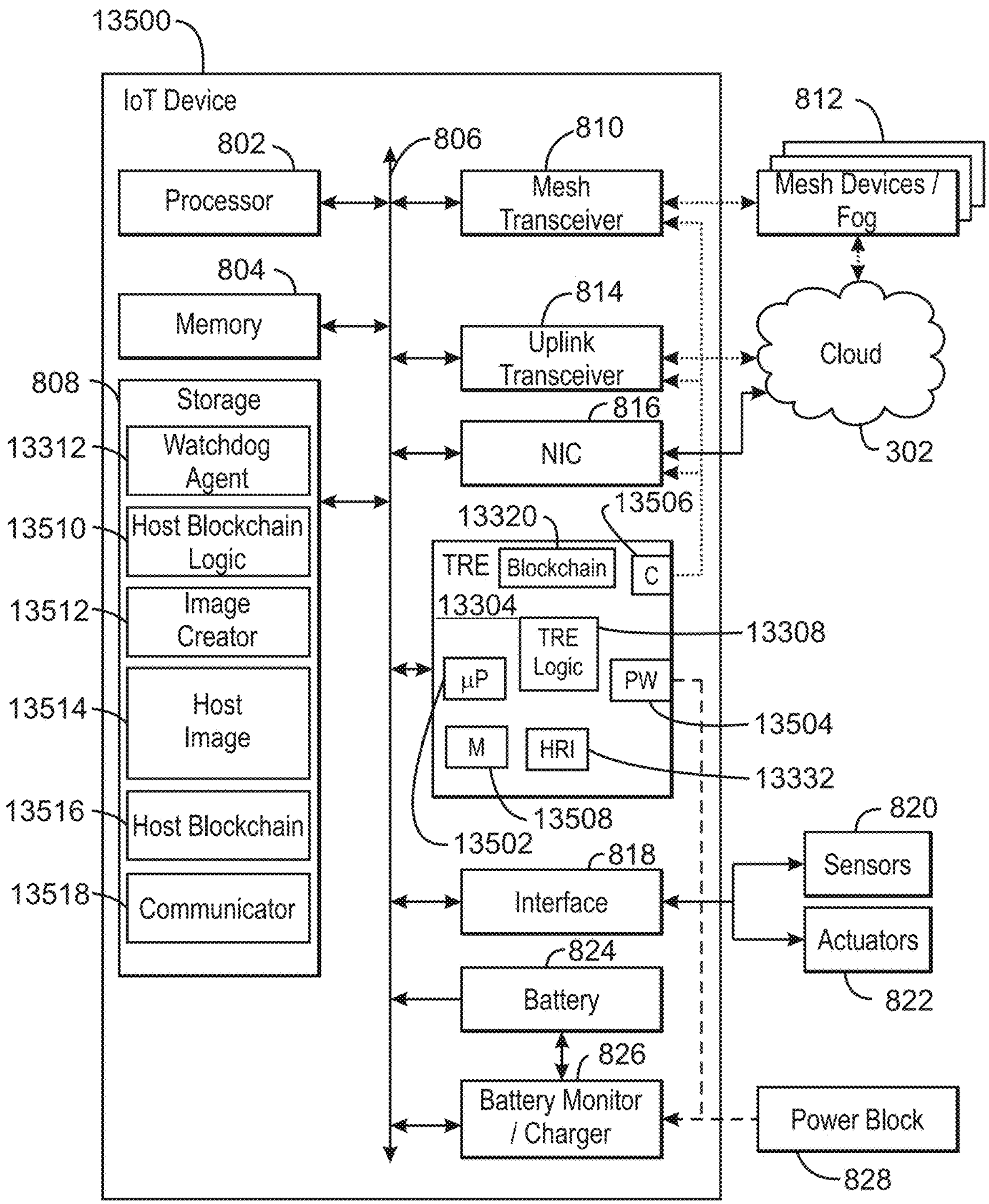

FIG. 135 is a block diagram of an example of components that may be present in an IoT device for implementing a failover mechanism using a trusted reliability engine in accordance with some embodiments.

Figure 136:
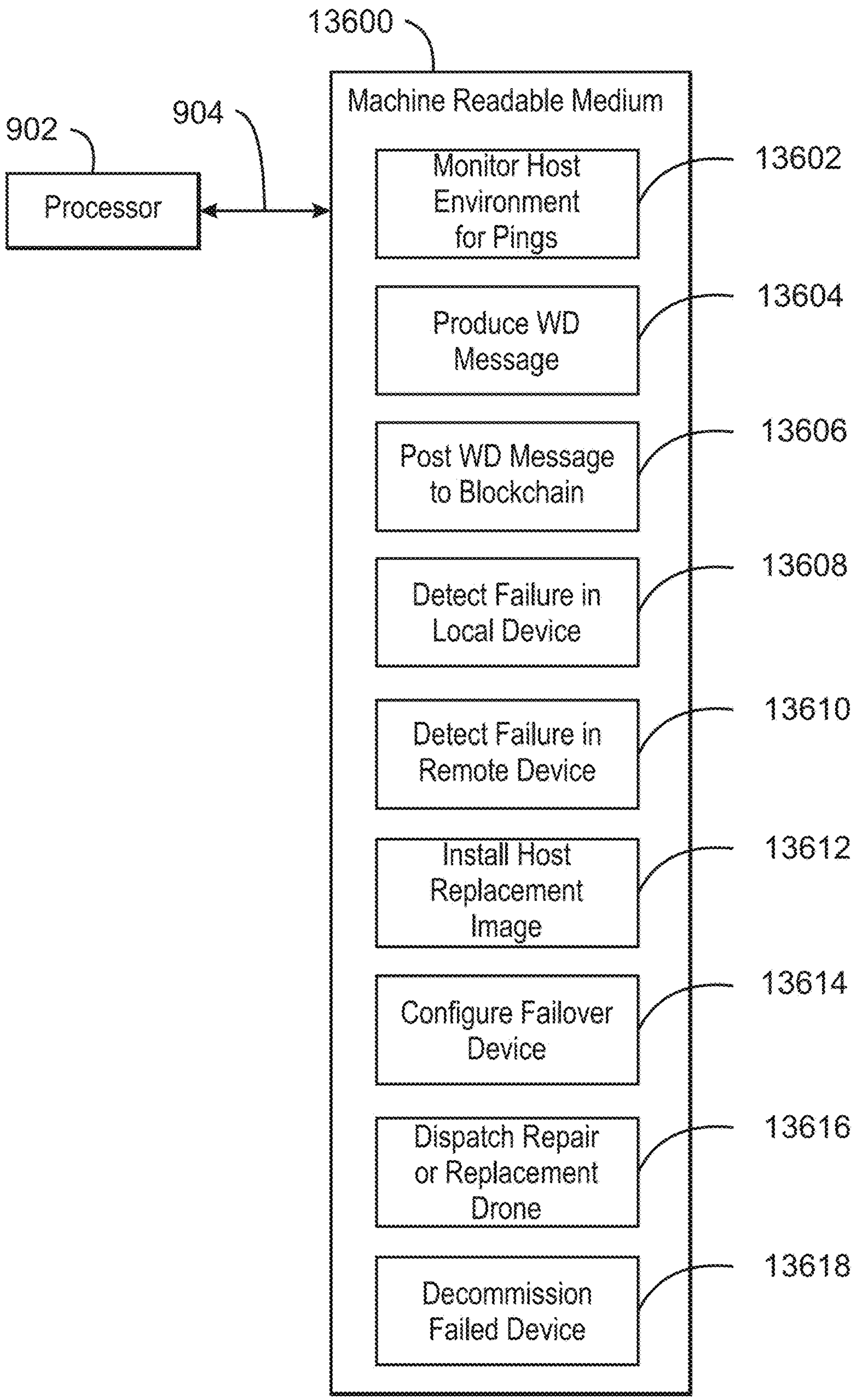

FIG. 136 is a block diagram of a non-transitory, machine readable medium including code to direct a processor to implement a failover mechanism using a trusted reliability engine in accordance with some embodiments.

Figure 137:
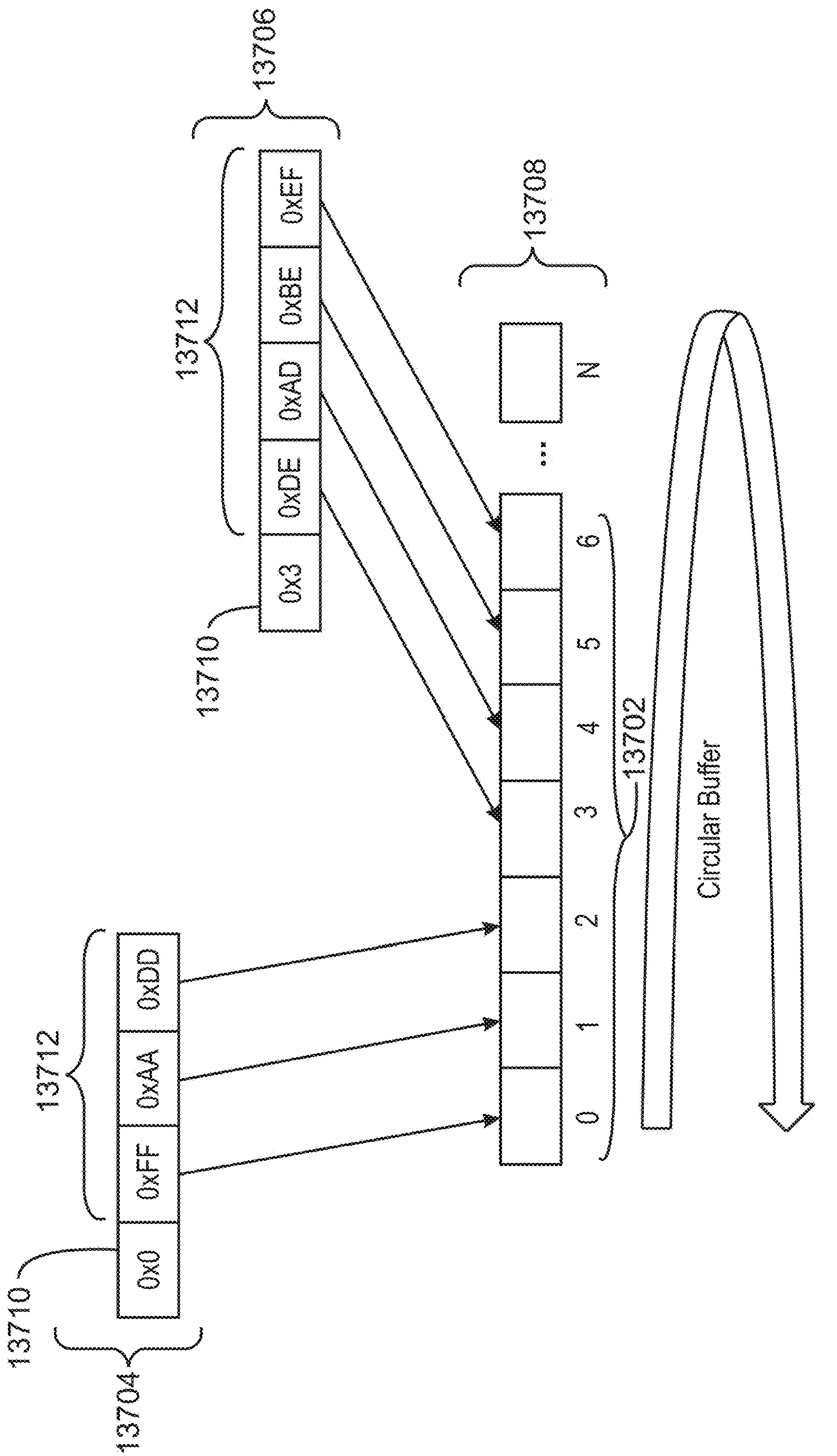

FIG. 137 is a schematic diagram of the construction of a key using fractional keys and exchanged between nodes in an IoT network in accordance with some embodiments.

Figure 138:
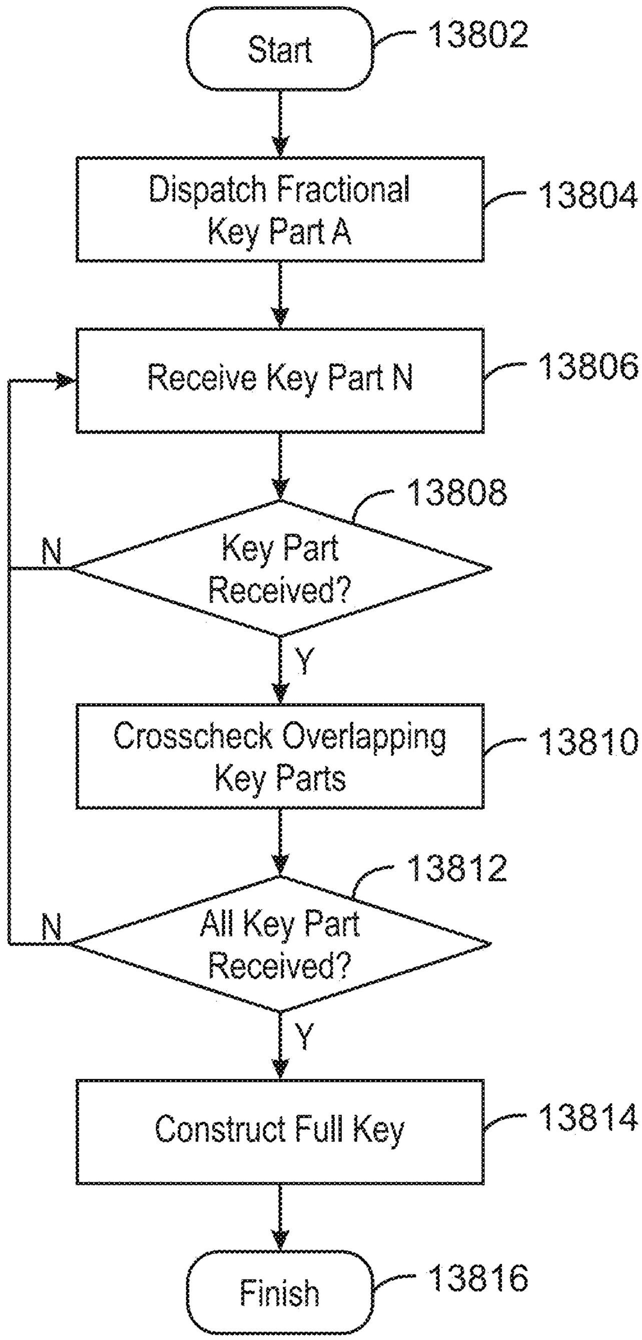

FIG. 138 is a process flow diagram of an example method for assembling a full key from fractional keys stored in individual nodes in an IoT network in accordance with some embodiments.

Figure 139:
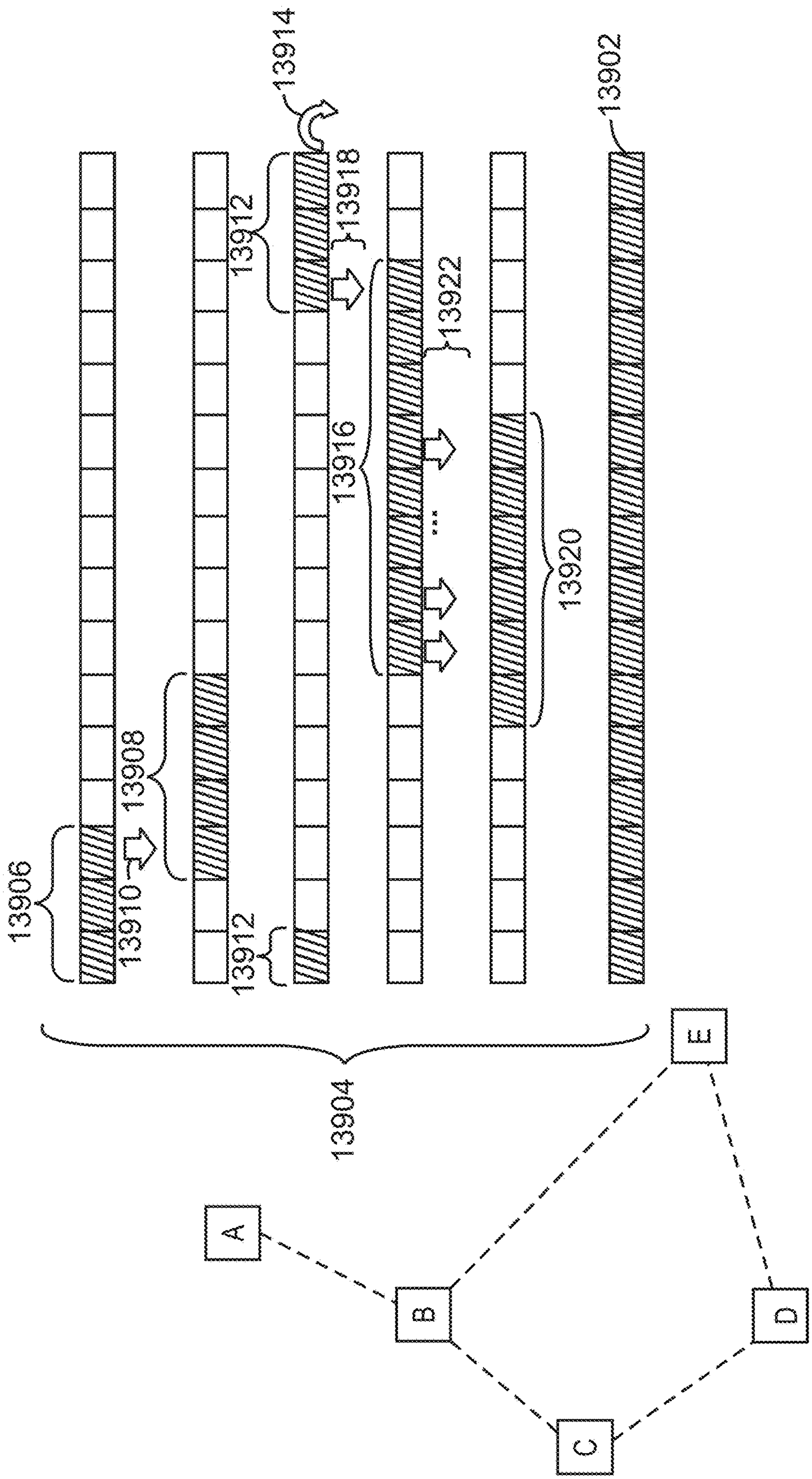

FIG. 139 is a schematic diagram of the assembly of a complete key from fractional keys provided by five nodes A-E in accordance with some embodiments.

Figure 140:
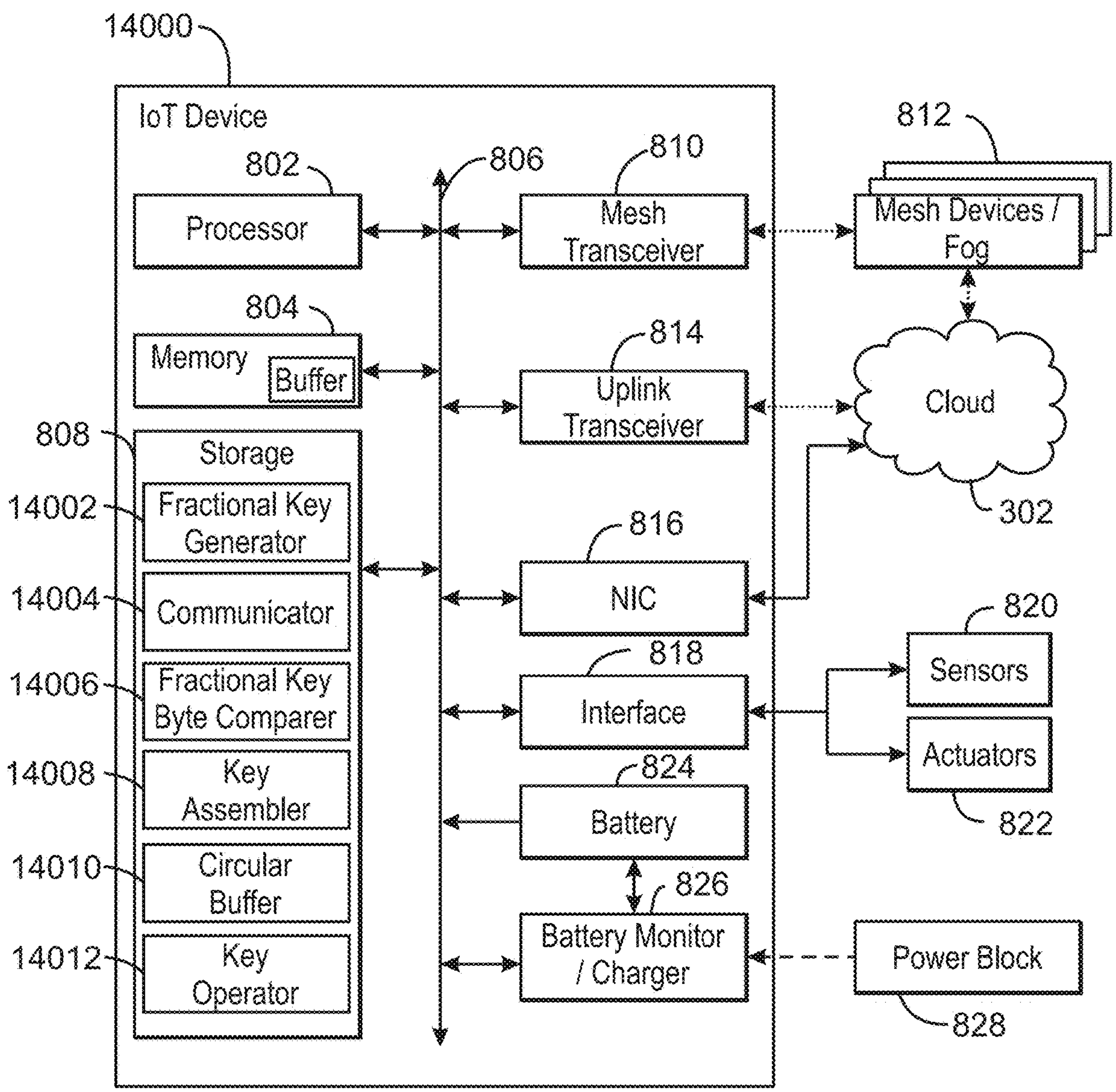

FIG. 140 is a block diagram of an example of components that may be present in an IoT device for assembling multiple fractional keys from different nodes in an IP mesh network into a single complete key in accordance with some embodiments.

Figure 141:
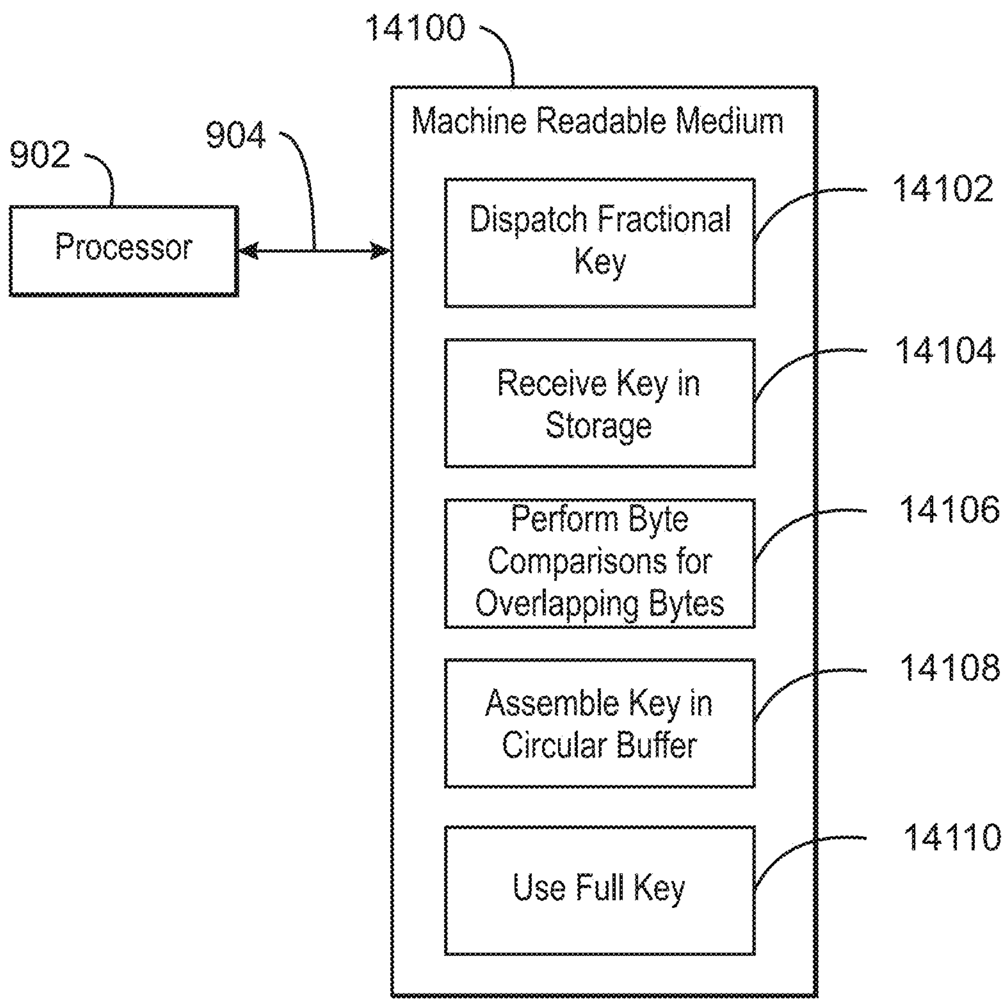

FIG. 141 is a block diagram of a non-transitory, machine readable medium including code to direct a processor to receive fractional keys, assemble the fractional keys into a final key, and use the final key in accordance with some embodiments.

Figure 142:
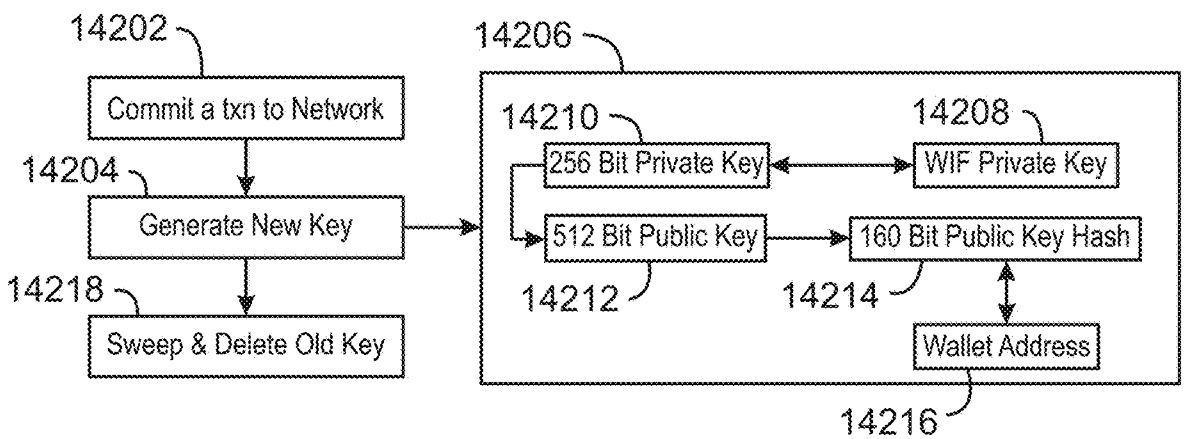

FIG. 142 is a schematic diagram of a procedure for generating keys on demand for devices on lossy networks in accordance with some embodiments.

Figure 143:
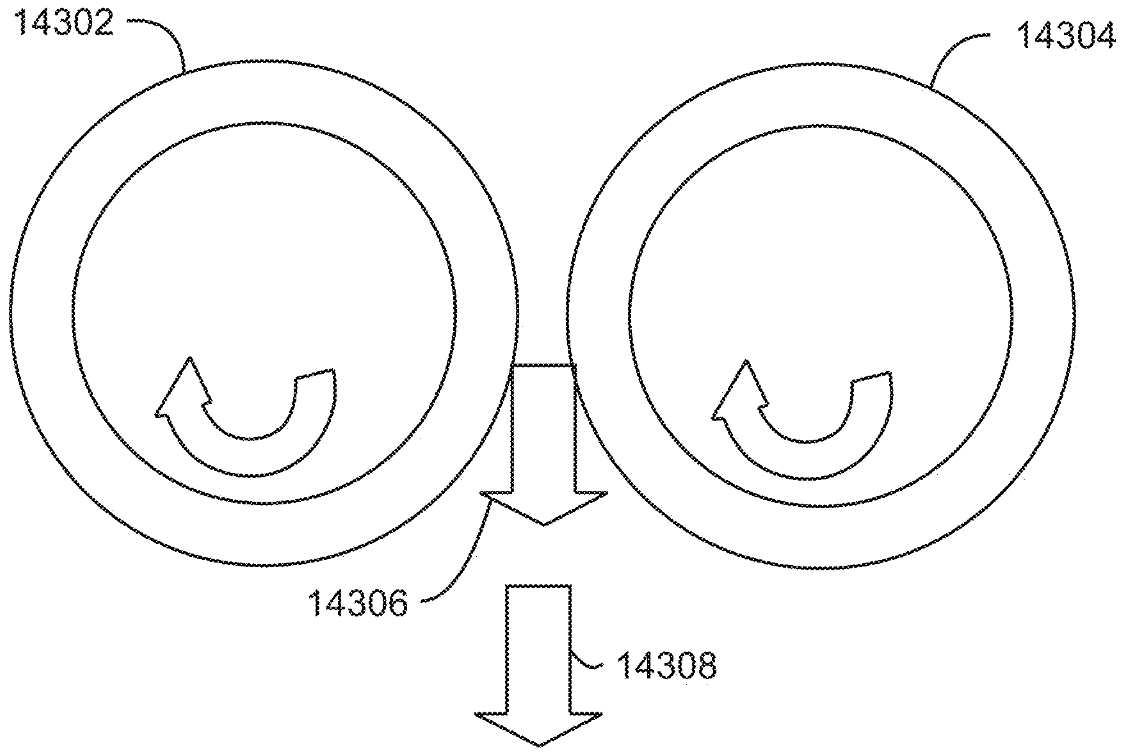

FIG. 143 is a schematic diagram of a key generation method that may be used in the on-demand process for key generation described above, as well as for generating keys in other contexts in accordance with some embodiments.

Figure 144:
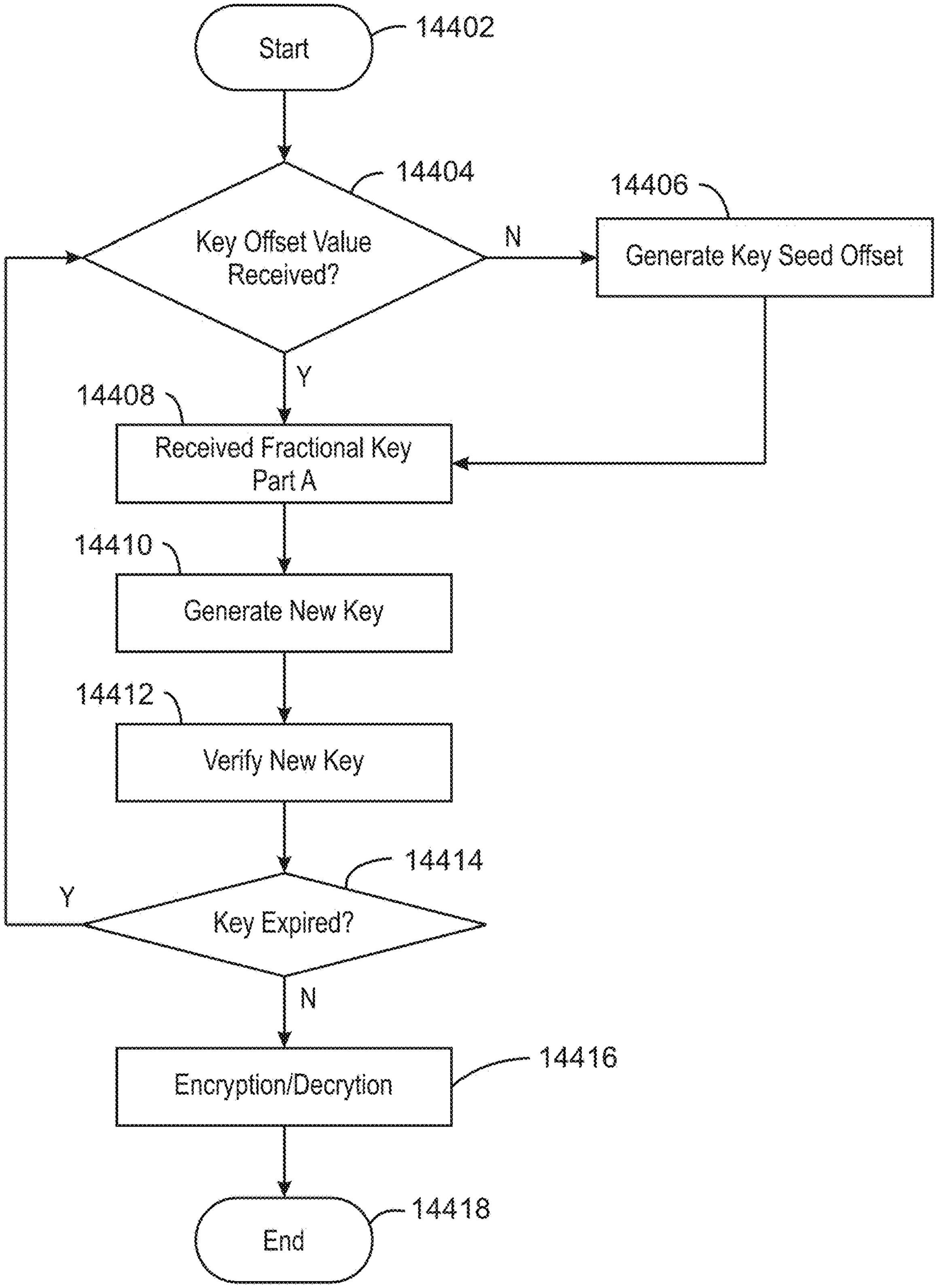

FIG. 144 is a process flow diagram of an example method for generating keys in accordance with some embodiments.

Figure 145:
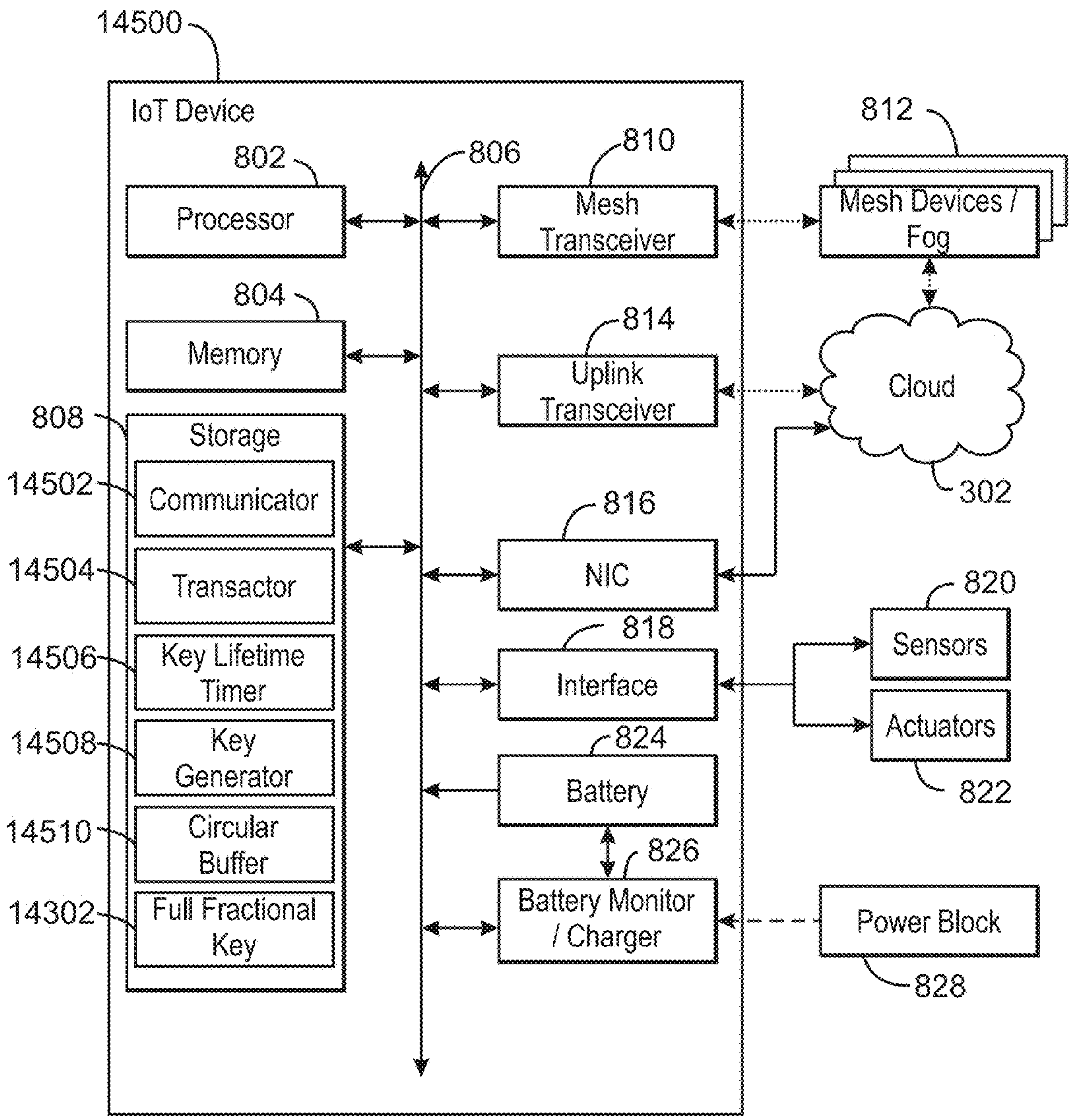

FIG. 145 is a block diagram of an example of components that may be present in an IoT device for generating keys on demand in accordance with some embodiments.

Figure 146:
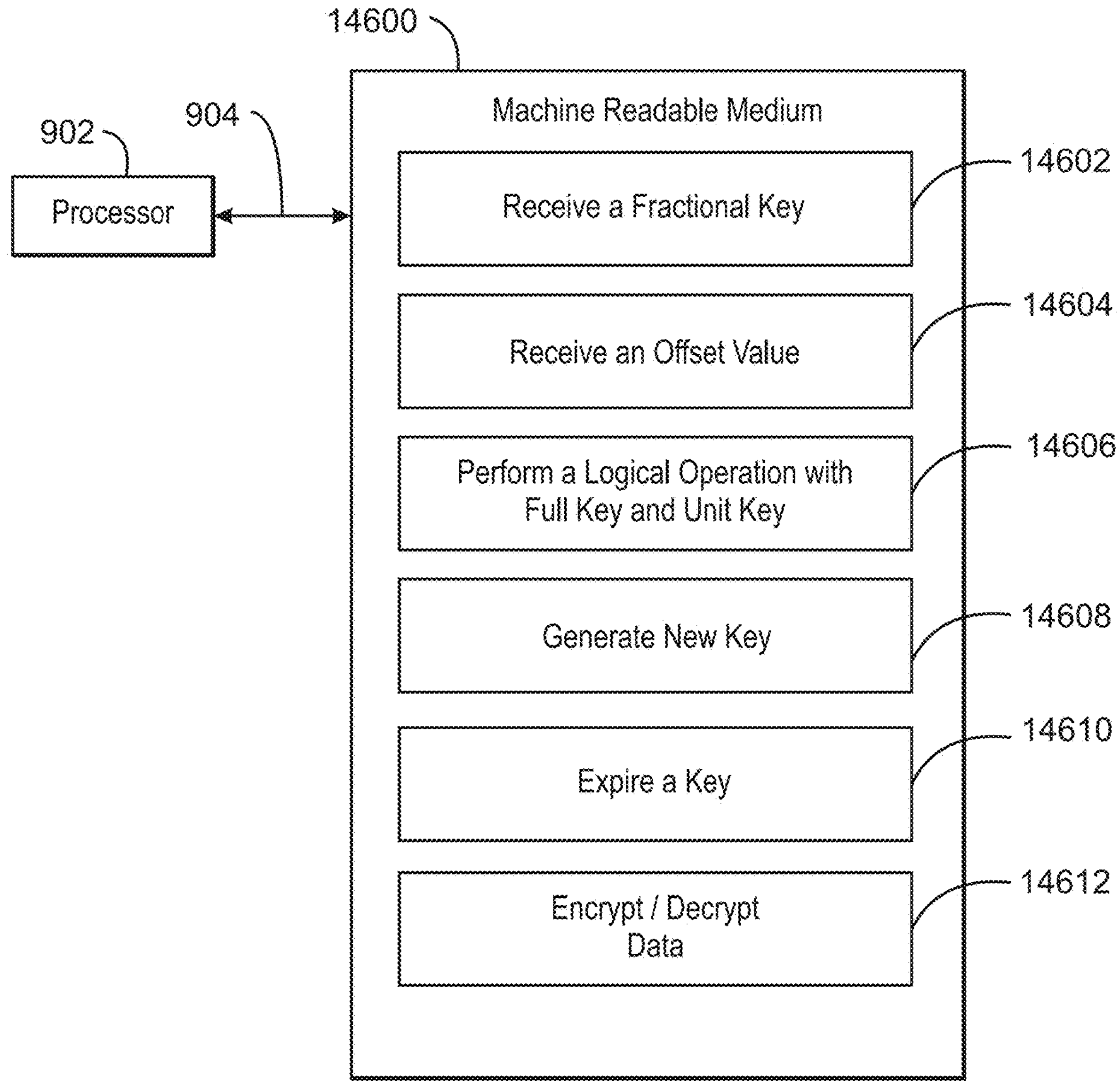

FIG. 146 is a block diagram of a non-transitory, machine readable medium including code to direct a processor to generate keys on demand in accordance with some embodiments.

Figure 147:
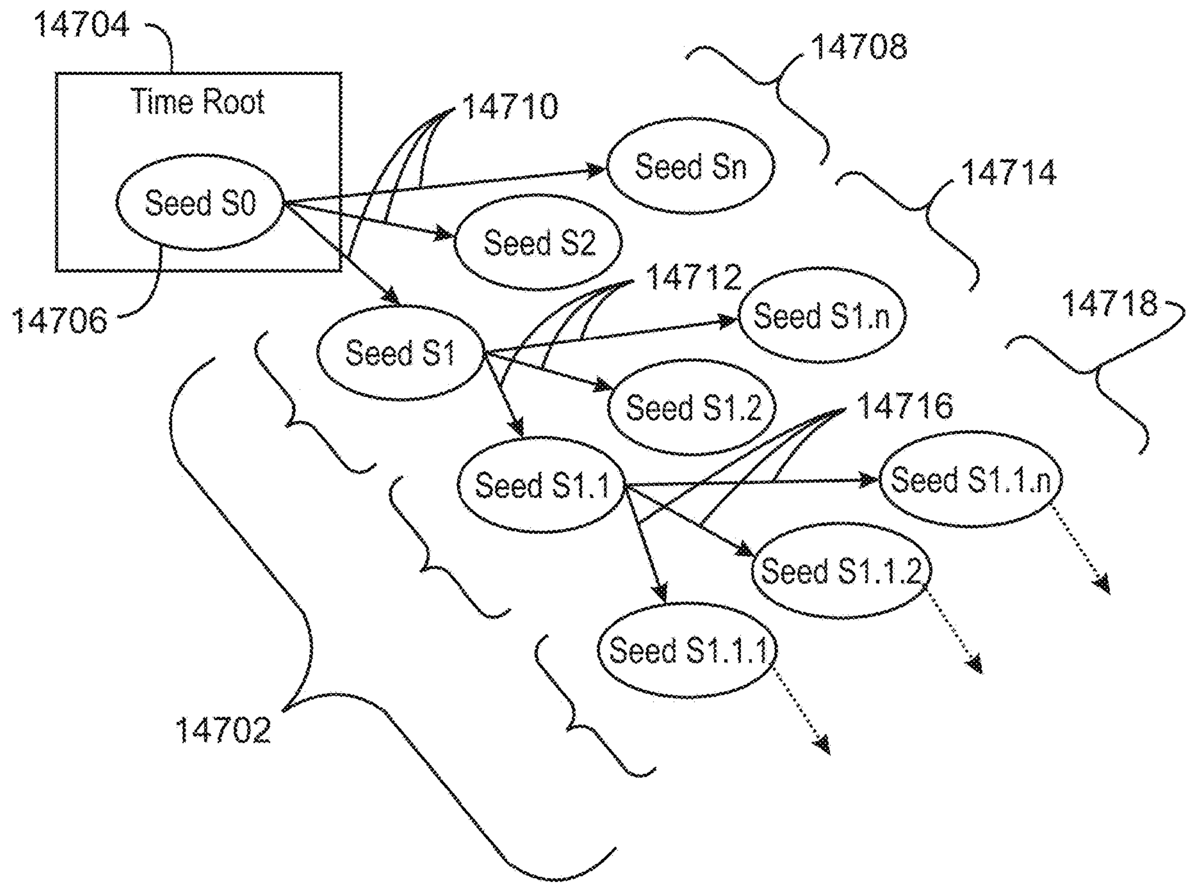

FIG. 147 is a schematic diagram of an entropy multiplexing process for generating a number of seeds that may be used to generate new keys in accordance with some embodiments.

Figure 148:
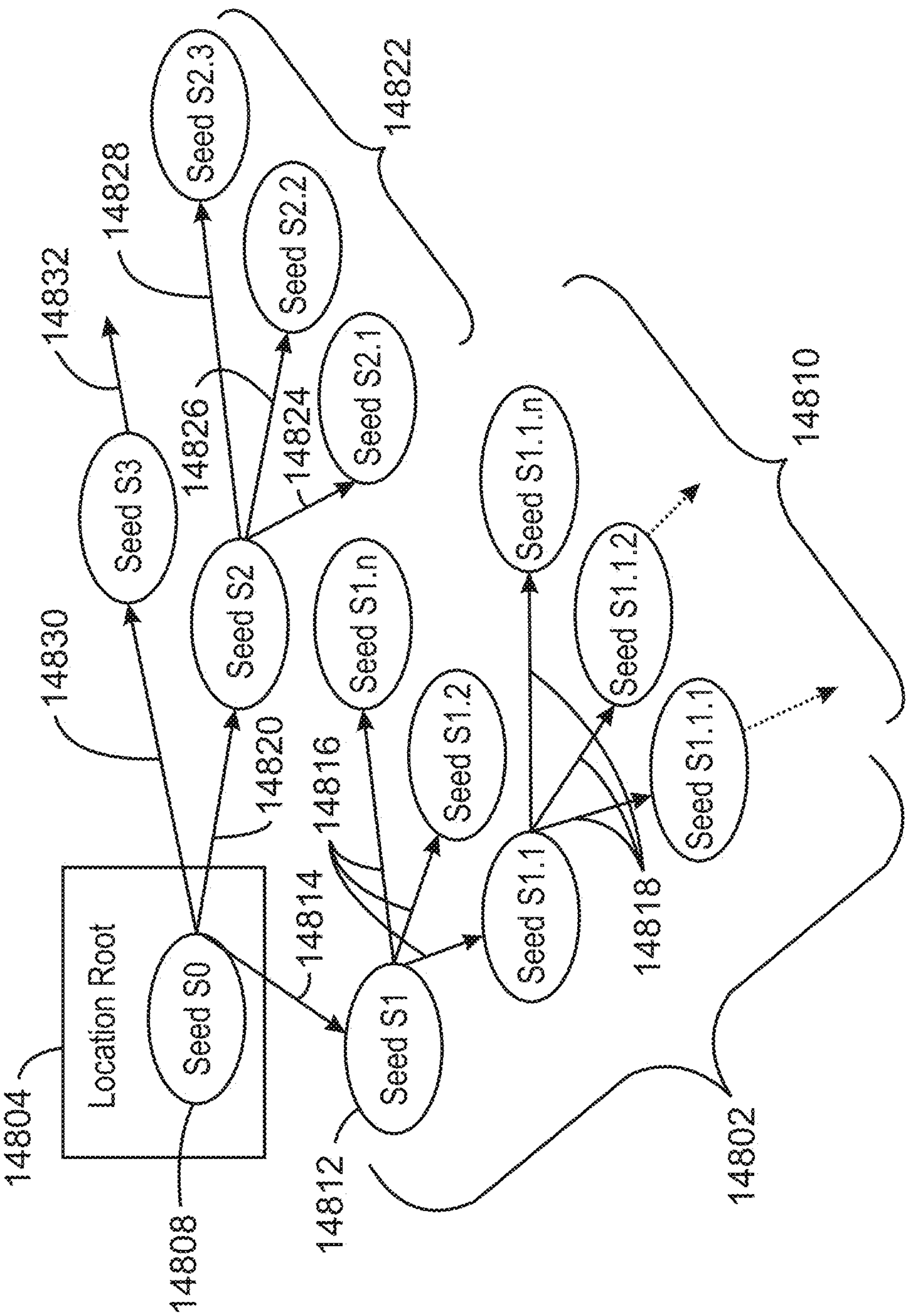

FIG. 148 is a schematic diagram illustrating a process for generating a location seed tree in accordance with some embodiments.

Figure 149:
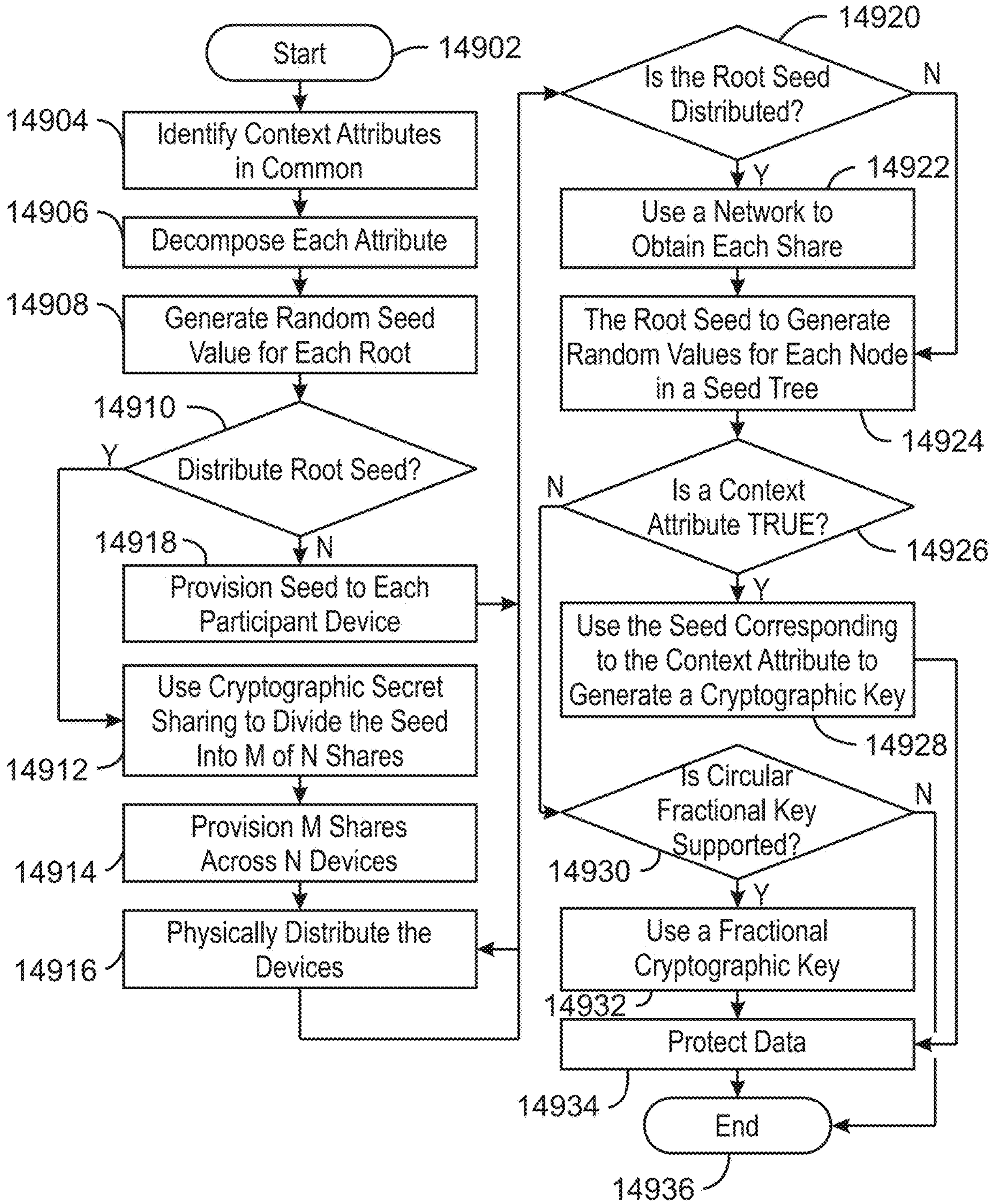

FIG. 149 is a process flow diagram of an example method for generating seeds using entropy multiplexing, and using those seeds to generate keys for encrypted communications in accordance with some embodiments.

Figure 150:
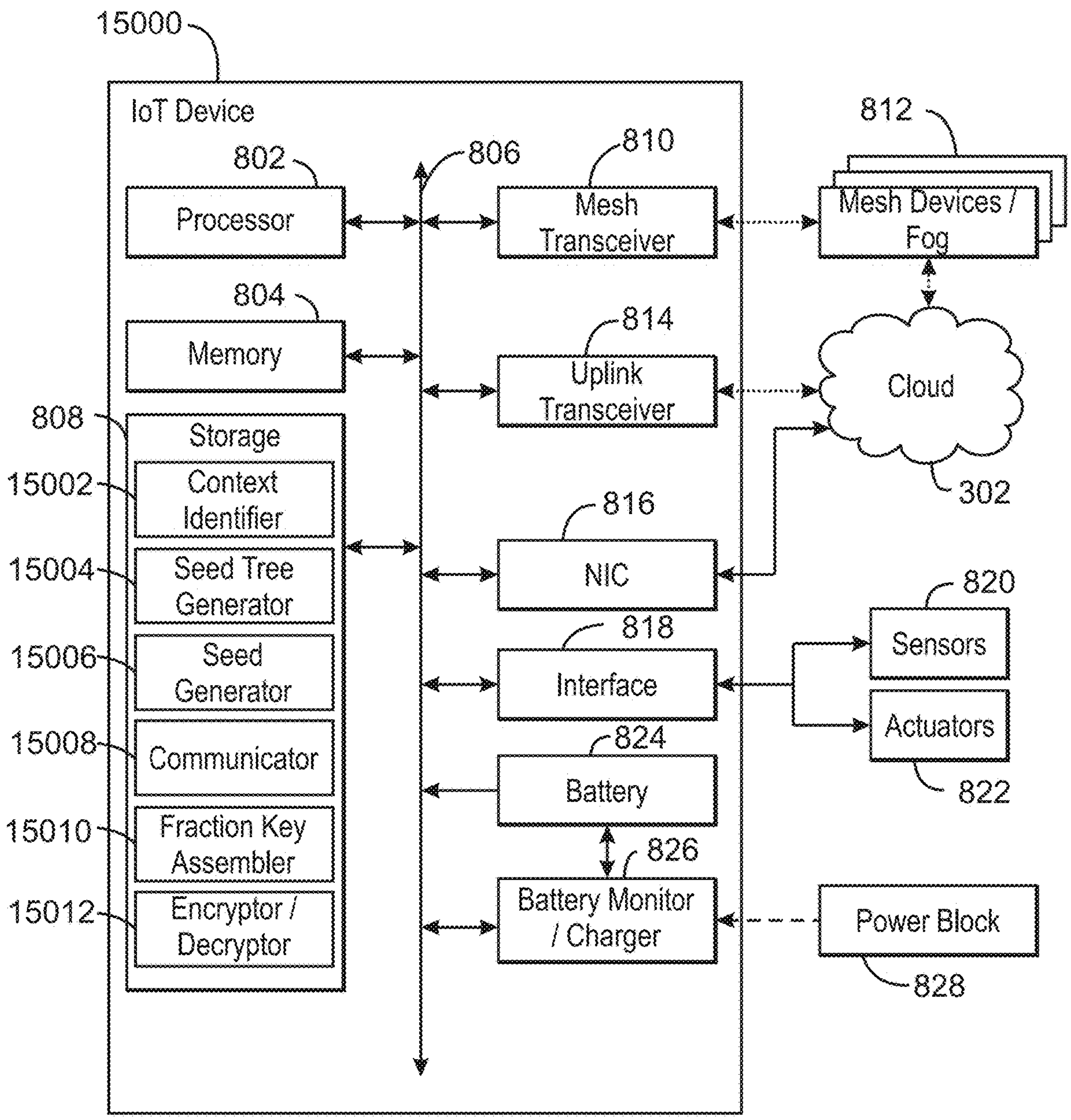

FIG. 150 is a block diagram of an example of components that may be present in an IoT device for assembling multiple fractional keys from different nodes in an IP mesh network into a single complete key in accordance with some embodiments.

Figure 151:
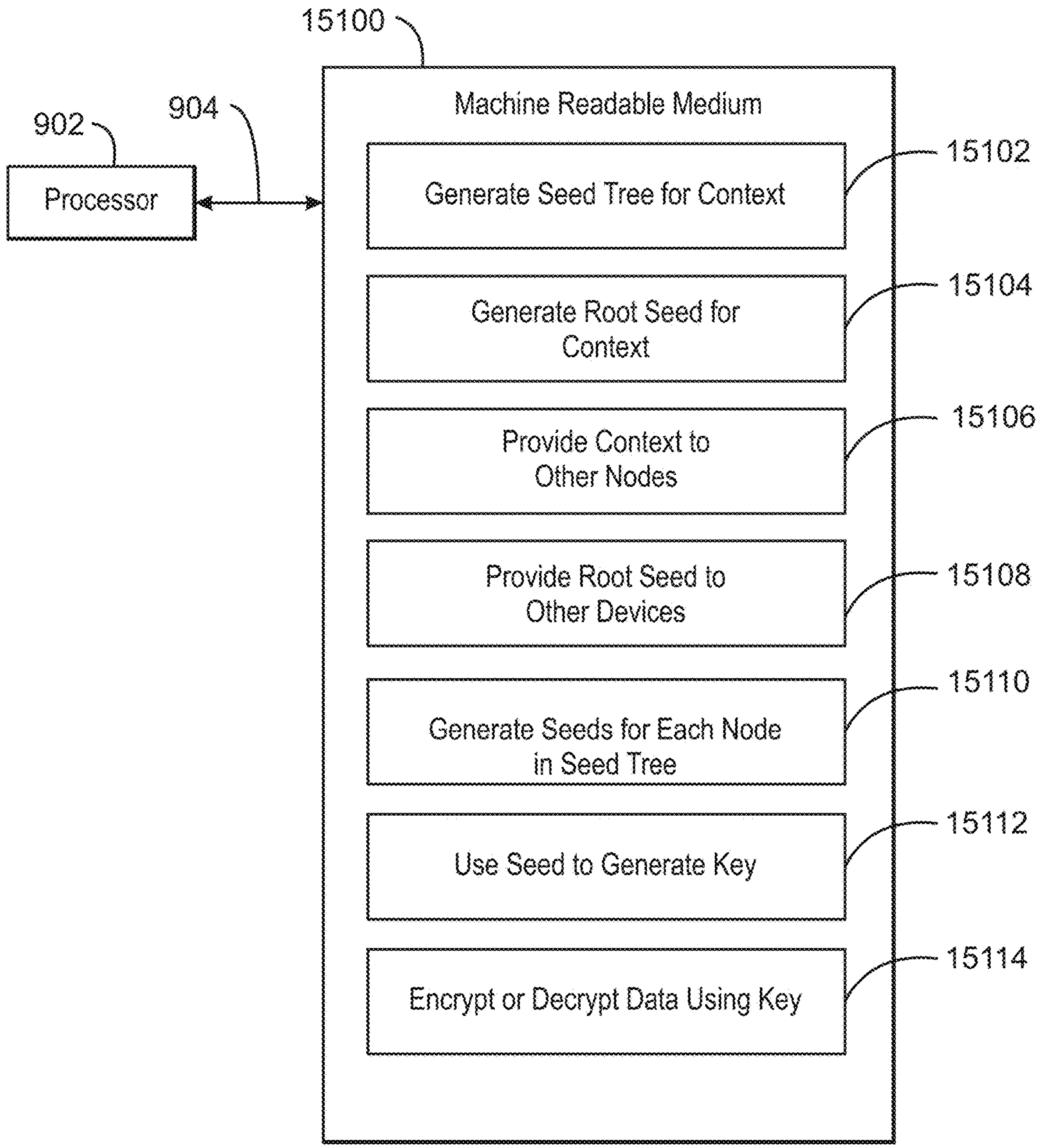

FIG. 151 is a block diagram of a non-transitory, machine readable medium including code to direct a processor to use entropy multiplexing to generate a common secret between devices in accordance with some embodiments.

Figure 152:
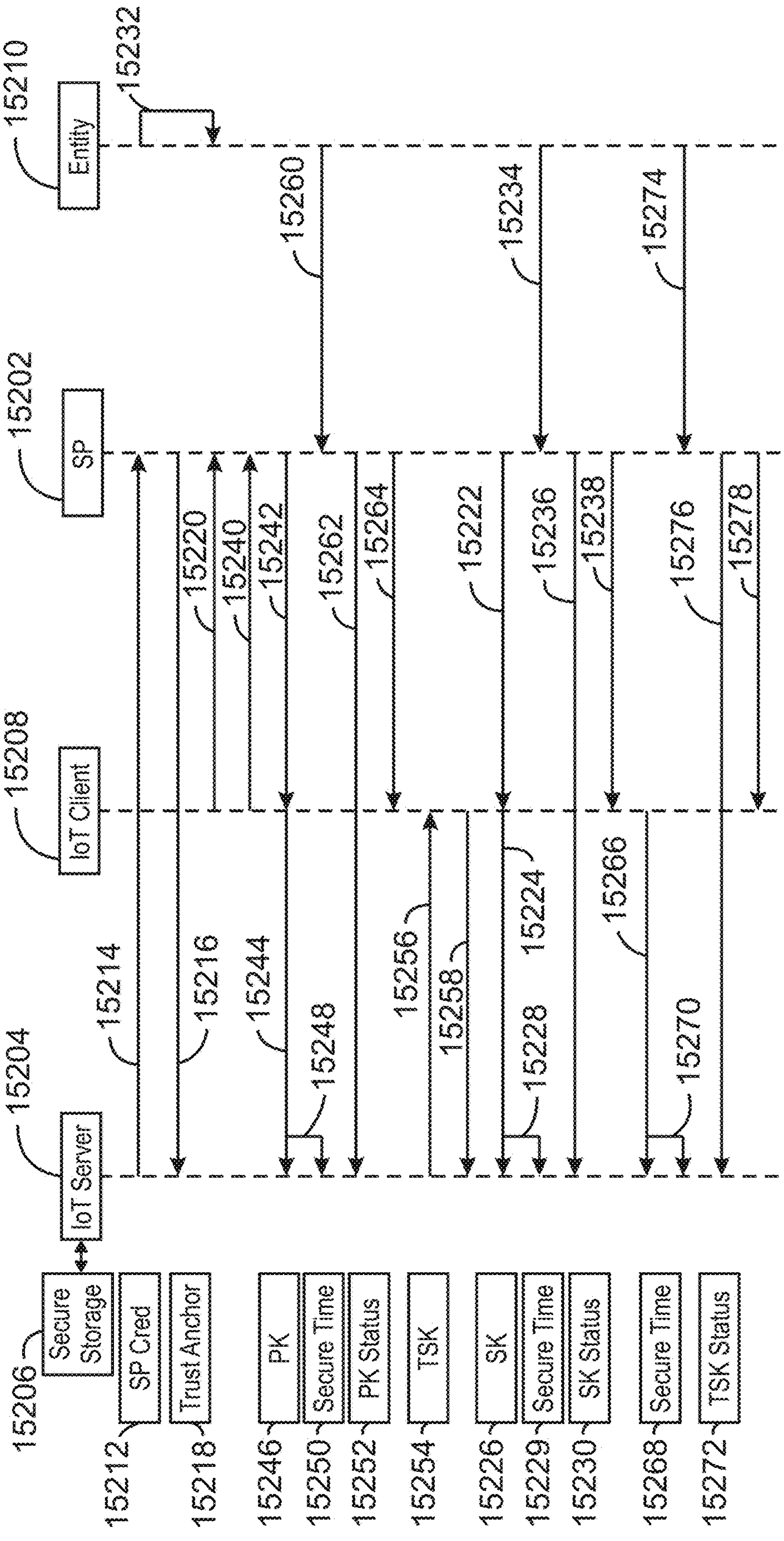

FIG. 152 is a ladder diagram of an example method for unified key management in an IoT network environment in accordance with some embodiments.

Figure 153:
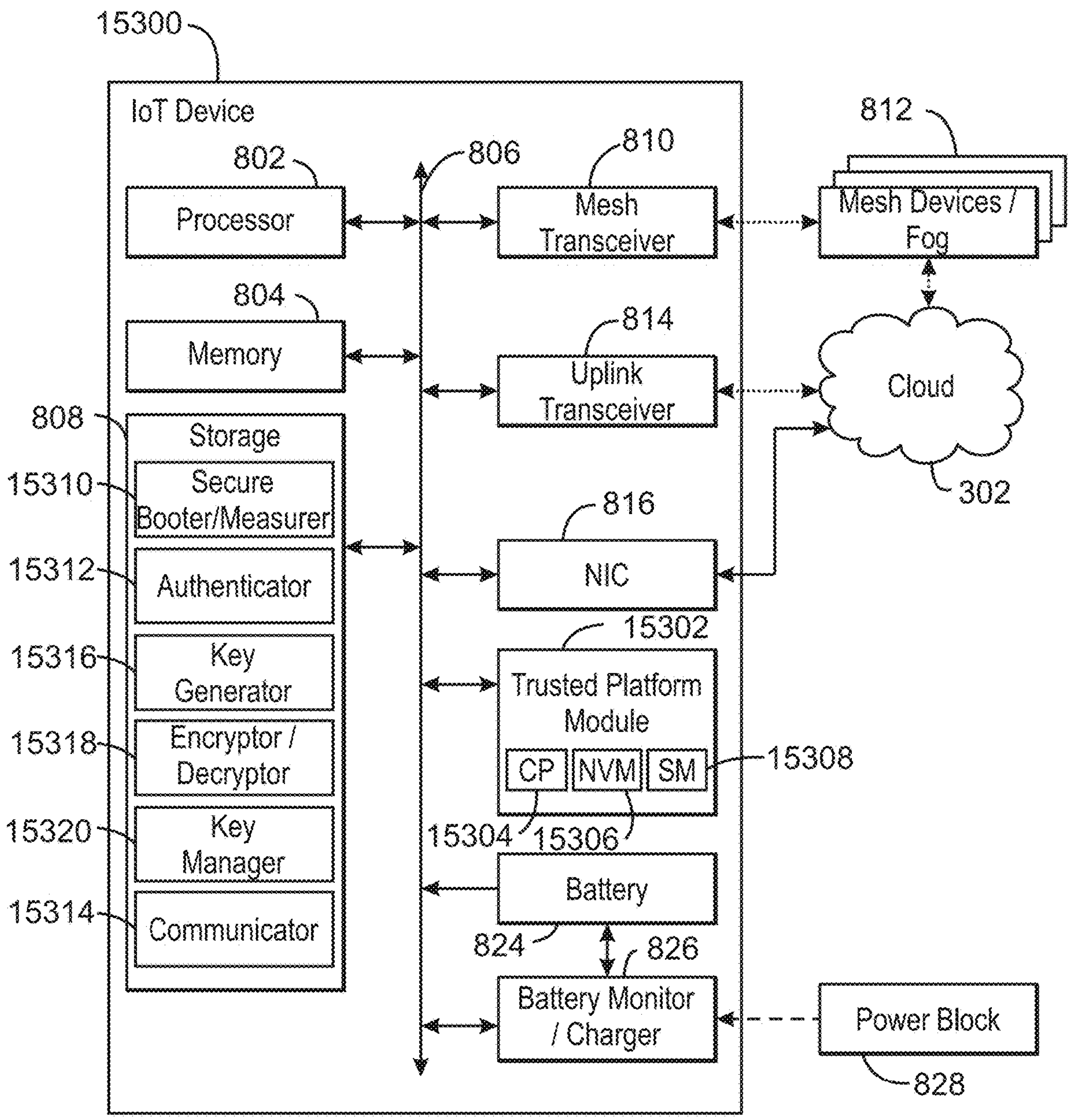

FIG. 153 is a block diagram of an example of components that may be present in an IoT device for managing keys in a network of IoT mesh devices in accordance with some embodiments.

Figure 154:
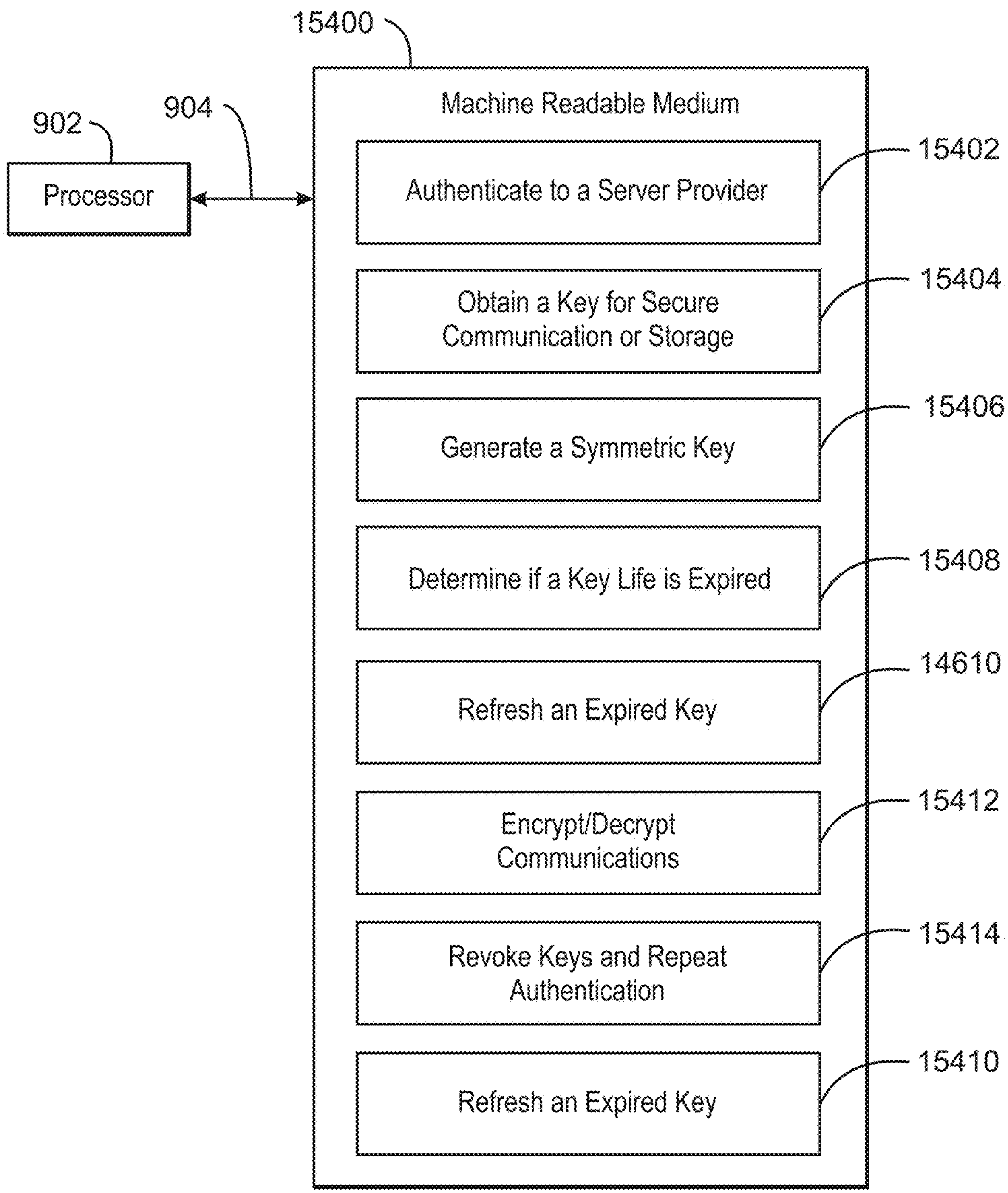

FIG. 154 is a block diagram of a non-transitory, machine readable medium including code to direct a processor to manage keys for secure communications in accordance with some embodiments.

Figure 155:
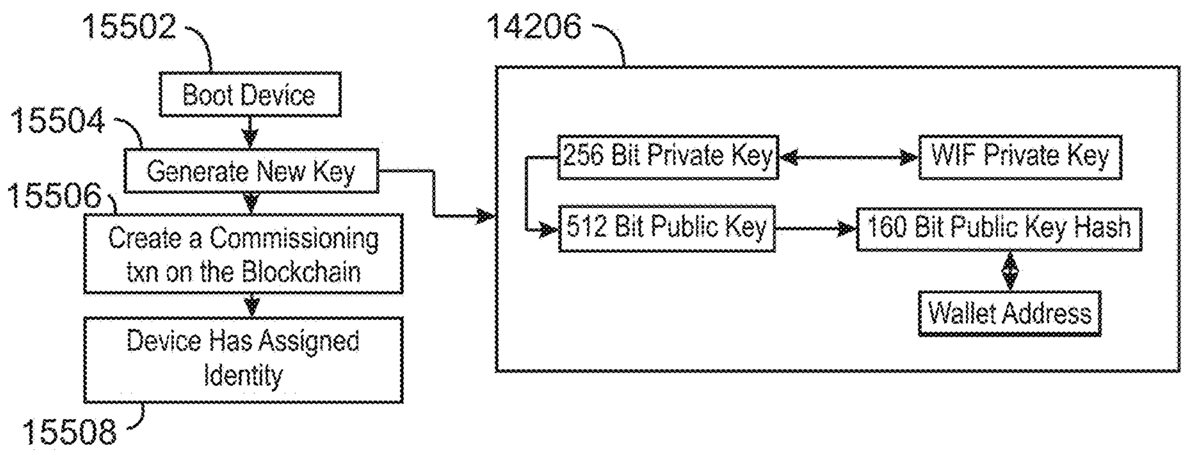

FIG. 155 is a schematic diagram of a process for bootstrap and discovery of a device in accordance with some embodiments.

Figure 156:
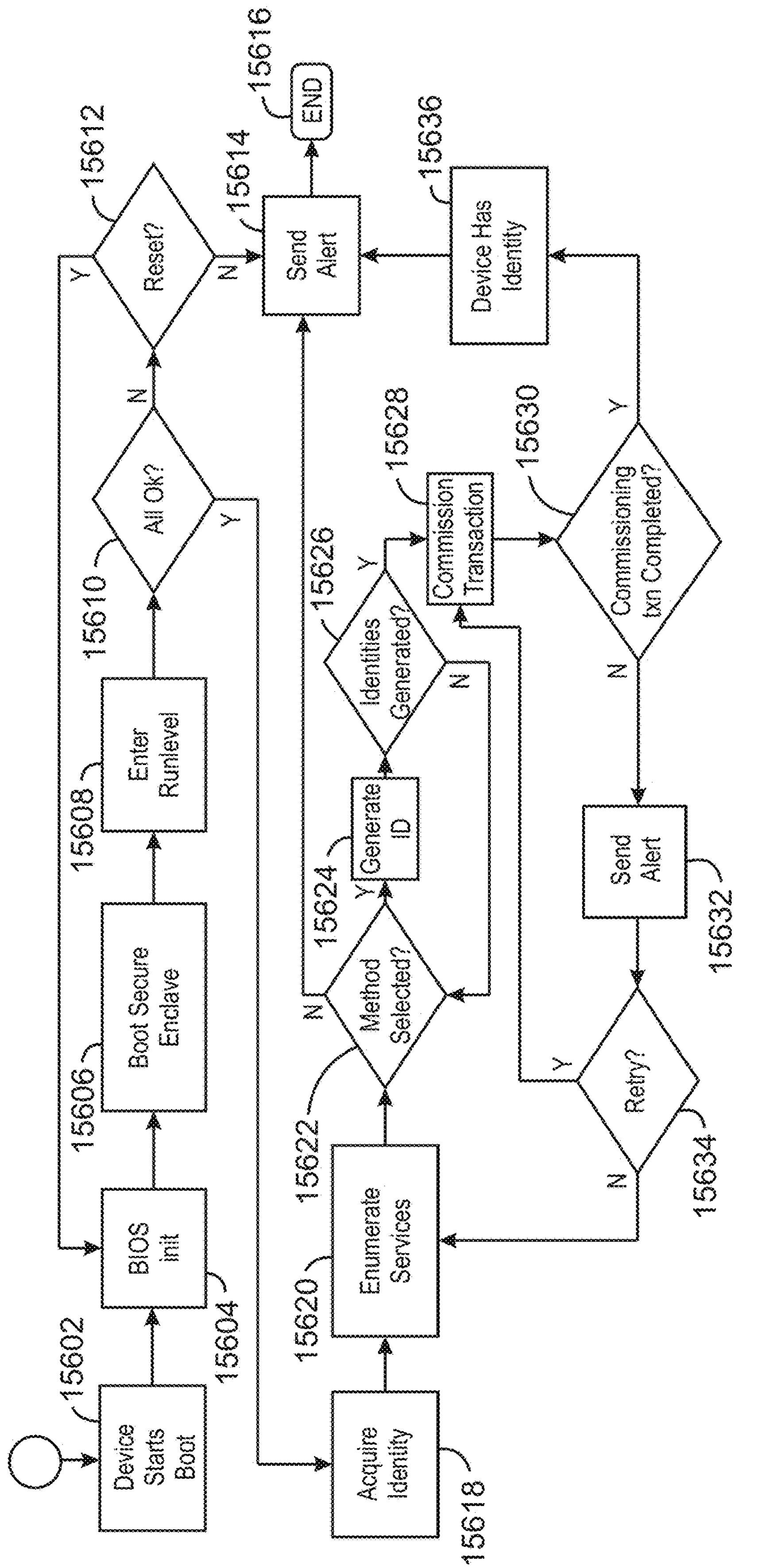

FIG. 156 is a process flow diagram of an example method for bootstrapping and discovery of devices in accordance with some embodiments.

Figure 157:
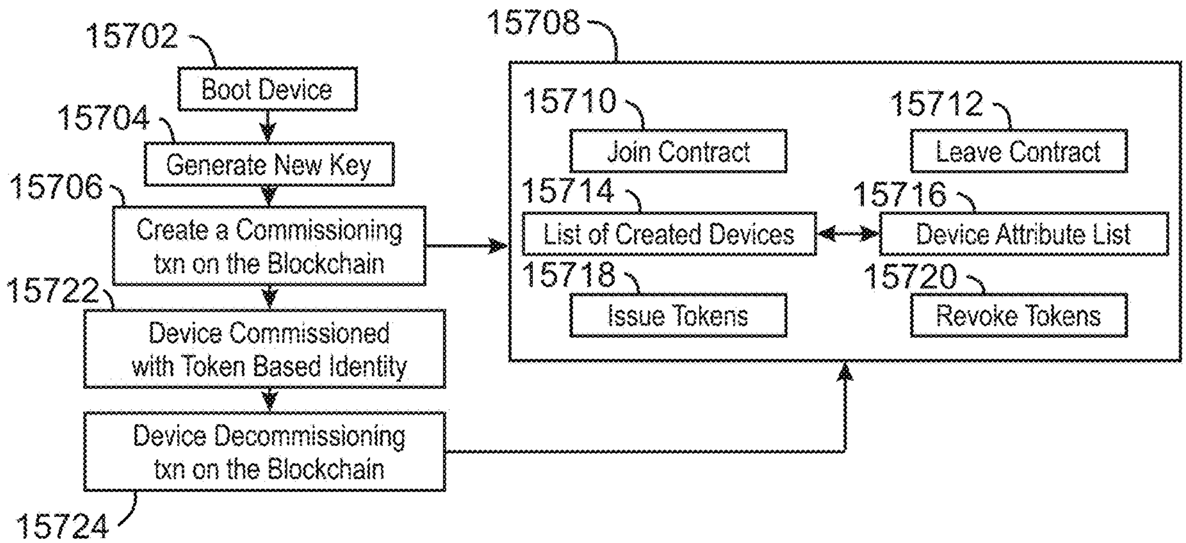

FIG. 157 is a schematic diagram of a process for bootstrap, discovery, and lifecycle of devices using smart contract functions in accordance with some embodiments.

Figure 158:
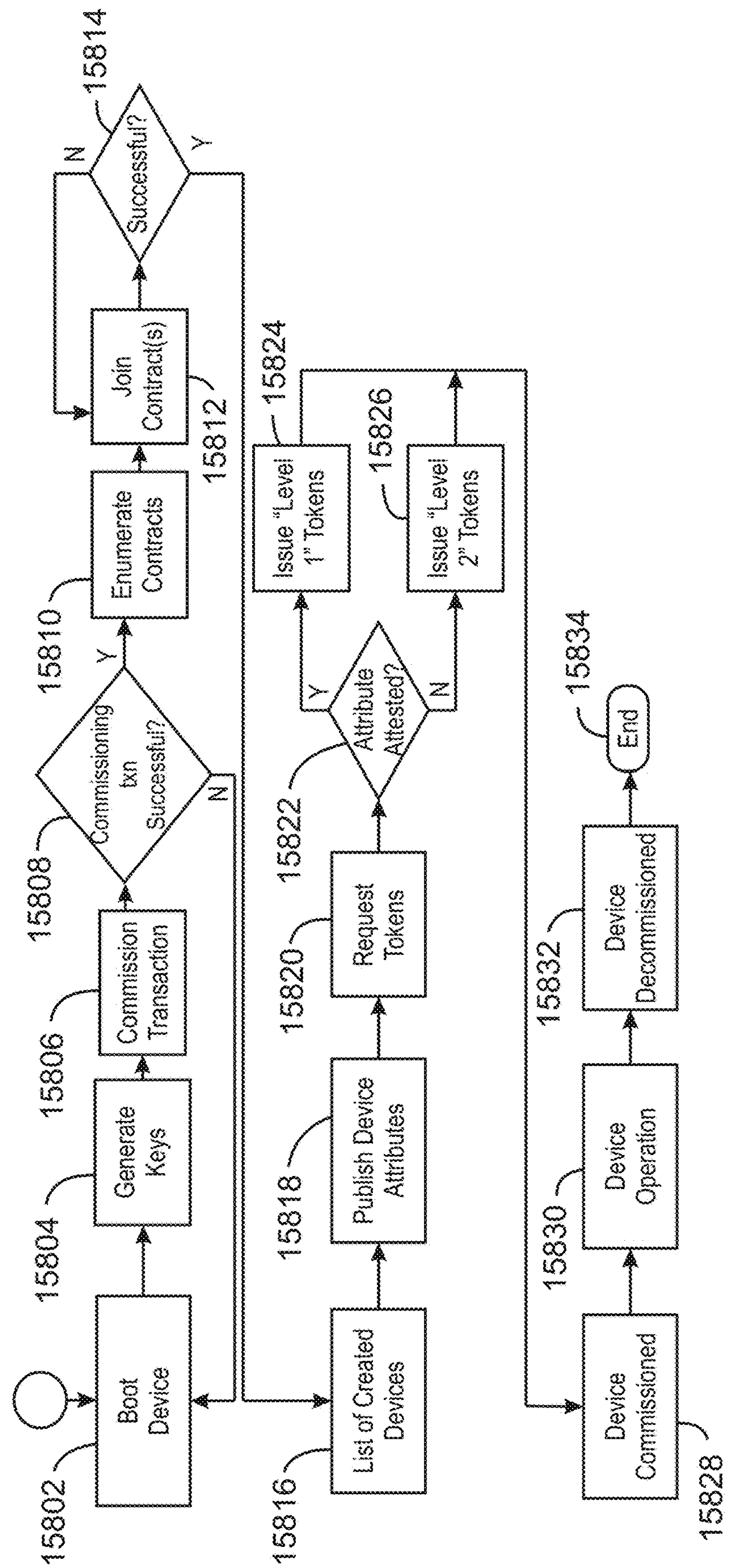

FIG. 158 is a process flow diagram of an example method for bootstrapping, discovery, and lifecycle of devices using a smart contract in accordance with some embodiments.

Figure 159:
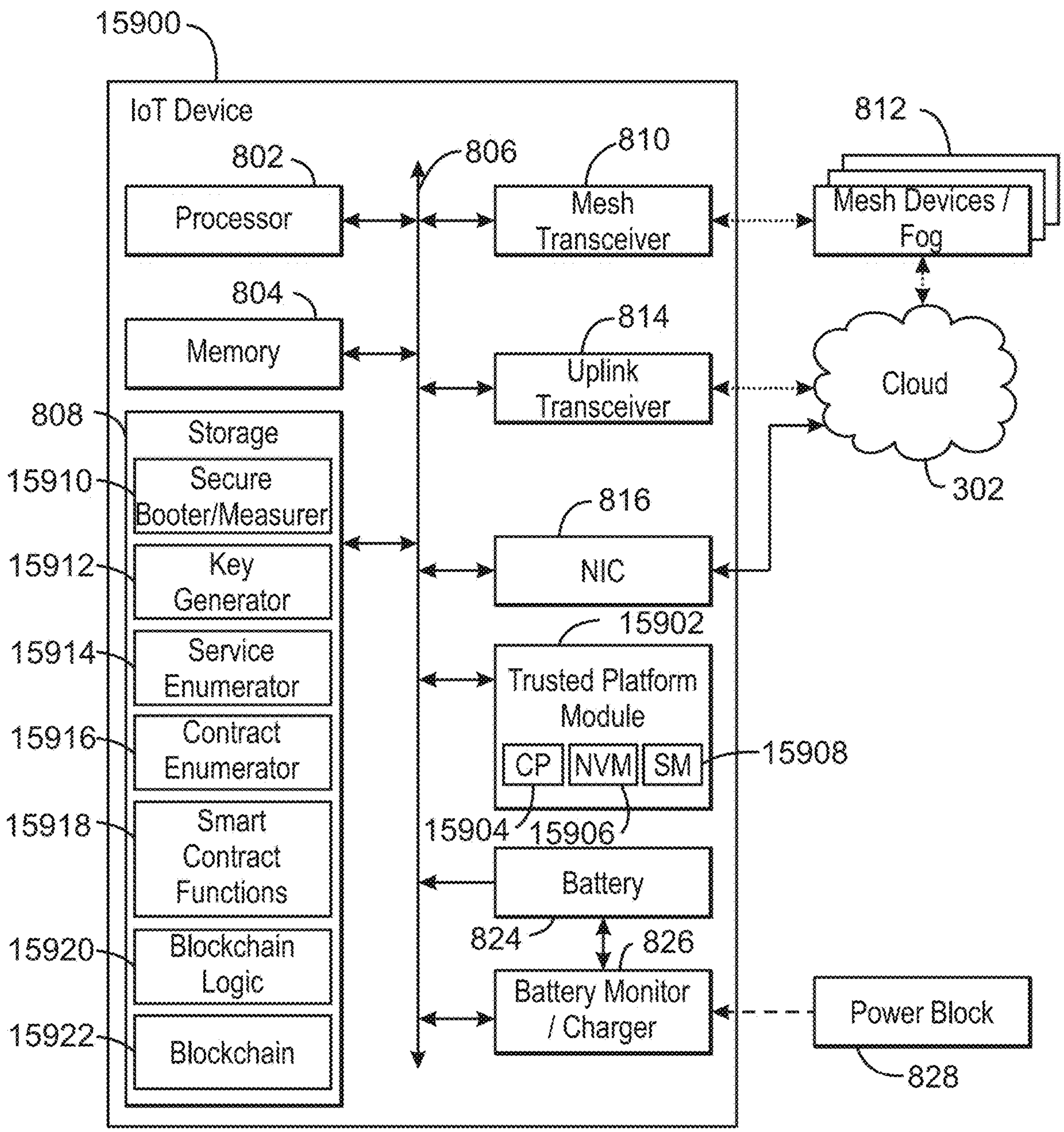

FIG. 159 is a block diagram of an example of components that may be present in an IoT device for bootstrap, discovery, and lifecycle management in accordance with some embodiments.

Figure 160:
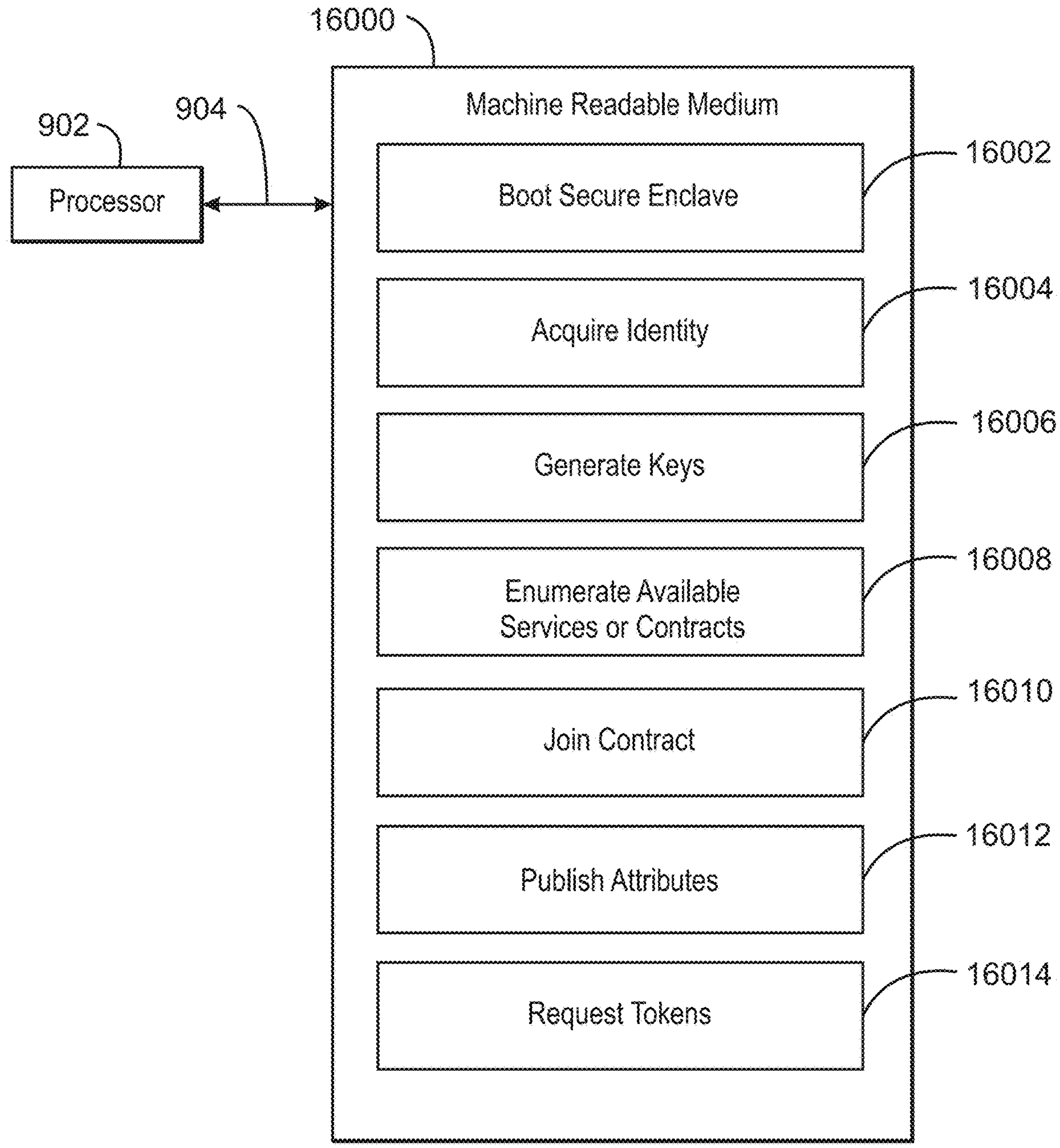

FIG. 160 is a block diagram of a non-transitory, machine readable medium including code to direct a processor to manage keys for secure communications in accordance with some embodiments.

Figure 161:
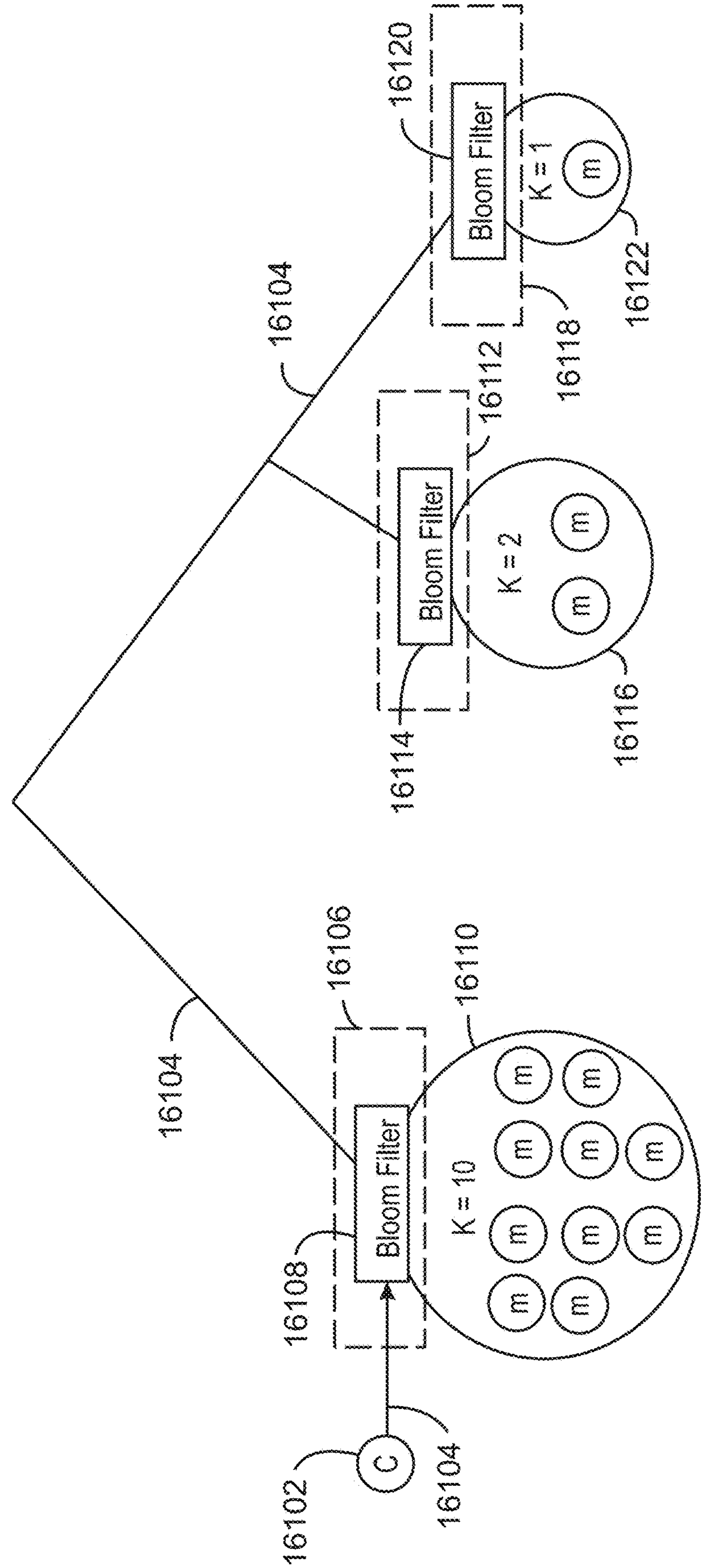

FIG. 161 is a schematic diagram of a process using bloom filter hops to discover resources in accordance with some embodiments.

Figure 162:
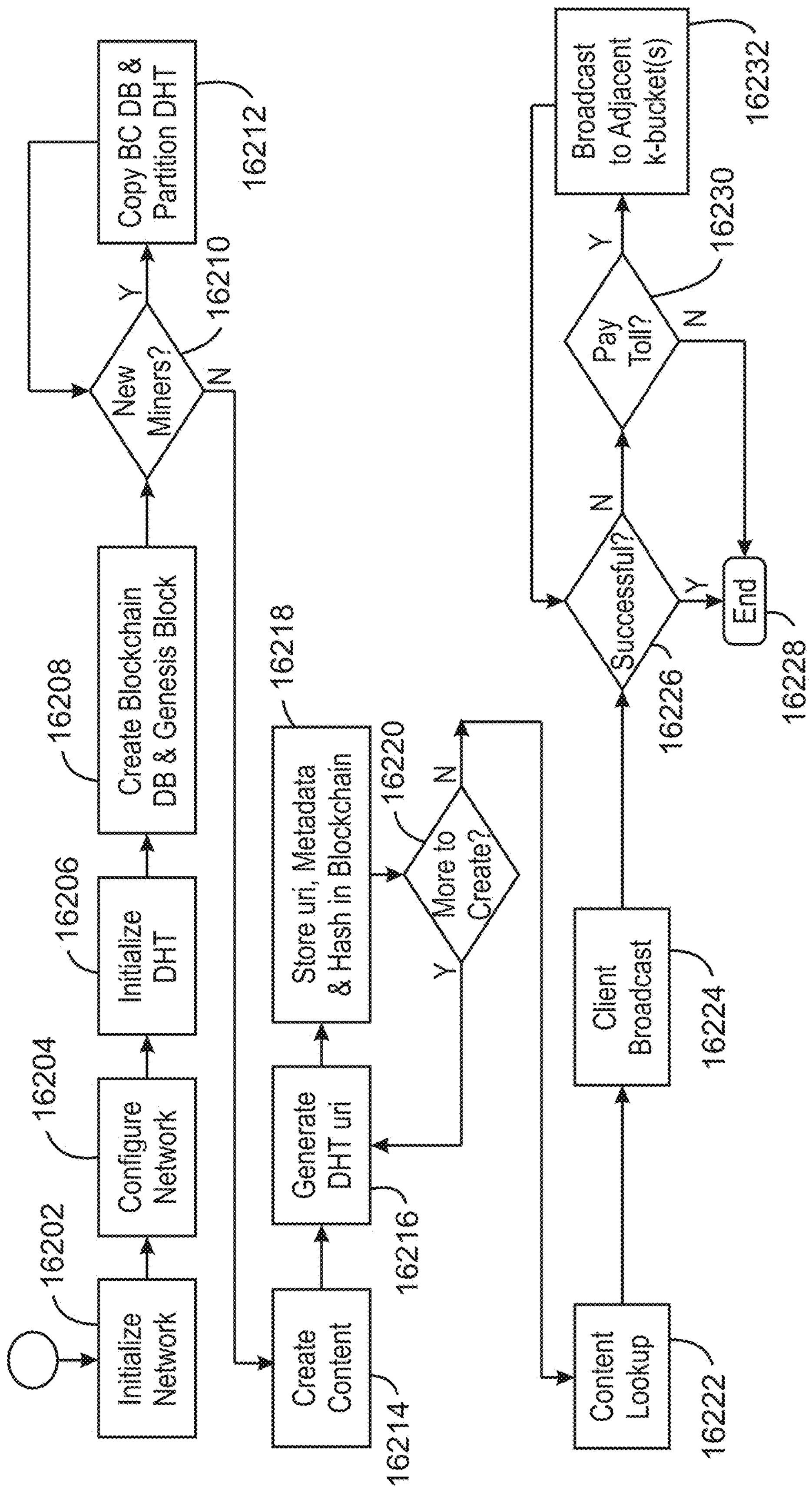

FIG. 162 is a process flow diagram of an example method resource discovery using DHT in accordance with some embodiments.

Figure 163:
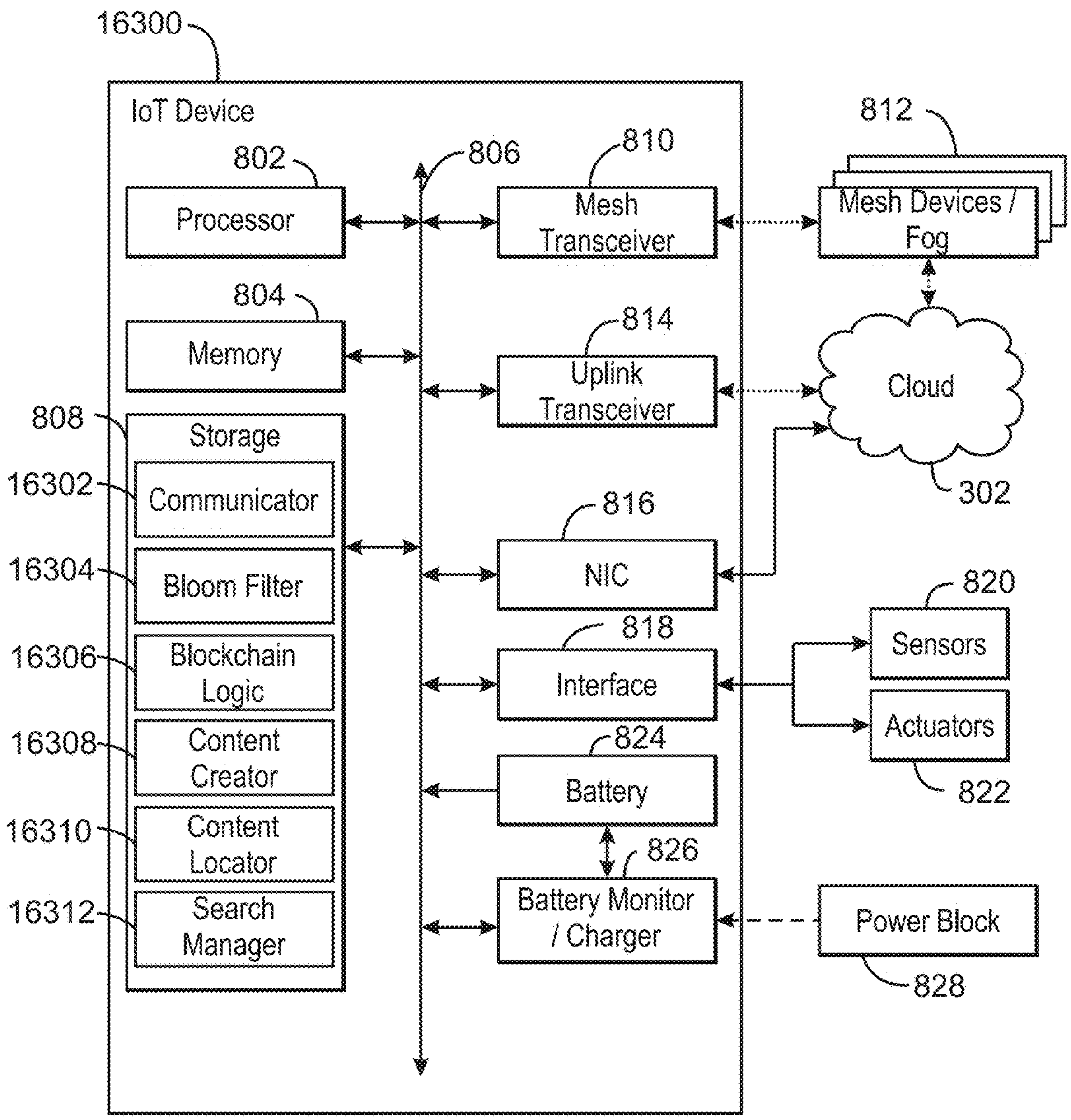

FIG. 163 is a block diagram of an example of components that may be present in an IoT device for assembling multiple fractional keys from different nodes in an IP mesh network into a single complete key in accordance with some embodiments.

Figure 164:
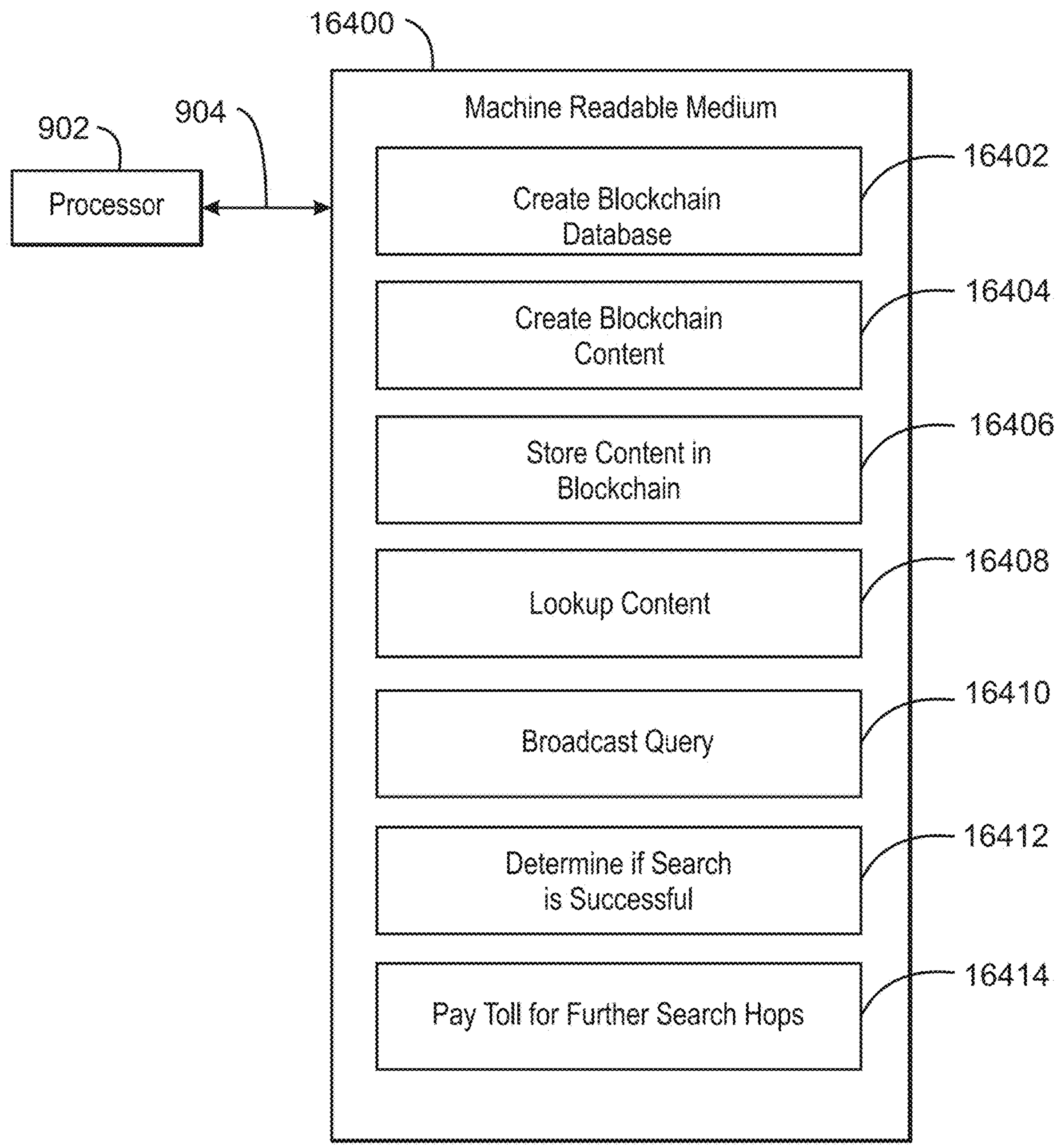

FIG. 164 is a block diagram of a non-transitory, machine readable medium including code to direct a processor to use a bloom filter hops method for resource discovery in accordance with some embodiments.

Figure 165:
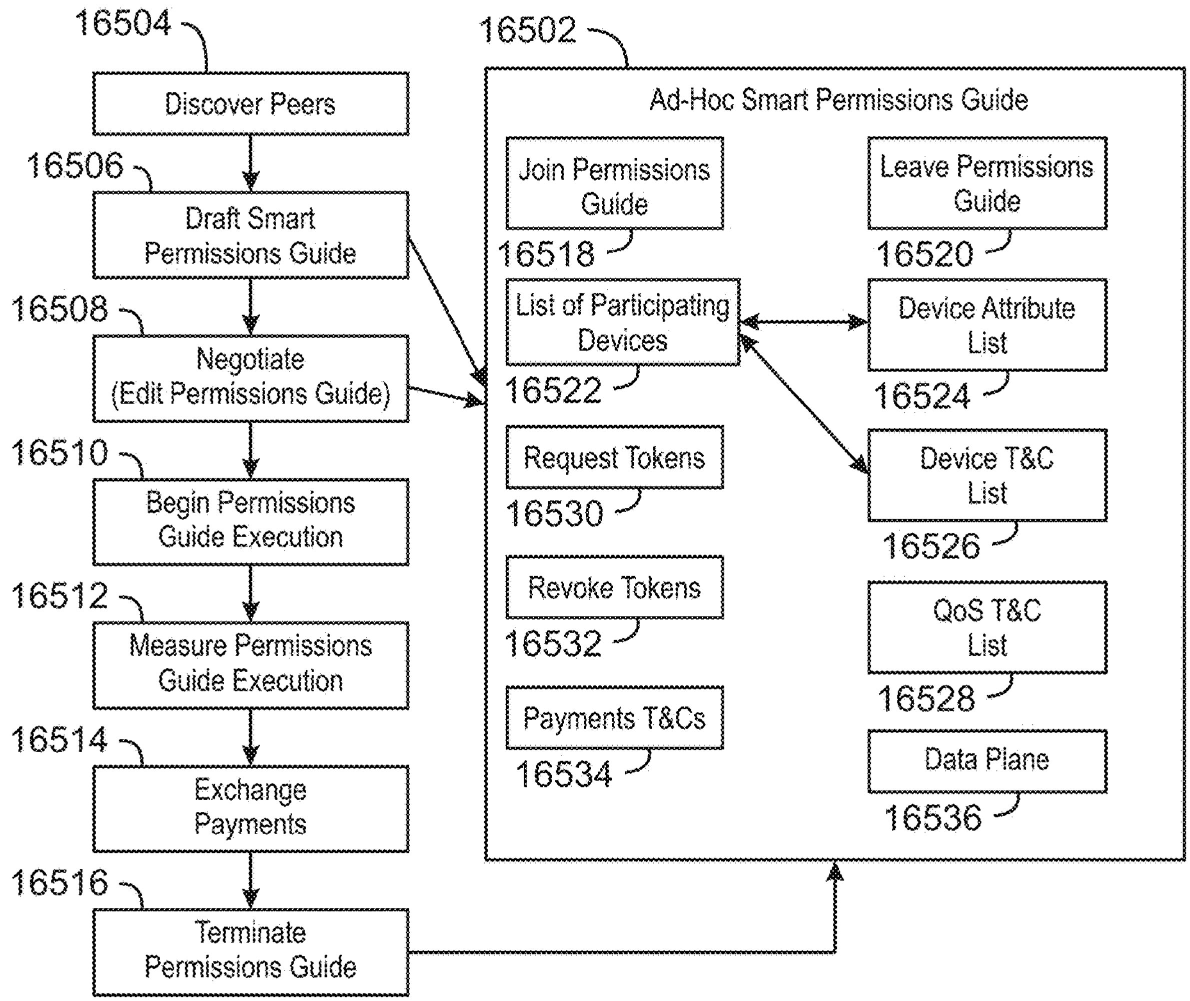

FIG. 165 is a schematic diagram of an example method for a task definition and commissioning in accordance with some embodiments.

Figure 166:
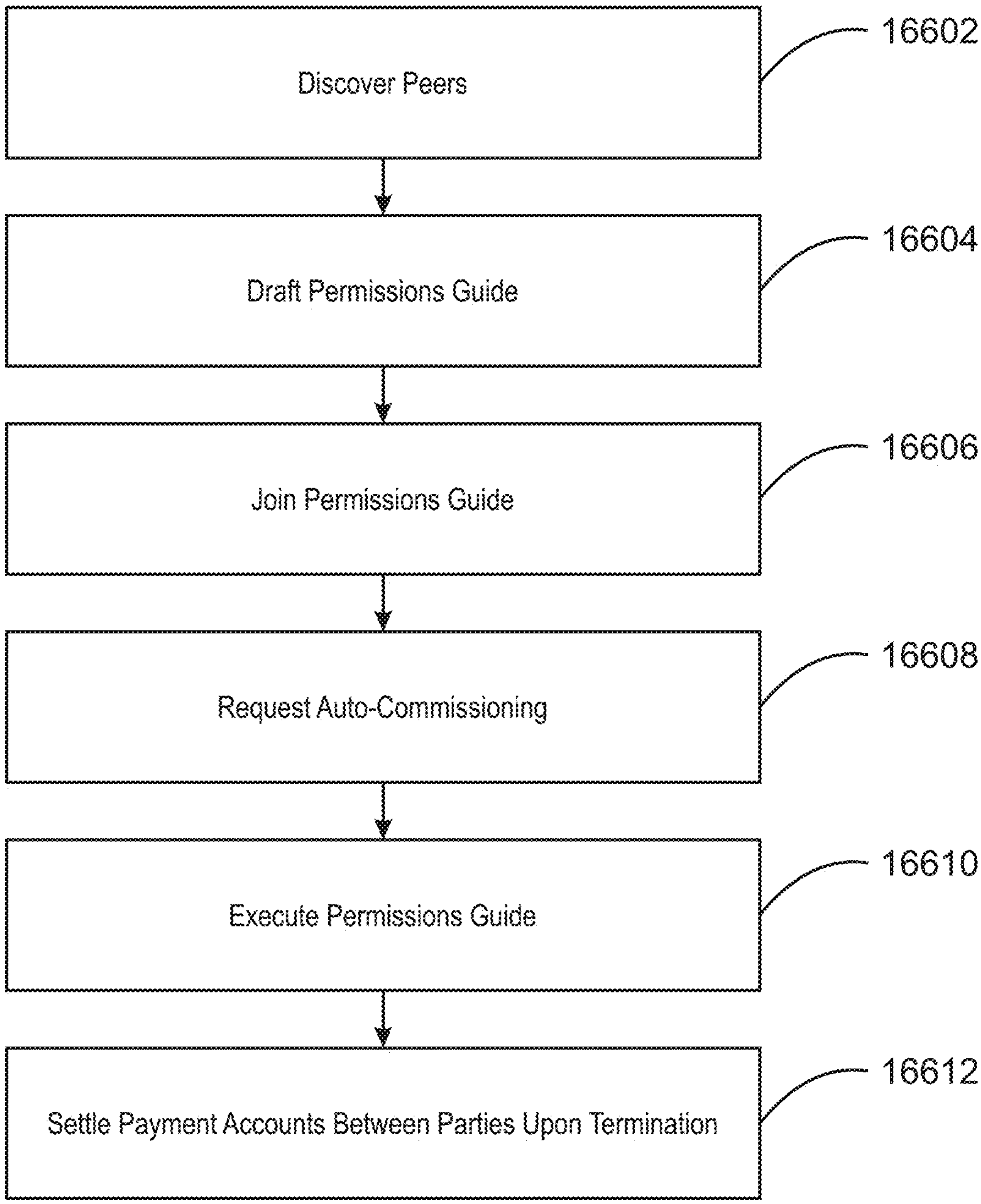

FIG. 166 is a process flow diagram of an example method for protocol conversion brokering by a protocol conversion broker in accordance with some embodiments.

Figure 167:
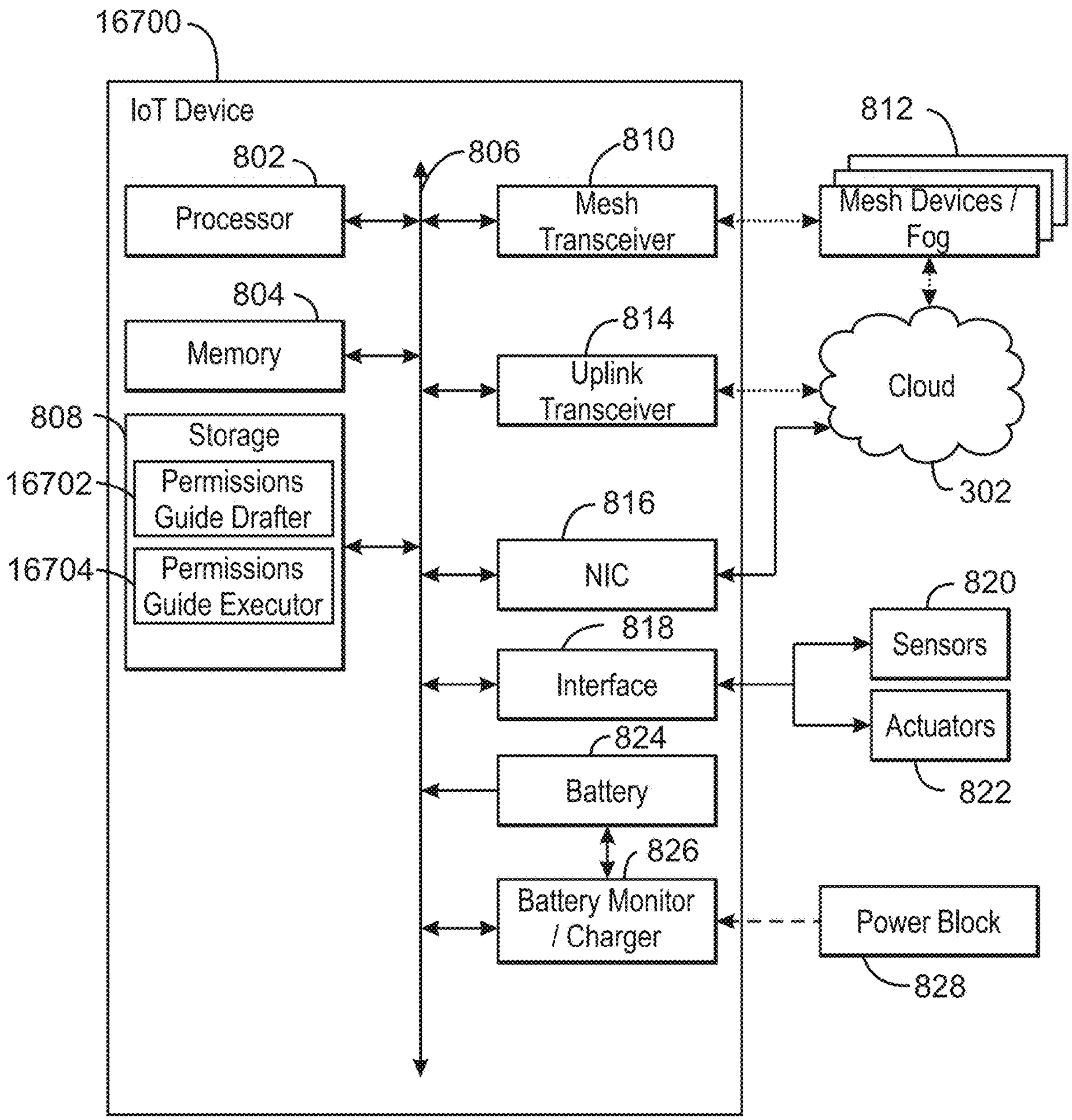

FIG. 167 is a block diagram of an example of components that may be present in an IoT device to define tasks and commission nodes in accordance with some embodiments.

Figure 168:
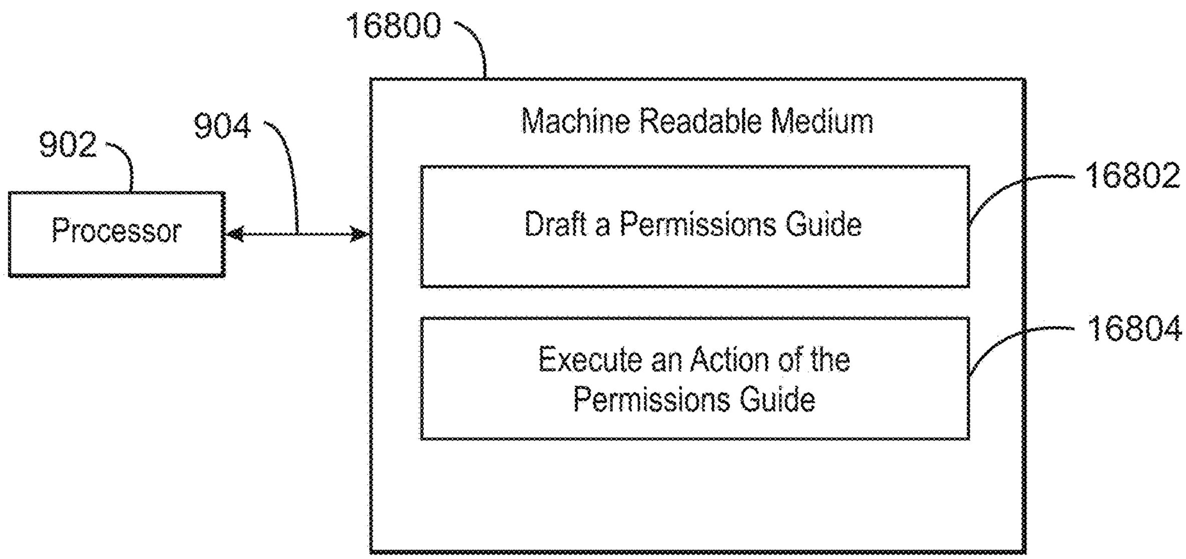

FIG. 168 is a block diagram of a non-transitory, machine readable medium including code to define tasks and commission nodes in accordance with some embodiments.

Figure 169:
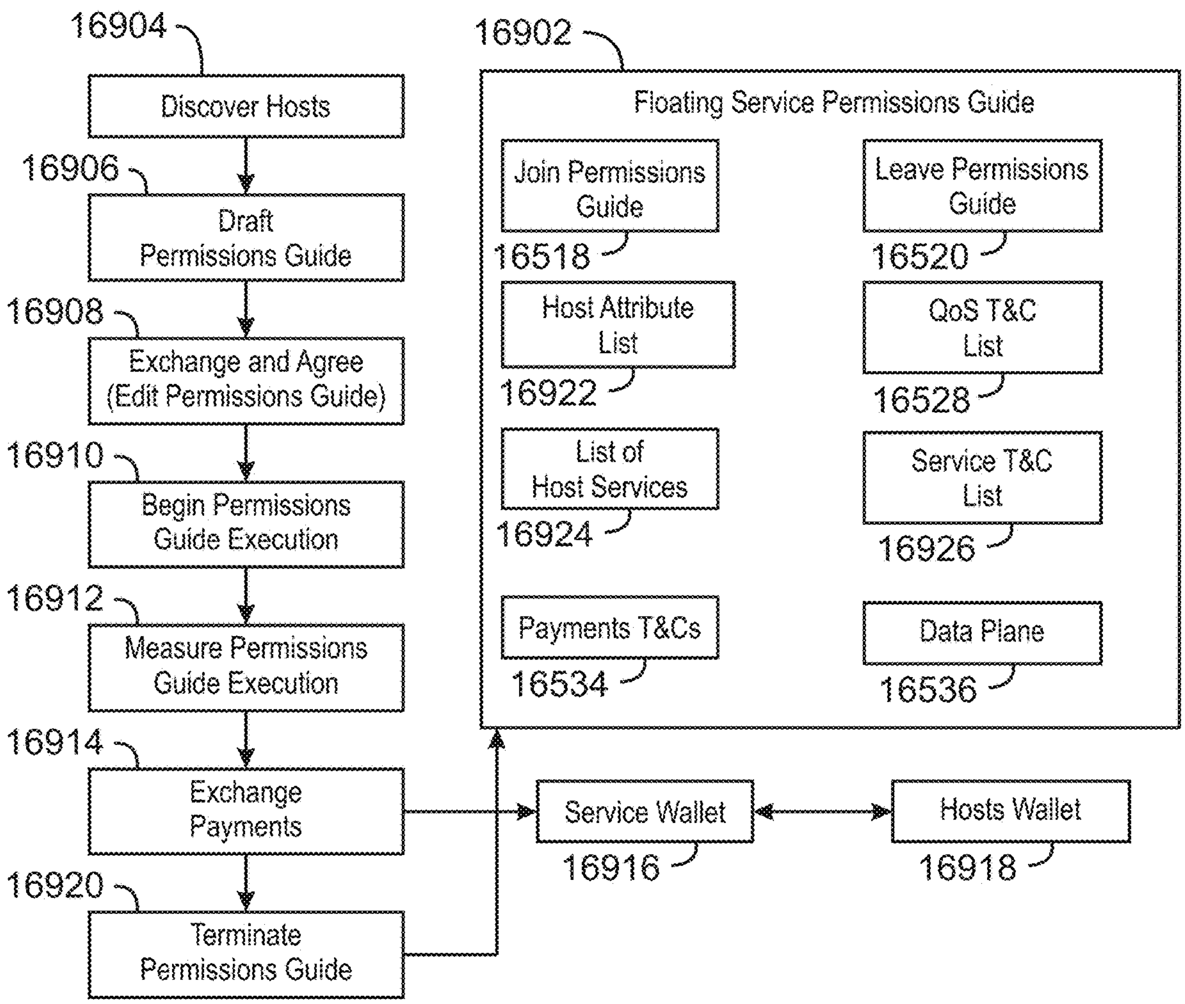

FIG. 169 is a process flow diagram of an example method to manage a floating service and value in a digital wallet in accordance with some embodiments.

FIG. 170 is a schematic diagram of an example floating service data structure to manage a floating service and the options, conditions and terms in accordance with some embodiments.

Figure 171:
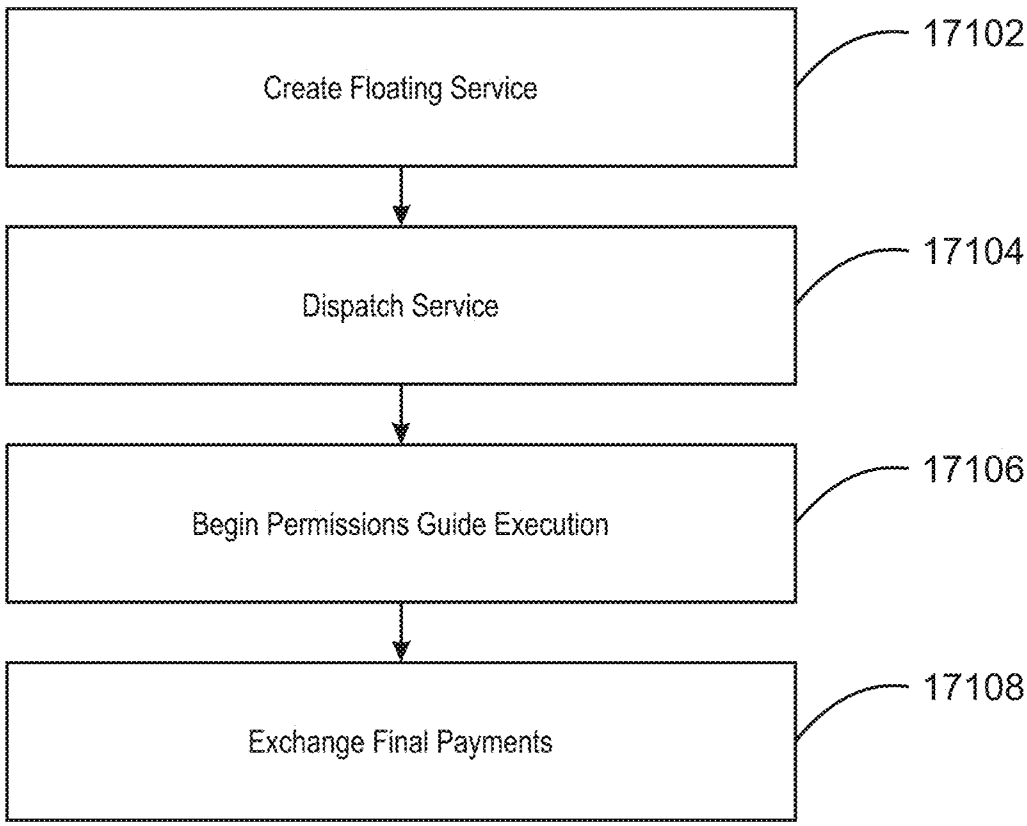

FIG. 171 is a process flow diagram of an example method for floating service management in accordance with some embodiments.

Figure 172:
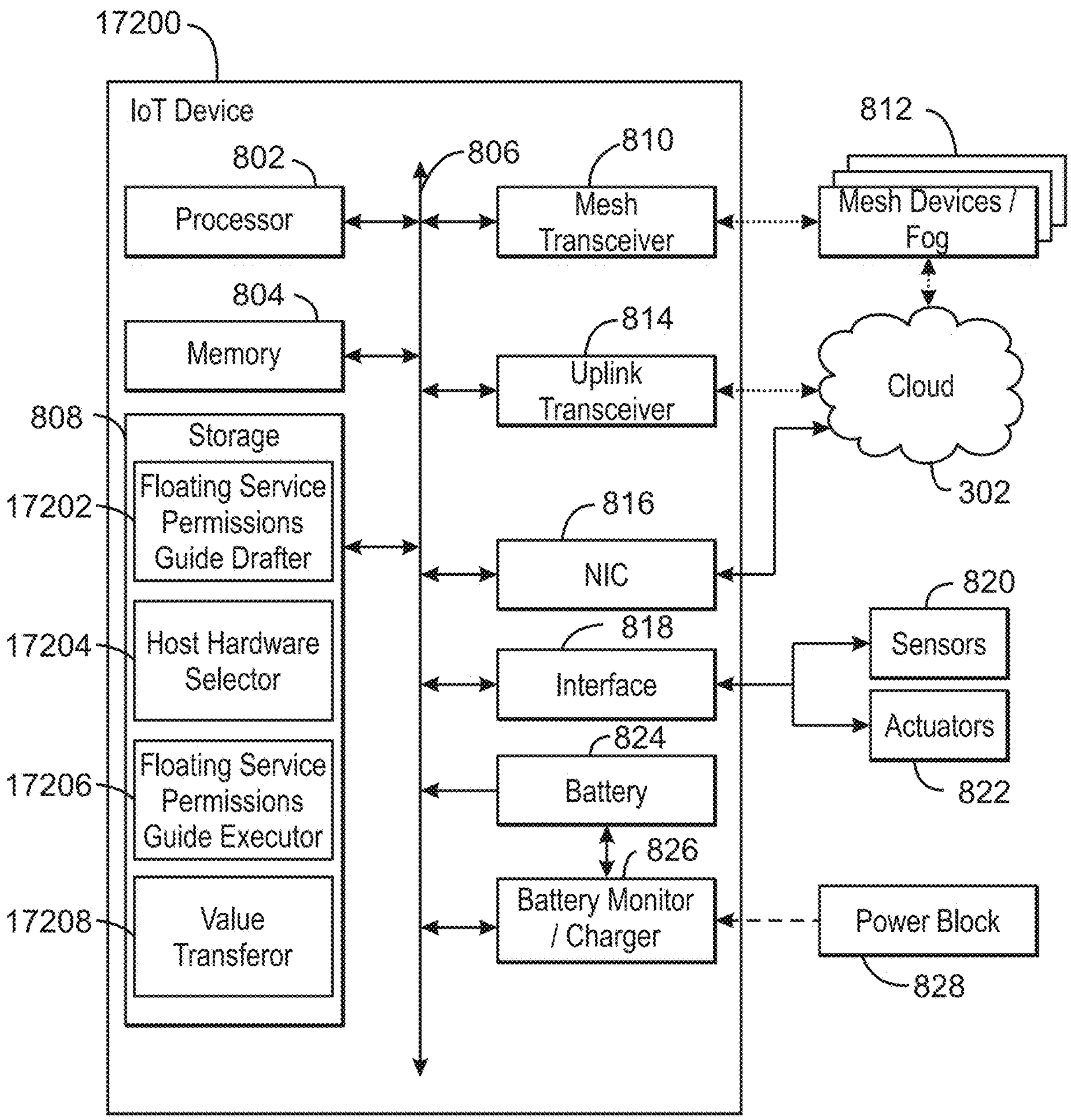

FIG. 172 is a block diagram of an example of components that may be present in an IoT device to manage floating services in accordance with some embodiments.

Figure 173:
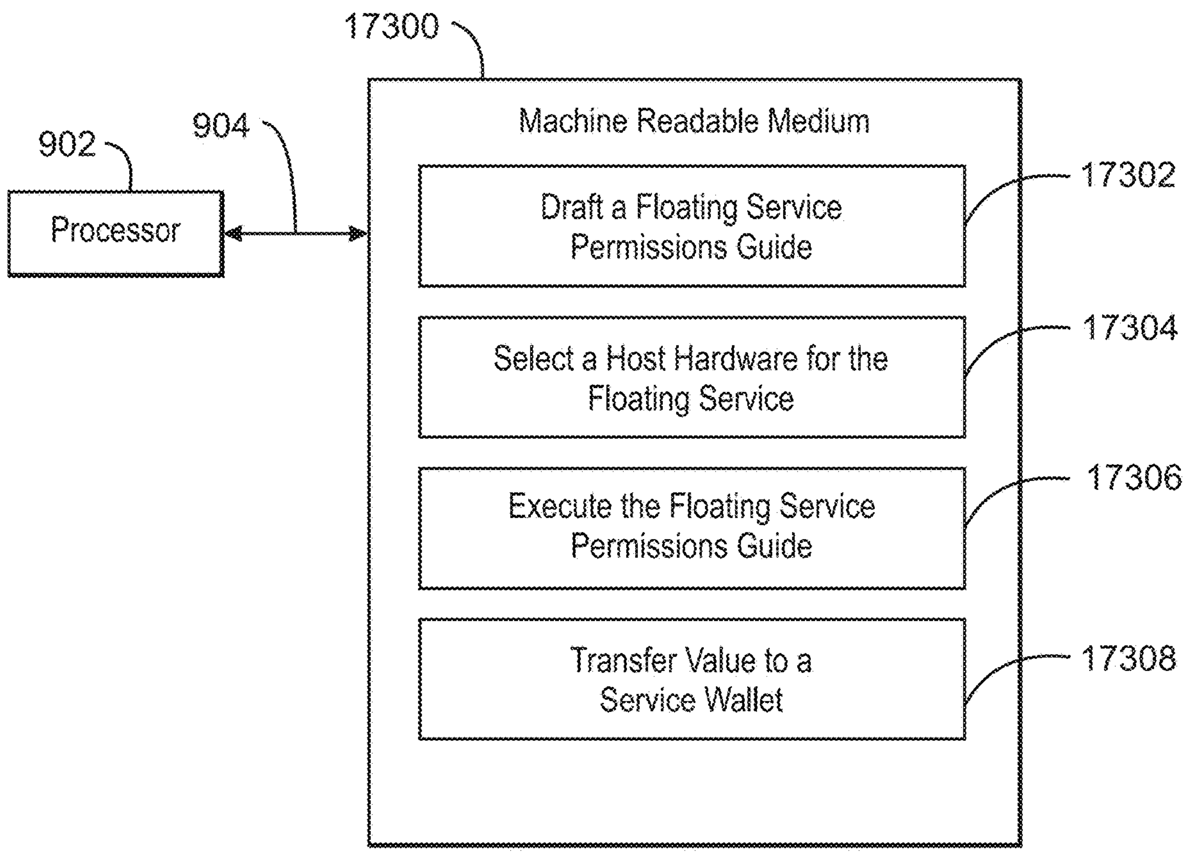

FIG. 173 is a block diagram of a non-transitory, machine readable medium including code to manage floating services in accordance with some embodiments.

Figure 174:
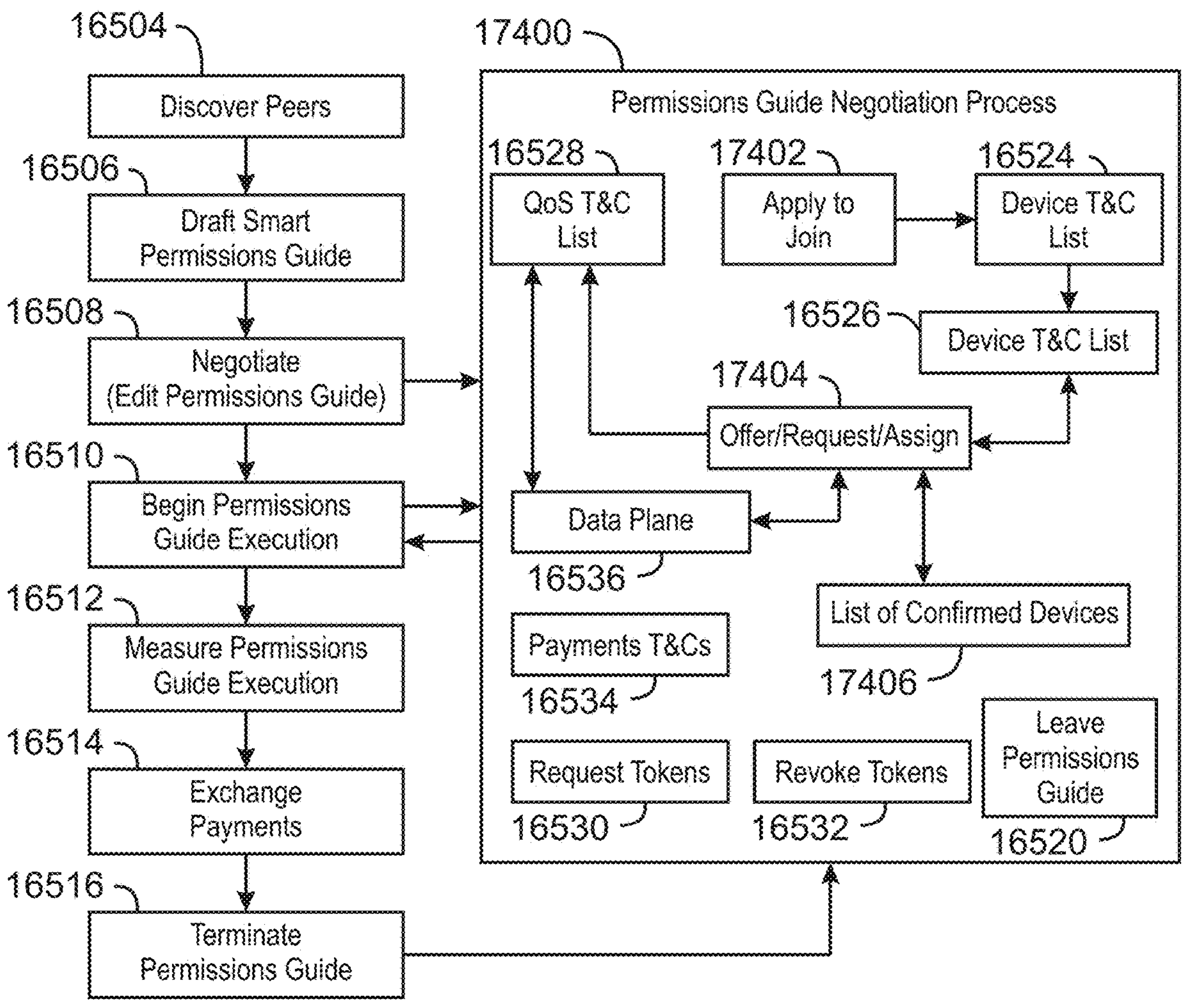

FIG. 174 is a schematic diagram showing an example permissions guide negotiation process in accordance with some embodiments.

Figure 175:
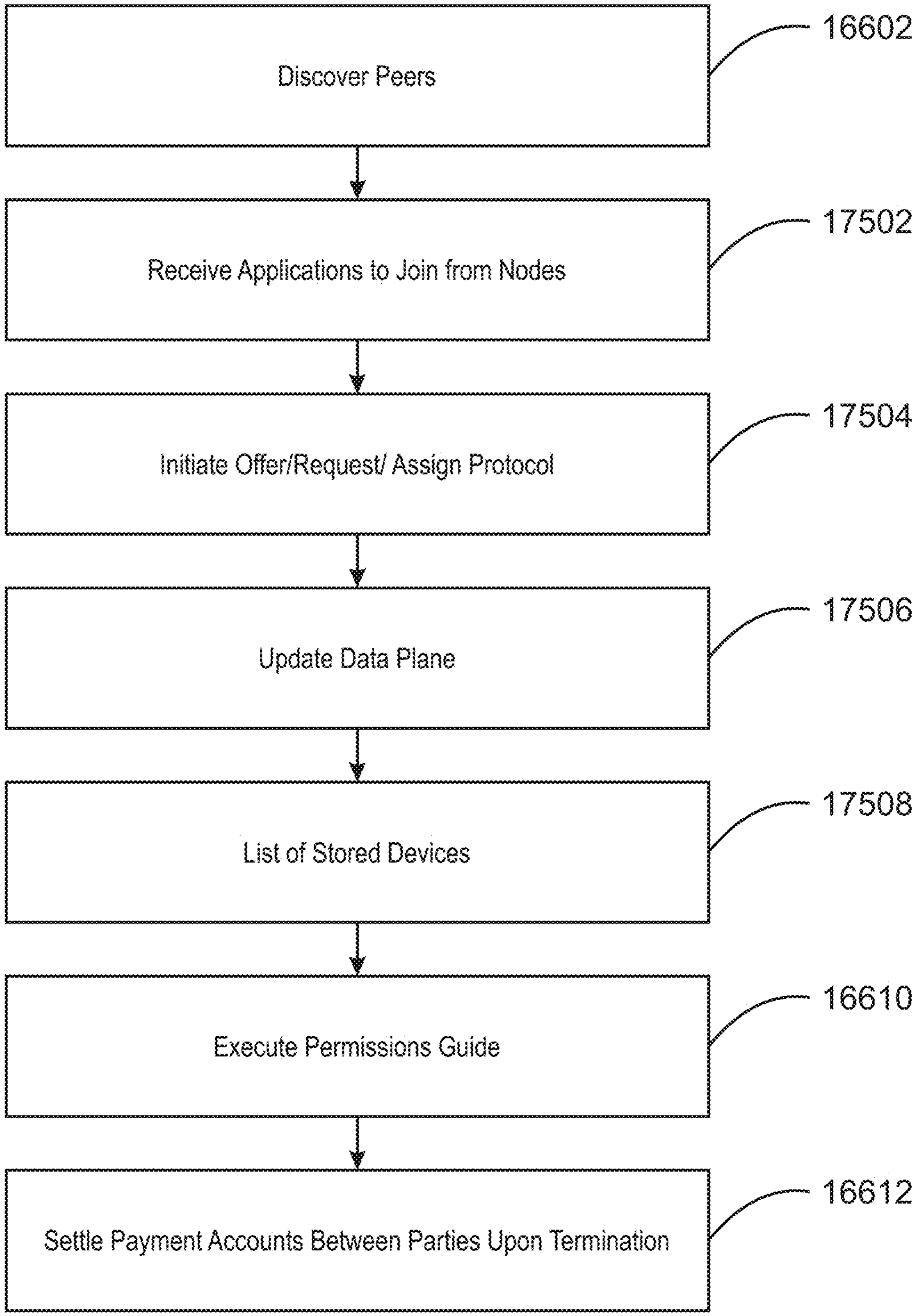

FIG. 175 is a process flow diagram of an example method for permissions guide negotiation in accordance with some embodiments.

FIG. 176 is a schematic diagram of an example data structure to assess and assign a value to a unit of data in accordance with some embodiments.

Figure 177:
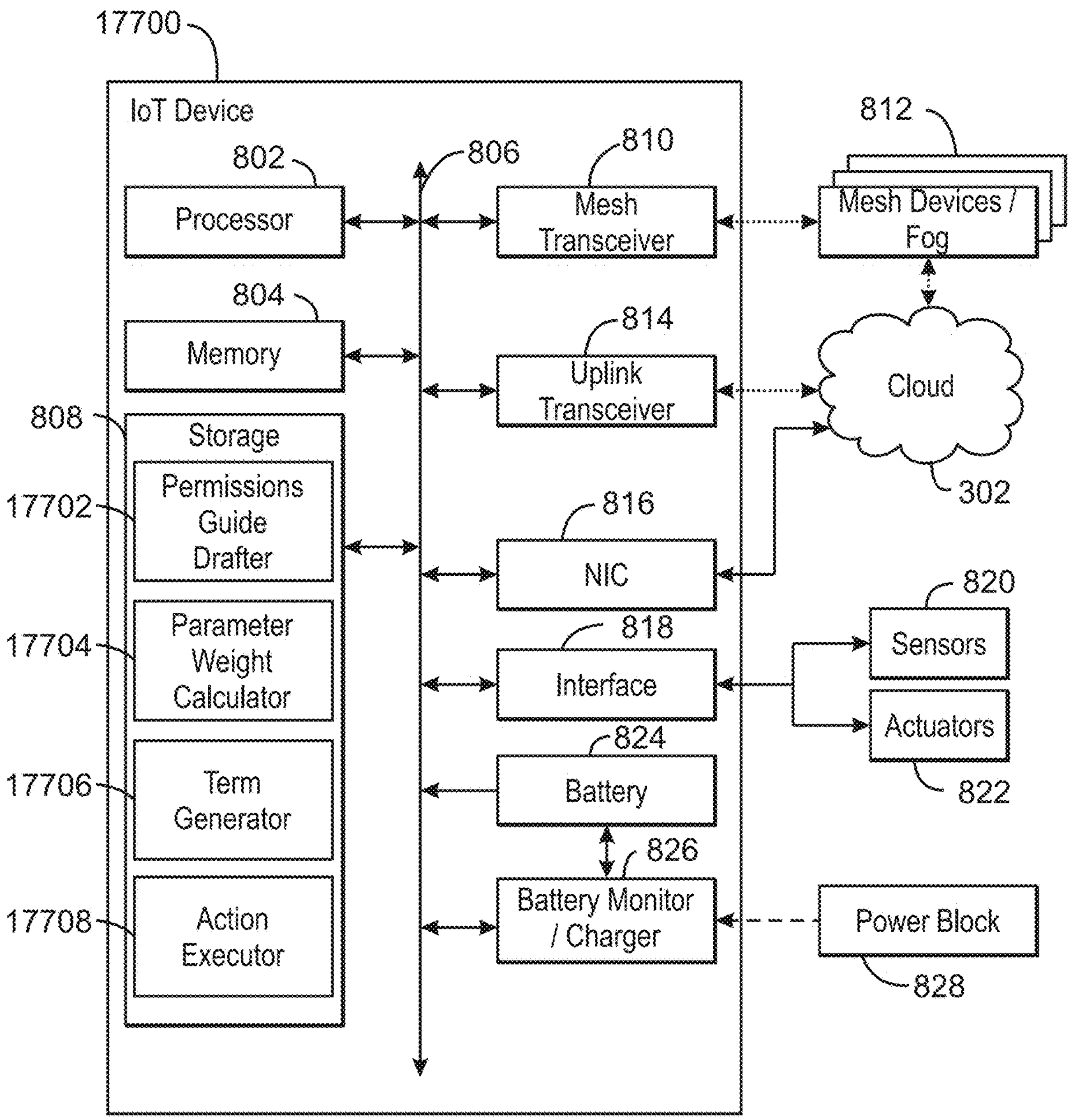

FIG. 177 is a block diagram of an example of components that may be present in an IoT device for negotiation with valued data units in accordance with some embodiments.

Figure 178:
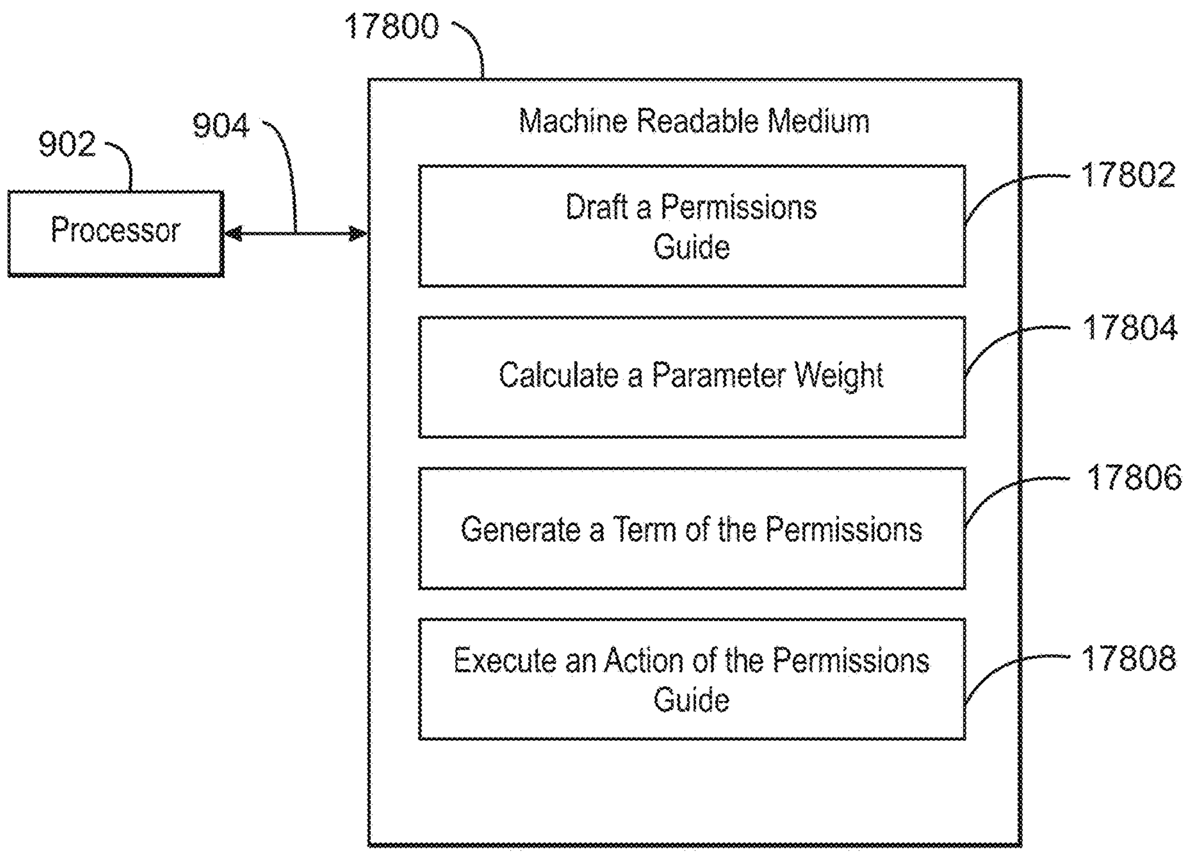

FIG. 178 is a block diagram of a non-transitory, machine readable medium including code to define tasks and commission nodes in accordance with some embodiments.

Figure 179:
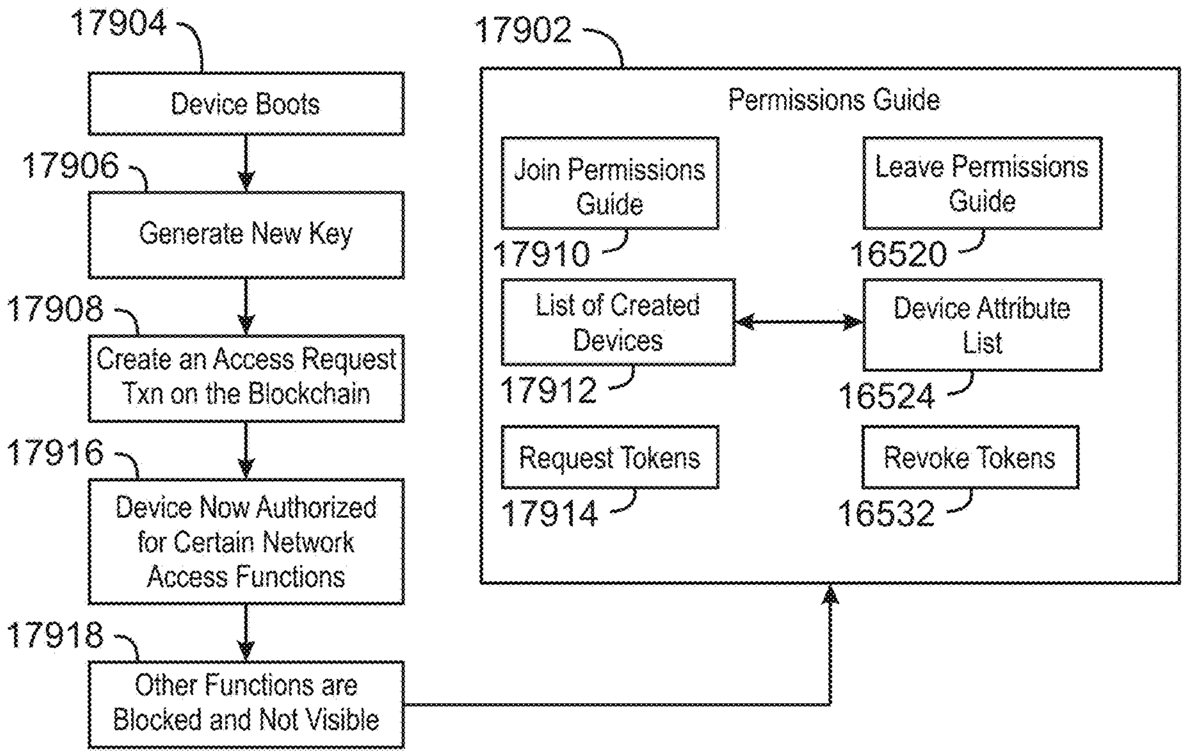

FIG. 179 is a schematic diagram of an example organization for the decentralized network access proxy to use functions in accordance with some embodiments.

Figure 180:
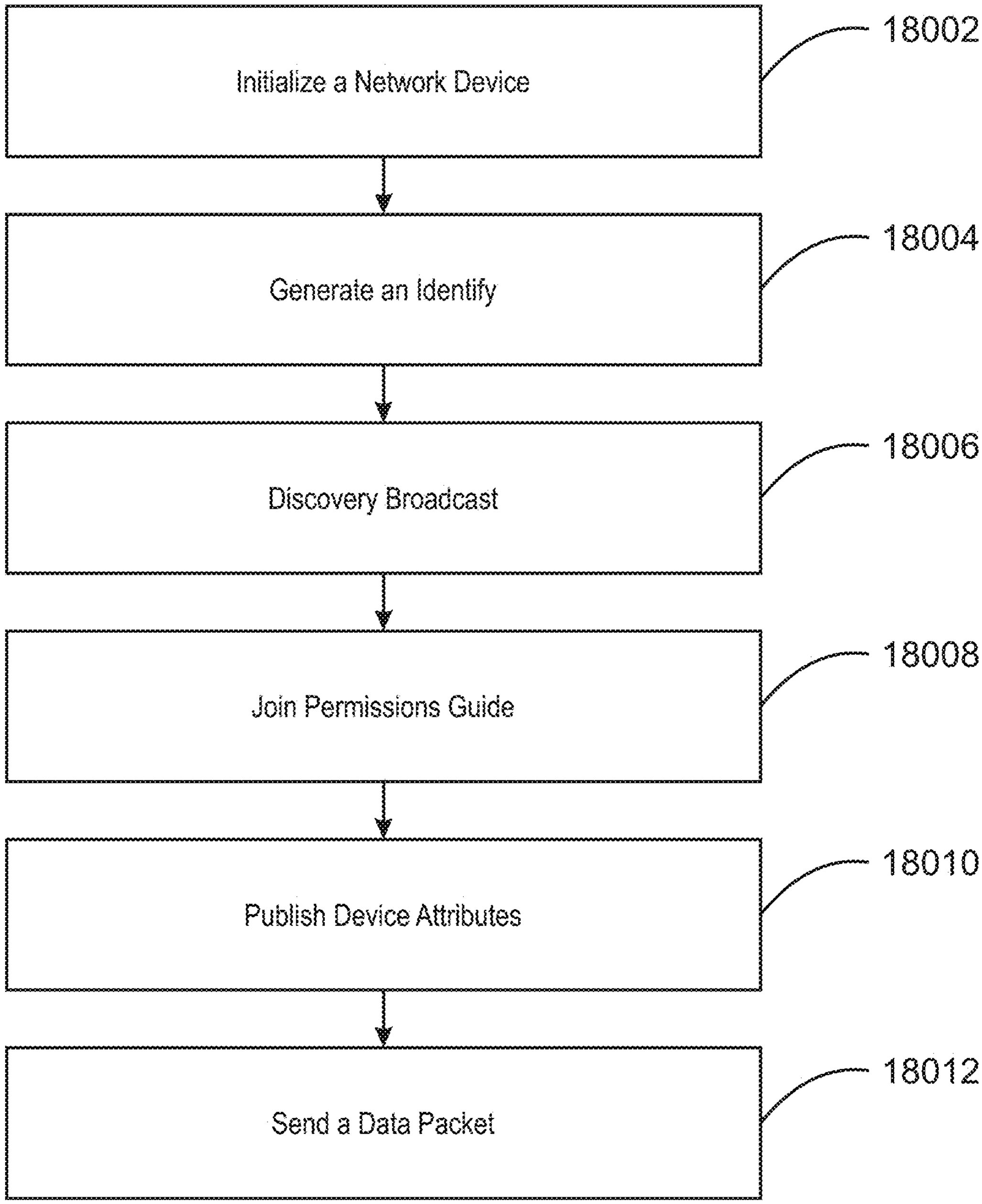

FIG. 180 is a process flow diagram of an example method for a decentralized network access proxy to use functions in accordance with some embodiments.

Figure 181:
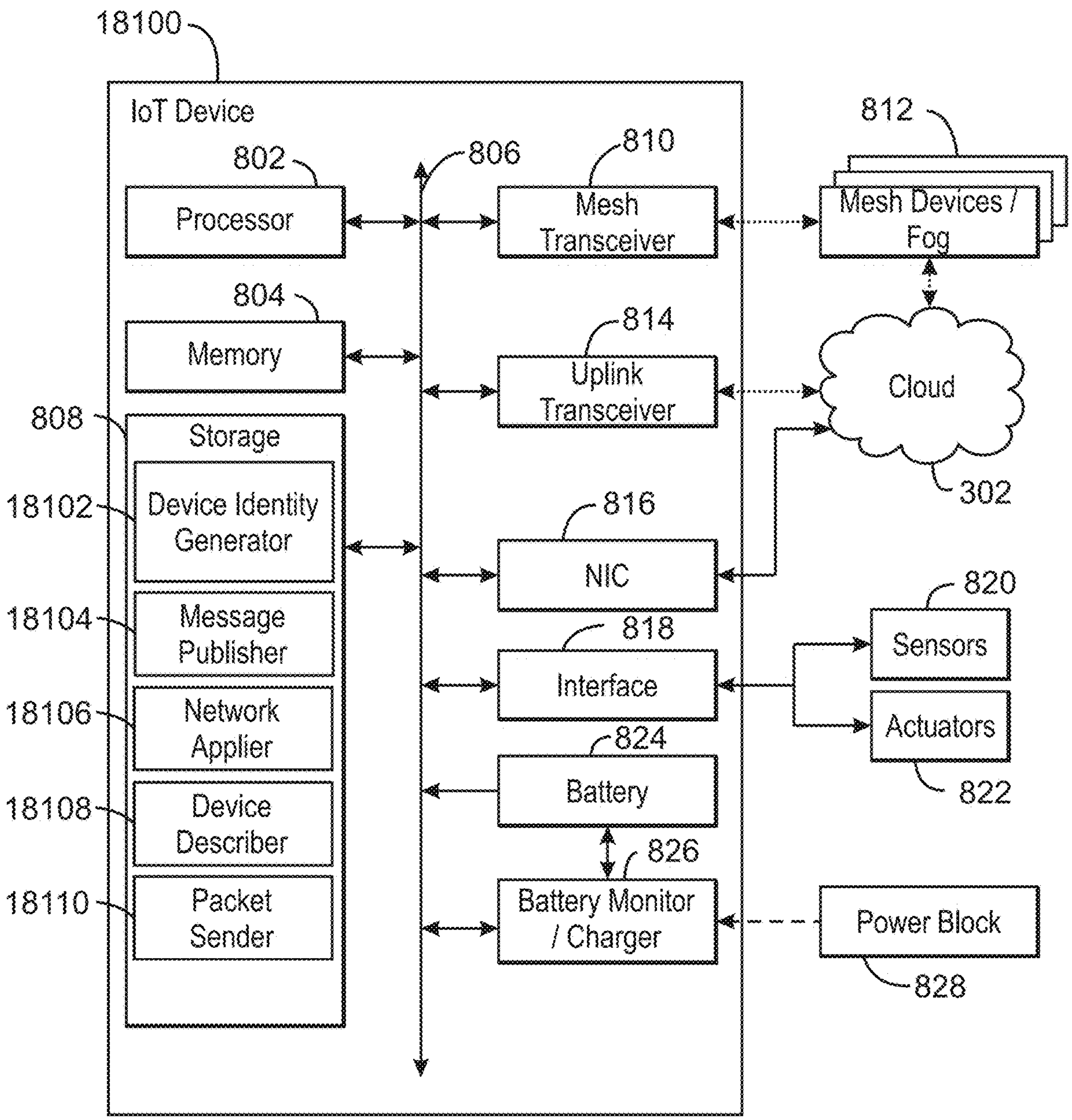

FIG. 181 is a block diagram of an example of components that may be present in an IoT device for negotiation with valued data units in accordance with some embodiments.

Figure 182:
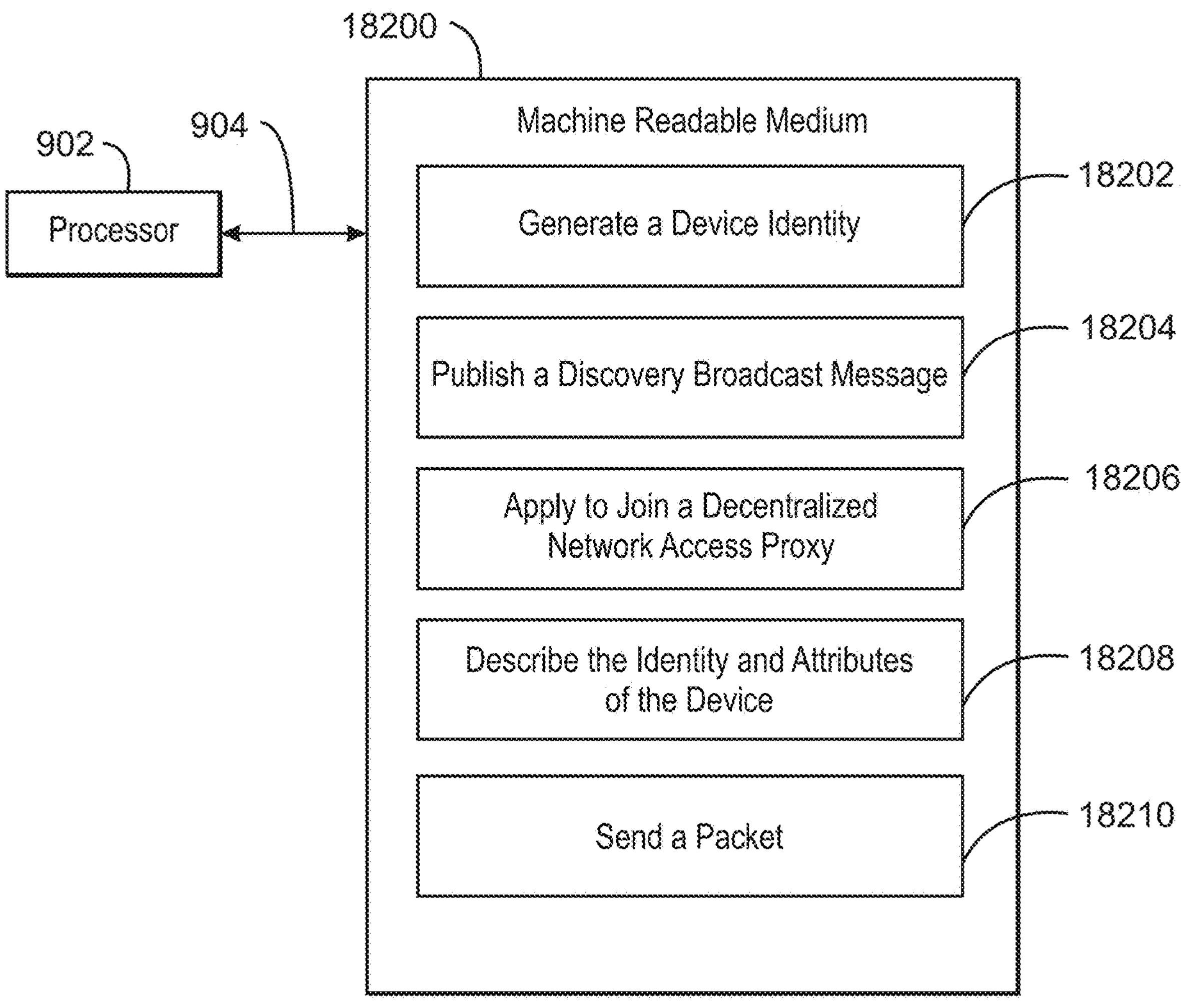

FIG. 182 is a block diagram of a non-transitory, machine readable medium including code to define tasks and commission nodes in accordance with some embodiments.

Figure 183:
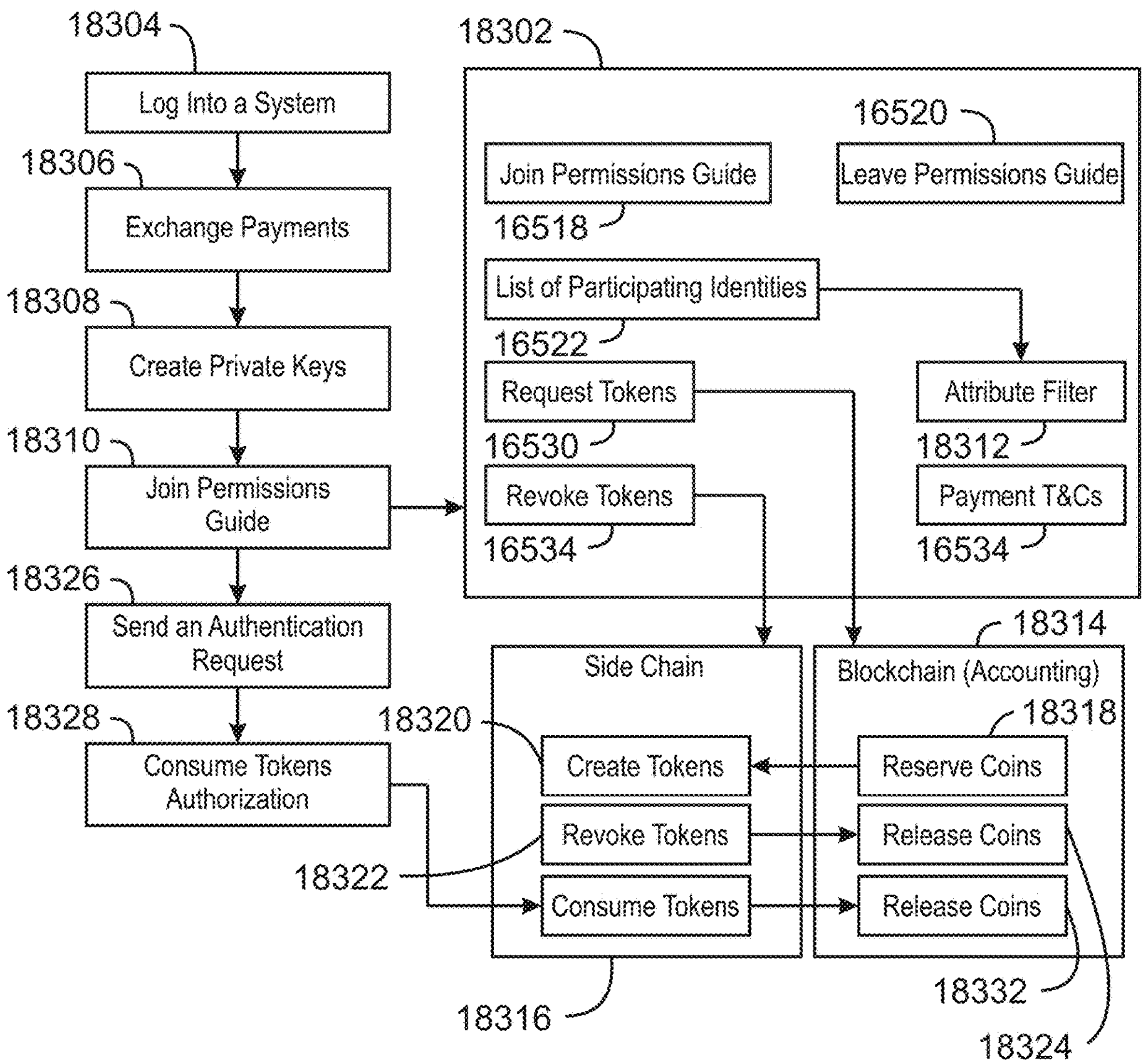

FIG. 183 is a schematic diagram of an example organization for a decentralized version of providing authentication, authorization, and accounting with a permissions guide in accordance with some embodiments.

Figure 184:
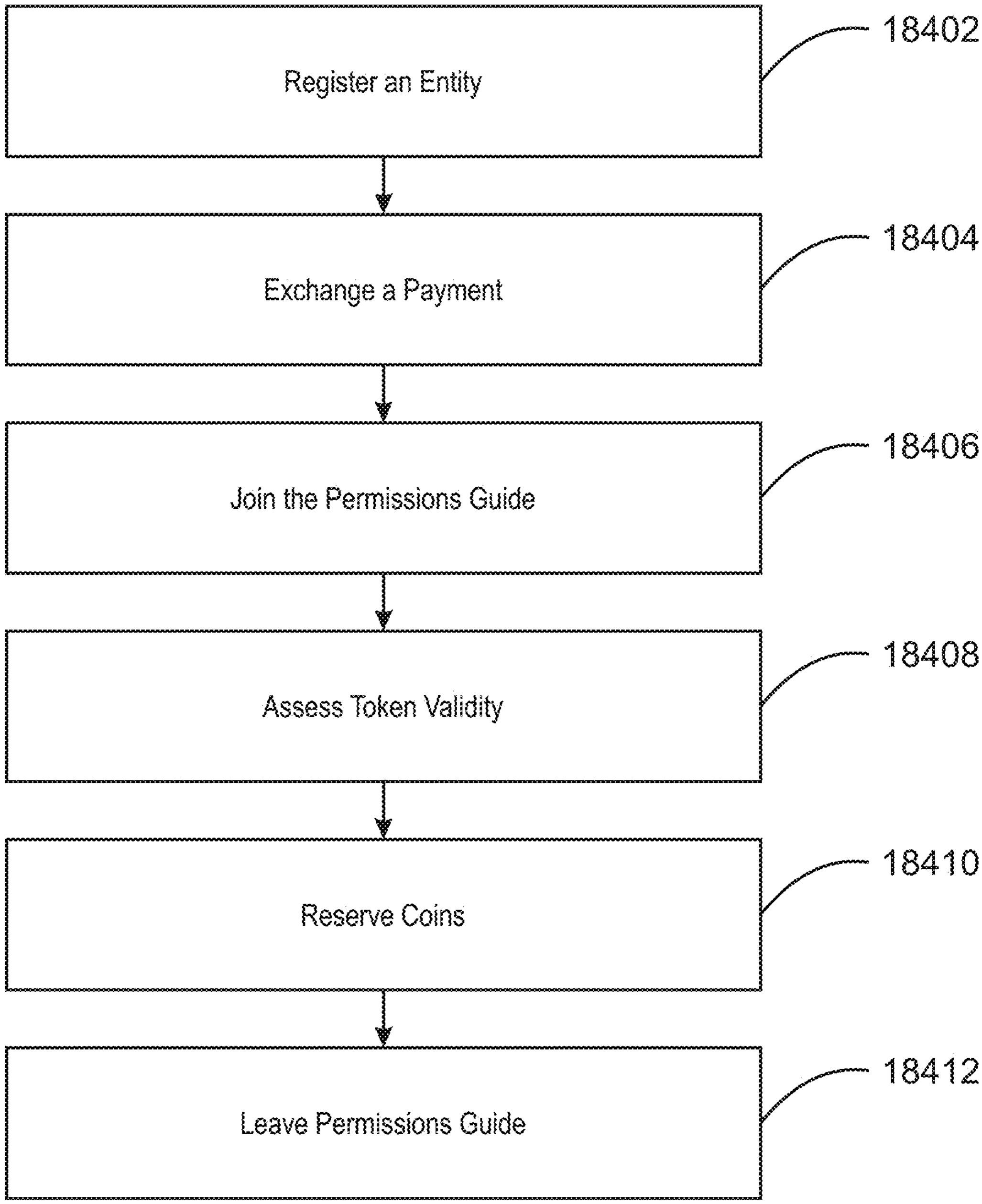

FIG. 184 is a process flow diagram of an example method for a decentralized version of providing authentication, authorization, and accounting with a permissions guide in accordance with some embodiments.

Figure 185:
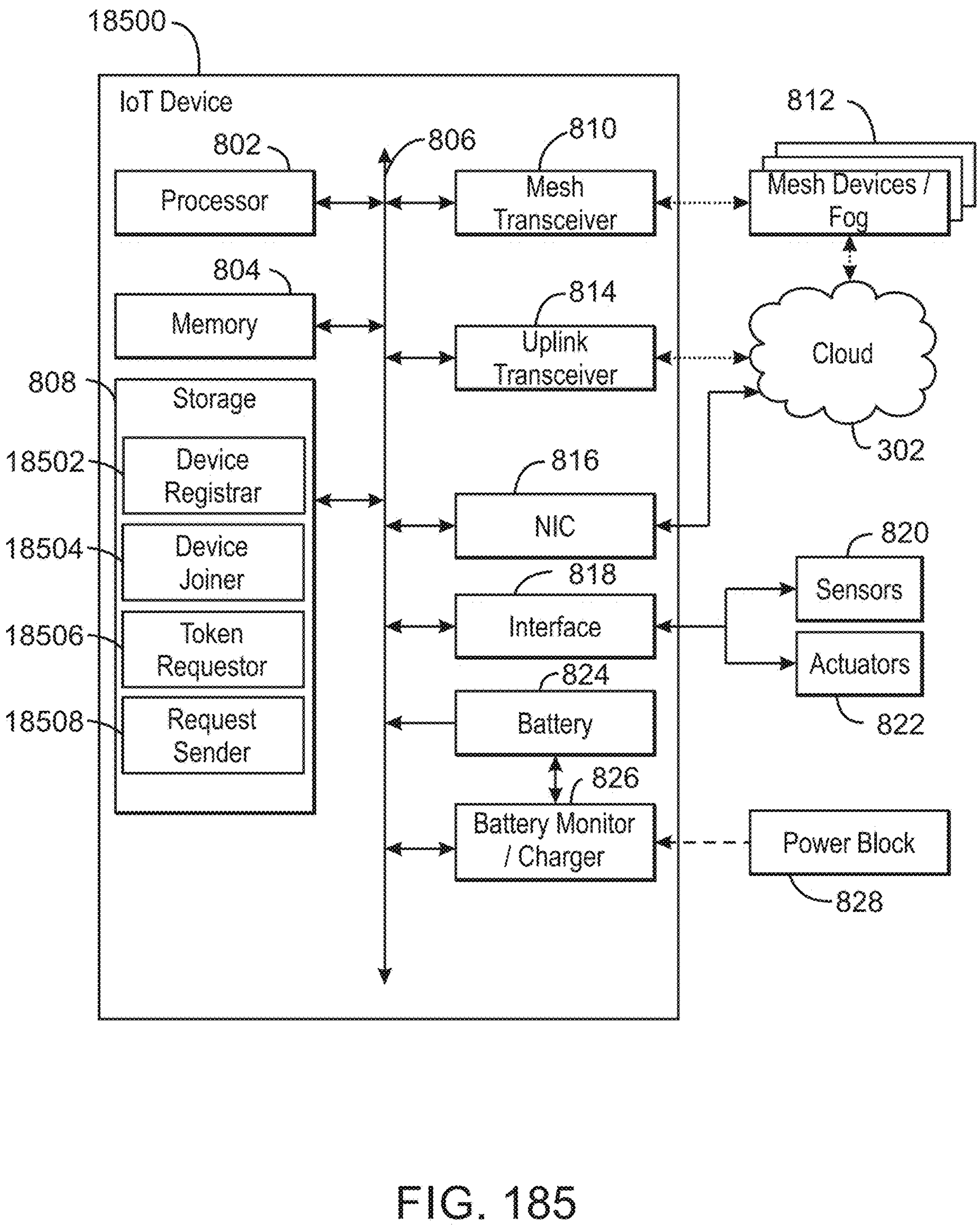

FIG. 185 is a block diagram of an example of components that may be present in an IoT device for decentralized authorization, authentication, and accounting with an IoT device in accordance with some embodiments.

Figure 186:
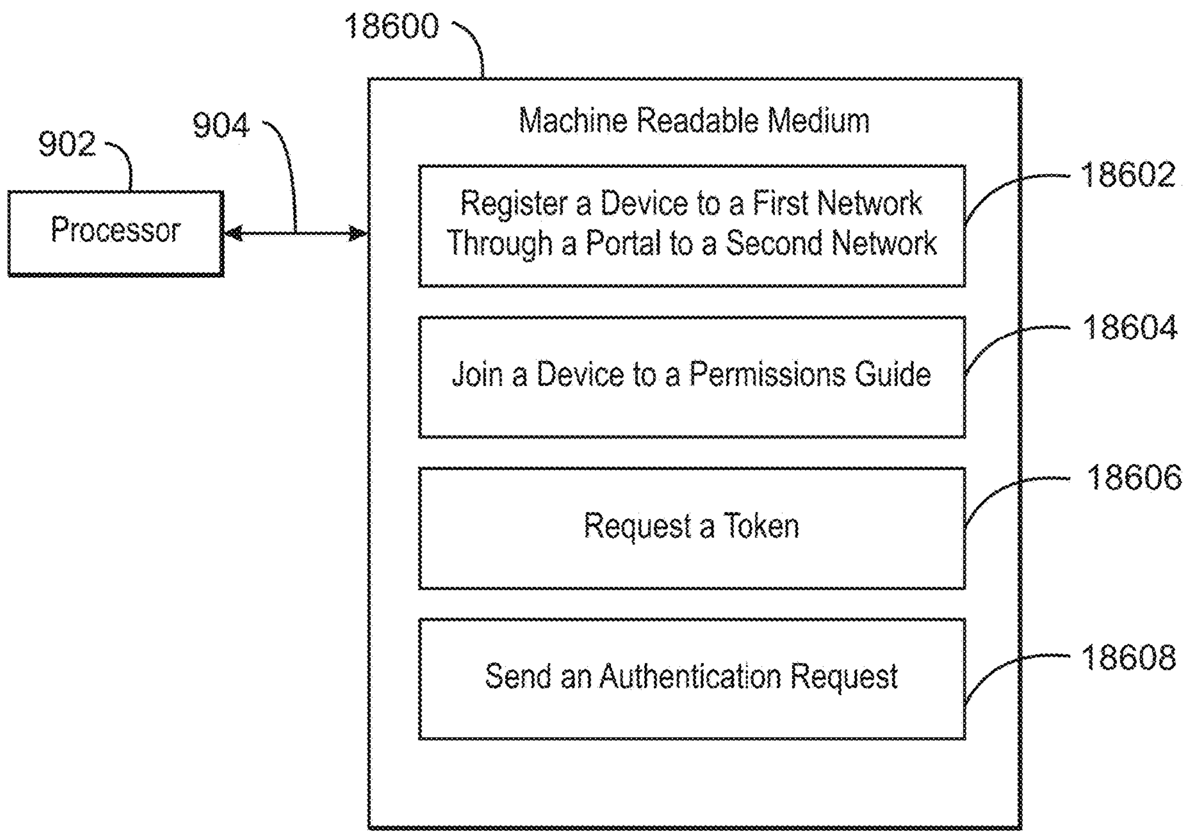

FIG. 186 is a block diagram of a non-transitory, machine readable medium including code for decentralized authorization, authentication, and accounting with an IoT device in accordance with some embodiments.

Figure 187:
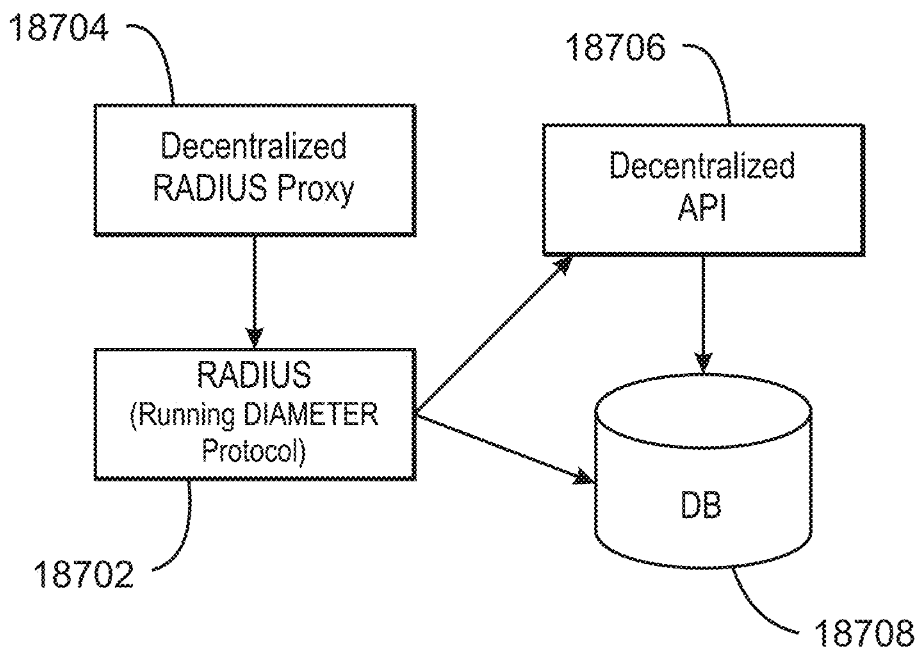

FIG. 187 is a schematic diagram of a technique for decentralized authorization, authentication, and accounting on an IoT device using Remote Authentication Dial-In User Service (RADIUS) or a DIAMETER protocol in accordance with some embodiments.

Figure 188:
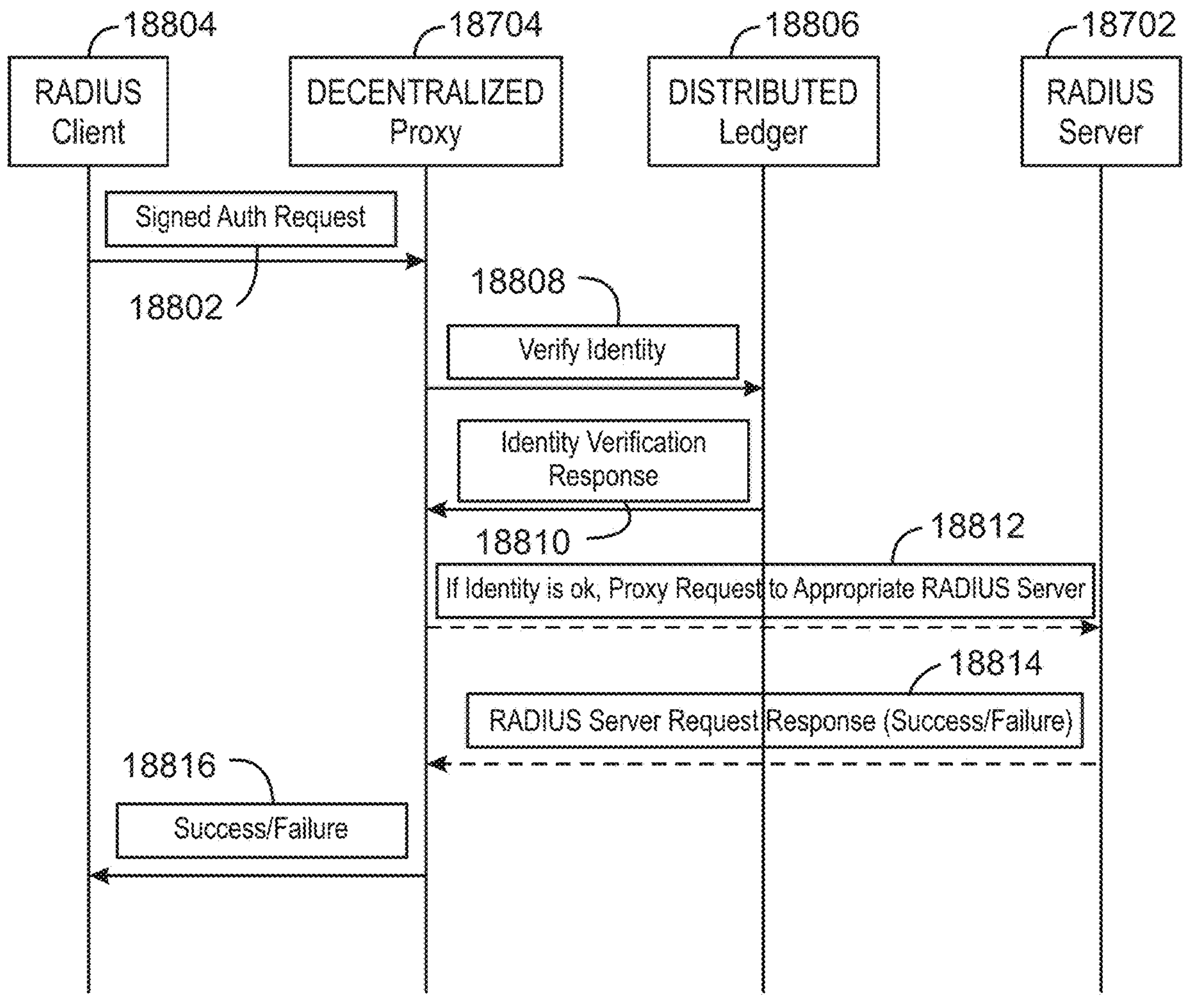

FIG. 188 is a schematic diagram of an action diagram for the components of FIG. 187 to act through a decentralized RADIUS proxy for authorization, authentication, and accounting on an IoT device in accordance with some embodiments.

Figure 189:
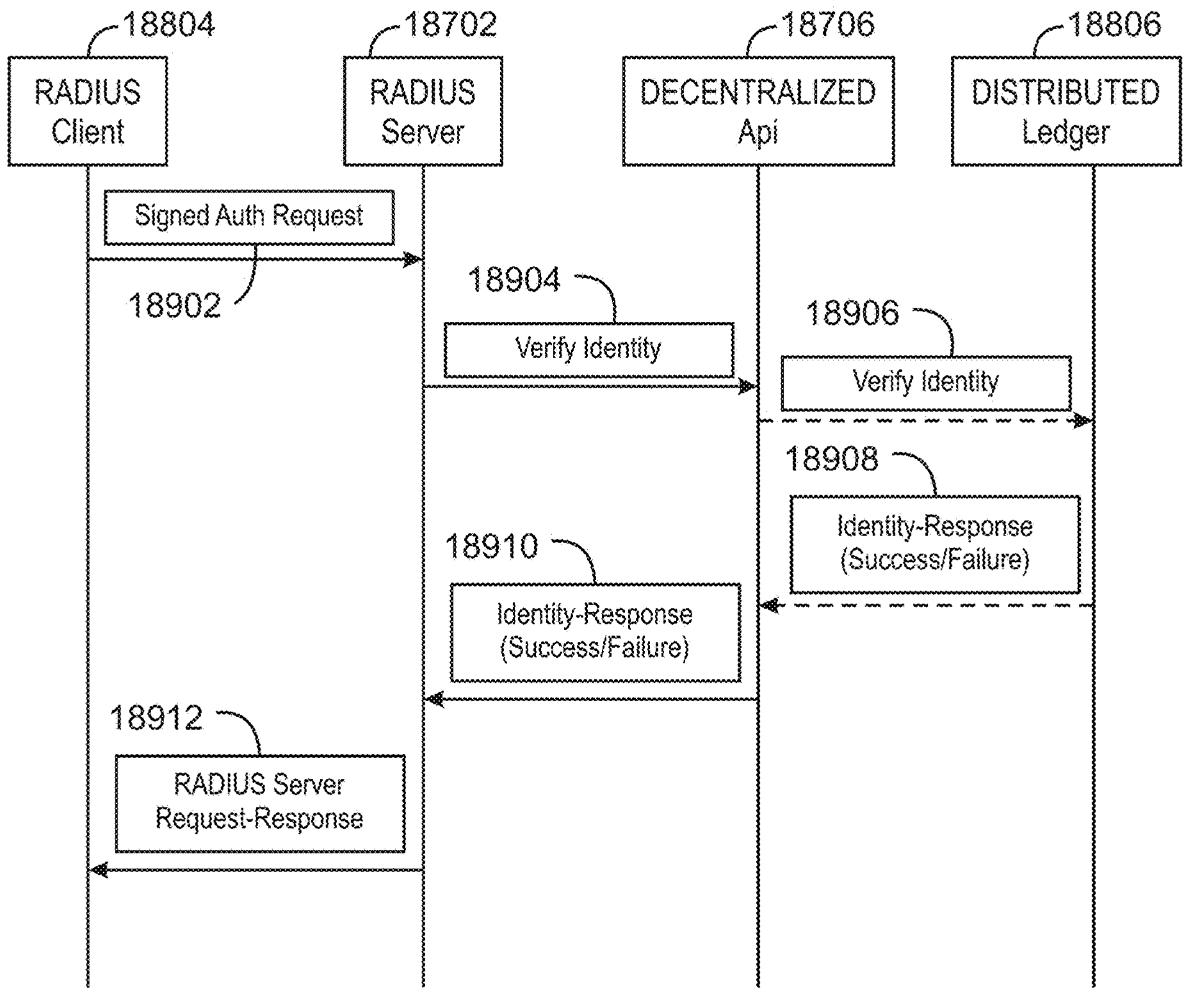

FIG. 189 is a ladder diagram of an example method for the components of FIG. 187 to act through a decentralized API 18706 for authorization, authentication, and accounting on an IoT device in accordance with some embodiments.

Figure 190:
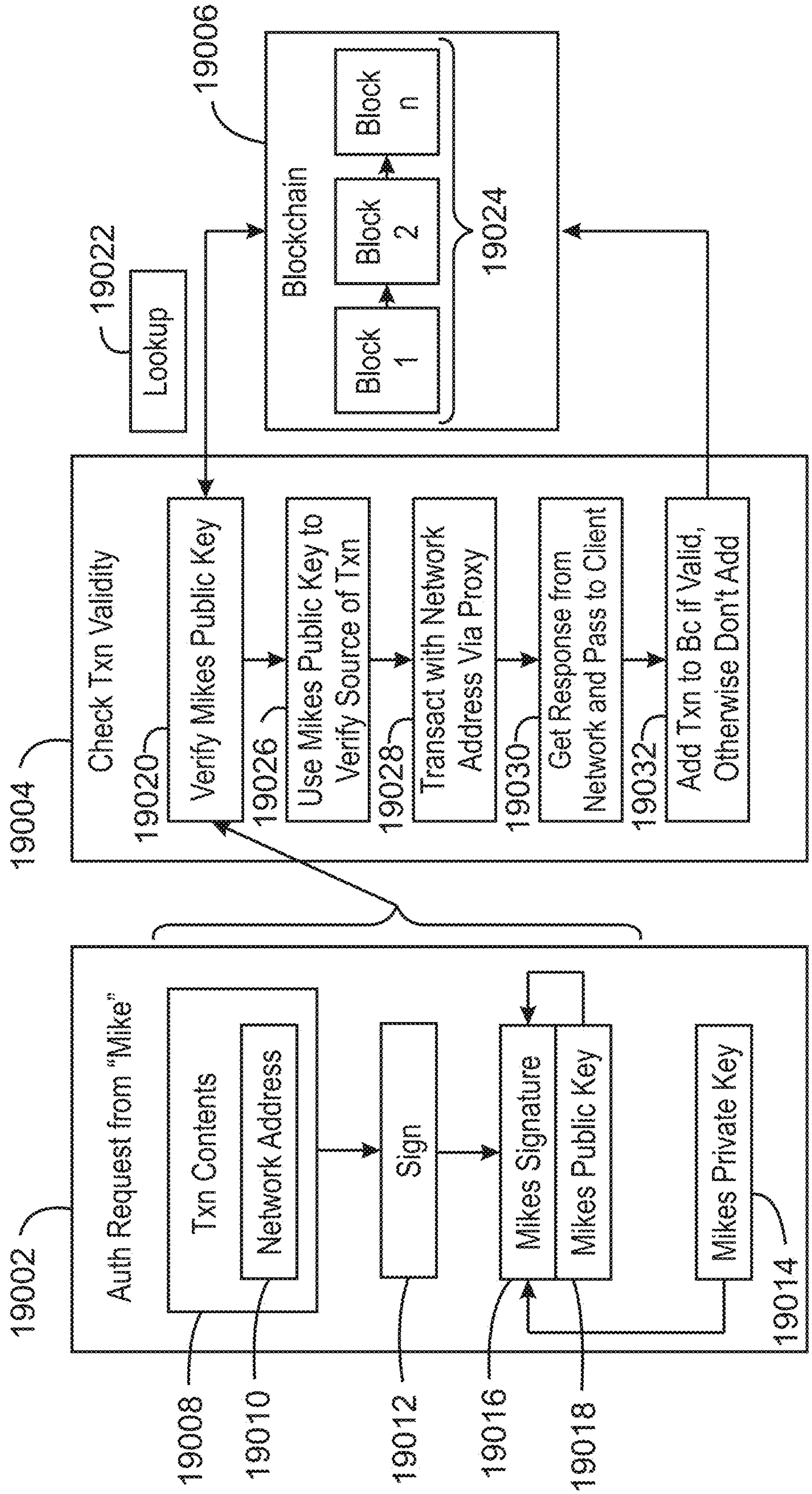

FIG. 190 is a schematic diagram of an action diagram for decentralized authorization, authentication, and accounting on an IoT device in accordance with some embodiments.

Figure 191:
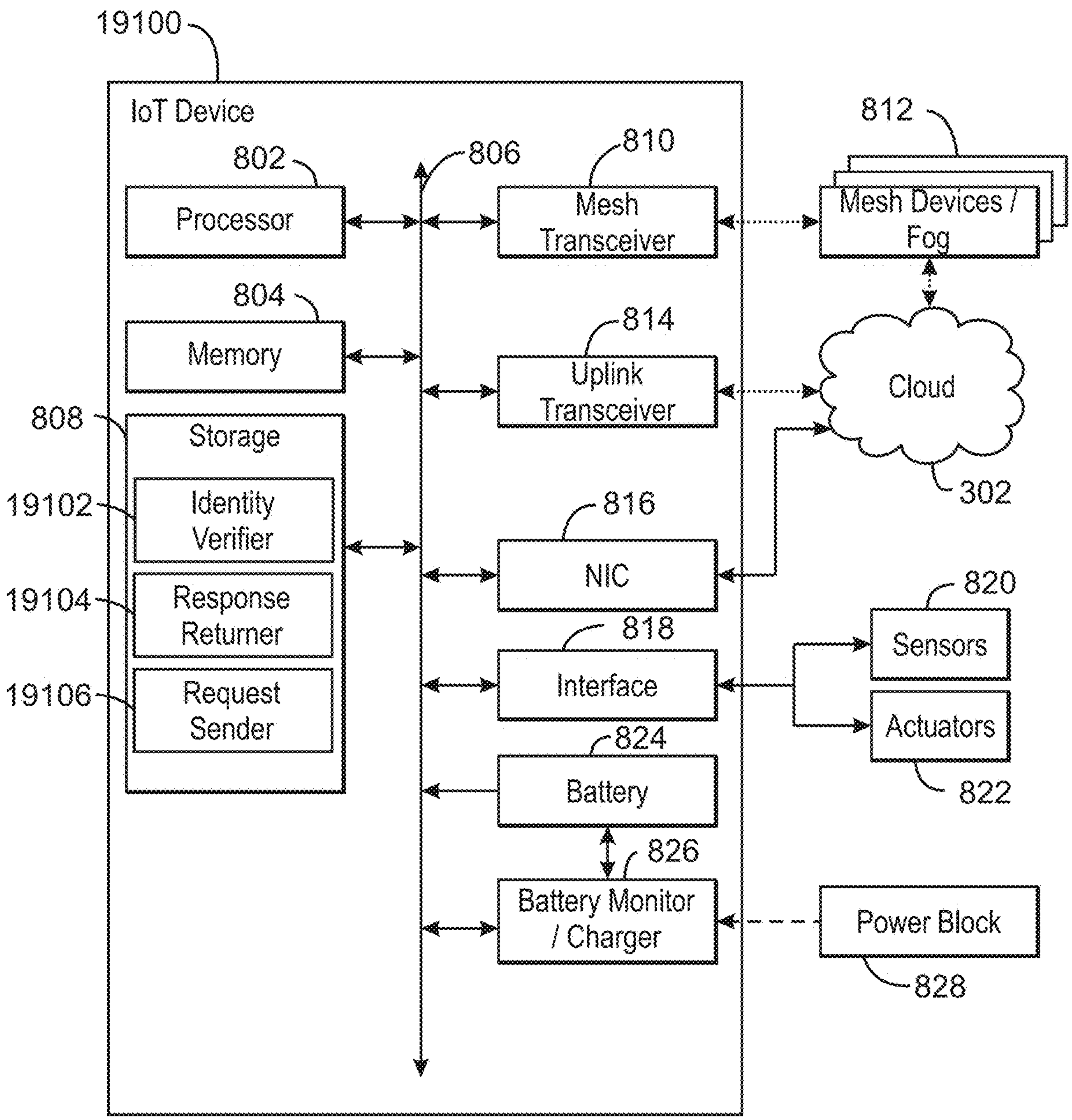

FIG. 191 is a block diagram of an example of components that may be present in an IoT device for decentralized authorization, authentication, and accounting with an IoT device in accordance with some embodiments.

Figure 192:
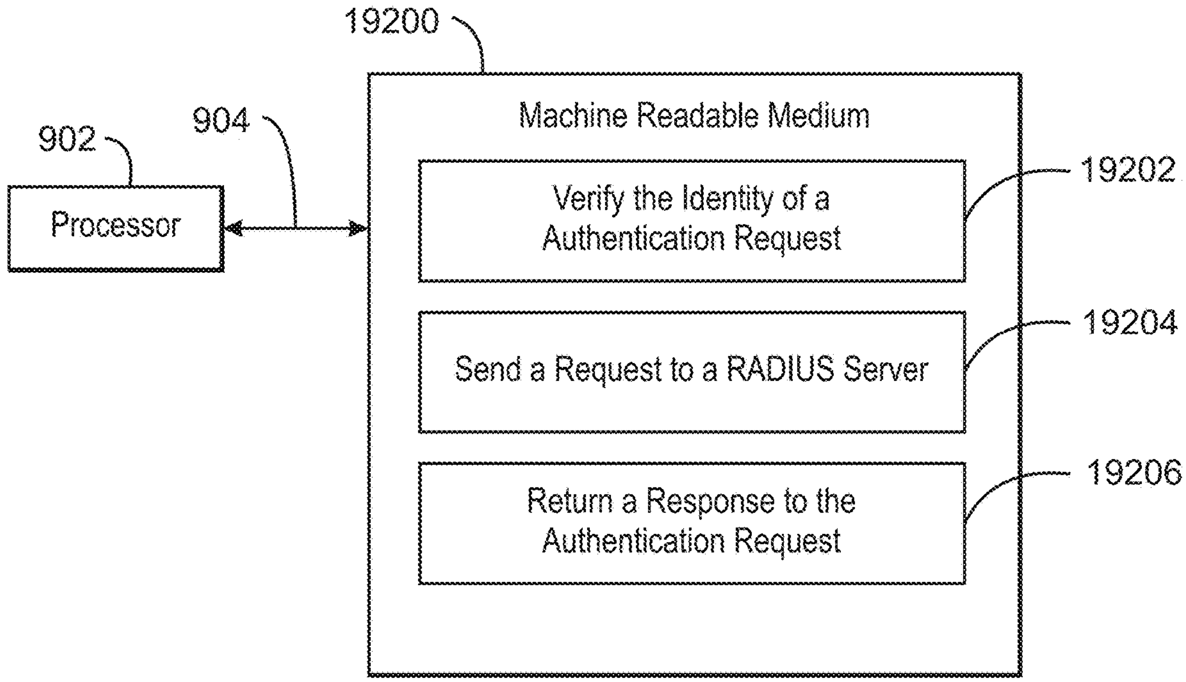

FIG. 192 is a block diagram of a non-transitory, machine readable medium including code to direct a processor for decentralized authorization, authentication, and accounting with an IoT device in accordance with some embodiments.

Figure 193:
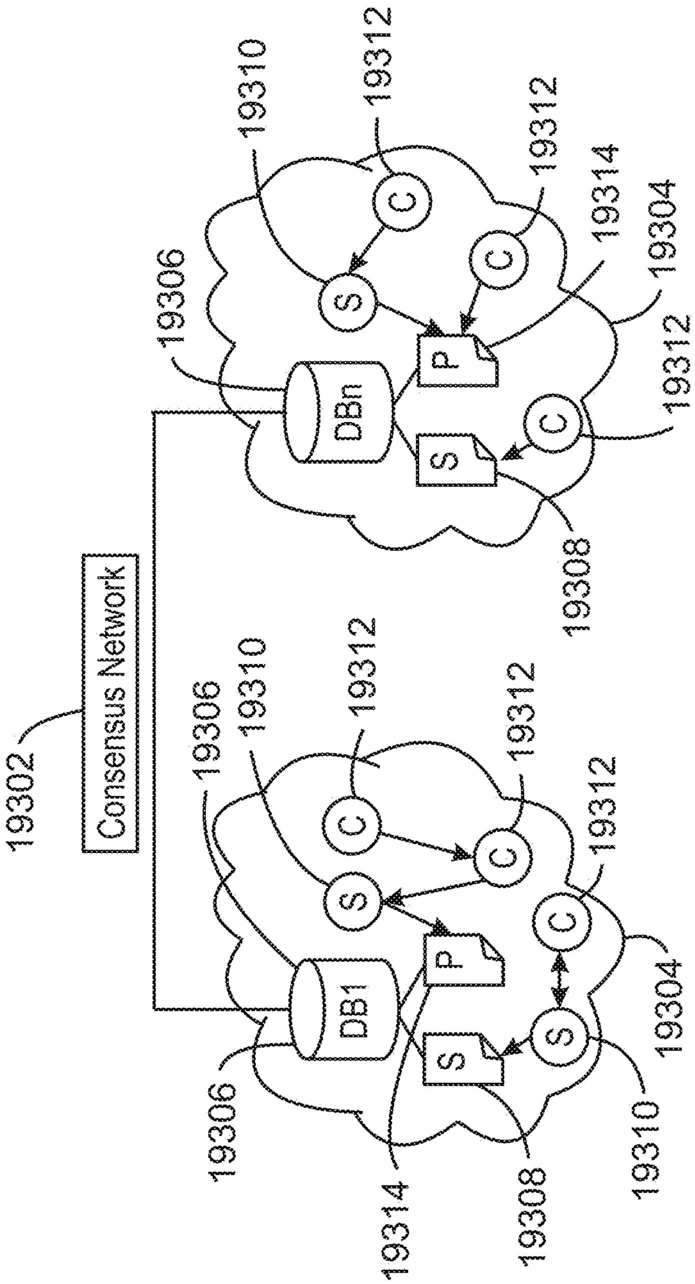

FIG. 193 is a schematic diagram of a process for configuring and operating a consensus network using a native decentralized database in accordance with some embodiments.

Figure 194:
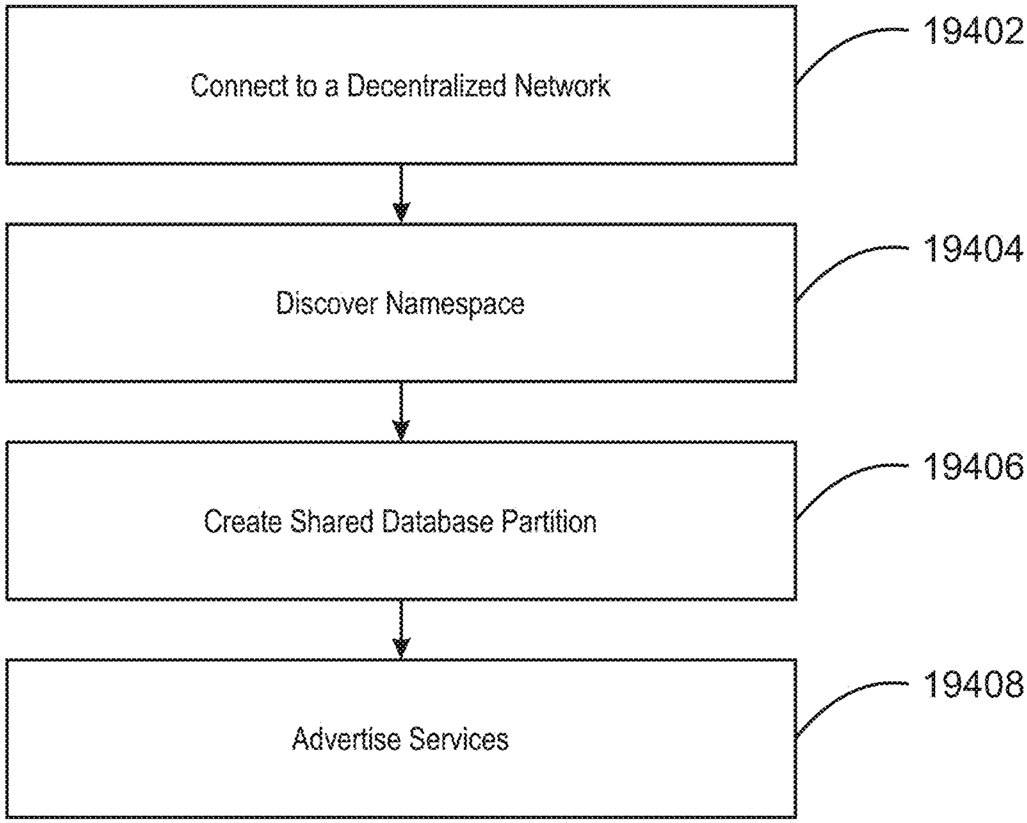

FIG. 194 is a process flow diagram of an example method for joining and operating within a consensus network using a native decentralized database in accordance with some embodiments.

Figure 195:
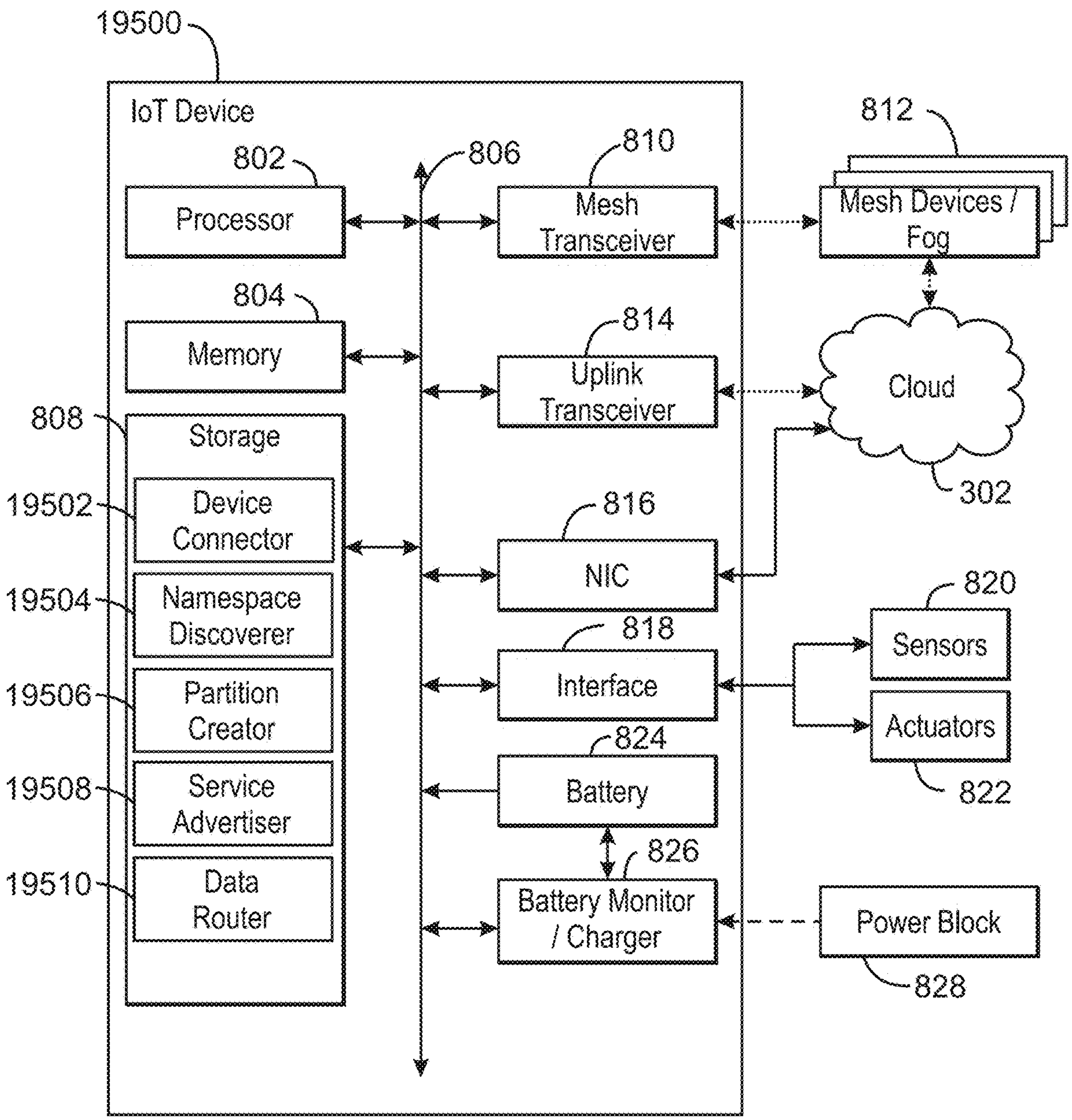

FIG. 195 is a block diagram of an example of components that may be present in an IoT device for joining and operating a decentralized database in accordance with some embodiments.

Figure 196:
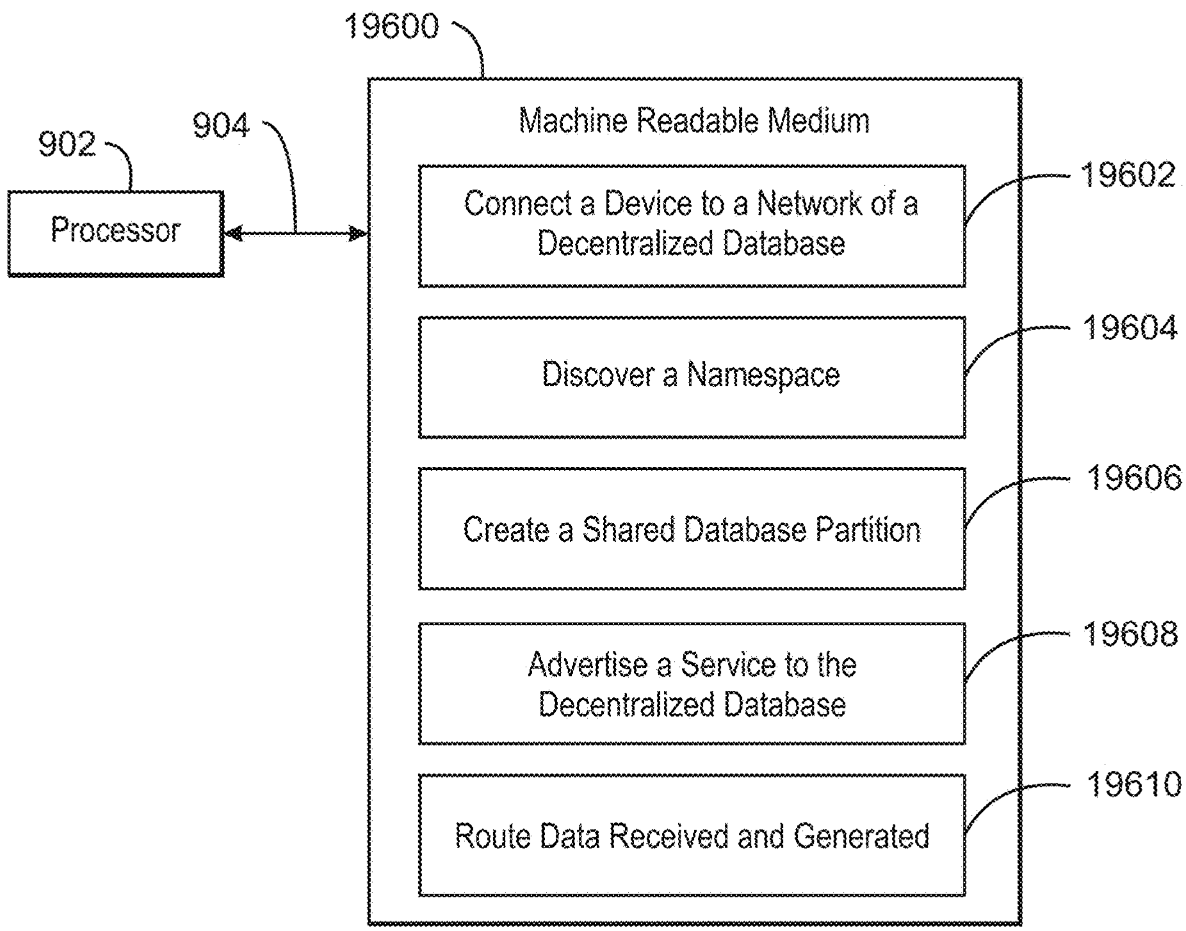

FIG. 196 is a block diagram of a non-transitory, machine readable medium including code to direct a processor for joining and operating a decentralized database in accordance with some embodiments.

Figure 197:
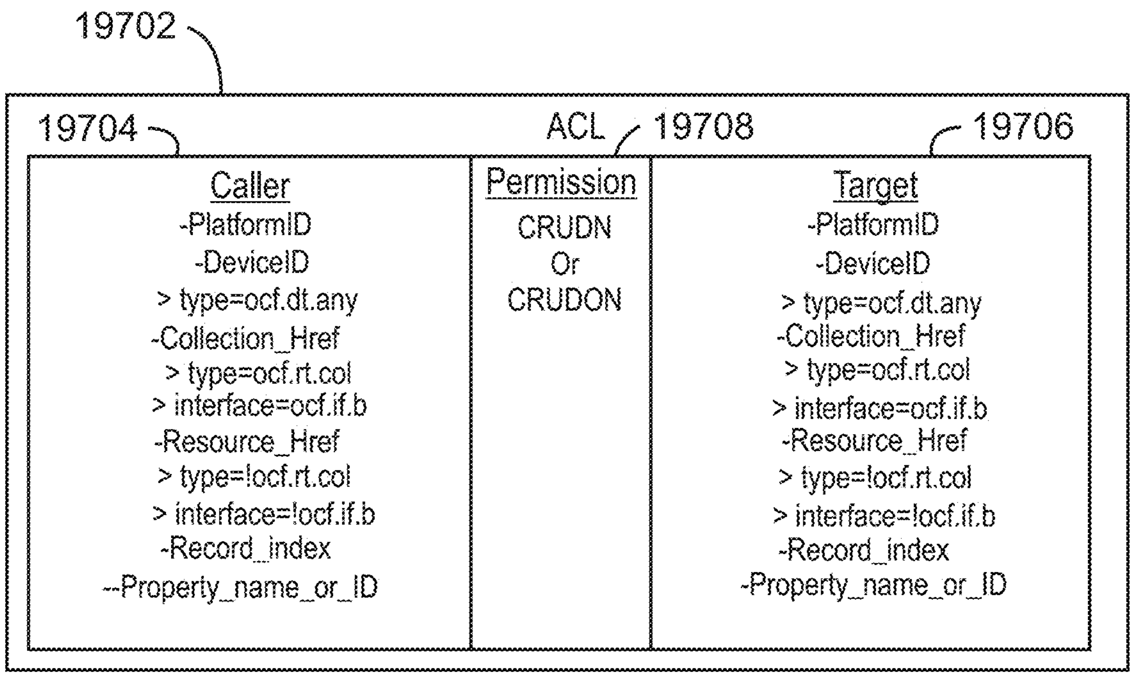

FIG. 197 is a schematic diagram of logical division for access control in an IoT object in accordance with some embodiments.

Figure 198:
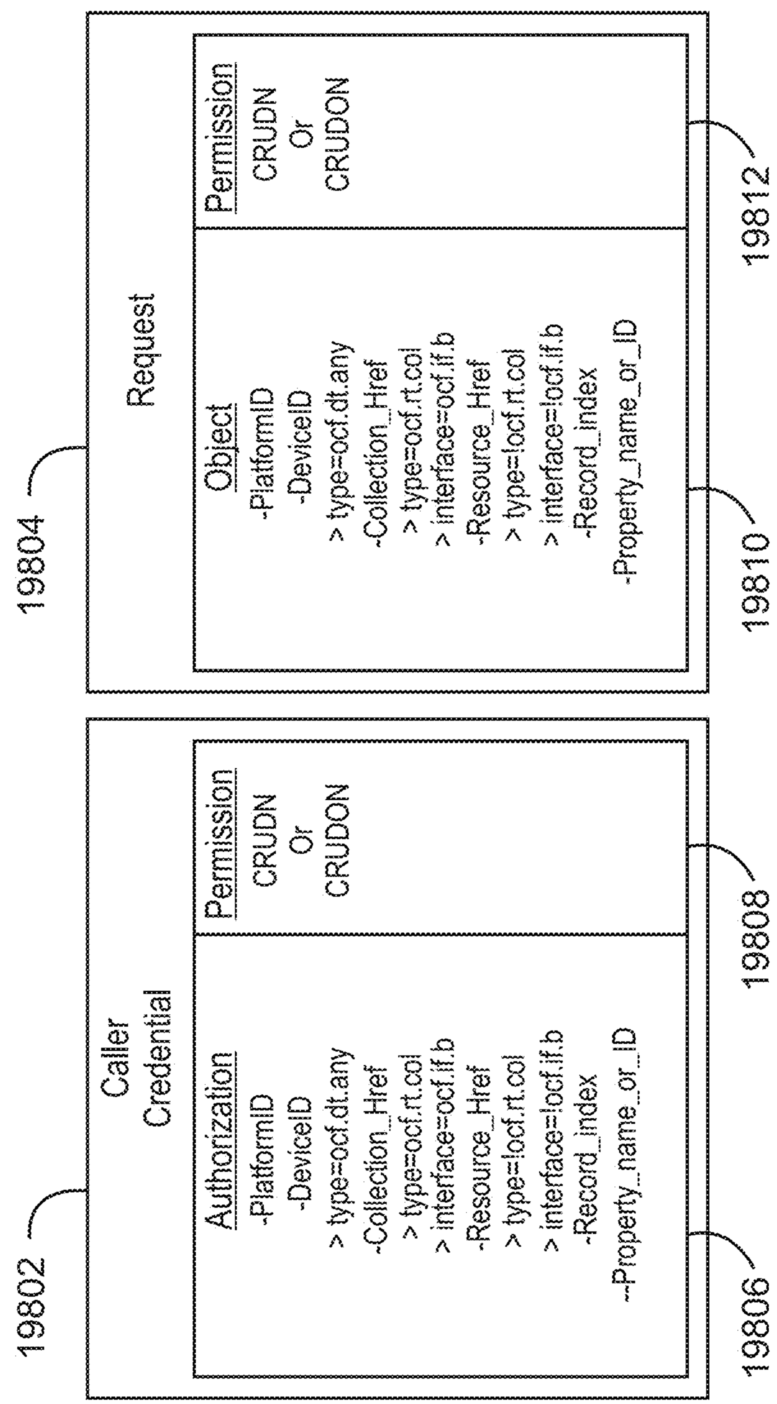

FIG. 198 is a schematic diagram of logical divisions between a caller credential and a request for access control in an IoT object in accordance with some embodiments.

Figure 199:
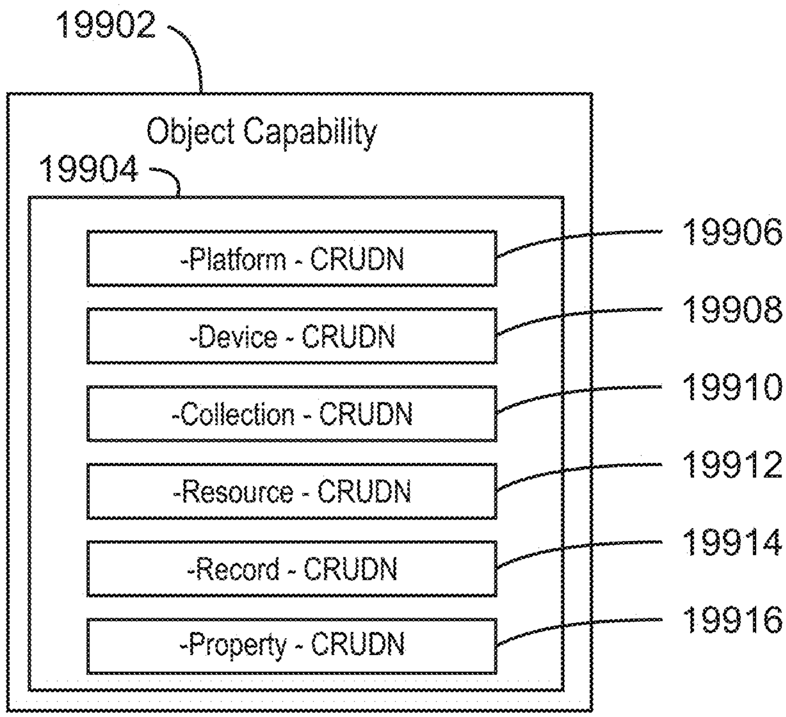

FIG. 199 is a schematic diagram of logical divisions between of an object capability for access control using layers in an IoT object in accordance with some embodiments.

Figure 200:
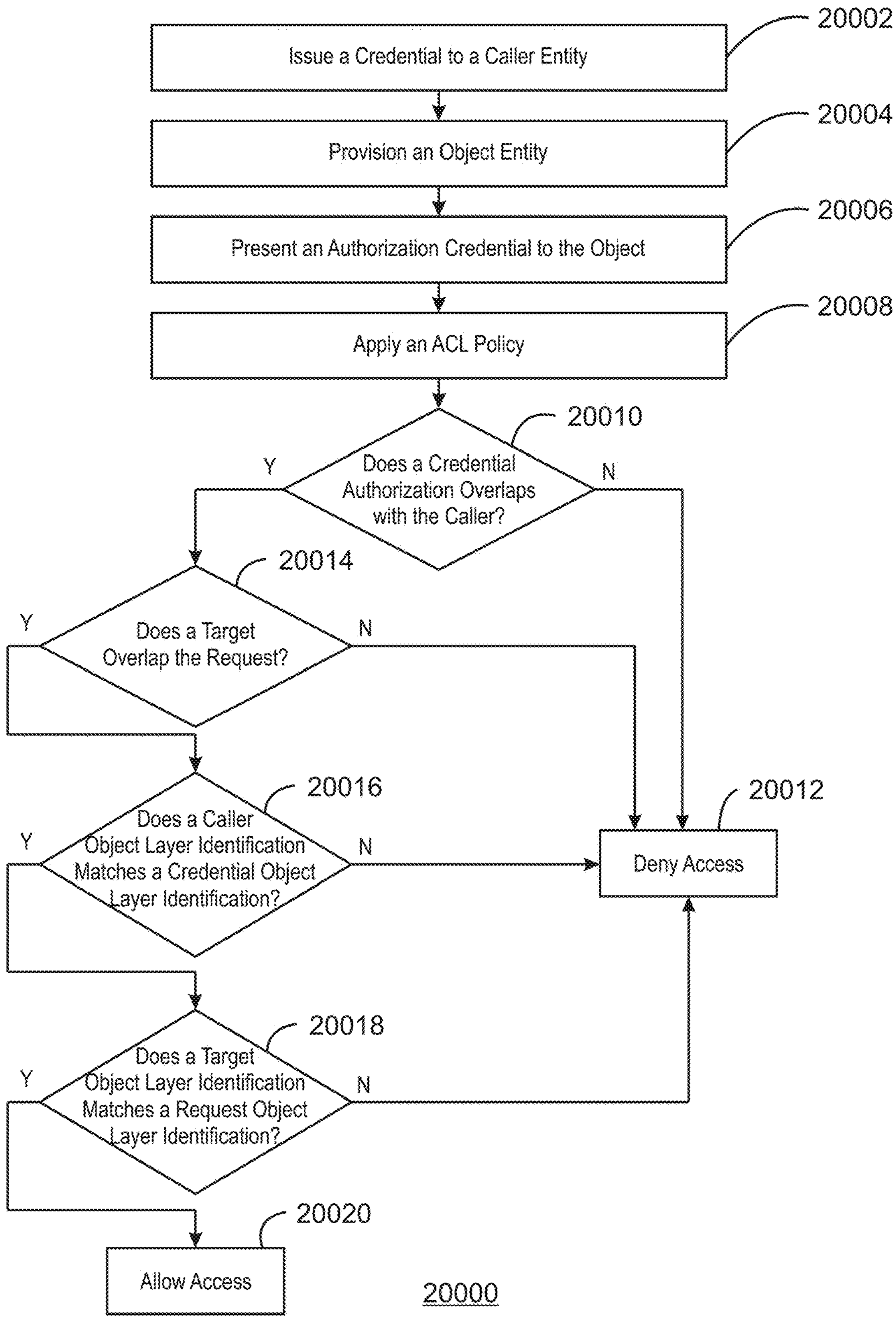

FIG. 200 is a process flow diagram of an example method for access control in an IoT object in accordance with some embodiments.

Figure 201:
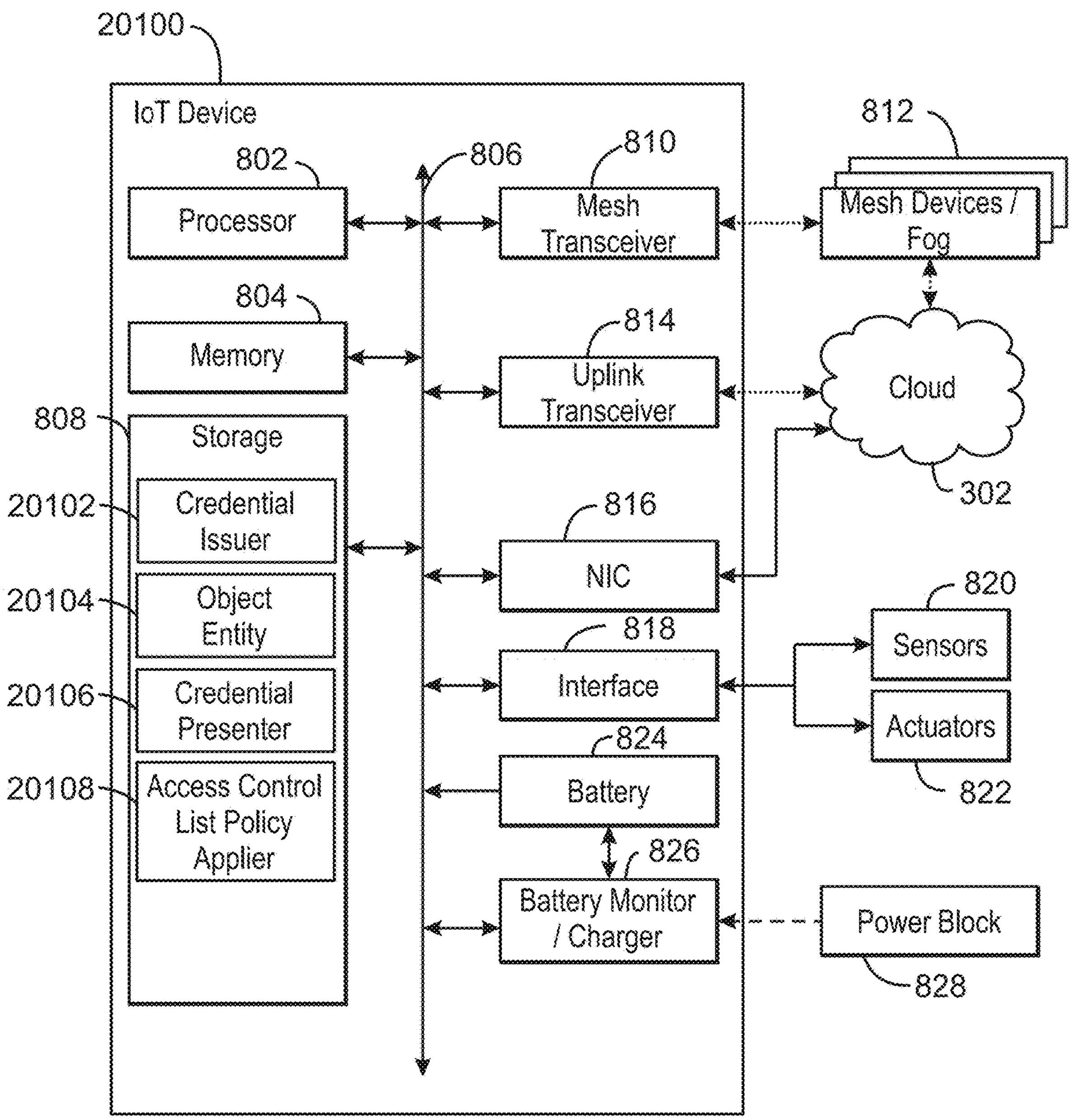

FIG. 201 is a block diagram of an example of components that may be present in an IoT device for access control in an IoT object in accordance with some embodiments.

Figure 202:
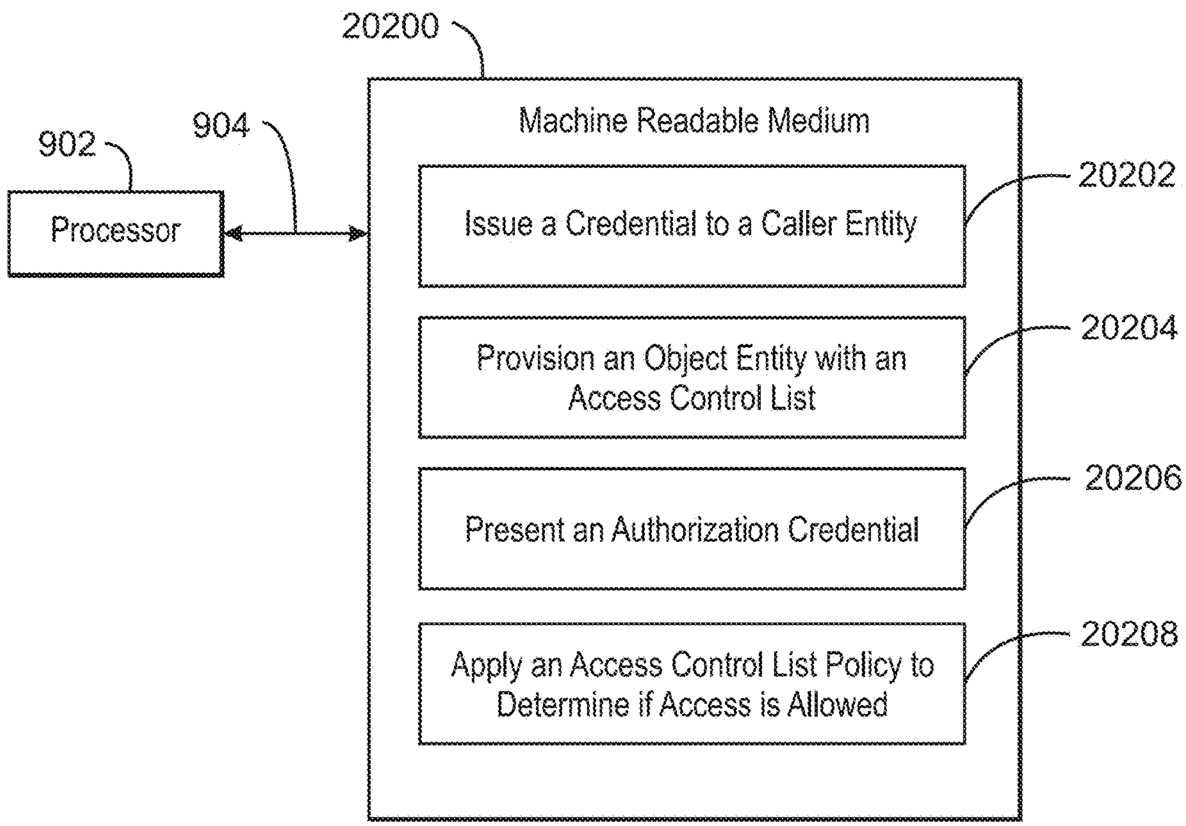

FIG. 202 is a block diagram of a non-transitory, machine readable medium 19600 including code to direct a processor for access control in an IoT object in accordance with some embodiments.

Figure 203:
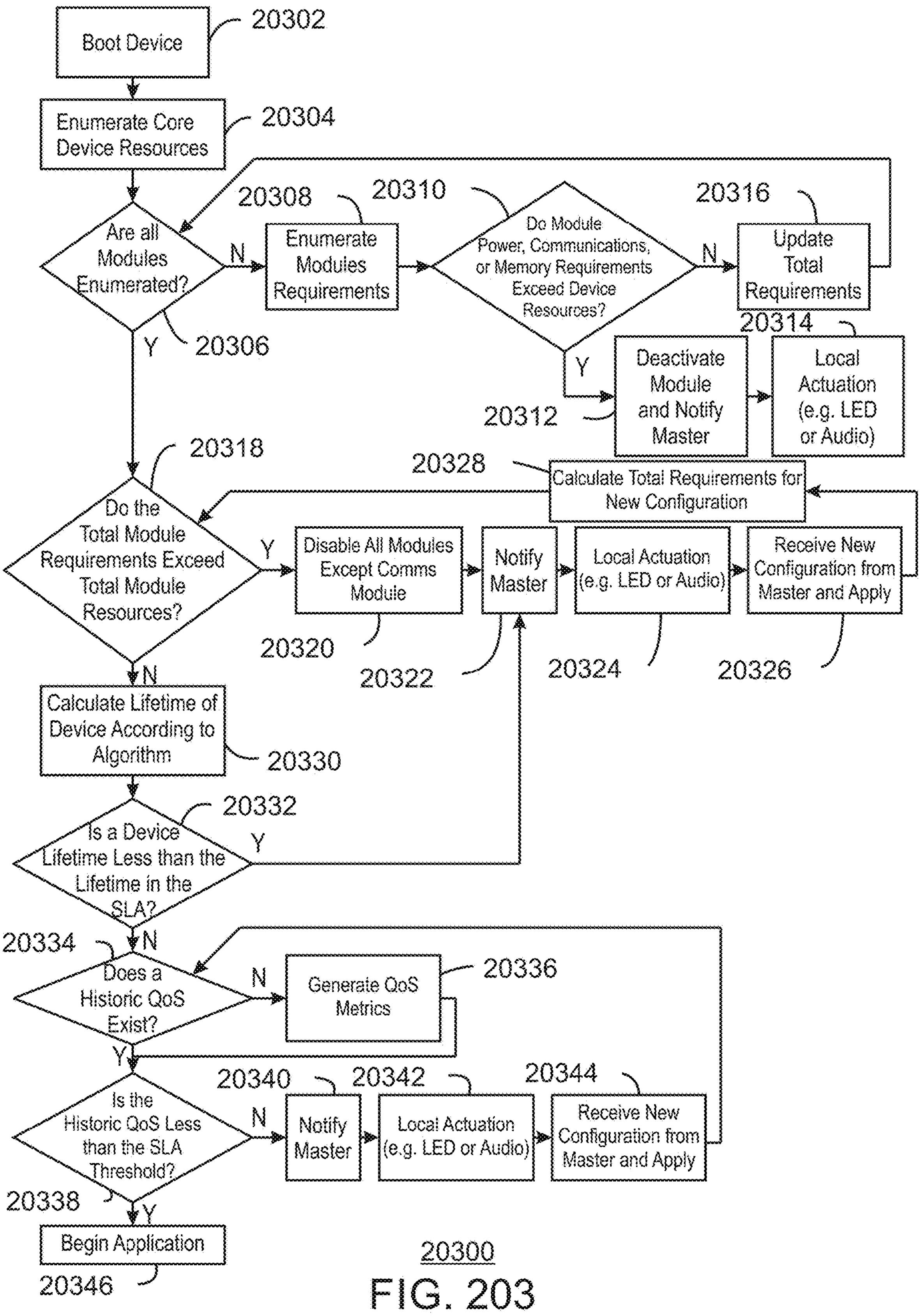

FIG. 203 is a process flow diagram of an example method for use by an IoT device to map resources and requirements of self-describing hardware.

Figure 204:
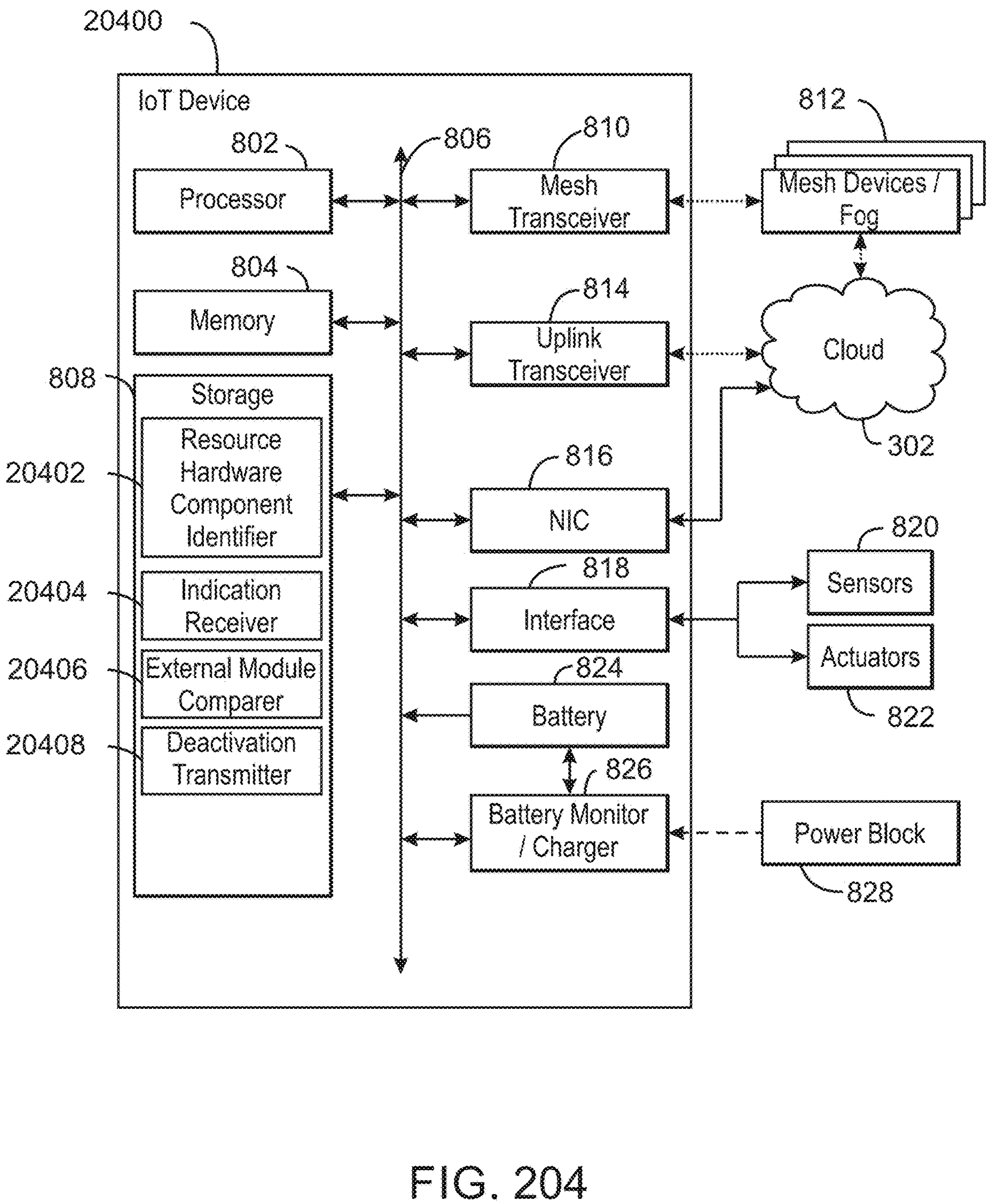

FIG. 204 is a block diagram of an example of components that may be present in an IoT device to map resources and requirements of self-describing hardware in accordance with some embodiments.

Figure 205:
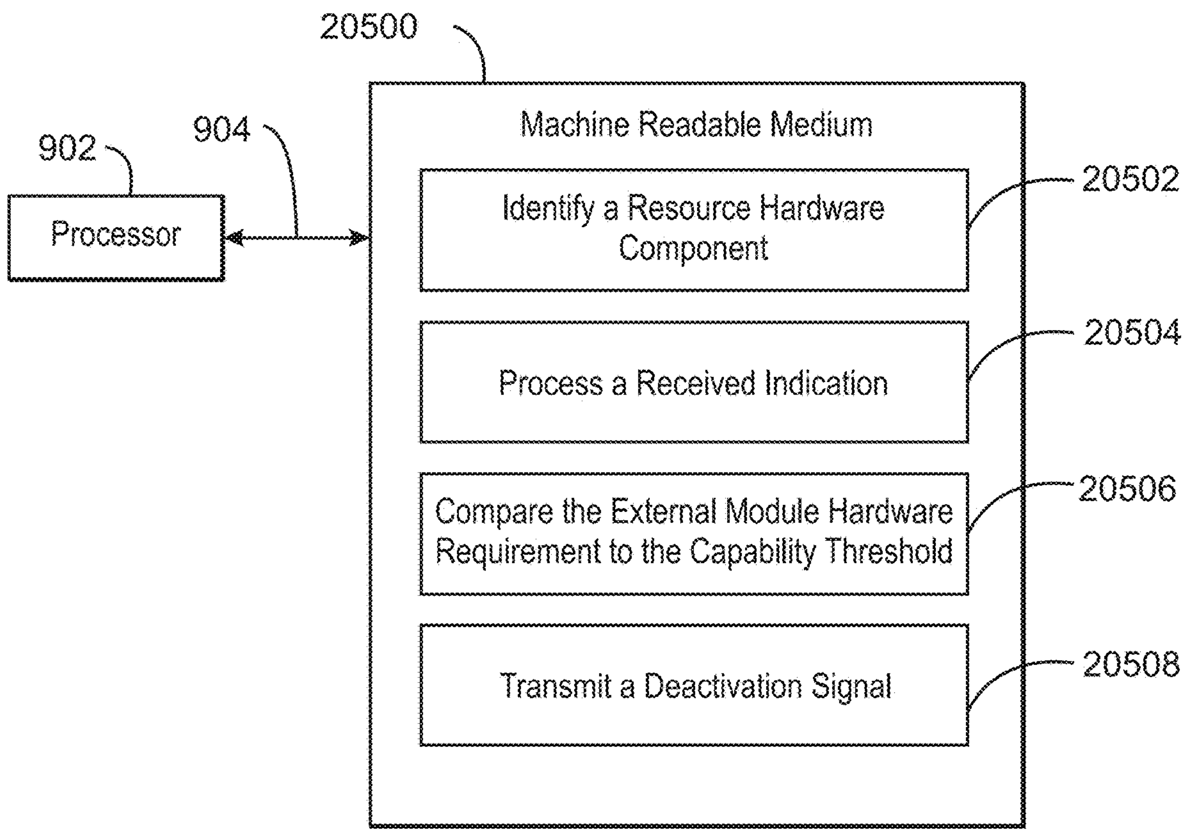

FIG. 205 is a block diagram of a non-transitory, machine readable medium including instructions that, when executed, direct a processor to map resources and requirements of self-describing hardware in accordance with some embodiments.

Figure 206:
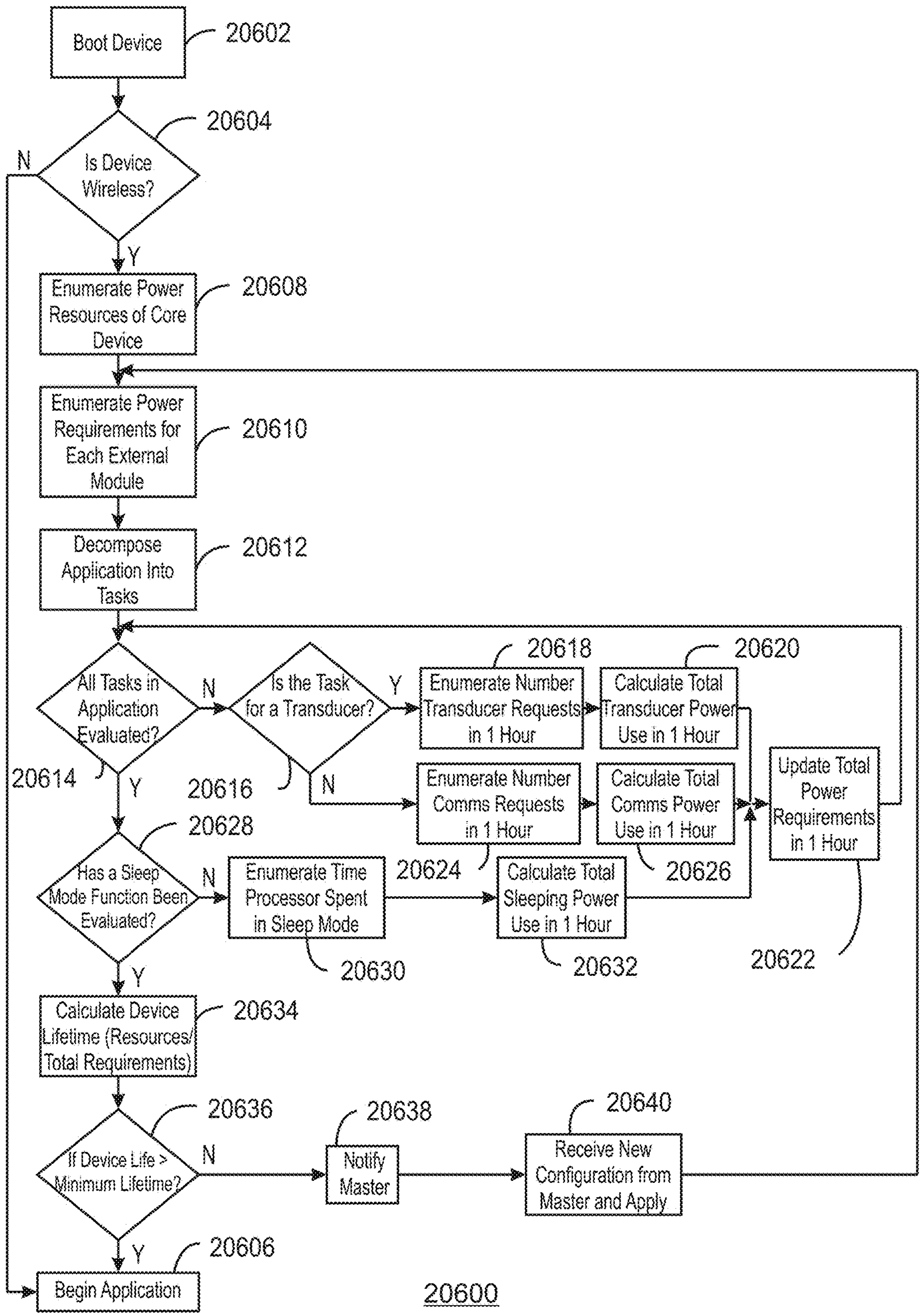

FIG. 206 is a process flow diagram of an example method for use by an IoT device to map resources and requirements of self-describing hardware in accordance with some embodiments.

Figure 207:
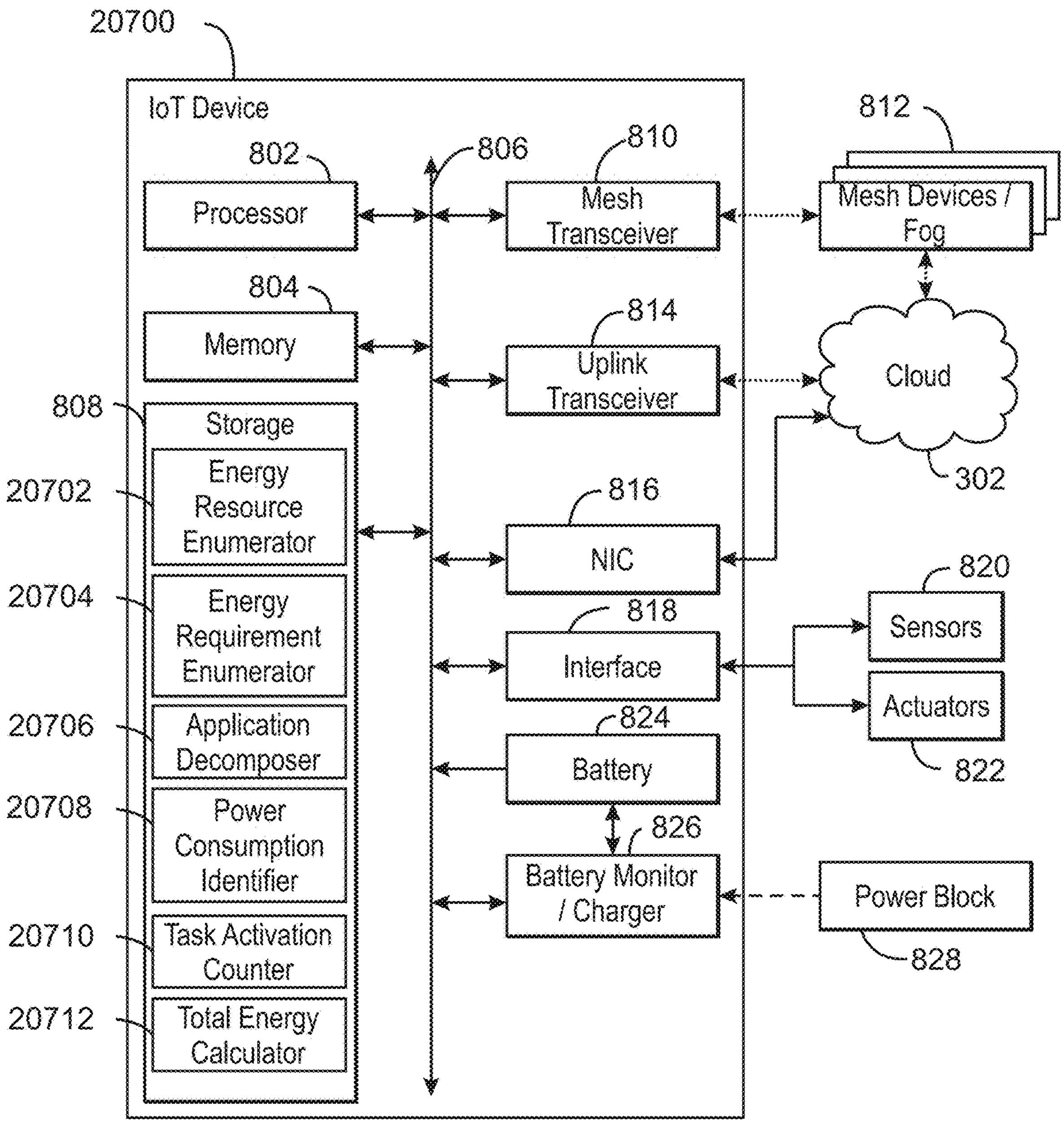

FIG. 207 is a block diagram of an example of components that may be present in an IoT device for a calculation tool for self-describing hardware in accordance with some embodiments.

Figure 208:
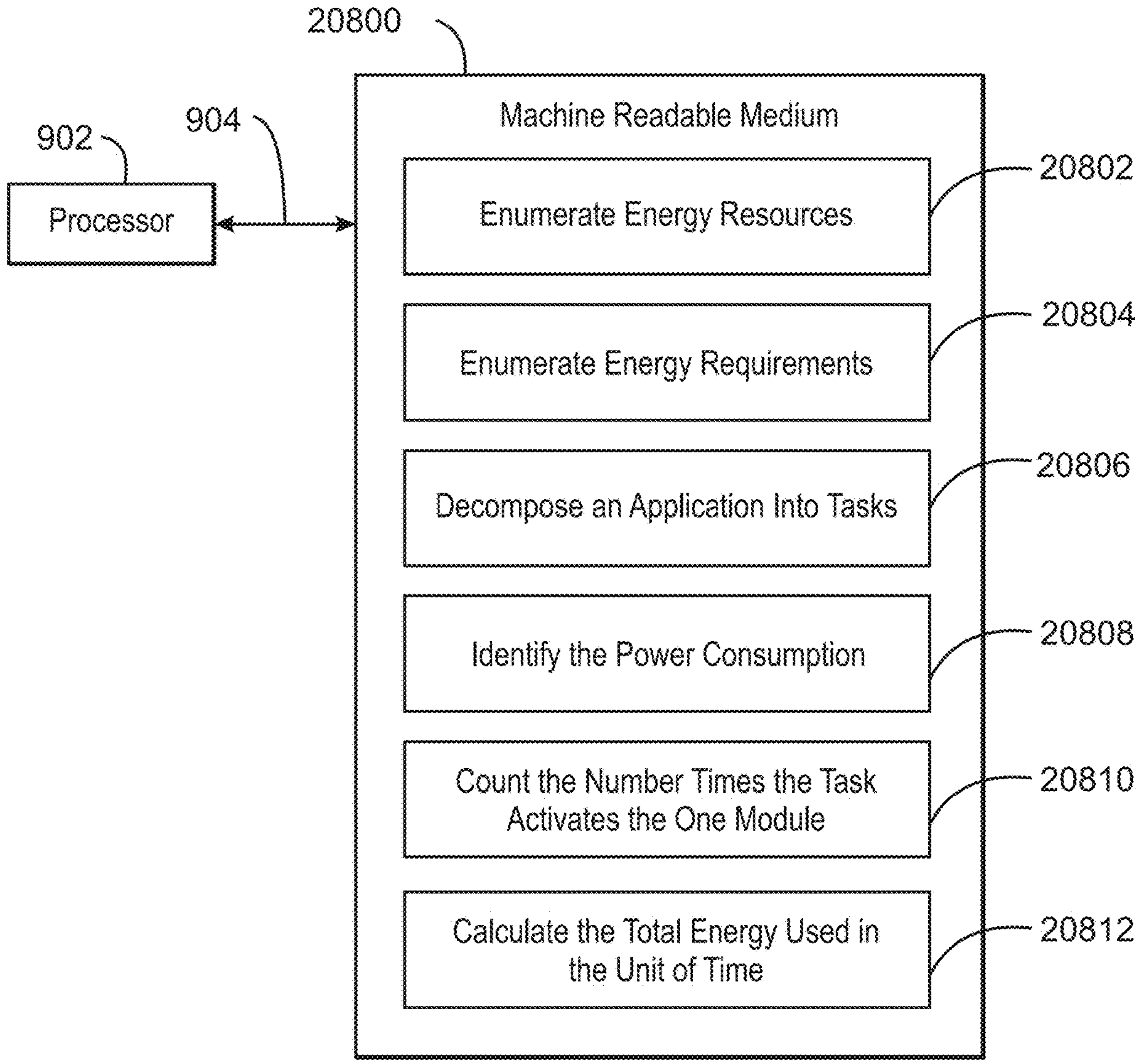

FIG. 208 is a block diagram of a non-transitory, machine readable medium including instructions that, when executed, direct a processor to map resources and requirements of self-describing hardware in accordance with some embodiments.

Figure 209:
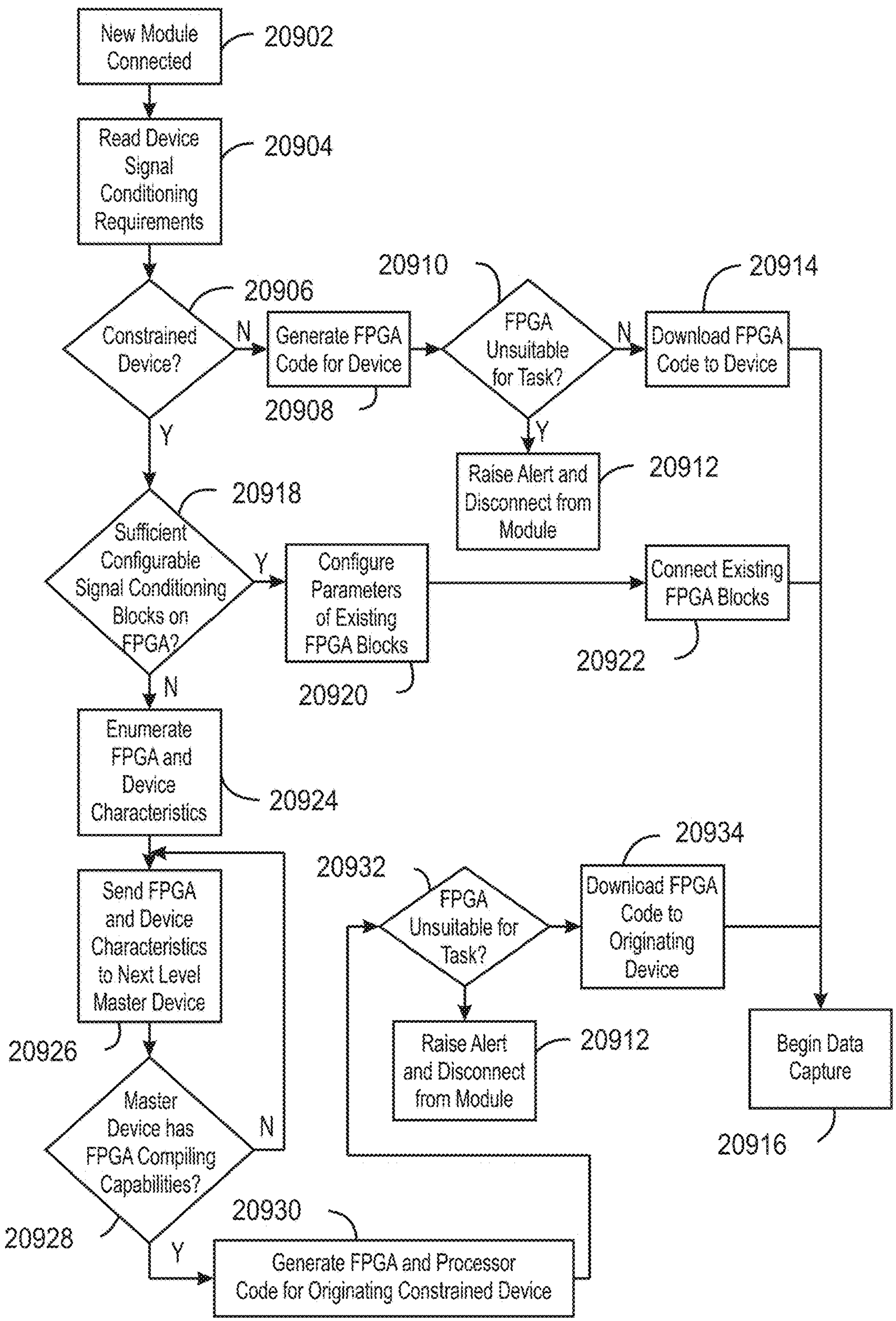

FIG. 209 is a process flow diagram of an example method for use by an IoT device to configure signal conditioning circuitry in accordance with some embodiments.

Figure 210:
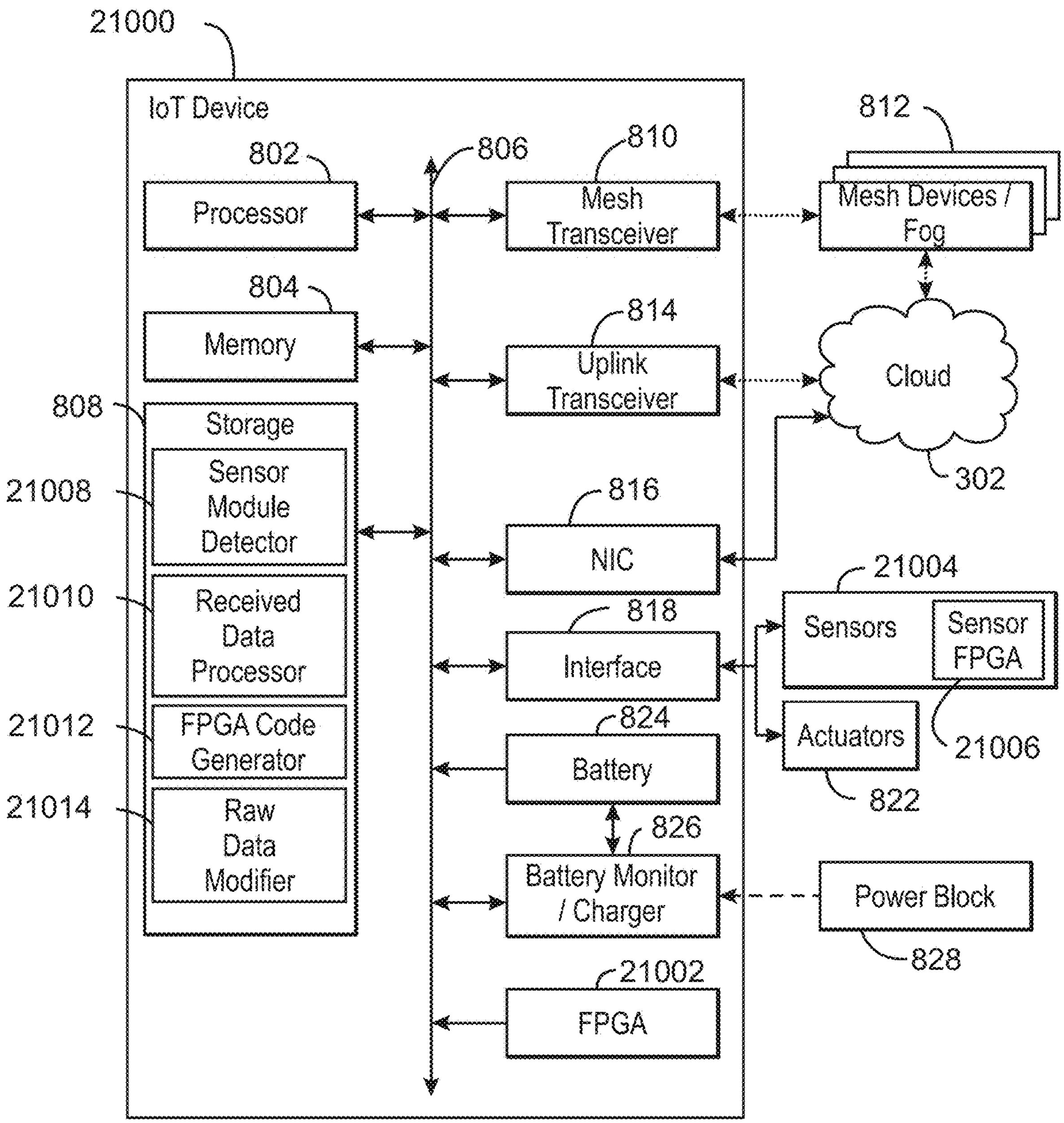

FIG. 210 is a block diagram of an example of components that may be present in an IoT device to configure signal conditioning circuitry in accordance with some embodiments.

Figure 211:
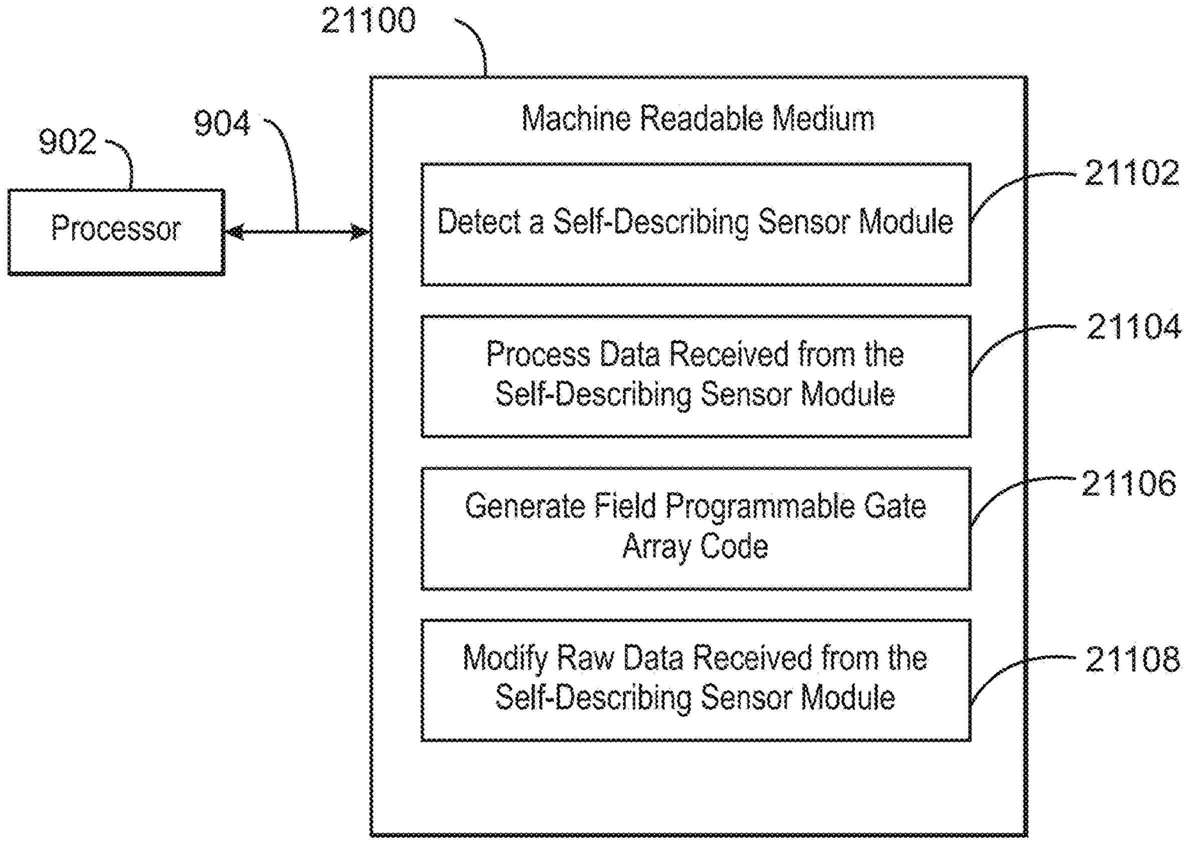

FIG. 211 is a block diagram of a non-transitory, machine readable medium including instructions that, when executed, direct a processor to configure signal conditioning circuitry in accordance with some embodiments.

Figure 212:
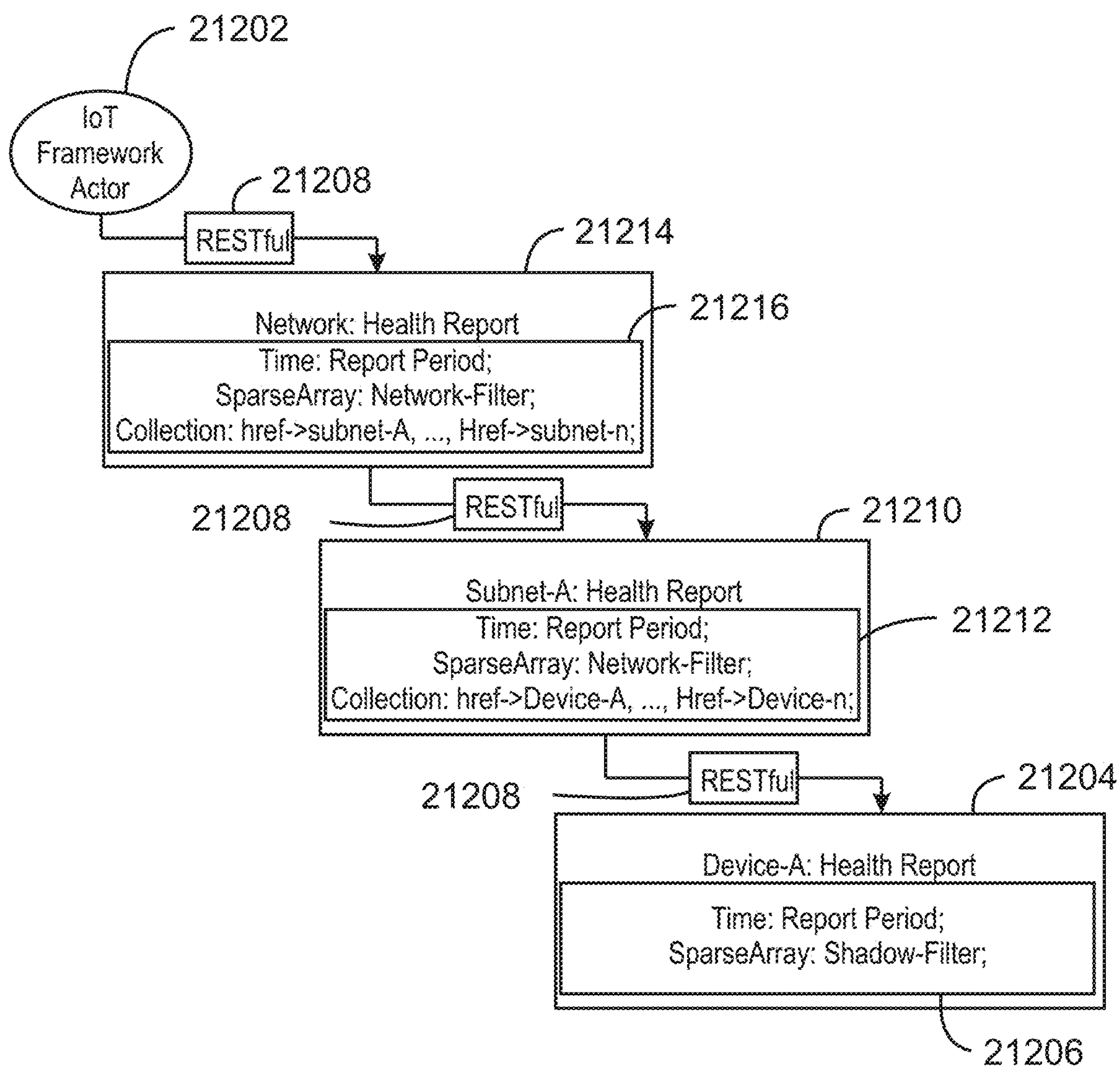

FIG. 212 is a schematic diagram of hierarchical device and network health reporting in accordance with some embodiments.

Figure 213:
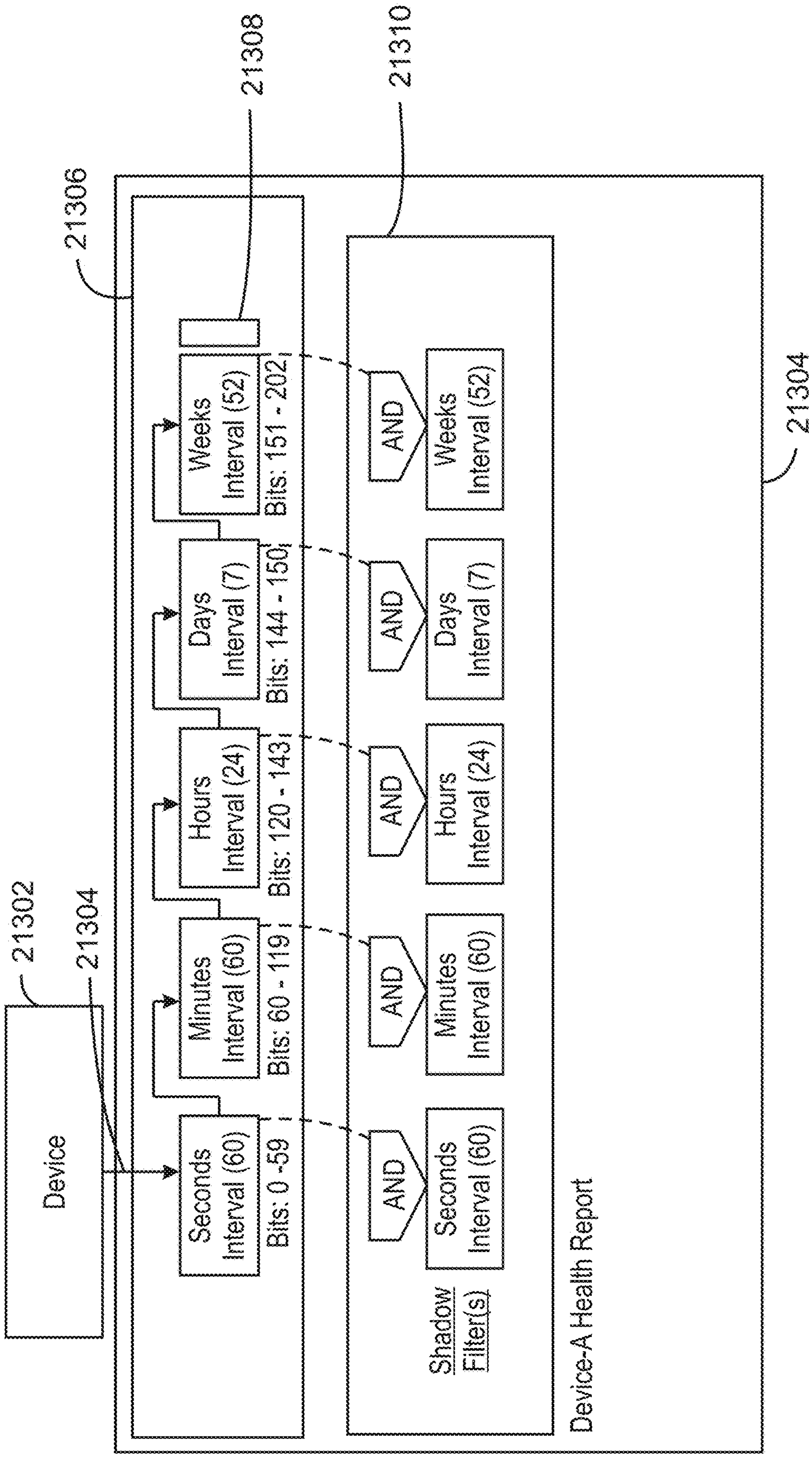

FIG. 213 is a schematic diagram of device level bloom filter and shadow filter health reporting in accordance with some embodiments.

Figure 214:
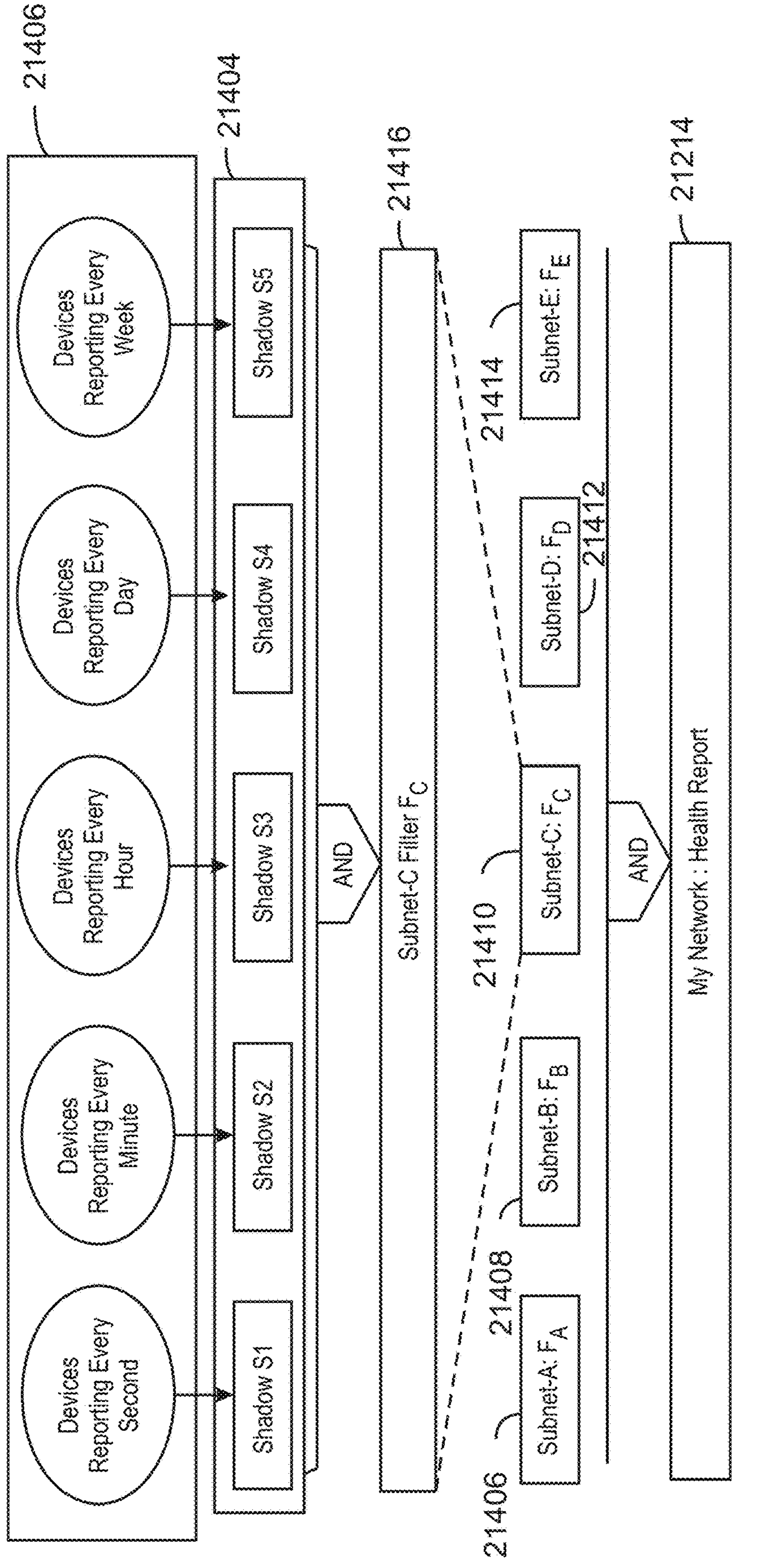

FIG. 214 is a schematic diagram of network level bloom filter reporting of historical intermittent loss of watchdog reporting in accordance with some embodiments.

Figure 215:
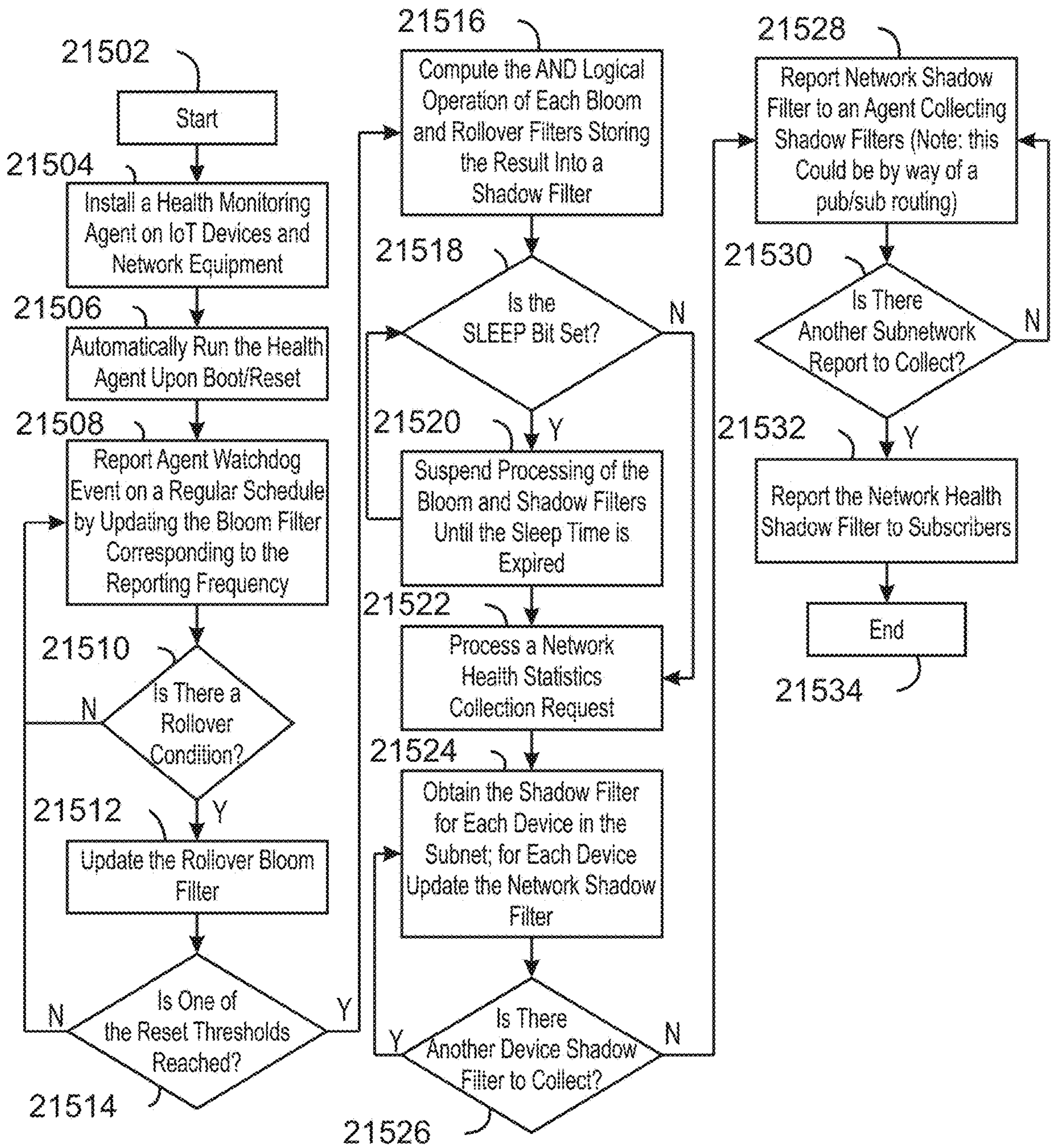

FIG. 215 shows a process flow diagram of an example method for use by an IoT device to report health using shadow and bloom filters in accordance with some embodiments.

Figure 216:
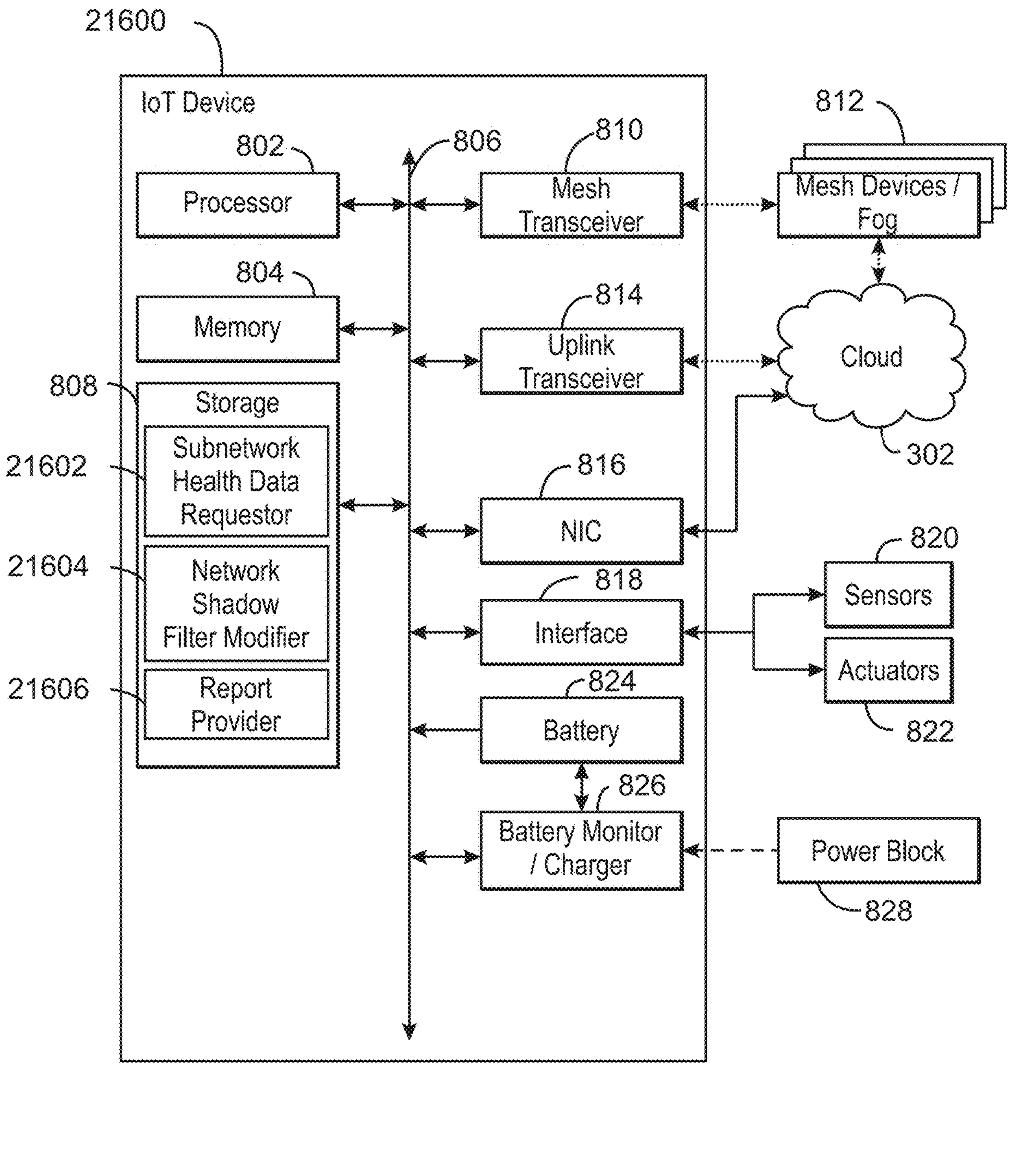

FIG. 216 is a block diagram of an example of components that may be present in an IoT device for reporting health of a network and network devices in accordance with some embodiments.

Figure 217:
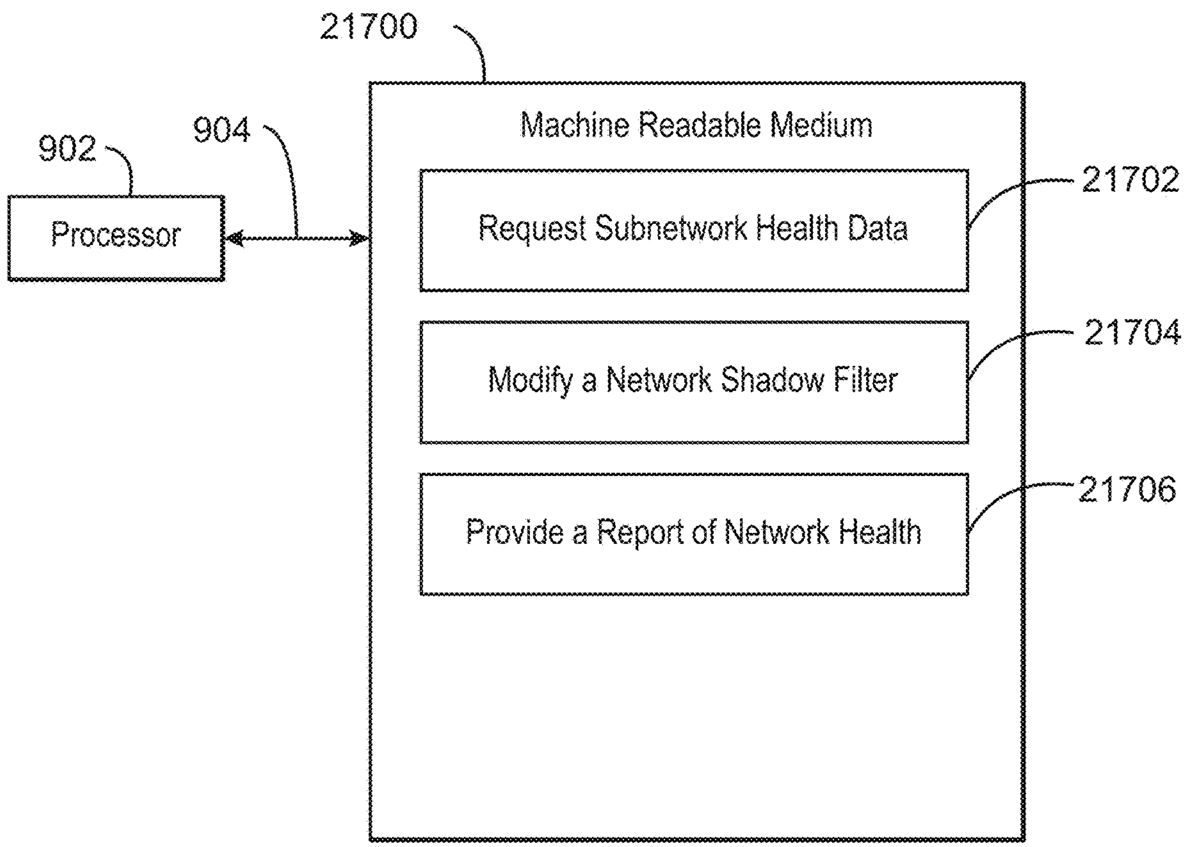

FIG. 217 is a block diagram of a non-transitory, machine readable medium including code to report health of a network and network devices in accordance with some embodiments.

Figure 218:
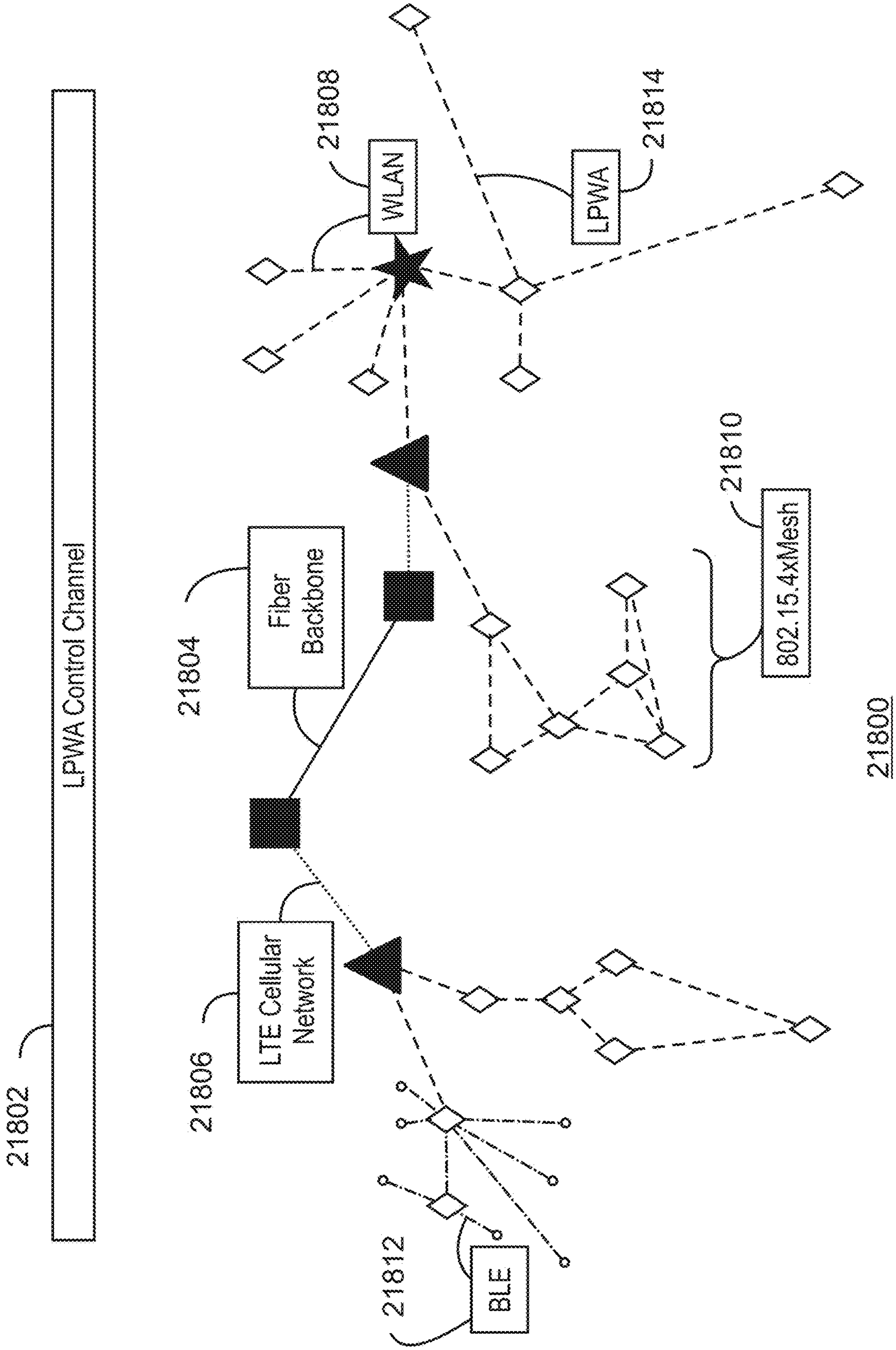

FIG. 218 is a schematic diagram of a wireless wide area network (WWAN) where a control channel may be used across each connection in accordance with some embodiments.

Figure 219:
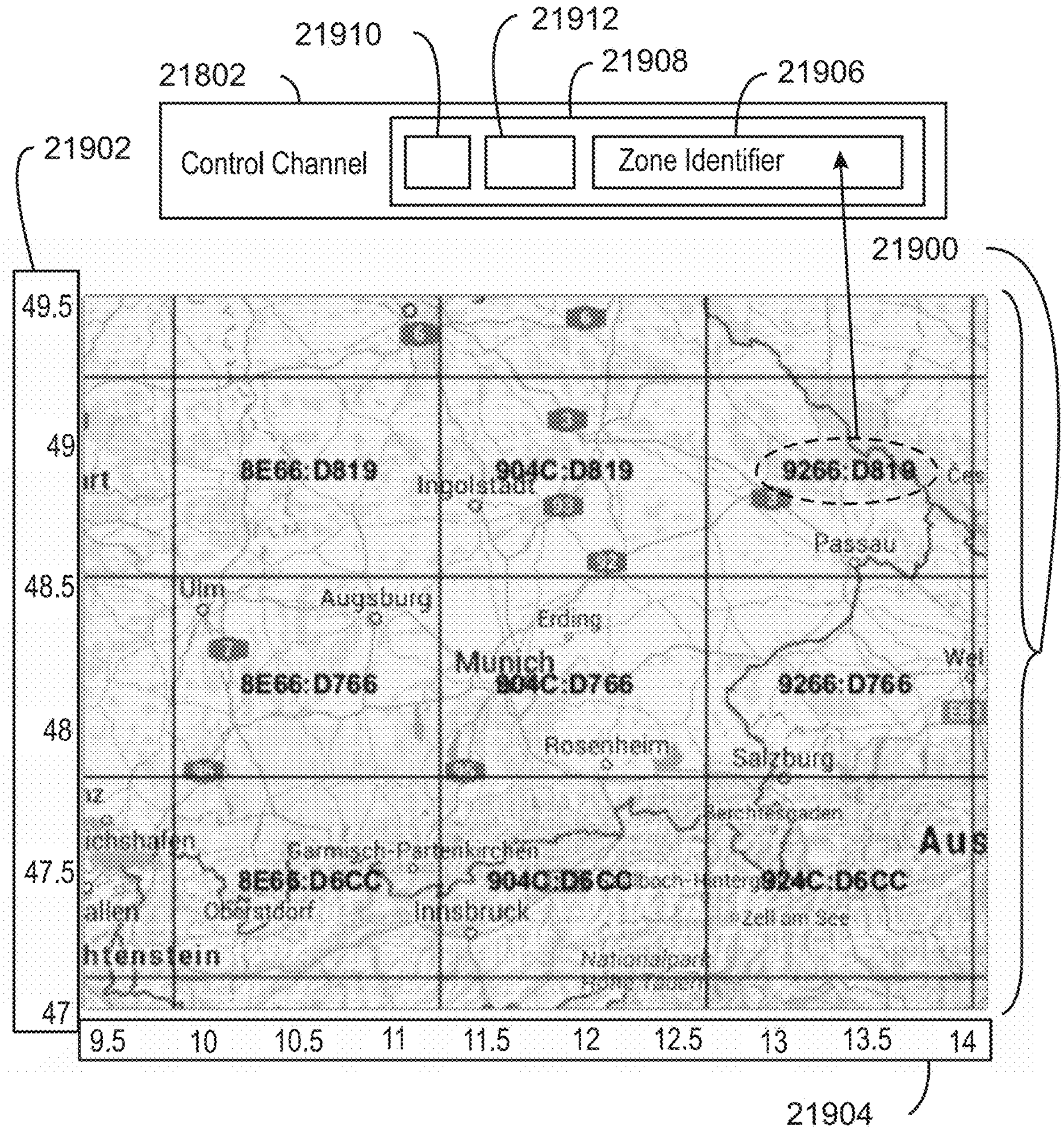

FIG. 219 is a schematic diagram of a map of a physical area broken into zones in accordance with some embodiments.

Figure 220:
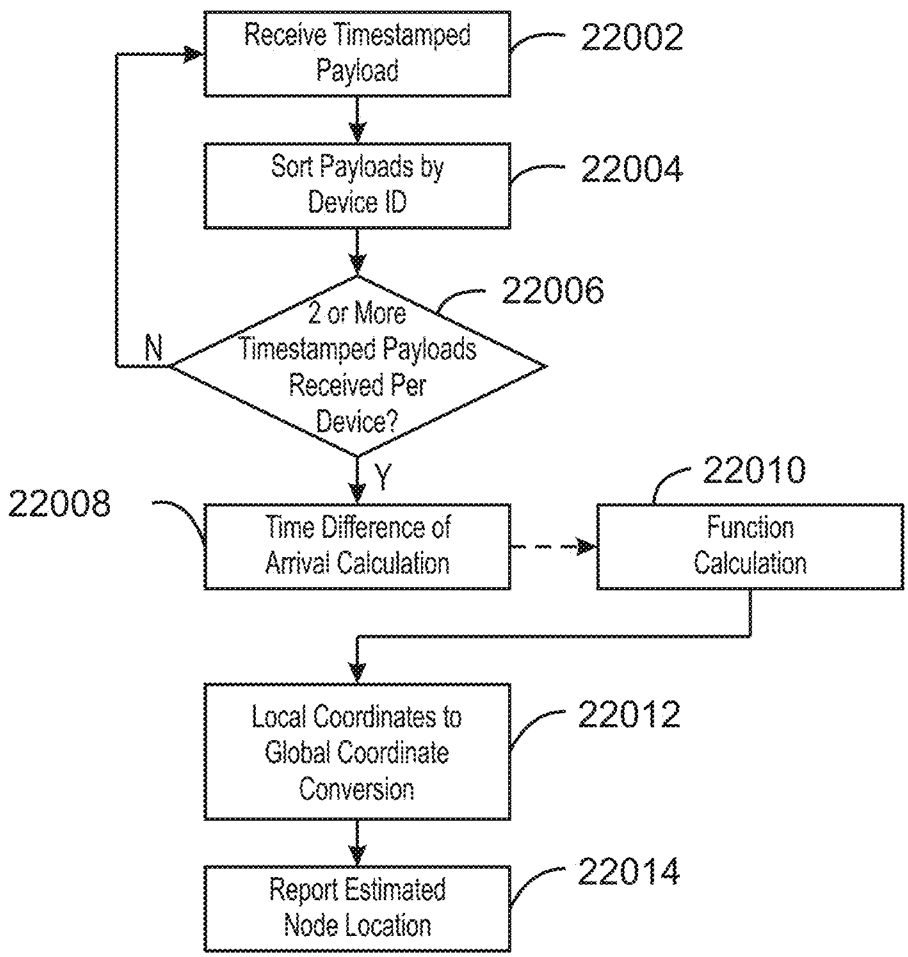

FIG. 220 shows a process flow diagram of an example method for use by an IoT device to report geolocation using time difference of arrival in accordance with some embodiments.

Figure 221:
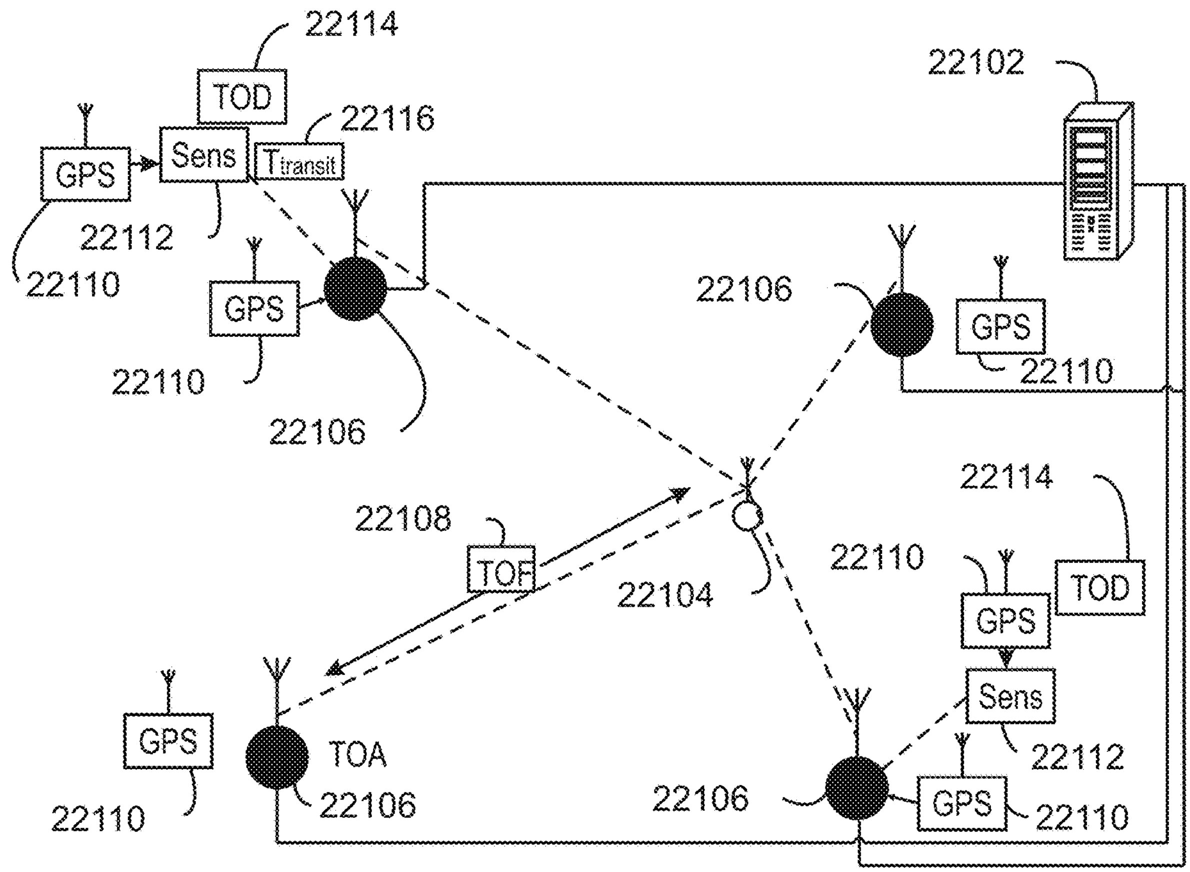

FIG. 221 is a schematic diagram of a network for determining a time difference based on time of arrival information in a heterogeneous network using, in part, zone ID in accordance with some embodiments.

Figure 222:
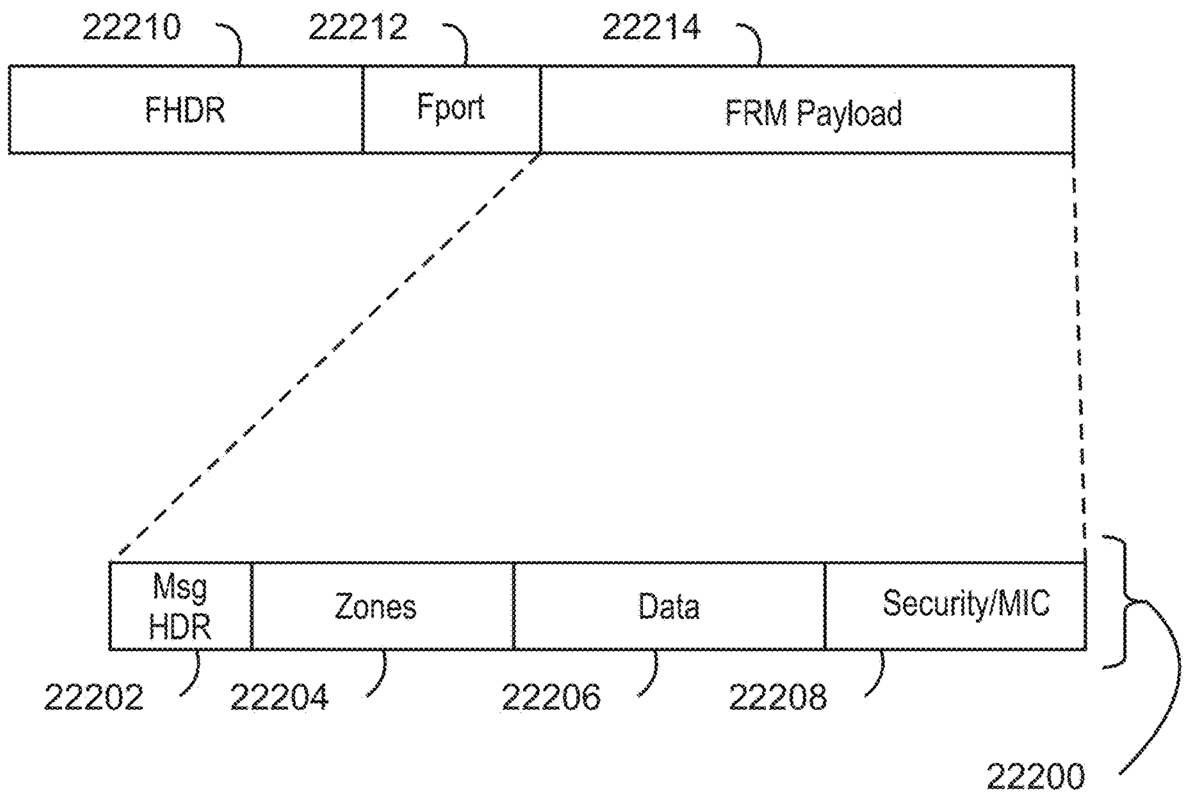

FIG. 222 is a schematic diagram of an example control channel frame structure packed in an example low power wide area network frame (LPWAN) in accordance with some embodiments.

Figure 223:
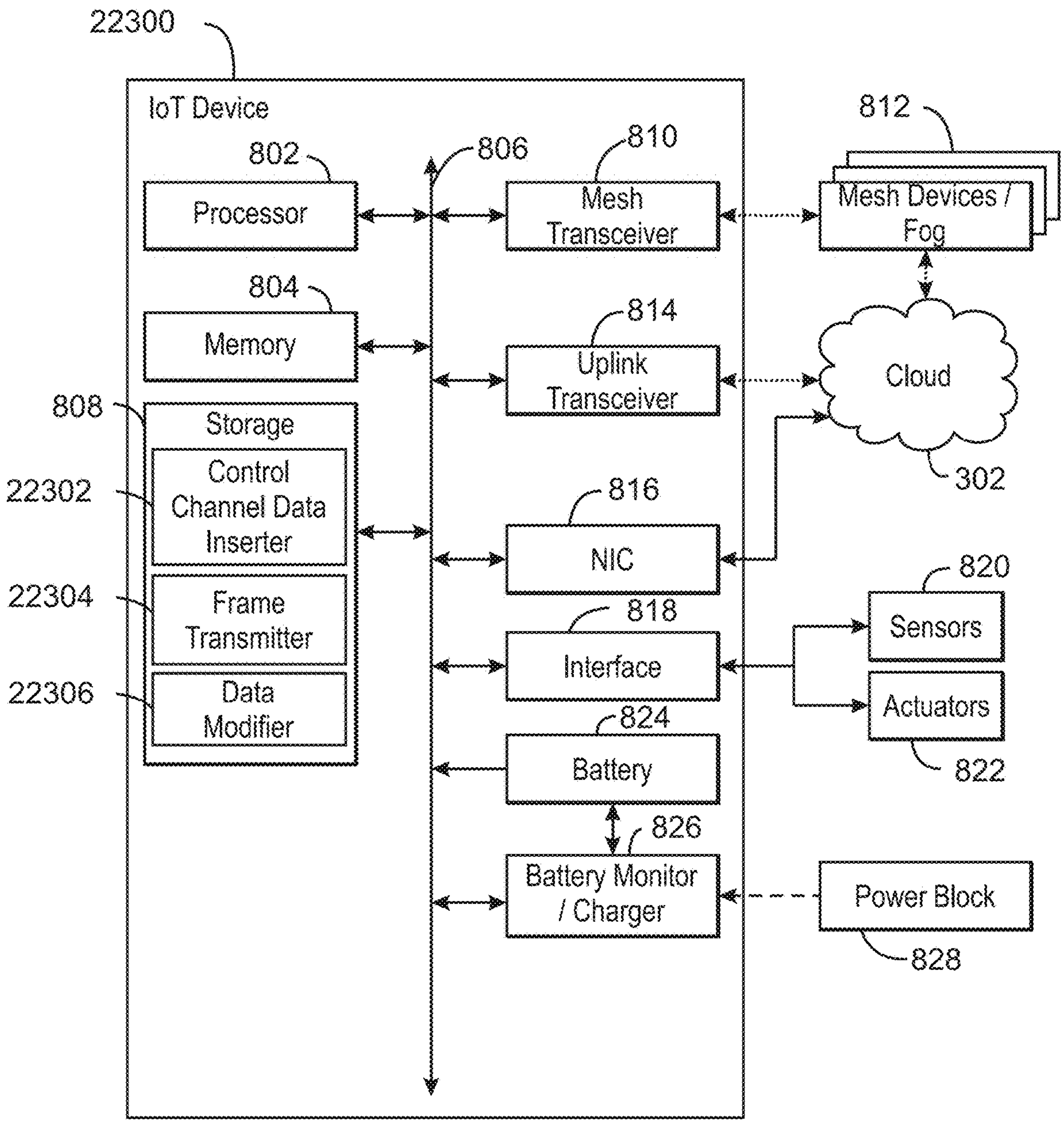

FIG. 223 is a block diagram of an example of components that may be present in an IoT device for discovery of resources and geolocation sector identification in accordance with some embodiments.

Figure 224:
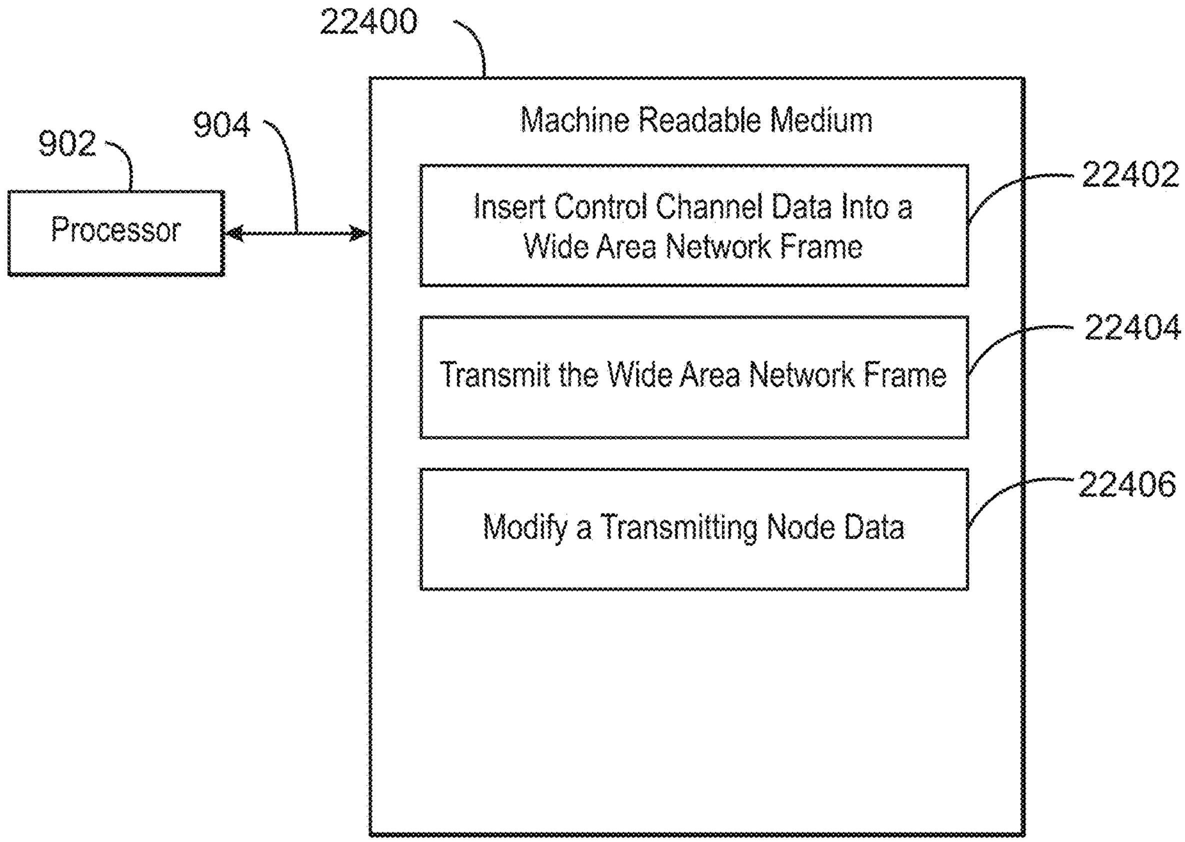

FIG. 224 is a block diagram of a non-transitory, machine readable medium including code to report health of a network and network devices in accordance with some embodiments.

Figure 225:
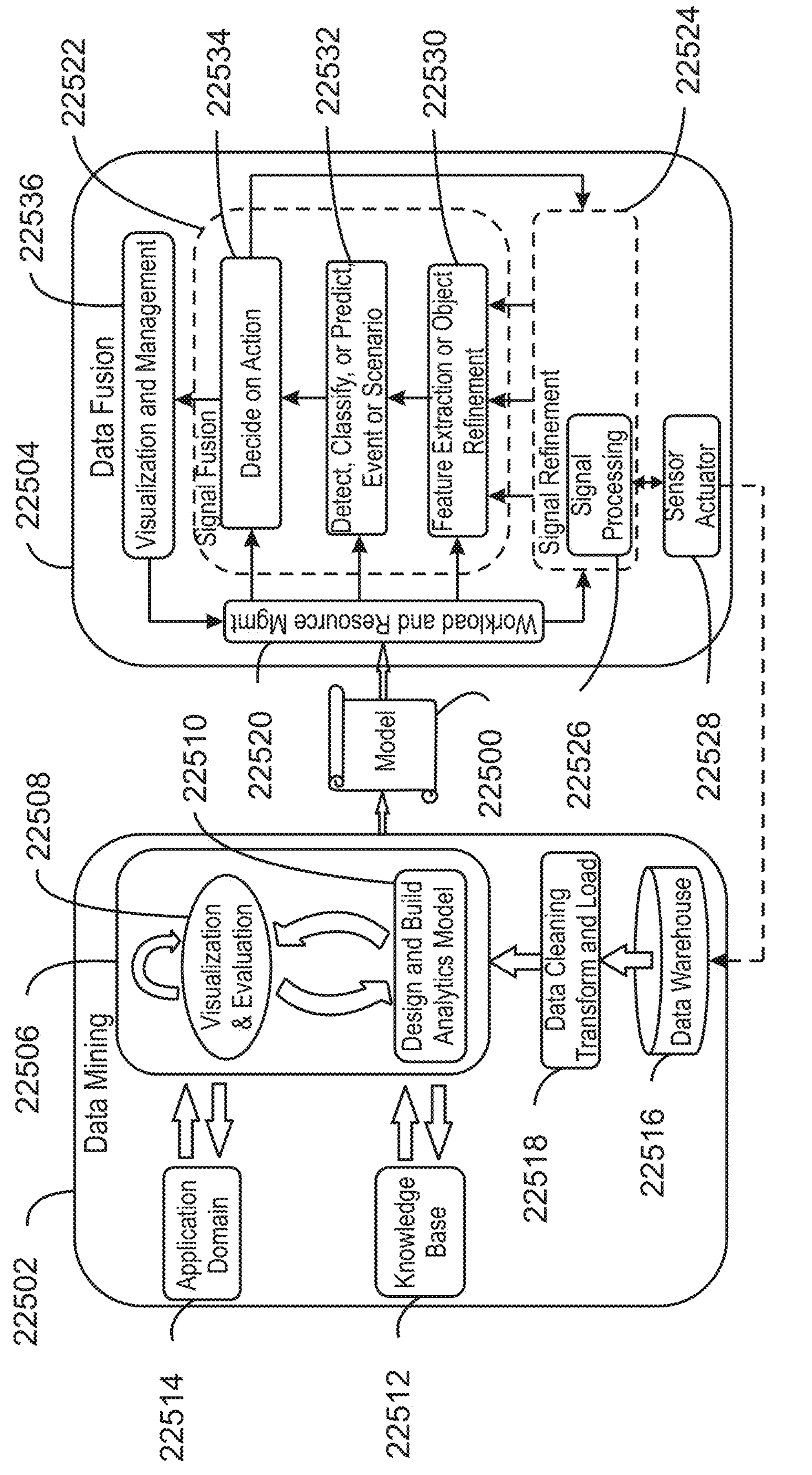

FIG. 225 is a schematic diagram of a conceptual model of data analytics in accordance with some embodiments.

Figure 226:
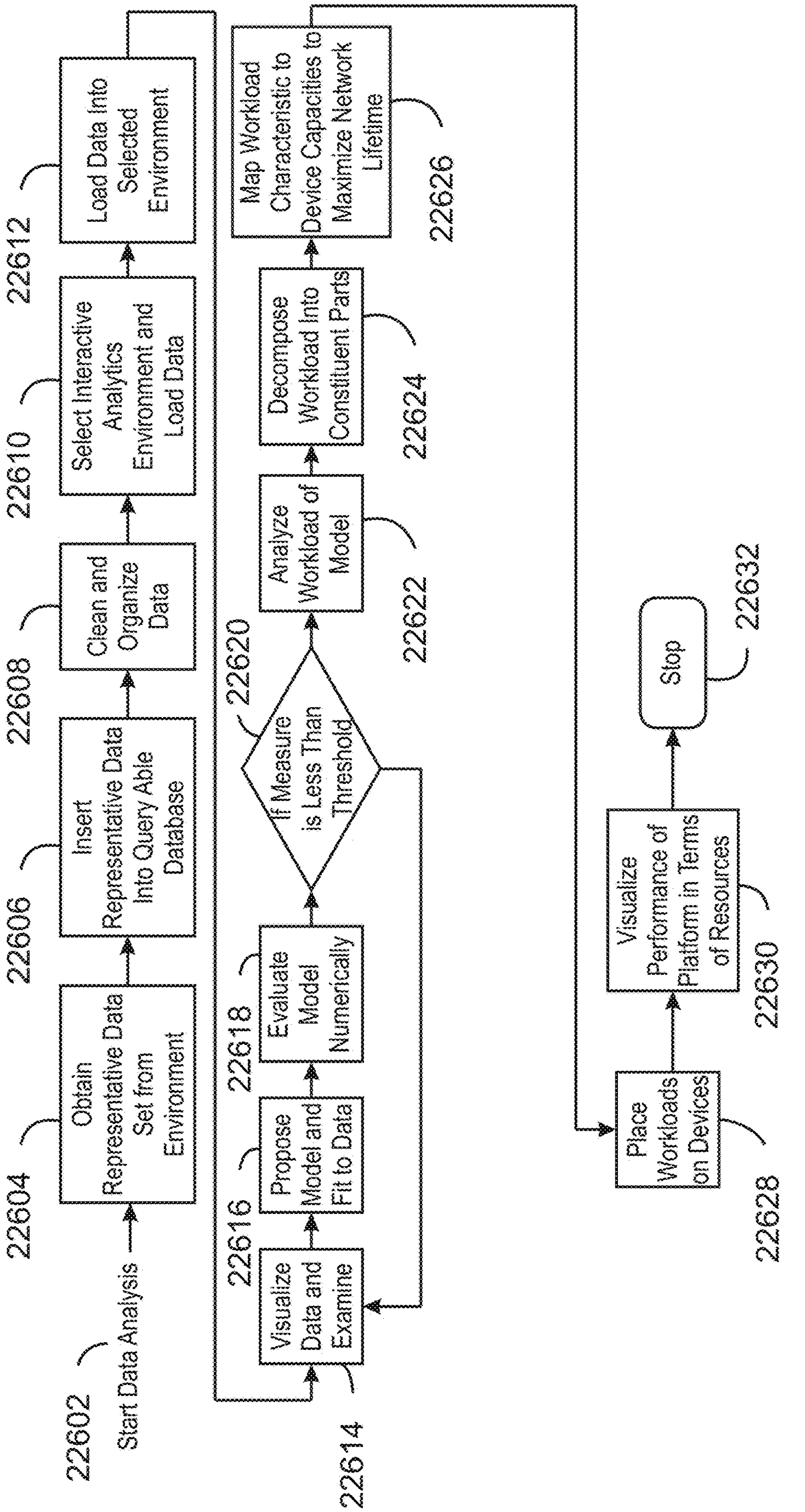

FIG. 226 shows a process flow diagram of an example method for use by an IoT device to provide data analytics of IoT systems in accordance with some embodiments.

Figure 227:
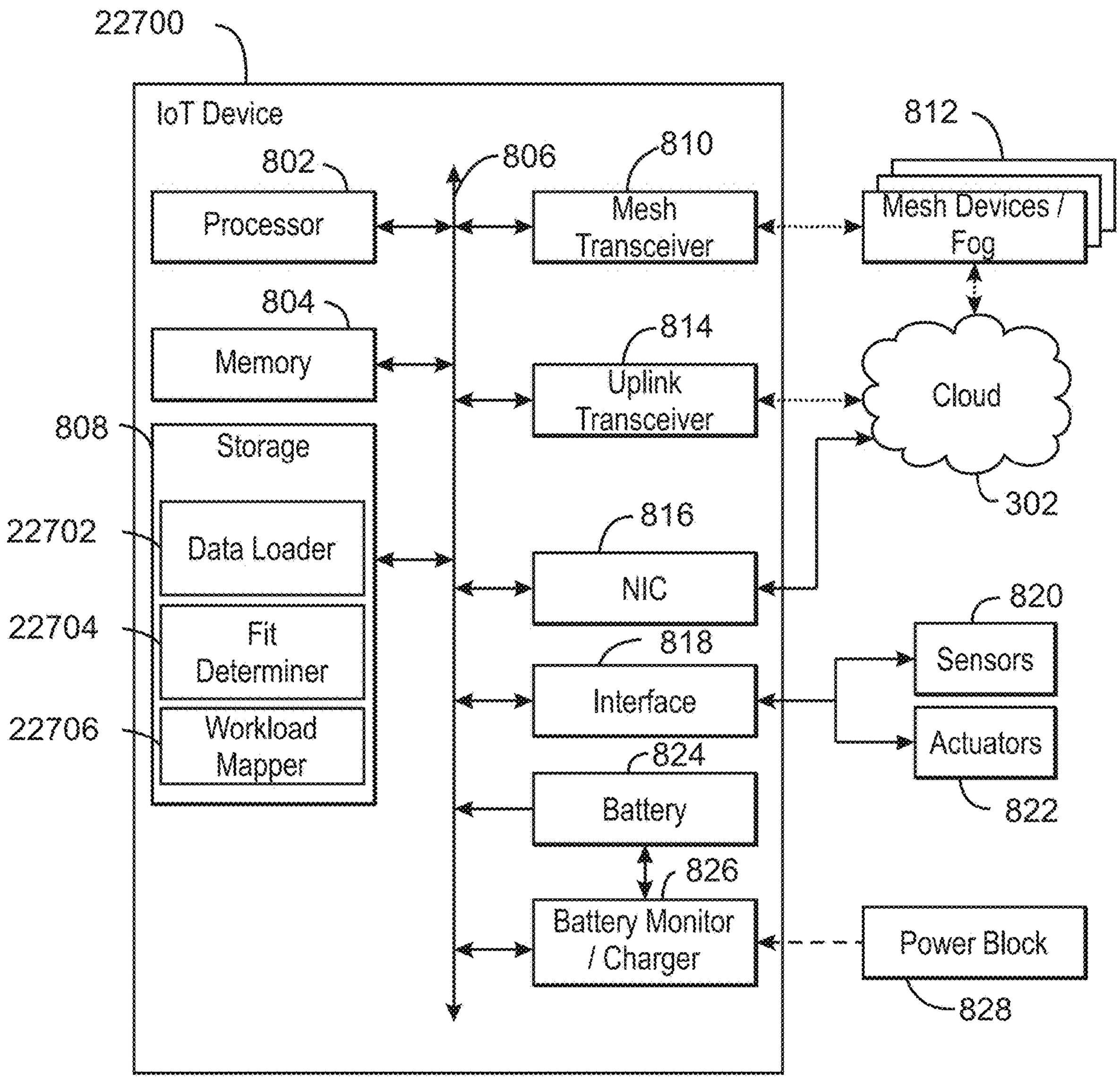

FIG. 227 is a block diagram of an example of components that may be present in an IoT device to provide data analytics of IoT systems in accordance with some embodiments.

Figure 228:
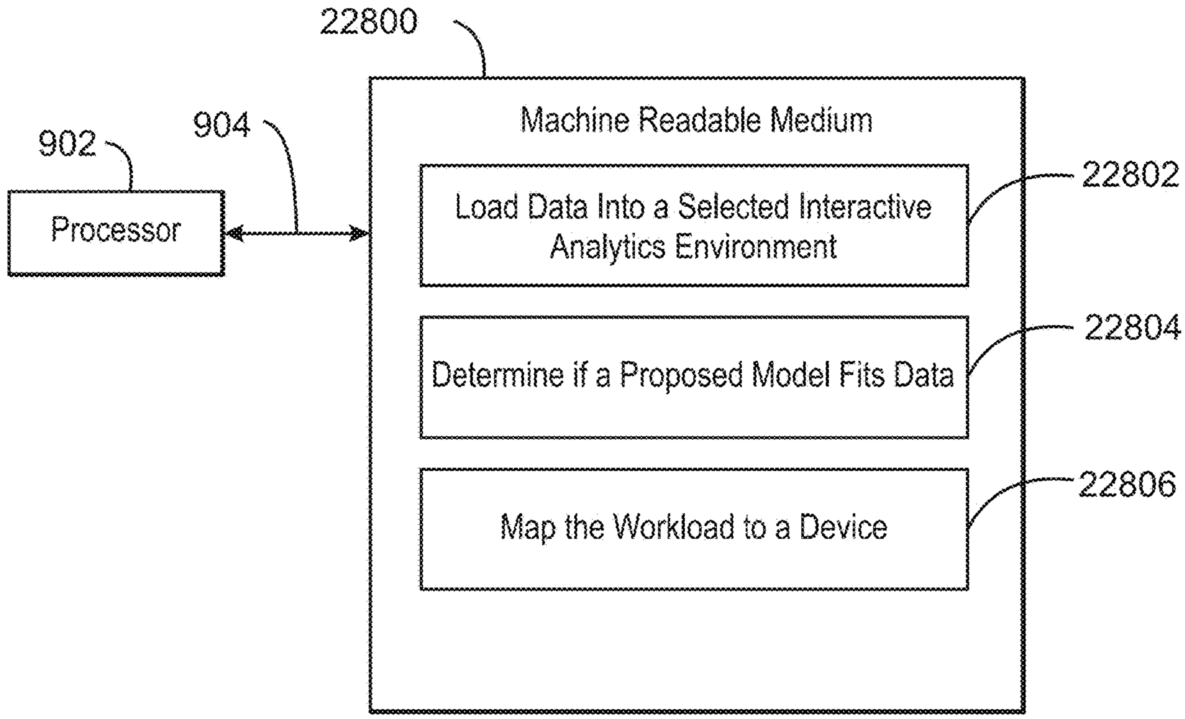

FIG. 228 is a block diagram of a non-transitory, machine readable medium including code to report health of a network and network devices.

Figure 229:
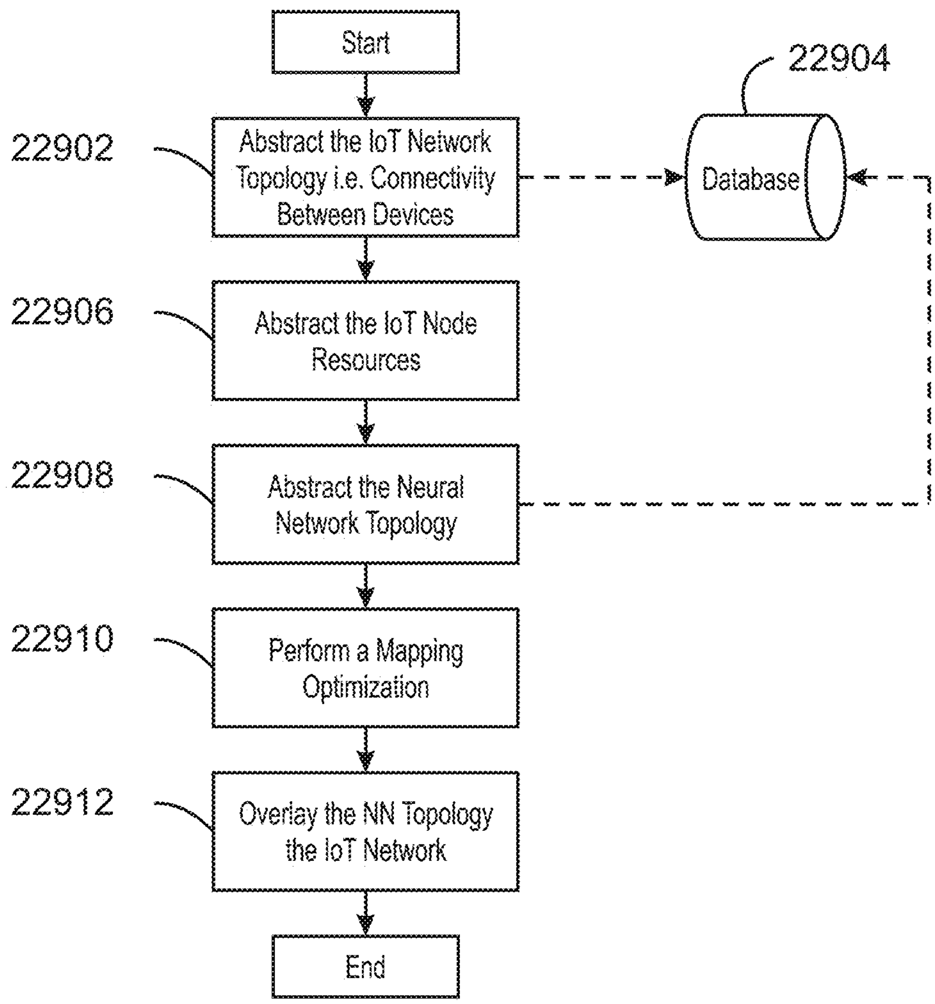

FIG. 229 shows a process flow diagram of an example method for use by an IoT device in distributed neural network mapping and resource management in accordance with some embodiments.

Figure 230:
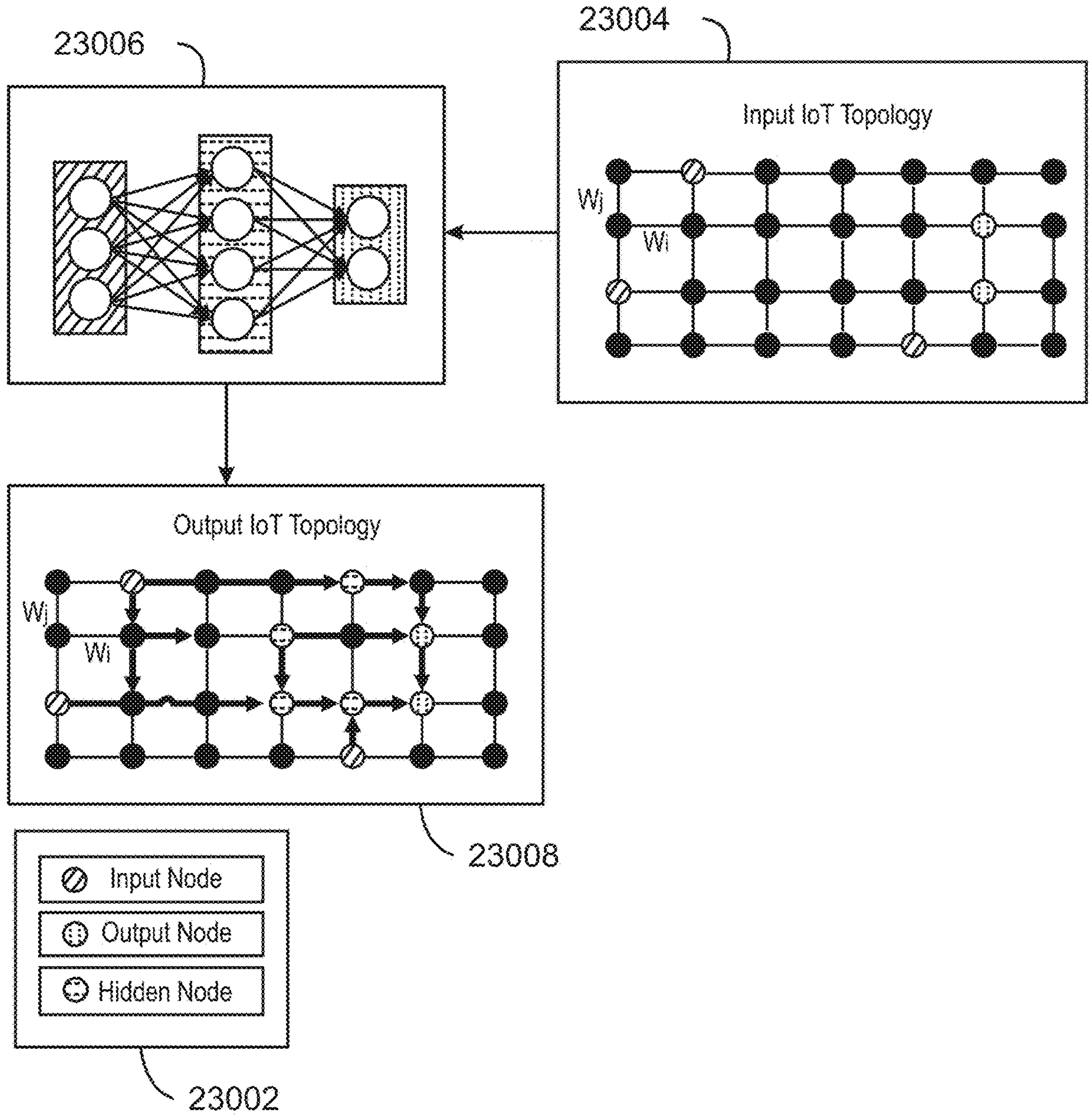

FIG. 230 is a schematic diagram for a distributed neural network mapping for resource management in accordance with some embodiments.

Figure 231:
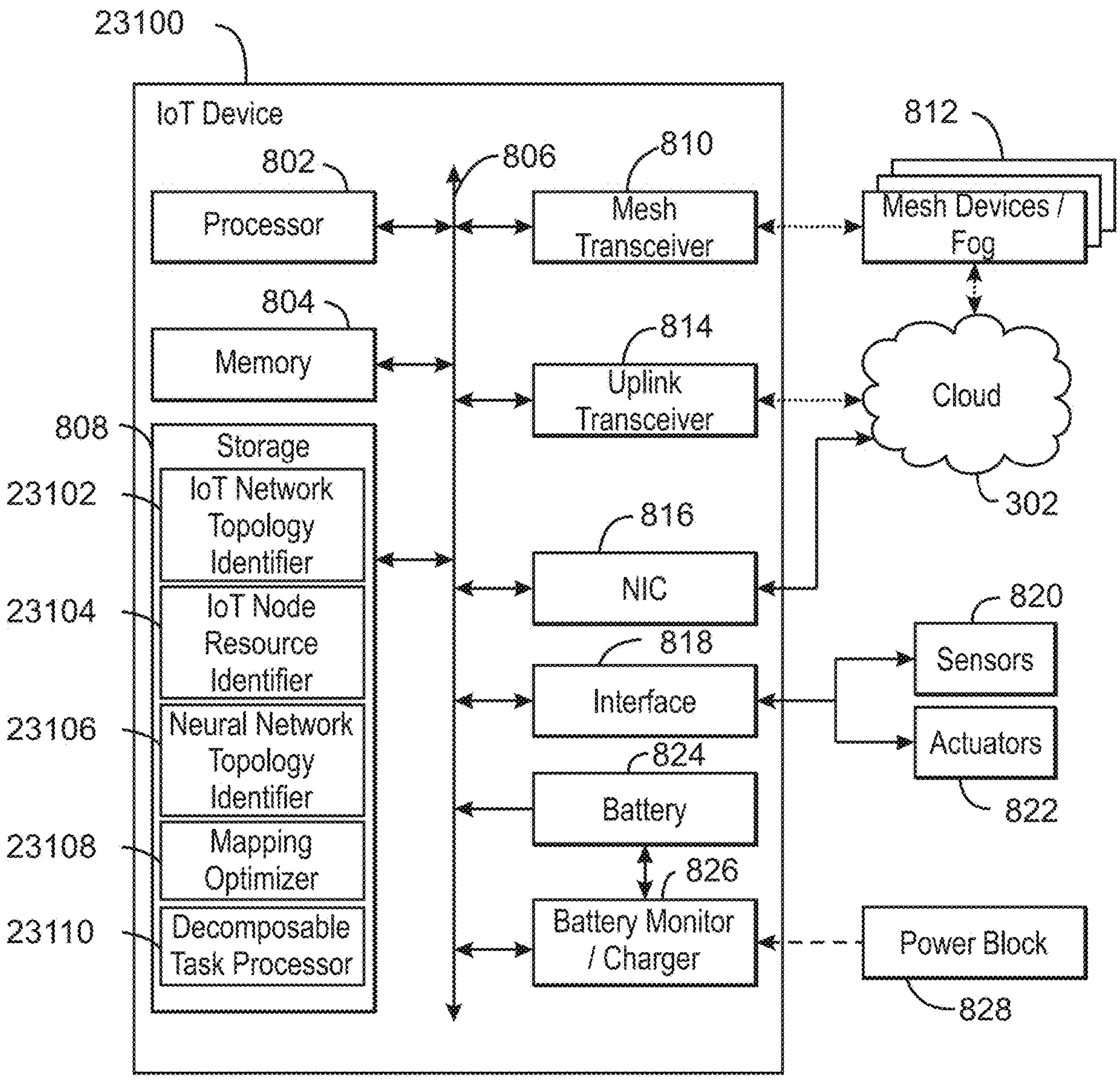

FIG. 231 is a block diagram of an example of components that may be present in an IoT device for distributed neural network mapping and resource management in accordance with some embodiments.

Figure 232:
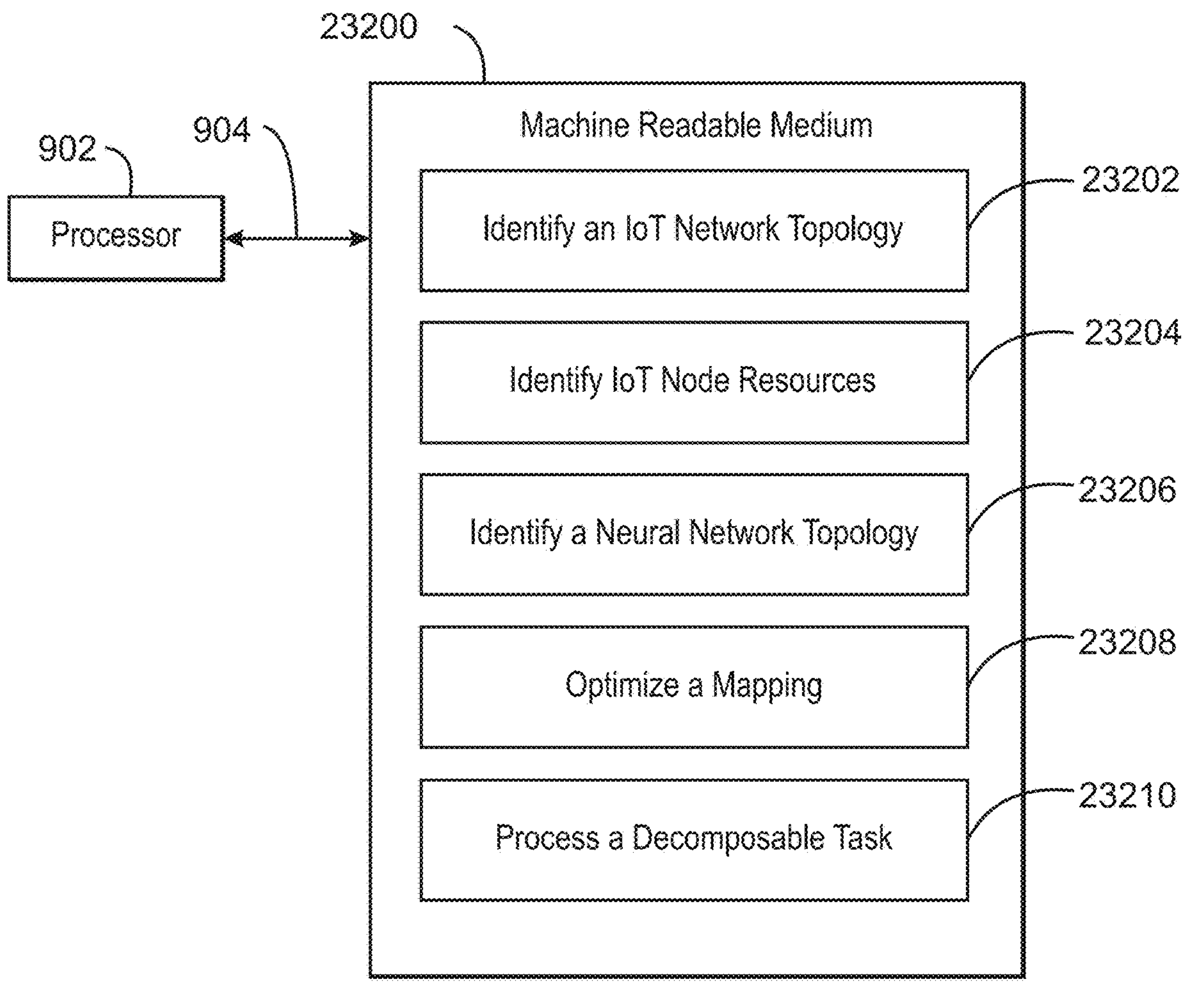

FIG. 232 is a block diagram of a non-transitory, machine readable medium including code to report health of a network and network devices in accordance with some embodiments.

Figure 233:
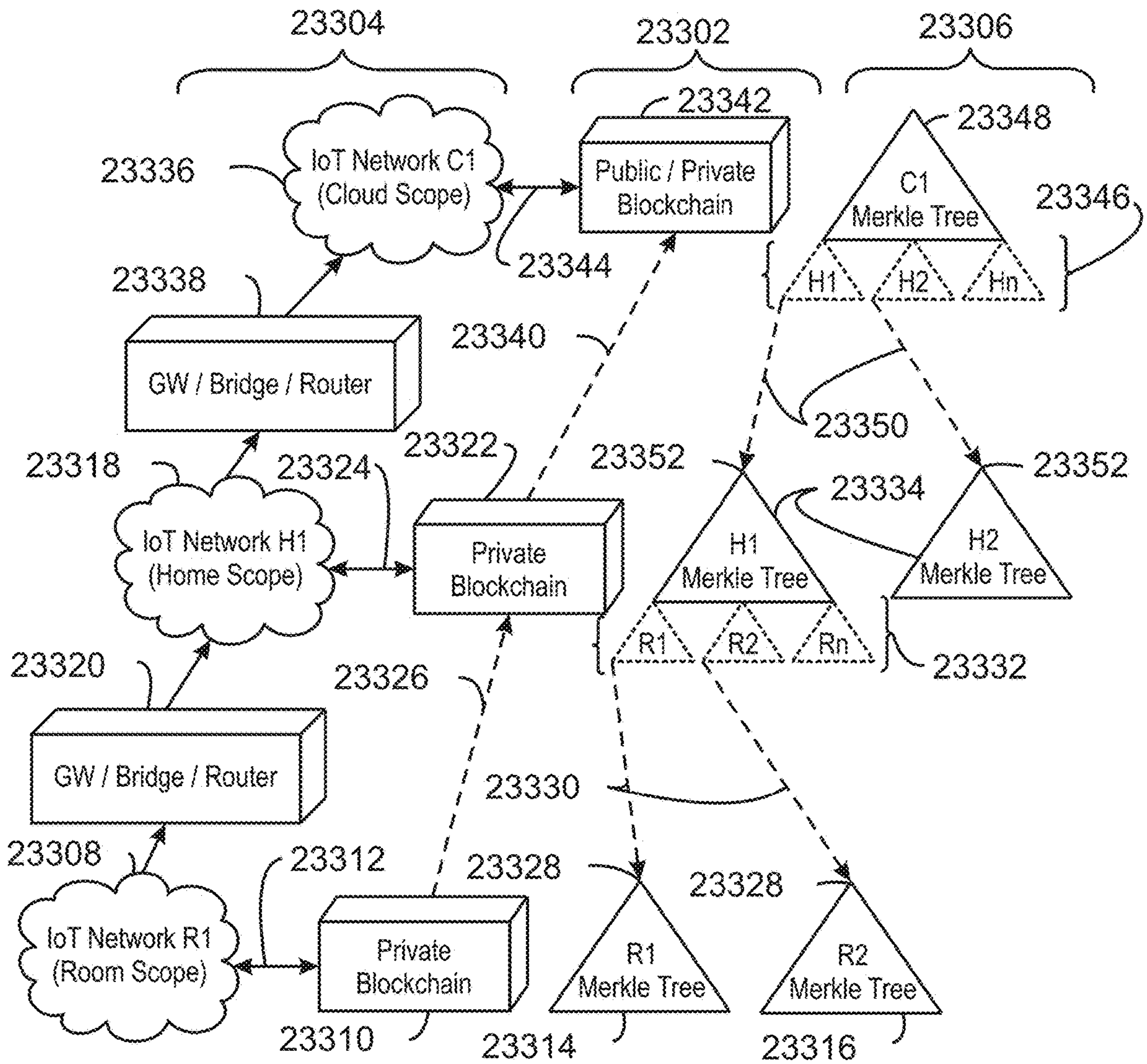

FIG. 233 is a schematic diagram of a hierarchy of blockchains associated with levels in a network hierarchy in accordance with some embodiments.

Figure 234:
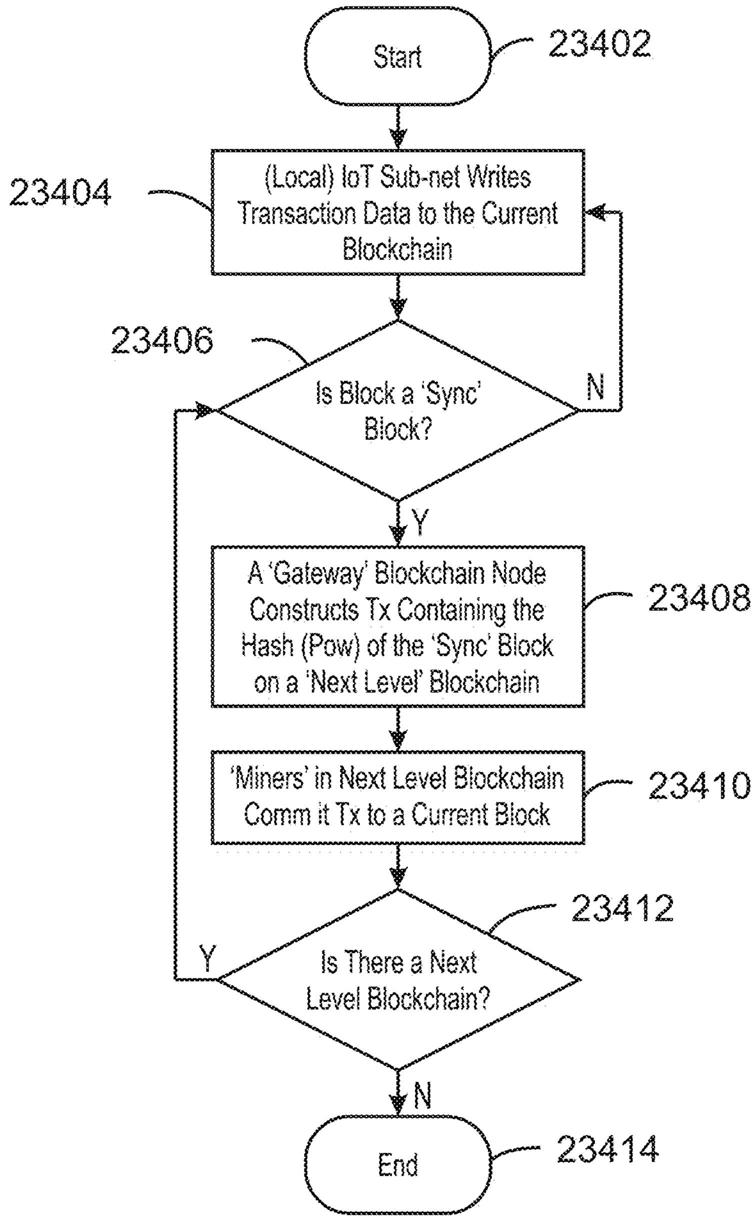

FIG. 234 is a process flow diagram of an example method for constructing a blockchain hierarchy in accordance with some embodiments.

Figure 235:
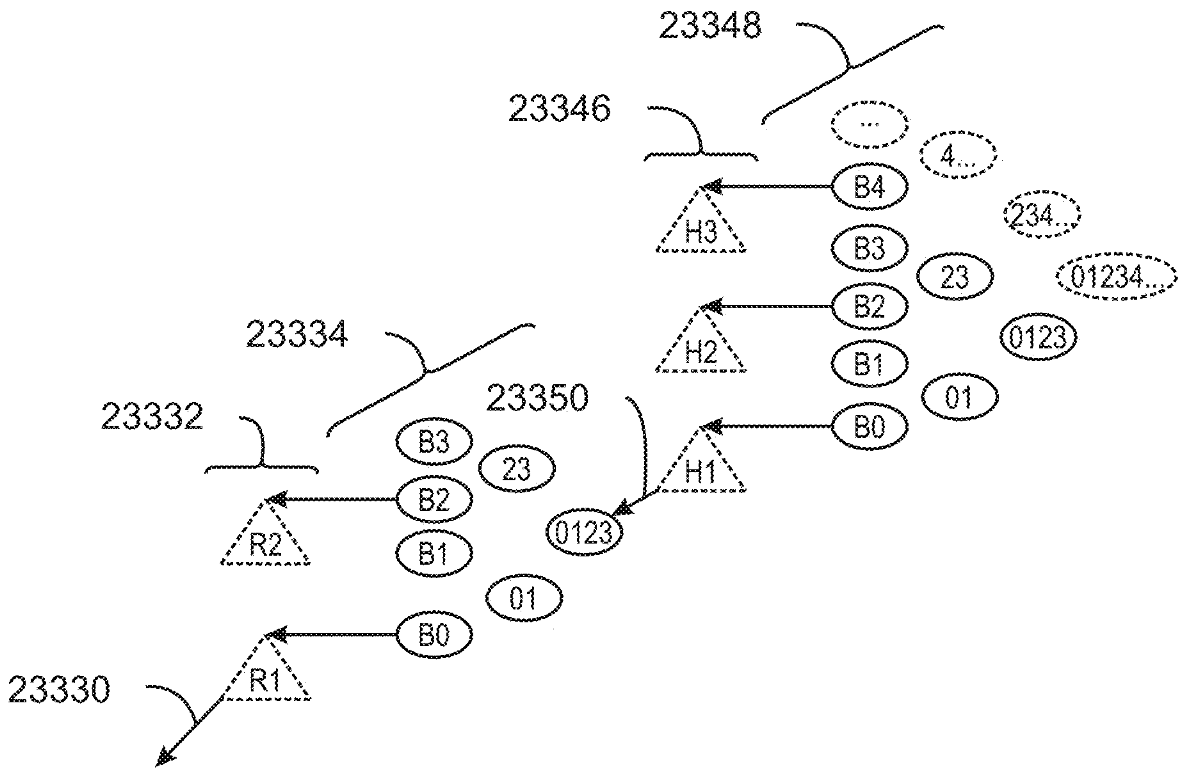

FIG. 235 is expanded view of the Merkle trees described with respect to FIG. 233 in accordance with some embodiments.

Figure 236:
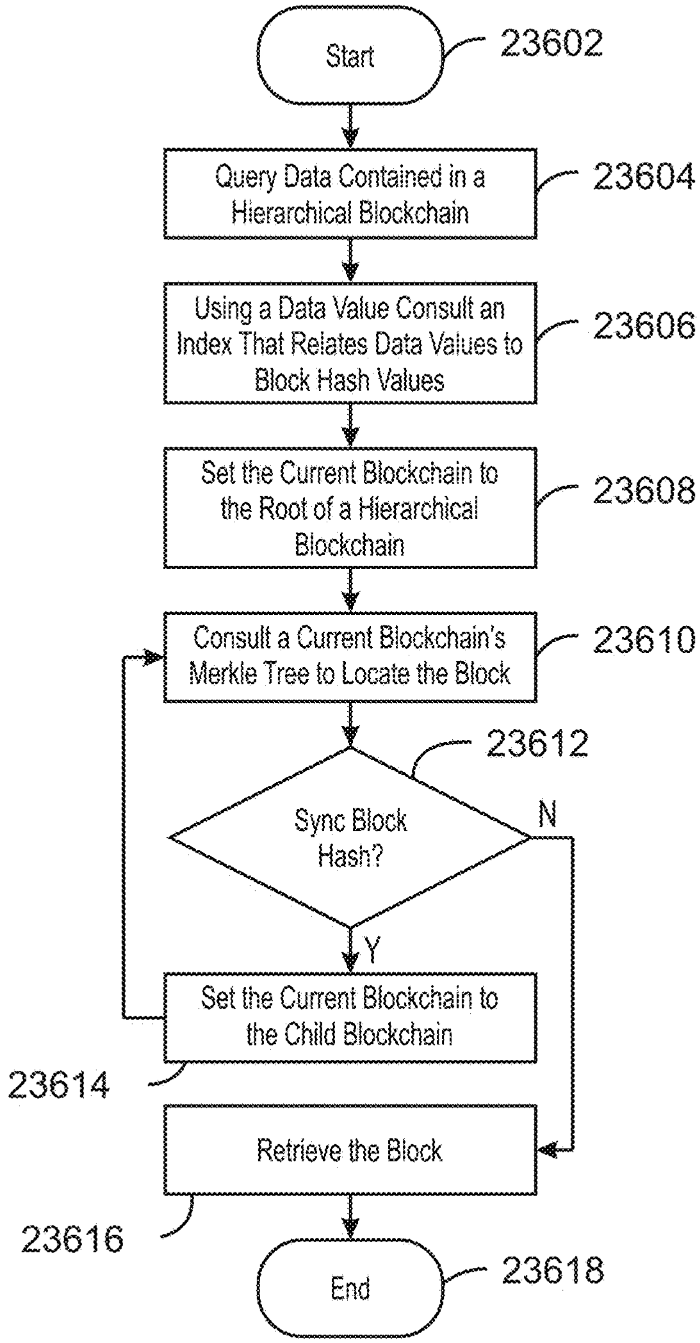

FIG. 236 is a process flow diagram of an example method for searching a blockchain hierarchy using Merkle tree indexes in accordance with some embodiments.

Figure 237:
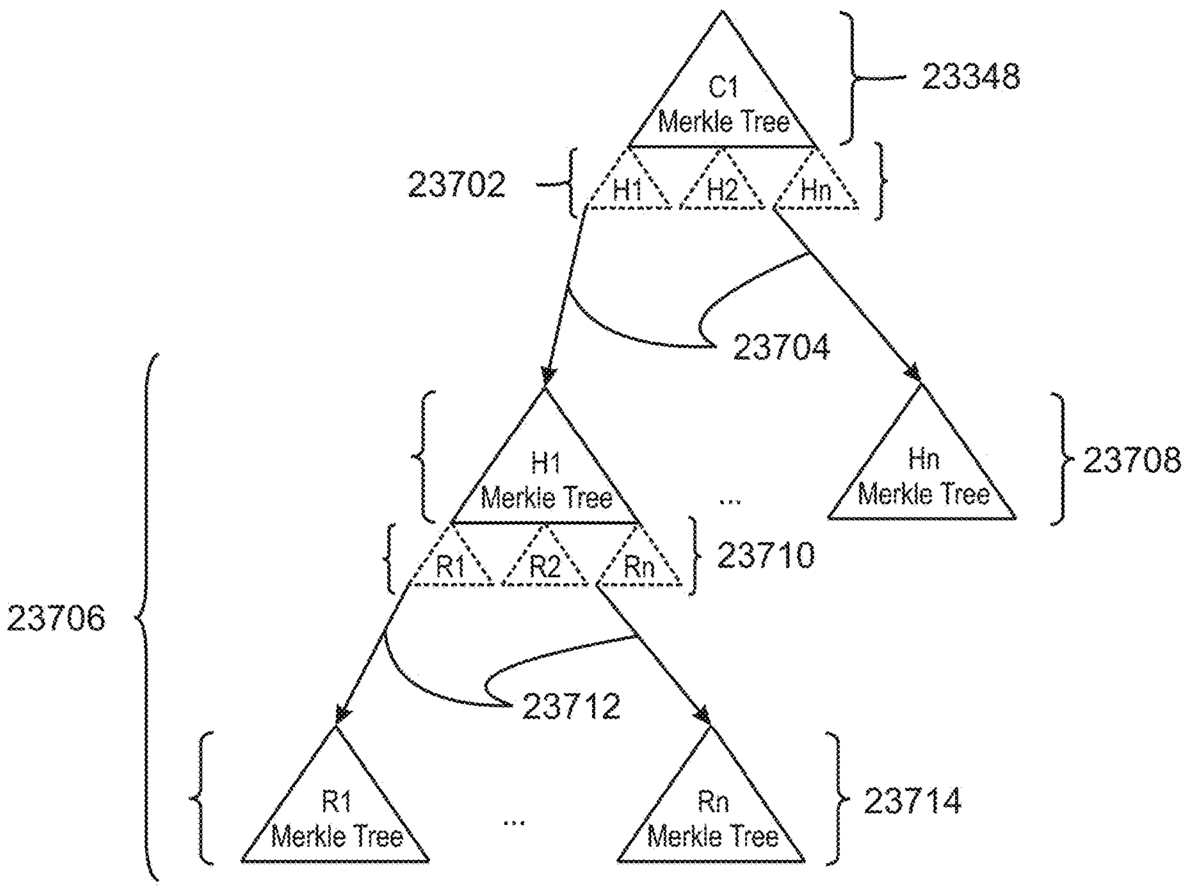

FIG. 237 is a schematic diagram of a cached Merkle tree stored in a cloud server in accordance with some embodiments.

Figure 238:
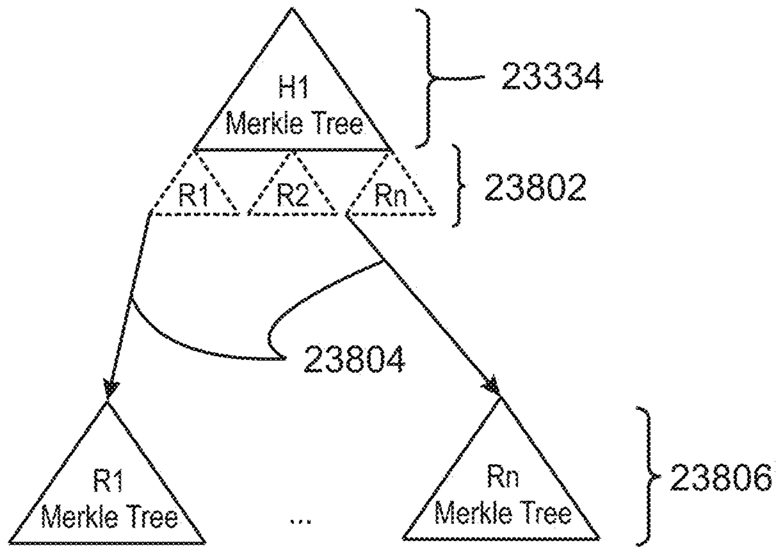

FIG. 238 shows a schematic diagram of a distributed Merkle tree cache at the IoT network level H1, as described with respect to FIG. 233, in accordance with some embodiments.

Figure 239:
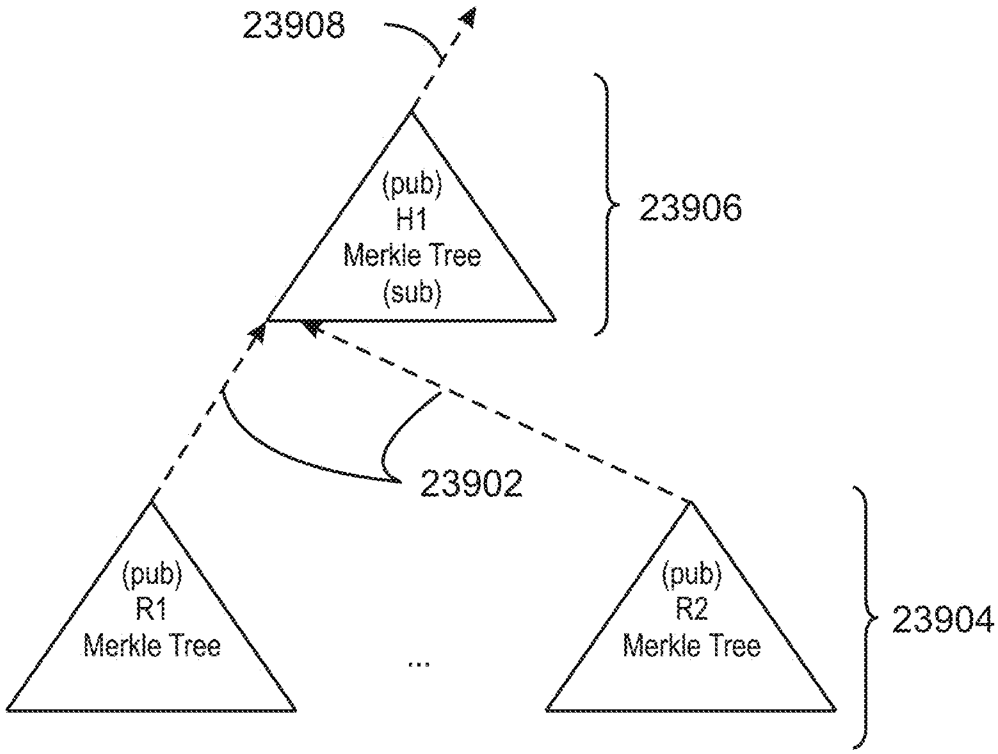

FIG. 239 is a schematic diagram of a technique for maintaining a distributed cache with coherency in accordance with some embodiments.

Figure 240:
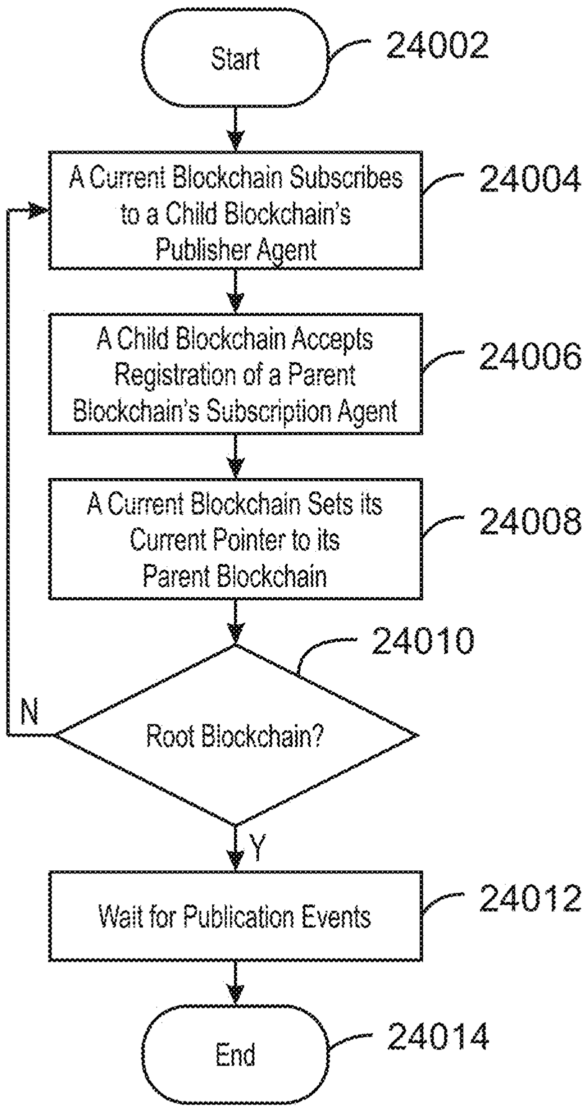

FIG. 240 is a process flow diagram of an example method to construct a coherent cache for a hierarchy of blockchains in accordance with some embodiments.

Figure 241:
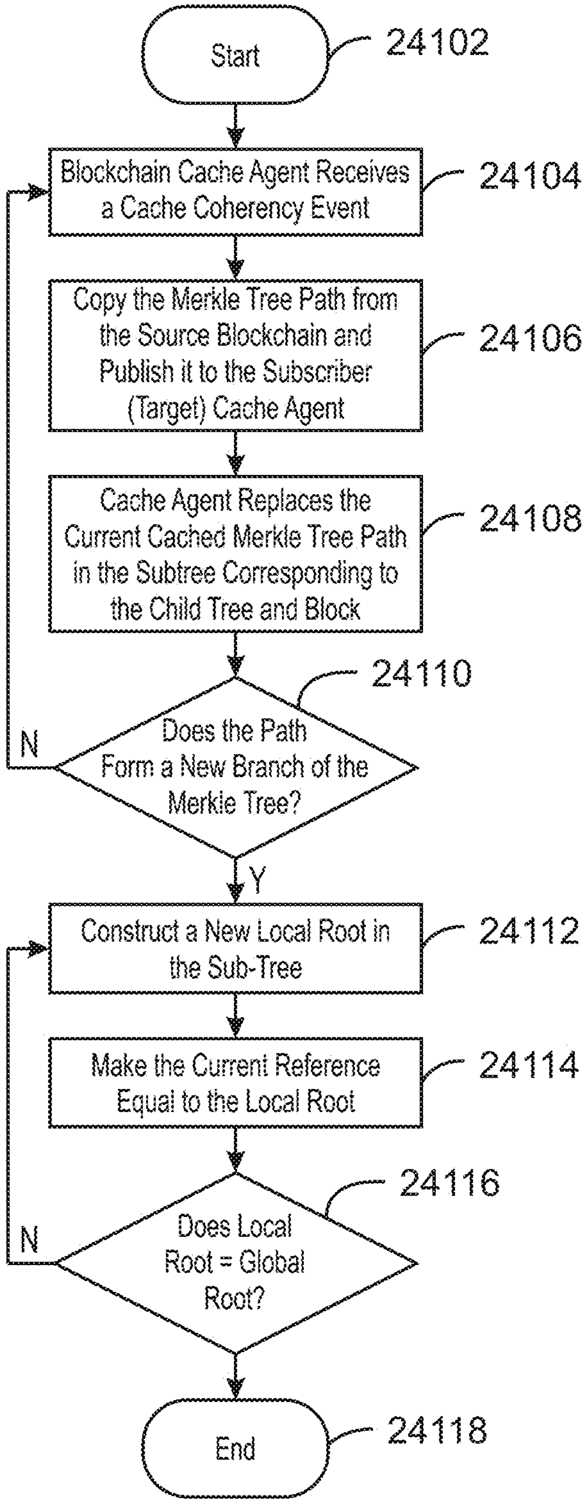

FIG. 241 is a process flow diagram of an example method to maintain a coherent cache for a hierarchy of blockchains in accordance with some embodiments.

Figure 242:
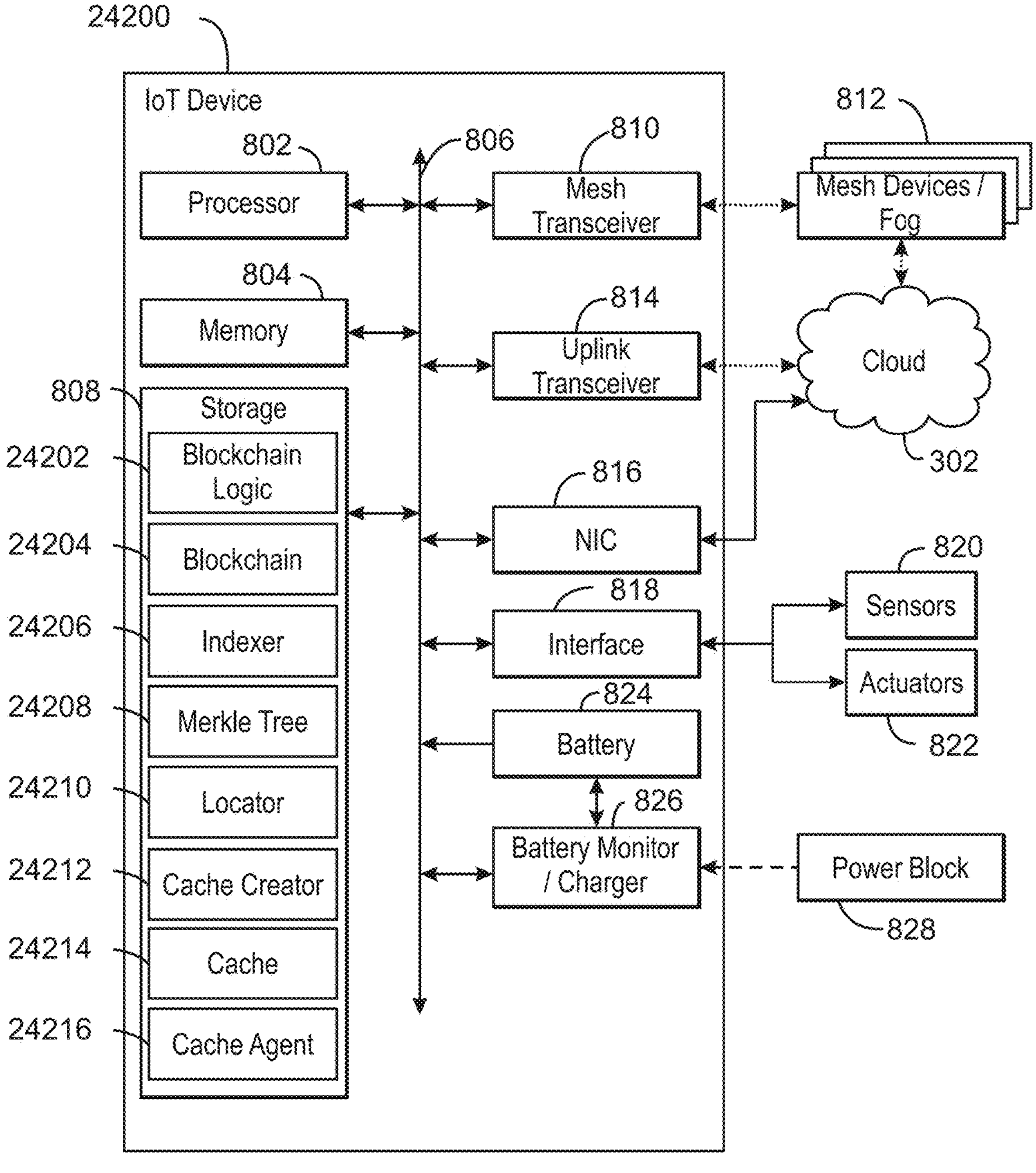

FIG. 242 is a block diagram of an example of components that may be present in an IoT device for implementing hierarchical blockchains with associated indexes in accordance with some embodiments.

Figure 243:
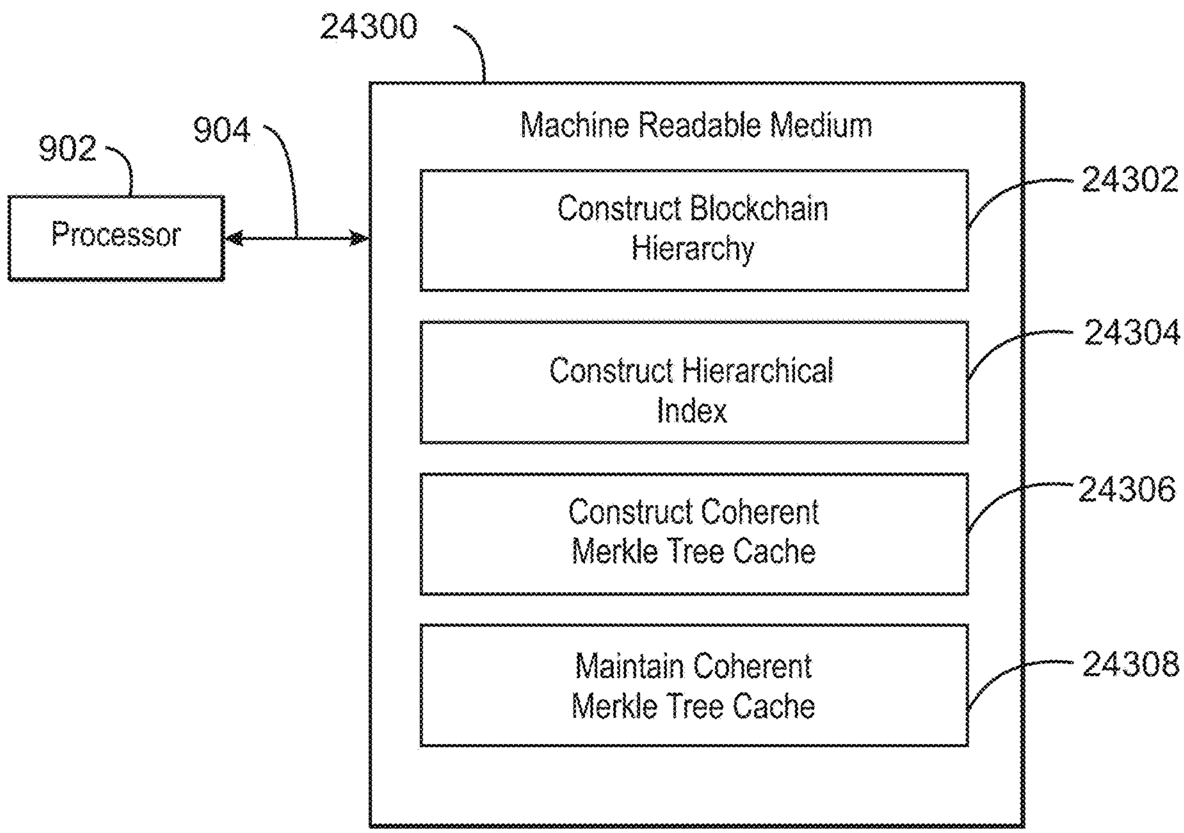

FIG. 243 is a block diagram of a non-transitory, machine readable medium including code to direct a processor to manage keys for secure communications in accordance with some embodiments.

Figure 244:
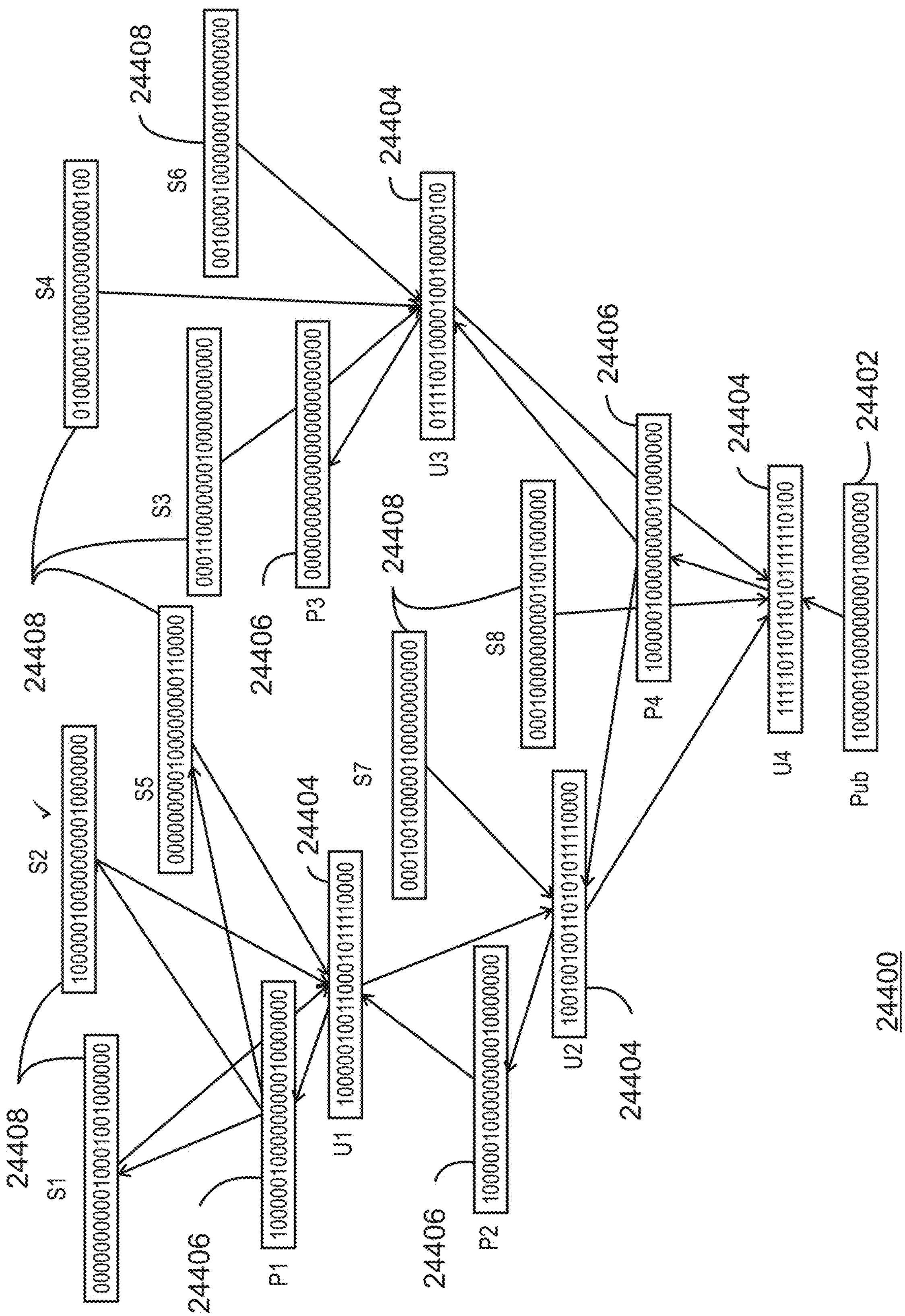

FIG. 244 is a schematic diagram of using Pub-Sub routing based on bloom filters in accordance with some embodiments.

Figure 245:
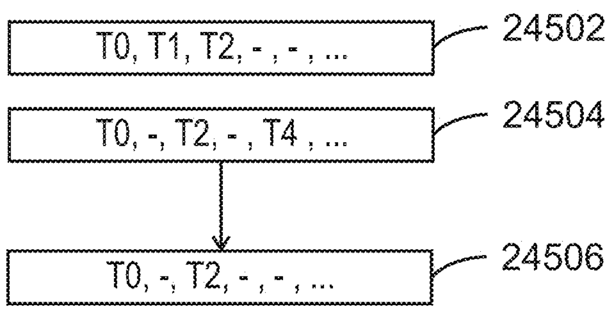

FIG. 245 is a schematic diagram of using a whitelist bloom filter for allowing the distribution of content in accordance with some embodiments.

Figure 246:
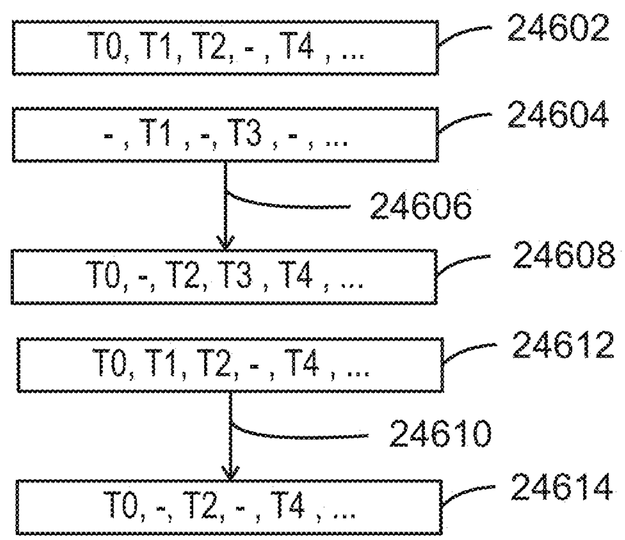

FIG. 246 is a schematic diagram of using a blacklist bloom filter for preventing the distribution of content in accordance with some embodiments.

Figure 247:
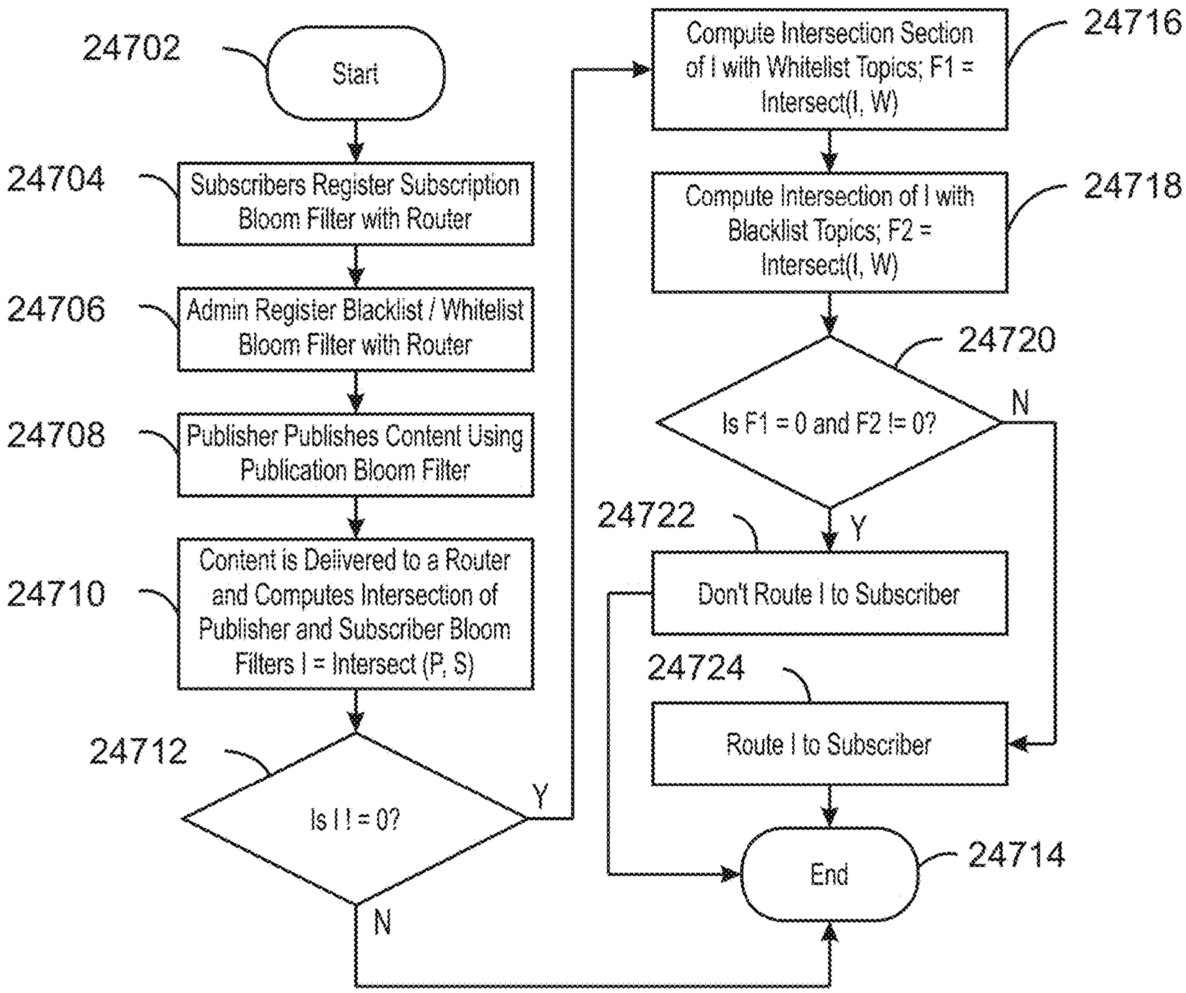

FIG. 247 is a process flow diagram of an example method for implementing Pub-Sub with blacklist or white list bloom filters for content control in accordance with some embodiments.

Figure 248:
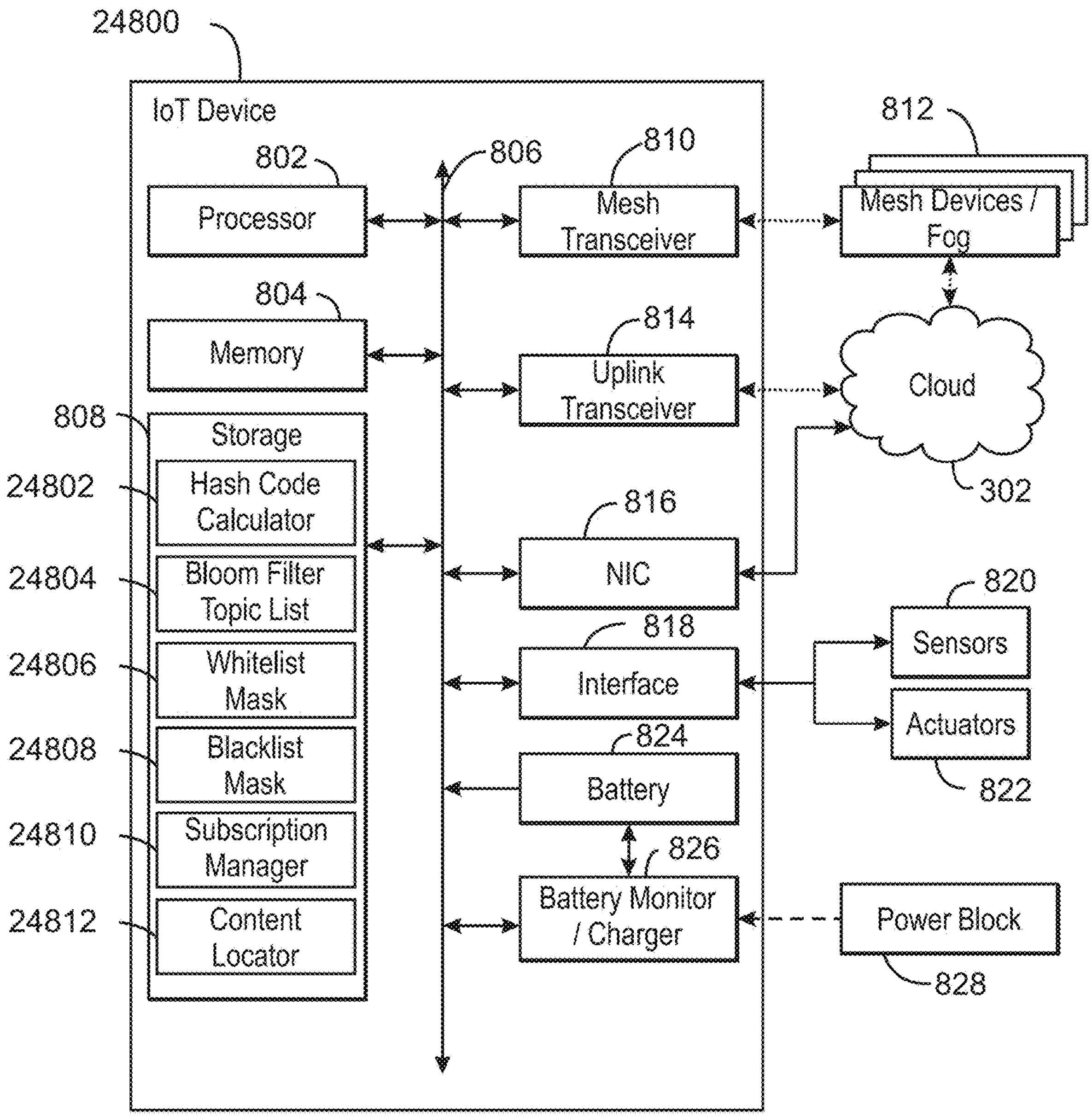

FIG. 248 is a block diagram of an example of components that may be present in an IoT device for implementing a Pub-Sub content distribution system using bloom filters in accordance with some embodiments.

Figure 249:
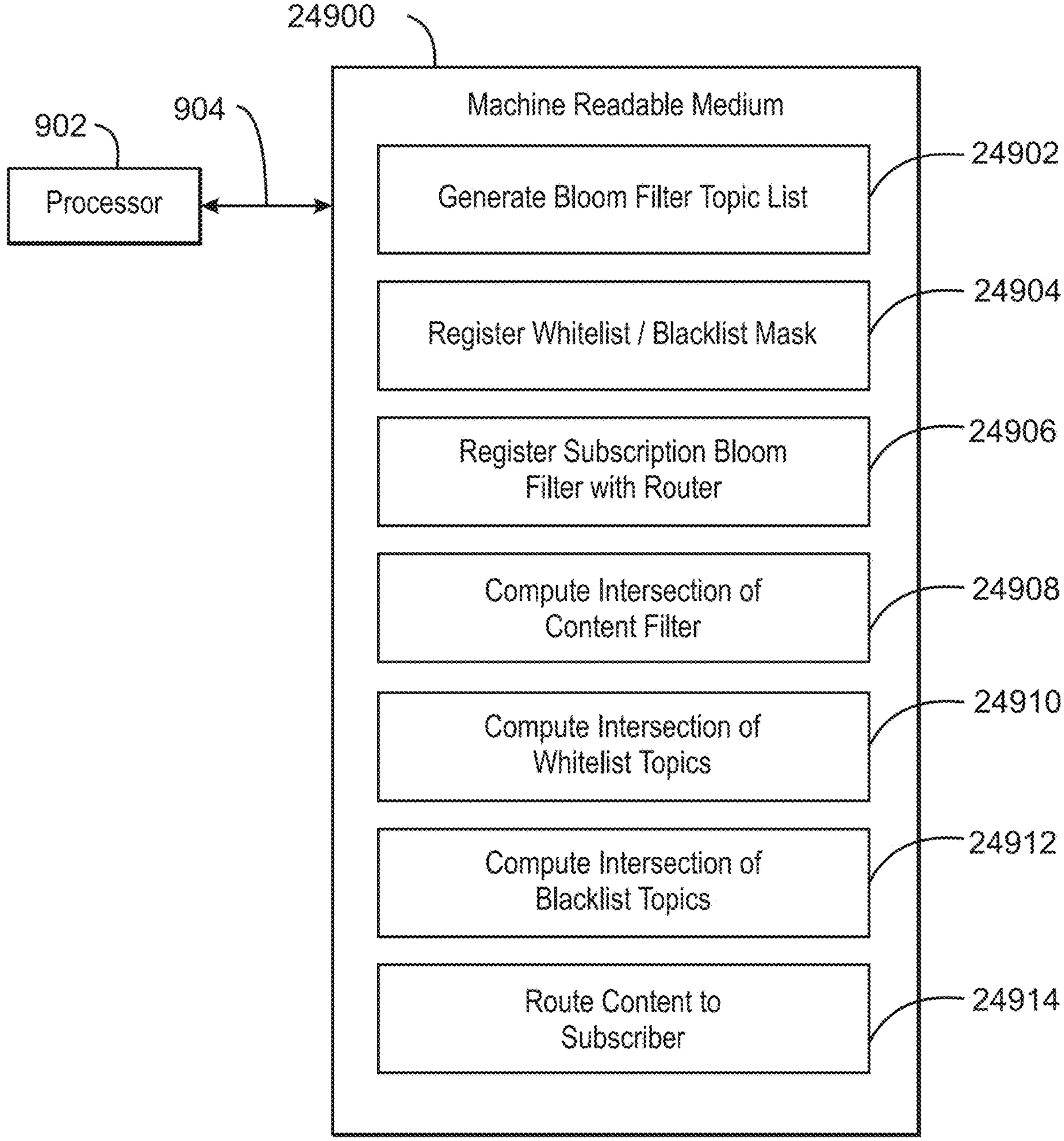

FIG. 249 is a block diagram of a non-transitory, machine readable medium including code to direct a processor to manage a Pub-Sub system using bloom filters for content distribution in accordance with some embodiments.

Figure 250:
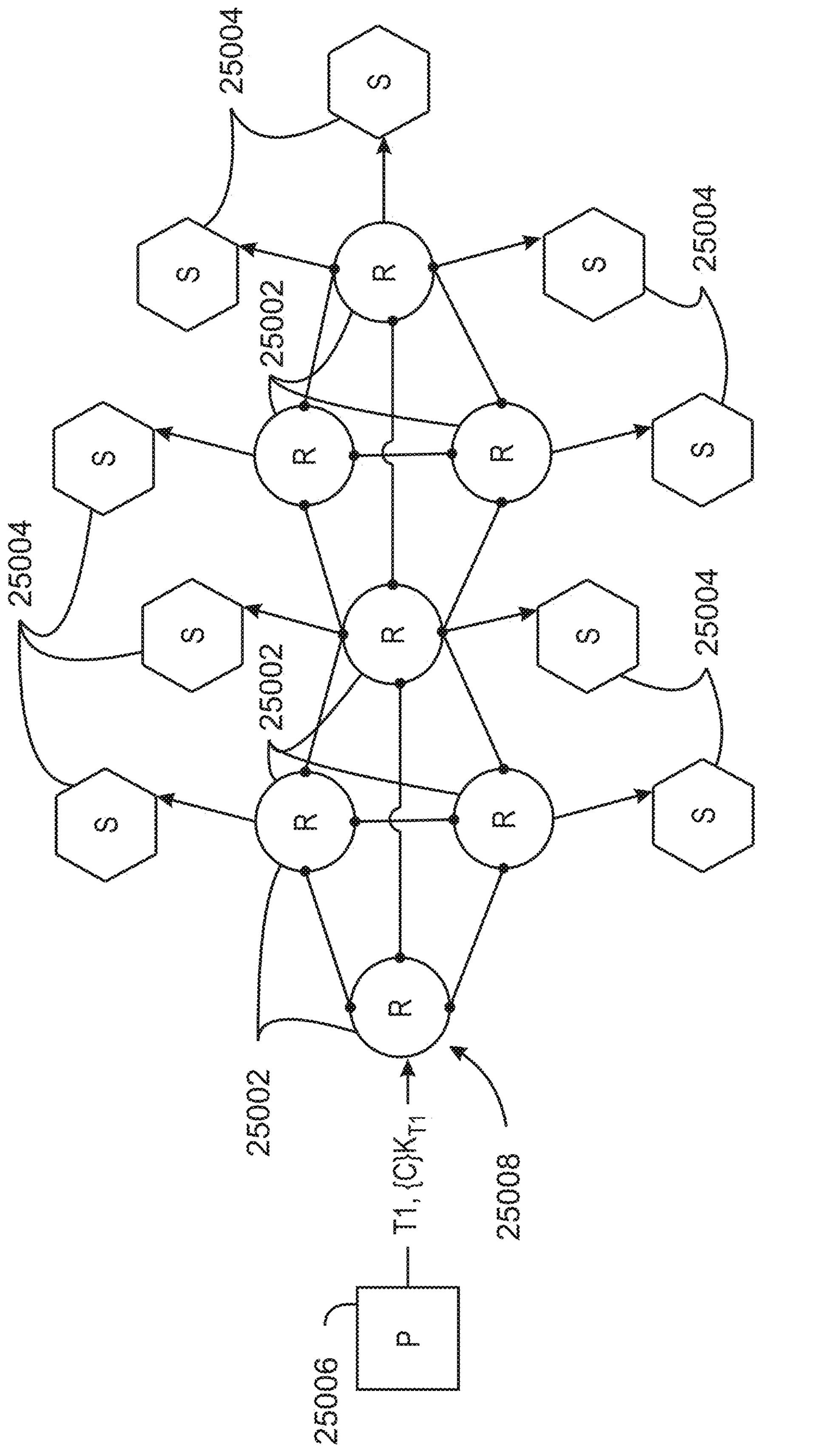

FIG. 250 is a schematic diagram of topic notification with encrypted content in accordance with some embodiments.

Figure 251:
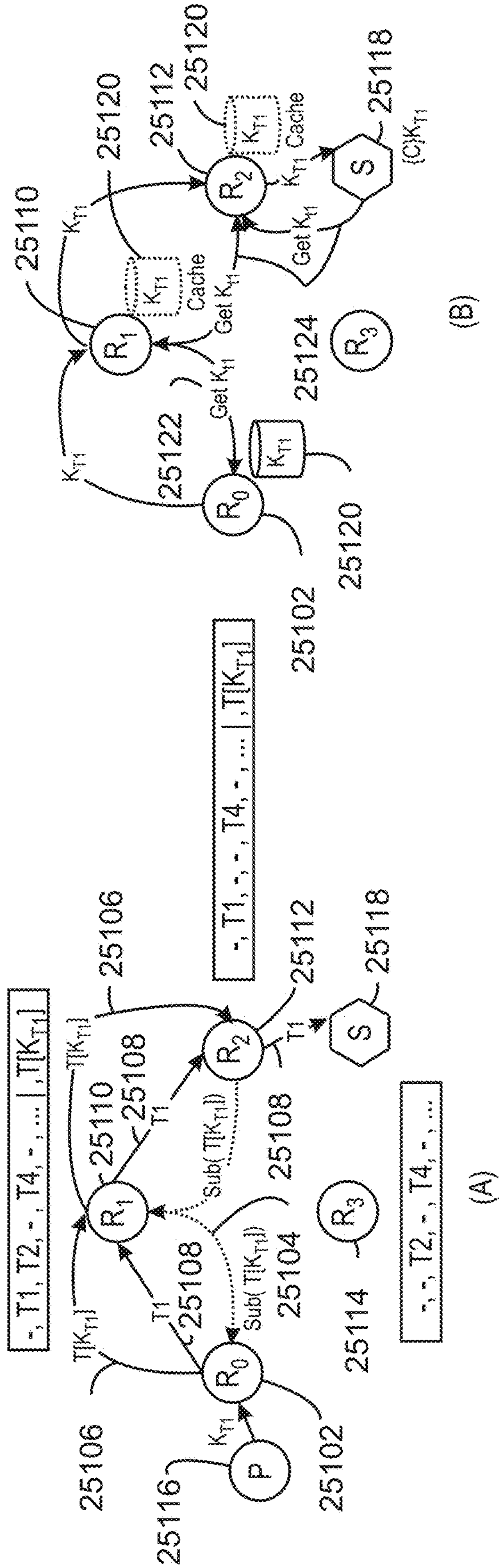

FIG. 251(A) is a schematic diagram of a group of routers receiving notifications of a topic that includes encrypted content in accordance with some embodiments.

FIG. 251(B) is a schematic diagram of a group of routers warming their caches in anticipation of a subscriber requesting an encrypted topic in accordance with some embodiments.

Figure 252:
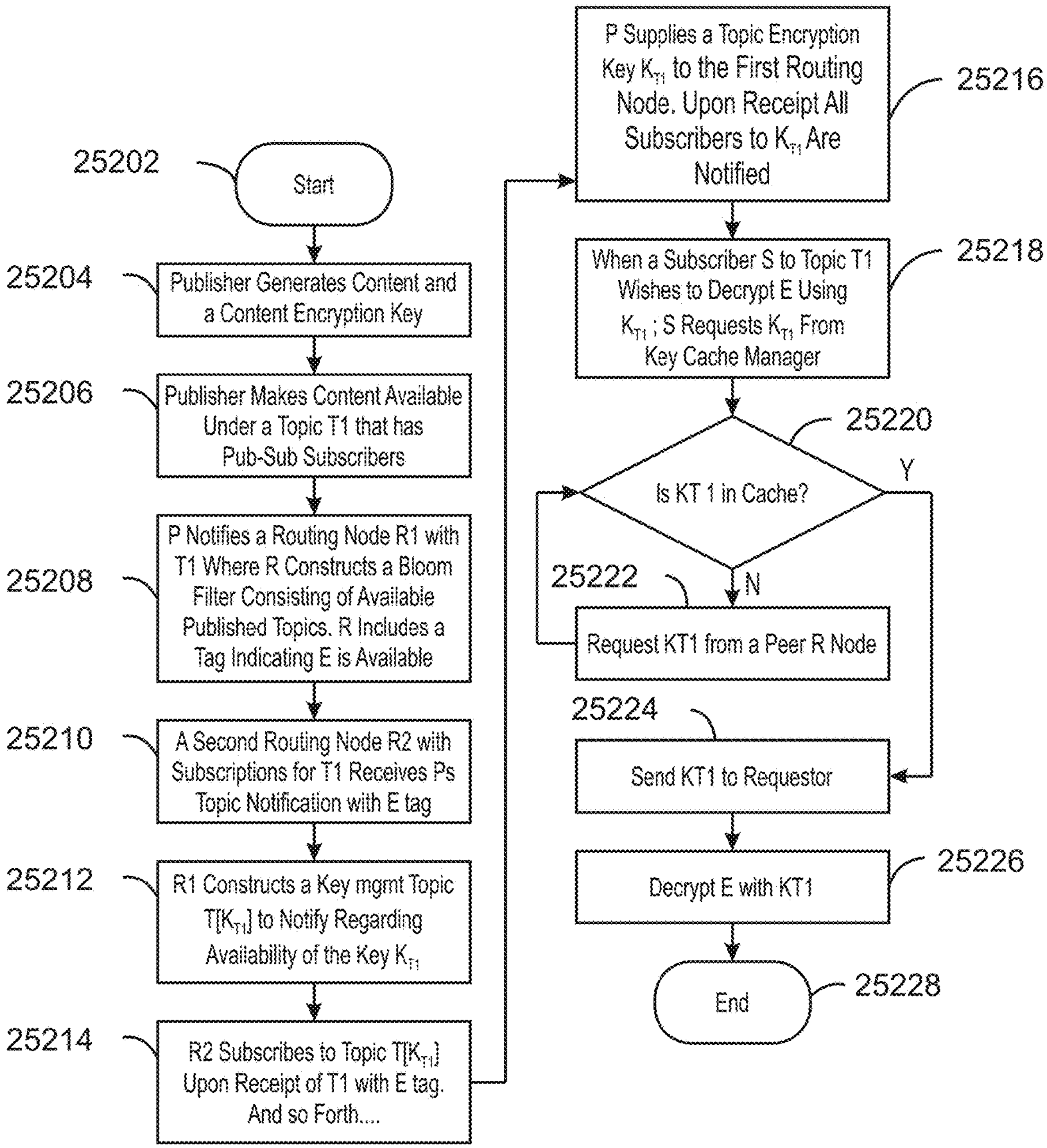

FIG. 252 is a process flow diagram of an example method for using key management notification and warm Key caching in accordance with some embodiments.

Figure 253:
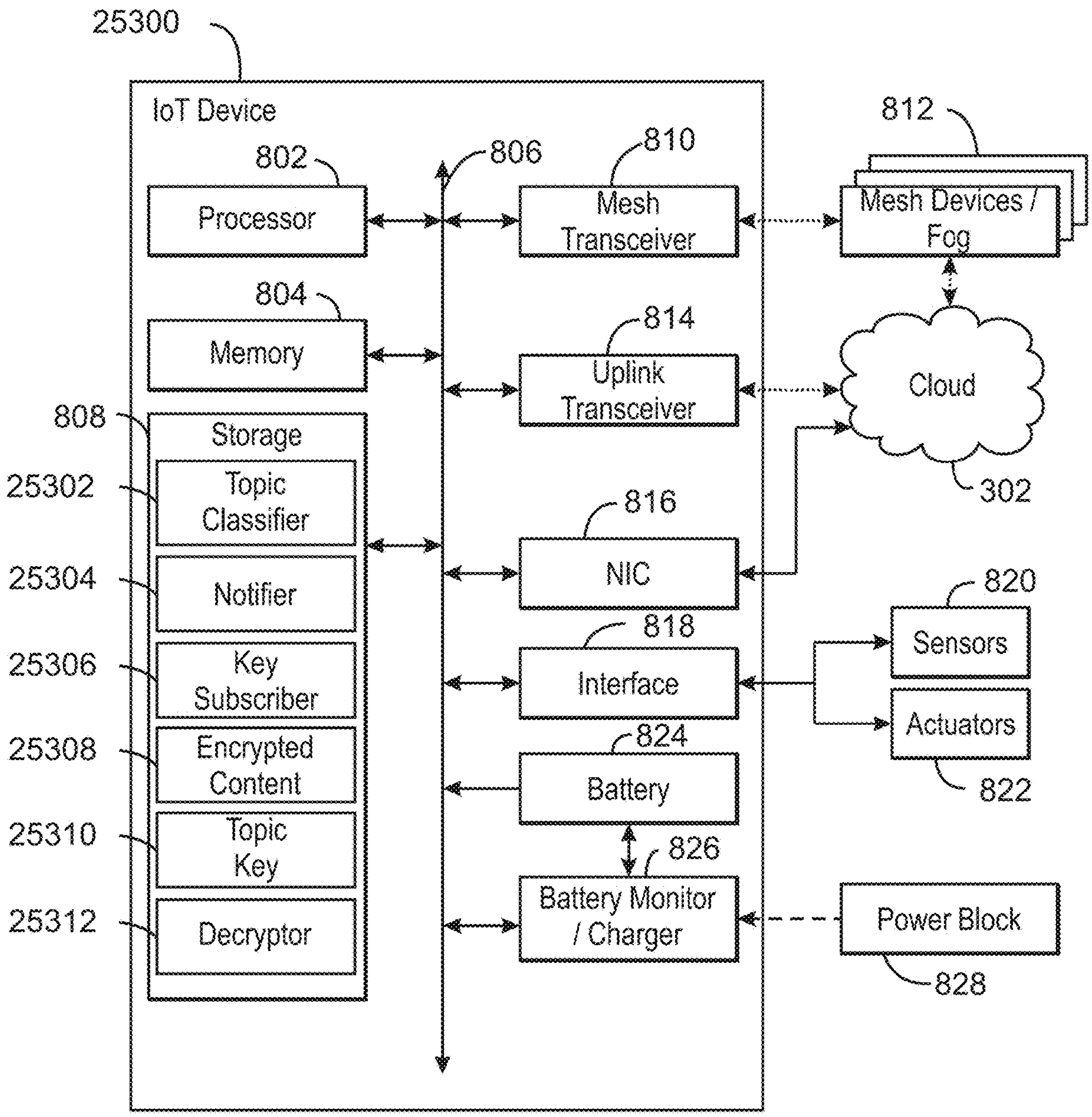

FIG. 253 is a block diagram of an example of components that may be present in an IoT device for managing topic notification with encrypted content in accordance with some embodiments.

Figure 254:
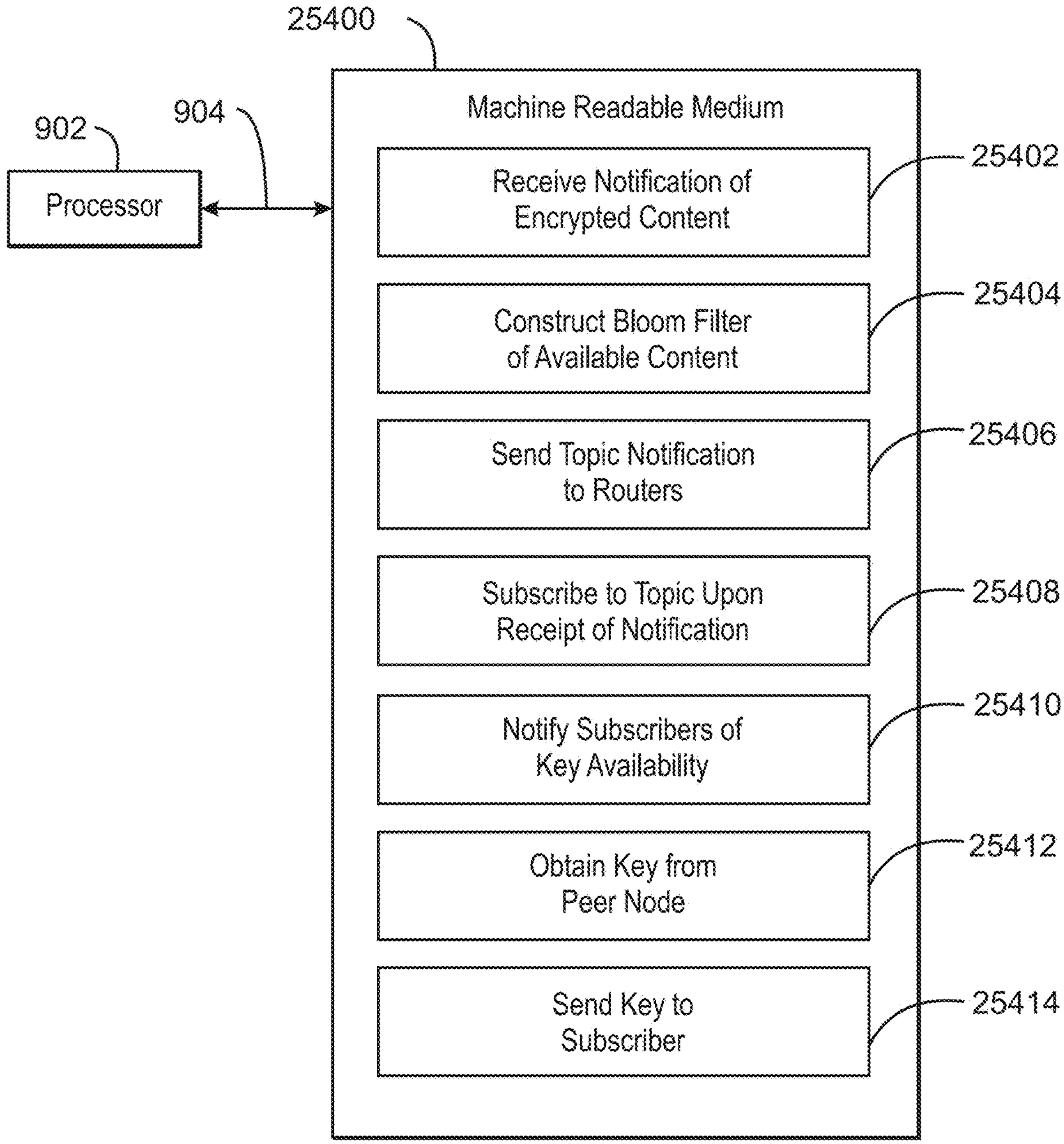

FIG. 254 is a block diagram of a non-transitory, machine readable medium including code to direct a processor to manage topic notification with encrypted content in accordance with some embodiments.

Figure 255:
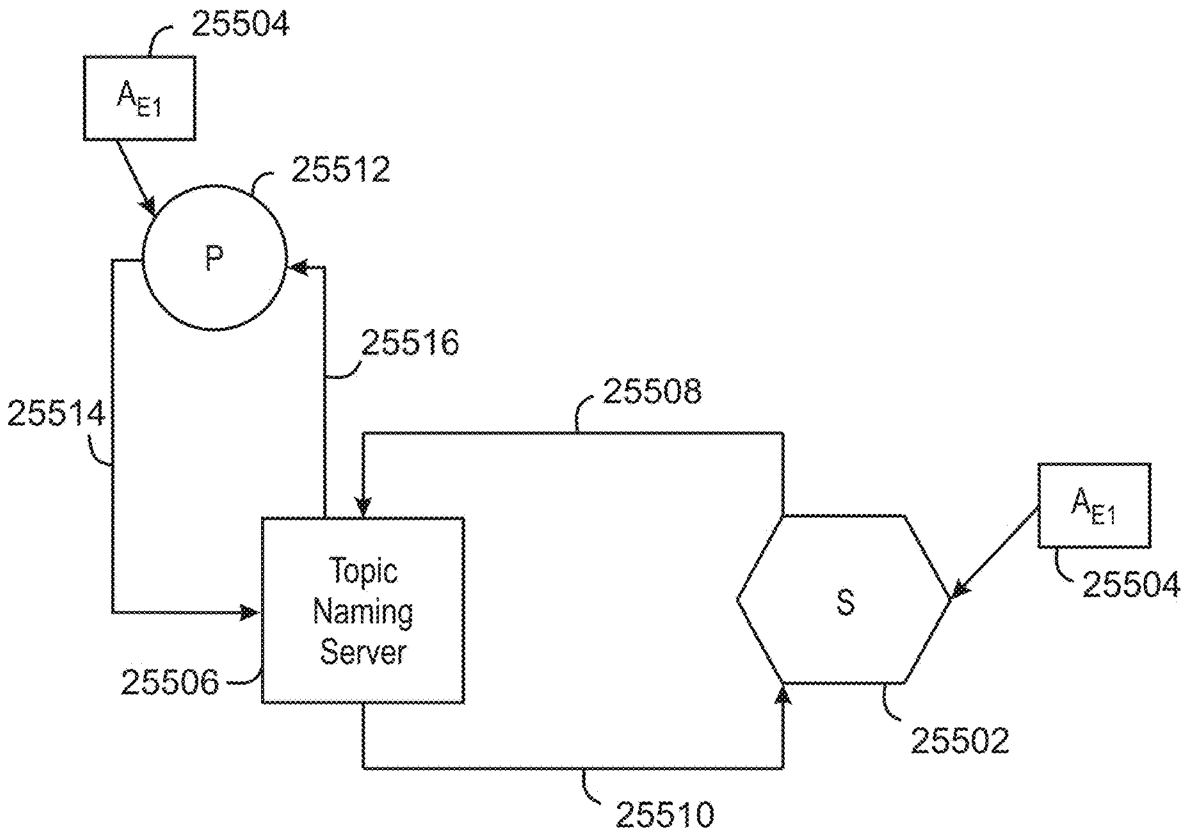

FIG. 255 is a schematic diagram of a subscriber obtaining a topic group key in accordance with some embodiments.

Figure 256:
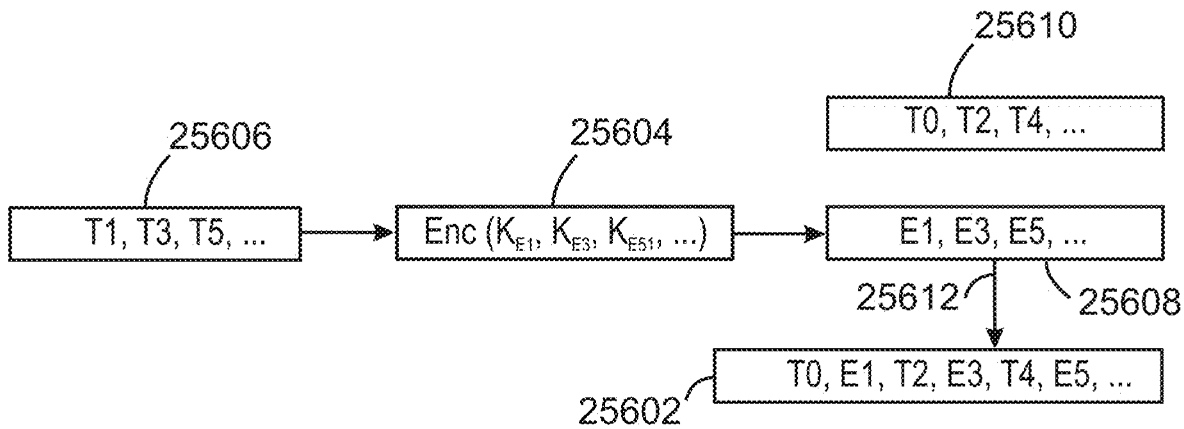

FIG. 256 is a schematic diagram of a publisher generating a subscription bloom filter for notification of subscribers of available topics in accordance with some embodiments.

Figure 257:
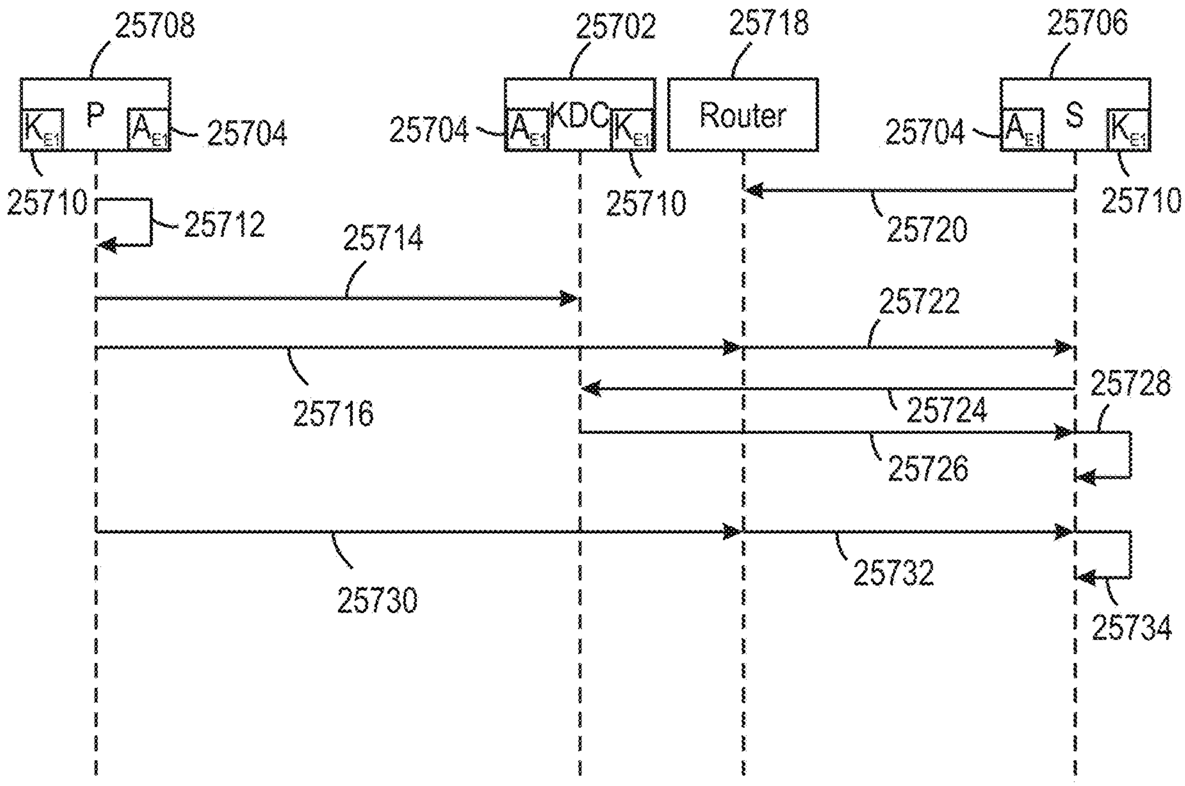

FIG. 257 is a ladder diagram of an example method for topic encryption in accordance with some embodiments.

Figure 258:
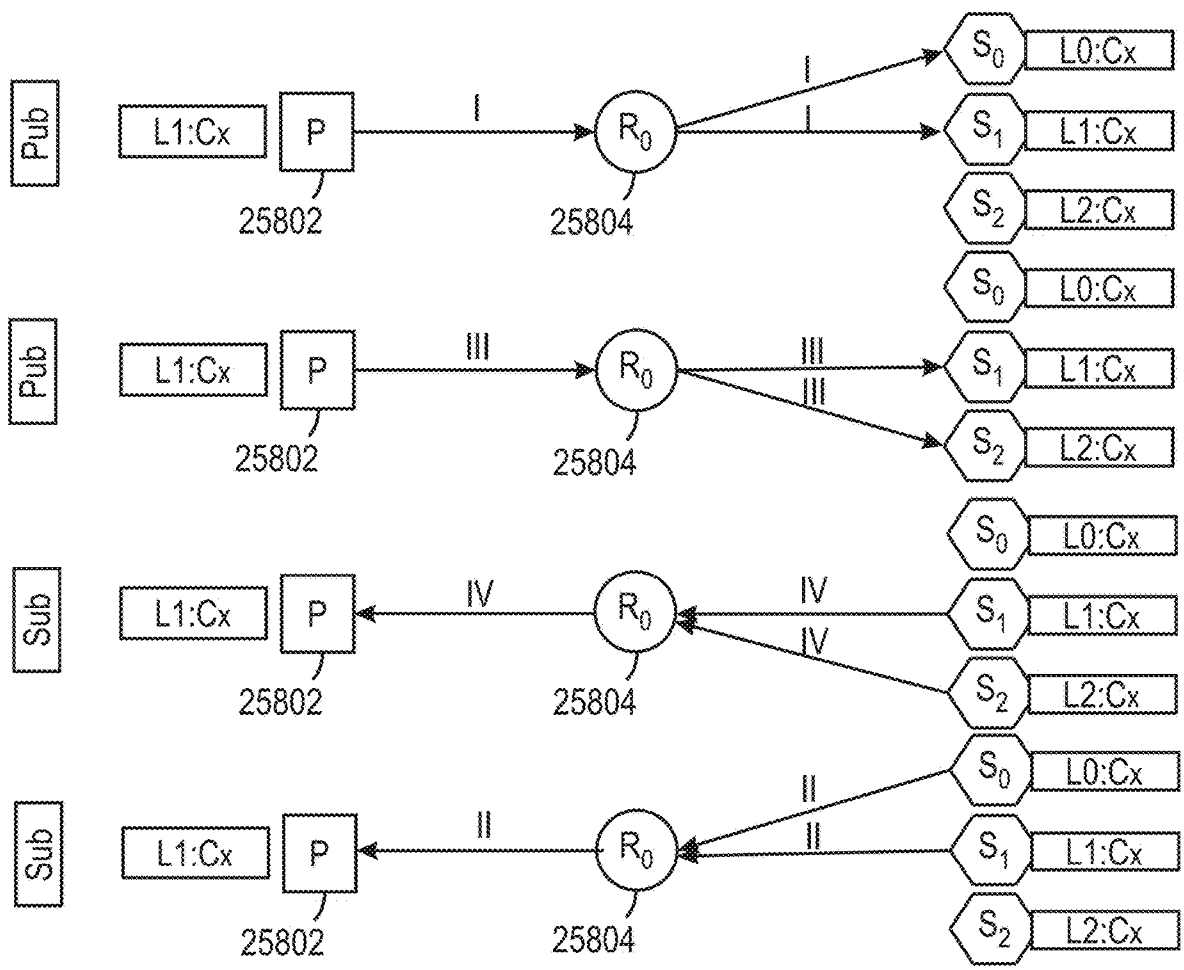

FIG. 258 is a schematic diagram of the use of multilevel security labels in a publication-subscribe environment in accordance with some embodiments.

Figure 259:
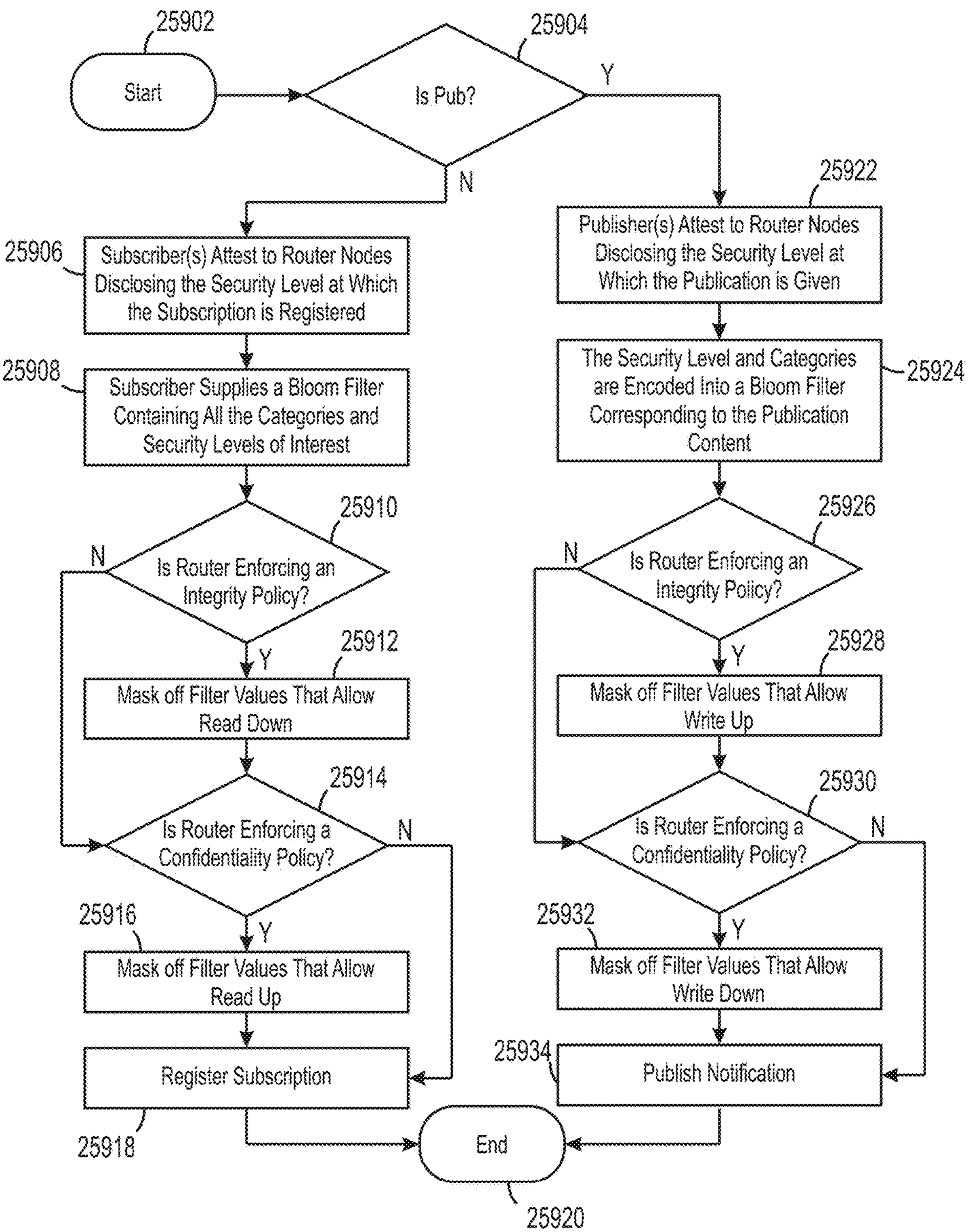

FIG. 259 is a process flow diagram of an example method for implementing bloom filters to apply multi-level security policies to notification messages in accordance with some embodiments.

Figure 260:
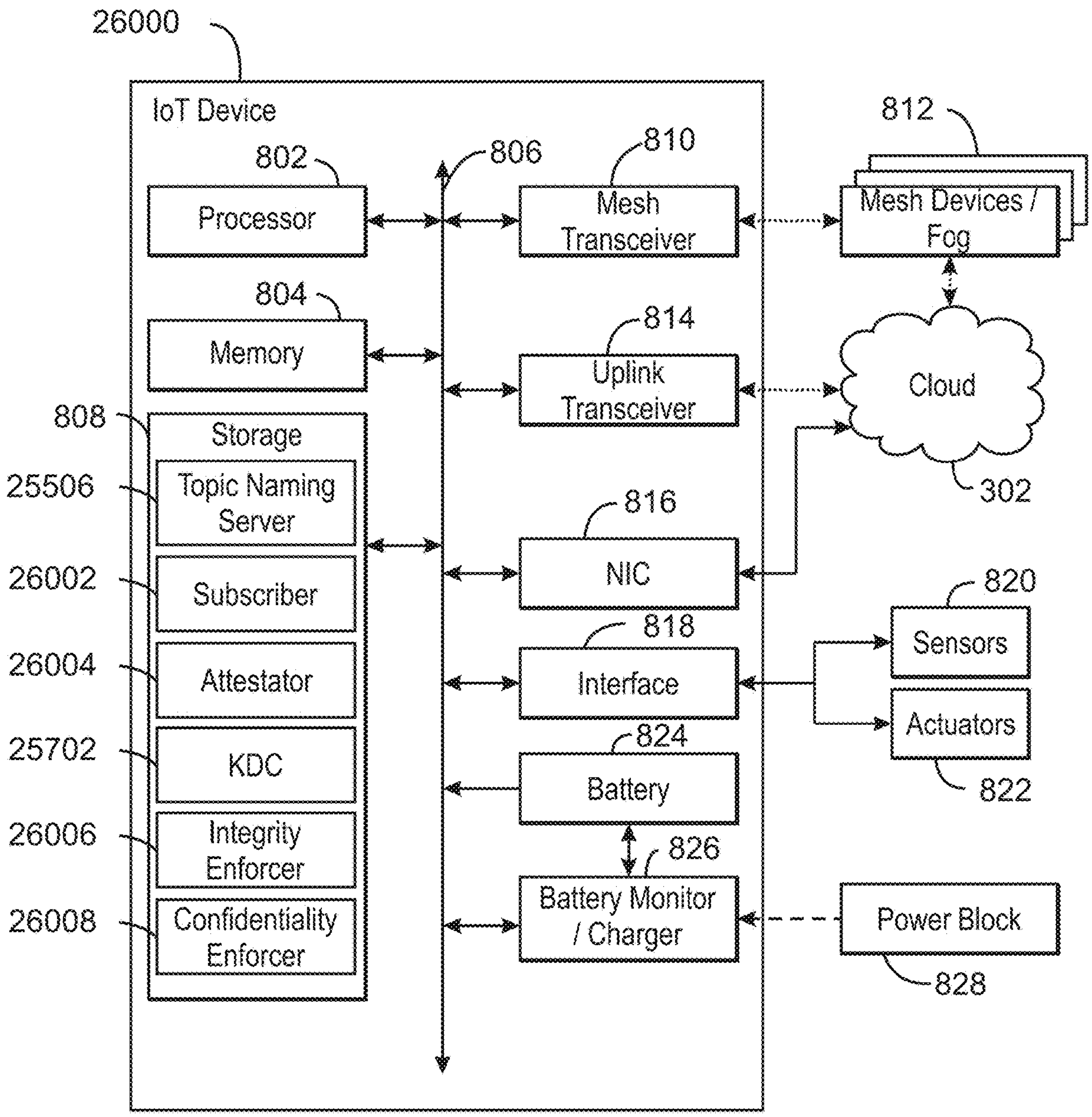

FIG. 260 is a block diagram of an example of components that may be present in an IoT device for managing topic notification with encrypted content in accordance with some embodiments.

Figure 261:
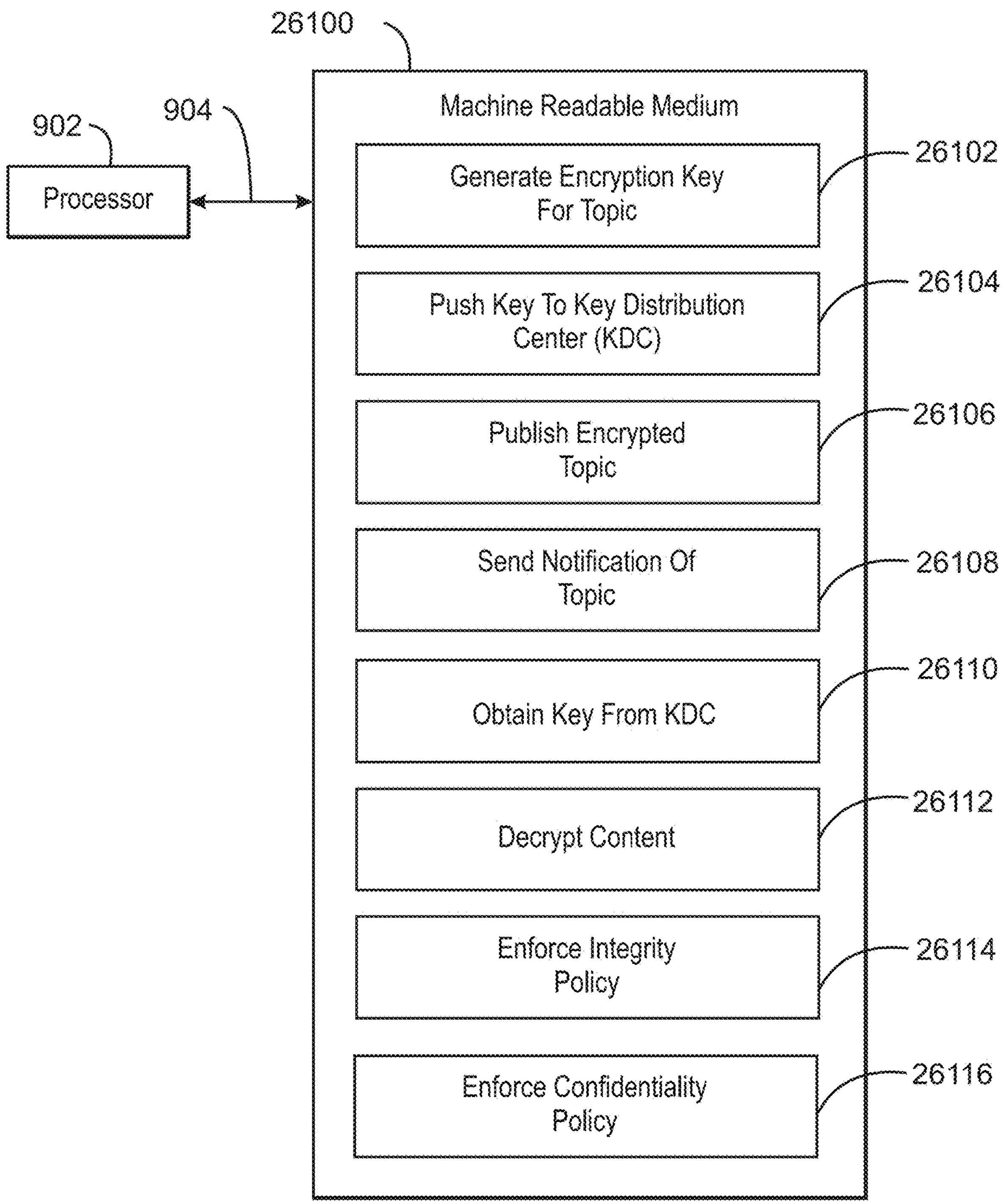

FIG. 261 is a block diagram of a non-transitory, machine readable medium including code to direct a processor to manage topic notification with encrypted content in accordance with some embodiments.

Figure 262:
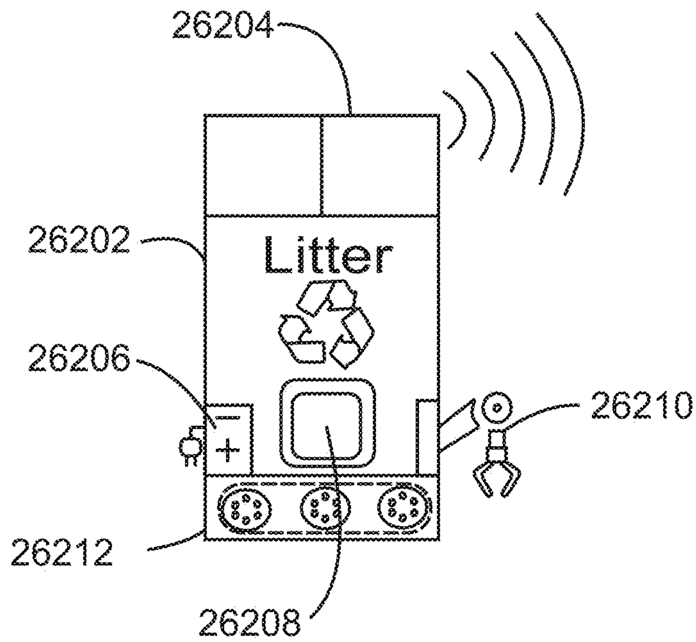

FIG. 262 is a drawing of an example of a shy robot in accordance with some embodiments.

Figure 263:
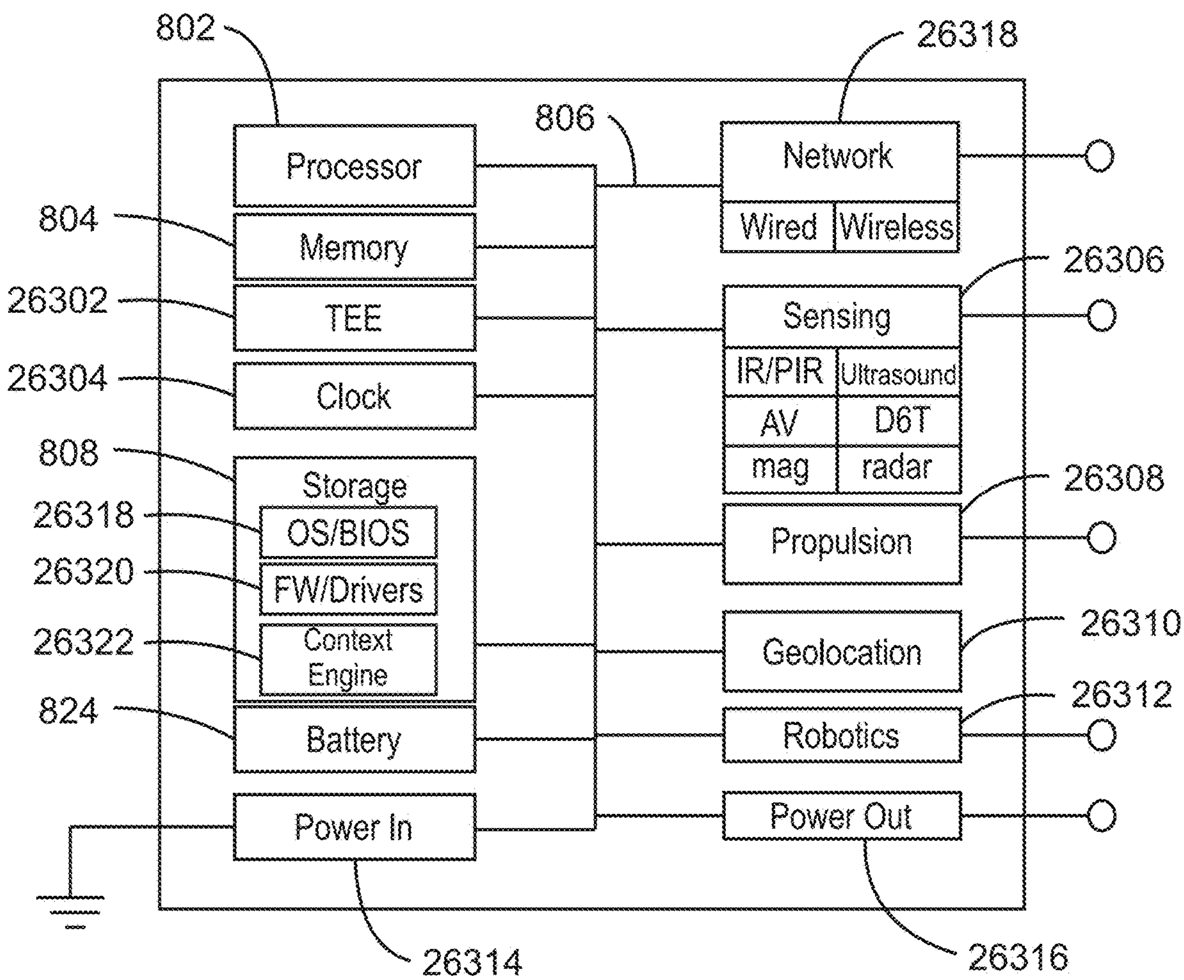

FIG. 263 is a block diagram of an example of components that may be present in a shy robot in accordance with some embodiments.

Figure 264:
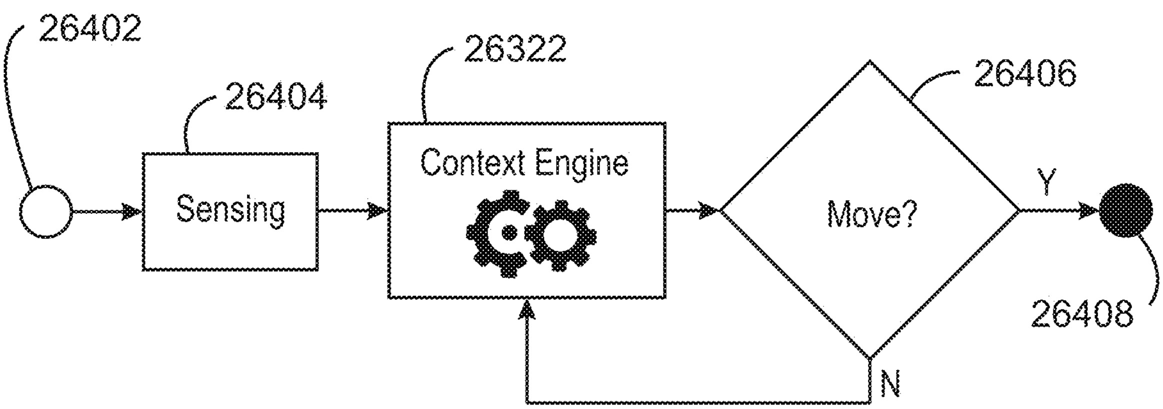

FIG. 264 is a schematic diagram of the operation of the context engine in accordance with some embodiments.

Figure 265:
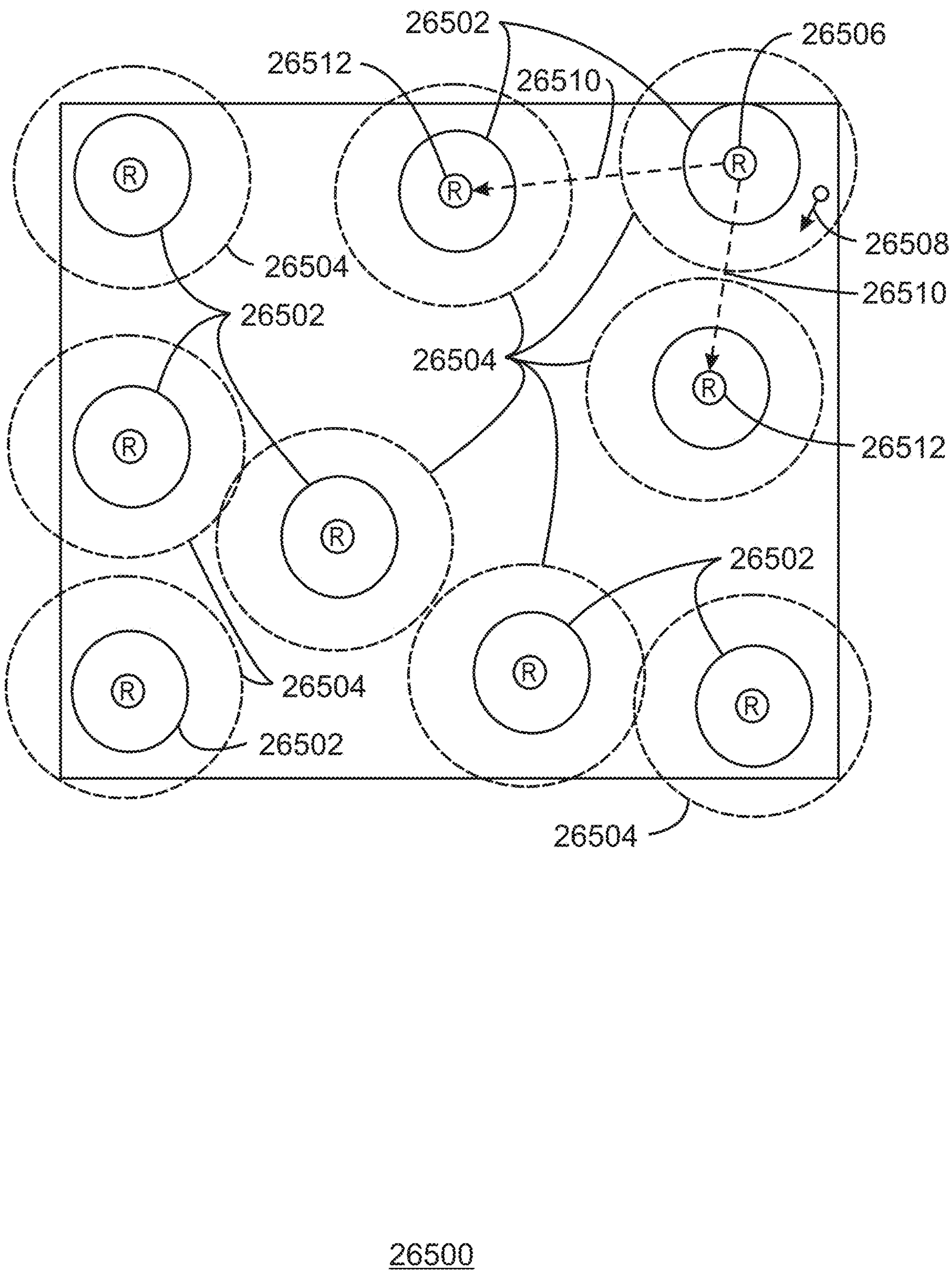

FIG. 265 is a schematic diagram of the operation to of a swarm of shy robots in accordance with some embodiments.

Figure 266:
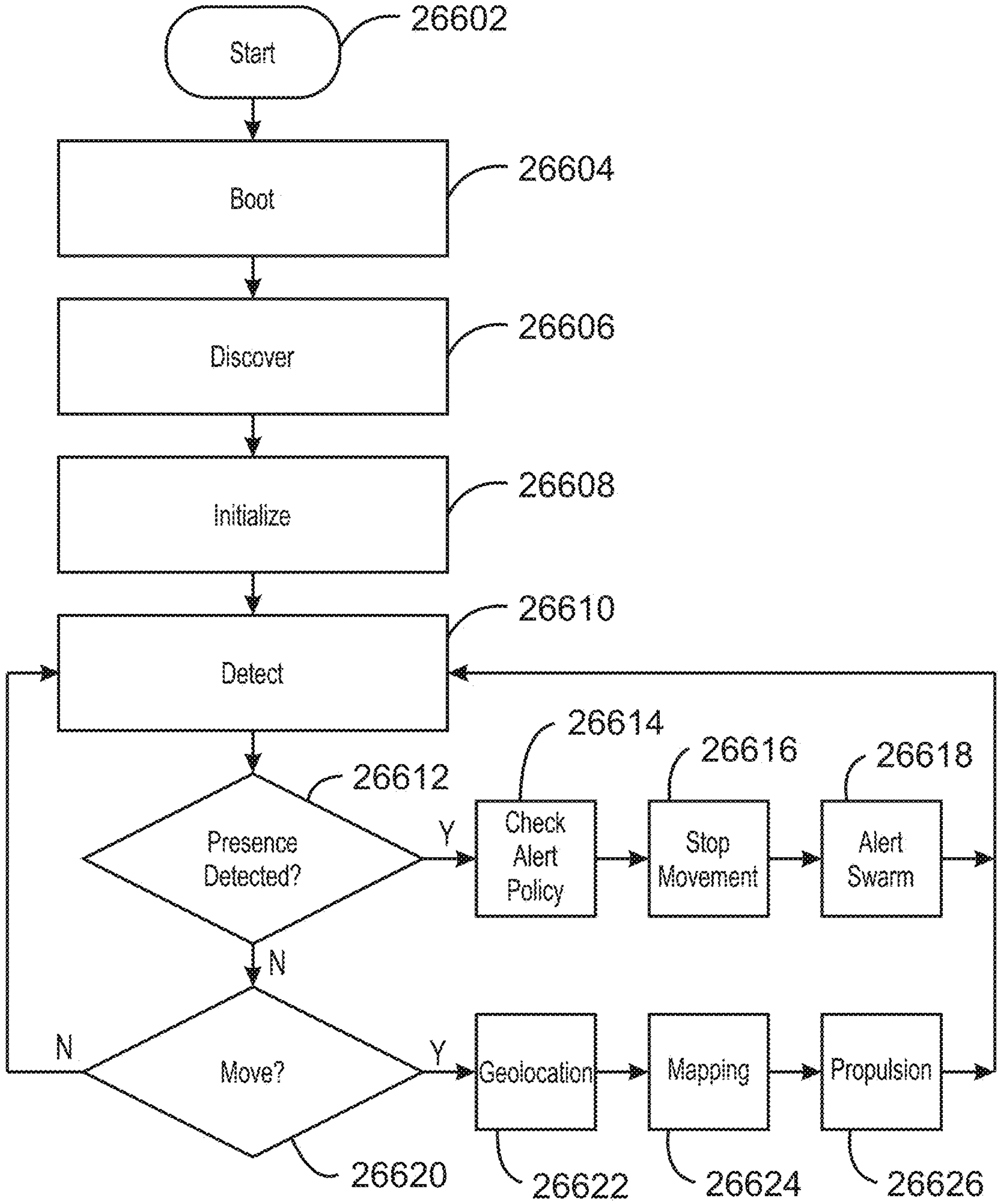

FIG. 266 is a process flow diagram of an example method for the operation of a shy robot in a swarm in accordance with some embodiments.

Figure 267:
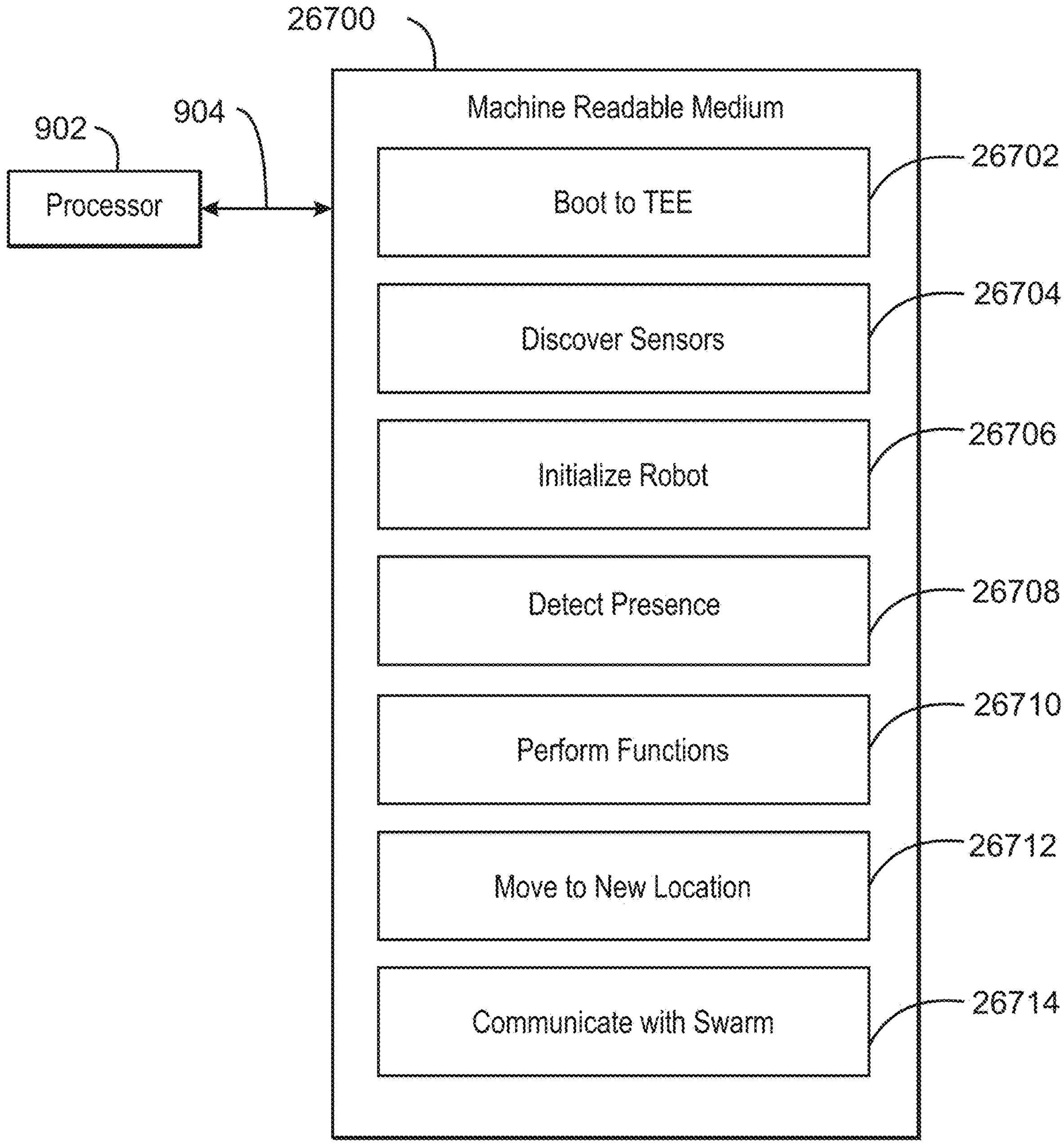

FIG. 267 is a block diagram of a non-transitory, machine readable medium including code to direct a processor to manage operations of shy robots in accordance with some embodiments.

Figure 268:
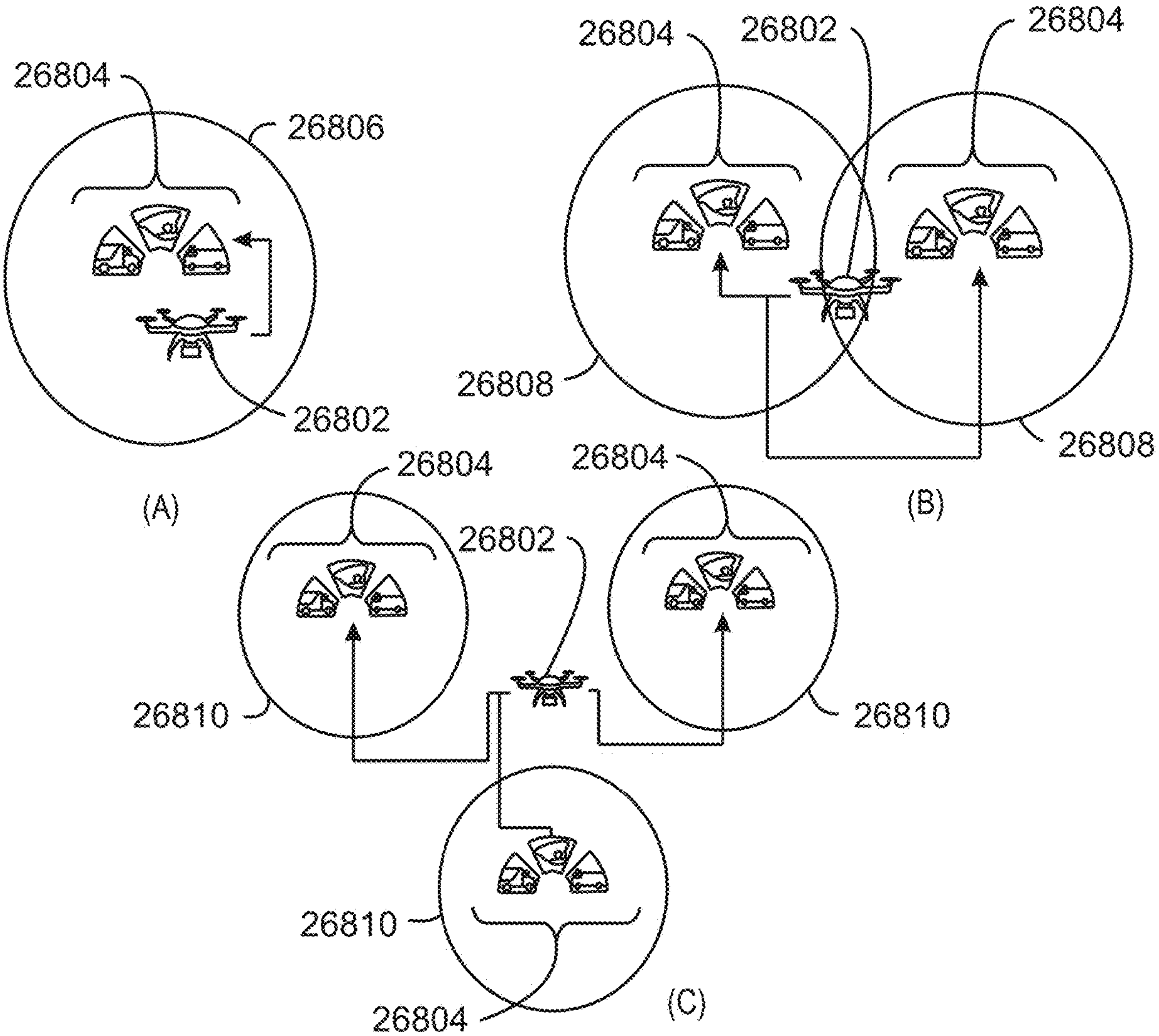

FIG. 268 is a schematic diagram of a use case showing drones as pre-first responder devices to a scene within a jurisdiction in accordance with some embodiments.

Figure 269:
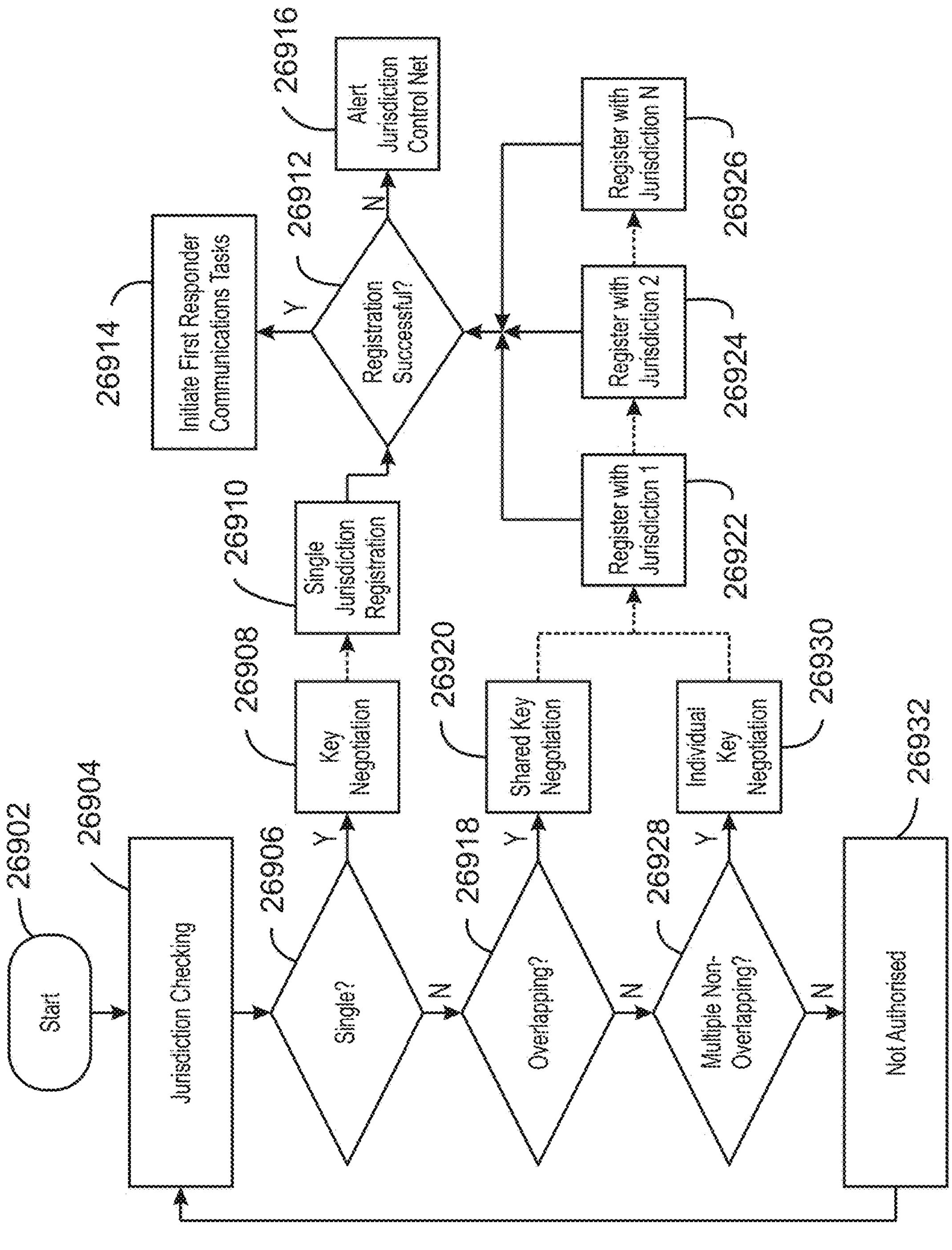

FIG. 269 is a process flow diagram of an example method for performing a joining and registration process associated with the single and multiple jurisdictional control zones in FIG. 268 in accordance with some embodiments.

Figure 270:
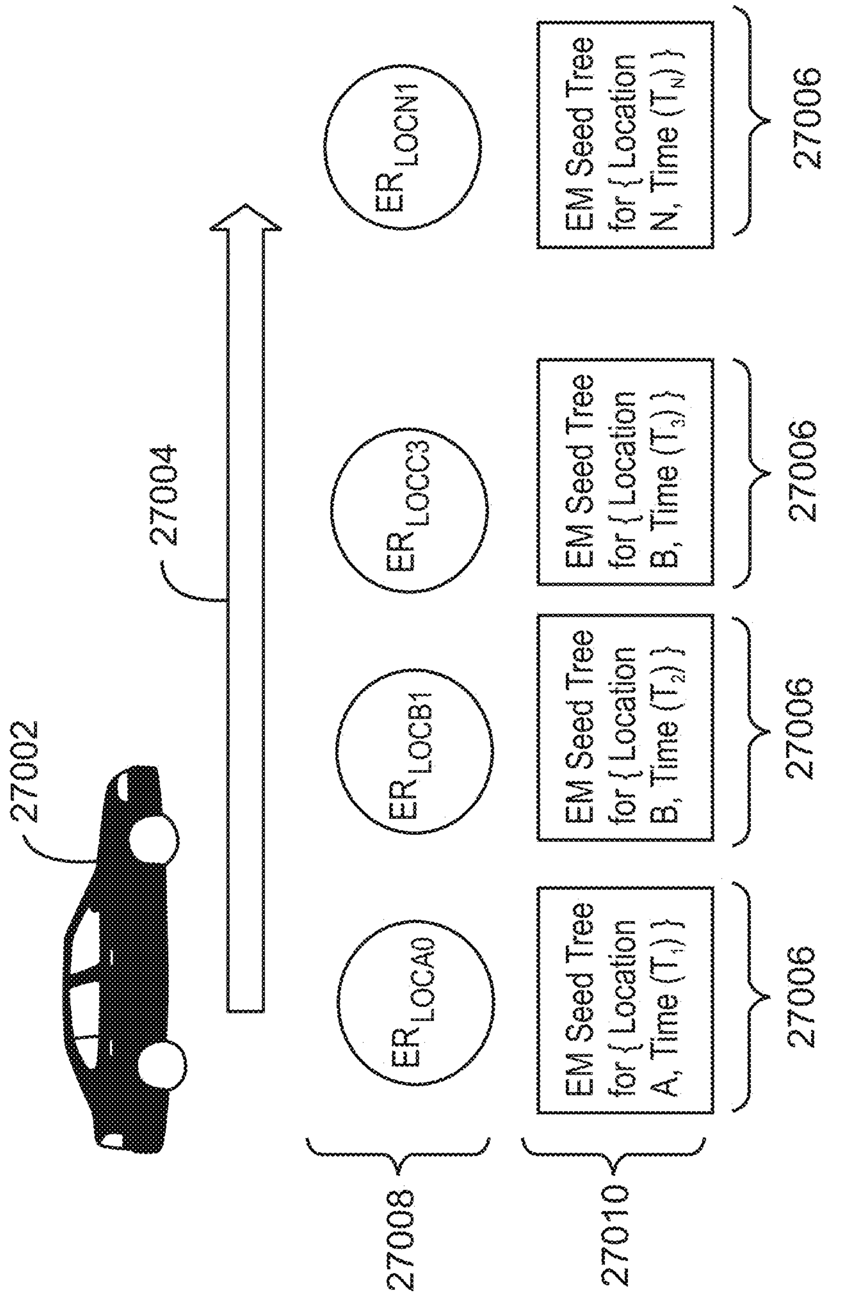

FIG. 270 is a schematic diagram of trip planning for an emergency responder (ER), or other entity, to determine a route to a destination in accordance with some embodiments.

Figure 271:
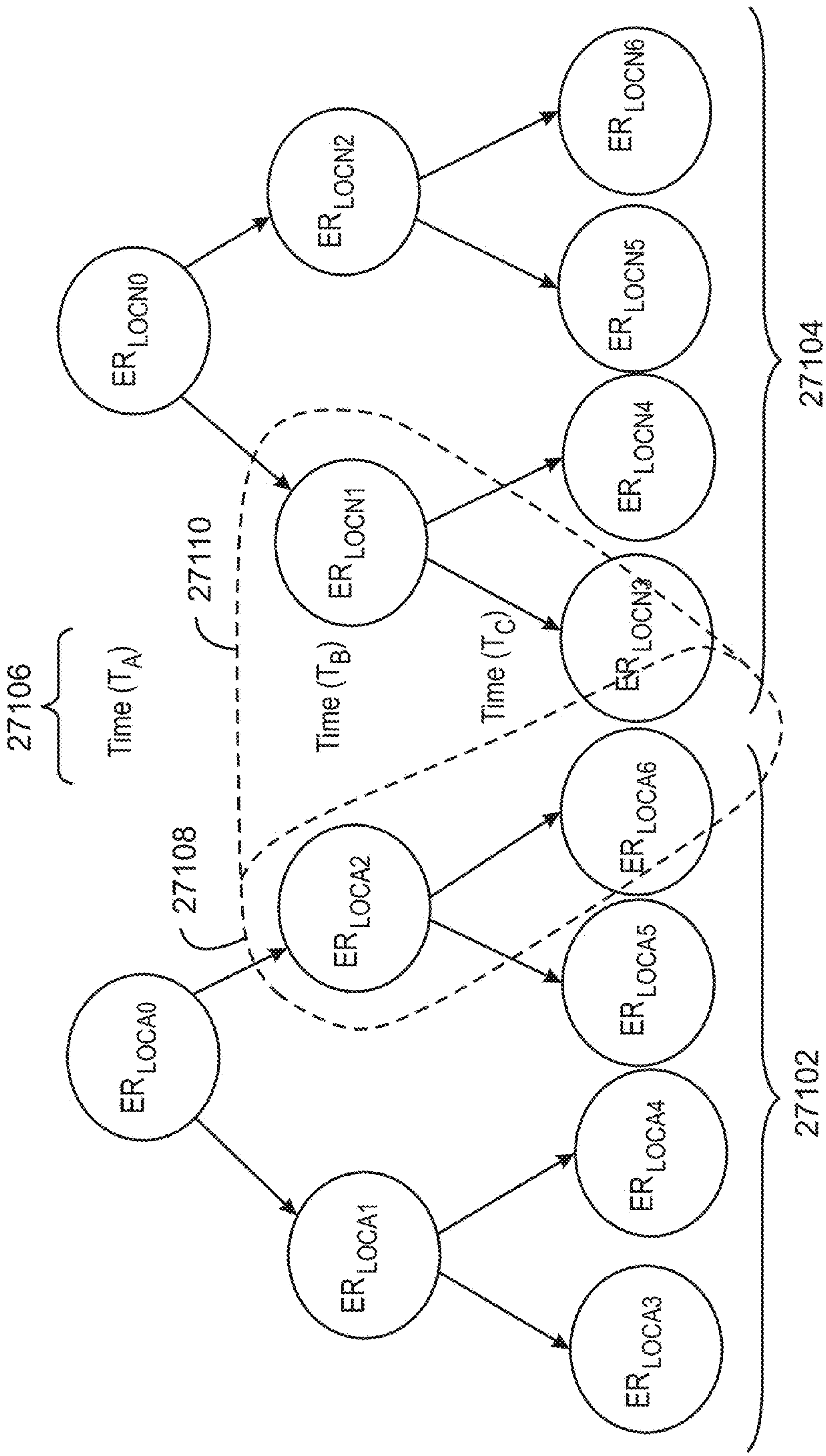

FIG. 271 is a schematic diagram of using emergency management (EM) sub-trees at each waypoint in accordance with some embodiments.

Figure 272:
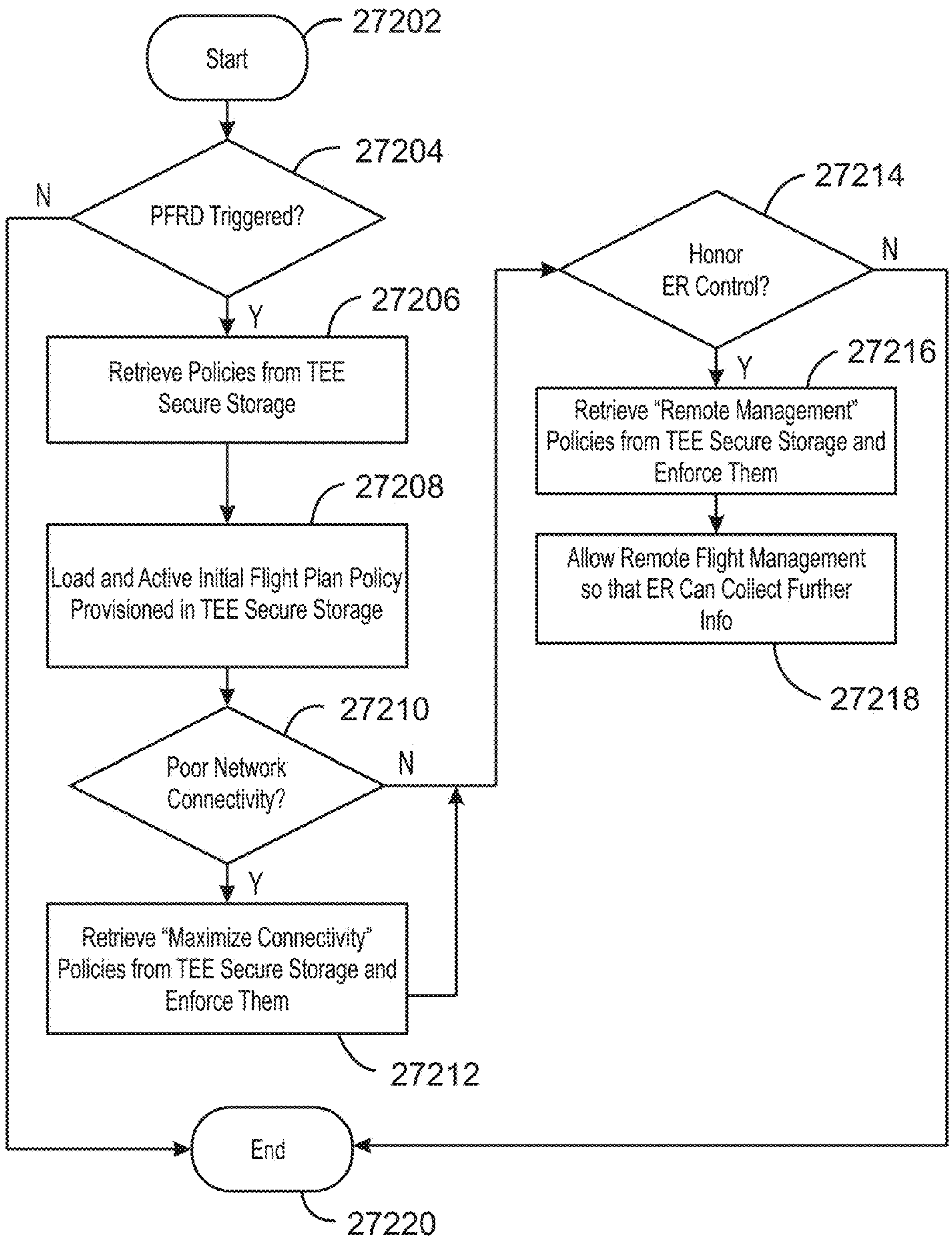

FIG. 272 is a process flow diagram of an example method for dynamic configuration of a pre-first responder dispatch (PFRD) network at a scene in accordance with some embodiments.

Figure 273:
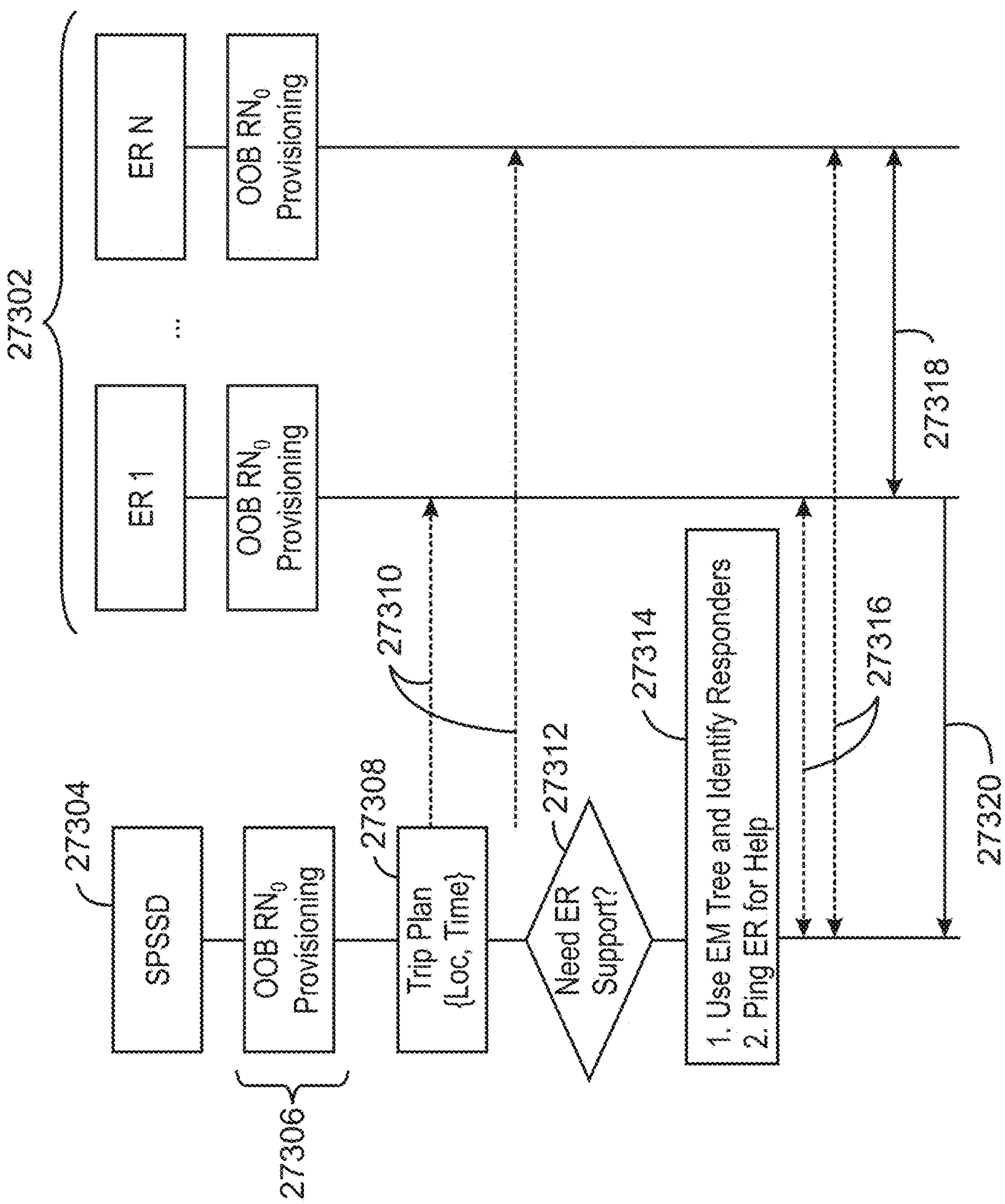

FIG. 273 is a ladder diagram of an example method for beaconing scene information by a PFRD in accordance with some embodiments.

Figure 274:
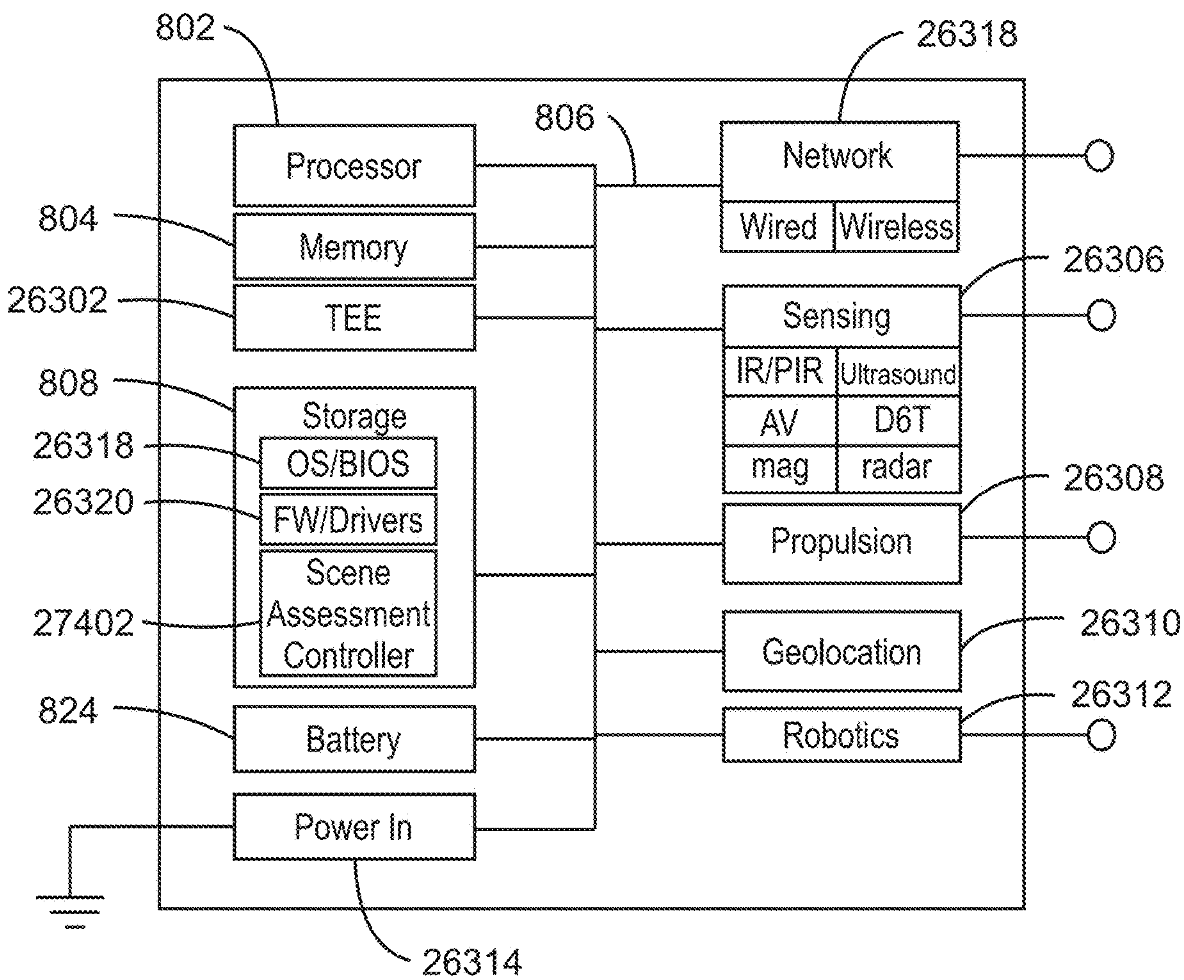

FIG. 274 is a block diagram of an example of components that may be present in a PFRD in accordance with some embodiments.

Figure 275:
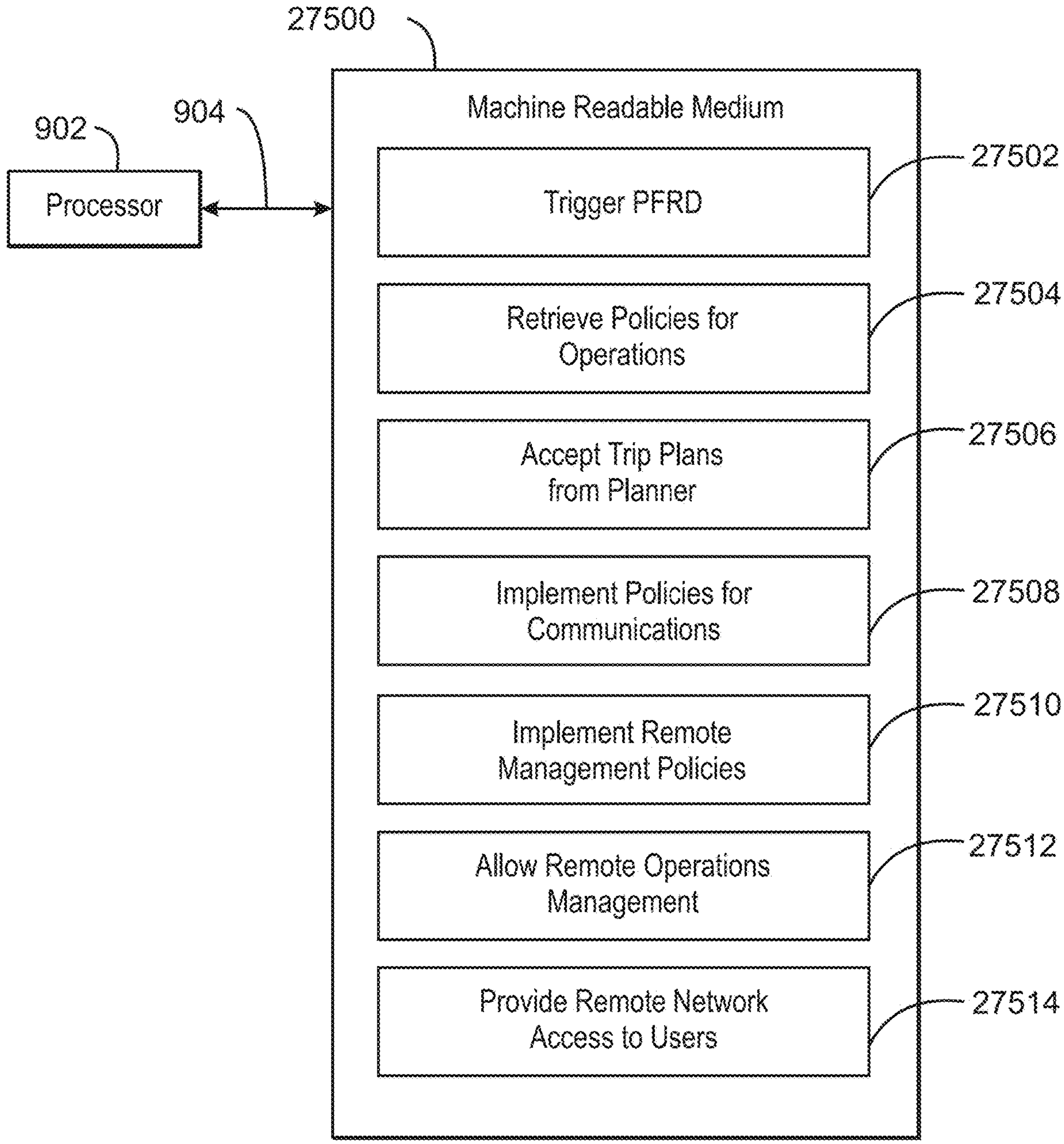

FIG. 275 is a block diagram of a non-transitory, machine readable medium including code to direct a processor to manage operations of pre-first responder devices in accordance with some embodiments.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The Internet-of-Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 1 and 2.

Figure 1:
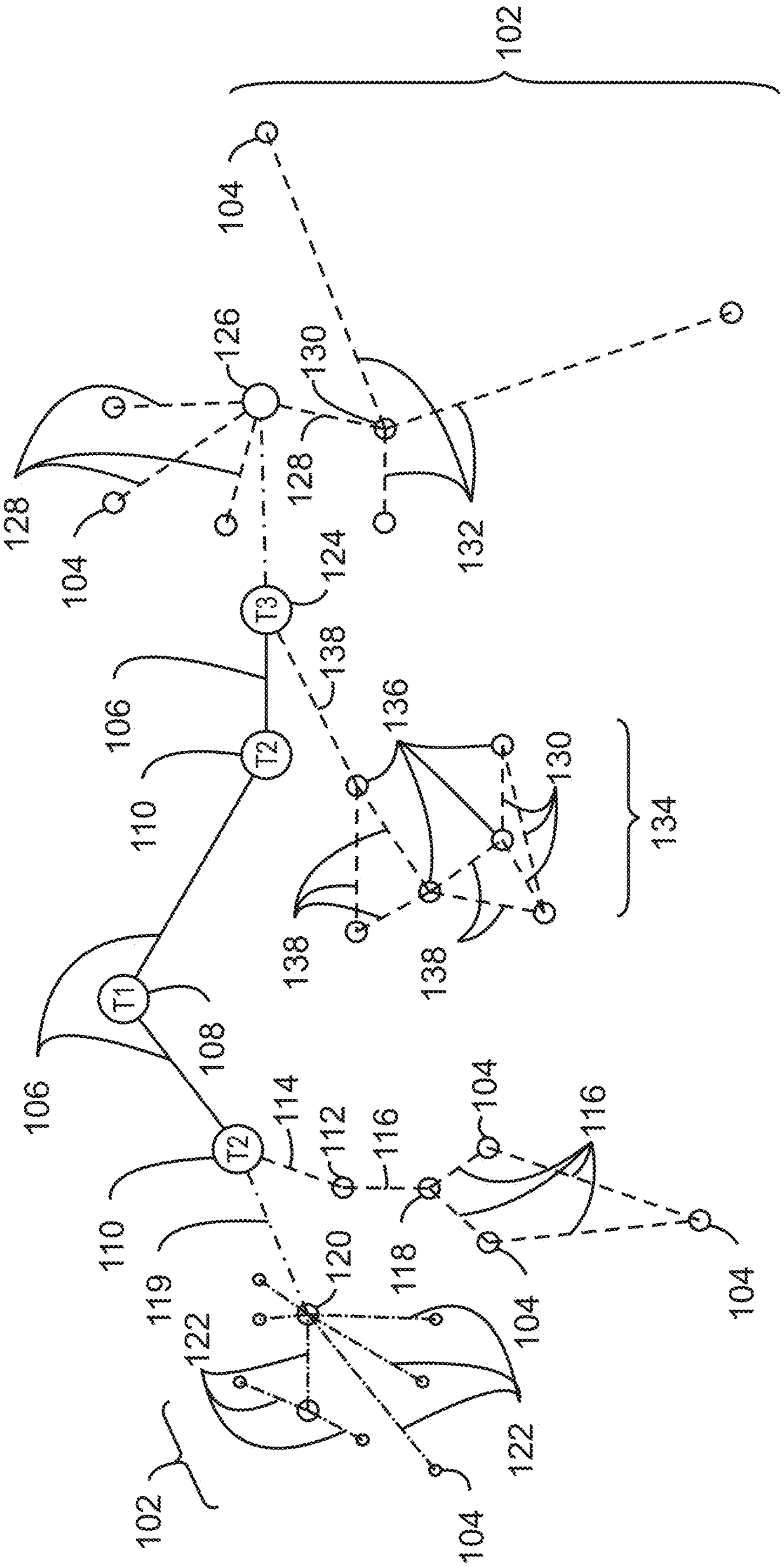
FIG. 1 is a drawing of interconnections that may be present in the Internet in accordance with some embodiments.
Figure 2:
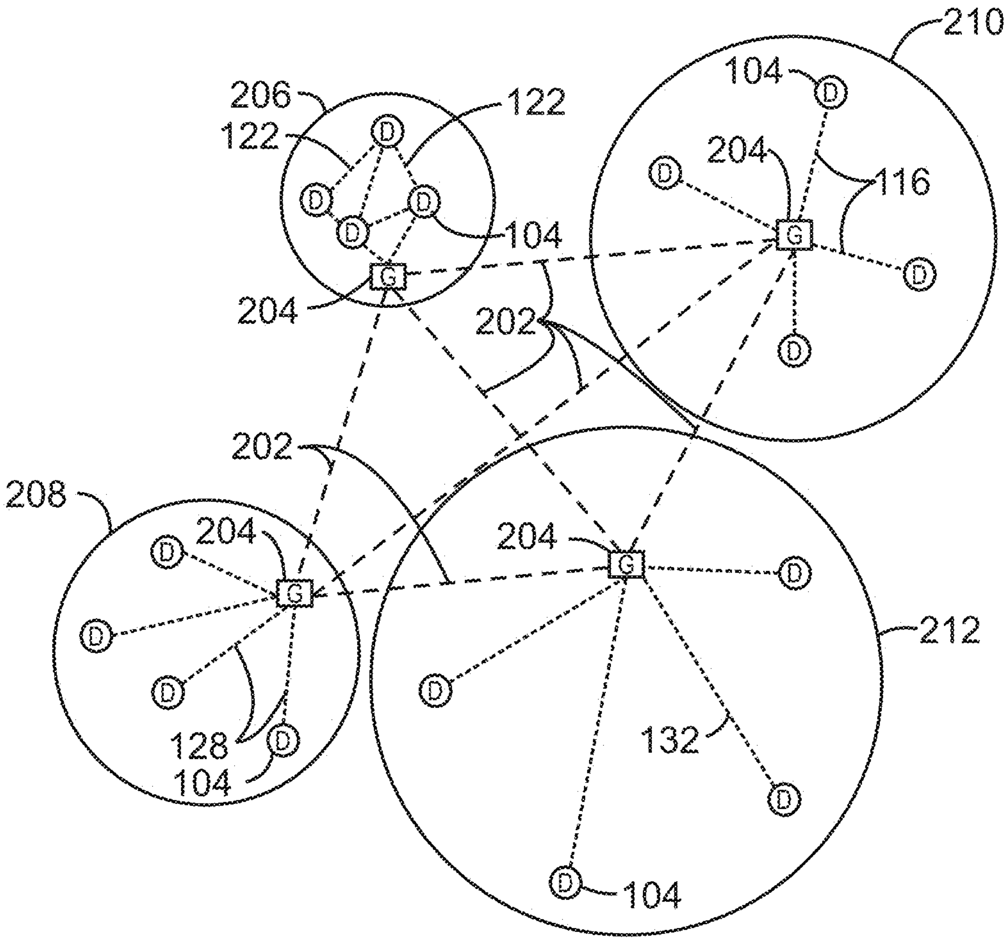
FIG. 2 is a drawing of a network topology for a number of internet-of-things (IoT) networks coupled through backbone links to gateways in accordance with some embodiments.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWan specification promulgated by the LoRa alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms one or more cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 8.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology rather than a strictly hub-and-spoke topology.

The network topology 200 may include any number of types of IoT networks, such as a mesh network 206 using Bluetooth Low Energy (BLE) links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, and vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each. Furthermore, the proper components of infrastructure and resource based trust and service indices may be inserted to improve the data integrity, quality assurance, and deliver a metric of data confidence.

As described herein, the WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
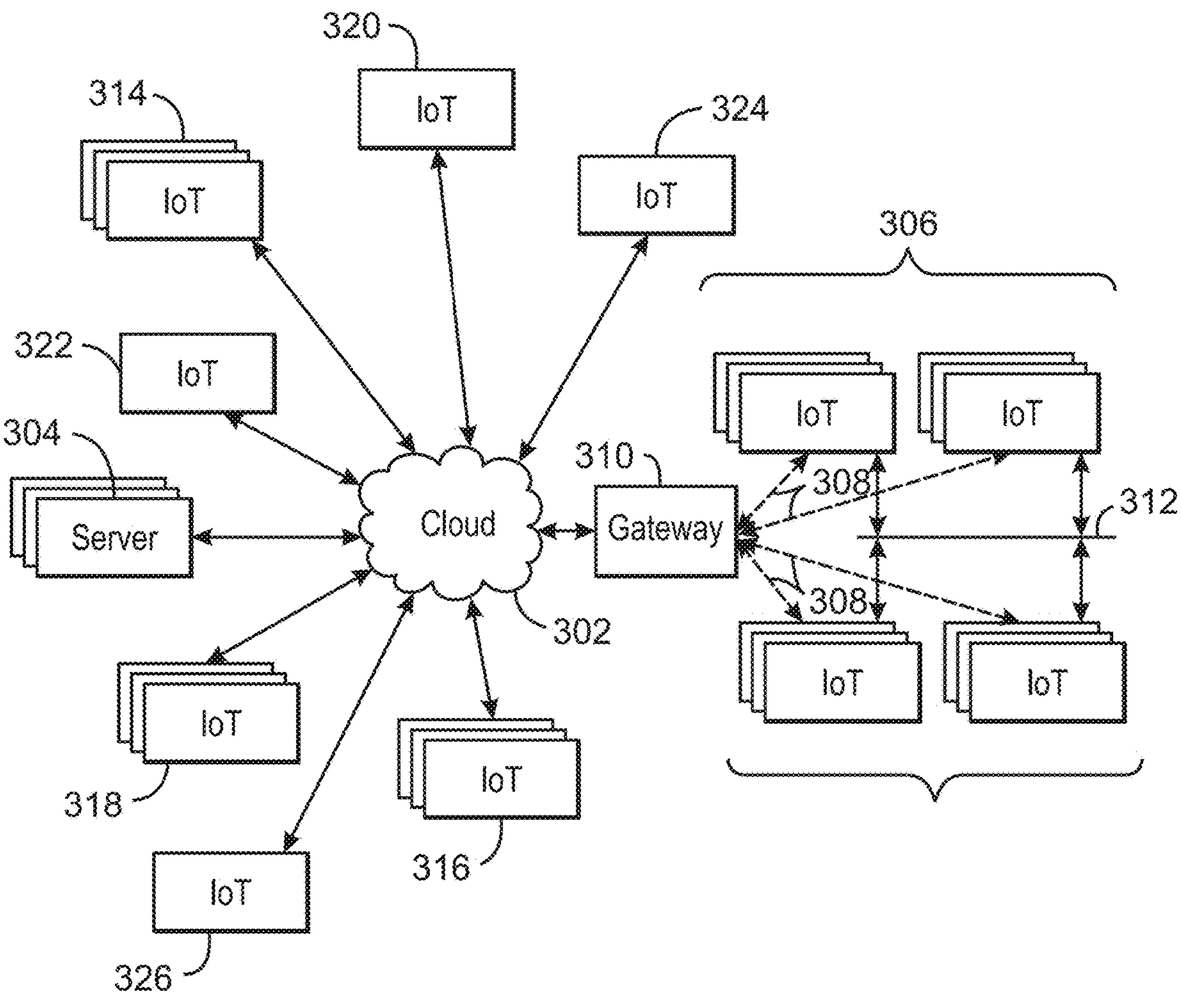
FIG. 3 is a drawing of a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
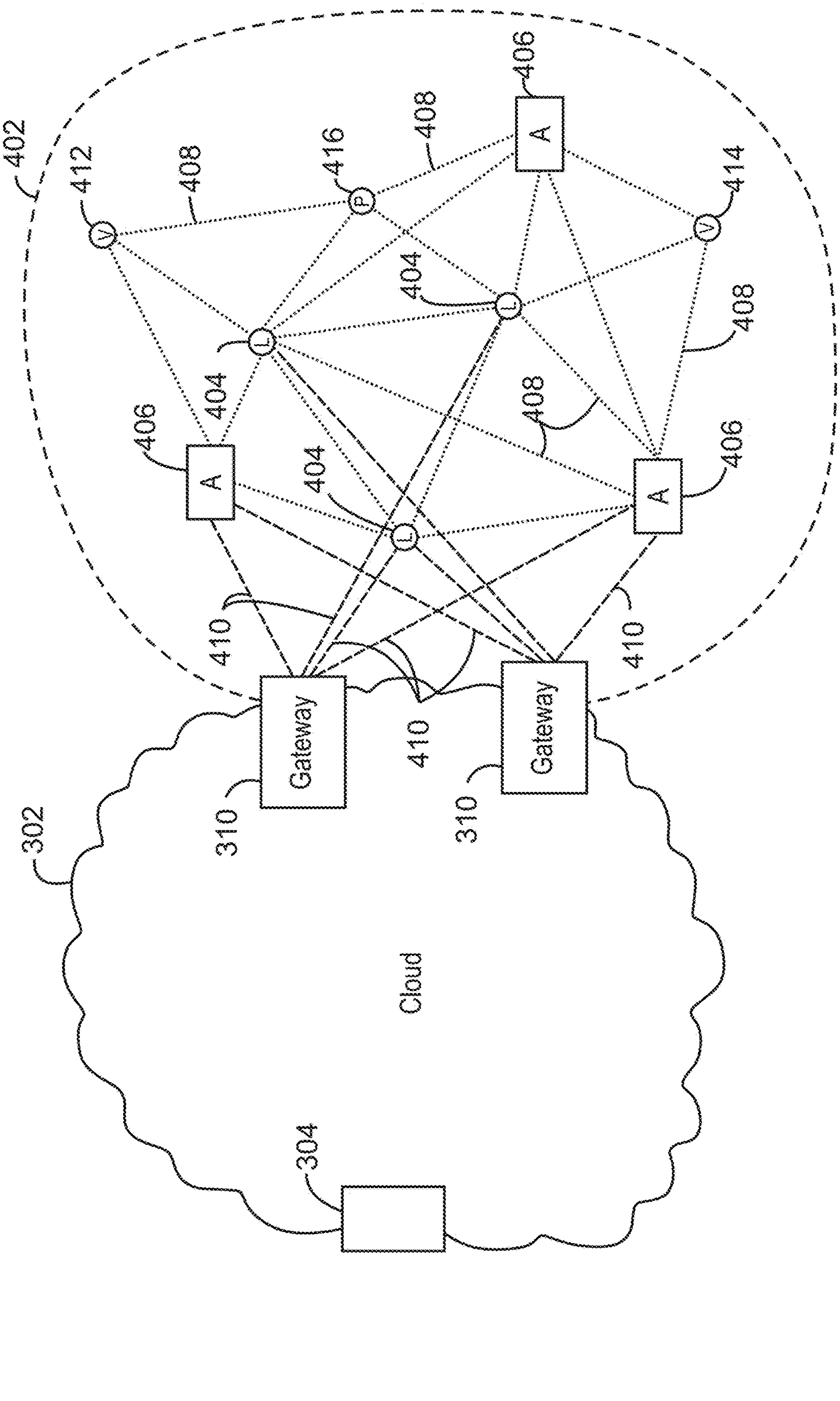
FIG. 4 is a drawing of a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices, which may be termed a fog device 402, operating at the edge of the cloud 302 in accordance with some embodiments. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, traffic analyses, and the like.

For example, traffic flow through the intersection may be controlled by a plurality of traffic lights 404 (e.g., three traffic lights 404). Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in the exemplary system 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416. Other IoT devices may also be present, such as IoT devices in bicycle computers, motorcycle computers, drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 416, cyclists, or non-autonomous vehicles.

As the transient devices 412, 414, and 416, leave the vicinity of the intersection of the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Figure 5:
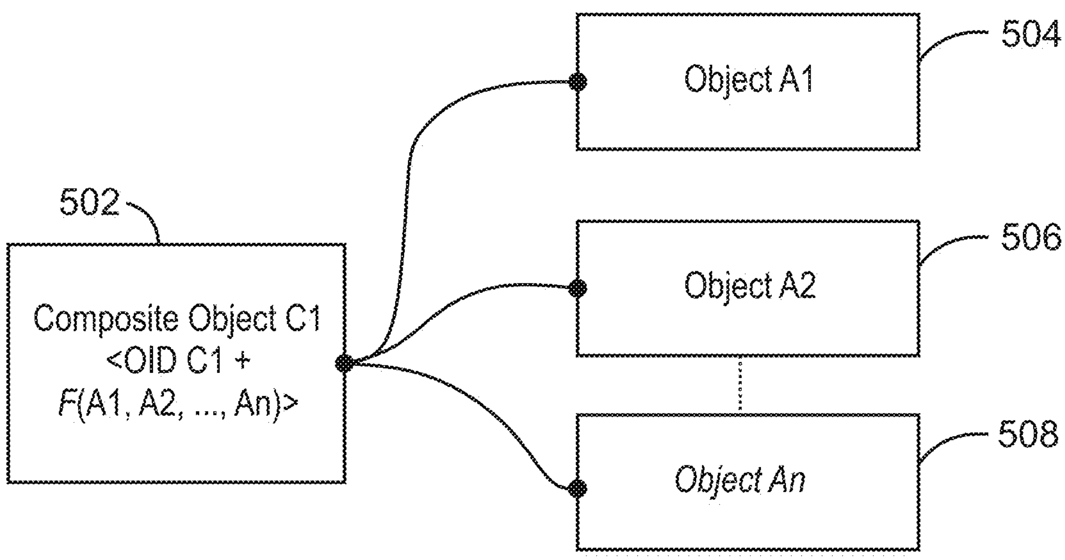
FIG. 5 is a schematic drawing showing the formation of a composite object from a number of atomic objects in accordance with some embodiments.

FIG. 5 is a schematic drawing 500 showing the formation of a composite object 502 from a number of atomic objects 504, 506, and 508 in accordance with some embodiments. An object includes a data model representation of functionality, state and interface semantics that make up a node of a distributed system. As used herein, an object, or IoT object, may be a physical device made up of IoT devices, a virtual device formed from a group of physical or virtual devices, or any number of other configurations.

Objects may interact to accomplish a larger function, goal or workflow. Objects may be identified in terms of their type, e.g., the function performed, and instance, e.g., presence. Multiple object instances may have the same type identity, but may have unique instance identities. Further, multiple object instances may be organized into groups where an instance of the grouping may have an identity. A group of objects that interact in a particular way, given their type, for example, function, state and interface semantics, may represent a composite object. The composition itself may have a type and instance abstraction. Hence, composite objects follow the same identity rules as atomic objects. Composition with type and instance properties allows object extensibility through composition.

The object may last as long as a single device, such as a refrigerator, or only until a current function is completed. For example, a refrigerator may be regarded as a composite object 502 consisting of multiple other objects, such as a light, a compressor, a temperature sensor, a thermostat, a water dispenser, an ice maker, and the like. The other objects may each be atomic objects 504, 506, and 508, or may themselves be composite objects 502. The ice maker may be composite object 502 formed from atomic objects 504, 506, and 508, such as a temperature sensor, a thermostat, a solenoid-operated water valve, a timer, an ice tray, and the like. An example of a virtual composite object 502 made up of a number of physical devices is the intersection and the emergency cluster, described with respect to FIG. 4.

Accordingly, object identity may be understood in context of three abstractions: object instance, object type, and meta-identity. An object instance is a computational element that occupies finite resources, such as memory, CPU, bandwidth, status, and the like. Object instantiation has a lifecycle that involves creation, mutation, and deletion. An object type is a logical construct that declares expected or possible behavior, states, and composition. The object type can place constraints on how objects behave and interact when instantiated. The object type can also indicate the types of requests the object can respond to, for example, the interface.

Meta-identity is a way of defining a meta-data context in which the object may exist. An object may not be aware of encapsulating meta-identity. Object instances may dynamically apply stereotyping information by defining a group having desired meta-data context then enrolling the object into the group.

Authentication and identity are collated issues. An object identity cannot be believed if not authenticated. However, authentication without identity has limited utility. Asymmetric key signing, such as ECDSA (Elliptic Curve Digital Signature Algorithm), RSA, or the like, is useful for authentication under the expectation that the ability to replicate and distribute the private key is restricted. The use of the key establishes proof a principal or agent has access to the key though restricted. Hence, the principal or agent must be authentic.

The semantics of authentication, when applied to object identities, also follows the three abstractions of object instance, object type, and meta-identity. For an object instance, the authentication challenge-response establishes that the current interaction can only be with a particular instantiation of the object. For an object type, the authentication challenge-response attests that the current interaction is constrained by the semantics of type identification. For the meta-identity, the authentication challenge-response categorizes the current interaction according to the defined context.

Figure 6:
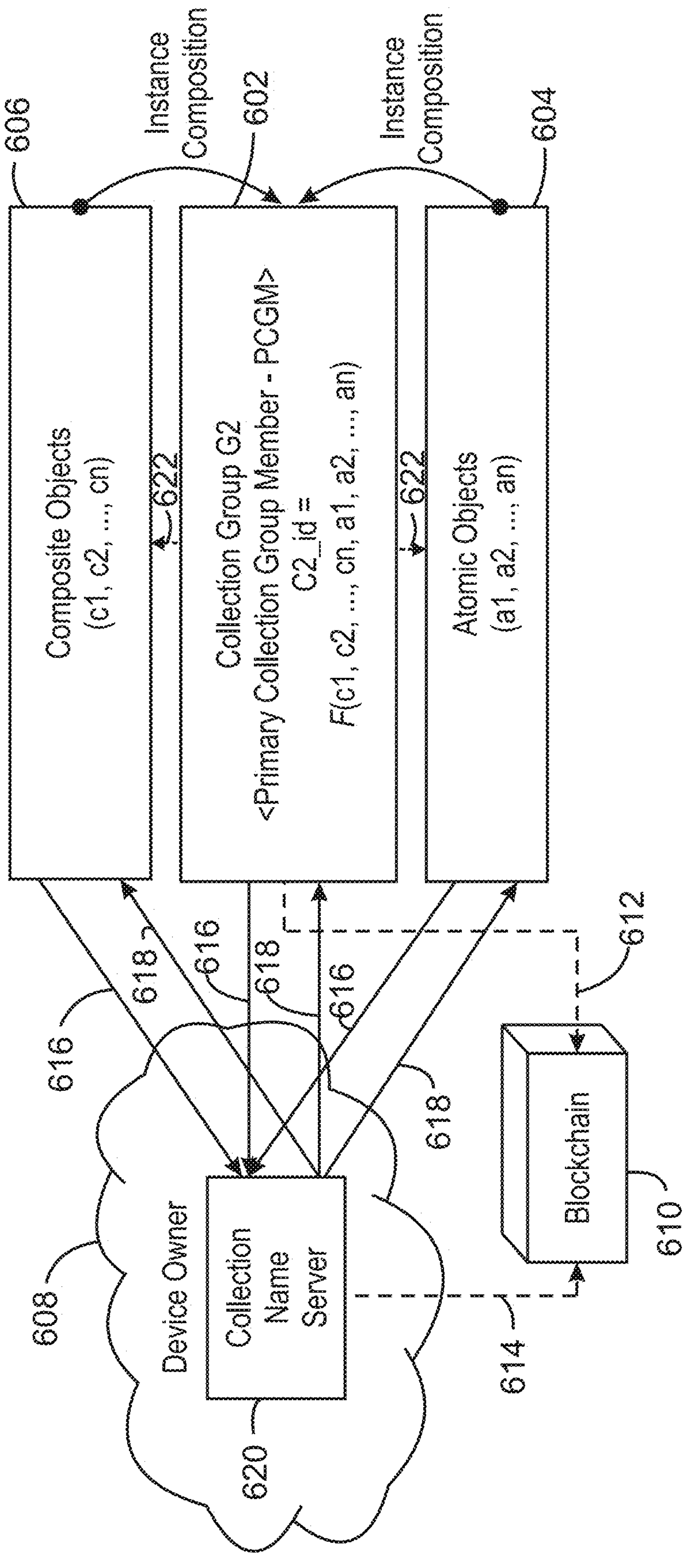
FIG. 6 is a schematic drawing of the formation of a group object from a collection of atomic objects and composite objects in accordance with some embodiments.

FIG. 6 is a schematic drawing 600 of the formation of a group object 602 from a collection of atomic objects 604 and composite objects 606. The group object 602 belongs to an object class, which is a subset of the object type. An object class, for example, might be a heat exchanger, while an object type of the class heat exchanger may be a more specific device, such as a refrigerator, a heat pump, an air-conditioner, an evaporative cooler, and the like.

Authenticating an object class may be facilitated using EPID (Enhanced Privacy ID), which is an asymmetric encryption system involving a single public key matched to multiple private keys. A signature generated by any of the private keys can be verified with the single public key. Thus, the group object 602 may have a single public key, while each of the atomic objects 604 and composite objects 606 are issued a unique private ID. The system is not limited to using EPID, but may use other identification techniques, such as shared access signatures.

If an object class is associated with a number corresponding to an EPID group ID (gid) and object instances of the same type are issued private keys corresponding to the EPID group, object instances may authenticate its class to a verifier. Object class authentication is a form of attestation that allows others to interact with the object based on typed rules. This is also known in the industry as type-enforcement. Construction of a composite object class identifier using the type identifiers of its component objects is an object type extensibility method. For example, a function f( ) that accepts as arguments C=(c1, c2, c3, . . . cn), where cX are the object types for each of its component objects, produces an EPID gid value, C2_id, that represents the type identifier of the composite object. The implementation of f( ) may include using a cryptographic hash of each cx in C. In another example, f( ) may use an OID (Object Identifer) naming hierarchy where each cx is an OID subtree of a parent OID for C. There may be other methods for computing f( ) as well.

Extensible composite object class identifiers allow systems of IoT objects to be combined at any time during the lifetime of the device owner 608 hosting the objects. A blockchain 610 may track the evolution of composed objects such that authoring tools may be informed by pre-existing compositions. A distributed schema library may be formed using the blockchain 610 by supplying a transaction 612 registering the object type identifier, e.g., gid, with the composite object definition, for example, C. Current centralized object repository schemes often depend on a single logical service that authoritatively maintains class definitions on central servers. However, a modification to the central servers could result in unauthorized schema changes. In comparison, the use of a blockchain 610 may ensures a threshold consensus exists across a number of IoT devices, for example, in a fog, before an existing object class definition can be changed.

The blockchain 610 facilitates identification of isomorphic object classifications. When a new object class is proposed, for example, in a message 614, the blockchain 610 can be searched to see if C already exists.

Composing a group object 602 from sub-objects, forming composite objects, is an extensibility mechanism for a IoT object model. Composed objects can be named using a function that relates the sub-objects, such as "intersection XYZ". The collection of object instances may form the group object 602 when each proposed member of the group sends a message 616 to obtain a message 218 including the credential that identifies the collection. When EPID is used as the credentialing mechanism, each object in the collection can interact with each other or other IoT devices as an agent of the collection.

The blockchain 610 is used by the system to remove the need for trust from the Name Server 620. If a group name is reused while a group of the same name is currently in use, the blockchain 610 may police the misfeasance of the Name Server 620. The reuse of a group name may be determined by the IoT devices that are storing and monitoring the blockchain 610. This determination may be made by identifying that a current name request overlaps a previous block that is active and includes the group name.

In some aspects, the primary collection group member (PCGM), or group object 602, is configured to determine the group name based on the particular configuration of the collection. The PCGM communicates 622 the group name to other collection members, for example, the composite objects 606 and the atomic objects 604, or another collection member, performs the same operations as the PCGM to arrive at the same group name. A function F( ) may compute the collection group name, C2_id, using a set membership logic so as to avoid differences in introspection order non-determinism when different members separately compute a group name.

As an example, the EPID group ID (gid) may take a 32-bit or 128-bit value. When a 32-bit value is used, the function F( ) may truncate the high-order 12 bytes. The Name Server 620 may verify if the gid is re-issued regardless of gid length. Shorter gid lengths may be useful in constrained environments, such as using more limited IoT devices. Though name collisions from F( ) may be rare, collision resolution may be achieved by recursive invocation of F( ) again supplying the group membership values (e.g., F'=F(m1, m2, . . . , mn, F(m1, m2, . . . , mn)).

Figure 7:
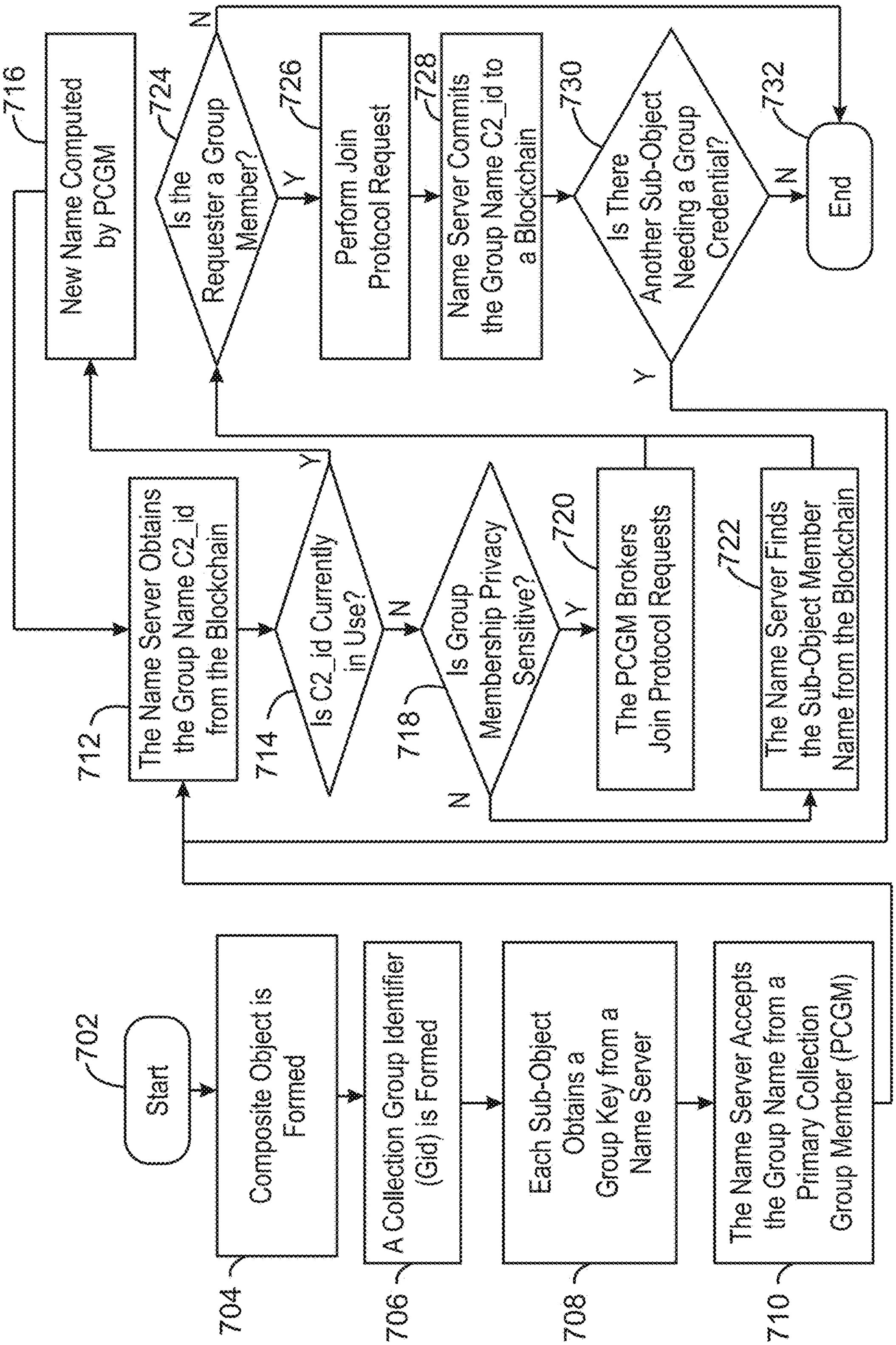
FIG. 7 is a process flow diagram of an example method for group creation using a collection of objects in accordance with some embodiments.

FIG. 7 is a process flow diagram of an example method 700 for group creation using a collection of objects in accordance with some embodiments. The method 700 may be run using the system 802 described with respect to FIG. 8. The block 702 represents, for example, when a new group object is desired. This may occur when a transient object moves proximate to a current group object, as described with respect to the emergency cluster of FIG. 4, which may be formed when an emergency vehicle approaches a street. In another example, the powering of a device, such as the refrigerator described with respect to FIGS. 5 and 6, may initiate the creation of a group object.

At block 704, a composite object is formed by maintaining a reference to the ID of each of the atomic (A) or composite (C) sub-objects that will make up the group object in a list in the primary collection group member (PCGM) of the composite object. The objects making up the composite object may be determined by the objects needed to accomplish the function, as determined by a consensus of the objects, by a previous program in a device owner, or by any number of other techniques, such as constructing an object with a number of IoT devices.

At block 706, a collection group identifier is formed. This may be done by applying a function to the list of object IDs in the PCGM that make up the group object. The function may combine and form a hash code of the object IDs, for example, C2_ID=SHA2 (C1, C2, C3, . . . , A1, A2, A3, . . . , An).

At block 708, one or more of the sub-objects (for example, all of the sub-objects) communicates with a name server, for example, in the device owner, to obtain a group key. This may be performed by using an EPID join protocol. In the join protocol, the sub-object sends a join message to the name server, and receives an EPID credential, for example, for the C2_ID group object, in return.

At block 710, the group name server accepts the name calculated for the group from the list in the PCGM. The name server may then commit the name to a blockchain. At block 712, the name server gets the name, e.g., C2_ID, from the blockchain. As used herein, the blockchain is a distributed database of transactions saved at a number of individual IoT devices. The confirmation of the validity of the transactions may be performed by each of the IoT devices, providing multiple confirmations of authenticity and identity.

At block 714, a determination is made as to whether the name is already in use, for example, present in an earlier transaction block with no corresponding expiration of the name for the object. If so, at block 716, a new name may be determined by recursive invocation of F( ), again supplying the group membership values, F'=F(m1, m2, . . . , mn, F(m1, m2, . . . , mn)).

If the name is not in current use, at block 718 a determination is made as to whether the group membership is privacy sensitive. This may be performed if the presence of an IoT device at a location should not be public knowledge, such as a vehicle being present at a series of intersections. If so, at block 720 the PCGM acts as a proxy, brokering join protocol requests from sub-objects. If not, at block 722, the name server finds the sub-object member name from the blockchain.

At block 724, a determination is made as to whether a requester is an authorized group member. If so, at block 726 a join request is performed. At block 728, the name server commits the group name, e.g., C2_ID to a blockchain.

At block 730, a determination is made as to whether another sub-object exists and, thus, needs a group credential. If so, process flow returns to block 712 for the credentialing of the sub-object. If not, or if it was determined that a requester was not an authorized group member, the process ends at block 732.

Figure 8:
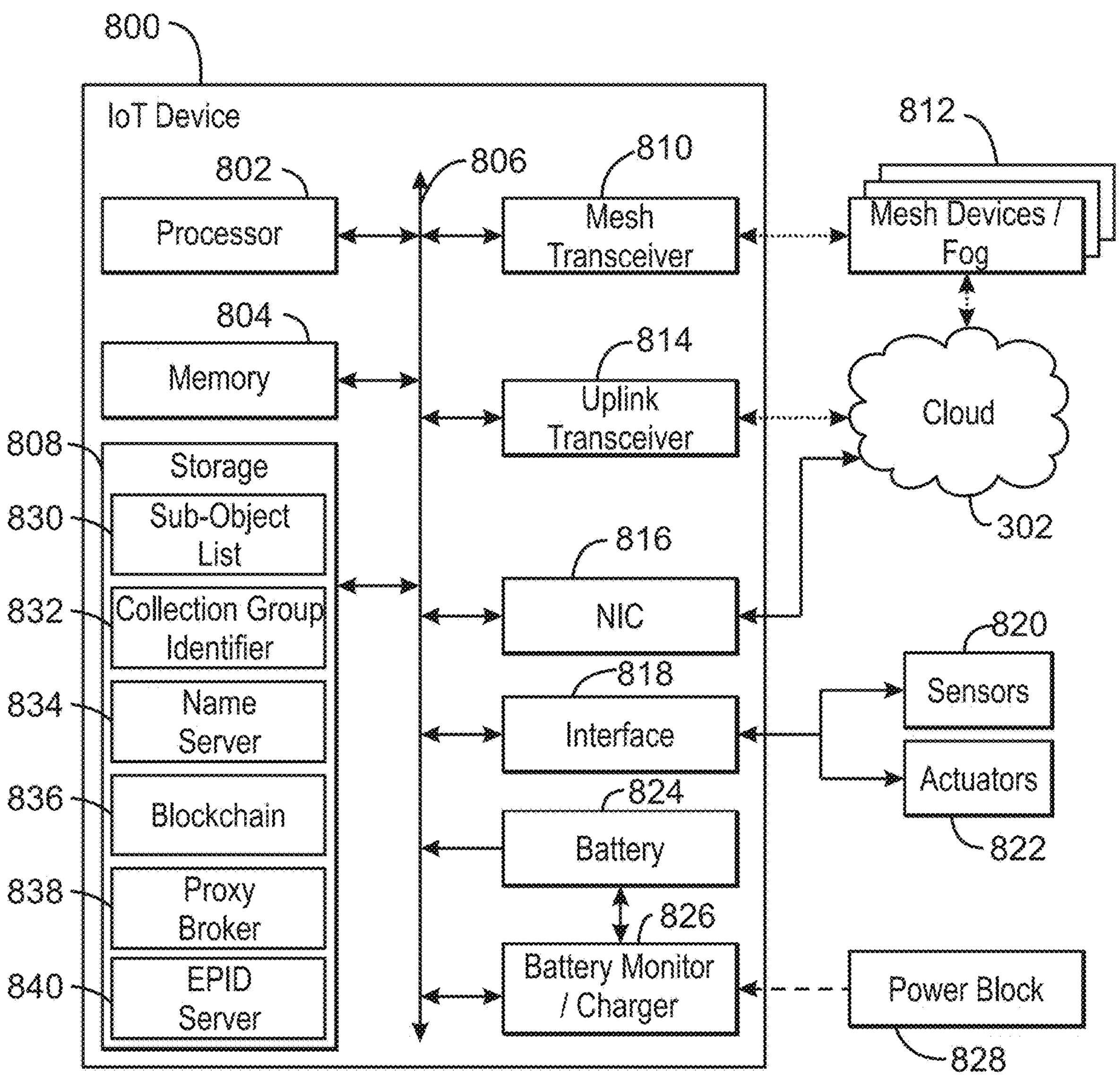
FIG. 8 is a block diagram of an example of components that may be present in an IoT device for offloading data in accordance with some embodiments.

FIG. 8 is a block diagram of an example of components that may be present in an IoT device 800 for offloading data. The IoT device 800 may include any combinations of the components shown in the example. The components may be implemented as ICs, portions thereof, discrete electronic devices, or other modules, logic, hardware, software, firmware, or a combination thereof adapted in the IoT device 800, or as components otherwise incorporated within a chassis of a larger system. The block diagram of FIG. 8 is intended to show a high level view of components of the IoT device 800. However, some of the components shown may be omitted, additional components may be present, and different arrangement of the components shown may occur in other implementations.

The IoT device 800 may include a processor 802, which may be a microprocessor, a multi-core processor, a multi-threaded processor, an ultra-low voltage processor, an embedded processor, or other known processing element. The processor 802 may be a part of a system on a chip (SoC) in which the processor 802 and other components are formed into a single integrated circuit, or a single package, such as the Edison™ or Galileo™ SoC boards from Intel. As an example, the processor 802 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 802 may communicate with a system memory 804 over a bus 806. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 808 may also be coupled to the processor 802 via the bus 806. To enable a thinner and lighter system design, the mass storage 808 may be implemented via a solid state drive (SSD). Other devices that may be used for the mass storage 808 include flash memory cards, such as SD cards, microSD cards, xD picture cards, and the like, and USB flash drives.

In low power implementations, the mass storage 808 may be on-die memory or registers associated with the processor 802. However, in some examples, the mass storage 808 may be implemented using a micro hard disk drive (HDD). Further, any number of new technologies may be used for the mass storage 808 in addition to, or instead of, the technologies described, such resistance change memories, phase change memories, holographic memories, or chemical memories, among others. For example, the IoT device 800 may incorporate the 3D XPOINT memories from Intel® and Micron®.

The components may communicate over the bus 806. The bus 806 may include any number of technologies, including industry standard architecture (ISA), extended ISA (EISA), peripheral component interconnect (PCI), peripheral component interconnect extended (PCIx), PCI express (PCIe), or any number of other technologies. The bus 806 may be a proprietary bus, for example, used in a SoC based system. Other bus systems may be included, such as an $I^2C$ interface, $I^3C$ interface, an SPI interface, point to point interfaces, and a power bus, among others.

The bus 806 may couple the processor 802 to a mesh transceiver 810, for communications with other mesh devices 812. The mesh transceiver 810 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 812. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 810 may communicate using multiple standards or radios for communications at different range. For example, the IoT device 800 may communicate with geographically proximate devices, e.g., within about 10 meters, using a local transceiver based on BLE, or another low power radio, to save power. More distant mesh devices 812, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 810 may be incorporated into an MCU as an address directly accessible by the chip, such as in the Curie® units available from Intel.

An uplink transceiver 814 may be included to communicate with devices in the cloud 302. The uplink transceiver 814 may be LPWA transceiver that follows the IEEE 802.15.4, IEEE 802.15.4g, IEEE 802.15.4e, IEEE 802.15.4k, or NB-IoT standards, among others. The IoT device 800 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 810 and uplink transceiver 814, as described herein. For example, the radio transceivers 810 and 812 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 810 and 812 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 814, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 816 may be included to provide a wired communication to the cloud 302 or to other devices, such as the mesh devices 812. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 816 may be included to allow connect to a second network, for example, a NIC 816 providing communications to the cloud over Ethernet, and a second NIC 816 providing communications to other devices over another type of network.

The bus 806 may couple the processor 802 to an interface 818 that is used to connect external devices. The external devices may include sensors 820, such as accelerometers, level sensors, flow sensors, temperature sensors, pressure sensors, barometric pressure sensors, and the like. The interface 818 may be used to connect the IoT device 800 to actuators 822, such as power switches, valve actuators, an audible sound generator, a visual warning device, and the like.

While not shown, various input/output (I/O) devices may be present within, or connected to, the IoT device 800. For example, a display may be included to show information, such as sensor readings or actuator position. An input device, such as a touch screen or keypad may be included to accept input.

A battery 824 may power the IoT device 800, although in examples in which the IoT device 800 is mounted in a fixed location, it may have a power supply coupled to an electrical grid. The battery 824 may be a lithium ion battery, a metal-air battery, such as a zinc-air battery, an aluminum-air battery, a lithium-air battery, a hybrid super-capacitor, and the like.

A battery monitor/charger 826 may be included in the IoT device 800 to track the state of charge (SoCh) of the battery 820. The battery monitor/charger 826 may be used to monitor other parameters of the battery 824 to provide failure predictions, such as the state of health (SoH) and the state of function (SoF) of the battery 824. The battery monitor/charger 826 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 826 may communicate the information on the battery 824 to the processor 802 over the bus 806. The battery monitor/charger 826 may also include an analog-to-digital (ADC) convertor that allows the processor 802 to directly monitor the voltage of the battery 826 or the current flow from the battery 824. The battery parameters may be used to determine actions that the IoT device 800 may perform, such as transmission frequency, mesh network operation, sensing frequency, and the like.

A power block 828, or other power supply coupled to a grid, may be coupled with the battery monitor/charger 826 to charge the battery 824. In some examples, the power block 828 may be replaced with a wireless power receiver to obtain the power wirelessly, for example, through a loop antenna in the IoT device 800. A wireless battery charging circuit, such as an LTC4020 chip from Linear Technologies of Milpitas, Calif., among others, may be included in the battery monitor/charger 826. The specific charging circuits chosen depend on the size of the battery 824, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 828 may be augmented or replaced with solar panels, a wind generator, a water generator, or other natural power systems.

The mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a sub-object list 830 of atomic objects and composite objects that may be used to form a group object. A collection group identifier 832 may use the sub-object list 830 to generate a group id, for example, using a hash formula on the sub-object list 830.

A name server 834 may be included to provide name support and commit names to the blockchain 836. The name server 834 may confirm that the name selected is not in current use, and issue credentials to sub-objects to act on behalf of the group object.

The blockchain 836 includes a transactional database that includes blocks of data that have transactions corresponding to names of group objects, the sub-objects forming the group object, and the current status of the group objects, such as formed, evolved, or dissolved. In addition to identification information, the blockchain 836 may include authorization information, such as public encryption keys for group objects and sub-objects. A copy of the blockchain 836 may be kept on a portion or all of the IoT devices in a mesh network. This allows other IoT devices to confirm changes in the blockchain 836 and flag any attempts to change the blockchain 836 without proper authorization. Although used for group identification transactions in this example, the blockchain 836 may be used for any number of other transactions related to security, payments, transactions, and the like, as described herein, A proxy broker 838 may provide credentials from the blockchain 836 to sub-objects for a group object if the composition of the group is to be considered private. This may be used, for example, to increase the security of IoT networks located in public places, such as intersections and streets.

An EPID server 840 may be included to provide encryption services, such as encrypting and decrypting data using a public or private key. Further, the EPID server 840 may provide public keys or other credentials that can be used to authorize sub-objects to act on behalf of a group object, as well as acting as a key verification server. The EPID server 840 may also be used in other applications to form and issue keys, or to generate type identities, as discussed with respect to FIGS. 10 to 15.

Figure 9:
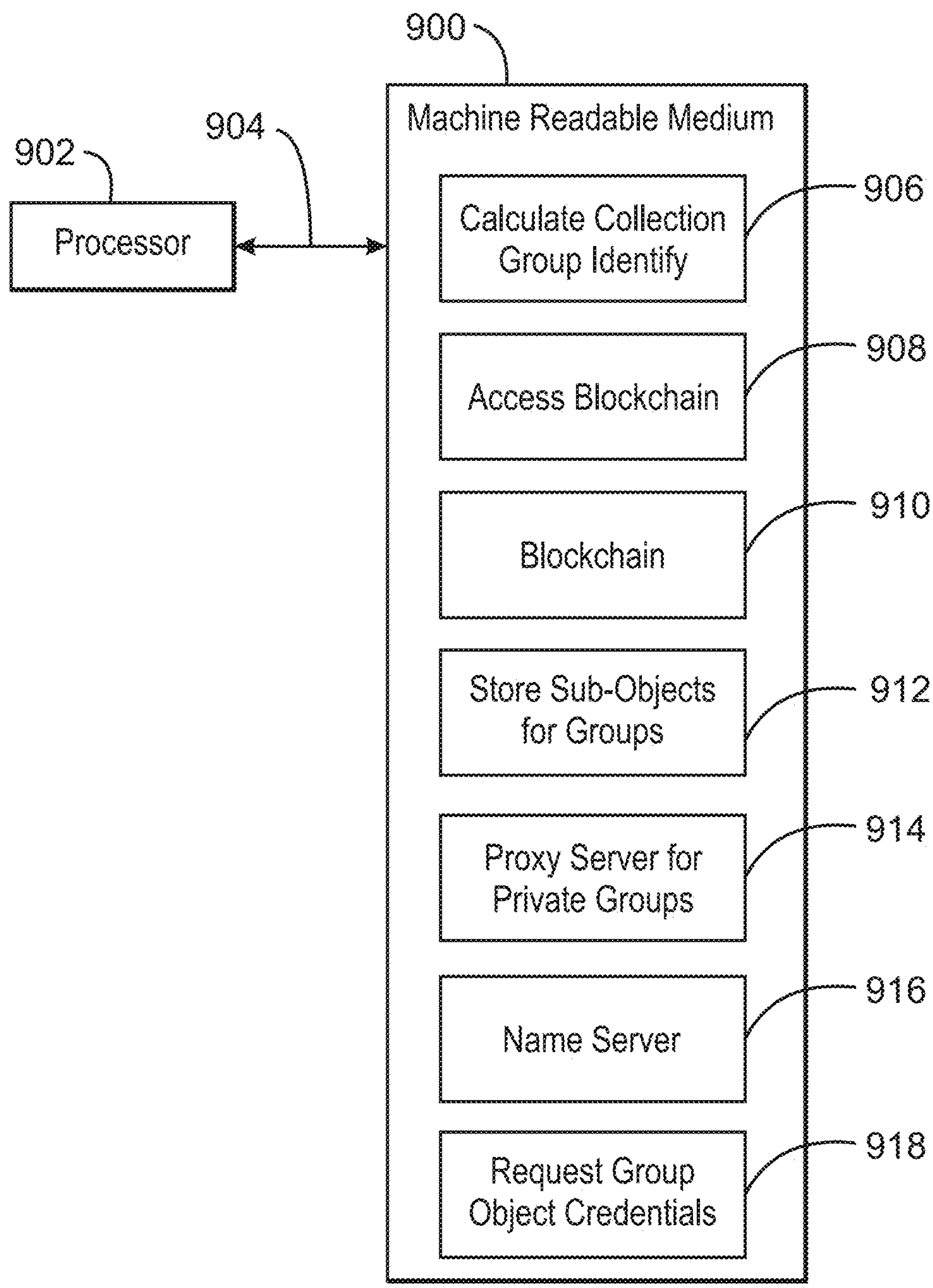
FIG. 9 is a block diagram of a non-transitory, machine readable medium including code to direct a processor to form group objects in accordance with some embodiments.

FIG. 9 is a block diagram of an exemplary non-transitory, machine readable medium 900 including code to direct a processor 902 to form group objects in accordance with some embodiments. The processor 902 may access the non-transitory, machine readable medium 900 over a bus 904. The processor 902 and bus 904 may be selected as described with respect to the processor 802 and bus 806 of FIG. 8. The non-transitory, machine readable medium 900 may include devices described for the mass storage 808 of FIG. 8 or may include optical disks, thumb drives, or any number of other hardware devices.

The non-transitory, machine readable medium 900 may include code 906 to direct the processor 902 to calculate a group name from a list of sub-objects, for example, as described with respect to FIGS. 6 and 7. Code 908 may be included to direct the processor 902 to access a blockchain 910, for example, for determining if a group object name is in the blockchain 910, and, if so, the status of the group object. The code 908 may also direct the processor 902 to commit transactions to the blockchain 910 once the name has been confirmed. The code 908 may also direct the processor 902 to migrate changes to the blockchain 910 to other units in an IoT network.

The machine readable medium 900 may include code 912 to direct the processor 902 to store the identities of sub-objects for the group object in a list. The code 912 may also direct the processor to determine if requests to join the group are from authorized sub-objects. If so, the code 912 may also direct the processor to issue credentials to the requesting sub-objects. The machine readable medium 900 may include code 914 to direct the processor to act as a proxy server for providing credentials to sub-objects for a privacy-protected group object.

The machine readable medium 900 may include code 916 to direct the processor 902 to act as a name server for a group object. The machine readable medium 900 may include code 918 to direct the processor 902 to request credentials to join a group, for example, as a sub-object.

Figure 10:
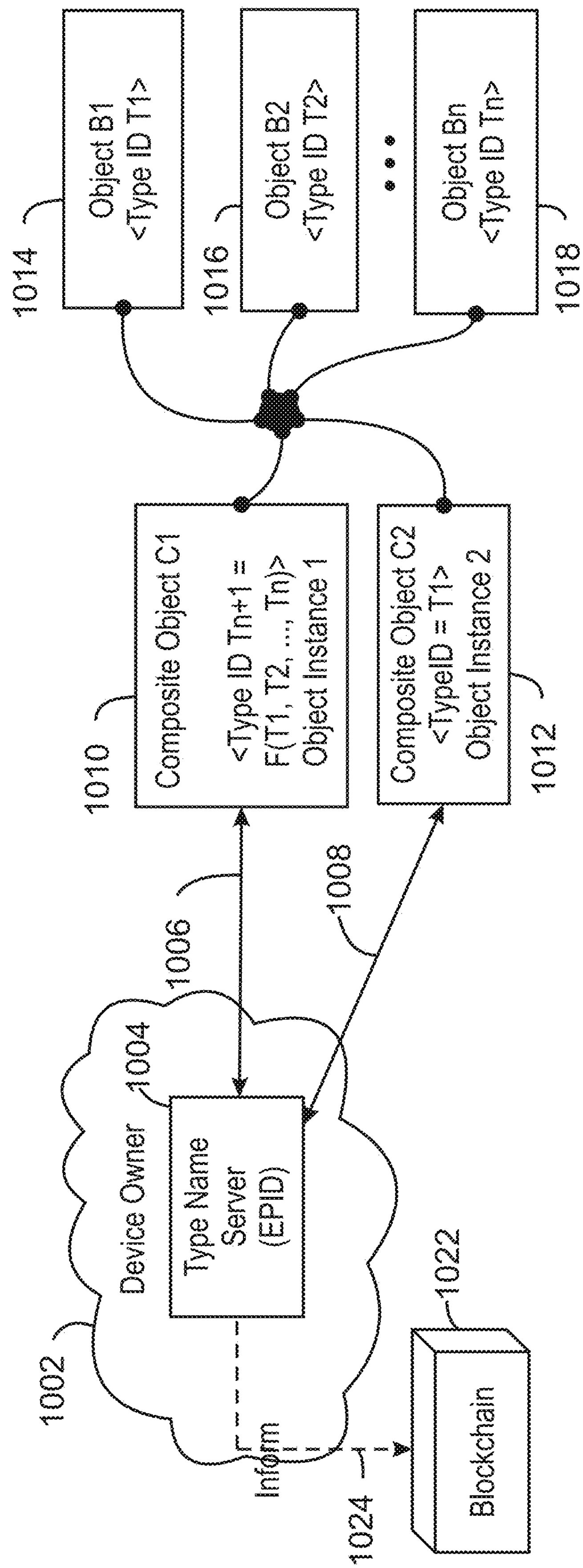
FIG. 10 is a schematic drawing showing the use of Enhanced Privacy Identification (EPID) for object type identity in accordance with some embodiments.

FIG. 10 is a schematic drawing 1000 showing the use of EPID for object type identity in accordance with some embodiments. A device owner 1002 includes a type name server 1004 that enrolls new types based on enrollment requests 1006 or 1008 from composite objects 1010 or 1012. As used herein, enrolling a type or object means registering the type or object in a database or list of types or objects. For example, the enrollment may include sending a transaction to a blockchain to store the type. A new object type, Tn+1, can be derived through composition of a composite group 1010 or 1012 from sub-objects 1014 to 1018. The type names for the sub-objects 1014 to 1018 may be used to form a new type name for the composite objects 1010 or 1012.

The composite object 1010 or 1012 may dynamically determine a type name by inspecting the sub-objects 1014 to 1018 with which it interacts. Two methods may be used for inspecting the configuration of a sub-object 1014 to 1018. A first method, as described with respect to the ladder diagram of FIG. 12, uses introspection. In introspection, the IoT object, or other device with a resource model definition, may describe itself when requested. For example, the IoT object can be configured to provide the structures, interfaces and semantics implemented by the object when requested. In some aspects, the IoT object can describe the structures, interfaces and semantics using a data model language (DML) such as XML Schema, JSON Schema, and/or YANG. The actual implementation may not directly interpret the data model as this could imply slow execution. But testing can be used to show the DM produced by introspection matches the behavior implemented.

Figure 13:
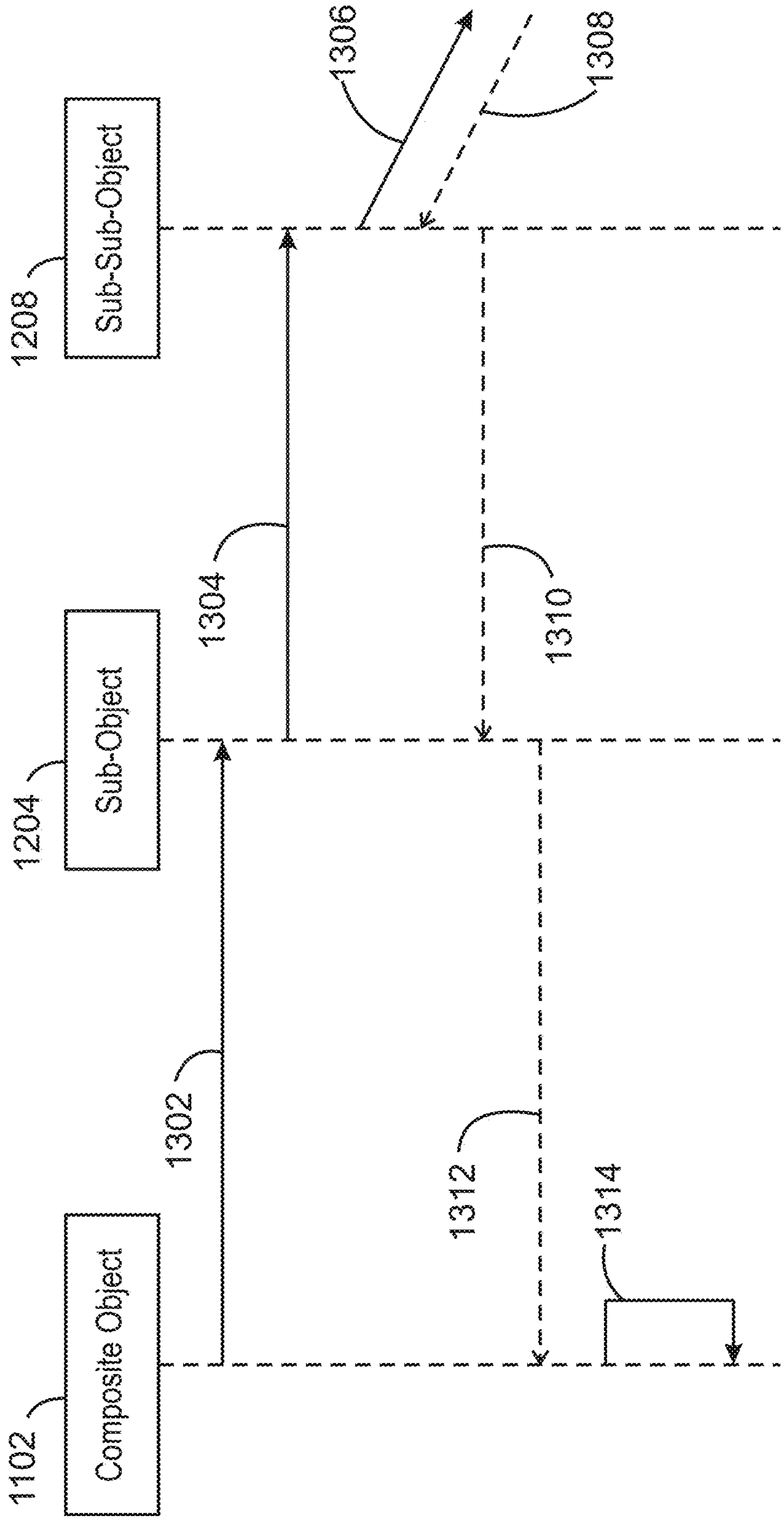
FIG. 13 is a ladder diagram of an example method for recursive type attestation in accordance with some embodiments.

A second method, as described with respect to the ladder diagram of FIG. 13, may use attestation to validate the integrity, credentials, or identity of the device. As used herein, attestation is a secure method for disclosing the trust properties of a device or platform, in which the device or platform self-reports the trust properties. The trust properties may include the platform manufacturer, certifications achieved by the vendor that reflect security hardening, such as FIPS140-2 for crypto module implementation. Further, ISO9000 may be relevant, as well as vendor processes followed to ensure quality. Attestation typically reveals the hardware, firmware and software versions and patch levels. It may reveal information about keys that are protected by the hardened environment, such as a trusted execute environment (TEE), and information about key types. For example, a hardened environment may use a trusted platform module (TPM) to define key types where one type of key cannot be migrated out of the TPM, to a less hardened cryptographic module.

Both introspection and attestation may produce a set containing object membership based on sub-object typing. Further, the two methods may be used together, for example, using the attestation key to confirm that the introspection identity came from a particular unit. All IoT objects are typed, though not all may have a credential that authenticates the type.

Figure 12:
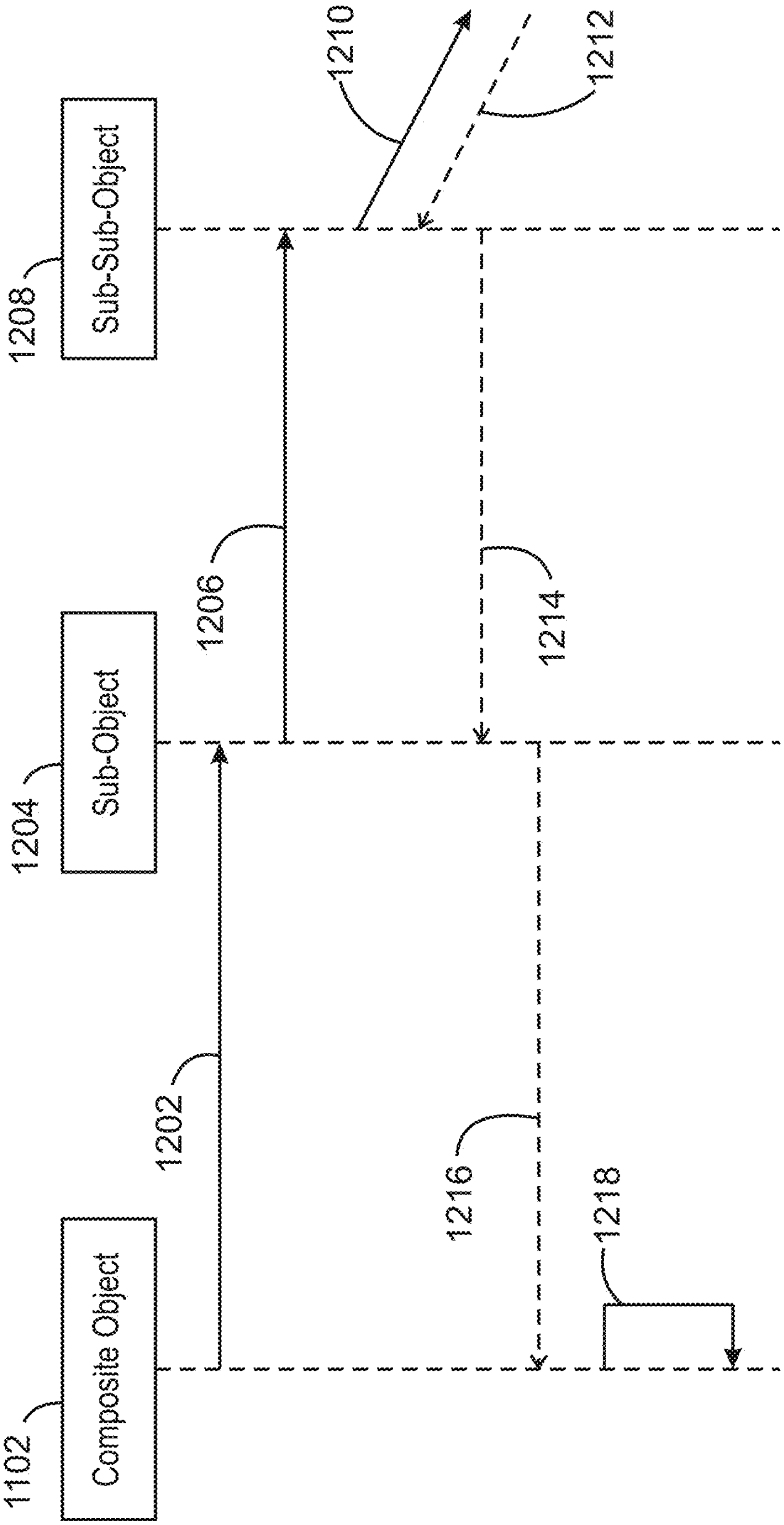
FIG. 12 is a ladder diagram of an example method for type introspection using recursion in accordance with some embodiments.

A method for deriving new object type names, for example, as described with respect to the ladder diagram of FIG. 12, supports the automated generation of object types. Auto-generation allows useful collections of objects to form a pattern for object replication. A useful collection may then be instantiated more easily elsewhere in the network using the type name and pattern as input parameters.

The type name server 1004 may use EPID to authenticate the object type identifier by admitting each instance of the same type object into an EPID group using the type name as the group ID. A blockchain 1022 can be used to record the creation of dynamically derived types, for example, by committing a transaction 1024 from the type name server 1004, so that objects of the same type can be instantiated reliably without isomorphic redundancy.

Figure 11:
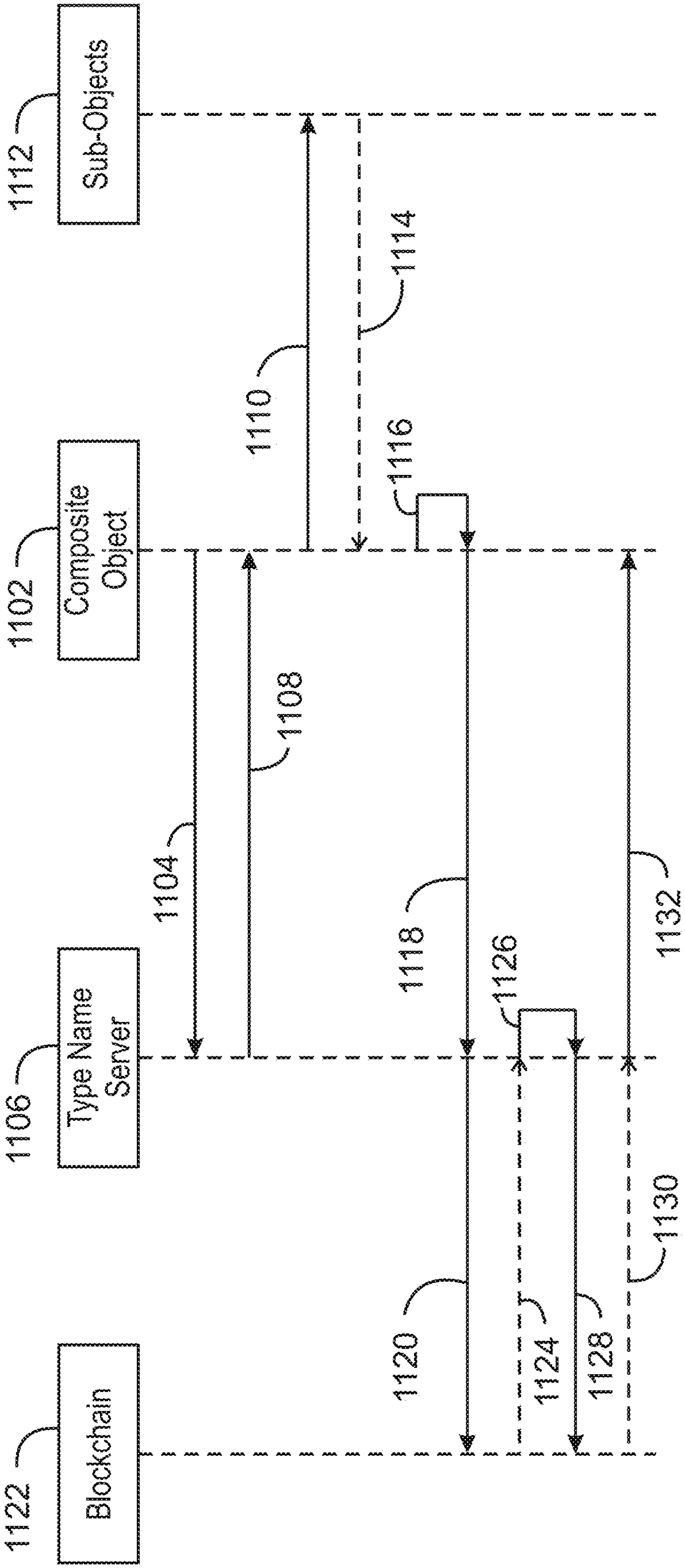
FIG. 11 is a ladder diagram of an example method for dynamic creation of an object type in accordance with some embodiments.

FIG. 11 is a ladder diagram of an example method 1100 for dynamic creation of an object type in accordance with some embodiments. The method 1100 of FIG. 11 may be implemented by the IoT device 1400 described with respect to FIG. 14. In step 1104, a composite object 1102 can send a request 1104 to create a type group, e.g., T1, to a type name server 1106. A type name server 1106 may be included in a device owner 1002, as described with respect to FIG. 10, or may be in a central or separate device, such as an aggregator 406, described with respect to FIG. 4.

In step 1108, the type name server 1106 responds to the composite object 1102 with a request for type introspection. In step 1110, the request triggers a recursive sending of requests to sub-objects 1112 to provide introspection or attestation information. The sub-objects 1112 respond 1114 with the requested information. Once the recursion is completed, the composite object 1102 may calculate a type name 1116 from the types of all of the sub-objects 1112, for example, as T1=F(t1, t2, t3, . . . , tn). The composite object 1102 may then attest the type using the object instance key in an EPID join request 1118 to the type name server 1106.

The type name server 1106 sends a request 1120 to the administrator of the blockchain 1122 for a previous instantiation of the creation event. A message 1124 may be received from the administrator of the blockchain 1122 indicating that the type already exists. This may also be performed by a determination by the type name server 1106 that a previous type has already been created with that name and is present in the blockchain 1122.

If the type is not created, the type name server issues 1126 a request 1128 to create the type in the blockchain 1122. This may be done by committing the creation transaction to the instantiation of the blockchain 1122 residing in the IoT device that hosts the type name server 1106.

In some examples, other IoT devices storing the blockchain 1122 may fail to validate the new creation, for example, locating another instantiation of the type in the blockchain 1122 they have stored. If a majority fail to validate the creation, it is rejected, and the blockchain 1122 reverts to the previous chain. The type name server 1106 may then rename 1126 the type and retry the creation 1128.

If the creation is successful, for example, as indicated by a message 1130 received from the administrator of the blockchain 1122 or by confirmation of the new blockchain 1122 by a majority of IoT devices, the type name server 1106 may then issue an EPID join request 1132 to the composite object 1102. The EPID join request 1132 includes the EPID credentials for the type. These may be shared with the sub-objects 1112 directly by the composite object 1102, or the sub-objects 1112 may send a join request with the new type name to have the type name server 1106 provide the credentials.

FIG. 12 is a ladder diagram of an example method 1200 for type introspection using recursion in accordance with some embodiments. Like numbered items are as discussed with respect to FIG. 11. The method 1200 of FIG. 12 may be implemented by the IoT device 1400 described with respect to FIG. 14. The introspection provides a connection graph stemming from a composite object to leaf objects. Leaf objects are otherwise known as atomic objects because they do not have sub-objects.

In step 1202, the composite object 1102 can send a command 1202 to a sub-object 1204 to instruct the sub-object 1204 to perform an introspection. If the sub-object 1204 is an atomic object, it returns a signature as identification of type. If the sub-object 1204 is, itself, a composite object, it sends a command 1206 to each sub-sub-object 1208 forming the sub-object 1204 to perform an introspection. This occurs recursively from the composite object 1102 to each sub-object 1204 and from each sub-object 1204 to each sub-sub-object 1208, as indicated by a command 1210 sent to a lower layer, and a type graph 1212 or 1214 returned from the lower layer.

Introspection uses recursion as a method for walking a sub-object graph. The recursion halts given one of two possible conditions, first if an atomic object is encountered and second if an already encountered object is encountered again. Recursive walking of the sub-object graph produces a tree (directed acyclic graph) consisting of at least and at most one way to reach every node in the graph. The type graph may have the format G=(gn), $[G]K_{n\_instance}$, in which gn is the group number, [G] is the group name, and $K_{n\_instance}$ is the key for the specific group. Upon return from the recursive walk of the tree, the current node populates an entry in a manifest forming a tree structure containing the object's type information. If the object possesses an instance key, the type information is signed. Thus the sub-sub-object 1208 may return a type graph of the format G'=(gn+1|gn), $[G']K_{n\_instance}$ to the sub-object 1204. Once all sub-sub-objects 1208 have returned their types, or type graphs to the sub-object 1204, it may return its own type graph 1216 to the composite object 1102, for example, G"=(gn+2|gn+1|gn), $[G'']K_{n\_instance}$.

The resultant manifest is used by the composite object 1102, as the root object, to generate 1218 its own type name. This may also include a locally scoped property name as input to the function F( ) used to generate a type name. The manifest may be supplied to a Type Name Server 1106, as discussed with respect to FIG. 11, which may verify the signatures and construction of the type name. The Type Name Server 1106 may check for a prior type name reservation in a blockchain. If an original type name is found and a credential is issued, a blockchain may be updated enabling independent verification of type name reservation status.

FIG. 13 is a ladder diagram of an example method 1300 for recursive type attestation in accordance with some embodiments. The method 1300 of FIG. 13 may be implemented by the IoT device 1400 described with respect to FIG. 14 Recursive object attestation is similar to recursive object introspection with the distinction that type information may be signed using a type name credential, for example, programmed into the device, or formed from a credential programmed into the device. When the object type credential is used, the type name may identify a previously enrolled type, hence a blockchain may contain a historical record of its type hierarchy. Accordingly, use of a type credential may halt recursion. In an embodiment of recursive object attestation, authenticated type termination may be ignored as a method for re-verifying a type hierarchy.

In step 1302, the composite object 1102 sends a command 1302 to a sub-object 1204 to instruct the sub-object 1204 to send an attestation credential. If the sub-object 1204 is an atomic object, it returns an object credential as identification of type. If the sub-object 1204 is, itself, a composite object, it sends a command 1304 to each sub-sub-object 1208 forming the sub-object 1204 to send an attestation credential. This occurs recursively from the composite object 1102 to each sub-object 1204 and from each sub-object 1204 to each sub-sub-object 1208, as indicated by a command 1306 sent to a lower layer, and a type graph 1308 returned from the lower layer. A similar type graph 1310 is returned from each sub-sub-object 1208 to the sub-object 1204. A type graph 1312 may then be returned from each sub-object 1204 to the composite object 1102. As for introspection, the composite object 1102 may then verify 1314 each signature.

Figure 14:
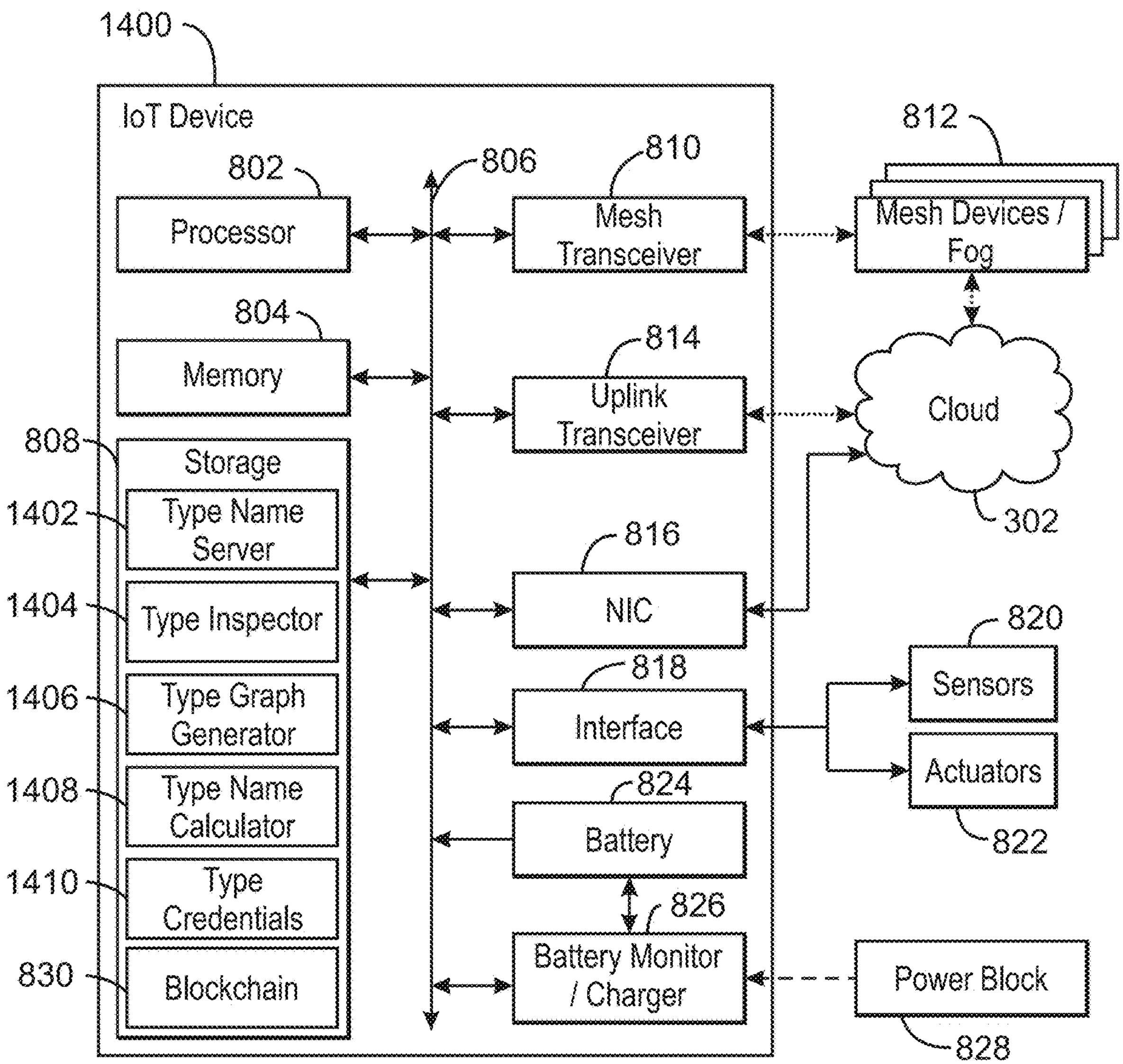
FIG. 14 is a block diagram of an example of components that may be present in an IoT device for assigning types to composite objects as they are formed in accordance with some embodiments.

FIG. 14 is a block diagram of an example of components that may be present in an IoT device 1400 for assigning types to composite objects as they are formed in accordance with some embodiments. Like numbered items are as described with respect to FIGS. 3 and 8. It can be noted that different components may be selected and used for the IoT device 800 discussed with respect to FIG. 8, and the IoT Device 1400 discussed with respect to FIG. 14.

The mass storage 808 may include a number of modules to implement the type creation functions described herein. Although shown as code blocks in the mass storage 808, it may be understood that any of the modules may be fully or partially replaced with hardwired circuits, for example, built into an application specific integrated circuit (ASIC). The mass storage 808 may include a type name server 1402 that lists atomic object types and composite objects types that may be used to form a group object. The type name server 1402 may issue a command to a type inspector 1404 to determine the types of sub-objects and sub-sub-objects forming a composite object. The type inspector 1404 may perform a recursive inspection of mesh devices 812 using introspection or attestation. A type graph generator 1406 may generate a type graph using the responses from the sub-objects and sub-sub-objects, including type graphs generated by lower level objects. A type name calculator 1408 may be used to generate a type name from the type graph generated, for example, by calculating a hash function of the entries in the type graph. Type credentials 1410 may be included to identify the type of the IoT device 1400. The type credentials 1410 may include credentials programmed into the device by the manufacturer, for example, for attestation, or credentials provided to the IoT device 1400 by another device, for example, for attestation. A combined type credential may be created, using a credential manufactured into the device to validate or encrypt a credential provided to the device.

A blockchain 836 may be included in the IoT device 1400 to record type name transactions, in addition to other information, such as group name transactions. As described herein, the blockchain 836 transactions may be validated by a majority vote of mesh devices 812 that are also storing copies of the blockchain 836.

Figure 15:
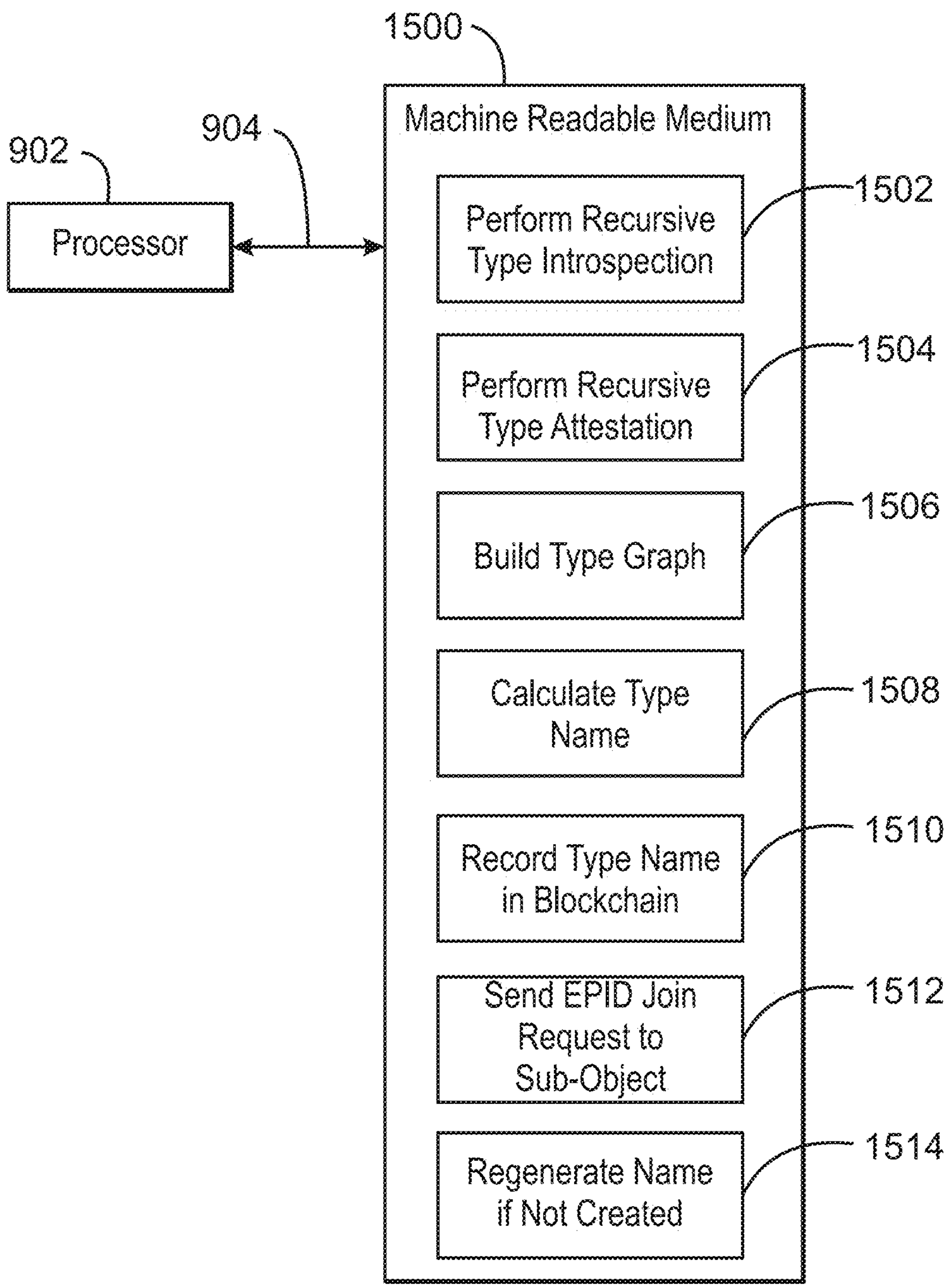
FIG. 15 is a block diagram of a non-transitory, machine readable medium including code to direct a processor to form group objects in accordance with some embodiments.

FIG. 15 is a block diagram of an exemplary non-transitory, machine readable medium 1500 including code to direct a processor 902 to form group objects in accordance with some embodiments. The processor 902 may access the non-transitory, machine readable medium 1500 over a bus 904. The processor 902 and bus 904 may be selected as described with respect to the processor 802 and bus 806 of FIG. 8. The non-transitory, machine readable medium 1500 may include devices described for the mass storage 808 of FIG. 8 or may include optical disks, thumb drives, or any number of other hardware devices.

The non-transitory, machine readable medium 1500 may include code 1502 to direct the processor 902 to perform a recursive type introspection to determine the types of devices in a composite object. Code 1504 may be included to direct the processor 902 to perform a sequential attestation to determine the types of devices in a composite object. Code 1506 may be included to direct the processor 902 to build a type graph with information returned from sub-objects and sub-sub-objects. Code 1508 may be included to direct the processor 902 to calculate a type name for the type, for example, calculating a hash function from the type graph. Code 1510 may be included to direct the processor 902 to determine if the type name is already in the blockchain and, if not, to commit the type name to the block chain. The code 910 may also direct the processor 902 to migrate changes to the blockchain stored in other devices in the mesh network. Code 1512 may be included to direct the processor 902 to send out EPID join requests to sub-objects create the type group. If the name is not created, for example, due to a redundancy or other fault in the blockchain records, code 1514 may be included to direct the processor 902 to regenerate the type name and repeat the commit process.

Figure 16:
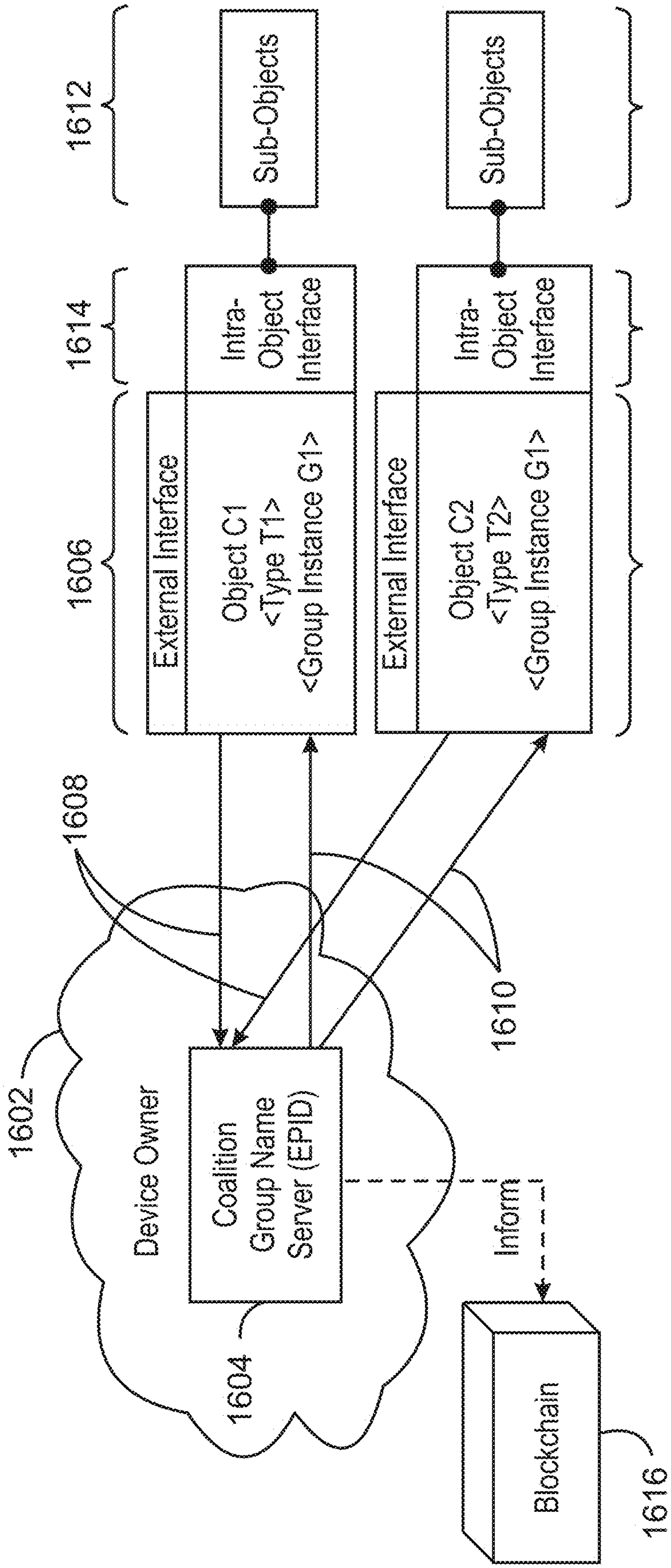
FIG. 16 is a schematic drawing of the formation of a coalition group in accordance with some embodiments.

FIG. 16 is a schematic drawing of the formation of a coalition group 1600 in accordance with some embodiments. IoT networks may form a loose coalition of objects that may not regularly interact, termed a coalition group 1600. However, labeling the objects as part of a group abstraction may provide semantic value. Coalition groups 1600 can be formed by administrative decisions, for example, to indicate a region, location, or general purpose, such as devices located on a floor or in an apartment in a single building. An administrative authority, such as a device owner 1602, may choose the group identifier that the grouped devices use, for example, through a coalition group name server 1604. Coalition group members 1606 may enroll in a coalition group 1600 by sending a join request 1608 to the device owner 1602. From the coalition group name server 1604, credentials 1610 may be provided to the group members, including EPID credentials. The credentials 1610 may be further provided to sub-objects 1612 by the coalition group members 1606, for example, through intra object interfaces 1614. The coalition group name may be accessed from a blockchain 1616, or committed to the blockchain 1616 upon creation.

A credential for a coalition group 1600 allows the coalition group member 1606 to authenticate without revealing a value that may be used for tracking privacy. Hence, criteria for membership may be esoteric where the size of the group is used to determine the degree of privacy risk associated with use of the credential.

Enrollment in a coalition group 1600 by an IoT device, or object, allows the object to inherit properties and attributes of the coalition group 1600. These properties and attributes for the coalition group members 1606 may not incorporate code, state or interfaces that process group properties and attributes. Nevertheless, other entities may name properties and attributes to sort, categorize, route, manage or perform analysis. In this sense, coalition grouping is a strategy for dynamic application of object meta-data.

Figure 17:
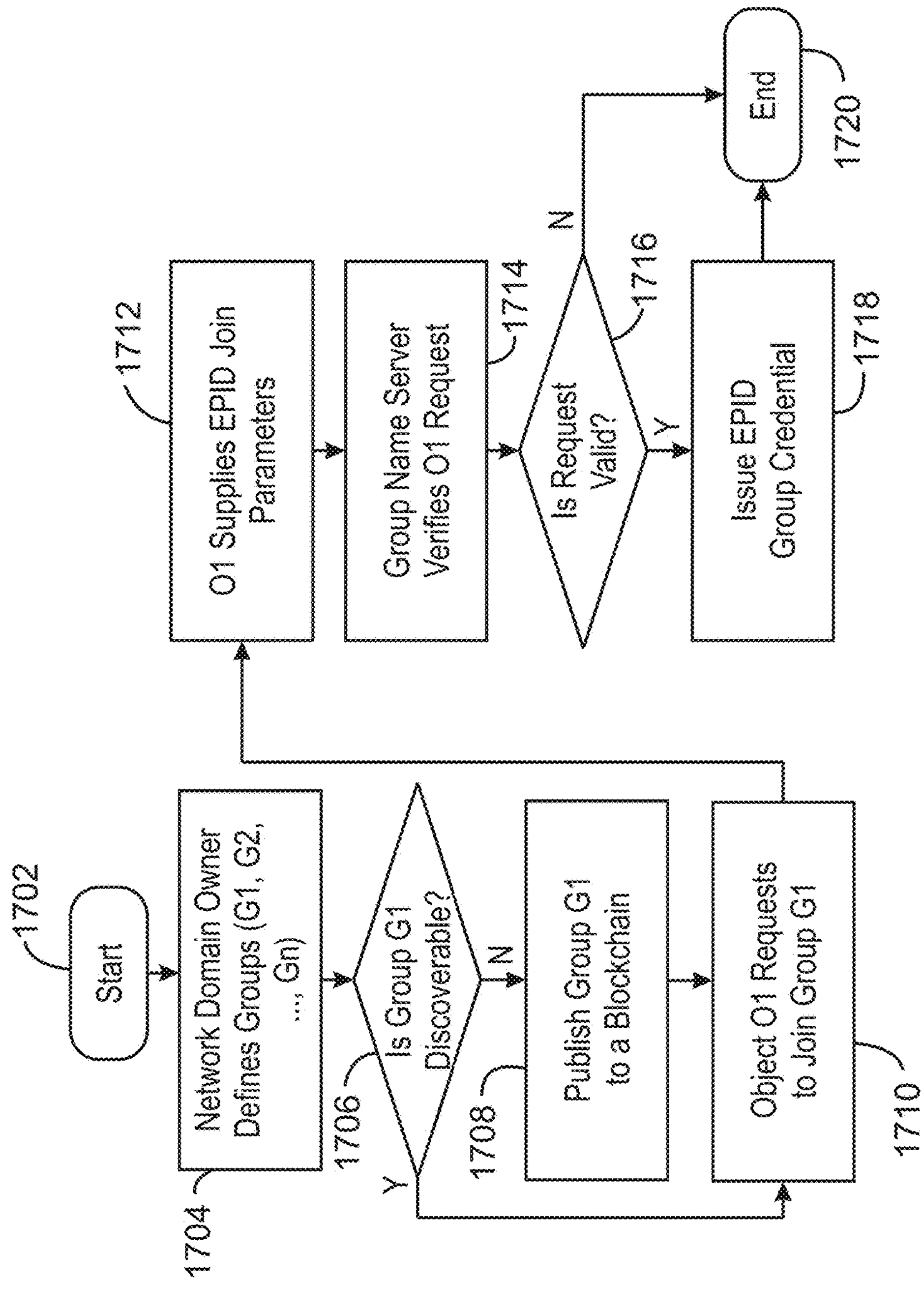
FIG. 17 is a process flow diagram of an example method for enrolling members in a coalition group in accordance with some embodiments.

FIG. 17 is a process flow diagram of an example method 1700 for enrolling members in a coalition group in accordance with some embodiments. The method 1700 of FIG. 17 may be implemented by the IoT device 1800 described with respect to FIG. 18. The block 1702 represents, for example, when a group of IoT devices are powered or otherwise activated, for example, when a virtual device is started. At block 1704, the network domain owner defines groups (G1, G2, . . . , Gn). A group may include a locality designation, such as upstairs, downstairs, and the like, or a functional designation, such as admin, climate control, and the like, and may include combinations of locality and function, such as evacuation, entry routes at a stadium, and the like. Any number of other designations may be used. Generally, the coalition group name is selected to provide useful metadata to a system.

At block 1706, a determination is made as to whether a group, for example, G1, is discoverable. If not, at block 1708, the group is published to a blockchain. At block 1710, a request may be received from an object, for example, O1, to join the group, G1. At block 1712, EPID join parameters may be received from the object, O1. These may be sent in response to a request from the group device owner.

At block 1714, a coalition group name server verifies the join request from O1. The request may be authenticated using any variety of credentials or techniques. For example, the coalition group name server may check the instance, authority, or type name credentials to determine if the values are in the blockchain. In higher security applications, all of the credentials may be required to be correct before allowing the device to join the coalition group. Similarly, in lower security applications, the coalition group name server may not require credentials in enroll a device in a coalition group. If the request is determined to be valid at block 1716, at block 1718, a coalition group credential, such as an EPID, may be issued to the object O1. If the request is not determined to be valid, the process ends at block 1720 without the issuance of the credentials.

Figure 18:
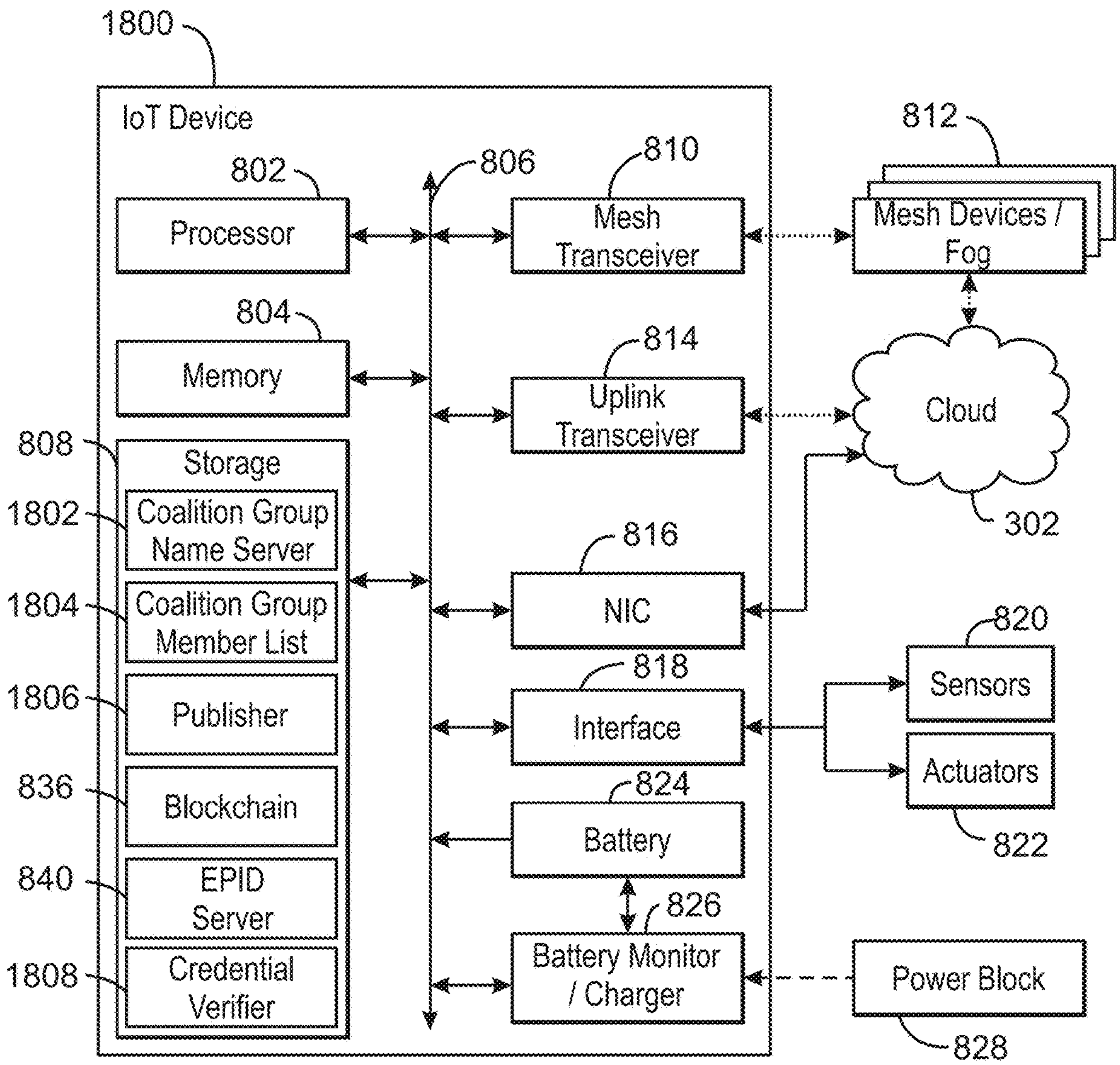
FIG. 18 is a block diagram of an example of components that may be present in an IoT device for creating coalition groups in accordance with some embodiments.

FIG. 18 is a block diagram of an example of components that may be present in an IoT device 1800 for creating coalition groups in accordance with some embodiments. Like numbered items are as described with respect to FIGS. 3 and 8. It can be noted that different components may be selected and used for the IoT device 800 discussed with respect to FIG. 8, and the IoT Device 1800 discussed with respect to FIG. 18.

The mass storage 808 may include a number of modules to implement the creation of coalition groups as described herein. Although shown as code blocks in the mass storage 808, it may be understood that any of the modules may be fully or partially replaced with hardwired circuits, for example, built into an application specific integrated circuit (ASIC). The mass storage 808 may include a coalition group name server 1802 including convenient groupings for objects. As discussed herein, the groups may be formed based on location, functionality, or a combination. A user may define the parameters to be used for the grouping. The type name server 1802 may build and maintain a coalition group member list 1804 to generate a name for the coalition group. If the group is not discoverable, a publisher 1806 may make the characteristics of the group, including types, locations, and other metadata, available to other IoT devices, so that those IoT devices may determine if they should join the group. This may be performed, for example, by publishing the group name and composition to a blockchain 836.

The blockchain 836 may be included in the IoT device 1800 to record coalition group name transactions, in addition to other information, such as type name transactions and composite object transactions. As described herein, the blockchain 836 transactions may be validated by a majority vote of mesh devices 812 that are also storing copies of the blockchain 836.

A credential verifier 1808 may be included to receive credentials from IoT devices and composite objects that wish to join the coalition. The credential verifier 1808 may be checked against transactions in the blockchain 836 to determine if the credentials are valid. If so, the credential verifier 1808 may obtain credentials from the EPID server 840 and issue them to the IoT device or composite object that sent the join request. The credential verifier 1808 may then commit the transaction to the block chain 836 to record that the IoT device or composite object has joined the coalition group.

Figure 19:
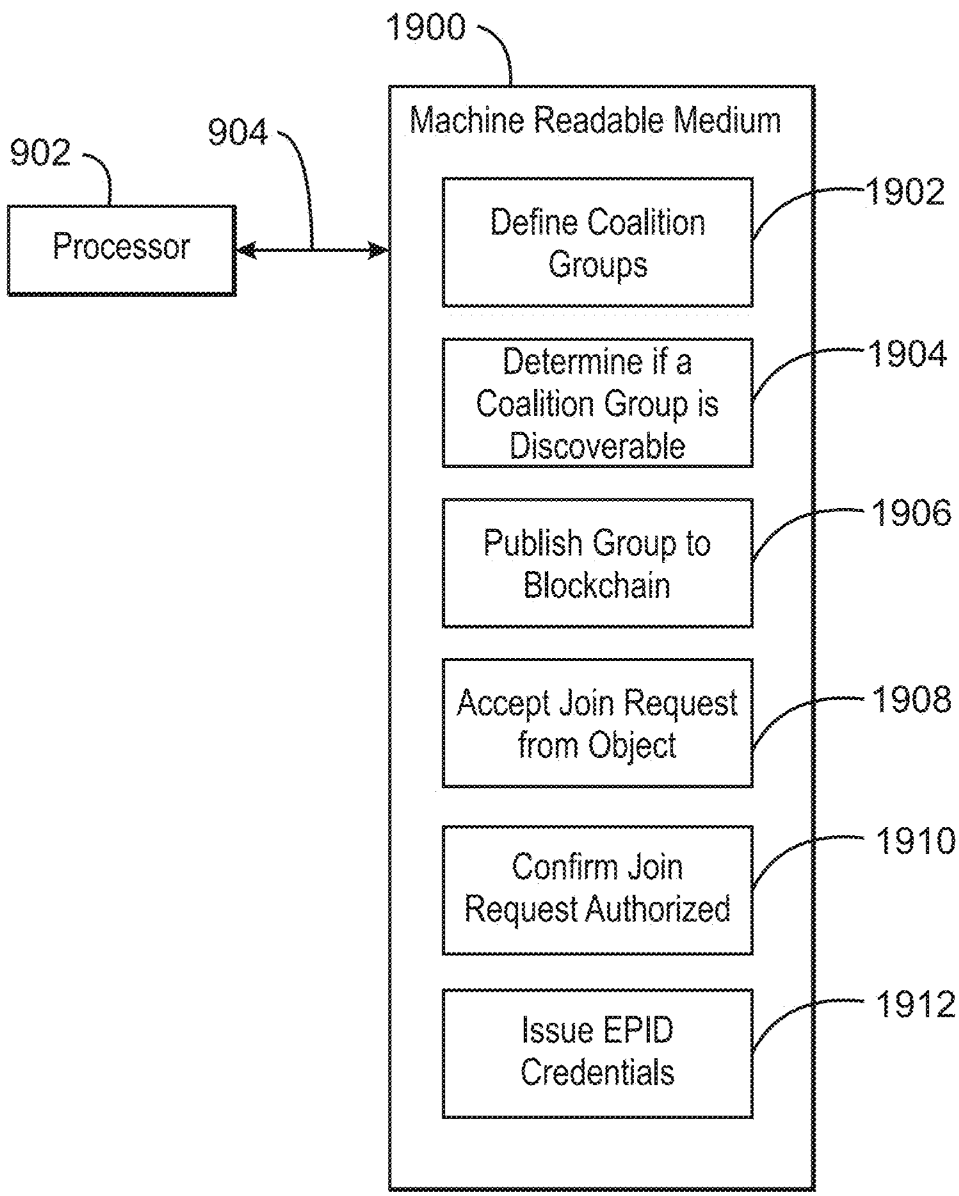
FIG. 19 is a block diagram of a non-transitory, machine readable medium including code to direct a processor to create coalition groups in accordance with some embodiments.

FIG. 19 is a block diagram of a non-transitory, machine readable medium 1900 including code to direct a processor 902 to create coalition groups in accordance with some embodiments. The processor 902 may access the non-transitory, machine readable medium 1900 over a bus 904. The processor 902 and bus 904 may be selected as described with respect to the processor 802 and bus 806 of FIG. 8. The non-transitory, machine readable medium 1900 may include devices described for the mass storage 808 of FIG. 8 or may include optical disks, thumb drives, or any number of other hardware devices.

The non-transitory, machine readable medium 1900 may include code 1902 to direct the processor 902 to define coalition groups, for example, by locations, function, or both. Code 1904 may be included to direct the processor 902 to determine if a coalition group is discoverable, for example, set up to respond to a discovery request with meta-data identifying the coalition group. Code 1906 may be included to direct the processor 902 to publish the coalition group to a blockchain, or directly to surrounding devices. This may make the presence of the coalition group known, discoverable, or both.

Code 1908 may be included to direct the processor 902 to accept a join request for the coalition group from IoT devices, including atomic objects, composite objects, or both. The join request may identify the coalition group, and include verification information, such as location, type, and other credentials or metadata. Code 1910 may be included to direct the processor 902 to validate the credentials, for example, determining if they are present in the blockchain. Code 1912 may be included to issue credentials to the requestor, such as an EPID key.

Communications among IoT devices, for example, in a coalition group, a mesh network, a fog device, or other arrangement, may need to be secured, but this may be problematic for devices that are of limited functionality. Further, the IoT devices may be distributed across different networks, making securing the communications more challenging. A distributed ledger system may enhance security in communications by IoT devices.

Figure 20:
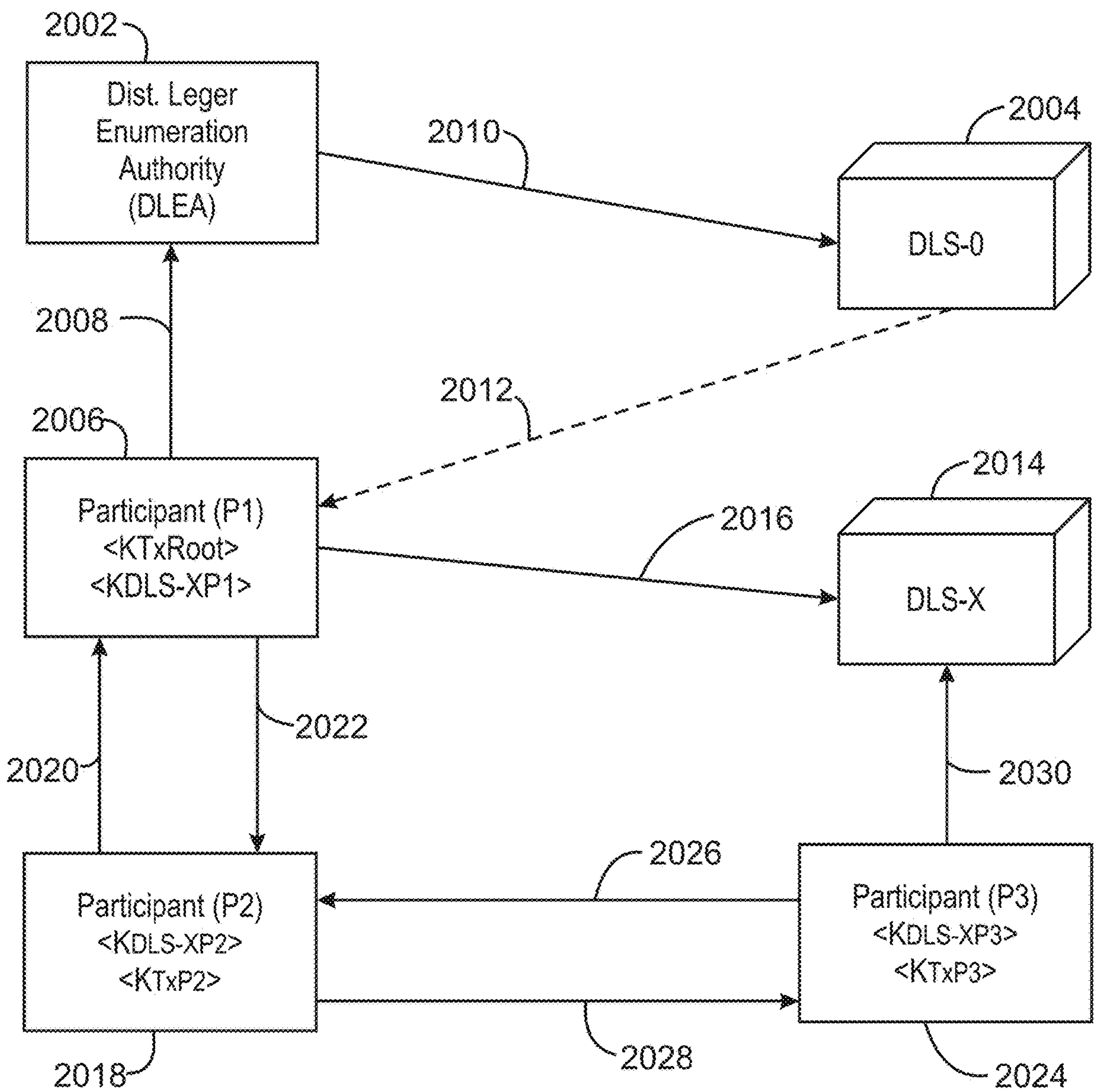
FIG. 20 is a schematic diagram of a semi-permissioned distributed ledger transaction in accordance with some embodiments.

FIG. 20 is a schematic diagram of enabling communications between devices using a semi-permissioned distributed ledger transaction 2000 in accordance with some embodiments. As used herein, a semi-permissioned distributed-ledger system uses Enhanced Privacy Id (EPID) keys to introduce transaction keys into the ledger. A namespace authority, termed a Distributed Ledger Enumeration Authority (DLEA) 2002 allocates a unique number to an instance of a ledger. The DLEA 2002 may be operated by the Internet Assigned Numbers Authority (IANA), a public agency, a private entity, or any entity that manages a number space by taking steps to avoid reuse of numbers in use.

It may be observed that the algorithm used by the DLEA 2002 for assigning names/numbers may be distributed because the number space is sparse in relation to the assigned numbers in use. Thus, the possibility of collisions is small. Hence it is possible that multiple instances of the DLEA 2002 could operate independently. Accordingly, the DLEA 2002 may be hosted across geo-political boundaries where there isn't a need for a central controlling authority such as a government or the UN or a single large private organization. Further, the independence of distributed blockchains may not be compromised by a centralized naming authority.

The operational integrity of the DLEA 2002 may be cross-checked using a public distributed ledger system that publishes DLEA numbers in use. This ledger, DLS-0 2004 is assigned the value of zero '0' and is off limits for the DLEA 2002 to assign. The proper behavior of the DLEA number assignment may be strengthened by implementing the number space allocation algorithm in a trusted execution environment (TEE) such as an Intel SGX enclave, an ARM TrustZone, or a hardware security module (HSM), among others. In these environments, the number assignment algorithm may be confirmed by the global community of experts. Thus, the DLEA 2002 may be trusted, to a very high level, to perform the simple function of avoiding re-assigning an already assigned number.

A participant, for example, P1 2006, may send a request 2008 for an identifying number for communication transactions, e.g., DLS-X #, to the DLEA 2002. The request may take the form [request DLS-X #, $K_{TxRoot}$] $K_{TxRoot}$, in which the information in the brackets is the message, and the number outside the brackets is the public key for P1 2006, $K_{TxRoot}$, which indicates a signing of the message.

The DLEA 2002 may assign a unique number to an instance of a semi-permissioned distributed ledger system (DLS), and post 2010 the DLEA allocated number to DLS-0 2004 along with the public key, $K_{TxRoot}$. DLS-0 2004 is the public distributed ledger system (DLS) and is only writable by the DLEA 2002, but is visible to all.

P1 2006 may monitor 2012 the ledger, DLS-0 2004, to determine when the assignment of a new key, X, has been recorded. The assigned number, X, may be used by P1 2006 as the root or starting key of a newly formed ledger, DLS-X 2014. This may be performed by creating the ledger, DLS-X 2014, by committing a message 2016 to the new ledger DLS-X 2014: [$K_{TxRoot}$]$K_{DLS\text{-}X}$; [$K_{DLS\text{-}X}$, perm] $K_{TxRoot}$; and [$K_{TxP2}$] $K_{TxRoot}$, where $K_{TxP2}$ is a new ledger transaction key.

The new ledger, DLS-X 2014, may also be used to implement the EPID 'join' protocol that establishes EPID private keys for each new member of DLS-X 2014. All subsequent use of EPID private keys may be verified using the public key, $K_{TxRoot}$, of the first transaction to the ledger, DLS-X 2014. Any of the EPID private keys may introduce ledger transaction keys ($K_{Tx}$) to DLS-X 2014 by signing the new TxK with the EPID key.

For example, another participant, P2 2018 may send a join request 2020 to the first participant, P1 2006. The join request 2020 may include the message: [JoinP DLS-X] $K_{Mfg2}$; [$K_{TxP2}$]$K_{TxP2}$. The second participant, P2 2018, may have obtained the transaction key, $K_{TxP2}$, by accessing DLS-X 2014. The second key, $K_{Mfg2}$, may be a manufacturer's EPID key, such as $K_{Mfg2}$, where the root $K_{Tx}$ is attested, or signed, by a manufacturer supplied EPID key of the format $K_{Mfg}$. The $K_{Mfg}$ attests that the trusted execution environment (TEE) containing the root TxK is sufficiently trustworthy. Likewise, a $K_{Mfg}$ in the TEE of the new participant device is used to attest that the temporal key used to protect the join request 2020, e.g., $K_{TxP2}$, is legitimate and trustworthy.

If P1 2006 authenticates the request, it may return a message 2022 to P2 2018 to finalize the join. The message 2022 may include [[JoinI DLS-X]$K_{TxRoot}$]$K_{Mfg1}$, in which $K_{Mfg1}$ is the manufacturer's EPID for P1 2006. The root $K_{Tx}$, $K_{TxRoot}$ is used to authenticate the join protocol response.

The devices P1 2006 and P2 2018 may exist at two different hierarchical levels. Thus a number of devices at the level of P2 2018 may join with P1 2006, for example, as a composite object and sub-objects as described herein. Similarly, other devices may join with P2 2018 at a lower level, such as participant P3 2024. To join, P3 2024 may send a join protocol request 2026 to P2 2018 of the form [JoinP DLS-X]$K_{Mfg3}$; [$K_{TxP3}$]$K_{TxP3}$. If P2 2018 authenticates the join protocol request 2026, it may respond with a message 2028 of the format: [[JoinI DLS-X]$K_{TxP2}$]$K_{Mfg2}$; [TxData, $K_{TxP3}$]$K_{TxP2}$. P3 2024 may commit the transaction to the distributed ledger, DLS-X 2014 by recording a signed message 2030 of the format: [[TxData, $K_{TxP3}$]$K_{TxP2}$]$K_{DLS\text{-}XP3}$ in the ledger DLS-X 2014.

Instead of using JoinP transactions P2 and P3 may be peer nodes in the blockchain (X). Accordingly, they may use the transaction keys (KT) to engage in commerce. For example, the message 2028 may be buying a good or service and the message 2026 may be selling the good or service. In this case, they only need KTx keys, and the technique is describing a blockchain transaction key behavior.

Further, blockchains generally don't have a KDLS key. That means the blockchains may not be able to enforce semi-permissioned transactions. For example, in message 2028, P2 is buying a good or service, and P3 knows that P2 is a member of a club, for example, a commercial establishment, an online auction site, a casino club, and the like. Accordingly, P2 may get a discounted offer if the Seller, P3, is also part of the club, or if club-owned currency, such as gambling chips, are exchanged for different goods or services provided by the club members.

It may make sense to use EPID as a transaction key (KTx) in order to maintain several wallets for convenience. As used herein, a wallet may be a cryptographically protected electronic storage that holds a currency or a link to a credit account. In this example, P2 and P3 may be different wallets that each hold a share of a distributed wallet, for example, each other's distributed wallets.

Another case in which the EPID may be used as a transaction key is when P2 and P3 are each members of a group, such as a group of employees at a company or a group of people that represent a church or civic enterprise, where the various members can act as agents of the enterprise. From a blockchain perspective, it doesn't matter semantically whether the Tx key is an EPID key or other types of keys as long as the signature verifies the identities.

Figure 21:
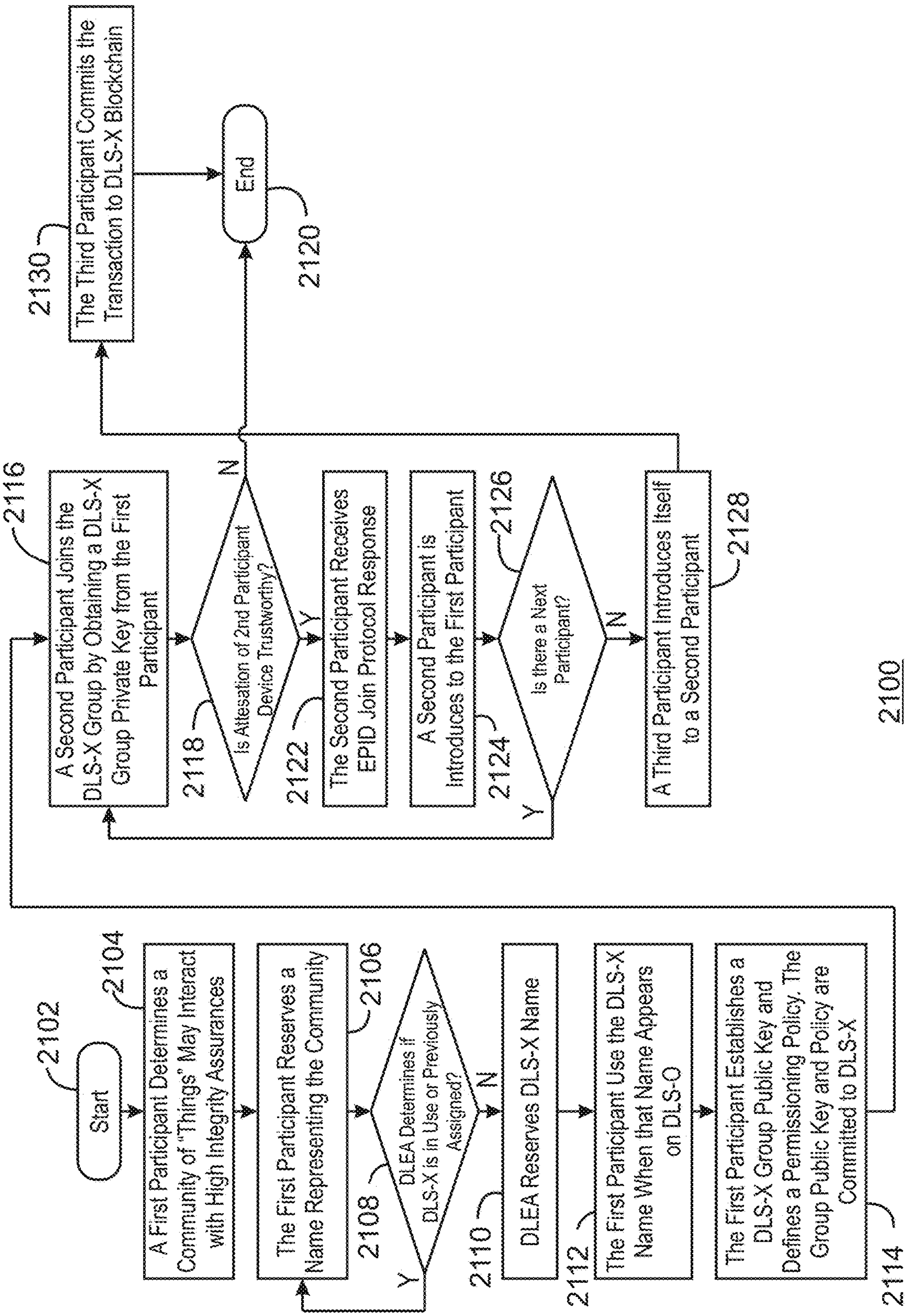
FIG. 21 is a process flow diagram of an example method for performing semi-permissioned transactions in accordance with some embodiments.

FIG. 21 is a process flow diagram of an example method 2100 for performing semi-permissioned transactions in accordance with some embodiments. The method 2100 of FIG. 21 may be implemented by the IoT device 2200 described with respect to FIG. 22. The block 2102 represents, for example, when a device is instructed to join with other devices. At block 2104, a first participant determines that a community of things, such as the IoT devices forming a fog device, among others, may interact with high integrity assurances.

At block 2106, the first participant reserves a name representing the community. This may be performed, for example, by sending a name, e.g., DLS-X, and a public key for the first participant to a DLEA. The name, e.g., DLS-X, may be a universally unique identifier (UUID), or other identification that has a very low likelihood of replication. The message may be signed by a private key for the first participant.

At block 2108, the DLEA determines whether the name is in current use or has been previously assigned. If so, process flow returns to block 2106 for the first participant to select a new name. If not, at block 2110, the DLEA reserves the name, DLS-X, by committing it to a distributed ledger, DLS-0. The key used to authenticate the initial transaction to the DLEA may be committed to the ledger along with the name.

At block 2112, the first participant may use the DLS-X name when that name appears on DLS-0. This may be determined by the first participant monitoring the DLS-0 ledger. At block 2114, the first participant establishes a DLS-X group public key using EPID, and defines a permissioning policy. The group public key and policy are committed to the DLS-X ledger using the first participant's transaction key. The first participant's transaction may also be committed to the DLS-X using the EPID group private key.

At block 2116, a second participant may join the DLS-X group by obtaining a DLS-X group private key from the first participant. The first participant may be acting as EPID group key issuer. The second participant may attest the trustworthiness of its device using a manufacturer's key, for example, a manufacturers EPID key. At block 2118, a determination is made as to whether the attestation of the second device is trustworthy. If not, the method 2100 ends at block 2120.

If the attestation is trustworthy, at block 2122, second participant receives EPID join protocol response allowing it to generate a second group private key under the EPID group public key for DLS-X. At block 2124, a second participant self-signs its transaction key, delivers it to the first participant. First participant signs second participant's public key and commits the transaction to the ledger, DLS-X, thereby introducing the second participant to DLS-X. At block 2126, a determination is made as to whether there is another participant. If so, process flow returns to block 2116 to resume the next registration.

At block 2128, a third participant may introduce itself to a second participant. This may be done by the third participant self-signing a third participant transaction key and sending it to the second participant. The second participant signs the third participant public transaction key and optionally includes transaction data and signs with its transaction key and DLS-X group key.

At block 2130, the third participant commits the transaction to DLS-X. This may be performed by the third participant signing the second participant's transaction data using the third participant's DLS-X group private key before committing the transaction to the DLS-X blockchain. The second participant may also commit the transaction data to the DLS-X ledger using its DLS-X group private key. In this scenario, the third participant also signs his self-signed tx key with the third participant's DLS-X group key. The method 2100 then ends at block 2120.

Figure 22:
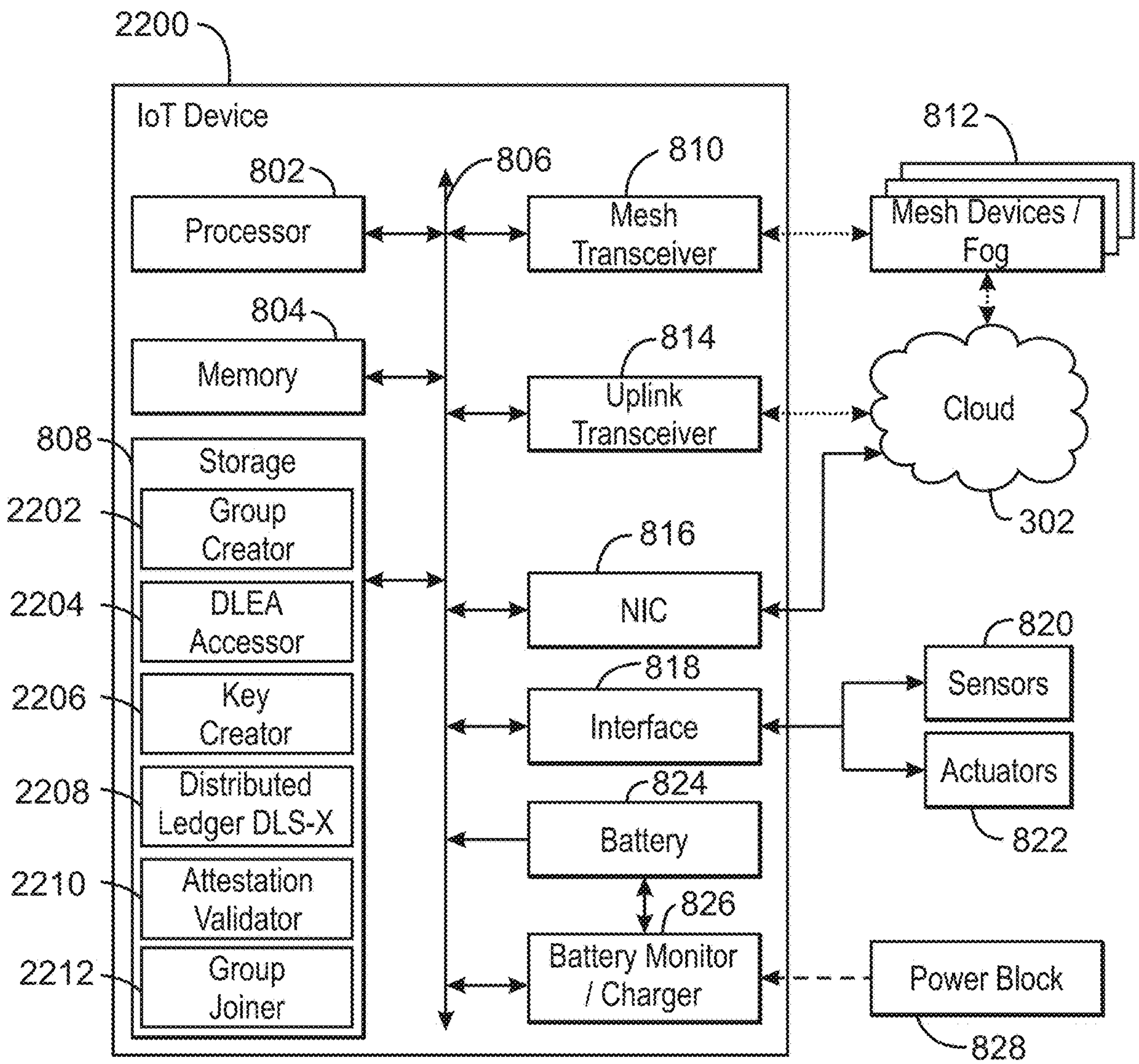
FIG. 22 is a block diagram of an example of components that may be present in an IoT device for creating coalition groups in accordance with some embodiments.

FIG. 22 is a block diagram of an example of components that may be present in an IoT device 2200 for creating coalition groups in accordance with some embodiments. Like numbered items are as described with respect to FIGS. 3 and 8. It can be noted that different components may be selected and used for the IoT device 2200 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC). The mass storage 808 may include a group creator 2202 that determines if a group of objects can interact with high trust assurances.

As discussed herein, the assurances may be based attestation keys programmed into the IoT device 2200, and other mesh devices 812 by manufacturers. The group creator 2202 may create a name for the group. A DLEA accessor 2204 may access a DLEA to determine if the name is available, or if the IoT device 2200 will have to create another name. If the name is available, the DLEA will commit the name to a distributed ledger, DLS-0. The DLEA accessor 2204 may monitor DLS-0 to determine if the name was committed. A key creator 2206 may create a key based on name created by the group creator 2202, for example, using an EPID server. The key creator 2206 may commit the key to a local distributed ledger, DLS 2208. DLS 2208 may exist in the IoT device 2200, or may exist in another mesh device 812. An attestation validator 2210 may be included to determine if a join request from another device is valid. If so, a group joiner 2212 may send out a join message with the group key.

Figure 23:
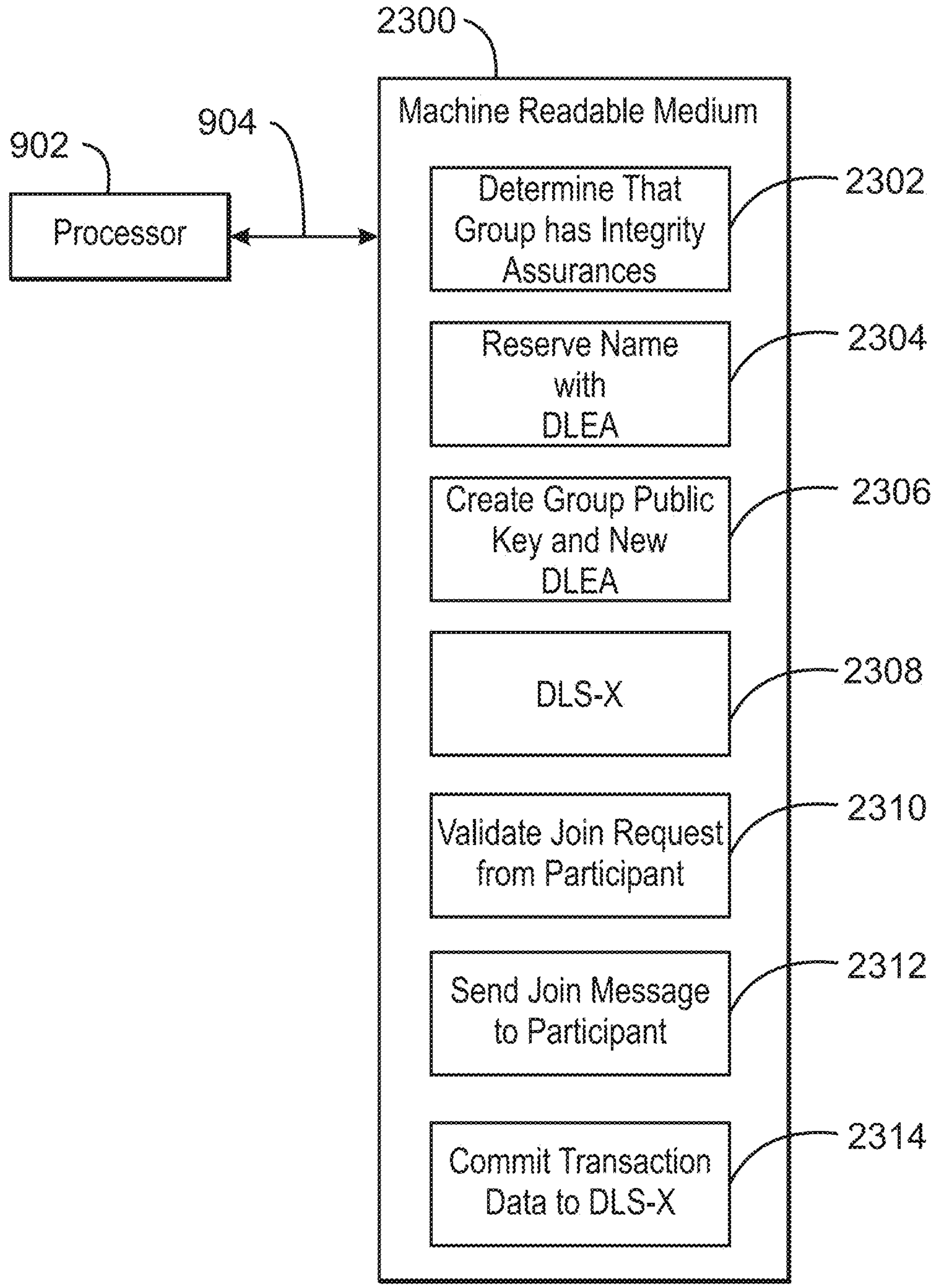
FIG. 23 is a block diagram of a non-transitory, machine readable medium including code to direct a processor to securely communicate in groups in accordance with some embodiments.

FIG. 23 is a block diagram of a non-transitory, machine readable medium 2300 including code to direct a processor 902 to securely communicate in groups in accordance with some embodiments. The processor 902 may access the non-transitory, machine readable medium 2300 over a bus 904. The processor 902 and bus 904 may be selected as described with respect to the processor 802 and bus 806 of FIG. 8. The non-transitory, machine readable medium 2300 may include devices described for the mass storage 808 of FIG. 8 or may include optical disks, thumb drives, or any number of other hardware devices.

The non-transitory, machine readable medium 2300 may include code 2302 to direct the processor 902 to determine that a group may communicate with high integrity. Code 2304 may be included to direct the processor 902 to generate a name for the group, and reserve the name with a Distributed Ledger Enumeration Authority (DLEA). Code 2306 may be included to direct the processor 902 to create other keys from the registered name and commit the information to a new distribute ledger, DLS-X 2308.

Code 2310 may be included to direct the processor 902 to validate a join request for the group from IoT devices, composite objects, or both. The join request may include attestation information, such as a manufacturer's key provided to a requesting device. Code 2312 may be included to direct the processor 902 to issue credentials to the requestor, such as an EPID. Code 2314 may be included to direct the processor 902 to commit transaction data to the distributed ledger, DLS-X, using a private key, a public key, or a combination of both.

In addition to secure communications, security during booting may be useful to protect the network from intrusion. While a secure boot may be implemented in a less constrained system, including larger IoT devices, using a trusted execution module (TEM), or other hardware device, this may be more challenging for more resource-constrained IoT devices.

Figure 24:
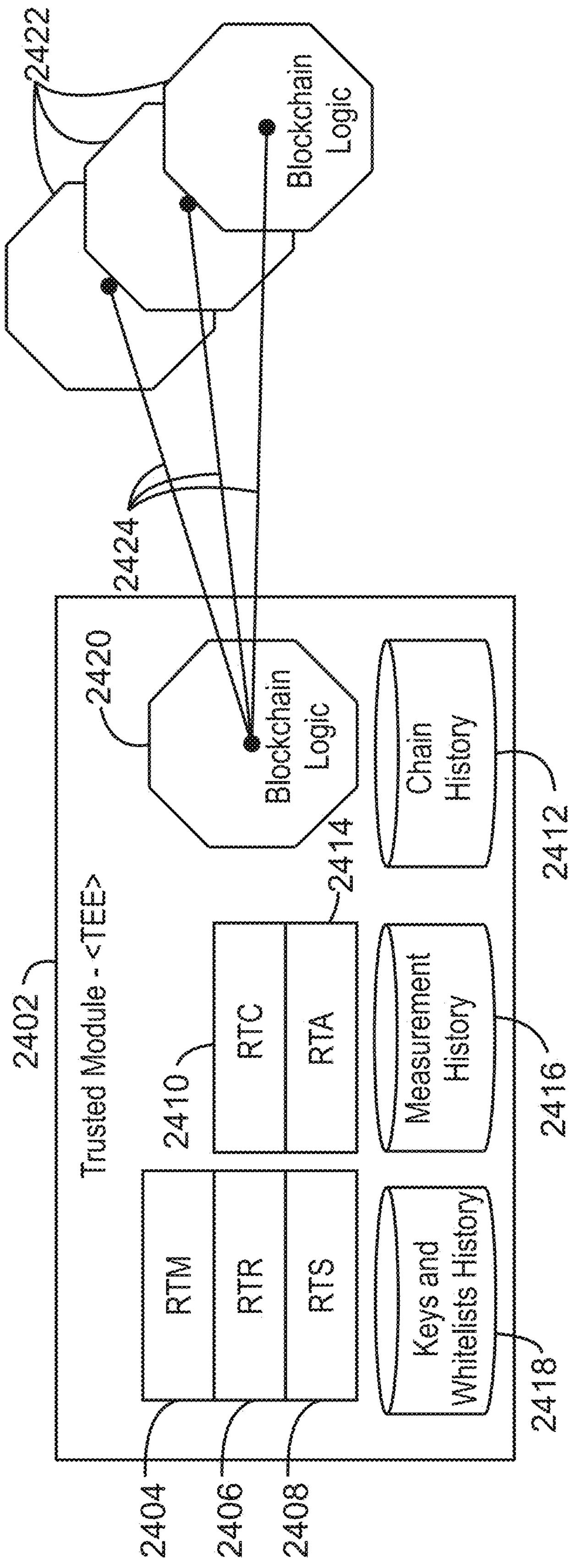
FIG. 24 is a schematic diagram of the use of a trusted execution environment (TEE) to securely boot a device in an IoT environment in accordance with some embodiments.

FIG. 24 is a schematic diagram 2400 of the use of a trusted execution environment (TEE) to securely boot a device in an IoT environment in accordance with some embodiments. Trusted computing is primarily concerned with the ability of a device to attest to trustworthy attributes of a computing device. Attributes typically affecting trust include a trusted or secure boot.

Trusted boot instruments the boot sequence with measurement operations that compute a hash of the next code block to be loaded and executed. Measurements are stored in secure storage, such as a trusted module (TEE) 2402. In an IoT device, the trusted module 2402 may be a separate device or may be a protected memory region that is encrypted or otherwise not generally accessible to the processor or general operating code of the IoT device. A secure boot is an extension to a trusted boot environment which adds the checking of measurements against a whitelist of permitted processes. Typically, the boot sequence is altered if actual and whitelist measurements do not agree, for example, by booting into a non-secure environment and informing other devices of this.

Once the trusted boot is complete, it may provide the TEE for secure execution. If code is loaded into, or is statically bound, to a hardened execution environment, such as the TEE, the operations performed may resist some attacks. A hardened execution environment may include any number of hardware enhanced security systems, such as a trusted platform module (TPM) to create the TEE. The hardening techniques may include Software Guard Extensions (SGX) from Intel®, TrustZone® from ARM®, hardware security modules (HSMs) such as a TPM, smart cards, or virtualization, among others.

The TEE may also provide an environment for secure update. Secure boot checks code authenticity at load time. Secure update uses code signing to ensure integrity and authenticity, such as with the Authenticode™ technology from Microsoft. A manifest structure may be used to manage association of code hash values and signatures over hash values as part of the install image. Technologies for installation image packages include the Itsy Package Management System (IPKG), Debian Linux installation files (DEB), RPM package manager files (RPM), and Clear Linux Bundles, among others.

The TEE may provide secure storage for both temporal and long term storage of security relevant data. Data types include keys, whitelists, blacklists, measurements, audit logs, passwords, biometrics, certificates and policies. Hardening techniques include isolation, anti-tampering, encryption and obfuscation.

Attestation may be a part of the secure environment. Attestation, as described herein, is a reporting function tied to a secure execution or secure storage function in which the device or platform self-reports its trust properties. It details the hardening techniques and assurances that are applied to the secure function in question. The attestation function itself must be a secure function where hardening and assurances exceed the level of quality of the function over which it is reporting.

Trusted computing challenges may increase in an IoT setting due to several factors. For example, IoT devices may be constrained by size, functionality, and economics. Security hardening often comes as a trade-off to these costs. Inclusion of trusted computing building blocks may be missing or incomplete on cost constrained devices.

Further, IoT networks may distribute functionality over multiple devices, which results in a greater dependency on network building blocks. Consequently, network behaviors may be more problematic as the network becomes a larger ingredient of the overall computing fabric. Undesirable behaviors may be amplified as network complexity and scale increases.

IoT networks may often include devices and application from a number of vendors, value-added-resellers, integrators, suppliers and analysts. Each of these players may create systems that have to cooperate to ensure interfaces, structures, computing environments and operations procedures fit together properly—without introducing unexpected and undesired behavior.

In some aspects, to address these issues, IoT networks may have a distribution of trust across multiple devices. Distribution is one way to address diminished reliability, availability and safety that centralization brings. Distribution also scatters decision processes as the natural central control points dissolve.

In some aspects, trusted computing attestation in IoT networks may be improved with the use of blockchain technology. Trusted computing concepts define a set of trust roots that perform a function fundamental to security where the proper and expected behavior of root functionality is implicitly trusted to work as expected. The trusted computing group (TCG), for example, in the trusted module 2402, may include several trust roots.

A root of trust for measurement (RTM) 2404 is a function that measures and may verify the first loadable object in a system. A root of trust for reporting (RTR) 2406 is a function that attests to values in the root of trust for storage (RTS) 2408 and to the computing environment that implements the RTM 2404, RTR 2406, and RTS 2408. The attestation function may be recursively defined within the RTR 2406. The root of trust for storage (RTS) 2408 is the function that stores values produced and consumed by the RTM 2404 and RTR 2406.

Blockchain roots-of-trust may be used in IoT network environments to increase security by distributing the security functions. Distributed trust in IoT networks using blockchain may add two additional roots-of-trust for the blockchain. A root of trust for chaining (RTC) 2410 is a function that exposes a blockchain resource to local trusted computing roots, such as the RTR 2406. The RTC 2410 and RTR 2406 can work together to commit attested attributes to a blockchain, for example, by saving the attested attributes to a chain history 2412. The trust properties of blockchains are highly desirable because they employ distribution as a mechanism for guaranteeing expected behavior using threshold consensus protocols.

A root of trust for archival function (RTA) 2414 adds an availability component to the other roots. A constrained IoT device may not have the resources to maintain a history of measurements 2416 and measurement logs spanning multiple reboots. Further, it may not be capable of storing expansive whitelists 2418 that describe past or anticipated configurations. Trusted computing inquiry may require searching historical context. The RTA 2414 adds archival capability to RTC nodes that may not maintain the full block history.

The system described herein may be used with blockchain logic 2420 that works with blockchain logic 2422 in other devices to maintain the chain history 2412. This may include, for example, propagating 2424 the chain history 2412 of the blockchain to other devices. In other devices, the chain history 2412 may be compared to local copies to make sure that the changes made are authorized. If a majority of devices agrees that the change was not authorized, the blockchain logic 2420 reverts the chain history 2412 to the previous history.

Figure 25:
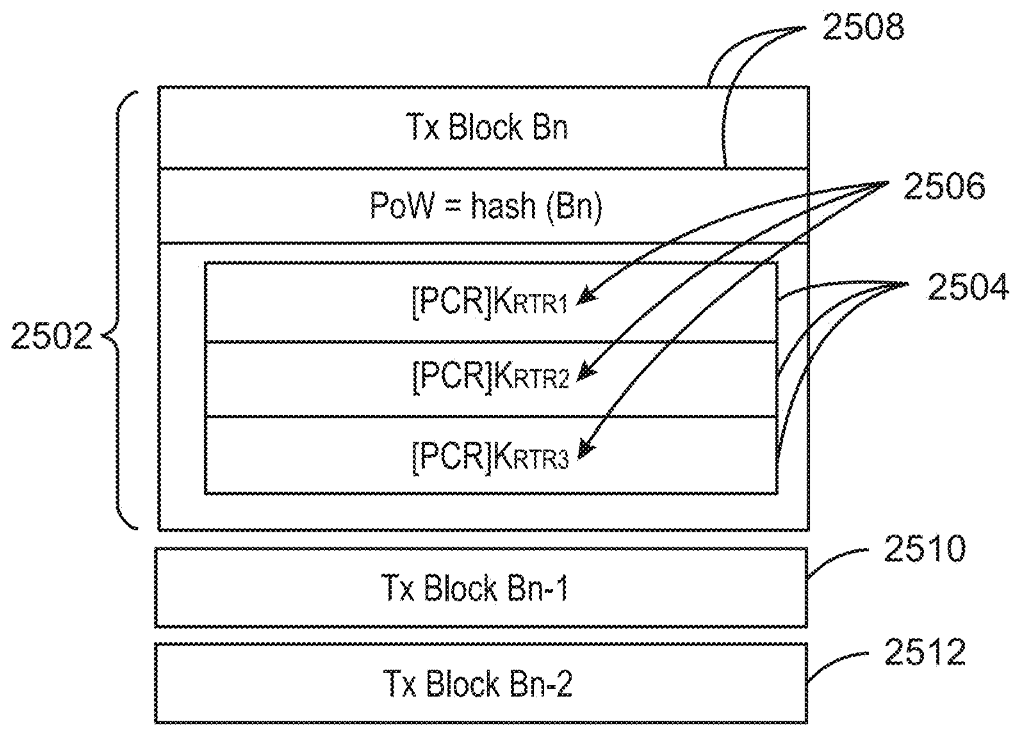
FIG. 25 is a block diagram of a blockchain block holding boot integrity transactions in accordance with some embodiments.

FIG. 25 is a block diagram 2500 of a blockchain block 2502 holding boot integrity transactions in accordance with some embodiments. Referring also to FIG. 24, the blockchain block 2502 forms a single record in the chain history 2412 or other distributed ledger system. The RTC 2410 constructs a block including measurements 2504 in platform configuration registers (PCR). The PCR may be memory locations in a protected region, in a specific hardware device, or both.

In some aspects, the sample rate for the measurements used for the blockchain block 2502 may be more granular than rate at which measurements are saved to the PCR, for example, PCR extends. However, every PCR extend may trigger a transaction that is added to a block. PCR values are signed by an attestation signing key 2506 that may differ from the block-signing key. In essence, the RTR 2406 is attesting to the blockchain its current integrity state. The RTC 2410 is attesting that the PCRs have not been overwritten by undetected system resets.

The block diagram 2500 can also indicate the presence of previous blockchain blocks 2510 and 2512. Although not shown in this figure, these blocks 2510 and 2512 may hold other boot integrity transactions, or may hold information on composite objects, object types, coalition group compositions, secure transaction data, or any number of other items to support the security of an IoT network.

Figure 26:
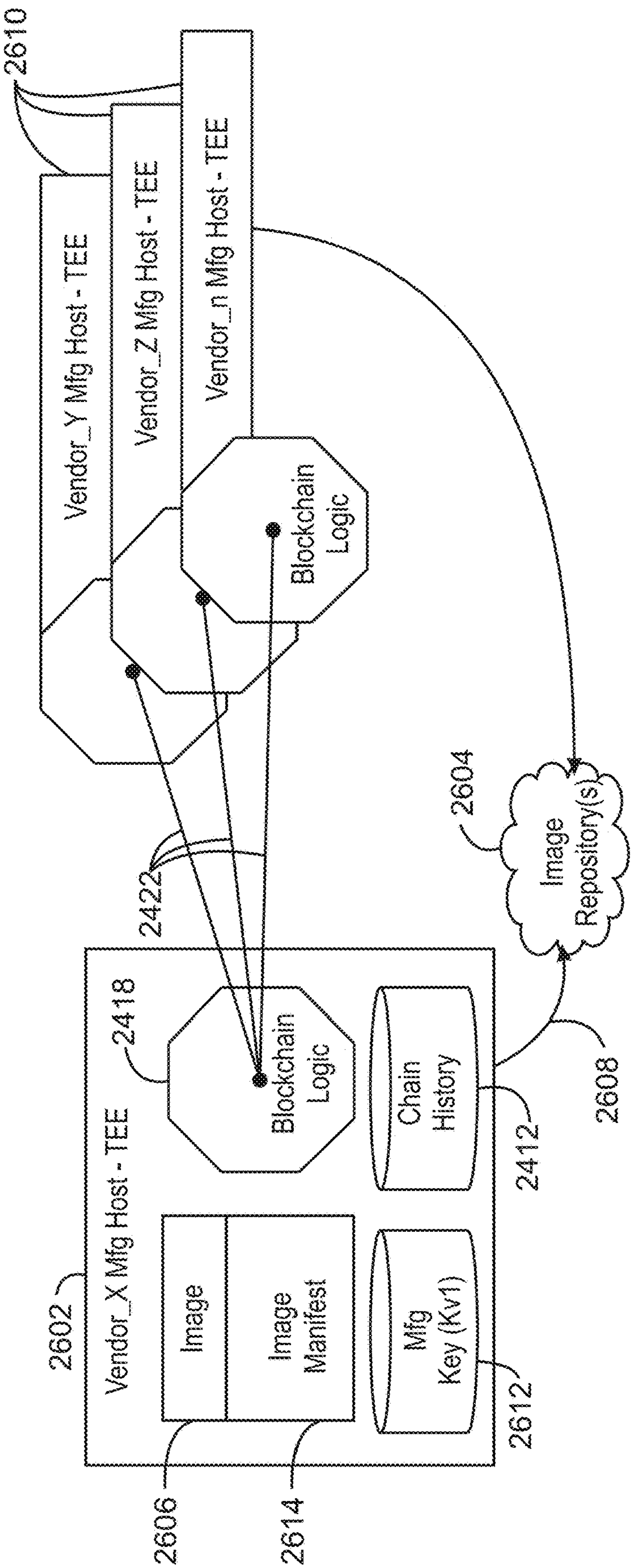
FIG. 26 is a schematic diagram of the use of a whitelist image collection with a blockchain in accordance with some embodiments.

FIG. 26 is a schematic diagram 2600 of the use of a whitelist image collection with a blockchain in accordance with some embodiments. Like numbered items are as described with respect to FIG. 24. A boot process is taking place on a first IoT device 2602. An image repository 2604 may be accessed to obtain a whitelist image 2606, for example, using communications 2608 that are encrypted with a manufacturer's key 2612 programmed into the system. In some examples, they may be accessed from a chain history 2412 or blockchain instead of, or in addition to, the image repository 2604. The images in the image repository 2604 may have been stored by other, similar, IoT devices 2610 such that a reference count can be maintained. Since each device may sign their blockchain transaction that records boot integrity reports, the reference count can distinguish between re-boot activity from the same device vs. activity from different devices.

Measurements are taken as the IoT device 2602 boots, for example, by calculating a hash code of the next software to be run in the boot sequence. The measurements may be compared to whitelist values, for example, in the whitelist image 2606 to ensure integrity. An image manifest 2614 may be used to validate origination of the whitelist value. The manifest 2614 may include white list hash values that can be compared with a dynamically obtained hash of the image 2606.

Construction of whitelists in IoT networks is challenging because of the rate at which the population of images changes, for example, as the image repository 2604 grows, the greater the likelihood that devices in a deployment depend on the repository for finding reference images selected for inclusion in a whitelist. Unless there is a data de-duplication function and a trusted delete function in the network, the number of images monotonically increases because there may be an IoT device referencing the image in the repository. The blockchain history is a way to inform the Image Repository regarding the popularity of devices referencing its images. Devices that are no longer in service would not show up in the history 2412 hence would not be reference counted by the image repository. The image repository 2604 may maintain a "heat map" revealing the devices that perform boot integrity checking. A strategy obsoleting older devices no longer in deployment may be to remove their image 2606 from the image repository 2604, and block whitelist referencing. This approach may be tuned to select a rate of decommissioning that correlates to a rate of growth that new images are created.

Figure 27:
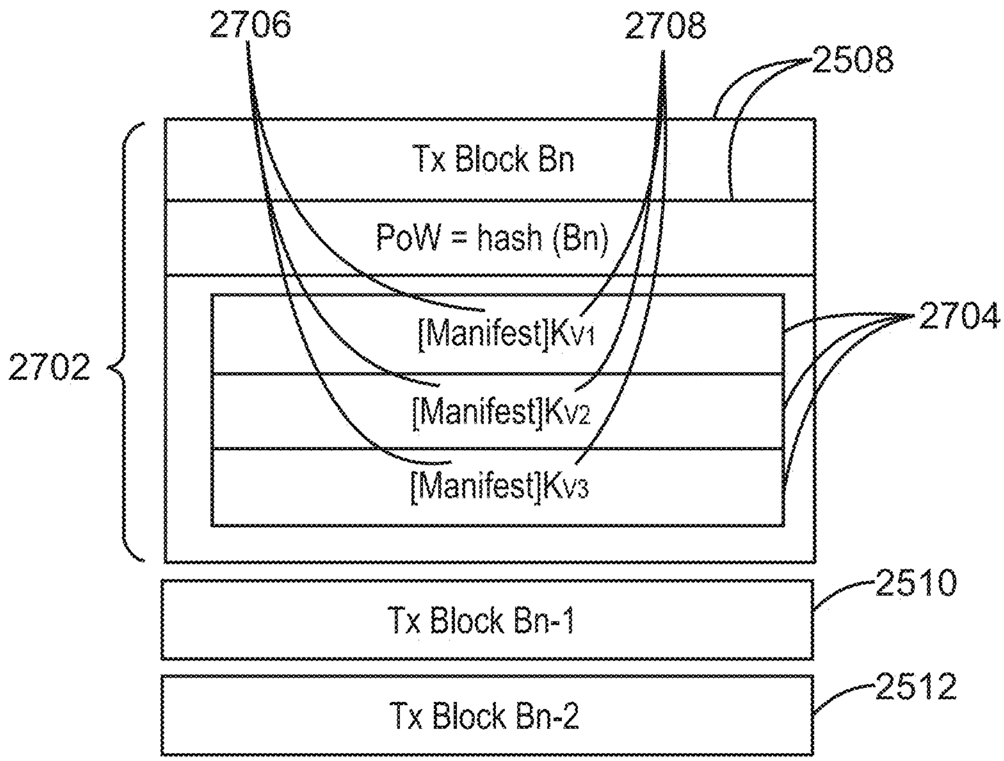
FIG. 27 is a drawing of a blockchain block with integrity transactions for whitelist images in accordance with some embodiments.

FIG. 27 is a drawing of a blockchain block 2702 with integrity transactions for whitelist images in accordance with some embodiments. To implement the blockchain block, vendors, makers and code generation factories may incorporate blockchain capabilities in their production process. Each whitelist image may be signed using a manifest structure 2704 that includes the manifest 2706. The developer or factory generating the image may sign it using a manufacturer's key 2708, which may be an EPID key, to establish which entity manufactured the image. Signed manifests 2704 are added to the blockchain block 2702 and committed to the chain history 2412 (FIG. 24) of the blockchain using an appropriate transaction key, as described herein.

Figure 28:
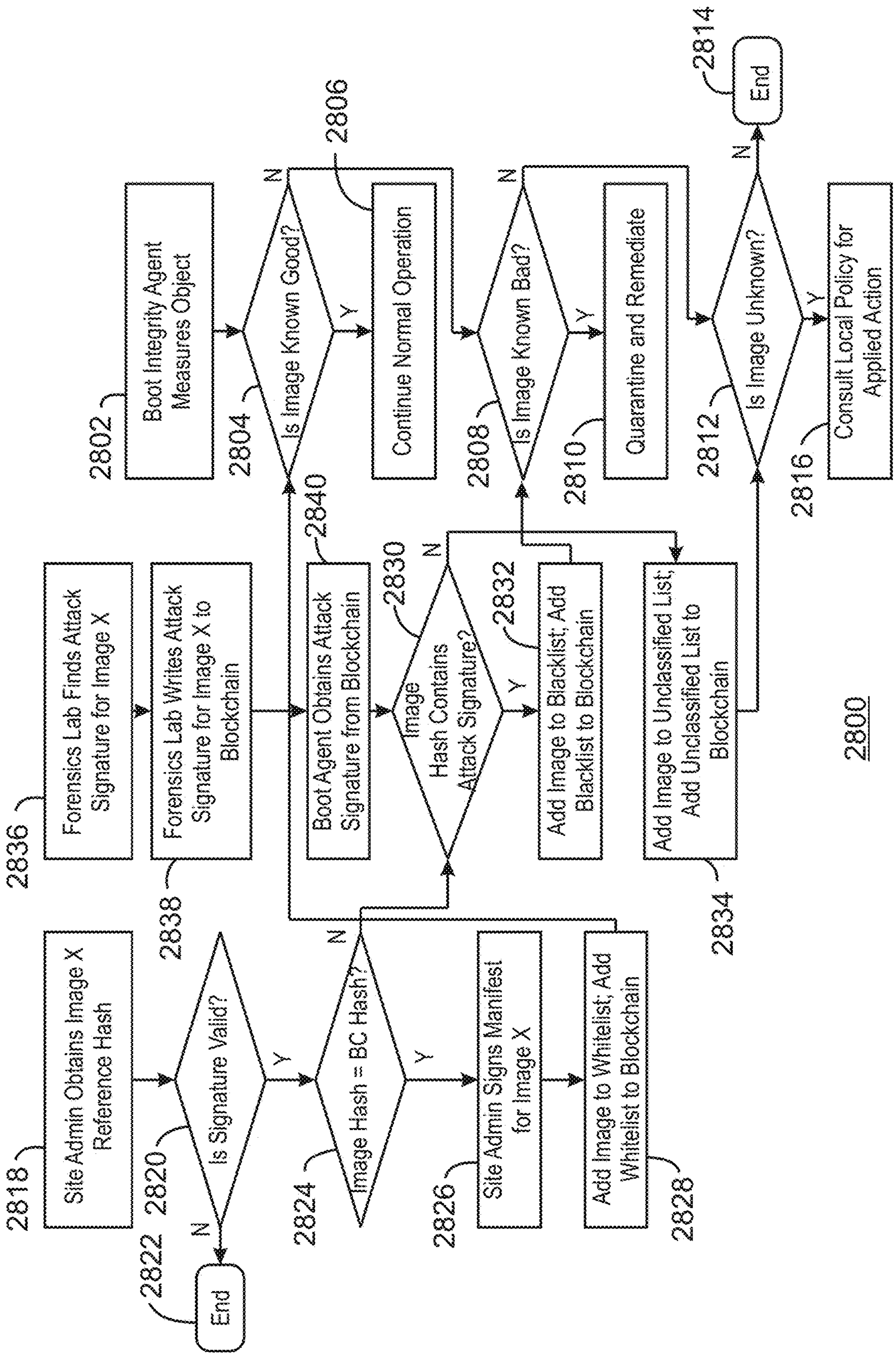
FIG. 28 is a process flow diagram of an example method for a secure boot process flow using blockchain roots-of-trust in accordance with some embodiments.

FIG. 28 is a process flow diagram of an example method 2800 for a secure boot process flow using blockchain roots-of-trust in accordance with some embodiments. The method 2800 of FIG. 28 may be implemented by the IoT device 2900 described with respect to FIG. 29. The block 2802 represents, for example, when a boot integrity agent measures an object. As discussed herein, this may be performed by calculating a hash code of the next code to be booted, creating an image of the code. At block 2804, a determination is made as to whether the image is known to be good. If so, the method 2800 ends at block 2806 when the IoT device continues normal operations. If not, at block 2808, a determination is made as to whether the image is known to be bad. If so, the method 2800 ends at block 2810 with the quarantine of the code and remediation of the issue.

If the image is not known to be bad at block 2808, process flow proceeds to block 2812, where a determination is made as to whether the image is unknown. If not, the method 2800 may end at block 2814, for example, with the status being listed as not trusted. If so, the method 2800 may end at block 2816 where a local policy is consulted to determine the action to be applied.

To obtain an image for use in the comparison at block 2804, at block 2818, a site administrator may obtain a reference hash, for example, from a cloud repository. The hash may be obtained from other sources, including other IoT devices, manufacturers, and the like. At block 2822, a determination is made as to whether the signature on the hash is valid. If not, the method 2800 ends at block 2822. At block 2824, a determination is made as to whether the image hash is equal to the blockchain (BC) hash. If so, at block 2826, the site administrator signs the manifest for the image. At block 2828, the image is added to the whitelist and the whitelist is committed to the blockchain for access by the boot code. The whitelist image may then be used in the comparison at block 2804, for example, by an IoT device accessing the whitelist in the blockchain or in an image repository.

If the image hash does not match the BC hash at block 2824, at block 2830, a determination is made as to whether the image hash contains an attack signature. If so, at block 2832, the image may be added to a blacklist, and the blacklist may be committed to the blockchain. The blacklist image may then be used in the comparison at block 2808, for example, by an IoT device accessing the blacklist in the blockchain or in an image repository.

If at block 2830, the image hash does not match a known attack signature, at block 2834, the image may be added to an unclassified list. The unclassified list may then be added to the blockchain. The unclassified image may then be used in the comparison at block 2812, for example, by an IoT device accessing the unclassified list in the blockchain or in an image repository.

The attack signatures can be identified by any number of techniques. For example, at block 2836, a forensics lab may identify the attack and generate the attack signature for the image. As used herein, a forensics lab may be a commercial security service that identifies malware, viruses, and other problematic code in circulation. At block 2838, the forensics lab may write the attack signature for the image to the blockchain. In some examples, the site administrator may obtain the attack signature from a commercial forensics lab, and write the attack signature to the blockchain. At block 2840, the attack signature may be obtained from the blockchain for use at block 2830.

As described herein, the secure boot process may be extended to include using a blockchain to obtain and validate reference measurements, formulate a whitelist, blacklist, or an unclassified list that may be used to evaluate local measurements. Secure boot enforcement occurs normally. Thus, the blockchain may provide information for enforcement points for network quarantine, which may place firewall restrictions on the flow of packets to or from devices when a known bad or unknown configuration is found. Further, the blockchain may inform software update servers that may seek to obtain reference measurements from a reliable source.

Figure 29:
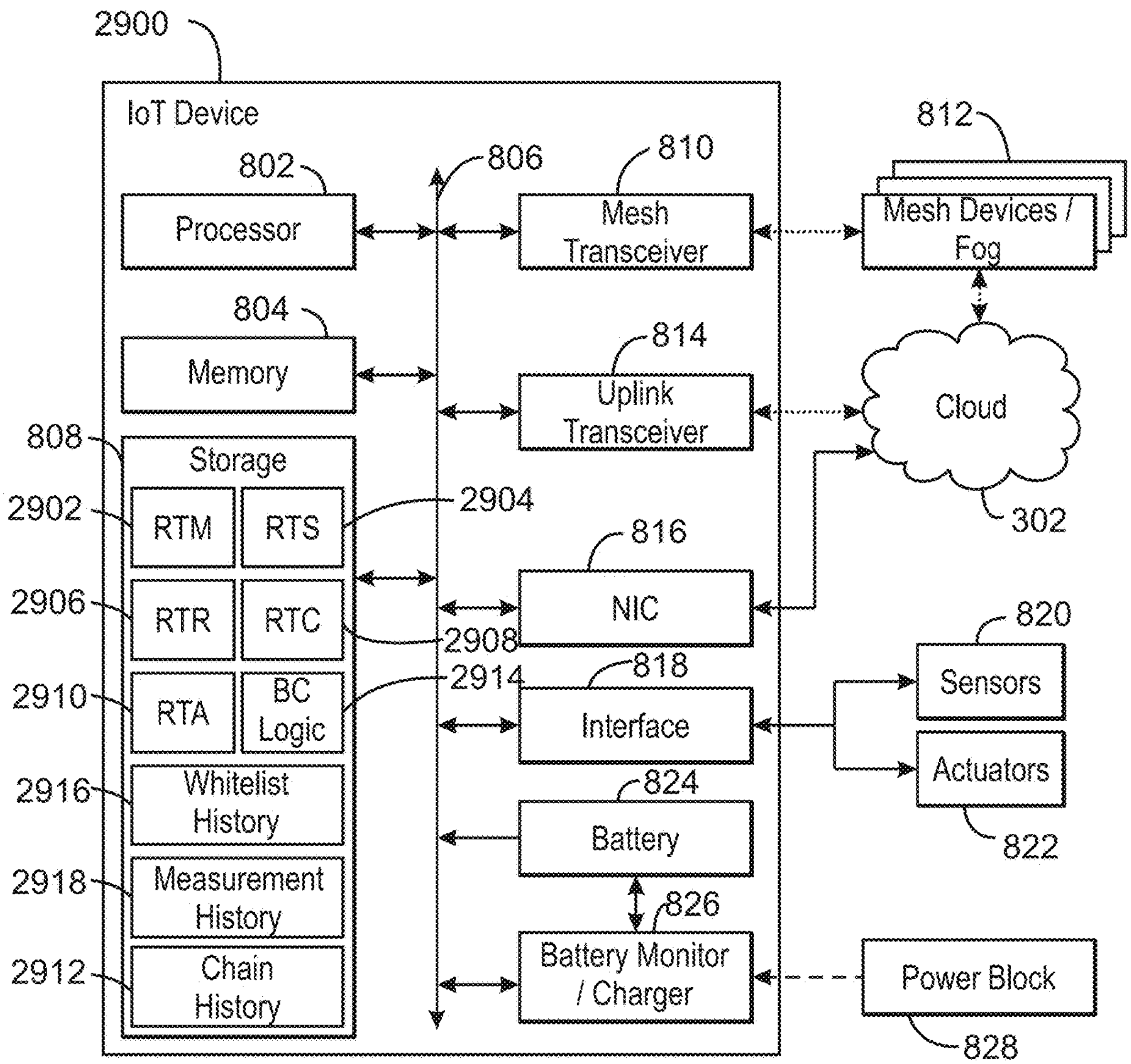
FIG. 29 is a block diagram of an example of components that may be present in an IoT device for creating coalition groups in accordance with some embodiments.

FIG. 29 is a block diagram of an example of components that may be present in an IoT device 2900 for secure booting in accordance with some embodiments. Like numbered items are as described with respect to FIGS. 3 and 8. It can be noted that different components may be selected and used for the IoT device 2900 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a root-of-trust measurer (RTM) 2902 that measures and may verify the first loadable object in a system. A root-of-trust storage manager (RTS) 2904 may store values produced and consumed by other security systems, such as the RTM 2902 and a root-of-trust reporter (RTR) 2906. The RTR 2906 may attests to values in the root of trust for storage (RTS) F08 and to the environment that implements the RTM 2404, RTR 2406, and RTS 2408. A root of trust archiver (RTA) 2910 may add archival capability to RTC nodes that may not have the capabilities to maintain a full chain history 2912.

Various historical databases may be maintained in the IoT device 2900, or may be accessed on other mesh devices 812. For example, blockchain logic 2914 may maintain a chain history 2912 that includes the blocks of the blockchain. Further, the blockchain logic 2914 may push changes to other mesh devices 812, or accept and validate changes made in the blockchain by other mesh devices 812. A whitelist history 2916 may hold the whitelist, and changes made to the whitelist items, for example, before the changes are committed to the chain history 2912. Further, the whitelist history 2916 may hold other lists and changes, such as the blacklist, and the unclassified list. A measurement history 2918 may hold current and past measurements made during the boot process, for example, for comparison to the images.

Figure 30:
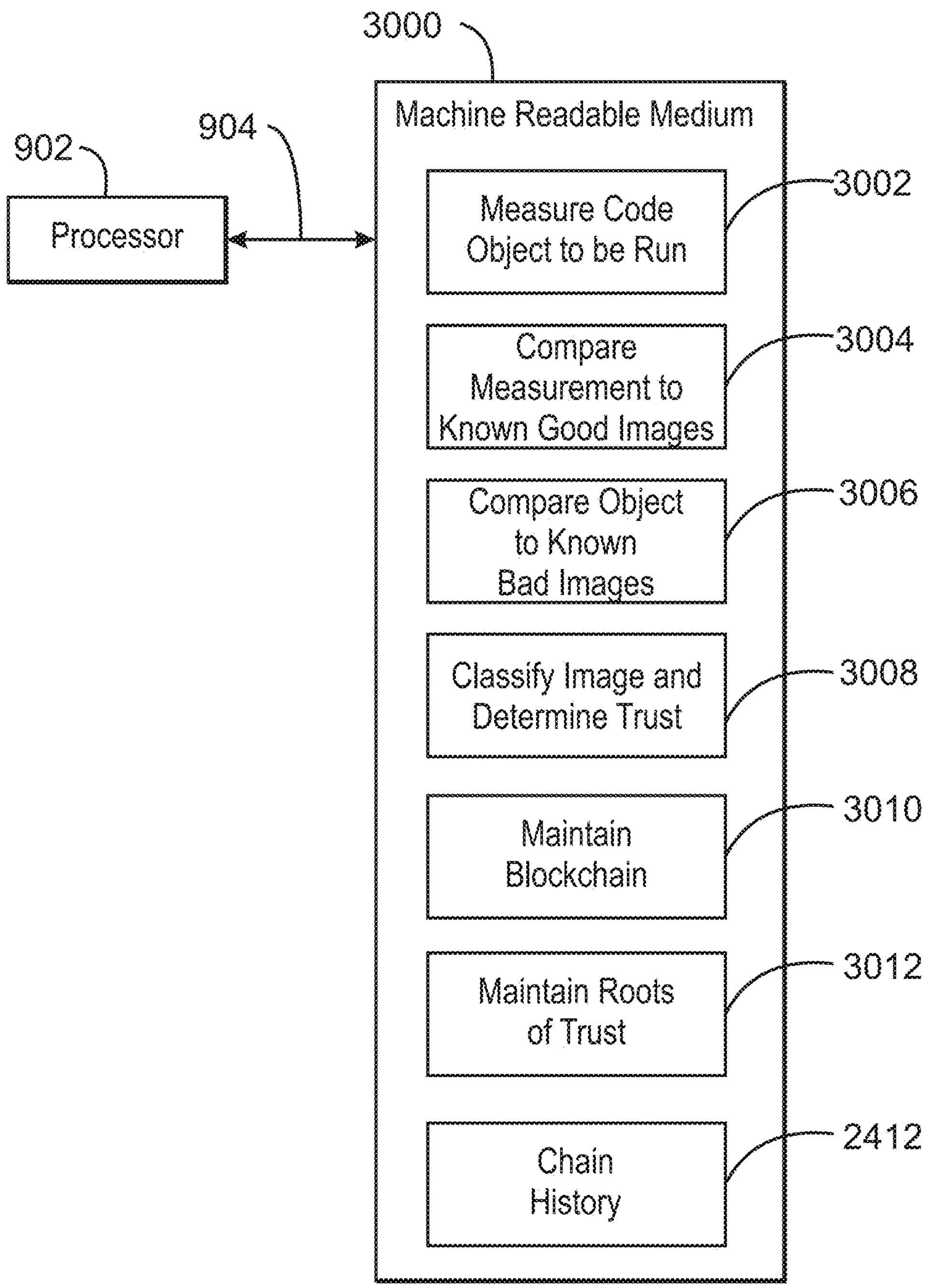
FIG. 30 is a block diagram of a non-transitory, machine readable medium including code to direct a processor to securely communicate in groups in accordance with some embodiments.

FIG. 30 is a block diagram of an exemplary non-transitory, machine readable medium 3000 including code to direct a processor 902 to securely boot in accordance with some embodiments. The processor 902 may access the non-transitory, machine readable medium 3000 over a bus 904. The processor 902 and bus 904 may be selected as described with respect to the processor 802 and bus 806 of FIG. 8. The non-transitory, machine readable medium 3000 may include devices described for the mass storage 808 of FIG. 8 or may include optical disks, thumb drives, or any number of other hardware devices.

The non-transitory, machine readable medium 3000 may include code 3002 to direct the processor 902 to measure a code object before running the code object. Code 3004 may be included to direct the processor 902 to compare the measurement to a list of know good images. Code 3006 may be included to direct the processor 902 to compare the object to a list of known bad images. Code 3008 may be included to direct the processor 902 to classify the image and determine a trust level, for example, allowing the processor to boot into a trusted execution environment, allowing the processor to boot into an untrusted environment, or blocking a boot and alerting a site administrator. Code 3010 may be included to direct the processor 902 to maintain a blockchain 3014, for example, committing transaction to a chain history, forwarding transaction changes to other IoT devices, or validating changes from other IoT devices, among others. Code 3012 may be included to maintain roots-of-trust, for example, as described with respect to FIG. 24 for the RTM 2404, the RTR 2406, the RTS 2408, the RTC 2410, and the RTA 2414. The machine readable medium 3000 may also store the blockchain, such as the chain history 2412, described with respect to FIG. 24.

Figure 31:
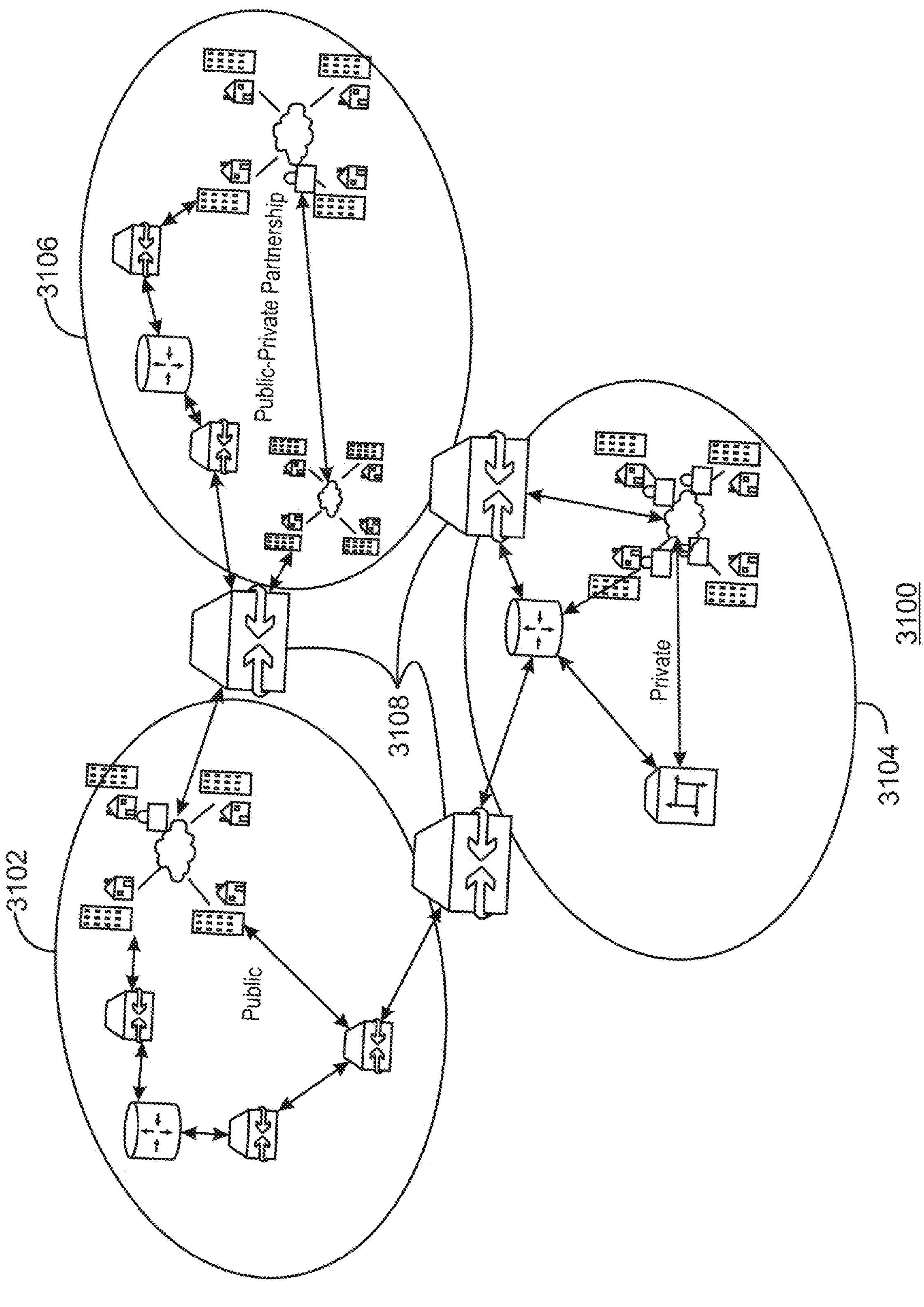
FIG. 31 is a schematic drawing illustrating interoperability across public domains, private domains, and public-private domains in accordance with some embodiments.

FIG. 31 is a schematic drawing 3102 illustrating interoperability across public domains 3102, private domains 3104, and public-private domains 3106 in accordance with some embodiments. The network topology may be in a continuous state of change, making any attempt at permanent maps impossible. Accordingly, IoT devices may use the backbone resources, such as domain name servers (DNS) to send packets between domains. The packets may be routed between the domains 3102, 3104, and 3106 through the Internet backbone, shown as routers 3108.

In some aspects, the routers 3108 provide the edge connections that couple the domains to one another. As described herein, any number of services may be provided at the edges of the domains 3102, 3104, and 3106 to enhance the interconnectivity. For example, interconnections between the public domain 3102 and the private domains 3104 may provide opportunities for micropayments for domain access, explicit permission and tracking for domain access, and the separation of public and private traffic, among others. Similarly, interconnections between the public domain 3102 and the public-private domain 3106 may provide opportunities for services such as time-based leases, resource marketplaces, and distributed identity servers, among others. Interconnections between the private domains 3104 and the public-private domains 3106 may provide opportunities for inline service interconnects, behavior based threat analysis, and proof-of-provenance, among others.

Figure 32:
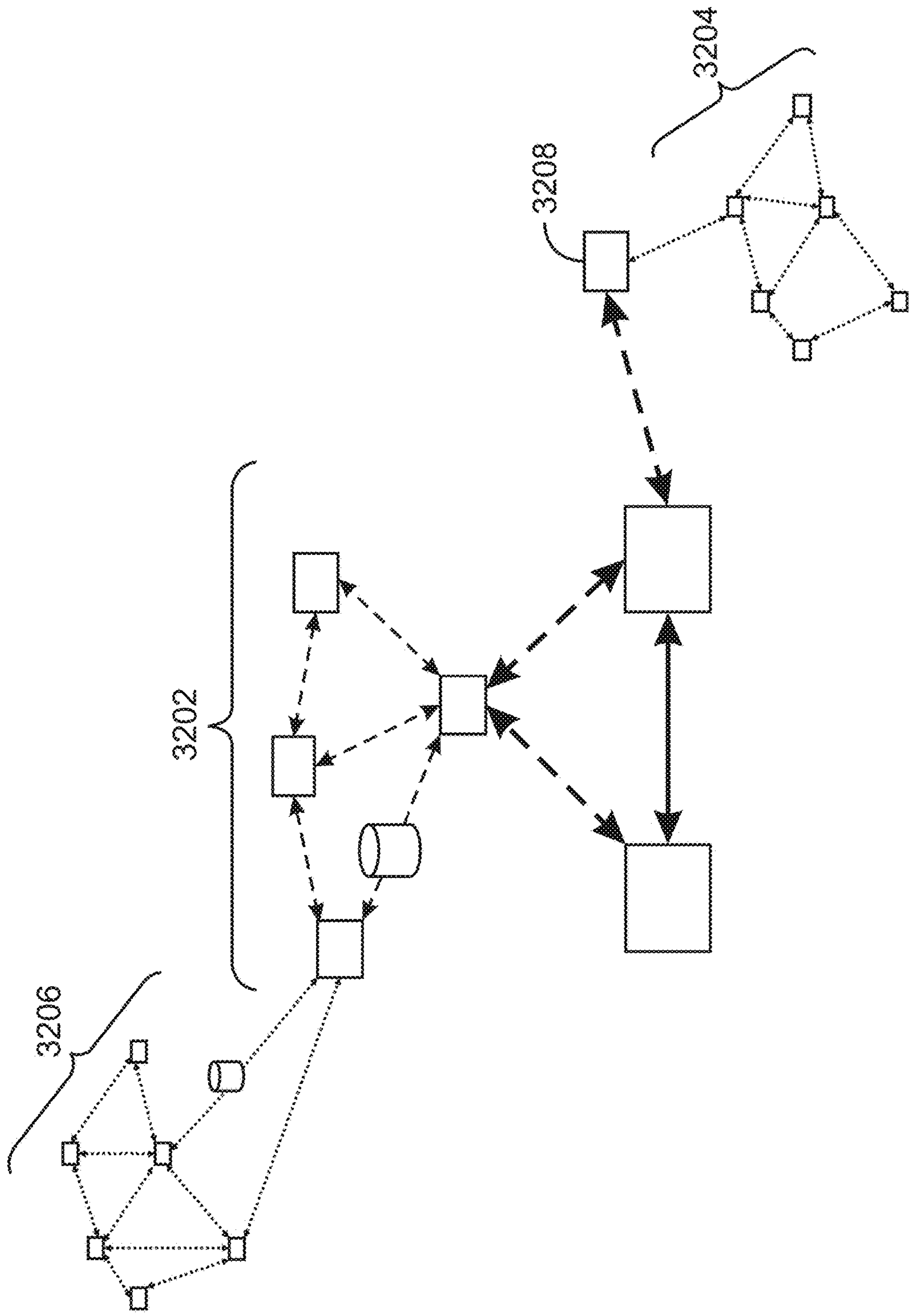
FIG. 32 is a schematic drawing of interoperability across a heterogeneous network of wired networks and wireless networks in accordance with some embodiments.

FIG. 32 is a schematic drawing of interoperability across a heterogeneous 3200 network of wired networks 3202 and wireless networks 3204 and 3206 in accordance with some embodiments. The wireless networks 3204 and 3206 may be communicatively coupled by devices in the wired network 3202. This provides opportunities for efficiency improvements in communications between devices in the wireless networks 3204 and 3206, as well as improvements in communications between devices in a wireless network 3204 or 3206 and a device in the wired network 3202. For example, edge device 3208 coupling a first wireless network 3204 to the wired network 3202 may provide a data to information transform to reduce the size of the payload. Further, the edge device 3208 may have a permissioning system that allows packets from the first wireless network 3204 to pass, while blocking unpermitted packets from transferring. The permissioning system may include systems to make micropayments to allow the information to move across the wired network 3202. As an example, the first wireless network 3204 may be a ground moisture sensor array on an agricultural site. The reporting frequency may depend on the rate of change, which may increase costs due to the need to purchase bandwidth to match the highest reporting rate. Thus, a micropayment system may lower costs by allowing transactions to paid for on an as-needed basis.

Figure 33:
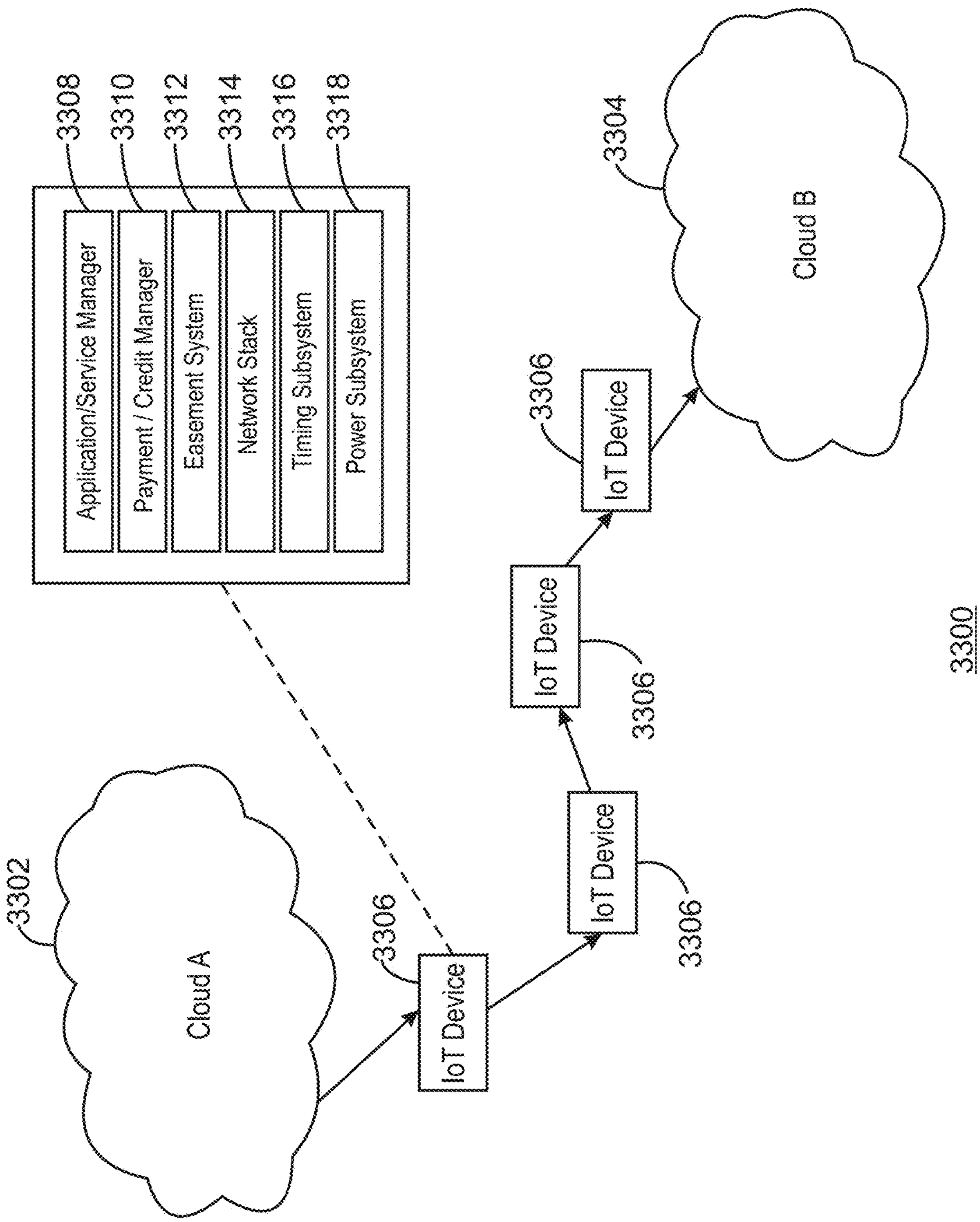
FIG. 33 is a schematic drawing of an inline routing system connecting two different fog or cloud entities, such as cloud A with cloud B in accordance with some embodiments.

FIG. 33 is a schematic drawing of an inline routing system 3300 connecting two different fog or cloud entities, such as cloud A 3302 with cloud B 3304 in accordance with some embodiments. In-line routing may use IoT devices 3306 as conduits between multiple sources and destinations where the combined action of the IoT devices 3306 acting as in-line routers form what may currently be termed a gateway.

In-line routing between connected IoT devices 3306 in a network may be performed using a stack-popping technique connecting at Layer 3 and Layer 4 of a networking stack. This technique may reduce the in-line latency and need for application-specific traffic management. The technique may be incorporated directly into a board support package (BSP) for various devices, such MCU-class devices.

Subsystems may be included in the IoT devices 3306 to perform the routing function, such as an application/service manager 3308 to interface with applications and manage the network stack for communications between the IoT devices 3306. A payment/credit manager 3310 may handle micropayments for transaction access to other networks, among other purposes. For example, the payment/credit manager 3310 may pay systems for allowing information transfer across a network or access to information, such as local weather information, traffic flow patterns, and the like. An easement system 3312 may control a network layer used to provide access rights to allow traffic to flow through a particular IoT device 3306.

A networking stack 3314 is configured to provide the different layers of the communications stack. Additional layers may be provided to implement the functionality described herein. For example, the easement system 3312 may control an easement layer, as described herein. A timing subsystem 3316 may be used to add timing functionality to the communications. For example, communications through an easement layer may be permitted during a limited time window for a particular set of credentials. After the time expires, new credentials, or further payments, may be required to reopen the communications. The system may include a power subsystem 3318 to provide power to the device.

Figure 34:
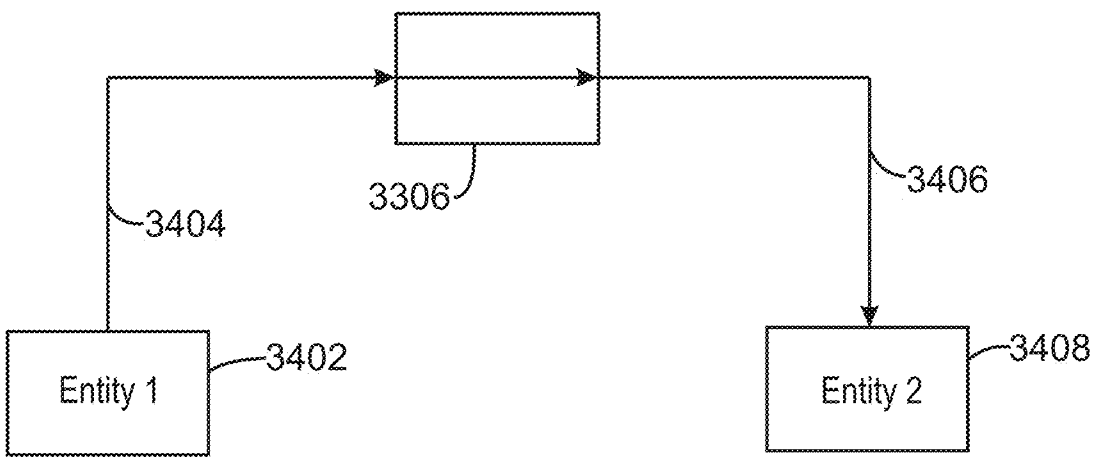
FIG. 34 is a schematic drawing of in-line routing showing implicit pass-through routing by an IoT device in accordance with some embodiments.

FIG. 34 is a schematic drawing 3400 of in-line routing showing implicit pass-through routing by an IoT device 3306 in accordance with some embodiments. Like numbered items are as described with respect to FIG. 33. The IoT device 3306 may be acting as an edge device between two domains, for example, translating the communications between different protocols.

A first entity 3402 may communicate with the IoT device 3306, for example, using a first protocol 3404. In this example, the IoT device 3306 does not restrict the traffic, but passes it on through without further permissions. The IoT device 3306 may translate the packets to a second protocol 3406 when sending them on to the second entity 3408.

Figure 35:
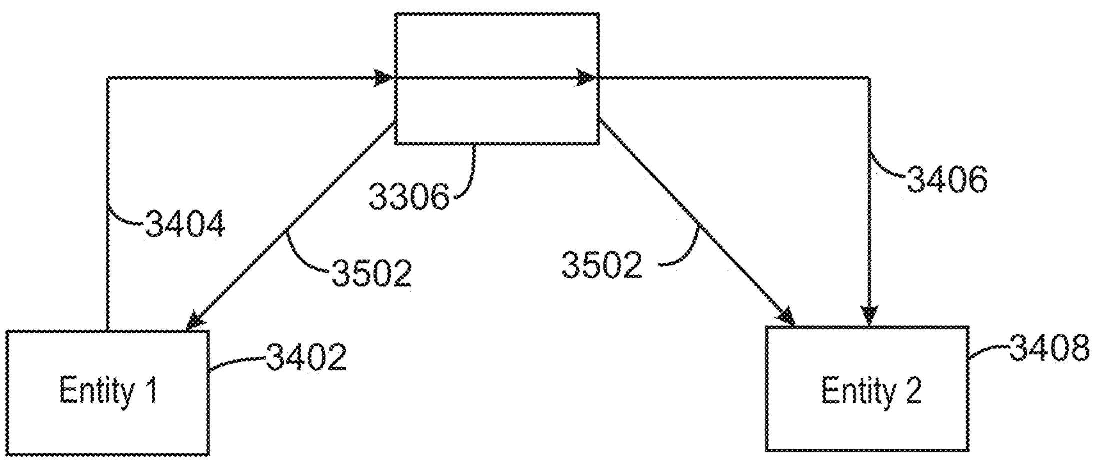
FIG. 35 is a schematic drawing of an explicit permissioned routing by an IoT device in accordance with some embodiments.

FIG. 35 is a schematic drawing of an explicit permissioned routing by an IoT device 3306 in accordance with some embodiments. Like numbered items are as described with respect to FIGS. 33 and 34. This approach addresses a potential security flaw in systems in which pass-through is implicit. As described with respect to FIG. 34, the IoT device 3306 may be acting as an edge device between two domains, for example, to translate the communications.

A first entity 3402 communicates with the IoT device 3306, for example, using a first protocol 3404. In this example, the IoT device 3306 may issue challenges 3502 to one, or both devices, to determine permissions before passing the traffic through. As used herein, permissioned pass-through is a method of asserting a right to pass through an in-line interconnection based on a key or token challenge, a time-limited easement, a behavior or reputation-based permission, a monetary or other electronic currency exchange, or any combinations thereof.

For example, the IoT device 3306 may accept an identification key from an entity 3402 or 3408, and access a blockchain to confirm that the device is authorized to communicate with the other entity 3408 or 3402. The IoT device 3306 may allow communications to continue for a predetermined amount of time, such as 1 second (s), 500 milliseconds (ms), 100 ms, or less. The IoT device 3306 may require a micropayment to allow the communications to proceed. Further, the IoT device 3306 may translate the packets to a second protocol 3406 when sending them on to the second entity 3408.

Figure 36:
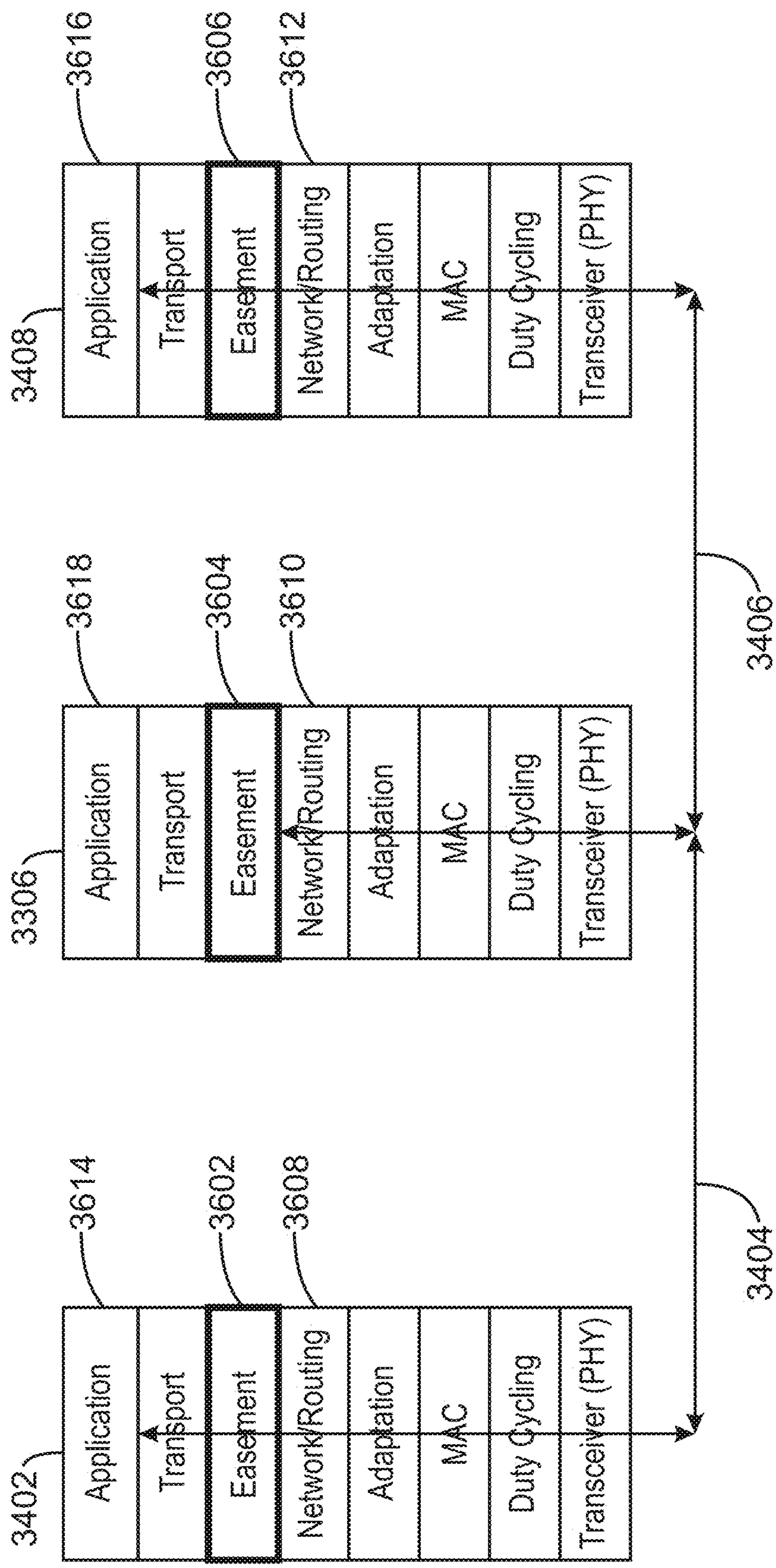
FIG. 36 is a schematic drawing of an easement layer for in-line routing used for pass through policy control in accordance with some embodiments.

FIG. 36 is a schematic drawing of an easement layer 3602, 3604, and 3606 for in-line routing used for pass through policy control. Like numbered items are as described for FIGS. 33 and 34. As used herein, the term easement describes a non-possessory right to relay information through a node without possessing the node. The process provides a conduit for communications across multiple nodes consenting to the use of their resources without intermediate nodes knowing of the packet ingress, egress, or contents, for example, in an easement layer below the application layer.

The easement layer 3602, 3604, or 3606 may include part of a networking stack above the routing layer 3608, 3610, or 3612, respectively. An application 3614 in a first entity 3402 may send a packet to an application 3616 in a second entity 3404. The packet passes through the easement layer 3608 in the first entity 3402, where it is packaged with the appropriate information to be transferred by a second easement layer 3604, for example, in the IoT device 3306.

Once permission to transfer packets, for example, based on identity, authorization, payment, or time, is confirmed by an easement system, such as a code block operating in the memory, the packet transfer may take place through an easement layer 3604 in a network stack in the IoT device 3306. The protocol of the packet may be converted to the second protocol 3406 in the easement layer 3604. Thus, the packet is handled below the application layer 3618 in the IoT device 3306, which is not aware of its contents or even that a packet has passed through.

The packet is then passed on to the second entity 3408. In the easement layer 3606 in the second entity 3408, the easement information is removed from the packet, and the packet is sent on to the application layer 3616 for consumption by an application. A similar process works in the opposite direction for packets sent from the second entity 3408 to the first entity 3402.

The schematic diagram 3600 shows a single intermediate entity, the IoT device 3306. However, as shown in FIG. 33, multiple intermediate entities may be used to transfer the packet from the first entity 3402 to the second entity 3408.

Figure 37:
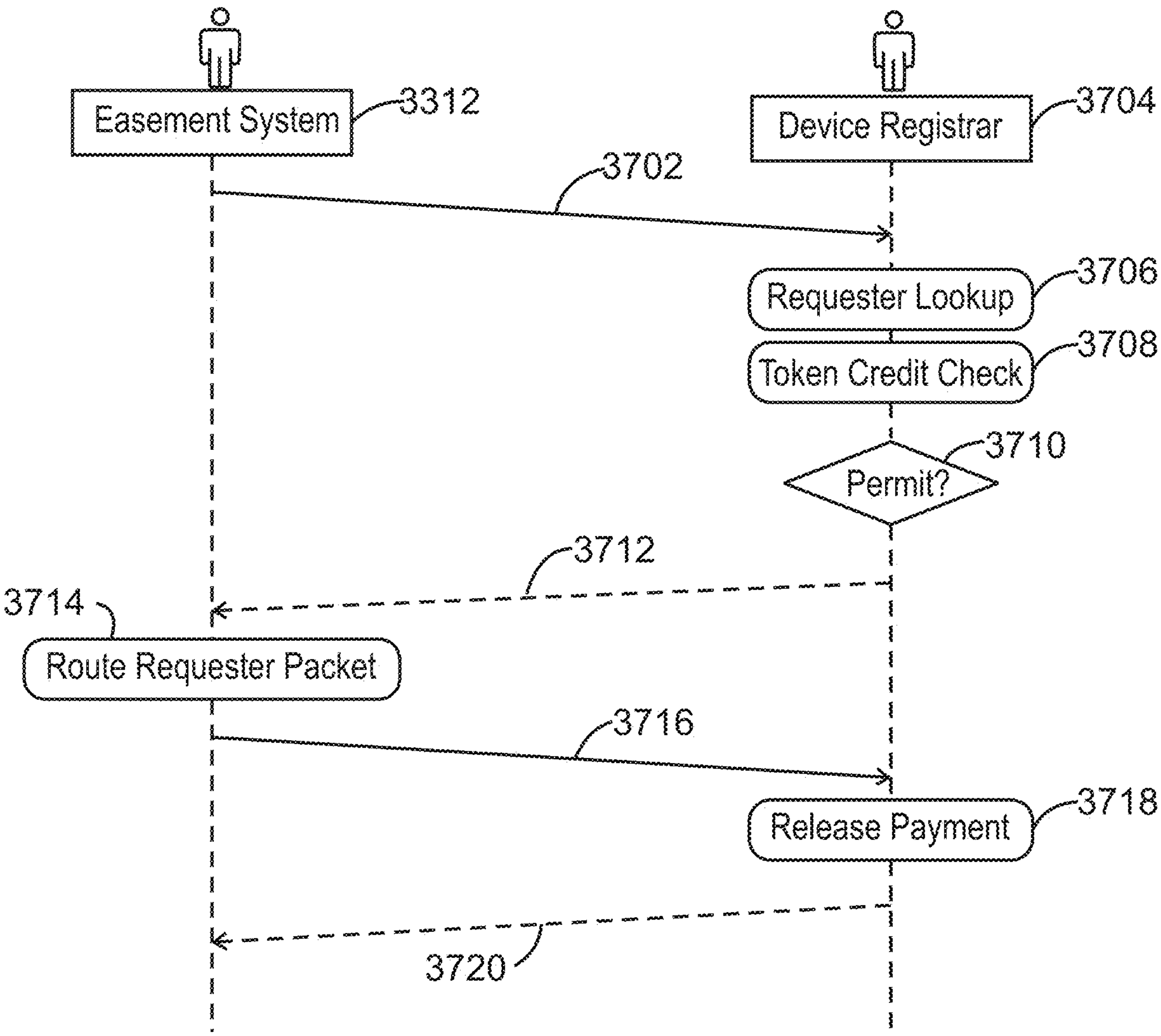
FIG. 37 is a ladder diagram of an example method for explicit pass-through routing based on permissions in accordance with some embodiments.

FIG. 37 is a ladder diagram showing an example method 3700 for explicit pass-through routing based on permissions in accordance with some embodiments. The method 3700 of FIG. 37 may be implemented by the IoT device 3900 described with respect to FIG. 39. Like numbered items are as described with respect to FIG. 33. In this case, the permissions are based on electronic credits for micropayments, but similar permissions may be based on keys, unit identifications, reputational keys, and the like.

In the method 3700, an easement system 3312 may send a routing request 3702 to a device registrar 3704 to determine if a packet may be passed through the easement. The device registrar 3704, or escrow agent, may reside either within the node acting as the explicit pass-through node, or externally as a common agent to a group of nodes. The routing request 3702 includes the identification or keys associated with the requester, which may be used by the device registrar 3704 to determine if the pass-through request should be granted or denied.

In a payment-based example, the ability of the requester to pay is also determined. This may be performed, for example, by the device registrar 3704 by looking up 3706 the identification or keys for the device in a blockchain. A token credit check 3708 may be performed on transactions in the blockchain to determine if sufficient credit exists to pay for the transaction. The token credit check 3708 may be based on a token embedded in the pass-through request, or on an amount of credit recorded in a blockchain.

The permit or deny decision 3710 may then be made on the basis of the credit, identification, keys, or any combinations. A response 3712 may then be sent to the easement system 3312 to inform it of the outcome of the permit or deny decision 3710. If the decision was to deny the packet transit, the easement system 3312 may delete the packet without further action, or inform the sender of the denial of access, among other events.

If the permit or deny decision 3710 is to pass the packet through, the easement system 3312 may route the packet 3714 towards the target device. The determination of permission, for example, the micropayment, may occur with transit through one or more of the IoT devices 3306, or only through edge devices, such as routers coupling different domains. Once the packet has been routed, the easement system 3312 may send a notification 3716 that the routing has been completed to the device registrar 3704. The device registrar 3704 can then release a micropayment 3718, and send the payment 3720 to the easement system 3312. If a blockchain record is used, the device registrar 3704 may record the payment in a block and commit the block to the blockchain to record the change in the amount of credit remaining.

Figure 38:
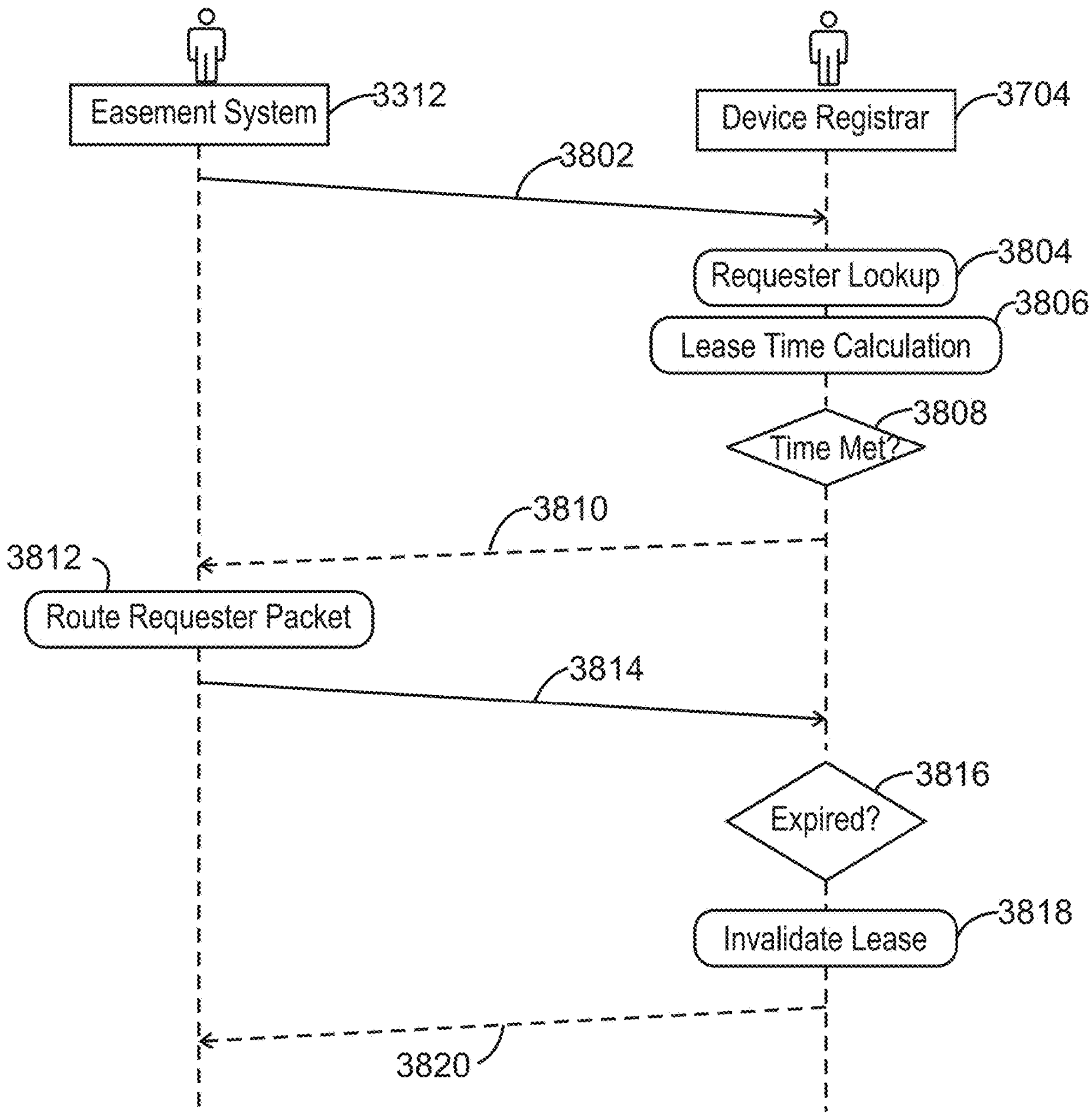
FIG. 38 is a ladder diagram of an example method of for a time limited lease approach for explicit pass-through in accordance with some embodiments.

FIG. 38 is a ladder diagram of an example method 3800 of for a time limited lease approach for explicit pass-through in accordance with some embodiments. The method 3800 of FIG. 38 may be implemented by the IoT device 3900 described with respect to FIG. 39. Like numbered items are as described with respect to FIGS. 33 and 37. In this example, in step 3802, the device registrar 3704 receives a pass-through request that includes the identification or keys associated with the requester and a requested pass-through duration. The credentials and duration may be used by the registrar to determine if the request should be granted or denied. This may be performed, for example, by having the device registrar 3704 looking up 3804 the identification, keys, and permitted communications duration for the device in a blockchain.

In step 3806, the permitted duration for the communications is determined. If the requested pass-through duration cannot be supported 3808, a maximum permitted pass-through duration is specified in a response 3810. Once the packet has been routed 3812, the easement system 3312 may send a notification 3814 that the routing has been completed to the device registrar 3704. The device registrar 3704 may then determine if the lease time has expired 3816. If so, in step 3818, the device registrar 3704 invalidates the lease, and in step 3820, the device registrar 3704 sends a notification 3820 to the easement system 3312 to notify it of the lease expiration.

Figure 39:
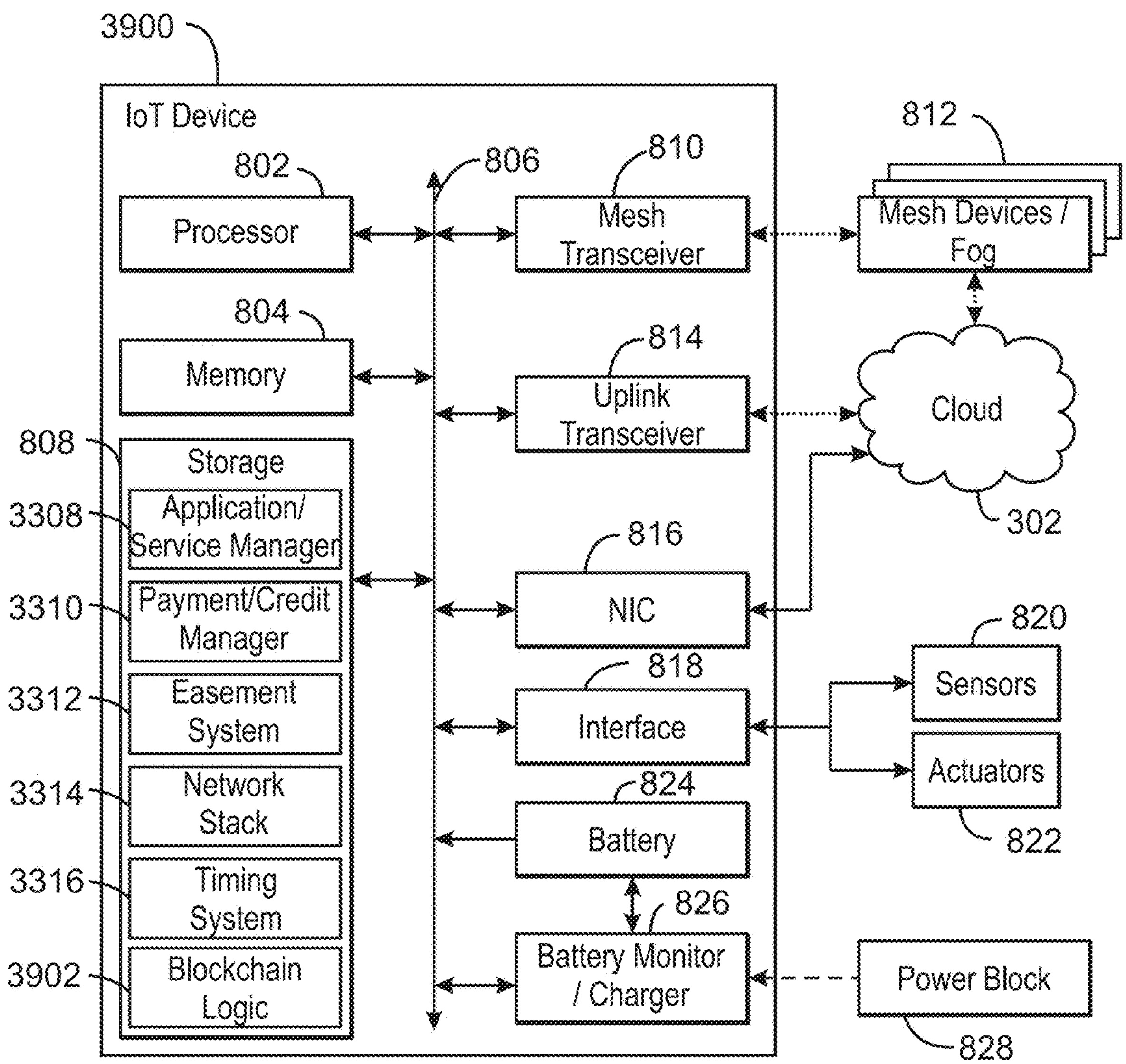
FIG. 39 is a block diagram of an example of components that may be present in an IoT device for creating coalition groups in accordance with some embodiments.

FIG. 39 is a block diagram of an example of components that may be present in an IoT device 3900 for creating coalition groups in accordance with some embodiments. Like numbered items are as described with respect to FIGS. 3, 8, 33, and 38. It can be noted that different components may be selected and used for the IoT device 3900 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include an application/service manager 3308 that may provide an application operating environment, such as an operating system and a programming interface for communicating packets to other mesh devices 812, devices in the cloud 302, and the like. A payment/credit manager 3310 may handle micropayments for communications, as described with respect to FIG. 33. An easement system 3312 may control an easement layer to provide access rights for packet transfer, as described with respect to FIGS. 37 and 38. A network stack 3314 may provide the network layers for packaging and transferring packets. The network stack 3314 may include an easement, for example, as described with respect to FIG. 36. A timing system 3316 may be included to add timing functionality for communications, for example, counting down the time before a lease expires. Blockchain logic 3902 may be included to access and maintain a blockchain of communication permissions, payments, or credits, among other items.

Figure 40:
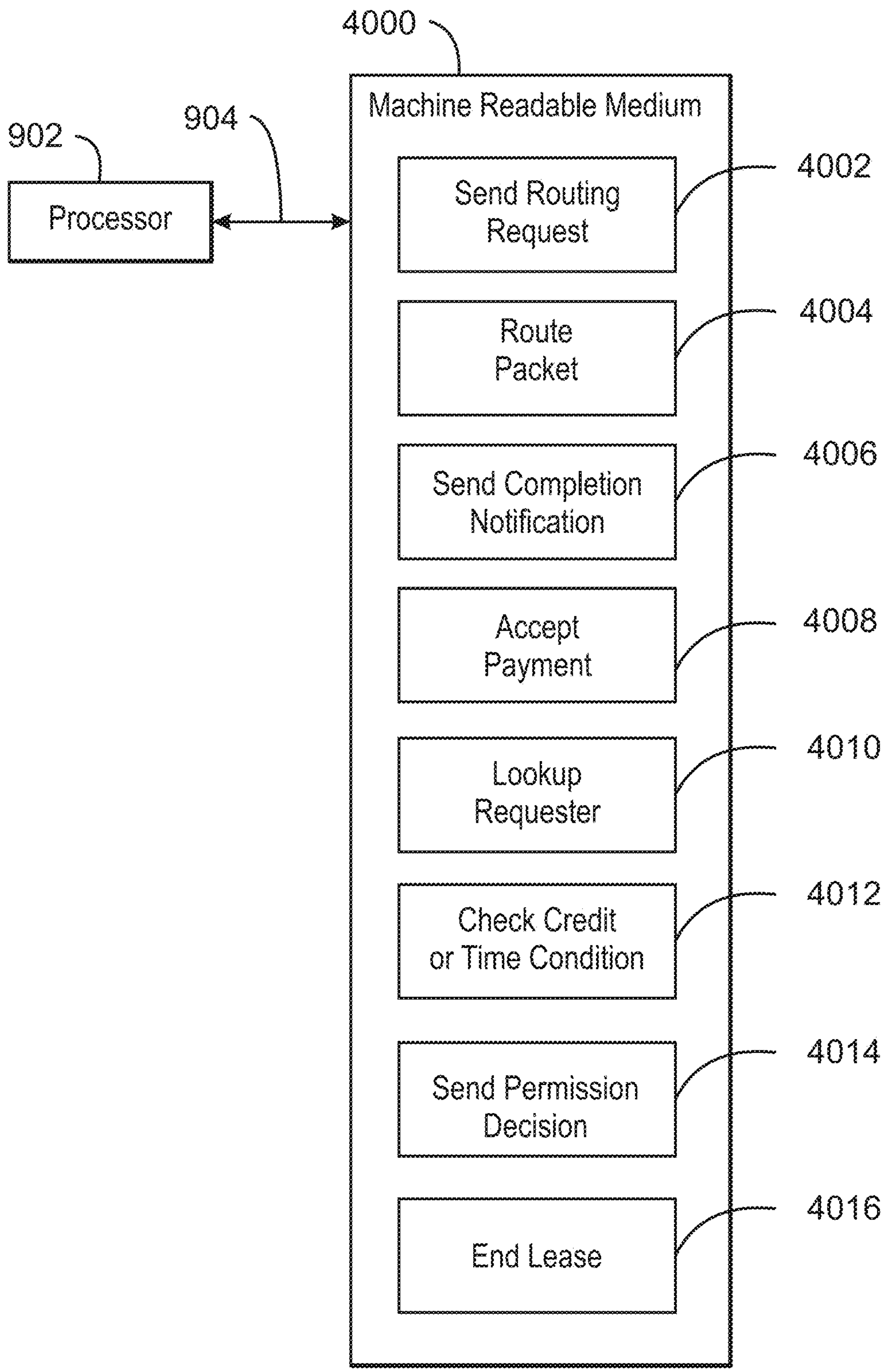
FIG. 40 is a block diagram of a non-transitory, machine readable medium including code to direct a processor to transfer communications between devices through easements in accordance with some embodiments.

FIG. 40 is a block diagram of a non-transitory, machine readable medium 4000 including code to direct a processor 902 to transfer communications between devices through easements. The processor 902 may access the non-transitory, machine readable medium 4000 over a bus 904. The processor 902 and bus 904 may be implemented in a manner similar to the processor 902 and bus 904 described with respect to FIG. 9. The non-transitory, machine readable medium 4000 may include devices described for the mass storage 808 of FIG. 8 or may include optical disks, thumb drives, or any number of other hardware devices.

The non-transitory, machine readable medium 4000 may include code 4002 to direct the processor 902 send a routing request to a device registrar to determine if the communications are permitted. Code 4004 may be included to direct the processor 902 to route a packet between devices based on reputation, permission, micropayments, and the like. The code 4004 may direct the processor 902 to translate the packet to a new protocol, for example, when entering a new domain.

Code 4006 may be included to direct the processor 902 to send a completion notification to the device registrar to inform it that communications, such as a group of packets forming a message, have been transferred. Code 4008 may be included to direct the processor 902 to accept payment from the device registrar for the communications, for example, which has been held in escrow by the device registrar pending completion of the transfer.

As an IoT device 3306 (FIG. 33) may act as the device registrar, code 4010 may be included to direct the processor 902 to lookup a requester, for example, accessing a blockchain to determine permissions and identities. Code 4012 may be included to direct the processor 902 to check a credit or payment to determine if it is sufficient for the communications. The code 4012 may direct the processor 902 to calculate a permitted communication time. Code 4014 may be included to direct the processor 902 to send a permission decision to an easement system 3312, permitting the easement system 3312 to transfer or delete the packet or communication. Code 4016 may be included to direct the processor 902 to invalidate a time based lease, for example, if the last communication completed exceeded the permitted lease time. The code 4016 may direct the processor 902 to send a message to the easement system 3312 invalidating the lease.

Tracking the devices that a frame passes through may provide an enhanced level of security as communications pass through different domains from a source device to a target device. This may help to prevent attacks that imitate source devices, such as man-in-the-middle attacks, among others. In a man-in-the-middle attack, a device intercepts communications intended for another device, and changes the communications to compromise security.

Figure 41:
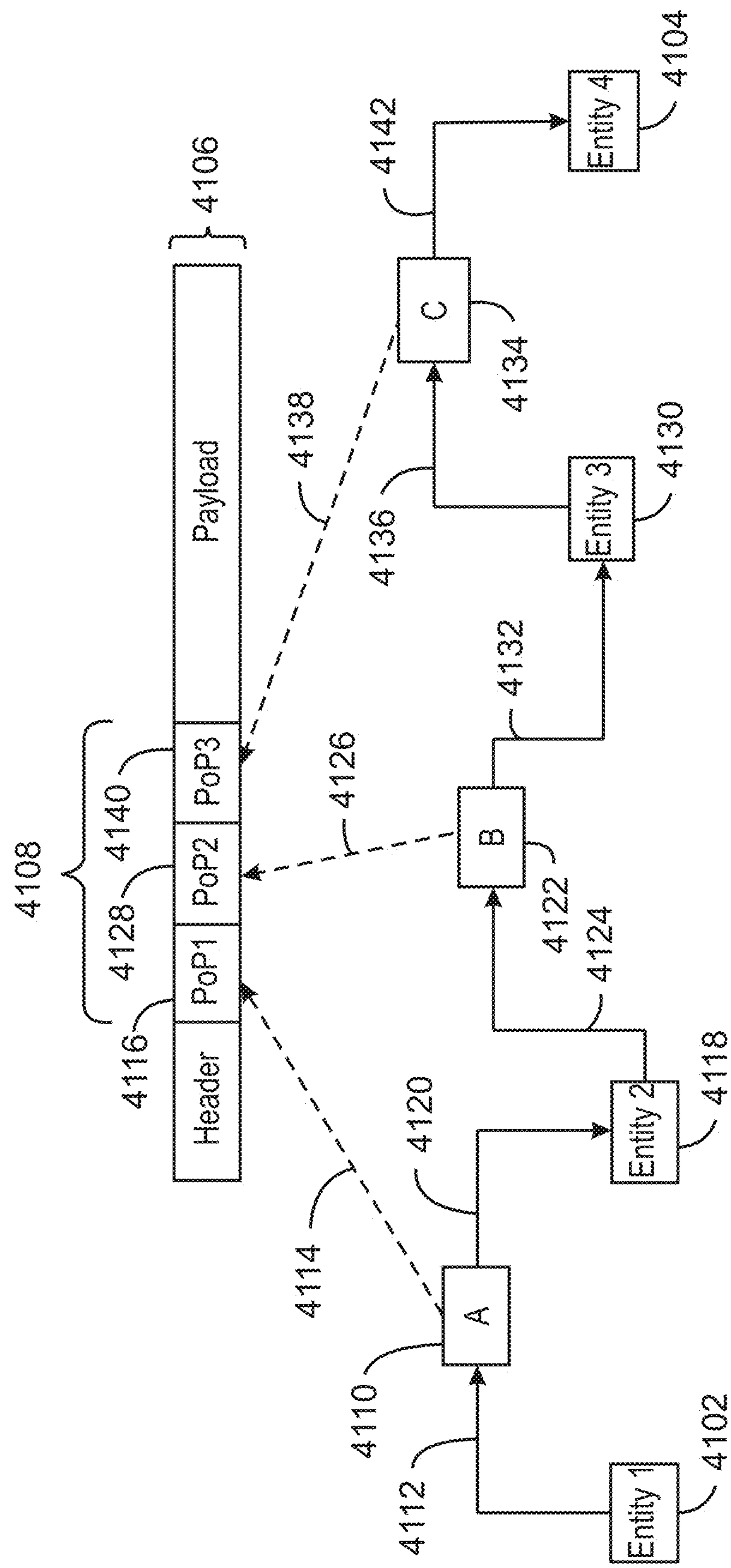
FIG. 41 is a schematic drawing of using a frame structure to carry proof-of-provenance (PoP) information through devices in a network in accordance with some embodiments.

FIG. 41 is a schematic drawing of using a frame structure to carry proof-of-provenance (PoP) information through devices in a network in accordance with some embodiments. The devices may include IoT devices, internet devices, edge devices, or any combinations thereof. Proof-of-provenance provides traceability of network traffic through a multi-link connectivity chain. The PoP method creates a traffic audit trail, and, as described herein, may be used to identify and block a man-in-the-middle attack. The PoP may be used when an entity 1 4102 initiates communications with another entity 4 4104, for example, by sending a packet 4106. The packet 4106 may include a number of placeholders 4108 to identify devices that the packet 4106 has passed through.

In this example, the packet 4106 may be sent to a first device A 4110, or router, in a first message 4112. Device A 4110 may modify the packet 4106 to indicate the transition of the packet through the device A 4110, for example, by writing 4114 a transit code, PoP1 4116 into the placeholders 4108. The generation of the transit code is discussed further with respect to FIG. 42.

The packet 4106 may then be passed to another device, entity 2 4118, in a second message 4120. The second message 4120 may be in a different protocol from the first message 4112, for example, being translated into the second protocol in device A 4110. Entity 2 4118 may pass the packet along to another device B 4122 in a third message 4124, and may also translate the packet into a new protocol.

Device B 4122 may modify the packet 4106 to indicate the transition of the packet 4106 through device B 4122, for example, by writing 4126 a second transit code, PoP2 4128 into the placeholders 4108. Device B 4122 may then pass the packet on to another device, entity 3 4130 in another message 4132. In this example, entity 3 4130 may translate the packet 4106 back to the initial protocol, before sending it on to device C 4134 in a message 4136.

Device C 4134 may modify the packet 4106 to indicate the transition of the packet 4106 through device C 4122, for example, by writing 4138 a third transit code, PoP3 4140 into the placeholders 4108. Device C 4134 may then pass the packet on to another device, entity 4 4140 in another message 4142. Device C 4134 may or may not translate the packet 4106 to another protocol, before sending it on to entity 4 4140.

Each node in the chain may only have knowledge of the previous node and the next node in the chain. Thus, the PoP sequence in the packet 4106 provides a trail of devices that the packet 4106 transited. In some examples, the placeholders 4108 are not explicitly used, with the PoP codes inserted into, or appended on, the packet 4106.

Figure 42:
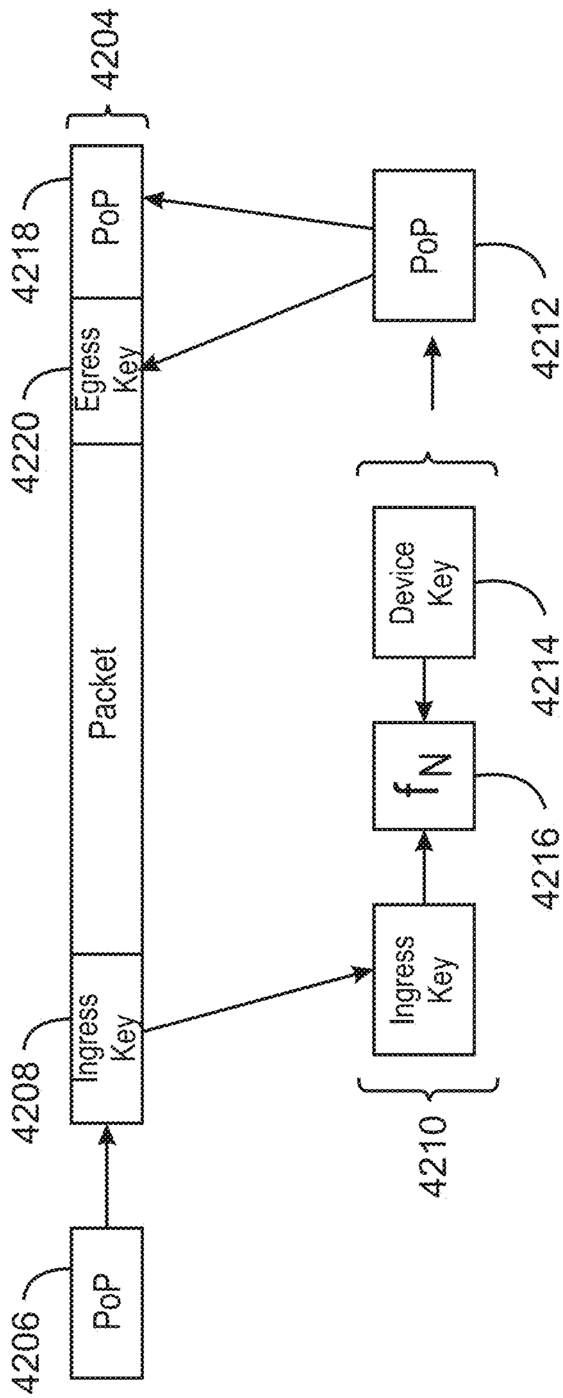
FIG. 42 is a schematic diagram of a procedure that may be used to create a PoP transit code or key in accordance with some embodiments.

FIG. 42 is a schematic diagram 4200 of a procedure that may be used to create a PoP transit code or key in accordance with some embodiments. For an originating packet 4204, a PoP sequence 4206 may be generated by performing a transformation on a seed byte sequence. The seed byte sequence may be generated by a random number generator based on a device ID, or by any number of other techniques. The transformation process may entail an exclusive OR operation (XOR), or other binary calculation method.

A node in the chain receives the PoP sequence and treats it as an ingress key 4208. The node then performs a transformation 4210 using the incoming ingress sequence to produce its own PoP sequence 4212. For example, the ingress key 4208 may be combined with a device key 4214 using an exclusive OR function 4216 to generate the PoP sequence 4212. The device key 4214 may be a manufacturer's key stored in the device, a device ID, a random number generator based on a device ID, and the like. The PoP sequence 4212 may then be added to the packet 4204 as a PoP key 4218. The same sequence may be added as an egress key 4220 used by the next stage of the PoP to generate the next PoP key. In some examples, the egress key 4220 may be left off, and the PoP key 4218 itself may be used for the next stage. A null sequence, or other standard sequence format, may be used to denote that a PoP transformation was not performed by the previous stage.

Figure 43:
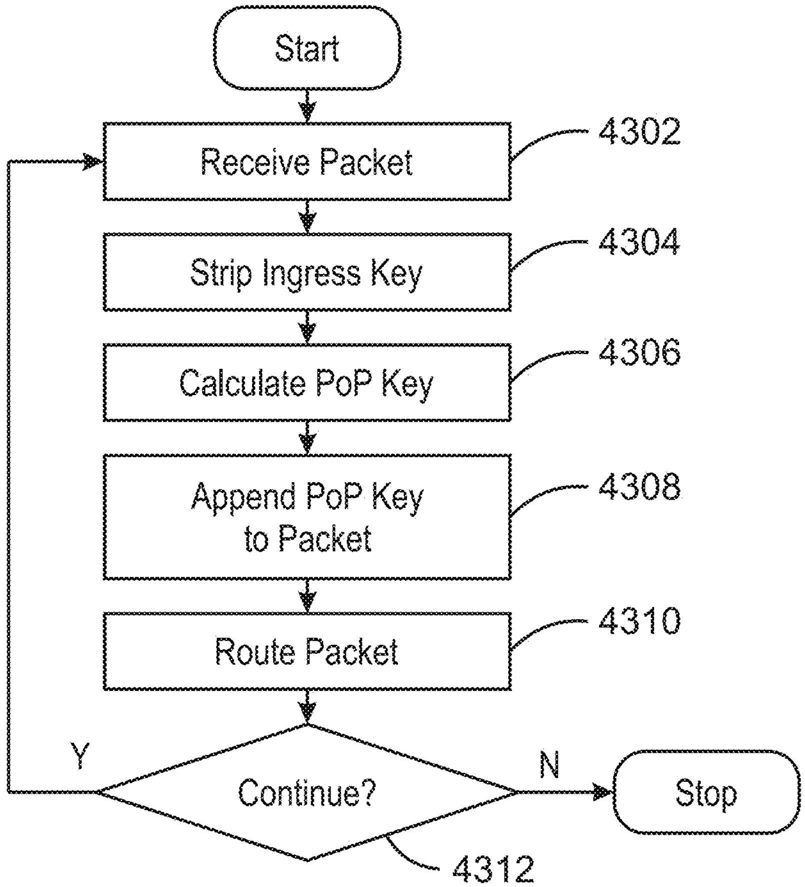
FIG. 43 is a process flow diagram of an example method for generating a PoP key in accordance with some embodiments.

FIG. 43 is a process flow diagram of an example method 4300 for generating a PoP key. The method 4300 of FIG. 43 may be implemented by the IoT device 4500 described with respect to FIG. 45. The block 4302 represents, for example, when a device receives from another device a packet intended for transmission to a third device. At block 4304, the ingress key is obtained, for example, by reading the PoP key generated by the last PoP stage. At block 4306, another PoP key is calculated, for example, using an XOR function of the previous PoP key and the device key, such as the private key or the common key used by the node.

At block 4308, the newly generated PoP key is appended to the packet, leaving any previously generated PoP keys intact. At block 4310, the packet is routed to the next device. At block 4312 a determination is made as to whether the packet has reached the destination. If not, process flow returns to block 4302 to continue the process at the next node. If the packet has reached the destination, the method 4300 ends. It may be noted that not all devices need to insert or append a PoP key to the packet. Some devices, such as Entity 3 4130, described with respect to FIG. 41, may pass packets without placing a PoP key in the packet. These devices may be generic routers and other devices within a single domain.

Figure 44:
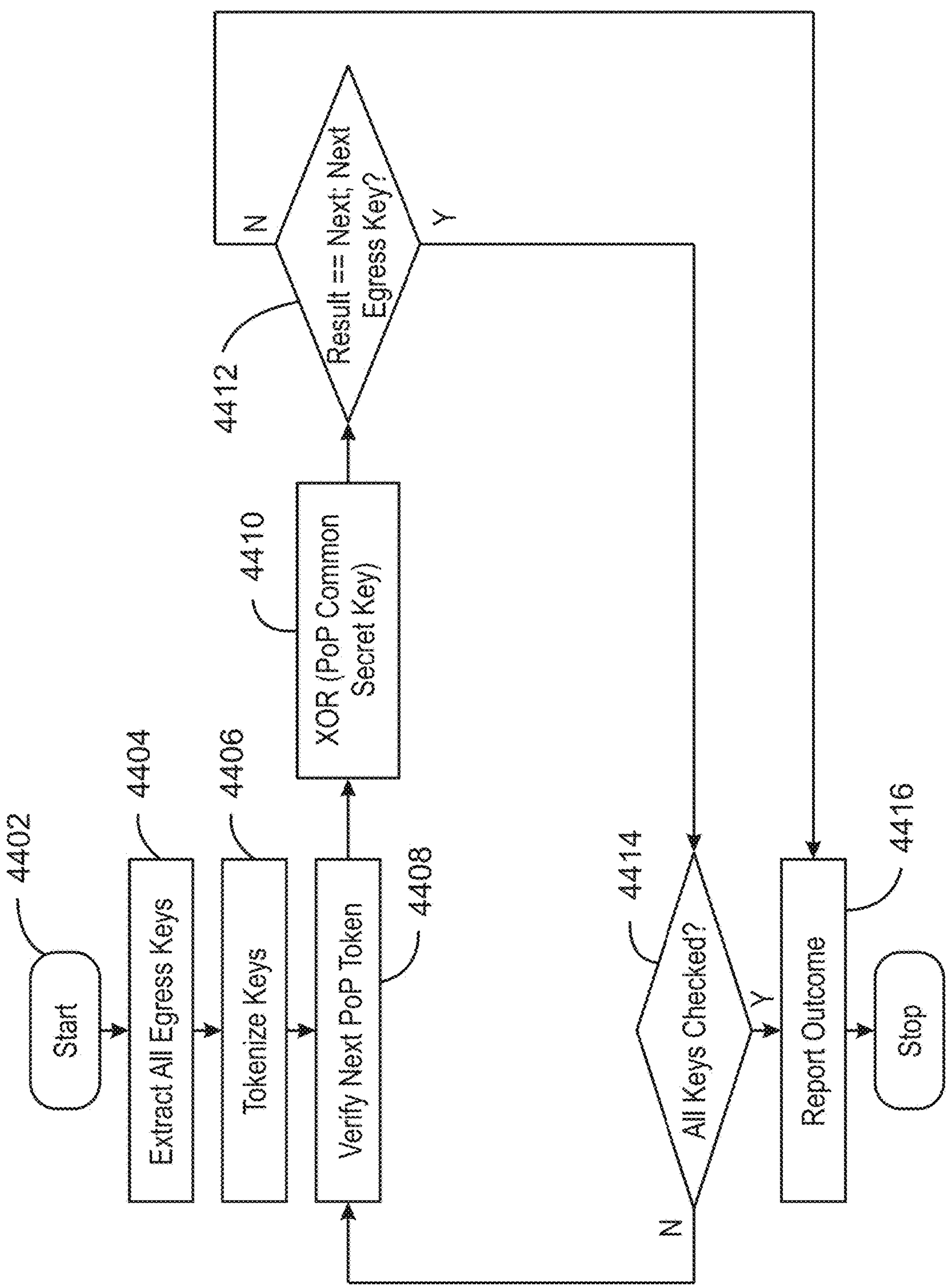
FIG. 44 is a process flow diagram of an example method for verifying the PoP keys in a packet in accordance with some embodiments.

FIG. 44 is a process flow diagram of an example method 4400 for verifying the PoP keys in a packet in accordance with some embodiments. The destination node at the end of a continuous PoP chain will receive a valid sequence of PoP keys if the packet traveled through a complete chain. Device keys from the nodes in the chain may be made available to the destination node, or other validation entity, via a database, a blockchain, or other mechanisms. The device keys may be used to verify the full chain using a sequence transformation process, when having knowledge of the ingress and PoP keys for all of the nodes. This process can be used to determine if, and where, a break in the PoP chain occurred when the iterative verification calculation results in a PoP value that does not match the reported PoP sequence.

The block 4402 represents, for example, when a validation device receives a packet. At block 4404, the concatenated list of PoP keys is extracted from the packet to be verified. At block 4406, the PoP keys may be tokenized to segment the string into the individual tokens/keys. At block 4408, a current PoP key may be verified. At block 4410, the current PoP key may be combined with a common secret key using an XOR process. At block 4412, the XOR result may be compared to the next token which is the ingress key for the next node in the route. If the XOR result and next ingress key don't match, process flow may proceed to block 4416 to report a failure condition.

If there is a match at block 4412, at block 4414, a determination is made as to whether all keys in the PoP sequence have been tested. If not, process flow returns to block 4408 to test the next key. If all keys have been tested, at bock 4416 a successful outcome is reported.

Figure 45:
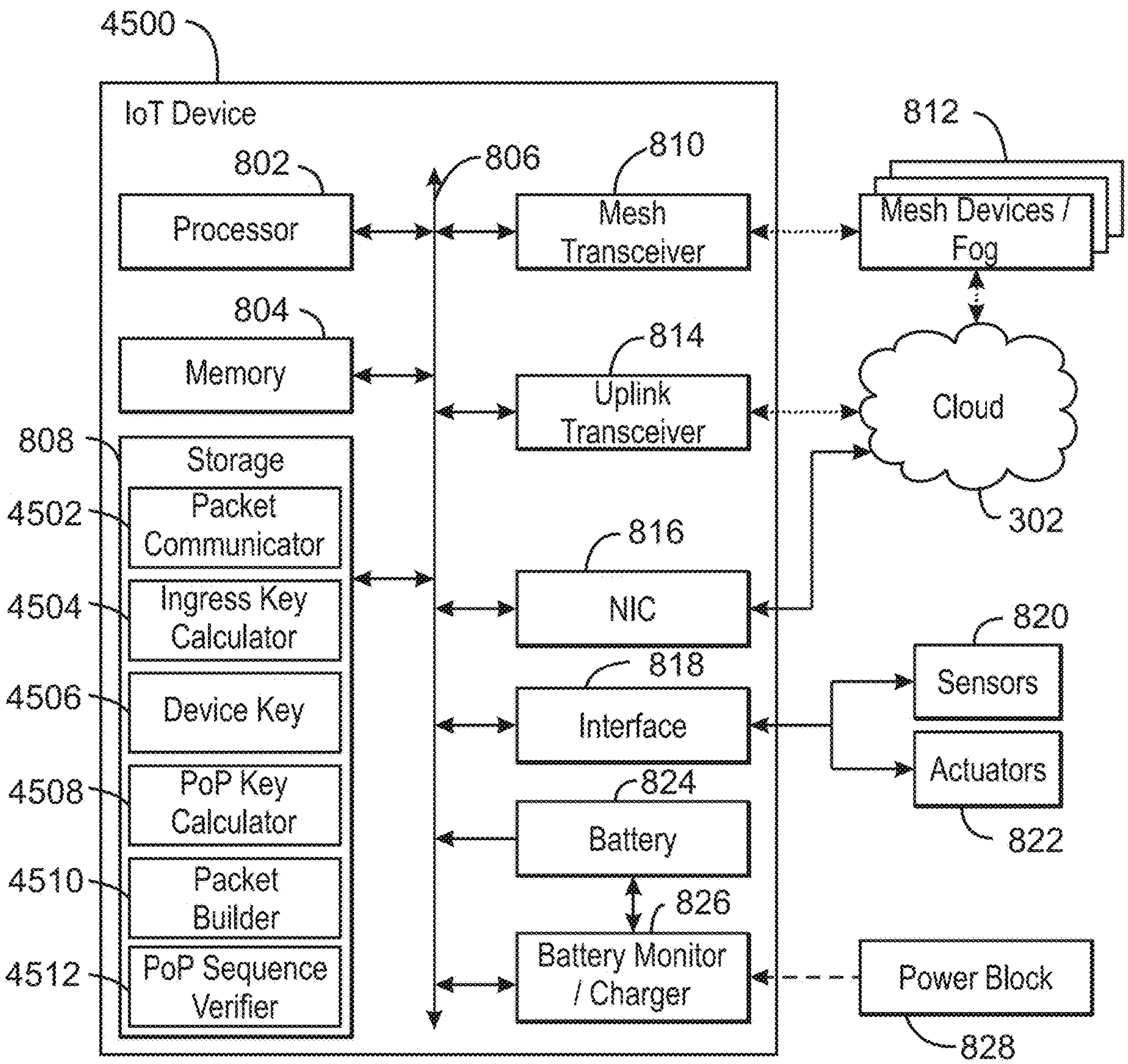
FIG. 45 is a block diagram of an example of components that may be present in an IoT device for tracking proof-of-provenance in packets in accordance with some embodiments.

FIG. 45 is a block diagram of an example of components that may be present in an IoT device 4500 for tracking proof-of-provenance in packets in accordance with some embodiments. Like numbered items are as described with respect to FIGS. 3 and 8. It can be noted that different components may be selected and used for the IoT device 4500 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a communicator 4502 that accepts packets from mesh devices 812 or devices in the cloud 302, and relays the packets to other mesh devices 812, devices in the cloud 302, and the like. The communicator 4502 may perform other functions, such as translation of packets between protocols, accepting micropayments, and the like. Further, the communicator 4502 may be part of an easement system 3312, described with respect to FIG. 33.

An ingress key calculator 4504 may be used to determine the ingress key. If the packet has an appended PoP key, this may be read and identified as the ingress key. If the ingress key calculator 4504 finds a null character or other character indicating that the IoT device 4500 may be the first device in a chain, the IoT device may use a random number generator to calculate an ingress key. This may be based on a device key 4506 or other seed. The device key 4506 may be a stored value from a manufacturer, or may be a key that has been generated and assigned to the IoT device 4500 for secure communications in a group, as described with respect to FIG. 20, among others.

A PoP key calculator 4508 may be used to calculate PoP, or egress, keys from the device key 4506 and the ingress keys. This may be performed as discussed with respect to FIG. 42.

A packet builder 4510 may be used to construct the new packet, for example, once any translation to different protocols has been performed. The packet constructor may append the PoP key for the current node to the end of the packet, after any other keys. Further, the packet constructor 4510 may be part of an easement layer, adding any easement information used for transmitting the packet by easement layers in other devices, as described with respect to FIG. 36.

A PoP sequence 4512 verifier may be included to analyze PoP sequences, as described with respect to FIG. 44. The PoP sequence verify may determine that the PoP keys in a packet follow an allowed route through a chain of devices, and that the packet has not passed through an illegitimate device. This may protect from man-in-the-middle attacks.

Figure 46:
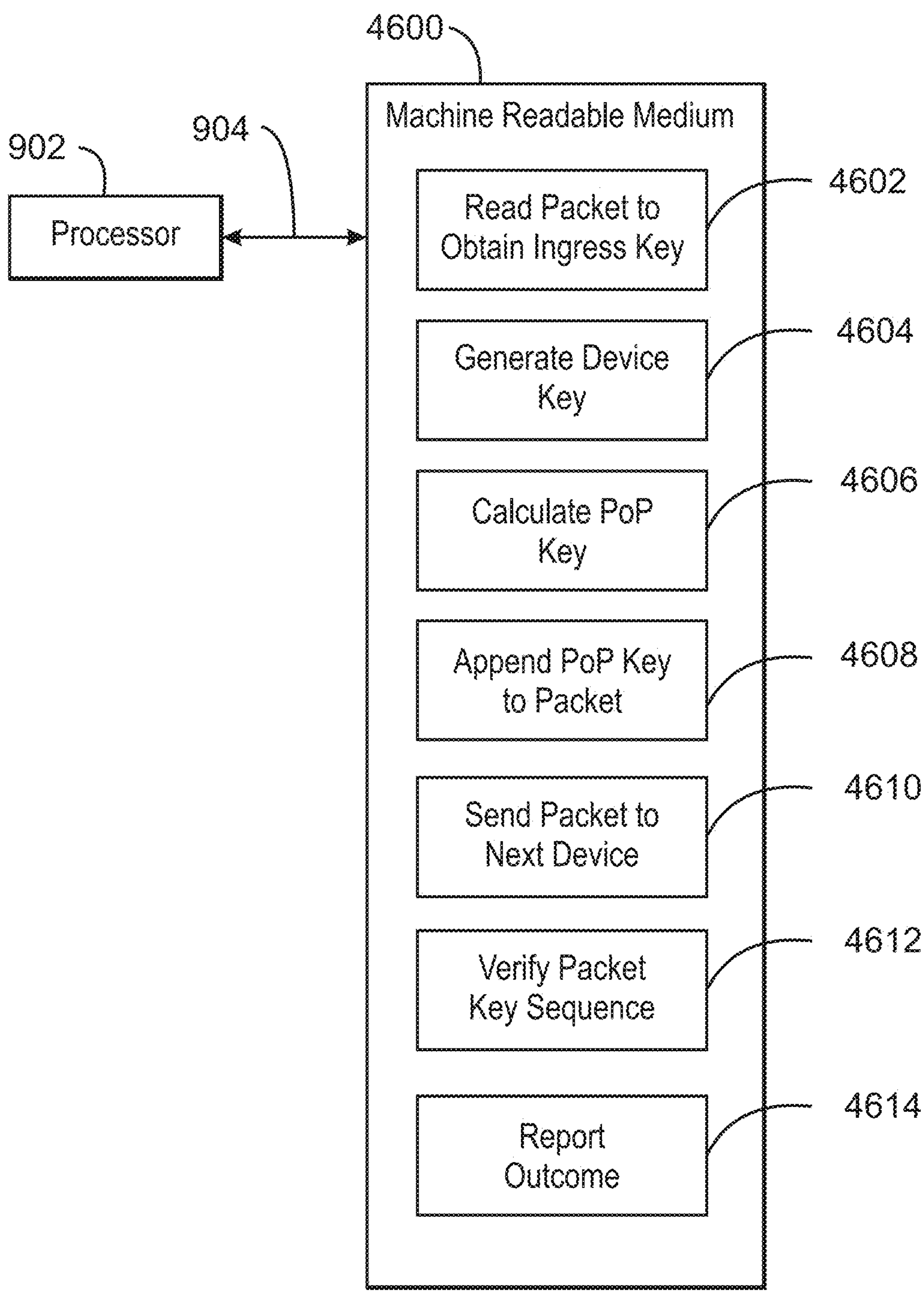
FIG. 46 is a block diagram of a non-transitory, machine readable medium including code to direct a processor to transfer communications between devices through easements in accordance with some embodiments.

FIG. 46 is a block diagram of a non-transitory, machine readable medium 4600 including code to direct a processor 902 to transfer communications between devices through easements. The processor 902 may access the non-transitory, machine readable medium 4600 over a bus 904. The processor 902 and bus 904 may be implemented in a manner similar to the processor 902 and bus 904 described with respect to FIG. 9. The non-transitory, machine readable medium 4600 may include devices described for the mass storage 808 of FIG. 8 or may include optical disks, thumb drives, or any number of other hardware devices.

The non-transitory, machine readable medium 4600 may include code 4602 to direct the processor 902 to read a received packet to determine an ingress key, for example, by detecting an appended PoP key. Code 4604 may be included to direct the processor 902 to generate, or otherwise provide, a device key for generating other keys. The device key may be a manufacturers key stored in the device, or may be a device-specific communications key accessed from a blockchain, among others.

Code 4606 may be included to direct the processor 902 to calculate a new PoP key, for example, from the ingress key and the device key. Code 4608 may be included to direct the processor 902 to append the new PoP key to the end of a packet. Code 4610 may be included to direct the processor 902 to send the packet to the next device.

Code 4612 may be included to direct the processor 902 to verify the sequence of PoP keys appended to a packet to make sure that the packet passed through legitimate devices. Code 4614 may be included to direct the processor 902 to report on the outcome of the verification procedure, for example, reporting to another device or group of devices, that the packet was compromised. A user may also be alerted to the illegitimate packet.

Figure 47:
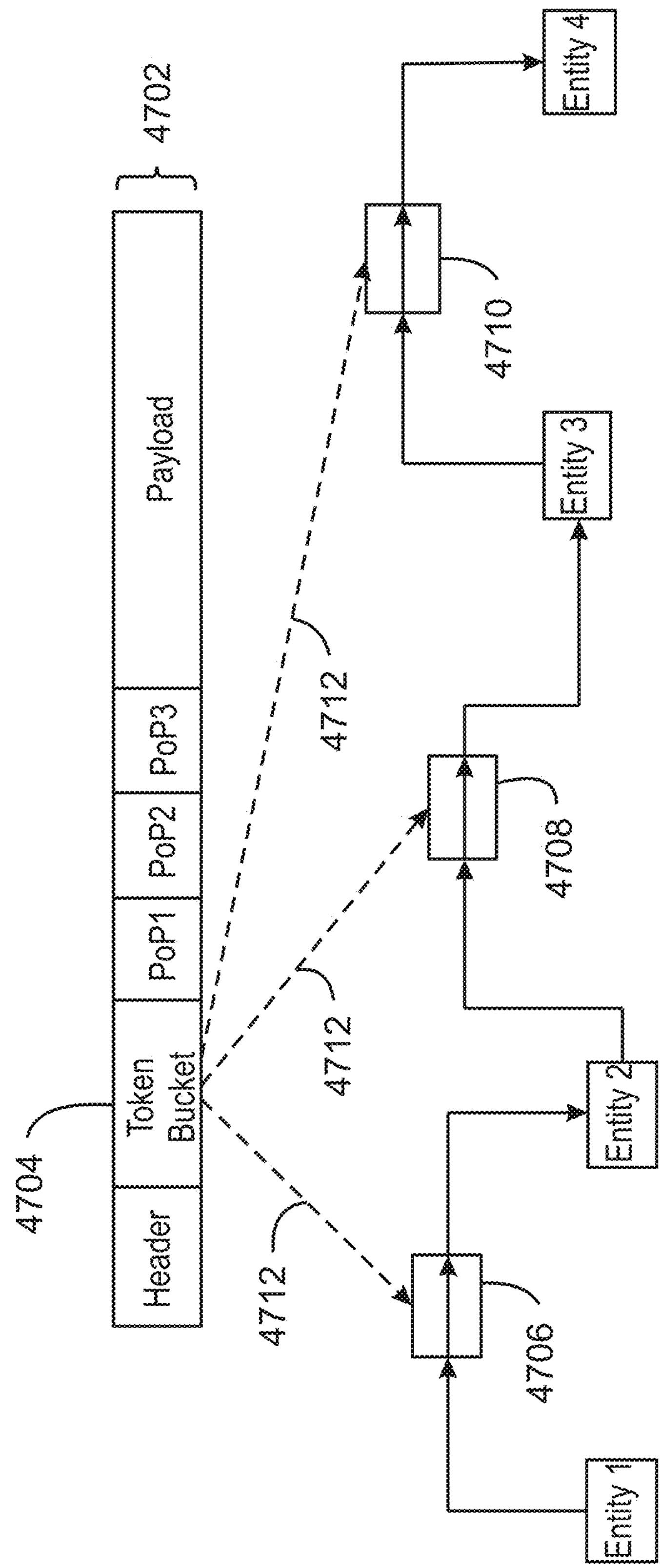
FIG. 47 is a schematic drawing of an example of a packet that includes micropayment information in a token bucket in accordance with some embodiments.

FIG. 47 is a schematic drawing 4700 of an example of a packet 4702 that includes micropayment information in a token bucket 4704. The token bucket 4704 is a region of the packet that includes a bit sequence that encodes tokens for micropayments. The use of the token bucket 4704 may enable a packet to pay for transit through systems that do not have access to a common database or blockchain. The token bucket 4704 may have an encrypted balance that may be decremented by one or more transmitting device. In some examples, a token in the token bucket may be one or more sequences encrypted with a first key, where one or more of the edge devices 4706-4710 may have a key that decrypts the token file and removes a sequence or token.

When the packet 4702 is received at an edge device 4706, the token bucket 4704 may be accessed 4712 and decrypted to determine the balance left in the token bucket 4704. The cost to transit through the edge device 4706 is deducted, and the token bucket is re-encrypted and accessed 4712 to save in the frame. The steps are repeated as the packet passes through other edge devices 4708 and 4710. In another example, the token bucket 4704 includes a number of identical encrypted bit sequences. Each sequence represents a token, which is removed as the packet passes through the edge device 4706-4710. If the token bucket 4704 is empty, or the balance is insufficient, the packet may be deleted or returned to the sender.

The token bucket 4704 may allow for increased priority for transmitting the message. The cost may be directly related to the priority given a packet. Further, the tokens themselves may carry this information. For example, if a token has a first balance, the edge devices 4706-4710 may transfer the packet following a normal first-in-first-out sequence. However, if a token has a higher balance, the edge device 4706-4710 may send the packet before other packets in the queue. This may be used to prioritize communications from an IoT device, for example, sending alarms at high priority while sending normal data messages at a lower priority.

Figure 48:
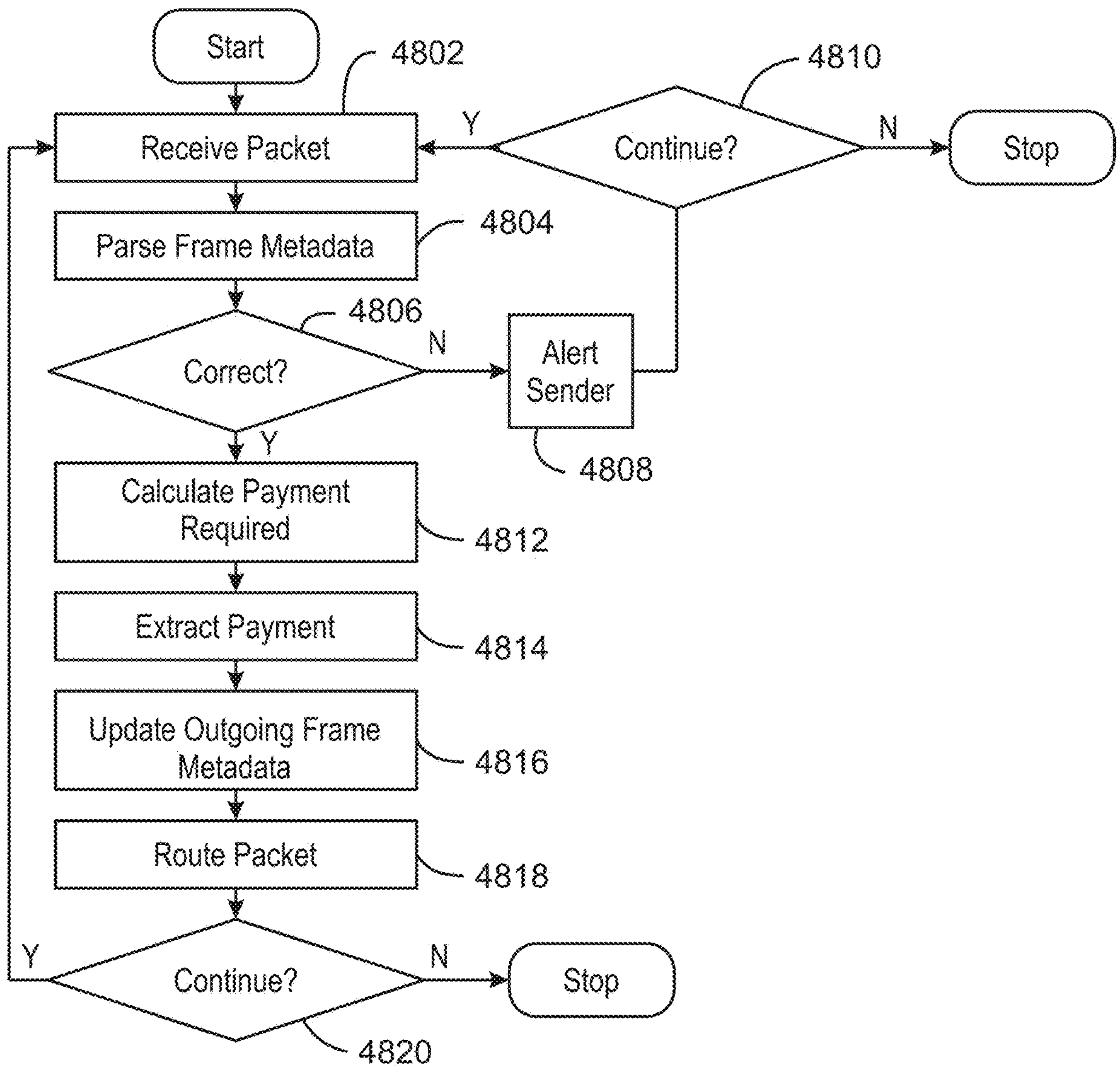
FIG. 48 is a process flow diagram of an example method for using a token bucket to pass micropayments to transmitting systems in accordance with some embodiments.

FIG. 48 is a process flow diagram of an example method 4800 for using a token bucket to pass micropayments to transmitting systems in accordance with some embodiments. The method 4800 of FIG. 48 may be implemented by the IoT device 4900 described with respect to FIG. 49. The block 4802 represents, for example, when a transmitting system receives a packet. At block 4804, the packet frame metadata is parsed, for example, to locate the token bucket. If the parsed metadata is determined not to be correct at block 4806, a sender may be alerted 4808, for example, by sending a failed routing report. A determination is made at block 4810 as to whether to continue. If so, process flow returns to block 4802.

At block 4812, the payment to complete the transmission is calculated. This may be performed by simply multiplying the payload size by the charge per byte routed. In some examples, a priority routing may be charged a higher rate per byte.

At block 4814, the payment for the routing is extracted from the token bucket. This may be performed by decrementing the token field. A local payment subtotal may be incremented. The local payment subtotal may be used to update a payment store, for example, in a database. The payment store may be a blockchain that includes the payment records.

At block 4816, the metadata for an outgoing frame may be completed using the new token field. At block 4818, the packet may then be routed on from the transmitter. At block 4820, a determination is made as to whether to continue. This may be based on whether a sequence of communications is ongoing, among other items. If so, process flow returns to block 4802 to continue.

Figure 49:
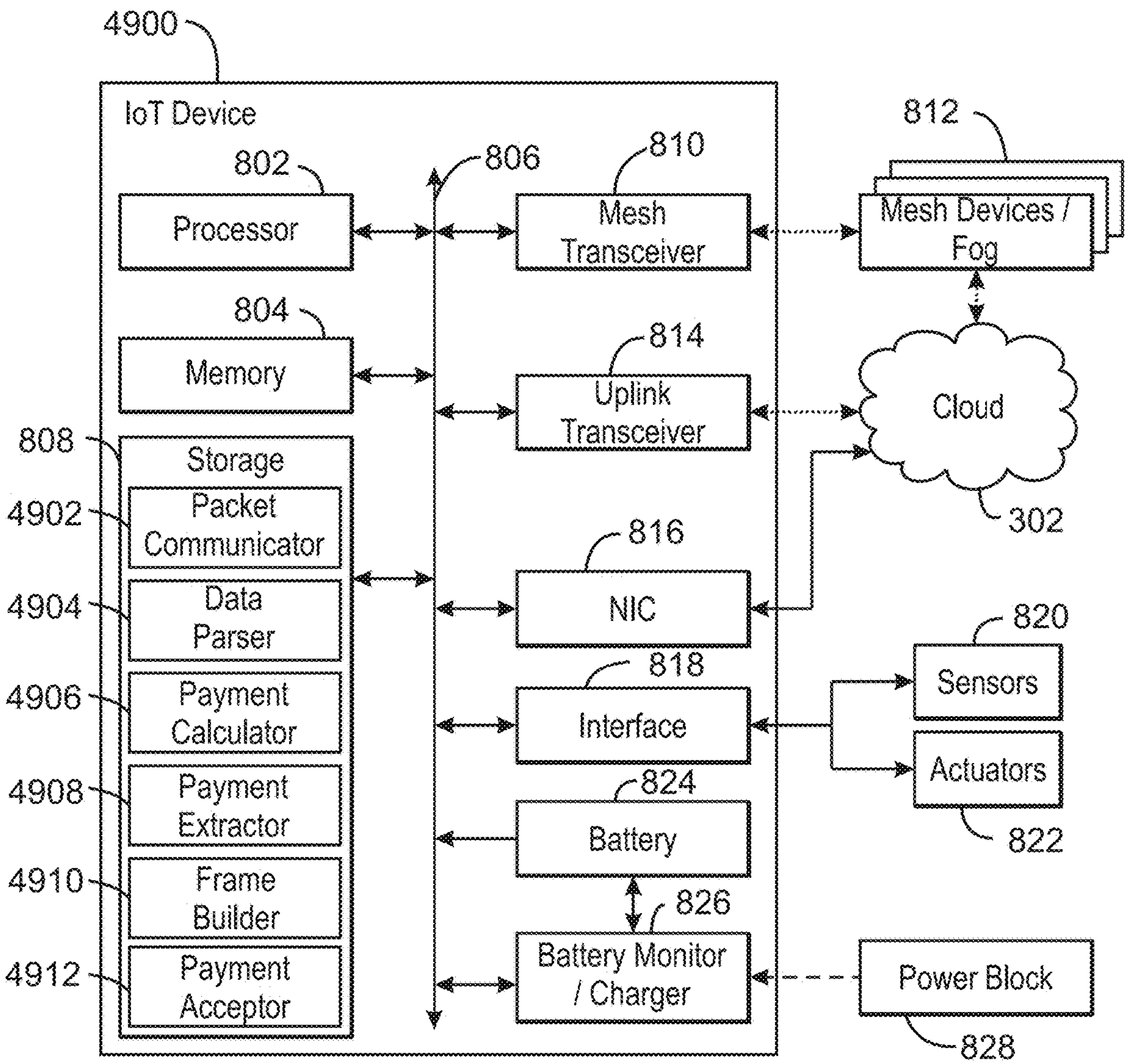
FIG. 49 is a block diagram of an example of components that may be present in an IoT device for using token buckets to facilitate payments in accordance with some embodiments.

FIG. 49 is a block diagram of an example of components that may be present in an IoT device 4900 for using token buckets to facilitate payments in accordance with some embodiments. Like numbered items are as described with respect to FIGS. 3 and 8. It can be noted that different components may be selected and used for the IoT device 4900 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a communicator 4902 that accepts packets from mesh devices 812 or devices in the cloud 302, and relays the packets to other mesh devices 812, devices in the cloud 302, and the like. One or more packets may constitute a communication between devices. In addition to the functions described with respect to FIG. 49, as described with respect to 4502, the communicator 4902 may perform other functions, such as translation of packets between protocols, performing proof-of-provenance additions, and the like. Further, the communicator 4902 may be part of an easement system 3312, described with respect to FIG. 33.

A data parser 4904 may parse the metadata for a received packet to identify the token bucket. This may include decrypting the token bucket, for example, using a public or private key saved by the IoT device 4900. A payment calculator 4906 may be used to calculate the payment required for transmitting a communication. The calculation may include a multiplier that accounts for a particular priority level, for example, multiplying the payment by the multiplier if a higher bandwidth channel is selected. A payment extractor 4908 may deduct the payment from the token bucket. This may be performed by deducting an amount from a balance recorded in the token bucket. In some examples, the token bucket may include a number of discrete tokens, such as encrypted tokens, which can be discretely removed. A frame builder 4910 may rebuild the frame with the metadata, for example, encrypting the token bucket and assembling the packet payload and metadata to form the frame. The communicator 4902 may then be used to transmit the assembled packet. In some examples, a payment acceptor 4912 may be used to accept payment from another source, for example, a blockchain identified by a bit sequence in the token bucket.

Figure 50:
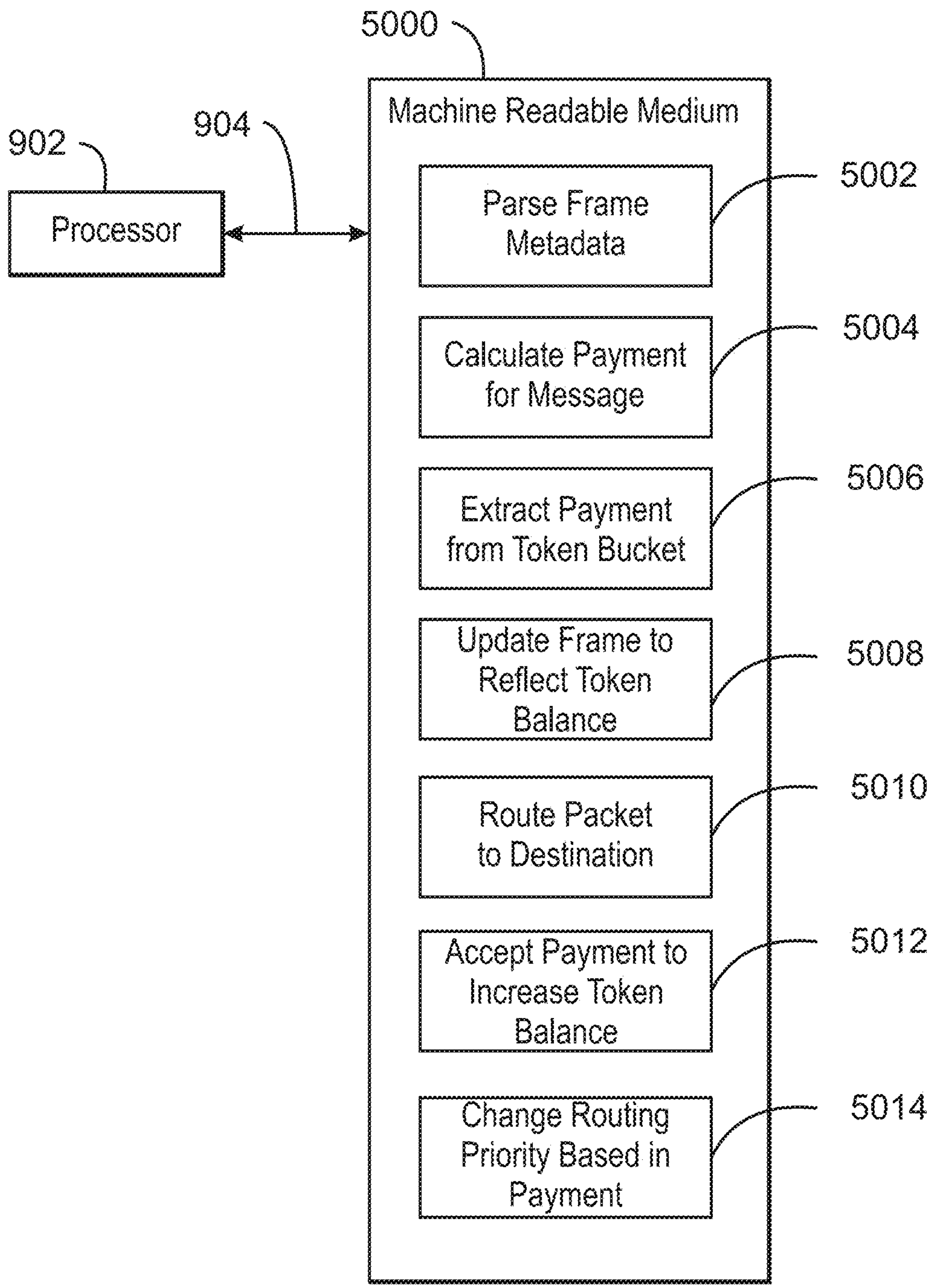
FIG. 50 is a block diagram of a non-transitory, machine readable medium including code to direct a processor to transfer communications between devices based on payments from a token bucket in accordance with some embodiments.

FIG. 50 is a block diagram of a non-transitory, machine readable medium 5000 including code to direct a processor 902 to transfer communications between devices based on payments from a token bucket. The processor 902 may access the non-transitory, machine readable medium 5000 over a bus 904. The processor 902 and bus 904 may be implemented in a manner similar to the processor 902 and bus 904 described with respect to FIG. 9. The non-transitory, machine readable medium 5000 may include devices described for the mass storage 808 of FIG. 8 or may include optical disks, thumb drives, or any number of other hardware devices.

The non-transitory, machine readable medium 5000 may include code 5002 to direct the processor 902 to parse metadata for a frame, for example, to extract a token bucket from the metadata. Code 5004 may be included to direct the processor 902 to calculate a payment for transmitting a message. The payment may be based, for example, on the size of the message and/or the priority for the message transmission. Code 5006 may be included to direct the processor 902 to extract the payment from the token bucket. This may be performed by reducing a balance in the token bucket or by removing a bit sequence, corresponding to a token, from the token bucket. Code 5008 may be included to direct the processor 902 to update the frame, for example, including the changed balance for the token bucket. The code 5008 may also direct the processor 902 to encrypt the token bucket before reassembling the frame. Code 5010 may be included to direct the processor 902 to route the frame towards a destination, for example, by sending the frame on to a subsequent device with an address indicating the final destination.

Code 5012 may be included to direct the processor 902 to accept a payment to increase the balance in the token bucket. Code 5014 may be included to direct the processor 902 to increase the priority of the transmission based on the amount paid. For example, if the token bucket uses discrete bit sequences for the token, the transmitting device may set the priority based, at least in part, of the amounts of the individual tokens.

Figure 51:
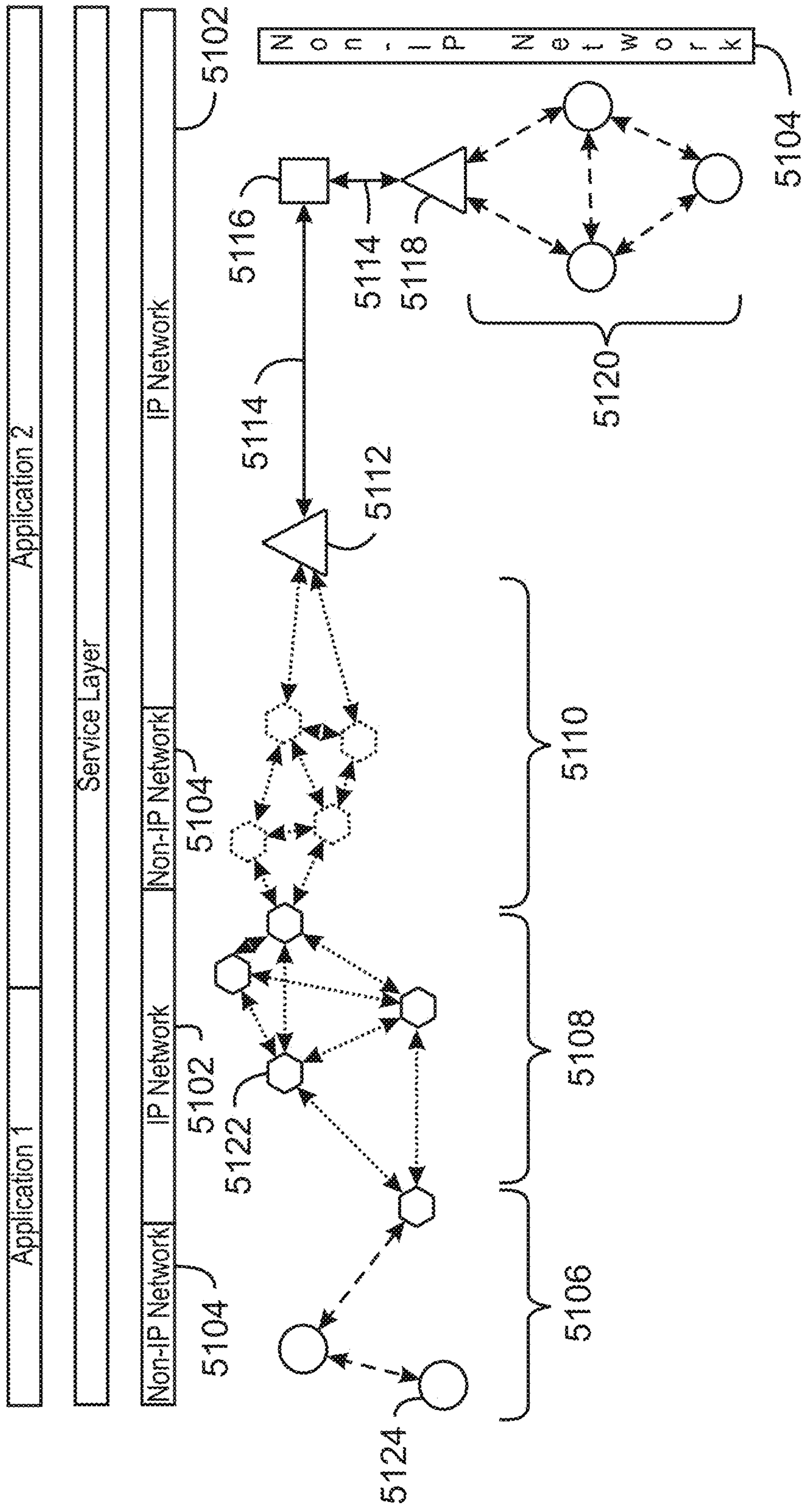
FIG. 51 is a drawing of a heterogeneous network (hetnet) infrastructure, connecting IP domains to non-IP domains at multiple stages in accordance with some embodiments.

FIG. 51 is a drawing of a heterogeneous network (hetnet) infrastructure 5100, connecting IP domains 5102 to non-IP domains 5104 at multiple stages in accordance with some embodiments. In this example, an LPWA domain 5106 is in communications with an IEEE 802.15.4g mesh network 5108. The mesh network 5108 is in communications with an IEEE 802.15.4 mesh network 5110. An access point 5112 provides a communications connection 5114 (e.g., an Ethernet connection) to a core network 5116. The core network 5116 may be coupled to a second access point 5118. The second access point 5118 may provide communications to a second LPWA network 5120. The different permutations of IP domains 5102 and non-IP domains 5104, coupled with providing support for a substantial number of services, militates against dedicated translation nodes. Further, dynamic interconnections may be useful for interacting with volatile IoT infrastructure, in which nodes can join networks, leave networks, and may be mobile.

For example, data from different domains may be efficiently transmitted from a source to a target destination by the use of protocol packing. In this example, a protocol frame in a first protocol may be packaged into the payload field of a packet in another protocol. By adopting this approach, both protocols remain standards-compliant. As described further with respect to FIG. 52, a LoRaWAN frame received at a gateway 5122 from a sensor 5124 in fog device, such as a LoRaWAN network 5106, may be packaged into an IEEE 802.15.4 frame, before being sent on. Further protocol packing may be performed at the first access point 5112. At the target device, for example, a second access point 5118, the packaging may be removed, and the frame sent on to a target device 5124. This may be used for communications in fog devices that include remote devices that are accessed over different networks, or through a core network 5116.

Figure 52:
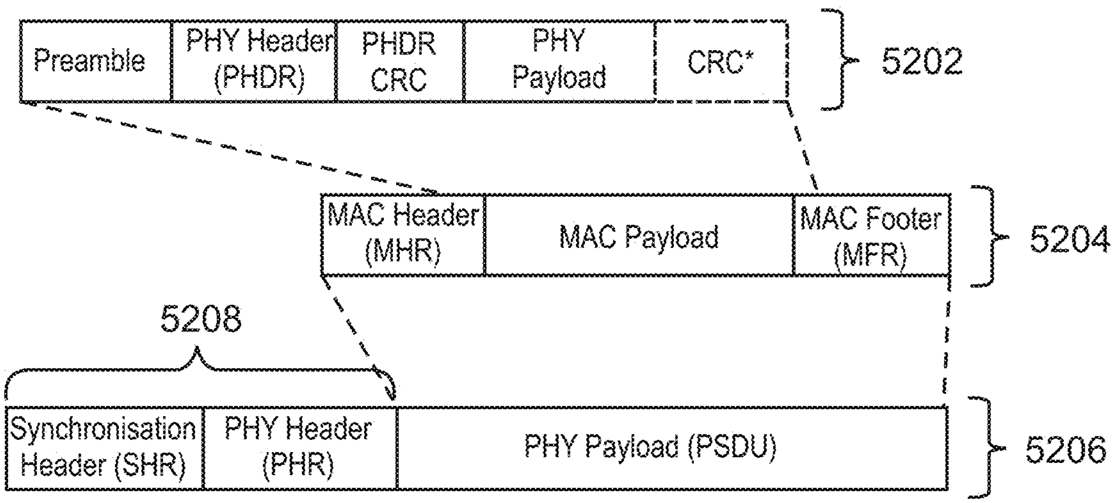
FIG. 52 is a schematic drawing of protocol packing used to package frames from one protocol into another protocol in accordance with some embodiments.

FIG. 52 is a schematic drawing 5200 of protocol packing used to package frames from one protocol into another protocol in accordance with some embodiments. In the example shown in the schematic drawing 5200, a LoRaWAN frame 5202 is packed into the payload field of a packet 5204, which is included in an IEEE 802.15.4 MAC frame 5206. The MAC frame 5206 has the headers 5208 that form a transmission frame for transmission to the destination.

Any number of other data link layer and transport encapsulation targets can be supported using this method. For example, frames following the Data Over Cable Service Interface Specification (DOCSIS) protocol may be encapsulated in packets of the AX.25 protocol. DOCSIS is used for high data rate transfer over cable and wireless systems. It is predominately used for high data rate transfer, such as broadband internet and television services. AX.25 was developed by the Tucson Amateur Packet Radio (TAPR) and American Radio Relay League (ARRL) organizations in 1996 with an update in 1998. AX.25 is a data link layer protocol derived from the AX.25 protocol and was primarily designed for use in impaired narrowband wireless networks, predominately in the amateur radio bands.

Figure 53:
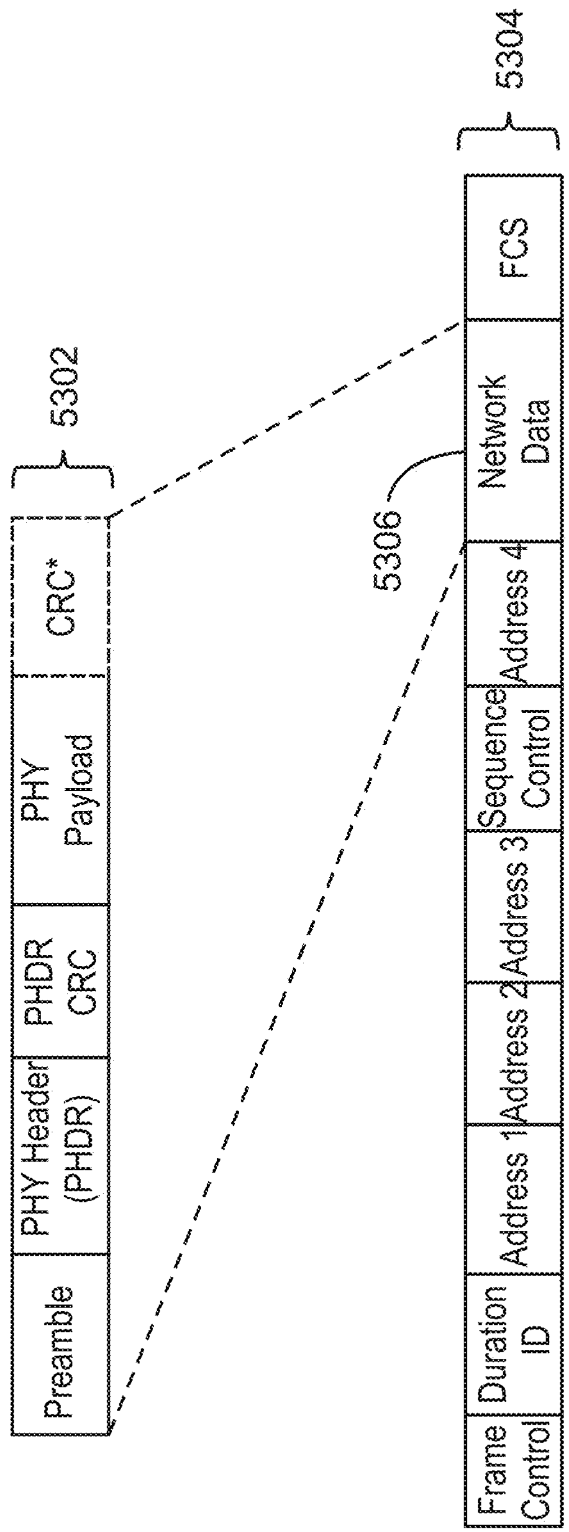
FIG. 53 is a schematic drawing of protocol packing used to package a Low Power Wide Area Network (LPWAN) protocol frame, such as a LoRaWAN frame inside an IEEE 802.11 (or Wi-Fi®) media access control (MAC) layer frame in accordance with some embodiments.

FIG. 53 is a schematic drawing 5300 of protocol packing used to package a LoRaWAN frame 5302 inside an IEEE 802.11 (or Wi-Fi®) MAC frame 5304 in accordance with some embodiments. As shown in the schematic drawing 5300, the LoRaWAN frame 5302 may be inserted as the network data 5306 in the IEEE 802.11 MAC frame 5304. When the IEEE 802.11 MAC frame 5304 reached the destination, such as a gateway leading to a LPWA network, the LoRaWAN frame 5302 may be read from the IEEE 802.11 MAC frame 5304 and transmitted to a destination.

Figure 54:
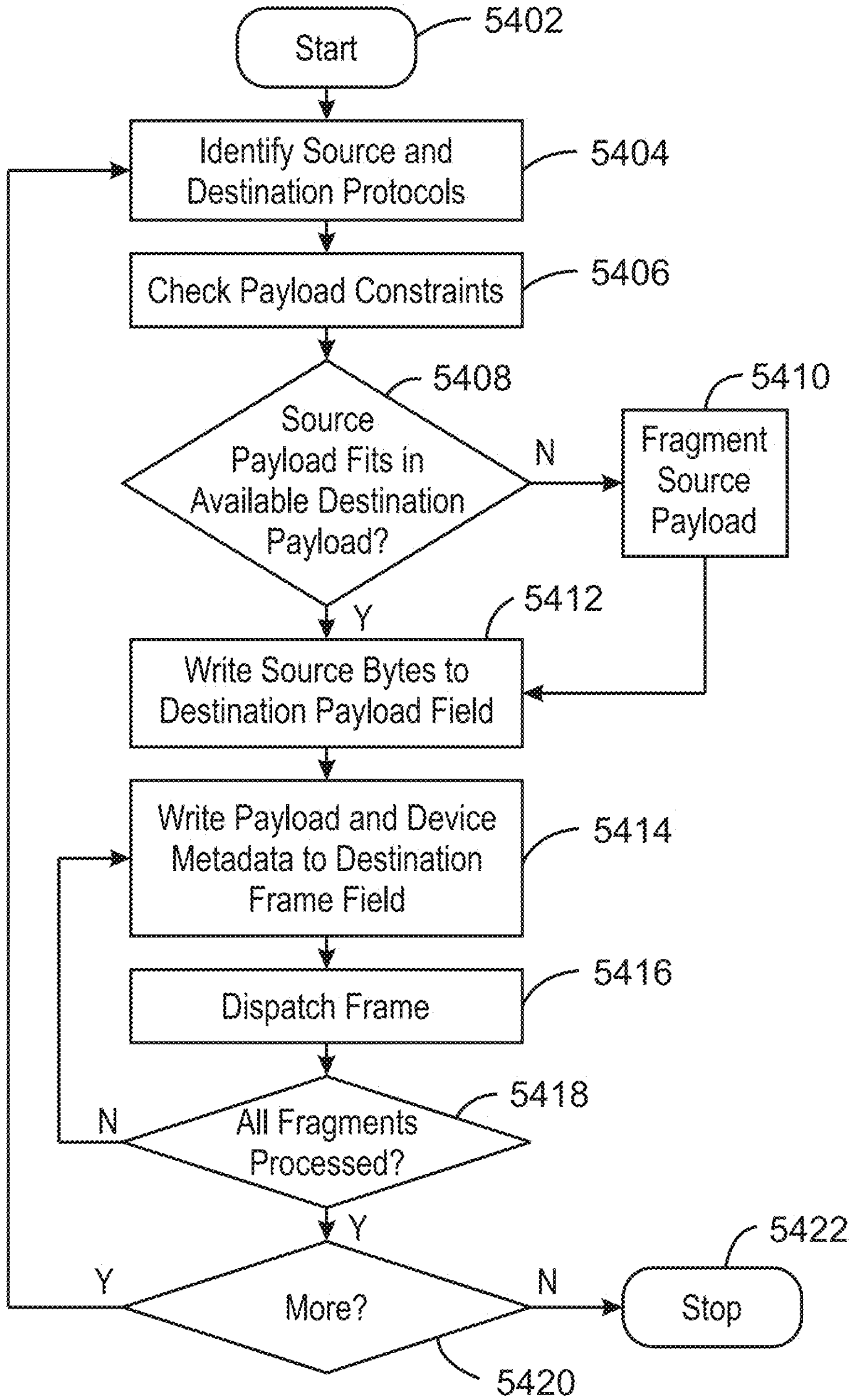
FIG. 54 is a process flow diagram of an example method for protocol packing for the transmission of a frame in accordance with some embodiments.

FIG. 54 is a process flow diagram of an example method 5400 for protocol packing for the transmission of a frame in accordance with some embodiments. The method 5400 described with respect to FIG. 54 may be implemented by the IoT device 5500 described with respect to FIG. 55. The block 5402 represents, for example, when data is ready to be sent out.

At block 5404, the source and destination protocols available are identified. An inventory of available protocols may be created and stored in the gateway or access point, and the ingress and egress protocols for the protocol packaging are identified. The payload sizes and constraints associated with each protocol, for example, the required frame field information, such as addresses, flags, and the like, are identified.

At block 5406, the payload constraints are checked against the payload, for example, the source frame, to be transmitted. At block 5408, a determination is made as to whether a source frame fits in the destination protocol payload. If not, at block 5410, the payload is fragmented into multiple payloads. This may be performed, for example, by splitting the payload into N byte sequences. Each byte sequence may be placed into a separate destination protocol frame and the packet sequences are numbered.

At block 5414, the payload and device metadata are written to the destination field. At block 5416, the frame is dispatched towards the destination. At block 5418, a determination is made as to whether all fragments of the data have been processed. If not, process flow returns to block 5414 to write and send the next fragment.

At block 5420, a determination is made as to whether more data is to be sent, for example, another ingress frame has been received. If so, process flow returns to block 5404 to process the next frame. If not, the method 5400 ends at block 5422, at which point the device waits for another frame to be received.

Figure 55:
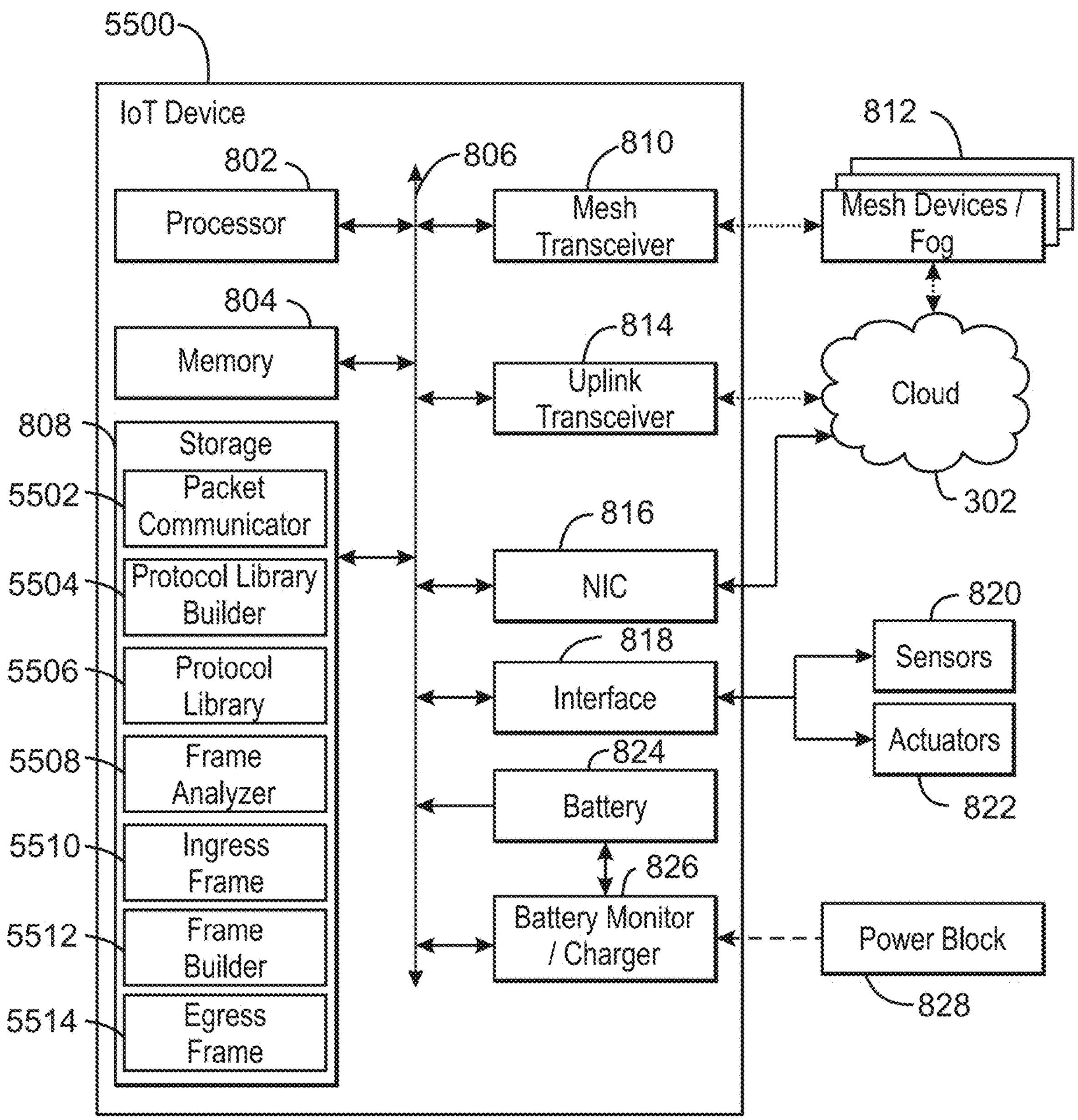
FIG. 55 is a block diagram of an example of components that may be present in an IoT device to package frames in a first protocol in frames of a different protocol in accordance with some embodiments.

FIG. 55 is a block diagram of an example of components that may be present in an IoT device 5500 to package frames in a first protocol in frames of a different protocol in accordance with some embodiments. Like numbered items are as described with respect to FIGS. 3 and 8. It can be noted that different components may be selected and used for the IoT device 5500 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a communicator 5502 that accepts frames from mesh devices 812 or devices in the cloud 302, and relays the frames to other mesh devices 812, devices in the cloud 302, and the like. In addition to the functions described with respect to FIG. 55, as described with respect to 4502, the communicator 5502 may perform other functions, such as translation of frames between protocols, performing proof-of-provenance additions, and the like. Further, the communicator 5502 may be part of an easement system 3312, described with respect to FIG. 33.

A protocol library builder 5504 may determine what protocols are available, and construct a protocol library 5506 storing the protocols and formats for each. The formats may include constraints, such as data field length, and the like, that can be used to determine how to format the frame, such as breaking the ingress frame into fragments for transmission in multiple egress frames.

A frame analyzer 5508 may be used to analyze the ingress frame 5510, received from the sending device, to determine length, packaging protocol, and other constraints. A frame builder 5512 may build an egress frame 5514 using the constraints determined. For example, the frame builder 5512 may build multiple egress frames 5514 if the ingress frame 5510 is too large to fit within the payload field for the egress frame 5514. Once the egress frame 5510, or egress frames, are built, the communicator 5502 may transmit them towards the destination.

Figure 56:
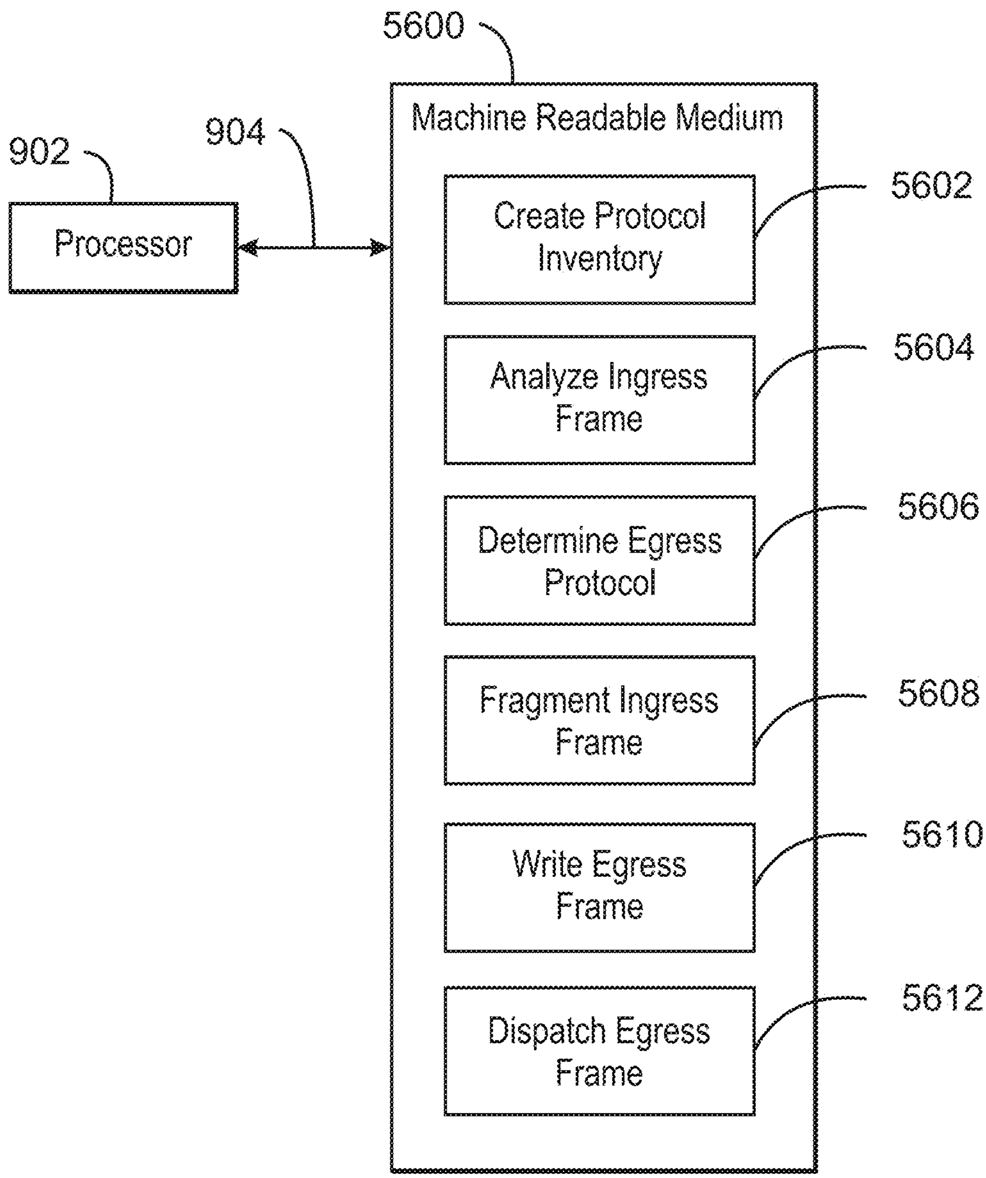
FIG. 56 is a block diagram of a non-transitory, machine readable medium including code to direct a processor to package frames in a first protocol in frames of a different protocol in accordance with some embodiments.

FIG. 56 is a block diagram of an exemplary non-transitory, machine readable medium 5600 including code to direct a processor 902 to package frames in a first protocol in frames of a different protocol. The processor 902 may access the non-transitory, machine readable medium 5600 over a bus 904. The processor 902 and bus 904 may be implemented in a manner similar to the processor 902 and bus 904 described with respect to FIG. 9. The non-transitory, machine readable medium 5600 may include devices described for the mass storage 808 of FIG. 8 or may include optical disks, thumb drives, or any number of other hardware devices.

The non-transitory, machine readable medium 5600 may include code 5602 to direct the processor 902 to create an inventory of possible ingress and egress protocols. Code 5604 may be included to direct the processor 902 to analyze an ingress frame to determine size and other constraints. Code 5606 may be included to direct the processor 902 to determine a protocol for an egress frame. Code 5608 may be included to direct the processor 902 to fragment the ingress frame if it is too large to fit within the payload field of the egress frame. The codes 5606 may direct the processor to label each fragment with a sequence number for correct reassembly at a destination. Code 5610 may be included to direct the processor 902 to write an egress frame, for example, by placing the ingress frame, or a fragment of the ingress frame with an associated sequence number, in the payload field of the egress frame. Code 5612 may be included to direct the processor 902 to route the egress frame towards a destination, for example, by sending the frame on to a subsequent device with an address indicating the final destination.

In addition to packaging frames of different protocols within other protocol, the increasing use of complex data structures in low overhead communications, such as LoRaWAN, indicates the utility of more advanced framing. A new framing structure is described with respect to FIG. 57.

Figure 57:
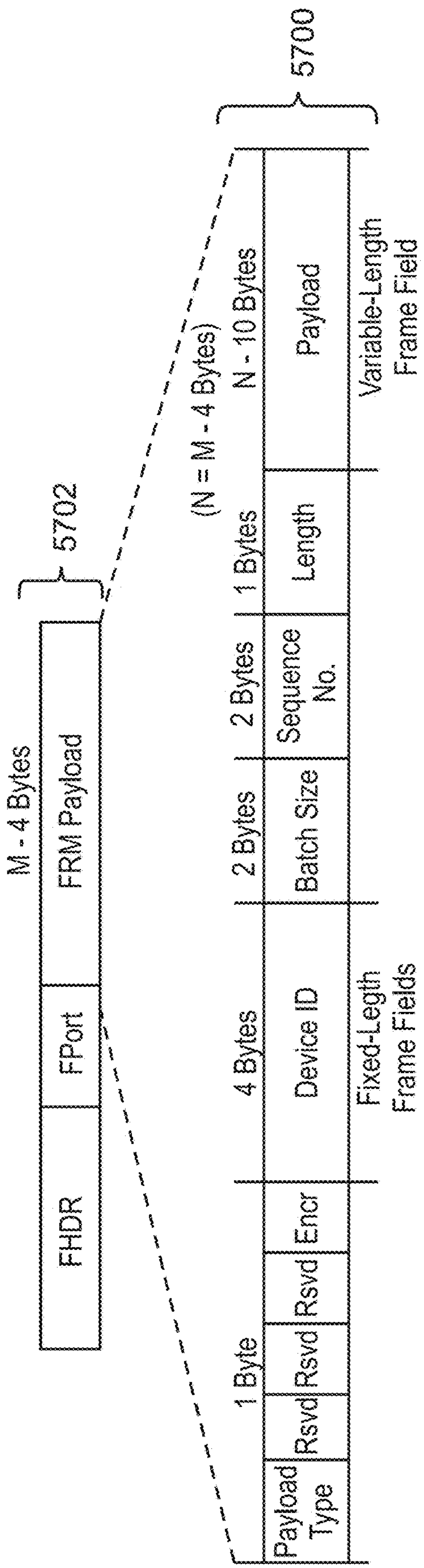
FIG. 57 is a drawing of a frame structure that may be used as a payload in a low power wide area (LPWA) frame, such as a LoRaWAN frame in accordance with some embodiments.

FIG. 57 is a drawing of a payload structure 5700 that may be used as the payload in a low power wide area (LPWA) frame 5702, such as a LoRaWAN frame in accordance with some embodiments. The payload structure 5700 may be used for multi-modal data, including, for example, information from one or multiple sources that may be in aggregated, fragmented, interleaved, or otherwise constructed. These types of multi-modal data may often result in data sizes that require more than one LPWA frame 5702 to dispatch to the intended destination.

The payload structure 5700 specification provides a minimal frame overhead. The frame overhead may be as described in Table 1.

TABLE 1

| Total Frame Overhead: 10 bytes | |
|---|---|
| Payload Type | 4 bits |
| Reserved (rsvd) | 1 bit |
| Reserved (rsvd) | 1 bit |
| Reserved (rsvd) | 1 bit |
| Encryption (encr) | 1 bit |
| Device ID | 4 bytes |
| Batch Size | 2 bytes |
| Sequence No. | 2 bytes |
| Length | 1 byte |
| Payload | N-10 bytes (variable length field) |

In some aspects, the payload type identifier identifies the type of data carried in the payload structure 5700, such as an image, a 24-bit GPS report, or a 3×2 byte sensor report, among others. Examples of values that may be used for the payload type identifier are present in Table 2. As this is a four-bit field, 15 possible identifiers may be used.

TABLE 2

| Payload type identifiers | |
|---|---|
| Value | Payload type |
| 0x0 | Invalid |
| 0xA | Image (JPEG) |
| 0xB | Image (PNG) |
| 0x1 | GPS report (24-bit format) |
| 0x2 | GPS report (IEEE 754 format) |
| 0x3 | 3 × 2-byte sensor (temp/pressure/rainfall) |
| 0x4 | Battery + 2-byte lat./long. GPS report |

In some aspects, the frame overhead may include an encryption flag to indicate if the payload is encrypted, for example, Encr=0x1 for encrypted, and Encr=0x0 for unencrypted. The Device ID can include a string (e.g., a four-byte string) that presents the unique identifier for the sending device. This may be the identifier assigned using the blockchain methods described herein, or may be a manufacturers assigned name, among others. The Device ID field may be used, for example, to support any number of endpoint IDs per radio head. In some examples, a two-byte identifier may be used to support up to 65535 endpoint IDs per radio head, assuming ID zero is invalid.

The batch size indicates the number of payloads included in a single message. The sequence number indicates the position of the particular payload structure 5700 in a sequence for reassembly. The length of the payload field is carried in the length field. The LoRa frame encapsulation may provide a message integrity check (MIC) for uplink messages. If not, a separate MIC field may be included in the frame 5702 above.

In some aspects, the payload for longer messages may need to be fragmented across multiple frames. These frames do not have to be sequentially sent in an IoT network, but may be sent over parallel radio channels to decrease the transmission time and improve the transmission efficiency. This technique, termed Network Division Multiplexing (NDM), is a networking protocol-agnostic method of splitting data into multiple independent parallel data subsets and conveying them over multiple network paths before recombination at the destination. The technique leverages the ability to overlay multiple data streams operating in parallel over different interconnected network paths and infrastructure, for example, using different protocols. NDM supports multiple same-network paths, such as a number of LPWA paths, or multiple different network infrastructure paths, such as a number of LPWA paths in concert with a number of IEEE 802.15.4g routes.

The alignment of the data stream and lossy network characteristics affecting one or more of the NDM paths may adversely affect recombination at the destination. However, these problems may be decreased by the integration of adaptive delay/disruption tolerant protocols, such as the Licklider Transmission Protocol (LTP), which may be used as the convergence layer for a fault tolerant protocol, such as the Bundle Protocol (BP) described at http://www.rfc-editor.org/rfc/pdfrfc/rfc5050.txt.pdf (last accessed on Aug. 25, 2016).

In LTP, data may be identified as important and less important. Important data, such as headers, must be accurately transmitted and receipt acknowledged, before the data is discarded by the sending unit. Less important data, such as a single pixel in a picture, may be recoverable from the transmission or less important if lost, and, thus, the data may be discarded after being sent. Due to the extreme latency, no negotiations are performed before initiating communications. The following figures described the transmission of data using the NDM technique.

Figure 58:
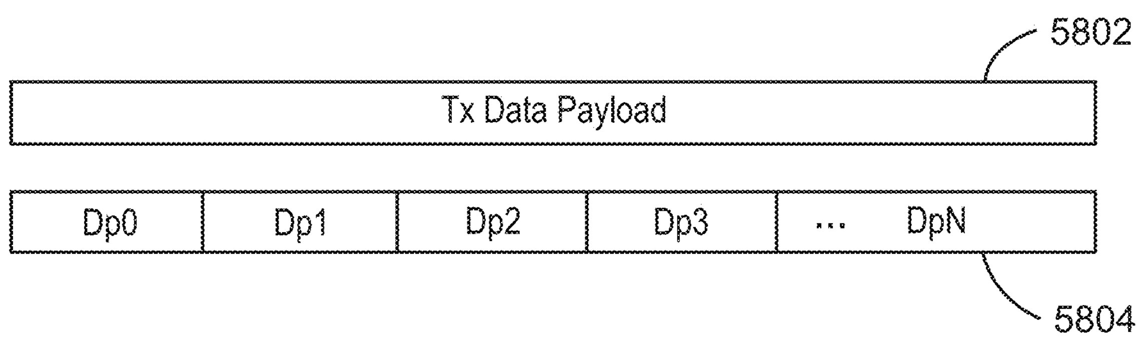
FIG. 58 is a schematic drawing of transmission data payload being fragmented into a number of sub-blocks for sending in accordance with some embodiments.

FIG. 58 is a schematic drawing 5800 of transmission data payload 5802 being fragmented into a number of sub-blocks 5804 for sending in accordance with some embodiments. Each of the sub-blocks 5804 may have a variable length, L. The sub-blocks 5802 may be assigned to N network paths where one or more network protocols or PHYs are used.

Sub-header data may then be appended to each sub-block 5804, for example, each frame in a data sub-stream may be encapsulated with header data to denote the sub-stream order in the main data payload to support recombination at the destination. The header data may also include a max transit time, for example, a time to live, as well as a priority ordering and a retry policy. Once the header information is attached, the sub-blocks 5804 may be packaged into the different protocol frames used for the transmission, for example, as described with respect to FIG. 54 above.

Figure 59:
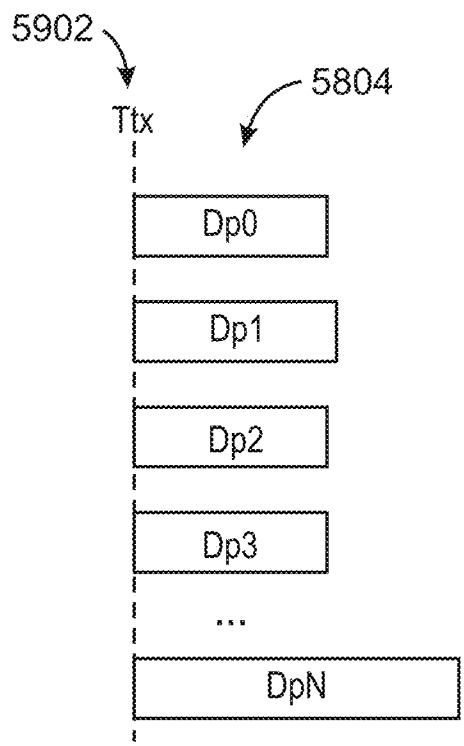
FIG. 59 is a schematic drawing of Network Division Multiplexing (NDM)-serial-to-parallel transmission in accordance with some embodiments.

FIG. 59 is a schematic drawing 5900 of NDM-serial-to-parallel transmission in accordance with some embodiments. The sub-blocks 5804 may be dispatched at time $T_{tx}$ 5902 for synchronized dispatch mode. In some cases, the sub-blocks 5804 may be sent in a synchronized per-path dispatch mode, at times $T_r x[i]$, in which each [i] represents a transmission path.

Figure 60:
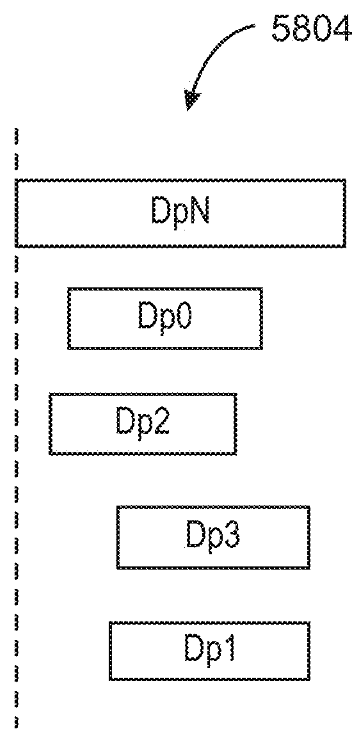
FIG. 60 is a schematic drawing of the reception of the sub-blocks in accordance with some embodiments.

FIG. 60 is a schematic drawing 6000 of the reception of the sub-blocks 5804 in accordance with some embodiments. At the destination, or other intended interception point, the sub-blocks 5804 may be received in a different order than when dispatched and at different time offsets. The sub-blocks 5804 may be unpackaged, if packaged in a different protocol, and analyzed to determine the number and order of sub-blocks 5804 expected for the message. The sub-blocks 5804 may then be held until all parts are received before being reassembled into the TX data payload 5802 of FIG. 58.

Figure 61:
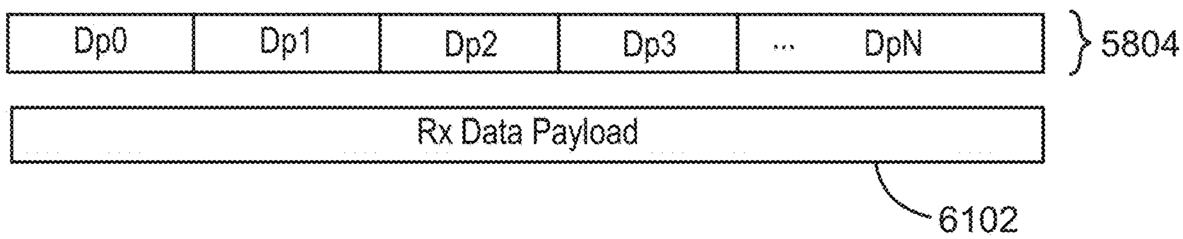
FIG. 61 is a schematic drawing of the recombination of the sub-blocks to form the received data payload in accordance with some embodiments.

FIG. 61 is a schematic drawing 6100 of the recombination of the sub-blocks 5804 to form the received data payload 6102 in accordance with some embodiments. Conversion from parallel to serial block form takes place using header data in each sub-block 5804 to identify block ordering. Depending on the instructions in the header, reassembly may occur even if sub-blocks 6102 are missing.

Figure 62:
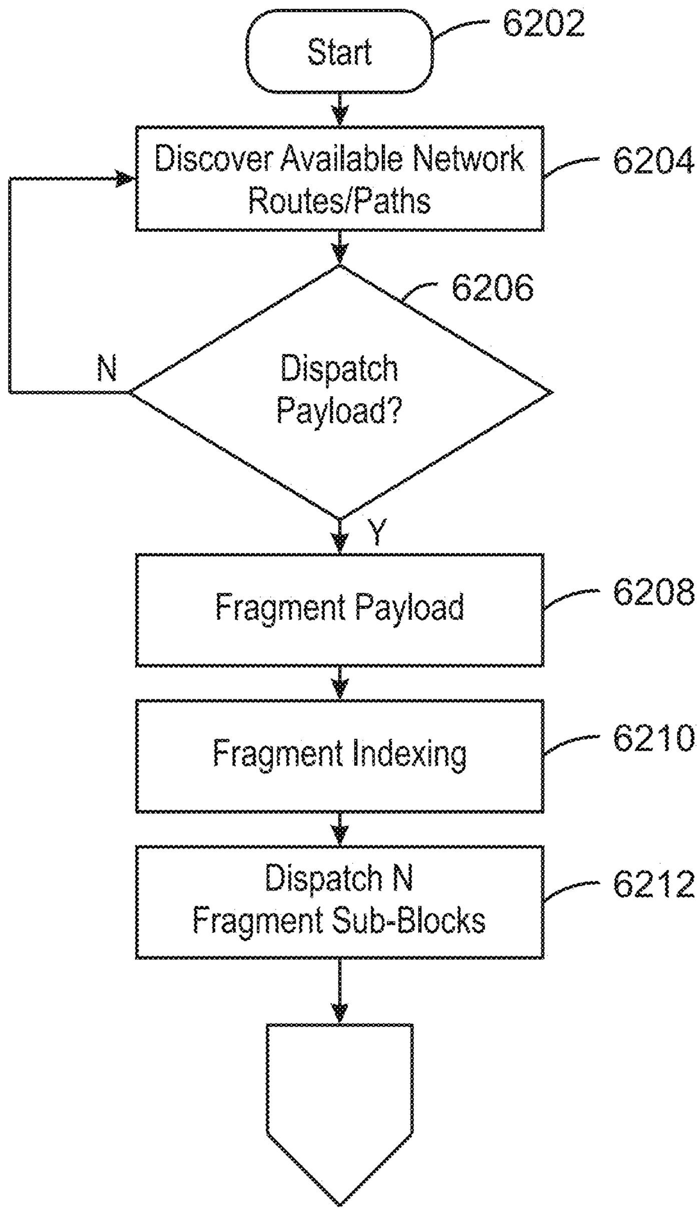
FIG. 62 is a process flow diagram of an example method for fragmenting and dispatching a payload over multiple parallel communication channels in accordance with some embodiments.

FIG. 62 is a process flow diagram of an example method 6200 for fragmenting and dispatching a payload over multiple parallel communication channels in accordance with some embodiments. The method 6200 of FIG. 62 may be implemented by the IoT device 6400 described with respect to FIG. 64. The method 6200 starts at block 6202, for example, when a data payload is ready for transmission.

At block 6204, the available network routes and associated protocols are discovered. These may be saved in a library in the IoT device, and periodically tested to confirm that connectivity is still present. The information discovered may also include data on allowed payload sizes for the supported protocols, transmission speeds, and the like.

At block 6206, a determination is made as to whether to dispatch a payload. This may be performed when a payload is ready and connectivity to one or more networks is present.

At block 6208, the payload is fragmented, for example, based on the available network routes and the maximum available payload sizes supported by the associated protocols. The fragmentation may account for other parameters of the communication channels, such as transmission rates, priority, and the like. The fragmentation may form the sub-blocks 5804 described with respect to FIGS. 57-61.

At block 6210, the fragments are indexed. This may be performed by assigning sequence numbers to the fragments, then constructing fragment headers that include the sequence numbers. The fragments are concatenated with the headers to form the sub-blocks. The individual sub-blocks may then be packaged into the protocol frames for the transmission over the different routes, for example, as described with respect to FIGS. 52-56. At block 6212, the sub-blocks or fragments of the payload are dispatched along the different transmission routes.

Figure 63:
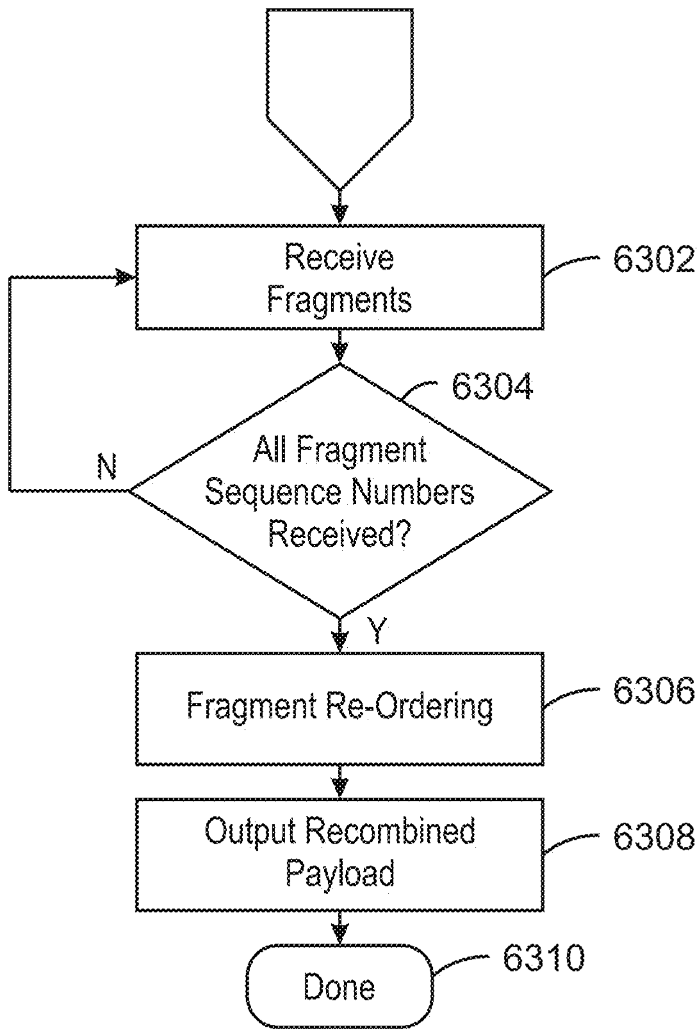
FIG. 63 is a process flow diagram of an example method for receiving and recombining packets sent using an NDM technique in accordance with some embodiments.

FIG. 63 is a process flow diagram of an example method 6300 for receiving and recombining packets sent using an NDM technique in accordance with some embodiments. The method 6300 of FIG. 63 may be implemented by the IoT device 6400 described with respect to FIG. 64. The method 6300 starts at block 6302 as fragments are received from a sending device over a number of different communications channels.

This may be performed by detecting the receipt of frames on a number of different routes and in a number of different protocols. If the frames are packaged in different protocols, the payload is removed from the protocol frame and analyzed. The analysis parses the frame and strips the header. The fragment of the payload is pushed to a local memory store and the sequence number is recorded.

At block 6304, a determination is made as to whether all of the fragments have been received. If not, process flow returns to block 6302 to continue waiting for fragments. The IoT device may not need to waits for all fragments to be received before starting to assemble the data. For example, a command in one of the fragments could indicate that a missing fragment contains less important data and should not stop reassembly.

At block 6306, the fragments may be reordered and combined. For example, each fragment may be appended by sequence number and length to the reassembled data payload to form the received data payload. At block 6308, the recombined payload is output, for example, to the consumer process.

Figure 64:
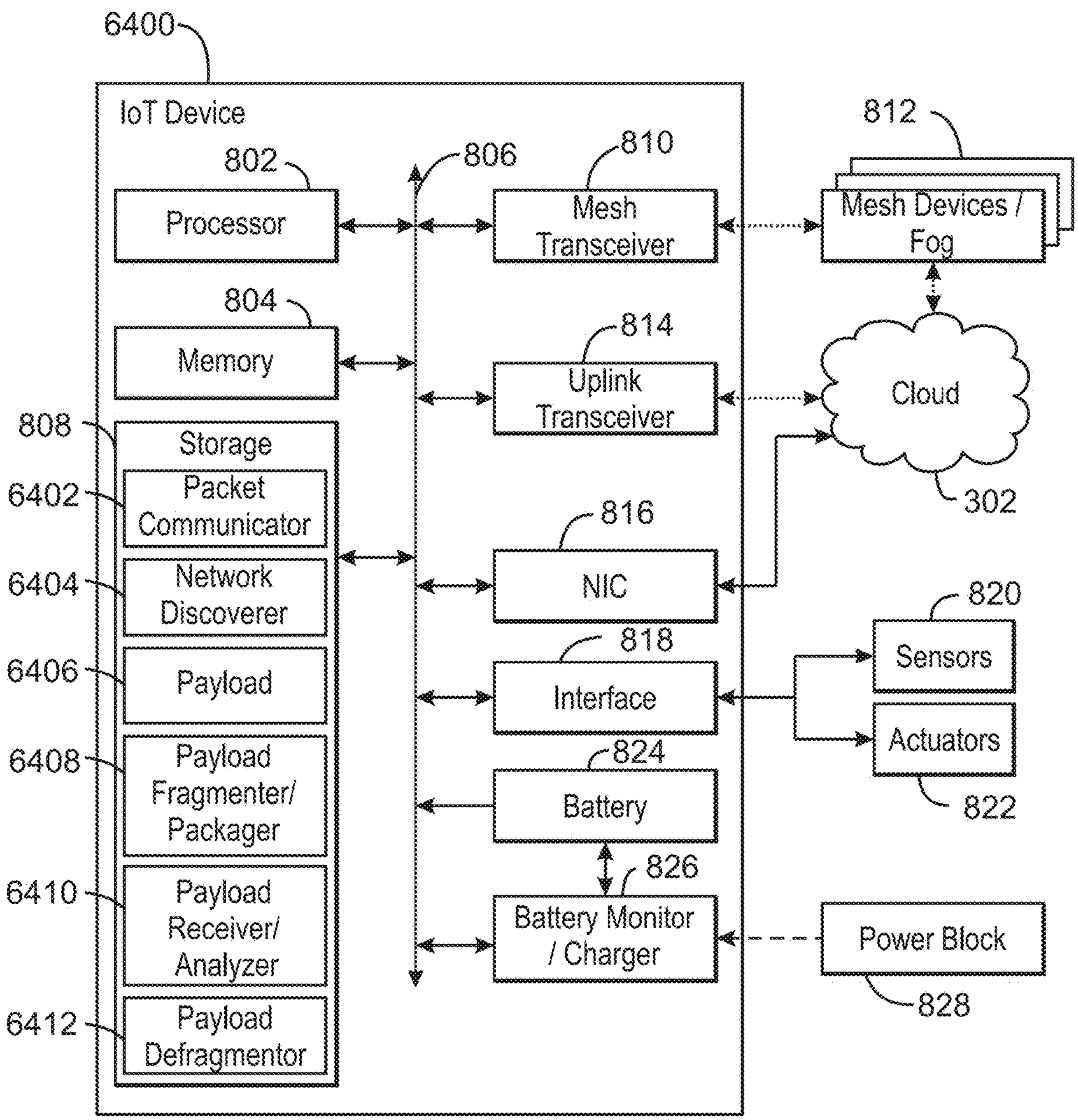
FIG. 64 is a block diagram of an example of components that may be present in an IoT device for fragmenting payloads for transmission along multiple parallel paths in accordance with some embodiments.

FIG. 64 is a block diagram of an example of components that may be present in an IoT device 6400 for fragmenting payloads for transmission along multiple parallel paths in accordance with some embodiments. Like numbered items are as described with respect to FIGS. 3 and 8. It can be noted that different components may be selected and used for the IoT device 6400 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a communicator 6402 that sends receives frames from mesh devices 812 or devices in the cloud 302 over one more communications links, for example, through a mesh transceiver 810, an uplink transceiver 814, and a NIC 816, among others. In addition to the functions described with respect to FIG. 64, as described with respect to 4502, the communicator 6402 may perform other functions, such as translation of frames between protocols, packaging frames in other protocols, performing proof-of-provenance additions, and the like. Further, the communicator 6402 may be part of an easement system 3312, described with respect to FIG. 33.

The communicator 6402 may be used by a network discoverer 6504 to identify available networks and protocols for communications between the IoT device 6400 and a target device. The network discoverer 6504 may build and maintain a list of available network communication paths and protocols to be used for parallel NDM communications.

A payload 6406 may be built by the IoT device 6400, for example, from measurements obtained from the sensors 820. In some examples, the payload 6406 may be passed from another IoT device in the mesh device 812, such as a more remote device. In this example, the IoT device 6400 may be operating as a gateway to pass communications, including the payload, on to other devices.

A payload fragmenter/packager 6408 may analyze the payload and available communications channels to determine the channel combinations likely to result in an optimum communication of the payload, based on speed of communications, reliability, power availability, or any number of other factors and combinations of factors. The payload fragmenter/packager 6408 may then fragment the payload into sub-objects for transmission. Headers and other identifying and sequence information may be appended for the transmission. Depending on the communications selected, the sub-objects may be packaged into the data fields of various protocol frames, then sent over the selected communications channels by the communicator 6402.

In some aspects, the communications may be bidirectional. A payload receiver/analyzer 6410 may receive frames from other devices, remove protocol packaging, and analyze the frames to identify message and sequence information. The payload receiver/analyzer 6410 may determine that the data fields of received frames are sub-objects of payloads. The payload receiver/analyzer 6410 may store the sub-objects and sequence numbers until various conditions are met, then pass the sequence numbers and storage information on to a payload defragmenter 6412. The conditions may include a determination that all sub-objects in a payload have been received, or a determination that any missing sub-objects in a sequence include less important data and assembly should proceed.

The payload defragmenter 6412 may reassemble the payloads into the final payload object, for example, as discussed in FIG. 63. The payload may then be used by the IoT device 6400, or sent on to a data consumer.

Figure 65:
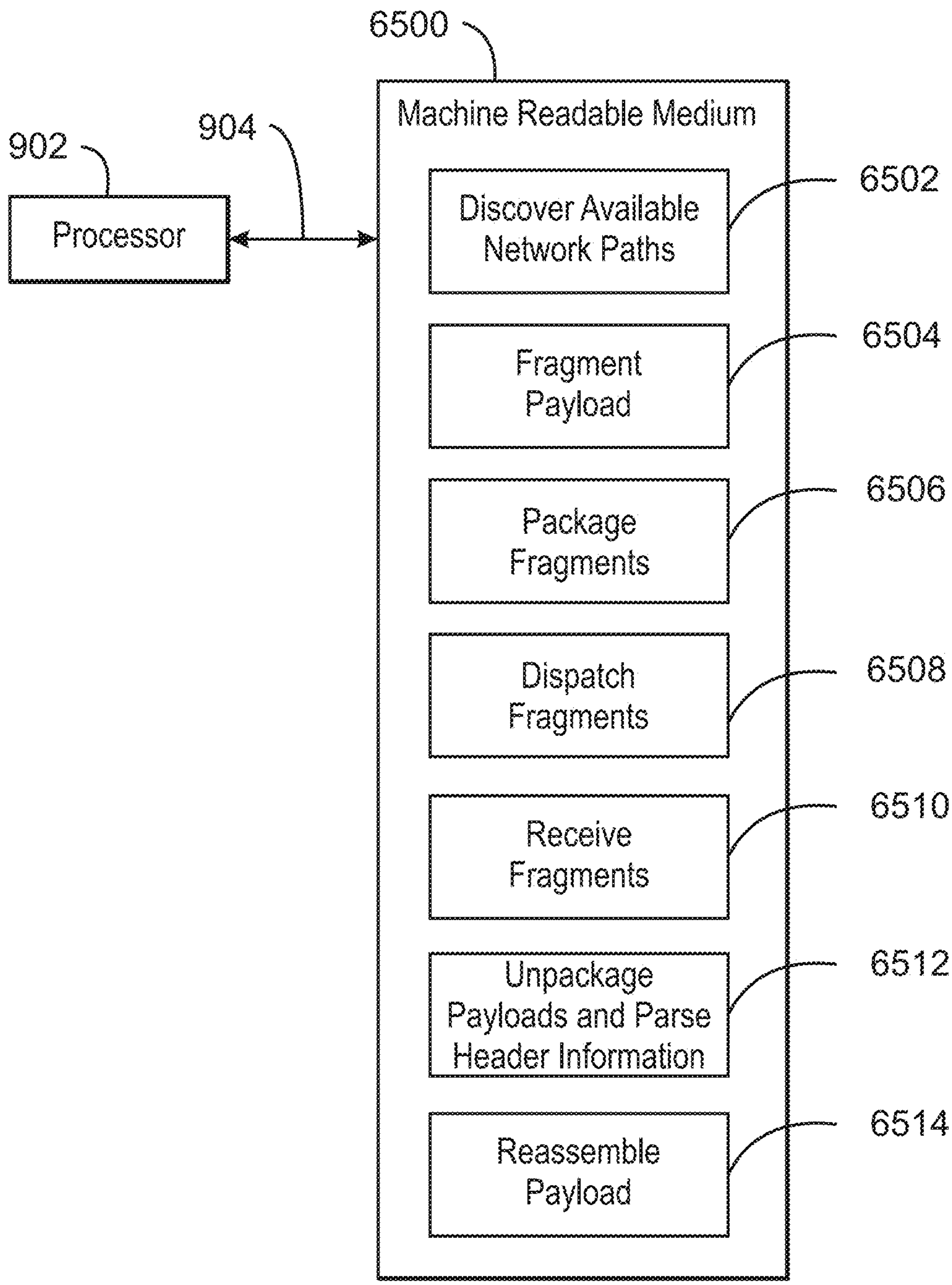
FIG. 65 is a block diagram of a non-transitory, machine readable medium including code to direct a processor to fragment and transmit payloads along multiple parallel paths in accordance with some embodiments.

FIG. 65 is a block diagram of a non-transitory, machine readable medium 6500 including code to direct a processor 902 to fragment and transmit payloads along multiple parallel paths in accordance with some embodiments. The processor 902 may access the non-transitory, machine readable medium 6500 over a bus 904. The processor 902 and bus 904 may be implemented in a manner similar to the processor 902 and bus 904 described with respect to FIG. 9. The non-transitory, machine readable medium 6500 may include devices described for the mass storage 808 of FIG. 8 or may include optical disks, thumb drives, or any number of other hardware devices.

The non-transitory, machine readable medium 6500 may include code 6502 to direct the processor 902 to discover available network paths and protocols to a receiving device. Code 6504 may be included to direct the processor 902 to fragment a payload to fit into the data fields of frames for the protocols selected for the communications. The code 6504 may direct the processor 902 to append header information that includes the sequence number of the packet, among other information. Code 6506 may be included to direct the processor 902 to package the fragments into different protocol frames, depending on the selected communications. Code 6508 may be included to direct the processor 902 to dispatch the frames in the direction of the target device over the different communication channels selected.

Code 6510 may be included to direct the processor 902 to receive the fragments, for example, in frames of different protocols. Code 6512 may be included to unpackage the payloads from the different protocol frames, then to parse the header information to identify a payload and sequence number. The code 6512 may instruct the processor 902 to determine when the reassembly of the payload should be attempted, for example, before all fragments have been received. Code 6514 may be included to direct the processor to reassemble the payload based on the sequence number.

The communications techniques described above may be used to enable or enhance communications with remotely located IoT devices, for example, weather sensors, industrial units, and the like. Position determinations for these devices may be an issue, especially in networks that have battery powered units. Techniques that allow devices to determine their position from information communicated from other devices in a mesh network may allow at least a portion of the devices to conserve power. One technique for performing this is described in FIGS. 66-70.

Figure 66:
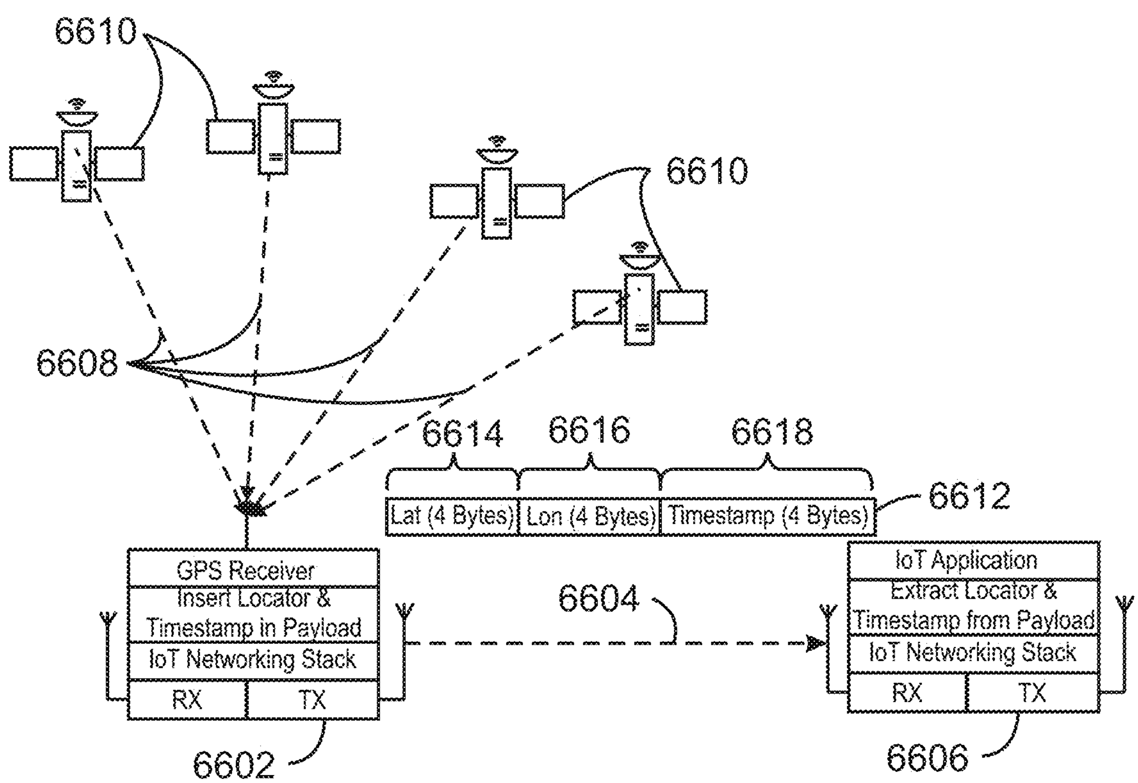
FIG. 66 is a schematic drawing of an overlay beaconing system in which a beaconing node provides a location message to a nearby IoT device in accordance with some embodiments.

FIG. 66 is a schematic drawing of an overlay beaconing system 6600 in which a beaconing node 6602 provides a location message 6604 to a nearby IoT device 6606 in accordance with some embodiments. For IoT deployments in areas without an infrastructure, the single IoT node, or beaconing node 6602, is equipped with a satellite-based positioning receiver and acts as a geolocation beacon to convey location and time data to adjacent connected nodes. This may be done over multiple heterogeneous networks by sending a location payload in a frame appropriate for each type of communication link, as part of the payload data. The beaconing node 6602 may be an IoT device that is equipped with GPS module, such as a satellite receiver to receive signals from the global positioning system (GPS) satellite system, the global navigation satellite system (GLONASS), or other global navigation satellite systems (GNSS).

In some aspects, the beaconing node 6602 may determine its position by acquiring a signal 6608 from three or more global positioning system satellites 6610. The beaconing node 6602 may convert the data received from the satellites, for example, as National Marine Electronics Association (NMEA) sentences, to a data type suitable for dispatch. A location payload 6612 may be created that includes position data, such as in an IEEE754 packed format. In this format, four bytes may be used to represent latitude 6614, four bytes may be used to represent longitude 6616, and four bytes may be an appended timestamp 6618. The beacon node 6602 may pack the location payload 6612 into a protocol frame for transmission to other devices as the location message 6604. As described herein, any number of protocols may be used, depending on the communications channels available.

At regular time intervals, or on event-based or other triggers, the beacon node 6602 transmits the location message 6604. IoT devices or other nodes within range of the beacon node 6602, for example, from tens to hundreds of meters from the beacon node 6602, may receive the location message 6604, and use the geolocation payload 6612 for their own messaging or other purposes. For example, time corrections for a local device may be performed using the timestamp 6618 from the beacon node 6602.

Figure 67:
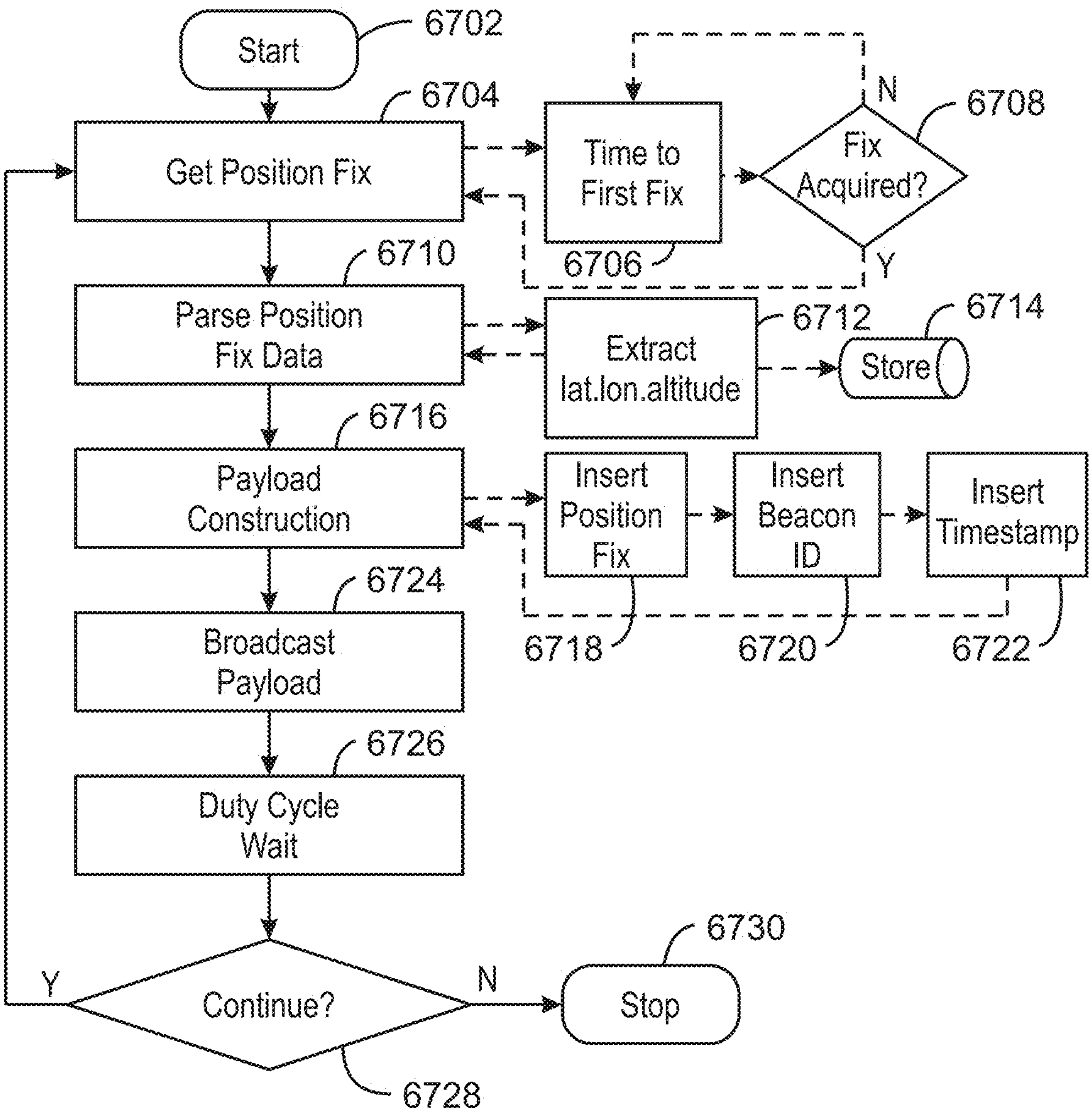
FIG. 67 is a process flow diagram of an example method for generating a location payload in accordance with some embodiments.

FIG. 67 is a process flow diagram of an example method 6700 for generating a location payload in accordance with some embodiments. The method 6700 of FIG. 67 may be implemented by the IoT device 6900 described with respect to FIG. 69. The block 6702 represents, for example, when a device is powered, or otherwise instructed to start the geolocation process. At block 6704 a position fix is obtained. A command is sent to a GPS module to obtain a position fix. At block 6706, a wait time for a first fix is implemented, for example, 10 seconds, 30 seconds, 60 seconds, or longer. After the wait time is completed, at block 6708, a determination is made as to whether a fix has been obtained. If not, process flow returns to block 6706 to wait for another increment. If a fix has been obtained, process flow returns to block 6704 with the location data from the GPS module.

At block 6710, the location data is parsed. This may be implemented at block 6712 by extracting the longitude, latitude, time, and other data, such as altitude. The extracted data is stored in a local store 6714.

At block 6716, a location payload is constructed from the data in the local store 6714. The payload may be constructed at block 6718, by inserting the position fix into a packet, for example, using the IEEE754 format 4-byte representation of the latitude and longitude position data. At block 6720 a beacon ID may be inserted into the packet, and at block 6722, a timestamp may be appended. The timestamp may be derived from a local clock, or may be time data extracted from the satellite data. The payload may be packed in a frame for the transmission. The protocol of the frame may be based on the communication channels to be used, such as Ethernet, LoRaWAN, or 4G, among others.

At block 6724, the frame is broadcast to the surrounding IoT devices. This may entail activating a transmitter and dispatching the frame as a message over a radio transmission. In some examples, the frame may be sent over a wired network, such as Ethernet. In some examples, a simple packet construction may be used, for example, by appending a header to the payload to identify the packet as location information and broadcasting the packet to surrounding devices without a direct or targeted communication.

At block 6726, a wait time may be implemented before repeating the process. This may be performed by activating a sleep command for a predetermined period of time. At block 6728 a determination is made as to whether to continue the location beacon process. If so, process flow returns to block 6704 to obtain the next position fix. If not, the process ends at block 6730.

Figure 68:
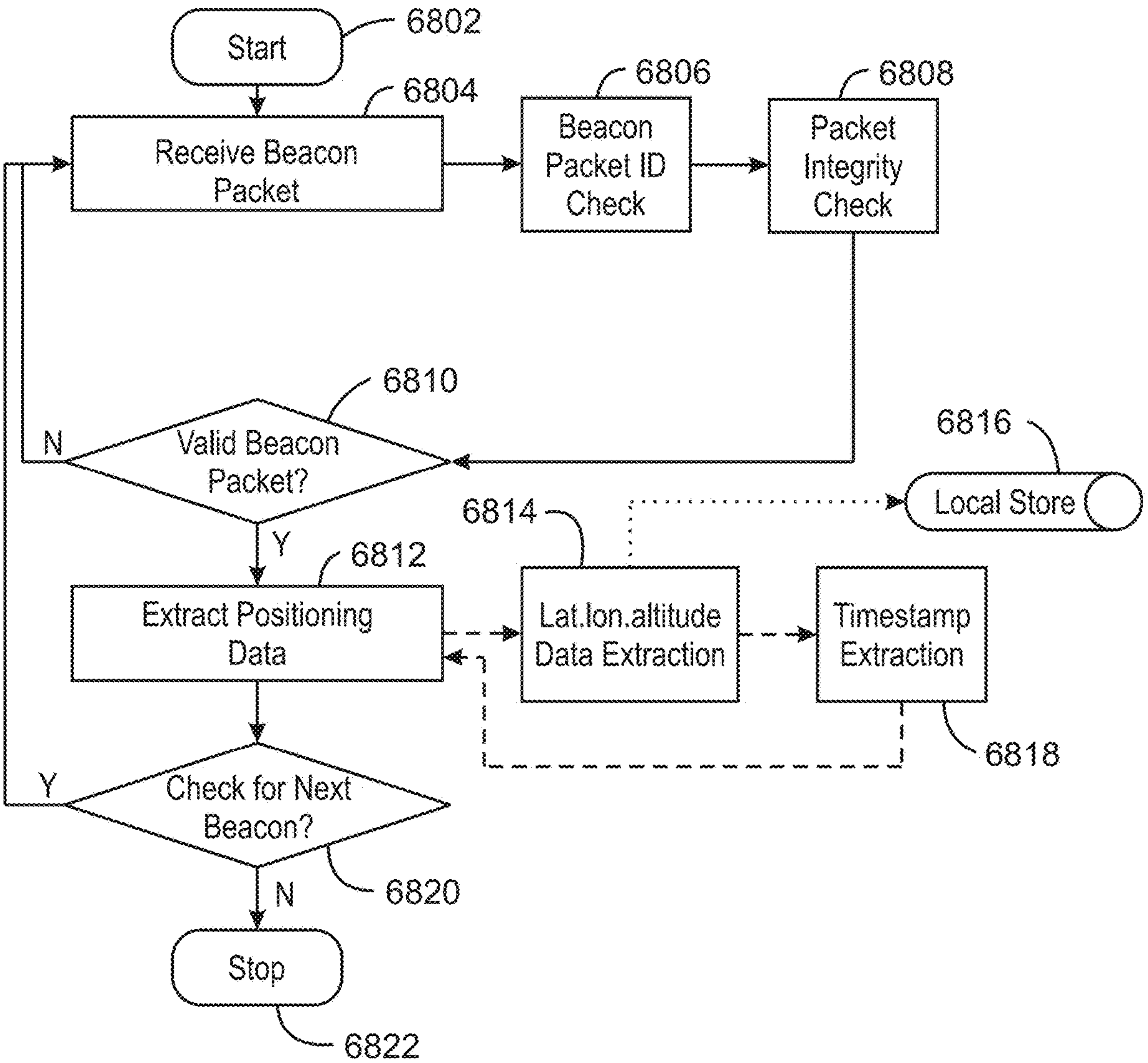
FIG. 68 is a process flow diagram of an example method for parsing a frame that includes a location payload in accordance with some embodiments.

FIG. 68 is a process flow diagram of an example method 6800 for parsing a frame that includes a location payload in accordance with some embodiments. The method 6800 of FIG. 67 may be implemented by the IoT device 6900 described with respect to FIG. 69. The block 6802 represents, for example, when an IoT device discovers a beacon node. At block 6804, a beacon frame or location packet is received from the beacon node. At block 6806, the beacon ID is checked to confirm the identity of the beacon node. At block 6808, a frame integrity check is run to determine if the frame or location packet is valid. If not, process flow returns to block 6804 to await the receipt of another frame or location packet.

If a valid frame or location packet was received, at block 6812 positioning data, for example, a location payload, is extracted. At block 6812, the location payload may be parsed. This may be performed by extracting the latitude and longitude, and altitude, if included, from the payload at block 6814. The timestamp may be extracted at block 6818. The information may be stored in a local store 6816. The IoT device may then use the information from the local store 6816, for example, for messaging, synchronization, or other purposes.

At block 6820, a determination is made as to whether another beacon frame has been received. If so, process flow returns to block 6804 to process that frame. If not, process flow ends at block 6822.

In this technique, every node does not need a dedicated GPS receiver, saving costs and battery power. In cases where exact per-device location or waypoint information is not needed this may provide sufficient information for IoT devices to identify their deployment area and perform location and/or time-dependent dependent tasks.

Figure 69:
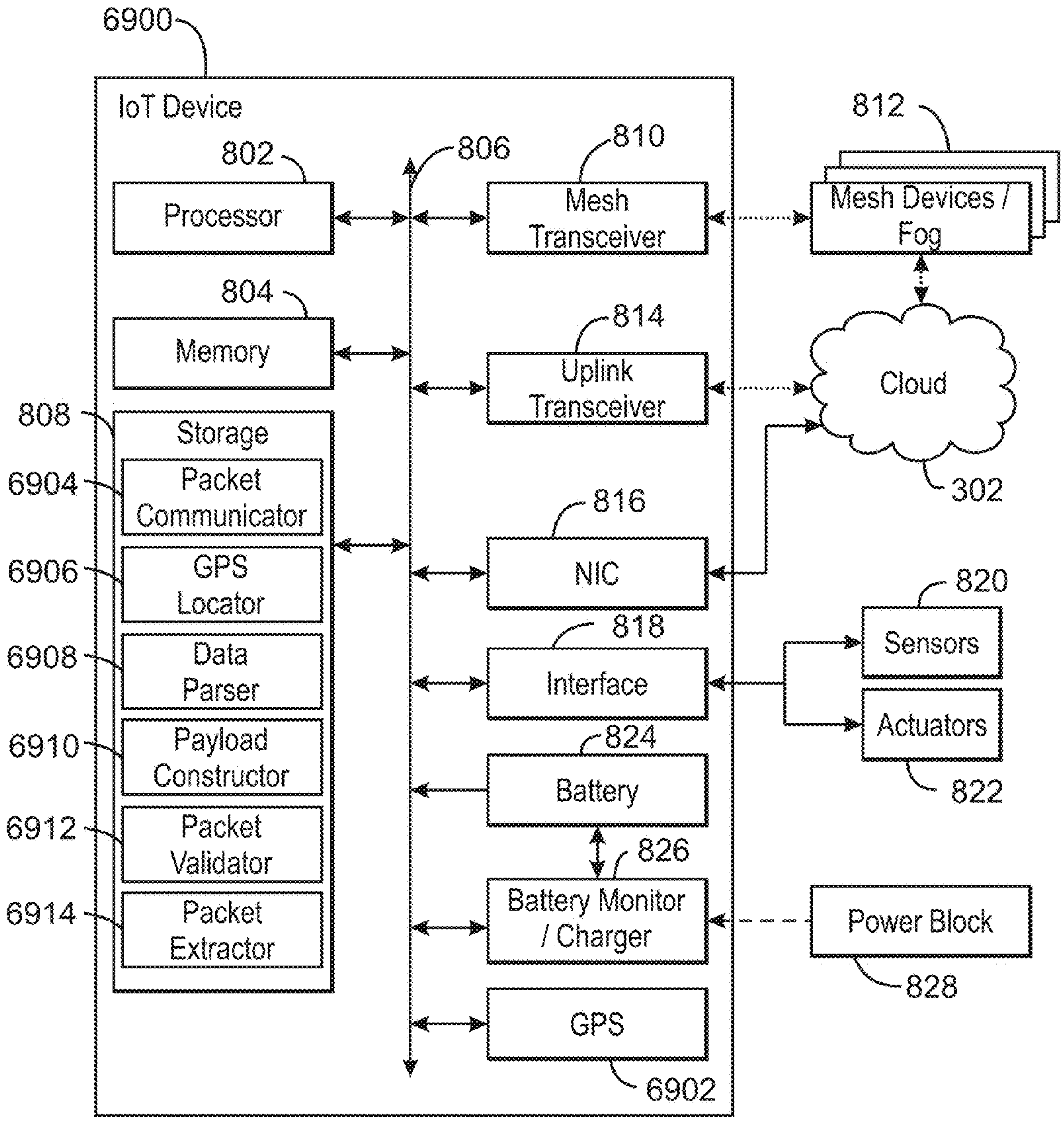
FIG. 69 is a block diagram of an example of components that may be present in a beacon node for establishing a beacon node system for sharing location data in accordance with some embodiments.

FIG. 69 is a block diagram of an example of components that may be present in a beacon node 6900 for establishing a beacon node system for sharing location data in accordance with some embodiments. Like numbered items are as described with respect to FIGS. 3 and 8. It can be noted that different components may be selected and used for the beacon node 6900 than for those selected for the IoT device 802 discussed with respect to FIG. 8, and other IoT devices discussed herein.

In this example, the IoT device 6900 may include a GPS module 6902 to receive and process satellite position data. The GPS module 6902 may be included in a number of interconnected mesh devices 812, but only activated in one or a few. This may allow for the system to have some location and time redundancy if the beacon node 6900 fails, for example, due to a low battery.

The mass storage 808 may include a number of modules to implement the beacon function described herein. Although shown as code blocks in the mass storage 808, it may be understood that any of the modules may be fully or partially replaced with hardwired circuits, for example, built into an application specific integrated circuit (ASIC).

The mass storage 808 may include a packet communicator 6904 that sends and receives frames or location packets that include a location payload from mesh devices 812 or devices in the cloud 302 over one more communications links, for example, through a mesh transceiver 810, an uplink transceiver 814, and a NIC 816, among others. As described with respect to 4502, the packet communicator 6904 may perform other functions, such as packaging location payloads in different protocols, performing proof-of-provenance checks, and the like. Further, the communicator 6904 may be part of an easement system 3312, described with respect to FIG. 33.

A GPS locator 6906 may communicate with the GPS module 6902 to obtain location information. The GPS locator 6906 may power or depower the GPS module 6906, for example, to control battery usage or to start a GPS module 6906 when another mesh device 812 having a GPS module fails. The GPS locator 6906 may collect and store the GPS location data from the GPS module 6906.

A data parser 6908 may parse the GPS location to determine latitude, longitude, time, and other parameters, such as altitude. The parsed data may be stored for further use.

A payload constructor 6910 may use the parsed data to construct a location payload. This may be performed as described with respect to FIG. 66. The payload may be packaged into a frame of a particular protocol type by the payload constructor 6910. The frame may then be sent by the packet communicator 6904.

As described herein, the IoT device is not limited to functioning as a beacon node, but may also receive location data. This may be useful when a GPS module 6902 fails, or is not able to determine a position. In some examples, the IoT device 6900 may not have a GPS module 6902, but may function as a location consumer only.

A frame validator 6912 may be used to validate frames received from a beacon node to determine if the packets match a beacon ID and contain valid data. The packet validator 6912 may refuse or ignore invalid packets, or may send a resend request, for example, if the beacon ID was correct, but the frame or location packet was corrupted.

A packet extractor 6914 may analyze a received frame to extract the location payload. This may include determining the data that indicates the latitude, the longitude, and the time information, as well as other information such as altitude.

Figure 70:
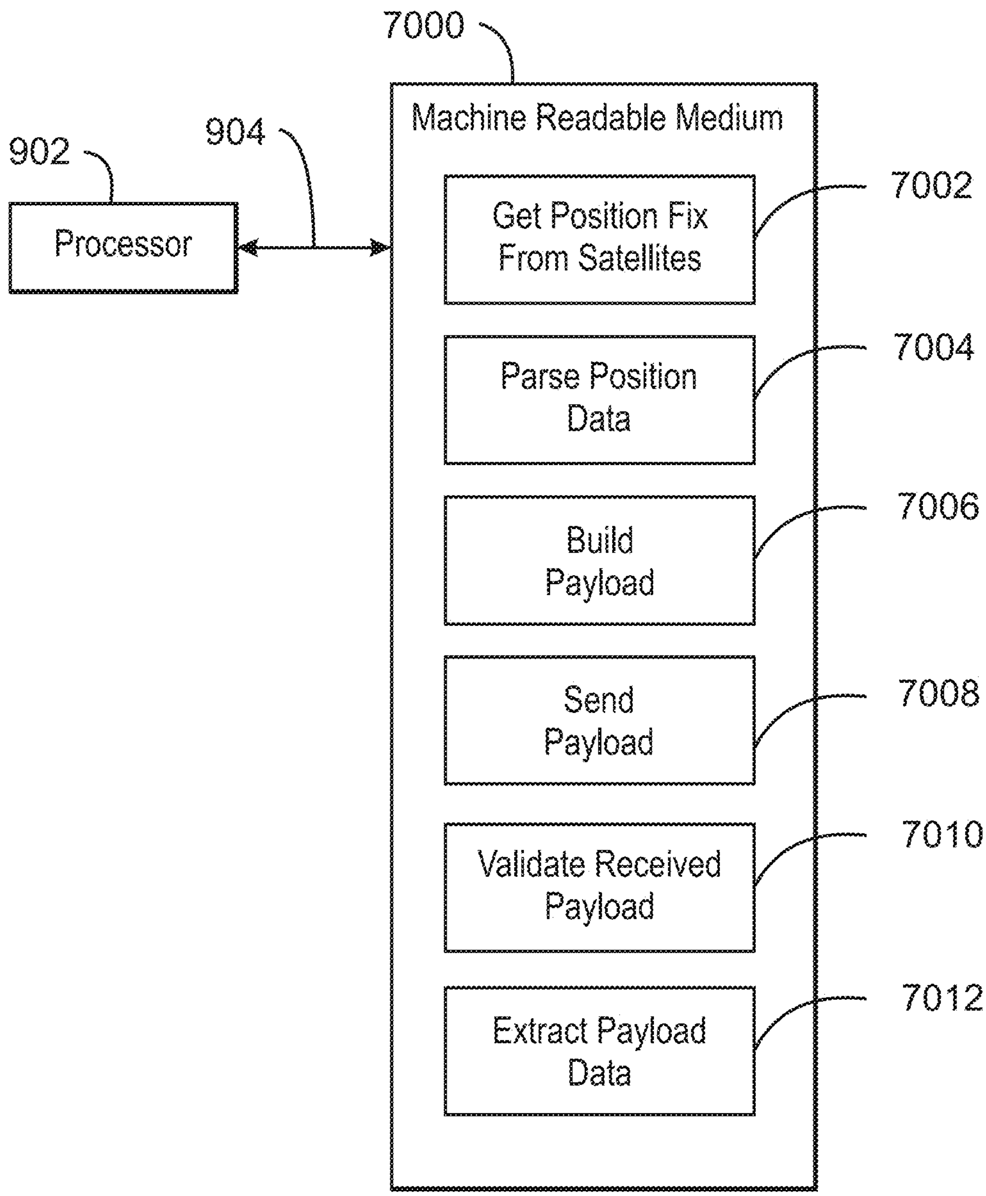
FIG. 70 is a block diagram of a non-transitory, machine readable medium including code to direct a processor to send and receive location payloads in accordance with some embodiments.

FIG. 70 is a block diagram of an exemplary non-transitory, machine readable medium 7000 including code to direct a processor 902 to send and receive location payloads in accordance with some embodiments. The processor 902 may access the non-transitory, machine readable medium 7000 over a bus 904. The processor 902 and bus 904 may be implemented in a manner similar to the processor 902 and bus 904 described with respect to FIG. 9. The non-transitory, machine readable medium 7000 may include devices described for the mass storage 808 of FIG. 8 or may include optical disks, thumb drives, or any number of other hardware devices.

The non-transitory, machine readable medium 7000 may include code 7002 to direct the processor 902 to get position data from GPS satellites, for example, using a GPS module. Code 7004 may be included to direct the processor 902 to parse the position data from the GPS module to obtain separate values for latitude, longitude, and time. The code 7004 may direct the processor 902 to determine other values, such as altitude, from the position data. Code 7006 may be included to direct the processor 902 to build a location payload including the latitude, longitude, and time. The code 7006 may direct the processor 902 to package the location payload in a frame of a particular protocol. Code 7008 may be included to direct the processor 902 to dispatch the payload data through various communication channels. Code 7012 may be included to direct the processor to extract location payload data from a valid frame received from a beacon and store the payload data for other purposes.

Almost all methods for storing and delivering information around a network utilize a push or pull method. Push can often be equated to the broadcast of a gateway or base station to all connected base nodes. This type of model is also often use in publish/subscribe models, where devices send data via channels as a means of sending data. Further, most model use a central server from where end-points broadcast data from (push), or a content server where they pull from. The techniques described with respect to FIGS. 71 to 74 use a combination of push and pull to distribute content across networks.

Figure 71:
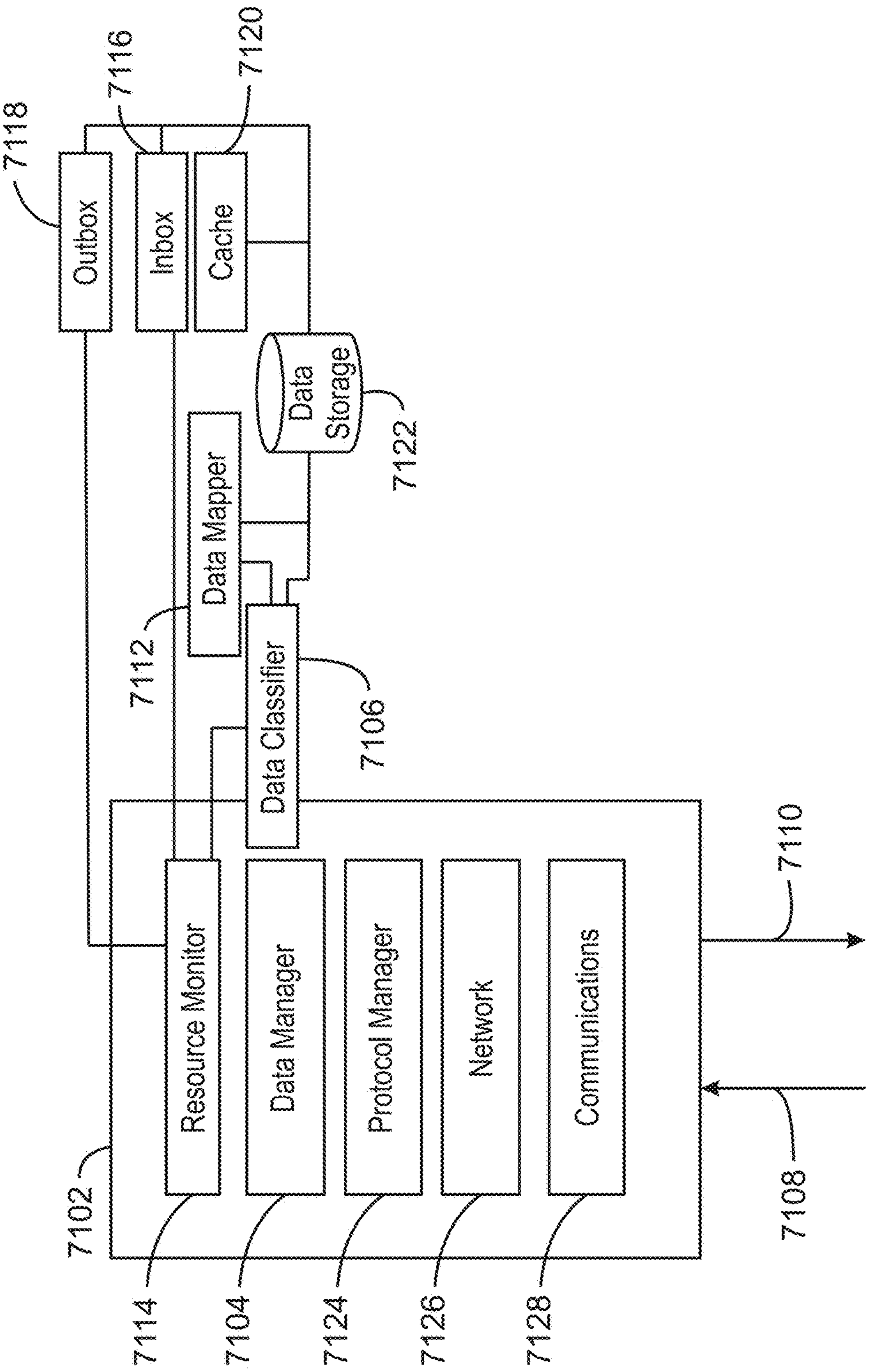
FIG. 71 is a schematic drawing of a distributed content-distribution system for heterogeneous networks in accordance with some embodiments.

FIG. 71 is a schematic drawing of a distributed content-distribution system 7100 for heterogeneous networks in accordance with some embodiments. The use of the distributed content-distribution system 7100 may enable the distribution across heterogeneous networks which may be lossy or have intermittent connectivity. Furthermore, it enables the distribution of data in a stateless fashion. One, or more, IoT device, or node 7102, in the distributed content-distribution system 7100 has a data manager 7104 that is responsible for the management of data on the node. The data manager 7104 has a number of sub systems, including a data classifier 7106 that may classify the inbound data 7108 and outbound data 7110 that passes through the distributed content-distribution system 7100. It uses three main classifications for the data, inbound, outbound, and cache.

In some aspects, a data mapper 7112 is responsible for mapping the classified data to a physical location on the system. The data mapper 7112 may use an algorithm, such as a hash function, to determine the optimum location of the data. The data classifier 7106 communicates with a resource manager 7114 to determine the classification for outbound and cache data. Inbound data 7108 is data intended to be consumed by the node itself. The data mapper 7112 transfers the data to an inbox 7116, and the resource manager 7114 monitors for changes or updates to the inbox 7116.

Outbound data 7110 may be shared by a node 7102 at greater than one hop distance, and is determined by the resource manager 7114. The outbound data 7110 may be stored in an outbox 7118. The resource manager 7114 calculates the number of hops by calculating the current resource availability at the node 7102, such as power and network node count.

Cached data is saved in a cache 7120, and is data that has been determined to be useful for the node 7102. A data historian 7122 may track data moving in and out of the node 7102, such as inbound and outbound data requests. A protocol manager 7124 may manage the protocols used for incoming and outgoing frames, for example, based on the communications channels in use for the particular frames. A network manager 7126 may handle network communications on the various communications channels, for example, hosting the network stack. A communications manager 7128 may handle physical level, or PHY, operations, such as radios, network interface controllers, and the like.

Figure 72:
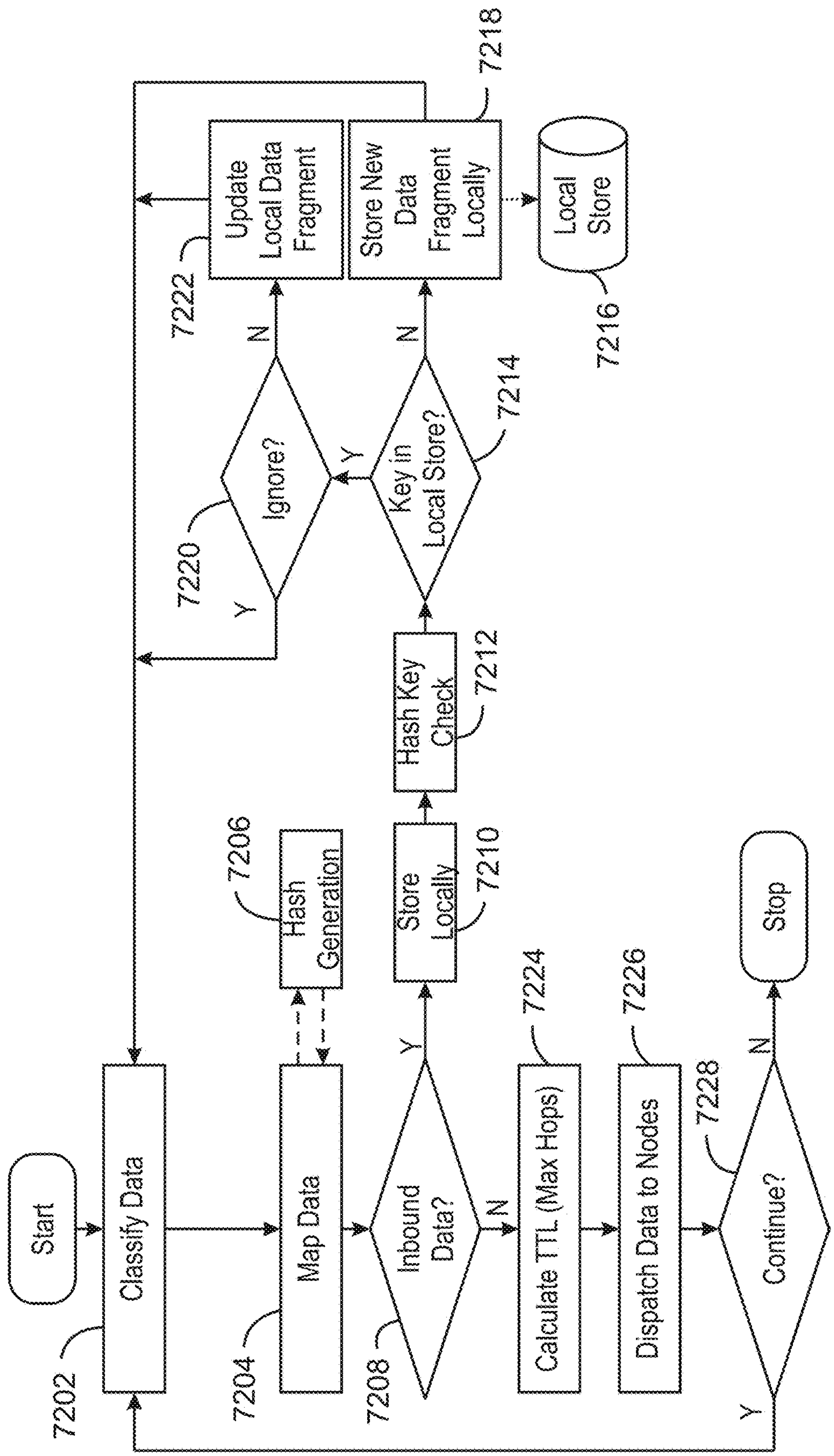
FIG. 72 is a process flow diagram of an example method for dispersed content distribution in accordance with some embodiments.

FIG. 72 is a process flow diagram of an example method 7200 for dispersed content distribution in accordance with some embodiments. The method 7200 of FIG. 72 may be implemented by the IoT device 7102 described with respect to FIGS. 71 and 73. In block 7202, the data is classified. This is performed by classifying one or more pieces of inbound and outbound data that passes through the system, for example, as inbound data, outbound data, and cache data.

At block 7204, the classified data is mapped to the correct physical location on the system. For example, as indicated at block 7206, this may be performed using an algorithm to generate a hash code identifying the location of inbound data.

At block 7208, a determination is made as to whether the data is inbound. If so, the data is locally stored at block 7210. At block 7212, the hash key is checked. At block 7214, a determination is made as to whether the hash key is in the local store 7216. If not, at block 7218, the new data fragment is stored locally. Process flow then returns to block 7202.

If the key is determined to be in the local store 7216 at block 7214, at block 7220 a determination is made as to whether the information should be ignored, for example, if it is identical to the previous information in the local store 7216. If so, process flow returns to block 7202. If not, the data is the local store 7216 is updated with the new fragment, and process flow returns to block 7202.

If at block 7208, the data is determined to be outbound data, at block 7224, the maximum number of hops is calculated. This is termed time-to-live (TTL), and may be determined by calculating the current resource availability at the node, such as power, network node count. At block 7226, the data is dispatched, or pushed, to the target node.

A target node may also pull data by requesting data from a node of one hop. The data pull request may have a TTL, measured in terms of hop count, i.e. number of hops a packet makes as it traverses a network where the TTL is decremented following each hop. When the TTL reaches a zero count, the data fragment is invalidated. The TTL may be measured in absolute time, for example, in seconds, minutes, or hours, where the data fragment is invalidated when the timeout expires. If it does not get a pull request within the timeout, it can push a request to the node, which can then be forwarded through the system.

At block 7226, a determination is made as to whether to continue the distributed sharing of content. If so, process flow resumes at block 7202.

Each node may keep track of inbound and outbound requests received in the data historian. A cache window may be maintained for all requests. The frequency can be determined by a number of factors, such as the number of requests over a period of time.

The device also self-manages its cache size by applying an accessed counter and timer to determine how often the cached data is accessed. If the data is being accessed frequently it may increase the cache, and if accessed less frequently, it may decrease the cache. Each node also will determine if it can push or pull data via the data manager.

Figure 73:
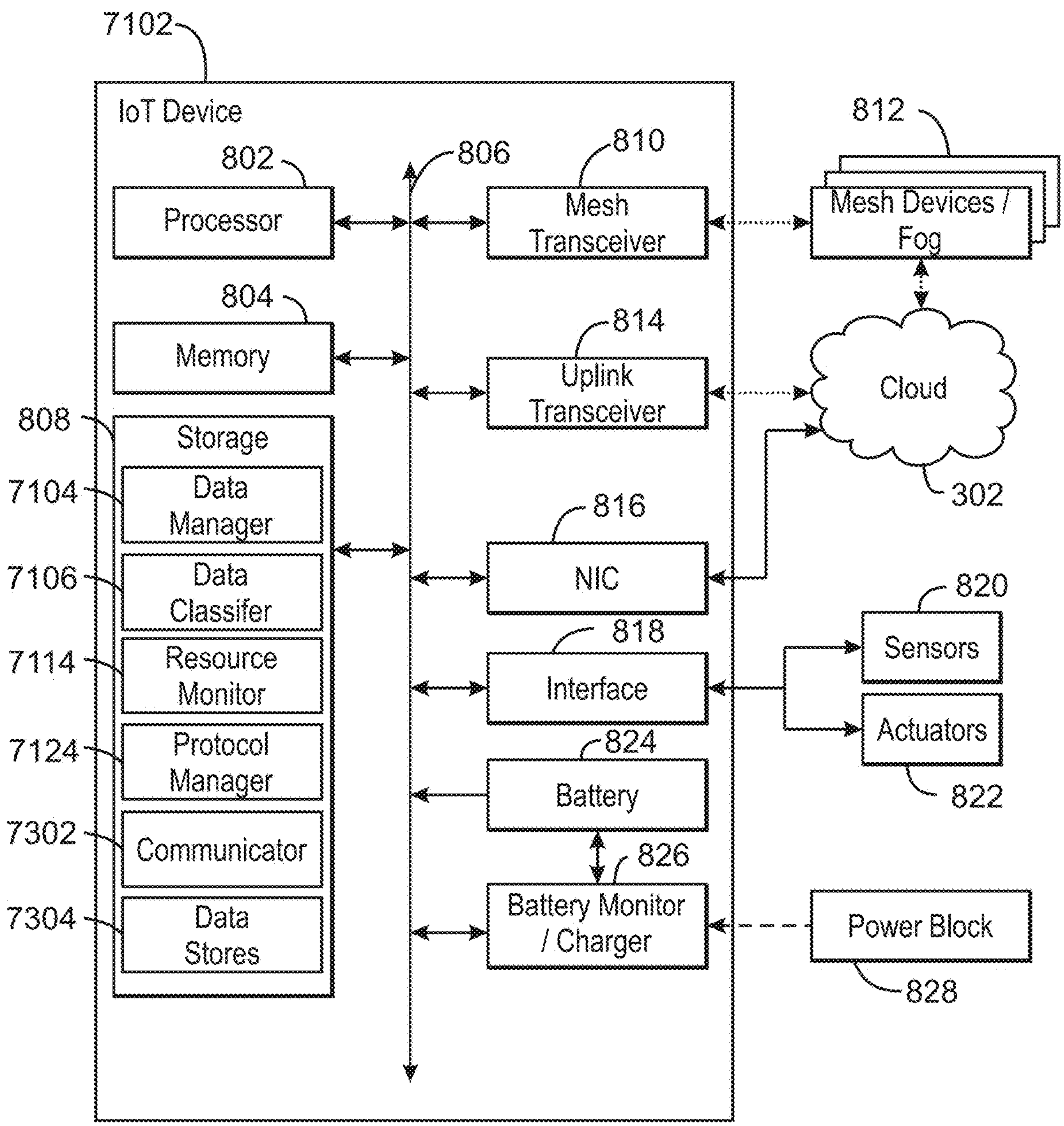
FIG. 73 is a block diagram of an example of components that may be present in an IoT device for implementing a distributed content-distribution system in accordance with some embodiments.

FIG. 73 is a block diagram of an example of components that may be present in an IoT device 7300 for implementing a distributed content-distribution system in accordance with some embodiments. Like numbered items are as described with respect to FIGS. 3, 8, and 71. It can be noted that different components may be selected and used for the IoT device 7300 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include the modules described with respect to FIG. 71. Data stores 7304, such as the inbox 7116, outbox 7118, cache 7120, and data historian 7122 may be included in the mass storage 808, or may be stored in other locations, such as memory on another device.

The mass storage 808 may include a communicator 7302 that sends packets to and receives frames from mesh devices 812 or devices in the cloud 302 over one more communications links, for example, through a mesh transceiver 810, an uplink transceiver 814, and a NIC 816, among others. In addition to the functions described with respect to FIG. 73, as described with respect to 4502 of FIG. 45, the communicator 7302 may perform other functions, such as translation of packets between protocols, performing proof-of-provenance additions, and the like. Further, the communicator 7302 may be part of an easement system 3312, as described with respect to FIG. 33.

Figure 74:
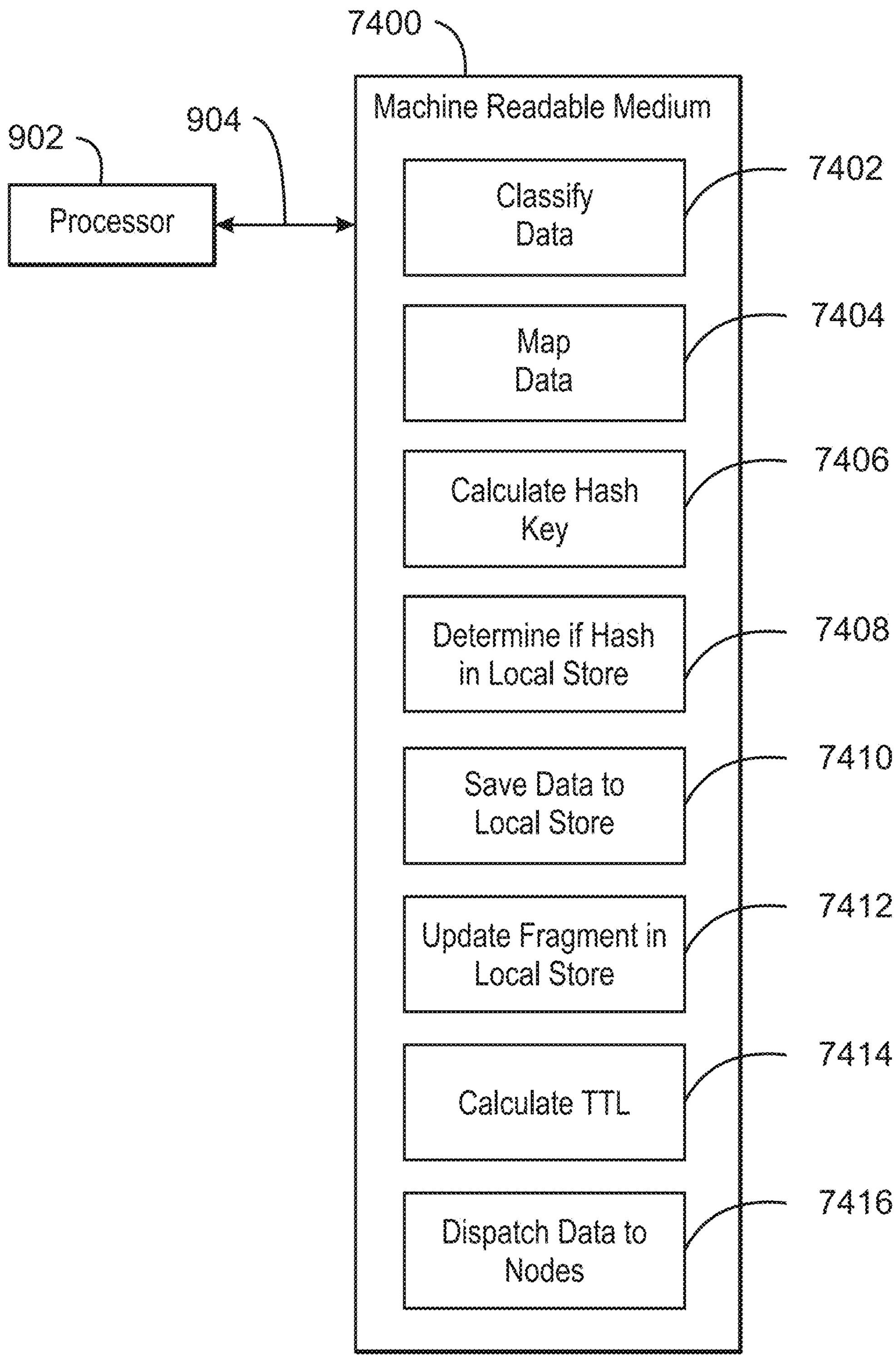
FIG. 74 is a block diagram of a non-transitory, machine readable medium including code to direct a processor to implement a distributed content-distribution system in accordance with some embodiments.

FIG. 74 is a block diagram of a non-transitory, machine readable medium 7400 including code to direct a processor 902 to implement a distributed content-distribution system in accordance with some embodiments. The processor 902 may access the non-transitory, machine readable medium 7400 over a bus 904. The processor 902 and bus 904 may be implemented in a manner similar to the processor 902 and bus 904 described with respect to FIG. 9. The non-transitory, machine readable medium 7400 may include devices described for the mass storage 808 of FIG. 8 or may include optical disks, thumb drives, or any number of other hardware devices.

The non-transitory, machine readable medium 7400 may include code 7402 to classify the data that passes through the distributed content-distribution system as inbound data, outbound data, or cache data. Code 7404 may be included to direct the processor 902 to map the classified data to a physical location on the system. The code 7404 may direct the processor 902 to determine the optimum location of the data. The code 7406 may direct the processor 902 to calculate a hash function of the data. Code 7408 may be included to direct the processor 902 to determine if the hash key is in the local store.

Code 7410 may be included to direct the processor 902 to store a new data fragment locally. Code 7412 may be included to update a locally stored data fragment. Code 7414 may be included to direct the processor to calculate a time-to-live for a data fragment, for example, in number of hops before deletion, or in amount of time before deletion, or both. Code 7416 may be included to dispatch data to other nodes, for example, in frames. The protocol for the frames may be selected based on the communications channel used for sending the frames.

Figure 75:
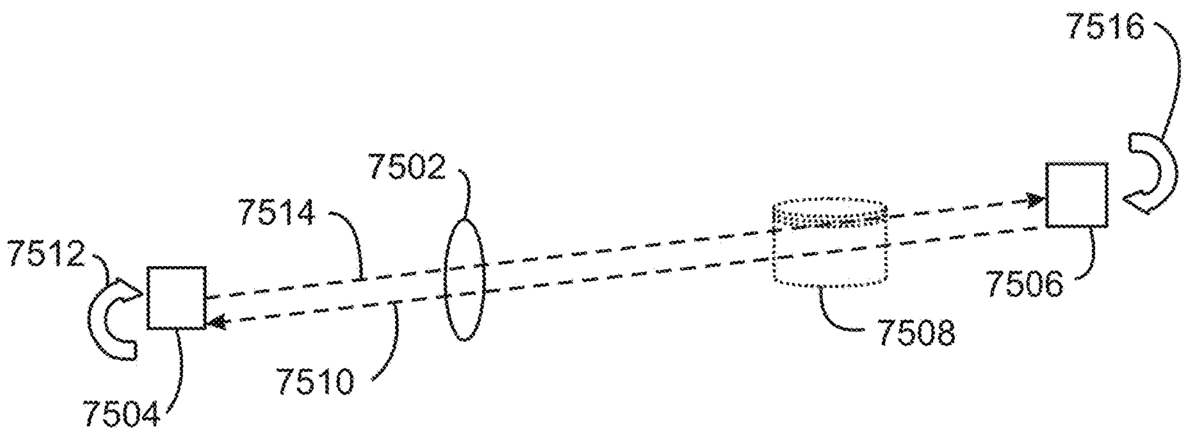
FIG. 75 is a schematic drawing of a wireless memory system in accordance with some embodiments.

FIG. 75 is a schematic drawing of a wireless memory system 7500 in accordance with some embodiments. The wireless memory system 7500 uses a communication channel 7502 between two or more connected nodes, such as an originating node 7504 and receiving node 7506 as a storage medium 7508. This is essentially a wireless sequential access memory system in which the radio signal itself is acting as the storage medium 7508 for the data being transferred between the nodes 7504 and 7506. Thus, the node 7504 and 7506 may trade-off storage space for communications bandwidth.

In the wireless memory system 7500, data 7510 arriving at the originating node 7504 is looped back 7512 to be sent to another node, such as the receiving node 7506. The data 7514 arriving at the receiving node 7506 is then looped back 7516 and sent back to the originating node 7504. In some examples, multiple nodes may form a chain for receiving and transmitting the data. By repeating the process, data remains in-flight and the communications channel 7502 acts as a storage medium.

Figure 76:
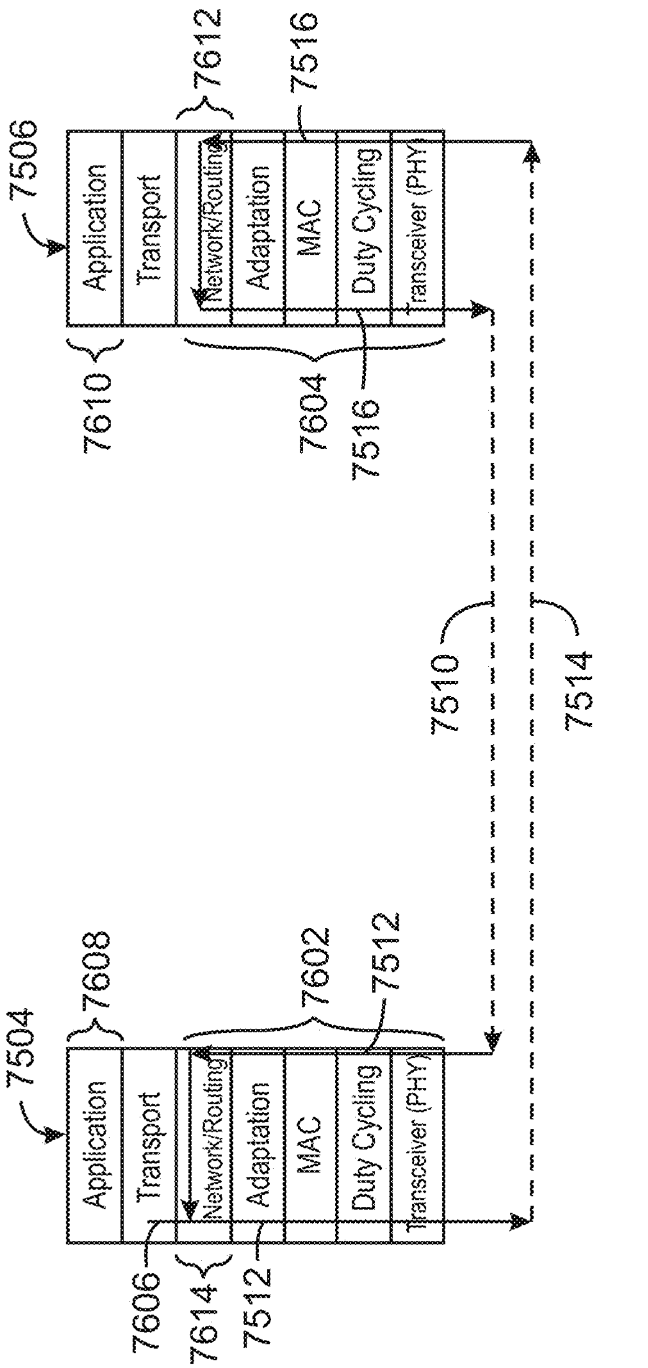
FIG. 76 is another schematic drawing of the wireless memory system in accordance with some embodiments.

FIG. 76 is another schematic drawing of the wireless memory system 7500 in accordance with some embodiments. Like numbered items are as described with respect to FIG. 75. In this example, the network stack 7602 for the originating node 7504, and the network stack 7604 for the receiving node 7506 are shown. Data 7606 arriving from the application layer 7608 in the originating node 7504 may be tagged, secured, and transmitted for storage as a transmission 7514 to the receiving node 7506. However, the receiving node 7506 may not pass the data in the transmission 7514 on to the application layer 7610, but may perform a loopback operation 7516 in the networking/routing layer 7612 to send out the received data as another transmission 7510, for example, back to the originating node 7504.

The round trip memory storage time, $M_{tm}$ is given as:

$$TO_{stack}+T_{TX}+T1_{stack}+T_{RX}$$

In this equation, $TO_{stack}$ denotes the time taken for the storage payload to transit from the network/routing layer 7614 of the originating node 7504 and exit via a wireless transmission. $T_{TX}$ denotes the in-flight transmission time from the originating node 7504 to the receiving node 7506. $T1_{stack}$ denotes the time for the in-stack loopback 7516 to take place in the receiving node 7506, and $T_{RX}$ is the in-flight transmission time from the receiving node 7506 back to the originating node 7504.

Figure 77:
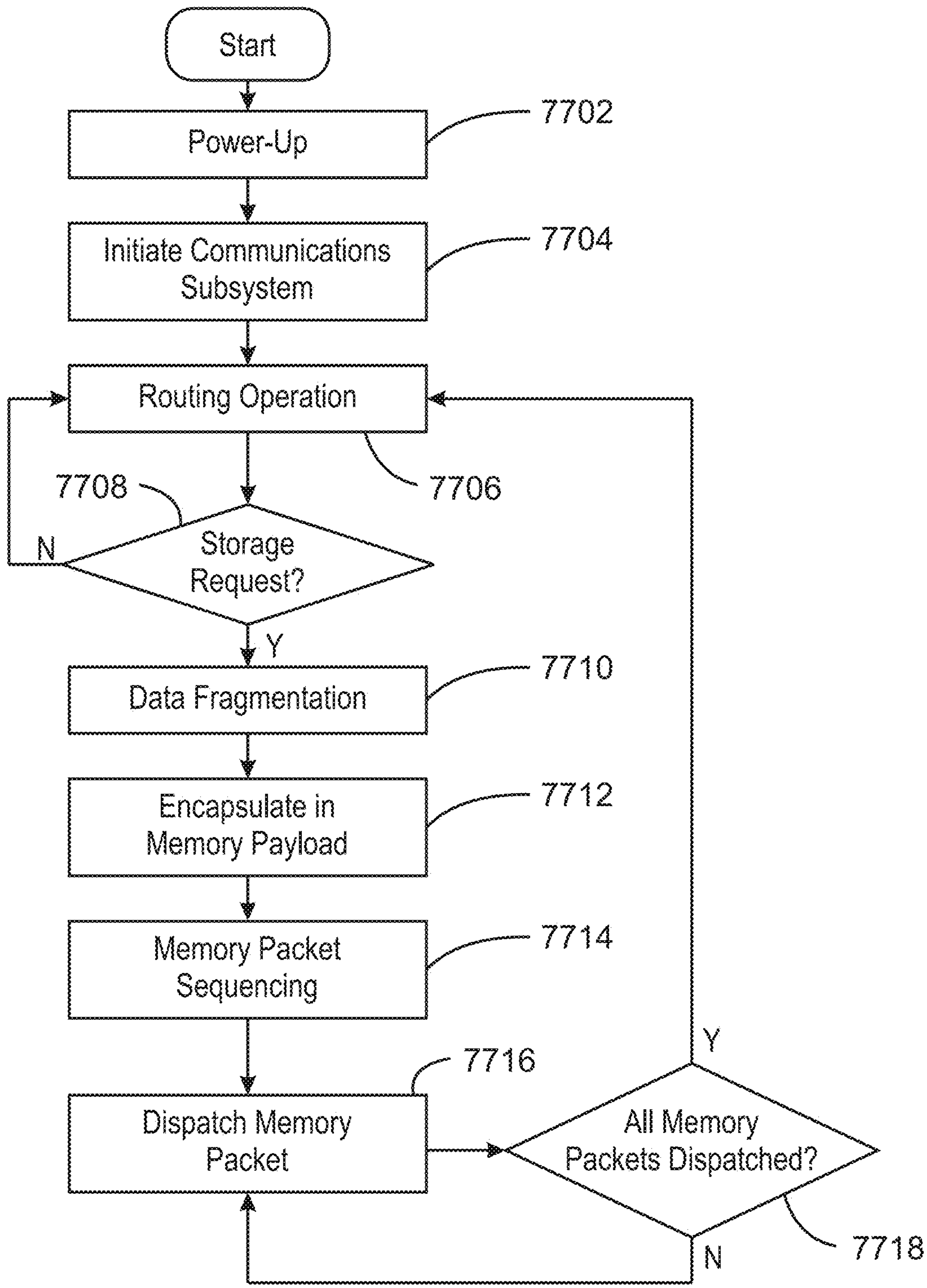
FIG. 77 is a process flow diagram of an example method for fragmenting and storing data in a transmission loop between devices in accordance with some embodiments.

FIG. 77 is a process flow diagram of an example method 7700 for fragmenting and storing data in a transmission loop between devices in accordance with some embodiments. The method 7700 of FIG. 77 may be implemented by the IoT device 7900 described with respect to FIG. 79. The method 7700 starts at block 7702 when the system is powered. At block 7704, the communications subsystem is initiated and communications channels are established between the different devices.

At block 7706 a routing operation between devices is initiated. The routing operation may be a data send or a data storage request. At block 7708, a determination is made as to whether the routing request is a data storage request. If not, the data is routed and process flow returns to block 7706 to wait for another routing request.

At block 7710, the data to be stored is fragmented, for example, to fit into individual frames or other appropriate packaging. At block 7712, the data is encapsulated into a memory packet. As the data is not being transferred over the communications channels, but merely being routed back, the packaging may be simple, for example, the memory packet may be formed by appending a header indicating that it is stored data and a sequence number. This may reduce the overhead, allowing an increase in the amount of data to be stored. At block 7714, the memory packet is sequenced to allow reassembly, or identification of the starting point and ending point for the data.

At block 7716, the memory packet is dispatched over the communication channel. At block 7718, a determination is made as to whether all memory packets have been sent. If not, process flow returns to block 7716 to dispatch another memory packet. If all packets have been dispatched, process flow returns to block 7706.

Figure 78:
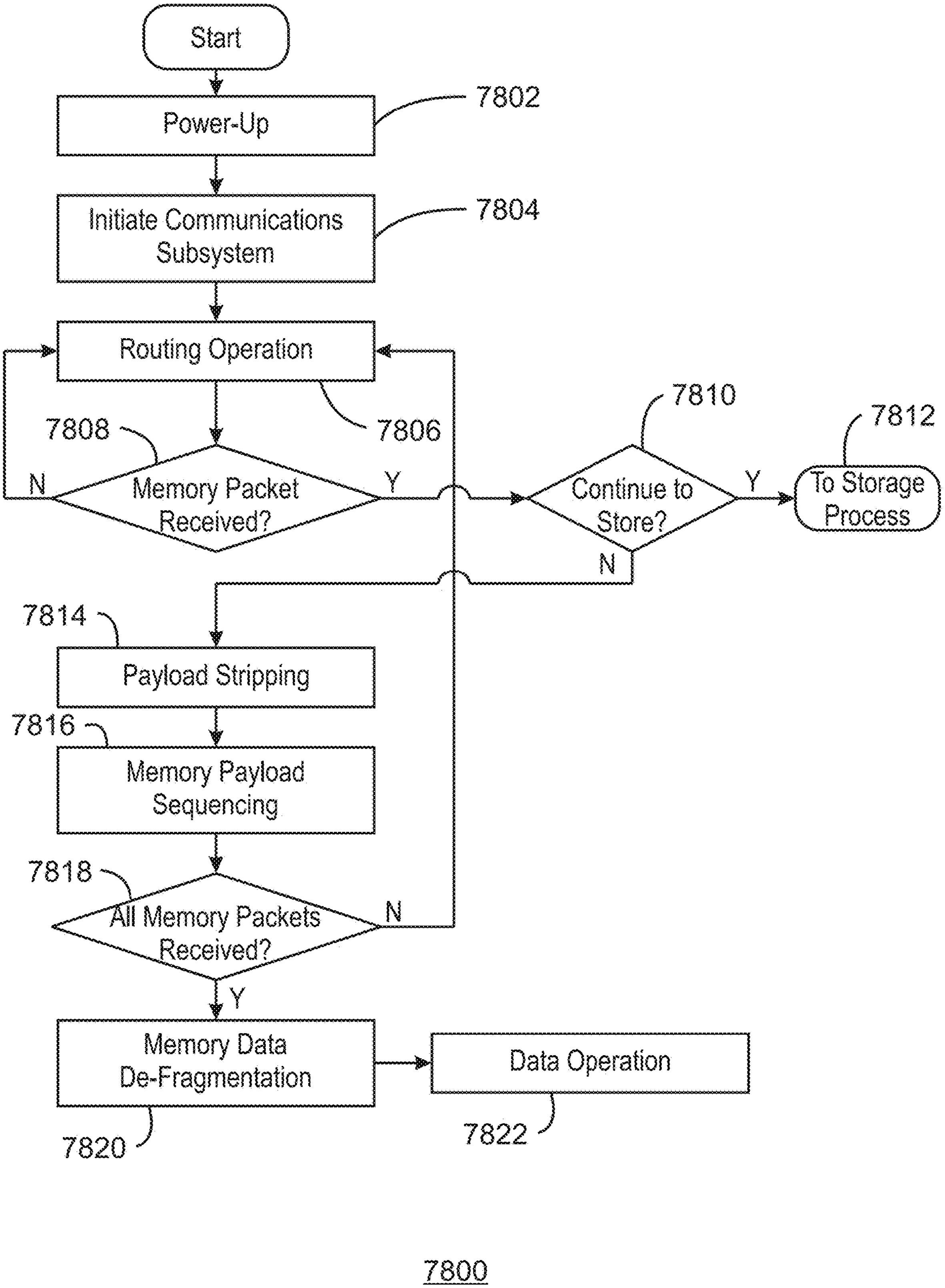
FIG. 78 is a process flow diagram of an example method for data storage and access using a communications channel for storage in accordance with some embodiments.

FIG. 78 is a process flow diagram of an example method 7800 for data storage and access using a communications channel for storage in accordance with some embodiments. The method 7800 of FIG. 78 may be implemented by the IoT device 7900 described with respect to FIG. 79. The block 7802 represents, for example, when the device is powered up. At block 7804, a communication subsystem is initialized and communications channels are established with other devices.

At block 7806, a routing operation takes place, for example, when a packet or frame is received by the device. At block 7808, a determination is made as to whether a memory packet has been received. If not, process flow returns to block 7806 to complete the routing and wait for another packet or frame to be received.

If a memory packet has been identified at block 7808, at block 7810, a determination is made as to whether the packet should continue to be stored. If so, at block 7812, the packet is returned to the storage process, for example, being routed back to the sending device.

If the packet is no longer to be stored, at block 7814, the payload is stripped from the packet and stored. At block 7816, the sequence number is determined from the header information and stored for data reassembly. At block 7818, a determination is made as to whether all packets have been received. If not, process flow returns to block 7806 to wait for the next packets or frame.

If all packets are determined to have been received at block 7818, at block 7820, the payloads are reassembled to form the data. At block 7822, the data is used by the consumer.

Figure 79:
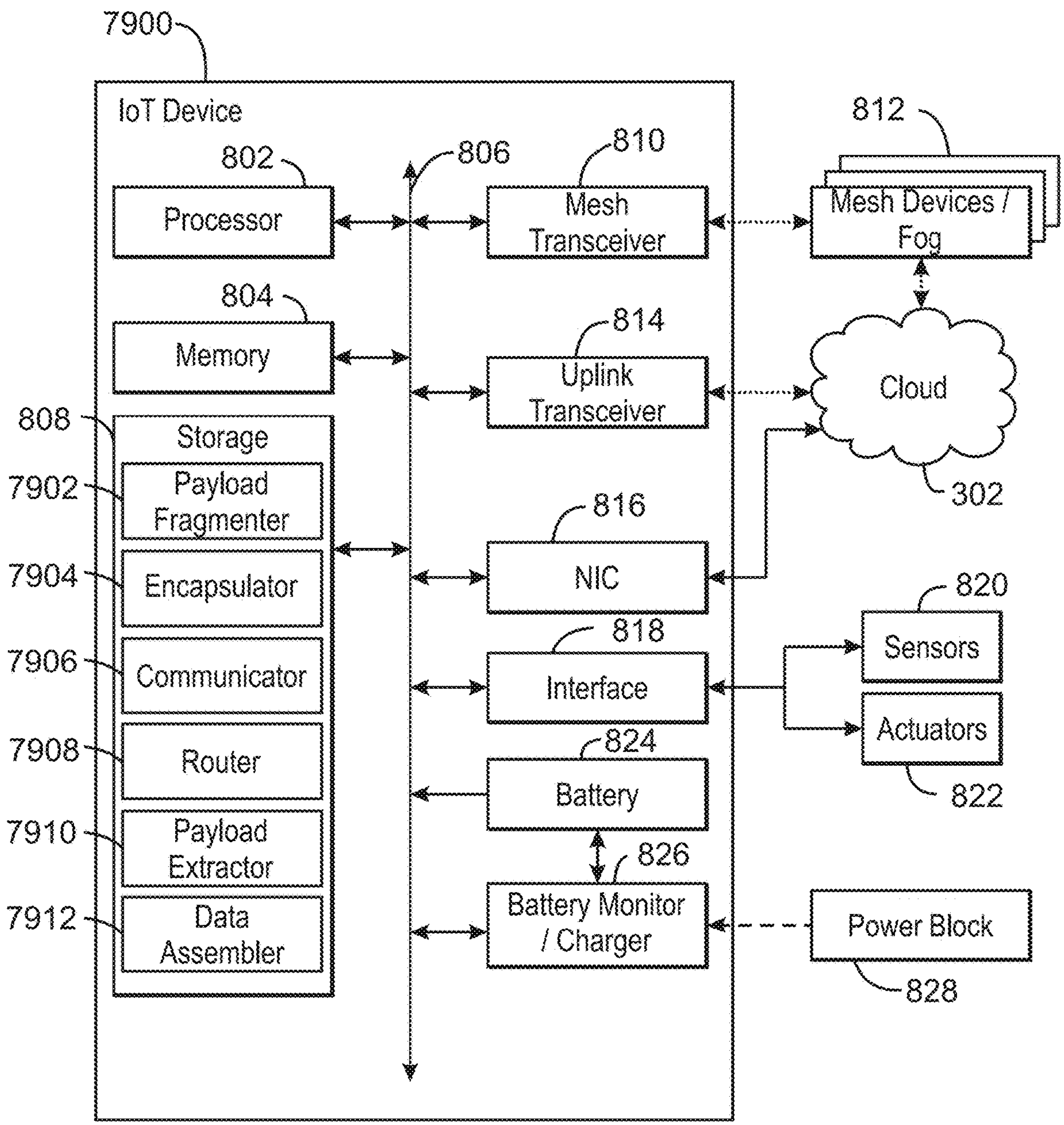
FIG. 79 is a block diagram of an example of components that may be present in an IoT device for storing data in transmission channels in accordance with some embodiments.

FIG. 79 is a block diagram of an example of components that may be present in an IoT device 7900 for storing data in transmission channels in accordance with some embodiments. Like numbered items are as described with respect to FIGS. 3 and 8. It can be noted that different components may be selected and used for the IoT device 7900 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

A payload fragmenter 7902 may receive a storage request, and fragment the data into payloads based on the communications channel, size of the data, and the like. The payload fragmenter 7902 may determine an associated sequence number for the payload in the data stream. An encapsulator 7904 may encapsulate payload into a packet, with a header identifying the packet as a storage request. The header may also contain the sequence number for the payload. Depending on the communications channel selected, the packets may be packaged into the data fields of a protocol frames, although the overhead may militate towards using a simpler encapsulation.

The mass storage 808 may include a communicator 7906 that sends packets to and receives packets from mesh devices 812 or devices in the cloud 302 over one more communications links, for example, through a mesh transceiver 810, an uplink transceiver 814, and a NIC 816, among others. In addition to the functions described with respect to FIG. 79, as described with respect to 4502 in FIG. 45, the packet communicator 7902 may perform other functions, such as translation of packets between protocols, performing proof-of-provenance additions, and the like. Further, the packet communicator 7902 may be part of an easement system 3312, described with respect to FIG. 33.

A router 7908 may examine packets and frames that are received to determine if they are part of a storage request. Packets that include stored data may be retransmitted, for example, from a network/routing level in a communications stack. If a retrieval request is received, the router may intercept packets that include stored data for extraction. The router 7908 may also receive data from an application and determine if it is to be stored or transmitted.

A payload extractor 7910 may take packets extracted from the storage stream, and extract a payload and a sequence number from the packets. A data assembler 7912 may then reassemble the retrieved data for use by the device. If some packets are missing, the data assembler 7912 may instruct the router to continue looking for those packets.

Figure 80:
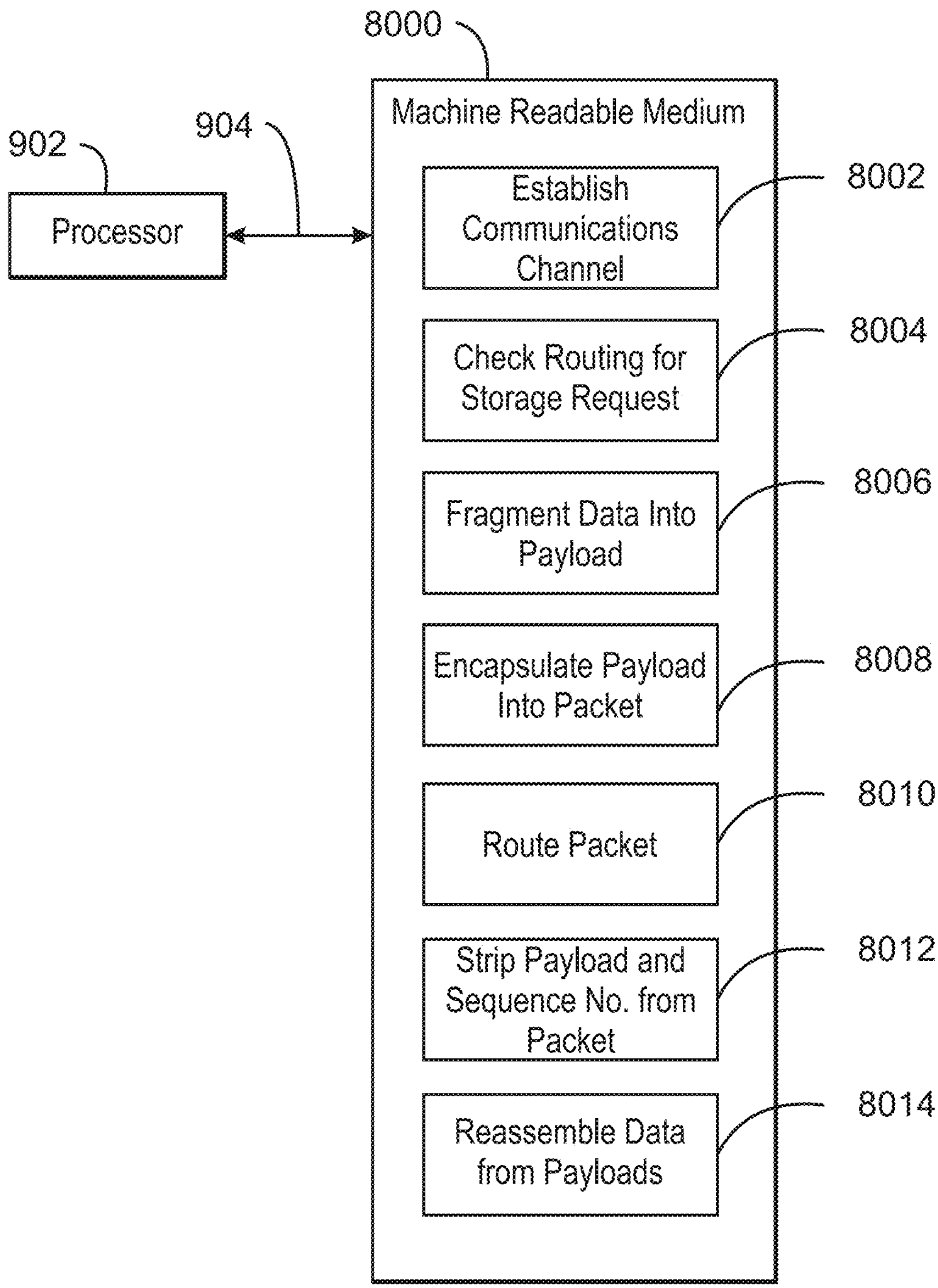
FIG. 80 is a block diagram of a non-transitory, machine readable medium including code to direct a processor to fragment and transmit payloads along multiple parallel paths in accordance with some embodiments.

FIG. 80 is a block diagram of an exemplary non-transitory, machine readable medium 8000 including code to direct a processor 902 to store data in transmission channels in accordance with some embodiments. The processor 902 may access the non-transitory, machine readable medium 8000 over a bus 904. The processor 902 and bus 904 may be implemented in a manner similar to the processor 902 and bus 904 described with respect to FIG. 9. The non-transitory, machine readable medium 8000 may include devices described for the mass storage 808 of FIG. 8 or may include optical disks, thumb drives, or any number of other hardware devices.

The non-transitory, machine readable medium 8000 may include code 8002 to direct the processor 902 to establish communications channels with other devices. Code 8004 may be included to direct the processor 902 to determine if a routing request is a data storage request. Code 8004 may be included to direct the processor 902 to fragment the data for a storage request into payloads. Code 8008 may be included to direct the processor 902 to encapsulate the payloads into memory packets.

Code 8010 may be included to direct the processor 902 to route the memory packets over the communications channel. The code 8010 may direct the processor 902 to determine if memory packets should be resent to another device, or intercepted for use.

Code 8012 may be included to direct the processor 902 to unpackage the payloads from the memory packets, and then to parse the header information to identify sequence number. Code 8014 may be included to direct the processor 902 to reassemble the data from the payloads based on the sequence number.

Figure 81:
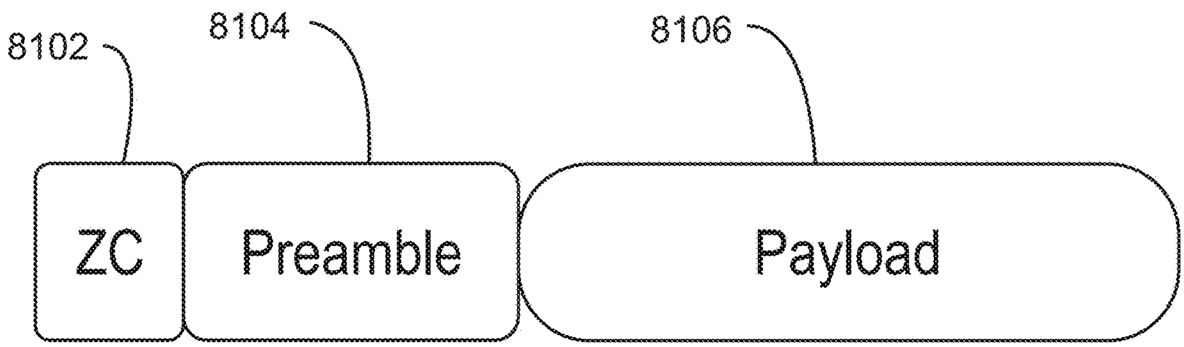
FIG. 81 is a drawing of a structure that may be used for dynamic signaling in accordance with some embodiments.

FIG. 81 is a drawing of a waveform 8100 that may be used for dynamic signaling in accordance with some embodiments. As described herein, a preamble waveform 8102 and 8104 may be prepended to a transmitted waveform 8106, where the transmitted waveform includes a number of overlapping frames in individual channels. The preamble waveform 8102 and 8104 may be used by a base station to dynamically determine the number of data channels that will be used by a client device for an uplink. Using the preamble waveform 8102 and 8104 may eliminate the use of out-of-band control messaging or other synchronization information to inform the base station of the data channels.

In some aspects, the preamble waveform 8102 and 8104 may be an analog waveform built using a shifted Zadoff-Chu (ZC) sequence. ZC sequences are a family of so-called constant-amplitude, zero autocorrelation (CAZAC) sequences with auto and cross-correlation properties that make them highly attractive for synchronization purposes. They are predominately used in the long-term evolution (LTE) standard for high-speed wireless communications.

In some aspects, a ZC sequence is a complex-valued mathematical sequence which, when applied to radio signals, gives rise to an electromagnetic signal of constant amplitude, whereby cyclically shifted versions of the sequence imposed on a signal result in zero cross-correlation with one another at the receiver. A generated sequence that has not been shifted is known as a root sequence.

ZC sequences also have the property of constant amplitude. When adopted in a communications signal, this improves the efficiency of the power amplifier in the transmitter. This presents an opportunity to use lower cost power amplifiers than would be typically used for a high-linearity system such as orthogonal frequency division multiplexing (OFDM). The ability to maintain a linearly-amplified signal using a ZC or other constant envelope sequence is less complex and less expensive than using a sequence with a rapidly-changing amplitude profile. If linearity is compromised, the signal quality can be degraded. CAZAC sequences exhibit good anti-noise features and can be detected even when the signal to noise ratio is as low as −10 dB. Taken together, all of these properties make ZC sequences very attractive when used for preamble signaling and synchronization in communications systems.

The approach has been designed to prepend client and base station signaling waveforms to the frames that are exchanged, indicating the channel being used for a particular frame. Designed for wireless systems using dynamic spectrum access and adaptive bandwidth approaches, it is particularly suitable for systems that do not use or require control channels or scheduled uplink (UL)/downlink (DL) timeslots.

In a channelized system, the preamble structure 8102 and 8104 can enable client devices to inform a receiving base station of the number of channels that will be used to convey the UL data payload from the client device to a base station, before the client dispatches its UL payload message. An example usage is in low power wide area wireless communications used for low overhead IoT systems. The techniques enable these devices to dynamically change the bandwidth used in case more data is required to be dispatched to a base station in UL mode, and if variable data lengths are required to be dispatched from a base station to remote client devices, for example, to support over the air firmware and configuration updates.

Figure 82:
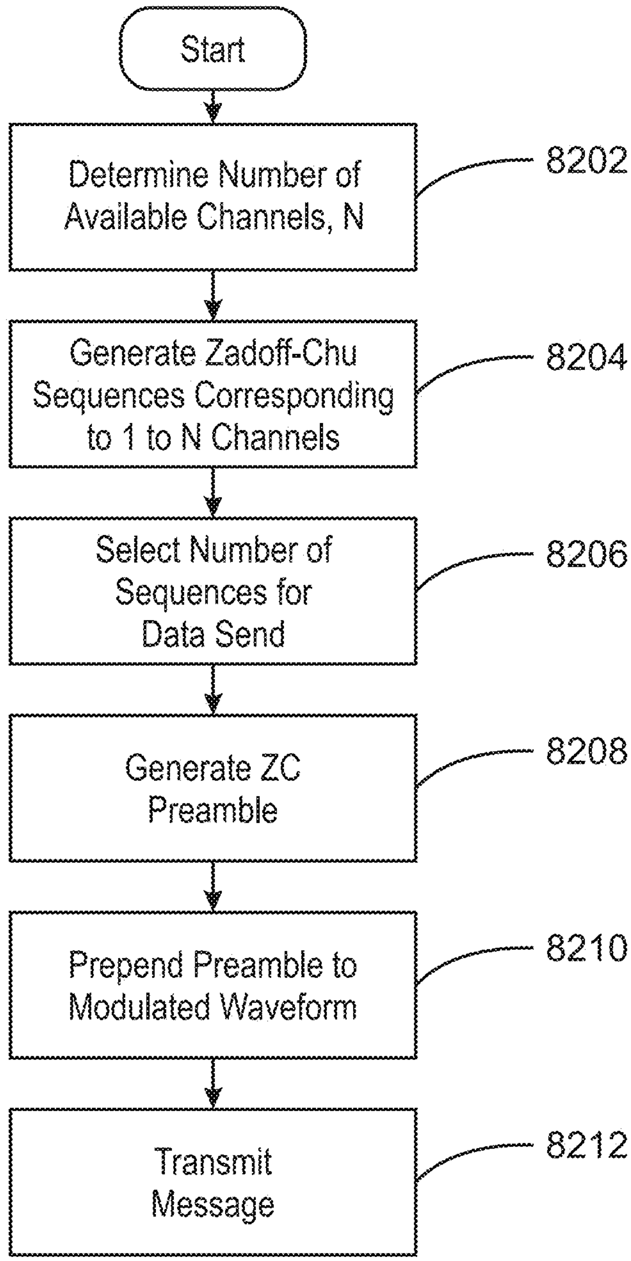
FIG. 82 is a process flow diagram of an example method for transmission of data using a Zadoff-Chu (ZC) preamble structure in accordance with some embodiments.

FIG. 82 is a process flow diagram of an example method 8200 for transmission of data using a ZC preamble structure in accordance with some embodiments. The method 8200 of FIG. 82 may be implemented by the IoT device 8500 described with respect to FIG. 85. At block 8202, a client device determines the number of available, or possible, channels, N. This may be performed by an information theory analysis of the communication channels coupling the devices. The available number of channels may be sent to a receiving device to initialize communications, for example, in a single channel message.

At block 8204, the set of NZC sequences, corresponding to the number of available channels, N, are generated by generating a set, K, of integer, non-zero, and unique ZC shift values associated with each channel, $K_c$, where c denotes the channel number. It may be noted that all wireless devices, including the base station, have knowledge of K, for example, generating their own copy of the channel information. The ZC sequences for each shift value $K_c$ are generated according to the formula:

$$x_{Kc}(n+1)=\exp^{-j\pi K_c n(n+1)/NZC}$$

The complex value at each position (n) of each root ZC sequence (u) is given by:

$$x_u(n+1)=\exp^{+j\pi un(n+1)/NZC},$$

where $0 \le n \le N_{ZC}$ and $N_{ZC}$ is the length of the sequence.

The device may then determine the number of channels, k, it intends to use to dispatch UL data to a base station in a communication. For example, the device may not need to use all of the possible channels, but may use a fewer number to increase the signal-to-noise ratio for the transmission.

At block 8206, the wireless client device selects a sequence $K_c$ corresponding to the number of channels, c, to be used to transmit the waveform. The client device than generates the ZC preamble at block 8208. At block 8210, the wireless device prepends the single ZC sequence, xKc to the existing complex-value baseband waveform used by the device to send the modulated frames. At block 8212, the wireless client device then up-converts the baseband waveform and transmits it.

Figure 83:
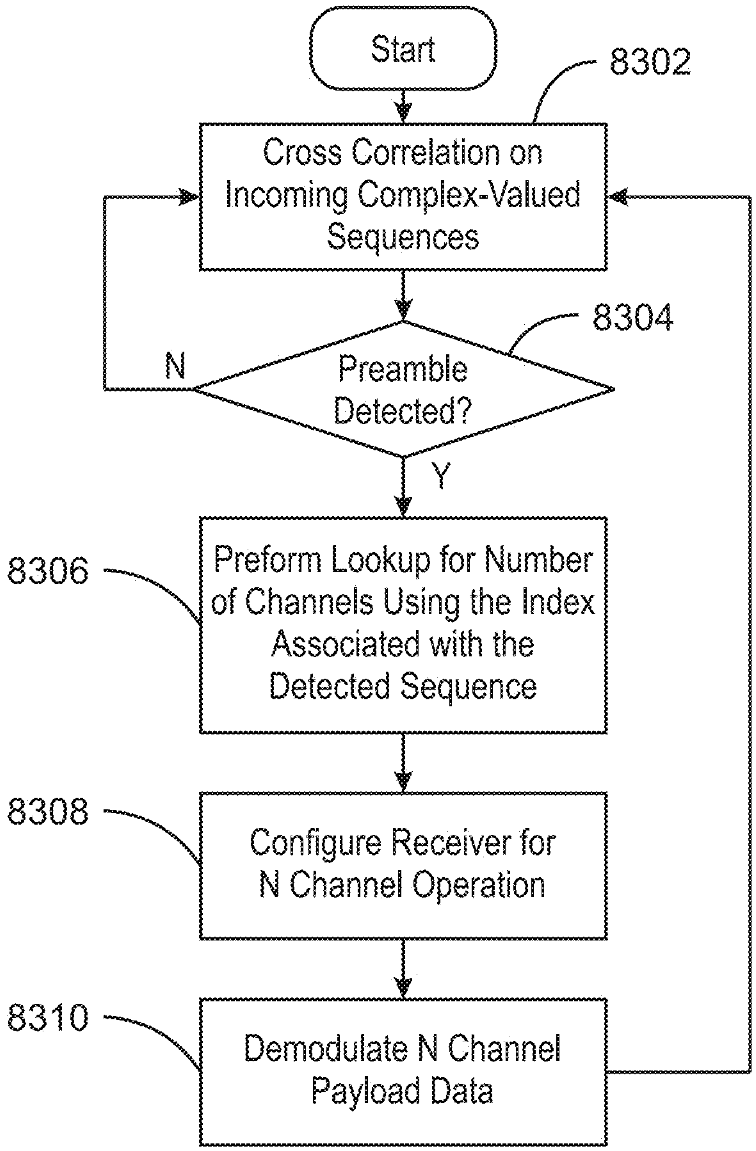
FIG. 83 is a process flow diagram of an example method for receiving data on multiple channels using the ZC shifted sequence in accordance with some embodiments.

FIG. 83 is a process flow diagram of an example method 8300 for receiving data on multiple channels using ZC shifted sequences in accordance with some embodiments. The method 8300 of FIG. 83 may be implemented by the IoT device 8500 described with respect to FIG. 85. The method 8300 starts at block 8302 when the receiving device determines the number of channels that will be used by the sending device. This may be performed by an autocorrelation on incoming complex-valued sequences to detect a preamble. ZC sequences are periodic with period $N_{ZC}$, if $N_{ZC}$ is prime. When $N_{ZC}$ is prime, the discrete Fourier transform (DFT) of a ZC sequence is also a ZC sequence. The autocorrelation of a prime length ZC sequence with a cyclically shifted version of itself is zero. The preamble may also be detected by performing a cross correlation with each of the shifted ZC sequences at the receiving device. If one sequence works, the signal intensity for that sequence will be much higher than the others, as described with respect to FIG. 84.

If, at block 8304, the preamble is detected, the number of channels intended to be used by the client device is determined from the cross correlation of the received ZC preamble against a known set of possible ZC-shifted sequences. The receiver requires a priori knowledge of the ZC sequence length, NZ C and the set of shift values, and may use the following equation:

$$\hat{R} = \left\{ \begin{array}{c} \sum_{n=0}^{N-m-1} x_{n+m} y_n^*, \; m \ge 0, \\ \hat{R}_{yx}^*(m-N), \; m = 1, 2, \ldots, N-1 \end{array} \right\},$$

where x (n) and y(n) are the two sequences being correlated and the correlation output is denoted by $\hat{R}$. The cross correlation between two prime length ZC sequences, for example, of different u values, is constant and equal to:

$$\frac{1}{\sqrt{N_{ZC}}}.$$

The sequence used in the received signal is determined via the correlation results. The zero-autocorrelation ZC sequence properties enable this to be achieved with a high degree of confidence. If no ZC preamble is detected at block 8304, process flow returns to block 8304 to repeat for the next frame.

At block 8306, a reverse mapping is performed to determine the number of channels that corresponds to the detected ZC sequence used in the UL signal. At block 8310, the base station prepares its receive chain to receive and demodulate the combined i channel payload from the client device which immediately follows the ZC-based signaling waveform. At block 8312, the payload data for each of the N channel data is demodulated, for example, using a cross-correlation technique on the payload waveform with a shifted ZC sequence corresponding to a channel.

Figure 84:
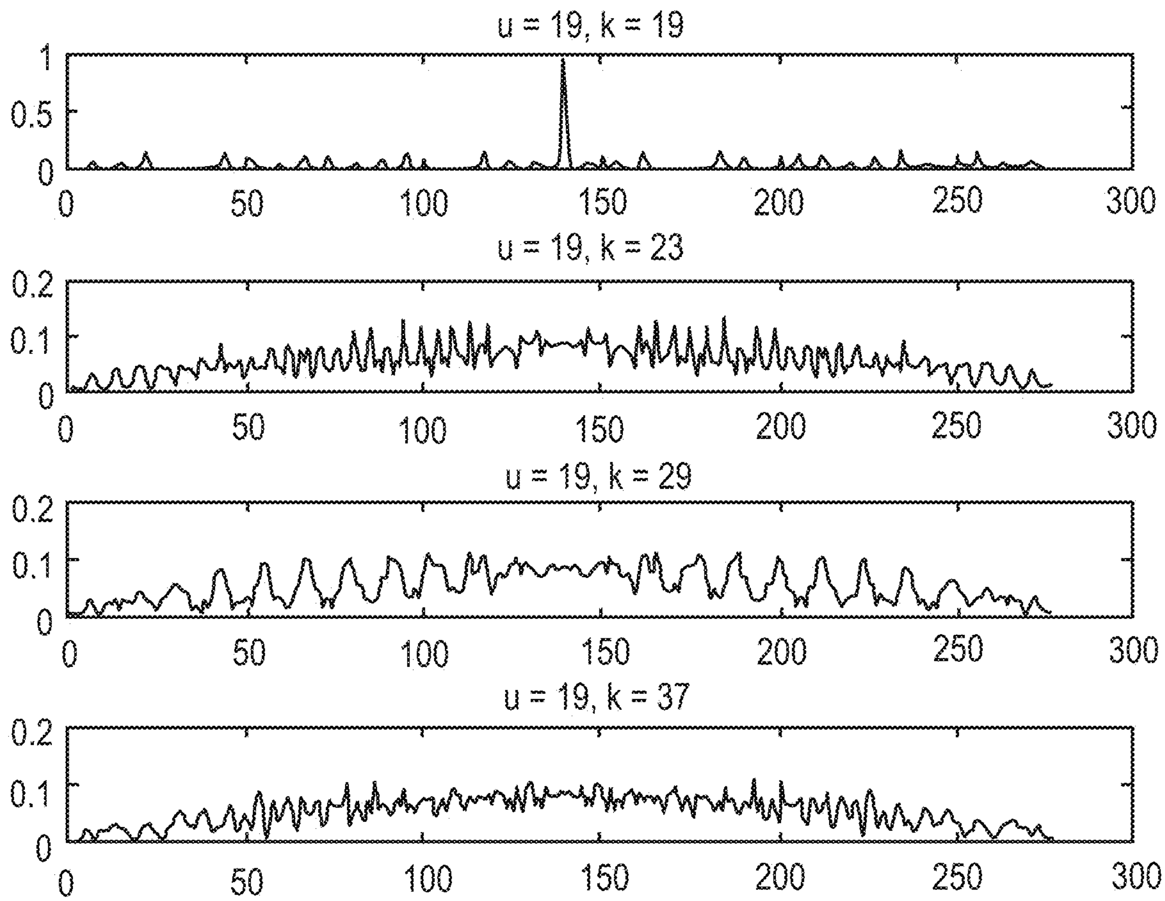
FIG. 84 is a series of plots illustrating the correlation process detailed in in the above equation for each of the sequences given by K in accordance with some embodiments.

FIG. 84 is a series of plots illustrating the correlation process detailed in in the equation for $\hat{R}$ for each of the sequences given by K in accordance with some embodiments. This determines which sequence, $K_C$, has resulted in the largest correlation peak. The first plot shows that the first sequence where u=19, k=19, and where u corresponds to the channel c, has resulted in the largest correlation output. More specifically, the correct sequence, $ZC_d$ is determined by finding the maximum of the following:

$$ZC_d = \max(\max(x_{Kc})),$$

where $x_{Kc}$ is the output of the cross correlation process.

Figure 85:
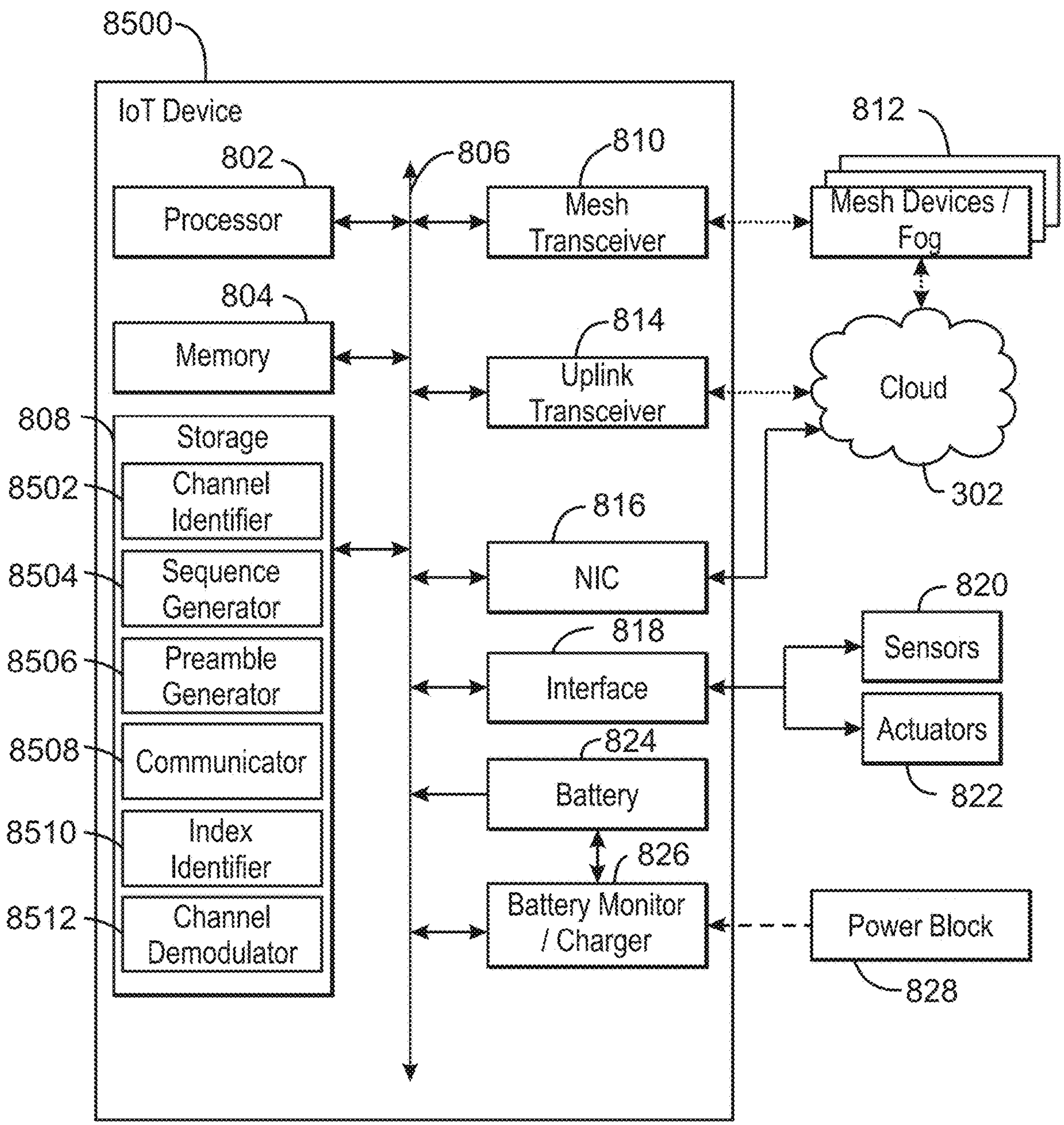
FIG. 85 is a block diagram of an example of components that may be present in an IoT device for using ZC sequences to send data in multiple simultaneous channels in accordance with some embodiments.

FIG. 85 is a block diagram of an example of components that may be present in an IoT device 8500 for using ZC sequences to send data in multiple simultaneous channels in accordance with some embodiments. Like numbered items are as described with respect to FIGS. 3 and 8. It can be noted that different components may be selected and used for the IoT device 8500 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a channel identifier 8502 that determines the maximum number of channels available. A sequence generator 8504 may generate the ZC sequences for each of the channels. A preamble generator may generate the preamble waveform that indicates the number of channels used in the communication. A communicator 8506 may generate a modulated waveform for each of the frames associated with a channel using the ZC sequence associated with that channel. The communicator 8506 may then superimpose the modulated waveforms, prepend the preamble waveform, and pass the resulting waveform to a transmitter, such as the mesh transceiver 810.

In some aspects, the communications are bidirectional. An index identifier 8510 may analyze a waveform received from another device and perform a cross-correlation to determine if a preamble is present. If so, the index identifier may perform a look-up to determine the number of channels in the payload. A channel demodulator 8512 may demodulate the information in each of the channels to recover the original frame sent in that channel.

Figure 86:
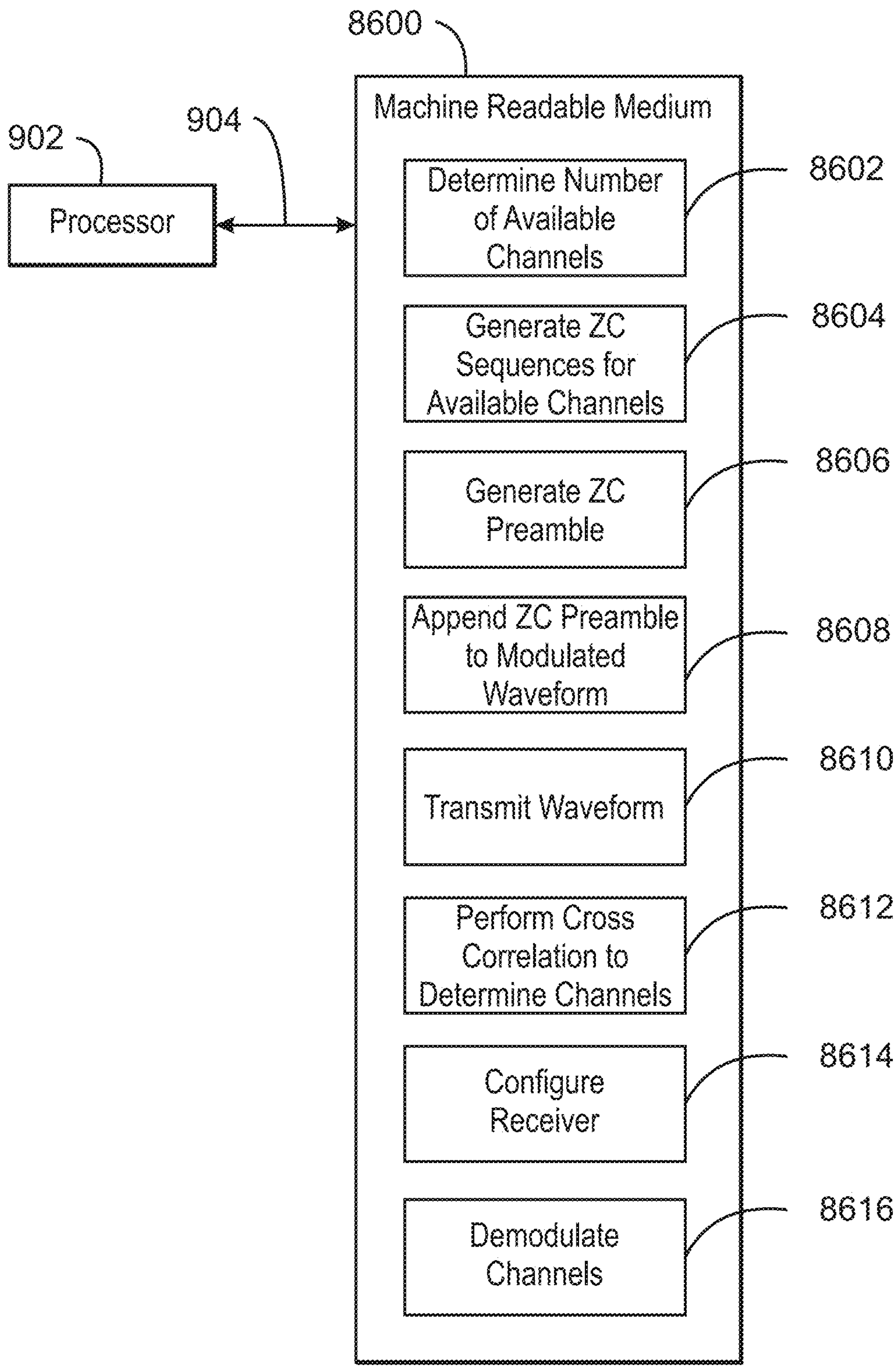
FIG. 86 is a block diagram of a non-transitory, machine readable medium including code to direct a processor to communicate over channels modulate using ZC sequences in accordance with some embodiments.

FIG. 86 is a block diagram of an exemplary non-transitory, machine readable medium 8600 including code to direct a processor 902 to communicate over channels modulate using ZC shifted sequences in accordance with some embodiments. The processor 902 may access the non-transitory, machine readable medium 8600 over a bus 904. The processor 902 and bus 904 may be implemented in a manner similar to the processor 902 and bus 904 described with respect to FIG. 9. The non-transitory, machine readable medium 8600 may include devices described for the mass storage 808 of FIG. 8 or may include optical disks, thumb drives, or any number of other hardware devices.

The non-transitory, machine readable medium 8600 may include code 8602 to direct the processor 902 to determine the number of available channels. Code 8604 may be included to direct the processor 902 to generate ZC sequences for each of the channels. Code 8606 may be included to direct the processor 902 to generate a ZC preamble for a modulated waveform. Code 8608 may be included to direct the processor 902 to prepend the ZC preamble to the modulated waveform. Code 8610 may be included to direct the processor 902 to transmit the ZC preamble and the modulated waveform.

Code 8612 may be included to direct the processor 902 to perform a cross correlation on a received waveform to determine if a ZC preamble is present, and, if so, how many channels are represented. Code 8614 may be included to direct the processor 902 to configure the receiver for the number of channels present. Code 8616 may be included to direct the processor 902 to demodulate the channels to recover the data from each channel.

Figure 87:
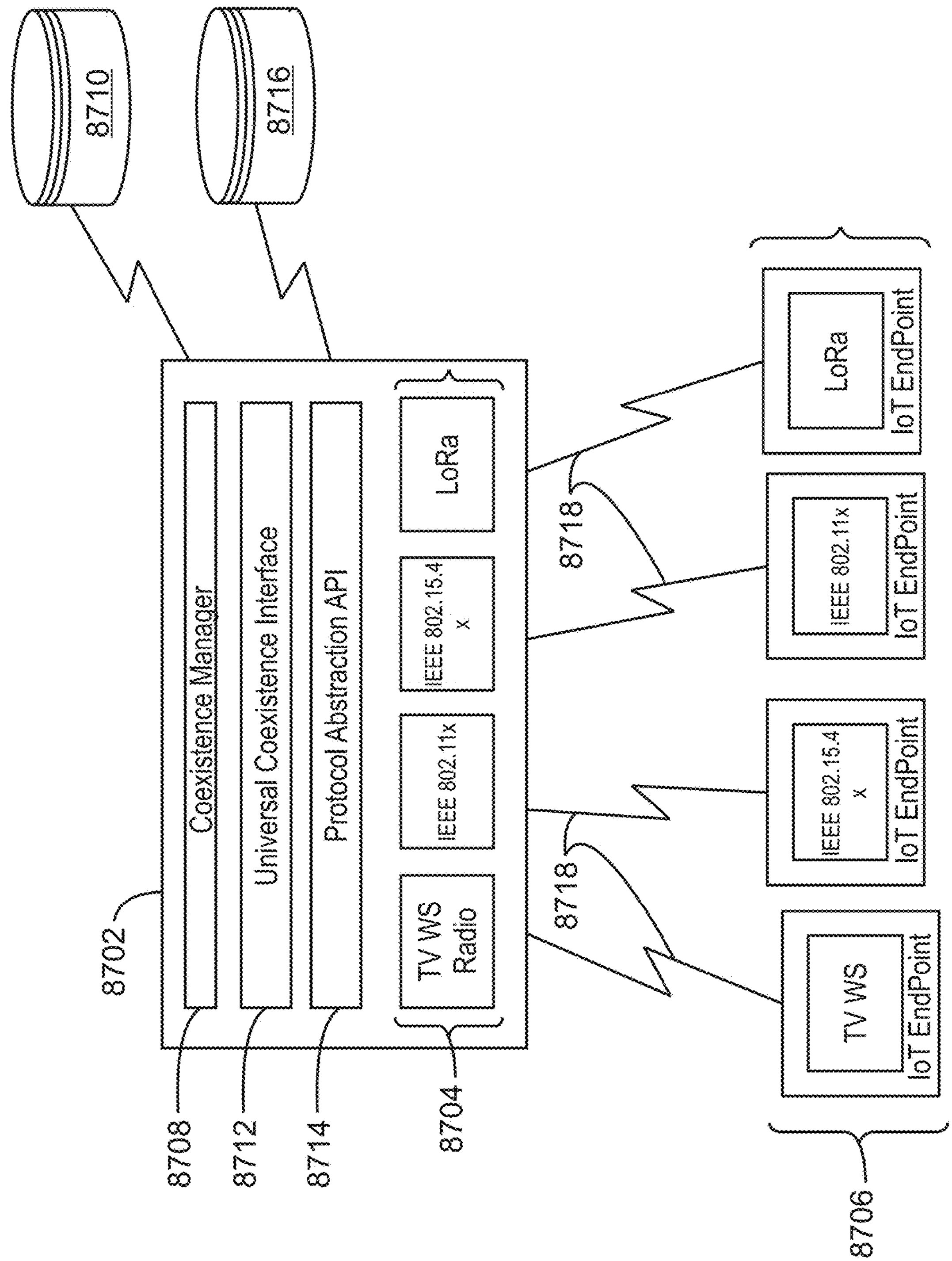
FIG. 87 is a schematic drawing of a multi-radio coexistence system in an IoT device in accordance with some embodiments.

FIG. 87 is a schematic drawing of a multi-radio coexistence system 8700 in an IoT device 8702 in accordance with some embodiments. The IoT device 8702 may be a gateway or coordinator enabling communications with a cloud, or with other IoT devices in a fog device. As described herein, the multi-radio coexistence system 8700 enables communications using multiple radio systems 8704 with radio systems in other nodes 8706 to enable more efficient use of spectrum. This may enable coexistence between different radio technologies as well as primary and secondary users of the frequency spectrum.

One approach is to enable license exempt access by conformance to temporally unused parts of the frequency spectrum using cognitive radios as the secondary user's access system, limited to specific frequency bands. Cognitive radios (CR) may detect which communication channels are in use and move communications to vacant channels while avoiding occupied ones. Devices operating on these frequency bands adhere to a defined set of rules, such as to protect the primary users and coexist with other users.

While CRs cover the use of white space (WS) spectrum, the techniques described herein are directed to the coexistence of radio transceivers using standard, such as radios 8704 conforming to IEEE 802.11x, IEEE 802.15.4, and nonstandard radios such as LoRa. The communication between nodes AL06 may be used to share information on coexistence between radio systems. For example, a coexistence manager 8708 may track the radios 8704 in use for a particular communications and save the information to a channel data store 8710.

In some aspects, a universal coexistence interface 8712 may access the information from the coexistence manager 8708, and identify what communications can be used at what points in time. Radio standards based on IEEE 802.22 and IEEE 802.11af already support methods for coexistence. For example, IEEE 802.22 uses a time based method for coexistence, while IEEE 802.19.1 provides mechanisms for sharing coexistence data only between TV WS frequencies. The universal coexistence interface 8712 may also enable the modification of operating parameters such as coding scheme and modulation, and the transmission power of individual radios.

The communication channels that are selected by the universal coexistence interface 8712 may then be passed to a protocol abstraction API (application programming interface) 8714 to build frames for the particular communications channels. The protocol abstraction API 8714 may access a protocol data store 8716 to obtain the protocols that can be used for the communications channels selected. The frames may then be transmitted to, or received from the other nodes 8706, as indicated by lines 8718.

Figure 88:
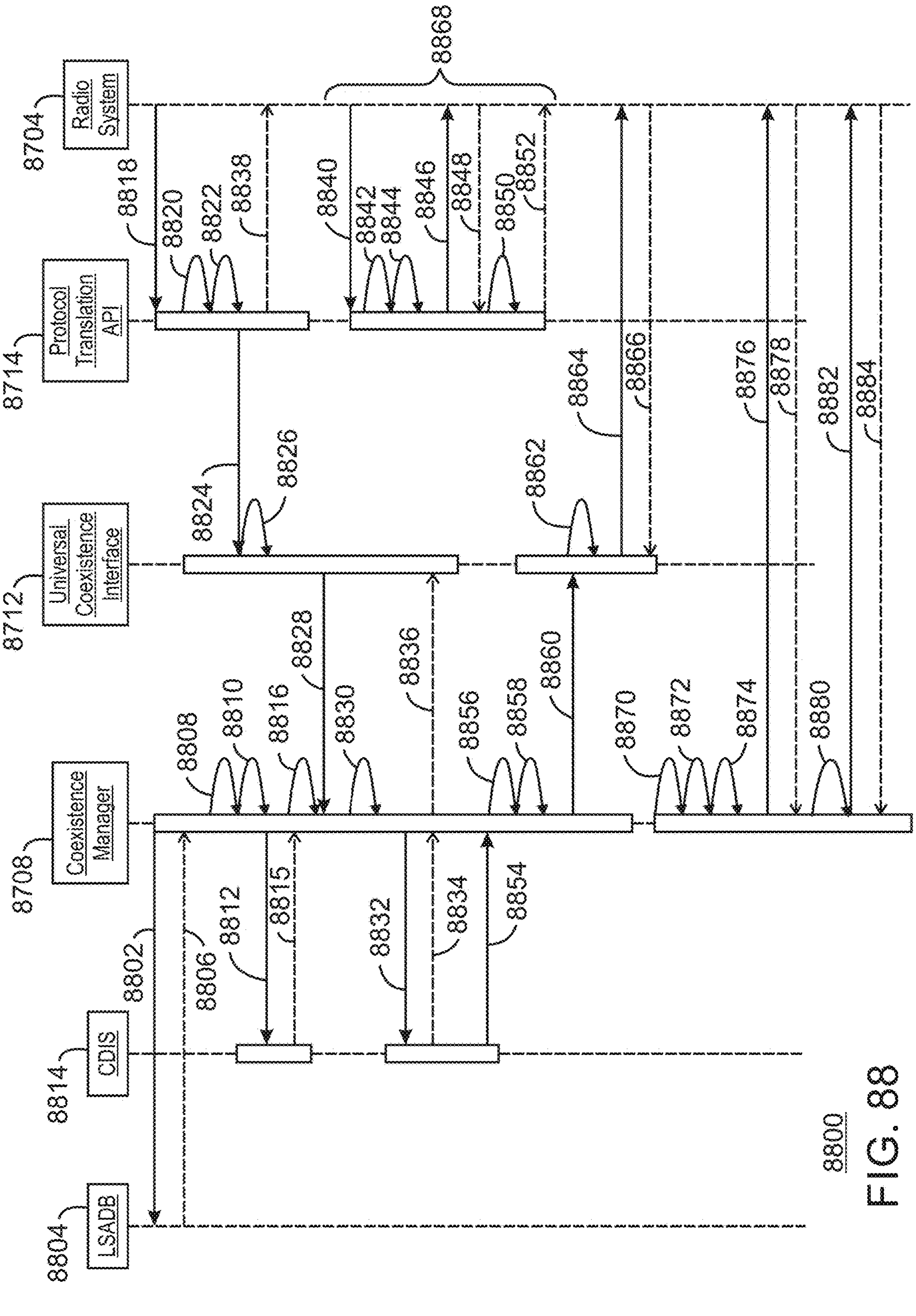
FIG. 88 is a ladder diagram of an example method of control and management of the operation and coexistence of multiple radios in accordance with some embodiments.

FIG. 88 is a ladder diagram of an example method 8800 for control and management of multiple coexisting radios in accordance with some embodiments. The method 8800 of FIG. 88 may be implemented by the IoT device 8702 described with respect to FIGS. 87 and 89. Like numbered items are as described with respect to FIG. 87. In step 8802, a coexistence manager 8708 sends a request 8802 for available bands for communications to a local security authority domain broker (LSADB) 8804. The LSADB 8802 responds with a message 8806 providing the available bands.

The coexistence manager 8708 then calculates 8808 an initial band plan and builds 8810 a neighbor map that includes an identity of one or more neighbors. This information may be saved to the channel data store 8710 described with respect to FIG. 87. The coexistence manager 8708 may then send a request 8812 to a cross-domain information sharing system (CDIS) 8814 to identify the communications channels, or bands, that may be used to communicate with the neighbors. The CDIS 8814 may respond with a message 8815 identifying the communication channels that can be used with a neighbor. This information may be used by the coexistence manager 8708 to determine 8816 an initial coexistence model that identifies both neighbors and associated communications channels. At that point, the coexistence manager 8708 waits for further communications to set up the system.

To complete the initialization, a radio system 8704 can send a message 8818 to the protocol translation API 8714, enumerating the radio types available in the IoT device. The protocol translation API 8714 then verifies 8820 that the standards, such as protocols for frames, among others, used for the radio types present are available, for example, in the protocol data store 8716 described with respect to FIG. 87. If not, the protocol translation API 8714 may download the appropriate standards from the cloud. In step 8822, the protocol translation API 8714 then confirms that the radios are following the standards 8822, and sends a subscription request for the radios to the universal coexistence interface 8712.

In step 8826, the universal coexistence interface 8712 assigns a radio management identification to one or more of the radio types. The universal coexistence interface 8712 then sends a subscription request 8828 to the coexistence manager 8708 that includes the management ID for the radio types.

After receiving the subscription request 8828, the coexistence manager 8708 determines 8830 an active coexistence model, updating or replacing the initial coexistence model. If any of the radio types were not present in the initial coexistence model, for example, due to not being present in the CDIS 8814, the coexistence manager 8708 sends a request 8832 for a subscription for the new radio. The CDIS 8814 responds 8834, for example, with a message indicating that the radio has been registered. The coexistence manager 8708 then sends a notification 8836 to the universal coexistence interface 8712 that the new radio subscription request has been accepted.

Once the protocol translation API 8714 has enumerated the radio types to the universal coexistence interface, it may send a message 8838 to the radio system 8704 to indicate that the function has been completed. The message 8838 may list the radio types enumerated to the universal coexistence interface 8712.

The radio system 8704 may send a message 8840 to the protocol translation API 8714 to restart radio initialization for one or more of the radios. The protocol translation API 8714 may again validate 8842 the standards for the radio types, and determine 8844 if any of the radios are not following the standards. The protocol translation API 8714 may then send a message 8846 to the radio system 8704 to set the configurable parameters for each of the radios. The radio system 8704 may respond with a message 8848 confirming the parameters set for the radios. The protocol translation API 8714 may then create a parameter mapping set for the radios in use and send a message 8852 to the radio system 8704 indicating the enumeration of the radio types is completed, and the communications with the radio system 8704 are initialized.

If the CDIS 8814 detects a coexistence violation, for example, a licensed user is occupying a frequency blocking use by the IoT device, it may send a message 8854 to the coexistence manager 8708 announcing the violation. In step 8856, the coexistence manager 8708 may verify the coexistence violation, for example, by determining if the associated radio is receiving a blocking signal, then set 8858 a flag indicating the violation. It may then send a message 8860 to the universal coexistence interface 8712 to request a reconfiguration of the communication parameters.

The universal coexistence interface 8712 may verify 8862 the radio type for the coexistence violation, and send a message 8864 to the radio system 8704 with a new set of parameters, for example, temporarily disabling a particular radio, shifting to a different frequency, and the like. The radio system 8704 may respond with a message 8866 confirming the change in the radio parameters. The radio system 8704 may then reconfigure the active type list with the protocol translation API 8714, for example, by sending the message 8840 to the protocol translation API 8714 to indicate radio initialization for the radios. The radio system 8704 may then restart the radio initialization sequence 8868 by sending a message 8840 to the protocol translation API 8714. The protocol translation API 8714 may then step through the initialization sequence 8868 through message 8852 to the radio system 8704 to indicate the enumeration of the radio types is completed, and the communications with the radio system 8704 are initialized.

On a recurring basis, the coexistence manager 8708 may perform a good neighbor check 8870 to determine which other nodes are still communicating with the IoT device. If communications have changed, the coexistence manager may determine 8872 a neighbor command list change, and make 8874 a local change in the list of commands. The coexistence manager 8708 may then send a reconfiguration message 8876 to the radio system 8704 with a new set of parameters. The radio system 8704 may respond with a message 8878 confirming acceptance of the parameters. As described herein, the radio system 8704 may then repeat the initialization sequence 8868 with the protocol translation API 8714.

In addition to triggering changes through reoccurring checks by the coexistence manager 8708, other units may request a change in the communication parameters. For example, the coexistence manager 8708 may determine 8880 that a request for a change has been received from a neighbor. The coexistence manager 8708 may then send the reconfiguration request 8882, with the suggested parameters to the radio system 8704. The radio system 8704 may then respond with a message 8884 confirming the parameters were accepted. The radio system 8704 may then repeat the initialization sequence 8868 with the protocol translation API 8714.

Figure 89:
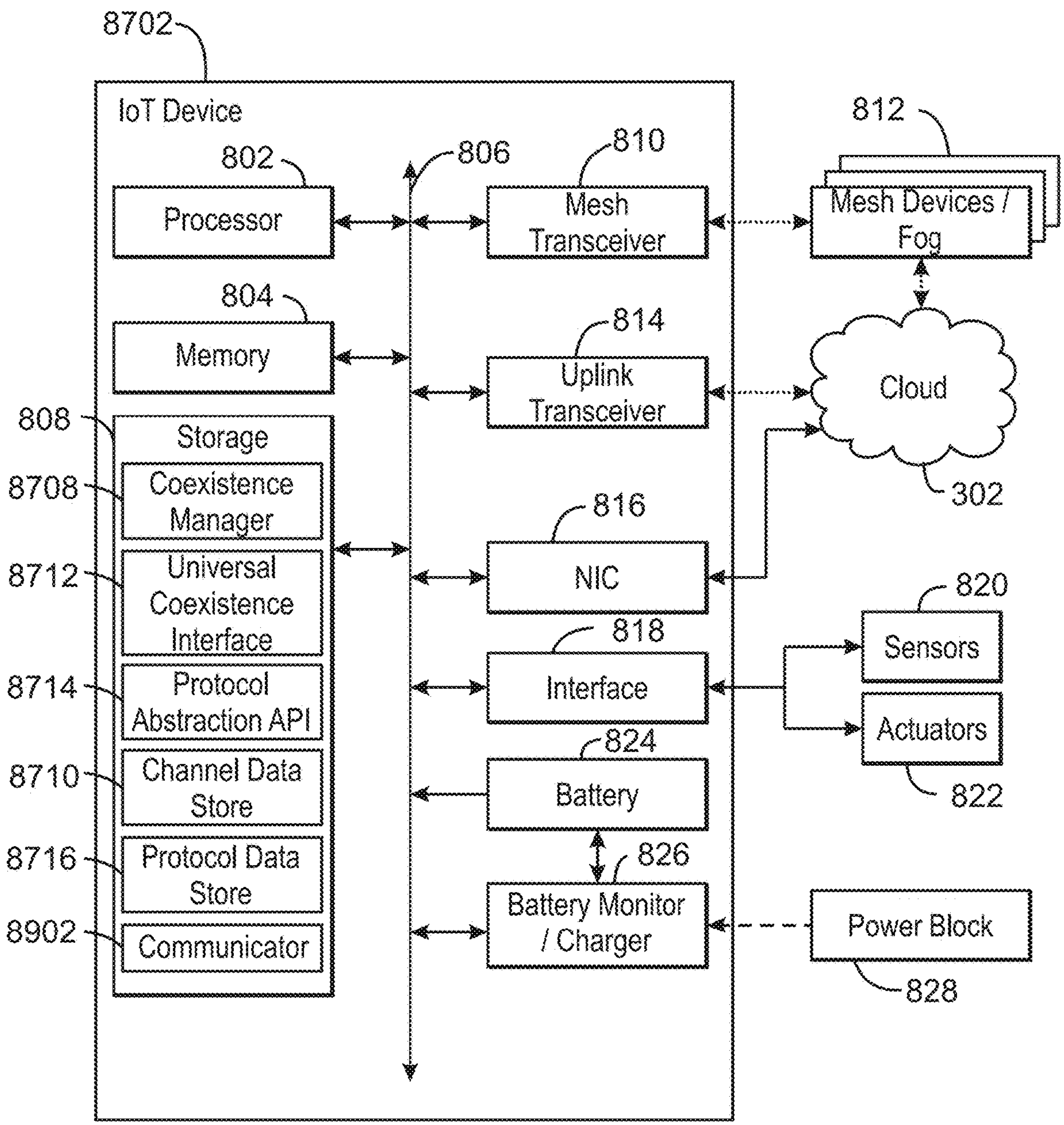
FIG. 89 is a block diagram of an example of components that may be present in an IoT device for using multiple coexisting radios to communicate with other nodes in accordance with some embodiments.

FIG. 89 is a block diagram of an example of components that may be present in an IoT device 8900 for using multiple coexisting radios to communicate with other nodes in accordance with some embodiments. Like numbered items are as described with respect to FIGS. 3, 8, and 87. It can be noted that different components may be selected and used for the IoT device 8900 than for those selected for the IoT device 800 discussed with respect to FIG. 8, and other IoT devices discussed herein. The radio system 8704, described with respect to FIG. 87, may correspond to the radios used for the mesh transceiver 810, the uplink transceiver 814, or both. The other nodes 8706 may include mesh devices 812, devices in the cloud 302, or both.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a coexistence manager 8708 to control the use of multiple coexisting radios. A universal coexistence interface 8712 may interface to the radios, for example, through a protocol translation API 8714. The protocol abstraction API 8714 may track the different communication channels in use, and package data in frames for the particular protocols needed. A channel data store 8710 may hold the active communications plans and radios determined by the coexistence manager. A protocol data store 8716 may store the available protocols for the protocol translation API 8714. A communicator 8902 may transmit the frames from the protocol translation API 8714 to another device using the appropriate radio, for example, in the mesh transceiver 810 or the uplink transceiver 814.

Figure 90:
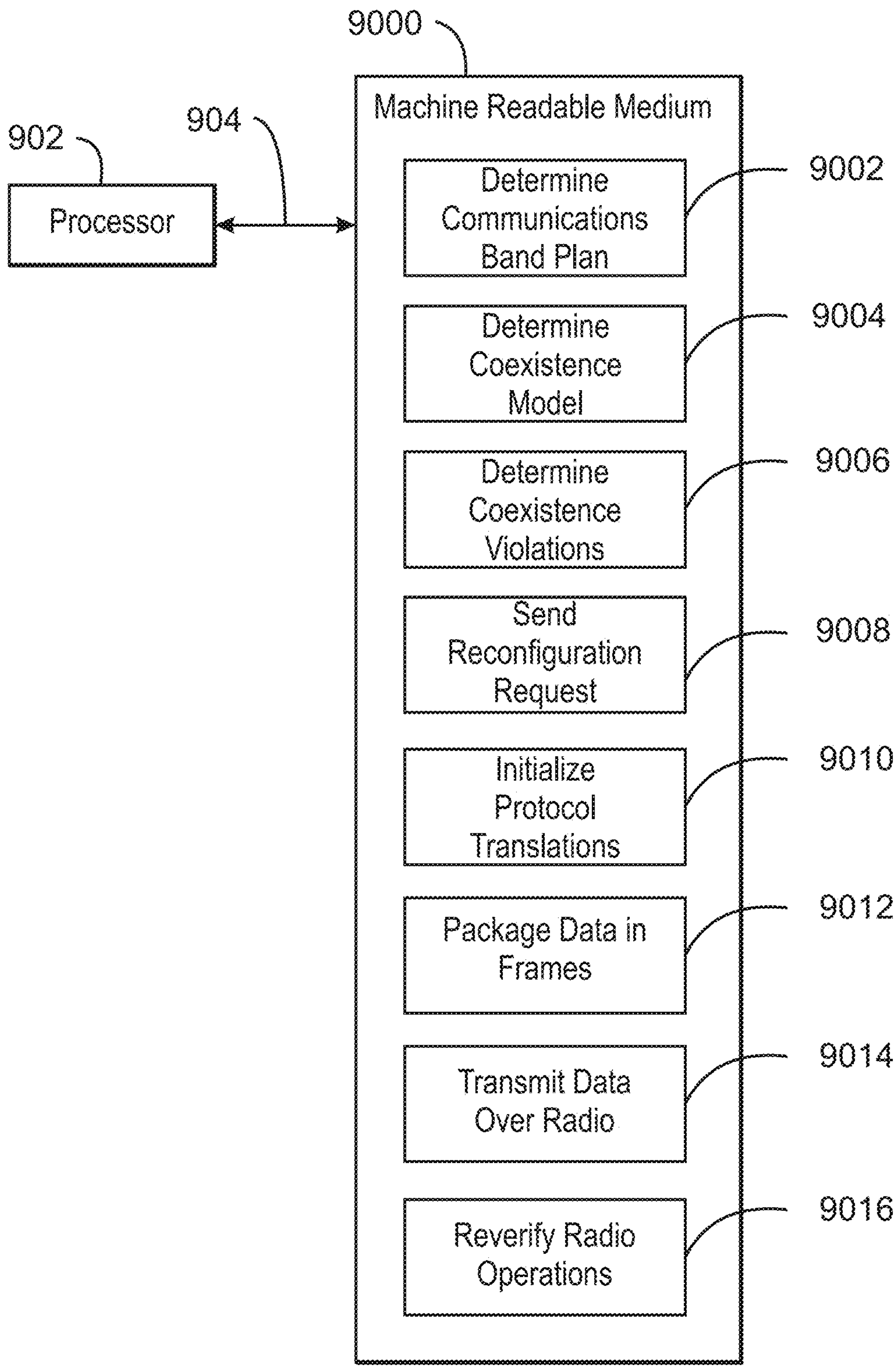
FIG. 90 is a block diagram of a non-transitory, machine readable medium including code to direct a processor to communicate over channels modulate using ZC sequences in accordance with some embodiments.

FIG. 90 is a block diagram of an exemplary non-transitory, machine readable medium 9000 including code to direct a processor 902 to manage multiple coexisting radios in accordance with some embodiments. The processor 902 may access the non-transitory, machine readable medium 9000 over a bus 904. The processor 902 and bus 904 may be implemented in a manner similar to the processor 902 and bus 904 described with respect to FIG. 9. The non-transitory, machine readable medium 9000 may include devices described for the mass storage 808 of FIG. 8 or may include optical disks, thumb drives, or any number of other hardware devices.

The non-transitory, machine readable medium 9000 may include code 9002 to direct the processor 902 to determine an initial band plan and build a neighbor map that includes an identity of the neighbors and the communication channels that can be used with the identified neighbors. The initial band plan may be determined from a list of radios for the device and include what radios are expected to be available, and their associated protocols. The band plan may then be finalized after determining the radios that are actually available. Code 9004 may be included to direct the processor 902 to determine an initial coexistence model that identifies both neighbors and associated bands. The coexistence model may be finalized after the initialization of the radio systems allows the determination of what radios and bands are operational. Code 9006 may be included to direct the processor 902 to determine if a coexistence violation is present, for example, after being informed by an outside unit or by detecting an interfering transmission. Code 9008 may be included to direct the processor 902 to reconfigure communications, for example, if a coexistence violation is detected, if a recurring check of neighboring units indicates that the parameters need adjustment, or upon request from a neighboring unit.

Code 9010 may be included to direct the processor 902 to initialize protocol translations, for example, by a radio system informing a protocol translation API of the communication channels available. Code 9012 may be included to direct the processor 902 to package data into frames for specific communication channels. Code 9014 may be included to direct the processor 902 to transmit the frames over the associated communication channels. Code 9016 may be included to direct the processor 902 to reinitialize a protocol translation function after radio operations have been modified.

Figure 91:
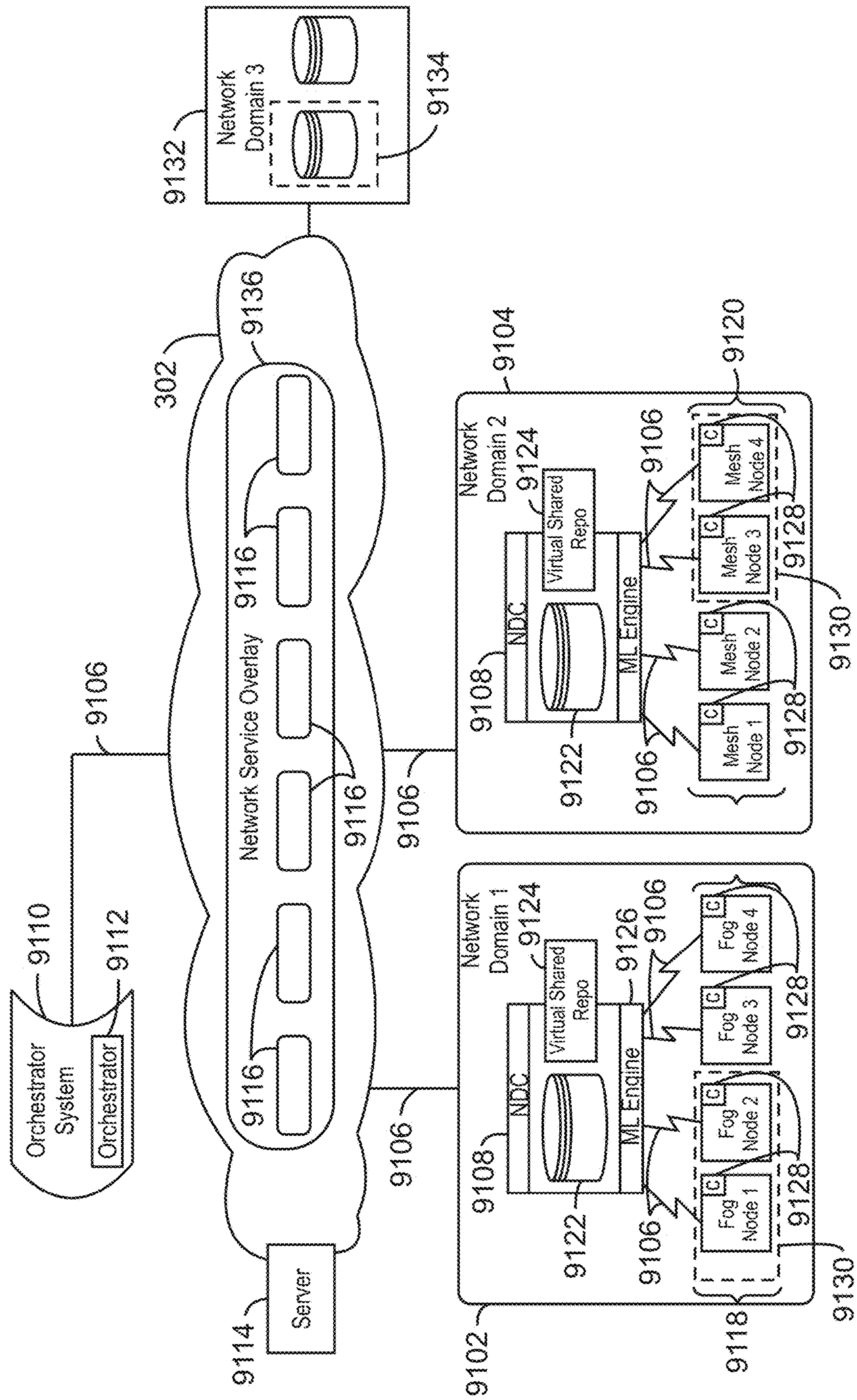
FIG. 91 is a schematic diagram of a service network overlay function across a heterogeneous network in accordance with some embodiments.

FIG. 91 is a schematic diagram of a service network overlay function across a heterogeneous network (HetNet) 9100 in accordance with some embodiments. The technique allows the creation of service chains across heterogeneous networks, which may allow for the automatic provisioning and reconfiguration of IoT devices in a fog or mesh network. For example, IoT devices may be functionally clustered to form a service, such as a temporary virtual or fog device, as described with respect to FIG. 4. In the HetNet, network 9100, domains 9102 and 9104 may include IoT devices that may be grouped together to perform a particular function, such as a traffic control function at an intersection. The devices may be connected to each other, and to the cloud 302, through any numbered of wired and wireless links 9106.

A network domain 9102 or 9104 may include a network domain controller (NDC) 9108, or service coordinator, which runs on a device within the network domain 9102 or 9104. The NDC 9108 may be dynamically moved to a network domain 9102 or 9104 or may be pre-installed on the device prior to deployment. The NDC 9108 may communicate with a higher level orchestrating system 9110. The NDC 9108 may act as a service coordinator, identifying units or components that may participate in the service. It may be noted that other devices may act as the service coordinator, such as endpoint IoT devices, data aggregators, devices in the cloud 302, or devices in other network domains 9102 or 9104.

Service management requests to perform a service, or create a fog device to perform a service, may be passed to the NDC 9108 from an orchestrator 9112. Although shown as part of the higher level orchestrating system 9110, the orchestrator 9112 may be located in another unit in the cloud, such as a gateway interface to the domain 9102 or 9104, a server 9114 acting as a data consumer, or in the NDC 9108.

Management applications in the orchestrator 9112 may include the creation, updating, deletion, and migration of network service overlays 9116. The network service overlays 9116 may function as microprograms, for example, code segments designed to complete a specific task, such as obtaining a temperature from a location, or increasing traffic flow in one direction along a road, among others. Further, the network service overlays 9116 may function at higher levels, including code sequences for a service that include a number of calls to lower level network service overlays 9116.

The orchestrator 9112 may decompose the service, or virtual service network, into network service elements that may be completed by associated network service overlays 9116. An NDC 9108 that is registered with the orchestrator 9116 may submit a provider request to the orchestrator 9112 to provide the resources, such as network service overlays or devices in the other domain 9102 or 9104, to satisfy one or many of the service elements for a service management request.

After the NDC 9108 is acknowledged by the orchestrator 9112 as being a service coordinator, it is responsible for fulfilling the service request, for example, managing the network service elements providing the service. As used herein, a network service element may be a code operated component of a system to provide data for the service. Multiple network service elements may be grouped together to provide a service, which may be a fog device 402, as described with respect to FIG. 4. It can be noted that a network service element may include a node 9118 or 9120, a single sensor from a node 9118 or 9120, a program running on a unit, such as a data aggregator 406, or any number of other physical or virtual devices or systems.

An NDC 9108 in the first domain 9102 may also communicate with an NDC 9108 in the second domain 9104, for example, when a service will include devices from multiple network domains. The NDC 9108 may use a database 9122 to store data and meta-data, such as resources, from nodes 9118 or 9120 registered to a particular domain 9102 or 9104, including attached devices and capabilities. The NDC 9108 may also maintain a shared virtual repository 9124 where it advertises network service elements that need action and stores identities of service components providing network service elements.

The NDC 9108 may use a machine learning (ML) engine 9126 which it uses to select which nodes 9118 or 9120, or combination of nodes 9118 or 9120, will be used to satisfy the requirements of the service. The ML engine 9126 may use simulations, neural networks, statistical analysis, and any number of other techniques to determine which components may complete a network service element.

The NDC 9108 may use a variety of criteria to select which nodes 9118 or 9120, or other devices, will host network service elements. The selection criteria may include latency requirements, specific bandwidth needs, or reliability metrics. The data is stored in the database 9122, and may be based on historic performance data. The NDC 9108 may also act as mediator when multiple end nodes bid to fulfill an advertisement request for the same network service element. The NDC 9108 is responsible for publishing the components or tasks it was assigned by the orchestrator 9112.

A network client 9128 may reside on each device, or node 9118 or 9120, in the network domain 9102 or 9104. It may be registered with the NDC 9108 or other service coordinator to provide information about the node 9118 or 9120 and any connected elements such as sensors, cameras, actuators, and the like. The type of information it provides may include performance and system telemetry information, such as power, performance, and reliability measurements. The network client 9128 also enables control by the NDC 9108, or other service coordinator, to change the operation or configuration of the node 9118 or 9120 to ensure performance criteria are met. For example, an NDC 9108 may modify the duty cycle for collecting data from an attached sensor. The NDC 9108 may also configure the networking and transport settings of the end node 9118 or 9120 communicating within the network domain 9102 or 9104, such as a gateway 310, described with respect to FIGS. 3 and 4. The network client 9118 may subscribe to or poll the shared virtual repository 9124 for any network service elements it can complete.

The virtual shared repository 9124 may include a list of all tasks, for example, network service elements, requiring execution. A node 9118 or 9120 can advertise its ability to perform a task and request the task assignment. The NDC 9108 will perform a lookup of the requesting node 9118 or 9120 to ensure it has not previously violated or failed to execute a function. If the NDC 9108 decides to assign the task to the node 9118 or 9120, it marks the task in the virtual shared repository 9124 as assigned. The virtual shared repository 9124 may be part of the database 9122 or may be a standalone system.

The service and the network service element are not limited to a single node 9118 or 9120, or even a single domain 9102 or 9104. For example, a service may be a fog device 9130 that is assigned nodes 9118 and 9120 in both domains 9102 and 9104. As shown, the fog device 9130 crosses multiple domains 9102 and 9104 and is provided for nodes 9118 and 9120 under the direction of the NDC 9108 in the first domain 9102 and the NDC 9108 in the second domain 9104. A third network domain 9132 may be accessed over the cloud 302 and may include, for example, a database 9134 to provide long term storage of data as a network service element. The components, such as nodes 9118 or 9120 and database 9134, that are located in other domains 9102, 9104, or 9132, may be identified by the orchestrator 9112, and may be incorporated into a shared virtual domain to share resources, as described with respect to FIGS. 110-114.

The network service overlays 9116 may be stored in a shared repository 9136 of tasks and components, that may also include other items requested by the orchestrator 9112, the NDC 9108, or other components. In addition to network service overlays 9116 being pushed to nodes 9118 and 9120 to form a fog device 9130, the nodes 9118 and 9120 may also request, or pull, network service overlays 9116 to complete a task, such as a network service element, for which they need code or other configuration information.

Figure 92:
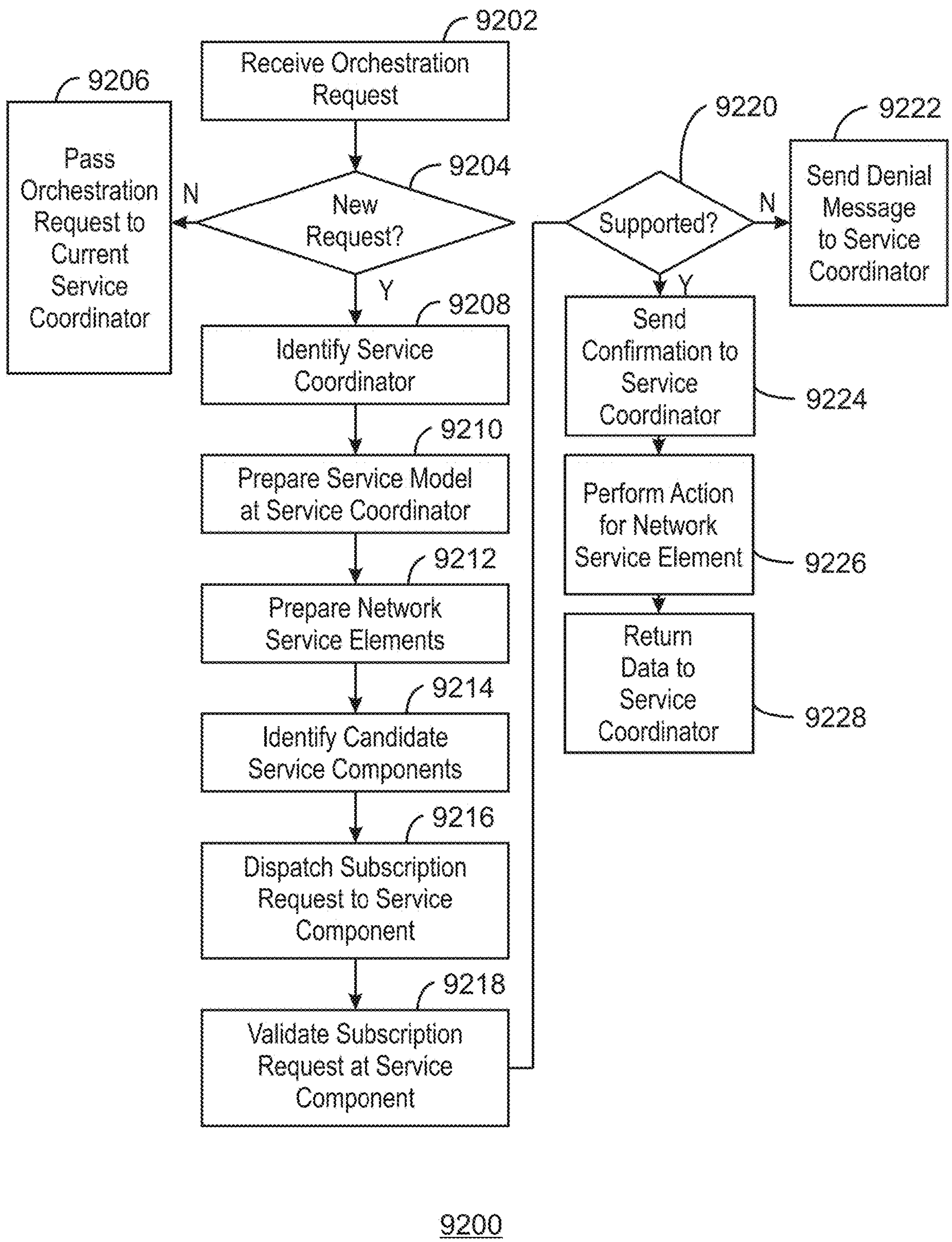
FIG. 92 is a process flow diagram of an example method for handling new requests for a service in accordance with some embodiments.

FIG. 92 is a process flow diagram of an example method 9200 for handling new requests for a service in accordance with some embodiments. The method 9200 of FIG. 90 to may be implemented by the IoT device 9400 described with respect to FIG. 94. The method 9200 starts at block 9202, when an orchestration request is received, for example, at a network domain controller or other service coordinator. At block 9204, a determination is made as to whether the service request is new, for example, to form a new service or fog device. If not, at block 9206, the orchestration request is passed to an existing service coordinator. For example, the service request may be a request for data or information that is currently a purpose of the service or fog device, or it may repurpose the fog device to provide different information. If so, the service coordinator may modify the service by adding or dropping nodes. Further, the service coordinator or service components may request network service overlays to be downloaded to allow completion of network service elements.

If the orchestration request is for a new service, at block 9208, a service coordinator may be identified. The service coordinator may be an NDC located in a domain related to the service request, such as the NDC that services the largest number of nodes that would provide information for the service request.

At block 9210, a service model may be prepared. The service model may be considered as a virtual parts list for a fog device or service to be used to fulfil the service request. The service model may identify what types of network service elements, end nodes, and other service providers are needed for the service. The service model may be constructed at the service coordinator or may be prepared at an orchestrator and downloaded to the service coordinator. At block 9212, the service coordinator may prepare the network service elements. These may be the portions of the service that identify the specific data requests, actions, and the like. The network service elements may already be present in a data store on the service coordinator, or may be network service overlays that are pulled from another store, such as in the cloud.

At block 9214, the service coordinator may identify candidate service components, such as individual endpoint nodes, data sources, code, and the like, that are capable of providing specific network service elements. The individual endpoint nodes may be IoT devices that have registered their identity and capability with the NDC, as described with respect to FIG. 93. At block 9216, the service coordinator may dispatch subscription requests for network service elements to the service components that have been identified.

At block 9218, the service component may validate the subscription request. This may be performed by comparing the service request to the sensors and other devices present and operational in the service component to ensure that the service component is capable of performing the network service element in the service request. At block 9220, a determination is made as to whether the service request is supported. If not, at block 9222, a denial message is sent to the service coordinator. The service coordinator may then remove the service component from the list of devices capable of fulfilling that network service element and look for another device capable of providing the network service element.

If the service component is capable of fulfilling the service request by providing the data or actions for the network service element, at block 9224, it may send a confirmation message to the service coordinator, which may add it to the list of devices. As described herein, a block chain transaction may be used to record the service component in a transaction, and a group identification may be issued to allow the service component to communicate as part of the group. The service component may have a network service overlay to implement the network service element in a local store, or may download the network service overlay from the service coordinator, or from a store in the cloud.

At block 9226, the service component may perform the action for the network service element. This may be the collection of data from a sensor, such as temperature, wind speed, precipitation, and the like, associated with the service component. In some examples, the network service element may be completed by the service component performing an action, such as turning a light on or off, activating a compressor to lower a temperature, and the like.

At block 9228, the service component returns data or an acknowledgement to the service coordinator. This may be the data associated with a sensor reading, or confirmation that an action has been taken.

Figure 93:
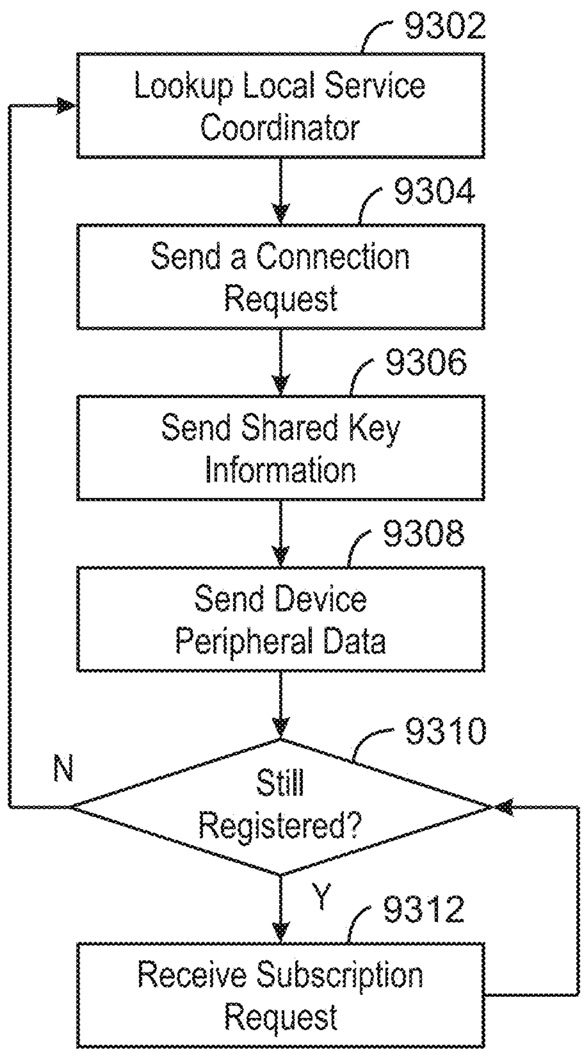
FIG. 93 is a process flow diagram of an example method for registering an endpoint, or service component, with an network domain controller (NDC), or other service coordinator in accordance with some embodiments.

FIG. 93 is a process flow diagram of an example method 9300 for registering an endpoint, or service component, with an NDC, or other service coordinator in accordance with some embodiments. The method 9300 of FIG. 93 to may be implemented by the IoT device 9400 described with respect to FIG. 94. The block 9302 represents, for example, when a service component, such as an IoT device or endpoint node, looks up a local service coordinator. This may be an NDC operating in the network domain that includes the service component. At block 9304, the service component sends a connection request to the service coordinator. Upon receiving an acknowledgement from the service coordinator, at block 9306, the service component may send a shared key, or other identifying information, such as a blockchain generated key, to the service coordinator. Upon receiving a confirmation that the service component is registered to the local service coordinator, at block 9308, the service component may send the service coordinator the device peripheral data, such as attached sensors, actuators, and the like. At block 9310, a determination is made as to whether the service component is still registered. If not, process flow may return to block 9302 to reregister the device. At block 9312, a subscription request may be received by the service component. Once the service component has acted on the subscription, it may return to block 9312 to determine if the device is still registered. If the service component is no longer registered, process flow may return to 9302 to repeat the process.

Figure 94:
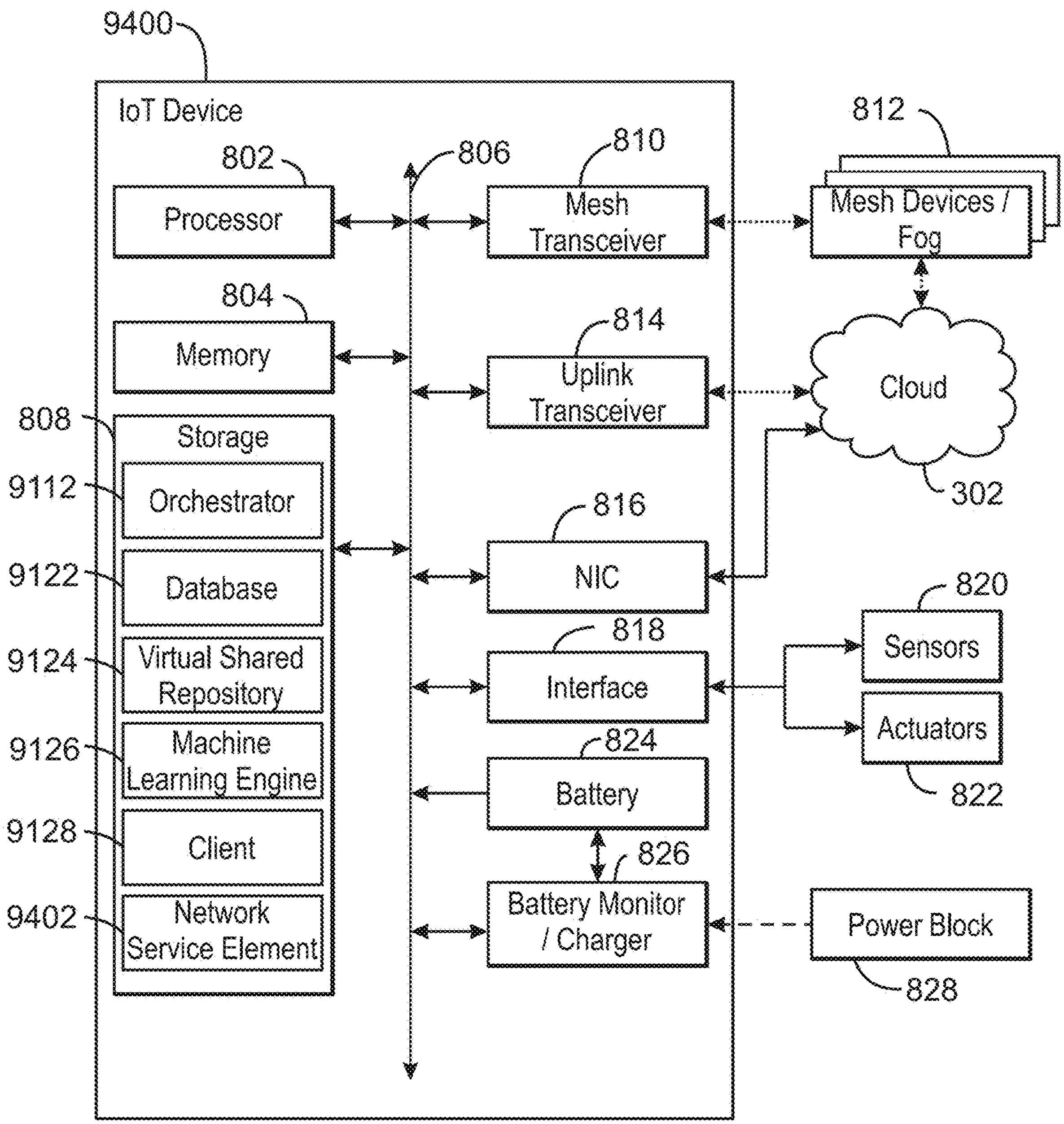
FIG. 94 is a block diagram of an example of components that may be present in an IoT device for coordinating or fulfilling service requests in accordance with some embodiments.

FIG. 94 is a block diagram of an example of components that may be present in an IoT device 9400 for coordinating or fulfilling service requests in accordance with some embodiments. Like numbered items are as described with respect to FIGS. 3, 8, and 91. It can be noted that different components may be selected and used for the IoT device 9400 than for those selected for the IoT device 800 discussed with respect to FIG. 8, and other IoT devices discussed herein. The IoT device 9400 may be an orchestrator, an NDC, an endpoint node, or function as a combination of these systems.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include an orchestrator 9112 to submit service requests to other units, such as service coordinators. A database 9122 may store data, meta-data, and resources from nodes registered to a particular domain, including attached devices and capabilities. A virtual shared repository 9124 may be used to advertise network service elements that need action and store identities of service components providing network service elements. A machine learning engine 9126 may be used to select which service components, such as mesh devices 812 or devices in the cloud 302, may be used to satisfy the requirements of the service. A client 9128 may register with the service coordinator and provide information on connected devices and capabilities. The client 9128 may advertise the availability of the IoT device 9500 to fulfill a network service element 9402. The client 9128 may respond to a service request with a confirmation that the IoT device 9400 can complete the actions for the network service element 9402, or send a denial informing the service coordinator that it cannot complete the actions. The client 9128 may access the service coordinator to obtain any network service overlays needed to complete the network service element 9402 or may directly access a store in the cloud 302 to download the needed network service overlays.

Figure 95:
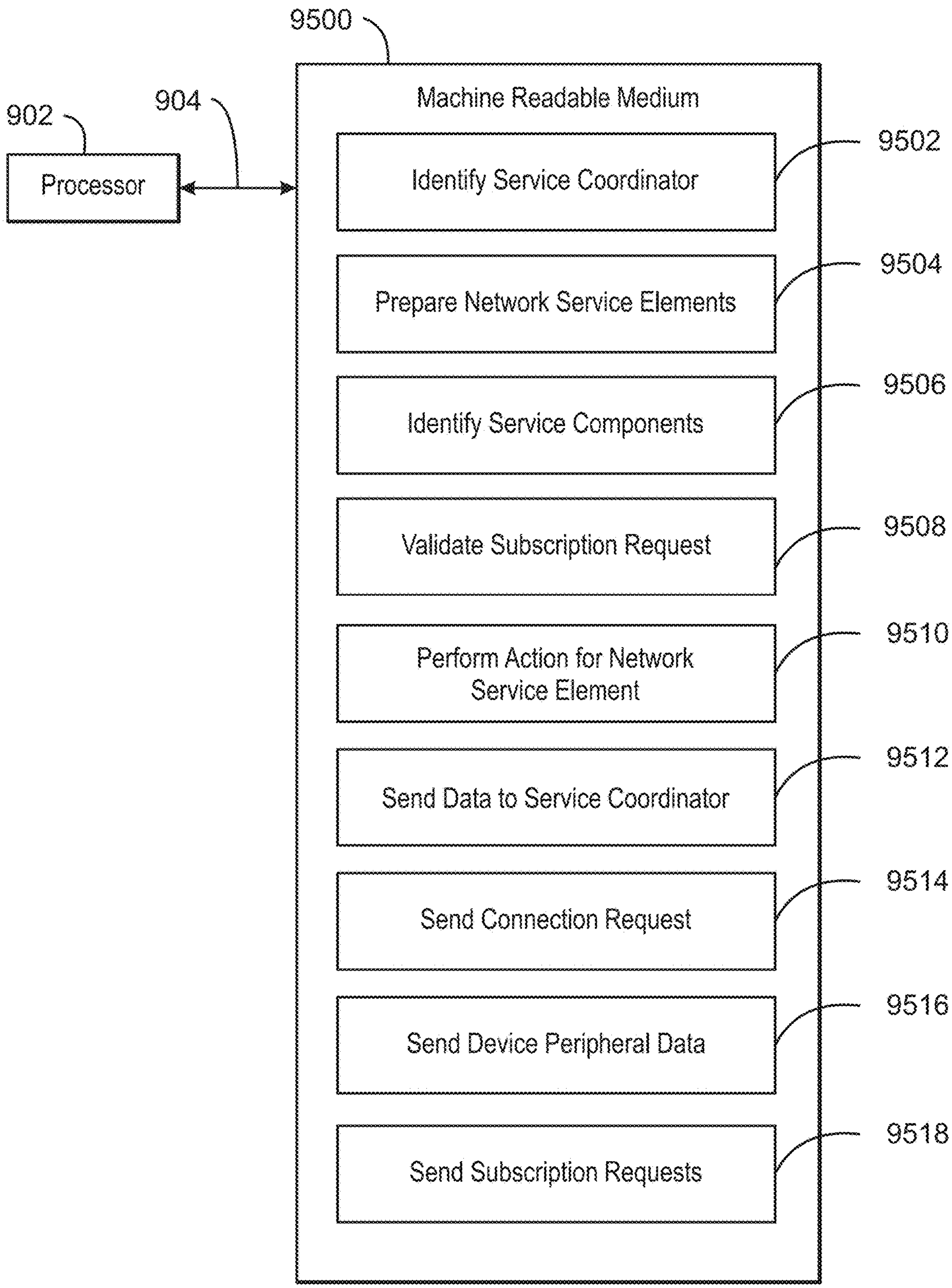
FIG. 95 is a block diagram of a non-transitory, machine readable medium including code to direct a processor, or processors, to coordinate or fulfill service requests in accordance with some embodiments.

FIG. 95 is a block diagram of an exemplary non-transitory, machine readable medium 9500 including code to direct a processor 902, or processors, to coordinate or fulfill service requests in accordance with some embodiments. Like numbered items are as described with respect to FIG. 9. The processor 902 may access the non-transitory, machine readable medium 9500 over a bus 904. The non-transitory, machine readable medium 9500 may include devices described for the mass storage 808 of FIG. 8 or may include optical disks, thumb drives, or any number of other hardware devices.

The non-transitory, machine readable medium 9500 may include code 9502 to direct the processor 902 to identify a service coordinator, such as a network domain controller in the local domain. Code 9504 may be included to direct the processor 902 to prepare the network service elements for a service request. Code 9506 may be included to direct the processor 902 to identify candidate service components that are capable of providing specific network service elements. Code 9508 may be included to direct the processor 902 to validate a subscription request. Code 9510 may be included to direct the processor 902 to perform the action for a network service element. Code 9512 may be included to direct the processor 902 to return data or an acknowledgement to a service coordinator. Code 9514 may be included to direct the processor 902 to send a connection request to the service coordinator. Code 9516 may be included to direct the processor 902 to send the service coordinator the device peripheral data, such as attached sensors, actuators, and the like. Code 9518 may be included to direct the processor 902 to send subscription requests to other units. It can be noted of these units may be present in every device. For example, an end point node may not function as a service coordinator or orchestrator, and, in that example, would not include code blocks 9502, 9504, 9506, and 9518 that perform those functions.

Mesh networks are useful in environments where an actor may want access to data with very low latency or when the data might be tightly coupled in a temporal spatial fashion. Using the example of a traffic intersection, as discussed with respect to FIG. 4, data exchange at the intersections may occur at very high volume, velocity, and variety between road users such as vehicles, pedestrians, cyclists, and traffic lights or other roadside units. The environment of the intersection may be particularly challenging with fast moving vehicular traffic, minimal fixed infrastructure, and signal propagation conditions that may be difficult.

One approach to improving performance and improve latency is to perform network data storage and content delivery at the very edge of the network. This may include caching data requiring very fast access in devices capable of holding the data and are close to applications needing the data.

An intersection may use a number of applications for traffic control and other purposes. The applications may include collision prevention systems, emergency services, modification of operations based on environmental data, retail and advertising services, among others. A good deal of that data is temporally and spatially dependent. For example, a traffic jam the data is tightly coupled to the location and the time. Moreover, the data is often intended to be consumed by proximate groups, such as traffic control systems, vehicles, cyclists, pedestrians, police, emergency services, and the like.

Due to IP address determination, framing, handshaking, and other communications requirements, IP based technologies may perform poorly in environments in which contact time between devices may be very low. Data semantics, and other technologies described herein, may provide a means to simplify accessing and using data. The technologies may enable users of data to access the data from devices in close proximity. Vehicles may also act as mules to move data, for example, between different intersections and systems. One technique that may be used for these types of communication is the use of distributed hash tables to describe, store, and publish data in a network.

Figure 96:
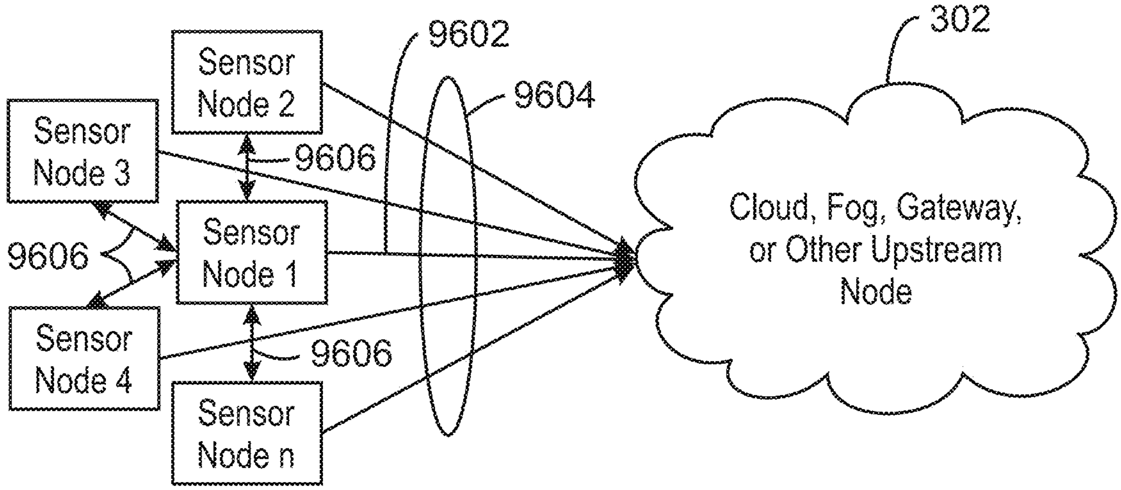
FIG. 96 is a schematic diagram of the ad-hoc formation of a reverse distributed hash table (DHT) network for IoT services in accordance with some embodiments.

FIG. 96 is a schematic diagram 9600 of the ad-hoc formation of a reverse distributed hash table (DHT) network for IoT services in accordance with some embodiments. The IoT services may include the sending or storage of data. DHT networks may be formed by the generation of a unique hash to describe, or publish a file within a network as fragments sent to various nodes. Nodes that have received fragments of the file become the source of new copies of the file. Nodes wishing to access that file download file fragments from other nodes until they have the complete file. As nodes begin to receive fragments of the file, then can share, or seed, those fragments onto other nodes that wish to acquire the file. This creates an ad-hoc network with no central control which is capable of distributing many copies of a file throughout the peers in a network and enabling new peers to acquire the files quickly as they download fragments from many sources, instead of one source.

In some aspects, a reverse version of this may also be applied to data transmission to lower the probability of data loss during events. In this example, a sensor node, such as node 1 in the diagram, detects an event storm which is generating a high volume of data. The event storm may correspond to an emergency event, a high traffic flow in an intersection, an increased period of data collection, and the like. Node 1 proceeds to send the data to the cloud 302, or to a fog node, a gateway or some other upstream data sink over a first communication channel 9602. However, the first communication channel 9602 has limited network bandwidth and quickly becomes congested, forcing a backlog of messages to queue up on node 1. The queue may take a significant period of time to be cleared, delaying messages to the destination, or even causing the loss of data if the queue overflows.

However, in the techniques used for a reverse DHT network, node 1 may use the network capacity of its neighboring nodes to send the excess message load to the same end destination. Node 1 may discover the neighboring nodes 1 . . . n, for example, over uncongested network links 9606. Various techniques may be used for the peer discovery, including mesh networking protocols, such as the specifications from the Openfog consortium, the Alljoyn specification, and others including various open source ad-hoc networking protocols. Further, the IP protocols for IPv6 include native support for peer discovery, as do other networking protocols.

The uncongested network links 9606 may include any number of network links, such as Wi-Fi, or Bluetooth, among others. In some example, as described with respect to FIG. 3, the nodes may be coupled by a wired network, while each individual node may also have a wireless link to a gateway. Physically proximate nodes may have higher bandwidth connections than remote ones, thus, a congested node can send file fragments to surrounding peers and have them route the messages to their destination.

The data sink, in this example, located in the cloud 302 may acknowledge the received messages to the node which sent it, for example, if node 2 sends a portion of the data to the data sink, the data sink may acknowledge receipt to node 2. Node 2 would then acknowledge the receipt of the data by the data sink to node 1, the data source. Once node 1 receives an acknowledgement message (ACK) from any source, such as node 2 or other peers, on the delivery of a particular message, it may consider the message delivered and remove it from the queue.

The rate at which the ACKs are received back by the data source may allow flow control. For example, if node 2 is sending an acknowledgement every second and node 3 is sending an acknowledgement every two seconds, it would indicate that node 2 is able to handle a higher message load, and thus node 1 would adjust its operation to send more messages to node 2 than to node 3.

The source sensor node, or node 1 in the example, may track the message flow and implement mechanisms to allow for peers failing to deliver a message. For example, if a peer node, such as node 4, does not return an ACK for a message it is sent, the source node may stop routing messages to it for a configurable period of time. Further, any messages sent to node 4 may be considered lost and may be resent through other peers or directly from the sensor node to the device in the cloud 302.

Figure 97:
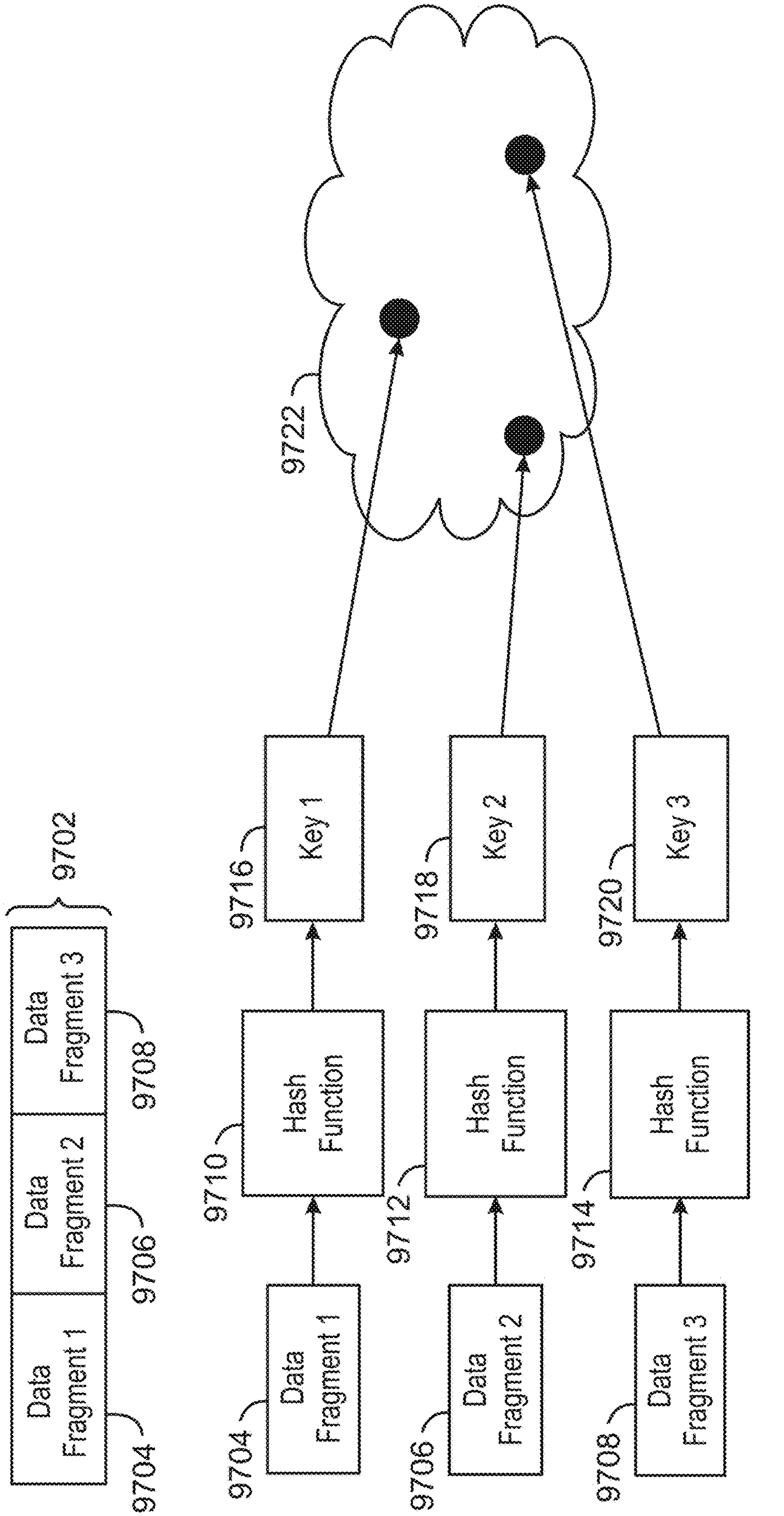
FIG. 97 is a schematic diagram of a process for tracking which nodes may be used for storing or transmitting file data in accordance with some embodiments.

FIG. 97 is a schematic diagram 9700 of a process for tracking which nodes may be used for storing or transmitting file data 9702 in accordance with some embodiments. The file data 9702 may be broken into fragments 9704-9708. A hash function 9710-9714 may be performed on each of the fragments 9704-9708 to generate a key 9716-9720. The key 9716-9612 may then be used to determine which node should be used to store or send a data fragment in a dispersed mesh 9722 of nodes.

Figure 98:
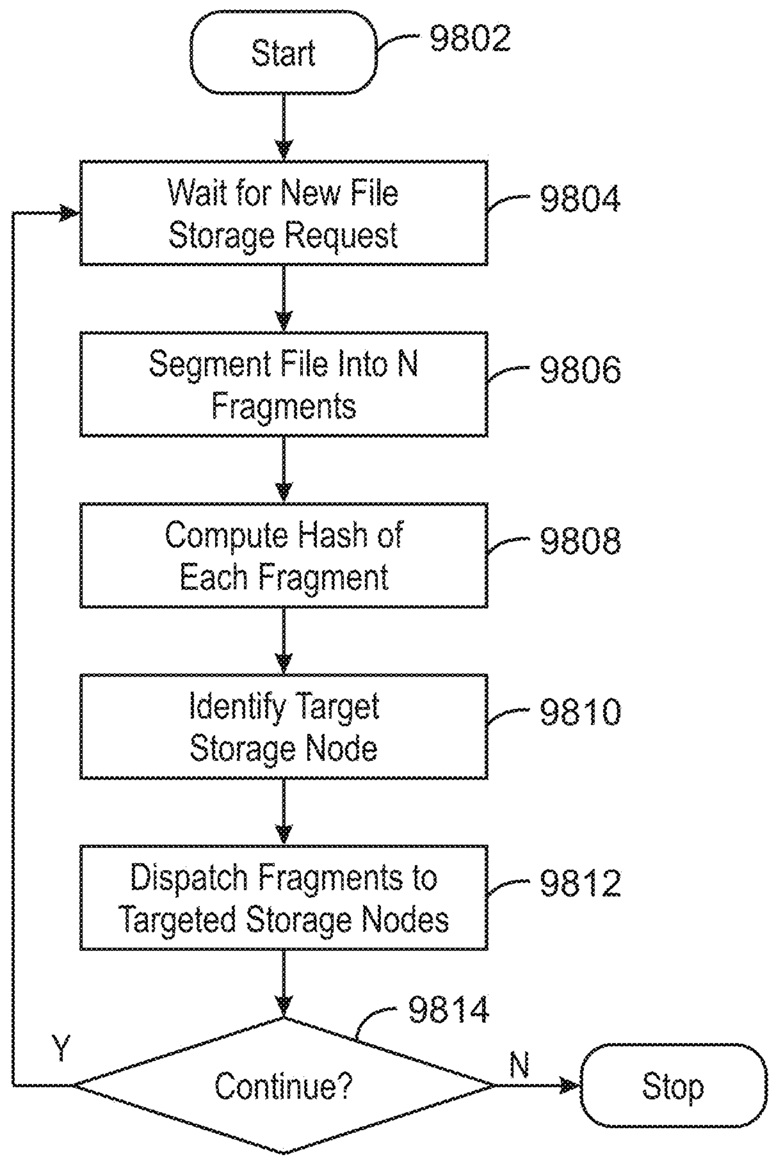
FIG. 98 is a process flow diagram of an example method for targeting storage or sending nodes in accordance with some embodiments.

FIG. 98 is a process flow diagram of an example method 9800 for targeting storage or sending nodes in accordance with some embodiments. The method 9800 of FIG. 90 to may be implemented by the IoT device 10000 described with respect to FIG. 100. The block 9802 represents, for example, when a node generates a file for storage or transmission. At block 9804, a new file storage or transmission request is generated for the file. At block 9806, the file is fragmented into N fragments, depending, for example, on the payload size of packets or frames used to transmit the data. At block 9808, a hash may be computed for each fragment.

At block 9810, the target storage or transmission node for each fragment may be identified. This may be performed by extracting the first M bytes from the hash code of the fragment, where the number, M, may be determined by the length of node IDs used in the mesh network. The bytes from the hash may then be used to determine a target node by identifying the target node as a closest match between the first M bytes of the node ID and first M bytes of the file fragment hash. The node ID may then form a part of the file address table. Knowing the node ID, a determination may be made as to the range of file fragments that it is responsible for saving or transmitting. For nodes with closely matching IDs, the technique may build in redundancy in cases where node availability is not guaranteed, such as in volatile network environments. At block 9812, the fragment is sent to the target storage or transmission node, packaged in a packet or frame.

At block 9814, a determination is made as to whether to continue the process. The process may end when the data storage is finished, or may wait until ACKs are received for all fragments being sent by other nodes.

Figure 99:
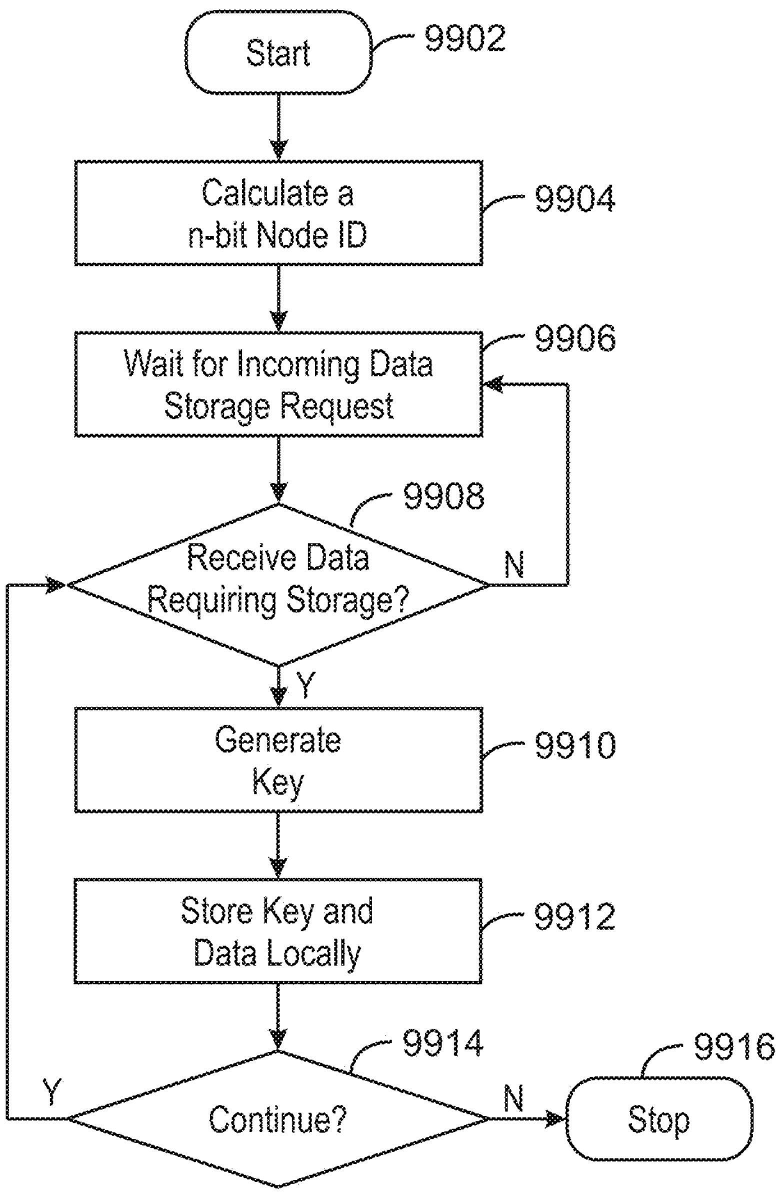
FIG. 99 is a process flow diagram of an example method for storing or transmitting data using a distributed hash table (DHT) in accordance with some embodiments.

FIG. 99 is a process flow diagram of an example method 9900 for storing or transmitting data using a distributed hash table (DHT) in accordance with some embodiments. The method 9900 of FIG. 99 to may be implemented by the IoT device 10002 described with respect to FIG. 100. The block 9902 represents, for example, when device is powered and joins an ad-hoc network. At block 9904, a node ID of n-bits in length is calculated or obtained. This may be an ID assigned from a blockchain, as described herein, an ID assigned by a manufacturer, or an ID calculated from a random number generator, among others.

At block 9906, a wait period for an incoming storage or transmission request is implemented. Once the wait period is completed, at block 9908 a determination is made as to whether data has been received for storage or transmission. If not, process flow returns to block 9906 for another wait period.

If data has been received at block 9908, at block 9910, a key is generated for the data received. This may be performed by calculating a hash function for the data received.

At block 9912, the key and the data are stored locally or transmitted. This may be performed by storing or transmitting the data in the node, then prepending the node ID to the key. The resulting key may be stored in a local store, for example, in a list, a table, a queue, or a database, among other data structures.

At block 9914, a determination is made as to whether to continue the process. This may be based on a determination as to whether more data is expected for the current sequence. If so, process flow returns to block 9908 to determine if data has been received for storage or transmission. If not, the process ends at block 9916.

Figure 100:
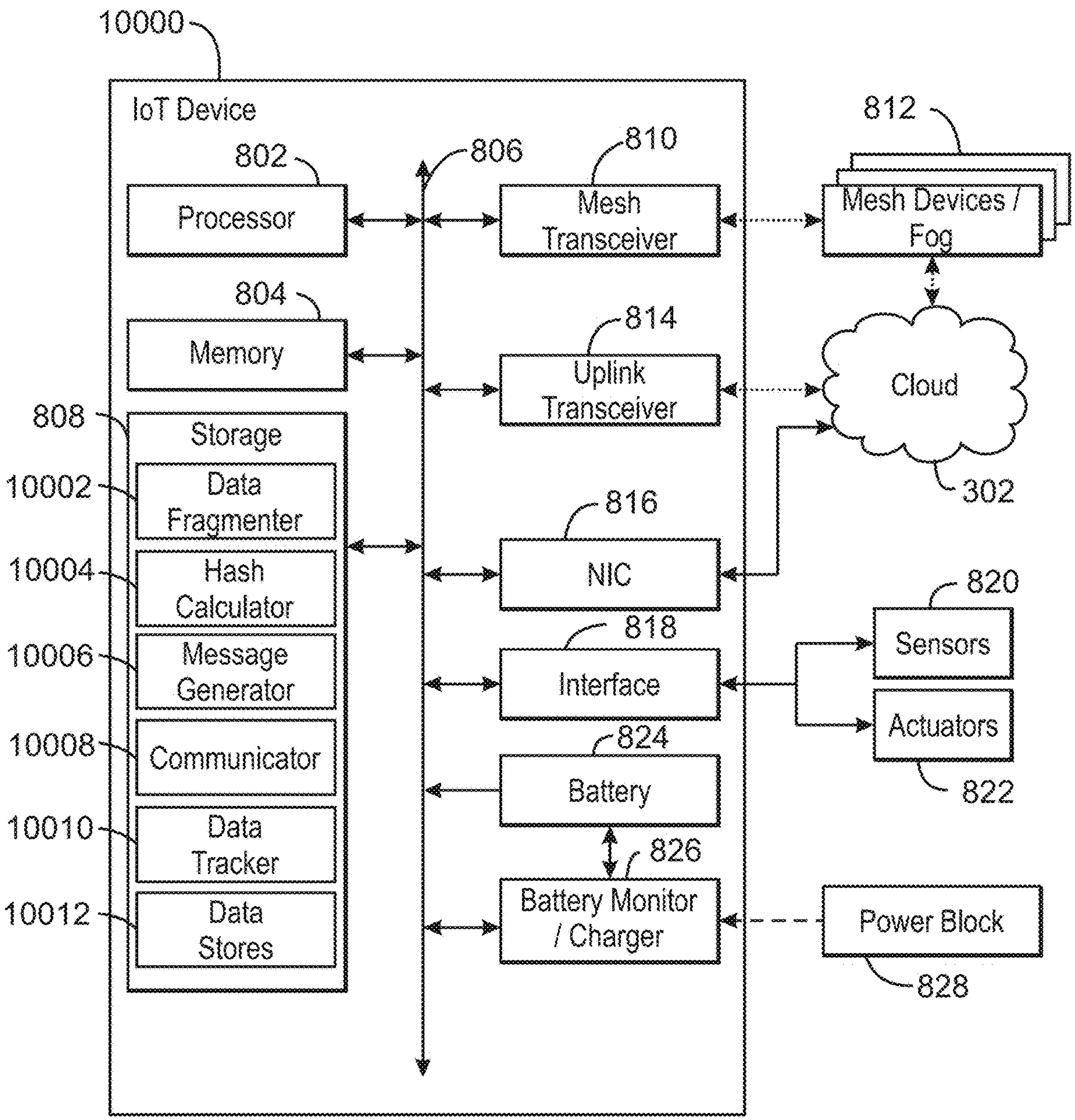
FIG. 100 is a block diagram of an example of components that may be present in an IoT device for coordinating or fulfilling service requests in accordance with some embodiments.

FIG. 100 is a block diagram of an example of components that may be present in an IoT device 10000 for coordinating or fulfilling service requests in accordance with some embodiments. Like numbered items are as described with respect to FIGS. 3 and 8. It can be noted that different components may be selected and used for the IoT device 10000 than for those selected for the IoT device 800 discussed with respect to FIG. 8, and other IoT devices discussed herein. The other nodes may include mesh devices 812, devices in the cloud 302, or both.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC). The mass storage 808 may include a data fragmenter 10002 to fragment a data file to fit within the payload field of packets or frames. A hash calculator 10004 may calculate hash keys to identify storage or transmission nodes for the data.

A message generator 10006 may use the hash keys to determine node IDs for storage or transmission of the data. The message generator 10006 may also format a data fragment for sending it to another node for storage or transmission, for example, packaging the data fragment in a payload field of a packet or frame.

A communicator 10008 may send the packaged data fragment to another node for storage or transmission. For transmission, the communicator 10008 may also receive an acknowledgement from another node, such as a mesh device 812, and determine if the acknowledgment was from an upstream destination, such as a device in the cloud 302. A data tracker 10010 may use the acknowledgments to determine whether data has been sent to the target device from the sending node, or needs to be resent. The data tracker 10010 may also implement flow control, for example, based on the rate of acknowledgments coming in from other nodes. For storage, a data store 10012 may save a key with the location and identity of a data fragment. The key may prepend the hash code for the fragment to the ID of the node, or mesh device 812, holding the stored data.

Figure 101:
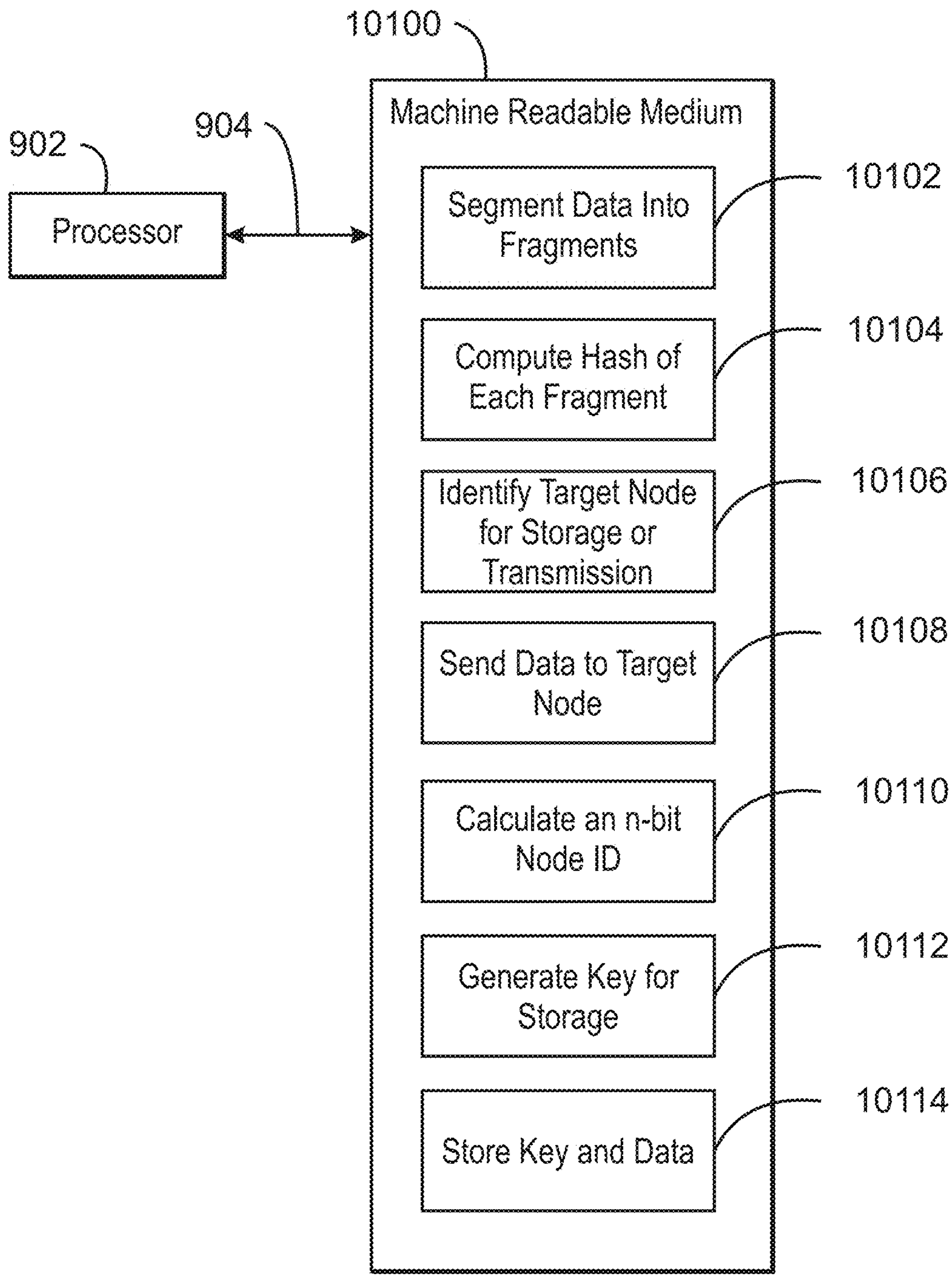
FIG. 101 is a block diagram of a non-transitory, machine readable medium including code to direct a processor, or processors, to coordinate or fulfill service requests in accordance with some embodiments.

FIG. 101 is a block diagram of an exemplary non-transitory, machine readable medium 10100 including code to direct a processor 902, or processors, to coordinate or fulfill service requests in accordance with some embodiments. Like numbered items are as described with respect to FIG. 9. The processor 902 may access the non-transitory, machine readable medium 10100 over a bus 904. The non-transitory, machine readable medium 10100 may include devices described for the mass storage 808 of FIG. 8 or may include optical disks, thumb drives, or any number of other hardware devices.

The non-transitory, machine readable medium 10100 may include code 10102 to direct the processor 902 to segment a file into fragments. Code 10104 may be included to direct the processor 902 to compute a hash code for each fragment. Code 10106 may be included to direct the processor 902 to identify the target storage or transmission node for each fragment. Code 10108 may be included to direct the processor 902 to send a data fragment to a target node. Code 10110 may be included to direct the processor 902 to calculate a node ID. Code 10112 may be included to direct the processor 902 to generate a key for storage. Code 10114 may be included to direct the processor 902 to store the key and hash.

The communications by the different nodes do not have to be over the same types of communication channels. Different communication routes, frequencies, and the like, may be used depending on the application requirements. As discussed with respect to FIGS. 102 to 105, appropriate traffic routes may be selected for data. The techniques allow the selection of different paths or combinations of paths to be used to address application requirements, ranging from high to low latency, and from connection oriented to connectionless. This extends transport selection and use criteria beyond multi-path Transmission Control Protocol (TCP).

Figure 102:
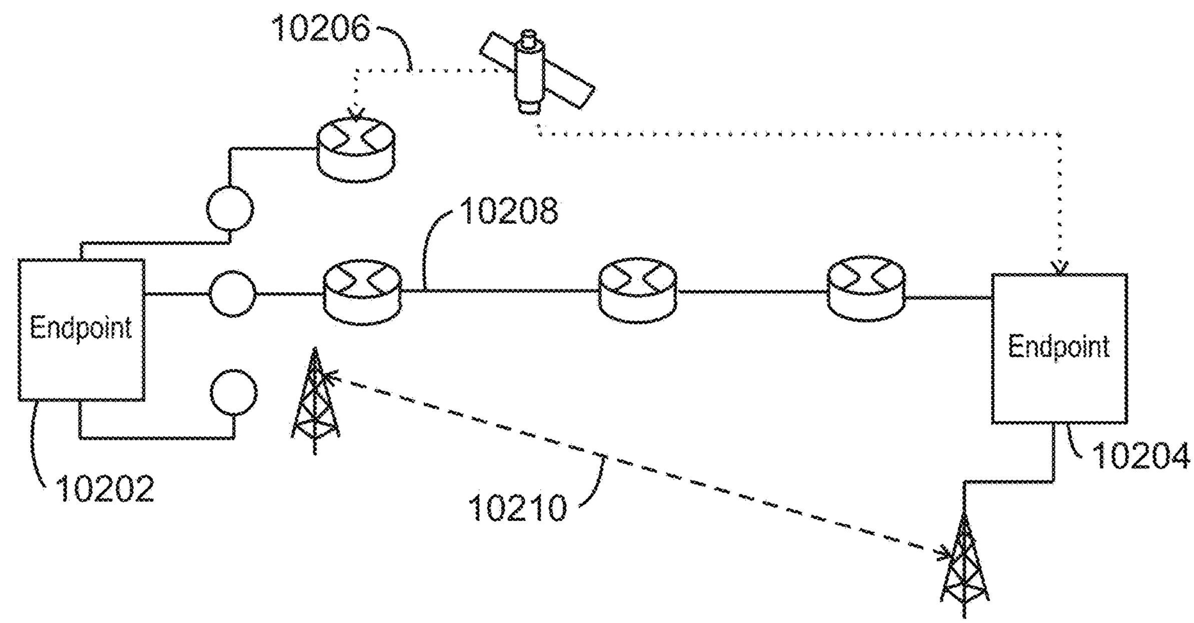
FIG. 102 is a schematic diagram of a multi-route communications system depicting three example routes between two endpoints and that may available for potential usage in accordance with some embodiments.

FIG. 102 is a schematic diagram of a multi-route communications system depicting three example routes between two endpoints 10202 and 10204 that may available for potential usage in accordance with some embodiments. In this example, the routes include a satellite uplink 10206, an internet backbone, or wired, connection 10208, and an LTE connection 10210. However, any number of wired or wireless connections may be used between the two endpoints, including any of the radio connections discussed with respect to FIG. 8, as well as optical fiber, microwave, and other connections.

The selection of the data path may depend on the amount of data to be transferred, the reliability of the data path, the speed of the communications, and the like. For example, if a wired connection 10208 is lost or unavailable, an endpoint 10202 may select an alternate communication path 10206 or 10210 based on the application requirements.

Figure 103:
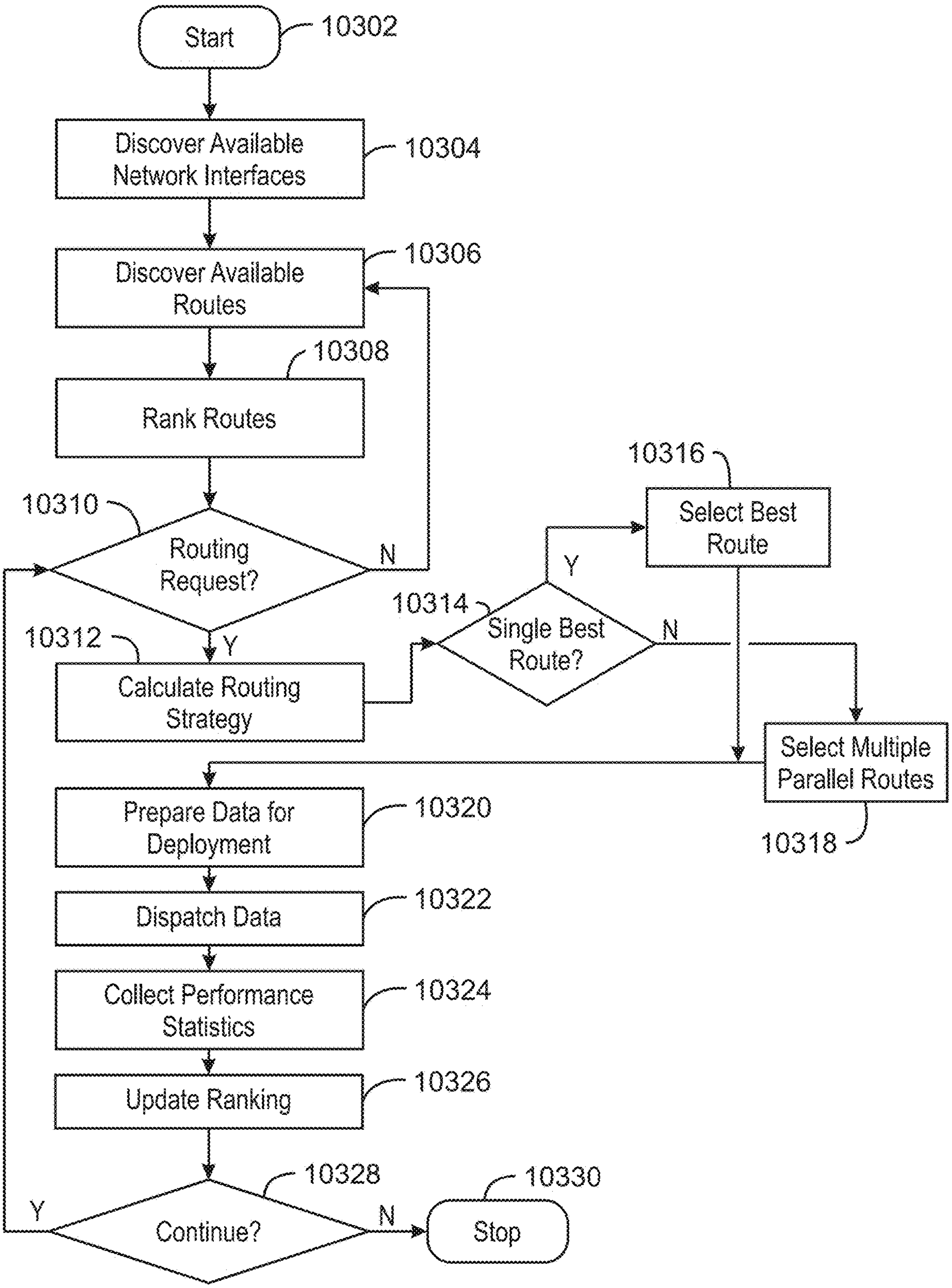
FIG. 103 is a process flow diagram of an example method for selecting a communication path in accordance with some embodiments.

FIG. 103 is a process flow diagram of an example method 10300 for selecting a communication path in accordance with some embodiments. The method 10300 of FIG. 103 to may be implemented by the IoT device 10400 described with respect to FIG. 104. It can be noted that multiple communication paths may be used in parallel. The block 10302 represents, for example, when a device is powered or when a network service overlay allowing the use of multiple communication paths is downloaded, among others.

At block 10306, available network interfaces on the device are discovered. This may be performed using configuration commands, such as lfconfig or ipconfig, that may be used to list attached network interfaces. The first, lfconfig, is a Unix type command that may be used by some operating systems to initialize network interfaces. The second, ipconfig, is a command that may be used in a number of operating systems, including, for example, systems from Apple, Microsoft, and others, that may display all currently TCP/IP configuration values, including the interfaces in a system.

At block 10306, available routes between the endpoints over the active network interfaces are discovered. The number of available routes may be larger than the number of network interfaces due to the potentially different topologies, security credentials, and protocols supported by each individual network interface. This may be performed by, e.g., discovering logical channels, obtaining last known active routes, and the like. The routes that are discovered may be saved to a route database. The route database may be located locally on the device, on a remote server, or on another device in a mesh network, among others. A remotely-connected database may be used by one or multiple devices which may be on the device or on another device in a mesh network.

At block 10308, the routes may be ranked. The ranking process can include ordering the routes by, e.g., expected or historical quality of service, capacity, cost, latency. The updated route information may be stored in the route database.

At block 10310, a determination is made as to whether a routing request has been received. If not, process flow returns to block 10306. If a routing request has been received, at block 10312, a routing strategy is calculated. The routing strategy can be directed by local policy objectives, such as best QoS routing, lowest cost routing, lowest latency routing, and the like.

The routing strategy may begin at block 10314 with a determination as to whether a single best route should be used. If so, at block 10316, the single route is selected, for example, based on desired route characteristic such as cost, reliability, latency, etc., determined from the ranking information in the routing database. If a multiple route strategy is to be selected, at block 10318, multiple routes in the routing database may be selected for use, for example, based on total data for transfer, reliability, and the like.

At block 10320, packets or frames are prepared for deployment over the selected routes. This may be performed by fragmenting the data into sizes that fit within the payloads of the packets or frames used for the selected routes. The fragments are then packed into the packets or frames for the selected routes.

At block 10322, packets are dispatched over the selected routes to the target. At block 10324, performance statistics may be collected for the different routes used, and, at block 10326, the route rankings in the routing database may be updated based on the performance statistics. The performance statistics may include, for example, whether the dispatch was successful on a given route, and the packet error rate, latency, route reliability, number of retries, total data transferred, and the like, for the route.

At block 10328, a determination is made whether to continue the process. For example, an orchestrator or service coordinator may determine that the multiple route communications are no longer needed. If multiple route communications are to continue, process flow returns to block 10310 to wait for another routing request. If not, the method 10300 may end at block 10330.

Figure 104:
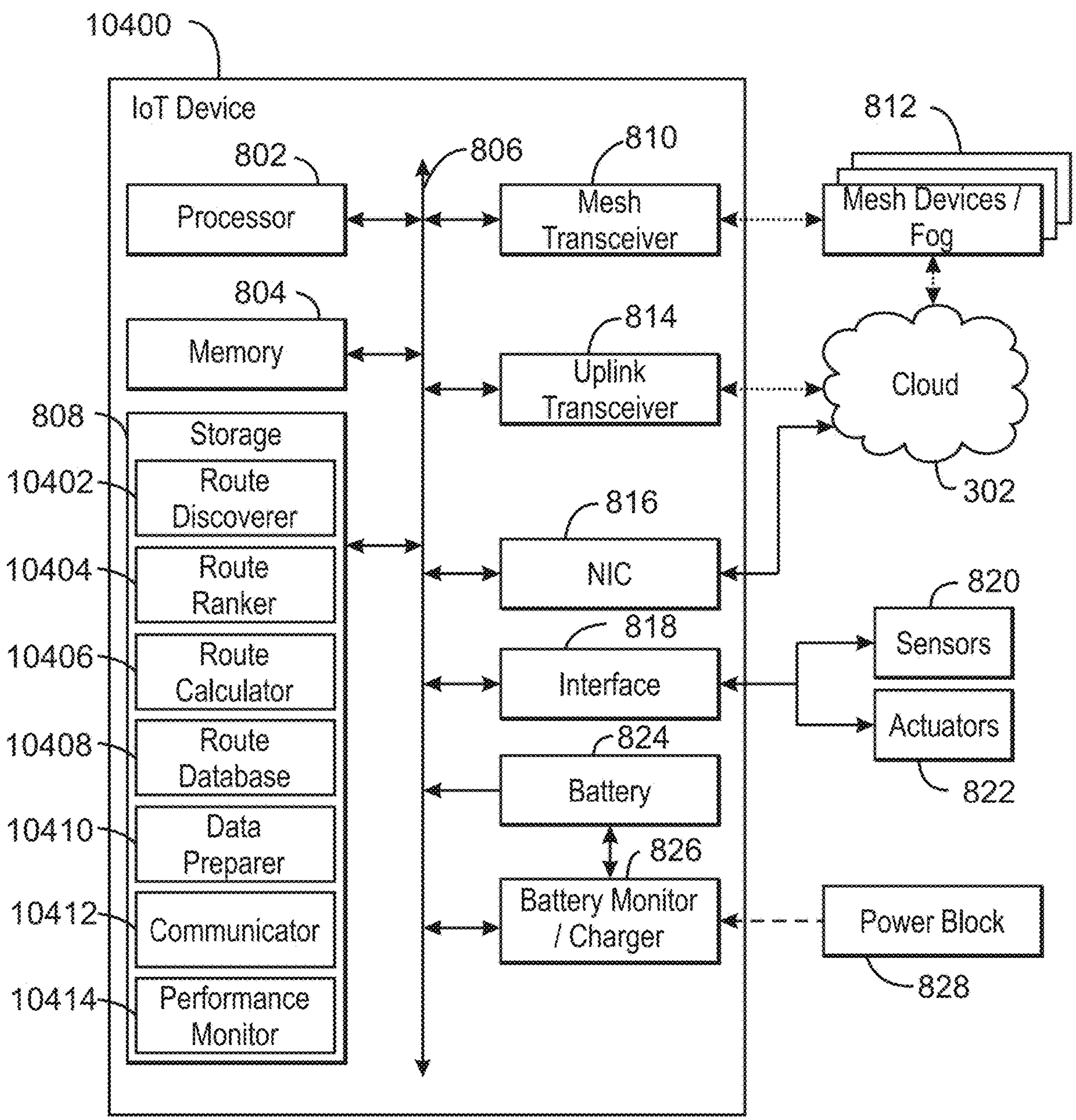
FIG. 104 is a block diagram of an example of components that may be present in an IoT device for sending data over multiple communication channels in accordance with some embodiments.

FIG. 104 is a block diagram of an example of components that may be present in an IoT device 10400 for sending data over multiple communication channels in accordance with some embodiments. Like numbered items are as described with respect to FIGS. 3 and 8. It can be noted that different components may be selected and used for the IoT device 10400 than for those selected for the IoT device 800 discussed with respect to FIG. 8, and other IoT devices discussed herein.

The mass storage 808 may include a number of modules to implement the route determination described herein. Although shown as code blocks in the mass storage 808, it may be understood that any of the modules may be fully or partially replaced with hardwired circuits, for example, built into an application specific integrated circuit (ASIC).

The mass storage 808 may include a route discoverer 10402 that identifies the network connections present and determines the routes, or communication channels, from the IoT device 10400 to an end device, such as a mesh device 812 or a device in the cloud 302. A route ranker 10404 may rate the routes, for example, based on transmission rates, reliability, and other performance statistics. A route database 10408 may store the routes, rankings, and associated performance statistics. The route database 10408 may be used to store other related information, such as protocols for communication channels, access information and credentials for channels, and the like.

A route calculator 10406 may determine a route or routes to send data from the IoT device 10400 to an end point. The route calculator may use information stored on the routes and rankings in the route database 10408.

A data preparer 10410 may take the information from the route calculator 10406 and prepare data, such as packets or frames, to be sent over the route or routes selected. The preparation may include fragmenting the data to fit into the payload fields of packets or frames associated with the different routes, and packaging the data in the packets or frames. A communicator 10412 may send the packets or frames to the target device over a transmitter, such as the mesh transceiver 810 or the uplink transceiver 814, or over the Internet via a network interface controller 816.

A performance monitor 10414 collects performance data for the communication channels. The performance monitor 10414 may update the route rankings saved in the route database 10408. The performance monitor 10414 may also note when a route has failed, for example, by noting the lack of an acknowledgment from a target device within a determined period of time, then resend the frame and flag the route as being potentially inappropriate in the route database 10406. The route discoverer 10402 may periodically check the flagged route to determine if it has been reestablished.

Figure 105:
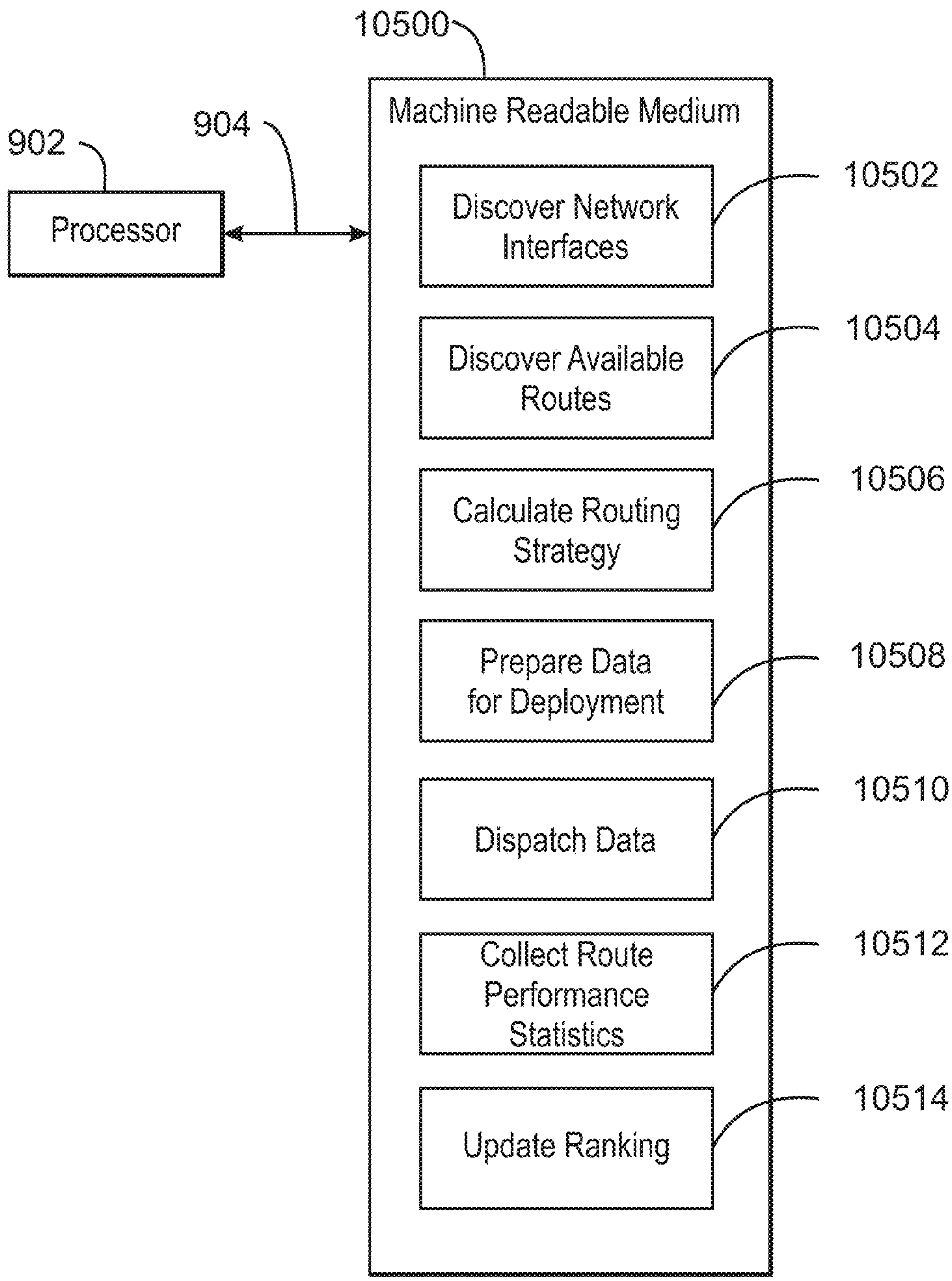
FIG. 105 is a block diagram of a non-transitory, machine readable medium including code to direct a processor to send data over multiple communication channels in accordance with some embodiments.

FIG. 105 is a block diagram of a non-transitory, machine readable medium 10500 including code to direct a processor 902 to send data over multiple communication channels in accordance with some embodiments. The processor 902 may access the non-transitory, machine readable medium 10500 over a bus 904. The processor 902 and bus 904 may be as described with respect to FIG. 9. The non-transitory, machine readable medium 10500 may include devices described for the mass storage 808 of FIG. 8 or may include optical disks, thumb drives, or any number of other hardware devices.

The non-transitory, machine readable medium 10500 may include code 10502 to direct the processor 902 to discover network interfaces. Code 10504 may be included to direct the processor 902 to discover available routes to an endpoint device using the discover network interfaces. The code 10504 may rank the routes by various performance statistics, such as communications speed, reliability, and the like. Code 10506 may be included to direct the processor 902 to calculate a routing strategy for a data file over a route or a group of routes, for example, using the rankings, among other factors. Code 10508 may be included to direct the processor 902 to prepare data for deployment, for example, by fragment a data file into sizes that fit into data fields for packets or frames associated with the communication channels. Code 10510 may be included to direct the processor 902 to transmit the packets or frames to the target device over the route or routes selected.

Code 10512 may be included to direct the processor 902 to collect route performance statistics, including time to receive and acknowledgement, failure to receive an acknowledgement, and the like. Code 10514 may be included to direct the processor 902 to update the rankings based on the performance statistics collected for the routes. Techniques disclosed herein may help provide for congestion management in IoT networks, and other types of mesh networks.

Figure 106:
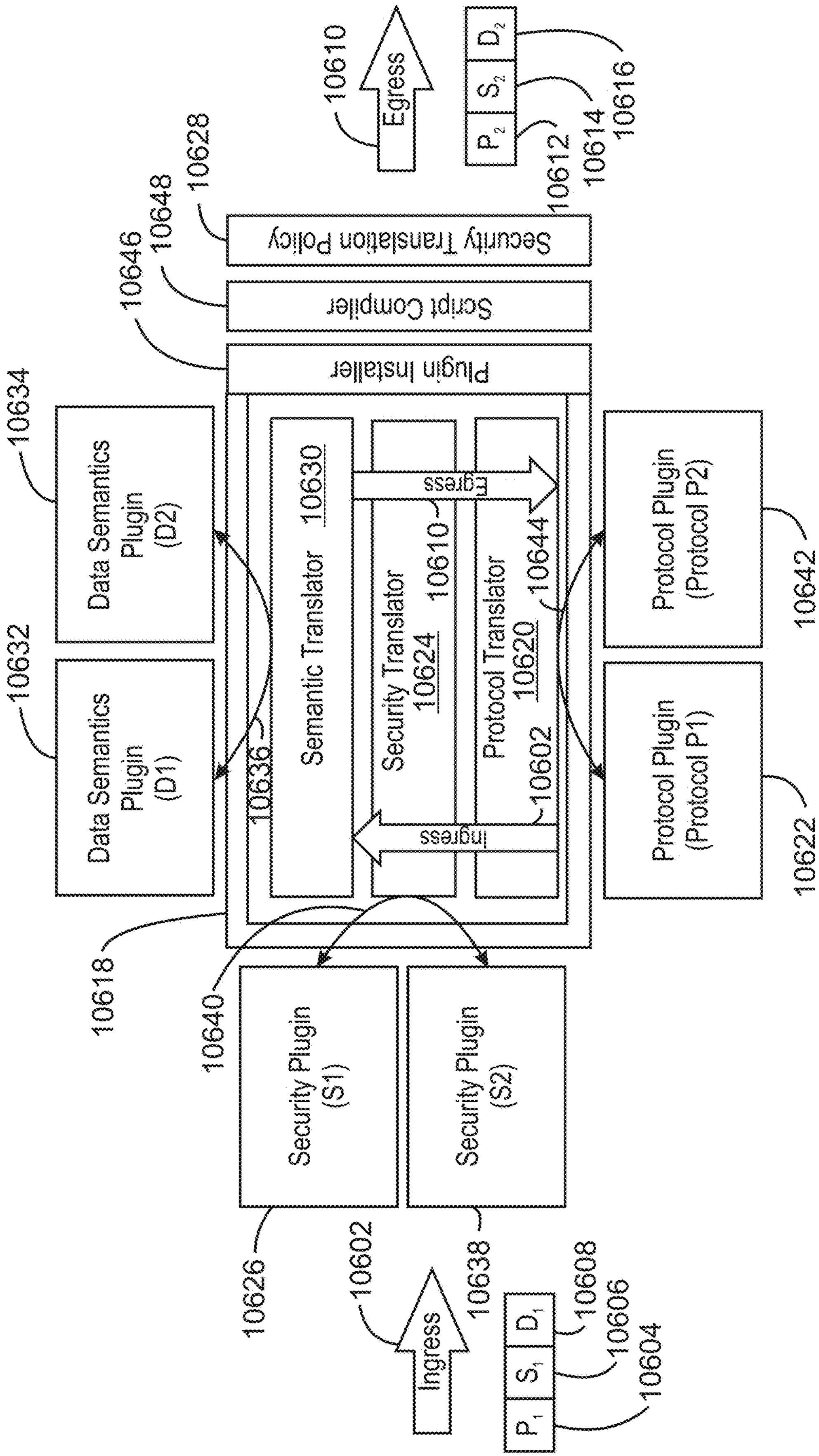
FIG. 106 is a schematic drawing of an IoT gateway for secure communications and translations between domains in accordance with some embodiments.

FIG. 106 is a schematic drawing of an IoT gateway 10600 for secure communications and translations between domains in accordance with some embodiments. IoT networks are often heterogeneous, with different domains and protocols functioning at multiple layers. To communicate across these domains, IoT frameworks may define session and application level protocol and data models. However, end-to-end data protection uses encryption and signature formats that are often incompatible with IoT frameworks, and use a gateway for translation. Gateway strategies may use plug-ins that contain protocol translation logic. However, IoT gateways may not combine protocol translation, security translation, and semantic translation into a single IoT gateway.

Ingress data 10602 may enter the IoT gateway 10600 from a first domain, such as the Internet, or cloud. In examples described herein, the ingress data 10602 may be in a first protocol P1 10604, have a first security level 10606, and represent data and devices using a first sematic representation 10608. To be compatible with downstream devices, the egress data 10610 leaving the IoT gateway 10600 may be in a second protocol 10612, have a second security level 10614, and use a second sematic representation 10616.

The IoT gateway 10600 may use a trusted execution environment (TEE) 10618 to protect upstream and downstream devices from corrupted data caused by attacks on the IoT gateway 10600. The TEE 10618 may include any number of different security techniques that may implement a secure boot environment, pre-execution validation of code, isolated execution, remote attestation, secure storage, secure provisioning, a trusted path, and the like. For example, any number of systems compliant with the specifications released by the Trusted Computing Group (TCG) may be used.

The ingress data 10602 may be processed in a protocol translator 10620 to remove the payload from an ingress packet or frame. This may be performed by the IoT gateway 10600 using a first protocol plug-in 10622. The ingress data may then be passed to a security translator 10624 for processing.

In the security translator 10624, a first security plug-in 10626 may be used to analyze the ingress data for a biometrically encrypted payload. If the security translation policy 10628 allows for decryption of the biometrically encoded package, the payload may be decrypted. The first security plug-in 10626 is not limited to biometric payloads. For example, a payload in the ingress data 10602 may be encrypted at a first security level 10606, such as 1024 bits. If the security translation policy 10628 allows, the payload may be decrypted, for later encryption using a second security level 10614, such as 512 bits, 2048 bits, and the like, for the egress data 10610. The security translation policy 10628 may have the keys for the decryption and encryption processes, and may set limits on the maximum mismatch in security level, for example, allowing a 1024 to 2048-bit change between ingress data 10602 and egress data 10610, but blocking a 2048 to 512-bit change, among others.

A semantic translator 10630 may be used to translate the sematic representation of the payload in the ingress data 10602 to the sematic representation used for the payload in the egress data 10610. This may involve, for example, using a first data semantics plug-in 10632 to convert the payload from a first sematic representation 10608, such as HTML to an intermediate state, then using a second data semantics plug-in 10634 to convert the data from the intermediate state to a second sematic representation 10616, such as XML. Many different semantic representations may be used, and the plug-ins may be selected based on the translations needed. In some examples, a single first data semantics plug-in 10632 may be paired with two different second data semantics plug-ins 10634. This may be useful if data from different IoT networks is passing through the IoT gateway 10600 from a common source or sink, such as a database in the cloud. The translation 10636 may be bidirectional, depending on the origin and destination of the data. The semantic translator 10630 may have a single plug-in, allowing conversion directly between the sematic representations 10608 and 10616.

Once the semantic translation is complete, the payload for the egress data 10610 passes to the security translator 10624 for conversion to the security level S2 10614 for the egress data 10610. This may involve encrypting the payload in a second security plug-in 10638 to the egress data security level 10614, as allowed by the security translation policy 10628. For example, the payload may be encrypted at a different bit level than the ingress data 10602. If a biometric marker was used to protect the payload, the data may be re-protected using a simulated biometric marker.

After the security translation 10640 is completed, the payload for the egress data 10610 is then passed to the protocol translator 10620. At the protocol translator 10620, a second protocol plug-in 10642 is used to package the payload in the protocol P2 10616 for the egress data 10610. This may involve packaging the egress data 10610 in the payload field of a packet or frame matching the protocol for the transmission route to downstream devices. If the payload for the egress data 10610 is too large for the payload field of the particular packet or frame, it may be fragmented and packaged into multiple packets or frames. The protocol translation 10644 completes the processing of the ingress data 10602 to form the egress data 10610. The egress data 10610 is then transmitted to the downstream device.

Other units may be present in the IoT gateway 10600 to provide adaptability. For example, a plug-in installer 10646 may validate and install plug-ins into the appropriate translator 10620, 10624, or 10630. The validate process may include taking a measurement (e.g., calculating a hash code) of the plug-in using a trusted platform module (TPM), or other system, and comparing the measurement to a whitelist of accepted values.

A script compiler 10648 may be included to compile scripts used in plug-ins. This may be useful for applications, such as video feeds, among others, that have high-speed and high bandwidth requirements.

It can be noted that not every payload may be processed at all three levels. For example, a payload in the ingress data 10602 may be processed to remove the payload from an ingress frame, then directly processed to be packaged in an egress frame, and sent out as the egress data 10610. In other examples, a semantic translation may not be used. In these examples, after the payload is removed from an ingress frame, a security translation 10640 may be performed and the payload returned to the protocol translator 10620 for packaging in an egress frame before sending it out as the egress data. Any combinations of the translation functions may be used depending on the parameters of the ingress and egress networks.

It may be noted that a resource partitioning scheme may include multiple virtual clients. The resources used to process a gateway translation with data and control ingress and egress from a first virtual IoT Client to a first virtual IoT Server may be isolated from resources for controlling the transfer of data from a second virtual IoT Client to a second virtual IoT server. This platform partitioning scheme may include exchanging keys between a Client and a Server within TEE "channels". Generally, a virtual client on one side of a channel negotiates keys used by the virtual server on the other side of the same channel. In this way, the security semantics and security level may be preserved across dissimilar IoT networks that are bridged. Resource partitioning and assignment may be aligned with the gateway notion of "channels" in which a virtual client and virtual server may interact.

This example includes a gateway abstraction, in which a virtual client and a virtual server may be communicating over a secure channel that has a security level. Different system resource partitioning and assignment schemes may be used, for example, based on Intel virtualization technology (VT-X and VT-d), or on Intel SGX (software guard extensions). Resource partitioning and assignment may be aligned with the gateway's channel, such that all keys, communication and processing are performed at the appropriate security level.

Further, a security policy describing security levels may be associated with ingress and egress channels, wherein a first channel is at a first security level and a second channel is at a second security level. For example, a first security level may include encrypting data using a 1024-bit encryption, while a second security level may include encrypting data using a 256-bit encryption. The hardware partitioning scheme may be sufficient to enforce channel isolation at or above the security level assigned.

Additionally, the secure or trust boot scheme may ensure the hardware partitioning scheme is in force and verifiable and attestable according to a trusted platform module (TPM), or other trusted execution environment scheme such as Intel TXT, Intel SGX, or ARM Trustzone.

Figure 107:
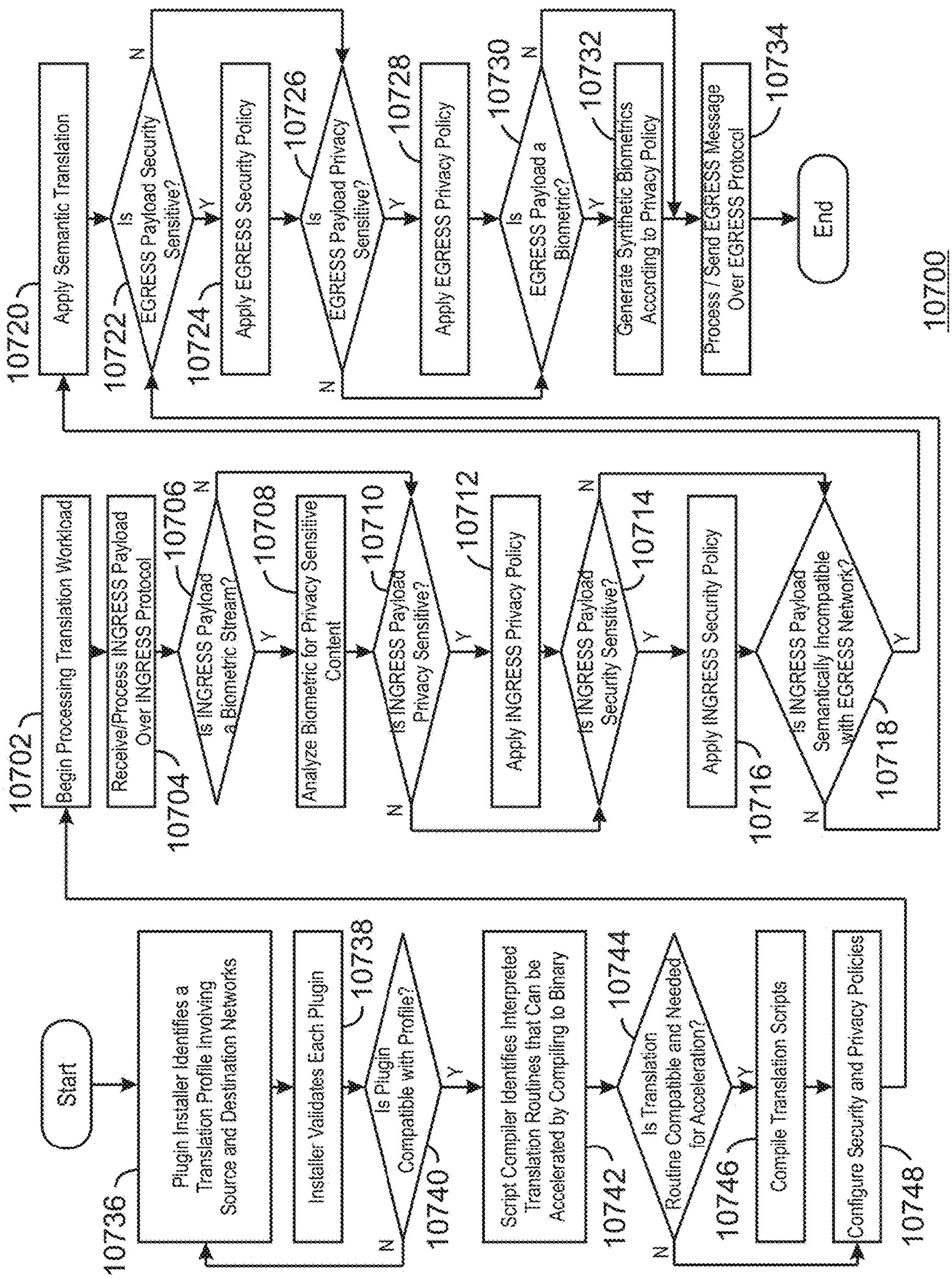
FIG. 107 is a process flow diagram of an example method for translating workloads in a secure IoT gateway in accordance with some embodiments.

FIG. 107 is a process flow diagram of an example method 10700 for translating workloads in a secure IoT gateway in accordance with some embodiments. The method 10700 of FIG. 107 to may be implemented by the IoT device 10800 described with respect to FIG. 108. The block 10702 represents, for example, when a workload arrives at the gateway for translation. At block 10704, the ingress data is processed to obtain the ingress payload, using the ingress protocol.

At block 10706, a determination is made as to whether the ingress payload is a biometric stream. If so, at block 10708, the biometric may be analyzed for privacy sensitive content.

At block 10710, a determination is made as to whether the ingress payload is privacy sensitive. If so, at block 10712, an ingress privacy policy may be applied, for example, to decode the ingress payload. For example, an IoT object having a first identity, such as a UUID, may have a policy restricting disclosure of the identity, as it may be used by a foreign system to track a plurality of interactions using this or other gateway such that the tracking information may be used to construct a connection graph or machine learning representation further analyzable using differential analysis. The privacy policy may instruct the translator to replace a first UUID with a second randomly generated UUID so as to avoid tracking, collaboration, or other analytics based on the UUID.

The policy may further detect object data values that can be fingerprinted, such that a further analysis of the data using differential analysis might reveal statistical correlations with other data values obtained from other objects. This may be used to block inferences that may be made of internal behaviors, processes and decisions. The privacy policy module may cause the data value in question to be substituted for another having less granularity, less resolution, greater abstraction, or greater generality. The privacy policy module may simply refuse to supply the requested data value over the gateway interface.

The privacy policy may further instruct the credentials used by the gateway to authenticate, authorize, or otherwise protect the data to use an EPID private key. The selection of the EPID key may align with a person or group or community of things, people, devices or concepts that can be numbered, and where the number of instances satisfies a privacy policy. For example, the degree of anonymity, based on population of numbered instances, may prevent differential privacy analytics from converging on a statistically relevant inference of knowledge.

At block 10714, a determination is made as to whether the ingress payload is security sensitive, for example, being encrypted. If so, at block 10716 an ingress security policy may be applied, for example, to decrypt the payload for processing.

At block 10718, a determination is made as to whether the ingress payload is semantically incompatible with the egress network. If so, at block 10720 a semantic translation is performed, for example, to translate the ingress payload to a semantically intermediate, or IoT gateway, representation, then to translate the semantically intermediate representation into the egress representation. In some examples, the ingress representation may be directly converted from the ingress representation to the egress representation to lower conversion times. This may be performed for data having a high bandwidth, or when both formats are very common, among other reasons.

At block 10722, a determination is made as to whether the egress payload is security sensitive, for example, the policy mandates encryption for the egress network. If so, at block 10724, the egress security policy is applied. The egress payload may be encrypted at the bit-level required by the security policy.

At block 10726 a determination is made as to whether the egress payload is privacy sensitive. If so, at block 10728, the egress privacy policy is applied. At block 10730, a determination is made as to whether the egress payload is part of a biometric stream. If so, a synthetic biometric stream generated according to the privacy policy is used to protect the payload.

At block 10734, the egress payload is processed according to the egress protocol, for example, being packed into the data field of an egress packet or frame. The egress packet or frame is then sent over the egress network to the target device.

The method 10700 may also include a number of actions to prepare the IoT gateway for the translation functions. At block 10736, a plug-in installer may identify a translation profile between ingress and egress networks, including plug-ins to be used for protocol, privacy, security, and semantic translations. The identification and discovery of the ingress and egress networks may be performed in the IoT gateway, or may be performed at another device, such as a database located in the cloud. If another device has the network catalog, the plug-in installer in the IoT gateway may accept the list of plug-ins, and then download and attempt installation of the plug-ins into the IoT gateway.

At block 10738, each plug-in is validated, for example, as to the authenticity, integrity, version, and compatibility of the plug-in with the IoT gateway, among other items. At block 10740, if a plug-in is determined to have failed the validation, process flow returns to block 10736 to find a replacement for that plug-in. If no replacement can be found, an alert message may be sent.

At block 10742, a script compiler, or other policy system, may determine which translation routines may be performed using interpreted code, and which may be accelerated by compilation to binary code. At block 10744, a determination is made as to whether each of the translation scripts can be compiled. If so, at block 10746, the translation scripts are compiled and linked as binary code files. At block 10748, the security and privacy policies are configured. Process flow the returns to block 10702 to begin the translation workload.

Process flow may return to the configuration blocks 10736 to 10748 as needed to reconfigure the system. This may be performed when a new network is coupled to the IoT gateway, or an older network is decoupled from the IoT gateway. Further, reconfiguration may be performed when new privacy, security, or semantic translations are to be used for payloads.

Figure 108:
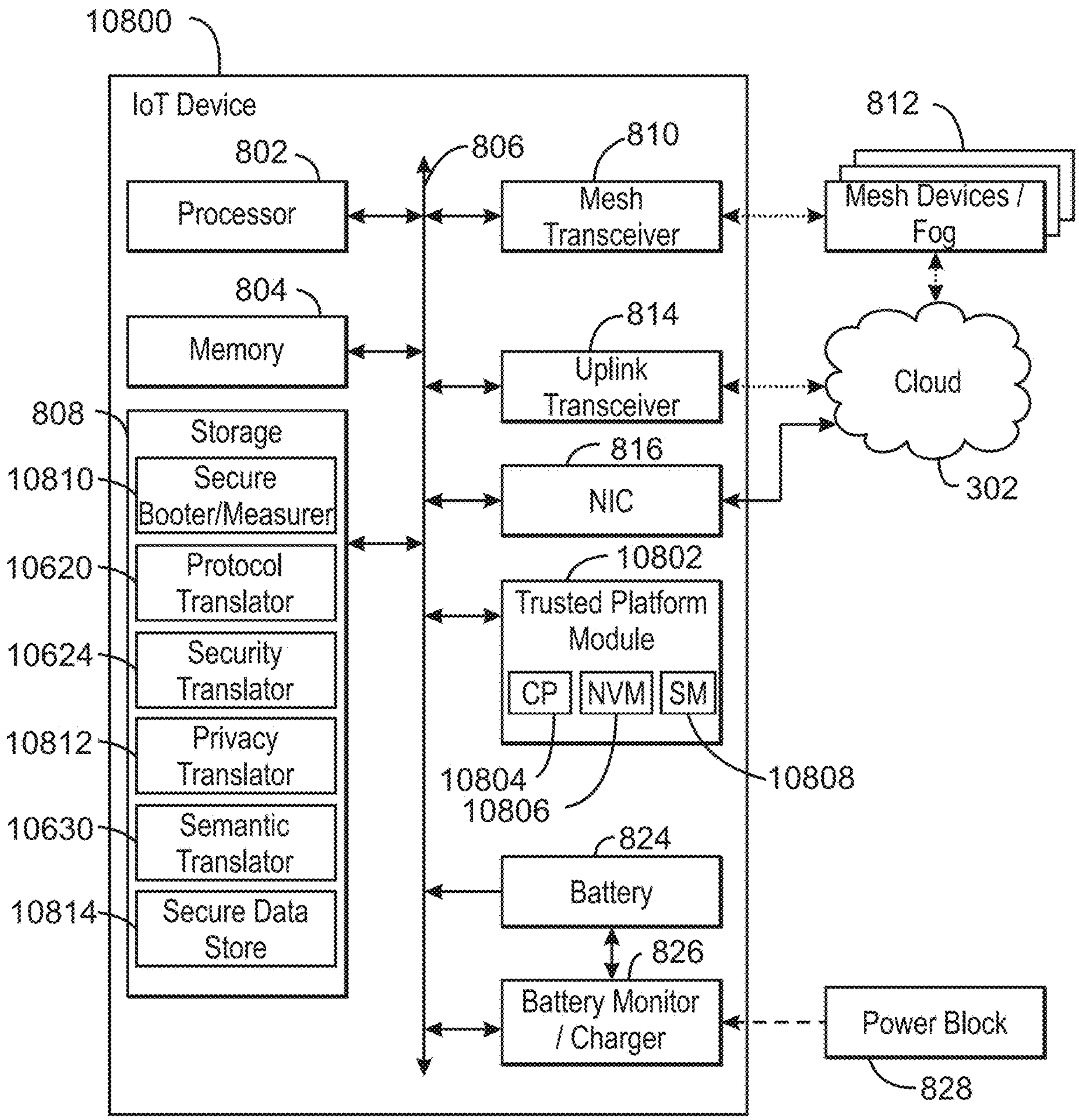
FIG. 108 is a block diagram of an example of components that may be present in an IoT gateway for translating workloads between domains in accordance with some embodiments.

FIG. 108 is a block diagram of an example of components that may be present in an IoT gateway 10800 for translating workloads between domains in accordance with some embodiments. Like numbered items are as described with respect to FIGS. 3, 8, and 106. It can be noted that different components may be selected and used for the IoT gateway 10800 than for those selected for the IoT device 800 discussed with respect to FIG. 8, and other IoT devices discussed herein.

The IoT gateway 10800 may include a trusted platform module (TPM) 10802, for example, compliant with the specification promulgated by the Trusted Computing Group as ISO/IEC 11889 in 2009. The TMP 10802 may include a cryptographic processor (CP) 10804, non-volatile memory (NVM) 10806, and secure memory (SM) 10808. The CP 10804 may provide a random number generator, an RSA hash generator, a SHA-1 hash generator, and an encryption-decryption engine, among others. The NVM 10806 may include keys programmed at the time of manufacture that include, for example, an RSA key, among others. The SM 10808 may hold measurements taken on software in platform configuration registers. As used herein, a measurement is a hash code calculated on a code or data segment stored in the storage 808 or memory 804. Starting from a measurement of a boot code segment, the measurements may be used to establish a trusted execution environment 10618, as described with respect to FIG. 106, by creating a chain-of-trust from the initial booting.

The mass storage 808 may include a number of modules to implement the translation functions described herein. Although shown as code blocks in the mass storage 808, it may be understood that any of the modules may be fully or partially replaced with hardwired circuits, for example, built into an application specific integrated circuit (ASIC).

The mass storage 808 may include a secure booter/measurer 10806 that performs measurements on code or data. As described herein, a measurement may be the generation of a hash code of the code or data. The hash code may be compared to an expected measurement value before the code or data is run or transmitted. An initial boot measurement may be performed by the processor 802 to set up the secure booter/measurer 10806 to perform additional measurements. A protocol translator 10620 may perform translations between an ingress protocol and an egress protocol. A security translator 10624 may perform security translations between an ingress security level and an egress security level. A privacy translator 10808 may perform privacy translations, for example, based on biometric credentials, among others. A semantic translator 10624 may perform a data semantics translation between an ingress payload and an egress payload. A secure data store 10810 may store plug-ins, security policies, privacy policies, a script compiler, and the like.

These resources may be assigned to a gateway processing "channel" according to an assigned security level administered by the security policy modules. Ingress and egress policies may authorize security level upgrade, for example, from unclassified to classified, or a downgrade, for example, from classified to unclassified. The policies may authorize data integrity classification, for example, from sanitized to unsanitized or from manufacturing to engineering, or following any other data categorization scheme.

Figure 109:
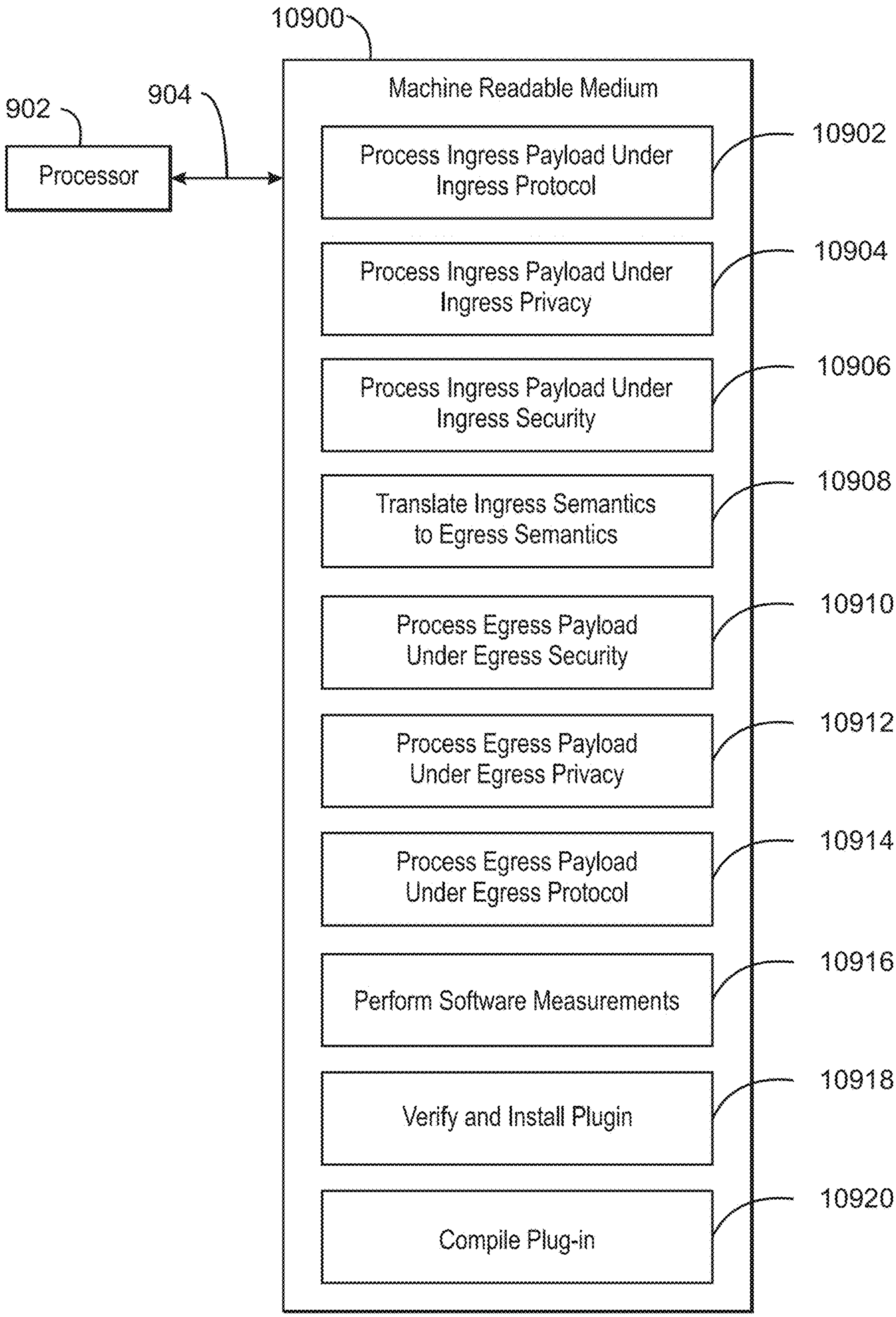
FIG. 109 is a block diagram of a non-transitory, machine readable medium including code to direct a processor to translate a workload between an ingress network and an egress network in accordance with some embodiments.

FIG. 109 is a block diagram of a non-transitory, machine readable medium 10900 including code to direct a processor 902 to translate a workload between an ingress network and an egress network in accordance with some embodiments. The processor 902 may access the non-transitory, machine readable medium 10900 over a bus 904. The processor 902 and bus 904 may be implemented in a manner similar to the processor 902 and bus 904 described with respect to FIG. 9. The non-transitory, machine readable medium 10900 may include devices described for the mass storage 808 of FIG. 8 or may include optical disks, thumb drives, or any number of other hardware devices.

The non-transitory, machine readable medium 10900 may include code 10902 to direct the processor 902 to process an ingress payload under an ingress protocol. Code 10904 may be included to direct the processor 902 to process an ingress payload under an ingress privacy policy. Code 10906 may be included to direct the processor 902 to process an ingress payload under an ingress security policy. Code 10908 may be included to direct the processor 902 to translate the data semantics of an ingress payload to the data semantics of an egress payload.

Code 10910 may be included to direct the processor 902 to process an egress payload under an egress security policy. Code 10912 may be included to process an egress payload under an egress privacy policy. Code 10914 may be included to direct the processor 902 to process an egress payload under an egress protocol policy. Code 10916 may be included to direct the processor 902 to perform software measurements of plug-ins and policies, for example, prior to installation. Code 10918 may be included to direct the processor 902 to verify and install plug-ins. Code 10920 may be included to direct the processor 902 to compile plug-ins.

IoT networks may be considered a collection of devices forming a fog device. The individual devices may connect via a variety of network transport, session, and application layer communication paths. An owner of the IoT network, such as a user, organization, or group has a common interest and participation in the IoT network. The owner may determine that devices belong to an organization because the owner manages, legally owns, or orchestrates collaboration among the various devices.

A device may be onboarded into an IoT network so as to allow an owner to take ownership of the device, thereby registering it with the owner as an owned device. As used herein, onboarding indicates that activities to join a device, such as the exchange of join requests, and verification of identities, and the creation of device resources, have taken place. A device may in turn acknowledge ownership in the domain by recording the owner/domain information in device resources. A device may allow or have multiple owners. In some examples, the devices may exist in multiple domains, complicating the recognition of the devices by each other.

Figure 110:
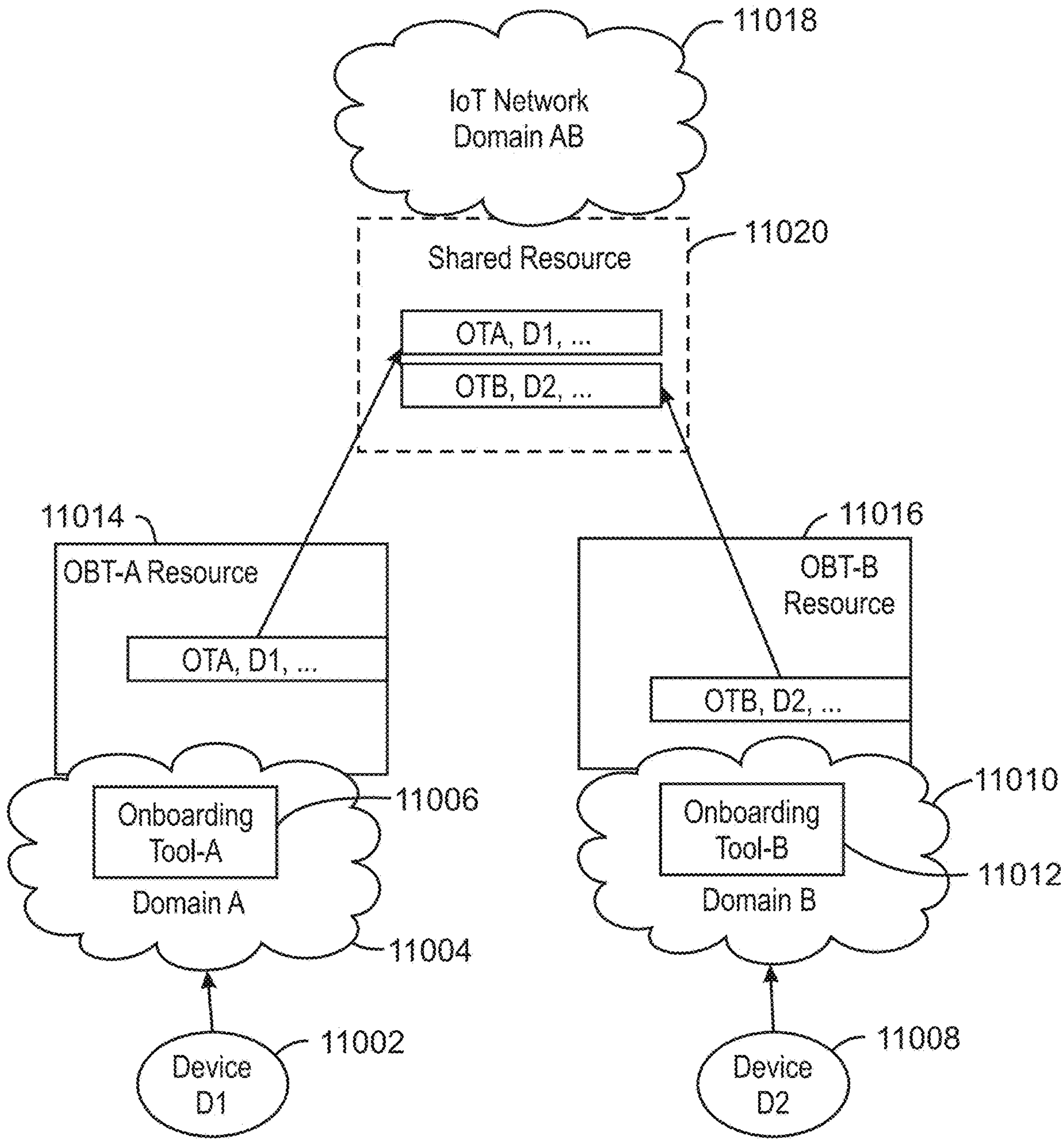
FIG. 110 is a schematic diagram of devices that are onboarded by different domains being incorporated by a shared domain created to allow the devices to participate as components of a new domain in accordance with some embodiments.

FIG. 110 is a schematic diagram 11000 of devices that are onboarded by different domains being incorporated by a shared domain created to allow the devices to participate as components of a new domain in accordance with some embodiments. In the schematic diagram 11000, a first device 11002 is onboarded into a first domain A 11004 by an onboarding tool (OBTA) 11006. A second device 11008 is onboarded into a second domain B 11010 by a second onboarding tool (OBTB) 11012. In this example, the devices 11002 and 11008 may regard themselves as members of domains A 11004 and B 11010 respectively.

Interactions between devices D1 11002 and D2 11008 may be permitted under the security levels, for example, if the domains are part of a family, but may not be permitted, in some cases, because the disparate OBTA 11006 and OBTB 11012 establish a division between the resources 11014 or 11016 in the networks. Thus, the OBTA 11006 for domain A 11004 may not recognize or trust a device onboarded in a foreign domain B 11010. This could be due to, for example, the respective onboarding tools not sharing a common resource 11014 or 11016 containing onboarded, and, therefore, trusted devices 11002 and 11008.

In the techniques described herein, when trust is established between the onboarding tools 11006 and 11012 in the respective domains 11004 and 11010, a new domain 11018 may be created that has a shared resource 11020. The shared resource 11020 may include information from resources 11014 or 11016 in the individual parent domains 11004 and 11010. This is discussed further with respect to FIG. 111.

Figure 111:
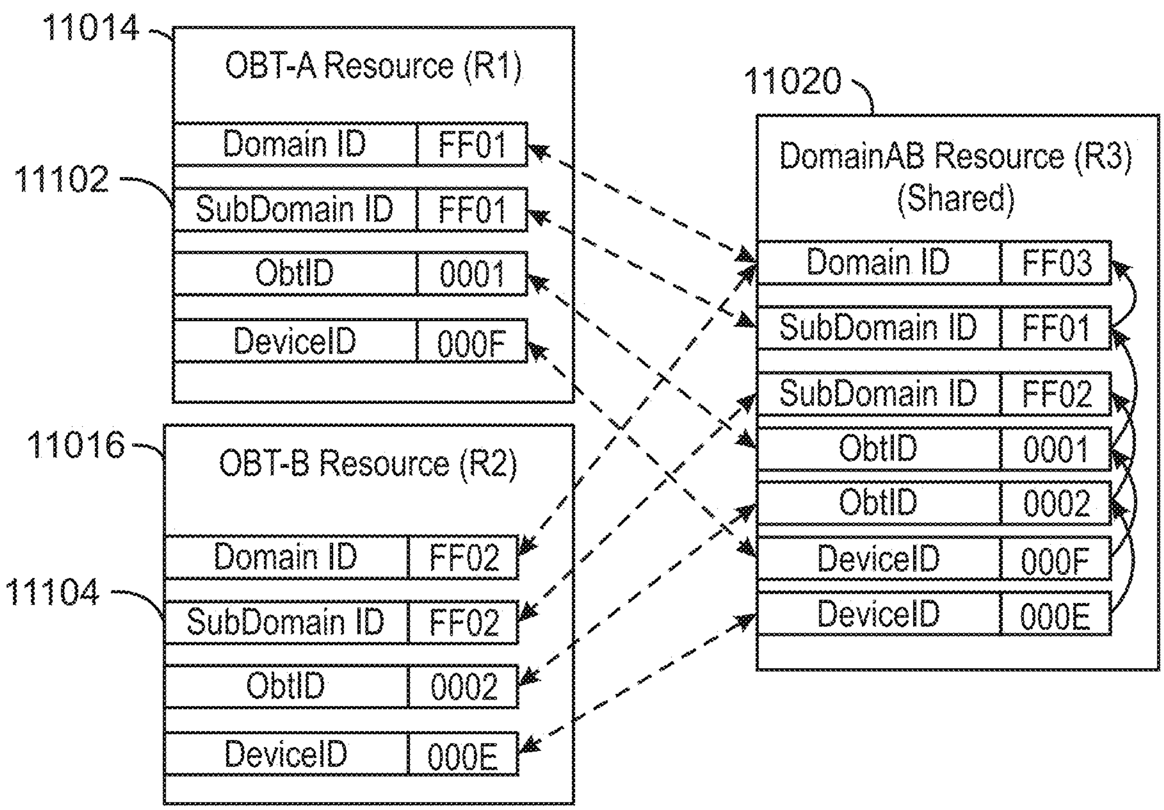
FIG. 111 is a schematic diagram of the creation of a shared resource to allow a device to participate across domains in accordance with some embodiments.

FIG. 111 is a schematic diagram 11100 of an exemplary creation of a shared resource to allow a device to participate across domains in accordance with some embodiments. Like numbered items are as described with respect to FIG. 110. As described in FIG. 110, discovering local onboarding resources R1 11012 and R2 11016 in another domain results in the creation of a shared resource, R3 11020, such that records contained in R1 11014 are stored in R3 11020, allowing access by the onboarding tool, OBTB 11012, in domain B 11010. Similarly, records contained in R2 11016 are stored in R3 11020, and may be accessed by the onboarding tool, OBTA 11014, in domain A 11004. Furthermore, the shared resource R3 11020 may resolve naming conflicts, for example, when a presumed domain name by OBTA 11006 is the same as a presumed domain name by OBTB 11012, among other conflicts.

The techniques find or create a new domain ID for the union of the domains 11004 and 11010, for example, a new UUID, such that the shared resource R3 11020 synchronizes a DomainID in a local resource R1 11014 and R2 11016. A subdomain ID 11102 in R1 11014 may differ from a subdomain ID 11104 in R2 RP16 such that each subdomain respectively becomes a subdomain of the newly formed domain 11018. The shared resource R3 11020 synchronizes with the respective local resources, R1 11014 and R2 11016, to populate the merged resource showing the multiple subdomain IDs.

The onboarding tools OBT-A 11006 and OBT-B 11012 similarly are synchronized with the shared resource 11020 establishing each as members of a common domain 11018. Similarly, devices D1 11002 and D2 11008 are synchronized with the shared resource 11020 establishing each as a member of the same common domain 11018 but may retain, respectively, membership in the respective sub-domain 11004 or 11010 that originally onboarded the device 11002 or 11008.

Figure 112:
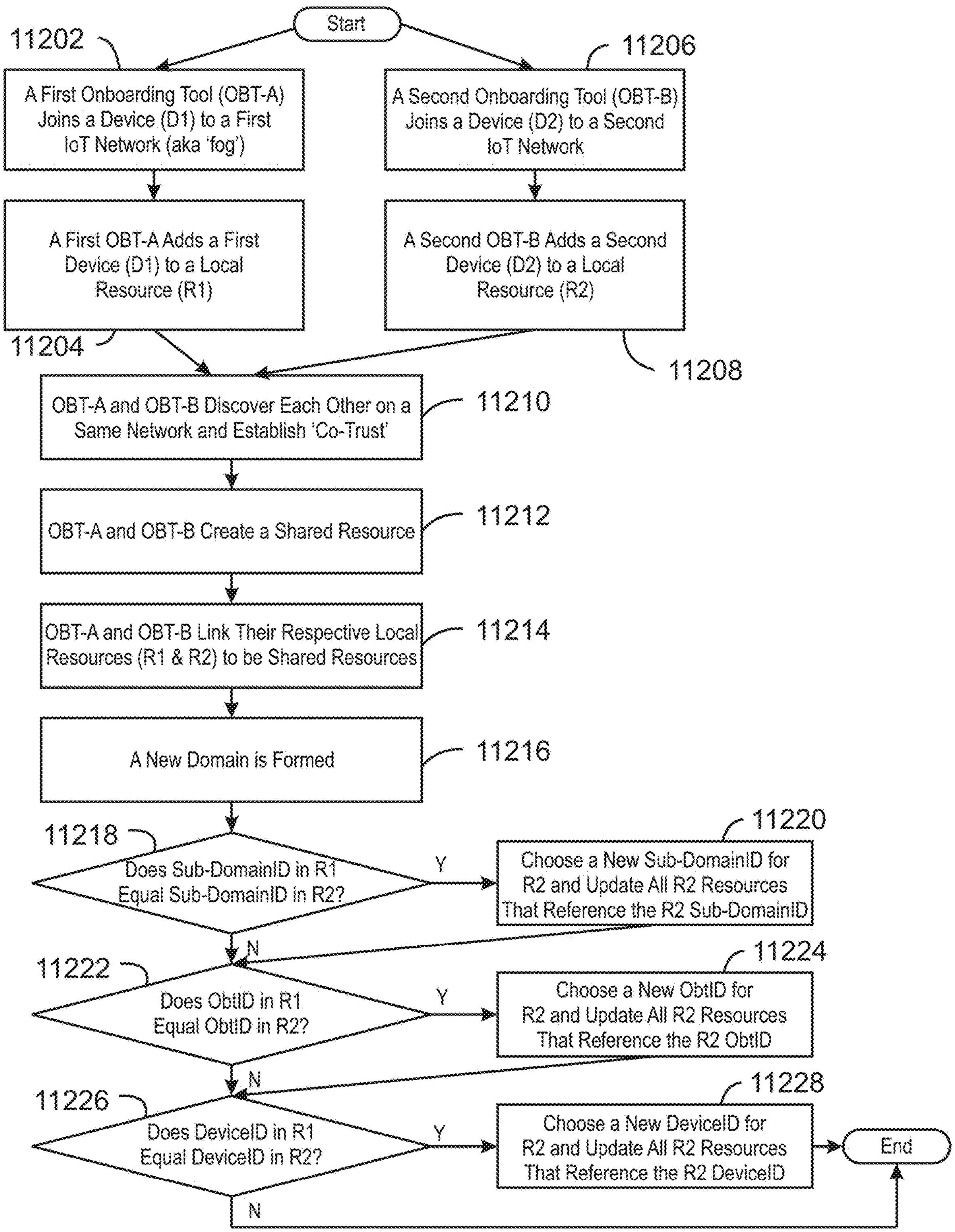
FIG. 112 is a process flow diagram of an example method for establishing a combined IoT domain including shared resources in accordance with some embodiments.

FIG. 112 is a process flow diagram of an exemplary method 11200 for establishing a combined IoT domain including shared resources in accordance with some embodiments. The method 11200 of FIG. 112 may be implemented by the IoT device 11300 described with respect to FIG. 113. As used herein, the shared resources may include virtualized resources, storage resources, communication resources, onboarding resources, service provider resources, and the like. The resources may exist at the domain level, the sub-domain level, or the device level. The block 11202 represents, for example, when a first onboarding tool joins a first device to a first network domain. At block 11204, the first onboarding tool adds the device to a local resource, for example, as a member or owned device.

At block 11206, a second onboarding tool adds a second device to a second network domain. At block 11208, the second onboarding tool adds the device a local resource, for example, as a member or owned device.

At block 11210, the onboarding tools discover each other on a network and establish trust between them. This may be performed by, for example, mutual attestation, individual pairing, through an administrative console, or by a blockchain, as described herein.

At block 11212, the onboarding tools create a shared resource, where they are shareholders in the resource. At block 11214, the onboarding tools link their respective resources to the shared resource. As a result, the resources of the first device are accessible to the second onboarding tool, and the resources of the second device are accessible to the first on-boarding tool. At block 11216, a new domain is formed that is based on the union of the two device domains. The Domain ID for the new domain is recorded in the shared resource.

At block 11218, a determination is made as to whether the subdomain ID in the first domain is the same as or similar to the subdomain ID in the second domain. If so, at block 11220 a new subdomain ID is chosen for the subdomain ID in the second resource, and all resources accessing that subdomain ID are updated with the new name.

At block 11222, a determination is made as to whether the OBT ID, or onboarding tool ID, in the first domain is equal to the OBT ID in the second domain. If so, at block 11224 a new OBT ID is chosen for the OBT ID in the second resource, and all resources accessing that OBT ID are updated with the new name.

At block 11226, a determination is made as to whether the device ID in the first domain is equal to the device ID in the second domain. If so, at block 11228 a new device ID is chosen for the device ID in the second resource, and all resources accessing that device ID are updated with the new name.

Although the method is shown for two devices and domains, any number of devices that need to be incorporated from overlapping domains may be used. For example, two domains with multiple devices may be joined by a shared domain created by onboarding tools in both domains. In another example, devices in three or more domains may be joined by a shared domain.

Figure 113:
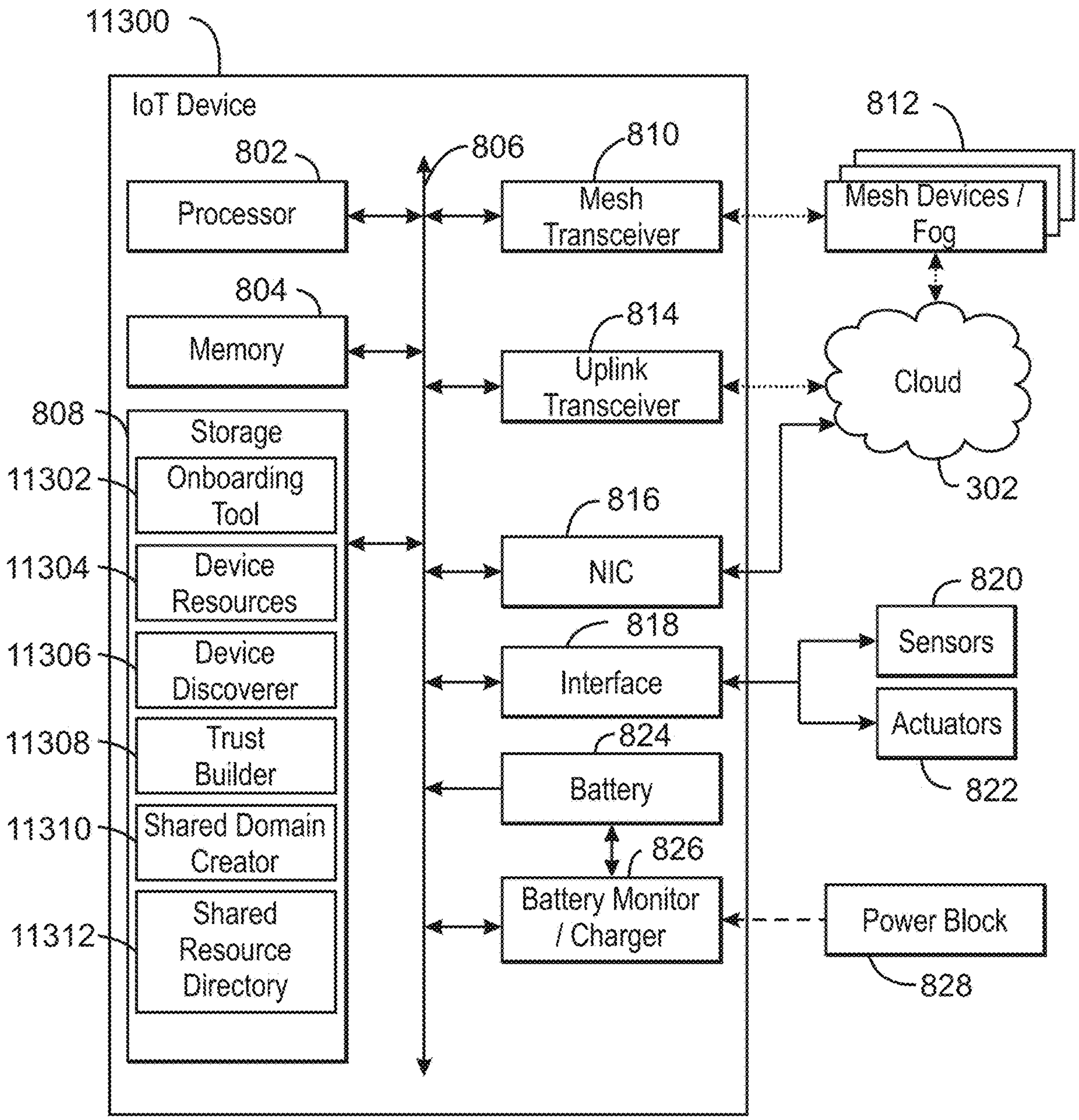
FIG. 113 is a block diagram of an example of components that may be present in an IoT device for creating shared resources in accordance with some embodiments.

FIG. 113 is a block diagram of an example of components that may be present in an IoT device 11300 for creating shared resources in accordance with some embodiments. Like numbered items are as described with respect to FIGS. 3 and 8. It can be noted that different components may be selected and used for the IoT device 11300 than for those selected for the IoT device 800 discussed with respect to FIG. 8, and other IoT devices discussed herein.

The mass storage 808 may include a number of modules to implement the cross domain sharing of resources described herein. Although shown as code blocks in the mass storage 808, it may be understood that any of the modules may be fully or partially replaced with hardwired circuits, for example, built into an application specific integrated circuit (ASIC).

The mass storage 808 may include an onboarding tool 11302 that joins devices to the domain of the IoT device 11300, and creates a store of device resources 11304 for the devices. A device discover 11306 may identify devices in other domains that may be used as part of a fog device with devices in the current domain. The device discoverer 11306 may use information provided by an orchestrator to discover other devices, as described herein. A trust builder 11308 may use various techniques to establish trust between the onboarding tool 11302, and an onboarding tool in another domain. The trust builder 11308 may exchange attestation information, identification keys, or may use an assigned trust certificate from an administrator workstation. In some examples, the trust builder 11308 may use a blockchain root-of-trust, as described herein.

A shared domain creator 11310 may work to assist the onboarding tool in working with onboarding tools from the other domains to create a shared domain. The shared domain may include a shared resource directory 11312 that is accessible to all of the onboarding tools across the different domains, or is mirrored in each of the IoT devices hosting onboarding tools.

Figure 114:
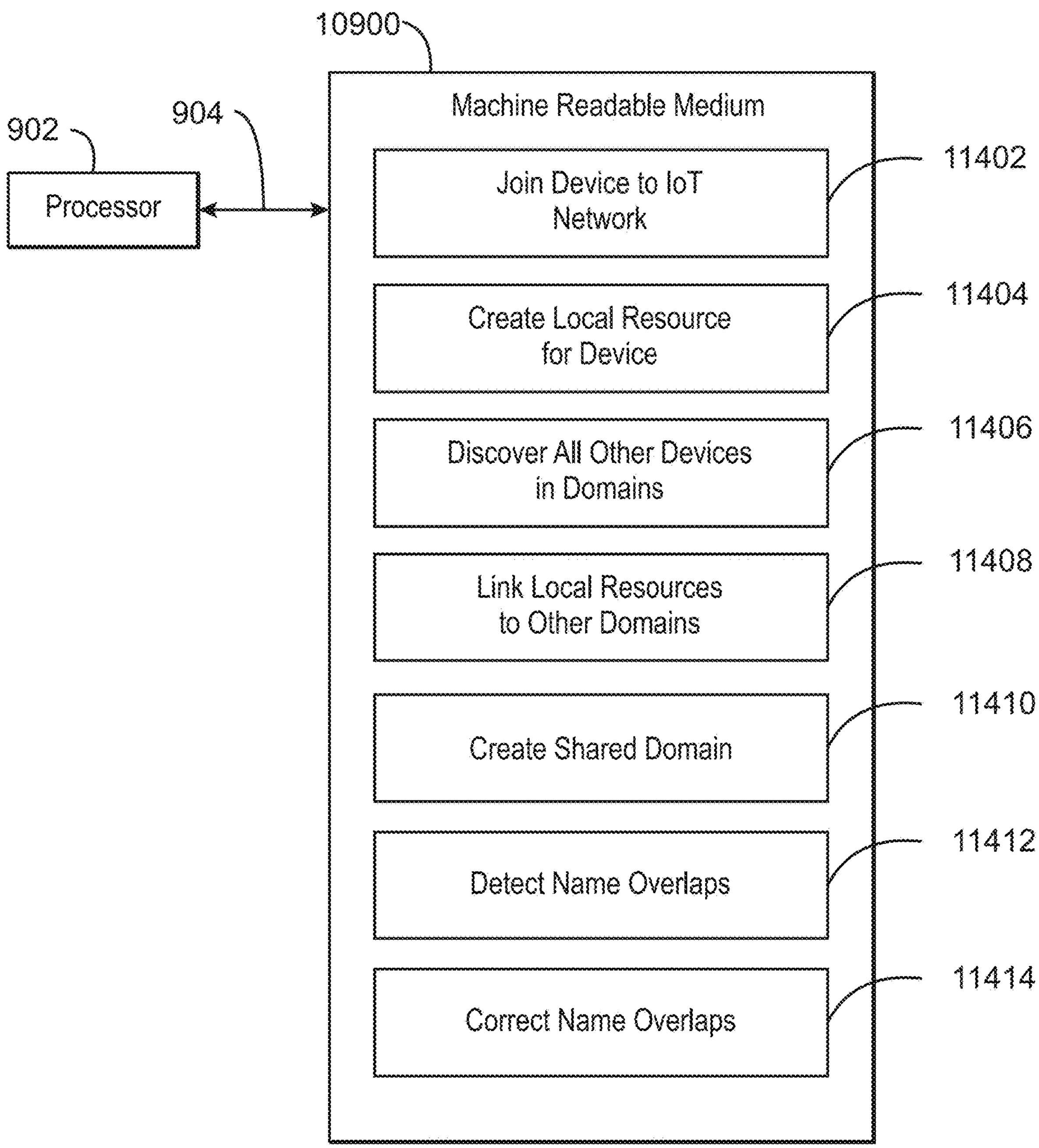
FIG. 114 is a block diagram of a non-transitory, machine readable medium including code to direct a processor to establish shared resources across domains in accordance with some embodiments.

FIG. 114 is a block diagram of a non-transitory, machine readable medium 11400 including code to direct a processor 902 to establish shared resources across domains in accordance with some embodiments. The processor 902 may access the non-transitory, machine readable medium 11400 over a bus 904. The processor 902 and bus 904 may be implemented in a manner similar to the processor 902 and bus 904 described with respect to FIG. 9. The non-transitory, machine readable medium 11400 may include devices described for the mass storage 808 of FIG. 8 or may include optical disks, thumb drives, or any number of other hardware devices.

The non-transitory, machine readable medium 11400 may include code 11402 to direct the processor 902 to join a device to a domain. Code 11404 may be included to direct the processor 902 to create local resources for the device in the domain. Code 11406 may be included to direct the processor 902 to discover relevant devices in other domains, including, for example, onboarding tools in those domains. Code 11408 may be included to direct the processor 902 to link resources for local devices to resources in other domains. Code 11410 may be included to direct the processor 902 to create a shared domain that holds the shared resources for all of the devices. Code 11412 may be included to direct the processor 902 to determine if there are any name, or ID, overlaps between domains, onboarding tools, and devices. Code 11414 may be included to direct the processor 902 to correct the name overlaps by renaming domains, onboarding tools, or devices that were last to join, and propagating the new names to all relevant resources.

The networking communication and authentication systems described above provide a number of aspects for implementing IoT networks for particular applications. In one example, a distributed network may be used to implement traceability of end products, such as food stuffs, pharmaceuticals, or industrial product.

For any lifecycle tracing system, there is the question of how the players in the system will establish trust that the system is behaving according to an expected behavior model versus something that is outside the model. The challenge is that the entity that defines good behavior may not be trustworthy. To that end, provincial trust, e.g. device-to-device, and institutional trust mechanisms, e.g., controlled by central authorities, have weaknesses. However, infrastructural trust may be a more reliable form of trust enforcement and that blockchain is a technology for implementing infrastructural trust. Therefore, the incorporation of devices in other domains, as described with respect to FIG. 110 may allow the formation of devices from groups of IoT devices, and the establishment of trust between those devices. This may be performed using various systems to establish trust, such as the blockchain roots-of-trust discussed with respect to FIG. 20.

In cases where a 'record key' is used, a method is provided for establishing trust properties of the record key. As the use of IoT to develop a traceability system that touches many industries, including new industries that have not yet been established, the framework, such as the blockchain trust described herein, may be useful for developing trust in the traceability system.

An exemplary IoT traceability system is described further with respect to FIGS. 115-120. The IoT traceability system may be implemented using an IoT network, as described with respect to FIG. 3, or a fog device, for example, as described with respect to FIG. 4. The IoT traceability system may cross domains, such as public and private domains, IP and IoT network domains, and through domains controlled by various suppliers or commercial entities.

Figure 115:
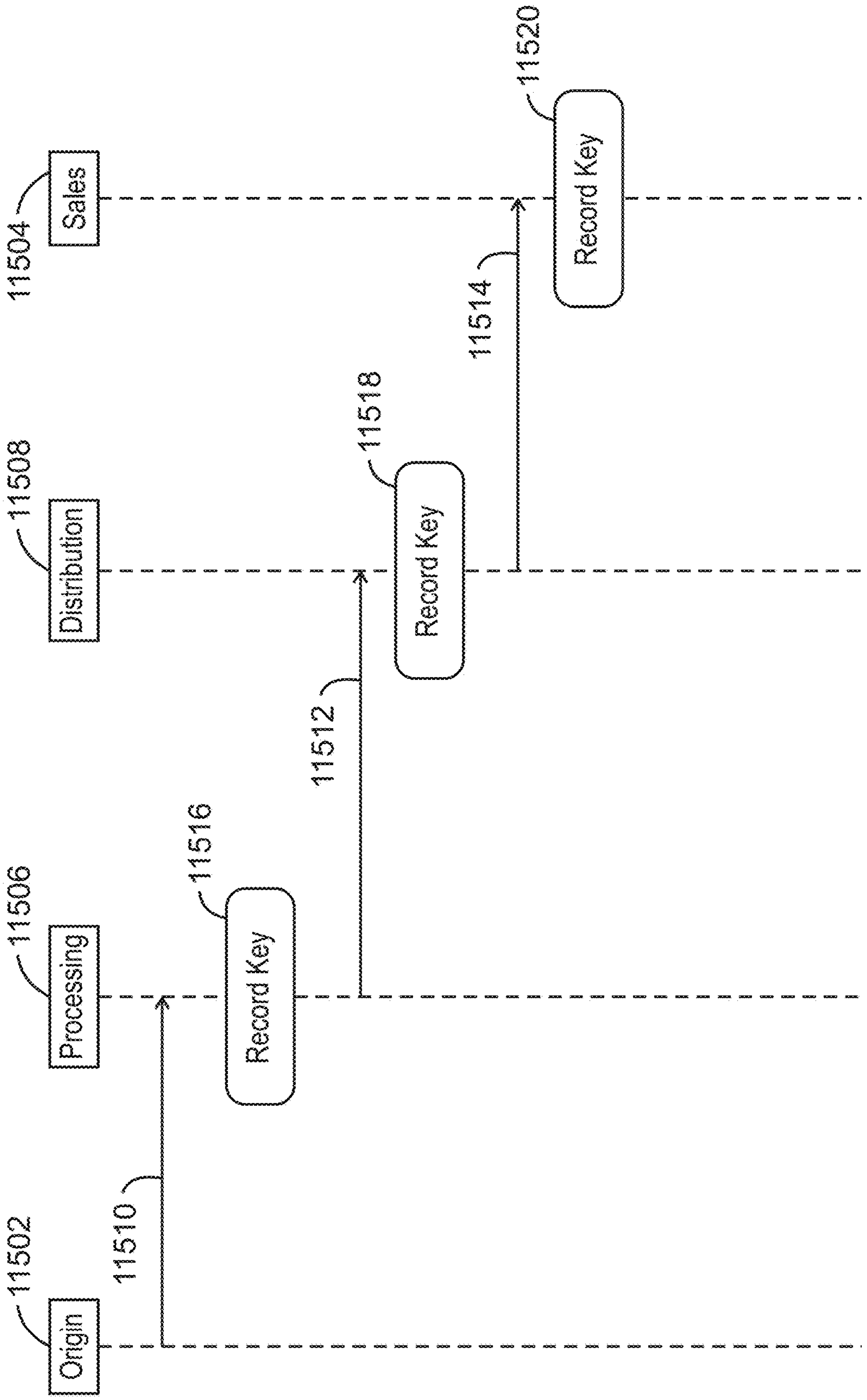
FIG. 115 is a ladder diagram showing a stages in a product lifecycle for the implementation of a product tracing system in accordance with some embodiments.

FIG. 115 is a ladder diagram 11500 showing stages in a product lifecycle for the implementation of a product tracing system in accordance with some embodiments. The ladder diagram 11500 of FIG. 115 may be implemented by the IoT device 11900 described with respect to FIG. 119. The traceability systems may implement the recording, storage, verification, securitization, and retrieval of chain of command and trace information from the origin 11502 of the product to the sales outlet 11504, for example, as it passes through a processing facility 11506 and distribution center 11508, among others. The information generated during the transitions 11510, 11512, and 11514 from one stage to the next is also relevant. For example, the transitions 11510, 11512, and 11514 occur as the product is moved from the origin 11502, such as a farm, to a processing plant 11506 or from the processing plant 11506 to a distribution center 11508. The information may include, for example, inventory, such as shipping date, product types, and amount, and transforms, such as harvest dates (for produce), production dates (for goods), storage temperature history, or any number of other parameters that affect changes in the products.

A record key 11516, 11518, and 11520 may be generated at one or more stages to store and access the information, termed traceability records herein, for that stage. It may be noted that traceability is an aspect of trust. Traceability presumes there is a method for establishing whether the trace histories are indicative of expected good behavior versus unexpected or inappropriate behavior. In cases where provincial and institutional trust are involved, it is possible for the criteria that defines expected, e.g., good, or unexpected, e.g., inappropriate behavior, are not well defined. The process of employing infrastructural trust, for example, through a blockchain, necessitates definition of these criteria and the use of a consensus truth regarding expected behavior. Hence, infrastructural trust may be the stronger approach for some cases. The traceability records may be stored in a publicly accessible store, private stores, or in a combination thereof. Further, traceability records may be partially stored in a public store, such as the record key, with the remaining details kept in private stores for access in troubleshooting later occurrences.

Figure 116:
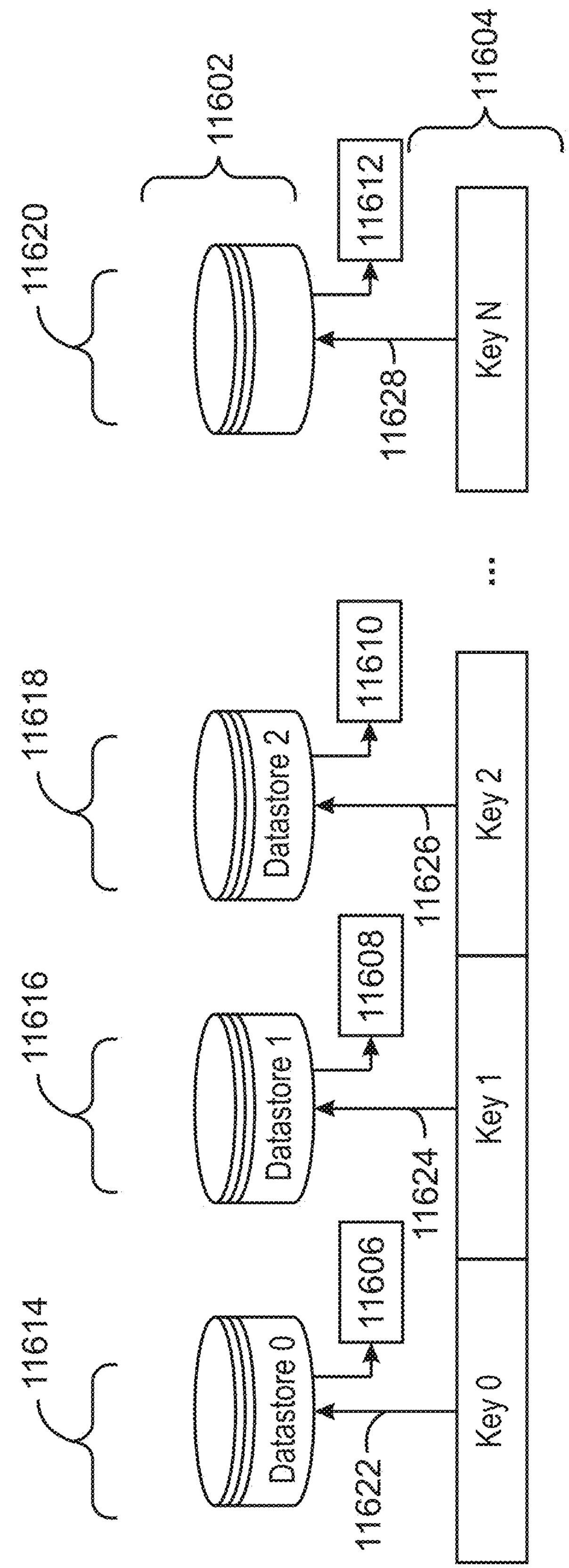
FIG. 116 is a schematic drawing of using private data stores, wherein a record key may be used to access the traceability records for each stage to in accordance with some embodiments.

FIG. 116 is a schematic drawing of using private data stores 11602, wherein record keys 11604 may be used to access the traceability records 11606 to 11612 for a stage 11614 to 11620 in accordance with some embodiments. In this example, the traceability records 11606 to 11612 that are accessible by the public may not include detailed processes or information associated with the farmer, manufacturer, and the like.

It may be useful to maintain a private/public boundary between basic traceability data, such as the record key, time, and place of origin, and the detailed proprietary task data from production facilities. This may increase the perceived privacy protections for entities at a stage 11614 to 11620, increasing a rate of adoption. In this example, calls 11622 to 11628 sent to the separate data stores 11602 is utilized to extract the traceability records 11606 to 11612. In some cases, the separate private data stores 11602 could present security and reliability issues as the private data stores 11602 are managed by different entities.

Figure 117:
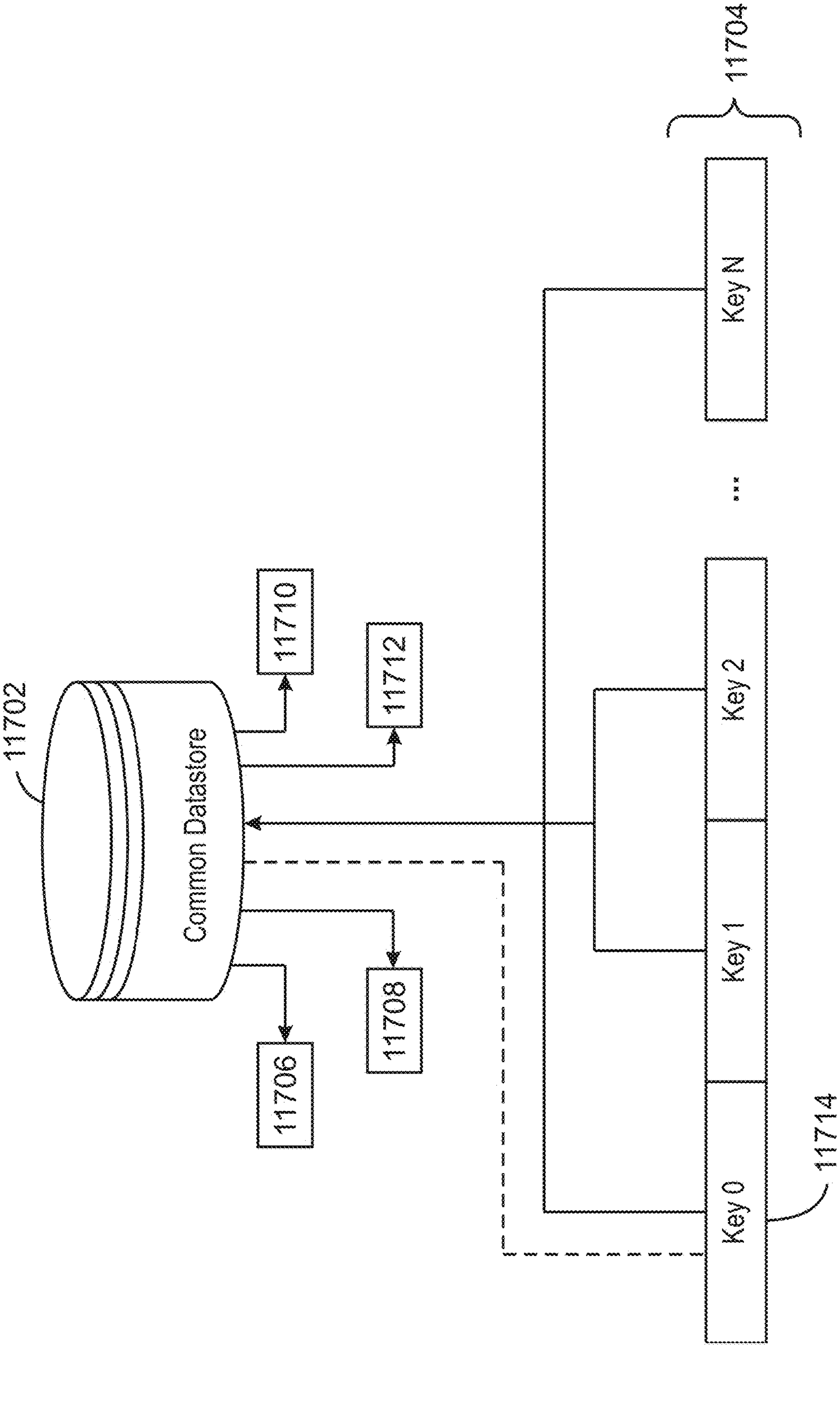
FIG. 117 is a schematic drawing of using a public or common data store in accordance with some embodiments.

FIG. 117 is a schematic drawing of using a public or common data store 11702 in accordance with some embodiments. In this example, the data may be stored publicly, but encrypted under the record keys 11704 for the different stages. The record keys 11704 may also act as indices for the common data store 11702, where chain of command and traceability data may be extracted. A record key 11704 may access and decrypt the traceability records 11706 to 11712 for a stage. For example, key 11714 may locate and decrypt traceability record 11706.

The record keys 11704 may be appended into a chain, and passed along through the stages, either physically or through markings on the product packaging. For example, an IoT device associated with the packaging of the product may join with a mesh network, or fog device, at a facility, such as a processing plant, upon delivery of the product to a loading dock.

The IoT device may follow the product through the processing plant and leave with the processed product, for example, in the associated packaging. As the IoT device is loaded into a truck for delivery to another stage, such as retail sales, the mesh network, or fog device, in the facility may program the IoT device with the record key 11704 for that stage. Once the IoT device leaves the stage, for example, losing contact with the mesh network for the processing facility, the traceability record for that stage may be saved to a public data store 11702, or to a private data store 11602 as described with respect to FIG. 116, or both.

Figure 118:
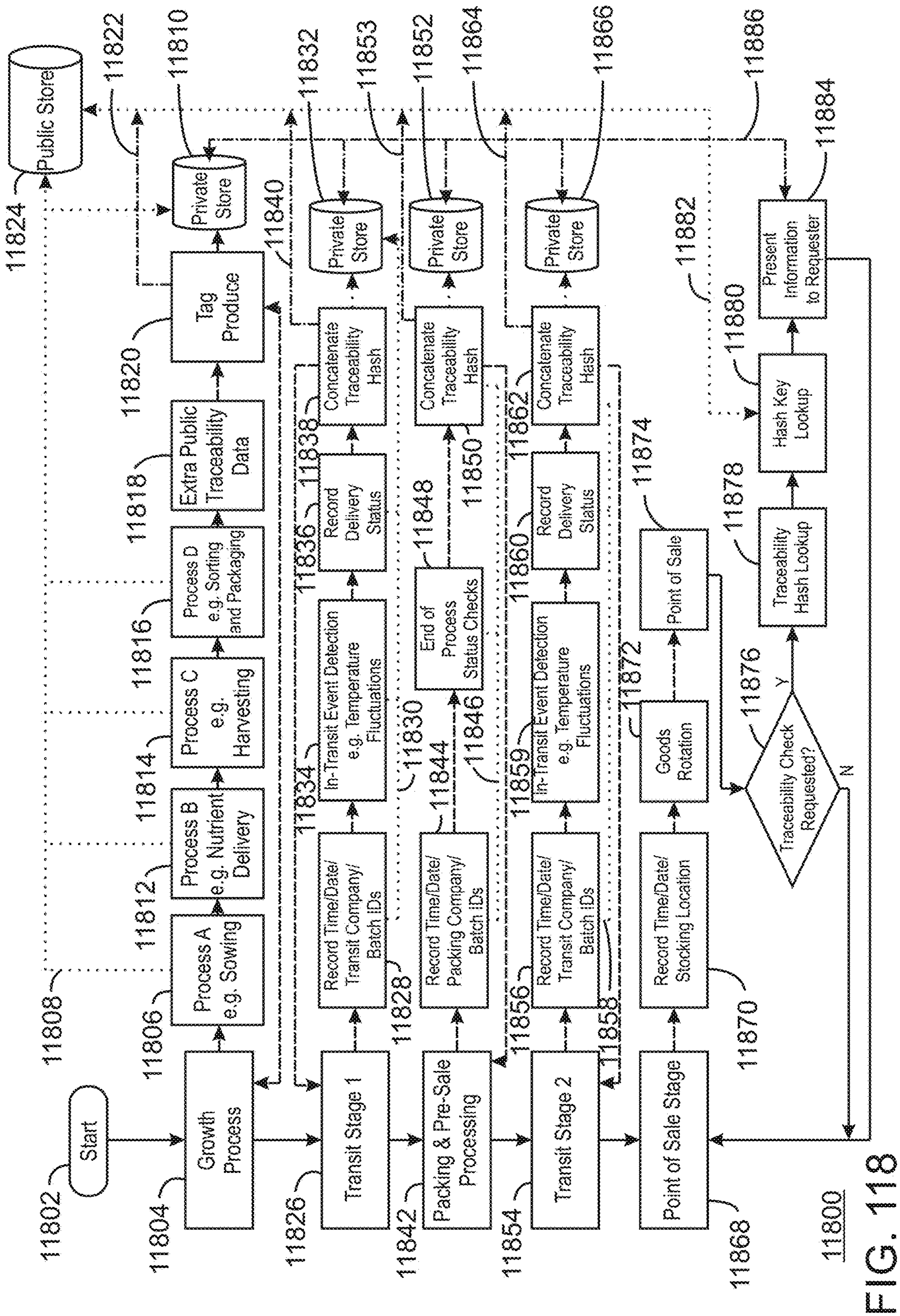
FIG. 118 is a schematic diagram of a process for implementing a traceability system in accordance with some embodiments.

FIG. 118 is a schematic diagram of an exemplary process 11800 for implementing a traceability system in accordance with some embodiments. The process 11800 of FIG. 118 may be implemented by the IoT device 11900 described with respect to FIG. 119. In this example, the product is produce, such as grain, fruit, and the like. In this case, the stages are directed to an action taken for the produce, such as growing, shipping, processing, and the like. While the stages below are discussed with respect to a specific product, the example applies to any type of product, grown or manufactured. Thus, actions in the first stage may concern actions taking place in, for example, a manufacturing plant as a product is built.

The first stage 11804 concerns the process lifecycle associated with the origination of the produce. The first stage 11804 may begin at block 11806 with the planting of the produce. The planting may be tracked and monitored by an IoT mesh network associated with the planting device, such as a tractor. Many tractors are equipped with GPS and computer monitors to direct the tractor on the most efficient course through the field. The IoT mesh network may include the on-board computers, as well as devices monitoring the seed drill planting the seeds, the seed reservoir, the planting temperature, the soil moisture level, and other planting parameters, as well as equipment parameters such as fuel level, compressor pressure for an air seeder, fuel levels, and the like. The data 11808 that is generated may be stored in a farm data store 11810, such as a central server. The tractor may be in continuous communications with the farm store 11810 over a LPWA network, LTE network, satellite uplink, or other radio network, or may store the data for downloading when the tractor reaches a main building or barn. The farm data store 11810 may be located at a remote site, for example, in the cloud.

At block 11812, the crop may be fertilized, for example, by injection of liquid ammonia. This may be monitored by the IoT mesh network associated with the tractor, with additional devices monitoring the nutrient applicator. These devices can monitor the anhydrous ammonia reservoir, injection pressure, and the like. Other processes can be monitored at this block in addition to, or instead of, the fertilization. This may include the application of solid fertilizers and irrigation. Solid fertilizer application may be monitored through the tractor IoT mesh network. Irrigation may be monitored through an IoT mesh network associated with an irrigation system, such as pumps, flow meters, pressure sensors, motors moving booms, and the like. The irrigation network may report to the central system through a radio link, such as an LPWA network. Data 11808 from these processes may also be stored in the farm data store 11810, for example, in a private blockchain.

At block 11814, the crop may be harvested, for example, using a combine. As for the tractor, combines often have an extensive computer control system including GPS and data collection. An IoT mesh network may be installed on the combine and joined to the computer system on the combine to track the produce as it is harvested. The mesh network may include devices that track the weight of the harvested material, the field locations for the harvested material, and other parameters that may be used for traceability.

In comparison to technologies that apply process control technologies to individual units, such as a tractor or combine, the IoT mesh network may include devices located on auxiliary vehicles, such as grain trucks, fuel trucks, and other devices. These may be used to provide a further record of the product location and transforms as it moves through multiple devices. Further, devices in fixed locations may participate in the IoT mesh network, such as devices in produce refrigerators, silos, and other crop storage areas, which track amount of stored product, water content, pest activity, dust amounts, and the like. These devices may be part of the farm network, or may be part of a corporate network that collects information primarily for the traceability record.

It can be noted that the product may have a minimal traceable unit, for example, the amount held in a combine, produce truck, grain truck, and the like. An amount below the minimal traceable unit may not be distinguishable as the tracking information only applies to the minimal traceable unit. Further, some commingling of the product may be expected in storage, for example, in a grain silo, although the flow characteristics may be used to determine the amount of commingling that is taking place. The same issue may apply to a pharmaceutical product, or other products in which a batch size may determine the minimal traceable unit.

At block 11816, the product may be sorted and packaged. For example, being loaded onto a truck or railcar. At block 11818, extra information may be added for a traceability record, such as time, date, location of the production, shipping company, and the like. This information may be included in the public information, or kept in the farm data store 11810.

At block 11820, the produce may be tagged for shipping. This may involve attaching an IoT device to the produce packaging, or otherwise associating an IoT device with the product, before shipping. The IoT device may store a record key from the farm data store 11810. In other examples, a barcode may be printed on the produce packaging before shipping. The tag may include the record key to access the traceability record from the farm data store 11810. The record key may also be sent 11822 to a public data store 11824, such as a public blockchain. From the public store 11824, record keys for a stage may be accessible.

At stage 2 11826, the product may be transported from the farm to production facility. At block 11828, the time date and transit company may be recorded as well as the batch IDs of the product. The data 11830 may be sent to a shipping store 11832, for example located on a computer or server associated with the truck. The shipping store 11832, may also be located at a central shipping office for the trucking company. In this case the data 11830, may be uploaded to the central shipping office through a radio uplink, for example an LTE link or a satellite link.

At block 11834, IoT devices, such as an IoT device associated with the product packaging, or other IoT devices on a truck or shipping platform, may monitor in-transit events. The in-transit events may include, for example, temperature fluctuations, G forces, transportation time, or delays in the transportation, among others. The data 11830, from block 11834 may also be sent to the shipping store 11832.

At block 11836, the delivery status of the product may be recorded. This may include the time, location, and date of delivery. The delivery data may be sent to the shipping store 11832. A record key may be created for stage 2 11826 and stored in the shipping store 11832, and appended at block 11838 to the record key for stage 1 11804. The record key may be transmitted 11840 to the public store 11824, and saved in an IoT device associated with the packaging. After stage one 11826 is completed the product may be at the loading dock of a processing facility.

At, stage 3 11842, the product is processed for sales. At block 11844, the time, date, packaging company, and batch IDs of the material is recorded. The data 11846 is sent to a processing data store 11852. This may include packaging and presale processing. For example, for a fresh cut salad the processing may include washing the ingredients, chopping the ingredients, mixing the ingredients, and packaging the ingredients. At block 11848, as each of the processes are conducted or completed, data on the status may be sent to the processing data store 11852. Once the processing is complete, at block 11850, the record ID for the stage 3 11842 is appended to the record ID for previous stages, saved to the processing data store 11852 and sent to the public store 11853. The packaged, processed product is then moved to a loading dock for stage 4 11854, to be transported to the final point-of-sale.

At each stage, the appended record keys may be saved in IoT devices associated with the packaging. As described herein, the IoT devices may also track in-transit events. In stage 4 11854, at block 11856 the time, date, transit company, and batch IDs for the product are recorded. The data 11858 may be sent to a shipping store 11866, for example, aboard the truck or located at the shipping company. At block 11859, the IoT devices monitor the shipping parameters for the product, for example, recording temperature fluctuations G forces and other parameters that may affect the quality of the product. The data 11858 from monitoring the shipping parameters, may also be sent to the shipping store 11866.

At block 11860, the product arrives at the destination, for example, a retail sales outlet. The delivery status is recorded, and at block 11862 a record ID, or key, is appended to the record ID, or key, for previous stages. The appended key may be stored by the IoT device, and sent 11864 to the public store 11824.

The final stage 11868, is the point of sale in this example. At block 11870, the time date and stocking location is recorded. The freshness of the product may be taken into account, at block 11872, for example, by the rotation of older goods to be replaced with the newer goods. At block 11874, the consumer purchases the product. The consumer may be a commercial company or may be a private individual purchasing the product at a store or other retail outlet.

After purchase, the consumer, or other entities, may wish to perform a traceability check on the product. For example, the traceability record may be accessed to determine an origin of a contamination in the product. At block 11876, a determination is made as to whether a traceability check has been requested. If so, at block 11878 the record key is accessed. At block 11880, this may be performed by obtaining the record key from an IoT device on the packaging or shipping container, or accessing the data 11882 from the public store 11824, using a SKU number or other package marking. The appended record key, comprising the concatenated record keys for the stages, is first checked for continuity from the origin to the point of sale. This process may involve a cyclic redundancy check of the full key, an XOR of the individual record keys with a check for zero to denote validity, or an online verification process involving a key lookup in a database or the public store 11824. At block 11884 the record key may be used to access 11886 data saved in the private stores 11810, 11832, 11852, or 11866.

Following verification, the data may then be presented to the requester. Available options may include displaying a full or partial path from the origin to sales to the requestor. Other options may include displaying a value or text message regarding the result of the traceability key, this may involve activating a sound, a color, an image, or other type of sensory alert to the requestor.

A blockchain may be an inherently traceable system, such that the IoT devices may make use of public and private blockchains as a way to establish trust in the operation of the IoT network using distributed trust semantics.

An auditing system may help ensure that the collection and storage of traceability hashes are managed correctly under a provincial trust method. A system such as that based on a TPM with a PKI for signing PCR measurements of traceability hashes may be a strategy that relies on institutional trust. A method that builds the private store around a blockchain or hierarchy of blockchains employs infrastructural trust.

Figure 119:
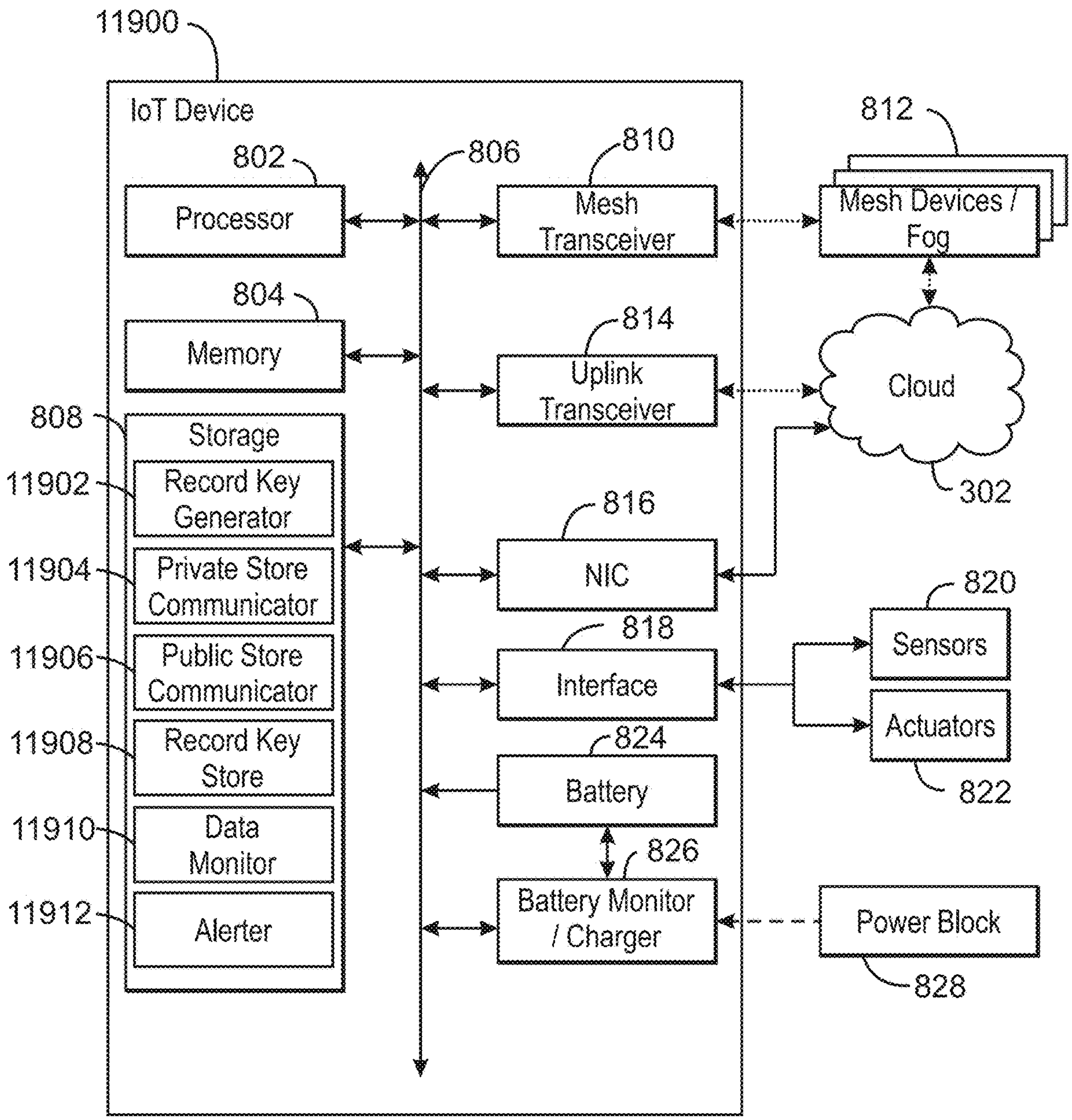
FIG. 119 is a block diagram of an example of components that may be present in an IoT device for providing traceability records for a product in accordance with some embodiments.

FIG. 119 is a block diagram of an example of components that may be present in an IoT device 11900 for providing traceability records for a product in accordance with some embodiments. Like numbered items are as described with respect to FIGS. 3 and 8. It can be noted that different components may be selected and used for the IoT device 11900 than for those selected for the IoT device 800 discussed with respect to FIG. 8, and other IoT devices discussed herein.

The mass storage 808 may include a number of modules to implement the traceability of records for a product, as described herein. Although shown as code blocks in the mass storage 808, it may be understood that any of the modules may be fully or partially replaced with hardwired circuits, for example, built into an application specific integrated circuit (ASIC).

The mass storage 808 may include a record key generator 11902 that generates a record key at the production and sales stages, which may include generating the record key at a stage. A private store communicator 11904 may communicate with a private store to save the record key and data collected from the IoT device 11900, and other IoT devices 812, at the production or sales process stages. A public store communicator 11906 may communicate with the public store to save the record key to the public store. The public store communicator 11906 may save other information to the public store, such as transit temperature, transit time, and the like. The public store communicator 11906 may save the appended record keys for all stages from a record key store 11908 to the public store. A data monitor 11910 may monitor sensors 820, such as temperature sensors, G4 sensors, and others, over the interface 818, to determine if there have been any transit problems, such as temperature extremes, shock extremes, and the like, for the product. An alerter 11912 may activate an actuator 822 over the interface 818, for example, a light, sound, or other device, if an in transit limit, such as temperature, has been breached. The alerter 11912 may also store any in transit breaches to the public data store, for example, through the public store communicator 11906.

Figure 120:
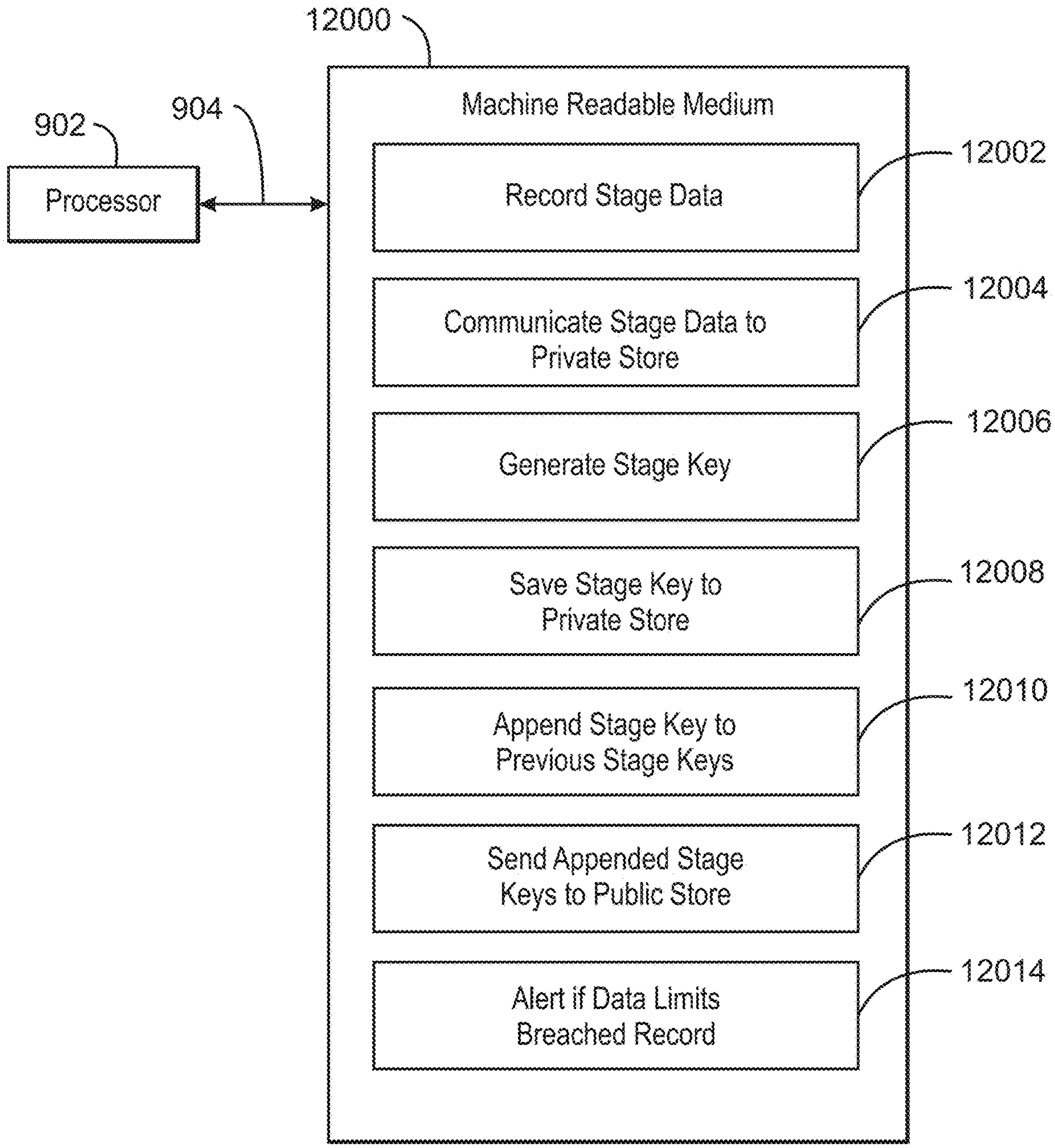

FIG. 120 is a block diagram of a non-transitory, machine readable medium 12000 including code to direct a processor 902 to share resources across domains in accordance with some embodiments. The processor 902 may access the non-transitory, machine readable medium 12000 over a bus 904. The processor 902 and bus 904 may be as described with respect to FIG. 9. The non-transitory, machine readable medium 12000 may include devices described for the mass storage 808 of FIG. 8 or may include optical disks, thumb drives, or any number of other hardware devices.

The non-transitory, machine readable medium 12000 may include code 12002 to direct the processor 902 to record data while a product is in a processing or shipping stage. Code 12004 may be included to direct the processor 902 to communicate the stage data to a private store. Code 12006 may be included to direct the processor 902 to generate a record key for a stage. Code 12008 may be included to direct the processor 902 to save the record key for the stage to the private store. Code 12010 may be included to direct the processor 902 to append the record key for the stage to previous record keys for previous stages. Code 12012 may be included to direct the processor 902 to send the appended stage keys to a public store. Code 12014 may be included to direct the processor 902 to alert if data limits, such as temperature limits, among others, have been breached during a stage. Code 12014 may be included to direct the processor 902 to save the data limit breach to the public store.

Policies are defined as a set of rules to manage and control access to network resources. A policy may include a set of events, conditions, actions, subjects and targets. A policy aggregates the events, conditions, actions, subjects and targets into a policy structure that directs a device or network to respond to conditions that arise.

However, for IoT mesh networks, such as in the different stages of the production process in the example above, the propagation of policies may need to be addressed. Further, the use of widely distributed IoT networks may increase the relevance of policies, such as policies to protect the security of data, to change the data collected, or to increase the accessibility of that data.

Figure 121:
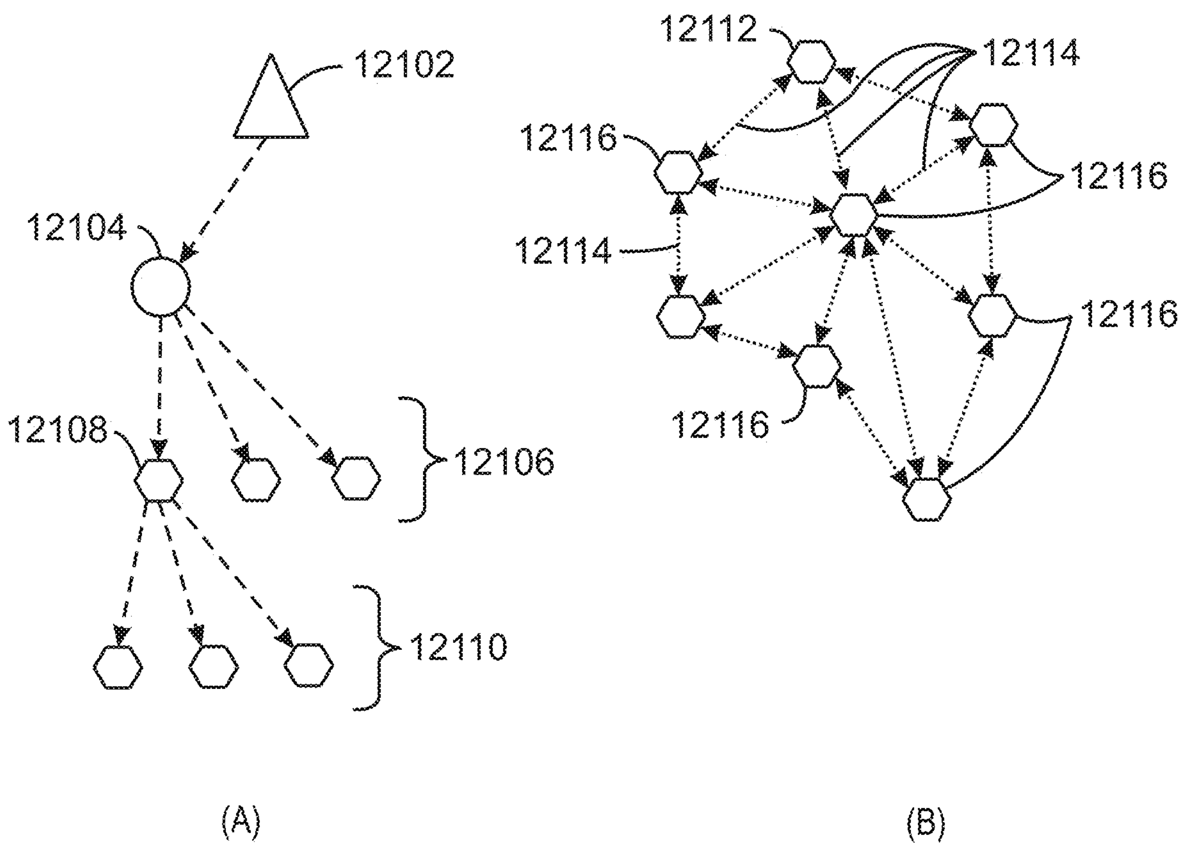

FIG. 121(A) is a schematic drawing of a hierarchical policy management system 12100 used in computer networks in accordance with some embodiments. An approach for the real time management of device policies is a hierarchical broadcast architecture. This may be replaced with a publication-subscription model based on bloom filters, as described herein. The typical flow is from a central system, such as a centralized cloud server 12102, which propagates policies to subunits, such as a gateway 12104. The gateway 12104 may then propagate the policy to a lower level 12106, including IoT endpoint devices 12406. One of the IoT endpoint devices 12108 may then propagate the policies to a lower level 12110, for example, to sensor devices or other units.

In the hierarchical policy management system 12100, the individual devices are directly addressable. By its nature the deployment of policies in this architecture may require the administrator to explicitly know the address of all the targeted nodes and how to replace defective nodes, or policies. In addition, devices may often store a limited number of policies in the local memory due to resource constraints and replace the policies when additional policies are implemented.

As described herein, a distributed policy-based management framework may be implemented to store, locate, access, and execute policies in a network. This framework may use a peer-to-peer (P2P) policy storage and deployment mechanism to utilize available memory, for example, in the IoT mesh network. This may result in a policy system that helps with respect to node failure, and single points of failure.

FIG. 121(B) is a schematic drawing of policy management in a peer-to-peer (P2P) network, such as an IoT mesh network in accordance with some embodiments. In the P2P network, a coordinator 12112, such as a gateway, distributes policies 12114 to neighbors, such as coupled nodes 12116, which may be the nearest neighbors. These neighbors may then pass the policy along to other coupled nodes 12116.

As the IoT mesh network scales and becomes heterogeneous in nature, large numbers of policies may need to be defined and continuously amended to help ensure the IoT mesh network satisfies operational objectives. Autonomic network management, such as distributed policy management, may automate and distribute the decision making processes involved in optimizing network operations. This may enable administrators to focus less on low-level device configuration processes. Incorporating policies into an autonomic management system may involve methods and algorithms for policy translation, code generation, conflict analysis and policy enforcement.

Figure 122:
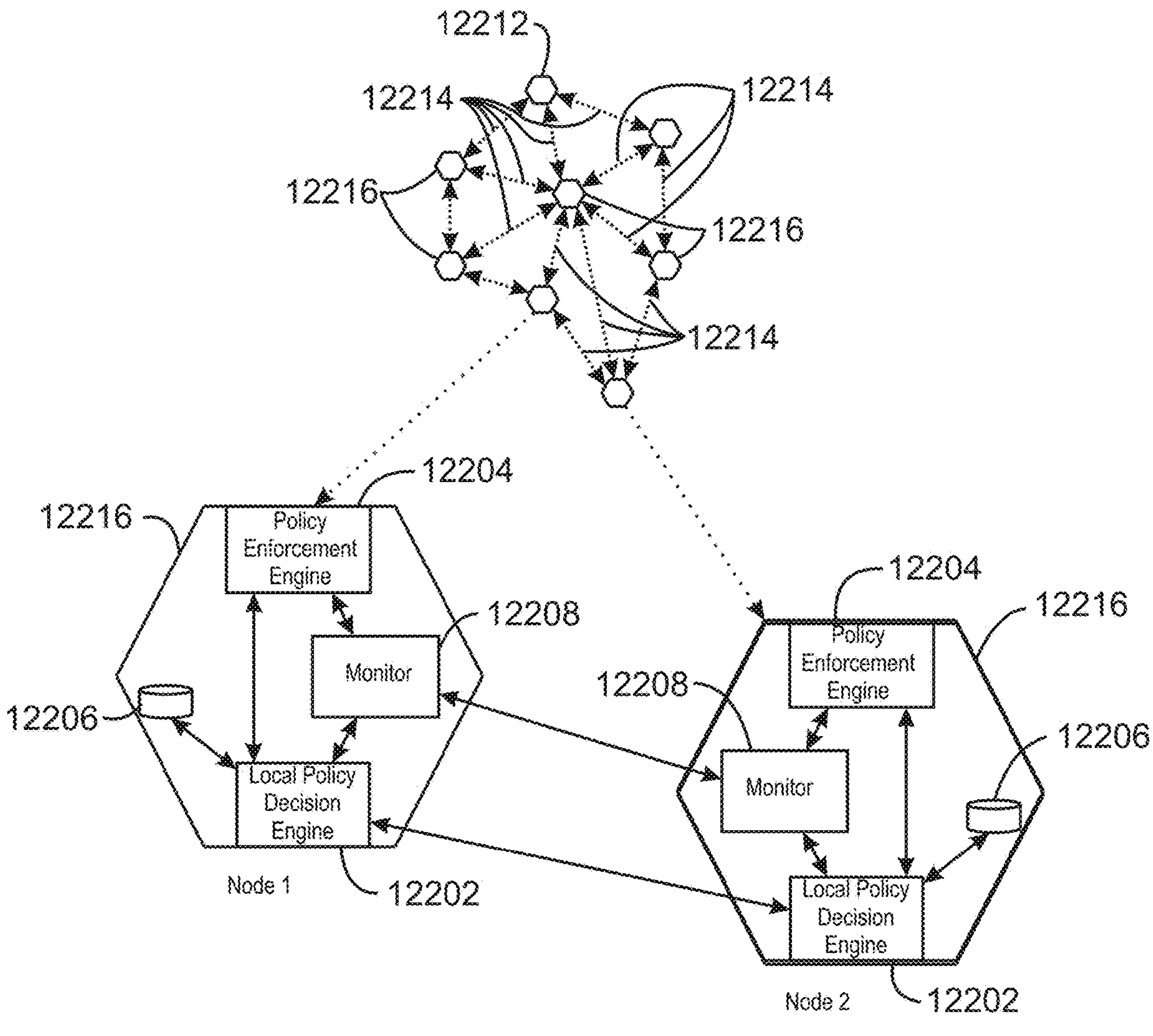

FIG. 122 is a schematic diagram of systems in nodes 12116 to implement a distributed policy management system 12200 in accordance with some embodiments. Like numbered items are as discussed with respect to FIG. 121. Each of the nodes 12116 may implement a policy decision engine 12202, a policy enforcement engine 12204, a policy repository 12206, and a monitor 12208. The policy repository 12206 stores the policies for the node 12116, which may not require a high storage capacity. The policy decision engine 12202 makes decisions on which policies are going to be enforced that are passed to the policy enforcement engine 12204. The decisions may be based on the policies stored in the policy repository 12206 as well as on state information reported by the monitor 12208. The policy decision engine 12202 interacts with other nodes 12116 in order to distribute policies to non-configured nodes. In a non-configured node, the policy decision engine 12202 may communicate with other nodes 12116 to access policies.

The policy enforcement engine 12204 implements policy decisions provided by the local policy decision engine 12202. The local policy enforcement engine 12204 also collects information about its state, network traffic, transmission errors and information reported to it from the monitor 12208.

The monitor 12208 interfaces to the local policy enforcement engine 12204 and to monitors 12208 in other nodes 12116. The monitor 12208 collects information at specific intervals and stores it in a database, for example in the local policy repository 12206. Examples of information that may be collected by the monitor 12208 include current device configuration, capabilities and functions supported by each node. Other information that can be collected by the monitor 12208 includes information about the services which are being offered, node requirements for the network, resource availability estimation, triggered events, and the like.

Figure 123:
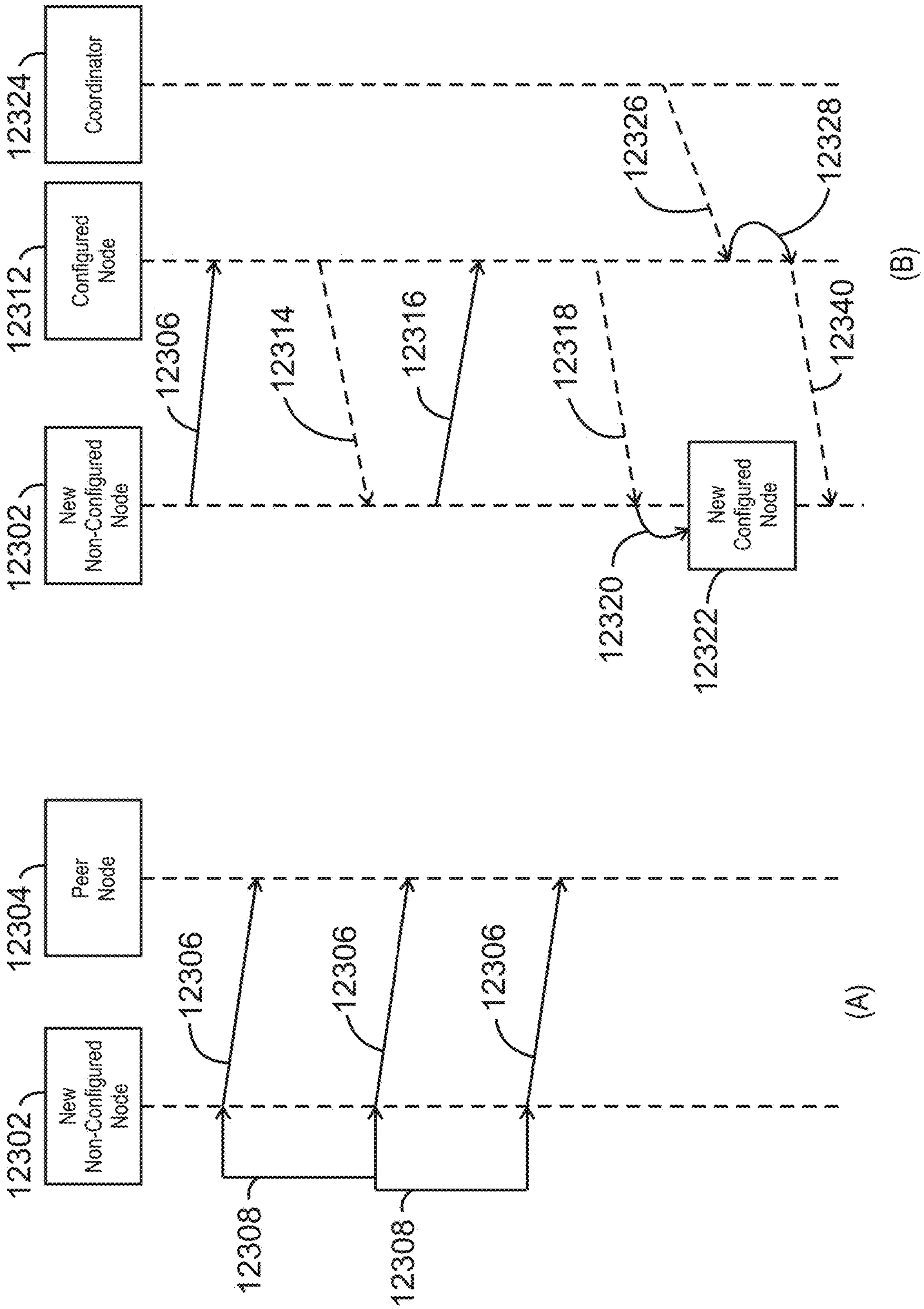

FIG. 123(A) is a ladder diagram of an example method 12300 of a new non-configured node 12302 attempting to discover policies on a network, for example, from a peer node 12304 in accordance with some embodiments. The method 12300 of FIG. 123(A) may be implemented by the IoT device 12600 described with respect to FIG. 126. When the new non-configured node 12302 joins the network it initiates a policy discovery action. It may broadcast a discover message 12306 to a peer node 12304 and wait until a discover timeout timer 12308 expires. If it does not receive any response, it re-sends the discover message 12306.

The roles of a coordinating node, configured nodes and new non-configured nodes may be modeled using a pub-sub notification system using bloom filters, as described herein. In this example, a bloom filter 'router' node may serve as a coordinator node to help ensure that new non-configured nodes can find existing configured nodes. Existing configured nodes are publishers of the policy objects they currently implement. New non-configured nodes may subscribe to the policy objects of the configured nodes. Changes or updates to configured nodes' policy objects may generate a cascade of notification traffic that may permeate the network.

FIG. 123(B) is a ladder diagram of an example method 12310 of a new non-configured node 12302 discovering policies from a configured node 12312 in accordance with some embodiments. The method 12310 of FIG. 123(B) may be implemented by the IoT device 12600 described with respect to FIG. 126. The configured node 12312 has a high level policy that satisfies an objective of the network. In one example, the high level policy may include how devices in the network are to handle communications to balance quality of service with power reserve. Any number of other policies may be implemented. The new non-configured node 12302 sends a discover message 12306 to the configured node 12312. The configured node 12312 responds with an offer message 12314.

Upon receiving the offer message 12314, the non-configured node 12302 checks the message. If the offer is accepted, it sends an accept message 12316 as a response. Otherwise, a reject message is sent back to the configured node 12312.

Upon receiving the accept message 12316, the configured node 12312 sends an InitPolicy message 12318 to the non-configured node 12302. The InitPolicy message 12318 incorporates the policies to be sent to the non-configured node 12302. The non-configured node 12302 processes the policy objects, installs the policies, and updates 12320 its state to a configured node 12322.

An updated policy may be dispatched, for example, from a coordinator 12324, in an update message 12326 that is received by a configured node 12312. The configured node 12312 may perform an update 12328 to the policy in force following validation and policy integrity checks.

The validation check may determine whether the policy conflicts with a current objective. For example, a policy directing all devices to conserve power may be dispatched to all the nodes in a network. As described herein, this may be described in terms of a pub-sub system, in which a power management policy is enumerated and subscribed to as the pub-sub "topic". For example, a policy direction that says to operate at power level 4 may be published to subscribers of the power management topic. An efficient bloom filter based message delivery system will help ensure subscribers of the power management topic will be notified of the policy change.

If the policy object implies a security or safety critical function then receipt of the topic notification message may be followed by opening a secure session to a policy decision point where the node may authenticate and establish end-to-end security credentials before acting on the notification. However, the nodes may already be actively implementing a policy which requires the devices to maintain a particular quality of service (QoS). The implementation of the power conserving policy could conflict with the QoS policy. Therefore, the new policy may be rejected.

If the policy does fail a validation check, the update may perform a partial replacement of the policy in force. A partial replacement may involve the calculation of a differential between the current policy in force and the updated policy. The partial update can potentially reduce the impact of a complete policy change by only modifying the affected policy parameters or conditions. This is discussed further with respect to FIG. 124.

The update message 12326 may also involve a concatenation of policies. This is especially applicable in distributed and dispersed network environments where a base level policy is augmented by additional policy rules received from neighboring nodes. This is discussed further with respect to FIG. 125.

If a configured node 12312 has updated or replaced a policy, a conflict alert message 12340 may be sent to another configured node 12322 to alert it to the policy conflict. Policy conflict analysis processes must be efficient and scalable to cope with the dynamic nature and size of such communications networks. A policy selection process for policy conflict analysis may maintain a history of previous policy comparisons in a tree based data structure to reduce the number of comparisons required in subsequent iterations.

Figure 124:
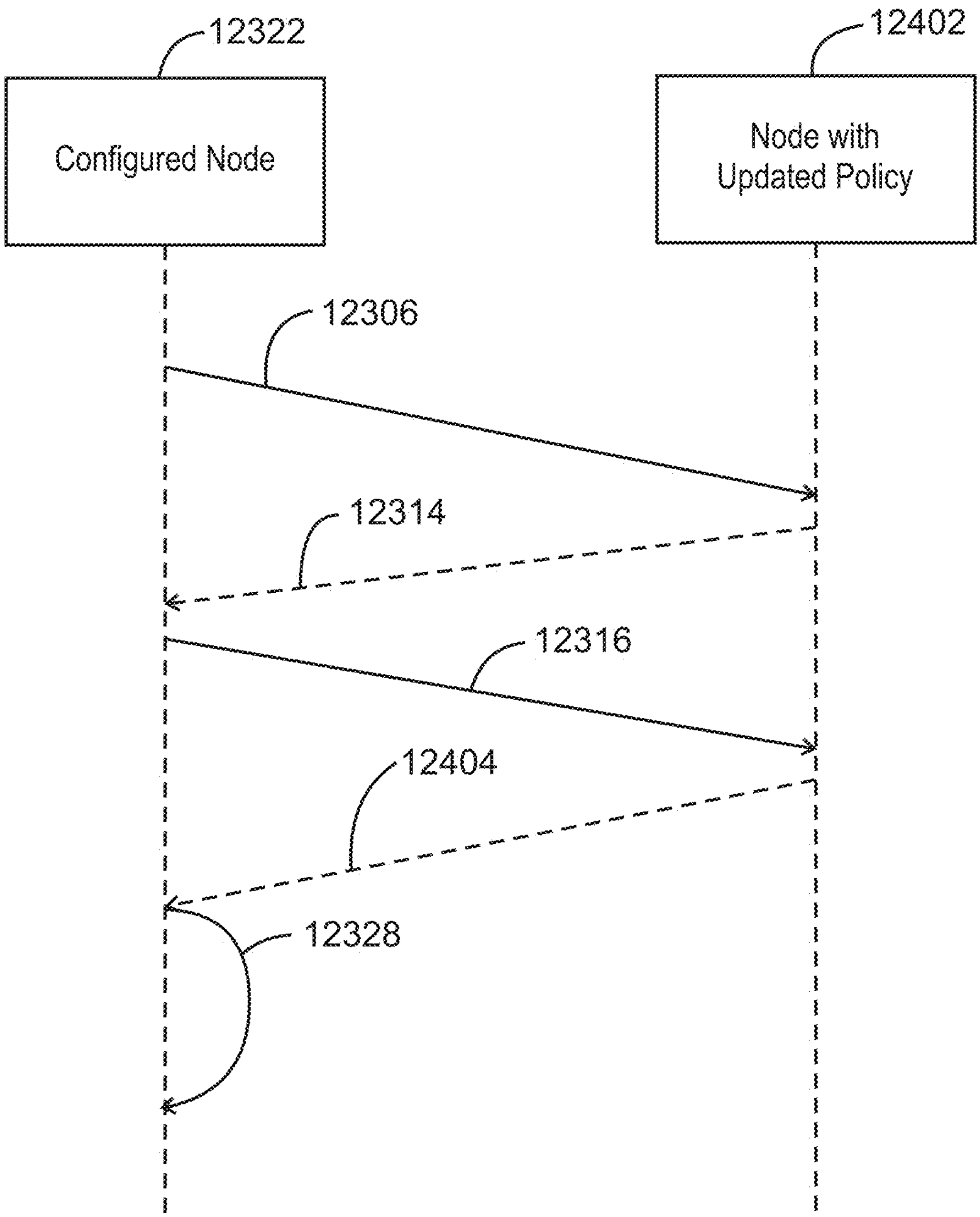

FIG. 124 is a ladder diagram of an example method 12400 of a configured node 12322 communicating with a node 12402 having an updated policy to update the policies of the configured node 12322 in accordance with some embodiments. The method 12400 of FIG. 124 may be implemented by the IoT device 12600 described with respect to FIG. 126. Like numbered items are as described with respect to FIG. 123. This may occur, for example, when the configured node 12322 receives a conflict alert message 12340 from the other node 12402. The configured node 12322 may send a discover message 12306 to the updated node 12402.

The updated node 12402 may reply with an offer message 12314 that alerts the configured node 12322 to the policy update. The configured node 12322 may then reply with an accept message 12316 to indicate to the updated node 12402 that it may send the updated policy. The updated policy may then be sent in an update message 12404 from the updated node 12402 to the configured node 12322. After validation and policy integrity checks the configured node 12322 may then perform 12328 a complete or partial replacement of a policy in force.

To determine if only a partial replacement is needed, a method may be implemented to calculate a delta between the policies. For example, a comparison may be made between individual rules in the new policy and the old policy to determine if rules have been added, removed, or modified, such as by the change of a parameter value for the rule. In a bloom filter model, the different tenants of a policy are representable as notifications in the bloom filter. Changes in policy decision are propagated to policy enforcement points, who are the subscribers to PDPs which are the publishers. The same efficiency aspects afforded by bloom filter notification messaging, as described herein, may be leveraged to implement distributed policy management.

As the number of IoT devices scales, appropriate delta technology will be integral to a distributed policy management system. A smaller file size for a delta file may lower the update file size that is distributed over the network, taking less time, and causing less network congestion. As policy updates may be varied in terms of priority, complexity, and size, sending only the changes may generate smaller files. These files would effectively encapsulate the difference (or delta) between the currently policy and the new policy, for example, by selecting an adaptive delta compression technique based on the requirements or desires of the client.

Policy updates may also take into account limitations of the hardware on the client-side. For example, in various IoT mesh networks, such as automotive Electronic Control Units (ECUs), embedded modules, and Machine-to-Machine (M2M) devices used in utilities, manufacturing, and logistics, devices may be constrained. A compressed file that is sent out can only be reconstructed according to the capacity of the hardware. It may be limited by CPU, memory and storage. If the receiving device doesn't have the resources to implement a policy change, then the sender may need to anticipate this. These restrictions may vary from device to device so an adjustable and adaptive system may need to be able to compress accordingly.

The ability to incorporate historical information into the selection process may be performed by a two phase approach in the conflict analysis algorithm. The first phase of the algorithm initializes a relationship pattern matrix between a candidate policy and a deployed policy, the second phase matches this pattern against a conflict signature. Some solutions compare candidate policies against all deployed policies sequentially. However, the exemplary approach described herein may reuse the patterns already discovered from previous iterations of the algorithm to reduce the number of comparisons. Performance improvements may be made using this approach, but the degree of this improvement may depend on the nature of the relationships between deployed policies.

The policies may be tiered. For example, a policy may have a flag that requires it be implemented without hypothesis checking. Conversely, a node could suggest a policy compromise in the event that it could not implement a policy. This could be conducted in a closed loop system. An example may be a policy that requests that the IoT devices increase transmission intervals from every 5 minutes to every 5 hours. If implemented this policy could breach the QoS requirements for the device. The device may offer a transmission rate of every hour.

It may be appreciated that a set of policies representing the available parameters controllable by a site policy may be modeled using a set of policy object identifiers, each corresponding to a notification message further representable by a bloom filter, as described herein. An existing notification delivery capability based on bloom filters may be leveraged to deliver notifications corresponding to policy changes imposed by a network administrative entity. When a policy change notification is received, the node may open a secure connection to a policy server to obtain further direction regarding policy enforcement point adjustments.

Non-file base policies may be implemented for enhanced security. Further, non-file based systems could be used for storing polices in devices lacking storage outside of RAM. According to some aspects, when a device receives a policy, the policy isn't stored, instead certain parameters are, for example, updated in RAM and implemented on the fly. Further, policy parameters may be stored in ROM. In a secure lightweight device, the execution of the policies may be performed from ROM with some parameters read from RAM. Thus, a ROM may act as the kernel with all other features operating in RAM.

Figure 125:
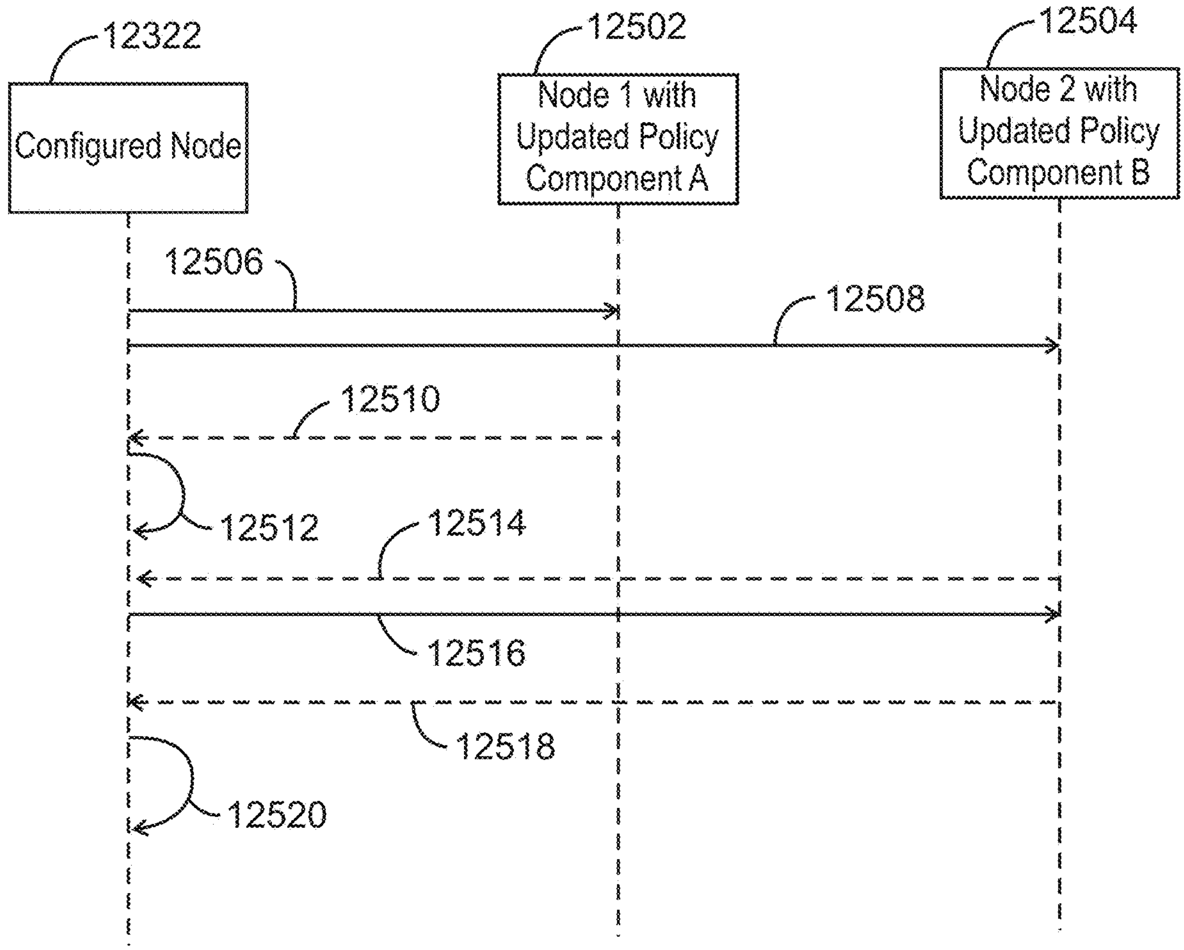

FIG. 125 is a ladder diagram 12500 of an example method for the concatenation of policies obtained from different nodes by the configured node in accordance with some embodiments. The method 12500 of FIG. 125 may be implemented by the IoT device 12600 described with respect to FIG. 126. Like numbered items are as described with respect to FIG. 123. In this example a first node 12502 has updated policy component A, while a second node 12504 has updated policy component B. The configured node 12322 may have received a conflict alert message 12340 indicating that it needs to update policies in the configured node 12322. The configured node 12322 sends a first discovery message 12506 to the first node 12502. The configured node also sends a second discover message 12508 to the second node 12504. In response, the first node 12502 sends a policy update message 12510 to the configured node 12322. The policy update message 12510 includes policy component A, which the configured node 12322 appends 12512 to the current policy.

The second node 12504 sends an offer message 12514 to the configured node 12322, letting the configured node 12322 know that the second node 12504 has policy component B. The configured node 12322 sends an acceptance message 12516 to the second node 12504, letting it know that it accepts the update. The second node 12504 then sends a policy update message 12518, which includes policy component B, which the configured node 12322 appends 12520 to the current policy. This results in a policy configuration for the configured node 12322 that is a combination of the policy components from the various other nodes, as shown in Table 3.

If a bloom filter structure is used for policy distribution, the policy object may associate a policy object identifier (OID) with line items in the policy structure where each policy OID may correspond to a bit in a bloom filter. In this example, every node implementing a set of OIDs may subscribe to the bloom filter covering an OID. Consequently, the same notification system that implements pub-sub routing may be leveraged to implement a distributed policy enforcement method.

TABLE 3

| Policies in the configured node |
|---|
| POLICY |
| Base Level |
| Policy component from node 1 |
| Policy component from node 2 |
| ... |
| Policy component from node N |

The nodes in a mesh network are not limited to implementing all of the same policies, or all in the same way. For example, a node that is experiencing a low battery may implement a policy to conserve battery power, while other nodes not sharing this limitation may continue with policies that maintain a QoS.

Figure 126:
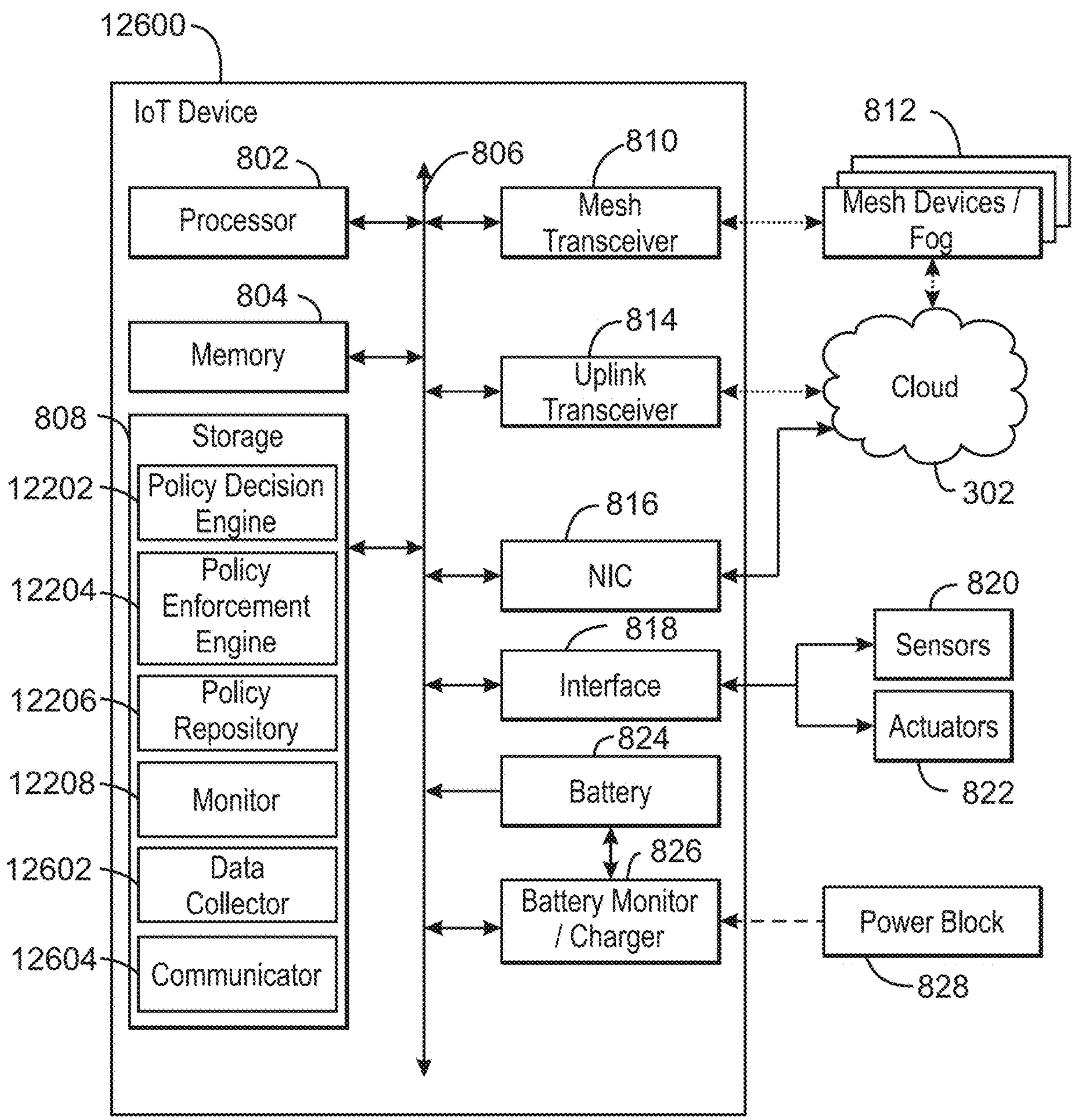

FIG. 126 is a block diagram of an example of components that may be present in an IoT device 12600 for the distributed management of policies in accordance with some embodiments. Like numbered items are as described with respect to FIGS. 3, 8, and 122. It can be noted that different components may be selected and used for the IoT device 12600 than for those selected for the IoT device 800 discussed with respect to FIG. 8, and other IoT devices discussed herein.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a policy decision engine 12202 to determine which policies are going to be enforced. A policy enforcement engine 12204 implements the policy decisions. A policy repository 12206 stores the policies for the IoT device 12600. The monitor 12208 communicates with monitors in other nodes in the mesh network 812, and collects information including, for example, the device configuration, capabilities, and functions supported by the nodes.

A data collector 12602 may collect data from the sensors 820 through the interface 818. A communicator 12604 may transfer the data collected from the data collector 12602 or from other units such as the monitor 12208 or the local policy decision engine 12202, to other devices in the mesh 812 or in the cloud 302.

Figure 127:
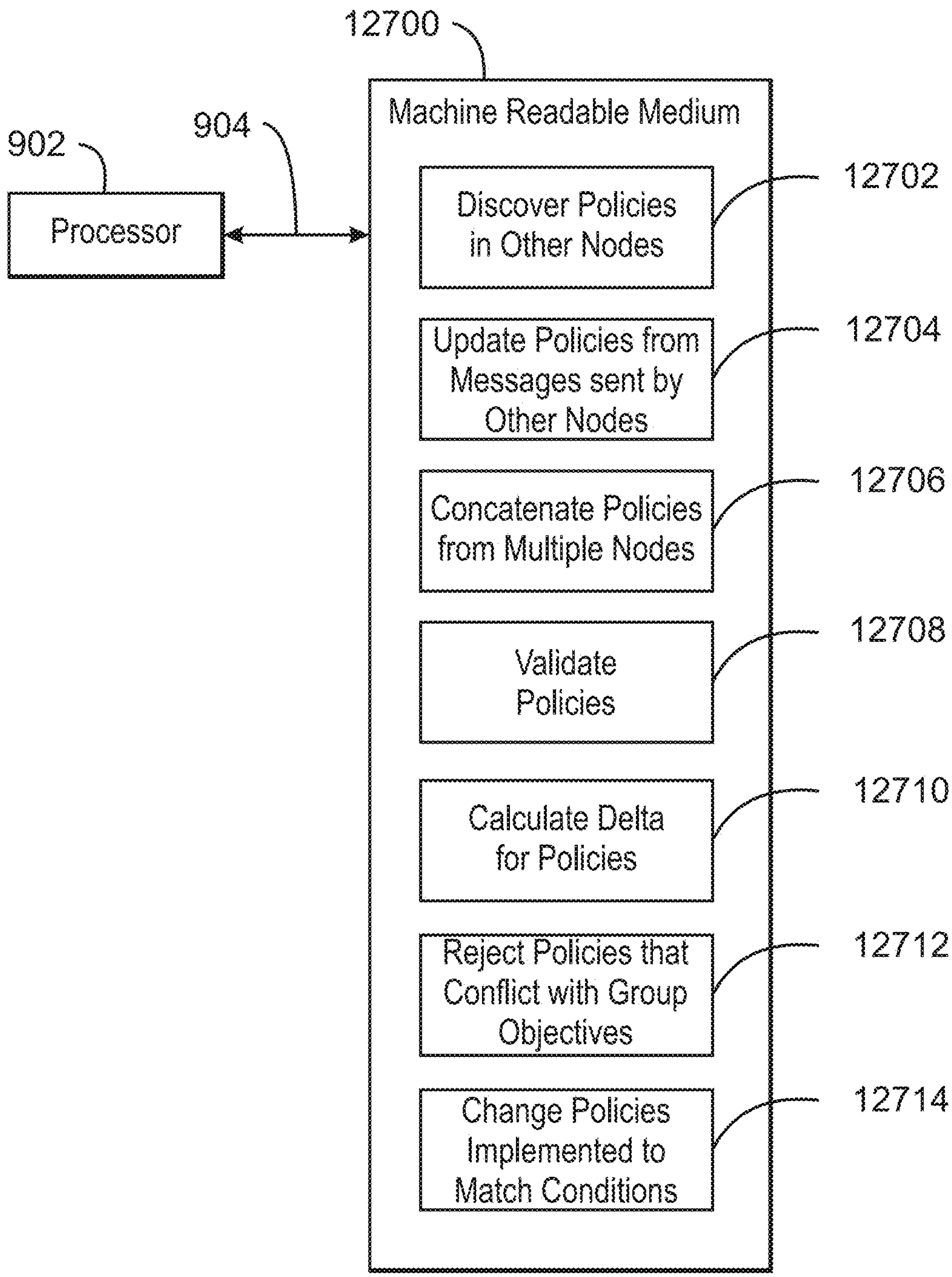

FIG. 127 is a block diagram of a non-transitory, machine readable medium 12700 including code to direct a processor 902 to manage policies in an IoT network in cooperation with other IoT devices in accordance with some embodiments. The processor 902 may access the non-transitory, machine readable medium 12700 over a bus 904. The processor 902 and bus 904 may be as described with respect to FIG. 9. The non-transitory, machine readable medium 12700 may include devices described for the mass storage 808 of FIG. 8 or may include optical disks, thumb drives, or any number of other hardware devices.

The non-transitory, machine readable medium 12700 may include code 12702 to direct the processor 902 to discover policies in other nodes. Code 12704 may be included to direct the processor 902 to update policies from messages sent by the other nodes. Code 12706 may be included to direct the processor 902 to concatenate the policies obtained from multiple nodes. Code 12708 may be included to direct the processor 902 to validate the policies obtained from the other nodes. Code 12710 may be included to direct the processor 902 to calculate a Delta, or change, for policies from current policies.

Code 12712 may be included to direct the processor 902 to reject policies that conflict with group objectives. The code 12712 may be included to direct the processor 902 to negotiate partial implementation of policies that conflict with group objectives. Code 12714 may be included to direct the processor 902 to change policies implemented to match current conditions.

In addition to distributing policies and performing functions, maintaining the availability of IoT devices is relevant, for example, to helping to prevent the loss of data collected by the IoT devices. A technique that may increase the availability of IoT devices could use out-of-band mechanisms to ensure their availability.

Figure 128:
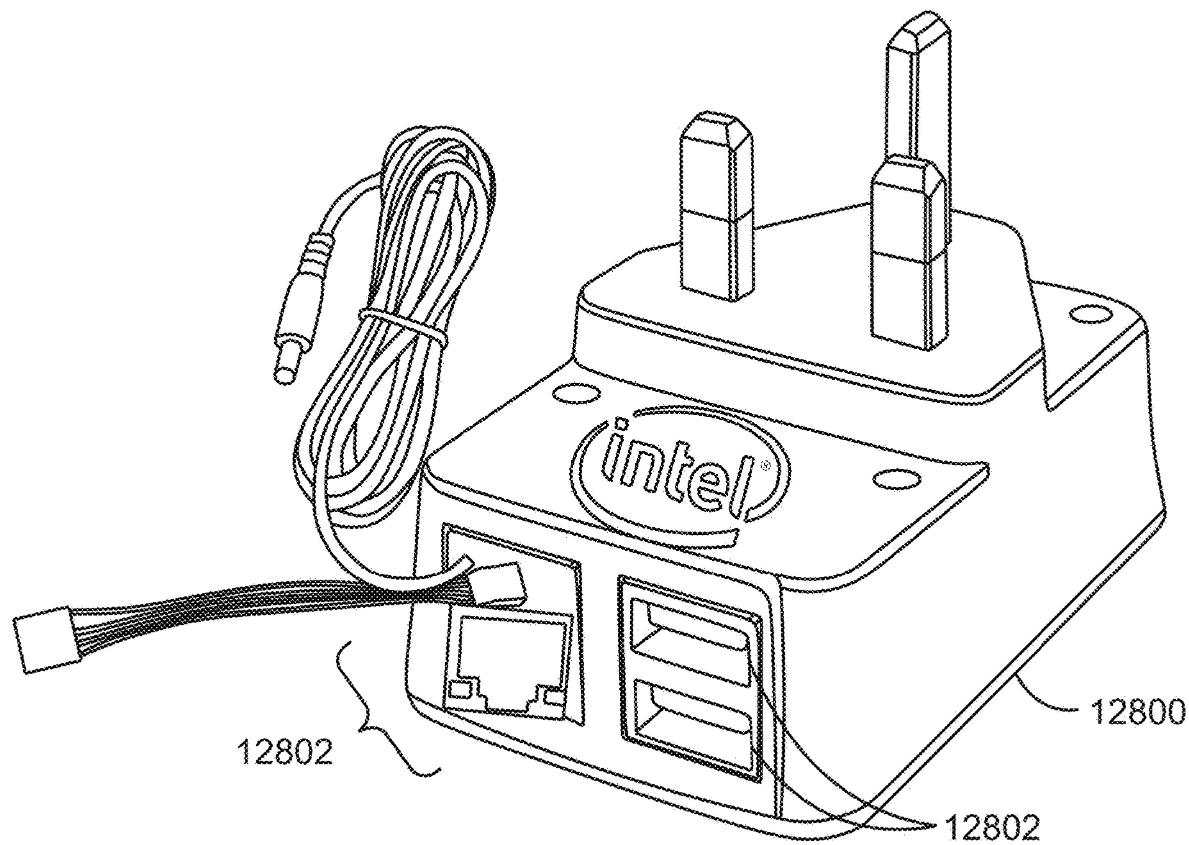

FIG. 128 is a drawing of an exemplary power plug device 12800 that may be used to improve the availability of an IoT device in accordance with some embodiments. In this example, the power plug device 12800 is built into a 220 VAC plug. Linux and other operating systems implement functions which can interact either with software or hardware watchdogs. These watchdogs are on-board functions and they may not always be present in embedded devices or in IoT devices. The power plug device 12800 is may be an out-of-band mechanism to manage the availability of generic or utility IoT devices. It may perform this function by communicating with an IoT device over one or more of its available interfaces 12802 to determine if the IoT device is operational and functioning correctly. If it is not, the power plug device 12800 can take remedial actions to return the IoT device to a healthy state. As described herein, the power plug device 12800 may act as the primary power source for the IoT device. In this way it may improve availability by being able to cycle the power of a managed device connected to it.

A range of out-of-band management technologies may be implemented. Examples of these may include for desktop or client systems, the vPro from Intel Corporation, and for server or datacenter systems, the Intelligent Platform Management Interface (IPMI) from Intel Corporation. However, these technologies have not been made available in embedded or IoT class devices. Thus, IoT devices introduce a new level of complexity in achieving availability, as these devices may pose management challenges.

The power plug device 12800 may use a standard wall socket as its power source, or it may be supplied with power by batteries or via a power-over-Ethernet connection, among others. It may run its own operating system, such as a basic OS, RTOS or BIOS.

Users or operators of the device may use a web or other interface to configure the device. The configuration of the device may include a login service which may have roles for admins and operators. A settings screen for an interface may indicate if anything is connected to the interface. Parameters may be set on the interface to act as rules or policies to dictate when and what types of actions should be taken if the device encounters an operational issue. These may range from restarting a service or the operating system of the IOT device to cycling the power of the IoT device, for example.

The power plug device 12800 may have its own communication channels, enabling it to act as an out-of-band mechanism to contact IoT devices which are offline. The device may be manufactured to fit the requirements of an IoT deployment, or it might be made more generically with a variety of interfaces 12802 to fit a wide range of devices. The interfaces 12802 may include, for example, USB connections, Ethernet connections, SPI/I2C/I3C, Sensor HID, Magnetometers/radios, or JTAG. These interfaces 12802 are discussed further with respect to FIG. 131.

Figure 129:
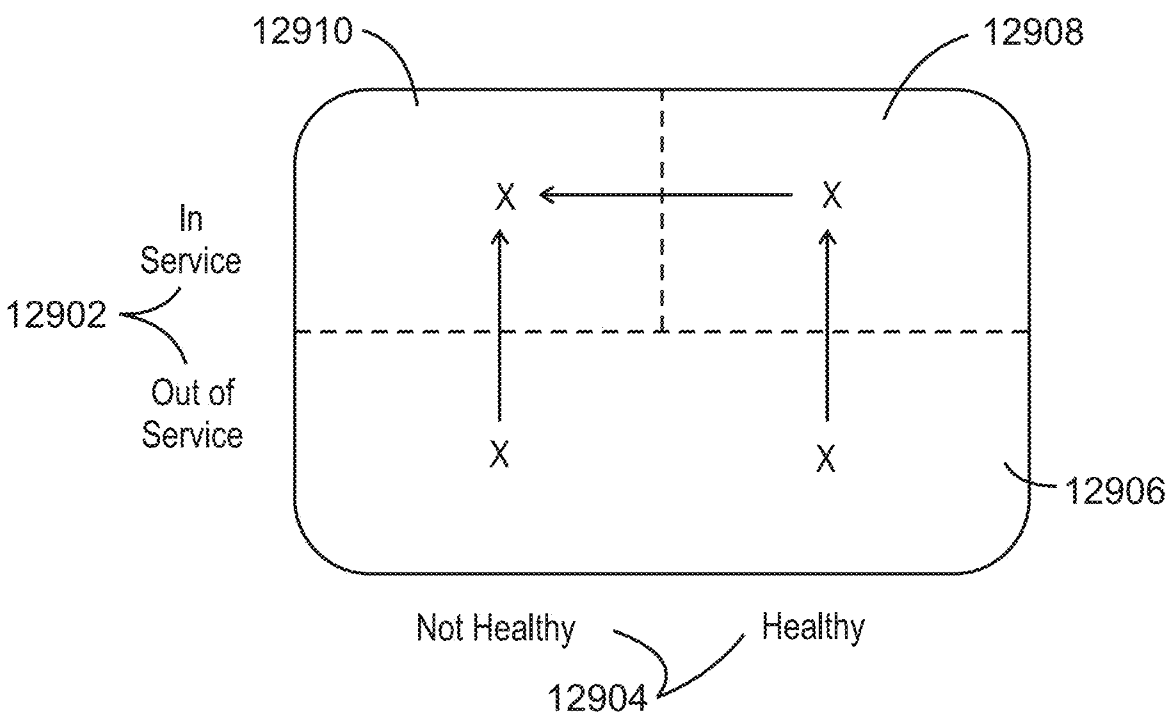

FIG. 129 is a plot 12900 of a global state transition based on self-adaptation for the power plug device in accordance with some embodiments. In the plot 12900, a determination 12902 may be made as to whether an IoT device is in service or out of service. Another determination 12904 may be made as to whether the managed IoT device is healthy or not healthy. As described herein, a healthy device is performing its designated functions and communicating with a network, while a device that is not healthy is either not performing functions, not communicating, or both.

The power plug device may determine that the IoT device is out of service 12906 by determining that the IoT device is not powered, not in communication with the power plug device, or otherwise not responding to the power plug device. This may be performed in several ways, for example, if the power plug device is interfaced to the IoT device through an SPI, I2C, or an I3C interface, it may be able to detect the hardware status of components on the IoT device. If these are not functioning correctly, then a corrective action can be taken, such as resetting the device, cycling the power, and the like.

Further, the power plug device may determine if the IoT device is in service but not healthy 12910 by determining if the operating system is running on the IoT device. This may be tested by communicating with the service to prove that the operating system is responsive, such as mounting a disk on the IoT device, telnetting to a port, or activating another service, among other tests. The power plug device may determine if communications are functioning on the IoT device. This may be tested by pinging the IoT device over an Ethernet connection or another wired connection. It may also be performed by sensing if the radio is transmitting on the IoT device or querying a cloud fog service about the last message received from the IoT device.

The power plug device may have received a last will command from the IoT device. The IoT device may be configured to issue a last will command over any or all of its communication paths in the event of a system crash. This is an available feature of various protocols such as MQTT, but it may be implemented at a hardware level by the developer of the IoT device to create a signal on the SPI, I2C, or an I3C interface bus which the power plug device may receive through an SPI, I2C, or an I3C interface. The last will command may inform other devices that the IoT device has failed or crashed, or may include instructions on actions to take in event of a failure or crash. Further, the absence of a periodic "Is Alive" message, or other heartbeat signal, from a watchdog agent in the IoT device to the power plug device may be used as a trigger to reset the IoT device.

Other devices in a cloud or mesh may determine that the IoT device is either out of service 12906 or in service but not healthy 12910. For example, a cloud or fog service which detects that the IoT device has not sent a message for a configurable period of time may send a remote command to the power plug device to reset the IoT device power supply to attempt to return it to a healthy state. The power plug device may then perform the reset command for the IoT device, for example, by pulling a reset pin low, cycling the power, and the like.

The power plug device may implement a reset time to live (TTL). For example, on a regular basis the power plug device may periodically cycle the power for the IoT device. In many deployments, regularly cycling the power may result in greater uptime. Cycling the power may be more preferable to a scripted shutdown method, during which an unresponsive process may prevent the operating system from going down.

Using these exemplary techniques, the power plug device may maintain the IoT device in the healthy and in service quadrant 12908 for longer periods of time. This may increase the uptime, and thus the reliability of the IoT device and IoT network, over a deployment in the absence of the power plug device.

FIG. 130 is a process flow diagram of an example method 13000 for using a power plug device to increase the reliability of an IoT device in accordance with some embodiments. The method 13000 of FIG. 130 may be implemented by the IoT device 13100 described with respect to FIG. 131. The block 13002 represents, for example, when the power plug device boots. During booting the power plug device loads an operating system, then loads any required firmware and drivers from an internal storage device.

At block 13004 the power plug device discovers a list of managed devices. This may include a single device plugged into the power plug device, several devices, or an IoT mesh network or fog device. This discovery may be performed dynamically or statically. Examples of dynamic discovery would be to enumerate all the physical paths connected to the power plug device, querying what is physically connected, or it can include cycling through its radio and communication links to discover near-by devices which may be managed.

The device may also include a static list of managed devices listed in a local configuration file stored on the device. The power plug device adds the managed devices to a list stored locally. The discovery may be repeated as necessary or implemented upon the detection of a newly connected IoT device. For example, the presence of sensor HID and USB make it possible to have plug-n-play detection of managed devices. The power plug device may periodically cycle through radios and communication links to determine if a new IoT device is present and should be added to the management list. Static lists may be provided to the device from a fog or cloud service, or through direct human or device interaction with the power plug device through an interface it may make available, such as a RESTful user interface or application programming interface.

At block 13006, the power plug device initializes and may begin operation. The power plug device may load policies from a remote host or an orchestration device, which may be cloud or fog based. Policies may be loaded onto the power plug device using an interface which runs on the device. The policies may include sets of rules to identify which managed devices are associated with which policies. This may allow support operators to define what kinds of actions are possible for which kinds of devices. This may be based on the type of connection to the device.

At block 13008, the power plug device monitors the managed IoT devices over their respective connections. The health checks may include the power and communication monitoring described herein, a report on health from a watchdog agent in the IoT device, or a failure to receive a health report from the watchdog agent. There can be any number of health checks and device designers may implement other methods not described earlier in this document. This part of the operation results in periodic checks of the functioning of the managed device.

At block 13010, the power plug device may report the status. For example, if the managed device is not functioning as expected, an alert policy may be used to determine if an alert should be sent and what type of alert to send. Alerts may be classified as warnings, errors, or critical failures. Different messaging mechanisms, such as email, an event written to a log, a text or SMS message, or other kind of alert, may be associated with the alert levels. Each of those, or combinations thereof, may be sent to different end points, users, distribution lists, and the like.

At block 13012, the power plug device may attempt to take action to correct a failure. For example, depending on the connection type, the power plug device may attempt to contain services running on the failing or failed managed IoT device, and take actions to correct the failure, before attempting to recover the device.

If the managed IoT device is connected over a wireless connection, then standard commands may be used to remotely restart or reset the device. However, this may not work if the operating system in the managed IoT device is not responding. Accordingly, if the IoT device is connected over a medium that also supplies power to it, such as power-over-Ethernet (PoE), USB, or power-out connections, then the power plug device can cycle the power to the managed IoT device if an issue is detected.

If an IoT device is connected over a JTAG interface, then it becomes possible to remotely debug the IoT device, provide flashing of the device firmware, and the like. A JTAG interface may have a dedicated debug port that implements a serial communication interface. The JTAG interface may be connected from the power plug device to a port on the IoT device that connects to a test access port (TAP) on the processor of the IoT device.

The managed IoT devices may be designed to incorporate an awareness of the power plug devices on the network. For example, if one knows that a useful method to recover a failed device is to cycle the power to it, then one may implement mechanisms into the boot sequence of the managed device to clean up logs, check for common errors and restart all processes automatically without human intervention. This approach may provide additional functionality, but even in the case of less aware IoT devices, the power plug device may cycle the power to attempt to return them to a healthy state.

FIG. 131 is a block diagram of an example of components that may be present in a power plug device 13100, which may be used for increasing the availability of an IoT device in accordance with some embodiments. Like numbered items are as described with respect to FIGS. 3 and 8.

The power plug device 13100 may have a power supply 13102 that is coupled to the grid 13104 or other power source, such as a power-over-Ethernet connection, a battery, and the like. The power supply 13102 provides power to a power controller 13106 which then may supply that power to an external plug 13108 for an IoT device. The power control 13106 may be coupled to the processor 802 through the bus 806 to allow the power to an IoT device to be cycled.

The power plug device 13100 may include a USB interface 13110. This allows the power plug device 13100 to act as a USB client of an IoT device and to supply power over USB to the IOT device. A USB port 13112 coupled to the USB interface 13110 may provide both a data coupling and a power connection.

The network interface controller (NIC) 816 may provide a direct connection to IoT devices that have an Ethernet connection, through an Ethernet port 13114. The Ethernet port 13114 may also provide power to the IoT device, for example, in accordance with the power-over-Ethernet specification promulgated in IEEE 802.3at Type 1, for 12.95 Watts (W), or IEEE 802.3at Type 2, for 25.5 W.

The power plug device 13100 may include an interface 13116 for a serial peripheral interface (SPI) bus, an I2C bus, or an I3C bus, or a combination thereof. Through this interface 13116, the power plug device may be directly interfaced to an IoT device over communication interfaces that are often available on embedded devices. The interface 13116 may couple to an IoT device through one or more ports 13118 provided at the outside of the power plug device. If more than one of these buses is present in the power plug device 13100, ports 13118 may be provided for each of the different buses.

The power plug device 13100 may include an HID transport interface 13120 to allow the power plug device 13100 to interface with certain classes of sensors 820. Sensors 820 that may be supported by the HID transport interface 13120 include, for example, an ambient temperature sensor, a humidity sensor, a proximity sensor, or a presence sensor, among others. The HID transport interface 13120 may be supported by an HID class driver in the operating system termed SensorHID. SensorHID is a functional block which supports the plug-n-play interfacing of a sensor into the power plug device 13100 over the HID transport interface 13120, as well as sensors that may be interfaced through the USB interface 13110, or the SPI, I2C or 130 busses 13116.

The sensors 820 coupled to the power plug device 13110 may include sensors for monitoring the power plug device 13110 itself, as well as sensors 820 for monitoring the environment, such as temperature and humidity, and sensors 8204 monitoring the IoT device. The sensors 820 for monitoring the IoT device may include power consumption sensors, magnetometers, and the like. These sensors may be used to detect if managed IoT devices are transmitting.

The power plug device 13100 may include a JTAG interface 13124 to provide chip level access to the IoT device to enable it to be remotely debugged. The JTAG interface 13124 may couple to the IoT device through a port 13126 on the power plug device 13100. The JTAG interface 13124 may also allow a power reset function for the IoT device. Further, the JTAG interface 13124 may be used to remotely flash non-volatile memory in IoT devices.

The transceivers 810 and 814 in the power plug device 13100 may be used to communicate with nearby IoT devices using their short range radios or to establish if devices with certain hardware signatures are still transmitting signals. However, a physical connection to the managed device may be required for the power plug device 13100 to cycle the power for the managed IoT device, if the IoT device is not functioning.

The power plug device 13100 may include a trusted platform module (TPM) 13128, for example, compliant with the specification promulgated by the Trusted Computing Group as ISO/IEC 11889 in 2009. The TMP 13128 may include a cryptographic processor (CP) 13130, non-volatile memory (NVM) 13132, and secure memory (SM) 13134. The CP 13130 may provide a random number generator, an RSA hash generator, a SHA-1 hash generator, and an encryption-decryption engine, among others. The NVM 13132 may include keys programs at the time of manufacture that include, for example, an RSA key, among others. The SM 13134 may hold measurements taken on software in platform configuration registers. As used herein, a measurement is a hash code calculated on a code or data segment stored in the mass storage 808 or memory 804.

Starting from a measurement of a boot code segment, the measurements may be used to establish a trusted execute environment (TEE) by creating a chain-of-trust from the initial booting. Instead of the TPM 13128, the TEE may be based on other technologies, such as EPID, SGX, or similar technologies. The TEE may be used to protect the IoT device from attacks from a power plug device 13100 that has been compromised.

The mass storage 808 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC). As IoT devices are often constrained in both computing power and other parameters, other devices may be implemented in simpler circuitry as well. For example, a TPM as a separate security co-processor may be a more significant processor than those targeting constrained devices for IoT. Hence, a more constrained "TPM" is likely to be employed than is specified by the TCG TPM specifications. Further, trusted computing primitives, such as for TPM operations, may be implemented in an FPGA for improved time to market over an ASIC solution.

The coalition group formation logic described here may be represented by the TRE architecture in 13340 and may implement some portion of the TPM functionality as defined herein. Again, the logic may be instantiated in an FPGA, ASIC, or a hybrid approach to optimize time to market, flexibility, and cost.

The mass storage 808 may include a basic input-output system and an operating system (OS/BIOS) 13122. This includes the operating system (OS) of the power plug device 13100. The OS/BIOS 13122 may be a real time OS (RTOS), an extended BIOS, a Linux OS, a windows kernel, or a HAL. The OS may be a simplified system or a full system, depending on the capabilities of the processor, memory, and storage.

The FW/Drivers 13136 represent any software used as firmware (FW) or drivers required by the power plug device 13100 to operate. The FW/Drivers 13136 may include drivers and policies to interface with the IoT device.

The mass storage 808 may include a software repository (SW Repo) 13138, which may act as a staging point for over-the-air (OTA) upgrades to devices which are managed by the power plug device 13100. A monitor 13140 may be included to monitor the managed IoT devices.

The mass storage 808 may include an actuator 13142 to implement the actions that are to be taken to restore operations for the managed IoT devices, such as cycling the power, among others. A reporter 13144 may perform the reporting function, reporting on the status of the managed devices.

FIG. 132 is a block diagram of a non-transitory, machine readable medium 13200 including code to direct a processor 902 to increase the availability of an IoT device in accordance with some embodiments. The processor 902 may access the non-transitory, machine readable medium 13200 over a bus 904. The processor 902 and bus 904 may be as described with respect to FIG. 9. The non-transitory, machine readable medium 13200 may include devices described for the mass storage 808 of FIG. 8 or may include optical disks, thumb drives, or any number of other hardware devices.

The non-transitory, machine readable medium 13200 may include code 13202 to direct the processor 902 to discover IoT devices that may be managed. The code 13202 may direct the processor 902 to build a list 13204 of IoT devices. Code 13206 be included to direct the processor 902 to initialize a power plug device. Code 13208 may be included to direct the processor 902 to monitor managed IoT devices. Code 13210 may be included to direct the processor 902 to report on IoT devices, for example, when a fault has occurred. Code 13212 may be included to direct the processor 902 to actuate IoT devices to restore operations.

In addition to ensuring the availability of IoT devices, techniques for dealing with the failure of IoT devices are provided. These techniques may include alerting other IoT devices to the failure, for example, through the use of block chains as described herein. The IoT devices that are alerted to the failure may include an IoT device similar enough to the failed device to take over the functionality from that device.

FIG. 133 is a schematic diagram of a failover mechanism 13300 for a failed device 13302 in accordance with some embodiments. The failed device 13302 may include a trusted reliability engine (TRE) 13304 that has an independent power supply 13306. The TRE 13304 may implement blockchain logic 13308 in hardware, such as ASIC, FPGA, or EC, among others.

A host environment 13310 may include a watchdog agent (WA) 13312 that generates watchdog messages 13314 that report on the health and operation of the host environment 13310 to the TRE 13304. The host environment 13310 may run on host hardware 13316 separate from the hardware of the TRE 13304.

The TRE may be a MESH network, for example, including multiple instances of 13304, that cooperate to perform a last-ditch failover function when expected watchdog reports stop coming in from the local host. A lack of a watchdog messages 13314 may be an indication the host environment 13310 has died or otherwise is inoperable. An aspect at this point is to get a failover message delivered before the node goes dark. The TRE 13304 is designed with a small amount of reserve power, for example, enough to perform the failover actions with a peer TRE.

The WA 13312 may independently deliver watchdog messages 13314 to a blockchain where blockchain observers may analyze the pattern of received watchdog events to draw conclusions about the health of the host. Intermittent losses may be an indication of potential failures in the host environment 13310 or a network environment. These may be health conditions that can be proactively corrected, but may not prompt failover actions.

The watchdog messages 13314 may be written to a block chain 13320, through block chain transactions 13318 from the block chain logic 13308. Writing the watchdog messages 13314 to the blockchain 13320 may synchronize them across other IoT devices, for example, in a mesh or fog network.

Some of the other IoT devices in the mesh network may possess similar functionality as the failed device and may have spare cycles, enabling them to act as a fail-over target. For example, a failover device 13322 or a repair/replacement drone 13324, may assess functional compatibility with the failed device 13302 using composite object identities, for example, as defined with respect to FIGS. 5 to 9. In those examples, the blockchain 13320 may include a history of similar object types, which may be authenticated as such.

When a failover condition exists, IoT devices having similar object types, such as the failover device 13322, may compete to become the target device by periodically registering their candidacy with the TRE records, for example, through a transaction 13326 to the block chain 13320. The TRE 13304 may maintain a list of viable failover candidates, obtained 13328 from the block chain 13320, as it receives periodic registrations.

When a failure is observed by the TRE 13304, for example, the loss of watchdog messages 13314 from the watchdog agent 13312 in the host environment 13310, a failover action may be applied. To begin, the TRE 13304 may first perform a local strategy 13330 to recover the host. This may be applied assuming the TRE 13304 is not damaged by the failure event. The local strategy 13330 by the TRE 13304 may involve restoring a host replacement image 13332 to the host environment 13310.

A TRE 13304 on a suitable failover target, such as the failover device 13322, may observe 13334 watchdog activity in the block chain 13320, and may note the absence of it. If the local strategy 13330 is unsuccessful, for example, if the local strategy 13330 is not realized within a window of time, a suitable failover peer, such as the failover device 13322, may assume 13336 the role of the failed device 13302. This may be achieved by posting a transaction to the blockchain 13320 claiming failover target rights. The synchronization of the block chain 13320 among IoT devices ensures a first claimant is selected and does not race with a second.

Although the failover device 13322 may take over for the failed device 13302 temporarily, a permanent solution may be obtained. A repair or replacement drone 13324 may be dispatched 13338 to either repair or replace the failed device 13302. The repair or replacement drone 13324 may automatically dispatch itself, for example, by monitoring the block chain 13320 to determine that a device has failed. A replacement drone may be a direct replacement, moved into place by a repair drone or a service technician. In some examples, the replacement drone may be an autonomous unit that moves itself into place. Once the repair or replacement drone 13324 is in place, it may take over 13340 functionality for the failed device 13302, allowing the failover device 13322 to return to normal operations. At that point, the TRE 13304 in the failed device 13302 may decommission 13342 the failed device 13302. Observers of activity in the blockchain 13320 may monitor failures and plan a strategy for repairing, removing or replacing the failed device 13302.

FIG. 134 is a process flow diagram of an example method 13400 for implementing a failover mechanism using a trusted reliability engine (TRE) in accordance with some embodiments. The method 13400 of FIG. 134 may be implemented by the IoT device 13500 described with respect to FIG. 135. The TRE may implement a self-reliant strategy by first monitoring for host failure using the TRE while also informing a blockchain regarding device health state. The first self-reliant strategy may use a replacement image to recover the damaged or failed host, for example, replacing a corrupted image in a failed device. A second strategy may detect a failover device and transfer the device workload from the failed device to the failover device. A third strategy may dispatch a replacement device using an automated dispatch device, such as a replacement or repair drone. A fourth strategy decommissions the failed device to decrease the probability of unknown behaviors and lowering a risk of causing failures in surrounding network devices. The TRE may also perform trusted execution environment (TEE) functions including storage and management of keys, attestation and cryptographic operations. The method 13400 starts at block 13402, when the IoT device including the TRE is powered.

At block 13404, the TRE monitors the host environment. This may include monitoring operations and functionality of the memory, bus, or CPU, among others. Further the TRE monitors the host environment for watchdog messages, or pings, confirming that the host environment is operational. For example, the IoT/device attestation measurement includes the heartbeat reporting, generated by the watchdog (WD) pings. This may include a historical record of multiple heartbeats or the most recently reported heartbeat. If no pings are received over a selected period of time, for example, a millisecond (ms), 5 ms, 15 ms, or longer, the TRE may determine that there is been a failure of the host environment.

At block 13406, the TRE produces a WD message including the WD pings. The TRE attestation key may be used to sign the WD message in response to an attestation request or to sign the WD message. At block 13408, the WD message may be sent to a monitoring entity, for example, committing the WD message as a transaction to a block chain. The WD message generation logic may remain protected within the TRE, which provides greater assurance and resistance to being impacted by host failures. Nodes monitoring the WD messages in the block chain may observe the block chain updates across a variety of subnets, devices, and networks.

At block 13410, a failure of the IoT device may be detected locally, for example, by the TRE. If no local failure is detected at block 13410, a remote device may detect failure at block 13412. If no remote detection of failure is made at 13412, at block 13414 the monitoring resumes at block 13404.

If a remote failure is detected at block 13412, a process failure message is sent to the TRE in the local device at block 13416, for example, by the remote device that detected the failure. In the event the process failure message is received or a local failure is detected at block 13410, at block 13418 failure processing is begun.

At block 13420, a determination is made as to whether the host is recoverable locally. This may be determined, for example, by noting that the host is still powered and may have just hung up at a particular code segment. If so, at block 13422 a host replacement image may be installed, for example, overwriting the current operational memory of the failed device. The TRE may then attempt a restart of the host device in the code of the host replacement image. The TRE may attempt an initial restart of the host environment prior to installing the host replacement image. This may save time when the failure is not due to a corruption of the operating code, but is due to, for example, a software crash or hang.

If the host device is not locally recoverable, at block 13424 a determination may be made by the TRE that a failover device is nearby. If a failover device is nearby, at block 13426, the failover device is configured to begin performing the host functions.

If a failover device is not nearby at block 13424, at block 13428 a determination is made as to whether a host is replaceable or repairable. If so at block 13430, a replacement device or repair drone may be dispatched to perform the repair or replacement of the failed device. Even if a failover device has been identified and has taken over the functions of the failed device, at block 13426, a repair or replacement drone may still be dispatched at block 13430 to allow the failover device to return to normal operations.

At block 13432, a determination is made as to whether the failure is resolved, for example, if the functions of the failed device are being performed. If so, the method 13400 ends at block 13436, for example, by returning to normal monitoring operations at block 13404. If the failed device has not returned to normal operations at block 13432, at block 13434, the failed device is decommissioned. The TRE in the failed device may be placed in a sleep state. In this example the failover device or the replacement device has taken over the function of the failed device, and continues to provide the services of the failed device. The method 13400 then ends at block 13436.

In a scenario where host failure is malicious, the compromising event may not be distinguishable from normal anomalies or unexpected behavior. The TRE environment may improve security of an endpoint device and increase the probability that an attacker will be unable to prevent release of a WD 'sos' message. Further, an attacker may be limited in the ability to cover up audit trail evidence that may have been collected during the normal course of a security audit.

FIG. 135 is a block diagram of an example of components that may be present in an IoT device 13500 for implementing a failover mechanism using a trusted reliability engine in accordance with some embodiments. Like numbered items are as described with respect to FIGS. 3, 8, and 133. It can be noted that different components may be selected and used for the IoT device 13500 than for those selected for the IoT device 800 discussed with respect to FIG. 8, and other IoT devices discussed herein.

The trusted reliability engine (TRE) 13304 may provide a trust execute environment (TEE) containing reliability logic and isolation, for example, implemented by a trusted platform module (TPM). Accordingly, the TRE 13304 may include a number of functional units that are protected from general access. These functional units may duplicate other functional units in the IoT device 13500. These may include the TRE logic 13308, the host replacement image 13332, and the block chain 13320, as discussed herein. In addition, the TRE 13304 may include a microprocessor 13502, and independent power supply 13504, a TRE communicator 13506, and a memory 13508. The power supply 13504 may couple to the power from the power block 828, or may have an independent power supply, for example, a battery linked to a charger.

The mass storage 808 may include a number of modules to implement the failover mechanism using the trusted reliability engine described herein. Although shown as code blocks in the mass storage 808, it may be understood that any of the modules may be fully or partially replaced with hardwired circuits, for example, built into an application specific integrated circuit (ASIC).

The mass storage 808 of the host may include a watchdog (WD) agent 13312 that sends WD messages to the TRE 13304 over the bus 806. As described herein, the TRE 13304 may create a watchdog message and commit the watchdog message to the block chain 13320. The TRE logic 13308 may propagate the block chain 13320 to mesh devices 812 or devices in the cloud 302 over one more communications links, for example, through a mesh transceiver 810, an uplink transceiver 814, and a NIC 816, among others. The TRE 13304 may access the communications links through the TRE communicator 13506, which may power the transceivers 810 or 814 or the network interface controller 816 as needed. This may ensure that the TRE 13304 maintains communications with external devices even if the host system in the IoT device 13500 has failed.

According to some aspects, not all of the functionality of the system is contained within the TRE 13304. In addition to the watchdog agent 13312, the storage 808 of the IoT device 13500 may contain a number of other blocks providing functionality to the system. For example, the mass storage 808 may include host block chain logic 13510 to maintain a host block chain 13512 outside of the TRE 13304. The host block chain 13512 may include all transactions in the block chain 13320 in the TRE 13304, and may include a more extensive set of transactions. For example, the block chain in the mass storage 808 may include identity blocks, peer device blocks, and other blocks that are not present in the block chain 13320 in the TRE 13304 due to memory constraints.

The mass storage 808 of the IoT device 13500 may include an image creator 13512 to copy a host image 13514 and send it to the TRE 13304 over the bus 806 to be saved as a host replacement image 13332. The host image 13514 may include the operating system, drivers, and functional code for the host environment of the IoT device 13500.

The mass storage 808 may include a communicator 13518 that accepts packets or frames from mesh devices 812 or devices in the cloud 302, and sends packets or frames to other mesh devices 812, devices in the cloud 302, and the like. As described with respect to FIG. 45, the communicator 13518 may perform other functions, such as translation of packets between protocols, accepting micropayments, and the like.

FIG. 136 is a block diagram of a non-transitory, machine readable medium 13600 including code to direct a processor 902 to implement a failover mechanism using a trusted reliability engine in accordance with some embodiments. The processor 902 may access the non-transitory, machine readable medium 13600 over the bus 904. The processor 902 and bus 904 may be as described with respect to FIG. 9. The non-transitory, machine readable medium 13600 may include devices described for the mass storage 808 of FIG. 8 or may include optical disks, thumb drives, or any number of other hardware devices.

The non-transitory, machine readable medium 13600 may include code 13602 to direct the processor 902 to monitor host environment for heartbeat messages, or pings. Code 13604 may be included to direct the processor 902 to produce watchdog messages, for example, including the heartbeat messages. Code 13606 may be included to direct the processor 902 to post the watchdog messages to a block chain, for example, as a transaction. Code 13608 may be included to direct the processor 902 to detect failures in a local device associated with the TRE. Code 13610 may be included to direct the processor 902 to detect failures in a remote device, for example, by examining the watchdog messages in a block chain.

Code 13612 may be included to direct the processor 902 to install a host replacement image in place of that currently stored in a host environment. Code 13614 may be included to direct the processor 902 to configure a failover device. Code 13616 may be included to direct the processor 902 to dispatch a repair or replacement drone. Code 13618 may be included to direct the processor 902 to decommission a failed device.

Security in IoT networks is a consideration, especially as the networks grow in size. Private key storage, updates and in-transit interception, rogue key detection, and rapid new key generation are potential concerns. However, in many cases IoT devices are constrained by memory, processing power, and other issues, such as limited components. Further, IoT networks may have limited bandwidth to share data and all other functions. Thus, it is useful to maximize the efficiency of communications between the devices.

In the techniques described herein, IoT nodes in a network may not need to receive or dispatch a full private key, for example, with each message. Instead, they may dispatch and receive fractional parts of the key. In addition to improving the efficiency of communications, this may reduce the attack surface for a secure IoT network, as no individual node needs to store the full key sequences in persistent storage.

FIG. 137 is a schematic diagram of the construction of a key 13702 using fractional keys 13704 and 13706 exchanged between nodes in an IoT network in accordance with some embodiments. In this example, a water filling approach may be used for the construction of the key 13702 using the fractional keys 13704 and 13706. The key 13702 may be assembled in a circular buffer 13708. Each fractional key 13704 or 13706 may include an offset 13710 which indicates where the portion of the key 13712 in each fractional key 13704 or 13706 is to be inserted into the circular buffer 13708. The key 13702 may be used to access services for the IoT network, communicate with other IoT networks, and the like.

Although, two fractional keys 13704 and 13706 are shown in this example, multiple fractional keys of various sizes may be stored in the circular buffer. A complete key may be identified when sufficient fractional keys have been added to fill the circular buffer. This approach may result in overlapping key indices which enables partial key verification as overlapping fractional key bytes should be identical. Likewise, this enables rogue device detection before full key sequences have been constructed. If any overlapping fractional key bytes do not match, an alert may be sent out to other devices in the mesh, or to other users, noting that a device may be compromised.

Generally, according to some aspects, no single device in the IoT network stores the complete key. Accordingly, no single device may be attacked or analyzed using a microscope to determine the full key. Once the full key 13702 is assembled, it may be used by the IoT network, or fog device, to access other devices, for example, in the cloud.

FIG. 138 is a process flow diagram of an example method 13800 for assembling a full key from fractional keys stored in individual nodes in an IoT network in accordance with some embodiments. The method 13800 of FIG. 138 may be implemented by the IoT device 14000 described with respect to FIG. 140. The block 13802 represents, for example, for example, when a full key is needed by fog device to access the system in the cloud.

At block 13804, the first portion of a fractional key is dispatched. This may occur when a node constructs a payload, and initiates a wired or wireless communications to send the payload, including the fractional key, to a node that has requested it. The dispatch of the fractional key may also function as a request for other nodes to send fractional keys to peer nodes.

At block 13806, the requesting node receives a portion of the fractional key from a sending node. At block 13808, the requesting node analyzes the payload to determine if it includes a fractional key and offset. If not, process flow returns to block 13806.

If, at block 13808, it is determined that a payload includes a fractional key, then, at block 13810, the requesting node may crosscheck the fractional key to determine if the received fractional key overlaps other portions. This may be performed in a number of ways including, for example, making a comparison of the buffer index. Further, the fractional key part may be stored in the circular buffer, and, if any portions overlap other keys, they may be compared to confirm that the overlapping portions match. Any failure of overlapping portions to match may indicate that the device has been compromised. If so, the assembly process may be stopped and an alert sent out.

Further security may be provided by other techniques. For example, a “dirty bit” may be maintained for each “cell” in the circular key buffer that may be allocated for use by a fractional key. A security weakness may be introduced when a previously used cell is selected as a member of a subsequent key fraction. To correct for this possible weakness, the dirty bit may be set upon first allocation and checked upon subsequent overlap verification. If an overlap check reveals the dirty bit, then the circular buffer offset calculation is repeated, to determine if this results in a non-dirty cell. This process repeats until enough virgin key material is found for the key generation method.

At block 13812, a determination may be made as to whether all fractional keys have been received. If not, process flow may return to block 13806. If all fractional keys have been received, at block 13814 the full key may be constructed.

The method 13800 ends at block 13816. This may take place, for example, when the full key is provided to another device on behalf of a fog device.

FIG. 139 is a schematic diagram of the assembly of a complete key 13902 from fractional keys provided by five nodes A-E in accordance with some embodiments. In this example, the five nodes A-E exchange their fractional keys with each other. Each node A-E may construct the full key by placement of the received keys in the designated offset in a circular buffer. The offset may be denoted by {N:x,O:y}, in which x is the number of bytes, N, in the fractional key and y is the starting index, or offset O, of the fractional key in the full key 13902.

For example, if a circular buffer 13904 is located in node A, the fractional key A 13906 from node A may already be located in the circular buffer 13904. The fractional key B 13908 may then be received from node B. In this example, the first byte of fractional key B 13908 overlaps the last byte of fractional key A 13906, and a byte comparison 13910 may be performed to ensure that the overlapping byte matches between the two fractional keys 13906 and 13908. If the byte comparison 13910 determines that the overlapping byte matches between the two fractional keys 13906 and 13908, then the fractional key from node B may be loaded into the circular buffer 13904.

Node A may then receive fractional key C 13912 from node C. As fractional key C 13912 does not overlap either of the previous fractional keys 13906 and 13908 it may be loaded into the buffer with no byte comparisons. Fractional key C 13912 may have an offset and length that overlaps the end of the circular buffer 13904, accordingly, the last byte of fractional keys see 13912 may be rotated to fall in the beginning of the circular buffer 13904 as indicated by the arrow 13914.

Node A may then receive fractional key D 13916 from node D. As the last bite of fractional key D 13916 overlaps the first bite of fractional key C 13912, a byte comparison 13918 may be performed to ensure that the two bytes match. Once this is confirmed, then fractional key D 13916 may then be loaded into the circular buffer 13904.

Node A may then receive fractional key E 13920 from node E. As there is a substantial overlap in the bytes between fractional keys D and E 13916 and 13920, a byte comparison 13922 may be performed on each of these bites to ensure that they match. If so, the node E fractional key E13920 may then be loaded into the circular buffer 13904 to form the complete key 13902.

As overlaps occur, byte verification takes place to confirm that the overlapping fractional parts match. If not, the process may be terminated and the potential for a compromised node may be reported. The overlapping bytes may also provide redundancy in cases where one or more nodes may not be able to exchange their fractional keys with other nodes in the network. This situation may otherwise result in a failure for all nodes to construct the complete key 13902, if all of the fractional keys orthogonal, for example, had no byte overlaps.

FIG. 140 is a block diagram of an example of components that may be present in an IoT device 14000 for assembling multiple fractional keys from different nodes in an IP mesh network 812 into a single complete key in accordance with some embodiments. Like numbered items are as described with respect to FIGS. 3 and 8. It can be noted that different components may be selected and used for the IoT device 14000 than for those selected for the IoT device 800 discussed with respect to FIG. 8, and other IoT devices discussed herein.

The mass storage 800 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a communicator 14002 that sends packets to and receives packets from mesh devices 812 or devices in the cloud 302 over one more communications links, for example, through a mesh transceiver 810, an uplink transceiver 814, and a NIC 816, among others. In addition to the functions described with respect to FIG. 140, as described with respect to FIG. 45, the communicator 14004 may perform other functions, such as translation of packets between protocols, performing proof-of-provenance additions, and the like. Further, the communicator 14004 may be part of an easement system, as described with respect to FIG. 33.

A fractional key generator 14002 may generate a fractional key, for example, from a random number generator, a block chain, or from a key saved to the device during manufacturing. As an example, the key may be generated using an Intel Digital Random Number Generator (DRNG) or a pseudo-random number generator (PRNG) that is seeded using a DRNG. The fractional key generator 14002 may use any number of other techniques to generate the fractional key, such as accessing a key from a blockchain, as described herein.

Another exemplary fractional key generation method may use a DRNG that accepts a random seed, for example, obtained from the DRNG when it is not in PRNG mode, in which the search space over the circular buffer may be effectively unlimited, as determined by the DRNG word size architecture. In this example, the offset into the circular buffer is taken as the seed to the Intel DRNG in PRNG mode. Hence, the circular buffer may effectively be of infinite size ensuring collisions within the buffer are probabilistically impossible.

The communicator 14004 may build frames that include fractional keys in the payload of the frame. In some examples, a frame including a fractional key may be passed from another IoT device in the mesh devices 812, such as a more remote device. In this example, the IoT device 14000 may assemble fractional keys received from other IoT devices in the mesh devices 812, to form a final key.

A byte comparer 14006 may be included to compare overlapping bytes of fractional keys received from different devices to ensure that the overlapping bytes are identical. The byte comparer 14006 may stop the process of assembling a final key, if any of the overlapping bytes do not match, as this may indicate that an IoT device has been compromised.

A key assembler 14008 may assemble each of the fractional keys in a circular buffer 14010 to form the final key. The key operator 14012 may use the final key in an operation, such as providing the key to a gateway to confirm an identity of a mesh or fog device 812.

FIG. 141 is a block diagram of a non-transitory, machine readable medium 14100 including code to direct a processor 902 to receive fractional keys, assemble the fractional keys into a final key, and use the final key in accordance with some embodiments. The processor 902 may access the non-transitory, machine readable medium 14100 over a bus 904. The processor 902 and bus 904 may be as described with respect to FIG. 9. The non-transitory, machine readable medium 14100 may include devices described for the mass storage 808 of FIG. 8 or may include optical disks, thumb drives, or any number of other hardware devices.

The non-transitory, machine readable medium 14100 may include code 14102 to direct the processor 902 to dispatch a fractional key to a receiving device. Code 14104 may be included to direct the processor 902 to receive a fractional key and store the fractional key. Code 14106 may be included to direct the processor 902 to perform byte comparisons for overlapping bytes, for example, to ensure that the overlapping bytes match before assembling a final key. Code 14108 may be included to direct the processor 902 to write the fractional key to the circular buffer, and assemble the final key in the circular buffer from the fractional keys received from devices. Code 14110 may be included to direct the processor 902 to use the final key, for example, to access a device in the cloud on behalf of the device or the devices in the IoT network.

A monetary concern about the security of a key based approach to crypto-currencies is raised by the emergence of digital wallets and anonymous key-based identities in a blockchain context. A digital wallet is a system that allows an individual to make an electronic payment for a transaction. The digital wallet may be linked to a bank account or may store a balance transferred from another account. In some examples, the digital wallet may be implemented in software in an electronic device, such as a smart phone, including communications, encryption, and other systems to implement the functionality. In other examples, the digital wallet may be implemented as an RFID tag, where the systems exist on a central server accessed from a communication system.

A transaction on a blockchain is signed by the private keys of the digital wallet owner and the loss, or exposure, of those private keys enables an attacker to sweep the digital wallet. This is a process whereby any unspent balance of currency owned by that digital wallet is transferred to another owner, e.g., belonging to the attacker.

Generally, blockchain consensus mechanisms have no method to identify such a transaction as fraudulent. Searching the blockchain after the fact may identify the route that the currency has taken, but the unregulated nature of such technologies means that the practical methods available to reverse the transaction are prohibitive and do not scale. This may be made more difficult because the identities of the parties involved are not known without some deeper investigation. Further, subsequent transactions of the same coins to third parties become problematic to roll back. Accordingly, it may be preferable to prevent the situation in the first place and seek to reduce the exposure of actors in a blockchain by introducing the concept of demand driven key generation.

FIG. 142 is a schematic diagram of a procedure 14200 for generating keys on demand for devices on lossy networks in accordance with some embodiments. As described herein, demand driven key generation may allow digital wallets to generate new keys for transactions, using any of the techniques for key generation described herein, in an on-demand fashion, rather than on a regular time-scheduled one. On-demand would equate to performing a new key generation for every transaction and using it only once. The same mechanism could be applied to system access and other popular applications of key based technologies.

The procedure may start at block 14202 when a transaction is committed to a network. This may occur, for example, when a purchase is made and a digital wallet is used to pay for the purchase. The purchase may be made online, or at a retail establishment, for example, when a device including a digital wallet is tapped on the communications pad.

At block 14204, a new key may be generated. This may be performed by the procedure shown in block 14206, which may be related to the standard bit coin examples. Further, other procedures discussed herein may be used. In this procedure, a wallet import format (WIF) private key may be used to import a 256-bit private key 14210. The 256-bit private key 14210 may be used to generate a 512-bit public key 14212, which may be used to generate a 160-bit public key hash 14214 that may be associated with the wallet address 14216. At block 14218 the old key may be deleted. Generating the new key is not limited to the procedure shown in block 14206. For example, a new key may be generated using the procedure described with respect to FIG. 143.

FIG. 143 is a schematic diagram of a key generation method 14300 that may be used in the on-demand process for key generation described above, as well as for generating keys in other contexts in accordance with some embodiments. The method 14300 of FIG. 143 may be implemented by the IoT device 14500 described with respect to FIG. 145. Rapid key generation in lossy high-latency networks remains a challenging task due to the often false assumptions that an IoT network has end-to-end connectivity, persistent secure connections, a centralized key authority and issuing agent, and inexpensive communications, and networking to support key exchanges. The method 14300 for local key generation may be used when commanding nodes dispatch offset values and full or partial keys are not needed. A full fractional key 14302 may be used with the local key 14304 for example provided by vendor. The local key 14304 may be stored in a circular buffer, and a new key may be generated by a circular exclusive or (XOR) operation 14306 of the full fractional key 14302 and the local key 14304.

The new key 14308 may then be used as needed for access. A key offset may be used to generate multiple new keys, by changing the offset between the full fractional key 14302 and the local key 14304. In this example, a remote control node may send only an offset value for generating the new key.

FIG. 144 is a process flow diagram of an example method 14400 for generating keys in accordance with some embodiments. The method 14400 of FIG. 144 may be implemented by the IoT device 14500 described with respect to FIG. 145. Generally, key management is relatively static. Keys, once generated, are used until a compromised situation has been detected, an occasional refresh is required, and the like. However, in IoT networks, disruption and lack of end to end connectivity may be common occurrences. Accordingly, key refresh, and secure dispatch of keys to a large network of devices may be challenging. The techniques described herein may allow for constantly changing keys without direct human intervention. The method 14400 may start at block 14402, for example, when an operating system determines that it is time to change a key or a request to change the key is received.

At block 14404, a determination is made as to whether a key offset value has been received. If not, at block 14406 an offset value for the key may be generated in an IoT device. At block 14408, a fractional key may be received by the IoT device. This may not be needed for example, if a fractional key has already been received by the IoT device. The fractional key may be used, along with other fractional keys received from other IoT devices, to assemble a full fractional key, for example, as described with respect to FIGS. 137 through 141.

At block 14410, a new key may be generated, for example, as described with respect to FIG. 140 or 143. At block 14412, the new key may be verified. The verification may be performed by decrypting a standard message from another node.

At block 14414, a determination may be made as to whether the key is expired. If so, the method 14400 may return to block 14404 to generate a new key.

If the key is not expired at block 14414, at block 14416 the encryption or decryption of a data file may take place. At block 14418, the method 14400 ends, for example, with the transmission of an encrypted file or use of a decrypted file.

In the method, offset values to the internal circular key generators may be dispatched to nodes. Further, although fractional keys may be dispatched to nodes, the nodes may generate their own keys, decreasing a need to send new keys to nodes. Key re-generation may be performed on a regular time-scheduled basis.

FIG. 145 is a block diagram of an example of components that may be present in an IoT device 14500 for generating keys on demand in accordance with some embodiments. Like numbered items are as described with respect to FIGS. 3 and 8. It can be noted that different components may be selected and used for the IoT device 14500 than for those selected for the IoT device 800 discussed with respect to FIG. 8, and other IoT devices discussed herein.

The mass storage 800 may include a number of modules to implement the key generation process described herein. Although shown as code blocks in the mass storage 808, it may be understood that any of the modules may be fully or partially replaced with hardwired circuits, for example, built into an application specific integrated circuit (ASIC).

The mass storage 808 may include a communicator 14502 that sends packets to and receives packets from mesh devices 812 or devices in the cloud 302 over one more communications links, for example, through a mesh transceiver 810, an uplink transceiver 814, and a NIC 816, among others. In addition to the functions described with respect to FIG. 145, as described with respect to FIG. 45, the communicator 14504 may perform other functions, such as translation of packets between protocols, performing proof-of-provenance additions, and the like. Further, the communicator 14504 may be part of an easement system, as described with respect to FIG. 33.

A transactor 14504 may commit a transaction to a network, for example, to purchase or rent an item, such as from a device in the cloud 302 or the fog 812. The transactor 14504 may use a previously generated key, triggering the generation of a new key after the transaction is finished. In another example, the transactor 14504 may generate a new key for committing the transaction to the network.

In other examples, the transactor 14504 may use a key for a particular period of time. A key lifetime timer 14506 may control the period of time the key may be used before a new key is generated. For example, the key lifetime timer 14506 may allow a key to last for one minute, 5 minutes, 30 minutes, an hour, or longer.

A key generator 14508 may generate the new key, for example, using a circular buffer 14510 to perform an XOR of a full fractional key 14302 with the local key 14304, as described with respect to FIG. 143. The full fractional key 14302 may be assembled from fractional keys received from other IoT devices, as described further with respect to FIGS. 137 to 141. For example, the communicator 14502 may receive frames that include fractional keys in the payload of the frame. In this example, the IoT device 14000 may assemble fractional keys received from other IoT devices in the mesh devices 812, to form the full fractional key 14302.

FIG. 146 is a block diagram of a non-transitory, machine readable medium 14600 including code to direct a processor 902 to generate keys on demand in accordance with some embodiments. The processor 902 may access the non-transitory, machine readable medium 14600 over a bus 904. The processor 902 and bus 904 may be as described with respect to FIG. 9. The non-transitory, machine readable medium 14600 may include devices described for the mass storage 808 of FIG. 8 or may include optical disks, thumb drives, or any number of other hardware devices.

The non-transitory, machine readable medium 14600 may include code 14602 to direct the processor 902 to receive a fractional key from a sending device. The code 14602 may assemble a full fractional key from a number of fractional keys received from different sending devices. Code 14604 may be included to direct the processor 902 to receive an offset value for the generation of a key from the full fractional key and a key stored in the device. Code 14606 may be included to perform a logical operation with the full fractional key and the device key to generate a new key, for example, using the offset value. Code 14608 may be included to direct the processor 902 to generate a new key using other techniques, for example, accessing a blockchain to obtain a new key, randomly generating a new key, or using an entropy multiplexing technique, as described with respect to FIGS. 147 to 151. Code 14610 may be included to direct the processor 902 to expire a key, for example, when a timer reaches a particular value. Code 14612 may be included to direct the processor to encrypt or decrypt data using the key.

In some situations, distributed collaboration may be complicated by failures in signaling and synchronization between nodes. For example, a peer IoT device may be sleeping or network connectivity may not be reliable. In this case, collaborating peers may use an entropy multiplexing concept to agree on a temporal symmetric key for encryption, message integrity codes, and like.

FIG. 147 is a schematic diagram of an entropy multiplexing process 14700 for generating a number of seeds that may be used to generate new keys in accordance with some embodiments. The entropy multiplexing process 14700 builds a seed tree 14702 of seed values used to seed a random number generator. The structure of the seed tree 14702 may be correlated with a contextual attribute, such as time, location, proximity or any other attribute class that can be described using a taxonometric or ontological decomposition method. In this example, the entropy multiplexing process 14700 is based, at least in part, on time.

The seed tree may also use a PRNG that can be viewed as a circular buffer of infinite size, as described with respect to FIG. 140. The tree context establishes the offsets into the buffer based on a repeatable convention for tree construction.

The collaborating nodes may select a time root 14704 and generate a first seed value 14706. The first seed value 14706 may be used as a starting point in an ontology to generate the seed tree 14702. A first lower level of seeds 14708 may be generated using, for example, a year value 14710 of the first seed value 14706. A month value 14712, for example, may then be used to generate a second lower level of seeds 14714. A day value 14716, for example, may then be used to generate a third level of seeds 14718. Further levels in the seed tree 14702 may be generated using successively finer increments, such as minutes, or even seconds.

The collaborating nodes may agree on the first seed value 14706 and the starting point in an ontology. The collaborating nodes may then separately generate and save an individual copy of the seed tree 14702. When a shared secret is needed, for example, relating to the ontological context, the collaborating nodes may independently use that context to search the local copy of the seed tree 14702 locating the common secret. This may then be used to generate a symmetric key for encryption of communications and data between the collaborating nodes.

Any number of other ontological parameters may be used to generate a seed tree. Including, for example, location information, such as address information, GPS coordinates, IP address, and the like.

FIG. 148 is a schematic diagram illustrating a process 14800 for generating a location seed tree 14802 in accordance with some embodiments. As for the generation of the seed tree 14702 discussed with respect to FIG. 147, the location seed tree 14802 may be independently generated by a number of collaborating nodes, once a location root 14804, an initial seed 14808, and a tree ontology are agreed-upon. For example, an address seed tree 14810 may be generated from the initial seed 14808 by first generating a seed 14812 from a continent of location 14814. A lower level of seeds may then be generated from country designations 14816. A still lower level of seeds may then be generated from a city designation 14818. Further levels may be generated from street designations or address generations if needed.

Other types of location seed tree 14802 may be generated from other location parameters. For example, a GPS coordinate 14820 may be used to generate a cord and seed tree 14822 in the coordinate seed tree 14822, lower level seeds may be generated from a latitude designation 14824, a longitude designation 14826, or an altitude designation 14828, among others. Other types of location seed tree 14802 may be generated from an IP address designation 14830 sub-portions of the IP address 14832 may be used to generate lower level seeds.

Multiple contexts may be combined to produce a composite shared secret by combining multiple values using a pseudo-random function (PRF) such as HMAC. This may include combining seeds generated from time designations with seeds generated from location designations.

FIG. 149 is a process flow diagram of an example method 14900 for generating seeds using entropy multiplexing, and using those seeds to generate keys for encrypted communications in accordance with some embodiments. The method 14900 of FIG. 149 may be implemented by the IoT device 15000 described with respect to FIG. 150. The block 14902 represents, for example, when an IoT device joins a network and needs a common key for encrypted communications.

At block 14904, context attributes in common across the IoT devices are identified. The context attributes may include, for example, time, location, activity, interest, and the like. At block 14906, each of the context attributes may be decomposed to form a set of sub-attributes. The sub-attributes may be used to generate a seed tree for the context attributes. At block 14908, a random seed value may be generated for the root of each seed tree.

At block 14910, a determination may be made as to whether the seed for each root is used to guard against physical threats, such as theft or loss. If so process flow proceeds to block 14912. At block 14912, cryptographic secret sharing may be used to divide the root seed into M of N shares. At block 14914, the M shares are provisioned across N devices. At block 14916, the devices are physically distributed, for example, during implementation of the network. If at block 14910, a distributed root seed is not needed to guard against physical threats, at block 14918 the seed may be provisioned to each participant device.

Once blocks 14902 through 14918 are completed, the IoT devices in a network may generate common secrets to generate symmetric keys for the encryption of data and communications. At block 14920 a determination may be made as to whether the root seed is distributed. If so, at block 14922, a network may be used to obtain each share of the root seed from the N devices. This may be performed using a personal area network including a QR code display and reader to obtain each share.

At block 14924, the root seed may be used to generate random values for each node in a seed tree. This may be performed for each context attribute and hierarchical decomposition.

At block 14926, a determination is made as to whether a context attribute is true. This identifies which seed tree should be used to generate a cryptographic key, if any. At block 14928, the seed corresponding to the context attribute is used to generate a cryptographic key.

If no context attribute is true at block 14926 at block 14930, a determination is made as to whether a circular fractional key is supported. If so, at block 14932, a fractional cryptographic key is generated or assembled from fractional keys submitted by other IoT devices in the network.

At block 14934, the cryptographic key is used to protect data. For example, data to be sent from a first IoT device to another IoT device may be encrypted prior to being sent. Similarly, the cryptographic key may be used to decrypt data sent from the other IoT device.

The process ends at block 14936, once the data has been decrypted or encrypted. If it is determined at block 14930 that no circular fractional key is supported, the process also ends at block 14936.

FIG. 150 is a block diagram of an example of components that may be present in an IoT device 15000 for assembling multiple fractional keys from different nodes in an IP mesh network 812 into a single complete key in accordance with some embodiments. Like numbered items are as described with respect to FIGS. 3 and 8. It can be noted that different components may be selected and used for the IoT device 15000 than for those selected for the IoT device 800 discussed with respect to FIG. 8, and other IoT devices discussed herein.

The mass storage 808 may include a number of modules to implement the coalition group formation described herein. Although shown as code the mass storage 808, it may be understood that any of the modules may be fully or partially replaced with hardwired circuits, for example, built into an application specific integrated circuit (ASIC).

The mass storage 808 may include a context identifier 15002 to determine a context for the generation of the seed tree. As described herein, the context may be based, for example, on time, location, IP address, or any number of other parameters.

A seed tree generator 15004 may generate the seed tree for the context. This may include decomposing the context into parts, for example, breaking down the time into a year, month, day, minute, and the like. The seed tree generator 15004 may create seeds at different hierarchical levels by selecting time increments of that type around the decomposed value, such as setting seeds for your values of minus one or minus two, and the like, from the year value in the time.

A seed generator 15006 may then be used to generate a root seed and a seed value for a node in the hierarchical seed tree. The seed value may be a random number generated using the decomposed levels of the context for that node.

A communicator 15008 may be included to send packets to and receive packets from mesh devices 812 or devices in the cloud 302 over one more communications links, for example, through a mesh transceiver 810, an uplink transceiver 814, and a NIC 816, among others. The packets may include information used by other nodes to generate a common secret. For example, the packets may include the context, the hierarchical level, the root seed, and the like.

As described with respect to FIG. 45, the communicator 15008 may perform other functions, such as translation of packets between protocols, performing proof-of-provenance additions, and the like. Further, the communicator 15008 may be part of an easement system, as described with respect to FIG. 33. A fractional key assembler 15010 may assemble fractional keys received from other mesh devices 812 to form a key, or to recover a value for a root seed.

The fractional key assembler 15010 may assemble each of the fractional keys in a circular buffer to form the final key. An encryptor/decryptor 15012 may use the final key in an operation, such as encrypting data to send to another mesh or fog device 812, or decrypting data received from another mesh or fog device 812.

FIG. 151 is a block diagram of a non-transitory, machine readable medium 15100 including code to direct a processor 902 to use entropy multiplexing to generate a common secret between devices in accordance with some embodiments. The processor 902 may access the non-transitory, machine readable medium 15100 over a bus 904. The processor 902 and bus 904 may be as described with respect to FIG. 9. The non-transitory, machine readable medium 15100 may include devices described for the mass storage 808 of FIG. 8 or may include optical disks, thumb drives, or any number of other hardware devices.

The non-transitory, machine readable medium 15100 may include code 15102 to direct the processor 902 to generate a seed tree for a context. As noted above, the context may be based, for example, on time, location, IP address, or any number of other parameters. Code 15104 may be included to direct the processor 902 to generate a root seed for the context. Code 15106 may be included to direct the processor 902 to provide the context to other devices. Code 15108 may be included to direct the processor 902 to provide the root seed to other devices. Code 15110 may be included to direct the processor 902 to generate seeds for each node, or device, in a hierarchical seed tree. Code 15112 may be included to direct the processor 902 to use the seed to generate a cryptographic key. Code 15114 may be included to direct the processor 902 to use the cryptographic key to encrypt data sent to other IoT devices or decrypt data received from other IoT devices.

The key management and generation processes described herein provide a number of techniques for managing security in an environment that includes IoT devices. However, in some instances, managing the generation, lifespan, termination, and reissuing of keys may be complex in an IoT network environment.

FIG. 152 is a ladder diagram of an example method 15200 for unified key management in an IoT network environment in accordance with some embodiments. The method 15200 of FIG. 152 may be implemented by the IoT device 15300 described with respect to FIG. 153. In this example, a service provider (SP) 15202 may be used to provide the overall roots of trust. This service provider 15202 may be a blockchain managed by a group of IoT devices, in the IoT network. In another example, the service provider 15202 may be an external device providing security services to the IoT network.

An IoT server 15204 may manage the local security for an IoT network, for example, storing secure information in a secure storage location 15206 accessible from the IoT server 15204. The secure storage location 15206 may be in a trusted execute environment (TEE), for example, managed by a trusted platform module (TPM).

An IoT client 15208 may interact with both the service provider 15202 and the IoT server 15204 to obtain keys for encryption and decryption of data and communications. Another entity 15210 may participate in the communications, for example, determining that a key has been compromised and triggering the revocation of the keys and generation of new keys. The entity 15210 may be another IoT device in the IoT network, may be a user at administrative console, or may be a manufacturer of IoT devices in the IoT network, among others.

The method 15200 may be used to manage both symmetric keys and asymmetric keys. For certain communications, all data may be protected using symmetric keys. The method 15200 may begin when the IoT server 15204 is onboarded into an IoT network and receives a service provider credential 15212. The service provider credential 15212 may be used to validate the IoT server 15204 to the service provider 15202 in an authentication message 15214. The authentication message 15214 may request that the service provider 15202 provide credentials for secure communications. The service provider 15202 may respond with a trust message 15216 that includes a trust anchor 15218. The trust anchor 15218 may include a hash of a public key, or a certified path, or chain to a trusted root of authority.

An IoT client 15208 may send symmetric key message 15220 to the service provider 15202, requesting that symmetric keys be provided for communications. The symmetric key message 15220 may be signed by a public or private key from the IoT client 15208.

If the symmetric key message 15220 is validated by the service provider 15220, the service provider 15202 may respond with a message 15222 that includes a symmetric key, or ticket. The message 15222 may be signed by the service provider 15202 using the same key provided by the IoT client 15208. The IoT client 15208 may then provide the symmetric key to the IoT server 15204 in a message 15224. The IoT server 15204 may save the symmetric key 15226 to the secure storage 15206. The IoT server may also determine if the secure key is expired by comparing a timestamp to a secure time 15229 in the secure storage 15206. The result of this comparison may be saved in a secure key status 15230.

The entity 15210 may make a determination that a key 15232 has been compromised. Ro example, the entity 15210 may find data that was protected by the key, or the key itself, in network searches. For the secure key 15226 this may result in a message 15234 to the service provider 15202 to revoke the secure key 15226. In response to the message 15234, the service provider 15202 may send a revoke message 15236 to the IoT server. Another message 15238 may be sent to the IoT client 15208, instructing the IoT client 15208. The IoT server 15204 may then re-authenticate with the service provider 15202 by sending an authentication message 15214 to repeat the process.

The IoT client 15208 is not limited to using symmetric keys, but may send an authentication message 15240 to the service provider 15202 using a private key. The service provider 15202 may then decrypt the authentication message 15240, confirming the identity of the IoT client 15208, using a public key belonging to the IoT client 15208.

If the authentication of the authentication message 15240 indicates the IoT client 15208 is valid, the service provider 15202 may send a message 15242 including a certificate. The message 15242 may be signed with the public key for the service provider 15202. The IoT client 1528 may then send a message 15244 to the IoT server 15204 including the certificate. The message 15244 may be signed with a public key for the IoT client 15208. The public key 15246 may be saved by the IoT server to secure storage 15206. The IoT server 15204 may also determine 15248 if the certificate has expired, for example, by comparing a timestamp in the certificate to a secure time value 15250 stored in the secure storage 15206. The status of the private key 15252 may also be saved to the secure storage 15206.

The IoT server 15204 may then generate a temporal symmetric key (TSK) 15254 for communications. The IoT server 15204 may send a key exchange message 15256 including the TSK 15254 to the IoT client 15208. The IoT client 15208 may then communicate with the IoT server 15204 using the TSK 15254, for example, to encrypt a message 15258.

If the entity 15210 detects 15232 that the public key 15226 has been compromised, it may send a revocation message 15260 to the service provider 15202. The service provider 15202 may then send a revocation message 15262 to the IoT server 15204 instructing revoke the public key 15246. The service provider 15202 may also send a message 15264 to the IoT client 15208 instructing it to delete the private key generated for the public key 15246 sent on to the IoT server 15204.

The TSK 15254 does not last indefinitely, and may have a lifespan shorter than the public keys. For example, a message 15266 may be sent by the IoT client 15208 to the IoT server 15204 after being encrypted using the TSK 15254. A secure time value 15268 in the secure storage 15206 may be used by the IoT server 15204 to determine 15270 whether the TSK 15254 has expired. The TSK status 15272 may then be stored in the secure storage 15206 and, if expired, the TSK 15254 may be refreshed with the new value that is exchanged 15256 with the IoT client 15208.

Further if the entity 15210 determines that the TSK 15254 has been compromised, the entity 15210 may send a revocation message 15274 to the service provider 15202. The service provider 15202 may then send a revocation message 15276 to the IoT server 15204 instructing it to change the TSK status 15272 to invalid. The service provider 15202 may also send a message 15278 to the IoT client 15208 instructing it to delete the TSK 15254. At this point, the IoT server 15204 may attempt to re-authenticate to the service provider 15202 by sending the authentication message 15214, restarting the process.

The symmetric key 15226 may have a lifespan, as determined by a secure time value 15282 stored in the secure storage 15206. The IoT server 15204 may determine 15284 that the secure key, or ticket, has expired by comparing the time of use to the secure time 15250. The IoT server 15204 may then issue a refreshed key, SK'. The refreshed key, SK', may then be used until the secure time 15250 is exceeded. The entity 15210 may also monitor to determine if the key, SK', has been compromised, and send out a revocation message 15234 if needed.

As described herein, a key exchange or key management protocol may result in temporary, or temporal, symmetric keys that are used to protect data, including confidentiality, integrity, or both. The temporal keys presume the authentication and trust properties established by the authentication/key exchange event based on an assumption that the temporal keys have not be compromised since they were initially established.

Temporal keys may, however, may have variable lifetimes. Lifetime may be dynamically adjusted based on context and situation. For example, a node that is entering and exiting a sleep mode may not diminish key lifetime while it is sleeping.

Further, key revocation of any keys, symmetric and asymmetric, may be performed by sending a revocation message to both the Client and the Server. In the case where a key is revoked, the credential (certificate or ticket) may be deleted by sending a key deletion message that instructs the Clients and Servers possessing the certificate or the ticket to delete them. Deletion may differ from revocation in that revocation may only instruct the Clients or Servers to refuse verification of revoked keys while deletion may instruct the keys to be physically expunged from the system. Both revocation and deletion messages may take effect immediately, whereas the certificate or ticket expiration may allow the key to be used up to the date of expiry—and subsequent to a key compromise event.

Key lifecycle management further applies to symmetric key cache systems where a temporal key may be reused for a second or third message even though the key is deemed to be temporal. Temporality of cached keys is determined by the cache expiry policy. Hence a key cache policy doubles as a ticket structure where the cache policy configuration message may be specified using a 'ticket' structure that does not contain a symmetric key.

Unified key management leverages key management messages and flows for both symmetric and asymmetric keys allowing reuse efficiencies in implementation that benefits constrained IoT environments.

FIG. 153 is a block diagram of an example of components that may be present in an IoT device 15300 for managing keys in a network of IoT mesh devices 812 in accordance with some embodiments. Like numbered items are as described with respect to FIGS. 3 and 8. The IoT device 15300 may be the IoT server 15204 or the IoT client 15208, described with respect to FIG. 152. It can be noted that different components may be selected and used for the IoT device 15300 than for those selected for the IoT device 800 discussed with respect to FIG. 8, and other IoT devices discussed herein.

In this example, the IoT device 15300 may function as either the IoT server 15204 or the IoT client 15208, described with respect to FIG. 152. In other examples, the IoT device 15300 may function only as an IoT client 15208, for example, if the IoT device 15300 is more constrained. In further examples, the IoT device 15300 may function only as an IoT server 15204.

The IoT device 15300 may include a trusted platform module (TPM) 15302, for example, compliant with the specification promulgated by the Trusted Computing Group as ISO/IEC 11889 in 2009. The TMP 15302 may include a cryptographic processor (CP) 15304, non-volatile memory (NVM) 15306, and secure memory (SM) 15308. The CP 15304 may provide a random number generator, an RSA hash generator, a SHA-1 hash generator, and an encryption-decryption engine, among others. The NVM 15306 may include keys programmed at the time of manufacture that include, for example, an RSA key, among others. The SM 15308 may hold measurements taken on software in platform configuration registers. As used herein, a measurement is a hash code calculated on a code or data segment stored in the storage 808 or memory 804. Starting from a measurement of a boot code segment, the measurements may be used to establish a trusted execution environment (TEE), by creating a chain-of-trust from the initial booting. The SM 15308 may provide the secure storage 15206 described with respect to FIG. 152.

The mass storage 808 may include a number of modules to implement the key management functions described herein. Although shown as code blocks in the mass storage 808, it may be understood that any of the modules may be fully or partially replaced with hardwired circuits, for example, built into an application specific integrated circuit (ASIC).

The mass storage 808 may include a secure booter/measurer 15310 that performs measurements on code or data. An initial boot measurement may be performed by the processor 802, or the TPM 15308, to set up the secure booter/measurer 15310 to perform additional measurements. This may create a trusted execute environment (TEE) to provide security to the IoT device 15300. Succeeding measurements in the TEE may be performed by the TPM 15308 as code segments are prepared for operation.

An authenticator 15312 may be used to authenticate communications with other mesh devices 812, or devices in the cloud 302. The authenticator 15312 may use a packet communicator 15314 to send and receive encrypted packets from the other mesh devices 812, or devices in the cloud 302. The authenticator 15312 may authenticate the communications using a symmetric key provided by a service provider 15202, or a temporal symmetric key (TSK) generated in the IoT device 15300.

A key generator 15316 may be used to generate the temporal symmetric keys (TSKs) for communications with other devices. The authenticator 15312 may exchange the TSKs with other devices. The key generator 15316 may also generate new TSKs, or new symmetric keys (SKs), after the keys have expired, for example, when a secure time for the life of the key has been exceeded. An encryptor/decryptor 15318 may encrypt or decrypt communications using the TSKs or SKs.

A key manager 15320 may be included to monitor and manage the keys. This may include determining if a key has expired and using the key generator 15316 to generate a new key for reissue. The key manager 15320 may monitor communications received through the communicator 15314 for a revocation message from another mesh device 812, or a device in the cloud 302, that indicates that a key has been compromised. Upon receiving the revocation message, the key manager 15320 may change a status of the key to indicate that the key is no longer valid. The key manager 15320 may then re-trigger authentication through the authenticator 15312 to regenerate the keys.

FIG. 154 is a block diagram of a non-transitory, machine readable medium 15400 including code to direct a processor 902 to manage keys for secure communications in accordance with some embodiments. The processor 902 may access the non-transitory, machine readable medium 15400 over a bus 904. The processor 902 and bus 904 may be as described with respect to FIG. 9. The non-transitory, machine readable medium 15400 may include devices described for the mass storage 808 of FIG. 8 or may include optical disks, thumb drives, or any number of other hardware devices.

The non-transitory, machine readable medium 15400 may include code 15402 to direct the processor 902 to authenticate to a service provider. Code 15404 may be included to direct the processor 902 to obtain a key for secure communication or storage. The code 15404 may direct the processor 902 to request a symmetric key, such as a ticket, or an asymmetric key, such as a certificate, from a service provider.

Code 15406 may be included to direct the processor 902 to generate a symmetric key for communications. The symmetric key may be a TSK that is exchanged with another device after authentication through exchange of a public/private key pair. The symmetric key that is generated by the code 15406 may also be a new key generated to refresh a key that has expired.

Code 15408 may be included to direct the processor 902 to determine if the key has reached a preset key lifetime. Code 15410 may be included to direct the processor 902 to refresh an expired key. Code 15412 may be included to direct the processor 902 to encrypt and decrypt communications from other devices. Code 15414 may be included to direct the processor 902 to revoke keys and repeat the authentication to the service provider, for example, if a revocation message is received.

The key management techniques described herein may be used in any number of contexts. For example, when an object activates and needs to connect, it may use information from a registrar about other services or agents running in the network about how to register itself and to find other services and agents. However, public registrars are prone to distributed denial-of-service (DDoS) attacks. If it is feasible, implementing a registrar based on a decentralized protocol may be useful. In a decentralized protocol, a blockchain or ledger may act as a replacement for a public key infrastructure (PKI) to assess device or agent identities by means of their blockchain addresses. The blockchain may be used as a name space that is secure, memorable, and decentralized. Names in a namespace are a limited resource that may be managed in some decentralized manner. Further, lower level addresses that are usually regulated by leases, such as Internet protocol (IP) in a dynamic host configuration protocol (DHCP), may be charged and regulated by micropayments or other credit or currency.

FIG. 155 is a schematic diagram of a process 15500 for bootstrap and discovery of a device in accordance with some embodiments. As used herein, bootstrap is the initial startup of a device, during which the device may load an operating system and other code to perform functions, from a storage device. The process 15500 may take place in an IoT network environment. The block 15502 represents, for example, when a device would boot and would run code in, for example, a secure enclave or trusted execute environment (TEE), such as establish by a trusted platform module (TPM) or other technologies.

At block 15504, the keys for the device to operate as a blockchain client are generated. This may be performed, for example, by the process shown in block 14206 and described with respect to FIG. 142. However, any number of key generation processes may be used, such as the key generation processes descried with respect to FIGS. 137 to 141, FIGS. 142 to 146, or FIGS. 147 to 151, among others.

At block 15506, the device generates a special commissioning transaction on the blockchain. The commissioning transaction may include purchasing a domain name, or some other unique attribute, which may be part of an overall package of attributes making up the device's identity. At block 15508, the device is assigned an identity provided either through the purchased attribute, such as a domain name or universally unique identifier (UUID), or through an owner.

FIG. 156 is a process flow diagram of an example method 15600 for bootstrapping and discovery of devices in accordance with some embodiments. The method 15600 of FIG. 156 may be implemented by the IoT device 15900 described with respect to FIG. 159. The method 15600 may describe a modified boot process that results in a device acquiring an identity. The identity may be used for discovery of services and payment for the services.

The block 15602 represents, for example, when the device starts a boot process. This may occur after the device is first powered or upon a reboot. At block 15604, the BIOS initializes, running normal POST checks. The boot process may be a secure boot process to ensure only trusted SW is run. This is usually performed by hardware enabled by a manufacturer using instructions from a firmware supplier to store keys in the device before deployment.

At block 15606, the secure boot process may boot to a secure enclave or trusted execute environment (TEE). The secure enclave may run an identity client, which could be for example, a Sawtooth Lake Client released by Intel as an open source modular platform for building, deploying, and running distributed ledgers. Once the identity client is initialized, the device may continue to boot as normal. At block 15608, the operating system (OS) boots to an appropriate run level. In some examples, no operating system is present, instead, the device is operated by an advanced BIOS.

At block 15610, a determination is made as to whether the boot process performed correctly. If not, at block 15612, a determination is made as to whether the device should be reset. The reset may be a factory reset of the device, which may wipe all the data from the device and reset it to boot from an on-board read-only ROM image, or the like. If performed, process flow returns to block 15604 to repeat the boot process. If a determination is made that the device should not be reset, at block 15614 and alert message is sent out. The process then ends at block 15616.

If, at block 15610, everything is determined to have functioned correctly during the boot process, process flow proceeds to block 15618 to acquire an identity. Multiple identities may be assigned to devices, for example, devices may have DNS names, IP addresses, MAC addresses, UUIDs, or other methods of establishing their identity. Further, device identifications may be assigned using blockchain techniques, as described with respect to FIGS. 5 through 9, among others. In the present example, a globally unique identity may be acquired in order to participate in a process governed by a smart contract or similar construct. As used herein, a smart contract may be an automatically negotiated contract between two devices, in which a first device performs a service, or provides data, to a second device in exchange for a payment from the second device.

At block 15620, potential services from which an identity can be acquired or discovered are enumerated. The device may perform this function using dynamic or static processes, including, but not limited to, methods such as new DHCP options which specify the location of smart contract or consensus based networks. Further, the potential services may be preloaded into the device, as is the case with some cryptocurrency network clients. The potential services may be advertised in internet based service registries, which the device discovers or is hard coded to use. The potential services may be advertised in a decentralized name service, such as namecoin, among others. Accordingly, the client may become aware of one or more such networks that may use a network identity and begin interacting with any service provided by a smart contract process. Different services or networks may have elected to share identity mechanisms, or they may have completely incompatible approaches to identity.

The device may select services to which it will attempt to subscribe, based on its ability to generate an identity of the type specified by the service or based on its pre-programmed purpose. The services may be statically assigned in the secure enclave during boot or may be set dynamically by a policy system. However, the services may first be verified by processes running within the secure enclave before being trusted.

At block 15622, the device determines if a method by which it will acquire IDs has been selected. As noted, multiple methods may be selected if multiple networks are available for which IDs may be used. If no method is selected at block 15622, an alert message may be sent at block 15614, and the method 15600 ends at block 15616. As the device may have a variety of identities, such as a DNS name, a NetBIOS name, an IP address, a UUID, and the like, the alert may take many forms. For example, the alert may be an email to an administrator, an SMTP trap, an entry in a local or remote log file, an SMS message, a blinking LED sequence on the exterior of the device, or other alerts.

If a method has been selected at block 15622, at block 15624, the device may generate an identity for the chosen service. The device owner may set an option, for example, through a configuration in the secure enclave, to require the device to use identity methods which are hardware backed. In other examples, the owner may make the selection of a hardware backed identity method optional or preferable, which may allow the device to use a less secure method to generate keys or other unique identifiers as required by the service. These settings, or other unanticipated errors or exceptions, may result in the device failing to generate an identity for a particular service.

At block 15626, a determination is made as to whether an identity for the device has been successfully generated. If the identity has not been successfully generated, or a number of identities are to be generated, the method 15600 may return to block 15622 to see if another method can be selected for generating the identification. The device may continue through a list of possible methods or services until it has satisfied its policy settings. For example, a policy may stipulate that the device should stop after it has one identity successfully generated. In other examples, the device may explore all available services, trying many mechanisms of identity generation until successful, or until all options have traversed. The identity generation process may also acquire resources the device may use to carry out transactions, for example, in the case of a crypto-currency network the device may be assigned an initial balance of funds when the identity is assigned.

At block 15628, a commissioning transaction may be generated. The commissioning transaction may be a hardware backed process, which results in the secure and trustworthy generation of a balance for the device. This may include the generation of new coins on the network.

The commissioning transaction may be specific to the particular consensus network. It may validate the identity of the device on the network, and may include the public identity information required by the consensus network. For example, a transaction signed by the private key of the device may include the public key and wallet ID in the transaction, so that the source of the transaction can be easily verified. The commissioning transaction may occur at any time after the identity generation. Further, it may be demand driven, for example, it may only happen the first time the device wants to participate in a transaction. After the first transaction, the identity of the device is publicly known in the network and messages from it can be verified using the mechanism provided by the consensus network.

At block 15630, a determination is made as to whether the commissioning transaction has been completed. If the commissioning transaction has failed, for example, the network has rejected the transaction as invalid, at block 15632 the device generates an alert. Depending on the failure, the device may change some parameters of the transaction and retry the transaction at block 15634. The device may attempt to generate a new identity for that service or select other services for which to generate identities.

An example of a failure that may be retried would be the purchase of a domain name. The domain name may be available when it is checked, and the transaction is generated. However, before it is processed, another entity acquires the domain name. In this example, the device may update the domain name parameter and retry the transaction. Some transactions may fail, but not be able to be retried. For example, a double payment may not be re-playable.

If the transaction has been determined to have been successfully completed at block 15630, at block 15636 the device may be confirmed to have an identity. At block 15614, an alert may be generated to indicate the process is fully complete. The process would then end at block 15616.

If the device is decommissioned at some future point, the blockchain protocol may determine the disposal of the balances, such as mined or assigned coins. The coins may be destroyed, or otherwise removed from circulation. The coins or balance may be redistributed to other devices specified by the device owner. In some examples, the balance or coins may be sold on an exchange and converted to a currency for reimbursement to a device owner.

The process is not limited to the block shown in FIGS. 155 and 156. A more feature rich mechanism using the concept of a blockchain smart contract may be implemented.

FIG. 157 is a schematic diagram of a process 15700 for bootstrap, discovery, and lifecycle of devices using smart contract functions in accordance with some embodiments. The block 15702 represents, for example, when a device boots. This may occur after the device is powered or may occur after the device has been rebooted. As described with respect to block 15502 of FIG. 155, the device would boot and run code in a secure enclave, such as a TEE.

At block 15704, the device may generate a key to be used as a blockchain client. This may be performed, for example, as described with respect to block 14206 of FIG. 142.

At block 15706, the device may interact with a smart contract 15708 on the blockchain, for example, by creating a commissioning transaction. A join contract function 15710 may be performed when a new device first interacts with the smart contract 15708. The smart contract 15708 may support device attestation features and decide whether or not to accept a particular device in the smart contract 15708. The contents of the commissioning transaction may be used to determine acceptance. The join contract function 15710 may enforce policies on a device before it is allowed to join the smart contract 15708. For example, the join contract function 15710 may require that the device encrypts its hard disk, or storage, using a specified minimum standard before joining. The join contract function 15710 may require other features or extra interactions with the device to prepare it before accepting it into the smart contract 15708.

Similarly, conditions or functions may be imposed upon the device upon leaving the smart contract 15708. These may be part of a leave contract function 15712. For example, the leave contract function 15712 may require that the device wipes its memory, such as performing a factory reset. Other requirements of the leave contract function 15712 may include sending an end-of-life message to a maintenance service provider, such as a service organization, sending a drone, or a robot, with the current device location, so the device may be collected, and then shut itself down. The leave contract function 15712 can contain any number of conditions specified by the contract owner.

If the device is allowed to join the smart contract 15708, it is added to a list of created devices 15714, for example, in the blockchain. Generally, only the control function may be stored in the blockchain. Variables may be stored off-chain in any of a number of different secure storage mechanisms. These mechanisms may have a reference in the blockchain. This may be useful for variables that may have significant storage requirements.

A device attribute list 15716 may be associated with the list of created devices at block 15714. Further, devices may self-describe attributes, and store the attributes either in the blockchain or off-chain in a secure storage mechanism. The attributes may include context properties for a simple device such as a type of device, location, device capabilities and features. The attributes may also include a list of advertised services which the device is offering. This may perform as a service discovery mechanism.

The smart contract 15708 can issue tokens 15718 to devices during the commissioning process, or at any time thereafter. The tokens may have a number of abstract meanings and may be issued for different purposes. For example, if a device meets criteria set within the smart contract 15708, for example, having a certain level of encryption capabilities, then it may be issued a special type of trust token. When accessing a service, the token can be presented to the service to require that a data sink for the data coming from the device has those encryption features. Further, tokens can be used to enable a device to access other services or to verify identity.

The smart contract 15708 can revoke tokens 15720 when a device is ready to exit the contract. Once the token is revoked, the access under that token is no longer valid. The revoked token function 15720 may be triggered by the leave contract function 15712 as part of the conditions of leaving the contract.

Once the device is commissioned on the network, at block 15722, it may begin operations under the smart contract 15708. The device may interact with the smart contract 15708 at any time during its operation to request new tokens if new features become available on the device or if its attributes change.

The relationship of devices to the smart contract 15708 may be many:1, many:many, or 1:many. Tokens and attributes may be changed at any time during the device lifetime by engaging with the contract. The smart contract 15708 may be a part of the device, for example, including a shared blockchain that is mirrored on other devices. In this example, the functions of the smart contract 15708 may be part of the blockchain logic used to maintain the blockchain.

In other examples, the smart contract 15708 may be located on another device, in an IoT network, or in the cloud.

At block 15724, the device may be decommissioned, for example, by posting a decommissioning transaction to the blockchain of the smart contract 15708. Any issued tokens are revoked 15720, the device is removed from the list of created devices 15714. Further, the leave contract function 15712 may be implemented.

FIG. 158 is a process flow diagram of an example method 15800 for bootstrapping, discovery, and lifecycle of devices using a smart contract in accordance with some embodiments. The method 15800 of FIG. 158 may be implemented by the IoT device 15900 described with respect to FIG. 159. The block 15802 represents, for example, the device booting. This may be performed as described with respect to blocks 15602 to 15608 of FIG. 156.

At block 15804 keys may be generated for the device to participate in a blockchain or smart contract. The key generation step may be performed as described herein, for example, as described with respect to block 14206 of FIG. 142.

At block 15806, a commissioning transaction may be created and implemented. The commissioning transaction may be as described with respect to block 15628 of FIG. 156. At block 15808 a determination is made as to whether the commissioning transaction was successful. If not, the device may be rebooted as described at block 15802.

If the commissioning transaction was successful, as determined at block 15808, at block 15810 the contracts may be enumerated. As the device may be able to interact in different ways, enumerating the contracts may list the different options. The enumeration may be done in any static or dynamic way, for example, it may be performed on an internet hosted registry of contracts. Further, it may be performed using a lookup method described in section 3.4.3.

At block 15812, the device joins a smart contract by interacting with it, which may involve sending a fee to the wallet address of the smart contract owner.

Negotiation may be involved around the fee, for example, the contract may offer options where the device may pay less if it agrees to some terms and conditions such as providing trusted data, or attested attributes. Other negotiation mechanisms can be employed, including those detailed herein.

At block 15814, a determination is made as to whether the negotiation was successful, and if not, the negotiation continues at block 15812. If the negotiation was successful at block 15814, at block 15816 the device is added to a list of created devices, for example, by committing a blockchain transaction. This may be as described with respect to the list of created devices 15714, described with respect to block 15708 of FIG. 157.

At block 15818, the attributes of the device are published. For each attribute, it may be possible to identify if there is a hardware environment, such as a trust execute environment (TEE) supported by a trusted platform module (TPM), or other trusted mechanism, that may be used to attest or verify that the device actually possesses that attribute.

At block 15820, the device may request tokens for functioning under the smart contract. The tokens may be presented by the device to owners of services when trying to access, or offer, services, or resources, once the device is fully operational. The criteria for the issuing of tokens may take features such as attribute attestation into account. At block 15822, if a particular attribute is attested, a higher value token may be assigned to the device at block 15824. If not, a lower value token may be assigned, for example at block 15826. Multiple token types and token volumes may be assigned to the device. However, this is at the discretion of the smart contract owner, when they are designing the smart contract. Some tokens may be consumable, for example, when they are presented to a process, service, or system owner during device operation, they are consumed in a pay-per-use model in which the tokens are transferred from the device's wallet to the owner's wallet. Other tokens may be perpetual, for example, they may be presented merely to verify that the device is a member of a particular smart contract, a group of devices, or to attest to the device possessing specific attributes, capabilities, or features.

At block 15828, the device is commissioned and assumes operation at block 15830. This may be as described with respect to block 15722 of FIG. 157.

At block 15832, the device is decommissioned. If the device included unused tokens, this may or may not result in a refund of currency between parties to the smart contract. The process then ends at block 15834.

FIG. 159 is a block diagram of an example of components that may be present in an IoT device 15900 for bootstrap, discovery, and lifecycle management in accordance with some embodiments. Like numbered items are as described with respect to FIGS. 3 and 8. It can be noted that different components may be selected and used for the IoT device 15900 than for those selected for the IoT device 800 discussed with respect to FIG. 8, and other IoT devices discussed herein.

The IoT device 15900 may include a trusted platform module (TPM) 15902, for example, compliant with the specification promulgated by the Trusted Computing Group as ISO/IEC 11889 in 2009. The TMP 15902 may include a cryptographic processor (CP) 15904, non-volatile memory (NVM) 15906, and secure memory (SM) 15908. The CP 15904 may provide a random number generator, an RSA hash generator, a SHA-1 hash generator, and an encryption-decryption engine, among others. The NVM 15906 may include keys programmed at the time of manufacture that include, for example, an RSA key, among others. The SM 15908 may hold measurements taken on software in platform configuration registers. As used herein, a measurement may be a hash code calculated on a code or data segment stored in the storage 808 or memory 804. Starting from a measurement of a boot code segment, the measurements may be used to establish a trusted execution environment (TEE), by creating a chain-of-trust from the initial booting. The SM 15908 may provide secure storage. The TPM 15902 may be used to establish a TEE, or secure enclave, for running programs.

The mass storage 808 may include a number of modules to implement the key management functions described herein. Although shown as code blocks in the mass storage 808, it may be understood that any of the modules may be fully or partially replaced with hardwired circuits, for example, built into an application specific integrated circuit (ASIC).

The mass storage 808 may include a secure booter/measurer 15910 that performs measurements on code or data. An initial boot measurement may be performed by the processor 802, or the CP 15904, to set up the secure booter/measurer 15910 to perform additional measurements.

A key generator 15912 may be used to generate keys for communications with other devices. This may be performed, for example, by the process shown in block 14206 and described with respect to FIG. 142. However, any number of key generation processes may be used, such as the key generation processes descried with respect to FIGS. 137 to 141, FIGS. 142 to 146, or FIGS. 147 to 151, among others.

A service enumerator 15914 may be included to enumerate services available to the IoT device 15900 or services that can be provided by the IoT device 15900. For operation in smart contract environments, a contract enumerator 15916 may discover contracts that the IoT device 15900 may join. The contract enumerator 15916 may use any number of discovery technologies to discover contracts, such as the functions provided as part of the specifications provided by the Open Connectivity Foundation, the Allseen Alliance, or the Open Fog Consortium, among others.

Smart contract functions 15918, for example, as described with respect to block 15708 of FIG. 157, may be included to support the use of the IoT device 15900 as a host for a smart contract.

Blockchain logic 15920 may be included to maintain a blockchain 15922 that holds services, attributes, identities of devices, contracts, coin balances, and the like. The blockchain logic 15920 may be used to propagate the block chain transactions to other IoT devices.

FIG. 160 is a block diagram of a non-transitory, machine readable medium 16000 including code to direct a processor 902 to manage keys for secure communications in accordance with some embodiments. The processor 902 may access the non-transitory, machine readable medium 16000 over a bus 904. The processor 902 and bus 904 may be as described with respect to FIG. 9. The non-transitory, machine readable medium 16000 may include devices described for the mass storage 808 of FIG. 8 or may include optical disks, thumb drives, or any number of other hardware devices.

The non-transitory, machine readable medium 16000 may include code 16002 to direct the processor 902 to boot into a secure enclave. Code 16004 may be included to direct the processor 902 to acquire an identity. Code 16006 may be included to direct the processor 902 to generate a key for communications.

Code 16008 may be included to direct the processor 902 to enumerate available services or smart contracts. Code 16010 may be included to direct the processor 902 to join a smart contract. Code 16012 may be included to direct the processor 902 to publish attributes or services available from the IoT device. Code 16014 may be included to direct the processor 902 to request tokens to operate under a smart contract.

To participate in a network, a device or agent requiring data or resources may search the network and other interconnected networks to acquire the data or resources. As used herein, the data may be any data needed to complete a function in the present device, such as distance traffic flow for an intersection controller. Resources include any function that may be used to complete a task, such as a predictive model run on an upstream system, or code used to perform a local function, among others. However, flooding the network with queries may overload the network communications, and may cause problems for energy constrained devices. Further, centralize networks may be vulnerable to distributed denial-of-service (DDoS) attacks. The use of a ledger or blockchain certified credit may help decrease network loading and allow objects to better manage their resources, as well as lowering the vulnerability of the network to DDoS attacks.

To better organize resources for tracking, the resources may be distributed in a distributed hash table (DHT) based network such as Kademlia. In a Kademlia network consisting of n nodes, finding any node in the network will take a maximum of O(log(n)) hops. Additionally, such networks use the concept of k-buckets, which effectively means that nodes in a network know their own neighborhood well and thus, their local k-bucket will have a large number of nodes. However, in some cases, the further away nodes are from a node, the less nodes will be present, indicating that k-buckets with lower k values will have fewer nodes.

As noted, current blockchain techniques may build a Merckle hash tree as a way to index to a particular block in the block chain. If a block hash is known, the block may be efficiently located in a repository of blocks. This may be considered a form of DHT. DHT may also be used to identify specific data that are included in a blockchain. In this approach, a data value may be hashed to a DHT where the location in the DHT database reveals the blockchain block hash where the data can be found.

A system that wants to verify the trust of the data may follow a two-step lookup process, where the interesting data are hashed to a DHT location. That location reveals the block hash values. The block hash values are hashed into the Merckle Tree revealing the actual block in the block chain. A calculation of the block hash and check of the next previous block verifies the block integrity within the chain. In this way, any data that is recognizable in a DHT may have its integrity validated according to an infrastructural trust mechanism.

A bloom filter mechanism, as described herein, may be implemented using DHT. When a DHT value is used to form a bloom filter, it may indicate that there is a topic for that data item available for subscription by a community of subscribers. The community may be interested in the bloom filter value and may be notified whenever a transaction involving the data value is found on a blockchain.

Data analytics is intended to find correlations between seemingly uncorrelated data. Hence, an analytics engine might hypothesize a previously unanticipated correlation, and may subscribe to these topics. If the DHTs for the hypothetically correlated values fire within a frame of time that is statistically interesting, then a data analyst can test his hypothesis. Given a significant body of transactions mapped to the blockchain, this may enable efficient notification of data analysts' hypothesis testing.

This approach to a network structure means queries to far away nodes may return detailed information about the remote neighborhood without having to replicate a complete network map to every participating node. This may keep the network much more dynamic. Broadcasts to discover resources in the local network are relatively inexpensive and the federated nature of an overall network means that the level of resource discovery broadcast traffic across the entire network may be reduced.

However, prior consensus networks do not incorporate this concept because the methods of how to use a blockchain as a control plane with a complementary off-chain data/storage plane were not developed. Therefore, aspects disclosed herein provide a method, which may be used to enable this, and thus, address issues of scalability that arise as more data is stored on-chain over time.

As described herein, a blockchain designed so that the consensus nodes are distributed in a k-bucket fashion may improve the efficiency of the blockchain to locate resources. The k-buckets may introduce local, segmented networks are semi-autonomous and where locally available services and contracts can be stored without distributing them to the entire network. This storage may be done off-chain or on-chain.

As described herein, devices may wish to locate service, smart contract and other information within the network. Storing such information in the chain may create scalability and performance issues as the blockchain can be considered a control plane, rather than a data plane. Using this concept of ledger certified credit, a dynamic cost can be associated with each hop that it takes to acquire a service or smart contract. While a global search may result in the best available matches, it may cost more in terms of time and credit to perform. A searching entity must therefore make a tradeoff decision between paying the cost for a hop or being satisfied with the current search result, which could be an empty set. The resources being searched for must be in a discoverable format and the idea of a bloom filter could be applied as a technique to further increase the efficiency of searches across the network.

FIG. 161 is a schematic diagram of a process 16100 using bloom filter hops to discover resources. In the process 16100, a client, c, node 16102, broadcasts a search 16104 for a resource to a nearest mining, m, node 16106 in accordance with some embodiments. The m node 16106 maintains its own bloom filter 16108 populated with the contents of services, smart contracts and files held within nodes within its local k-bucket 16110, or as dictated by the operation of the underlying DHT protocol. If the result is negative, then the search has failed and the c node 16102 can decide using any of a number of criteria whether to terminate the search or to continue. If the result is to continue, then a more exhaustive search of the contents of the network may be carried out.

As used herein, a bloom filter is a probabilistic data structure, such as a storage structure including a number of bits, that may be used to test whether an element is a member of a set. A query may return one of two different results, possibly in a set or not in the set. Each element, or result, in the bloom filter is a hash function used to populate some set of bits in the filter. If a hash used for search matches all the bits in a bloom filter, then the desired result may be included in the associated K bucket. In contrast, if any of the bits do not match, then the desired result is not in that K bucket. If a potential positive result is returned, a further search of hash codes in the DHT of nodes associated with that K bucket may be performed to determine if the desired result is present.

To continue, them node 16106 broadcasts the search 16104 to another node 16112. That node 16112 may include a bloom filter 16114 populated with the contents of nodes in its local K bucket 16116. If that search is not successful, the c node 16102 has the choice whether to continue the search. If the c node 16102 chooses to continue the search 16104, it may be broadcast to another node 16118. This node 16118 also includes a bloom filter 16120 listing the contents of the nodes in its K bucket 16122. In this case, the search 16104 successfully locates a target service in three hops. Exemplary criteria for continuing a search includes a balance between the criticality of finding a match versus the additional cost to the network of a further search.

FIG. 162 is a process flow diagram of an example method 16200 for resource discovery using distributed hashtags (DHT) in accordance with some embodiments. The method 16200 of FIG. 162 may be implemented by the IoT device 16300 described with respect to FIG. 163. As described herein, a decentralized blockchain may store most of its data in an associated DHT, thus lowering the size of the blockchain database (DB). Resources, such as smart contracts or even files, may be located in the DHT. The providence of the resources may be backed up by the presence of the blockchain record and its associated hash.

A toll payment may be associated with lookups to encourage clients to accept search results that may include a sub-optimal result, so long as a result may fulfill the requirements. The toll payment is a charge for extending the search across devices through further hops between devices and networks. It may be charged if a search is not successful in a first k-bucket, and the client requests that the search be extended. This may save costs over performing an exhaustive search of the network for a somewhat better result.

The block 16202 represents, for example, when the network is powered or new devices are added to it. At block 16204, the network is configured. Both the blockchain and the DHT may need to be configured. Blockchain settings may include a choice of consensus algorithm, a reward level for miners or validators who propose successful blocks, the difficulty level of the algorithm, how often the reward levels are adjusted, and the like. As used herein, the miners or validators are devices that identify devices that may be able to provide a service or function by accessing blockchains and DHTs to located a likely target. The difficulty level of the algorithm may indicate the number of search terms to be matched for a successful search. The reward level may be considered the payment made to a miner or validator for performing a successful search. It may be based on the complexity of the search, the number of hops to reach a result, and the like.

At block 16206, the DHT is initialized. The DHT is instantiated and begins its operation. The DHT owner is free to use any existing DHT or to specify or implement their own specialized protocol, which may further integrate with the blockchain or enable their own differentiating features. The DHT may include non-typical settings, such as how many replicas of a piece of data should be held within the network. In a DHT, files may expire, for example, when the last of any of the peers in a swarm, or the tracker node are no longer available. As described herein, a blockchain-aware DHT may maintain replicas of files automatically within the network. Data may be preserved indefinitely, if the owner of that data has not specified any conditions around how the data can be removed or deleted. Otherwise, data can have a fixed time-to-live (TTL) or the owner and specified delegates may remove it.

At block 16208, the initially empty blockchain database (DB) and genesis block are created. Not all of the data is needed to be stored in the blockchain, as data stored in the blockchain may point to other locations. The blockchain developer may specify what fields or parameters are included in records added to the blockchain through the specific protocols that are implemented. The parties creating or maintaining the blockchain may delegate that decision to application developers, who may choose to store particular data on the blockchain or the blockchain depending on the rules permitted to them by the blockchain developers. In this example, data stored off of the blockchain may be stored in the DHT. At any time in the process, other units may join the network as miners or validators. The miners may add data to the DHT, and to the blockchain, concerning stored resources. The validators may confirm that that data is correct, store the DHT, and perform search functions to locate data concerning stored resources.

At block 16210, a determination is made as to whether there are new participants, such as miners or validators, joining the network. If so, at block 16212, a newly joined miner or validator may copy the blockchain database and the partition DHT. Process flow then returns to block 16210 to determine if any more miners or validators wish to join the network. Any node may be both a miner and a validator, if so permitted by the blockchain protocol in operation. Further, any node may be a blockchain storage or DHT node. If new notes joining the network are participating in the DHT network, this may result in the repartitioning of the DHT in accordance with the protocol rules of the DHT.

At block 16214, the content for the blockchain database and the partition DHT may be created. The content creation may be a two-step process, in which the data gets stored, replicated, and distributed in the DHT and a record pointing to the data location is stored in the blockchain. The content creation may include additional steps for specific types of content, such as determining and accessing content sources, among others. One aspect of this approach over traditional blockchains is that not all miners or validators in the network need to keep records of all the same data. In Ethereum, for example, smart contracts are stored on-chain, meaning that every validator in the network has a duplicate copy. In this example, if the DHT specifies to keep three replicas of each data object, then file fragments for three copies are distributed across nodes participating in the DHT and not every node needs to have a full copy of every file.

At block 16216, a Uniform Resource Identifier (URI) is generated for the created content. The URI may use traditional approaches where a tracker is involved. However, this would introduce a centralized component. Accordingly, to keep the data distributed across the network, the URI may utilize a magnet link or similar content based networking approach, rather than a location based identifiers for data.

At block 16218, the content creator stores the URI, any additional metadata prescribed by the blockchain protocol, and a hash of the contents of the object as stored in the DHT. The hash, stored in the blockchain, assures the providence of the data object, and may be used to verify its contents have not changed. Further, storing the hash in a blockchain may be used to confirm that it existed on a particular date, was created or owned by a specific identity, and the like.

The metadata may be used to control what content creators are allowed to do. For example, a smart contract owner may create a computer program and "orphan" it on the chain so that it may not be subsequently terminated its execution. Accordingly, the blockchain protocol owner may need to give careful consideration on what functions to enable to the blockchain. If enabled, data may live forever in the DHT without deletion for the life of the blockchain, and rights to the data may not be delegated. The data in the DHT may be encrypted using any method that is at the disposal of the data creator to utilize.

At block 16220, a determination is made as to whether there is more content to create. The content creation may be a continuous loop in the method 16200 running in parallel to other activities, so long as both the DHT and the blockchain continue to exist.

At block 16222, content may be identified in the blockchain, or the DHT, or both. The content lookup may begin by checking a bloom filter stored in the blockchain to determine if there is a bit match between the hash of the search target and the bloom filter. If so, this may indicate that the content may be present in the K bucket associated with the bloom filter. The content lookup may then examine the DHT to determine if the content is present.

Content lookup is performed to find data that is no longer stored on-chain and replicated to every node in the network. The data may be stored in a global network, or data plane, making an exhaustive search of the entire network potentially problematic. The DHT implements its own distance metric algorithm to form the k-buckets. Distance may not necessarily be representative of geographical distances, but may be based on, for example, number of hops between participating nodes, latency across those hops, and the like.

Aspects disclosed herein may allow for finding "good enough" search results without necessarily having to find the best global result. As disclosed further below, a disincentive against exhaustive searching may be introduced based on an alternative concept of "toll." As explained earlier, a client may want to search for or discover nodes within the network, which are offering or consuming particular services or data. A typical scenario might be a decentralized global market place for IOT data in which data suppliers and data consumers want to find and contact each other but without the need for centralized marketplace hosters (an example might be eBay or Amazon).

At block 16222, a client broadcasts the hash code of the search target to its n nearest mining or validating nodes. The nodes are defined as being "close" to another node by the DHT distance algorithm. The nodes that are defined as being close may be considered the nodes within the K bucket. Further, the nearest mining or validating nodes have a substantial amount of information about the resources stored within their region. They implement bloom filters as an optimization, for example, so that the client broadcast can be quickly responded to if negative, or a more exhaustive search can be used if it is positive.

At block 16226, a determination is made as to whether the search was successful. The search is successful if it returns one or more results. The "toll" cost for a local broadcast is either minimal or 0, depending on the preference of the blockchain or DHT protocol developers to encourage clients to accept results when possible. If the search identifies a data supplier, the client has to decide if the results are satisfactory, in which case the search process ends, or if they want to search further. The network applies algorithms to calculate "toll" costs for wider searches, should the client wish to proceed further.

At block 16230, a determination is made as to whether the client can pay the toll. In some examples, the client may opt to change the criteria of the search and perform a different local search rather than proceed with the costlier search. The toll cost can be paid in many ways, such as a charge in the crypto-coin currency used by the blockchain. The toll cost may be paid as a service charge added into any contract engagement, where suppliers and producers have concluded a successful contract engagement. The toll cost may be part of the billing calculation of the internet service provider.

If the total cost is paid at block 16230, at block 16232 the broadcast is extended to adjacent K buckets. Process flow then returns to block 16226 to determine if the search has been successful. If so, or if the toll has not been paid at block 16230, the search ends at block 16228.

FIG. 163 is a block diagram of an example of components that may be present in an IoT device 16300 for assembling multiple fractional keys from different nodes in an IP mesh network 812 into a single complete key in accordance with some embodiments. Like numbered items are as described with respect to FIGS. 3 and 8. It can be noted that different components may be selected and used for the IoT device 16300 than for those selected for the IoT device 800 discussed with respect to FIG. 8, and other IoT devices discussed herein.

The mass storage 800 may include a number of modules to implement the coalition group formation described herein. Although shown as code blocks in the mass storage 808, it may be understood that any of the modules may be fully or partially replaced with hardwired circuits, for example, built into an application specific integrated circuit (ASIC).

The mass storage 808 may include a communicator 16302 that sends packets to and receives packets from mesh devices 812 or devices in the cloud 302 over one more communications links, for example, through a mesh transceiver 810, an uplink transceiver 814, and a NIC 816, among others. As described with respect to FIG. 45, the communicator 16304 may perform other functions in addition to those described with respect to FIG. 162, such as translation of packets between protocols, performing proof-of-provenance additions, and the like. Further, the communicator 16304 may be part of an easement system, as described with respect to FIG. 33.

A bloom filter 16304 may be included in the mass storage 808 to hold a bit sequence that contains overlapping hash values for items, such as resources or smart contracts, in an associated K bucket. The K bucket may include information for a number of different IoT devices, wherein an IoT device is capable of providing resources, services, or smart contracts. The bloom filter 16304 may also be associated with entries in a DHT database.

Blockchain logic 16306 may be used to create entries in a blockchain, such as the URI, any additional metadata prescribed by the blockchain protocol, and a hash of the contents of the object as stored in the DHT. The content creator 16308, may be included to create the content for the bloom filter and for the blockchain, such as the URI, the metadata, and the hash codes. A search manager 16312 may direct the search for values, for example, accepting results from searches that may have resulted in potential positive results, or determining if further searching is needed. The search manager 16312 may pay any tolls required for further hops in the search.

FIG. 164 is a block diagram of a non-transitory, machine readable medium 16400 including code to direct a processor 902 to use a bloom filter hops method for resource discovery in accordance with some embodiments. The processor 902 may access the non-transitory, machine readable medium 16400 over a bus 904. The processor 902 and bus 904 may be as described with respect to FIG. 9. The non-transitory, machine readable medium 16400 may include devices described for the mass storage 808 of FIG. 8 or may include optical disks, thumb drives, or any number of other hardware devices.

The non-transitory, machine readable medium 16400 may include code 16402 to direct the processor 902 to create a blockchain database. Code 16404 may be included to direct the processor 902 to create blockchain content. Code 16406 may be included to direct the processor 902 to store blockchain content in the blockchain DB. Code 16408 may be included to direct the processor 902 to search for content. Code 16410 may be included to direct the processor 902 to broadcast the query to devices within one hop. Code 16412 may be included to direct the processor 902 to determine if the search has been successful. Code 16414 may be included to direct the processor 902 to pay a toll for further search hops.

Devices can use peer devices to collaboratively compose a complex task, including for example an exchange of data, access to instrumentation across multiple architectures, and parallel processing. In an example, to compose a complex device across multiple devices, a device may identify possible peers. Once the potential peers have been identified, a device may encode a digital permissions guide for use among the peers. The permissions guide may be a set of policies or rules that determine what services or functions a peer device is permitted to use, access, or provide to other peers. As part of the permissions guide, the device may request the peers to automatically commission themselves to perform subtasks from the complex task and obtain a signature from one or more peers and any users associated with peer devices, as may be outlined in the permissions guide or task. In an example, in response to the device detecting all parties have signed the permissions guide, the device may then provide a signal for the subject matter of the permissions guide to be activated. The actions outlined in the permissions guide may be enacted through a blockchain. In an example, a value or credit can be transferred to designated parties as outlined and agreed to in the permissions guide of the device.

The use of the permissions guide and the use of collaborative devices can also be used in the formation and control of ad-hoc networks. The control of an ad-hoc network by these permissions guides can be limited in time or based on time designations outlined in the permissions guide. In this concept, permissions guides can be created either by humans or by machines acting autonomously.

FIG. 165 is a schematic diagram of an example method 16500 for task definition and commissioning in accordance with some embodiments. The method 16500 of FIG. 165 may be implemented by the IoT device 16700 described with respect to FIG. 167. The schematic shown can represent task definition and commissioning for ad-hoc permissions guide and permissions guide functions 16502. A process of interaction however can begin at 16504.

At block 16504, a device can identify the peers it uses to carry out a task. While devices can perform this discovery, the term device in this context can also refer to agents or services acting through a single device or a number of devices. The discovery of peers and their capabilities at block 16504 can be through a discovery procedure of the device, the system of request, a defined protocol or through a bloom filter hop method of resource discovery as described above.

At block 16506, a device may generate a permissions guide and permissions guide functions 16502. The permissions guide and functions may be machine readable. The permissions guide can be stored on a block-chain, off a block-chain. In an example, the permissions guide can be discoverable and can advertised to the peers discovered by the device. At block 16506, the device can compose a function to be performed into discrete functions to be written into a permissions guide. In an example, the function can be fixed function, general purpose, or specialized code segments. The functions can be authored by human developers, Artificial Intelligence (AI) methods for generating code, or any combination. In an example, the functions may be generated through genetic algorithms.

At block 16508, a permissions guide may be negotiated or edited by the device, peers, or any other party in an ad-hoc network of the devices and peers. Many different aspects of the permissions guide can be edited. For example, the permissions guide may have a format described above that contains methods for joining and leaving the permissions guide. As part of negotiating the permissions guide, edits may be made after the permissions guide advertises attributes and functions of the permissions guide. In response to the advertisement of attributes or functions, the peers of the device may agree to supply these attributes or functions by agreeing to the permissions guide or inserting or editing it. In an example, the device can, through the permissions guide, request the generation of tokens if an authorization by the device or a peer is provided in an attempt to access any services among the peers resources and other functions. In an example, the permissions guide can include functions with limits that have additional information including time constraints, quality of service, or a quality of data. In an example, the permissions guide can include other conditions that a permissions guide owner may request from participating peers. The permissions guide may outline a limited use of source peers. In an example, the permissions guide may move to permit multi tenancy.

As discussed above, terms can be negotiated by peers. For example, a data consumer and a data providers can have a mechanism to negotiate on terms before entering into the permissions guide. In an example, the parties may advertise terms and rates. In an example, the terms and rate can be negotiable. In this way, the entities partaking in the permissions guide can retain a position to ensure that they do not get bound into an unprofitable permissions guide. Examples of these conditions may include minimum subscription rates and periods which data suppliers may want to impose.

At block 16510, the permissions guide can execute. The execution of a permissions guide can be run indefinitely. In an example, the execution of the permissions guide can be for a fixed and specified time. In response to the failure of communications with service providers or data providing peers with permissions guide, the permissions guide may terminate. Similarly, new peers can take over functions of the permissions guide if they improve on function performance from the device or service. Improvement of permissions guide function can include the performance of services used in the permissions guide at lower rates, higher data quality, or other measurable metrics. In an example, a listing of mechanisms for execution during permissions guide execution can be recorded to a permissions guide before the permissions guide commences.

At block 16512, the execution of the permissions guide can be monitored. Monitoring execution of the permissions guide can include searching for new peers and new nodes. At block 16514, a payment can occur between participating parties in response to an agreed upon condition of the permissions guide being met. In an example, the payment can be specified in the permissions guide. At block 16516, the permissions guide can be terminated once the period of the permissions guide expires. In an example, the permissions guide can be terminated in response to a determination that any of the participating parties leave the permissions guide and no replacement parties can be located. In an example, the permissions guide can be terminated in response to a detection that the purpose for which the permissions guide was created has been fulfilled.

Within the ad-hoc permissions guide 16502, the permissions guide functions may be described. For example, a function within the ad-hoc permissions guide 16502 can include join permissions guide function 16518. The join permissions guide function can implement as it has been described above. The ad-hoc permissions guide 16502 can also include a leave permissions guide function 16520 as described above. The ad-hoc permissions guide 16502 may include a function to list of participating devices 16522 which may be similar to other listing device functions described above. The ad-hoc permissions guide 16502 may include a device attribution list function 16524 as described above.

In an example, the ad-hoc permissions guide 16502 may include a function to account for terms and conditions of devices added to the ad-hoc permissions guide 16502. The device terms and conditions listing function 16526 may allow devices joining the permissions guide to have conditions on their terms of service included as parameters or functions within the ad-hoc permissions guide 16502. In an example, the device terms and conditions listing function can also include a function for enforcing penalties that can be agreed upon as part of the permissions guide to be imposed on or agreed to by participating parties of the permissions guide.

In an example, the ad-hoc permissions guide 16502 may include a function to account for the quality of service (QoS) terms and conditions (T&C) list 16528. In the QoS T&C list 16528 may include allowing a consumer of service data from a permissions guide to stipulate QoS rules about the supply of the service and data. These rules can include, for example, specification of data availability, service availability, frequency of supplied data, accuracy of supplied data, and the granularity of the data. The QoS T&C list 16528 may also include a rule if the data is from a trusted sensor, where the data may be from a trusted sensor when the providence of the data can be shown to have come from, for example, a measurement by a sensor as opposed to being a value generated by a piece of code in a processor. The ad-hoc permissions guide 16502 may include a request token function 16530 and the revoke token function 16532 as described above.

In an example, the ad-hoc permissions guide 16502 may include a function to account for the payment terms and conditions. Accordingly, the ad-hoc permissions guide 16502 may include a payment T&C function 16534 to show events that trigger payments between the parties. In an example, these events that trigger payment between parties may include the fulfilment of supply of service of a subscription, the fulfillment of supply of data on a subscription. The T&C functions 16534 can be written to function within the framework of a pay-per-use model, or other model where there can also be a function for the imposition of a penalty on a party to the permissions guide for failure to comply with a previously agreed condition.

In an example, the ad-hoc permissions guide 16502 may include a data plane function 16536. The data plane function 16536 may allow parties to the permissions guide to agree how the data or service will be supplied and consumed. The data plane function 16536 may specify that data may be shared in an off-chain mechanism, and the data plane function 16536 may specify specific endpoints and endpoint technologies to which data can be made available. In one example, the data can be made available through a function subscribing the endpoint to a source or through a function that publishes data for consumption. In an example, the means of data consumption and service consumption by parties participating in the permissions guide 16502 may include authentication and authorization information. Parties to the ad-hoc permissions guide 16502 may supply a service or data and may specify how the parties may make consumption preferences available. Parties consuming data and services may also specify preferences on how the consuming parties may consume authentication and authorization.

The overlap shown for supply and consumption technologies may allow the parties to agree on methods of sharing for services and data without a human getting involved. In an example, a protocol conversion broker may be introduced as a party who may join the permissions guide 16502 to offer automated conversion or automated proxying of the service and of the data to the endpoint type or data format desired by the consumers and consuming parties.

FIG. 166 is a process flow diagram of an example method 16600 for protocol conversion brokering by a protocol conversion broker in accordance with some embodiments. The method 16600 of FIG. 166 may be implemented by the IoT device 16700 described with respect to FIG. 167. The concept of a protocol conversion broker may be, for example, a party who can join the permissions guide to offer automated conversion or automated proxying of the service/data to the endpoint type or data format desired by the consumers. Process flow may begin at block 16602.

At block 16602, peers can be discovered. This can be done by the protocol conversion broker, by party, or by a permissions guide 16502 computation. In an example, the discovery of peers may be an initial phase or may be repeated throughout the process to ensure peers are known.

At block 16604, a permissions guide 16502 may be drafted between potential participants. The drafting of an ad-hoc permissions guide 16502 can include the definition of a task or tasks to be undertaken during drafting of the ad-hoc permissions guide 16502 phase. In an example, a task may refer to the supply of a service. In an example, supplying a service can make use of information provided by suppliers regarding the service. Suppliers of services may advertise their services through a lookup service. A lookup service may be centralized or decentralized. One method of looking up services is described herein. In an example, this drafting of the ad-hoc permissions guide 16502 can include a phase of exchanges where peers in the permissions guide 16502 may have specified ranges for particular parameters. Parameters may be marked by a party as preferred. Parameters may provide an ordered weighting of the preference compared to other party preferences.

At block 16604, the permissions guide 16502 can be joined. The protocol conversion broker may join the permissions guide 16502. The protocol conversion broker may oversee the joining of the permissions guide 16502 by a party or several parties. In an example, the permissions guide 16502 may include a time-to-live (TTL) parameter which may be used later to determine if the permissions guide 16502 ends or if the consumers of the service wish to continue and try to find alternative suppliers. Devices exposed to the permissions guide 16502 may also have a minimum number of parties to meet parameters of the permissions guide 16502. In an example, these listed parameters can be outlined in terms of services, attributes of the participating devices, T&C's, and QoS parameters. During a joining permissions guide phase, parties may join, leave, or be ejected from the process in response to the identification of a lower cost entity for execution of a task of protocol. Similarly, parties may join, leave, or be ejected in response to identification of an entity for execution of a task or protocol with a higher net value entity.

In an example, if there are three particular features and attributes that are favored to be present by the task consumers, these features and attributes might be initially supplied by three different parities at varying costs. During this phase, in this example, in response to identification of a single party that may supply the service at a better price point, then use of this found single party may be a more optimal solution.

At block 16608, a protocol conversion broker can request an auto-commissioning of the service providing nodes. The service providing nodes may refer to nodes that provide services outlined in the ad-hoc permissions guide 16502. Auto-commissioning may include deployment of micro-services out to IoT devices in the field which contain functionality to process data and services in a way specified by task consumers. In an example, auto-commissioning may involve tasks that are possible to do automatically, or remotely in a reasonable period of time without manual intervention. Auto-commissioning may also, if specified, use manual deployment of devices in the field. The manual deployment may include deployment by humans, trained animals, drones, or robots. In an example, manual deployment may be used in a version of this process if the QoS settings including the time of deployment by suppliers meet the requests of the permissions guide 16502 by the parties.

In an example, tokens or objects to describe functions including constants, identifiers, operators, reserved words, and separators, and preambles can be provided to the parties within the permissions guide 16502. A preamble, as previously described, may involve a configuration, initialization, and exchange of any information between peers which may be used to proceed further. A preamble may include the location of services, machine readable application protocol interface (API) descriptors, access credentials, access to keys. In an example, an unsuccessful preamble can include loss of a critical mass of suppliers, loss of the consumer, a drop out of the process. If a party drops out, the process can return to a drafting of the ad-hoc permissions guide 16502.

At block 16610, execution of the permissions guide 16502 begins, if a preamble and proceeding steps are present and successful. Based on the conditions and parameters of the preamble and the permissions guide 16502 and agreed to terms of the parties, payments can be unlocked if terms are met. In an example, the terms have been exchanged and agreed to in the drafting of the permissions guide 16502.

At block, 16612, final payments can be made through the protocol conversion broker in response to a detection that a peer is terminating their participation in the permissions guide 16502. If the permissions guide 16502 can continue to function with the existing members, the permissions guide 16502 may continue to function if there is a determination that the TTL has not expired. However, if the TTL expires prior to the process completing, then the permissions guide 16502 may end. In an example, if the permissions guide 16502 may not be able to continue without finding alternative suppliers or consumers, then the process may return to the discover peers phase 16602.

FIG. 167 is a block diagram of an example of components that may be present in an IoT device 16700 to define tasks and commission nodes in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a permissions guide drafter 16702 to draft a permissions guide 16502 for a number of discovered peers, where the number of discovered peers each have a parameter, and where a term of the permissions guide 16502 may be generated in response to the term being allowable by at least two of the number of discovered peers. The parameter of each discoverable peer of the number of discovered peers may include a range of an allowable term range for an associated peer. The permissions guide drafter 16702 may include a function for listing of the terms and conditions of the number of discovered peers. The permissions guide drafter 16702 may include a listing of the quality of service terms and conditions for the number of discovered peers, for example. The permissions guide drafter 16702 includes a listing of data plane terms and conditions for the number of the discovered peers. In an example, the data plane may indicate a process for how the data is to be supplied and consumed by the peers. The permissions guide 16502 may also include a time-to-live as described above. In an example, the permissions guide 16502 may include a protocol conversion broker to manage the joining and leaving of the permissions guide 16502 by a peer. The permissions guide 16502 may include a preamble to manage the exchange of a configuration between the number of discovered peers.

The mass storage 808 may include an action executor 16704 to execute an action of the permissions guide 16502 in response to detecting that a condition of the term is satisfied. The action executor 16704 may include a function for auto-commissioning of a service to a peer instructing the peer to process data. In an example, the term refers to a rate of payment to be paid between the number of discovered peers, and a final payment may be made between peers upon a detection that a peer of the number of discovered peers is terminating participation in the permissions guide 16502.

FIG. 168 is a block diagram of a non-transitory, machine readable medium 16800 including code to define tasks and commission nodes in accordance with some embodiments. Like numbered items are as they are described with regards to FIG. 9.

The non-transitory, machine readable medium 16800 may include code 16802 to direct the processor 902 to draft a permissions guide 16502 for a number of discovered peers, where the number of discovered peers may each have a parameter, and where a term of the permissions guide 16502 is generated in response to the term being allowable by at least two of the number of discovered peers. The drafting of the permissions guide 16502 may include a function for listing of the terms and conditions of the number of discovered peers. The drafting of the permissions guide 16502 may include a listing of the quality of service terms and conditions for the number of discovered peers. The drafting of the permissions guide 16502 may include a listing of data plane terms and conditions for the number of the discovered peers. The data plane may indicate a process for how the data is to be supplied and consumed by the peers. The permissions guide 16502 may include a time-to-live. The permissions guide 16502 may include a protocol conversion broker to manage the joining and leaving of the permissions guide 16502 by a peer. The permissions guide 16502 may include a preamble to manage the exchange of a configuration between the number of discovered peers.

The non-transitory, machine readable medium 16800 may include code 16804 to direct the processor 902 to execute an action of the permissions guide 16502 in response to detecting that a condition of the term is satisfied. Executing an action of the permissions guide 16502 may include, for example, auto-commissioning of a service to a peer instructing the peer to process data. As used herein, term refers to a rate of payment to be paid between the number of discovered peers. In an example, a final payment may be made between peers upon a detection that a peer of the number of discovered peers is terminating participation in the permissions guide 16502.

A floating service may be a website or virtual service that floats around the internet managing a digital wallet associated with the floating service, and negotiating for hosting as well as jobs that could use the software of the floating service. The floating service can include software for execution on a range of hardware, where the execution of the software can be done at varying efficiencies based, in part, on the software of the service and the hardware being used. The execution of jobs using the service selected software and the service selected hardware, can result in a payment for the job completed.

As used herein, the payment may be performed through a commission on sales that a floating service is processing. The payment may be in compensation for advertising provided on the floating service or by the service. In an example, several services can be compared for use in processing a job. A number of services may each be associated with their own digital wallet. While a floating service may be paid for the work completed by the floating service, the floating service may additionally pay for access to resources, software, or sub services, in order to complete an agreed to job, for example. A floating service may also cease to function when a value in the digital wallet is zero. Through the ceasing of functions without value, a manager or owner of floating services may allocate value between digital wallets for a number of services. A manager of floating services can set the digital wallets to automatically replenish or withdraw a value in response to a detection that the digital wallet reaches a set value in an associated wallet. In an example, a floating service can include a service for mining bitcoins, litecoin, dogecoin, other cryptocurrencies, protein folding projections and other processor and software based jobs or service centric jobs that a floating service can complete to return value to a digital wallet. In an example, a dedicated computer could serve as a host or a hired host for a floating service.

FIG. 169 is a process flow diagram of an example method 16900 to manage a floating service and value in a digital wallet in accordance with some embodiments. The method 16900 of FIG. 169 may be implemented by the IoT device 17200 described with respect to FIG. 172. The schematic shown can represent the process of a floating service lifecycle and the drafted floating service permissions guide 16902. A process of floating service lifecycle may begin at block 16904. Like numbered items are as described in FIG. 165.

At block 16904, a floating service may identify hosts the service may use to carry out a task. This discovery of hosts and host capabilities may be performed using a bloom filter hop as disclosed above. At block 16906, the floating service may create a machine readable permissions guide which may be stored on a block-chain or off a block-chain. In an example, the permissions guide may be discoverable to identified peers and hosts. The permissions guide may be advertised to identified peers and hosts, or may be discoverable by devices that have not been identified on the network. At block 16906, the floating service may compose a task to be performed into functions. The functions can be written into a permissions guide. The task and the composed functions can be broken down into smaller fixed functions with general purpose. The task and composed functions may also be broken down into specialized code segments. The task and function codes may be generated, for example, by an artificial intelligence including genetic algorithms.

At block 16908, the permissions guide may be modified to fit a predefined format. An example of a format for a permissions guide may be a format that allows for peers and hosts to join and leave the guidance and enforcement of the permissions guide. The permissions guide may also include a listing of attributes and functions that the hosts agree to supply. The functions agreed to by the hosts may include, for example, network services, load balancing, use of fully qualified domain names (FQDNs), use of domain name system (DNS), and firewall services. The permissions guide may include a listing of time constraints and quality of service conditions to be followed by the owner of the permissions guide as well as any joining peers and hosts. In an example, the permissions guide may use exclusive hardware of a host through permitted multi-tenancy or through sharing of direct access to the host hardware. The above listed parameters, and other parameters that can be used by a floating service may feed into a determination of a higher or lower fee being paid from the requesting floating service to the host provider or host providers.

At block 16910, the permissions guide may begin execution. The execution may be based on the conditions, functions, and input received at devices that are governed by the permissions guide. As noted above, the permissions guide may have a set fixed time, no fixed time, or conditions based execution. In an example of execution of the permissions guide, the permissions guide may terminate in response to a detection that a service providing peer disappears or a data providing peer disappears. In an example, peer device or host devices can be replaced, substituted, or decommissioned if there is a detection that peers and hosts are providing services at lower rates then agreed to in the permissions guide. A peer device or a host device may also be replaced, substituted, or decommissioned in response to a detection that a data quality may not be in line with metrics agreed to in the permissions guide.

At block 16912, the service entity and the hosting entity may include a function to exchange terms between hosts and peers to identify mutually agreed upon terms for listing in the permissions guide. Terms in the permission guide may include execution priority, communications bandwidth, access permissions, and the like. At block 16914, payment may be exchanged between peers and hosts that have joined the guidance of the permissions guide of the floating service 16902. The payment may be exchanged upon the meeting of conditions outlined by the floating service permissions guide 16902. In an example, the exchanging of payment may include preparing a payment and providing the payment data to a service wallet 16916. The payment may be through existing value or through credit to a service wallet from a peer, host, or other party that has joined the floating service permissions guide 16902. In an example, the exchange of credit between two wallets can be from a service wallet 16916 to a host wallet 16918. The wallets of any entity may be a logical storage of a numeral representation of value, credit, or debit. In an example, a peer or host can be limited by the value in their wallet. If a peer, host, or other provider fails to meet obligations of the floating service permissions guide 16902 then an exchange of value between the service wallet 16916 and an injured parties wallet or a general value holding place may allow for penalties and value withdrawn from the service wallet 16916. One example of a violation of an obligation may include a peer or host not meeting an agreed upon level of availability. In an example, the function of a host, peer, or floating service may be regulated, governed, or limited based on a value stored in the wallet associated with that service, peer, or host. In an example, once funds may be exhausted in a service wallet 16918, the access peer or host associated with that wallet may be removed from the permissions guide 16902. Warning thresholds may be provided to notify a floating service owner when the value in an associated wallet is lower or higher than a designated threshold. The warning threshold values may be associated with an automatic cutoff or throttle of service based on a value in a wallet reaching or passing a designated threshold.

At block 16920, the permissions guide 16902 may be terminated. The termination may apply in response to a condition being met by a peer or host. The termination of the permissions guide 16902 may be in response to a time period elapsing, a number of peers leaving, a number of hosts leaving, a percentage of peers leaving, a percentage of hosts leaving, a lack of incoming peers and hosts, or any other manually set guideline agreed to in the permissions guide 16902.

As one of the permissions guide 16902 functions, a host attribute function 16922 provides a listing of the capabilities that a host that has joined the permissions guide may be offering. In an example, the capabilities a host may be offering may include attested features, trust based features, and features that operate upon receipt by the permissions guide 16902 of proof of authorization for access to the host and to the function. The availability of the host attributable function 16922 may be limited to reduce the supply or access to such features in order to maintain a value of the services of the host attributable function. The host attribute function 16922 may be associated with a listing of host function conditions for the service around the host function activities and host function behavior. The host attribute function 16922 may deny access to a host function or impose a penalty upon a detection that the floating service breaches conditions of the host attribute function 16922.

A list of hosted services 16924 and corresponding service terms and conditions (T&C) list 16926 combine to allow services joining the permissions guide to indicate conditions on their levels of service included as parameters or functions within the permissions guide 16902. In an example, parameters listed in the permissions guide 16902 may be rated on a scale indicating their degree of priority or lack of priority relative to the floating service and the floating service operation. The service T&C list 16926 may outline penalties that may be agreed upon by peers and hosts. These penalties may be applied to a peer or host that reaches agreed upon conditions of the floating service permissions guide 16902.

FIG. 170 is a schematic diagram of an example floating service data structure 17000 to manage a floating service 17002 and the options, conditions and terms in accordance with some embodiments. In an example the floating service data structure 17000 may show floating service conditions, terms, and features based on the priority of condition, term, and feature. The listed options, conditions, terms, features, values, and their related priorities shown in the example floating service data structure 17000 are exemplary and may be included in a listing of terms and conditions of a floating service permissions guide 16902.

The floating service data structure 17000 may assess the calculated costs, known costs, and unknown costs when choosing a host. In an example, a floating service 17002 may use the data structure 17000 to compare a combined identified cost to a listing of features and the identified feature requests of the floating service and job. In an example, a list of features for a floating service may be inserted into a decision matrix of the data structure 17000.

A decision matrix of a data structure 17000 may include a comparison of identified hosts, peers, and other devices or resources available to a floating service 17002. In the example provided, the data structure 17000 shows example data collected from three hosts, host 1, host 2, and host 3. In the example data structure 17000, based on the priority of features and the data gathered from the hosts, a floating service 17002 may determine that host 2 and 3 are possible hosts for execution of the floating service, while host 3 may rank higher due, at least in part, to an increased presence of features with priority in data received regarding host 3. In this example, host 3 displays a higher nominal cost, and is shown to receive a higher decision score or value shown in the example floating service data structure 17000. The higher value may be the result of host 3 fulfilling features with increased importance priority relative to other features, options, conditions, and terms considered. The formula calculating this decision score and value may be calculated in a number of ways including a method of calculation dividing the sum cost per hour of a host by the sum of the rating for each feature, option, condition, or term that is listed for comparison in the floating service data structure 17000 of the floating service 17002.

FIG. 171 is a process flow diagram of an example method 17100 for floating service management in accordance with some embodiments. The method 17100 of FIG. 171 may be implemented by the IoT device 17200 described with respect to FIG. 172. Process flow may begin at block 17102.

At block 17102, a floating service may be created. The floating service may be created in an encapsulation module capable of being executed on a wide range of hardware systems. In an example, the encapsulation modules may be containers such as docker containers and virtualization constructs including virtual machines. In an example, an encapsulation module may be a framework capable of being used to package and distribute software binaries. The floating service may then assign requests to allow the floating service owner to specify priorities for the floating service. In an example, a priority can include features or specific capabilities including options of hardware. Hardware features may include CPU capacities and capabilities, storage capacities and capabilities, and memory capacities and capabilities. In an example, these capacities and capabilities may include an assessment of whether or not hardware accelerators are present. In an example, if hardware accelerators are present, then hardware enable features may be assessed including Advanced Encryption Standard (AES), SGX, virtualization (VTx), or high availability services. A floating service owner may also specify software dependencies as features to be assessed. Software features to be assessed may include, for example, an operating system type, an operating system version, a software version, patching levels, and the presence of layered applications for messaging and communication. While creating the floating service at block 17102, the quality of service and the terms and conditions of the floating service may be attached. In an example, the service owner or a connected data source may indicate a geographical location of the floating service or an exclusivity status of the hardware. The creation of the floating service at block 17102 may include attaching a service wallet. In an example, the floating service owner may create a new wallet to be associated with the floating service. In an example, the floating service may associate or share an existing wallet. As used herein wallets may refer to any store of value and may include bitcoin wallets, ethereum wallets, and google wallets. A floating service may also include specific forms of funding other than a wallet such as payment services similar to and including PayPal and Visa online services. The creation of the floating service at block 17102 may include the assigning of funding rules for the floating service. In an example, rules for the floating service may include funding triggers that would cause a wallet to be refilled or not refilled. In an example, one setting could include an automatic refill or top-up of the wallet by a preselected amount by a user in response to a detection that a balance of the wallet has passed below a threshold. The floating service owner may choose to indicate a rule for the floating service that indicates that the floating service may cease to execute if the floating service reaches a zero value point in an associated wallet or if a negative value generation rate is detected. Additional rules initiated during the creation of a floating service at block 17102 can include a combination of date triggers, event triggers, and balance triggers. The floating service may use theses triggers as indications that a certain wallet filling action may occur. In an example, a wallet may transfer funds to a separate wallet, account, or financial service in response to detecting a balance exceeding a certain threshold or passes an identified date trigger or event trigger. A transfer of funds can include a specified amount of funds to be transferred, the identified surplus funds, or the sum of the funds in the wallet. In an example, the wallet may include a TTL criteria. In an example, the floating service owner may specify a value for a TTL. A TTL may include a limit on the number of operations to execute, a number of fund transfers, or a number of transactions to a wallet. In an example, a TTL for a floating service may also be automatically extended if certain criteria for dates, activity levels on the service, and criteria for movement of the floating service.

At block 17104, the floating service may be dispatched. The dispatch of the floating service may begin in response to an indication that the full configuration of the floating service is completed. The configuration of the floating service is disclosed, in part, above with regard to block 17102. In an example, a dispatch mechanism may be dictated by the encapsulation module used, as described above. In an example, if the service is a container, then existing methods for deploying the container may be employed once a suitable target home is found for it. In response to the floating service dispatch, hosts may be discovered. In an example, finding a target host may include first searching for systems offering hosting services. In response to the dispatch of the floating service from block 17104, the contracts may be enumerated. In an example, systems offering services may offer multiple permissions guides, where a permissions guide may include different criteria. The permissions guides may be enumerated. In response to the dispatch of the floating service from block 17104, a host and a permissions guide may be selected. In an example, the method for selecting a particular host and selecting a particular permissions guide may take place as discussed above.

In response to the dispatch of the floating service from block 17104, terms and conditions may be negotiated or exchanged as described below. In an example, if a peer, host, or other party has marked a part of the permissions guide as negotiable, then ranges can be specified around those parameters. Other policies may be implemented to allow portions of the permissions guide to be negotiable, such as paying a fee for the right, among others. In an example, hosting may be shared at a particular cost and this offer can contrast with another offer where limited access to hardware may be available at a higher cost. In an example, a particular floating service may have ranges which the floating service may be authorized to pay for different qualities of service. In response to a detection that a limited use of hardware fits within an acceptable range of payment, then the floating service may choose to accept the offer for limited access to the hardware. A floating service may instead not tag the limited hardware configuration as preferable, and in response to this tag, the floating service may default to an option in the market which meets the floating service minimum threshold.

In response to the dispatch of the floating service from block 17104, a preamble may be provided. As described above, the preamble may include an exchange of information which may be used for the permissions guide to begin execution. The preamble may include wallet identifiers, identity information, access information, key exchanges for the service and the hardware, hosts location, host IP address, or the location where the floating service is available. In response to a detection that the preamble fails, another host may be selected with the process resuming from the reviewing and selection of the host as part of block 17102. In response to a detection of a preamble fail, a notification may be sent to a floating service owner. The notification may include a request for input regarding if the floating service owner may reduce a level of hardware, software, terms and conditions, or quality of service being sought to open up more options for the floating service based on the supply of capable hosts in the market.

At block 17106, the permissions guide may begin executing. In an example, the permissions guide execution may begin in response to the preamble phase completing. In response to the start of execution of the permissions guide, the execution conditions may be measured. During permissions guide execution, payments may be unlocked as events or conditions of the permissions guide are met. While a party that joined and agreed to the permissions guide may leave the permissions guide, the party leaving the permissions guide may incur a penalty to be charged to a wallet associated with the party. In an example, the permissions guide may be based, at least in part, on the nature of the floating service and being based around the concept of a permissions guide.

In an example, the billing period of the permissions guide could be as small as desired, perhaps seconds or microseconds. In an example, if during a permissions guide executing, a host or a peer meets a QoS condition, the process may proceed and other conditions accessed. In response to a detection that a QoS condition ranks as unsatisfactory, the permissions guide may be terminated or penalties may be applied to a violating host. In an example, termination of a permissions guide may be a decision taken by the permissions guide automatically based on implementation managed by an AI. Termination of a permissions guide may be a decision taken manually, in an example, at the discretion of both the service provider and the service consumer.

In response to the permissions guide executing at block 17106, payment can be reached when terms and conditions of the permissions guide reach triggering thresholds. The payments and penalties assessed may be multidirectional such that payments can be transferred or offset between multiple parties, peers, and hosts. As noted above, if a party is terminated or leaves, the permissions guide may be terminated.

At block 17108, final payments may be exchanged. In an example, in response to a permissions guide reaching a natural end then the process may be ended or reset. In an example, a natural end may refer to the expiration of a TTL. In response to a detection that the TTL of a floating service is not expired, then the floating service may begin a new cycle of discovering another host.

FIG. 172 is a block diagram of an example of components that may be present in an IoT device 17200 to manage floating services in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a floating service permissions guide drafter 17202. In an example, the floating service permissions guide drafter 17202 may draft a floating service permissions guide for a number of discovered hosts for executing the tasks of a floating service, where the number of discovered hosts may be assessed for host fulfilment of a parameter specified in the floating service permissions guide.

In an example, the floating service permissions guide may indicate penalties to be assessed against a host in response to a detected violation of the service permissions guide, the penalties are to be collected from a host wallet.

The mass storage 808 may include a host hardware selector 17204. In an example, the host hardware selector 17204 may select a host hardware for the floating service based on a data structure of the floating service.

In an example, the data structure is a decision matrix. The decision matrix may list a feature sought by the floating service, a number of available hosts, and an assessment score of the hosts relative to the feature listed in the decision matrix. The floating service may select a host based on a best value calculated from a cost per hour divided by a number of features with quality metrics indicating satisfactory use for the floating service, where the cost per hour is a projected cost per hour of operating the floating service using a host being assessed. The features of the floating service may variously weigh the features in a value calculation using the decision matrix.

The mass storage 808 may include a floating service permissions guide executor 17206 to implement the floating permissions guide for the IoT device 17200. In an example, the floating service permissions guide may use the host hardware.

The mass storage 808 may include a value transferor 17208. In an example, the value transferor 17208 may transfer value to a service wallet associated with the floating service in response to a detection that a condition of the floating permissions guide is reached. In an example, the service wallet may hold a block-chain encoded value. The floating service may cease functioning when the service wallet has a value of zero. In an example, the permissions guide may indicate that a service wallet may transfer value in response to a detection that the service wallet has reached a triggering threshold value. The floating service may initiate a value transaction between the service wallet and a host wallet.

FIG. 173 is a block diagram of a non-transitory, machine readable medium 17300 including code to manage floating services in accordance with some embodiments. Like numbered items are as they are described with regards to FIG. 9.

The non-transitory, machine readable medium 17300 may include code 17302 to draft a floating service permissions guide for a number of discovered hosts, where the number of discovered hosts are assessed for host fulfilment of a parameter. In an example, the floating service permissions guide may indicate penalties to be assessed against a host in response to a detected violation of the service permissions guide, the penalties are to be collected from a host wallet.

The non-transitory, machine readable medium 17300 may include code 17304 to select a host hardware for the floating service based on a data structure of the floating service. In an example, the data structure is a decision matrix. The decision matrix may list, for example, a feature sought by the floating service, a number of available hosts, and an assessment score of the hosts relative to the feature listed in the decision matrix. The floating service may select a host based on a best value calculated from a cost per hour divided by a number of features with quality metrics indicating satisfactory use for the floating service, where the cost per hour is a projected cost per hour of operating the floating service using a host being assessed. The features of the floating service may variously weigh the features in a value calculation using the decision matrix.

The non-transitory, machine readable medium 17300 may include code 17306 to execute the floating service permissions guide using the host hardware. The non-transitory, machine readable medium 17300 may include code 17308 to transfer value to a service wallet associated with the floating service in response to detecting that a condition of the floating permissions guide is reached. In an example, the service wallet may hold a block-chain encoded value. The floating service may cease functioning when the service wallet has a value of zero. In an example, the permissions guide may indicate that a service wallet may transfer value in response to a detection that the service wallet has reached a triggering threshold value. The floating service may initiate a value transaction between the service wallet and a host wallet.

Permissions guides may incorporate a run-time calculation for a cost of service provision as well as historical reputation of a host or service. Costs may refer to energy costs, equipment capital costs, depreciation costs, point-in time capacity costs, data privacy costs, data entropy costs. As disclosed herein, a permissions guide negotiation process may be time based. The permissions guide may be capable of switching between providers even if tasks have been assigned and in the middle of execution. In an example, switching between providers may occur in response to changing conditions that may affect the consumer or provider of the service.

FIG. 174 is a schematic diagram showing an example permissions guide negotiation process 17400 in accordance with some embodiments. Like numbered items are as described in FIG. 165.

In an example, a negotiation for a permissions guide may not exist or may be a template permissions guide. A template permissions guide may be an incomplete version of an enforceable agreement stored as a series of permissions scattered across a storage medium or as a single document indicating permissions, rights, and obligations of the parties that agree to adopt the permissions guide. A template permissions guide may allow an interested party access to read and commit changes.

The permissions guide negotiation process 17400 may begin in response to the discovery of peers and the initial drafting of a permissions guide. In an example, an initial permissions guide may be populated with QoS T&C's as requested by the service or requested by the data consumer or data consumers.

The permissions guide negotiation process 17400 may receive indications of interest to join from peers, hosts, and other services. Accordingly, a candidate service provider or consumer wishing to join and abide by the permissions set by the permissions guide may begin the process of joining by applying to join 17402. A candidate service provider or consumer applying to join may provide information on provider attributes or consumer attributes respectively. The provider attribute and consumer attributes can refer to capabilities or features of the devices as asserted or may validate the capabilities and features prior to proceeding to include these capabilities and features on a device attribute list 16524.

An offer function, a request function, or an assignment function 17404 may be used to identify a usable set of service providers, data providers, and consumers. The set of service providers, data providers, and consumers may be useable if attributes and capabilities are overlapping such that the attributes and capabilities are capable of meeting the terms of the permissions guide. Meeting the terms of the permissions guide may refer to, for example, satisfying a complete set of the parties' requests. Meeting the terms of the permissions guide may refer to, for example, satisfying as many parties' requests as practicable.

In an example, offers may be made by a candidate service consumer to a highest ranked service provider or data provider. Providers receiving an offer may send a request to confirm their acceptance of the offer. In response to receiving an offer, the accepted provider may be held to the permissions of the permissions guide and become part of the list of confirmed devices 17406. During the joining process, negotiation may be occurring. During negotiation, candidates may agree how the service or data can be accessed. If no overlapping set of technologies can be agreed to, then a protocol and data schema broker, such as a third party permissions broker, may be invited to join the permissions guide as an intermediary.

Confirmed providers and consumers may optionally opt out of the permissions guide. Opting out may not carry any cost, or there may be conditions where a penalty is applied. In an example, if a device fails to fulfil its obligations and no replacement device can be identified, then a penalty may be accessed.

During execution of the permissions guide 16510, other providers and consumers may apply to join and may join. As the permissions guide executes 16510, providers and consumers may be replaced.

FIG. 175 is a process flow diagram of an example method 17500 for permissions guide negotiation in accordance with some embodiments. The method 17500 of FIG. 175 may be implemented by the IoT device 17700 described with respect to FIG. 177. Like numbered items are as described with regard to FIG. 166. Process flow may begin at block 16602. At block 17502, nodes may apply to join. The nodes can include providers, contributors, and other devices and services that may wish to be governed by the permissions guide.

At block 17504, the nodes may list their offerings, attributes, and any terms or conditions a node may have. During the node application process a cost function may be applied to the inputs received from the nodes. In an example, the cost function can be an infocoin algorithm as disclosed below. The cost function may apply to nodes in an IOT marketplace because, in an example, a cost assessment may include the cost of deploying and provisioning IOT devices in the field. Cost assessments may include, for example, the energy, running, and maintenance costs of operating the device, data transport, and storage devices. Costs assessments may include the cost of these devices deployed across a widespread infrastructure plus the cost of an operating margin. In an example, the margin may refer to an area where negotiation can take place through the use of lower and upper ranges by various parties.

At block 17506, a data plane may update. The data plane may represent an on-block-chain or off-block-chain mechanism. As discussed above, the data used and referenced in a block-chain may be executed through integration with a distributed hash table (DHT).

At block 17508, devices that meet approval may be added. In an example, confirmed devices may be identified through a device criterion, through parameter selection, or based on a cost function. For example, a device meeting specified criteria may be accepted by default. A device with a certain suitability parameter may be accepted. A device meeting the output of a cost function may be accepted. A cost function may prioritize ordering nodes and accepting the top N most suitable nodes in terms of cost per unit of supply. As with other methods described herein, a preamble may be used in the protocol frame. The preamble may allow participants to negotiate data needed to enable the process to continue before tokens are negotiated between the permissions guide and its participating members. Parties possessing the correct tokens may be subsequently trusted to access or provide specific services.

As discussed above, node negotiation from a permissions guide may use a cost function such as an infocoin algorithm. An infocoin algorithm may assume that the sensor will send data continually at a predefined rate. An infocoin algorithm may assume that the lifetime and maintenance schedule of the sensor is predictable. An infocoin algorithm may assume that out of band requests for data is not permitted. An infocoin algorithm may assume that the sensor, gateway, and server has fewer resource constraints such as, for example, power constraints, processing constraints, communications constraints, or storage constraints.

As used in the equation below, D refers to a unit of data. This unit of data may be a primary piece of data. In an example, a primary piece of data may be a directly observed measurement by a sensor in an IoT network. A primary piece of data may refer to a derived piece of data calculated based on inputs from one or more primary data sources.

As used in the equation below, $C_t$ refers to the cost of transporting the unit of data. In an example, a unit of data may be referred to as an infocoin. The cost of transporting the unit of data may depend on network transport costs or the size of the data to be transported. The cost of transporting the unit of data may depend on if the data is being copied to a new storage location over the network or if a URI to a data home is used. In an example, a data home may be an Inter Planetary File System (IPFS) or a lightweight Fog File System. As used in the equation below, $C_{store}$ refers to the cost of storing the unit of data, where the cost of storage may be a function of the size of the data. The cost of storing data may refer to if replication of data is used for redundancy and the cost of the specific storage medium.

As used in the equation below, the term Margin may reflect the value provided by data. In an example, the value of data increases as data may be combined with other sources of data. As used in the equation below, $C_{raw}$ may refer to the cost of acquiring or the cost of generating a unit of primary data plus an operating margin. The cost of acquiring a unit of data or the cost of generating a unit of data may both include a fixed cost of the sensor ($C_S$), may include a cost of maintenance over lifetime of sensor ($C_m$), and may include an energy running cost ($C_e$) for the sensor node. In an example, the cost of acquiring a unit of data or the cost of generating a unit of data may both account for the sampling rate per day (rate) and a number of days (t) that the sensor will be used. $C_{raw}$ may be used by a permissions guide as an indication of a negotiated value for parties subscribed to the permissions guide.

$$C_{raw}=C_S+(C_e*t)+Cm/[\text{rate}*t]*\text{Margindata}\cdot C_{derived}$$

In another example, a cost of acquiring derived data or virtual data can be created by processing or analyzing one or more sets of primary data to gain new insights and value. As used herein, there may be at least three types of derived data. A type of derived data may include data derived within a sensor node. Another type of derived data may include data derived within a network. A further type of derived data may include data derived from historical data.

In an example, a raw cost can vary based on the number of data sources. For example, if derived data may be calculated from multiple inputs on the same sensor node the cost of acquiring the data is the same or similar to acquiring raw data. The fixed cost for the sensor node and running cost may be the same, regardless of whether or not all of the sensors on the node are used. Accordingly, in an example, there may be no additional cost to calculate a derived value on the same node. For example, calculating a derived value for a comfort index from inputs of temperature and humidity may include data from the same node and as such, raw costs for transport of data may not be increased.

Derived data may provide more value than raw data, and there may be a calculated "Margin on derived value" as seen in the equation below.

$$C_{derived\_local}=C_{raw}*\text{Margininformation}$$

Data may be derived from a number of different sources. In an example, data may be derived at a gateway, server, instrument, central processor, or other devices. When raw data is to be transported to a location for creation of derived data, a cost may be added in a cost calculation for the cost of transporting data. In an example, the cost of transporting data may relate to the cost of data traveling from a node to a gateway or server as well as the cost of storing the data at that location. In an example, a unit of raw data may have multiple stages of transport to get to a final data destination. During transport, a unit of data may be stored locally at a midway or intermediate stage between the trips to a final data destination. A cost may be generated as a sum of the cost for piece of raw data to reach its final destination plus a "Margin on derived value". In the formula below, the variable $C_{raw}$ could be replaced with $C_{derived\_local}$ if the data is derived at a point on its way to the final destination to generate the data referred to by $C_{derived\_remote}$.

$$C_{derived\_remote}=\Sigma_0^n[C_{raw}+\Sigma_0^n(C_t+C_{store})]*\text{Margin-knowledge}$$

If data is derived from historical data, then the cost of storing the data may be added to the cost of generating the data. The cost can be substantially proportional to the number of historical samples used to generate this data, due to the increased value of data as additional data sources are added.

In the below example equations, $C_{acq}$ represents a cost that may be calculated for acquiring data, D. Data may have a monetary value, for example United State Dollars. Data may also express value in terms of some other native or overlay asset. The cost of $C_{acq}$ may be equal to Craw, $C_{derived\_local}$, or $C_{derived\_remote}$. In the below example equation, Div may represent information value of the data unit. Div may vary from data unit to data unit because not every data unit may have an equal value.

$$C_{derived\ historical}=\Sigma_0^n(C_{acq}+C_S)*\text{Marginwisdom}$$

To identify a value of a unit data, or data generally, a weight of evidence model may inform an information value score used to classify data value at the time the data is created. Information value (IV) may be used to select variables in a predictive model. In an example, a IV statistic as a predictor may not be useful for modeling if the IV statistic falls less than a threshold. Using and varying a threshold for a calculated IV may be used to assess value to a data unit, or an infocoin. Data units with an IV below a threshold would receive a lower value. Data units with an IV above a threshold but below a second threshold could have a medium value assigned. This assessment of a value score could increase as the number of IV thresholds are surpassed by the inputs for an IV data score. In an example, high value data could have a greater monetary value as the data is more highly sought after by consumers in an IoT ecosystem. In an example, the more sought a unit of data is, the more the value of the unit of data.

Additional methods of storing and assessing value of a unit of data may be substituted into a negotiation system. The use of an IV score on data units may be the placement of a score on data that enables information itself to be used as a tradable asset within a negotiation framework or otherwise.

FIG. 176 is a schematic diagram of an example data structure 17600 to assess and assign a value to a unit of data in accordance with some embodiments. The data shown is merely exemplary and shown as an example way of calculating value of units of data as well as selecting a most value piece of data. Further the data that can be assigned a value may be used as a negotiation point or payment method of a permissions guide. In the example data structure 17600, the column for the weight of evidence (WoE) calculation 17602 is shown as based on a percentage of events for which data is gathered in a particular node.

In the example data structure 17600 a column for Bin may be an identification of nodes that have at least 5% of the observations for a particular data type. In an example, there may be multiple such value calculation models for each node and each data type. In the example data structure 17600, bin 7 appears as data that may have a high predictive value. In the example data structure 17600, the overall Div for the dataset appears as a value of 0.3138. Relatively, data from bin 7 may command a higher value in a data market. The $C_{acq}$ in the example shown may appear as a flat value across bins and nodes. However, market forces may alter the value of $C_{acq}$. Creating a market for information units may encourage data suppliers to supply the types of data that will command a profit for their investment.

FIG. 177 is a block diagram of an example of components that may be present in an IoT device 17700 for negotiation with valued data units in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a permissions guide drafter 17702 to draft a permissions guide for a first discovered peer including a first parameter and a first parameter value, and a second discovered peer including a second parameter and a second parameter value. In an example, the first parameter and second parameter may refer to acceptable data value ranges for a first and second node, respectively. The acceptable data value ranges may be calculated with a cost function. The cost function may calculate and combine operating costs of a node implementing the permissions guide. The operating costs include, for example, at least one of energy, running, and maintenance costs of operating a device, data transport, and storage devices. In an example, the data value ranges may refer to a calculation of the value of the data as a function of a number of sources of data. The data may be derived data synthesized from a number of sensors. The value of data may increase as a rate of data sought increases.

The mass storage 808 may include a parameter weight calculator 17704 to calculate a first parameter weight and a second parameter weight by comparing the first parameter value and the second parameter value, for example, as described for the weight of event column with respect to FIG. 176. The mass storage 808 may include a term generator 17706 to generate a term of the permissions guide in response to a proposed term being within ranges proposed by the first parameter and the second parameter, where the first parameter is adjusted by the first parameter weight and the second parameter is adjusted by the second parameter weight. The mass storage 808 may include an action executor 17706 to execute an action of the permissions guide in response to detecting that a condition of the term is satisfied.

In an example, a processor 802 may process a request from candidate peer to the permissions guide including a joining parameter and a joining parameter value. In an example, a processor 802 may calculate a joining parameter weight by comparing to the first parameter value and the second parameter value to the joining parameter value.

FIG. 178 is a block diagram of a non-transitory, machine readable medium 17800 including code to define tasks and commission nodes in accordance with some embodiments. Like numbered items are as they are described with regards to FIG. 9.

The non-transitory, machine readable medium 17800 may include code 17802 to direct the processor 902 to draft a permissions guide for a first discovered peer including a first parameter and a first parameter value, and a second discovered peer including a second parameter and a second parameter value. In an example, the first parameter and second parameter may refer to acceptable data value ranges for a first and second node, respectively. The acceptable data value ranges may be calculated with a cost function. The cost function may calculate and combine operating costs of a node implementing the permissions guide. The operating costs include at least one of energy, running, and maintenance costs of operating a device, data transport, and storage devices. In an example, the data value ranges may refer to a calculation of the value of the data as a function of a number of sources of data. The data may be, for example, derived data synthesized from a number of sensors. The value of data may increase as a rate of data sought increases.

The non-transitory, machine readable medium 17800 may include code 17804 to direct the processor 902 to calculate a first parameter weight and a second parameter weight by comparing the first parameter value and the second parameter value. The non-transitory, machine readable medium 17800 may include code 17806 to direct the processor 902 to generate a term of the permissions guide in response to a proposed term being within ranges proposed by the first parameter and the second parameter, where the first parameter is adjusted by the first parameter weight and the second parameter is adjusted by the second parameter weight. The non-transitory, machine readable medium 17800 may include code 17808 to direct the processor 902 to execute an action of the permissions guide in response to detecting that a condition of the term is satisfied.

In an example, the processor 902 may process a request from candidate peer to the permissions guide including a joining parameter and a joining parameter value. In an example, the processor 902 may calculate a joining parameter weight by comparing the first parameter value and the second parameter value to the joining parameter value.

Message flows across an IOT network may establish a recognizable pattern over time but if an unauthorized agent gains access to the network, the unauthorized agent may be able to alter operations for their own purposes. As such, if transactions are visible in a block-chain it may be possible to detect such illicit activity on the network and take actions to resolve, or even to prevent what are effectively unauthorized transactions from occurring.

In an example, a block-chain may be used to keep a record of transactions on a network as well as a pre-authorization for a network agent to perform an operation. This pre-authorisation function may be referred to as a decentralized network access proxy (DNAP) protocol.

FIG. 179 is a schematic diagram of an example organization 17900 for the decentralized network access proxy to use functions in accordance with some embodiments. Like numbered items are as disclosed in reference to FIG. 165. A process for the function of a DNPA protocol and its interactions with a permissions guide 17902 may begin at 17904.

At block 17904, a device may boot. The booting process may be the initialization of a network stack on a network interface device in a pre-execution environment (PXE) and may not imply the presence of a higher level software stack or operating system.

At block 17906, a network interface adapter may generate keys for use in operating as a block-chain aware device. The device using the generated keys may also be using or operating from a hardware enabled secure enclave. The generated keys may be used to sign traffic leaving the device so that the origin of the traffic for every packet and the content of every packet can be determined. In an example, the key based encryption for this device may be hardware enabled on the device and may assist in preventing man-in-the-middle attacks. A network may drop traffic arriving to the device if the traffic is not signed with the private key from a valid agent. In an example, in order to use network switches and routers a modification may be made to the network switches so that the hardware encryption and decryption of traffic may occur.

At block 17908, a network interface adapter may create an access request transaction on the block-chain. In an example, a packet being run on the network may be forcibly routed to a DNAP. In this context, the DNAP may be considered a function of the layer 2 data link layer as it may be running as a service on the physical switches and routers of the network. Once a network device attempts to use core network infrastructure then the network device may not be able to avoid having the network device traffic routed to the decentralized network access proxy if it attempts to use the core network infrastructure or a connection that is more than a private peer-to-peer connection over a dedicated medium. In an example, a peer-to-peer connection over a dedicated medium may include communication through Bluetooth or an Ethernet crossover cable.

At block 17910, the DNAP protocol may grant a device certain network access functions. In an example, the DNAP protocol may make use of previously discussed functions of the permissions guide. Nodes like switches and routers on a network running a DNAP protocol may become miners of a block-chain. In an example, the nodes of a network may run a consensus algorithm that does not use a large compute overhead or be based on direct participation in a transaction. A proof of elapsed time algorithm may be one example of a technology used in this protocol. The use of the DNAP protocol may also protect from the introduction of rogue switches and routers as a malicious actor would have to be able to deploy, or compromise 51% of the network infrastructure, for example, to execute a successful attack. An attempt by a DNAP device to use the access request transaction function may result in a network interface adapter identifying itself to the network through the mechanism of a permissions guide. The network interface adapter may run a hardware enabled secure enclave to assist in this process.

At block 17912, a DNAP using device may be added to a permissions guide list of created, or authorized, devices on the network, if the DNAP using device is accepted by the join function in the permissions guide. At block 17910, an initialization process may occur and the device may describe its attributes and features to the permissions guide. In an example, the DNAP described attributes may be attested through a hardware enabled secure enclave on the DNAP device to establish a level of trust. In an example, the description of attributes of the DNAP device may be defined in an extension to a human interface device (HID). The description of attributes or the data stored in the permissions guide may be stored off-chain. In an example, a switch or a router enabled with the DNAP protocol, storage of data off-chain may involve the integration of some storage within the switch. The switches and routers in a DNAP network may be edge or fog nodes. Storage may become a DHT type distributed storage mechanism on top of the routers and switches on the network.

At block 17914, tokens may be issued to devices to permit the devices to execute actions in an orchestrated manner. Use of tokens into a device may allow individual device firewalls for the entities on the DNAP network. In an example, if a device holds an internet control message protocol (IMCP) token, then the device may send and receive ping traffic. The use of tokens may allow the formation of virtual local area networks (VLAN) by allowing devices with the same tokens to talk to each other without going through a router. Tokens may also be used to create private networks which are not connected to larger enterprise ones.

Token assignments may have rules for assigning default token types to devices meeting certain criteria. These rules may govern the type of device and if the device complies with minimum security standards. In an example, the type of device may be a corporate owned and supported device or an employee owned device in a "bring your own" style plan. In some environments, such as an individual accessing a financial database from a personal device, the token assignments described herein may apply outside of a corporate environment. In an example, DNAP devices that are not authorized or which do not possess the tokens for certain actions may receive a notification that a device requested function has failed because the device is not authorized by the network. Using a token based approval approach can decentralize the enforcement of security on a network. In an example, network administrators may manually create tokens to represent actions that the network administrators permit or deny on the network. In an example, a pre-populated set of tokens may be provided by the network equipment manufacturers.

At block 17916, a DNAP device may be authorized on the network to perform certain functions. The DNAP device may be granted additional tokens or have tokens revoked. The control plane of this operation may be block-chain-backed. Block-chain-backed may refer to rules being enforced on a port or access point a device is connected to after the device is issued tokens, where the provided rules for the connected device do not generally change and the rules are enforced based on the confirmed identity of the device. In an example, switches and routers in the network may be miners and may synchronize transactions to a commonly shared ledger.

At block 17918, functions that a device may attempt to carry out may be blocked and the device may receive a message indicating that the network has blocked the communication.

FIG. 180 is a process flow diagram of an example method 18000 for a decentralized network access proxy to use functions in accordance with some embodiments. The method 18000 of FIG. 180 may be implemented by the IoT device 18100 described with respect to FIG. 181. Process flow may begin at block 18002.

At block 18002, a network device may be initialized. In an example, the network device may be a client, a server, a piece of the network infrastructure, or a network interface. At block 18004, the firmware and hardware on the device generate an identity and allow the device to act in the capacity of a block-chain client. In an example, a node may have a network switch role or a router role and the device may act in the capacity of a validator for the DNAP block-chain. The DNAP block-chain may be distributed across all the network infrastructure nodes.

At block 18006, the device may publish a discovery broadcast message, similar to a preboot execution environment (PXE) or dynamic host configuration protocol (DHCP). In an example, the device and DNAP protocol could be implemented using PXE and DHCP protocols. In an example, if the discovery broadcast does not return the location of any DNAP-aware systems, then the network device may delay and retry. If the discovery broadcast does not return the location of any DNAP-aware systems, the device may perform a legacy operation allowing the device to operate on non-DNAP networks. The process of delay and retry, or the process of switching to another network may be controlled by a preset policy, BIOS settings, firmware settings, physical jumper settings on the device, or otherwise manually adjusted.

At block 18008, the DNAP device applies to join the DNAP network in response to discovering a DNAP network in operation. As discussed above, joining the DNAP network may include joining a permissions guide that is followed in the network.

At block 18010, a DNAP device may publish its attributes and features and request tokens that may be assigned to the DNAP device based on the attributes or identity of the device. A decision to assign tokens may be controlled by a network administrator through the use of policies or based on, for example, the device's network, address, identity, device type, device capabilities, device features, or based on an effectiveness measure of the policy on the device and the permissions guide. As discussed above, constructing a permission guide may be accomplished by network engineers who may use a user interface or application program interface. The implementation of the permissions guide and tokens, may enable detailed control of network traffic on a per device basis. In an example, enterprise systems may allow Hypertext Transfer Protocol (HTTP) traffic or other specific types of traffic as a default for devices. Enterprise systems using the DNAP protocol may also provide devices with designated business function additional tokens to permit other traffic types when those devices may wish to use other network services.

At block 18012, the device may send a packet on the network. The operating system and the higher layers of the open system interconnection (OSI) stack may be unaware of this process. In an example, the sending of the device packet may be running at the network layer. The network may authenticate the packets in several ways. For example, the tokens may appended to the header of the packet, or the packets can be signed with the private key of the identity sending the packet. Packets arriving at the network may be permitted if the identity sending them can be verified and they possess the token to send that type of traffic. If the traffic is not permitted, the network operators may decide to send a negative acknowledgement (NACK) back to the client, otherwise the packet is routed across the network to its destination.

In DNAP, the network infrastructure itself may be acting as the validator nodes in a block-chain as the place where the consensus about the state of the system is stored. For a malicious entity to compromise this approach, the malicious entity would need to compromise 51% of the network infrastructure, for example. Compromising a majority of network infrastructure may result in more burden to malicious entities as there are many locations that would need to be compromised rather than a single centralized firewall service. The consensus of the network infrastructure may be an access control list (ACL) command list (C-List). In an example, once a consensus of network infrastructure is established with a decentralized protocol, the methods described above could be re-written or mapped on the management of ACL or C-LIST stored in the block-chain. In an example, the DNAP protocol could update status change based on triggering by transactions signed by agents with a valid address in the protocol.

As used herein with regard to security and communications with DNAP, the creator of a resource may issue tokens, tokens themselves may be transferable or not, and tokens can, based on instruction from a network operator, be used like disposable credentials. Using DNAP functional tokens, once a token is used, the token may not be used again, and thus tokens used in DNAP and similar systems may be used like a quota to control how much access a device gets to the network. A token may be set to function for X number of packets, or X volume of data, or X period of time, or it may have an infinite lease for some types of traffic and quotas for others.

FIG. 181 is a block diagram of an example of components that may be present in an IoT device 18100 for negotiation with valued data units in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a device identity generator 18102 to generate a device identity for a device as a block-chain client. The device may request tokens from the DNAP. The tokens may grant the device the ability to send and receive network data other than peer to peer. In an example, the tokens may grant the device the ability to send and receive data on a layer of an open system interconnection layer of a network. In an example, the device may store a transaction record of transactions received and sent by the device, the transaction record to be shared with the DNAP. The device may generate keys to indicate an origin of a packet sent from the device. The device may be a block-chain enabled device and the device may store transactions sent by the device and received by the device on the block-chain. The descriptions of the device attributes may be stored off of a block-chain.

The mass storage 808 may include a message publisher 18104 to publish a discovery broadcast message from the device. The mass storage 808 may include a network applier 18106 to apply, from the device, to join a decentralized network access proxy (DNAP) network in response to the device receiving a response from a DNAP based on the published discovery broadcast message. The mass storage 808 may include a device describer 18108 to describe the identity and attributes of the device to the DNAP.

The mass storage 808 may include a packet sender 18110 to send a packet from the device through the network in response to access being granted to the device by the network based on the identity and attributes of the device. In an example, the packet may append a token and the combination of the packet and the token may be sent to be DNAP for verification, where the DNAP rejects both the packet and the token in response to a detection that the token is not accepted by the DNAP. In an example, the token may be valid for use with at least one of a threshold number of packets, a threshold volume of data, or a threshold period of time.

FIG. 182 is a block diagram of a non-transitory, machine readable medium 18200 including code to define tasks and commission nodes in accordance with some embodiments. Like numbered items are as they are described with regards to FIG. 9.

The non-transitory, machine readable medium 18200 may include code 18202 to direct the processor 902 to generate a device identity for a device as a block-chain client. The device may request tokens from the DNAP. The tokens may grant the device the ability to send and receive network data other than peer to peer. In an example, the tokens may grant the device the ability to send and receive data on a layer of an open system interconnection layer of a network. In an example, the device may store a transaction record of transactions received and sent by the device, the transaction record to be shared with the DNAP. The device may generate keys to indicate an origin of a packet sent from the device. The device may be a block-chain enabled device and the device stores transactions sent by the device and received by the device on the block-chain. The descriptions of the device attributes may be stored off of a block-chain.

The non-transitory, machine readable medium 18200 may include code 18204 to direct the processor 902 to publish a discovery broadcast message from the device. The non-transitory, machine readable medium 18200 may include code 18206 to direct the processor 902 to apply, from the device, to join a decentralized network access proxy (DNAP) network in response to the device receiving a response from a DNAP based on the published discovery broadcast message. The non-transitory, machine readable medium 18200 may include code 18208 to direct the processor 902 to describe the identity and attributes of the device to the DNAP.

The non-transitory, machine readable medium 18200 may include code 18210 to direct the processor 902 to send a packet from the device through the network in response to access being granted to the device by the network based on the identity and attributes of the device. In an example, the packet may append a token and the combination of the packet and the token may be sent to be DNAP for verification, where the DNAP rejects both the packet and the token in response to a detection that the token is not accepted by the DNAP. In an example, the token may be valid for use with at least one of a threshold number of packets, a threshold volume of data, or a threshold period of time.

The permissions guide may be used to provide decentralized authorization, authentication, and accounting for devices. The present disclosure discloses building blocks for an extension to Remote Authentication Dial-In User Service (RADIUS) and the related DIAMETER protocols. In an example, the disclosed techniques address scalability issues caused by centrally governed systems. These techniques may be applied to larger, distributed radius networks. In an example, members of large networks may run their own RADIUS servers at their campus, maintaining their own user accounts. In an example, authentication may proceed through RADIUS proxies routing a member's network access request back to the network of the member regardless of the location of the request. If a request to join a network is accepted at a member network, then the rest of the large network accepts the traffic from that origin as authenticated. This technique allows a network to avoid syncing user accounts across such a large, distributed and dynamic network. This technique can be added to in order to provide a vetting process when a new entity joins the network. This technique can be added to in order to provide confirmation that an entity operates their RADIUS servers securely and conforms to the criteria set by a set policy.

FIG. 183 is a schematic diagram of an example organization 18300 for a decentralized version of providing authentication, authorization, and accounting with a permissions guide 18302 in accordance with some embodiments. Like numbered items are as disclosed in reference to FIG. 165. A process for the function may begin at 18304.

The organization 18300 and the method be a complete system and may also be an extension to existing authorization, authentication, and accounting protocols. At block 18304, a user may log onto a centralized authority where they are already users. In an example, the user may be a student or faculty member of a university and the centralized authority may be a university network. While logged in, a user may create their profile. The use of the user profile, a password, or the network may be used together to validate a user identity to the system at this point. If the user is a device, rather than logging in to user account, the device may boot and commission device authentication by modules of the system.

At block 18306, a device of a user may exchange payments at the instruction of a use. In an example, a device of a user may be accessing a pay-per-use network and payment may be needed to access the network. A user through a user device may negotiate a payment with the network operator through the network. This kind of payment may be optional, for example, the network provider may provide free access. A network provider may choose to charge and in charging the network provider may specify forms of payment the network provider may accept. In an example, the network may accept cryptocurrencies or infocoin. Exchanging payments as described with regard to 18306 may be performed as listed or at the end of the process when the joining entity has accepted terms and the provider allows the joining entity the joining entry access.

At block 18308, private keys may be created for the user, and may be associated with an address. At block 18310, a user device may request to join a permissions guide. As described above at block 16518, joining the permissions guide may be an occurrence that happens once where the user device may become a permanent member of a network. In an example, joining a permissions guide may be time bound, or bound by other conditions. As described above, a join permissions guide function could ensure that certain conditions are met before accepting applicants. In an example, if a payment were made, the payment may or may not be finalized until the entire process of joining the permissions guide was completed.

As described above, at block 16522, the list of participating identities may be stored. Storage of participating identities may be done off chain. Storage may also occur in a hash. Further, with regard to storage of participating identities, a pointer may be used to identify a location where the identity information could be stored. The data stored may also be encrypted and limiting for authorized entities to view.

At block 18312, an attribute filter may be used to validate attributes. In an example, the validation may be done with a zero knowledge proof mechanism. Validation of attributes may use attestation. In an example, the attribute filter may validate conditions to operate on the network, for instance identifying whether or not an individual is over 18 years old. The attribute filter may allow the attestation of an attribute for an individual without the individual having to disclose their full identity.

At block 16530, like above, an applicant device may request tokens. As before, tokens may be unlimited or tokens may be limited. Tokens may or may not be backed by cryptocurrency coins. The use of tokens may allow a mix where some tokens may use payment to acquire and others are free as decided by a network operator. The request for tokens may involve additional steps that pass through a block-chain 18314 that performs accounting functions and a sidechain 18316 of the block-chain 18314. At block 18318, within the block-chain 18314, a payment or a function call from the permissions guide 18302 reserves coins on the block-chain. At block 18320, within the sidechain 18316, reserved tokens may be associated with sidechain 18316 in which tokens are created. The action of reserving coins or creating tokens in a sidechain 18316, where the tokens may be added block-chain constitutes a form of accounting where it may be possible to identify and construct which identities have requested which sorts of tokens.

At block 16534, like above, tokens may be revoked by an enactment of a policy of the permissions guide 18302. In an example, tokens may be requested to be refunded by an entity if the entity wishes to leave the permissions guide 18302. In response to a request from the permissions guide 18302, at block 18322, the tokens may be deleted from the side chain 18316. At block 18324, within the block-chain 18314, any coins associated with the deleted tokens in the sidechain 18316 may be released to a network provider or refunded to the entity depending on the reason for the transaction.

At block 16534, like above, payment T&Cs which the network provider asserts may be encoded into the permissions guide 18302. At block 18326 an authentication request may be sent. In an example, authentication works by the device sending a request to the network. A device may present a public key to the verifier party. In an example, the party sent the public key may check in the block-chain 18314 to determine if tokens are credited to such pubkey. Accessing different services on the network may request the holder to own different types of tokens.

At block 18328, tokens may be consumed. In an example, tokens may be consumed on a per use basis. Use of tokens on a per use basis may be a form of authorization that gives the network provider a method to allocate budgets to entities on their network on a per service basis. The provider may instead indicate that tokens are not per use and may be used without restriction by use. At block 18330, the consumption or presentation of tokens through the sidechain 18316 may be recorded as transactions on the sidechains. This recording may be seen as another accounting service. At block 18316, the sidechain may indicate if tokens are consumed. If tokens are consumed and if there may be a record of this consumption on the sidechain 18316. In an example, tokens consumed on the sidechain 18316 may be backed by coins on the main block-chain 18314. At block 18332, on the block-chain 18314, coins may be released back or paid back to a network operator and to the wallet of a provider.

FIG. 184 is a process flow diagram of an example method 18400 for a decentralized version of providing authentication, authorization, and accounting with a permissions guide in accordance with some embodiments. The method 18400 of FIG. 184 may be implemented by the IoT device 18500 described with respect to FIG. 185. Process flow may begin at block 18402.

At block 18402, entities requesting to use the network may register, for example, through a portal or API. In an example, a portal may be provided by individual universities for attending students to register and pay fees. In an example, for entities seeking to join a machine-oriented network, such entities could join automatically using funds from any wallet or credit card provider.

At block 18404, a payment exchange may be used if the joining entity has no credit on the network they wish to join. At block 18406, joining entities may be entered into a smart contract by partaking in an exchange of payments. In an example, the attributes of the joining entities may be registered. In an example, attributes for a use may include date of birth and other personal data. In an example, attributes for machines may include type of device or type and version of software. Attribute data may be attested to if the attribute data is reported with supporting documentation. In the case of attributes for machines, these machine attributes may be attested by technical methods, including trusted sensing or hardware root of trust (HWROT). In response to this attestation, a list of the participating entities may be maintained in the permissions guide and the entities may now request tokens from the permissions guide.

At block 18408, tokens may be issue to an entity in response to confirmation of a valid identity request as determined by a consensus network. Tokens may be issued to an entity in response to an identity's balance on the network being greater than zero. In an example, a TTL may be set for the attestation for the entity. In an example, the attestation for the entity may be limited through time, usage, and geographically. In an example the limits may be enforced by tokens as tokens may work in some regions and not in others if the entity is mobile.

At block 18410, coins may be reserved against tokens. In an example, coins may be reserved in a sidechain. The process of reserving coins may be retried in response to unsuccessful attempts. In an example, the process may also include backing out of the transaction thereby refunding exchanged credit in the process. If an attempt to reserve coins is successful, tokens may be created and issued to the entity which can then send authentication requests. Authentication requests may attribute filtered as previously described. As tokens are consumed, the coins associated with them in the sidechain may be unlocked or released and these tokens may pass to a network provider.

At block 18412, an entity may leave a permissions guide. To avoid leaving a permissions guide, an entity may request additional tokens if the tokens of the entity are already consumed. In an example, if the entities identity is no longer valid on the network, the permissions guide may end. In an example, the network entity or the network provider may also initiate this process to evict the entity. Unspent tokens may be revoked or destroyed and remaining balance of funds for an entity may be refunded in accordance with the terms of the permissions guide.

FIG. 185 is a block diagram of an example of components that may be present in an IoT device 18500 for decentralized authorization, authentication, and accounting with an IoT device in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a device registrar 18502 to register a device to a first network through a portal to a second network, where the second network is authorized to access the first network. The device may execute a payment exchange to a wallet in the second network.

The mass storage 808 may include a device joiner 18504 to join a device to a permissions guide through agreement to obligations of the permissions guide. The mass storage 808 may include a token requestor 18506 to request a token using a function of the permissions guide, the token identifying the device as authenticated to access the second network. In an example, the request for the token may result in a reservation of a coin on an accounting block-chain to correspond to a token generated on a sidechain. A coin of the block-chain may be released in response to detecting a token being at least one of revoked and consumed by a sidechain. In an example, joining the permissions guide may include providing, from the device, attributes of the device to the permissions guide for an attribute filter to validate that the attributes of the device are allowed in the first network. The attributes may include an attribute of a user profile active while the device is joining the permissions guide. The token may destroy itself in response to being used as a form of authorization for the device.

The mass storage 808 may include a request sender 18508 to send an authentication request from the device to the first network, wherein the first network confirms the authentication in response to detecting the token. The token may be consumed on a sidechain in response to authentication of the device by presentation by the device of the token to the first network. The device may be authorized to access the first network based on authentication to the first network that the device has credentials to access to second network. In an example, authorization of the device to use the first network may expire based on at least one of number of accesses, volume of data accessed through the first network, and time of granted access.

FIG. 186 is a block diagram of a non-transitory, machine readable medium 18600 including code for decentralized authorization, authentication, and accounting with an IoT device in accordance with some embodiments. Like numbered items are as they are described with regards to FIG. 9.

The non-transitory, machine readable medium 18600 may include code 18602 to direct the processor 902 to register a device to a first network through a portal to a second network, where the second network is authorized to access the first network. The device may execute a payment exchange to a wallet in the second network.

The non-transitory, machine readable medium 18600 may include code 18604 to direct the processor 902 to join a device to a permissions guide through agreement to obligations of the permissions guide. The non-transitory, machine readable medium 18600 may include code 18606 to direct the processor 902 to request a token using a function of the permissions guide, the token identifying the device as authenticated to access the second network. In an example, the request for the token may result in a reservation of a coin on an accounting block-chain to correspond to a token generated on a sidechain. A coin of the block-chain may be released in response to detecting a token being at least one of revoked and consumed by a sidechain. In an example, joining the permissions guide may include providing, from the device, attributes of the device to the permissions guide for an attribute filter to validate that the attributes of the device are allowed in the first network. The attributes may include an attribute of a user profile active while the device is joining the permissions guide. The token may destroy itself in response to being used as a form of authorization for the device.

The non-transitory, machine readable medium 18600 may include code 18608 to direct the processor 902 to send an authentication request from the device to the first network, wherein the first network confirms the authentication in response to detecting the token. The token may be consumed on a sidechain in response to authentication of the device by presentation by the device of the token to the first network. The device may be authorized to access the first network based on authentication to the first network that the device has credentials to access to second network. In an example, authorization of the device to use the first network may expire based on at least one of number of accesses, volume of data accessed through the first network, and time of granted access.

Some embodiments of the present techniques disclose decentralized authorization, authentication, and accounting on an IoT device using, for example, a Remote Authentication Dial-In User Service (RADIUS) and/or a DIAMETER protocol, among others. A decentralized proxy may sit in front of a RADIUS server, a DIAMETER server, or a RADIUS server running a DIAMETER protocol. A decentralized API may be built into a RADIUS service and/or a DIAMETER service. Existing calls may be wrapped to a RADIUS service and/or a DIAMETER service in a block-chain-type encryption mechanism. The block-chain-type encryption mechanism may be used as a layer of proof of the source of a request to, for example, enable the request to pass through for processing by the RADIUS sever and/or DIAMETER server.

FIG. 187 is a schematic diagram of a technique 18700 for decentralized authorization, authentication, and accounting on an IoT device using a Remote Authentication Dial-In User Service (RADIUS) and/or a DIAMETER protocol in accordance with some embodiments. The RADIUS server 18702 may be locked from modifications, while the decentralized RADIUS proxy 18704 may be augmented functionality. The decentralized RADIUS proxy 18704 may take action before a message would arrive to a traditional RADIUS server. A decentralized API 18706 may be inserted between the RADIUS server 187020 a back-end database 18708 and may include modifications to the operation of the RADIUS service.

The decentralized RADIUS proxy 18704 may function when the RADIUS server 18702 implements a back end database 18708. In an example, the database 18708 may be a file or it may use any of a number of supported data stores. In the decentralized RADIUS proxy 18704, a service may sit in front of the RADIUS server 18702 and act as a decentralized filter. The decentralized RADIUS proxy 18704 may provide a security check by confirming the identity of a requester using decentralized mechanisms.

The calls that the RADIUS server 18702 uses may be modified to route them through a decentralized API 18706. The decentralized API 18706 may be incorporated into the RADIUS servers code base as a set of classes which support the routing of RADIUS functions to a block-chain. The RADIUS server 18706 may become a block-chain client and perform identity and transaction validity checks. Alternatively, or in addition, identity and validity checks could be implemented as an external service which the RADIUS server is modified to support. With the decentralized API, the RADIUS server code may be modified such that the operation may enable identity and validity checking functionality. Exemplary mechanisms for performing the validity checks are described below.

FIG. 188 is a ladder diagram of an example method 18800 for the components of FIG. 187 to act through a decentralized RADIUS proxy 18704 for authorization, authentication, and accounting on an IoT device in accordance with some embodiments. The method 18800 of FIG. 188 may be implemented by the IoT device 19100 described with respect to FIG. 191. Like numbered items are as disclosed with regards to FIG. 187.

The decentralized RADIUS proxy 18704 may process a RADIUS authentication request 18802 from a RADIUS client 18804. The RADIUS client 18804 may be modified to sign the RADIUS request with a private key from the RADIUS client block-chain or from an identity of a distributed ledger 18806. An identity may be used to verify the identity 18808 the source of the request, and if the request may actually be the holder of the private key corresponding to the identity on the block-chain or distributed ledger 18806. The identity on the block-chain or the distributed ledger 18806 may have been previously established using a permissions guide as described in previous sections. For example, the identity may have registered for a service, joined a permissions guide, and may be listed as a participating entity within that contract, or the identity may also be a token holder. The identity verification could be done at runtime where a block-chain or a distributed ledger 18806 may accept the identity of the request the first time an authentication request signed by a new identity are seen. An identity verification response 18810 may be returned to the decentralized proxy 18704. In response to an identity being verified as acceptable, the decentralized proxy 18704 may request 18812 an appropriate RADIUS server. In response, the RADIUS server 18702 may respond 18814 that the request was approved as a success or denied as a failure.

A successful verification of identity may link multiple identities so that future RADIUS requests from the same user may be signed by the correct private key, where requests not including the private key may be rejected. The identity may present a token with a RADIUS request and respond with by comparing the verification against the block-chain or the ledger to validate that the identity. As before, validation may indicate that a request as a valid token holder, and an unsuccessful validation may still have identity verified by being listed as a member of a particular permissions guide. Validation may indicate when a currency on the block-chain is spent against the RADIUS request. For example, to make a RADIUS request, the identity may have some credit and coins on the block-chain to spend.

FIG. 189 is a ladder diagram of an example method 18900 for the components of FIG. 187 to act through a decentralized API 18706 for authorization, authentication, and accounting on an IoT device in accordance with some embodiments. The method 18900 of FIG. 189 may be implemented by the IoT device 19100 described with respect to FIG. 191. Like numbered items are as disclosed with regards to FIGS. 187 and 188.

The sequence of calls varies from the sequence of calls with regard to FIG. 188 as the calls, while similar in substance, may be addressing different actors. For example, in FIG. 189, the signed authorization request 18902 may be from the RADIUS client 18804 to the RADIUS server 18702. A verification of identity 18904 may be from the RADIUS server 18702 to the decentralized API 18706. A second verification of identity request 18906 may be sent from the decentralized API 18706 and to the distributed ledger 18806. In response, the distributed ledger 18806 may return an identity response 18908 to the decentralized API 18706 indicating either success or failure of the identity verification. In response, the decentralized API 18706 may return a second identity response 18910 to the RADIUS server 18702 indicating either success or failure of the identity verification. The RADIUS server 18702 may return a RADIUS server request-response to the RADIUS client 18804. A result of these actions may be the validation of the identity of the source of the RADIUS request, where the validation may, for example, be passed through a block-chain or a decentralized ledger, before the request for validation may be processed.

FIG. 190 is a schematic diagram of an action diagram 19000 for decentralized authorization, authentication, and accounting on an IoT device in accordance with some embodiments. An authorization request 19002 interacts with a transaction validation checker 19004 that makes use of a block-chain 19006.

Within the authorization request 19002, at block 19008, the transaction contents may be added to a message. In the example shown in FIG. 190, the transaction contents may be a username and password, for example, the username and credentials for "Mike." The sensitive information is not exposed to third parties through this method as described below. The transaction may include metadata. The metadata may be stored in a public ledger. If money or crypto currency denominations are part of the transaction, then the transaction contents may include the details of how much value is being transacted. The validity of the transaction may depend on the conditions of the transaction being satisfied. For example, conditions of the transaction being met can include payment actions and authentication actions in the example described above.

Within the authorization request 19002, at block 19010, a network address being requested may be included in the transaction contents. In place of the network address, a resource being requested may be included in the transaction contents. The network address may, for example, be a fully qualified domain name (FDQN) or internet protocol (IP) address for a RADIUS server. The network address may be a resource on the network. The network address may include a wallet address based on the private key of the RADIUS server or network resource owner. A network address may include the wallet in response to a payment being requested for the use of the service can be performed.

Within the authorization request 19002, at block 19012, the transaction contents may be signed by the private key of the party. The process of signing contents of a transaction may include forming a signature 19014, a reference to the location of the public key may be included 19016, or the transaction could contain the public key itself and provide the public key 19018 to the authorization request 19002 itself.

Within the transaction validation checker 19004, a request to verify a public key 19020 can be made. The location of the public key may be looked up 19022 or requested from the block-chain 19006. A network owner may create the block-chain 19006, and entities may purchase or acquire identities on the block-chain 19006 by posting a public key of the entity to the block-chain 19006. The posting of a public key for an entity to the block-chain 19006 during negotiation may be in exchange for crypto currencies, tokens, or other payment. An amount of a payment may determine how long a key may be held in the block-chain 19006. A key may be held by a block-chain 19006 indefinitely or for a specified period of time. Conditions for an identity to be established or confirmed may be adjusted by a network administrator.

The block-chain 19006 may include a number of blocks 19024. The block-chain 19006 used for storing identities may be a virtual block-chain that sits on top of a larger block-chain which has a critical mass of miners. The block-chain may, for example, incorporate the concept of dual mining, where the work done for the proof in one block-chain 19006 also serves as the proof in another. The lookup 19022 may, for example, be performed using a bloom filter hop method disclosed above. A result of the lookup 19022 may be that a public key is known. A result of the lookup 19022 may be that the key was included in the transaction to begin with.

Within the transaction validation checker 19004, at block 19026, the key may decrypt the transaction, and may confirm the identified entity. The key may be public, in the case of an asymmetric key, or private, in the case of a symmetric key. Message communications will generally use private symmetric keys for the encryption/decryption. A transaction may be committed to the block-chain 19006. A transaction may be a reference to an off-chain storage mechanism. The off-chain storage mechanism may be used at block 19026 to record the result of the identify verification step. The recording of a result of the identify verification step may provide accounting. A record may, for example, be committed to the block-chain 19006 of network providers and/or to a virtual block-chain. Recordation on the block-chain 19006 may in some cases be limited to metadata about the transaction. Information relating to usernames and passwords may in some cases be barred from being included on the block-chain 19006. If the information is included in the block-chain 19006, the information may be part of the transactions between a RADIUS proxy and/or a modified RADIUS server.

Within the transaction validation checker 19004, an off chain event may occur at block 19028, where contents of the transaction may be passed along to the RADIUS server for normal processing if the transaction identity is valid. In the case of an authentication request, the contents may, for example, include a username and password. The passing of contents to a server may occur between the RADIUS server and its proxy or the modified decentralized code within the RADIUS proxy.

Within the transaction validation checker 19004, an off chain event may occur at block 19030, where a response from the RADIUS server may be routed directly back to a client. The routing of a response may be through a proxy and/or by a RADIUS server, depending, in part, on an implementation architecture choice. The RADIUS server may perform logging and accounting of requests the RADIUS server receives.

Within the transaction validation checker 19004, at block 19032, a response may be routed back. The response may be a positive or negative. The response may be stored to the block-chain 19006 as an immutable record. Storing a response on the block-chain 19006 may increase the difficulty for a malicious actor to hide their actions.

FIG. 191 is a block diagram of an example of components that may be present in an IoT device 19100 for decentralized authorization, authentication, and accounting with an IoT device in accordance with some embodiments. Like numbered items are as described with respect to FIGS. 3 and 8. It can be noted that different components may be selected and used for the IoT device 19100 than for those selected for the IoT device 800 discussed with respect to FIG. 8, and other IoT devices discussed herein.

The mass storage 808 may include a number of modules to implement decentralized authorization, authentication, and accounting with an IoT device. Although shown as code blocks in the mass storage 808, it may be understood that any of the modules may be fully or partially replaced with hardwired circuits, for example, built into an application specific integrated circuit (ASIC).

The mass storage 808 may include an identity verifier 19102 to verify the identity of an authentication request with a decentralized API, the authentication request received from a RADIUS client, the decentralized API to verify the identity by sending a request to a distributed ledger and returning, to a RADIUS server, a response in response to receiving an identity verification response from the distributed ledger. The RADIUS client may make a transaction in response to a response of authenticated identity. The transaction may include at least one of username, password, and metadata. The transaction may include a value transaction. The transaction may be a cryptocurrency transaction. The authentication request may include a request for a network address. The network address may include at least one of a fully qualified domain name for the RADIUS server or an internet protocol address for the RADIUS server. The RADIUS server may verify a public key by requesting a location of the public key from a block-chain. The request to a RADIUS server may occur off chain, in response to a RADIUS client receiving a confirmation of authenticated identity. The RADIUS server may perform logging and accounting of requests the RADIUS server receives. The response to the authentication request may be stored in to a block-chain as an immutable record.

The mass storage 808 may include a response returner 19104 to return a response to the authentication request to the RADIUS client in response to receiving the response from the decentralized API. The mass storage 808 may include a request sender 19106 to send a request to a RADIUS server in response to receiving a positive identity verification response from the distributed ledger.

FIG. 192 is a block diagram of a non-transitory, machine readable medium 19200 including code to direct a processor 902 for decentralized authorization, authentication, and accounting with an IoT device in accordance with some embodiments. The processor 902 may access the non-transitory, machine readable medium 19200 over a bus 904. The processor 902 and bus 904 may be implemented in a manner similar to the processor 902 and bus 904 described with respect to FIG. 9. The non-transitory, machine readable medium 19200 may include devices described for the mass storage 808 of FIG. 8 or may include optical disks, thumb drives, or any number of other hardware devices.

The non-transitory, machine readable medium 19200 may include code 19202 to direct the processor 902 to verify the identity of an authentication request with a distributed ledger, the authentication request received from a Remote Authentication Dial-In User Service (RADIUS) client. The RADIUS client may make a transaction in response to a response of authenticated identity. The transaction may include at least one of username, password, and metadata. The transaction may include a value transaction. The transaction may be a cryptocurrency transaction. The authentication request may include a request for a network address. The network address may include at least one of a fully qualified domain name for the RADIUS server or an internet protocol address for the RADIUS server. The RADIUS server may verify a public key by requesting a location of the public key from a block-chain. The request to a RADIUS server may occur off chain, in response to a RADIUS client receiving a confirmation of authenticated identity. The RADIUS server may perform logging and accounting of requests the RADIUS server receives. The response to the authentication request may be stored in a block-chain as an immutable record.

The non-transitory, machine readable medium 19200 may include code 19204 to direct the processor 902 to send a request to a RADIUS server in response to receiving a positive identity verification response from the distributed ledger. The non-transitory, machine readable medium 19200 may include code 19206 to direct the processor 902 to return a response to the authentication request to the RADIUS client in response to receiving a response from the RADIUS server.

Techniques disclosed herein may refer to a native decentralized database. The native decentralized database may be a database which understands the concept of participation in a decentralized cluster as opposed to a distributed one. In an example, the decentralized database may function through the use of public and private partitioning of tables within a database for natively supporting decentralized operation of distributed databases. This may improve the operation of an IoT system by allowing the distributed storage of data across a number of constrained devices.

FIG. 193 is a schematic diagram of a process 19300 for configuring and operating a consensus network 19302 using a native decentralized database in accordance with some embodiments. The consensus network 19302 can have a node 19304. The consensus network can have a number of nodes 19304 including a first node through an nth node. While using a natively decentralized database cluster, a party not known to the network may join the network. The existing nodes 19304 may be barred from forming a central authority. Joining the network may include a request to join a transaction that may be issued to a public uniform resource locator (URL) or advertised name space. The namespace may be hardcoded into a storage or adjustable by a user. If a node 19304 in the consensus network 19302 indicates a message requesting implementation of a central authority, made up of the nodes in the network, the nodes 19304 may vote on the accession of new members. Nodes in a central authority may establish rules allowing by default, new members to join the network. Once a new member joins, the database 19306 of the new member may be synchronized with the databases 19306 of existing members. The synchronization may include the shared, S, partitions 19308 to be replicated. The databases may be block-chain databases.

Shared partitions 19308 may be replicated by the underlying database 19306. Shared partitions 19308 may be used to house a data plane. Shared partitions 19308 may be used to house the consensus block-chain. A network may consist of many services 19310 and clients 19312 which may be performing tasks. The services 19310 and clients 19312 may, for example, be IOT systems collecting and processing data to make actuation decisions locally. Data gathered and calculated by the services 19310 and clients 19312 may be sent to a private partition 19314. The private partitions may be centrally controlled.

Whenever a network owner indicates a service may be shared, or that the service data derived from a service may be shared, the settings of the private partition may change or be copied to a public partition 19308. The moving of data from a private partition 19314 to a public partition 19308 may include adding data to an off-chain mechanism. The changing of data from private to public may, for example, include using the consensus nature of a decentralized database 19306 to participate in voting within the decentralized network 19302. Other techniques for changing the data from public to private, or vice versa, may include commands received from central systems, an expiration date on the data, and the like. Combinations of these may be used. For example, an expiration date may be included in a policy, after which a consensus of devices in a network determine that the status should be changed from private to public.

Private partitions 19314 may be replicated to other nodes owned by the network owner. Private partitions 19314 may in some cases be limited in their replication to other database instances operated by other members of the consensus network. The shared partitions may be permissioned and/or encrypted.

A network owner may, for example, be the data owner and by creating a shared partition 19308, the permissions and encryption on the partition may be set by the network owner. Permissions may, for example, be role based, or they can be RADIUS/DIAMETER protocol based, among others. Role based permissions may include other actors in the network possessing a particular role to access certain data. RADIUS or DIAMETER based may, for example, refer to an authentication method used by the internet as a permission control mechanism. Encryption may employed by the network. For example, encryption may include public key methods, private key methods, passwords, passphrases, Triple Data Encryption Standard (DES), Blowfish, Twofish, or AES. By adjusting the permissions and encryption with a shared partition, a data owner may retain the ability to control the parties in the network that may be authorized to access the data. By adjusting the permissions and encryption with a shared partition, a data owner may be able to store data in an off-chain manner.

Copies of the data may be replicated to nodes containing the identified privileges. Nodes containing identified privileges may have these identified privileges revoked at any time by the data owner. Revocation of identified privileges may result in either the loss of access to future data shared by the data owner, or revocation of privileges extending to historical data. The permissions system may be created to control the ability of a data consumer to make copies of the data. Limiting the ability of the data consumer to make copies of data may include the ability to revoke access to previously shared data if a role is revoked and the data consumer does not have permissions to make copies of the data.

The ability to grant and revoke roles may be handled by the control plane. The control plane may run as part of the consensus network and such roles and access to data may be granted between parties either in exchange for a digital currency. The digital currency may be an agreement to mutually share data between peers.

FIG. 194 is a process flow diagram of an example method 19400 for joining and operating within a consensus network using a native decentralized database in accordance with some embodiments. The method 19400 of FIG. 194 may be implemented by the IoT device 19500 described with respect to FIG. 195. At block 19402, a device may connect to a decentralized database network. Connecting may be distinguished from joining in some examples, as joining may imply acceptance and trust by other nodes. Decentralized binary software may be installed. The database may create private database partitions, or tables, which may be limited from replication on other nodes. The number, size, and function of those bases may be at the discretion of the system owner or system developer.

At block 19404, the system may discover namespaces. Namespaces may, for example, refer to other networks, and the other networks may be offering decentralized database services. The discovery of namespaces may, for example, be done through location lookups, network discovery, device discovery, and the like. The discovery process may be automated or hardcoded. A request to join the network may be initiated by the device attempting to join. The request may be driven by a construct such as a permissions guide. The request to join the network may be made through a known node on an existing network of the device, where the joining node may use the known node of the cluster to join the cluster. A decision on how to allow a new node to join a network may be made when the network developers first initialize the network or at an earlier or later time. As discussed above, the network developers, may set the conditions for the allowance of nodes through policies implemented on participant nodes in a decentralized database cluster. The policies may automatically accept participants requesting to join, once the participants are running a verified version of the decentralized database software. The verification of the decentralized database software may be performed using a measured environment to confirm that the software is on a whitelist, as described herein. Any number of other techniques may also be used to confirm the version and validity. The acceptance policies may use a vote to accept or reject the new entity.

New entities may join initially with roles which have limited authority in the decentralized database cluster, and over time the entity may become more authoritative as trust measures for the entity increase. The network developers may allow a designated node to become a validator on the network. For example, network developers may designate nodes as validators for block-chains like bitcoin. If a node attempting to join a decentralized database cluster gets rejected, the node may continue operating as a standalone database. The standalone database may serve centralized application that exist in the same security domain and/or network as the standalone database. A node attempting to join a decentralized database cluster may attempt to discover one or multiple namespaces. A node attempting to join a decentralized database cluster may join more than one consensus network, if polices implemented by the network developers permit.

At block 19406, a node allowed to join a decentralized database cluster may create a number of shared partitions and tables as specified, for example, by the network developers. Data stored in shared partitions and shared tables may be replicated within the network. The network may indicate how many copies of a data object may be stored for redundancy. A replication factor may be global, or the replication factor may be applied differently based, for example, on data object type. The replication factor may be selected based on the criticality of the data, or may be selected on piecemeal basis for partitions and tables, depending on the importance of the data. Data being stored may be sharded. Sharded data may refer to data stored in partial pieces across participating nodes in the network so that no single node has a complete set of shards for reconstruction of a particular object.

At block 19408, a node may be synchronized with the rest of the network and may advertise its services. Advertisement for services may, for example, include listening on a particular port or range of ports. Clients using the database may access the databases services over a range of ports. The natively centralized database may route data it receives so that the data may be stored in the private partitions and private tables or the shared partitions and shared tables. The clients may be aware of the decentralized nature of the database and the client may request that the decentralized database store the data privately. The clients may be aware of the decentralized nature of the database and the client may request that the decentralized database store the data publicly. Participants in the decentralized network may keep the data of the participant in one location, and later choose data the participant may be willing to share and which data not to share. Data stored in private partitions or shared partitions may be encrypted at the direction of the data owner before the data is stored. Encryption may be done by the clients and/or may be implemented in the decentralized database, for example, if the data owner trusts the database. A decentralized database may enable a shared market place for IoT data.

FIG. 195 is a block diagram of an example of components that may be present in an IoT device 19500 for joining and operating a decentralized database in accordance with some embodiments. Like numbered items are as described with respect to FIGS. 3 and 8. It can be noted that different components may be selected and used for the IoT device 19500 than for those selected for the IoT device 800 discussed with respect to FIG. 8, and other IoT devices discussed herein.

The mass storage 808 may include a number of modules for joining and operating a decentralized database. Although shown as code blocks in the mass storage 808, it may be understood that any of the modules may be fully or partially replaced with hardwired circuits, for example, built into an application specific integrated circuit (ASIC).

The mass storage 808 may include a device connector 19502 to connect a device to a network of a decentralized database. The device may install decentralized database software in response to connecting to the network of a decentralized database. The device may create a shared database partition in response to connecting to the network of a decentralized database.

The mass storage 808 may include a namespace discoverer 19504 to discover a namespace of a node of the decentralized database. The device may request to join the decentralized database in response to discovering the namespace of the node of the decentralized database. The device may be accepted to the decentralized database in response to discovering the namespace of the node of the decentralized database.

The mass storage 808 may include a partition creator 19506 to create a shared database partition in response to being accepted by the node. The shared database partition may be at least one of permissioned and encrypted. Copies of data stored in a shared database partition may be replicated to a second node in response to the second node presenting privileges indicating the authority of the second node to copy the data. The device may replicate a shared node partition for storage in the shared database partition, in response to creating the shared database partition.

The mass storage 808 may include a service advertiser 19508 to advertise a service to the decentralized database. The mass storage 808 may include a data router 19510 to route data received and generated during the execution of a service between a private database partition and a shared database partition. The data in the shared partition may be replicated for storage in a shared node partition in response to data being routed to the shared database partition. The device may receive acceptance to the decentralized database in response to the node voting on acceptance of the device.

FIG. 196 is a block diagram of a non-transitory, machine readable medium 19600 including code to direct a processor 902 for joining and operating a decentralized database in accordance with some embodiments. The processor 902 may access the non-transitory, machine readable medium 19600 over a bus 904. The processor 902 and bus 904 may be implemented in a manner similar to the processor 902 and bus 904 described with respect to FIG. 9. The non-transitory, machine readable medium 19600 may include devices described for the mass storage 808 of FIG. 8 or may include optical disks, thumb drives, or any number of other hardware devices.

The non-transitory, machine readable medium 19600 may include code 19602 to direct the processor 902 to connect a device to a network of a decentralized database. The device may install decentralized database software in response to connecting to the network of a decentralized database. The device may create a shared database partition in response to connecting to the network of a decentralized database.

The non-transitory, machine readable medium 19600 may include code 19604 to direct the processor 902 to discover a namespace of a node of the decentralized database. The device may request to join the decentralized database in response to discovering the namespace of the node of the decentralized database. The device may be accepted to the decentralized database in response to discovering the namespace of the node of the decentralized database.

The non-transitory, machine readable medium 19600 may include code 19606 to direct the processor 902 to create a shared database partition in response to being accepted by the node. The shared database partition may be at least one of permissioned and encrypted. Copies of data stored in a shared database partition may be replicated to a second node in response to the second node presenting privileges indicating the authority of the second node to copy the data. The device may replicate a shared node partition for storage in the shared database partition, in response to creating the shared database partition.

The non-transitory, machine readable medium 19600 may include code 19608 to direct the processor 902 to advertise a service to the decentralized database. The non-transitory, machine readable medium 19600 may include code 19610 to direct the processor 902 to route data received and generated in response to execution of a service between a private database partition and a shared database partition. The data in the shared partition may be replicated for storage in a shared node partition in response to data being routed to the shared database partition. The device may receive acceptance to the decentralized database in response to the node voting on acceptance of the device.

In some embodiments the techniques herein disclose access control in an IoT object. In IoT systems, security is complicated by the constrained nature of the devices involved, which may not be able to implement the security systems used in less constrained devices, such as desktops, laptops, or smartphones, among others. Implementing an access control that uses less complicated parameters may enhance the secure implementation of IoT applications in secure environments, and improve the operation and adoption of IoT systems.

In IoT system design an object may refer to a data model description and physical instantiation of a unit of operation. An IoT system may be described in terms of multiple objects interacting to achieve a goal or outcome. Objects may be composed of multiple layers of operation, in that sense the definition of object may be recursive. An object decomposition method, such as introspection, may resolve recursion to its leaf node attributes. An IoT object access may in some cases be understood according to a layering decomposition having at least six layers, and in other cases, more or fewer layers may be used.

FIG. 197 is a schematic diagram of logical division 19700 for access control in an IoT object in accordance with some embodiments. In an example, the logical division for access control may show that a caller's authorization may accompany a request for access. The caller authorization may be qualified within access control list (ACL) structure 19702 that identifies a caller object 19704 and a target object 19706. The ACL structure 19702 may show that Create, Read, Update, Delete, and Notify (CRUDN) permissions 19708 may be applied at any layer in the layering decomposition. The ACL caller object 19704 and ACL target object 19706 may be structures having the same object reference type so there may be full flexibility in specifying a range of caller object 19704 and target object 19706 granularity according to the layering model respectively. The CRUDN policy 19708 may be meaningful at each layer of granularity.

A caller object 19704 may be issued a credential with an authorization structure defining the privileges with which the caller is making a request. Privileges may be defined according to the layering structure above. The platform, device, collection, resource, record or property originating the request may be specified in the authorization section.

FIG. 198 is a schematic diagram of logical divisions 19800 between a caller credential 19802 and a request 19804 for access control in an IoT object in accordance with some embodiments. The authorization 19806 of a caller may accompany a request for access and resulting permissions 19808. An object to be accessed may be constrained by the intrinsic limitations placed on the object by the physicality of the object. For example, a read-only storage device (ROM) may not have physicality that permits write operations. Physicality may be expressed using CRUDN. The expected access may be limited by the physicality of an object, hence the access request may expect the requested permission to be dominated by physicality. The expected access may be a request 19804 including an object 19810 and permissions 19812. If not limited by the physicality of an object, an access request by an object, if honored, may in some cases cause a device to behave in an undefined or unsafe manner.

FIG. 199 is a schematic diagram of logical divisions 19900 between an object capability 19902 for access control using layers 19904 in an IoT object in accordance with some embodiments. A first layer of an IoT object access may be a platform layer 19906. A platform layer may include a physical instance of a computer containing computational, networking, storage, sensing or actuation capabilities. Platform access control may be understood in terms of a platform identifier and a credential. The credential may, for example, be embedded by a manufacturer, or stored in the unit during configuration or implementation, such that the credential could serve as an attestation credential. The platform credential may verify at an access request without the credential if the access request may be a condition of device credential issuance. The platform credential may be used to re-attest platform properties including its physicality.

A second layer of an IoT object access may be a device layer 19908. A device layer may include a logical instance of a computer containing computational, networking, storage, sensing or actuation capabilities. Device access control may be understood in terms of a device identifier and credential.

A third layer of an IoT object access may be a collection layer 19910. A collection layer may include a logical structure of one or more resources, as disclosed below. Access control may be understood in terms of a type identifier, interface definition and an authority identifier that names the structure.

A fourth layer of an IoT object access may be a resource layer 19912. A resource layer may include a logical structure of one or more records as disclosed below. Access control may be understood in terms of a type identifier, interface definition and an authority identifier that names the structure.

A fifth layer of an IoT object access may be a record layer 19914. A record layer may include a logical structure of one or more properties as disclosed below. Access control may be understood in terms of a resource plus a record index offset.

A sixth layer of an IoT object access may be property layer 19916. A property layer may, for example, include atomic data structure and/or a complex data structure of any structure definable using a data modeling language (DML). For example, an atomic data structure may include a string, a number, and/or a date. The DML may provide a structure of metadata to capture, for example, limitations on acceptable data formatting, structure, and data value constraints such as JSON Schema. Access control policy may be expressed in terms of a data structure life cycle of Create, Read, Update, Delete, and Notify (CRUDN). Notify may be further divided into Observe and Notify where Observe presumes read permission on a structure change event and Notify presumes write permission to another object.

Access control list (ACL) evaluation may be a process of verifying the authorization of a caller object that dominates and/or overlaps a caller section. ACL evaluation may be a process where a structure being accessed may be dominated and/or overlapped by a target section. Unless a complete set of layers in the target section match the structure to be accessed, the ACL may be limited in application. Access may be denied unless an ACL is found to match.

FIG. 200 is a process flow diagram of an example method 20000 for access control in an IoT object in accordance with some embodiments. The method 20000 of FIG. 200 may be implemented by the IoT device 20100 described with respect to FIG. 201. Process flow may begin at block 20002. At block 20002, a credential may be issued to a caller entity. The credential may, for example, contain a six-layer authorization structure, although other authorization structures, such as four-layer, may be used, depending on the security requirements. At block 20004, object entities may be provisioned with ACLs. The ACLs may specify the six-layer reference to the target object and a CRUDN or CRUDON permission. At block 20006, caller may present an authorization credential to the object over a suitable connection interface. At block 20008, an access enforcement engine (AEE) may apply the ACL policy given the supplier credential.

At block 20010, a determination may be made as to whether or not the credential authorization overlaps with the caller. If, no, the credential authorization does not overlap with the caller, the process flow proceeds to block 20012, where access may be denied.

At block 20014, a determination may be made as to whether or not a target overlaps the request. If no, the target does not overlap the request, the process flow proceeds to bock 20012, where access may be denied.

At block 20016, layers of the caller object layer identifications may be compared to the credential object layer identifications to determine if there is a match. If no, the caller object layer identifications do not match the credential object layer identifications, the process flow proceeds to block 200012, where access may be denied. Caller object layer identifications may include a platform layer, a device layer, a collection layer, a resources layer, a record layer, and a property layer.

At block 20018, layers of the target object layer identifications may be compared to the request object layer identifications to determine if there is a match. If no, the target object layer identifications do not match the request object layer identifications, the process flow proceeds to block 200012, where access may be denied. Target object layer identifications may include a platform layer, a device layer, a collection layer, a resources layer, a record layer, and a property layer. If yes to the above determinations, at block 20020, access may be allowed for an IoT object.

FIG. 201 is a block diagram of an example of components that may be present in an IoT device 20100 for access control in an IoT object in accordance with some embodiments. Like numbered items are as described with respect to FIGS. 3 and 8. It can be noted that different components may be selected and used for the IoT device 20100 than for those selected for the IoT device 800 discussed with respect to FIG. 8, and other IoT devices discussed herein.

The mass storage 808 may include a number of modules for access control in an IoT object. Although shown as code blocks in the mass storage 808, it may be understood that any of the modules may be fully or partially replaced with hardwired circuits, for example, built into an application specific integrated circuit (ASIC).

The mass storage 808 may include a credential issuer 20102 to issue a credential to a caller entity, the credential including a number of layers of authorization structure. The credential may be a six-layer permission. The six-layer permission may include a platform layer, a device layer, a collection layer, a resource layer, a record layer, and a property layer. The number of layers may include a platform layer to reflect a physical instance of a computer and includes at least one of computational, networking, storage, sensing and actuation capabilities. The number of layers may include a device layer to reflect a logical instance of a computer including at least one of computational, networking, storage, sensing and actuation capabilities. The number of layers may include a collection layer to a logical structure of a resource, where the resource includes a logical structure for a record, where the record includes a logical structure of a property, and where the property includes at least one of an atomic data structure and a complex data structure. The property may be a complex data structure, and the complex data structure is for a structure definable using a data modeling language. The property may include an atomic data structure, and the atomic data structure may be at least one of a string, a number, or a date. The credential may indicate installation by a manufacturer.

The mass storage 808 may include an object entity provisioner 20104 to provision an object entity with an access control list specifying a reference to a target object and a permission. The mass storage 808 may include a credential presenter 20106 to present an authorization credential to the object entity. The authorization credential to the object entity may be limited by limitations placed on the object by a physicality of object data based on a Create, Read, Update, Delete, and Notify (CRUDN) life cycle notification. The mass storage 808 may include an access control list policy applier 20108 to apply an access control list policy to determine if access is allowed for an IoT device based on a comparison of if the credential overlaps the caller entity, if the target object overlaps a request, if a number of device layer identifications match a number of credential layer identifications, and if a number of target layer identifications match a number of request layer identifications.

FIG. 202 is a block diagram of a non-transitory, machine readable medium 19600 including code to direct a processor 902 for access control in an IoT object in accordance with some embodiments. The processor 902 may access the non-transitory, machine readable medium 20200 over a bus 904. The processor 902 and bus 904 may be implemented in a manner similar to the processor 902 and bus 904 described with respect to FIG. 9. The non-transitory, machine readable medium 19600 may include devices described for the mass storage 808 of FIG. 8 or may include optical disks, thumb drives, or any number of other hardware devices.

The non-transitory, machine readable medium 20200 may include code 20202 to direct the processor 902 to issue a credential to a caller entity, the credential including a number of layers of authorization structure. The credential may be a six-layer permission. The six-layer permission may include a platform layer, a device layer, a collection layer, a resource layer, a record layer, and a property layer. The number of layers may include a platform layer to reflect a physical instance of a computer and includes at least one of computational, networking, storage, sensing and actuation capabilities. The number of layers may include a device layer to reflect a logical instance of a computer including at least one of computational, networking, storage, sensing and actuation capabilities. The number of layers may include a collection layer to a logical structure of a resource, where the resource includes a logical structure for a record, where the record includes a logical structure of a property, and where the property includes at least one of an atomic data structure and a complex data structure. The property may be a complex data structure, and the complex data structure may be for a structure definable using a data modeling language. The property may include an atomic data structure, and the atomic data structure may be at least one of a string, a number, or a date. The credential may indicate installation by a manufacturer.

The non-transitory, machine readable medium 20200 may include code 20204 to direct the processor 902 to provision an object entity with an access control list specifying a reference to a target object and a permission. The non-transitory, machine readable medium 20200 may include code 20206 to direct the processor 902 to present an authorization credential to the object entity. The authorization credential to the object entity may in some cases be limited by limitations placed on the object by a physicality of object data based on a Create, Read, Update, Delete, and Notify (CRUDN) life cycle notification. The non-transitory, machine readable medium 20200 may include code 20208 to direct the processor 902 to apply an access control list policy to determine if access is allowed for an IoT device based on a comparison of if the credential overlaps the caller entity, if the target object overlaps a request, if a number of device layer identifications match a number of credential layer identifications, and if a number of target layer identifications match a number of request layer identifications.

Self-managing devices and systems in accordance with some embodiments are capable of describing themselves and their features to themselves and to other devices. For example, introspection, as described herein, may be used. Introspection is a form of self-awareness where a data description language (DDL), e.g., JSON Schema, or XML, among others, that is machine readable and encapsulates the semantic decomposition of the device under interrogation or advertisement. As used herein, self-managing devices and systems may be self-aware and able to optimize the performance of the device or recognize when it is damaged or running low on resources. Further, self-describing modules may decrease human input and effort by automating the task of reading a data sheet and developing specific code for the module. For example, a self-describing transducer may include integrated memory that describes the data that is found in the datasheet.

The datasheet information may include manufacturer details, calibration parameters, signal conditioning, and signal processing requirements. A datasheet may further describe a node meta-model (NMM) for interaction. In the meta-model, a node may include a NodeID, a set of properties, and a set of commands, such as the commands the node sends and the commands the node receives, and a set of command parameters. Parameters may be qualified by an identifier, an editor and an initializer. Editors may be applied to properties and/or command parameters. A node may have its own editor. Thus, in a node meta model, the datasheet information may include command interaction semantics in addition to property information.

The NMM may be expressible using a DDL facilitating automated introspection. Hence, IoT devices interacting with the node can dynamically react to changes in the datasheet as further detailed herein. When both sides of a datasheet interaction recognize the same vocabulary of the NMM, the system of IoT devices can dynamically take advantage of changes in device behavior and capability without installation or update of a device's drivers or system software. Accordingly, a self-describing transducer may be used in a plug and play configuration with a microcontroller or IoT device, without the need to manually develop specific code to access the information on the data sheet. Self-describing devices may also be plug and play into a network, in which they advertise their resources and requirements.

Further, self-describing external modules, including transducers, radios, energy storage, energy harvesting and microcontrollers, may be used to decrease waste by disposing of expired or damaged components and repurposing the longer lived components. For example, an external module may include external sensors or actuators, communications modules, energy harvesting components or an external battery, or external memory, among others. The external modules, such as a sensor or a radio, may have an expiration date, at which the accuracy or functionality may be projected to be degraded. When interchangeable external modules are used in an IoT device, the external modules may be replaced upon reaching the expiration date, allowing the remainder of the IoT device to be reconfigured and repurposed. The ability to replace or remove aging or nonfunctional external modules, and the reconfigure the remaining IoT device and functioning external modules may provide an extension in the overall lifetime of the entire IoT device.

In a single IoT device assembly, lifespan may be tied to the lifetime of the first component to fail. However, using the presently disclosed techniques, in accordance with some embodiments, the overall sensor node may be automatically repaired, or reconfigured for another purpose, beyond the lifetime of the shortest living component. For example, the IoT device may deactivate the external module close to an end of lifetime and be reconfigured to perform different task based on remaining modules.

Further, after component has been deactivated the function of the self-describing IoT modular device may be completely different. For example, a defective external module may be replaced with a working external module for another function, thus changing the function of the overall IoT device. A radio module on a sensor node may be replaced with a newer, lower power, or longer-range radio resource. This may extend the useful life of the sensor node, as the sensor node may be reconfigured if a system gateway is upgraded to a newer radio protocol. Further, a self-describing IoT device may cross-reference the values from these multiple modules, and output more calibrated data through use of additional external modules. This may be facilitated when a machine readable DDL includes a semantic markup that is transferable to the cross-referenced and self-described device. Hence, a separate, manual, step of applying the semantic markup may be avoided. The IoT calibration parameters could allow a processor to read and apply these calibrated values directly rather than having to handle raw data with additional processing.

A common protocol may be used by devices and modules that are able to self-describe their resources and requirements. In these arrangements, the external modules may integrate into many devices. The devices may flag conflicts between the device capability and the requirements of an attached component.

FIG. 203 is a process flow diagram of an example method 20300 for use by an internet-of-things (IoT) device to map resources and requirements of self-describing hardware in accordance with some embodiments. The method 20300 of FIG. 203 may be implemented by the IoT device 20400 described with respect to FIG. 204. The method 20300 may be run using the system 802 described with respect to FIG. 8. The method 20300 may begin at block 20302 when an IoT device boots.

At block 20304, the IoT device may enumerate resources under the control of the IoT device. In an example, the resources may be hardware components and may include an energy source, such as a power supply, a battery, or an energy-harvesting system, including solar panels, wind turbines, or water turbines, among others. The hardware components of the IoT device may, for example, include a processor, context sensors, context actuators, signal conditioning circuitry, storage, and memory. Resource hardware components may, for example, include integrated communications including inter-integrated circuit (I2C), serial peripheral interface (SPI), universal asynchronous receiver/transmitter (UART), or integrated radio. The components of the IoT device in accordance with some embodiments are discussed further with respect to FIG. 204.

At block 20306, a determination is made as to whether some or all external modules have been enumeration and details about the requirements of an external module. If not all external modules have been identified, at block 20308, the requirements for the external module are identified and the external module is enumerated. Enumerating external modules allows an IoT device to reference the external modules and access the requirements of an external module. At block 20310, a determination is made as to whether the resources of the IoT device are exceeded by the requirements of the external module. The requirements may include, for example, module power, communication capabilities, communication speeds, memory requirements, and other IoT device and module capabilities.

If the requirements of the external modules exceed the resources of the IoT device by itself, at block 20312, the IoT device transmits a signal to the external module to deactivate. At block 20314, the IoT device may activate a visible or audible alert. The alert may be the actuation of a light-emitting diode (LED), an audio tone, or both. The alert, such as an LED, may signal to a user that the resources have been exceeded by the requirements of an indicated external module. For example, a high-throughput microphone, acting as an external module, may exceed the resources of a simple microcontroller as high-throughput processing may not be feasible in the microcontroller. In addition to a local alert, a message may be sent to master device from the IoT device.

If the resources of the IoT device are sufficient to meet the requirements of the external modules, at block 20316, the IoT device may update a listing of itself to include its remaining resources as well as a listing of the total requirements of some or all external modules operating from that IoT device.

Process flow resumes at block 20306, where a determination is made if some or all external modules connected to the IoT device are identified and enumerated. Once the external modules have been identified and enumerated, external modules may then be mapped to resources. For example, a gas sensor used as an external module may need temperature and humidity measurements to report data accurately. However, the IoT device may not have temperature and humidity sensors. In response to detecting that a gas sensor is attached and uses temperature and humidity measurements, the IoT device may send a request with these requirements to a master device. The master device may then determine if the requested external modules, such as the temperature sensor and the humidity sensor, are accessible by the master device either directly, or through another connected IoT device.

If a temperature or humidity sensor is found by the master device, for example, in an external module, the external module may be reconfigured to be under the control of the IoT device. The sensors may be local to the IoT device, or may be in a module external to the IoT device, so long as the measurement is sufficiently proximate to be useful. For example, if an IoT device wanted humidity and temperature information, a master device may access and reconfigure a temperature sensor or a humidity sensor in the same room or in a nearby hallway as the IoT device. These external modules to the IoT device may be configured to be under the control of the IoT device. The resources of these sensors may be used to enable a gas sensor on the IoT device to be calibrated for the variables of temperature and humidity, rather than returning raw data.

From another perspective, if an external module, such as a gas sensor, meets power, communications, and memory requirements, the external module may be added to the system even if the gas sensor does not have access to temperature or humidity data and cannot provide data calibrated by these factors. However, adding the gas sensor component to the IoT device may be used by other IoT devices in various configurations needing gas sensing.

Once the external modules have been identified and enumerated, at block 20318, a determination is made as to whether the total requirements of the sum of the combined modules and IoT device exceeds the total resources of the IoT device. The total resources of the IoT device, as used herein, generally refers to the resources of the IoT device, plus any external resources the IoT device may access without messaging a master device. Resources of an IoT device may be reflected in capabilities of the IoT. In an example, these resources may be allocated to the IoT device, or between several interconnected IoT devices based on the demands of the IoT device and the attached external modules.

If the total resources of the IoT device are exceeded by the total module requirements, at block 20320, the external modules may be disabled, except for a comm module. At block 20322, the IoT device may use the comm module to notify a master device of the shortfall in total resources. In response to receiving this notification, the master device may determine what resources it may reallocate by reconfiguring a pool of resources to a specific IoT device. Alternatively, in response to receiving a notification, the master device may reconfigure the external modules of the IoT device so that a second IoT device may use them while the first IoT device may be redeployed for another task or purpose.

At block 20324, an LED, audio signal, or both, may be actuated by the IoT device to provide a local indication that external modules are deactivated. At block 20326, the master device may identify a configuration to satisfy missing requirements by placing external modules under the control of the IoT device. The update in the configuration may be sent and applied to the IoT device. Applying a new configuration to an IoT device may include changing the resources available to the IoT device. Applying a new configuration to an IoT device may include changing if external modules remain under the control of the IoT device. If external modules are removed from an IoT device, the IoT device may make another check to determine if the remaining requirements of the remaining external modules may be satisfied. In response to a reconfiguration, the IoT device may be able to support its external modules if the IoT device resources have changed, if the sum of the external requirements has changed, or if the reconfiguration has changed a function the IoT device intends to execute. At block 20328, and after the reconfiguration by the master device, new total requirements may be calculated for the new configuration of external modules on the IoT device.

If, at block 20318, the total resources of the IoT device are not exceeded by the total module requirements, then at block 20330, the expected lifespan of the IoT device may be calculated using an algorithm comparing a component's lifespan. In an example algorithm, and expected lifespan for an IoT device may be set to match the shortest remaining lifetime of a component that, if lost or deactivated, could results in reconfiguration of the IoT device in order to function as expected.

An IoT modular device associated with a user or user account may include a service level specified in a service level agreement (SLA). An SLA may include agreed upon capabilities of the IoT device and configuration, an expected lifespan, and expected function, an expected performance, and an expected availability of the device. At block 20332, the IoT determines if a device lifetime is less than the lifetime specified in an SLA for a particular user or account. If yes, then process flow proceeds to block 20322, where a master device is notified. If the remaining lifetime of the device is less than provided in the SLA, the IoT device in its present configuration would not fulfil the requirements of the SLA. When the master device is notified at block 20332, a new configuration with external modules that fulfill the SLA may be added.

In an example, a configuration of an IoT device may include a module or modules that extends lifetimes of devices to meet a sensor lifetime specified in the SLA. For example, the lifetimes of the external modules available to an IoT device may be compared against the lifetime specified in the SLA. If a lifetime is less than specified in the SLA, the IoT may request a new configuration of external modules from the master device that meets the listed SLA lifetime value.

If however, the device lifetime exceeds the lifetime stated in the SLA, then at block 20334, a determination may be made about if a quality of service (QoS) measurement exits for the IoT device in its present configuration. If a QoS does not exist for the IoT device and its external modules, at block 20336, QoS metrics for the IoT device may be generated. Once these QoS metrics have been generated, or if QoS metrics were already present in the IoT device, then at block 20338 the IoT device may determine if the QoS is less than a specified QoS threshold in the SLA.

If the QoS is less than a requested threshold specified in the SLA, then at block 20340, the IoT may notify the master device that the QoS is lower than requested in the SLA and may identify the external module or modules that may be needed to change the QoS. At block 20342, a visible or audio signal such as LED or sound may be actuated to indicate locally to the IoT device that the IoT device does not meet a QoS. At block 20344, the IoT may receive an updated configuration with either additional, replacement, or fewer external modules, such that the QoS measurements match the requirements of the SLA. Process flow proceeds to block 20334, where a new QoS is found based on the updated configuration.

In an example, the QoS for an IoT device may be changed with the adding, subtracting, and substitution of external modules. These changes may result in a QoS less than the QoS specified in the SLA. For example, if there is no historic QoS on an IoT device for the IoT device communications module, the QoS may be tested on that device based. The QoS for the communication module on one IoT device may be different from the QoS for the communications module on another the same IoT device with a differing configuration to other external modules.

In this example, when a communications module QoS is below a threshold specified in the SLA, the master device may be notified by the IoT device and a request may be made for a new communications configuration. If an update to the configuration is granted by the master device, a new QoS test may be performed to evaluate and find a new QoS for the updated configuration. When the QoS is equal to or greater than the threshold listed in the SLA, at block 20334, the process ends by starting an application on the IoT device that makes use of the capabilities of the external modules in the present configuration of the IoT device.

In an example, after an application using an IoT and a certain set of external modules, the configuration of the IoT device may be disbanded and external modules removed from IoT device control for reconfiguration with other IoT devices.

Further, the self-describing hardware may incorporate the node meta-model described herein, and may capture a service-level agreement (SLA) as a parameter to commands it accepts. For example, the parameter may specify the expected power utilized to accomplish the command and an editor may adjust the power utilized to adapt to an expected SLA threshold for an expected lifespan of a device power source. Using NMM and these SLA conventions, IoT devices in accordance with some embodiments may support and perform the functions described herein without adding a separate driver or system software update.

FIG. 204 is a block diagram of an example of components that may be present in an IoT device 20400 to map resources and requirements of self-describing hardware in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a resource hardware component identifier 20402 to identify a resource hardware component controlled by the IoT device, the resource hardware component having a capability threshold. In an example, the resource hardware component may include at least one of a power source, a processing resource, an integrated communication component, a context sensor, and a context actuator, a signal conditioning circuit, a memory resource, or a storage resource. The capability threshold, as used herein, generally refers to a minimum functional compatibility between the resource hardware component and the external module indicating a minimal ability to function together. The capability threshold as used herein may also include a full compatibility between the resource hardware component and the external module indicating an ability to function at the highest capabilities of the external module.

An indication receiver 20404 may process a received indication of an external module hardware requirement from an external module. In an example, the external module includes a module resource to be pooled with the first resource hardware component for use at the direction of the IoT device.

An external module comparer 20406 may compare the external module hardware requirement to the capability threshold of the resource hardware component of the IoT device. The deactivation transmitter 20408 transmits a deactivation signal to the external module in response to the external module hardware requirement not satisfying the capability threshold of the resource hardware component.

FIG. 205 is a block diagram of a non-transitory, machine readable medium 20500 including instructions that, when executed, direct a processor to map resources and requirements of self-describing hardware in accordance with some embodiments. Like numbered items are as they are described with regards to FIG. 9.

The non-transitory, machine readable medium 20500 may include code 20502 to direct the processor 902 to identify a resource hardware component controlled by the IoT device, the resource hardware component having a capability threshold. The capability threshold, as used herein, generally refers to a minimum functional compatibility between the resource hardware component and the external module indicating a minimal ability to function together. The capability threshold may also include a compatibility between the resource hardware component and the external module. This may indicate the ability to function at the highest capabilities of the external module.

The non-transitory, machine readable medium 20500 may include code 20504 to direct the processor 902 to process a received indication of an external module hardware requirement from an external module. The non-transitory, machine readable medium 20500 may include code 20506 to direct the processor 902 to compare the external module hardware requirement to the capability threshold of the resource hardware component of the IoT device. The non-transitory, machine readable medium 20500 may include code 20508 to direct the processor 902 to transmit a deactivation signal to the external module in response to the external module hardware requirement not satisfying the capability threshold of the resource hardware component.

The non-transitory, machine readable medium 20500 may include instructions that, when executed, direct the processor to transmit a request to a master device in response to the external module hardware requirement not satisfying the capability threshold of the resource hardware component, the request to the master device to request a second resource hardware component be assigned to be controlled by the IoT device. The non-transitory, machine readable medium 20500 may include a second resource hardware component under the control of the IoT device, wherein the first resource hardware component and the second resource hardware component may be pooled such that the capability threshold is the sum of the capability threshold of the first resource hardware and the second resource hardware.

An indication may be sent, based on executed instructions stored in the computer readable medium, to indicate an unsatisfied capability threshold and to activate a visible indicator. The non-transitory, machine readable medium 20500 may include instructions that, when executed, direct the processor to place the external module under control of the IoT device in response to satisfying the capability threshold.

The non-transitory, machine readable medium 20500 may additional code blocks for execution. This code can be used in response to an external module lifetime being less than an operational life of the IoT device, transmit a request for an updated external module. This code can be used in response to a resource hardware component lifetime being less than an operational life of the IoT device, the processor may be sent instructions to transmit a request for an updated resource hardware component.

As described above, the internet of things (IoT) may progress to a state where any module may be used in a plug and play configuration any other device over a common physical interface. In this configuration, module may be interoperable with any device using a common interoperability protocol. However, IoT devices may not know the energy cost of implementing an application between modules or devices until the modules or devices are connected. As used herein, an application may include an algorithm, an operation, a subroutine, software, or any other action computing hardware may perform that could expend energy.

For example, a module that includes a Bluetooth low energy (BLE) radio may be replaced by a Wi-Fi radio module in a coin-cell powered IoT device. The Wi-Fi radio may be capable of successfully interfacing with the IoT device, but it may drain the battery of the IoT device within an hour, rendering the IoT device useless. As described herein, the IoT device may be able to calculate the energy required to process applications and raise an alert if a module may use too much power. Energy inefficient applications may be identified by such characteristics as whether the application communicates with or relies on a power-draining module too often, or if the application does not implement a low-power sleep mode.

The energy requirements for an application may be calculated according to connected hardware, using a calculation tool. The calculation tool may be used on an IoT device when the IoT device is powered up, when modules are added or removed, or when an application is updated by an internal request if the IoT device is self-managing, or by an external request if a master device manages the device. The calculation tool may be used on a master device, such as a gateway, following a request for a new configuration from a slave device, such as an end node. The calculation tool may also be used on a master device as a pre-verification method before software updates are implemented. The calculation tool may also be part of a pre-deployment simulation tool that may identify breaches of minimum parameters specified in a service level agreement (SLA).

A configuration optimization process may be aided by use of the calculation tool. For example, the calculation tool may be used as part of a pre-deployment simulation tool, in which application settings or device settings may be manipulated to identify a configuration that improves device energy efficiency. Further, determining what makes a module or device more energy efficient may provide a suggestion of applications that could extend the lifetime of the module or device.

The calculation tool may address devices and modules that are able to self-describe resources, requirements, and applications according to a common protocol across devices and modules. As disclosed herein, the calculation tool may, for example, identify default energy usage of a module by identifying historic energy usage of a module to provide measurements for use in making estimates, specified energy consumption, and the like. For example, the rated energy consumption of a 3G module may depend on the proximity of the module to a base station.

The calculation tool may account for the varying energy uses in between various hardware configurations being tested. In one example, the calculation tool relies on applications written with decomposable tasks. The tool may rely on measuring energy use of an application on a module, where the module may self-describe its energy use for a task that could be performed on the module. Examples of tasks a module may report energy consumption for include sending a message, reading a sensor, and powering an LED, among many others.

FIG. 206 is a process flow diagram of an example method 20600 for use by an internet-of-things (IoT) device to map resources and requirements of self-describing hardware in accordance with some embodiments. The method 20600 of FIG. 206 may be implemented by the IoT device 20700 described with respect to FIG. 207. The method 20600 may be run using the system 802 described with respect to FIG. 8. The method 20600 may begin at block 20602 when an IoT device boots.

At block 20604, a calculation tool determines if a device is connected to a network by a wired network or a wireless network. If it is connected by wired network, there may not be a need to calculate power requirements for the purposes of local device energy management. If wired, at block 20606, the calculation tool may send a signal to begin the application on the device. However, in some examples, the calculation tool may still be used if the device uses a wired network. This may be important if the device includes other types of modules that have a high energy draw, such as a graphics processing unit (GPU), even if those modules are not wireless.

If the calculation tool determines that the device is not wired, at block 20608, the power resources powering the core of the device are enumerated. This may, for example, include identification of the number of power sources, the type of power sources, the measure of power contained in the power sources, the energy sources for the core device, the battery capacity, and energy harvesting capability, and the energy expenditure by the core device.

At block 20610, the calculation tool enumerates the power requirements for an external module. As discussed herein, the enumeration of power requirements for an external module may, for example, include noting a baseline energy consumption for the external module, a fully powered energy consumption for the external module, and the like. The noted baseline energy consumption may be determined for each peripheral or added module that a device may be powering during the execution of the application. The calculation tool may determine and identify a range for the energy consumption, an average of the energy consumption, and a maximum energy consumption for an external module. The calculation tool may identify energy use specifications stored in an external module, or stored in a central node, and associated with the external module. As discussed above, the calculation tool may operate on a system where an external module and is self-describing and may self-describe the energy usage anticipated for certain actions on that module.

At block 20612, the calculation tool decomposes the application being analyzed into smaller tasks. The tasks may be discrete actions or a series of actions, and are broken down into smaller and smaller tasks until the tasks are associated with known energy use values on the hardware being analyzed. These decomposed actions may be saved for use later in tabulating total energy costs across a variety of hardware configurations. In an example, the enumeration of energy requirements may be for a module, accounting for resting power and active power. Active power may be the power used, for example, when sending a message or performing a measurement.

At block 20614, the calculation tool may determine if all of the tasks in an application have been evaluated for their energy use. If no, at block 20616 a determination is made as to whether the task is associated with a transducer module. While this process shows a division in the method between tasks for a transducer module and tasks for a communication module, other types of modules may be evaluated by this process, such as a GPU, among others. The decision shown at block 20614 and in the method shown in FIG. 206 contemplate the tabulation of energy per task and per type of task for a certain hardware and configuration. The energy use is tabulated for both the tasks implemented on the hardware of the device that is hosting the modules, and for the modules. Accordingly, the decision blocks and tabulation shown in FIG. 206 are included for ease of illustration of a tabulation process that allows not only tasks to be analyzed for energy use, but also specific modules and module groups.

If, at block 20616, the calculation tool determines that the task is for a transducer module, at block 20618, the number of transducers requests in one hour is enumerated. Enumeration of the number of transducer request may, for example, include a numerical figure that is measured over the course of one hour during execution of the application. The enumeration of the number of transducer requests may also include a historical average for the number of requests made to the transducer under analyses for the task in question.

At block 20620, the calculation tool may multiply the power it takes to execute the task in question by the number of times a transducer request will be made by the application in one hour. The time period is an example, and may be longer or shorter as needed. For example, the time period may be adjusted by a user or a deployer of the tool, or the time period may be automatically matched to an estimated time of execution for the application. The time period may be raised or lowered. In some embodiments, the time period that is measured is equal for all applications for which energy use is being measured. In an example, a module may self-store its energy usage for a specific task. For example, if a task or number of related tasks are frequently performed on a module, a module may improve the energy analysis step by storing a number of energy use values. For example, if a calculation tool requests the energy usage for a task on a module that already has the task energy usage in module memory, no further analysis is needed as the value may be returned immediately.

At block 20622, the calculation tool may update its calculated value of how much energy the application would use in the current hardware configuration. The process may then return to block 20614 to determine if all tasks for the application have been evaluated.

If, at block 20616, the calculation tool determines that the task is not for a transducer module, at block 20624, the number of communication requests in one hour is enumerated. As noted herein, while the process shows a division in the method between tasks for a transducer module and tasks for a communication module, other types of modules are contemplated in this process and dichotomy. The disclosure of measuring energy use for the tasks of a communicator module is only one example of modules that may be measured.

At block 20626, the calculation tool may multiply the power it takes to execute the communication module task by the number of times a communication request will be made by the application in one hour. As discussed above, the time period shown in the figure and disclosed here is exemplary and may be adjusted. At block 20622, the calculation tool may update its calculated value of how much energy the application would use in the current hardware configuration based on what it learned regarding energy usage of tasks for a communicator module. The process may then return to block 20614 to determine if all tasks for the application have been evaluated.

Once the calculation tool determines that a sufficient number of the tasks in an application have been evaluated at block 20614, the process may proceed to block 20628. For example, the power plan may be implemented while still performing a calculation of the power consumption of other tasks, for example, if the tasks evaluated have a large power consumption value relative to the power reserves of a unit, the process flow may implement the following blocks in parallel, while still evaluating the power consumption of other tasks.

At block 20628, the calculation tool determines if a sleep mode function has been evaluated. If not, then at block 20630 the time an application spends in sleep mode is enumerated. If there is no sleep mode function, then the time enumerated may be zero. Enumerating time spent in sleep mode may be measured in seconds, in clock cycles of the hardware, or in any subdivision of objectively measurable time. The enumeration of time may include measuring the amount of sleep time would occur over the course of one hour during execution of the application. In an example, the enumeration of the time in sleep mode may also include a historical average for the amount of time spent in sleep mode by a processor executing the application in question.

At block 20632, the processor power saved from the application having the processor in sleep mode is calculated. In an example, the processor power saved may be determined by multiplying processor power consumed per unit time by the number of units of time spent in sleep mode, as determined at block 20630. As discussed above, while the unit time of one hour is shown, additional units of time are contemplated. In some embodiments, the unit times are consistent across measured modules and devices.

While the calculation is performed for a sleep mode in this example, similar energy use calculations may be performed by the calculation tool. For example, the time that a processor is an active or available to execute other tasks while executing the application in question may be measured. This time, while not necessarily saving power, may be tabulated and shown as time and energy that could be spent executing tasks unrelated to the application being measured.

Once the total power saved by a processor in sleep mode is calculated, at block 20622, the calculation tool may update its calculated value of how much energy the application may use in the current hardware configuration. As the total power saved by using this application is saving power of the processor, this value may reduce the calculated value of how much energy the application would use. Process flow may then return to block 20614 to determine if a sufficient number of tasks for the application have been evaluated, as described herein.

Once the calculation tool determines that a sufficient number of tasks in an application have been evaluated at block 20614, and that the sleep mode function has been evaluated at block 20628, process flow may proceed to block 20634. At block 20634, the calculation tool may calculate a device power lifetime. In an example, this may be performed by comparing the resources of the modules to the requirements of the modules. The comparison may include dividing device resources by module requirements. In an example, the comparison may include a division of how much power is present in device resources by the total calculated total power requirements per unit time as updated in block 20622.

At block 20636, the calculation tool may determine that a device lifetime is greater than a pre-defined energy use minimum threshold, and, thus, the power used is sufficiently below the energy use threshold. If so, the process calculation tool may terminate, allowing the application to start at block 20606.

If the device life is not greater than the minimum threshold for energy use, block 20638, the calculation tool may notify a master device that the energy use minimum threshold had not been met, and may request a new configuration of modules. Notifying the master device of the energy use may include a breakdown of the amount of energy used by modules, the amount of energy used by individual tasks, whether the application includes a sleep mode, and other information gathered during the analysis of the energy use of the modules and core device. Based on this information a master device may identify modules that are not operating as efficiently as they could be and may replace them in a new configuration.

The new configuration of modules may be provided to the calculation tool at block 20640. The new configuration may include added hardware, replaced hardware, or hardware. The calculation tool may then check the energy use of the application in this new configuration. Accordingly, process flow may return to 20610 where the requirements of the modules to be used by the application may be enumerated as described above.

FIG. 207 is a block diagram of an example of components that may be present in an IoT device 20700 for a calculation tool for self-describing hardware in accordance with some embodiments. Like numbered items are as described in FIG. 8. The mass storage 808 may include a number of modules to implement the calculation tool described herein. Although shown as code blocks in the mass storage 808, it may be understood that any of the modules may be fully or partially replaced with hardwired circuits, for example, built into an application specific integrated circuit (ASIC). The mass storage 808 may include an energy resource enumerator 20702 to enumerate energy resources for a device configured to power and control a number of modules.

The mass storage 808 may include an energy requirement enumerator 20704 to enumerate energy requirements for modules, such as the mesh transceiver 810 or the uplink transceiver 814, among others. The mass storage 808 may include an application decomposer 20706 to decompose an application into tasks that, when enacted, function completely on a single module.

A power consumption identifier 20708 may identify the power consumption of a module, for each time period used for the analysis. A task activation counter 20710 may count the number times the task activates the module in a unit of time.

The mass storage 808 may include a total energy calculator 20712 to calculate the total energy used in the unit of time by the one module in of the number of modules based on the time the task is active, the time duration of the task completing on the one module, and the energy required by the module by the active time period.

In an example, the mass storage 808 may also include a total energy calculator 20712 with a device lifetime generator to generate a device lifetime based on the total energy used in the unit of time for the number of modules and on the energy resources for the device. A device instructor may be added to the total energy calculator 20712 to instruct the device to start the application in response to the device lifetime being calculated as greater than or equal to a minimum threshold of time as set before the application analysis begins for the device. In this example, the device instructor may instruct a request for a new configuration be sent to a master device in response to the device lifetime being calculated as less than a minimum threshold of time as set before the application analysis begins for the device. Further, in an example, the request for a new configuration may include a detailed listing of at least one of the following: the energy use for the task on the module, energy used by the module over the unit time, and energy use for a module type in the number of modules.

In an example, the mass storage 808 may provide code blocks to implement control of power to the device, the updating of a hardware configuration of the device, and an update to the code of the application. The application energy calculation apparatus may also include a device instructor to instruct the device to store the total energy per unit time as calculated for a first configuration in this example. In this example, the device instructor may instruct the device to request from a master device a second configuration. Further, in this example, a second total energy calculator may calculate a second total energy per unit for the second configuration of the device.

In an example, the mass storage 808 may also include a total energy comparer as part of the total energy calculator 20712 to compare the total energy per unit of the first configuration with the second total energy per unit for the second configuration. In an example, the mass storage 808 may also include the device instructor to instruct the device to request either the first configuration or the second configuration or both based on the comparison of the total energy per unit and the second total energy per unit. In an example, the mass storage 808 may also include a device instructor to instruct the device to start the application if it is determined that the device is powered by a wired resource.

In an example, the application energy calculation apparatus may also identify the power consumption of a module for each active time period, which may include the module retrieving historic energy usage values associated with the module for the task.

In an example, the mass storage 808 may also include an application sleep mode identifier as part of the total energy calculator 20712 to identify if the application has a sleep mode function. In this example, the mass storage 808 may also include a time counter to count the time the application will be in a sleep mode in a unit of time. The mass storage 808 may also include a total energy calculator to calculate the total energy used based on the total power saved based on the time the processor for an application will be in sleep mode.

FIG. 208 is a block diagram of a non-transitory, machine readable medium 20800 including instructions that, when executed, direct a processor to map resources and requirements of self-describing hardware in accordance with some embodiments. Like numbered items are as they are described with regards to FIG. 9.

In an example, the processor can instruct the providing of power to the device, the updating of a hardware configuration of the device, and an update to the code of the application. The non-transitory, machine readable medium 20800 may include code 20802 to direct the processor 902 to enumerate energy resources for a device configured to power and control a number of modules.

The non-transitory, machine readable medium 20800 may include code 20804 to direct the processor 902 to enumerate energy requirements for the number of modules. The non-transitory, machine readable medium 20800 may include code 20806 to direct the processor 902 to decompose an application into tasks that, when performed, function completely as a single module in the IoT device. The non-transitory, machine readable medium 20800 may include code 20808 to direct the processor 902 to identify the power consumption of the module in the number of modules, for each active time period. In an example, identifying the power consumption of the one module in the number of modules for each active time period includes the module retrieving historic energy usage values associated with the module for the task.

The non-transitory, machine readable medium 20800 may include instructions that, when executed, direct the processor to count the number times the task activates the module in a unit of time. The non-transitory, machine readable medium 20800 may include instructions that, when executed, direct the processor to calculate the total energy used in the unit of time by the module based, at least in part, on the time the task is active, the time duration of the task completed by the module, and the energy required by the module by the active time period.

The machine readable medium is not limited to the code blocks listed above, but may include code to perform other functions. For example, the code may direct the processor to generate a device lifetime based on the total energy used in the unit of time for the number of modules and on the energy resources for the device. In this example, the processor may be directed to request a new configuration be sent to a master device in response to the device lifetime being calculated as less than a minimum threshold of time as set before the application analysis begins for the device. As used herein, the request for a new configuration includes a detailed listing of at least one of the following: the energy use for the task on the module, energy used by the module over the unit time, and energy use for a module type in the number of modules.

In the presently disclosed techniques for internet of things (IoT), in accordance with some embodiments sensors may be capable of implementing algorithms capable of processing a raw data point collected by the sensor, and translating the data point into meaningful information. For example, a data point may be converted from an analog value, such as 3.4V, to a temperature reading, such as 78 degrees Fahrenheit.

As disclosed herein, sensors may be able to connect to generic pins on an IoT device to describe their signal conditioning requirements, and, in cooperation with the IoT device, generate appropriate signal conditioning circuitry. An example of signal conditioning circuitry may include an amplifier followed by a Butterworth filter, for example, to remove noise.

IoT devices may include field-programmable gate array (FPGA) devices, which may be embedded at all levels of an IoT network hierarchy. An FPGA is generally an integrated circuit designed to be configured after manufacturing, usually in a manual process by an OEM. As described herein, modules may describe their signal conditioning requirements, even if the modules are sensors that do not have signal conditioning circuitry. The self-describing modules may be used with FPGA circuits in IoT devices to create custom signal conditioning hardware for the modules.

The IoT device that includes the modules may be less constrained than the modules. As used herein, constrained may generally refer hardware or software that has restrictions that may limit the operation of a device, such as hardware limitations, resource limitations, or licensing or permissions restrictions. In an example, a less constrained IoT device may use a LINUX® operating system or similar operating system (OS), a general processor, such as described with respect to FIG. 8, and wherein the IoT device may be powered from an electrical grid, and include access to high bandwidth network connectivity. In this example, the IoT device includes an FPGA and FPGA compiler. An IoT device that includes an FPGA compiler may generate signal processing circuitry in the FPGA for new modules when the new modules are connected.

The creation of the custom hardware for signal conditioning in an FPGA may begin when a new module is connected to a less constrained IoT device. In response to the IoT device detecting the connection of the new module, the IoT device reads signal conditioning requirements and signal processing algorithm from the module. As noted above the constrained modules and sensors that are self-describing and may provide the signal conditioning requirements and a preferred signal processing algorithm from memory for the module. The less constrained IoT device with the FPGA compiler may then generate a custom conditioning circuitry and implement the conditioning circuitry in the FPGA of the IoT device. Once the custom condition circuitry is implemented by an FPGA compiler, the IoT device may read data output and may apply the signal processing algorithm to the data to generate the information.

When creating a custom hardware for signal conditioning, the device receiving the modules may be a constrained device. A constrained device may, for example, be a wireless node, the device may have low power processor, or the device may have low bandwidth network connectivity. In the constrained device, there may be a less efficient implementation of an FPGA compiler. The less efficient implementation of an FPGA compiler may rely on prebuilt signal conditioning blocks on the FPGA compiler rather than signal conditioning optimized for the specific FPGA compiler.

In an example, the parameters on signal conditioning blocks and connections between them may be defined by the processor after the sensor is connected. While the device may be constrained, the modules may self-describe, send, and receive messages through a common data protocol. As discussed above, a common data protocol is generally a protocol that is understood by all devices.

In an example, the modules may describe the signal conditioning requirements of themselves. From this module self-description, an example method for creating a custom hardware for signal conditioning may be illustrated.

Generating signal conditioning in a constrained device may begin when the module is connected to device. The constrained device may read signal conditioning requirements and signal processing algorithm. The constrained device may then configure parameters of existing FPGA compiler blocks and connect the FPGA logic blocks to create custom signal conditioning circuitry. The constrained device may then read output from the custom signal conditioning circuitry it has created and thus apply the prebuilt signal conditioning blocks and processing algorithm to generate human readable data.

When creating a custom hardware for signal conditioning, the device receiving the modules may be a constrained device that leverages the less constrained resources of an IoT device. In an example, a constrained node could send the signal conditioning requirements from a newly connected module to a less constrained gateway, network device, or cloud device. The less constrained IoT device may generate FPGA code that is transferred to the constrained device, for example, for implementation in an FPGA in the constrained node. The transfer of the optimized code may be transferred through data transferred means including wired and over the air (OTA).

In this example, the method for creating custom hardware or signal conditioning may begin when the constrained device detects a new module has connected. The constrained device may read the signal conditioning requirements and the signal processing algorithm described by the module and may send both to a less constrained IoT device. The constrained device may also send parameters of the constrained device and parameters describing the FPGA of the constrained device to the less constrained IoT device. The signal conditioning requirements may include the signal processing algorithm and the device parameters and FPGA parameters for constrained device. In response to receiving the signal conditioning requirements, the less constrained IoT device may generate custom conditioning circuitry. The generated custom conditioning circuitry may be customized for the constrained device and the FPGA of the constrained device. Once the custom conditioning circuitry has been generated by the less constrained IoT device, the constrained device may read output from the custom signal conditioning circuitry and apply signal processing algorithm to process the raw data and generate information.

FIG. 209 is a process flow diagram of an example method 20900 for use by an internet-of-things (IoT) device to configure signal conditioning circuitry in accordance with some embodiments. The method 20900 of FIG. 209 may be implemented by the IoT device 21000 described with respect to FIG. 210. The method 20900 may be run using the system 802 described with respect to FIG. 8. The method 20900 may begin at block 20902 when a new module is connected to IoT device.

At block 20904, the IoT device may determine signal conditioning requirements. The signal conditioning requirements may, for example, include a format that a device may deliver information corresponding to a signal, such as formatting temperature in degrees rather than measured voltages, or formatting a light measurement in lumens rather than raw voltages output from a photocell or photo resistor.

At block 20906, a determination may be made as to whether the IoT device is a constrained device or a less constrained device. As used herein, less constrained may generally refer to a device that has hardware or software that may implement more general processing software, communications hardware, or has enhanced licensing or permissions to read, write, or execute data received or created.

If the device is less constrained, at block 20908, FPGA code may be generated for the device, based on the self-describing module and the signal conditioning requirements of the device. At block 20910, a decision is made as to if the FPGA on the device is unsuitable for the task. If so, at block 20912, an alert may be sent and the device may disconnect the module.

If the FPGA is determined to be suitable for the task at block 20910, at block 20914, the FPGA code may be downloaded to the device. The FPGA code may be generated on the device itself. The FPGA code may be generated remotely, for example, by a device in the cloud, and may then be downloaded to the IoT device. Once the FPGA code has been generated or downloaded, an FPGA complier may generate a signal conditioning circuit based on the FPGA code. The signal conditioning circuit may then be implemented on the FPGA. Accordingly, the module gathering data may gather data at block 20916 to be fed through the signal conditioning circuit in the FPGA for processing to create the final information feed.

If the device is determined to be constrained at block 20906, at block 20918, it is decided if the device has sufficient configurable signal conditioning blocks on an available FPGA. The available FPGA may be local to the device or remote to the device and under the control of the device. If so, at block 20920, the device may instruct the configuration of the parameters of the existing blocks on the FPGA. For example, this may be based on FPGA code generated on a less constrained device and downloaded to the constrained device.

Once configured, at block 20922, the device may connect the existing FPGA blocks together to form a signal conditioning circuit for the module in the constrained device. As described above, in accordance with some embodiments the connected circuits of the FPGA may be used to condition a signal received at a module. As a result, the module gathering data may collect data at block 20916, and provide the data to the signal conditioning circuit in the FPGA.

If at block 20918, a determination is made that the device does not have sufficient configurable signal conditioning blocks on an FPGA, then at block 20924 the FPGA blocks of the device and the device characteristics are enumerated. As used herein, in accordance with some embodiments the enumeration of FPGA blocks and device characteristics may be used to identify details about the FPGA blocks and the device. The enumeration of FPGA blocks and device characteristics may also be used to send the details about the FPGA blocks and the device to a master device at a higher hierarchical level from the current constrained device at block 20926.

Once received by the master device at the higher hierarchical level, at block 20928, a determination may be made as to whether the master device has the FPGA compiling capabilities suitable for the device characteristics and the enumerated FPGA. If not, at block 20926 then the original device may send the enumerated FPGA blocks and device characteristics to a second master device at a higher hierarchical than the master device. If the master device has the requested capabilities, then at block 20930 the master device may generate the FPGA code for processing the data from the constrained device.

At block 20932, a determination is made as to whether or not the FPGA on the constrained device is unsuitable for the task. If so, at block 20912, an alert may be sent about the incompatibility and the device may be disconnected from the module. If, at block 20932, it is determined that the FPGA on the device is not unsuitable for the task, at block 20934, the FPGA code is downloaded to the constrained device. Once the FPGA code has been downloaded to the device, the FPGA complier may generate a signal conditioning circuit based on the FPGA code. As a result, the module gathering data may begin to gather data at block 20916 to be fed through the module and devices signal conditioning circuit that is based on the generated FPGA code.

FIG. 210 is a block diagram of an example of components that may be present in an IoT device 21000 to configure signal conditioning circuitry in accordance with some embodiments. Like numbered items are as described in FIG. 8.

The IoT device 21000 can include a FPGA 21002. As used herein, in accordance with some embodiments an FPGA may be an integrated circuit designed to be configured by a customer or a designer after manufacturing. In an example, a self-describing sensor module 21004 may include a sensor FPGA 21006. The sensor FPGA 21006 may function similarly to the FPGA 21002 of the IoT device 21000. The IoT device 21000 may be described as a self-describing IoT device 21000 herein.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a sensor module detector 21008 to detect the self-describing sensor module 21004 in response to the connection of the self-describing sensor module 21004 to the IoT device 21000.

The mass storage 808 may include a received data processor 21010 to process data received from the self-describing sensor module 21004, the received data indicating signal conditioning information for the self-describing sensor module 21004. The mass storage 808 may include a FPGA code generator 21012 to generate FPGA code to be implemented on the FPGA 21002.

The mass storage 808 may include a raw data modifier 21014 to modify raw data received from the self-describing sensor module 21004 to generate signal conditioned data using the FPGA based on the signal conditioning information. In an example, the processor 802 may detect that the FPGA cannot support the FPGA code. In this example, the processor may also connect to existing FPGA blocks in response to detecting that the FPGA blocks are sufficient for signal conditioning the raw data received from the self-describing sensor module 21004.

The processor 802 may also transmit identified FPGA characteristics and self-describing device characteristics. If this is the case, the processor 802 may also transmit a request to a master device in the fog 812 or cloud 302, including FPGA characteristics and self-describing device characteristics. This request may be sent in response to detecting that the self-describing IoT device 21000 is constrained and detecting that the FPGA of the self-describing device does not have sufficient configurable signal conditioning blocks. Further, the request may generate and return a master device generated FPGA code. Similarly, a self-describing IoT device 21000 that includes at least one of a battery 824, an internet connection based on wireless technology, for example, as provided by the mesh transceiver 810 or the uplink transceiver 814, or a processor 802 with a low power mode may be considered a constrained self-describing device in accordance with some embodiments.

In another example, the processor 802 may send the signal conditioning information for the self-describing sensor module 21004 and device information to a less constrained device in response to a detection that the self-describing device is constrained. In this example, the processor 802 may also transmit to the less constrained device a request to generate a return FPGA code to be implemented on the FPGA 21006 of the self-describing sensor module 21004. Further, the processor 802 may send the signal conditioning information for the self-describing sensor module 21004 and device information to a second constrained device in response to a detection that the self-describing IoT device 21000 is constrained, wherein the second constrained device may access a less constrained device.

The self-describing sensor module 21004 may follow the node meta-model (NMM) described herein. This may be implemented as a FPGA where a method for dynamic update of the FPGA may result in dynamic operation of the self-describing sensor module 21004 that implements a universally interoperable interface, such as a plug-and-play mode) based on a node meta model.

FIG. 211 is a block diagram of a non-transitory, machine readable medium 21100 including instructions that, when executed, direct a processor to configure signal conditioning circuitry in accordance with some embodiments. Like numbered items are as they are described with regards to FIG. 9.

The non-transitory, machine readable medium 21100 may include code 21102 to direct the processor 902 to detect a self-describing sensor module in response to the connection of the self-describing sensor module to the self-describing device, the self-describing device including a FPGA. In an example, the self-describing device may include at least one of a battery power source, an internet connection based on wireless technology, or a processor with a low power mode is considered a constrained self-describing device.

The non-transitory, machine readable medium 21100 may include code 21104 to direct the processor 902 to process data received from the self-describing sensor module, the received data indicating signal conditioning information for the self-describing sensor module. The non-transitory, machine readable medium 21100 may include code 21106 to direct the processor 902 to generate FPGA code to be implemented on the FPGA of the self-describing device. Lastly, the non-transitory, machine readable medium 21100 may include code 21108 to modify raw data received from the self-describing sensor module to generate signal conditioned data using the FPGA based on the signal conditioning information.

In an example, the machine readable medium may include instructions that, when executed, direct the processor to detect that the FPGA cannot support the FPGA code. In this example, the instructions may also direct a processor to connect existing FPGA blocks in response to detecting that the FPGA blocks are sufficient for signal conditioning the raw data received from the self-describing sensor module. Further, instructions may also direct a processor to transmit identified FPGA characteristics and self-describing device characteristics. The processor may then transmit a request to a master device, the request to include FPGA characteristics and self-describing device characteristics, the request to be sent in response to detecting that the self-describing device is constrained and detecting that the FPGA of the self-describing device does not have sufficient configurable signal conditioning blocks. In an example, the request is to generate and return a master device generated FPGA code.

The machine readable medium is not limited to the code blocks listed above, but may include code to perform other functions. For example, the code may send the signal conditioning information for the self-describing sensor module and device information to a less constrained device in response to a detection that the self-describing device is constrained. The code may transmit to the less constrained device a request to generate a return FPGA code to be implemented on the FPGA of the self-describing device. Alternatively, the processor may send the signal conditioning information for the self-describing sensor module and device information to a second constrained device in response to a detection that the self-describing device is constrained, wherein the second constrained device may access a less constrained device.

IoT networks may include a variety of device types. Some IoT devices may be powered by battery, other IoT devices may use power from an electrical grid. Further, some IoT devices are stationary, while other IoT devices are mobile. Accounting for mobile device behaviors and for devices that are frequently entering sleep states, may affect the way a network health monitor scales to account for large numbers of devices. As described herein, the generation of health reports, for example, using Bloom Filters, blockchains, DHTs, and the like, may be scaled to implement a network health monitor.

FIG. 212 is a schematic diagram of hierarchical device and network health reporting 21200 in accordance with some embodiments. As presently organized, network topologies may be hierarchical. The described techniques for network health reporting may build on the hierarchical topologies. For example, an IoT framework actor 21202 may wish to oversee a hierarchy of networks and devices. The IoT framework actor 21202 may include parties relying on the network, such as network administrators, networked consoles, and business service level agreement providers, among others.

A single device, such as Device-A, or many devices within a subnet may produce a device health report 21204. The device health report 21204 may include device health report data 21206 including a time variable that includes a value indicating the period of time the report covers, and a sparse array variable with a shadow-filter input. A shadow-filter may gather data when a report is expected, but is absent.

A monitoring agent may make a representational state transfer (REST) call 21208 from a subnet to retrieve device health reports for all devices within the subnet, such the device-A health report 21204 and others, aggregating them as a subnet health report 21210. As used herein, a REST call is a call that allows requesting systems to access and manipulate textual representations of web resources using a uniform and predefined set of stateless operations. In an example, a subnet health report 21210 may be one of many subnet health reports, such as subnet-A, subnet-B, and subnet-C health reports. Each subnet may monitor a number of devices. The subnet health report 21210 may include subnet health report data 21212. Subnet health report data 21210 may include a time period that the device reports are covering and a sparse array variable with the network-filtered shadow filter data, such as network-filter data, among other. The subnet health report data 21210 may include a listing of the collection of devices covered within the subnet, with links that may be used to access or address those devices.

A monitoring agent may make a representational state transfer (REST) call 21208 from a network to retrieve subnet health reports for all subnets within the network, such the subnet-A health report 21210 and others, aggregating them as a network health report 21214. The network health report 21214 may include network health report data 21216. Network health report data 21216 may include a time period that the subnet reports are covering and a sparse array variable with the network-filtered shadow filter data, such as the network-filter data. The network health report data 21216 may include a listing of the collection of subnets covered within the network with links that may be used to access or address those subnets.

Using this network topology and hierarchy, the health reports may be gathered by the IoT framework actor 21202 to monitor IoT network health. Monitoring the network health on a topology basis allows a high-level of information to be obtained and presented both broadly and narrowly as requested.

FIG. 213 is a schematic diagram of device level bloom filter and shadow filter health reporting 21300 in accordance with some embodiments. Like numbered items are as described with reference to FIG. 212. A device 21302 may provide a health message 21304 to the Device-A health report 21204. The health message 21304 may be scheduled to be repeated on a certain time period, such as once every second. The report may include health information. However, a simple ping indicating the health and function, or other similar alert of operations, may be adequate.

In an example, health reporting at the device level may rely on a watchdog agent. The watchdog agent may detect the lack of receipt of an expected health message 21304. Detecting the lack of receipt of an expected health message 21304 may generally be different from detecting a failure scenario and actively reporting the failure. In an example, the watchdog agent may use a bloom filter 21306 to acknowledge receipt of a watchdog message according to an expected schedule.

A bloom filter is generally a filter than may be constructed according to the expected schedule. For example, if the expected rate of watchdog messages is received within a period, e.g. seconds, a second bloom filter may be updated, such as through a rollover function indicated by the arrows in FIG. 42B, to indicate good health occurring over a longer period, for example, minutes, hours, days, weeks, and the like. Following this pattern, an upward cascade of bloom filters may store progressively longer periods of healthy operation. As disclosed herein, in accordance with some embodiments a report of the health of a device may be explored when there is an expected watchdog message that is not received within an expected window of time.

Each bloom filter 21306 is shown to cover a certain time period with a corresponding bit for each increment of that time interval. For example, the bloom filter for seconds codes to 60 bits allowing one bit for each second in a minute. The bloom filter for seconds may rollover to the bloom filter for minutes which codes to 60 bits allowing one bit for each minute in an hour. The bloom filter for minutes may rollover to the bloom filter for hours which codes to 24 bits allowing one bit for each hour in a day. This pattern may continue to increase as discussed above.

After the final time increment, a bloom filter may be applied to its corresponding bits, another bit called the sleep bit 21308 may indicate if the device has sent a message indicating that it is in sleep mode or powered down. In an example, if the sleep bit 21308 is set, the system may choose to avoid tracking system health information until the device is powered back on and the sleep bit 21308 is unset.

As shown in FIG. 213, the intermittent missing watchdog message may be detected and recorded for historical reporting by using bloom filters in concert with paired shadow filters 21310 that are generally updated only when there is a detection of an expected but absent health report. The shadow filters 21310 are shown as paired to the bloom filter of a similar time increment. The value of the shadow filter 21310 may be calculated by applying the AND logical function to the paired bloom filter and a corresponding rollover filter. In an example, the AND logical function returns a value of TRUE or 1 if the bloom filter shows no missing reports and the rollover filter shows no missing reports across the timespan recorded within that bloom filter. By contrast, the AND logical function may return a value of FALSE or 0 if the bloom filter shows a missing report across the timespan recorded or the rollover filter shows a missing report across the timespan recorded or both. This output value may be stored in the device shadow filter for further network health statistics gathering.

In an example, block chains could be used by the device, the subnetwork, and the network in listing and exchanging health reporting data. Block chains may generally refer to a distributed database that maintains a continuously-growing list of records called blocks. In an example, a block contains a timestamp and a link to a previous block thus forming a block chain. Block chain attestation is a broad concept that may be used in trusted boot mechanisms which use roots of trust for chaining and archiving. For example, a block chain attestation may attest not only to the block chain roots of trust on the local platform, but may also collect the measurements of participant 'miner' platforms. The first transaction that flows over the block chain may be an attestation of the individual platforms' roots-of-trust for chaining. By comparing the measurements of each of the miners' roots, the verifier may conclude that the block chain either is trustworthy and reliable for processing subsequent transactions.

The block chain may be accessed at a trusted platform module (TPM) as discussed above. In an example, the TPM may be compliant with the specification promulgated by the Trusted Computing Group as ISO/IEC 11889 in 2009. If a device is starting from a boot code segment, the block chain may first be used to establish a trusted execute environment (TEE) by creating a chain-of-trust from the initial booting. Instead of the TPM 13128, the TEE may be based on other technologies, such as EPID, SGX, or similar technologies.

As used herein, block chains of health information may reach vertically from the device layer, to the subnet layer, to the network layer in the overall topography. Similarly, block chains may reflect horizontal capture of multiple instances of devices health information based on the lack of receipt of a scheduled health message.

In one example, the bloom filters may be included in a block chain transaction to establish a historical record of network health at the lowest layer of the network topography. In an example, a lowest layer may refer to an endpoint such as a device. A lowest layer device may be referred to as a mining node because the mining node may gather the health information in the bloom filters before combining them with other lowest layer devices using a shadow filter.

In an example, if a router, concentrator, or gateway were considered a mining node then the router, concentrator, or gateway could be included in a block chain representation of an interlinked record of network health. Using a block chain for storing health information may allow other block chain miners to be informed of the health of the population of miners due to the interlinked nature of the mining nodes. Using this information, malicious and non-malicious failures may be predicted. In an example, failures of 50% or more mining nodes using a block chain may compromise the integrity of the block chain as a consensus may be unable to be formed.

FIG. 214 is a schematic diagram of network level bloom filter reporting of historical intermittent loss of watchdog reporting 21400. Like numbered figures are as described for FIG. 213. As shown, a device or set of devices 21402, may be paired to and provide data for shadow filters or a set of shadow filters 21404. In an example, each of the shadow filters in the set of shadow filters 21404 may correspond a single device or set of devices 21402 based on the reset rate and rollover time of the devices and paired shadow filters 21404.

As used herein, the set of shadow filters 21404 may not be related other than all devices belonging in a certain subnet, for example, subnet-A 21406, subset-B 21408, subset-C 21410, subset-D 21412, or subset-E 21414. Each of these subnets may include their own subnet shadow filter, for example, subnet-A 21406 may include shadow filter $F_A$, subset-B 21408 may include shadow filter $F_B$, subset-C 21410 may include shadow filter $F_C$ 21416, subset-D 21412 may include shadow filter $F_D$, and subset-E 21414 may include shadow filter $F_E$.

An exemplary subnet shadow filter is shown, shadow filter $F_C$ 21416 for subset-C 21410. As shown, the value to include in shadow filter $F_C$ 21416 may generated by applying the AND logical operation to multiple device shadow filters. As discussed above, the AND logical function may indicate TRUE or 1 across a number of sources if all of the sources are functioning and may read FALSE or 0 if even one of the source device shadow filters indicates a nonfunctioning device. Accordingly, the shadow filter $F_C$ 21416 may be used to capture intermittent shadow events for all the devices within subnet-C 21410 thereby showing health activity of the entire subnet at once. Similarly, the subnet shadow filters may have an AND logical function applied to the values generated and stored in each of the subnet shadow filters of the network. By this means, health reporting from each subnet shadow filter may inform the network shadow filter in a network health report 21214 to reflect the intermittent health of the network. From this information, a network health monitoring system may analyze data of the network shadow filter to observe a period where a network or several networks experience greater or lesser incidents of unexpected lapses in response from watchdog reports. In an example, a determination may be an indication that load, bandwidth, congestion or other processing conditions are exceeding physical capacities and these indications could bring attention to less safe operating conditions for an IoT network.

FIG. 215 shows a process flow diagram of an example method 21500 for use by an internet-of-things (IoT) device to report health using shadow and bloom filters in accordance with some embodiments. The method 21500 of FIG. 215 may be implemented by the IoT device 21600 described with respect to FIG. 216. The method 21500 may be run using the system 802 described with respect to FIG. 8. Process flow may begin at block 21502.

At block 21504, a health monitoring agent may be installed on IoT devices and network equipment in a network. At block 21506, the software of the health agent may be run upon the boot or reset of an IoT device or pieces of network equipment.

At block 21508, the health monitoring agent at the device or equipment level may report a watchdog event message, such as each time a health report is not received on a regular schedule, by updating the bloom filter corresponding to the reporting frequency. At block 21510, a determination is made as to whether the bloom filter has met a rollover condition. If not, process flow may return to block 21508 where additional watchdog reports may be sent. If the bloom filter has met a rollover condition, then at block 21512, the bloom filter may be updated by the rollover. The update of the bloom filter indicates that the device was healthy for the entire reporting period of the bloom filter.

At block 21514, a determination is made as to whether a reset threshold has been reached. If not, process flow may return to block 21508 where additional watchdog reports may be sent. If a reset threshold has been reached at block 21514, then at block 21516, the AND logical operation may be calculated for a bloom filter and rollover filter with the result being stored into a shadow filter. At block 21518, a determination is made as to whether or not the sleep bit is set. If so, at block 21520, the processing of bloom and shadow filters is suspended until a sleep time is expired and the sleep bit is unset. Process flow then returns to block 21518.

If the sleep bit is not determined to be set at block 21518, at block 21522, the process may wait until the system receives and processes a network health statistics collection request. Once the collection is processed, at block 21524 a subnet monitor may obtain the shadow filter of a device in the subnet. The results of this devices shadow filter may be applied to the subnetwork shadow filter. At block 21526, a determination is made as to whether or not there is another device shadow filter in the subnet to collect. If so, then process flow returns to block 21526, where the remaining device shadow filter is collected and applied to the subnet shadow filter.

If there is not another device shadow filter in the subnet to collect, at block 21528, a network monitor may obtain the subnet shadow filter from a subnet in the network. The results of this subnet shadow filter may be applied to the network shadow filter. At block 21530, a determination is made as to whether or not there is another subnet shadow filter in the network to collect. If so, process flow returns to block 21528, where the remaining subnet shadow filter is collected and applied to the network shadow filter. If there is not another subnet shadow filter in the network to collect, at block 21532, the network health shadow filter may be reported to subscribers. The process then ends at block 21534.

FIG. 216 is a block diagram of an example of components that may be present in an IoT device 21600 for reporting health of a network and network devices in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a subnetwork health data requestor 21602. In an example, the subnetwork health data requestor 21602 may request subnetwork health data from a subnetwork in response to a received network health request for a network. In an example, the subnetwork may request device health data from a device in response to receiving the subnetwork health data request. The subnetwork may also be instructed to generate subnetwork health data by modifying a subnetwork shadow filter using block chain data generated from received device health data.

The subnetwork may also be to request device health data from a number of devices in response to receiving the subnetwork health data request. Further, the subnetwork may be instructed to generate subnetwork health data by modifying the subnetwork shadow filter using a number of the received device health data through the use of a logical operator to compare the number of the received health data. In an example, the device may return device health data based on a device shadow filter, wherein the device shadow filter may be generated based on a device bloom filter that tracks an absence of scheduled health messages on the device. Other techniques to implement the device shadow filter may include DHTs, blockchains, and the like. The device shadow filter may include a number of shadow filters each corresponding to a time interval of a number of bloom filters.

The mass storage 808 may include a network shadow filter modifier 21604, to modify a network shadow filter based on received subnetwork health data generated from block chain data. The mass storage 808 may include a report provider 21606, to provide a report of network health based on the network shadow filter. In an example, the network shadow filter operates through the application of a logical operator.

In an example, a subnetwork health data requestor may request subnetwork health data from a number of subnetworks logically organized in the network, and a network shadow filter modifier to modify a network shadow filter based on a number of received subnetwork health data. In this example and others discussed above, the block chain data may be based on bloom filters that may be included in a block chain transaction to establish a historical record of network health at an endpoint of a network topography.

FIG. 217 is a block diagram of a non-transitory, machine readable medium 21700 including code to report health of a network and network devices in accordance with some embodiments. Like numbered items are as they are described with regards to FIG. 9.

The non-transitory, machine readable medium 21700 may include code 21702 to direct the processor 902 to request subnetwork health data from a subnetwork in response to a received network health request for a network. In an example, the subnetwork may request device health data from a device in response to receiving the subnetwork health data request. The subnetwork may also be instructed to generate subnetwork health data by modifying a subnetwork shadow filter using block chain data generated from received device health data. The subnetwork may also be to request device healthy data from a number of devices in response to receiving the subnetwork health data request. Further, the subnetwork may be instructed to generate subnetwork health data by modifying the subnetwork shadow filter using a number of the received device health data through the use of a logical operator to compare the number of the received health data. In an example, the device may return device health data based on a device shadow filter, wherein the device shadow filter may be generated based on a device bloom filter that tracks an absence of scheduled health messages on the device. The device shadow filter may include a number of shadow filters each corresponding to a time interval of a number of bloom filters.

In an example, the self-describing device may include at least one of a battery power source, an internet connection based on wireless technology, or a processor with a low power mode is considered a constrained self-describing device.

The non-transitory, machine readable medium 21100 may include code 21704 to modify a network shadow filter based on received subnetwork health data generated from block chain data. The non-transitory, machine readable medium 21100 may include code 21704 to provide a report of network health based on the network shadow filter. In an example, a subnetwork health data requestor may request subnetwork health data from a number of subnetworks logically organized in the network, and a network shadow filter modifier to modify a network shadow filter based on a number of received subnetwork health data. In this example and others discussed above, the block chain data may be based on bloom filters that may be included in a block chain transaction to establish a historical record of network health at an endpoint of a network topography.

IoT devices may use a low power wide area network (LPWAN) to perform control channel functions for a network of various connected devices and infrastructure. Other networks may be used to implement the techniques described, depending on power and communications availability for the IoT device, such as mobile networks, wired networks, and the like. A control channel LPWAN may be used in geolocation-based activation and deactivation of devices. A control channel LPWAN may also be used for network-wide service alerts and broadcasts. Security actions such as notifying devices that security keys need to be regenerated may also be performed using LPWAN. Further, LPWAN may be used in audit purposes such as performing infrastructure inventory or triggering location messages to be dispatched from the devices.

FIG. 218 is a schematic diagram of a wireless wide area network (WWAN) 21800 where a control channel 21802 may be used across each connection in accordance with some embodiments. In an example, the control channel may be run through low power wide area (LPWA) technologies.

The WWAN 21800 may include a number of technologies and network types that operate with each other. The WWAN 21800 may include a fiber backbone 21804 between core routers. The WWAN 21800 may also include a cellular network connection 21806. In an example, the cellular network connection 21806 may be a connection between a core router and a cellular transmitter node. The WWAN 21800 may also include a network connection to a wireless local area network (WLAN) 21808. The WWAN 21800 may also include a network connection to a mesh network 21810. In an example, the mesh network may include any kind of wireless personal area network (WPAN), such as an 802.15.4x mesh. The WWAN 21800 may also include a network connection between endpoints using short distance wireless communication networks 21812. In an example, the short distance wireless communication networks may be made using protocols including Bluetooth, Bluetooth low energy (BLE), Zigbee, and other similar connection protocols. The WWAN 21800 may also include using LPWA connections 21814 between devices.

As mentioned above, the WWAN 21800 may have communications managed between devices through a control channel 21802. As discussed above, the control channel may use any number of protocols, including LWPA protocols, such as LoRaWAN, among others. Using a control channel across a network using LWPA as described herein may enable geolocation features, other sensor features, and the like. The geolocation features shown here may operate through a method to encode global geolocation data points, as well as a method to produce zone IDs based on a grid approach. An example of a geolocation technique is one that produces zone identifiers for use with transactions and messages between network infrastructure components, where the zone identifiers may also be transformed back to human-readable latitude, longitude, and/or elevation data. To visualize and plot this information may involve the use of a zone identifier grid as shown below in FIG. 219.

FIG. 219 is a schematic diagram of a map 21900 of a physical area broken into zones in accordance with some embodiments. Like numbered items are as described in reference to FIG. 218.

The map 21900 shown includes lines of latitude 21902 and lines of longitude 21904. In an example, the grid squares formed by these lines may be used to indicate various zones, where each zone is given a zone ID. The map 21900 shows the zone encoding overlay of grid squares that indicate a breakdown of the physical area into zones each with its own zone ID. In an example, the zone identifier grid size may be configured via a parameter modification, such as a modification of the location metrics or zone marking units. As used in this context, parameter modification may not result in a change to the algorithmic flow of the method of geolocation being used.

By using a zone identifier approach to geolocation, zone sizes that range from thousands of square kilometers to a square meter, among other sizes, may be encoded and decoded. Using a zone identifier approach also allows calculating, encoding, and decoding zones IDs for physical areas of arbitrary sizes, where the zones are suitable for global use.

Incorporating these zones into a control channel 21802 may include the use of the zone identifiers (IDs) 21906. In some embodiments, a geolocation method for resource discovery may broadcast a message 21908 that includes the zone or zones pertaining to the control channel message 21910 and the control message 21912 itself. In an example, the message 21908 may include message header data prepended to other data the message contains, reflecting information about the message 21908, for example, regarding control channel message identification, number of zones, a time to live (TTL), if applicable, and the length of the data field. In an example, the message 21908 may include security features such as authorization, authentication, and message integrity data that may be appended to the frame. For use in a control channel, the message 21908 may be short, and thus, may use fewer resources resulting in relatively shorter transmission time and reduced power usage.

FIG. 220 shows a process flow diagram of an example method 22000 for use by an internet-of-things (IoT) device to report geolocation using time difference of arrival in accordance with some embodiments. The method 22000 of FIG. 220 may be implemented by the systems 22100 and 22300 described with respect to FIGS. 221 and 223. The method 21400 may be run using the system 802 described with respect to FIG. 8. Process flow may begin at block 22002.

At block 22002, a payload with a timestamp is received. The payload received may be a single payload or several payloads of data. At block 22004, the payloads may be sorted by device ID. In this way, the timestamp or timestamps of multiple devices may be compared. At block 22006, a determination may be made as to whether or not there are two or more timestamped payloads received for a device. If not, the process flow may return to block 22002, to await additional timestamped payloads. If there are two or more timestamped payloads received for a single device, the process flow proceeds to block 22008.

At block 22008, the time difference between the two timestamps for the same device may be calculated. At block 22010, the time difference may be an input to a function for location calculation. In an example, the function may be used to obtain the estimated distances and subsequently in terms of x and y coordinates from the coordinates of the device that initially provided the payload. One example of a function that may be used at block 22010 may be a hyperbolic function described in more detail below. The output of the function may be coordinates that may be used to locate a device on a map in physical space.

At block 22012, the output of the function calculation may be converted to global coordinates from local coordinates. A conversion may not be needed if the global coordinates are sufficient for use. At block 22014, the node location may be estimated with the coordinates generated. This process may be repeated as many times as desired in order to identify a location of a device, or as often as the device requests a location be identified for it through messages in a network.

Using a hyperbolic calculation in the process discussed above may increase in accuracy as the number or receiving gateways increases. For example, a standard common-network geolocation approach may be improved with the presently disclosed collaborative network that may include additional homogeneous or heterogeneous network nodes.

FIG. 221 is a schematic diagram of a network 22000 for determining a time difference based on time of arrival information in a heterogeneous network using, in part, zone ID in accordance with some embodiments. Geolocation generally may be an important differentiator for industrial, smart city, retail, and security-based IoT, and future internet applications and services. Calculating and storing a geolocation may occur in a network server 22102. The process of obtaining geolocation information as a product of the communications link and network path properties may be expanded using techniques described herein. The time difference of arrival (TDOA) of network packets that use a common time-synchronized reference point may aid in identifying a geolocation. One example of a time-synchronized reference point is a global positioning device (GPS) or other satellite time reference.

A transmitting node 22104 may transmit data or a payload to a receiving gateway 22106. Based on the timestamps attached to the payload upon departure and the timestamp received upon arrival, a time of flight (TOF) 22108 may be calculated. In an example, a receiver gateway 22104 may include a location sensor like a GPS 22110. The GPS allows not only a TOF to be calculated but may provide a reference distance for use by the transmitting node 22104. As the number of gateways measuring a TOF and starting distance increases, additional data gathering may be made about the TOF and the reference locations, and accordingly the location of the transmitting node 22104 may be made more accurate. To increase the number of location sensing nodes present in a network, gateways 22106 may be connected to collaborating sensor nodes 22112, which may contain a sensor, for example a GPS 22110.

A collaborating sensor node 22112 may be connected to a gateway 22106 through wireless protocols and/or wired methods. When the transmitting node 22104 is assessing its location using a wireless network, the transmitting node 22104 may transmit a timestamped payload to be received at a gateway 22110 or collaborating sensor node 22112 that has a time of delay (TOD) 22114 related to the length of the path traveled by the payload.

The receiving gateway may be time-synchronized using a common clock. The use of a collaborating sensor node 22112 is an extension of a homogeneous network employing TDOA calculation at a centralized processing point as these additional nodes may be a part of a different network and use a different protocol than the network from the server 22102 to the gateways 22106. The sensor nodes 22112 may sense, observe, and receive the packet of interest and report the timestamped detection information to a gateway node 22110 within range. Using additional nodes, even if out of network, increases the number of packet observers. In a location approximation system that uses a hyperbolic projection for assessing location, the increased number of packet observers may also increase the number of hyperbolic loci local present for gateways 22110 used for the location calculation process.

In an example, the method shown in FIG. 220 may be implemented on the network schematic shown in FIG. 221. For example, with reference to the pictured nodes, the time of arrival (TOA) may be calculated from the transmitting node 22104 to gateway using the following equation:

$$TOA_i = T_{tx} + TOF_i,$$

$$0 \leq i \leq N$$

In the above equations, T refers to time of transmission from the tx or transmitting node 22104. The term N denotes the number of receiving gateways indexed by the transmitting node 22104 ($i$), and where $l_i$ is the line of sight path distance between the transmitting node 22104 and the receiving gateway 22106. In an example, 22104 may be as shown in FIG. 221. The TOA in the equations above and below reflects the time of arrival and TOF is the time of flight, where $T_{tx}$ is the time of transmission. The change in time of arrival may be calculated using the following equations:

$$\Delta TOA_{ij} = TOA_i - TOA_j = TOF_i - TOF_j$$

$$\Delta TOA_{ij} = \frac{l_i}{v} - \frac{l_j}{v} = \frac{1}{v}(l_i - l_j)$$

In in the equation above, v is the speed of light or sound in air or water, where the choice of medium may depend on where the transmission occurs. In one example, the medium may be air with clear sight links between nodes.

When gathering signals and data, the data may be processed using a hyperbolic function approach, for which the estimated distances, l, and subsequently in terms of x and y coordinates from the receiving gateways may be used. In an example, these values may be used as follows:

$$l_i - l_j = \delta_{ij} = v\Delta TOA_{ij},$$

where each $\delta_{ij}$ corresponds to positions (x, y) along a hyperbola as shown in the equation below:

$$l_i = l_j = \delta_{ij} \Rightarrow l_i^2 l_j^2 + \delta_{ij}^2 + 2l_j\delta_{ij}$$

$$l_i^2 = (x - x_i)^2 - (y - y_i)^2$$

$$l = \sqrt{(x - x_i)^2 - (y - y_i)^2}$$

The hyperbolic function may be translated from local coordinates (x, y) to global coordinates (X,Y) using the following equations:

$$\begin{pmatrix} X \\ Y \end{pmatrix} = \begin{pmatrix} X_0 \\ Y_0 \end{pmatrix} + \begin{bmatrix} \cos(a) & -\sin(a) \\ \sin(a) & \cos(a) \end{bmatrix} \begin{pmatrix} x \\ y \end{pmatrix},$$

$$a = artcan\left(\frac{y_i - y_j}{x_i - x_j}\right)$$

The network transit time, $T_{transit}$ 22116 shows the time to convey information from a collaborative sensor node 22112 to the receiving gateway 22110. In the equations below, the time at which the collaborative sensor node detects the packet is shown as $TOD_i$ for the $i^{th}$ collaborative node. With this information, $TOD_i$ may be calculated as follows:

$$TOD_i = T_{tx} + TOF_i$$

$$\delta TOA_i = TOD_i - TOA_i - T_{transit}$$

In a network with nonhomogeneous protocols, devices, and geographic locations, there may be variability in transit times used in these calculations. These differences may be calibrated by the server 22102 sending periodic timestamped sounding packets to the gateways 22110, with the measured time of transit to be subtracted from a calculation of $\delta TOA_i$. This subtraction may be aid in canceling out increased delay due to the time taken for a packet to transit from the collaborating node to the receiving gateway 22110.

FIG. 222 is a schematic diagram of an example control channel frame structure 22200 packed in an example low power wide area network frame (LPWAN) in accordance with some embodiments. As an example, the LPWAN network may be a long range wide area network (LoRaWAN) frame and platform, although other platforms are contemplated and this frame is shown as an example of using the control channel frame structure 22200.

The example control channel frame structure 22200 may include a message header 22202 of length X bytes, a zone ID field 22204 that may include 1 to M bytes, a data field 22206 that may include 1 to N bytes, and a security/message integrity check (MIC) field 22208 of length Y bytes. For example, the zone ID field 22204 may include two to four bytes, the data field may include eight to 256 bytes, and the integrity check field may include two to four bytes. Any number of lengths may be used depending on the protocol and data.

The control channel commands transmitted through this frame are examples of operations for a wide area or zone-specific control of remotely deployed infrastructure in Table 4. As a note, the command set depicted in Table 4 is an example, as the command set is expandable and may be later modified to accommodate a specific application.

TABLE 4

| Control Channel Commands | |
|---|---|
| Command | Description |
| 0XA | Activate |
| 0XBx | Sleep for x hours/min where x ranges from 1 to F |
| 0XD | Generate new security key |
| 0XFA | Dispatch |
| 0XCA | Reboot |
| 0x2 | Dispatch location message |
| 0x3 | Send observation message |
| 0x4 | Route update (waypoints to follow for mobile sites) |
| 0x5 | Avoid sectors (waypoints to avoid for mobile nodes) |

The commands may be passed through the command channel frame 22200 through LPWA technology using LoRaWAN. In one example of frame delivery, the LoRaWAN outer frame encapsulation includes a frame header (FHDR) 22210, Frame port field (FPort) 22212, and a frame payload field (FRMPayload) 22212. The control channel message 22200 may be encapsulated within the FRMPayload field 22214. This packing approach means that LoRaWAN compatibility may not necessarily be affected since the control channel data may be treated as application-specific information. The control channel data may also be packed into the application payload frame fields for technologies including, and not limited to DOCSIS, WEIGHTLESS, ZWave, Ethernet, WLAN, Bluetooth, AX.25, Zigbee, IEEE 802.15.4, IEEE 802.16, and TIA/EIA-485.

In an example, an out-of-band control channel system may be used for control of fixed, portable, mobile, airborne, space, in-body, subterranean, and water-borne/underwater devices. Examples include street furniture, advertisement hoardings, vehicles such as cars, trucks, unmanned aerial vehicle, autonomous underwater vehicles, and the like. Geographic calculations may be particularly helpful in enforcement of no-fly zones, waypoint updates, and other navigational tools. Other out-of-band control channel systems that may be used to control of devices including sub-sea pipeline inspection rovers, smart pig monitoring systems used for oil line inspection and de-waxing, satellite systems, such as cubesats, environmental control and security systems, medical diagnostic probes, industrial production facility control systems including systems that require remote monitoring and actuation, and the like.

FIG. 223 is a block diagram of an example of components that may be present in an IoT device 22300 for discovery of resources and geolocation sector identification in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC).

The mass storage 808 may include a control channel data inserter 22402, to insert control channel data into a wide area network frame. The wide area network frame may include an application payload frame field to encapsulate the control channel data prior to and during transmission. The control channel data may include instructions for the first device to collect a payload from a transmitting node, extract a timestamp from the payload, and return payloads that include a timestamp and a zone ID. The control channel data may include a message header, a zone ID field, control message data field, and a security field. In an example, the control channel data may include instructions for the first device to return its zone ID and a number of timestamps from a transmitting node. The control channel data may also include instructions for the second device to return to the first device its zone ID and a timestamp from a transmitting node, the second device in accordance with some embodiments to have no communication path to a server device except by passing through the first device.

The mass storage 808 may include a frame transmitter 22404, to transmit the wide area network frame to a first device with a first transmission protocol, for example, using the mesh transceiver 810, and a second device with a second protocol, for example, using the uplink transceiver 814. The control channel data may gain access to both the first device and first device protocol and second device and second device protocol. The frame transmitter 22404 may transmit the wide area network frame to the second device through instructions to the first device to act as an intermediate transmitter and to resend to the second device.

The mass storage 808 may include a data modifier 22406, to modify a transmitting node data in response to the first device returning a detected transmission from a transmitting node. The modification of the transmitting node data may be based on extracting a zone ID and a timestamp returning a detected transmission from a transmitting node.

In an example, the apparatus may also include a calculator to calculate a location of the transmitting node using a hyperbolic function and a number of timestamps of packages received by the first device and the second device as well as the zone ID of the first device and the second device. The apparatus may include a calculator to calculate a location of the transmitting device based on transmission transit time between a signal detecting device and a signal receiving device.

FIG. 224 is a block diagram of a non-transitory, machine readable medium 22400 including code to report health of a network and network devices in accordance with some embodiments. Like numbered items are as they are described with regards to FIG. 9.

The non-transitory, machine readable medium 22400 may include code 22402 to direct the processor 902 to insert control channel data into a wide area network frame. The wide area network frame may include an application payload frame field to encapsulate the control channel data prior to and during transmission. The control channel data may include instructions for the first device to collect a payload from a transmitting node, extract a timestamp from the payload, and return payloads that include a timestamp and a zone ID. The control channel data may include a message header, a zone ID field, control message data field, and a security field. In an example, the control channel data may include instructions for the first device to return its zone ID and a number of timestamps from a transmitting node. The control channel data may also include instructions for the second device to return to the first device its zone ID and a timestamp from a transmitting node, the second device to have no communication path to a server device except by passing through the first device.

The non-transitory, machine readable medium 22400 may include code 22404 to direct the processor 902 to transmit the wide area network frame to a first device with a first transmission protocol and a second device with a second protocol, the control channel data to gain access to both the first device and first device protocol and second device and second device protocol. The frame transmitter may transmit the wide area network frame to the second device through instructions to the first device to act as an intermediate transmitter and to resend to the second device.

The non-transitory, machine readable medium 22400 may include code 22404 to direct the processor 902 to modify a transmitting node data in response to the first device returning a detected transmission from a transmitting node. The modification of the transmitting node data may be based on extracting a zone ID and a timestamp returning a detected transmission from a transmitting node.

In an example, the machine readable medium may also include a calculator to calculate a location of the transmitting node using a hyperbolic function and a number of timestamps of packages received by the first device and the second device as well as the zone ID of the first device and the second device. The machine readable medium may include a calculator to calculate a location of the transmitting device based on transmission transit time between a signal detecting device and a signal receiving device.

The IoT devices and networks described herein may generate a vast amount of data that may be mined to identify trends, solve problems, and the like. However, data analytics may be interpreted differently by practitioners and researchers. Based on the wide variety of data analytical techniques, it may be difficult to generalize about the technical challenges of data analytics in the context of IoT. One challenge for IoT technology is having a framework that enables IoT practitioners and researchers to more easily deploy analytics across their IoT platform.

An architectural framework for analytics is described herein that draws on influences from visual analytics, design science and knowledge engineering. The model, shown in FIG. 226, includes tasks involved in performing analytics in general, including edge-based analytics. By offering a unified view of data analytics, this architectural framework acts as a reference for data analysis practitioners and researchers, allowing greater collaboration between these agents. The architectural framework may aid in highlighting technical challenges that affect data analysis. The architectural framework may also be used to allow description of inventions related to research vectors.

Data analytics may be divided broadly into online based, such as edge-based analytics, and offline analytics. The differing types of analytics may be used to distinguish between generating knowledge from representative data while offline, and deploying this knowledge to an online system such as on an IoT platform. The offline analytics section broadly corresponds to edge-based analytics. Further, in an example, the hierarchical structure of the offline analytics may correspond to an inference hierarchy, where more knowledge is inferred, or greater context is learned, as the data moves through the various analytics tasks. The hierarchical structure of the offline analytics may culminate in a decision or action, which may be used to control an actuator. This hierarchical analytics model offers a staged framework in which complex analytics tasks may be decomposed into classes of subtasks such as feature extraction, classification and decision algorithm. In addition, when subtasks are distributable, classification by the offline analytics framework may act as a general guide for the placement of workloads across an IoT platform. In an example, hardware platforms may be classified into groups of platforms of similar hardware resources, such as sensor nodes and gateways. In cases where platforms may be classified intro groups of similar hardware resources, a class of analytics tasks may be deployed to a particular class of hardware platforms by matching workload characteristics with platform characteristics subject to analytics requirements.

FIG. 225 is a schematic diagram of a conceptual model 22500 of data analytics in accordance with some embodiments. In an example, the conceptual model 22500 includes data mining 22502 and data fusion 22504. The conceptual model 22500 may represent a data structure in a storage of one or more network systems. For example, the data mining 22502 may take place on a data aggregator in an IoT network or fog device, while the data fusion 22504 may be performed on a data collection system.

The data mining 22502 may be seen as generating knowledge in a batch or offline fashion. The data fusion 22504 may be viewed as applying the knowledge in an online fashion. The conceptual model 22500 describes data mining 22502 by combining in a combined model 22506 the visual analytics paradigm, which places the interaction of the data analyst with the data via data visualization techniques 22508 as a central activity. The design science research paradigm in data mining 22502 models knowledge creation as an iterative process of model-evaluate cycles through a design, and builds an analytics model 22510 that uses existing knowledge from a knowledge base 22512, and business needs from an application domain 22514. The incoming data from the data fusion 22504 environment may be received for data mining 22502 by a data warehouse 22516. The data may then be cleaned, transformed, and loaded 22518 to the combined model 22506 for use in the cycles between the design and build analytics model 22510 and the visualization and evaluation model 22508.

The data fusion model 22504 may receive data from the conceptual model 22500 and apply it to workload and resource management 22520. From the workload and resource management model, data may be sent to a signal fusion model 22522 and a signal refinement model 22524.

Within the signal refinement model 22524, the signal may be processed with signal processing 22526, by taking the data received and comparing and exchanging this data with data sensed with a sensor actuator 22528. While only one sensor actuator 22528 and signal processor 22526 are shown, multiple pairings may exist. Further, any data actuated by a signal actuator may be returned to the data warehouse 22516 for data mining 22502. Data from the workload and resource manager 22520 may also be sent to a feature extraction or object refinement model 22530, which may receive the data as well as additional data from signal refinement 22524. Data from the workload and resource manager 22520 may also be sent to a detect, classify, or predict event or scenario model 22532, which may receive the data as well as additional data from the feature extraction or object refinement model 22530. Data from the workload and resource manager 22520 may be sent to act on decision model 22534, which may receive the data as well as additional data from the detect, classify, or predict event or scenario model 22532. Based on the decision, an action may be sent from the act on decision model 22534 to the signal refinement model 22526. Based on the decision, an action may be sent from the act on decision model 22534 to the visualization and management module 22536.

FIG. 226 shows a process flow diagram of an example method 22600 for use by an internet-of-things (IoT) device to provide data analytics of IoT systems in accordance with some embodiments. The method 22600 of FIG. 226 may be implemented by the IoT device 22700 described with respect to FIG. 227. The method 22600 may be run using the system 802 described with respect to FIG. 8. Process flow may begin at block 22602. The starting of this process may be triggered by a request by a client device, an application, or third party assessing the data analytics of a target system.

At block 22604, representative data may be obtained from deployment environment, such as distributed sensors in a factory monitoring setting. This data may be obtained by physically connecting to a device and pulling data over UART or other interfaces in a comma separated value (CSV) file format. Other formats may be used, such as Extensible Markup Language (XML), or proprietary formats, such as Microsoft Excel, among others.

At block 22606, data may be inserted in the various CSV files into a query-able data such as Structured Query Language (SQL), or other data structures. The data may be entered according to a standard time series schema, where a sensor may have its own column in the table, and each row may have a unique time-stamp.

At block 22608, the database may be scanned to identify bad data such as data with duplicated time-stamps, or missing data. This may be performed by a user, or may be performed using automated tools that search for duplicate values and other faults, or both. This duplicated data may be removed. At block 22610, an analytics environment may be chosen in which the data analytics may be performed. This could, for example, be R-based data tool, python-based data tool, and other big data tools. At block 22612, data may be loaded into an environment for analytics. At block 22614, data may be visualized, within the environment for analytics, to understand the overall structure of the data such that a model may be hypothesized. The structure includes the temporal relationships between the samples, and the relationship between samples from different sensors. Various mathematical tools such as cross/auto correlation may be used to understand the relationships between the data.

At block 22616, a model may be proposed that captures the data or extracts the useful data from the data in the case of a classification problem. At block 22618, the success of the proposed model may be evaluated to attain applications objectives. For instance, if the model is a classifier, the performance of the model may be assessed in terms of the number of false positives, true positives, and false negatives.

If, at block 22620, performance does not meet applications objectives process flow may return to block 22614 for data to be visualized and examined again. If, however, at block 22620, it is determined that the measure of the models success is above user specified threshold, which may be set by the application objectives, process flow may proceed to block 22622.

At block 22622, the model may be analyzed to compute a workload. The computation of the workload may include profiling the compute, memory and network and energy requirements of the workloads. At block 22624, the means of decomposing the workload may be identified. In an example, the means for decomposing the workload may be through parallelism or modular serially dependent tasks. Another example of decomposition of a workload could be for a classification task, where the pre-processing, feature extraction, and classification task may be separated. A perform workload characterization of the sub-workloads could be performed using, at least in part, the metrics as above.

At block 22626, the available devices may be enumerated in the distributed network and the available devices may obtain characteristics. In an example, the enumeration and obtaining of characteristics may include running a suite of benchmarks on each device and measuring memory, computing, networking, and energy capacity. A workload may include sub workloads on devices that have a close agreement with the devices. The level of agreement may be obtained by sorting the workloads in terms of resources required and sorting the devices in terms of resources available and then pairing the workloads and devices depending on their ranking on this list.

At block 22628, the workloads may be placed on the devices using an appropriate protocol, such as secure copy (SCP). At block 22630, the performance of the systems may be continually monitored in terms of resource usage and application objectives. At block, 22632, the process may end or restart.

FIG. 227 is a block diagram of an example of components that may be present in an IoT device 22700 to provide data analytics of IoT systems in accordance with some embodiments. Like numbered items are as described in FIG. 8.

As also shown above, with reference to FIG. 8, the mass storage 808 may include a number of modules to implement the group creation functions described herein. Although shown as code blocks in the mass storage 808, it may be understood that any of the modules may be fully or partially replaced with hardwired circuits, for example, built into an application specific integrated circuit (ASIC). The mass storage 808 may include a data loader 22702, to load data into a selected interactive analytics environment. In an example, the data may be loaded based on a representative data set from an environment, the interactive analytics environment to be at least one of a data mining environment and a data fusion environment. The data may be cleaned and organized prior to loading into a selected interactive analytics environment. The interactive analytics may indicate a temporal relationship between a first data sample and a second data sample. Further, the interactive analytics may indicate a relationship between a first sample and a first sensor and the second data sample and a second sensor. The workload may include a profile of the computing requirements, memory requirements, and network requirements of the workload. In an example, the workload may include a number of sub-workloads on the device, the workload including an agreement with the devices obtained by sorting the workloads in terms of a resource required and a resource available and pairing a workload to a device based on the resource required and the resource available.

The mass storage 808 may include a fit determiner 22704, to determine if a proposed model fits data, the proposed model to comprise a workload of decomposable portions for processing on a number of devices. The workload is decomposed through at least one of parallelism and a modular serially dependent task. The workload may also be decomposed for a classification task, where the pre-processing, feature extraction, and classification task may be separated. In an example, the IoT device may include a processor to decompose the workload prior to mapping the workload to the device for execution by the device. In an example, the processor may also compute the performance of a platform in terms of resources used subsequent to the mapping and an execution of the workload on the device.

In an example, the mass storage 808 may include a workload mapper 22706, to map the workload to a device for execution by the device. In an example, the data mining environment incorporates data from an application domain and from a stored knowledge base corresponding to the representative data set from an environment.

FIG. 228 is a block diagram of a non-transitory, machine readable medium 22800 including code to report health of a network and network devices in accordance with some embodiments. Like numbered items are as they are described with regards to FIG. 9.

The non-transitory, machine readable medium 22400 may include code 22802 to direct the processor 902 to load data into a selected interactive analytics environment. In an example, the data may be loaded based on a representative data set from an environment, the interactive analytics environment to be at least one of a data mining environment and a data fusion environment. The data may be cleaned and organized prior to loading into a selected interactive analytics environment. The interactive analytics indicates a temporal relationship between a first data sample and a second data sample, the interactive analytics further indicate a relationship between a first sample and a first sensor and the second data sample a second sensor. The workload may include a profile of the computing requirements, memory requirements, and network requirements of the workload. In an example, the workload may include a number of sub-workloads on the device, the workload including an agreement with the devices obtained by sorting the workloads in terms of a resource required a resource available and pairing a workload to a device based on the resource required and the resource available.

The non-transitory, machine readable medium 22800 may include code 22804 to direct the processor 902 to determine if a proposed model fits data, the proposed model to comprise a workload of decomposable portions for processing on a number of devices. The workload may be decomposed through at least one of parallelism and a modular serially dependent task. The workload may also be decomposed for a classification task, where the pre-processing, feature extraction, and classification task may be separated. In an example, the IoT device may include a processor to decompose the workload prior to mapping the workload to the device for execution by the device. In an example, the processor may also compute the performance of a platform in terms of resources used subsequent to the mapping and an execution of the workload on the device.

The non-transitory, machine readable medium 22800 may include code 22706 to direct the processor 902 to map the workload to a device for execution by the device. In an example, the data mining environment incorporates data from an application domain and from a stored knowledge base corresponding to the representative data set from an environment.

In addition to using active data collection and modeling within an IoT network, IoT devices may be passive producers of data that is remotely processed and consumed by other systems, devices, or users. In some frameworks, data flows through a network to be stored and processed remotely either in the fog or the cloud. Based on the application, the processed information may be delivered to IoT device or devices in geographical proximity to the IoT nodes that generated the data.

In the present disclosure, an in-network processing paradigm may leverage an IoT network to act as an integrated computation and communication system. One method enables an IoT network to function as a parallel processor by collaboratively processing data as the data is transmitted through the network. Processing data in a parallel fashion may reduce or remove a dependency on further processing at the destination IoT device.

Providing proximity-based parallel processing in an IoT network allows data generated in a network to remain local to that network. Proximity-based parallel processing may also reduce or eliminate processes that forward data to external systems and networks, thereby reducing inherent potential security and privacy flaws in external data exposure. Proximity-based parallel processing may reduce latency present in an IoT system and may preserve the locality of the generated information. The reduction in latency for the calculations, and the preservation of the locality, may aid in automatic or semi-automatic control applications in which the consumers of the processed information are likely to be located in proximity to the sensing devices.

In one example of parallel processing in an IoT network, artificial neural networks (ANNs) may be used as the generic parallel processor implemented by an IoT network. ANNs may approximate any measurable function. In an example, a computation that is performed by a feed forward neural network may be partitioned into different tasks to be executed concurrently. The processing may exploit distributed processing, preserved locality, reduced latency, and similar characteristics to process the data while optimizing the use of resources in the network. The different computing tasks may be distributed into multiple IoT nodes taking into account the resources available at each node, the connectivity of the IoT network, producers and consumers of information in the network.

In an example, compute tasks may be decomposed for deployment across a fog resource that applies a computational practice of separating a computational task into pieces suitable for deployment upon a number of platforms within a network. In one example, the deployment and computation approach may be based on deployment across a fog resulting in utilization of another communications network as a tool for exchanging data between compute platforms. In this example, the computation and communications are considered as separate processes. Accordingly, deployment of distributed computing in this example system is undertaken without consideration of network topology or operation to support computation. The presently disclosed techniques jointly considers communication and computation in accordance with some embodiments.

FIG. 229 shows a process flow diagram of an example method 22900 for use by an internet-of-things (IoT) device in distributed neural network mapping and resource management in accordance with some embodiments. The method 22900 of FIG. 229 may be implemented by the IoT device 23100 described with respect to FIG. 231. The method 22900 may be run using the system 802 described with respect to FIG. 8. Process flow may begin at block 22002.

At block 22902, an IoT device may obtain a network topology map and listing by identifying connected nodes and physical network characteristics. Physical network characteristics may include exact location or relative position to each other. Physical network characteristics may also include inter-node distances, clustering, dispersal information, received signal strengths, and signal to noise ratios. The obtaining of a network topology by the IoT device may additionally provide an abstraction of the IoT network topology for further use by the neural net mapping system. This may include determining the proximity of the devices to each other and the current power levels of the devices. As part of the abstraction, signal measurements may be retrieved from IoT devices. An example of signal measurements may include received signal strength indicator (RSSI) and broadcasting power. Once a topology is obtained, the IoT device may model expected path loss and interference in the network between devices. The results of the abstraction may be stored in an IoT database 22904.

At block 22906, the method may include abstracting the IoT node resources. These resources may include power levels, available storage space, current processing loads, networking capabilities, uptime, and node reliability information. In an example, networking capabilities may include interface types, latency, and data capacity. In an example, the IoT resources that are abstracted may be exposed via an application programming interface (API) wrapper function or representational state calls. Abstracting the IoT node resources may include software abstraction of a residual memory, power, and storage. Another subtask may include having the API wrapper function for the system resource info. Once abstracted, the IoT device may retrieve resource information it may access.

At block 22908, a neural network topology may be determined by executing subtasks, such as determining the location of input nodes with source data for processing, hidden nodes for intermediate neural net processing, and output nodes using sink data. As discussed with respect to other steps in this method, data may be stored either locally or remotely in the database 22904 or equivalent storage medium. Abstracting a neural network topology may, for example, include identifying a location using Euclidian distance using signal triangulation, or direct global positioning system (GPS) position reporting, among others.

At block 22910, the method performs a mapping optimization. The mapping optimization may include selecting and refining a multi-variate objective function with the objective of optimal assignment of node tasks based on current and historical network and node characteristics. The objective function may, for example, favor cost, reliability, processing speed and result production time, or geographical area spread. Another subtask of block 22910 may include formulating an integer linear program, objective function selection, refining constraints, and model development.

At block 22912, the method may include overlaying the neural network topology on the network. This may include mapping roles and tasks obtained from the optimization stage to physical nodes in the network. Tasks for a node are created, prepared, and dispatched to the physical nodes or devices. One subtask of block 22912 may include confirming successful deployment of the roles and tasks of from the optimization stage. Following the successful dispatch of tasks and roles, the system may commence an updated network and node mapping exercise in preparation for subsequent workload assignment requests. Process flow may then end, and may also start again as needed to abstract the IoT into a series of tasks that are distributable along nodes of communication and processing as discussed in the language above.

FIG. 230 is a schematic diagram for a distributed neural network mapping 23000 for resource management in accordance with some embodiments. A legend of symbols is provided in block 23002 that identifies the input nodes, output nodes, and hidden nodes in the example IoT network topologies shown.

In the input IoT network topology 23004, three input layer nodes, four hidden layer nodes, and two output layer nodes are shown scattered in the mesh of the IoT connections. In an example, each dot of the IoT topology represents a node. Nodes may be as described above and throughout this application, and may represent an IoT device, server, or other inter-connectable tool of communication and processing. In an example, the input IoT network topology may represent a visualization of nodes connections prior to optimization of mapping a neural network into a physical IoT network. Each of the pictured nodes, or devices, may act as one or more neurons and connections are realized via wireless links.

A mapping framework 23006 may represent attempting mapping between nodes to minimize transmission power and the transmission time for transmission of information from the input nodes to the output nodes. The mapping may take into account the resources available on each device, capabilities of each device, and the connectivity of IoT network. The node connection shown in the mesh of the IoT visualized node networks may each represent a weight and a time of transfer of information across a particular node.

The mapping framework 23006 may yield a mapping that shows data paths for an output IoT network topology 23008. The output IoT network topology may include an identification of physical nodes on to which to map neurons. The mapping may be achieved by formulating an optimization model that uses all the inputs associated with the underlay IoT network and the overlay neural network. Inputs to the optimization model may include the IoT topology and the resources available at each node, the neural network topology that is to be mapped on the IoT topology, the set of source nodes, and the set of output nodes. For the purposes of IoT network topology, the resources at each node may, for example, refer to memory resources, power resources, sensor resources, or storage resources, among others. Similarly, a neural network topology may be mapped on an IoT topology, including the number of layers and hidden neurons as shown at least in FIG. 230.

FIG. 231 is a block diagram of an example of components that may be present in an IoT device 23100 for distributed neural network mapping and resource management in accordance with some embodiments. Like numbered items are as described in FIG. 8.

In an example, the mass storage 808 may include a number of modules to implement the mapping framework described herein. Although shown as code blocks in the mass storage 808, it may be understood that any of the modules may be fully or partially replaced with hardwired circuits, for example, built into an application specific integrated circuit (ASIC). The mass storage 808 may include an IoT network topology identifier 23102, to identify an IoT network topology showing the connections between a number of IoT nodes in an IoT network. The IoT network topology shows node characteristics including, for example, at least one of inter-node distances, clustering, dispersal information, received signal strengths, and signal to noise ratios. Identifying the IoT network topology may include determining the proximity of the number of nodes to each other, the current power levels of the number of nodes, and a signal measurement for the number of nodes. In an example, retrieving the signal measurement of the number of nodes may be through retrieval of at least a received signal strength indicator or broadcasting power.

The mass storage 808 may include an IoT node resource identifier 23104, to identify IoT node resources for each IoT node identified in the IoT network topology. The IoT node resources may comprise at least one of a power level, an available storage space, a current processing load, networking capabilities, uptime, or node reliability information.

The mass storage 808 may include a neural network topology identifier 23106, to identify a neural network topology of node distances and node locations. The neural network may be an artificial neural network.

The mass storage 808 may include a mapping optimizer 23108, to optimize a mapping based on the IoT node resources, the node distances, and the node locations. The optimized mapping preserves a location of processing the decomposable task across the IoT network by using the node locations of the number of nodes to identify a node or the number of nodes located in a same physical location. The optimizing of the mapping includes determining a transmission time for transmission of information from the input nodes to the output nodes.

The mass storage 808 may include a decomposable task processor 23110, to process a decomposable task in the number of IoT nodes based on an overlay of the neural network topology on the IoT network. The processing of a decomposable task in the number of IoT nodes includes dispatching portions of the decomposable task to the number of IoT nodes based on if the IoT nodes have identified as being located in a physical location on a same network. The overlay of the neural network topology may include three layers, for example, including an input layer, a hidden layer, and an output layer.

FIG. 232 is a block diagram of a non-transitory, machine readable medium 23200 including code to report health of a network and network devices in accordance with some embodiments. Like numbered items are as they are described with regards to FIG. 9.

The non-transitory, machine readable medium 23200 may include code 23202 to direct the processor 902 to identify an IoT network topology showing the connections between a number of IoT nodes in an IoT network. The IoT network topology may, for example, show node characteristics including at least one of inter-node distances, clustering, dispersal information, received signal strengths, and signal to noise ratios. Identifying the IoT network topology may include determining the proximity of the number of nodes to each other, the current power levels of the number of nodes, and a signal measurement for the number of nodes. In an example, retrieving the signal measurement of the number of nodes may be through retrieval of at least a received signal strength indicator or broadcasting power.

The non-transitory, machine readable medium 23200 may include code 23204 to direct the processor 902 to identify IoT node resources of each IoT node identified in the IoT network topology. The IoT node resources comprise at least one of a power level, an available storage space, a current processing load, networking capabilities, uptime, or node reliability information.

The non-transitory, machine readable medium 23200 may include code 23206 to direct the processor 902 to identify a neural network topology of node distances and node locations. The neural network may be an artificial neural network.

The non-transitory, machine readable medium 23200 may include code 23208 to direct the processor 902 to optimize a mapping based on the IoT node resources, the node distances, and the node locations. The optimized mapping preserves a location of processing the decomposable task across the IoT network by using the node locations of the number of nodes to identify a node or the number of nodes located in a same physical location, for example, in a region of a city, such as an intersection, a building, a room in a building, and the like. The optimizing a mapping includes a transmission time for transmission of information from the input nodes to the output nodes.

The non-transitory, machine readable medium 23200 may include code 23210 to direct the processor 902 to process a decomposable task in the number of IoT nodes based on an overlay of the neural network topology on the IoT network. The processing of a decomposable task in the number of IoT nodes may include dispatching portions of the decomposable task to the number of IoT nodes based on whether the IoT nodes have been identified as being located in a physical location or on a same local network, such as coupled by a router or a peer-to-peer connection. The overlay of the neural network topology may, for example, include three layers including at least an input layer, a hidden layer, and an output layer.

In some embodiments, IoT networks may utilize blockchains for multiple functions. These may include, for example, creating group identities, creating type identities, archiving trust measurements, registering object identifiers, secure device introduction, event tracking, and data logging among others. However, blockchain synchronization introduces additional overhead that may be difficult for constrained devices. The use of non-localized blockchains, such as those accepting transactions from anywhere, may result in the saturation of constrained bandwidth IoT subnets, which may result in functional delays, or the loss of data, among other issues. Consequently, a strategy for localizing blockchain processing may be needed to lower the demand. Further, smaller blockchains may be less trustworthy due to fewer nodes.

FIG. 233 is a schematic diagram of a hierarchy of blockchains 23302 associated with levels in a network hierarchy 23304 in accordance with some embodiments. The hierarchy of blockchains 23302 may increase the efficiency of the local subnet traffic to maintain and use blockchains 23302. To further improve efficiency, the blockchains 23304 may be indexed by an associated hierarchy of Merkle trees 23306, as described further with respect to FIG. 235. As used herein, a Merkle tree is generally a form of hash tree in which every non-leaf node is labeled with a hash of the labels or the values of two child nodes.

IoT subnets may each have a blockchain that is local to the subnet such that blockchain operations are contained within the subnet. Thus, frequent use of the local blockchain may not saturate subnets that connect to the local subnet.

As shown in FIG. 233, a local IoT network (R1) 23308, such as in a room or local environment, may have an associated blockchain 23310. Actions that are taken in R1 23308, or incorporated into transactions 23312 that may be committed to the blockchain 23310 to record activities, such as identities, group composition, security, operations tracking, and the like. A transaction 23312 may be stored in a block in the blockchain 23310. An associated hash code may be calculated for the block and saved to a Merkle tree 23306. In the Merkle tree 23306, a triangle represents a parent node, at the top, and two child nodes, below. In this example, an R1 Merkle tree 23314 and an R2 Merkle tree 23316 may be associated with different blocks in the blockchain 23310.

The local IoT network, R1 23308, may be coupled to a higher level IoT network, such as a home network (H1) 23318 through a bridge or router 23320. H1 23318 may include a blockchain 23322 to record transactions 23324 from H1 23318. Periodically, such as every second, minute, or at other repeating time periods, a checkpoint transaction 23326 may be created in the blockchain 23322 belonging to the parent network, H1 23318. The checkpoint transaction 23326 may include the hash values for the R1 Merkle trees 23314 or 23316, among other Merkle trees, or a sample of blocks committed to the lower level blockchain 23310.

The highest vertices 23328 for the Merkle trees R1 23314 and R2 23316 are linked by network references 23330 to the lowest level 23332 of the H1 Merkle trees 23334. Similarly, H1 23318 may be coupled to a next higher network, such as an IoT network cloud (C1) 23336 through another bridge or router 23338. Consolidated checkpoint transactions 23340 may be created in the public or private blockchain 23342 associated with C1 23336. Further C1 23336 may save transactions 23344 to the blockchain 23342. The lowest level 23346 of the C1 Merkle tree 23348 may include network references 23350 that are created from the hash code of the highest level vertices 23352 of the next lower level of Merkle trees, such as the H1 Merkle trees 23334.

Although shown as a simple set of cascading blockchains and associated Merkle trees through three levels, the process may include a cascade up to a root blockchain for a large number of participants and levels. The periodic checkpoints allow much of the local traffic to be isolated from the parent blockchains, thereby permitting scalability of IoT networks while continuing to protect the integrity using blockchains. With the prolific use of blockchains it may be useful to have a defined method for instantiating and permissioning new blockchains.

FIG. 234 is a process flow diagram of an example method 23400 for constructing a blockchain hierarchy in accordance with some embodiments. The method 23400 of FIG. 234 may be implemented by the IoT device 24200 described with respect to FIG. 242. The method 23400 may begin at block 23402, for example, when an IoT device is powered up or joins a local network.

At block 23404 a device in the current, or local, IoT subnet writes transactional data to the current blockchain. As described herein, the transactional data may be IoT operational events, trusted computing measurements, device or group identity information, and the like.

At block 23406, a determination may be made whether the blockchain block is a 'sync' block. If not, process flow returns to block 23404. If the block is a sync block as determined at block 23406, then at block 23408, a gateway blockchain node constructs a message containing the hash code of the sync block. The message is transmitted to a blockchain on the next level.

At block 23410, miners in the next level blockchain commit the message to a current block, along with a network reference pointing to the lower blockchain. At block 23412, a determination is made as to whether there is a next level blockchain. If so, process flow returns to block 23406 to determine if the block is a sync block. If not, the method 23400 ends at block 23414, when the IoT devices return to normal operations to wait another periodic blockchain write.

FIG. 235 is expanded view of the Merkle trees described with respect to FIG. 233 in accordance with some embodiments. As described, many IoT use cases using blockchains call for the retrieval of information that is integrity verified using the blockchain blocks. However, due to the nature of blockchain transactions, important measurements may not be proximate to one another in the chain. Thus, efficient indexing for the blockchain is needed. This may be performed by the use of Merkle trees to index the chain. As described with respect to FIG. 233, blockchains that cross network hierarchies may use Merkle trees, along with network references, to index the transactions. A blockchain may have its own Merkle tree or index. The checkpoint transactions require a context switch to the child blockchain that originally generated the checkpoint. A search engine seeking to obtain insight regarding the check pointed blocks may need to traverse the network, for example, by following network references 23330 or 23350, among others, to search the Merkle tree indexes for lower levels in the blockchain hierarchy.

FIG. 236 is a process flow diagram of an example method 23600 for searching a blockchain hierarchy using Merkle tree indexes in accordance with some embodiments. The method 23600 of FIG. 236 may be implemented by the IoT device 24200 described with respect to FIG. 242. The method may begin at block 23602, for example, when a query is received to locate data. At block 23604, the query data may be located in a hierarchical blockchain. At block 23606, a data value may be used to consult an index or lookup table that associates data values with block hash values. At block 23608, the current blockchain is set to point to the root of a hierarchical blockchain. At block 23610, the block hash value is used to consult a Merkle tree for a current blockchain to determine location of a target block in a chain of blocks in the blockchain.

At block 23612, a determination is made as to whether the target block contains a sync block hash from a child blockchain. If so, at block 23614 the current blockchain is set to point to the child blockchain to search the child blockchain. Process flow then returns to block 23610, to resume the search in the child blockchain.

If the target block does not contain a sync block hash, at block 23616 the target block is retrieved and provided to the searching entity. The method then ends at block 23618, for example, when normal operations are resumed.

Searching the Merkle tree indexes into lower levels of the blockchain hierarchy, using the network references, may result in increased network latency. Caching Merkle tree indexes for the child node blockchains may be a way to decrease the overhead of the index searches, by keeping searches to the root blockchain. Further, cloud servers may have sufficient processing resources to maintain the Merkle trees for all child blockchains in an IoT network.

FIG. 237 is a schematic diagram of a cached Merkle tree stored in a cloud server in accordance with some embodiments. Like numbered items are as described with respect to FIG. 233. In this example, the C1 Merkle tree 23348 is the same as in the hierarchical Merkle trees of FIG. 233. However, the lowest level 23702 in the C1 Merkle tree 23348 does not include network references, but instead includes cache references 23704 to cached Merkle trees 23706 for lower level IoT networks.

For example, the cached Merkle trees 23706 may include an H1 Merkle tree copy 23708 of the H1 Merkle tree 23334 described with respect to FIG. 233. In the H1 Merkle tree copy 23708, the lowest level 23710 may include references 23712 to copies 23714 of still lower level Merkle trees.

Similarly, intermediate blockchains may maintain a subtree cache to allow more efficient regional searches to be conducted. For example, FIG. 238 shows a schematic diagram of a distributed Merkle tree cache 23800 at the IoT network level H1 23318, as described with respect to FIG. 233. The H1 Merkle tree 23334 may be the same as described with respect to FIG. 233. However, the lowest level 23802 may include cache references 23804 to copies of the Rn Merkle trees 23806, rather than network references.

FIG. 239 is a schematic diagram of a technique for maintaining a distributed cache 23900 with coherency in accordance with some embodiments. As the caches are not directly saved with the blockchains they refer to, it may be useful to implement a method to maintain cache coherency for child blockchain Merkle trees. IoT frameworks may be used to efficiently implement publish-subscribe signaling. Child blockchains may publish 23902 lower level Merkle trees 23904 to a parent blockchain holding a higher level Merkle tree 23906. Similarly, the parent blockchain may publish 23908 the higher level Merkle tree 23906 to a root blockchain, such as to the C1 Merkle tree 23348, discussed with respect to FIG. 233.

FIG. 240 is a process flow diagram of an example method 24000 to construct a coherent cache for a hierarchy of blockchains in accordance with some embodiments. The method 24000 may be implemented, for example, by IoT or cloud devices at any level of the hierarchy. For example, the method 24000 of FIG. 240 may be implemented by the IoT device 24200 described with respect to FIG. 242. The method may begin at block 24002, for example, when an IoT network is first started, or when an IoT device joins the IoT network.

At block 24004, a current blockchain subscribes to a child blockchain's publisher agent. At block 24006, the child blockchain accepts registration of the parent blockchain's subscription agent. The publication and subscription (Pub-Sub) may include only the indexes, or Merkle trees, to maintain the coherent cache. In some examples, the Pub-Sub may include the complete blockchain from the child blockchain.

At block 24008, the current blockchain sets its current pointer to its parent blockchain. At block 24010, a determination is made as to whether the current blockchain is the root blockchain. If so, at block 24012, the coherent cache links are set up, and the system waits for publication events to take place, for example, as described with respect to FIG. 241. If the current blockchain is not the root blockchain, process flow returns to block 24004 to build the Pub-Sub links for the next level in the hierarchy.

FIG. 241 is a process flow diagram of an example method 24100 to maintain a coherent cache for a hierarchy of blockchains in accordance with some embodiments. The method 24100 may, for example, be implemented by IoT or cloud devices at any level of the hierarchy. For example, the method 24100 of FIG. 241 may be implemented by the IoT device 24200 described with respect to FIG. 242. The method may begin at block 24102, after the coherent cache has been constructed, for example, following the techniques of FIG. 240.

At block 24104, the blockchain cash agent receives a cache coherency event. The cache coherency event may, for example, be a publication of a change that has taken place in the Merkle tree for a lower level blockchain. In some examples, a periodic refresh may be used to confirm that the information in the higher level Merkle tree is correct.

At block 24106, the Merkle tree path from the source blockchain is copied and published to the subscriber cache agent. At block 24108, the cache agent in the subscriber blockchain replaces the current cached Merkle tree path in the subtree corresponding to the child tree and block. At block 24110, a determination is made as to whether the path forms a new branch of the Merkle tree. If not, process flow returns to block 24104, to continue with normal updates to maintain cache coherency.

If, at block 24110, the path does form a new branch of the Merkle tree, at block 24112, a new local root in the subtree is constructed. At block 24114, the current reference is made equal to the local root. At block 24116 a determination is made as to whether the local root is the global root. If not, process flow returns to block 24112, to construct a new local root in the next subtree.

If at block 24116, the local root is equal to the global root, the method 24100 ends at block 24118. At this point, the process may restart at block 24102.

FIG. 242 is a block diagram of an example of components that may be present in an IoT device 24200 for implementing hierarchical blockchains with associated indexes in accordance with some embodiments. Like numbered items are as described with respect to FIGS. 3 and 8. It can be noted that different components may be selected and used for the IoT device 24200 than for those selected for the IoT device 800 discussed with respect to FIG. 8, and other IoT devices discussed herein.

The IoT device 24200 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. A measurement may refer to a hash code calculated on a code or data segment stored in the storage 808 or memory 804. Starting from a measurement of a boot code segment, the measurements may be used to establish a trusted execution environment (TEE), by creating a chain-of-trust from the initial booting. The SM may provide secure storage.

The TPM may be used to establish a TEE, or secure enclave, for running programs. The TPM may also be used for any number of other functions, including providing cryptographic support for secure communications and keys for identification. The TPM may not be present in more constrained devices, such as sensors at the very edge of the IoT networks. In these devices, security may be provided by a blockchain itself, by upstream devices, by virtual TPM, and the like.

The mass storage 808 may include a number of modules to implement the key management functions described herein. Although shown as code blocks in the mass storage 808, it may be understood that any of the modules may be fully or partially replaced with hardwired circuits, for example, built into an application specific integrated circuit (ASIC).

The mass storage 808 may include blockchain logic 24202 may be included to maintain a blockchain 24204 that holds services, attributes, identities of devices, contracts, coin balances, and the like. The blockchain logic 24202 may be used to propagate the block chain transactions to other IoT devices. Further, the blockchain logic 24202 may be used to establish network references to blockchains at lower or higher levels of a network hierarchy. For example, the network references may include a link through a Gateway or router to a lower level IoT network.

An indexer 24206 may be used to generate a Merkle tree 24208 comprising hash codes of blocks in the blockchain 2422. The lowest levels of the Merkle tree 24208 may include network references to Merkle trees in IoT devices in a lower level IoT network that are generated by the blockchain logic 24202.

A locator 24210 may be included to search a blockchain hierarchy. The locator 24210 may perform this function as described with respect to FIG. 236, wherein the locator 24210 searches relevant Merkle trees for hash code of the target data, which may be used find the block in the blockchains.

A cache creator 24212 may be used to construct a cache 24214 of Merkle trees in IoT networks that are at a lower level in the hierarchy. For example, the cache creator 24212 may perform the method 24000 described with respect to FIG. 240. The locator 24210 may then perform the search of the blockchain hierarchy in the cache 24214, decreasing the load on the IoT networks.

The coherency of the cache 24214 may be maintained by a cache agent 24216. The cache agent 24216 may perform the method 24100 described with respect to FIG. 241. Further, the cache agent 24216 may subscribe to cache agents in lower level IoT devices to receive notification of cache coherency events from those cache agents. The cache agent 24216 may also publish cache coherency events for the current IoT device 24200 to higher level IoT devices that have subscribed to the cache agent 24216 to receive change notifications.

FIG. 243 is a block diagram of a non-transitory, machine readable medium 24300 including code to direct a processor 902 to manage keys for secure communications in accordance with some embodiments. The processor 902 may access the non-transitory, machine readable medium 24300 over a bus 904. The processor 902 and bus 904 may be implemented in a manner similar to the processor 902 and bus 904 described with respect to FIG. 9. The non-transitory, machine readable medium 24300 may include devices described for the mass storage 808 of FIG. 8 or may include optical disks, thumb drives, or any number of other hardware devices.

The non-transitory, machine readable medium 24300 may include code 24302 to direct the processor 902 to construct a blockchain hierarchy across a hierarchical IoT network, for example, extending from lowest level devices, such as sensors in a room, to a broader IoT network, such as a house or plant network, and onto still broader IoT networks, such as in the cloud. The code 24302 may perform this function according to the method described with respect to FIG. 243.

Code 24304 may be included to direct the processor 902 to construct a hierarchical index of the blockchains. The hierarchical index may be a Merkle tree, based on hash code values of the contents of the blocks in the blockchains.

Code 24306 may be included to direct the processor 902 to construct a coherent cache of Merkle trees at the present IoT network level, wherein the coherent cache includes the Merkle trees of lower levels in the IoT network. The code 24306 may perform the construction of the coherent cache using the method described with respect to FIG. 240.

Code 24308 may be included to direct the processor 902 to maintain the coherency of the cache. The code 24308 may perform this function using the method described with respect to FIG. 241.

Any number of other code blocks may be included in the machine readable medium 24300 to implement functions of the IoT devices. These code blocks may include a communicator to build and transmit packets between IoT devices, a secure booter/measurer to perform measurements for securely running code, a key generator, or any number of other code blocks as described herein.

Publish-subscribe (Pub-Sub) is a subset of Content-Centric Networking (CCN), in which a network routing function is applied to the efficient routing of content, as compared to routing by sending packets or frames to a specific network address. The focus of Pub-Sub is on efficiently routing a single published content to multiple subscribers, multiple publications to a single subscriber, or both. In addition to being used for a specific content item, the Pub-Sub may be relative to a topic, which may be a logical title or subject line under which multiple content items may be exchanged.

The Pub-Sub model allows for a topic to be defined to which network devices may subscribe, publish, or both. Publishers may publish to multiple topics and subscribers may subscribe to multiple topics. Thus, a scalability concern may arise when routing the topic traffic. Topics may be expressed in a variety of data formats including strings, numbers, network (multicast) addresses, UUIDs and Object ID hierarchies. However, routing efficiency may be affected by how topics are expressed and formatted.

As described herein, bloom filters may provide an efficient method for representing Pub-Sub topics for routing. The bloom filter indicates a match if all of the set bits of the target value, for example, bits with a value of one, match set bits in the bloom filter. Bits that have not been set, for example, have a value of zero, are ignored. Thus, if a bit is set in the bloom filter, but has a value of zero in the target value, there may still be match, so long as all of the set bits in the target value are set in the bloom filter. Other techniques may be used for tracking the topics for the Pub-Sub distribution, such as storing bit patterns for the topics in distributed hash tags (DHTs), or storing a topic and associated status in a blockchain, among others.

FIG. 244 is a schematic diagram of using Pub-Sub routing based on bloom filters in accordance with some embodiments. The apparatus constructs a bloom filter where a topic is hashed then overwritten onto the bit space for the bloom filter, such as by an XOR function. Multiple topic formats may use the same bloom filter since each would hash differently. The length of the bit space used for the bloom filter may be determined based on information theory. For example, a longer bloom filter, including a higher number of bit values, may provide for more topics to be included while decreasing the chances that bits may overlap, leading to the possibility of incorrect retrieval of topics.

As shown in FIG. 244, a content publisher 24402 may generate a hash code for a topic. The publisher may then send the content through a router 24404 (U2) that includes all of the set bits of the hash code for the content. The router 24404 may then publish the bloom filter to a local publisher 24406 (P4). Other routers 24404, such U2 and U3, may subscribe to the first router U2, for example, presenting a bit map that includes hash codes for target topics.

If a router 24404, such as U3 does not include all of the set bits in the bloom filter, the hash code for the topic is not sent through that tree. This may indicate that no subscriber 24408 in the tree maintained by the router to 24404 U3 has subscribed that topic. From the router 24404 U2, the hash code may be provided to other publishers 24406, such as P2. Further, the hash code for the topic may move through other routers 24404, such as U1, so long as all of the set bits in the bloom filter in U1 match. Subscribers 24408, such as S1, S2, and S5, may receive content from a publisher 24406, such as P1, or from a router 24404, such as U1. In this example, a subscriber 24408, S2, has a hash code for a target topic that matches the hash code from the content publisher 24402.

In this approach, a subscriber 24408 may construct a bloom filter containing overwritten hash codes for all of the topics to which it wishes to subscribe. The subscriber 24408 may then register the bloom filter with the router fabric. A publisher 24406 may also supply a bloom filter containing overlapping hash codes for all of the topics for which it can provide content. As an example, if there are multiple formatting methods corresponding to the same semantic topic, the bloom filter may match one or more satisfying the routing requirements.

Given a routing scheme that uses publish-subscribe model, it is possible that a security policy may wish to impose restriction over the set of topics that may be exposed to a sub-network, device or gateway to a foreign network. A bloom filter mask may be added to a routing node where the mask represents a whitelist expression of topics that may be routed. A mask may also be used to represent a blacklist of topics that are filtered.

FIG. 245 is a schematic diagram of using a whitelist bloom filter for allowing the distribution of content in accordance with some embodiments. In FIG. 245, an intersection is calculated for a topic bloom filter 24502 and a white list bloom filter 24504, for example, by performing an AND function. If the ending bloom filter 24506 is zero, then the topic bloom filter 24502 is in the white list bloom filter 24504, and the content is allowed to proceed to the consumer.

FIG. 246 is a schematic diagram of using a blacklist bloom filter for preventing the distribution of content in accordance with some embodiments. In FIG. 246, an intersection is calculated for a topic bloom filter 24602 and a black list bloom filter 24604, for example, by performing a NAND function to generate an intermediate bloom filter 24608. The intermediate bloom filter 24608 may then be intersected with the topic bloom filter 24602, for example, using an AND function 24610. If the ending bloom filter 24612 is not zero, then the topic bloom filter 24602 is in the black list bloom filter 24604, and the content is prevented from proceeding to the consumer.

FIG. 247 is a process flow diagram of an example method 24700 for implementing Pub-Sub with blacklist or white list bloom filters for content control in accordance with some embodiments. The method 24700 of FIG. 247 may be implemented by the IoT device 24800 described with respect to FIG. 248. The method 24700 may start at block 24702, for example, when a subscriber calculates a bloom filter including hash codes for a number of topics.

At block 24706, an administrator registers the blacklist bloom filter, white list bloom filter, or both with routers in the system. At block 24708, a publisher publishes content using a publication bloom filter. The publication bloom filter may be a direct hash code of the topic or publication, with a bit length that matches the length of the bloom filters to be used for distribution.

At block 24710, the content is delivered to a router. The router then computes a Pub-Sub intersection for the publisher and subscriber bloom filters. At block 24712, a determination is made as to whether the Pub-Sub intersection is equal to zero. If the Pub-Sub intersection is equal to zero, indicating no overlap of the publisher and subscriber bloom filters, the method 24700 ends at block 24714.

If at block 24712, it is determined that the Pub-Sub intersection is not equal to zero, at block 24716, a white list intersection of the Pub-Sub intersection with the bloom filter for the white list topics is calculated. At block 24718, a black list intersection of the Pub-Sub intersection with the bloom filter for the black list topics is calculated.

At block 24720, a determination is made as to whether both the white list intersection is equal to zero and the blacklist intersection is not equal to zero. If both conditions are true, then at block 24722, the content is not routed to the subscriber. If either condition is not true, then at block 24724, the content is routed to the subscriber. The method 24700 then ends at block 24714.

FIG. 248 is a block diagram of an example of components that may be present in an IoT device 24800 for implementing a Pub-Sub content distribution system using bloom filters in accordance with some embodiments. Like numbered items are as described with respect to FIGS. 3 and 8. It can be noted that different components may be selected and used for the IoT device 24800 than for those selected for the IoT device 800 discussed with respect to FIG. 8, and other IoT devices discussed herein.

The IoT device 24800 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. As used herein, a measurement is a hash code calculated on a code or data segment stored in the storage 808 or memory 804. Starting from a measurement of a boot code segment, the measurements may be used to establish a trusted execution environment (TEE), by creating a chain-of-trust from the initial booting. The SM may provide secure storage.

The TPM may be used to establish a TEE, or secure enclave, for running programs. The TPM may also be used for any number of other functions, including providing cryptographic support for secure communications and keys for identification. The TPM may not be present in more constrained devices, such as sensors at the very edge of the IoT networks. In these devices, security may be provided by a blockchain itself, by upstream devices, by virtual TPM, and the like.

The mass storage 808 may include a number of modules to implement the Pub-Sub functions described herein. Although shown as code blocks in the mass storage 808, it may be understood that any of the modules may be fully or partially replaced with hardwired circuits, for example, built into an application specific integrated circuit (ASIC).

The mass storage 808 may include a hash code calculator 24802 that may generate hash codes for topics. The hash code calculator 24802 may write the hash codes into a bloom filter, for example, using an XOR function. This may create a bloom filter topic list 24804. In some examples, the IoT device 24800 may function as a publisher or router. In these examples, the bloom filter topic list 24804 may be obtained from other publishers or routers, for example, in the fog 812 or in the cloud 302.

A white list mask 24806 may be included to store topics identified as acceptable for redistribution by an administrator. A black list mask 24808 may be included to store topics identified as not acceptable for redistribution.

A subscription manager 24810 may be included to register the bloom filter topic list 24804 with routers and other devices in the fog 812 or cloud 302. If the IoT device 24800 is functioning as a router or publisher, the subscription manager 24810 may determine if topics in the bloom filter topic list 24804 are in the white list mask 24806 or in the blacklist mask 24808, to determine whether or not the content should be passed on, as described with respect to FIG. 247.

A content locator 24812 may be included to locate and provide content associated with the topic. For example, content may be provided by other publishers or routers and saved by the content locator 24812 to allow a determination as to whether the content is in the white list 24806 or the blacklist 24808 prior to providing the content to other devices in the fog 812 or the cloud 302.

FIG. 249 is a block diagram of a non-transitory, machine readable medium 24900 including code to direct a processor 902 to manage a Pub-Sub system using bloom filters for content distribution in accordance with some embodiments. The processor 902 may access the non-transitory, machine readable medium 24900 over a bus 904. The processor 902 and bus 904 may be implemented in a manner similar to the processor 902 and bus 904 described with respect to FIG. 9. The non-transitory, machine readable medium 24900 may include devices described for the mass storage 808 of FIG. 8 or may include optical disks, thumb drives, or any number of other hardware devices.

The non-transitory, machine readable medium 24900 may include code 24902 to direct the processor 902 to generate a bloom filter topic list, for example, by calculating a hash code of each of the number of topics, and then overwriting the hash codes onto a bloom filter.

Code 24904 may be included to direct the processor 902 to register a white list mask, a blacklist mask, or both, with routers in an IoT network. In some examples, the code 24904 may accept the white list mask, blacklist mask, or both from another device for use by the processor in determining whether to forward content.

Code 24906 may be included to direct the processor 902 to register a subscription bloom filter with the router. The code 24906 may direct the processor 902 to accept a subscription bloom filter from another device, for example, if the machine readable medium 24900 is part of a router.

Code 24908 may be included to direct the processor 902 to compute a content intersection of the content filter with the subscription bloom filter to determine if the content is accessible on the network. Code 24910 may be included to direct the processor 902 to compute the intersection of the content intersection with a white list mask to determine if the content is permitted. Code 24912 may be included to direct the processor 902 to compute the intersection of the content intersection with a blacklist mask to determine if the content is prohibited.

Code 24914 may be included to direct the processor 902 to route content to a subscriber, for example, if the content is authorized by the white list mask, and not prohibited by the blacklist mask. If either of these conditions is true, the code 24914 may delete the content.

Any number of other code blocks may be included in the machine readable medium 24900 to implement functions of the IoT devices. These code blocks may include a communicator to build and transmit packets between IoT devices, a secure booter/measurer to perform measurements for securely running code, a key generator, or any number of other code blocks as described herein.

Given a Pub-Sub network consisting of a set of publisher, subscriber and routing nodes, publishers may wish to include confidential content with the topic notification message. The content may be encrypted with a topic encryption key that may be a group or shared key. A challenge for this use case is that subscribers need to obtain the content encryption key before they can consume the content subsequent to receiving the topic notification.

The Pub-Sub network may be used to deliver key management notification messages that scale with network dynamics, because the routing nodes may function as key management nodes. Key management topics may be automatically created and delivered, for example, when an original topic contains encrypted content, which signals the need for a key. Upon receipt of an encrypted content, subscribers will issue a key management GET request to obtain the encryption key. The routing node anticipates this and subscribes to the key management topic that pre-fetches the encryption key.

FIG. 250 is a schematic diagram of topic notification with encrypted content in accordance with some embodiments. In FIG. 250, routing nodes 25002 may cache topic keys, such as $K_{T1}$, so that they are available locally to a community of subscribers 25004 serviced by the routing nodes 25002. The key management topic notifies routing nodes 25002 acting as subscribers to the key management topics.

FIG. 251(A) is a schematic diagram of a group of routers receiving notifications of a topic that includes encrypted content in accordance with some embodiments. A routing node 25102 having the key, $K_{T1}$, contained in its cache may respond to a subscription 25104 by publishing the key management topic T[$K_{T1}$] 25106 for the topic T1 25108. A topic notification T1 25108 may include the encrypted content C, where the content encryption key is $K_{T1}$. Receiving the topic notification T1 25108 may cause a router 25102, 25110, 25112, or 25114 to define the topic T[$K_{T1}$] 25106.

The router 25110 that subscribes 25104 to the topic T[T1] may wait receipt of a key management event for that topic. The publisher P 25116 of topic T1 25108 may supply the key $K_{T1}$ to router 25102, which may function as a key cache manager for other routers in the system. Upon receipt of the key, the routing node 25102 notifies its subscribers of availability of the key $K_{T1}$.

FIG. 251(B) is a schematic diagram of a group of routers warming their caches in anticipation of subscribers requesting an encrypted topic in accordance with some embodiments. The subscribers to the routing node 25102, such as routing node 25110, may warm their cache 25120, for example, preemptively obtaining the key $K_{T1}$ using a key GET request 25122. This may be performed in anticipation of downstream routers, such as routing node 25112, and subscriber nodes, such as subscribing node 25118, responding to the T1 notification 25108 by issuing a key GET request 25124. It may be noted that content encryption keys may be further encrypted by a site specific key or by a VPN session that protects the topic key across hops between routing nodes and subscriber nodes.

FIG. 252 is a process flow diagram of an example method 25200 for using key management notification and warm key caching in accordance with some embodiments. The method 25200 of FIG. 252 may be implemented by the IoT device 25300 described with respect to FIG. 253. The method may begin at block 25202, for example, when an IoT device joins a routing network for content distribution, which may use bloom filters for content distribution. At block 25204, a publisher generates content (C) and a content encryption key ($K_{T1}$). The encrypted content, E={C}$K_{T1}$, may then be available for download from a public repository.

At block 25206, the publisher may make the content available under a topic T1 that has Pub-Sub subscribers. At block 25208, the publisher may notify a first routing node (R1) of T1. The routing node (R1) may construct a bloom filter including available published topics. The routing node (R1) includes a tag indicating the encrypted content (E) is available.

At block 25210, a second routing node (R2), having subscriptions for T1, receives the topic notification from the first routing node (R1), including the E tag. At block 25212, the first routing node (R1) constructs a key management topic T[$K_{T1}$] to notify the second routing node (R2) of the availability of the key, $K_{T1}$.

At block 25214, upon receipt of the T1 notification with the E tag, the second routing node (R2) subscribes to the key management topic, T[$K_{T1}$]. Further, the T1 notification and the key management topic may be propagated on through successive routers in the chain.

At block 25216, the publisher supplies the topic encryption key, $K_{T1}$, to the first routing node. Upon receipt of the topic encryption key, all subscribers to T1 are notified.

At block 25218, when a subscriber (S) to topic T1 wishes to decrypt E using the topic encryption key, $K_{T1}$, the subscriber requests $K_{T1}$ from a router functioning as a key cache manager. The key cache manager for the subscriber may be the nearest router in communication with the subscriber or may be an initial router providing the key cache management services for the entire group of routers.

At block 25220, a determination is made as to whether the topic encryption key is in the cache. If not, at block 25222, the router functioning as the key cache manager requests the topic encryption key from a peer node. Process flow then returns to block 25220 to determine if the topic encryption key is now in the cache. If the topic encryption key is determined to be in the cache at block 25220, process flow proceeds to block 25224, at which the topic encryption key is sent to the requester, such as the subscriber in this example.

At block 25226, the encrypted content, E, is decrypted using the topic encryption key, $K_{T1}$. The method 25200 then ends at block 25228.

FIG. 253 is a block diagram of an example of components that may be present in an IoT device 25300 for managing topic notification with encrypted content in accordance with some embodiments. Like numbered items are as described with respect to FIGS. 3 and 8. It can be noted that different components may be selected and used for the IoT device 25300 than for those selected for the IoT device 800 discussed with respect to FIG. 8, and other IoT devices discussed herein.

The IoT device 25300 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. As used herein, a measurement is a hash code calculated on a code or data segment stored in the storage 808 or memory 804. Starting from a measurement of a boot code segment, the measurements may be used to establish a trusted execution environment (TEE), by creating a chain-of-trust from the initial booting. The SM may provide secure storage.

The TPM may be used to establish a TEE, or secure enclave, for running programs. The TPM may also be used for any number of other functions, including providing cryptographic support for secure communications and keys for identification. The TPM may not be present in more constrained devices, such as sensors at the very edge of the IoT networks. In these devices, security may be provided by a blockchain itself, by upstream devices, by virtual TPM, and the like.

The mass storage 808 may include a number of modules to implement the encrypted content distribution functions described herein. Although shown as code blocks in the mass storage 808, it may be understood that any of the modules may be fully or partially replaced with hardwired circuits, for example, built into an application specific integrated circuit (ASIC).

The mass storage 808 may include a topic classifier 25302 that may identify topics that include encrypted content. The topic classifier 25302 may write create a bloom filter topic list for available topics, including topics that contain encrypted content and unencrypted content.

A notifier 25304 may notify other devices in the fog 812 of the topic that includes encrypted content. A key subscriber 25306 may be included to subscribe to a topic including a topic key 25308 for encrypted content 25310. The key subscriber 25306 may pull or receive the encrypted content 25310 from devices in the fog 812, such as publishers or routers, and may provide the encrypted content 25310 to other devices in the fog 812, such as routers or subscribers. A decryptor 25312 may be included to decrypt encrypted content, for example, using the topic key 25308.

FIG. 254 is a block diagram of a non-transitory, machine readable medium 25400 including code to direct a processor 902 to manage topic notification with encrypted content in accordance with some embodiments. The processor 902 may access the non-transitory, machine readable medium 25400 over a bus 904. The processor 902 and bus 904 may be implemented in a manner similar to the processor 902 and bus 904 described with respect to FIG. 9. The non-transitory, machine readable medium 25400 may include devices described for the mass storage 808 of FIG. 8 or may include optical disks, thumb drives, or any number of other hardware devices.

The non-transitory, machine readable medium 25400 may include code 25402 to direct the processor 902 to receive a notification of encrypted content. The notification may be sent by the publisher, a prime router in contact with the publisher, or other routers in contact with the prime router.

Code 25404 may be included to direct the processor 902 to construct a bloom filter of available content. The bloom filter may include hash codes for topics that include encrypted content as well as hash codes for topics that do not include encrypted content.

Code 25406 may be included to direct the processor 902 to send the topic notification to routers. The topic notification may include the information that the topic has encrypted content.

Code 25408 may be included to direct the processor 902 to subscribe to a topic upon receipt of the topic notification, including, for example, a key management topic. Code 25410 may be included to direct the processor 902 to notify subscribers of the availability of a key for the encrypted content.

Code 25412 may be included to direct the processor 902 to obtain the key from a peer node, for example, if the subscriber is a router. The code 25412 may direct the processor 902 to obtain the key from a router in communication with a subscriber.

Code 25414 may be included to direct the processor 902 to send a key to a subscriber, wherein the subscriber may include a router or an end consumer of the content. The code 25414 may direct the processor to decrypt the content, for example, if the subscriber is a consumer of the content.

Any number of other code blocks may be included in the machine readable medium 25400 to implement functions of the IoT devices. These code blocks may include a communicator to build and transmit packets between IoT devices, a secure booter/measurer to perform measurements for securely running code, a key generator, or any number of other code blocks as described herein.

In addition to topic level encryption to protect contact, topics may be privacy sensitive within a group of publishers and subscribers. To achieve the added level of protection a group key may be used to encrypt topics. The group key may double as a content encryption key or may be a second group key. Distribution of the group key may follow the method 25200 described with respect to FIG. 252, among other techniques.

FIG. 255 is a schematic diagram of a subscriber 25502 obtaining a topic group key 25504 in accordance with some embodiments. The topic group key 25504 may be obtained by first enrolling the subscriber 25502 into a topic group managed by a topic naming server 25506, for example, by having the subscriber 25502 send a join request 25508 to the topic naming server 25506 to join or create a topic. The topic naming server 25506 may then issue a message 25510 including a group membership credential. Similarly, publishers 25512 may join the group by sending a join request 25514, and receiving a message 25516 from the topic naming server 25516 that includes the group membership credentials, such as the topic group key 25504.

The publisher 25512 and the subscriber 25502 may then authenticate as group members. Once the authentication is successful, the topic naming server 25506 may initiate a secure session to distribute the topic group key 25504 to the members.

FIG. 256 is a schematic diagram of a publisher generating a subscription bloom filter 25602 for notification of subscribers of available topics in accordance with some embodiments. The bloom filter notification system may function as described with respect to FIG. 244. Once the publishers and subscribers possess topic group keys 25604 for encrypting topics 25606, the topics 25606 may be encrypted to form encrypted topics 25608 by the publisher. Non-private topics 25610 may be combined in a hash function 25612 with the encrypted topics 25608 to form the notification bloom filter 25602. Similarly, subscribers may compute a subscription bloom filter by encrypting a topic of interest then using the encrypted value as input to the bloom filter.

FIG. 257 is a ladder diagram of an example method 25700 for topic encryption in accordance with some embodiments. The method 25700 of FIG. 257 may be implemented by the IoT device 26000 described with respect to FIG. 260. The topic encryption keys may be managed by a key distribution center (KDC) 25702 that receives a list of known topics from a topic naming service (TNS), for example, as described with respect to FIG. 255. The KDC 25702 may use a certificate, or attestation key 25704 issued by the TNS to verify subscribers, such as subscriber 25706, and publishers, such as publisher 25708, are members of the topic group before providing the topic group key 25710.

The TNS may use an Enhanced Privacy ID (EPID) key as the topic group key 25710 and an EPID Join protocol for enrolling members. The KDC 25702 may use a signed Diffie-Hellman protocol to establish a secure channel to the subscriber 25704 or publisher 25706 when distributing the topic group key 25704. The topic group key 25704 may be a symmetric key.

The method 25700 may begin when the publisher 25708 generates 25712 the topic encryption key 25710. The publisher 25708 then encrypts the topic encryption key 25710 with a key provided by the KDC 25702, and pushes the topic encryption key 25710 to the KDC 25702 in an attestation message 25714.

The publisher 25708 may then publish 25716 the topic to a router 25718, along with the content that is encrypted using the topic encryption key 25710. The subscriber 25706 may send a subscription message 25720 to the router 25718, for example, including a bloom filter that includes hash codes of topics the subscriber 25706 wishes to receive.

Upon receipt of the published topic message 25716, the router 25718 may determine that the content has been requested by the subscriber 25706. The router 25718 may then send a notification message 25722 to the subscriber 25706 that includes the encrypted content. The subscriber 25706 may then send an attestation message 25724 to the KDC 25702 with a request to get the topic encryption key 25710.

The KDC 25702 may then send a message 25726 that includes the topic encryption key 25710, for example, encrypted with a communications key. The subscriber 25706 may then decrypt 25728 the content for use.

Additional content may be provided for the topic using the same topic encryption key 25710. For example, the publisher 25708 may send a message 25730 to the router 25718 that includes the additional encrypted content. The router 25718 may then send a notification message 25732 to the subscriber 25706 that includes the additional encrypted content. The subscriber 25706 may then decrypt 25734 the additional content for use.

IoT networks are often partitioned according to a classification of security, privacy, integrity or safety. A multilevel security label may be used to disambiguate the classification. There may be a set of topics, or categories, pertaining to each level. A bloom filter mechanism, for example, as described with respect to FIG. 244, can be used to deliver notifications including the security label. The security label may then be followed by routing nodes and other subscribers and publishers. The multi-level security labels may be based on a number of different models, including, for example, the Biba Integrity Model, and the Bella-LaPadula security mode, among others.

FIG. 258 is a schematic diagram of the use of multilevel security labels in a publication-subscribe environment in accordance with some embodiments. The figure illustrates the use of a Biba integrity model and a Bell-LaPodula confidentiality model. In a Biba integrity model, there are generally no permitted writes up (constraint I) to a higher level, such as from L1 to L2, and no permitted reads down (constraint II) from a lower level, such as from L0 to L1. In a Bell-LaPadula confidentiality model, there are generally no permitted writes down (constraint III) to a lower level, such as from L1 to L0, and no permitted reads up (constraint IV) to a higher level, such as from L0 to L1.

A publisher 25802 may encode the security label as a bloom filter by mapping label categories to bloom topics, C. The label level may, itself, be a topic that is present when any of the label categories are supplied. It may be appropriate to encode the level topic with each of the category topics to ensure a category of a different level is not confused with the category of a first level. The encoding may be achieved, for example, by cryptographic hash of the two values or by applying some function f( ) such that the output value doesn't collide with any of the input values. For example, a bit pattern representing a level may be processed with the bit pattern for a topic by performing an XOR of the bit patterns. the resulting bit pattern may then be used in the bloom filter.

Routing nodes 25804 apply the security policy semantics by recognizing the security level topic then applying the appropriate security model behavior constraint. For example, if constraint I is followed, then a router may allow a subscriber S0 authorized to operate at a level L0 to receive a notification from a publisher authorized to operate at a level L1. Similarly, if a subscriber S2 is authorized to operate at level L2 the notification from the L1 publisher would be blocked.

The multi-level security policies illustrated in FIG. 258 are not exclusive. Other multi-level security policies may be used. Further, it can be noted that although the examples used herein describe the application of the multilevel security policies to multiple levels in a network, the security levels may be defined as different security levels in a single network level, among other definitions.

FIG. 259 is a process flow diagram of an example method 25900 for implementing bloom filters to apply multi-level security policies to notification messages in accordance with some embodiments. The method 25900 of FIG. 259 may be implemented by the IoT device 26000 described with respect to FIG. 260. The method 25900 may begin at block 25902, for example, when a subscriber is requesting content where a publisher has content to share. At block 25904, a determination is made as to whether this is a publication. If not, the activity may be the registration of a subscription and process flow proceeds to block 25906.

At block 25906, a subscriber attests to its identity to router nodes, and discloses the security level at which the subscription is registered. At block 25908, the subscriber supplies a bloom filter, including the content of interest. As disclosed herein, the bloom filter may include overwritten bit hash codes for topics of interest, categories, and security levels, among others.

At block 25910, a determination is made as to whether the router is enforcing an integrity policy. If so, at block 25912, the router may mask off filter values that allowed reads down to lower network levels. At block 25914, a determination is made as to whether the router is enforcing a confidentiality policy. If so, at block 25916, the router may mask off filter values that allow reads up to higher network levels. At block 25918, the subscription is registered at the router. The method 25900 then ends at block 25920.

If, at block 25904, it is determined that the activity is a publication, process flow proceeds to block 25922. At block 25922, the publisher attests to router node the security level at which the publication is given. At block 25924, the security level in categories are encoded into a bloom filter corresponding to the publication content. As described herein, the bloom filter may, for example, include public topics, private topics, key management topics, security level topics, and others, in addition to the current publication.

At block 25926, a determination is made as to whether the router is enforcing an integrity policy. If so, at block 25928, the router may mask off filter values that allow writes up to higher network levels. At block 25930, a determination is made as to whether the router is enforcing a confidentiality policy. If so, at block 25932, the router may mask off filter values that allow writes down to lower network levels. At block 25934, the published notification is sent to the router, subscriber, or both. The method 25900 then ends at block 25920.

FIG. 260 is a block diagram of an example of components that may be present in an IoT device 26000 for managing topic notification with encrypted content in accordance with some embodiments. The IoT device 26000 may function as a publisher, a router, or a subscriber in an IoT network, such as the fog 812. Like numbered items are as described with respect to FIGS. 3, 8, 255 and 257. It can be noted that different components may be selected and used for the IoT device 26000 than for those selected for the IoT device 800 discussed with respect to FIG. 8, and other IoT devices discussed herein.

The IoT device 26000 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. As used herein, a measurement is a hash code calculated on a code or data segment stored in the storage 808 or memory 804. Starting from a measurement of a boot code segment, the measurements may be used to establish a trusted execution environment (TEE), by creating a chain-of-trust from the initial booting. The SM may provide secure storage.

The TPM may be used to establish a TEE, or secure enclave, for running programs. The TPM may also be used for any number of other functions, including providing cryptographic support for secure communications and keys for identification.

The mass storage 808 may include a number of modules to implement the encrypted content distribution functions described herein. Although shown as code blocks in the mass storage 808, it may be understood that any of the modules may be fully or partially replaced with hardwired circuits, for example, built into an application specific integrated circuit (ASIC).

The mass storage 808 may include a topic naming server 25506, as described with respect to FIG. 255. As described, the topic naming server 25506 may manage topics such as creating topic groups and issuing keys for topic groups, security levels, and the like. The topic naming server 25506 may use any number of techniques to generate the key, including techniques described herein, such as assembling circular fractional keys, EPID key generation, blockchain key generation, and the like.

A subscriber 26002 may supply a bloom filter containing categories, topics, and security levels of interest, among other items to routers and other devices, such as publishers. An attestator 26004 may attest to the identification of the publisher or subscriber, for example, to a key distribution center 25702, as described with respect to FIG. 257. The key distribution center 25702 may be located in another device such as in the fog 812 or the cloud 302. The key distribution center 25702 may confirm the identities of devices in the fog 812 or the cloud 302, and provide topic keys, level keys, or both, to other devices. The subscriber 26002 may receive notification of content of interest, and use the keys received from the key distribution center 25702 to decrypt the content of interest.

An integrity enforcer 26006 may mask off filter values that allow read operations down to lower security or network levels, write operations up to higher security or network levels, or both. A confidentiality enforcer 26008 may mask off filter values that allow read operations up to higher security or network levels, write operations down to lower security or network levels, or both.

FIG. 261 is a block diagram of a non-transitory, machine readable medium 26100 including code to direct a processor 902 to manage topic notification with encrypted content in accordance with some embodiments. The processor 902 may access the non-transitory, machine readable medium 26100 over a bus 904. The processor 902 and bus 904 may be implemented in a manner similar to the processor 902 and bus 904 described with respect to FIG. 9. The non-transitory, machine readable medium 26100 may include devices described for the mass storage 808 of FIG. 8 or may include optical disks, thumb drives, or any number of other hardware devices.

The non-transitory, machine readable medium 26100 may include code 26102 to direct the processor 902 to generate an encryption key for a topic, a security level, or both. Code 26104 may be included to direct the processor 902 to push the encryption key to a key distribution center. The key distribution center may then provide the key to devices that provide an attestation to the key distribution center to confirm identification. The devices may include publishers, routers, and subscribers, among others.

Code 26106 may be included to direct the processor 902 to publish an encrypted topic, for example, to a router. Code 26108 may be included to direct the processor 902 to send a notification of the topic to other devices, such as routers, subscribers, or both. The topic notification may include the information that the topic has encrypted content.

Code 26110 may be included to direct the processor 902 to obtain the encryption key from the key distribution center, for example, by sending an attestation message that requests the encryption key. Code 26112 may be included to direct the processor 902 to decrypt content using the encryption key.

Code 26114 may be included to direct the processor 902 to enforce an integrity policy, for example, masking off filter values that allow a read down to a lower security or network level or write up to a higher security or network level. Code 26116 may be included to direct the processor 902 to enforce a confidentiality policy, for example, masking off filter values that allow a read down to a lower security or network level or write up to a higher security or network level.

Any number of other code blocks may be included in the machine readable medium 26100 to implement functions of the IoT devices. These code blocks may include a communicator to build and transmit packets between IoT devices, a secure booter/measurer to perform measurements for securely running code, a key generator, or any number of other code blocks as described herein.

The techniques described herein may be used to implement any number of IoT networks for various purposes. The following sections describe additional applications that may be implemented.

In a first example, an IoT network may be used to implement a swarm of robots for unobtrusive operations, such as cleaning, maintenance, trash disposal, or the like. The robots may be described as shy robots, as they may be designed to minimize movement when humans are approaching the operational area or proximate to the robots. The shy robot may be based on an autonomous simultaneous localization and mapping (SLAM) system to perform functions under a plurality of modalities including presence, motion detection, and interaction with other shy robots, humans, and other cybernetic systems to achieve specific goals.

FIG. 262 is a drawing of an example of a shy robot 26200 in accordance with some embodiments. In this example, the shy robot is a recycling bin or trashcan 26202 that may also pick up rubbish or trash dropped by passersby. Although autonomously collecting the trash may be a primary function, the shy robot may have a number of augmented functions and secondary functions. For example, the trashcan may move around an area, for example, a park or a city block, and use a normally hidden arm to collect trash.

Further, the shy robots may have secondary functions provided by the included computing, memory, and networking capabilities. The shy robots may act as edge or fog nodes, for example, to provide parking payment access points, internet access points, and the like. As Internet access points, they may be configured to act as proxy servers, caching commonly accessed web pages locally for improving the internet experience by users. They may store and process any data that is collected locally, and send that data to the cloud, for example, to act as augmented security mechanisms for city or public authorities. This may include monitoring, alerting, and deterring illegal or anti-social activity. They may also be configured for voice-recognition communications, such as offering directions if lost, contacting authorities, and the like.

To implement these functions, the shy robot 26200 may be equipped with a number of different systems. The systems may be implemented as individual IoT devices forming an IoT network in each shy robot 26200.

The shy robot 26200 may have a number of sensors 26204. The sensors 26204 may collect data on the environment to allow the shy robot to gather context information and make local decisions for movement and other functions.

A power source 26206 may be used to provide power to the shy robot 26200. The power source may include any number of configurations, such as a battery, charger, solar panels, and the like.

The shy robot 26200 may include processing and analytic systems 26208 to allow the robots to function as fog nodes, for example with other shy robots, and other local devices. This may allow them to offer data and processing services, or to send the results of any analysis to the cloud or to humans for further action, among others. Actions that may be performed are discussed in more detail with respect to FIG. 264.

A number of retractable utilities 26210 may be included to aid in the performance of functions. For example, the trashcan 26202 may include a hidden retractable arm that may be configured to collect rubbish along its route. Other retractable utilities 26210 may include hidden plugs for charging that autonomously connect to charging stations, charging stations for human devices, and the like.

Propulsion systems 26212 may be included to move the shy robot 26200 to different locations, depending on rules of motion that determine if persons, animals, or other obstacles are nearby. The propulsion systems 26212 may include motor driven tracks, wheels, or other systems depending on the use.

FIG. 263 is a block diagram of an example of components that may be present in a shy robot 26200 in accordance with some embodiments. Like numbered items are as described with respect to FIGS. 8 and 262. It can be noted that different components may be selected and used for the shy robot 26200 than for those selected for the IoT device 800 discussed with respect to FIG. 8, and other IoT devices discussed herein.

The shy robot 26200 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. As used herein, a measurement is a hash code calculated on a code or data segment stored in the storage 808 or memory 804. Starting from a measurement of a boot code segment, the measurements may be used to establish a trusted execution environment (TEE) 26302, by creating a chain-of-trust from the initial booting. The SM may provide secure storage.

The TEE 26302 provides an area where processes which require hardware backed enclaves for protection can be run.

Using the TPM, and other methods described herein, an attestation of the function and identity of the shy robot may be provided to other systems, including other shy robots, cloud-based systems, and portable user devices, such as smart phones, among others.

The shy robot 26200 may include a clock 26304 for tracking the time of day. This can be a real time clock (RTC), an atomic clock, or any type of clock capable of letting the robot know the time of day. Activity in cities, on farms or other environments may be correlated directly to time of day.

As described, the shy robot 26200 may include any number of sensors 26306. The sensors 26306 may include Infra-red (IR) and Passive Infra-red (PIR) sensors that may be used to detect the presence of humans or wildlife by the infra-red energy given off by that body. Ultrasound detectors may be used to detect proximate objects and the distance to those objects. The data from the ultrasound may help the robot navigate, and detect movement of objects in its range.

The sensors 26306 may include audiovisual (AV) sensors. The audio data may be used to detect the presence of humans, for example, as described with respect to FIG. 264. A microphone array may use angle of arrival of the sound as well as estimate the distance of the source of the sound. A camera may be used to obtain image data. The image data may be analyzed by any number of techniques including, for example, edge detection, three-dimensional image detection, and the like. For example, edge detection may be used to identify objects in the image, and to determine the size of the objects which may allow a determination as to the distance to the objects. Visual sensing may also include the detection of light levels. This can be fed to a context engine to correlate it with the time of day or the approach of lights from a vehicle, from a flash light, or a street light, as described with respect to FIG. 264.

The sensors 26306 may include D6T or thermal sensors. The D6T sensor is a sensor which may be configured to recognize the heat signature of a human. It may be used to detect human presence or movement, with different detection angles available. A combination of the detection angles may then provide wide coverage. However, the D6T sensors may be tuned to other heat signatures of interest.

The sensors 26306 may include a magnetometer (mag) to detect electronic fields, for example, emitted by phones. A microwave radar sensor may be incorporated to determine the distance to objects. The microwave radar sensors may be low cost additions to the shy robot 26200, improving both functionality and economics.

A propulsion system 26308 may be included in the robot to control its movement. The propulsion system 26308 may include any number of known robotics propulsion systems, such as twin track drives, which may be used to move the robot, or to turn the robot in different directions, for example, as one track is moved in a different direction than the other track. Other propulsion systems may include a three-wheel system in which two wheels are driven, and a third wheel is a coaster used complete a tripod. In this system, the direction the two wheels are driven in may be used to steer the robot. In other examples, different propulsion systems may be selected depending on the application. For example, the robot may be an autonomous water-based vehicle, for example, propelled by a jet drive, and using a rudder for steering. In other examples, the robot may be an unmanned aerial vehicle, using propulsion systems such as a hexacopter, a quadcopter, or an aerodynamic system using a propulsion system to develop lift over wings.

A geolocation system 26310 may use global positioning system (GPS) satellite receivers to determine the position, orientation, or both, to help navigate the shy robot 26200. The location data may be used by a swarm of shy robots to coordinate their movements and to communicate the presence of humans/wildlife entering and leaving zones within the robots' field of operation. This is discussed further with respect to FIG. 265

A robotics system 26312 may be included to control any robotics present in the device. For example, robotic systems may include devices for completing functions, such as retracting arms for trash pickup or automatic connecting to the charging station, and the like. The devices may include weatherproof doors, for example, covering external charging ports for user devices. The robotic system 26312 may include drivers that allow the processor to control devices such as stepper motors, solenoids, and the like.

The shy robot 26200 may include a charging system 26314. The charging system 26314 may include any number of battery monitoring and charging devices, as described herein. Further, the charging system 26314 may include automatic coupling systems to connect the charging system 263142 to external power for charging the battery 824. As described herein, any number of other devices may be included to assist in this, such as solar panels, and the like. Depending on the power draw, and the economics, the charging system 26314 may be eliminated and the device may monitor the battery and inform operators when the battery reserve reaches selected low limits, such as 10% remaining power, 5% remaining power, or less. In this example, the battery may be made easily replaceable, for example, by an operator to remove the depleted battery and slide in a charged battery. Other devices, such as supercapacitors, may be included to maintain clock settings, memory settings, and the like, while the battery is being replaced.

A power out system 26316 may be included to provide power to external devices. For example, the shy robot 26200 may also function as a charging station for user devices. The charging station may include USB connections, wireless power locations, and the like.

A network system 26318 may be included to provide communications between the shy robot 26200. The network system 26318 may include wireless, and/or wired technologies. The shy robot 26200 may be cloud connected, and/or may act as a member of a peer-to-peer network and/or swarm. While acting as a swarm, shy robots in a similar geographic region may share information of interest. In this scenario, the robots may pass information about human activity to other robots.

The mass storage 808 may include a number of modules to implement the functions for the shy robot 26200, as described herein. Although shown as code blocks in the mass storage 808, it may be understood that any of the modules may be fully or partially replaced with hardwired circuits, for example, built into an application specific integrated circuit (ASIC).

The mass storage 808 may include an operating system and basic input-output system (OS/BIOS) 26318. The OS/BIOS 26318 is the operating system for the shy robot 26200. The OS/BIOS 26318 may be a full OS, for example, of types used in more advanced systems, or may be an extended BIOS.

The mass storage 808 may include firmware and drivers (FW/Drivers) 26320 for the shy robot 26200. The FW/Drivers 26320 may include the drivers necessary to operate the sensors 26306, propulsion 26308, geolocation 26310, robotics 26312, and network systems 26318. Further, the FW/drivers 26320 may include drivers for discovering other devices, such as those issued by the open connectivity foundation (OCF) or the AllJoyn specifications issued by the AllSeen Alliance. The FW/Drivers 26320 may include code for forming fog devices, such as those for the open fog consortium (OFC), as described herein.

The mass storage 808 may include the context engine 26322. The context engine 26322 may provide functionality to the system, such as controlling motion, providing inter-robot communications, sending battery alerts, and the like. As described herein, the context engine 26322 may run from system memory, or may be in an application specific integrated circuit (ASIC) or floating-point gate array (FPGA).

FIG. 264 is a schematic diagram of the operation 26400 of the context engine 26322 in accordance with some embodiments. Like numbered items are as described with respect to FIG. 263. The operation 26400 may begin at block 26402, for example, when the robot is brought online.

Sensing 26404 may be performed to collect information to determine the presence of humans, wildlife, or other objects, such as trash or other target items, in the vicinity. The sensing unit 26306, described with respect to FIG. 263, provides the information needed to establish the presence of humans or wildlife in the vicinity.

For example, the motion or proximity detectors may detect if there is movement nearby. The movement may include humans, wildlife, or other objects, such as a plastic bag blowing in the wind. The movement determination may classify the type of movement to distinguish something that is alive from something that is not, such as the plastic bag.

The sensing 26404 may include a determination of the time of day. Different areas of the immediate vicinity, such as a park or a city street, may be busy at different times of the day. A learning algorithm may be incorporated to train the robot on times of the week which are busy or not. If certain times are always busy, the robot may be configured to limit motion during those time periods.

The sensing 26404 may include the use of the audio detectors to detect and classify the level and directions of sounds, to determine if the sounds are caused by human or animal sources and to determine the distance to the sounds to determine if they are caused by human or animal sources and determine the distance.

Once the sensing 26404 is finished, the context engine 26322 may normalize the sensor readings to values between 0 and 1 for further processing. It may perform this function by placing the observed value within the range of possible values detectable by the sensor, for example, using a weighting coefficient that places an emphasis on values that are within interesting ranges. Using an audio sensor as an example, if the audio sensor can detect sound in the range of 0 Hz to 40 Khz, and the range of interest is that of human hearing, for example, 20 Hz to 20 Khz, an observed value of 200 Hz may be calculated as (200/40 Khz)*1. If the observation fell outside of the range of interest, a coefficient less than 1 may be used.

For each sensor source, $S_n$ feeding into the context engine, the algorithm may be based on the following equation:

$$S_n = \mu\left(\frac{O_{sn}}{\text{Max}_{sn}}\right).$$

In this equation, $S_n$ are the values coming from Sensor n. The term μ is the weighting coefficient which has a value between 0 and 1. The weighting coefficient may be applied by any transform function across all the values possible, so that ranges of interest have values of 1 or close to 1 and ranges that are less interesting have values of 0 or close to 0. The term 0, is the specific observation value for the current reading from Sensor n. The term Max, is the maximum possible value from the sensor.

A decision to move 26406 may be made based on the particular readings from the sensors. The process ends at 26408. Weightings may also be applied to a sensor reading to weight the importance of the sensor reading versus other sensor readings. For example, a system designer may have determined that audio is a better indicator of human or animal presence than motion detectors. The decision to move variable, M, may have a value between 0 and 1. The decision making may be performed in several ways, for example, a weighted average value for M may be used. In this technique, an incoming value may have a weight, w, assigned to it, and the final value used to make the decision to move or not is a weighted average of those values:

$$M = \frac{\sum_{i=1}^{n} w_i Sn_i}{\sum_{i=1}^{n} w_i}.$$

A largest weighted value technique may be used, in which the largest weighted value is taken as the value for M:

$$M = \max(w_1 Sn_1, \ldots, w_i Sn_i).$$

In addition, the context engine 26322 may implement an alert monitor to accept alerts from neighboring robots in a swarm. As for other sensor readings, the output of the alert monitor may be a value between 0 and 1. The value may vary depending on the distance to the peer robot sending the alert. For example, a more distant peer robot may result in a lower reading, while a closer peer robot may result in a higher reading. Thus, a higher value may correspond to a higher probability that human or animal is going to come into the field of vision of the shy robot, and may have a higher influence on the decision making of the context engine.

Any number of other techniques may also be used in addition to, or instead of these, techniques. These may include, for example, machine learning, neural network, hardware assisted learning, and the like. For example, the sensor readings may be used as inputs to a pre-trained neural net, or to a hardware assisted learning platform, such as the ARC processor in the Intel Atlas Peak processors.

Once a decision to move is made, the robot navigates itself to the new location. Any number of techniques may be used to control the movement. For example, the robots may move in a fixed area around known, fixed obstacles, such as park benches, lamp post, particular sidewalk regions, and the like. The robots may follow painted lines, or buried lines on pavements or park paths. Further, the robots may incorporate technologies developed in the field of ADAS to navigate. The robots may be GPS directed along a prefixed route with designated "stop" points, or bases, where the robot may not move to the next base unless there was a high probability of doing so without causing disturbance. Alternatively, the robot may be permitted to stop anywhere along a route.

Robots operating in this fashion may gain greater benefits from combining their respective observations and alerting neighboring robots when activity is noticed in their region. This may be termed swarm operation. This may make it possible for robots to gain information beyond the direct range of their sensors and feed this into other robots, as described with respect to FIG. 265.

FIG. 265 is a schematic diagram of the operation 26500 of a swarm of shy robots in accordance with some embodiments. Collaboration of a robot with other autonomous SLAM robots may allow the performance of operations that cannot be achieved by a single unit. This process may involve a common communication, behavior, and security protocol establishment in a peer-to-peer and broadcast manner. Each robot, R, may have two general detection zones, an inner zone 26502, in which the sensing of activity may be conducted with high certainty of detection, and an outer zone 26504, in which the sensing activity may be conducted with less certainty. If a robot 26506 detects an object 26508 moving through one of the zones 26502 or 26504, it may send an alert message 26510 to nearest neighboring robots 26512 to inform them of the detection. The alert message 26510 may include information such as the motion and location of the object 26508, as well as the certainty of the detection.

As a swarm, the robots may perform any number of group tasks in addition to individual tasks. These may include such operations as hypothesis generation and testing, delegation of roles and sub-tasks to the collective, performance of tasks, validation of complete sub-tasks, data aggregation and analysis, reputation-based feedback, and reward mechanisms.

FIG. 266 is a process flow diagram of an example method 26600 for the operation of a shy robot in a swarm in accordance with some embodiments. The method 26600 of FIG. 266 may be implemented by the shy robot 26200 described with respect to FIGS. 262 and 263. The method may start at block 26602, for example, when the shy robot is powered up.

At block 26604, the shy robot boots the control system. This may include loading the operating system or enhance BIOS, then loading code or initializing any firmware. The shy robot may then load any drivers or other software you may need for the operation. This may be done as part of a secure boot process, for example, using a TPM to obtain measurements to create a TEE in the shy robot.

At block 26606, the robot may enumerate all the sensors available to it. These may include any set of the sensors described with respect to FIG. 263, including sensors that may not be located on the robot itself. These may be sensors located remotely, such as motion sensors placed on light poles, buildings, and other objects. Further, the robot may take advantage of sensors in other robots in a swarm. Thus, some of the robots in the swarm may have more advanced sensor systems than other robots in the swarm. Although the sensors may be built into the robot, sensors may be dynamically added during operation, by, for example, inserting the sensors into USB ports or similar expansion ports or slots and/or connecting them wirelessly.

At block 26608, the robot initializes its operation. As part of the initialization, policies are loaded. The policies may include rules for alerting, and any hard set or dynamic thresholds or coefficients used by the context engine. Policies may also be implemented to ensure the shy robots are in compliance with regulations, such as the FCC regulations on Unmanned Aircraft Systems (UAS). The context engine may also be initialized at that point.

At block 26610, the robot may begin normal operations, for example, by detecting a presence or motion, implementing goal oriented behavior, and the like. The connected sensors feed data to the context engine, which is analyzed as described with respect to FIG. 264.

At block 26612, a determination is made as to whether presence is detected. If so, at block 26614, an alert policy is checked to determine the action to shy robot should take upon detecting the presence, for example, with respect to alerting peers and stopping motion.

At block 26616, the robot may issue commands to its propulsion system to bring it to a stop. The robots may be stop immediately, or they may move to a closest pre-defined location to stop, depending on their function. If a robot is in a problematic location, such as in the middle of a cycling path, it may be directed to move to a point outside of the problematic location.

At block 26618, the shy robot may alert other robots in the swarm. The alert policy may include rules and thresholds as to which peers to alert, for example, the nearest neighbors first, or a direct broadcast alerts to all of the robots, among others. As a result, the alert policy may therefore improve the efficiency of the network traffic between the swarm nodes, by preferentially sending alerts to peer robots that are most likely to use the alerts.

Process flow then returns to block 26610, to resume the detection function. The shy robot may in some cases not move until the presence is no longer detected.

If no presence is detected at block 26620, a determination may be made as to whether the shy robot should move. The movement may be a continuation of previous movements in the absence of a detection, or new movement used complete a function, such as picking up a piece of trash near the shy robot.

At block 26622, the shy robot may use the geolocation techniques to obtain its current location. At block 26624, the shy robot may create a map using the current location, the location of a target, such as a piece of trash, and a path to reach the target. The robot may use any of several methods for mapping. It may use GPS to determine a location and compare that to maps downloaded from the internet. At block 26626, the propulsion system may be used to move the shy robot from the current location to the target location. The shy robot may follow electronic guidelines, such as wires or magnets, or optical guidelines, such as painted lines. Further, the shy robot may move in any number of directions necessary to complete a target task, such as picking up a piece of trash. In any case, in some embodiments, the robot has the option to move as long as no presence is detected.

FIG. 267 is a block diagram of a non-transitory, machine readable medium 26700 including code to direct a processor 902 to manage operations of shy robots. The processor 902 may access the non-transitory, machine readable medium 26700 over a bus 904. The processor 902 and bus 904 may be implemented in a manner similar to the processor 902 and bus 904 described with respect to FIG. 9. The non-transitory, machine readable medium 26700 may include devices described for the mass storage 808 of FIG. 8 or may include optical disks, thumb drives, or any number of other hardware devices.

The non-transitory, machine readable medium 26700 may include code 26702 to direct the processor 902 to boot a shy robot into a trusted execute environment (TEE). Code 26704 may be included to direct the processor 902 to discover sensors associated with the shy robot, including sensors built into the shy robot, external sensors, newly attached sensors, and sensors associated with other members of a robot swarm.

Code 26706 may be included to direct the processor 902 to initialize the robot, for example, loading policies and starting a context engine. Code 26708 may be included to direct the processor 902 to detect the presence of humans, wildlife, or other objects the shy robot needs to respond to, such as a vehicle or a bicycle, among others. These objects may be stored in a list of objects in a policy in the machine readable medium, wherein each object is associated with an action the shy robot is to perform. The action may include terminating motion, moving out of the way of the object, moving towards the object to collected, and the like.

Code 26710 may be included to direct the processor 902 to perform configured functions, for example, picking up trash, providing Internet communications, autonomously connecting to a charger unit, and the like. Code 26712 may be included to direct the processor 902 to move the shy robot to a new location, for example, to perform a function, charge the shy robot, move out of the way of approaching persons or traffic, and the like.

Code 26714 may be included to direct the processor 902 to communicate with other robots in a swarm. This may be performed to alert other robots as to the detection of a presence, to coordinate the performance of functions, and the like.

Any number of other code blocks may be included in the machine readable medium 26700 to implement functions of the IoT devices. These code blocks may include a communicator to build and transmit packets between IoT devices, a secure measurer to perform measurements for securely running code, a key generator, or any number of other code blocks as described herein.

In other applications, IoT power devices may be used to secure sites and provide services during events. Scenarios involving unexpected coordination of mobile IoT devices may include emergencies, dynamic traffic control, caravaning with multiple parties and destinations, package delivery and distribution, ride-sharing, or air traffic control, among many others.

Privacy and security may be considerations for each of these cases. If a device arrives at a scene without credentials it may not be known if the device may be a rogue device. Further, the events at a scene may be privacy sensitive. Thus, sensed scene conditions and awareness may be subject to collection and use controls of a traveler. As used herein, a traveler refers to the entity anticipating interactions at a scene.

In one example, a traveler anticipates following a route to a destination intersected by a series of way-points. The trip planner calculates the expected way-points that will be encountered during a trip. At each way-point, a pre-first responder jurisdiction is calculated. As described with respect to FIGS. 270 and 271, an emergency management (EM) tree structure may be used to generate keys that may be used by the traveler and pre-first responders, such as drones, robots, or self-guided vehicles, among others, to coordinate communications that are protected with keys generated from the EM trees.

FIG. 268 is a schematic diagram of a use case 26800 showing drones as pre-first responder devices to a scene within a jurisdiction in accordance with some embodiments. In the use case 26800, three jurisdictional scenarios may be considered when commissioning pre-first responder devices (PFRD) 26802 with security and privacy preserving cryptography. In a first exemplary use case illustrated in FIG. 268(A), a single jurisdiction 26806 is present, and all emergency responders 26804 are from that jurisdiction. The PFRD 26802 is authorized to function within the single jurisdiction 26806 on behalf of in types of emergency responders 26804. In FIG. 268(B), a PFRD 26802 is authorized to function within overlapping jurisdictions 26808 on behalf of N types of emergency responders 26804. In FIG. 268(C), a PFRD 26802 is authorized to function within three separate and distinct jurisdictions 26810 on behalf of N types of emergency responders 26804.

FIG. 269 is a process flow diagram of an example method 26900 for performing a joining and registration process associated with the single and multiple jurisdictional control zones in FIG. 268 in accordance with some embodiments. The method 26900 of FIG. 269 may be implemented by the PFRD 27400 described with respect to FIG. 274. The method may begin at block 26902, for example, when a pre-first responder device (PFRD) receives a command to participate in the event, such as an emergency situation.

At block 26904, the PFRD checks what jurisdictions it may be participating in. At block 26906, a determination is made that the PFRD is participating in a single jurisdiction, for example, as described with respect to FIG. 268(A). At block 26908, the PFRD negotiates key with the jurisdiction to allow communications. At block 26910, the PFRD registers with the single jurisdiction using the key.

At block 26912, a determination is made as to whether the registration was successful. If so, the communications task for the PFRD may begin at block 26914. If the registration was not successful, at block 26916, a jurisdictional control net is alerted.

At block 26918, a determination is made as to whether the PFRD may be participating in overlapping jurisdictions. If so, at block 26920 a shared key negotiation is conducted with the overlapping jurisdictions. As the jurisdictions do overlap a single key may be issued for communications into both jurisdictions.

At block 26922, an Issued key is used to register with jurisdiction $\mathbf{1}_{stack}$, prior to process flow returning to block 26912 to determine if registration was successful. At block 26924, the issue keys used to register with jurisdiction 2, prior to process flow returning to block 26912 to determine if the registration was successful. As illustrated at block 26926, the registration may continue through any number of other jurisdictions.

At block 26928, a determination is made as to whether there are multiple, non-overlapping jurisdictions that the PFRD may be participating in at same time. If so, individual key negotiations are carried out at block 26930 with each of the individual jurisdictions. Once keys are issued from each of the individual jurisdictions, process flow proceeds to block 26922 to begin the registration with each of the jurisdictions.

If no jurisdictions are identified at blocks 26906, 26918, or 26928, at block 26932, the PFRD may not be permitted to register with any of the jurisdictions. If the registration process fails for one or more of the jurisdictions, an alert is dispatched to the control net.

FIG. 270 is a schematic diagram of exemplary trip planning 27000 for an emergency responder (ER) 27002, or other entity, to determine a route 27004 to a destination in accordance with some embodiments. Trip planning 27000 anticipates the various scenes, way-points, locations, intersections and destinations along the route 27002. The trip planning 27004, may include alternate routes and last-minute or on-demand planning. At each way-point 27006, a location coordinate and anticipated time of arrival 27008 may be calculated. The granularity of time may be chosen to allow for early or late arrival. For each way-point 27006, an entropy multiplexing (EM) tree 27010 is found that maps way-points to jurisdictions where an expected PFRD community may be commissioned to respond. Given an emergency responder use case context, the PFRDs are commissioned with a branch of the EM tree 27010 developed by the traveler, ER 27008.

Trip information from the trip planning 27000 may include a random nonce value that is shared with potential PFRDs. This may be validated by the ER 27008 at a scene. The nonce ensures the PFRD is using the correct EM tree. Travel planning may include enrolling responders to a trip by issuing an EPID private key to each PFRD participant. The EPID may be used to authenticate PFRDs at the scene.

FIG. 271 is a schematic diagram of using EM sub-trees 27102 and 27104 at each waypoint in accordance with some embodiments. In this example, a first EM subtree 27102 represents an EM tree for a given location (A) and time (A-C). A second EM subtree 27104 represents another location (N) and time (A-C) further along the route. Each EM sub-tree 27102 and 27104 encodes time 27106 with decreasing granularity. PRFDs are provisioned with the EM sub-tree 27102 or 27104 that aligns with its jurisdiction taking into consideration the various permutations of jurisdictional coverage. For example, a separate sub-tree branch 27108 may be used to represent the overlap between multiple jurisdictions for increased privacy and security. Or a PFRD may be provisioned with several sub-tree branches 27110 allowing it to be deployed to these multiple jurisdictions.

FIG. 272 is a process flow diagram of an example method 27200 for dynamic configuration of a PFRD network at a scene in accordance with some embodiments. The method 27200 of FIG. 272 may be implemented by the PFRD 27400 described with respect to FIG. 274. The method 27200 may begin at block 27202, when an emergency responder, or other traveler, embarks to a target destination. At block 27204, a determination is made as to whether PFRD along the route are triggered. If so, at block 27206, policies are retrieved, for example, from a secure storage in a trusted execute environment (TEE). At block 27208, an initial flight plan policy provisioned in the TEE secure storage is loaded and activated. The flight plan policy may include specific operations that the PFRD is to complete. These may include such operations as detach from anchor point, hover, capture images, perform image recognition, and the like. In cases where other autonomous vehicles besides drones are used, such as autonomous surface vehicles, a mapping policy may be provisioned in TEE secure storage, which may include other activities, such as avoiding obstacles, controlling speed, and the like.

At block 27210, a determination is made as to whether there is poor network connectivity. If so, at block 27212, maximum connectivity policies are retrieved from the TEE secure storage and implemented. These policies may be based on current location, for example, including commands such as moved to a particular location to communicate with a tower.

At block 27214, a determination is made as to whether the PFRD is to honor the ER contract. If so, at block 27216, remote management policies are retrieved from the TEE secure storage and implemented. At block 27218, remote flight management may be allowed, so that the ER can collect further information. This may improve incident preparation and may be in addition to initial configured policies.

The method 27200 ends at block 27220. This may occur, for example, if a PFRD is not triggered at block 27204, or if an ER contract is not honored at block 27214.

FIG. 273 is a ladder diagram of an example method 27300 for beaconing scene information by a PFRD in accordance with some embodiments. The method 27300 of FIG. 273 may be implemented by the PFRD 27400 described with respect to FIG. 274. When a traveler, such as an emergency responder (ER) 27302, arrives at a scene, the keys used to encrypt messages between other devices authorized to participate at the scene are dynamically generated given the scene seed. A participant device may attest its authorization by signing the scene information from the trip planner 27304 with an EPID, and supplying it to the traveler to verify.

As the devices 27302 arrive at the scene, provisioning 27306 may occur to access policies, keys, and other information needed. This may be performed through an out of band (00B) provisioning access.

A trip plan 27308 may be provided to an ER 27302, through a trip plan message 27310 provided by the trip planner 27304. A determination 27312 may be made as to whether emergency responder support is needed. If so, the trip planner may identify 27314 emergency responders by using the EM tree to identify responders, and pinging each of the emergency responders for help. Beacon attestation messages 27316 may be exchanged between the trip planner 27304 and each of the ERs 27302. Further, the ERs 27302 may negotiate 27318 between themselves for resource allocation. An ER 27302 may then return a message 27320 acknowledging the beacon and informing the trip planner 27304 of the policies in use by that ER 27302.

FIG. 274 is a block diagram of an example of components that may be present in a pre-first responder drone (PFRD) 27400 in accordance with some embodiments. Like numbered items are as described with respect to FIGS. 8 and 263. It can be noted that different components may be selected and used for the PFRD 27400 than for those selected for the shy robot 26300 discussed with respect to FIG. 263, IoT device 800 discussed with respect to FIG. 8, and other IoT devices discussed herein. For example, the PFRD 27400 may be a drone, or other unmanned aerial vehicle. Accordingly, the propulsion system 26308 for the PFRD 27400 may be a hexacopter or quadcopter system. In some examples, the PFRD 27400 may be an aerodynamic flight vehicle, such as an unmanned aerodynamic aircraft.

The PFRD 27400 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. As used herein, a measurement is a hash code calculated on a code or data segment stored in the storage 808 or memory 804. Starting from a measurement of a boot code segment, the measurements may be used to establish a trusted execution environment (TEE) 26302, by creating a chain-of-trust from the initial booting. The SM may provide secure storage.

The TEE 26302 provides an area where processes which require hardware backed enclaves for protection can be run. Using the TPM, and other methods described herein, an attestation of the function and identity of the PFRD 27400 may be provided to other systems, including trip planners, emergency responders, cloud-based systems, and portable user devices, such as smart phones, among others.

A network system 26318 may be included to provide communications between the PFRD 27400. The network system 26318 may include wireless, or wired technologies. The PFRD 27400 may be cloud connected, or may act as a member of a peer-to-peer network or swarm. While acting as a swarm, PFRDs in a similar geographic region may share information of interest. In this scenario, the PFRDs may pass information about emergency responders, communication policies, events, and other relevant information to other PFRDs.

The mass storage 808 may include a number of modules to implement the functions for the PFRD 27400, as described herein. Although shown as code blocks in the mass storage 808, it may be understood that any of the modules may be fully or partially replaced with hardwired circuits, for example, built into an application specific integrated circuit (ASIC).

The mass storage 808 may include an operating system and basic input-output system (OS/BIOS) 26318. The OS/BIOS 26318 is the operating system for the PFRD 27400. The OS/BIOS 26318 may be a full OS, for example, of types used in more advanced systems, or may be an extended BIOS.

The mass storage 808 may include firmware and drivers (FW/Drivers) 26320 for the PFRD 27400. The FW/Drivers 26320 may include the drivers necessary to operate the sensors 26306, propulsion 26308, geolocation 26310, robotics 26312, and network systems 26318. Further, the FW/drivers 26320 may include drivers for discovering other devices, such as those issued by the open connectivity foundation (OCF) or the AllJoyn specifications issued by the AllSeen Alliance. The FW/Drivers 26320 may include code for forming fog devices, such as those for the open fog consortium (OFC), as described herein.

The mass storage 808 may include a scene assessment controller 27402. The scene assessment controller may provide functionality to the system, such as controlling motion, image capture and transfer, network provision to user devices, inter-device communications, battery alerts, and the like. As described herein, the scene assessment controller 27402 may run from system memory, or may be in an application specific integrated circuit (ASIC) or floating-point gate array (FPGA).

In the PFRD 27400, hardware may enhance trust, for example, by segmenting EM seeds in secure storage and using trusted execution environment technology, such as Intel SGX, Intel CSME, Intel VTx, or other systems. Use of Intel DRNG may enhance the quality and performance of tree generation, such that constrained devices may feasibly generate keys dynamically from the stored seed value.

FIG. 275 is a block diagram of a non-transitory, machine readable medium 27500 including code to direct a processor 902 to manage operations of pre-first responder devices in accordance with some embodiments. The processor 902 may access the non-transitory, machine readable medium 27500 over a bus 904. The processor 902 and bus 904 may be implemented in a manner similar to the processor 902 and bus 904 described with respect to FIG. 9. The non-transitory, machine readable medium 27500 may include devices described for the mass storage 808 of FIG. 8 or may include optical disks, thumb drives, or any number of other hardware devices.

The non-transitory, machine readable medium 27500 may include code 27502 to direct the processor 902 to trigger a PFRD, for example, when an emergency responder enters a jurisdiction for the PFRD. Code 27504 may be included to direct the processor 902 to retrieve policies for automated operations, such as flight operations including hovering, capturing images, and the like.

Code 27506 may be included to direct the processor 902 to accept trip plans for the trip planner, and provide the trip plans to emergency responders. Code 27508 may be included to direct the processor 902 to detect poor network conductivity and implement policies for communications.

Code 27510 may be included to direct the processor 902 to implement remote management functions, such as allowing an emergency responder to control the PFRD for data collection. Code 27512 may be included to direct the processor 902 to allow remote operations management, for example, in a remote control mode. Code 27514 may be included to direct the processor 902 to provide remote network access to users.

Any number of other code blocks may be included in the machine readable medium 27500 to implement functions of the IoT devices. These code blocks may include a communicator to build and transmit packets between IoT devices, a secure measurer to perform measurements for securely running code, a key generator, or any number of other code blocks as described herein.

Example 1 includes an apparatus. The apparatus includes a composite object which includes a device owner This also includes a name server to provide names to sub-objects forming the composite object, and a sub-object list of the sub-objects forming the composite object, and a plurality of sub-objects forming the composite object, and a blockchain recording the sub-objects forming the composite object.

Example 2 includes the subject matter of example 1. In example 2, a sub-object includes a composite object formed from lower level sub-objects.

Example 3 includes the subject matter of either of examples 1 or 2. In example 3, a sub-object includes an atomic object.

Example 4 includes the subject matter of any of examples 1 to 3. In example 4, the name of the composite object includes a hash calculated from the names of the plurality of sub-objects.

Example 5 includes the subject matter of any of examples 1 to 4. In example 5, each sub-object includes a group key permitting the sub-object to act on behalf of the group.

Example 6 includes the subject matter of any of examples 1 to 5. In example 6, the device owner includes an EPID server.

Example 7 includes the subject matter of any of examples 1 to 6. In example 7, the device owner includes a proxy broker.

Example 8 includes the subject matter of any of examples 1 to 7. In example 8, the device owner includes a blockchain.

Example 9 includes the subject matter of any of examples 1 to 8. In example 9, the blockchain includes a record of the composite object.

Example 10 includes a method for forming a composite object in an IoT network. The method for forming a composite object in an IoT network includes building a list of sub-objects in a device owner, creating a collection group identifier, committing the collection group identifier to a blockchain in a blockchain transaction, and obtaining a group name from the blockchain in the name server.

Example 11 includes the subject matter of example 10. In example 11, the method includes determining, from the blockchain, if the collection group identifier is already in use, and, if so, generating a new collection group identifier.

Example 12 includes the subject matter of either of examples 10 or 11. In example 12, the method includes accepting a join request from a sub-object, confirming that the sub-object is a group member, looking up the name of the sub-object in the blockchain, and providing a group key to the sub-object from the name server.

Example 13 includes the subject matter of any of examples 10 to 12. In example 13, the method includes determining if group membership is private, and, if so, providing a group key to the sub-object from the device owner acting as a proxy to the name server.

Example 14 includes the subject matter of any of examples 10 to 13. In example 14, the method includes creating the collection group identifier by combining the names of the sub-object to form a combination, and calculating a hash code of the combination.

Example 15 includes the subject matter of any of examples 10 to 14. In example 15, the method includes creating a name for a sub-object by combining the names of all sub-sub-objects forming the sub-object to form a combination, and calculating a hash code of the combination.

Example 16 includes the subject matter of any of examples 10 to 15. In example 16, the method includes confirming that blockchain transaction is valid in a group of devices in a mesh network, and reversing the blockchain transaction if not valid.

Example 17 includes a non-transitory, machine readable medium. The non-transitory, machine readable medium includes instructions to direct a processor to store a list of sub-objects for a group, calculate a collection group identity for the group, and provide group identity credentials to sub-objects in the group.

Example 18 includes the subject matter of any of example 17. In example 18, the non-transitory, machine readable medium includes instructions to direct the processor to act as a proxy server for sub-objects.

Example 19 includes the subject matter of either of examples 17 or 18. In example 19, the non-transitory, machine readable medium includes instructions to direct the processor to commit a transaction including a collection group identity to a blockchain, and migrate the blockchain to other devices in a mesh.

Example 20 includes the subject matter of any of examples 17 to 19, including a blockchain including transaction blocks to 20. In example 20, a transaction block includes a collection group identity.

Example 21 includes an apparatus that includes a composite object. This includes a device owner including a type name server to create type names for the composite object, and a blockchain including a transaction including types of sub-objects forming the composite object.

Example 22 includes the subject matter of example 21. In example 22, the apparatus includes a type inspector to determine the types of sub-objects including the composite object.

Example 23 includes the subject matter of either of examples 21 and 22. In example 23, the type inspector includes a type introspection system.

Example 24 includes the subject matter of any of examples 21 to 23. In example 24, the type inspector includes a type attestation system.

Example 25 includes the subject matter of any of examples 21 to 24. In example 25, the apparatus includes a type graph generator to generate a type graph of types of sub-sub-objects forming the sub-objects.

Example 26 includes the subject matter of any of examples 21 to 25. In example 26, the apparatus includes a type name calculator to generate a type name from a type graph.

Example 27 includes the subject matter of any of examples 21 to 26. In example 27, the transaction includes a type graph.

Example 28 includes the subject matter of any of examples 21 to 27. In example 28, an object includes a type credential.

Example 29 includes the subject matter of any of examples 21 to 28. In example 29, a type credential includes a manufacturer's key.

Example 30 includes the subject matter of any of examples 21 to 29. In example 30, the type credential is provided by a name server.

Example 31 includes the subject matter of any of examples 21 to 30. In example 31, a sub-object includes sub-sub-objects, and the type name of the sub-object is determined from the types of the sub-sub-objects.

Example 32 includes the subject matter of any of examples 21 to 31. In example 32, the apparatus includes a type graph generated by a sub-object including the types of the sub-sub-objects.

Example 33 includes a method for creating an object type in an IoT network. The method for creating an object type in an IoT network includes requesting a creation of a type group by a name server, performing a type inspection of sub-objects making up a composite object to build a type graph of objects forming the composite object, calculating a type group name from the type graph, and accessing a blockchain to determine if type group name is already created.

Example 34 includes the subject matter of example 33. In example 34, the method includes creating the type group name by writing a transaction including the type graph to the blockchain.

Example 35 includes the subject matter of either of examples 33 or 34. In example 35, the method includes issuing an EPID join request from the name server to the composite object.

Example 36 includes the subject matter of any of examples 33 to 35. In example 36, the method includes issuing type credentials to the sub-objects forming the composite object.

Example 37 includes the subject matter of any of examples 33 to 36. In example 37, the name server requests the composite object perform the type inspection.

Example 38 includes the subject matter of any of examples 33 to 37. In example 38, the type inspection includes a recursive introspection of the sub-objects forming the composite object.

Example 39 includes the subject matter of any of examples 33 to 38. In example 39, the recursive introspection includes sending a type introspection request to each of the sub-objects forming the composite object, performing a type introspection to determine a type for each sub-sub-object forming the sub-object, building a type graph at each of the sub-objects that are formed from sub-sub-objects, returning the type graphs to the composite object, and verifying signatures on the type graphs.

Example 40 includes the subject matter of any of examples 33 to 39. In example 40, the method includes performing a recursive type introspection from each sub-sub-object to lower level objects in a hierarchy, building a type graph for objects at each level of the hierarchy, and returning the type graph to a next higher level of the hierarchy.

Example 41 includes the subject matter of any of examples 33 to 40. In example 41, the type inspection includes performing a recursive attestation of the sub-objects forming the composite object.

Example 42 includes the subject matter of any of examples 33 to 41. In example 42, the recursive attestation includes sending a type attestation request from each level to objects at a next lower level, returning a type graph of all objects making up the objects at a particular level of a hierarchy to a next higher level, and building an overall type graph in the composite object.

Example 43 includes a non-transitory, machine readable medium. The non-transitory, machine readable medium includes instructions to direct a processor to build a type graph of objects forming a composite object, calculate a type name for the composite object, and record the type name and type graph in a blockchain.

Example 44 includes the subject matter of example 43. In example 44, the non-transitory, machine readable medium includes instructions to direct the processor to perform a recursive type introspection of the objects forming the composite object.

Example 45 includes the subject matter of either of examples 43 or 44. In example 45, the non-transitory, machine readable medium includes instructions to direct the processor to perform a recursive type attestation of the objects forming the composite object.

Example 46 includes the subject matter of any of examples 43 to 45. In example 46, the non-transitory, machine readable medium includes instructions to direct the processor to create the type name if not present in the blockchain.

Example 47 includes the subject matter of any of examples 43 to 46. In example 47, the non-transitory, machine readable medium includes sending an EPID join request to a sub-object with a type credential.

Example 48 includes an apparatus. The apparatus includes a coalition group, including a coalition group name server to provide names to objects forming the coalition group, a coalition group member list of the objects belonging to the coalition group, and a blockchain recording the names of the objects forming the coalition group.

Example 49 includes the subject matter of example 48. In example 49, the apparatus includes a publisher to broadcast a coalition group existence.

Example 50 includes the subject matter of either of examples 48 or 49. In example 50, the apparatus includes a credential verifier to confirm an identity credential received from an object.

Example 51 includes the subject matter of any of examples 48 to 50. In example 51, the apparatus includes an EPID server to provide a credential to an object to join the coalition group.

Example 52 includes the subject matter of any of examples 48 to 51. In example 52, the apparatus includes a device owner to verify an identity credential from an object and provide a coalition group credential to the object, and a plurality of objects that each have a coalition group credential indicating membership in the coalition group.

Example 53 includes the subject matter of any of examples 48 to 52. In example 53, objects in the coalition group are grouped by location.

Example 54 includes the subject matter of any of examples 48 to 53. In example 54, objects in the coalition group are grouped by function.

Example 55 includes a method for forming a coalition group in an IoT network. The method for forming a coalition group in an IoT network includes defining a coalition group, receiving a request from an object to join the coalition group, and issuing coalition group credentials to the object.

Example 56 includes the subject matter of example 55. In example 56, defining the coalition group includes grouping devices by location.

Example 57 includes the subject matter of either of examples 55 or 56. In example 57, defining the coalition group includes grouping devices by function.

Example 58 includes the subject matter of any of examples 55 to 57. In example 58, the method includes publishing the coalition group to a blockchain if the coalition group is not discoverable.

Example 59 includes the subject matter of any of examples 55 to 58. In example 59, the method includes verifying the request before issuing the coalition group credentials.

Example 60 includes the subject matter of any of examples 59 to 59. In example 60, the method includes verifying the request by confirming that the request includes a valid identity credential.

Example 61 includes the subject matter of any of examples 59 to 60. In example 61, the method includes verifying the request by confirming that the request includes a valid instance credential.

Example 62 includes the subject matter of any of examples 59 to 61. In example 62, the method includes verifying the request by confirming that the request includes a valid type credential.

Example 63 includes a non-transitory, machine readable medium. The non-transitory, machine readable medium includes instructions to direct a processor to define a coalition group, publish the coalition group to a blockchain, and accept a join request from an object.

Example 64 includes the subject matter of example 63. In example 64, the non-transitory, machine readable medium includes instructions to direct the processor to confirm that the coalition group is discoverable.

Example 65 includes the subject matter of either of examples 63 or 64. In example 65, the non-transitory, machine readable medium includes instructions to direct the processor to confirm if the join request from the object is valid.

Example 66 includes the subject matter of any of examples 63 to 65. In example 66, the non-transitory, machine readable medium includes instructions to direct the processor to issue credentials in response to a valid join request.

Example 67 includes the subject matter of any of examples 63 to 66. In example 67, the non-transitory, machine readable medium includes instructions to direct the processor to generate EPID credentials.

Example 68 includes an apparatus. The apparatus includes a trusted communications environment, including a primary participant including a group creator to initiate creation of a trusted group, and a distributed ledger to store identities and credential for group members. The apparatus also includes a secondary participant including communication credentials for the trusted group provided by the primary participant.

Example 69 includes the subject matter of example 68. In example 69, the communications credentials include a private key for the trusted group, and a transaction key obtained from the distributed ledger.

Example 70 includes the subject matter of either of examples 68 or 69. In example 70, the primary participant includes a join request for a distributed ledger enumeration authority (DLEA), wherein the join request includes a trusted group name signed with a private key for the primary participant.

Example 71 includes the subject matter of any of examples 68 to 70. In example 71, the apparatus includes a distributed ledger enumeration authority (DLEA) accessor to determine if a trusted group name was created.

Example 72 includes the subject matter of any of examples 68 to 71, including the distributed ledger to 72. In example 72, the distributed ledger includes a public key for the trusted group and a permissioning policy.

Example 73 includes the subject matter of any of examples 68 to 72. In example 73, the primary participant includes a key creator to create a key based, at least in part, on a trusted group name.

Example 74 includes the subject matter of any of examples 68 to 73. In example 74, the apparatus includes an attestation validator to validate a join request from the secondary participant.

Example 75 includes the subject matter of any of examples 68 to 74. In example 75, the apparatus includes a group joiner to issue the communication credentials to the secondary participant.

Example 76 includes the subject matter of any of examples 68 to 75. In example 76, the apparatus includes a tertiary participant including secondary communication credentials for the trusted group provided by the secondary participant.

Example 77 includes the subject matter of any of examples 68 to 76. In example 77, the secondary communication credentials include a private key for the group and a secondary transaction key.

Example 78 includes the subject matter of any of examples 68 to 77. In example 78, the apparatus includes a plurality of secondary participants including communication credentials issued by the primary participant.

Example 79 includes the subject matter of any of examples 68 to 78. In example 79, the apparatus includes a plurality of tertiary participants each including secondary communication credentials issued by the primary participant.

Example 80 includes the subject matter of any of examples 68 to 79. In example 80, the distributed ledger includes transaction data signed by a group key and a private key for a participant.

Example 81 includes a method for securing communications transactions in an IoT network. The method for securing communications transactions in an IoT network includes determining by a first participant that a group of participants can communicate with integrity assurances, reserving a name for the group from a distributed ledger enumeration authority (DLEA), establishing a distributed ledger for the group using the name, and providing a private key for the group to a second participant.

Example 82 includes the subject matter of example 81. In example 82, reserving the name includes sending the name and a public key for the first participant to the DLEA in a message signed using a private key for the first participant, determining that the group has been created when the DLEA commits the name to a public distributed ledger, and establishing a group public key using an enhanced privacy identification (EPID) system.

Example 83 includes the subject matter of either of examples 81 or 82. In example 83, establishing the distributed ledger for the group includes committing a transaction from the first participant to the group distributed ledger, wherein the transaction includes a group public key and a permissioning policy, signed by a transaction key for the first participant.

Example 84 includes the subject matter of any of examples 81 to 83. In example 84, providing a private key includes receiving a join request from the second participant requesting permission to join the group, and validating trustworthiness of the second participant.

Example 85 includes the subject matter of any of examples 81 to 84. In example 85, validating trustworthiness includes verifying a manufacturers key used to sign the join request.

Example 86 includes the subject matter of any of examples 81 to 85. In example 86, the method includes generating a second private key for the group in the second participant, wherein the second private key is under a group public key, sending a message to the first participant, wherein the message is a public key for the second participant, signed by the second private key, and committing a transaction to the group distributed ledger, wherein the transaction includes the second participant's public key, signed by the private key.

Example 87 includes the subject matter of any of examples 81 to 86. In example 87, the method includes creating a join request in a third participant, wherein the join request includes a third participant transaction key signed by a private key for the third participant, sending the join request to the second participant, signing the join request by the second participant with a public key for the third participant, a transaction key for the second participant, and the group key to create a signed transaction, and sending the signed transaction back to the third participant.

Example 88 includes the subject matter of any of examples 81 to 87. In example 88, the method includes including transaction data from the second participant in the signed transaction.

Example 89 includes the subject matter of any of examples 81 to 88. In example 89, the method includes signing the signed transaction with a private group key for the third participant, and committing the signed transaction to the group distributed ledger.

Example 90 includes the subject matter of any of examples 81 to 89. In example 90, the method includes signing transaction data at the second participant using the private group key for the second participant, and committing the transaction data to the group distributed ledger.

Example 91 includes a non-transitory, machine readable medium. The non-transitory, machine readable medium includes instructions to direct a processor to determine that a group has integrity assurances, reserve a group name with a distributed ledger enumeration authority (DLEA), create a group public key and a permissioning policy, and commit the group name and group public key to a group distributed ledger.

Example 92 includes the subject matter of example 91. In example 92, the non-transitory, machine readable medium includes instructions to direct the processor to validate a join request from a second participant, and send a join message to the second participant, wherein the join request includes a group private key.

Example 93 includes the subject matter of either of examples 91 or 92. In example 93, the non-transitory, machine readable medium includes instructions to direct the processor to sign transaction data with a group private key, and commit the signed transaction data to the group distributed ledger.

Example 94 includes an apparatus. The apparatus includes an IoT network, wherein the IoT network includes a trusted execution environment (TEE). This also includes a chain history for a blockchain, wherein the chain history includes a whitelist of hash signatures, a root-of-trust for chaining (RTC) to provide the chain history to local computing roots-of-trust, and a root-of-trust for archives (RTA) to provide an archive function to constrained devices in the IoT network.

Example 95 includes the subject matter of example 94. In example 95, the TEE includes a root-of-trust measurer (RTM) to verify a first loadable object in a system.

Example 96 includes the subject matter of either of examples 94 or 95. In example 96, the TEE includes a root-of-trust for reporting (RTR) to attest to values in a root-of-trust for storage, and the root of trust for storage (RTS) to store values for root-of-trust devices.

Example 97 includes the subject matter of any of examples 94 to 96. In example 97, the TEE includes blockchain logic to migrate the chain history to other devices and verify chain histories from other devices.

Example 98 includes the subject matter of any of examples 94 to 97. In example 98, the TEE includes a whitelist history including current configurations, past configurations, or anticipated configurations or any combinations thereof.

Example 99 includes the subject matter of any of examples 94 to 98. In example 99, the TEE includes including a measurement history to record measurements made during a boot process.

Example 100 includes the subject matter of any of examples 94 to 99. In example 100, the measurement history includes measurement logs from multiple boot sequences.

Example 101 includes the subject matter of any of examples 94 to 100. In example 101, the apparatus includes a mesh network of devices that boot into a trusted environment.

Example 102 includes the subject matter of any of examples 94 to 101. In example 102, the chain history includes a blockchain block that includes a plurality of values from platform control registers (PCRs) that are each signed by an attestation key.

Example 103 includes the subject matter of any of examples 94 to 102. In example 103, the blockchain block includes a block-signing key.

Example 104 includes the subject matter of any of examples 94 to 103. In example 104, the apparatus includes an image repository storing whitelist values.

Example 105 includes the subject matter of any of examples 94 to 104. In example 105, the chain history includes a blockchain block that includes a plurality of manifests of whitelist images that are each signed by a manufacturers attestation key.

Example 106 includes the subject matter of any of examples 94 to 105. In example 106, the blockchain block includes a block-signing key.

Example 107 includes a method for securely booting a device in an IoT network. The method for securely booting a device in an IoT network includes measuring a code object before running the code object, comparing the measurement to a known good image retrieved from a blockchain, and running the code object if the measurement matches the known good image.

Example 108 includes the subject matter of example 107. In example 108, the method includes comparing the measurement to a known bad image retrieved from a blockchain, quarantining the device if the measurement matches the known bad image, and remediating the code if the measurement matches the known bad image.

Example 109 includes the subject matter of either of examples 107 or 108. In example 109, the method includes following a predefined policy if the measurement does not match a known good image or a known bad image.

Example 110 includes the subject matter of any of examples 107 to 109. In example 110, the predefined policy instructs the device to boot into an untrusted state and not communicate with trusted devices.

Example 111 includes the subject matter of any of examples 107 to 110. In example 111, the method includes obtaining the image for a measurement from a cloud repository, confirming that a signature for the image is valid, confirming that the image is a hash of a bootchain, signing a manifest for the image, adding the image to a whitelist, and committing the whitelist to a blockchain.

Example 112 includes the subject matter of any of examples 107 to 111. In example 112, the method includes determining that an image is not of a bootchain, determining that the image is an attack image, adding the attack image to a blacklist, and committing the blacklist to a blockchain.

Example 113 includes the subject matter of any of examples 107 to 112. In example 113, the method includes determining that an image is not of a bootchain, determining that the image is an unknown image, adding the unknown image to an unclassified list, and committing the unclassified list to a blockchain.

Example 114 includes the subject matter of any of examples 107 to 113. In example 114, the method includes creating a block including an image of a successfully run code block, and committing the block to the blockchain.

Example 115 includes the subject matter of any of examples 107 to 114. In example 115, the method includes creating a block including an image of a rejected code block, and committing the block to the blockchain.

Example 116 includes a non-transitory, machine readable medium. The non-transitory, machine readable medium includes instructions to direct a processor to measure a code object before running the object to obtain a measurement, compare the measurement to a known good image retrieved from a blockchain, and classify the code object as good if there is a match between the measurement and the known good image.

Example 117 includes the subject matter of examples 116. In example 117, the non-transitory, machine readable medium includes instructions to direct the processor to compare the measurement to a known bad image, and prevent the code object from running if the measurement matches the known bad image.

Example 118 includes the subject matter of either of examples 116 or 117. In example 118, the non-transitory, machine readable medium includes instructions to direct the processor to maintain a blockchain including a chain history, and maintain root-of-trust measurements in the blockchain.

Example 119 includes an apparatus. The apparatus includes an IoT device, the IoT device including an easement system to control a network layer used to provide access rights to allow traffic to flow through the IoT device, and an easement layer in a networking stack, the easement layer to route packets through the IoT device below the application layer.

Example 120 includes the subject matter of examples 119. In example 120, the access rights are based, at least in part, on identity, authorization, payment, or time.

Example 121 includes the subject matter of either of examples 119 or 120. In example 121, the apparatus includes a mesh network of devices that couple across two domains, wherein each of the two domains use a different communications protocol.

Example 122 includes the subject matter of any of examples 119 to 121. In example 122, the IoT device includes an edge device between the two domains.

Example 123 includes the subject matter of any of examples 119 to 122. In example 123, the easement system translates a packet from a protocol used by a first domain to a protocol used by a second domain.

Example 124 includes the subject matter of any of examples 119 to 123. In example 124, the IoT device includes an application/service manager to interface with applications and manage the network stack for communications.

Example 125 includes the subject matter of any of examples 119 to 124. In example 125, the application/service manager is to provide an application operating environment, such as an operating system and a programming interface for communicating packets to other mesh devices.

Example 126 includes the subject matter of any of examples 119 to 125. In example 126, the IoT device includes a payment/credit manager to handle micropayments for communications.

Example 127 includes the subject matter of any of examples 119 to 126. In example 127, the IoT device includes a timing subsystem to time communications.

Example 128 includes the subject matter of any of examples 119 to 127. In example 128, the IoT device includes blockchain logic to access and maintain a blockchain of communication permissions, payments, or credits, or any combinations thereof.

Example 129 includes the subject matter of any of examples 119 to 128. In example 129, the IoT device includes blockchain logic to migrate a blockchain to other devices and verify a blockchain transferred from another device.

Example 130 includes a method for using an easement system for communications in an IoT network. The method for using an easement system for communications in an IoT network includes transferring a packet from a first device to a second device through an easement layer, wherein the easement layer is in a network stack below an application layer.

Example 131 includes the subject matter of any of examples 130 to 131. In example 131, the method includes sending a routing request to a device registrar receiving permission from the device registrar, and routing a packet through the easement layer.

Example 132 includes the subject matter of example 130. In example 132, the method includes sending a routing completed notice to the device registrar.

Example 133 includes the subject matter of either of examples 130 or 132. In example 133, the method includes accepting a payment from the device registrar Example 134 includes the subject matter of any of examples 130 to 133. In example 134, the method includes sending a routing request to a device registrar receiving a deny decision from the device registrar, and deleting the packet.

Example 135 includes the subject matter of any of examples 130 to 134. In example 135, the method includes looking up the requester to determine if the request is authorized, checking a record to determine if sufficient credit exists for data transfer, and sending a message to authorize the transfer of the packet.

Example 136 includes the subject matter of any of examples 130 to 135. In example 136, the method includes looking up the requester to determine if the request is authorized, checking a record to calculate a lease time, and sending a message to grant a time limited lease for communications.

Example 137 includes the subject matter of any of examples 130 to 136. In example 137, the method includes releasing an escrowed payment for the transfer of the packet.

Example 138 includes the subject matter of any of examples 130 to 137. In example 138, the method includes invalidating a timed lease for communications, and sending a message to notify a device of the expiration.

Example 139 includes a non-transitory, machine readable medium. The non-transitory, machine readable medium includes instructions that, when executed, direct a processor to route a packet through an easement layer in an internet-of-things (IoT) device, based, at least in part, on an authorization for the packet.

Example 140 includes the subject matter of example 139. In example 140, the non-transitory, machine readable medium includes instructions that, when executed, direct the processor to send a routing request to a device registrar to obtain the authorization to route the packet.

Example 141 includes the subject matter of either of examples 139 or 140. In example 141, the non-transitory, machine readable medium includes instructions that, when executed, direct the processor to send a completion notification to a device registrar after a communication including the packet is finished.

Example 142 includes the subject matter of any of examples 139 to 141. In example 142, the non-transitory, machine readable medium includes instructions that, when executed, direct the processor to accept a payment for transferring the packet from a device registrar.

Example 143 includes the subject matter of any of examples 139 to 142. In example 143, the non-transitory, machine readable medium includes instructions that, when executed, direct the processor to lookup a requester to determine an authorization.

Example 144 includes the subject matter of any of examples 139 to 143. In example 144, the non-transitory, machine readable medium includes instructions that, when executed, direct the processor to determine if sufficient credit is present to pay for the transfer of the packet.

Example 145 includes the subject matter of any of examples 139 to 144. In example 145, the non-transitory, machine readable medium includes instructions that, when executed, direct the processor to calculate a lease time for a communication including the packet.

Example 146 includes the subject matter of any of examples 139 to 145. In example 146, the non-transitory, machine readable medium includes instructions that, when executed, direct the processor to communicate an authorization, a lease time, or both to the IoT device.

Example 147 includes the subject matter of any of examples 139 to 146. In example 147, the non-transitory, machine readable medium includes instructions that, when executed, direct the processor to terminate the lease and inform the IoT device of the termination.

Example 148 includes an apparatus. The apparatus includes an Internet-of-Things (IoT) network, wherein the IoT network includes an IoT device, including a proof-of-provenance (PoP) key calculator to calculate a PoP key identifying that a packet has been transmitted by the IoT device, a packet builder to append the PoP key to the packet, and a communicator to send the packet to another device.

Example 149 includes the subject matter of example 148. In example 149, the IoT device includes an ingress key calculator to determine an ingress key.

Example 150 includes the subject matter of either of examples 148 or 149. In example 150, the ingress key calculator includes a packet reader to identify a previous PoP key in the packet, and set the ingress key to the previous PoP key.

Example 151 includes the subject matter of any of examples 148 to 150. In example 151, the ingress key calculator includes a random number generator to calculate the ingress key.

Example 152 includes the subject matter of any of examples 148 to 151. In example 152, the IoT device includes a device key.

Example 153 includes the subject matter of any of examples 148 to 152. In example 153, the device key is a manufacturer's key programmed into the device.

Example 154 includes the subject matter of any of examples 148 to 153. In example 154, the device key is obtained from a blockchain.

Example 155 includes the subject matter of any of examples 148 to 154. In example 155, the PoP key calculator includes a function to combine an ingress key and a device key to form the PoP key.

Example 156 includes the subject matter of any of examples 148 to 155. In example 156, the IoT device includes a PoP sequence verifier to confirm that a sequence of PoP keys in a packet are authorized.

Example 157 includes the subject matter of any of examples 148 to 156. In example 157, the apparatus includes a plurality of devices, each of the devices including a PoP key calculator to calculate a PoP key for a received packet, a packet builder to append the PoP key to the packet, and a communicator to send the packet to another device.

Example 158 includes the subject matter of example 157. In example 158, the communicator includes a protocol translator to translate the packet to a new protocol.

Example 159 includes the subject matter of either examples 157 and 158, including a packet to 159. In example 159, the packet includes a plurality of placeholders for PoP keys.

Example 160 includes a method for transferring a packet between devices with a proof-of-provenance (PoP) for the packet. The method for transferring a packet between devices with a proof-of-provenance (PoP) for the packet includes receiving the packet from a device, determining an ingress key from the packet, calculating a PoP key for packet, appending the PoP key to the packet, and sending the packet to another device.

Example 161 includes the subject matter of example 160. In example 161, the method includes obtaining a device key from a blockchain.

Example 162 includes the subject matter of either of examples 160 or 161. In example 162, the method includes calculating the PoP as a function of the ingress key and a device key.

Example 163 includes the subject matter of any of examples 160 to 162. In example 163, the method includes extracting a PoP key from a packet, tokenizing the key, verifying the PoP token, and reporting a result for the verification.

Example 164 includes the subject matter of any of examples 160 to 163. In example 164, verifying the result includes performing a function to combine the PoP token with a common secret key to confirm an identity of a transmitting device.

Example 165 includes the subject matter of any of examples 160 to 164. In example 165, reporting the result includes informing other devices of the fault.

Example 166 includes a non-transitory, machine readable medium. The non-transitory, machine readable medium includes instructions that, when executed, direct a processor to read a received packet to identify an ingress key, calculate a proof-of-provenance (PoP) key, based, at least in part, on the ingress key, append the PoP key to the packet, and transmit the packet to a receiving device.

Example 167 includes the subject matter of example 166. In example 167, the non-transitory, machine readable medium includes instructions that, when executed, direct the processor to obtain a device key from a blockchain.

Example 168 includes the subject matter of either of examples 166 or 167. In example 168, the non-transitory, machine readable medium includes instructions that, when executed, direct the processor to generate a device key.

Example 169 includes the subject matter of any of examples 166 to 168. In example 169, the non-transitory, machine readable medium includes instructions that, when executed, direct the processor to perform a function on the ingress key and a device key to calculate the PoP key.

Example 170 includes the subject matter of any of examples 166 to 169. In example 170, the non-transitory, machine readable medium includes instructions that, when executed, direct the processor to verify a sequence of PoP keys in the packet.

Example 171 includes the subject matter of any of examples 166 to 170. In example 171, the non-transitory, machine readable medium includes instructions that, when executed, direct the processor to report a result for the verification to another device.

Example 172 includes an apparatus. The apparatus includes an Internet-of-Things (IoT) network, wherein the IoT network includes an IoT device. The IoT device includes a communicator to accept a communication and to send the communication, a data parser to parse metadata in a communication to identify a token bucket, a payment calculator to calculate a payment required for transmitting the communication, a payment extractor to deduct the payment from the token bucket and update the metadata, and a frame builder to rebuild the communication with the updated metadata.

Example 173 includes the subject matter of example 172. In example 173, the communicator is to translate the communication between protocols, or to perform a proof-of-provenance addition to the communication, or both.

Example 174 includes the subject matter of either of examples 172 or 173. In example 174, the apparatus includes an easement system.

Example 175 includes the subject matter of any of examples 172 to 174. In example 175, the data parser is to decrypt the token bucket.

Example 176 includes the subject matter of any of examples 172 to 175. In example 176, the payment calculator is to calculate the payment based, at least in part, on the payload size multiplied by a cost per byte to transmit the payload.

Example 177 includes the subject matter of any of examples 172 to 176. In example 177, the payment calculator is to calculate the payment based, at least in part, on a priority level for the communication.

Example 178 includes the subject matter of any of examples 172 to 177. In example 178, the payment extractor is to deduct the payment from a balance recorded in the token bucket.

Example 179 includes the subject matter of any of examples 172 to 178. In example 179, the payment extractor is to remove a token from the token bucket.

Example 180 includes the subject matter of any of examples 172 to 179. In example 180, the frame builder is to encrypt the token bucket and assemble the packet payload and metadata to form a frame including at least a part of the communication.

Example 181 includes the subject matter of any of examples 172 to 180. In example 181, the apparatus includes a payment acceptor to accept payment from a source referred to in the token bucket.

Example 182 includes the subject matter of any of examples 172 to 181. In example 182, the source includes a blockchain identified by a bit sequence in the token bucket.

Example 183 includes a method for using a token bucket to pay a routing device to transmit a communication. The method for using a token bucket to pay a routing device to transmit a communication includes receiving a frame in the transmitting system, parsing the packet frame metadata to identify the token bucket, calculating the payment to transmit the communication, extracting the payment from the token bucket providing a new token bucket, updating the frame metadata using the new token bucket, and routing the frame from the routing device.

Example 184 includes the subject matter of example 183. In example 184, the method includes alerting a sender if the frame metadata is determined to be incorrect.

Example 185 includes the subject matter of either of examples 183 or 184. In example 185, calculating the payment includes multiplying the payload size by a charge for each byte routed.

Example 186 includes the subject matter of any of examples 183 to 185. In example 186, calculating the payment includes charging a priority routing at a higher rate.

Example 187 includes the subject matter of any of examples 183 to 186. In example 187, extracting the payment from the token bucket includes decrementing the token field by the amount to transmit the communication.

Example 188 includes the subject matter of any of examples 183 to 187. In example 188, the method includes incrementing a local payment subtotal.

Example 189 includes the subject matter of any of examples 183 to 188. In example 189, the method includes updating a payment store with the local payment subtotal.

Example 190 includes the subject matter of any of examples 183 to 189. In example 190, the payment store is a blockchain that includes payment transactions.

Example 191 includes a non-transitory, machine readable medium. The non-transitory, machine readable medium includes instructions, that, when executed, direct a processor to parse metadata for a frame to identify a token bucket, extract the token bucket from the metadata, calculate a payment for transmitting a message to a destination, extract the payment from the token bucket, update the frame to include the change in the token bucket, and route the frame towards a destination.

Example 192 includes the subject matter of example 191. In example 192, the non-transitory, machine readable medium includes instructions, that, when executed, direct the processor to send the frame on to a subsequent device with an address indicating the final destination.

Example 193 includes the subject matter of either of examples 191 or 192. In example 193, the non-transitory, machine readable medium includes instructions, that, when executed, direct the processor to calculate the payment based, at least in part, on a size of the frame and a cost per byte transmitted.

Example 194 includes the subject matter of any of examples 191 to 193. In example 194, the non-transitory, machine readable medium includes instructions, that, when executed, direct the processor to calculate the payment based, at least in part, on the priority for the message transmission.

Example 195 includes the subject matter of any of examples 191 to 194. In example 195, the non-transitory, machine readable medium includes instructions, that, when executed, direct the processor to reduce a balance recorded in the token bucket.

Example 196 includes the subject matter of any of examples 191 to 195. In example 196, the non-transitory, machine readable medium includes instructions, that, when executed, direct the processor to remove a token from the token bucket, wherein the token includes an encrypted bit sequence.

Example 197 includes the subject matter of any of examples 191 to 196. In example 197, the non-transitory, machine readable medium includes instructions, that, when executed, direct the processor to encrypt the token bucket before updating the frame.

Example 198 includes the subject matter of any of examples 191 to 197. In example 198, the non-transitory, machine readable medium includes instructions, that, when executed, direct the processor to accept a payment to increase the balance in the token bucket.

Example 199 includes an apparatus. The apparatus includes an Internet-of-Things (IoT) network, wherein the IoT network includes an IoT device. This includes a communicator to send a communication including an egress frame, a protocol library builder to determine what protocols are available, a frame analyzer to analyze an ingress frame, and a frame builder to build the egress frame from the ingress frame.

Example 200 includes the subject matter of example 199. In example 200, the frame analyzer is to determine frame length for the ingress frame, a protocol for an egress frame, or both.

Example 201 includes the subject matter of either of examples 199 or 200. In example 201, the apparatus includes an easement system.

Example 202 includes the subject matter of any of examples 199 to 201. In example 202, the apparatus includes a protocol library to store available protocols.

Example 203 includes the subject matter of any of examples 199 to 202. In example 203, the protocol library includes formatting data for protocols including payload size, field length, frame header format, or frame footer format, or any combinations thereof.

Example 204 includes the subject matter of any of examples 199 to 203. In example 204, the apparatus includes the ingress frame in a first protocol, and the egress frame in a second protocol, wherein the egress frame includes a payload field including at least a portion of the ingress frame.

Example 205 includes the subject matter of any of examples 199 to 204. In example 205, the apparatus includes the ingress frame in a first protocol, and a plurality of egress frames, each in a second protocol, wherein each of the plurality of egress frames includes a payload field including at least a portion of the ingress frame.

Example 206 includes a method for packing a frame in a first protocol into a payload field of a second protocol. The method for packing a frame in a first protocol into a payload field of a second protocol includes identifying a protocol for an ingress frame and a protocol for an egress frame, writing at least a portion of the ingress frame into the payload field of the egress frame, and dispatching the egress frame towards the destination Example 207 includes the subject matter of example 206. In example 207, the method includes creating a library of available ingress and egress protocol, wherein the library includes the size of a frame in each protocol, the payload field size of a frame in each protocol, the addresses for each protocol, or any combinations thereof.

Example 208 includes the subject matter of either of examples 206 or 207. In example 208, the method includes determining the size of the payload field in the egress frame, and determining if the ingress frame will fit within the payload.

Example 209 includes the subject matter of any of examples 206 to 208. In example 209, the method includes fragmenting an ingress frame that is too large to fit in a payload field of an egress frame.

Example 210 includes the subject matter of any of examples 206 to 209. In example 210, the method includes splitting the ingress frame into a plurality of byte sequences, wherein each byte sequence will fit in a payload field of an egress frame.

Example 211 includes the subject matter of any of examples 206 to 210. In example 211, the method includes writing each of the plurality of byte sequences into the data field of a separate egress frame, and writing a sequence number for each of the plurality of byte sequences into the data filed of the separate egress frame.

Example 212 includes the subject matter of any of examples 209 to 211. In example 212, the method includes determining if all fragments of the ingress frame have been processed, and, if not, continuing to write fragments into egress frames.

Example 213 includes the subject matter of any of examples 206 to 212. In example 213, the method includes determining if a new ingress frame has been received, and processing the new ingress frame to package it into an egress frame.

Example 214 includes a non-transitory, machine readable medium. The non-transitory, machine readable medium includes instructions that, when executed, direct a processor to analyze an ingress frame to determine size and other constraints, determine a protocol for an egress frame, write at least a portion of the ingress frame into the data field of the egress frame, and route the egress frame towards a destination.

Example 215 includes the subject matter of example 214. In example 215, the non-transitory, machine readable medium includes instructions that, when executed, direct the processor to create an inventory of available ingress protocols and egress protocols.

Example 216 includes the subject matter of either of examples 214 or 215. In example 216, the non-transitory, machine readable medium includes instructions that, when executed, direct the processor to fragment the ingress frame if it is too large to fit within the data field of the egress frame.

Example 217 includes the subject matter of any of examples 214 to 216. In example 217, the non-transitory, machine readable medium includes instructions that, when executed, direct the processor to label each fragment with a sequence number for correct reassembly at a destination.

Example 218 includes the subject matter of any of examples 214 to 217. In example 218, the non-transitory, machine readable medium includes instructions that, when executed, direct the processor to place the ingress frame, or a fragment of the ingress frame, in the payload field of the egress frame.

Example 219 includes the subject matter of any of examples 214 to 218. In example 219, the non-transitory, machine readable medium includes instructions, that, when executed, direct the processor to send the frame on to a subsequent device with an address indicating the final destination.

Example 220 includes an apparatus. The apparatus includes an Internet-of-Things (IoT) network, wherein the IoT network includes an IoT device. The IoT device includes a network discoverer to identify available parallel communication channels between the IoT device and a target device. a payload, a payload fragmenter/packager to fragment the payload into sub-objects for transmission, and a packet communicator to send the sub-objects to the target device over the parallel communication channels.

Example 221 includes the subject matter of examples 220. In example 221, the network discoverer is to determine a combination of the communication channels.

Example 222 includes the subject matter of either of examples 220 or 221. In example 222, the network discoverer is to base, at least in part, the determination of the communication channels on speed of communications, reliability, or power availability, or combinations thereof.

Example 223 includes the subject matter of any of examples 220 to 222. In example 223, the payload includes measurements obtained from a sensor.

Example 224 includes the subject matter of any of examples 220 to 223. In example 224, the payload includes a message from another IoT device.

Example 225 includes the subject matter of any of examples 220 to 224. In example 225, the network discoverer is to maintain a list of available network communication paths and associated protocols to be used for parallel communications.

Example 226 includes the subject matter of any of examples 220 to 225. In example 226, the payload fragmenter/packager is to package each of the sub-objects into a frame, wherein the frame is in a protocol associated with a communication channel.

Example 227 includes the subject matter of any of examples 220 to 226. In example 227, the apparatus includes a payload receiver/analyzer to receive frames from other devices, to remove protocol packaging, and to analyze the frames to identify message and sequence information Example 228 includes the subject matter of any of examples 220 to 227. In example 228, the payload receiver/analyzer is to determine that the data fields of received frames are sub-objects of payloads.

Example 229 includes the subject matter of any of examples 220 to 228. In example 229, the payload receiver/analyzer is to store the sub-objects and sequence numbers all sub-objects have been received, then pass the sequence numbers and storage information on to a payload defragmenter.

Example 230 includes the subject matter of any of examples 220 to 229. In example 230, the apparatus includes a payload defragmenter to reassemble the payloads into the final payload object.

Example 231 includes a method for fragmenting and dispatching a payload over multiple parallel communication channels. The method for fragmenting and dispatching a payload over multiple parallel communication channels includes fragmenting the payload into fragments based, at least in part, on available communication channels and payload sizes supported by protocol frames associated with the communication channels. The method also includes assigning sequence numbers to the fragments, appending headers including the sequence numbers to the fragments to form sub-blocks, packaging the sub-blocks into the protocol frames for the transmission over the different routes, and dispatching the sub-blocks over the different communication channels.

Example 232 includes the subject matter of example 231. In example 232, fragmenting the payload into fragments is based on, at least in part, transmission rates over communication channels, or priority over communication channels, or both.

Example 233 includes the subject matter of either of examples 231 or 232. In example 233, the method includes discovering the available communication channels to a destination, and saving the communication channels and associated protocols to a library.

Example 234 includes the subject matter of any of examples 231 to 233. In example 234, the method includes testing the communication channels on a periodic basis to confirm that connectivity is still present.

Example 235 includes a method for receiving and recombining packets sent over multiple parallel communications channels. The method for receiving and recombining packets sent over multiple parallel communications channels includes receiving frames from a sending device over a number of different communications channels, parsing the frames to obtain fragments of a payload, determining when to reassemble the payload from the fragments, and combining the fragments to reassemble the payload.

Example 236 includes the subject matter of example 235. In example 236, the method includes detecting the receipt of frames on a number of different communication channels, removing the payloads from the frames, analyzing the payloads to identify payload fragments and associated sequence numbers, and storing the payload fragments and recording the associated sequence numbers.

Example 237 includes the subject matter of either of examples 235 or 236. In example 237, the method includes combining the fragments before all frames are received to obtain a partial payload.

Example 238 includes the subject matter of any of examples 235 to 237. In example 238, the method includes providing the payload to a consumer process.

Example 239 includes a non-transitory, machine readable medium. The non-transitory, machine readable medium includes instructions that, when executed, direct a processor to fragment a payload to fit into the data fields of frames for the protocols selected for the communications, append a header to each fragment that includes the sequence number of the fragment to form a sub-block, package each sub-block into a protocol frame, depending on the communication channel, and dispatch each of the protocol frames to the target device over the communication channel associated with the protocol frame.

Example 240 includes the subject matter of example 239. In example 240, the non-transitory, machine readable medium includes instructions that, when executed, direct the processor to discover available communication channels to a receiving device.

Example 241 includes the subject matter of either of examples 239 or 240. In example 241, the non-transitory, machine readable medium includes instructions that, when executed, direct the processor to receive the protocol frames, unpackage the sub-blocks from the protocol frames, parse the header in each of the sub-blocks to identify the fragment and the sequence number of the fragment, and direct the processor to reassemble the payload from the fragments in order of the sequence numbers.

Example 242 includes the subject matter of any of examples 239 to 241. In example 242, the non-transitory, machine readable medium includes instructions that, when executed, direct the processor to determine that the payload should be reassembled before all fragments have been received.

Example 243 includes an apparatus. The apparatus includes an Internet-of-Things (IoT) network, wherein the IoT network includes a beacon node. The beacon node includes a satellite-aided navigation module to receive and process satellite position data, a satellite-aided navigation locator to control the satellite-aided navigation module and obtain satellite-aided navigation location information, a data parser to parse the satellite-aided navigation location information, a payload constructor to construct a location packet, and a communicator to send the packet to a mesh device over a communication link.

Example 244 includes the subject matter of example 243. In example 244, the satellite-aided navigation location information includes latitude, longitude, time, or altitude, or any combinations thereof.

Example 245 includes the subject matter of either of examples 243 or 244. In example 245, the apparatus includes a mesh transceiver, an uplink transceiver, or a network interface controller (NIC), or any combinations thereof, to provide the communication link.

Example 246 includes the subject matter of any of examples 243 to 245. In example 246, the payload constructor is to place the packet in a frame having a protocol associated with the communication link.

Example 247 includes the subject matter of any of examples 243 to 246. In example 247, the satellite-aided navigation locator is to deactivate the GPS module based, at least in part, on battery capacity.

Example 248 includes the subject matter of any of examples 243 to 247. In example 248, the satellite-aided navigation locator is to activate the satellite-aided navigation module when another beacon node deactivates a satellite-aided navigation module.

Example 249 includes the subject matter of any of examples 243 to 248, including an IoT device to 249. In example 249, the IoT device includes a packet validator to validate packets received from a beacon node to determine if the packets match a beacon ID, include valid data, or both.

Example 250 includes the subject matter of any of examples 243 to 249. In example 250, the packet validator is to ignore invalid frames.

Example 251 includes the subject matter of any of examples 243 to 250. In example 251, the packet validator is to send a resend request.

Example 252 includes the subject matter of any of examples 243 to 251. In example 252, the IoT device includes a packet extractor to analyze a received frame to extract a location payload.

Example 253 includes a method for generating a location payload. The method for generating a location payload includes obtaining location data from a satellite-aided navigation module, parsing the location data, constructing a location payload from the location data, and broadcasting the location payload to surrounding IoT devices.

Example 254 includes the subject matter of example 253. In example 254, the method includes obtaining a position fix, including sending a command to the satellite-aided navigation module to obtain a position fix, waiting for a predetermined period of time, determining if a fix has been obtained, and providing location data if a fix has been obtained.

Example 255 includes the subject matter of either of examples 253 or 254. In example 255, parsing the location data includes extracting a longitude, a latitude, or a time, or any combinations thereof, and storing the location data in a local store.

Example 256 includes the subject matter of any of examples 253 to 255. In example 256, constructing a location payload from the location data includes writing latitude, longitude, and time in a sequential string of bits, writing a beacon ID to the sequential string of bits, and writing a timestamp to the sequential string of bits.

Example 257 includes the subject matter of any of examples 253 to 256. In example 257, the timestamp includes time data extracted from satellite data.

Example 258 includes the subject matter of any of examples 253 to 257. In example 258, the method includes packaging the payload in a frame for transmission.

Example 259 includes the subject matter of any of examples 253 to 258. In example 259, the frame is an Ethernet frame, a LoRaWAN frame, a 4G frame, a 3GG frame, or any combinations thereof.

Example 260 includes the subject matter of any of examples 253 to 259. In example 260, the method includes activating a transmitter, and dispatching the frame as a message over a radio transmission, a wired network, or both.

Example 261 includes the subject matter of any of examples 253 to 260. In example 261, the method includes waiting for a predetermined interval.

Example 262 includes the subject matter of any of examples 253 to 261. In example 262, the method includes receiving a beacon frame including the location payload, confirming an identity of a beacon node, confirming the frame is valid, extracting the location payload from the beacon frame, and parsing the location payload to extract latitude and longitude information.

Example 263 includes the subject matter of any of examples 253 to 262. In example 263, the method includes parsing the location payload to extract a timestamp.

Example 264 includes a non-transitory, machine readable medium. The non-transitory, machine readable medium includes instructions that, when executed, direct a processor to obtain location data from a satellite-aided navigation module, parse the location data from the satellite-aided navigation module to obtain separate values for latitude and longitude, build a location payload including the latitude and longitude, package the location payload in a frame of a particular protocol, and dispatch the location payload.

Example 265 includes the subject matter of example 264. In example 265, the non-transitory, machine readable medium includes instructions that, when executed, direct the processor to add a timestamp to the location payload.

Example 266 includes the subject matter of either of examples 264 or 265. In example 266, the non-transitory, machine readable medium includes instructions that, when executed, direct the processor to extract the location payload from a frame received from a beacon node.

Example 267 includes an apparatus. The apparatus includes an Internet-of-Things (IoT) network, wherein the IoT network includes an IoT device. The IoT device includes a data manager to manage data on the IoT device, a data classifier to classify each fragment of data passing through the IoT device as inbound, outbound, or cache, and a data mapper to map the classified data to a physical location on the IoT device.

Example 268 includes the subject matter of example 267. In example 268, the IoT device includes a data historian to track data moving in and out of the IoT device.

Example 269 includes the subject matter of any of examples 267 to 268. In example 269, the IoT device includes a protocol manager to manage protocols used for frames for communication channels.

Example 270 includes the subject matter of any of examples 267 to 269. In example 270, the IoT device includes a network manager to manage network communications on a plurality of communication channels.

Example 271 includes the subject matter of any of examples 267 to 270. In example 271, the IoT device includes a communications manager to manage a mesh transceiver, an uplink transceiver, an Ethernet connection, or any combinations thereof.

Example 272 includes the subject matter of any of examples 267 to 271. In example 272, the IoT device includes an inbox to store inbound data for the IoT device itself.

Example 273 includes the subject matter of any of examples 267 to 272. In example 273, the IoT device includes an outbox to store outbound data to be sent to another mesh device.

Example 274 includes the subject matter of any of examples 267 to 273. In example 274, the IoT device includes a cache to store data requests.

Example 275 includes the subject matter of any of examples 267 to 275. In example 275, the IoT device includes a plurality of mesh devices in communication with each other to store and distribute data.

Example 276 includes the subject matter of any of examples 267 to 276. In example 276, the data is distributed in a stateless fashion.

Example 277 includes a method for dispersed content distribution. The method for dispersed content distribution includes classifying a data fragment as inbound data, outbound data, or cache data, and mapping the data fragment to a physical location in a data store.

Example 278 includes the subject matter of example 277. In example 278, the method includes calculating a hash key for an inbound data fragment, and determining if the hash key is in the data store, and if not, storing the data fragment.

Example 279 includes the subject matter of either of examples 277 or 278. In example 279, the method includes, if the data fragment is determined to be outbound data, calculating a time-to-live (TTL) for the data.

Example 280 includes the subject matter of any of examples 277 to 279. In example 280, the TTL is calculated as a number of hops the data fragment can be transmitted before deletion.

Example 281 includes the subject matter of any of examples 277 to 280. In example 281, the TTL is calculated as a time period before deletion.

Example 282 includes the subject matter of any of examples 277 to 281. In example 282, the TTL is calculated as a combination of a number of hops the data fragment can be transmitted and a time period.

Example 283 includes the subject matter of any of examples 277 to 282. In example 283, the method includes tracking inbound data request, outbound data requests, or both, in a data historian.

Example 284 includes the subject matter of any of examples 277 to 283. In example 284, the method includes adjusting a size of a cache based, at least in part, on a frequency of data accesses to the cache.

Example 285 includes the subject matter of any of examples 277 to 284. In example 285, the method includes selecting a storage type selected will, at least in part, on a frequency of data accesses to the cash Example 286 includes a non-transitory, machine readable medium. The non-transitory, machine readable medium includes instructions that, when executed, direct a processor to classify a data fragment that passes through an internet-of-things (IoT) device as inbound data, outbound data, or cache data, and map the classified data fragment to a physical location on the IoT device.

Example 287 includes the subject matter of example 286. In example 287, the non-transitory, machine readable medium includes instructions that, when executed, direct the processor to calculate a hash key for a data fragment of inbound data, and determine if the hash key is in a local store, and, if not, save the data fragment to the local store.

Example 288 includes the subject matter of either of examples 286 or 287. In example 288, the non-transitory, machine readable medium includes instructions that, when executed, direct the processor to update a data fragment that is in a local store.

Example 289 includes the subject matter of any of examples 286 to 288. In example 289, the non-transitory, machine readable medium includes instructions that, when executed, direct the processor to calculate a time-to-live for a data fragment.

Example 290 includes an apparatus. The apparatus includes an Internet-of-Things (IoT) network, wherein the IoT network includes a wireless memory system, including at least two IoT devices. The wireless memory system includes an originating node and a receiving node. The originating node includes a payload fragmenter to break data to be stored into fragments, an encapsulator to form packets from the fragments, a communicator to send the packets to the receiving node, and a router to loop packets received from the receiving node back to the originating node. The receiving node includes a router to loop packets received from the originating node back to the receiving node, wherein the packets are stored in transmission between the originating node and the receiving node.

Example 291 includes the subject matter of example 290. In example 291, the originating node includes a payload extractor to remove the fragments from packets received from the receiving node, and a data assembler to reconstruct the data from the fragments.

Example 292 includes the subject matter of either of examples 290 or 291. In example 292, the originating node and the receiving node each include a compatible mesh transceiver.

Example 293 includes the subject matter of any of examples 290 to 292. In example 293, the apparatus includes a plurality of nodes forming a chain between the originating node and the receiving node.

Example 294 includes the subject matter of any of examples 290 to 293. In example 294, the originating node and the receiving node include a communications stack including a network/routing layer.

Example 295 includes the subject matter of any of examples 290 to 294. In example 295, the network/routing layer is to loop a packet received at the network/routing layer back to the physical layer for transmission.

Example 296 includes the subject matter of any of examples 290 to 295. In example 296, the network/routing layer is to accept a data access command and redirect the packets to the application layer.

Example 297 includes a method for fragmenting and storing data in a transmission loop between devices. The method for fragmenting and storing data in a transmission loop between devices includes fragmenting data to be stored into data fragments, encapsulating the data fragments into memory packets, sending the memory packets to another device, receiving the memory packets from the other device, and looping the memory packets back to the other device.

Example 298 includes the subject matter of example 297. In example 298, the method includes assigning a sequence number to each of the fragments.

Example 299 includes the subject matter of either of examples 297 or 298. In example 299, the method includes appending a header including the sequence number to a fragment to form a memory packet.

Example 300 includes the subject matter of any of examples 297 to 299. In example 300, the header includes an indication that the memory packet is stored data.

Example 301 includes the subject matter of any of examples 297 to 300. In example 301, the method includes looping the memory packets back to the other device at a stack layer below an application layer.

Example 302 includes the subject matter of any of examples 297 to 301. In example 302, the method includes determining if a received memory packet should continue to be stored, and, if so, transmitting the packet to the other device.

Example 303 includes the subject matter of any of examples 297 to 302. In example 303, the method includes determining that data should be received from a memory packet.

Example 304 includes the subject matter of any of examples 297 to 303. In example 304, the method includes stripping a data fragment from the memory packet.

Example 305 includes the subject matter of any of examples 297 to 304. In example 305, the method includes stripping a sequence number from the memory packet.

Example 306 includes the subject matter of any of examples 297 to 305. In example 306, the method includes determining if all of the data fragments have been received, and, if so, assembling the data fragments in order of sequence number to obtain the data.

Example 307 includes the subject matter of any of examples 297 to 306. In example 307, the method includes passing the data to an application layer for use in a data operation.

Example 308 includes a non-transitory, machine readable medium. The non-transitory, machine readable medium includes instructions that, when executed, direct a processor to determine if a routing request if a data storage request, fragment data into payloads, encapsulate the payloads into memory packets, route the memory packets over a communication channel, and determine if received memory packets should be sent to another device, or intercepted for use.

Example 309 includes the subject matter of example 308. In example 309, the non-transitory, machine readable medium includes instructions that, when executed, direct the processor to unpackage the payloads from the memory packets.

Example 310 includes the subject matter of either of examples 308 or 319. In example 310, the non-transitory, machine readable medium includes instructions that, when executed, direct the processor to reassemble the payloads in order of a sequence number to form the data.

Example 311 includes an apparatus. The apparatus includes an Internet-of-Things (IoT) network, wherein the IoT network includes an IoT device, including a radio transmitter to send a modulated waveform including multiple overlapping frames, wherein the modulated waveform includes a Zadoff-Chu (ZC) sequence.

Example 312 includes the subject matter of example 311. In example 312, the apparatus includes a channel identifier to determine a number for available channels that can be present in a radio communication to another device.

Example 313 includes the subject matter of either of examples 311 or 312. In example 313, the apparatus includes a sequence generator to generate a ZC sequence for each of the available channels.

Example 314 includes the subject matter of any of examples 311 to 313. In example 314, the apparatus includes a preamble generator to generate a preamble waveform that encodes a number of channels used for a transmission.

Example 315 includes the subject matter of any of examples 311 to 314. In example 315, the apparatus includes a communicator to generate a modulated waveform including a ZC modulated frame for each of the number of channels and a preamble waveform indicating the number of channels.

Example 316 includes the subject matter of any of examples 311 to 315. In example 316, the apparatus includes an index identifier to perform a cross-correlation on a received waveform to determine if a preamble waveform is present, and, if so, determine a number of channels in the received waveform.

Example 317 includes the subject matter of any of examples 311 to 316. In example 317, the apparatus includes a channel demodulator to demodulate the modulated waveform to extract the multiple overlapping frames.

Example 318 includes a method for transmitting data on multiple channels using Zadoff-Chu (ZC) shifted sequences. The method for transmitting data on multiple channels using Zadoff-Chu (ZC) shifted sequences includes determining a number for channels to be used for a communication, generating a preamble waveform including a number of channels in a ZC shifted sequence, prepending the preamble waveform to a modulated waveform to create a message, and transmitting the message to receiving device.

Example 319 includes the subject matter of example 318. In example 319, the method includes determining a number for available channels.

Example 320 includes the subject matter of either of examples 318 or 319. In example 320, the number for available channels is determined using information theory to determine a maximum amount of information that can be carried in a transmission.

Example 321 includes the subject matter of any of examples 318 to 320. In example 321, the method includes sending the number for available channels to a receiving device.

Example 322 includes the subject matter of any of examples 318 to 321. In example 322, the method includes generating ZC shifted sequences corresponding to each of the available channels.

Example 323 includes the subject matter of any of examples 318 to 322. In example 323, the method includes modulating a frame to be carried by each of the number of channels at a separate ZC shifted sequences, and combining the modulated frames to generate the modulated waveform.

Example 324 includes the subject matter of any of examples 318 to 323. In example 324, the method includes demodulating the modulated waveform in a message at each of a plurality of ZC shifted sequences to obtain a frame carried by a corresponding channel.

Example 325 includes the subject matter of any of examples 318 to 324. In example 325, the method includes performing an auto-correlation on the message to determine if the preamble waveform is present.

Example 326 includes the subject matter of any of examples 318 to 325. In example 326, the method includes performing a cross-correlation on the preamble waveform at each of the plurality of ZC shifted sequences to determine the number of channels in the modulated waveform.

Example 327 includes a non-transitory, machine readable medium. The non-transitory, machine readable medium includes instructions that, when executed, direct a processor to determine a number of channels to be used for a communication, generate a preamble waveform including the number of channels, prepend the preamble waveform to a modulated waveform to create a message, and transmit the message to receiving device.

Example 328 includes the subject matter of example 327. In example 328, the non-transitory, machine readable medium includes instructions that, when executed, direct a processor to determine a number for available channels.

Example 329 includes the subject matter of either of examples 327 or 328. In example 329, the non-transitory, machine readable medium includes instructions that, when executed, direct a processor to send the number for available channels to a receiving device.

Example 330 includes the subject matter of any of examples 327 to 329. In example 330, the non-transitory, machine readable medium includes instructions that, when executed, direct a processor to generate a separate ZC shifted sequences corresponding to each available channel.

Example 331 includes the subject matter of any of examples 327 to 330. In example 331, the non-transitory, machine readable medium includes instructions that, when executed, direct a processor to modulate frames to be carried by each of the number of channels at a separate ZC shifted sequence, and combine the modulated frames to generate the modulated waveform.

Example 332 includes the subject matter of any of examples 327 to 331. In example 332, the non-transitory, machine readable medium includes instructions that, when executed, direct a processor to demodulate the modulated waveform at each of a plurality of ZC shifted sequences to obtain a frame carried by a corresponding channel.

Example 333 includes the subject matter of any of examples 327 to 332. In example 333, the non-transitory, machine readable medium includes instructions that, when executed, direct a processor to perform an auto-correlation on the message to determine if the preamble waveform is present.

Example 334 includes the subject matter of any of examples 327 to 333. In example 334, the non-transitory, machine readable medium includes instructions that, when executed, direct a processor to perform a cross-correlation on the preamble waveform at each of a plurality of ZC shifted sequences to determine a number of channels in the modulated waveform.

Example 335 includes an apparatus. The apparatus includes an Internet-of-Things (IoT) network, wherein the IoT network includes an IoT device. The IoT device includes radio transceivers including a plurality of frequencies, protocols, or both, a coexistence manager to track the radio transceivers in use for a communication, a universal coexistence interface to identify what radio transceivers can be used for the communication, a protocol abstraction application programming interface (API) to build frames for the communication, and a communicator to transmit the frames from the protocol translation API to another device using a radio transceiver.

Example 336 includes the subject matter of example 335. In example 336, the universal coexistence interface is to modify configurable parameters for the radio transceivers.

Example 337 includes the subject matter of any of examples 335 to 336. In example 337, the configurable parameters include coding scheme, modulation, or both.

Example 338 includes the subject matter of any of examples 335 to 337. In example 338, the configurable parameters include a transmission power for individual radio transceivers.

Example 339 includes the subject matter of any of examples 335 to 338. In example 339, the universal coexistence interface is to identify when radio transceivers are to be used for the communication.

Example 340 includes the subject matter of any of examples 335 to 339. In example 340, the IoT device includes a protocol data store to obtain the protocols that can be used for communications over the radio transceivers selected.

Example 341 includes the subject matter of any of examples 335 to 340. In example 341, the IoT device includes a channel data store that includes an active communication plan and radios determined by the coexistence manager.

Example 342 includes the subject matter of any of examples 335 to 341. In example 342, the radio transceivers conform to IEEE 802.11x standards, IEEE 802.15.4 standards, or LoRa standards, or any combinations thereof.

Example 343 includes a method for control and management of multiple coexisting radios. The method for control and management of multiple coexisting radios includes enumerating radios available in a radio system in an internet-of-things (IoT) device, determining an active coexistence model that identifies both neighbors and associated radios, and communicating with neighbors through associated radios on available bands.

Example 344 includes the subject matter of example 343. In example 344, the method includes identifying the available bands for communications from a local security authority domain broker (LSADB), determining a band plan for using the bands, building a neighbor map that includes an identity for each neighbor, identifying an associated band that can be used to communicate with each neighbor from a cross-domain information sharing system (CDIS), and determining an initial coexistence model that identifies both neighbors and associated bands.

Example 345 includes the subject matter of either of examples 343 or 344. In example 345, the method includes sending a request for a subscription for a radio to the CDIS if a band of the radio was not present in the initial coexistence model.

Example 346 includes the subject matter of any of examples 343 to 345. In example 346, the method includes verifying that standards used for the radios in the IoT device are available.

Example 347 includes the subject matter of any of examples 343 to 346. In example 347, the method includes downloading the standards used for the radios in the IoT device from a cloud computing network.

Example 348 includes the subject matter of any of examples 343 to 347. In example 348, the method includes initializing each of the radios in a device, determining if any of the radios are not following the standards, sending a message to a radio system to set configurable parameters for each of the radios, create a parameter mapping set for the radios in use, and sending a message to the radio system to indicate that the communications with the radio system are initialized.

Example 349 includes the subject matter of any of examples 343 to 348. In example 349, the method includes detecting a coexistence violation, and reconfiguring configurable parameters.

Example 350 includes the subject matter of any of examples 343 to 349. In example 350, the method includes detecting a coexistence violation by determining that a licensed user is occupying a band.

Example 351 includes the subject matter of any of examples 343 to 350. In example 351, reconfiguring the configurable parameters includes sending a message to the radio system with a new set of parameters, and reinitializing the communications with the radios.

Example 352 includes the subject matter of any of examples 343 to 351. In example 352, reconfiguring the configurable parameters includes temporarily disabling a radio.

Example 353 includes the subject matter of any of examples 343 to 352. In example 353, reconfiguring the configurable parameters includes shifting to a different band.

Example 354 includes the subject matter of any of examples 343 to 353. In example 354, the method includes determining which other nodes are communicating with the IoT device, determining a neighbor command list change, and sending a reconfiguration request to the radio system with a new set of parameters.

Example 355 includes the subject matter of any of examples 343 to 354. In example 355, the method includes receiving a request for a change from a neighbor with suggested parameters, and sending a reconfiguration request with the suggested parameters to the radio system.

Example 356 includes a non-transitory, machine readable medium. The non-transitory, machine readable medium includes instructions that, when executed, direct a processor to determine a band plan, build a neighbor map including an identity for each neighbor and bands associated with that neighbor, and determine a coexistence model that identifies both neighbors and associated communications channels.

Example 357 includes the subject matter of example 356. In example 357, the non-transitory, machine readable medium includes instructions that, when executed, direct the processor to revise the band plan after determining available radios.

Example 358 includes the subject matter of either of examples 356 or 357. In example 358, the non-transitory, machine readable medium includes instructions that, when executed, direct the processor to revise the coexistence model after determining available radios.

Example 359 includes the subject matter of any of examples 356 to 358. In example 359, the non-transitory, machine readable medium includes instructions that, when executed, direct the processor to reconfigure communications if a coexistence violation is detected, if a recurring check of neighboring units indicates that configurable parameters need adjustment, or if requested by a neighboring unit, or any combinations thereof.

Example 360 includes an apparatus. The apparatus includes an Internet-of-Things (IoT) network, wherein the IoT network includes devices including an orchestrator to issue service management requests to a service coordinator to form a service, the service coordinator to identify a plurality of components to participate in the service, and a component to perform a network service element for the service.

Example 361 includes the subject matter of example 360. In example 361, the orchestrator manages a plurality of network service overlays to perform tasks.

Example 362 includes the subject matter of any of examples 360 to 361. In example 362, the apparatus includes a shared repository including the plurality of network service overlays.

Example 363 includes the subject matter of any of examples 360 to 362. In example 363, a network service overlay includes a code segment to allow the component to perform the network service element.

Example 364 includes the subject matter of any of examples 360 to 363. In example 364, the service coordinator includes a database to store data or metadata or both from a component, a shared virtual repository to hold a network service element needing completion, and a machine learning engine to select the component to complete the network service element.

Example 365 includes the subject matter of any of examples 360 to 364. In example 365, the shared virtual repository stores an identity of the component assigned to the network service element.

Example 366 includes the subject matter of any of examples 360 to 365. In example 366, the service includes a plurality of network service elements, and wherein the network service elements are completed by the plurality of components.

Example 367 includes the subject matter of any of examples 360 to 366. In example 367, the service includes a fog device including a plurality of internet-of-things (IoT) devices.

Example 368 includes the subject matter of any of examples 360 to 367. In example 368, the service coordinator includes a network domain controller.

Example 369 includes the subject matter of any of examples 360 to 368. In example 369, the component is a device including a client, and wherein the client registers the device with the service coordinator.

Example 370 includes the subject matter of any of examples 360 to 369. In example 370, the client sends a message including attached sensors, actuators, or devices, or any combinations thereof, the service coordinator.

Example 371 includes the subject matter of any of examples 360 to 370. In example 371, the plurality of components is selected from multiple domains.

Example 372 includes a method for completing service requests. The method for completing service requests includes receiving an orchestration request at a network domain controller, determining if the orchestration request is for an existing service, and if the orchestration request is for an existing service, sending the orchestration request to a service coordinator.

Example 373 includes the subject matter of example 372. In example 373, the method includes, if the orchestration request is a new request preparing a service model including a network service element, preparing the network service element, identifying a service component to perform the network service element, and dispatching a subscription request to the service component to perform an action for the network service element.

Example 374 includes the subject matter of either of examples 372 or 373. In example 374, the method includes identifying a service coordinator.

Example 375 includes the subject matter of any of examples 372 to 374. In example 375, identifying a service component includes accessing data on historic performance of a plurality of service components, and using a machine learning technique to select the service component.

Example 376 includes the subject matter of any of examples 372 to 375. In example 376, the method includes validating the subscription request at the service component, and sending a confirmation to the service coordinator if the subscription request is valid.

Example 377 includes the subject matter of any of examples 372 to 376. In example 377, the method includes sending a denial to the service coordinator if the subscription request is not valid.

Example 378 includes the subject matter of any of examples 372 to 377. In example 378, a subscription request is valid if it is supported by the service component.

Example 379 includes the subject matter of any of examples 372 to 378. In example 379, the method includes performing the network service element in the service component, and returning data from the service component to the service coordinator.

Example 380 includes the subject matter of any of examples 372 to 379. In example 380, the service component downloads a network service overlay from a virtual shared repository to perform the network service element.

Example 381 includes the subject matter of any of examples 372 to 380. In example 381, the service component downloads a network service overlay from a shared repository in a cloud.

Example 382 includes the subject matter of any of examples 372 to 381. In example 382, the method includes sending a message including capabilities of a service component to a service coordinator to register the service component.

Example 383 includes a non-transitory, machine readable medium. The non-transitory, machine readable medium includes instructions that, when executed, direct one or more processors to identify a service coordinator, prepare network elements, identify service components, and send subscription requests to service components.

Example 384 includes the subject matter of example 383. In example 384, the non-transitory, machine readable medium includes instructions that, when executed, direct the one or more processors to validate a subscription request, perform and action for a network service element, and send data to the service coordinator.

Example 385 includes the subject matter of either of examples 383 or 384. In example 385, the non-transitory, machine readable medium includes instructions that, when executed, direct the one or more processors to send a connection request to the service coordinator, and send device peripheral data to the service coordinator.

Example 386 includes an apparatus. The apparatus includes an Internet-of-Things (IoT) network, wherein the IoT network includes a plurality of IoT devices. Each IoT device includes a communication channel to an upstream device, a network link to another one of the plurality of IoT devices, a hash calculator to identify a neighbor IoT device, and a communicator to send out a message to the neighbor IoT device.

Example 387 includes the subject matter of example 386. In example 387, the apparatus includes a data fragmenter to fragment a data file into a plurality of payloads.

Example 388 includes the subject matter of either of examples 386 or 387. In example 388, the apparatus includes a message generator to package a payload in a frame to create the message.

Example 389 includes the subject matter of any of examples 386 to 388. In example 389, a communicator in the neighbor IoT device receives the message and sends the message to the upstream device.

Example 390 includes the subject matter of any of examples 386 to 389. In example 390, a message generator in the neighbor IoT device analyzes the message to obtain a payload and stores the payload in a data store.

Example 391 includes the subject matter of any of examples 386 to 390. In example 391, the apparatus includes a data tracker to store an identification for each message sent to a neighbor IoT device in a data store.

Example 392 includes the subject matter of any of examples 386 to 391. In example 392, the identification includes a hash code of a payload in the message and a node ID for the neighbor IoT device.

Example 393 includes the subject matter of any of examples 386 to 392. In example 393, the data tracker is to store an acknowledgement received from a neighbor IoT device that the message has been receive by the upstream device.

Example 394 includes a method for sending data from an internet-of-things (IoT) device to a neighbor IoT device for transmission or storage. The method for sending data from an internet-of-things (IoT) device to a neighbor IoT device for transmission or storage includes segmenting a file into a plurality of fragments, computing a hash code for each fragment, identifying a target node from the hash code, and sending the fragment to the target node.

Example 395 includes the subject matter of example 394. In example 395, identifying the target node includes extracting a selected number of bytes from the hash code, and comparing the selected number of bytes to a node ID for each of a plurality of IoT devices, and identifying the target node by a closest match between the selected number of bytes and a node ID in the plurality of IoT devices.

Example 396 includes the subject matter of either of examples 394 or 395. In example 396, sending the fragment to the target node includes packing the fragment into a payload field in a frame, and transmitting the frame to the target node.

Example 397 includes the subject matter of any of examples 394 to 396. In example 397, the method includes calculating a node ID, and sharing the node ID with neighbor nodes in a plurality of IoT devices.

Example 398 includes the subject matter of any of examples 394 to 397. In example 398, the method includes receiving a frame from a neighbor IoT device, determining that a payload in the frame includes the fragment to be stored, generating a key for the payload using a hash function, and storing data in the node, prepending a node ID to the key to create a data identifier, and storing the data identifier in a local store.

Example 399 includes the subject matter of any of examples 394 to 398. In example 399, the method includes receiving a frame from an IoT device, determining that a payload in the frame includes the fragment to be transmitted to an upstream device, and sending the frame to the upstream device.

Example 400 includes the subject matter of any of examples 394 to 399. In example 400, the method includes extracting the payload from the frame, packaging the payload in a new frame, and transmitting the new frame to the upstream device.

Example 401 includes the subject matter of any of examples 394 to 400. In example 401, the method includes fragmenting the frame into segments, packing the segments into a payload field of each of a plurality of new frames, and transmitting the plurality of new frames to the upstream device.

Example 402 includes the subject matter of any of examples 394 to 401. In example 402, the method includes receiving an acknowledgement of the transmission of the frame from the upstream device, and forwarding the acknowledgment to the IoT device.

Example 403 includes the subject matter of any of examples 394 to 402. In example 403, the method includes monitoring a rate of acknowledgements received at the IoT device from neighbor IoT devices, and controlling a rate of sending frames based, at least in part, on the rate of acknowledgements.

Example 404 includes the subject matter of any of examples 394 to 403. In example 404, the method includes determining that an acknowledgement was not received for a frame sent to a neighbor IoT device, resending the frame to a different neighbor IoT device, and marking the neighbor IoT device as potentially bad.

Example 405 includes a non-transitory, machine readable medium. The non-transitory, machine readable medium includes instructions that, when executed, direct one or more processors to segment data into fragments, compute a hash code for each fragment, identify a target node for a fragment, and send the fragment to the target node.

Example 406 includes the subject matter of example 405. In example 406, the non-transitory, machine readable medium includes instructions that, when executed, direct the one or more processors to compare the hash code to a node ID for a plurality of nodes to identify the target node.

Example 407 includes the subject matter of either of examples 405 or 406. In example 407, the non-transitory, machine readable medium includes instructions that, when executed, direct the one or more processors to calculate a node ID for a node, and share the node ID with a plurality of nodes.

Example 408 includes the subject matter of any of examples 405 to 407. In example 408, the non-transitory, machine readable medium includes instructions that, when executed, direct the one or more processors to receive the fragment, calculate a key for the fragment, and store the key and the fragment.

Example 409 includes the subject matter of any of examples 405 to 408. In example 409, the non-transitory, machine readable medium includes instructions that, when executed, direct the one or more processors to receive the fragment, and transmit the fragment to an upstream device.

Example 410 includes the subject matter of any of examples 405 to 409. In example 410, the non-transitory, machine readable medium includes instructions that, when executed, direct the one or more processors to receive an acknowledgment from the upstream device, and forward the acknowledgment to a device that sent the fragment.

Example 411 includes an apparatus. The apparatus includes an Internet-of-Things (IoT) network, wherein the IoT network includes an IoT device. The IoT device includes a plurality of communication devices providing a plurality of communication channels, a route discoverer to identify which of the plurality of communication channels are in communication with a target endpoint, a route ranker to rank the plurality of communication channels that are in communication with the target endpoint, and a route database to store the rankings.

Example 412 includes the subject matter of example 411. In example 412, the apparatus includes a route calculator to select a route from the IoT device to the target endpoint, wherein the route includes a communication channel.

Example 413 includes the subject matter of either of examples 411 or 412. In example 413, the route is selected based, at least in part, on the rankings.

Example 414 includes the subject matter of any of examples 411 to 413. In example 414, the route is selected based, at least in part, on an application.

Example 415 includes the subject matter of any of examples 411 to 414. In example 415, the apparatus includes a packet preparer to prepare communication packets for transmission over the communication channels.

Example 416 includes the subject matter of any of examples 411 to 415. In example 416, the packet preparer is to fragment data to be transmitted over the communication channel.

Example 417 includes the subject matter of any of examples 411 to 416. In example 417, the packet preparer is to package data to be transmitted into a frame for the protocol of a communication channel.

Example 418 includes the subject matter of any of examples 411 to 417. In example 418, the apparatus includes a communicator to transmit data over a communication channel.

Example 419 includes the subject matter of any of examples 411 to 418. In example 419, the communicator sends a portion of the data over two or more communication channels in parallel.

Example 420 includes the subject matter of any of examples 411 to 419. In example 420, the apparatus includes a performance monitor to track a performance statistic for each of the plurality of communication channels that are in communication with the target endpoint, wherein the performance monitor updates the rankings based, at least in part, on the performance statistic.

Example 421 includes a method for selecting a communication channel from an internet-of-things (IoT) device to a target endpoint. The method for selecting a communication channel from an internet-of-things (IoT) device to a target endpoint includes calculating a routing strategy including one or more available routes to the target endpoint, preparing data for dispatch over the available routes identified in the routing strategy, dispatching the data, collecting performance statistics on the available routes used for the dispatch, and updating a ranking of the available routes based, at least in part, on the performance statistics.

Example 422 includes the subject matter of example 421. In example 422, calculating the routing strategy includes determining that a single route should be used, and selecting the single route to be used.

Example 423 includes the subject matter of either of examples 421 or 422. In example 423, calculating the routing strategy includes determining that multiple routes should be used, and selecting the multiple routes to be used.

Example 424 includes the subject matter of any of examples 421 to 423. In example 424, preparing the data for dispatch includes fragmenting the data into payloads, packaging the payloads into packets, and assigning the packets to a route.

Example 425 includes the subject matter of any of examples 421 to 424. In example 425, the method includes packaging the payloads into frames based on the route.

Example 426 includes the subject matter of any of examples 421 to 425. In example 426, dispatching the data includes sending packets over a single available route.

Example 427 includes the subject matter of any of examples 421 to 426. In example 427, dispatching the data includes sending packets over multiple routes.

Example 428 includes the subject matter of any of examples 421 to 427. In example 428, collecting performance statistics includes monitoring data delivery status, determining route reliability, or measuring total data transferred per route, or any combinations thereof.

Example 429 includes the subject matter of any of examples 421 to 428. In example 429, the method includes discovering network interfaces in the IoT device, discovering the available routes to the target endpoint over the network interfaces, and ranking the available routes to the target endpoint.

Example 430 includes the subject matter of any of examples 421 to 429. In example 430, discovering network interfaces includes accessing a list of interfaces through a configuration command.

Example 431 includes the subject matter of any of examples 421 to 430. In example 431, discovering the available routes includes discovering logical channels to the target endpoint.

Example 432 includes the subject matter of any of examples 421 to 431. In example 432, discovering the available routes includes obtaining previous active routes to the target endpoint.

Example 433 includes the subject matter of any of examples 421 to 432. In example 433, discovering the available routes includes attempting to establish logical channels to the target endpoint over the network interfaces.

Example 434 includes a non-transitory, machine readable medium. The non-transitory, machine readable medium includes instructions that, when executed, direct a processor to discover network interfaces, discover available routes, calculate a routing strategy, and dispatch packets in accordance with the routing strategy.

Example 435 includes the subject matter of example 434. In example 435, the non-transitory, machine readable medium includes preparing the packets for dispatch by fragmenting data to form payloads for the packets.

Example 436 includes the subject matter of either of examples 434 or 435. In example 436, the non-transitory, machine readable medium includes collecting performance statistics on routes used in the routing strategy.

Example 437 includes the subject matter of any of examples 436 to 436. In example 437, the non-transitory, machine readable medium includes updating rankings of available routes based, at least in part, on the performance statistics.

Example 438 includes an apparatus. The apparatus includes an Internet-of-Things (IoT) network, wherein the IoT network includes an IoT gateway. The IoT gateway includes a communication interface to a first domain including communications in a first protocol and at a first security level, a communication interface to a second domain including communications in a second protocol and at a second security level, a protocol translator to translate payloads between the first protocol and the second protocol, and a security translator to translate payloads between the first protocol and the second protocol.

Example 439 includes the subject matter of example 438. In example 439, the apparatus includes a semantic translator to translate semantic representations of ingress data to semantic representations used in egress data.

Example 440 includes the subject matter of either of examples 438 or 439. In example 440, the apparatus includes a semantic translator plug-in to enable the semantic translator to translate the semantic representations of a payload in the ingress data to the semantic representations used in the egress data.

Example 441 includes the subject matter of any of examples 438 to 440. In example 441, the apparatus includes a first semantic plug-in to enable the semantic translator to translate the semantic representations of a payload in the ingress data to an intermediate semantic representation.

Example 442 includes the subject matter of any of examples 438 to 441. In example 442, the apparatus includes a second semantic plug-in to enable the semantic translator to translate the semantic representations of a payload from an intermediate semantic representation to the semantic representations used in the egress data.

Example 443 includes the subject matter of any of examples 438 to 442. In example 443, the apparatus includes a trusted execution environment including a plurality of translators to covert an ingress format to an egress format.

Example 444 includes the subject matter of any of examples 438 to 443. In example 444, the apparatus includes a trusted platform module to support the trusted execution environment.

Example 445 includes the subject matter of any of examples 438 to 444. In example 445, the apparatus includes a first protocol plug-in to enable the protocol translator to remove an ingress protocol from a payload.

Example 446 includes the subject matter of any of examples 438 to 445. In example 446, the apparatus includes a second protocol plug-in to enable the protocol translator to package a payload in an egress protocol.

Example 447 includes the subject matter of any of examples 438 to 446. In example 447, the apparatus includes a first security plug-in to enable the security translator to decrypt a payload encrypted at an ingress security level.

Example 448 includes the subject matter of any of examples 438 to 447. In example 448, the apparatus includes a second security plug-in to enable the security translator to encrypt a payload at an egress security level.

Example 449 includes the subject matter of any of examples 438 to 448. In example 449, the apparatus includes a secure data store including a security translation policy to control a security level difference allowed between an ingress payload and an egress payload.

Example 450 includes the subject matter of any of examples 438 to 449. In example 450, the apparatus includes a secure data store including a script compiler to compile a plug-in.

Example 451 includes the subject matter of any of examples 438 to 450. In example 451, the apparatus includes a secure data store including a plug-in installer.

Example 452 includes a method for translating communication between domains in an internet-of-things (IoT) gateway. The method for translating communication between domains in an internet-of-things (IoT) gateway includes receiving a payload in an ingress protocol from a first domain, removing the payload from the ingress protocol, decrypting the payload from an ingress security level, if the payload is encrypted, translating the payload from an ingress semantic representation to an egress semantic representation, if different from the ingress semantic representation. The method also includes encrypting the payload at an egress security level, if required by a security policy, packing the payload in an egress protocol, and transmitting the payload in a second domain.

Example 453 includes the subject matter of example 452. In example 453, the method includes, after removing the payload from the ingress protocol, determining if the payload is protected by a biometric and, if so, analyzing the biometric for content.

Example 454 includes the subject matter of either of examples 452 or 453. In example 454, the method includes, after encrypting the payload, protecting the payload with a simulation of the biometric.

Example 455 includes the subject matter of any of examples 452 to 454. In example 455, the method includes, after removing the payload from the ingress protocol, determining if the payload is privacy sensitive and, if so, applying a privacy policy to analyze the payload for content.

Example 456 includes the subject matter of any of examples 452 to 455. In example 456, the method includes, after encrypting the payload, applying the privacy policy to protect the payload.

Example 457 includes the subject matter of any of examples 452 to 456. In example 457, the method includes identifying a plurality of plug-ins to allow translation of communications between a first domain and a second domain, validating each of the plurality of plug-ins to determine that it is a valid plug-in, determining whether each valid plug-in is compatible with the IoT gateway, and, if so, installing each valid plug-in.

Example 458 includes the subject matter of any of examples 452 to 457. In example 458, the method includes compiling a plug-in to accelerate the translation the plug-in performs.

Example 459 includes the subject matter of any of examples 452 to 458. In example 459, the method includes configuring each valid plug-in for translation.

Example 460 includes a non-transitory, machine readable medium. The non-transitory, machine readable medium includes instructions that, when executed, direct a processor to receive ingress data from a first domain, process the ingress data under an ingress protocol to extract a payload, process the payload under ingress security policy, translate the payload from an ingress semantic format to an egress sematic format, process the payload under an egress security policy, process the payload under an egress protocol to package the payload into egress data, and transmit the egress data into a second domain.

Example 461 includes the subject matter of example 460. In example 461, the non-transitory, machine readable medium includes instructions that, when executed, direct the processor to process the payload under an ingress biometric policy to analyze content, and process the payload under an egress biometric policy to protect the content.

Example 462 includes the subject matter of either of examples 460 or 461. In example 462, the non-transitory, machine readable medium includes instructions that, when executed, direct the processor to process the payload under an ingress privacy policy to analyze content, and process the payload under an egress privacy policy to protect the content.

Example 463 includes the subject matter of any of examples 460 to 462. In example 463, the non-transitory, machine readable medium includes instructions that, when executed, direct the processor to perform a software measurement, and compare a result for the software measurement to an accepted value.

Example 464 includes the subject matter of any of examples 460 to 463. In example 464, the non-transitory, machine readable medium includes instructions that, when executed, direct the processor to validate a plug-in, and install the plug-in.

Example 465 includes the subject matter of any of examples 460 to 464. In example 465, the non-transitory, machine readable medium includes instructions that, when executed, direct the processor to compile a plug-in.

Example 466 includes an apparatus. The apparatus includes an Internet-of-Things (IoT) network, wherein the IoT network includes an IoT device. The IoT device includes a communication system to communicate with other IoT devices in a domain, an onboarding tool to discover a device in the domain and create resources for the device, a device discoverer to discover a remote device serviced by a remote onboarding tool located in a remote domain, a trust builder to establish trust with the remote onboarding tool, a shared domain creator to form a shared domain with the remote onboarding tool, and a shared resource directory storing resources for both the device and the remote device.

Example 467 includes the subject matter of example 466. In example 467, the device in the domain is represented by resources in a first resource block, the remote device in the remote domain is represented by resources in a second resource block, and a virtual domain stores a third resource block, wherein the third resource block includes the resources from the first resource block and the second resource block.

Example 468 includes the subject matter of either of examples 466 or 467. In example 468, the communication system includes a mesh transceiver, an uplink transceiver, or a network interface controller, or any combinations thereof.

Example 469 includes the subject matter of any of examples 466 to 468. In example 469, the apparatus includes a plurality of devices in a plurality of domains that form a fog device, wherein a common resource block in a virtual domain stores resources for all of the plurality of devices.

Example 470 includes the subject matter of any of examples 466 to 469. In example 470, the apparatus includes an orchestrator to provide information on a plurality of remote devices to the onboarding tool.

Example 471 includes the subject matter of any of examples 466 to 470. In example 471, the trust builder includes an attestation key, an identification key, or an assigned trust from an administrator, or any combinations thereof.

Example 472 includes the subject matter of any of examples 466 to 471. In example 472, the trust builder includes a blockchain system to form a blockchain root-of-trust.

Example 473 includes a method for sharing resources across domains. The method for sharing resources across domains includes joining a device to an IoT network in a first domain, adding resources for the device in the first domain to a local resource block, discovering a remote device in a remote domain, creating trust with the remote domain, and creating a shared resource block including resources for the device and the remote device.

Example 474 includes the subject matter of example 473. In example 474, the method includes creating a local resource block if not already in existence.

Example 475 includes the subject matter of either of examples 473 or 474. In example 475, discovering the remote device includes receiving information from an orchestrator about the remote device.

Example 476 includes the subject matter of any of examples 473 to 475. In example 476, discovering the remote device includes discovering an onboarding tool in the remote domain, and exchanging device information with the onboarding tool in the remote domain.

Example 477 includes the subject matter of any of examples 473 to 476. In example 477, creating trust with the remote device includes exchanging attestation information with the remote device.

Example 478 includes the subject matter of any of examples 473 to 477. In example 478, creating trust with the remote device includes looking up the remote device in a blockchain.

Example 479 includes the subject matter of any of examples 473 to 478. In example 479, creating trust with the remote device includes accepting an assigned trust setting from an administrator.

Example 480 includes the subject matter of any of examples 473 to 479. In example 480, the method includes renaming a sub-domain ID if the sub-domain ID matches a previous sub-domain ID in the shared resource block, and propagating the new sub-domain ID to all devices that use the sub-domain ID.

Example 481 includes the subject matter of any of examples 473 to 480. In example 481, the method includes renaming an object ID if the object ID matches a previous object ID in the shared resource block, and propagating the new object ID to all devices that use the object ID.

Example 482 includes the subject matter of any of examples 473 to 481. In example 482, the method includes renaming a device ID if the device ID matches a previous device ID in the shared resource block, and propagating the new device ID to all devices that use the device ID.

Example 483 includes the subject matter of any of examples 473 to 482. In example 483, the method includes accessing the resources of the remote device from the first domain.

Example 484 includes the subject matter of any of examples 473 to 483. In example 484, creating the shared resource block includes forming a union between the local resource block and a remote resource block.

Example 485 includes a non-transitory, machine readable medium. The non-transitory, machine readable medium includes instructions that, when executed, direct a processor to join a device to an IoT network, create a local resource for the device in a local resource block, discover devices in other domains, create a shared domain, create a shared resource block in the shared domain, and merge the local resource and remote resources for devices in the other domains in the shared resource block.

Example 486 includes the subject matter of example 485. In example 486, the non-transitory, machine readable medium includes instructions that, when executed, direct the processor to discover an onboarding tool in a remote domain, create trust with the onboarding tool in the remote domain, and exchange information on a plurality of devices in a local domain and the remote domain.

Example 487 includes the subject matter of either of examples 485 or 486. In example 487, the non-transitory, machine readable medium includes instructions that, when executed, direct the processor to discover an onboarding tool in a remote domain, and access a blockchain to validate the onboarding tool in the remote domain.

Example 488 includes the subject matter of any of examples 485 to 487. In example 488, the non-transitory, machine readable medium includes instructions that, when executed, direct the processor to detect a name overlap in the shared resource block, correct the name overlap by changing an overlapping entry to a new name, and propagating the new name to all devices that use that name.

Example 489 includes the subject matter of any of examples 485 to 488. In example 489, the non-transitory, machine readable medium includes instructions that, when executed, direct the processor to form a fog device including a device in a local domain and a remote device in a remote domain.

Example 490 includes an apparatus. The apparatus includes an Internet-of-Things (IoT) network, wherein the IoT network includes an IoT device, including a record key generator to generate a record key for a stage of a production process of a product, a private store communicator to communicate with a private store to save the record key and associated data collected for the stage by the IoT device, and a public store communicator to communicate with a public store to save the record key to the public store.

Example 491 includes the subject matter of example 490. In example 491, the record key generator obtains a record key from a distributed ledger.

Example 492 includes the subject matter of either of examples 490 or 491. In example 492, the record key generator is issued a record key from a central administrator.

Example 493 includes the subject matter of any of examples 490 to 492. In example 493, the apparatus includes a record key store to save the record key for a stage.

Example 494 includes the subject matter of any of examples 490 to 493. In example 494, the record key store is to store an appended record key, wherein the appended record key includes the record key for the stage of the production process appended to record keys for prior stages of the production process.

Example 495 includes the subject matter of any of examples 490 to 494. In example 495, the public store communicator is to save the appended record key for all stages to the public store.

Example 496 includes the subject matter of any of examples 490 to 495. In example 496, the apparatus includes a data monitor to monitor a sensor via an interface and associate the data with the record key.

Example 497 includes the subject matter of any of examples 490 to 496. In example 497, the sensor includes a temperature sensor, a shock sensor, or a global positioning system, or any combinations thereof.

Example 498 includes the subject matter of any of examples 490 to 497. In example 498, the apparatus includes an alerter to activate an alert indication if an in-transit limit has been breached.

Example 499 includes the subject matter of any of examples 490 to 498. In example 499, the in-transit limit includes a temperature limit, a shock limit, a light limit, or any combinations thereof.

Example 500 includes the subject matter of any of examples 490 to 499. In example 500, the alert includes an actuator for a light, a sound generator, or both.

Example 501 includes the subject matter of any of examples 490 to 500. In example 501, the alert includes a message sent over a mesh transceiver, an uplink transceiver, or both.

Example 502 includes a method for implementing a traceability system using an internet-of-things (IoT) device. The method for implementing a traceability system using an internet-of-things (IoT) device includes receiving a product shipping key for the product in the IoT device an IoT device with a product, receiving a processing key for the product in the IoT device, receiving a processed product shipping key for a processed product in the IoT device, receiving a point-of-sale key in the IoT device for the processed product, and transmitting an appended key including the product shipping key, the processing key, the processed product shipping key, and the point-of-sale key from the IoT device to a public data store.

Example 503 includes the subject matter of example 502. In example 503, the method includes collecting data on the production process for the product, storing the data for the production process in a production store, generating a production data key associated with the data for the production process, and saving the production data key to the IoT device.

Example 504 includes the subject matter of either of examples 502 or 503. In example 504, associating the IoT device with the product includes attaching the IoT device to the product packaging.

Example 505 includes the subject matter of any of examples 502 to 504. In example 505, the method includes collecting shipping data on shipping of the product, storing the shipping data in a shipping store, generating the product shipping key, and associating the shipping key with the shipping data in the shipping store.

Example 506 includes the subject matter of any of examples 502 to 505. In example 506, the data on shipping of the product includes temperature measurements, G force measurements, or location coordinates, or any combinations thereof.

Example 507 includes the subject matter of any of examples 502 to 506. In example 507, the method includes collecting processing data on processing of the product to form the processed product, storing the processing data for the processing of the product in a processing store, generating the processing key, and associating the processing key with the processing data in the processing store.

Example 508 includes the subject matter of any of examples 502 to 506. In example 508, processing of the product to form the processed product includes packaging the product at a warehouse.

Example 509 includes the subject matter of any of examples 502 to 508. In example 509, the method includes collecting processed product shipping data on shipping of the processed product, storing the shipping data for the processed product in a processing store, generating the processed product shipping key, and associating the processed product shipping key with the shipping data in the processing store.

Example 510 includes the subject matter of any of examples 502 to 509. In example 510, the method includes collecting point-of-sale data on the processed product at the point-of-sale, storing the point-of-sale data for the processed product in a sales store, generating the point-of-sale key, and associating the point-of-sale key with the point-of-sale data in the sales store.

Example 511 includes the subject matter of any of examples 502 to 510. In example 511, transmitting each of the keys from the IoT device to a public data store occurs when the product associated with the IoT device is sold.

Example 512 includes the subject matter of any of examples 502 to 511. In example 512, the method includes clearing the data from the IoT device, and returning the IoT device to a production facility to be associated with a new product.

Example 513 includes the subject matter of any of examples 502 to 512. In example 513, the method includes looking up a traceability hash, based, at least in part, on information associated with the product packaging, looking up a key in a public store, based, at least in part, on the traceability hash, and accessing information in a private store based, at least in part, on the key from the public store.

Example 514 includes a non-transitory, machine readable medium. The non-transitory, machine readable medium includes instructions that, when executed, direct a processor to record data for a production stage in an IoT device, communicate the data from the IoT device to a private store, generate a record key for the stage in the IoT device, and communicate the record key from the IoT device to the private store.

Example 515 includes the subject matter of example 514. In example 515, the non-transitory, machine readable medium includes instructions that, when executed, direct the processor to append the record key to key is generated for previous stages to generate an appended key.

Example 516 includes the subject matter of either of examples 514 or 515. In example 516, the non-transitory, machine readable medium includes instructions that, when executed, direct the processor to send the appended key to a public store.

Example 517 includes the subject matter of any of examples 514 to 516. In example 517, the non-transitory, machine readable medium includes instructions that, when executed, direct the processor to activate an alert if data limits are breached.

Example 518 includes an apparatus. The apparatus includes an Internet-of-Things (IoT) network, wherein the IoT network includes an IoT device. The IoT device includes a communication system to communicate with other IoT devices in the IoT network, a policy decision engine to determine which policies are going to be enforced, a policy repository to store the policies and state information reported by a network monitor, a policy enforcement engine to enforce the policies determined by the policy decision engine, and a peer monitor to monitor policies enforced by the IoT device, and by other IoT devices in the IoT network.

Example 519 includes the subject matter of example 518. In example 519, the communication system includes a mesh transceiver, an uplink transceiver, or a network interface controller, or any combinations thereof.

Example 520 includes the subject matter of either of examples 518 or 519. In example 520, the IoT network includes a plurality of devices forming a fog device.

Example 521 includes the subject matter of any of examples 518 to 520. In example 521, the policy decision engine is to base a determination of which policies are going to be enforced on a parameter for the IoT device.

Example 522 includes the subject matter of any of examples 518 to 521. In example 522, the parameter includes a remaining capacity of a battery in the IoT device, other IoT devices coupled through a mesh transceiver, or a status of an uplink transceiver to devices in a cloud, or any combinations thereof.

Example 523 includes the subject matter of any of examples 518 to 522. In example 523, the policy decision engine changes the policies being enforced based, at least in part, on a change in the parameter.

Example 524 includes the subject matter of any of examples 518 to 523. In example 524, the policy decision engine distributes policies to non-configured nodes.

Example 525 includes the subject matter of any of examples 518 to 524. In example 525, the peer monitor collects information and stores it in a database.

Example 526 includes the subject matter of any of examples 518 to 525. In example 526, the information includes current device configuration, a capability of a peer node, a service being offered, a node requirement for a network, a resource availability estimation, or a triggered event, or any combinations thereof.

Example 527 includes the subject matter of any of examples 518 to 526. In example 527, the apparatus includes a coordinator to distribute policies to peer nodes in the IoT network.

Example 528 includes the subject matter of any of examples 518 to 527. In example 528, the coordinator includes a gateway between the IoT network and a cloud device.

Example 529 includes the subject matter of any of examples 518 to 528. In example 529, the IoT device is to distribute policies to nearest neighboring nodes.

Example 530 includes the subject matter of any of examples 518 to 529. In example 530, the policy decision engine communicates with peer nodes to access policies.

Example 531 includes a method for distributing policy management across IoT devices in an IoT network. The method for distributing policy management across IoT devices in an IoT network includes receiving a discover message at a node, wherein the discover message is intended to identify new policies, change policies, or both, responding to the discover message with an offer message, wherein the offer message identifies policies, receiving an accept message, wherein the accept message requests the policies, and responding with a message that includes the policies.

Example 532 includes the subject matter of example 531. In example 532, the method includes installing policies received from a peer node, and updating a status to a configured node.

Example 533 includes the subject matter of either of examples 531 or 532. In example 533, the method includes receiving an updated policy in an update message.

Example 534 includes the subject matter of any of examples 531 to 533. In example 534, the method includes performing a validation on the updated policy received in the update message, and installing the updated policy.

Example 535 includes the subject matter of any of examples 531 to 534. In example 535, the validation includes determining whether the new policy conflicts with a current policy, and, if so, rejecting the new policy.

Example 536 includes the subject matter of any of examples 531 to 535. In example 536, the validation includes determining whether the new policy conflicts with a current policy, and, if so, partially implementing the new policy.

Example 537 includes the subject matter of any of examples 531 to 536. In example 537, the method includes sending a conflict alert message to a peer node to alert the peer node to a policy conflict.

Example 538 includes the subject matter of any of examples 531 to 537. In example 538, the method includes receiving a discover message from the peer node for the policy update, replying with an offer message, receiving an accept message from the peer node to indicate that the policy update may be sent, and sending an update message including the new policy.

Example 539 includes the subject matter of any of examples 531 to 538. In example 539, the method includes performing a validation on the updated policy received in the update message, and installing the updated policy.

Example 540 includes the subject matter of any of examples 531 to 539. In example 540, the method includes generating a file including a delta between a current policy and a new policy, and sending the file to a peer node.

Example 541 includes the subject matter of any of examples 531 to 540. In example 541, the method includes determining if a peer node has hardware capacity for the policies, modifying the policies to match the hardware capacity of the peer node, and sending the modified policies to the peer node.

Example 542 includes the subject matter of any of examples 531 to 541. In example 542, the method includes determining changes between new policies and current policies, and sending the changes in policies to the peer node.

Example 543 includes a non-transitory, machine readable medium. The non-transitory, machine readable medium includes instructions that, when executed, direct a processor to direct the processor to discover policies in other nodes, and update policies from messages sent by other nodes in an IoT network.

Example 544 includes the subject matter of example 543. In example 544, the non-transitory, machine readable medium includes instructions that, when executed, direct a processor to concatenate policies from multiple nodes.

Example 545 includes the subject matter of either of examples 543 or 544. In example 545, the non-transitory, machine readable medium includes instructions that, when executed, direct a processor to validate policies received in messages from other nodes, and reject policies that conflict with group objectives.

Example 546 includes the subject matter of any of examples 543 to 545. In example 546, the non-transitory, machine readable medium includes instructions that, when executed, direct a processor to change implemented policies to match current device conditions.

Example 547 includes the subject matter of any of examples 543 to 546. In example 547, the non-transitory, machine readable medium includes instructions that, when executed, direct a processor to calculate a delta between policies.

Example 548 includes an apparatus. The apparatus includes an Internet-of-Things (IoT) network, wherein the IoT network includes a power plug device. The power plug device includes a power supply to provide power to circuitry within the power plug device and a power controller to supply power to an external IoT device, an interface to interrogate the external IoT device to determine if the external IoT device has failed, and the power plug device to cycle the power to the external IoT device via the power controller if the external IoT device has failed.

Example 549 includes the subject matter of example 548. In example 549, the interface includes a network interface controller to interface with the external IoT device for exchanging data, providing power, or both.

Example 550 includes the subject matter of either of examples 548 or 549. In example 550, the interface includes a universal serial bus to interface with the external IoT device for exchanging data, providing power, or both.

Example 551 includes the subject matter of any of examples 548 to 550. In example 551, the interface includes a JTAG interface to interface with the external IoT device for monitoring operation, performing a power reset function, or remote flashing of nonvolatile memory, or any combinations thereof.

Example 552 includes the subject matter of any of examples 548 to 551. In example 552, the interface includes a serial peripheral interface (SPI) bus, an 120 bus, or an 130 bus, or any combination thereof.

Example 553 includes the subject matter of any of examples 548 to 552. In example 553, the power plug device includes an HID transport interface to interface with a sensor.

Example 554 includes the subject matter of any of examples 548 to 553. In example 554, the sensor includes an ambient temperature sensor, a humidity sensor, a proximity sensor, or a presence sensor, or any combinations thereof.

Example 555 includes the subject matter of any of examples 548 to 554. In example 555, the apparatus includes a trusted platform module to establish a trusted execute environment (TEE) for the power plug device.

Example 556 includes the subject matter of any of examples 548 to 555. In example 556, the apparatus includes a monitor to monitor an operation of external IoT device.

Example 557 includes the subject matter of any of examples 548 to 556. In example 557, the apparatus includes an actuator to cycle the power of the external IoT device using the power control.

Example 558 includes the subject matter of any of examples 548 to 557. In example 558, the apparatus includes a communication system including a mesh transceiver, an uplink transceiver, or a network interface controller, or any combinations thereof.

Example 559 includes the subject matter of any of examples 558 to 558. In example 559, the apparatus includes a reporter to report a condition of the external IoT device through the communication system.

Example 560 includes the subject matter of any of examples 548 to 559. In example 560, the apparatus includes a plurality of IoT devices in communication with the power plug device, wherein the power plug device reports a status of each of the plurality of IoT devices in communication with the power plug device.

Example 561 includes a method for improving availability of an internet of things (IoT) device using a power plug device. The method for improving availability of an internet of things (IoT) device using a power plug device includes discovering a list of managed IoT devices, initializing the power plug device, monitoring an IoT device, reporting a status of the IoT device, and taking an action to restore operations if the IoT device has failed.

Example 562 includes the subject matter of example 561. In example 562, discovering the list of managed IoT devices includes enumerating physical paths connected to the power plug device, and querying each of the physical paths to determine what is physically connected.

Example 563 includes the subject matter of either of examples 561 or 562. In example 563, discovering the list of managed IoT devices includes cycling through radios and communication links to discover nearby devices to manage.

Example 564 includes the subject matter of any of examples 561 to 563. In example 564, initializing the power plug device includes loading policies from a remote host, an orchestration device, or both.

Example 565 includes the subject matter of any of examples 561 to 564. In example 565, the policies include sets of rules that associate actions with the list of managed IoT devices.

Example 566 includes the subject matter of any of examples 561 to 565. In example 566, the actions are based, at least in part, on a type of connection to the IoT device.

Example 567 includes the subject matter of any of examples 561 to 566. In example 567, monitoring an IoT device includes monitoring communications from the IoT device, receiving messages from a watchdog agent in the IoT device, monitoring for a failure to receive a message from the watchdog agent in the IoT device, or any combinations thereof.

Example 568 includes the subject matter of any of examples 561 to 567. In example 568, reporting a status of the IoT device includes sending an alert.

Example 569 includes the subject matter of any of examples 561 to 568. In example 569, the alert includes an email, an event written to a log, or a text message, or any combinations thereof.

Example 570 includes the subject matter of any of examples 561 to 569. In example 570, taking the action to restore operations includes remotely restart in the device.

Example 571 includes the subject matter of any of examples 561 to 570. In example 571, taking the action to restore operations includes flashing firmware in the IoT device.

Example 572 includes the subject matter of any of examples 561 to 571. In example 572, taking the action to restore operations includes cycling the power to an IoT device obtaining power from the power plug device.

Example 573 includes the subject matter of any of examples 561 to 572. In example 573, taking the action to restore operations includes switching from a power supply to a battery.

Example 574 includes a non-transitory, machine readable medium. The non-transitory, machine readable medium includes instructions that, when executed, direct a processor to discover internet of things (IoT) devices to manage, build a list of managed IoT devices, initialize a power plug device, and monitor the managed IoT devices.

Example 575 includes the subject matter of example 574. In example 575, the non-transitory, machine readable medium includes instructions that, when executed, direct the processor to advertise power plugs and connected IoT devices.

Example 576 includes the subject matter of either of examples 574 or 575. In example 576, the non-transitory, machine readable medium includes instructions that, when executed, direct the processor to report a status of the managed IoT devices.

Example 577 includes the subject matter of any of examples 574 to 576. In example 577, the non-transitory, machine readable medium includes instructions that, when executed, direct the processor to actuate managed IoT devices to restore operations.

Example 578 includes an apparatus. The apparatus includes an Internet-of-Things (IoT) network, wherein the IoT network includes an IoT device. The IoT device includes a host environment, including a watchdog agent to send watchdog messages that report on health and operation of the host environment, and a trusted reliability engine (TRE), including a power supply separate from the power supply for the host environment, TRE distributed ledger logic to write the watchdog messages to a TRE blockchain, and TRE logic to apply a failover action if the host environment fails.

Example 579 includes the subject matter of example 578. In example 579, the host environment includes an image creator to make an image of the host environment and send image copy to the TRE to be saved as a host replacement image (HRI).

Example 580 includes the subject matter of either of examples 578 or 579. In example 580, the host environment includes host blockchain logic to maintain a host blockchain.

Example 581 includes the subject matter of any of examples 578 to 580. In example 581, the host blockchain includes watchdog message blocks, peer device blocks, or identity blocks, or any combinations thereof.

Example 582 includes the subject matter of any of examples 578 to 581. In example 582, the host environment includes a communicator to communicate with other mesh devices, devices in a cloud, or both.

Example 583 includes the subject matter of any of examples 578 to 582. In example 583, the TRE includes a communication system to allow the TRE to communicate with external devices if the host environment fails.

Example 584 includes the subject matter of any of examples 578 to 583. In example 584, the TRE includes a host replacement image (HRI).

Example 585 includes the subject matter of any of examples 578 to 584. In example 585, the HRI includes a copy of an operating system, drivers, and functional code for the IoT device.

Example 586 includes a method for implementing a failover mechanism using a trusted reliability engine (TRE). The method for implementing a failover mechanism using a trusted reliability engine (TRE) includes monitoring a host environment for a failure, posting a watchdog message to a blockchain, detecting a failure of the host environment, and implementing a failure process to recover from the failure of the host environment.

Example 587 includes the subject matter of example 586. In example 587, monitoring the host environment includes receiving pings from the host environment.

Example 588 includes the subject matter of either of examples 586 or 587. In example 588, when posting the watchdog message includes incorporating a ping into the watchdog message, and committing the watchdog message to the blockchain as a transaction.

Example 589 includes the subject matter of any of examples 586 to 588. In example 589, detecting the failure of the host environment includes determining that no pings have been received from the host environment for a selected period of time.

Example 590 includes the subject matter of any of examples 586 to 589. In example 590, detecting the failure of the host environment includes determining that no communications are taking place over a bus of the host environment.

Example 591 includes the subject matter of any of examples 586 to 590. In example 591, detecting the failure the host environment includes determining that a CPU has halted.

Example 592 includes the subject matter of any of examples 586 to 591. In example 592, detecting the failure of the host environment includes determining that a memory in the host environment has failed.

Example 593 includes the subject matter of any of examples 586 to 592. In example 593, the failure process includes determining if the host environment is locally recoverable, and, if so installing a host replacement image in the host environment, and restarting the host environment.

Example 594 includes the subject matter of any of examples 586 to 593. In example 594, the failure process includes determining if a failover device is nearby, and, if so configuring the failover device to begin performing a function of the host environment.

Example 595 includes the subject matter of any of examples 586 to 594. In example 595, the failure process includes determining if a device including the host environment is repairable, and, if so, dispatching a repair drone to repair the device.

Example 596 includes the subject matter of any of examples 586 to 595. In example 596, the failure process includes determining if a device including the host environment is replaceable, and, if so, dispatching a repair drone to replace the device.

Example 597 includes the subject matter of any of examples 586 to 596. In example 597, the failure process includes determining if the failure is resolved, and, if so, decommissioning the host environment, placing the TRE in a sleep state, or both.

Example 598 includes a non-transitory, machine readable medium. The non-transitory, machine readable medium includes instructions that, when executed, direct a processor to monitor a host environment for a heartbeat message, produce a watchdog (WD) message, post the WD message to a blockchain, and detect a failure in a host environment.

Example 599 includes the subject matter of example 598. In example 599, the non-transitory, machine readable medium includes instructions that, when executed, direct the processor to detect the failure in a local host environment, and install a host replacement image.

Example 600 includes the subject matter of either of examples 598 or 599. In example 600, the non-transitory, machine readable medium includes instructions that, when executed, direct the processor to detect the failure in a remote host environment, and configure a failover device to function as the remote host environment.

Example 601 includes the subject matter of any of examples 598 to 600. In example 601, the non-transitory, machine readable medium includes instructions that, when executed, direct the processor to detect the failure in a remote host environment, and dispatch a drone for repair or replacement of a device including the remote host environment.

Example 602 includes the subject matter of any of examples 598 to 601. In example 602, the non-transitory, machine readable medium includes instructions that, when executed, direct the processor to determine that the failure has been resolved, and decommission a failed device.

Example 603 includes an apparatus. The apparatus includes an Internet-of-Things (IoT) network, wherein the IoT network includes an IoT device. The IoT device includes a communicator to receive a packet from another IoT device that includes a fractional key and an offset in a payload field of the frame, a byte comparer to compare overlapping bytes of the fractional key and another fractional key stored in a circular buffer, and a key assembler to place the fractional key in the circular buffer at the offset.

Example 604 includes the subject matter of example 603. In example 604, if overlapping bytes of the fractional key and the other fractional key stored in the circular buffer do not match, the byte comparer is to prevent the key assembler from placing the fractional key in the circular buffer.

Example 605 includes the subject matter of either of examples 603 or 604. In example 605, the key assembler is to build a final key in the circular buffer from a plurality of fractional keys received from other IoT devices.

Example 606 includes the subject matter of any of examples 603 to 605. In example 606, the apparatus includes a key operator to use a key assembled in the circular buffer.

Example 607 includes the subject matter of any of examples 603 to 606. In example 607, the apparatus includes a key operator to use a key assembled in the circular buffer in in a process.

Example 608 includes the subject matter of any of examples 603 to 607. In example 608, the process includes providing the key to a gateway to confirm an identity of the IoT device.

Example 609 includes the subject matter of any of examples 603 to 608. In example 609, the process includes providing the key to a gateway to confirm an identity of a fog device.

Example 610 includes the subject matter of any of examples 603 to 609. In example 610, the apparatus includes a fractional key generator to generate a fractional key for the IoT device, and the communicator to build a frame that includes the fractional key in the payload of the frame and to send the frame to peer devices.

Example 611 includes a method for assembling a full key from fractional keys stored in individual nodes in an IoT network. The method for assembling a full key from fractional keys stored in individual nodes in an IoT network includes receiving a fractional key from a device in the IoT network, comparing overlapping bytes of the fractional key with other fractional keys received from other devices, and constructing the full key in a circular buffer.

Example 612 includes the subject matter of any of examples 611 to 612. In example 612, the method includes receiving a frame from the device in the IoT network, and determining if the frame includes a fractional key in a payload field.

Example 613 includes the subject matter of example 611. In example 613, the method includes storing the fractional key in the circular buffer and, if the fractional key overlaps an end of the circular buffer, writing remaining bytes at an opposite end of the circular buffer.

Example 614 includes the subject matter of either of examples 611 or 613. In example 614, the method includes receiving a second fractional key from another device, determining if any bytes in the second fractional key overlap bytes already written to the circular buffer, and comparing the bytes in the second fractional key that overlap bytes already written to the circular buffer.

Example 615 includes the subject matter of any of examples 611 to 614. In example 615, the method includes determining that bytes in the second fractional key do not match overlapping bytes already written to the circular buffer, deleting the second fractional key, and sending an alert that a device may be compromised.

Example 616 includes the subject matter of any of examples 611 to 615. In example 616, the method includes determining that all bytes in the second fractional key match overlapping bytes already written to the circular buffer, and writing the second fractional key to the circular buffer.

Example 617 includes the subject matter of any of examples 611 to 616. In example 617, the method includes determining that all keys have been received and that the circular buffer includes the full key, and providing the full key to another device.

Example 618 includes the subject matter of any of examples 611 to 617. In example 618, the fractional keys are of different lengths.

Example 619 includes the subject matter of any of examples 611 to 618. In example 619, the full key is assembled before all fractional keys have been received.

Example 620 includes a non-transitory, machine readable medium. The non-transitory, machine readable medium includes instructions that, when executed, direct a processor to receive a fractional key from a device, compare bytes in the fractional key to bytes already written to a circular buffer, and write the fractional key to the circular buffer.

Example 621 includes the subject matter of any of examples 620 to 621. In example 621, the non-transitory, machine readable medium includes instructions that, when executed, direct the processor to receive a frame from a device, and determine that the frame includes a fractional key in a payload field.

Example 622 includes the subject matter of example 620. In example 622, the non-transitory, machine readable medium includes instructions that, when executed, direct the processor to dispatch a fractional key to another device.

Example 623 includes the subject matter of either of examples 620 or 622. In example 623, the non-transitory, machine readable medium includes instructions that, when executed, direct the processor to use a full key assembled in the circular buffer.

Example 624 includes the subject matter of any of examples 620 to 623. In example 624, the non-transitory, machine readable medium includes instructions that, when executed, direct the processor to determine that overlapping bytes between a fractional key and bytes written to the circular buffer do not match, and prevent use of the fractional key.

Example 625 includes an apparatus. The apparatus includes an Internet-of-Things (IoT) network, wherein the IoT network includes an IoT device. The IoT device includes a communicator to exchange packets with other devices through a transceiver, a network interface controller, or both, a key generator to generate a key by performing a logical operation of a full fractional key and a local key, and a transactor to use the key to commit a transaction to a network through the communicator.

Example 626 includes the subject matter of example 625. In example 626, the IoT device includes a key lifetime timer to control a period of time the key may be used before a new key is generated.

Example 627 includes the subject matter of either of examples 625 or 626. In example 627, the IoT device includes a circular buffer to store a result of the logical operation between the full fractional key and the local key.

Example 628 includes the subject matter of any of examples 625 to 627. In example 628, the IoT device includes the full fractional key, and wherein the full fractional key is assembled from fractional keys transferred from other IoT devices.

Example 629 includes the subject matter of any of examples 625 to 628. In example 629, the logical operation includes an exclusive or performed between the full fractional key and the local key.

Example 630 includes the subject matter of any of examples 625 to 629. In example 630, the transaction includes a purchase, a rental, a payment for access, or any combinations thereof.

Example 631 includes the subject matter of any of examples 625 to 630. In example 631, the key generator is to obtain a local key from a blockchain.

Example 632 includes a method for generating a key on demand in an internet-of-things (IoT) device. The method for generating a key on demand in an internet-of-things (IoT) device includes generating a new key by performing a logical operation between a full fractional key and a local key, verifying the new key, and using the new key to commit a transaction.

Example 633 includes the subject matter of example 632. In example 633, the method includes receiving a plurality of fractional keys from other IoT devices, and assembling the plurality of fractional keys to form the full fractional key.

Example 634 includes the subject matter of either of examples 632 or 633. In example 634, the method includes determining if a key offset value has been received, and, if not, generating the key offset value.

Example 635 includes the subject matter of any of examples 632 to 634. In example 635, the method includes using the key offset value to determine a starting point in a circular buffer for the logical operation between the full fractional key and the local key.

Example 636 includes the subject matter of any of examples 632 to 635. In example 636, the logical operation includes an exclusive or performed between each bit of the full fractional key and each bit of the local key.

Example 637 includes the subject matter of any of examples 632 to 636. In example 637, the method includes determining if the new key has expired, and, if so, generating another new key.

Example 638 includes the subject matter of any of examples 632 to 637. In example 638, the method includes generating another new key after the new key has been used in a transaction.

Example 639 includes the subject matter of any of examples 632 to 638. In example 639, the method includes deleting the new key after it has been used to commit a transaction.

Example 640 includes a non-transitory, machine readable medium. The non-transitory, machine readable medium includes instructions that, when executed, direct a processor to receive a fractional key, receive an offset value, and generate a new key based, at least in part, on the fractional key and the offset value.

Example 641 includes the subject matter of example 640. In example 641, the non-transitory, machine readable medium includes instructions that, when executed, direct the processor to receive a plurality of fractional keys from Internet-of-things (IoT) devices in a network, and assemble the plurality of fractional keys to form a full fractional key.

Example 642 includes the subject matter of either of examples 640 or 641. In example 642, the non-transitory, machine readable medium includes instructions that, when executed, direct the processor to perform an exclusive or operation between each bit of the full fractional key and each bit of a local key, starting at the offset value, to generate the new key.

Example 643 includes the subject matter of any of examples 640 to 642. In example 643, the non-transitory, machine readable medium includes instructions that, when executed, direct the processor to encrypt data using the new key.

Example 644 includes the subject matter of any of examples 640 to 643. In example 644, the non-transitory, machine readable medium includes instructions that, when executed, direct the processor to expire the new key after a selected time, and generate another new key.

Example 645 includes the subject matter of any of examples 640 to 644. In example 645, the non-transitory, machine readable medium includes instructions that, when executed, direct the processor to perform a transaction validated by the new key, expire the new key after the transaction has been completed, and generate another new key.

Example 646 includes the subject matter of any of examples 640 to 645. In example 646, the non-transitory, machine readable medium includes instructions that, when executed, direct the processor to obtain a key from a blockchain.

Example 647 includes an apparatus. The apparatus includes an Internet-of-Things (IoT) network, wherein the IoT network includes an IoT device. The IoT device includes a context identifier to determine a context for generation of seeds, a seed tree generator to generate a seed tree from the context, and a seed generator to generate a seed for each node in the seed tree.

Example 648 includes the subject matter of example 647. In example 648, the context may be based, at least in part, on a time, a location, or an IP address, or any combinations thereof.

Example 649 includes the subject matter of either of examples 647 or 648. In example 649, the seed tree generator decomposes the context to form the seed tree.

Example 650 includes the subject matter of any of examples 647 to 649. In example 650, the seed tree generator extracts a portion of the context at each node, and wherein the portion includes a numerical value.

Example 651 includes the subject matter of any of examples 647 to 650. In example 651, the seed generator uses the numerical value as a seed to generate a random number.

Example 652 includes the subject matter of any of examples 647 to 651, including a communicator to exchange packets with other IoT devices to 652. In example 652, the packets include the context, a hierarchical level, or a root seed, or any combinations thereof.

Example 653 includes the subject matter of any of examples 647 to 652. In example 653, the seed generator generates a root seed for a top node in a seed tree.

Example 654 includes the subject matter of any of examples 647 to 653. In example 654, the IoT device includes a fractional key assembler to assemble a full fractional key from fractional key portions received from other IoT devices over a communicator.

Example 655 includes the subject matter of any of examples 647 to 654. In example 655, the IoT device includes an encryptor/decryptor to encrypt or decrypt communications using a key generated from the seed.

Example 656 includes a method for generating a shared secret for secure communications between IoT devices. The method for generating a shared secret for secure communications between IoT devices includes identifying an attribute in common between the IoT devices, decomposing the attribute to form a seed tree, generating a seed for a root of the seed tree, and provisioning the seed and the attribute to each participating device.

Example 657 includes the subject matter of example 656. In example 657, decomposing the attribute includes assigning a subset of the attribute to each node in a hierarchy.

Example 658 includes the subject matter of either of examples 656 or 657. In example 658, the method includes using the seed for the root of the seed tree to generate a new seed for a node in the seed tree, and using the new seed to generate a cryptographic key.

Example 659 includes the subject matter of any of examples 656 to 658. In example 659, the method includes using a cryptographic secret to divide the seed into shares, provisioning the shares across devices.

Example 660 includes the subject matter of any of examples 656 to 659. In example 660, the method includes using a network to obtain each of the shares, and reassembling the seed from the shares.

Example 661 includes the subject matter of any of examples 656 to 660. In example 661, the method includes receiving a plurality of fractional keys from other IoT devices in a network, and assembling a full fractional key from the plurality of fractional keys.

Example 662 includes the subject matter of any of examples 656 to 661. In example 662, the method includes encrypting data using a cryptographic key generated for a node in the seed tree, sending the data to another IoT device, and decrypting the data using a cryptographic key generated for the node in the seed tree stored in the other IoT device.

Example 663 includes a non-transitory, machine readable medium. The non-transitory, machine readable medium includes instructions that, when executed, direct a processor to generate a seed tree for a context, generate a root seed for the context, provide the context to other devices, and provide the root seed to other devices.

Example 664 includes the subject matter of any of examples 663. In example 664, the non-transitory, machine readable medium includes instructions that, when executed, direct a processor to generate a seed for each node in the seed tree, use the seed to generate a cryptographic key, and use the cryptographic key to encrypt data sent to other devices.

Example 665 includes the subject matter of either of examples 663 or 664. In example 665, the non-transitory, machine readable medium includes instructions that, when executed, direct a processor to receive the context from another device, receive the root seed from another device, generate a local seed tree for the context, and use the root seed to generate a local cryptographic key for each node in the local seed tree.

Example 666 includes the non-transitory, machine readable medium of examples 663 to 665. In example 666, the non-transitory, machine readable medium includes instructions that, when executed, direct a processor to receive a fractional key, receive an offset value, and generate a new key based, at least in part, on the fractional key and the offset value.

Example 667 includes the subject matter of any of examples 663 to 666. In example 667, the non-transitory, machine readable medium includes instructions that, when executed, direct the processor to receive a plurality of fractional keys from Internet-of-things (IoT) devices in a network, and assemble the plurality of fractional keys to form a full fractional key.

Example 668 includes an apparatus. The apparatus includes an Internet-of-Things (IoT) network, wherein the IoT network includes an IoT server. The IoT server includes a secure booter/measurer to use a trusted platform module (TPM) to create a trusted execute environment (TEE), a trust anchor for confirming an identity of a service provider, an authenticator to authenticate communications with an IoT client using a symmetric key (SK), a key manager to determine if a key has expired, and a key generator to generate the key.

Example 669 includes the subject matter of examples 668. In example 669, the trust anchor includes a hash of a public key, or a certified path, or chain to a trusted root of authority Example 670 includes the subject matter of either of examples 668 or 679. In example 670, the SK is a temporal symmetric key (TSK) generated by the key generator.

Example 671 includes the subject matter of any of examples 668 to 670. In example 671, the IoT server includes a public key (PK) for decrypting messages from a service provider.

Example 672 includes the subject matter of any of examples 668 to 671. In example 672, the IoT server includes an expiration time for the public key.

Example 673 includes the subject matter of any of examples 668 to 672. In example 673, the IoT server includes an SK received from the service provider.

Example 674 includes the subject matter of any of examples 668 to 673. In example 674, the IoT server includes an expiration time for the SK.

Example 675 includes the subject matter of any of examples 668 to 674. In example 675, the IoT server includes a service provider credential to validate the IoT server to the service provider.

Example 676 includes the subject matter of any of examples 668 to 675. In example 676, the apparatus includes the IoT client including an SK for communication.

Example 677 includes the subject matter of any of examples 668 to 676. In example 677, the apparatus includes the IoT server including a status for a public key.

Example 678 includes the subject matter of any of examples 668 to 677. In example 678, the apparatus includes an entity to detect that a public key has been compromised, and to send a revocation message to the IoT server.

Example 679 includes a method for unified key management in an IoT network environment. The method for unified key management in an IoT network environment includes sending a request from an IoT client to a service provider for a communication key, receiving the communication key at the IoT client from the service provider, sending the communication key to an IoT server from the IoT client, and communicating with the IoT server using a symmetric key to decrypt messages received from the IoT server.

Example 680 includes the subject matter of example 679. In example 680, the communication key includes the symmetric key.

Example 681 includes the subject matter of either of examples 679 or 680. In example 681, the communication key includes a certificate provided by the IoT server.

Example 682 includes the subject matter of any of examples 679 to 681, including receiving a temporal symmetric key at the IoT client from the IoT server to 682. In example 682, the temporal symmetric key includes the symmetric key.

Example 683 includes the subject matter of any of examples 679 to 682. In example 683, the method includes requesting credentials for the IoT server from a service provider for secure communications, and receiving a trust anchor at the IoT server from the service provider.

Example 684 includes the subject matter of any of examples 679 to 683. In example 684, the method includes generating a temporal symmetric key in the IoT server.

Example 685 includes the subject matter of any of examples 679 to 684. In example 685, the method includes receiving a revocation message at the IoT server to revoke the communication key.

Example 686 includes the subject matter of any of examples 679 to 685. In example 686, the method includes expiring the communication key, and requesting a new communication key to be provided by the service provider.

Example 687 includes a non-transitory, machine readable medium. The non-transitory, machine readable medium includes instructions that, when executed, direct a processor to authenticate to a service provider, obtain a key from the service provider, provide a communication key to a device, and communicate with the device using the key to encrypt and decrypt data.

Example 688 includes the subject matter of examples 687. In example 688, the non-transitory, machine readable medium includes instructions that, when executed, direct the processor to receive the key from the device.

Example 689 includes the subject matter of either of examples 687 or 688. In example 689, the non-transitory, machine readable medium includes instructions that, when executed, direct the processor to generate the communication key in response to the key received from the service provider.

Example 690 includes the subject matter of any of examples 687 to 689. In example 690, the non-transitory, machine readable medium includes instructions that, when executed, direct the processor to determine if the key has passed a predetermined lifespan.

Example 691 includes the subject matter of any of examples 687 to 690. In example 691, the non-transitory, machine readable medium includes instructions that, when executed, direct the processor to revoke the key and repeat authentication to the service provider.

Example 692 includes the subject matter of any of examples 687 to 691. In example 692, the non-transitory, machine readable medium includes instructions that, when executed, direct the processor to refresh a revoked or expired key.

Example 693 includes the subject matter of any of examples 687 to 692. In example 693, the non-transitory, machine readable medium includes instructions that, when executed, direct the processor to receive a revocation message and revoke the key.

Example 694 includes an apparatus. The apparatus includes an Internet-of-Things (IoT) network, wherein the IoT network includes an IoT device. The IoT device includes a service enumerator to enumerate services available to the IoT device, services that can be provided by the IoT device, or both, a contract enumerator to discover a contract for the IoT device, and a join contract function to join the IoT device to the contract.

Example 695 includes the subject matter of examples 694. In example 695, the IoT device includes blockchain logic to share and maintain a blockchain across a network of IoT devices, and the blockchain including services, contracts, identities, attributes, or any combinations thereof.

Example 696 includes the subject matter of either of examples 694 or 695. In example 696, the blockchain includes a list of created devices, wherein the list of created devices includes the devices joined to the contract.

Example 697 includes the subject matter of any of examples 694 to 696. In example 697, the blockchain includes a device attribute list for each device in the list of created devices, including context properties, advertised services, or both for the device.

Example 698 includes the subject matter of any of examples 694 to 697. In example 698, the IoT device includes a leave contract function to terminate participation of the IoT device in a contract.

Example 699 includes the subject matter of any of examples 694 to 698. In example 699, the IoT device includes an issue token function to issue tokens to devices.

Example 700 includes the subject matter of any of examples 694 to 699. In example 700, the IoT device includes a revoked token function to invalidate tokens issued to a device when the device leaves the contract.

Example 701 includes the subject matter of any of examples 694 to 700. In example 701, the IoT device includes a trusted platform module to perform measurements for a trusted execute environment during a booting process.

Example 702 includes a method for managing a lifecycle of devices. The method for managing a lifecycle of devices includes booting an IoT device into a secure enclave, running an identity client in the secure enclave, acquiring an identity for the IoT device, generating a commissioning transaction for the IoT device, enumerating contracts available to the IoT device, and joining the IoT device to a contract.

Example 703 includes the subject matter of example 702. In example 703, acquiring an identity for the IoT device includes enumerating services from which the identity can be acquired, selecting a service to obtain the identity, and requesting the identity from the service.

Example 704 includes the subject matter of either of examples 702 or 703. In example 704, the identity includes a DNS name, a NetBIOS name, an IP address, or a UUID, or any combinations thereof.

Example 705 includes the subject matter of any of examples 702 to 704. In example 705, the identity is selected based, at least in part, on the contract.

Example 706 includes the subject matter of any of examples 702 to 705. In example 706, the method includes sending an alert message if acquiring the identity fails.

Example 707 includes the subject matter of any of examples 702 to 706. In example 707, the method includes assigning an initial balance of funds when the identity is acquired.

Example 708 includes the subject matter of any of examples 702 to 707. In example 708, joining the IoT device to the contract includes sending a fee to a wallet address for an owner of the contract.

Example 709 includes the subject matter of any of examples 702 to 708. In example 709, the method includes completing requirements for joining the contract before joining the contract.

Example 710 includes the subject matter of any of examples 702 to 709. In example 710, requirements include encrypting a storage prior to joining the contract.

Example 711 includes the subject matter of any of examples 702 to 710. In example 711, the method includes adding the IoT device to a list of created devices associated with the contract.

Example 712 includes the subject matter of any of examples 702 to 711. In example 712, the method includes publishing device attributes for the IoT device.

Example 713 includes the subject matter of any of examples 702 to 712. In example 713, the method includes identifying a mechanism to attest to each of the device attributes.

Example 714 includes the subject matter of any of examples 702 to 713. In example 714, the method includes requesting tokens for functioning under the contract.

Example 715 includes the subject matter of any of examples 702 to 714. In example 715, the method includes presenting a token to an owner of a service to allow access to the service.

Example 716 includes the subject matter of any of examples 702 to 715. In example 716, the method includes commissioning the IoT device to operate under the contract, and performing operations under the contract.

Example 717 includes the subject matter of any of examples 702 to 716. In example 717, the method includes decommissioning the IoT device, and completing conditions required to leave the contract.

Example 718 includes the subject matter of any of examples 702 to 717. In example 718, the method includes performing a factory reset upon leaving the contract.

Example 719 includes the subject matter of any of examples 702 to 718. In example 719, the method includes sending an end-of-life message to a maintenance service provider upon leaving the contract.

Example 720 includes the subject matter of any of examples 702 to 719. In example 720, the method includes refunding any funds balance left for the IoT device when the IoT device leaves the contract.

Example 721 includes a non-transitory, machine readable medium. The non-transitory, machine readable medium includes instructions that, when executed, direct a processor to boot into a secure enclave, acquire an identity, enumerate available contracts, and join a contract.

Example 722 includes the subject matter of example 721. In example 722, the non-transitory, machine readable medium includes instructions that, when executed, direct the processor to generate a key to be used as a blockchain client.

Example 723 includes the subject matter of either of examples 721 or 722. In example 723, the non-transitory, machine readable medium includes instructions that, when executed, direct the processor to publish attributes for an IoT device.

Example 724 includes the subject matter of any of examples 721 to 723. In example 724, the non-transitory, machine readable medium includes instructions that, when executed, direct the processor to request tokens for operating under contract.

Example 725 includes an apparatus. The apparatus includes an Internet-of-Things (IoT) network, wherein the IoT network includes an IoT device. The IoT device includes a bloom filter to store information on items in a K bucket, blockchain logic to create entries in a blockchain including values from the bloom filter, a content creator to create hash codes for the bloom filter, and a search manager to search a bloom filter to determine a probability that a search target is present.

Example 726 includes the subject matter of example 725. In example 726, the bloom filter includes a storage structure that includes a bit sequence.

Example 727 includes the subject matter of either of examples 725 or 726. In example 727, the bit sequence includes overwritten hash values calculated for each of the items.

Example 728 includes the subject matter of any of examples 725 to 727. In example 728, the K bucket includes a group of nodes associated with the IoT device.

Example 729 includes the subject matter of any of examples 727 to 728. In example 729, the items include resources, services, contracts, or IoT device identities, or any combinations thereof.

Example 730 includes the subject matter of any of examples 725 to 729, including a distributed hash tag (DHT) database to 730. In example 730, the DHT database includes an individual entry for each item in the K bucket.

Example 731 includes the subject matter of any of examples 725 to 730. In example 731, the apparatus includes a content locator to search the DHT database to determine if an item is present.

Example 732 includes the subject matter of any of examples 725 to 731. In example 732, the content creator is to create content including a universal resource identifier (URI), metadata, or hash codes, or any combinations thereof.

Example 733 includes the subject matter of any of examples 725 to 732. In example 733, the search manager is to pay tolls for further hops in a search.

Example 734 includes a method for resource discovery. The method for resource discovery includes calculating a hash code for a search target, comparing bits of the hash code to bits set in a bloom filter, and performing a search of a distributed hash table (DHT) for the hash code of the search target if the bits of the hash code match bits set in the bloom filter.

Example 735 includes the subject matter of example 734. In example 735, the method includes broadcasting the hash code of the search target to nodes within a local K bucket, and performing a search of the DHT on any of the nodes within the local K bucket for which the bits of the hash code match the bits set in the bloom filter.

Example 736 includes the subject matter of either of examples 734 or 735. In example 736, the method includes determining that the search in a local K bucket was unsuccessful, determining a toll cost for sending the hash code for the search target to a remote K bucket, paying the toll cost, and sending the hash code for the search target to the remote K bucket to continue the search.

Example 737 includes the subject matter of any of examples 734 to 736. In example 737, the method includes determining that the search in a local K bucket was unsuccessful, determining a toll cost for sending the hash code for the search target to a remote K bucket, and terminating the search if the toll cost passes a predetermined limit.

Example 738 includes the subject matter of any of examples 734 to 737. In example 738, the method includes initializing the DHT, creating a blockchain database, creating a genesis block in the blockchain database, and copying the blockchain database and the DHT to each of a plurality of participants.

Example 739 includes the subject matter of any of examples 734 to 738. In example 739, the method includes saving the bloom filter to the blockchain database as a transaction.

Example 740 includes the subject matter of any of examples 734 to 739. In example 740, the method includes saving a pointer to the blockchain database as a transaction, where the pointer includes a location of the DHT.

Example 741 includes the subject matter of any of examples 734 to 740. In example 741, the method includes creating content for the blockchain database, the DHT, or both, including creating an item hash code, saving the item hash code to the DHT, creating a universal resource identifier (URI) for data saved to the DHT, and saving the URI and the item hash code to the blockchain database.

Example 742 includes the subject matter of any of examples 734 to 741. In example 742, the method includes saving metadata for the URI and the item hash code to the blockchain database, wherein the metadata controls actions for content creators.

Example 743 includes a non-transitory, machine readable medium. The non-transitory, machine readable medium includes instructions that, when executed, direct a processor to lookup content to locate resources by calculating a hash code for a search target, and comparing bits of the hash code to bits set in a bloom filter.

Example 744 includes the subject matter of example 743. In example 744, the non-transitory, machine readable medium includes instructions that, when executed, direct the processor to determine that the bits of the hash code match bits set in the bloom filter, and search a DHT to determine if the hash code is in the DHT.

Example 745 includes the subject matter of either of examples 743 or 744. In example 745, the non-transitory, machine readable medium includes instructions that, when executed, direct the processor to create a blockchain database.

Example 746 includes the subject matter of any of examples 743 to 745. In example 746, the non-transitory, machine readable medium includes instructions that, when executed, direct the processor to create content for the blockchain database, including calculating an item hash code for each of a plurality of items.

Example 747 includes the subject matter of any of examples 743 to 746. In example 747, the non-transitory, machine readable medium includes instructions that, when executed, direct the processor to store each item hash code in the blockchain database.

Example 748 includes the subject matter of any of examples 743 to 747. In example 748, the non-transitory, machine readable medium includes instructions that, when executed, direct the processor to pay a toll to send a search to other nodes, if the search was unsuccessful in local notes.

Example 749 includes an apparatus for use in an Internet-of-Things (IoT) network. The apparatus for use in an Internet-of-Things (IoT) network includes a permissions guide drafter to draft a permissions guide for a plurality of discovered peers, where the plurality of discovered peers each have a parameter, and where a term of the permissions guide is generated in response to the term being allowable by at least two of the plurality of discovered peers. The parameter of each discoverable peer of the plurality of discovered peers includes a range of an allowable term range for an associated peer, and an action executor to execute an action of the permissions guide in response to detecting that a condition of the term is satisfied.

Example 750 includes the subject matter of example 749. In example 750, the permissions guide drafter includes a function for listing of the terms and conditions of the plurality of discovered peers.

Example 751 includes the subject matter of either of examples 749 or 750. In example 751, the permissions guide drafter includes a listing of the quality of service terms and conditions for the plurality of discovered peers.

Example 752 includes the subject matter of any of examples 749 to 751. In example 752, the permissions guide drafter includes a listing of data plane terms and conditions for the plurality of the discovered peers.

Example 753 includes the subject matter of any of examples 752 to 752. In example 753, the data plane is to indicate a process for how the data is to be supplied and consumed by the peers.

Example 754 includes the subject matter of any of examples 749 to 753. In example 754, the permissions guide includes a time-to-live.

Example 755 includes the subject matter of any of examples 749 to 754. In example 755, the permissions guide includes a protocol conversion broker to manage the joining and leaving of the permissions guide by a peer.

Example 756 includes the subject matter of any of examples 749 to 755. In example 756, executing an action of the permissions guide includes auto-commissioning of a service to a peer instructing the peer to process data.

Example 757 includes the subject matter of any of examples 749 to 756. In example 757, the permissions guide includes a preamble to manage the exchange of a configuration between the plurality of discovered peers.

Example 758 includes the subject matter of any of examples 749 to 757. In example 758, the term refers to a rate of payment to be paid between the plurality of discovered peers, and a final payment is made between peers upon a detection that a peer of the plurality of discovered peers is terminating participation in the permissions guide.

Example 759 includes a method for task definition and commissioning in an internet-of-things (IoT) device. The method for task definition and commissioning in an internetof-things (IoT) device includes drafting a permissions guide for a plurality of discovered peers, where the plurality of discovered peers each have a parameter, and where a term of the permissions guide is generated in response to the term being allowable by at least two of the plurality of discovered peers, and executing an action of the permissions guide in response to detecting that a condition of the term is satisfied.

Example 760 includes the subject matter of example 759. In example 760, the drafting of the permissions guide includes a function for listing of the terms and conditions of the plurality of discovered peers.

Example 761 includes the subject matter of any of examples 759 to 760. In example 761, the drafting of the permissions guide includes a listing of the quality of service terms and conditions for the plurality of discovered peers.

Example 762 includes the subject matter of any of examples 759 to 761. In example 762, the drafting of the permissions guide includes a listing of data plane terms and conditions for the plurality of the discovered peers.

Example 763 includes the subject matter of any of examples 759 to 76. In example 763, the data plane is to indicate a process for how the data is to be supplied and consumed by the peers.

Example 764 includes the subject matter of any of examples 759 to 763. In example 764, the permissions guide includes a time-to-live.

Example 765 includes the subject matter of any of examples 759 to 764. In example 765, the permissions guide includes a protocol conversion broker to manage the joining and leaving of the permissions guide by a peer.

Example 766 includes the subject matter of any of examples 759 to 765. In example 766, executing an action of the permissions guide includes auto-commissioning of a service to a peer instructing the peer to process data.

Example 767 includes the subject matter of any of examples 759 to 766. In example 767, the permissions guide includes a preamble to manage the exchange of a configuration between the plurality of discovered peers.

Example 768 includes the subject matter of any of examples 759 to 767. In example 768, the term refers to a rate of payment to be paid between the plurality of discovered peers, and a final payment is made between peers upon a detection that a peer of the plurality of discovered peers is terminating participation in the permissions guide.

Example 769 includes a non-transitory, machine readable medium. The non-transitory, machine readable medium includes instructions that, when executed, direct a processor to draft a permissions guide for a plurality of discovered peers, where the plurality of discovered peers each have a parameter, and where a term of the permissions guide is generated in response to the term being allowable by at least two of the plurality of discovered peers, and execute an action of the permissions guide in response to detecting that a condition of the term is satisfied.

Example 770 includes the subject matter of example 769. In example 770, the drafting of the permissions guide includes a function for listing of the terms and conditions of the plurality of discovered peers.

Example 771 includes the subject matter of either of examples 769 or 770. In example 771, the drafting of the permissions guide includes a listing of the quality of service terms and conditions for the plurality of discovered peers.

Example 772 includes the subject matter of any of examples 769 to 771. In example 772, the drafting of the permissions guide includes a listing of data plane terms and conditions for the plurality of the discovered peers.

Example 773 includes the subject matter of any of examples 769 to 772. In example 773, the data plane is to indicate a process for how the data is to be supplied and consumed by the peers.

Example 774 includes the subject matter of any of examples 769 to 773. In example 774, the permissions guide includes a time-to-live.

Example 775 includes the subject matter of any of examples 769 to 774. In example 775, the permissions guide includes a protocol conversion broker to manage the joining and leaving of the permissions guide by a peer.

Example 776 includes the subject matter of any of examples 769 to 775. In example 776, executing an action of the permissions guide includes auto-commissioning of a service to a peer instructing the peer to process data.

Example 777 includes the subject matter of any of examples 769 to 776. In example 777, the permissions guide includes a preamble to manage the exchange of a configuration between the plurality of discovered peers.

Example 778 includes the subject matter of any of examples 769 to 777. In example 778, the term refers to a rate of payment to be paid between the plurality of discovered peers, and a final payment is made between peers upon a detection that a peer of the plurality of discovered peers is terminating participation in the permissions guide.

Example 779 includes an apparatus for use in an Internet-of-Things (IoT) network. The apparatus for use in an Internet-of-Things (IoT) network includes a floating service permissions guide drafter to draft a floating service permissions guide for a plurality of discovered hosts, where the plurality of discovered hosts each are assessed for host fulfilment of a parameter. The apparatus also includes a host hardware selector to select a host hardware for the floating service based on a data structure of the floating service, a floating service permissions guide executor to execute the floating service permissions guide using the host hardware, and a value transferor to transfer value to a service wallet associated with the floating service in response to a detection a condition of the floating permissions guide is reached.

Example 780 includes the subject matter of example 779. In example 780, the floating service initiates a value transaction between the service wallet and a host wallet.

Example 781 includes the subject matter of either of examples 779 or 780. In example 781, the service wallet holds a block-chain encoded value.

Example 782 includes the subject matter of any of examples 779 to 781. In example 782, a data structure is a decision matrix.

Example 783 includes the subject matter of any of examples 779 to 782. In example 783, the decision matrix lists a feature sought by the floating service, a number of available hosts, and an assessment score of each of the hosts relative to the feature listed in the decision matrix.

Example 784 includes the subject matter of any of examples 779 to 783. In example 784, the floating service selects a host based on a best value calculated from a cost per hour divided by a number of features with quality metrics indicating satisfactory use for the floating service, where the cost per hour is a projected cost per hour of operating the floating service using a host being assessed.

Example 785 includes the subject matter of any of examples 779 to 784. In example 785, the features of the floating service variously weigh the features in a value calculation using the decision matrix.

Example 786 includes the subject matter of any of examples 779 to 785. In example 786, the floating service permissions guide indicates penalties to be assessed against a host in response to a detected violation of the service permissions guide, wherein the penalties are to be collected from a host wallet.

Example 787 includes the subject matter of any of examples 779 to 786. In example 787, the floating service ceases functioning when the service wallet has a value of zero.

Example 788 includes the subject matter of any of examples 779 to 787. In example 788, the permissions guide indicates that a service wallet is to transfer value in response to a detection that the service wallet has reached a triggering threshold value.

Example 789 includes a method for management of a floating service in an internet-of-things (IoT) device. The method for management of a floating service in an internet-of-things (IoT) device includes drafting a floating service permissions guide for a plurality of discovered hosts, where the plurality of discovered hosts each are assessed for host fulfilment of a parameter, selecting a host hardware for the floating service based on a data structure of the floating service, executing the floating service permissions guide using the host hardware, and transferring value to a service wallet associated with the floating service in response to a detection a condition of the floating permissions guide is reached.

Example 790 includes the subject matter of example 789. In example 790, the floating service initiates a value transaction between the service wallet and a host wallet.

Example 791 includes the subject matter of either of examples 789 or 790. In example 791, the service wallet holds a block-chain encoded value.

Example 792 includes the subject matter of any of examples 789 to 791. In example 792, a data structure is a decision matrix.

Example 793 includes the subject matter of any of examples 789 to 792. In example 793, the decision matrix lists a feature sought by the floating service, a number of available hosts, and an assessment score of each of the hosts relative to the feature listed in the decision matrix.

Example 794 includes the subject matter of any of examples 789 to 793. In example 794, the floating service selects a host based on a best value calculated from a cost per hour divided by a number of features with quality metrics indicating satisfactory use for the floating service, where the cost per hour is a projected cost per hour of operating the floating service using a host being assessed.

Example 795 includes the subject matter of any of examples 789 to 794. In example 795, the features of the floating service variously weigh the features in a value calculation using the decision matrix.

Example 796 includes the subject matter of any of examples 789 to 795. In example 796, the floating service permissions guide indicates penalties to be assessed against a host in response to a detected violation of the service permissions guide, wherein the penalties are to be collected from a host wallet.

Example 797 includes the subject matter of any of examples 789 to 796. In example 797, the floating service ceases functioning when the service wallet has a value of zero.

Example 798 includes the subject matter of any of examples 789 to 797. In example 798, the permissions guide indicates that a service wallet is to transfer value in response to a detection that the service wallet has reached a triggering threshold value.

Example 799 includes a non-transitory, machine readable medium. The non-transitory, machine readable medium includes instructions that, when executed, direct a processor to draft a floating service permissions guide for a plurality of discovered hosts, where the plurality of discovered hosts each are assessed for host fulfilment of a parameter, select a host hardware for the floating service based on a data structure of the floating service, execute the floating service permissions guide using the host hardware, and transfer value to a service wallet associated with the floating service in response to a detection a condition of the floating permissions guide is reached.

Example 800 includes the subject matter of example 799. In example 800, the floating service initiates a value transaction between the service wallet and a host wallet.

Example 801 includes the subject matter of either of examples 799 or 800. In example 801, the service wallet holds a block-chain encoded value.

Example 802 includes the subject matter of any of examples 799 to 801. In example 802, a data structure is a decision matrix.

Example 803 includes the subject matter of any of examples 779 to 802. In example 803, the decision matrix lists a feature sought by the floating service, a number of available hosts, and an assessment score of each of the hosts relative to the feature listed in the decision matrix.

Example 804 includes the subject matter of any of examples 779 to 803. In example 804, the floating service selects a host based on a best value calculated from a cost per hour divided by a number of features with quality metrics indicating satisfactory use for the floating service, where the cost per hour is a projected cost per hour of operating the floating service using a host being assessed.

Example 805 includes the subject matter of any of examples 779 to 804. In example 805, the features of the floating service variously weigh the features in a value calculation using the decision matrix.

Example 806 includes the subject matter of any of examples 799 to 805. In example 806, the floating service permissions guide indicates penalties to be assessed against a host in response to a detected violation of the service permissions guide, wherein the penalties are to be collected from a host wallet.

Example 807 includes the subject matter of any of examples 799 to 806. In example 807, the floating service ceases functioning when the service wallet has a value of zero.

Example 808 includes the subject matter of any of examples 799 to 807. In example 808, the permissions guide indicates that a service wallet is to transfer value in response to a detection that the service wallet has reached a triggering threshold value.

Example 809 includes an apparatus for use in an Internet-of-Things (IoT) network. The apparatus for use in an Internet-of-Things (IoT) network includes a permissions guide drafter to draft a permissions guide for a first discovered peer including a first parameter and a first parameter value. The apparatus also includes a second discovered peer including a second parameter and a second parameter value, a parameter weight calculator to calculate a first parameter weight and a second parameter weight by comparing the first parameter value and the second parameter value, a term generator to generate a term of the permissions guide in response to a proposed term being within ranges proposed by the first parameter and the second parameter, where the first parameter is adjusted by the first parameter weight and the second parameter is adjusted by the second parameter weight, and an action executor to execute an action of the permissions guide in response to detecting that a condition of the term is satisfied.

Example 810 includes the subject matter of example 809. In example 810, the apparatus includes a processor to process a request from candidate peer to the permissions guide including a joining parameter and a joining parameter value.

Example 811 includes the subject matter of either of examples 809 or 810. In example 811, the processor calculates a joining parameter weight by comparing to the first parameter value and the second parameter value to the joining parameter value.

Example 812 includes the subject matter of any of examples 809 to 811. In example 812, the first parameter and second parameter refer to acceptable data value ranges for a first and second node, respectively.

Example 813 includes the subject matter of any of examples 809 to 812. In example 813, the acceptable data value ranges are calculated with a cost function.

Example 814 includes the subject matter of any of examples 809 to 813. In example 814, the cost function is to calculate and combine operating costs of a node implementing the permissions guide.

Example 815 includes the subject matter of any of examples 809 to 814. In example 815, the operating costs include at least one of energy, running, and maintenance costs of operating a device, data transport, and storage devices.

Example 816 includes the subject matter of any of examples 809 to 815. In example 816, the data value ranges refer to a calculation of the value of the data as a function of a number of sources of data.

Example 817 includes the subject matter of any of examples 809 to 816. In example 817, the data is derived data synthesized from a plurality of sensors.

Example 818 includes the subject matter of any of examples 809 to 817. In example 818, the value of data increases as a rate of data sought increases.

Example 819 includes a method for negotiation with valued data units in an internet-of-things (IoT) device. The method for negotiation with valued data units in an internet-of-things (IoT) device includes drafting a permissions guide for a first discovered peer including a first parameter and a first parameter value, and a second discovered peer including a second parameter and a second parameter value, calculating a first parameter weight and a second parameter weight by comparing the first parameter value and the second parameter value, generating a term of the permissions guide in response to a proposed term being within ranges proposed by the first parameter and the second parameter, where the first parameter is adjusted by the first parameter weight and the second parameter is adjusted by the second parameter weight, and executing an action of the permissions guide in response to detecting that a condition of the term is satisfied.

Example 820 includes the subject matter of any of examples 819. In example 820, the method includes receiving from candidate peer a request to the permissions guide including a joining parameter and a joining parameter value.

Example 821 includes the subject matter of either of examples 819 or 820. In example 821, the method includes calculating a joining parameter weight by comparing to the first parameter value and the second parameter value to the joining parameter value.

Example 822 includes the subject matter of any of examples 819 to 821. In example 822, the first parameter and second parameter refer to acceptable data value ranges for a first and second node, respectively.

Example 823 includes the subject matter of any of examples 819 to 822. In example 823, the acceptable data value ranges are calculated with a cost function.

Example 824 includes the subject matter of any of examples 819 to 823. In example 824, the cost function is to calculate and combine operating costs of a node implementing the permissions guide.

Example 825 includes the subject matter of any of examples 819 to 824. In example 825, the operating costs include at least one of energy, running, and maintenance costs of operating the device, data transport, and storage devices.

Example 826 includes the subject matter of any of examples 819 to 825. In example 826, the data value ranges refer to a calculation of the value of the data as a function of a number of sources of data.

Example 827 includes the subject matter of any of examples 819 to 826. In example 827, the data is derived data synthesized from a plurality of sensors.

Example 828 includes the subject matter of any of examples 819 to 827. In example 828, the value of data increases as a rate of data sought increases.

Example 829 includes a non-transitory, machine readable medium. The non-transitory, machine readable medium includes instructions that, when executed, direct a processor to draft a permissions guide for a first discovered peer including a first parameter and a first parameter value, and a second discovered peer including a second parameter and a second parameter value, calculate a first parameter weight and a second parameter weight by comparing the first parameter value and the second parameter value, generate a term of the permissions guide in response to a proposed term being within ranges proposed by the first parameter and the second parameter, where the first parameter is adjusted by the first parameter weight and the second parameter is adjusted by the second parameter weight, and execute an action of the permissions guide in response to detecting that a condition of the term is satisfied.

Example 830 includes the subject matter of example 829. In example 830, the non-transitory, machine readable medium includes instructions, that when executed, direct the processor to process a request received from a candidate peer, the request including a joining parameter and a joining parameter value.

Example 831 includes the subject matter of either of examples 829 or 830. In example 831, the non-transitory, machine readable medium includes instructions, that when executed, direct the processor to calculate a joining parameter weight by comparing to the first parameter value and the second parameter value to the joining parameter value.

Example 832 includes the subject matter of any of examples 829 to 831. In example 832, the first parameter and second parameter refer to acceptable data value ranges for a first and second node, respectively.

Example 833 includes the subject matter of any of examples 829 to 832. In example 833, the acceptable data value ranges are calculated with a cost function.

Example 834 includes the subject matter of any of examples 829 to 833. In example 834, the cost function is to calculate and combine operating costs of a node implementing the permissions guide.

Example 835 includes the subject matter of any of examples 829 to 834. In example 835, the operating costs include at least one of energy, running, and maintenance costs of operating a device, data transport, and storage devices.

Example 836 includes the subject matter of any of examples 829 to 835. In example 836, the data value ranges refer to a calculation of the value of the data as a function of a number of sources of data.

Example 837 includes the subject matter of any of examples 829 to 836. In example 837, the data is derived data synthesized from a plurality of sensors.

Example 838 includes the subject matter of any of examples 829 to 837. In example 838, the value of data increases as a rate of data sought increases.

Example 839 includes an apparatus for use in an Internet-of-Things (IoT) network. The apparatus for use in an Internet-of-Things (IoT) network includes a device identity generator to generate a device identity for a device as a block-chain client, a message publisher to publish a discovery broadcast message from the device, a network applier to apply, from the device, to join a decentralized network access proxy (DNAP) network in response to the device receiving a response from a DNAP based on the published discovery broadcast message, a device describer to describe the identity and attributes of the device to the DNAP, and a packet sender to send a packet from the device through the network in response to access being granted to the device by the network based on the identity and attributes of the device.

Example 840 includes the subject matter of example 839. In example 840, the device requests tokens from the DNAP.

Example 841 includes the subject matter of either of examples 839 or 840. In example 841, tokens grant the device the ability to send and receive network data other than peer to peer.

Example 842 includes the subject matter of any of examples 839 to 841. In example 842, tokens grant the device the ability to send and receive data on a layer of an open system interconnection layer of a network.

Example 843 includes the subject matter of any of examples 839 to 842. In example 843, the packet appends a token and the combination of the packet and the token is to be sent to be DNAP for verification, where the DNAP rejects both the packet and the token in response to a detection that the token is not accepted by the DNAP.

Example 844 includes the subject matter of any of examples 839 to 843. In example 844, the token is valid to be used with at least one of a threshold number of packets, a threshold volume of data, and a threshold period of time.

Example 845 includes the subject matter of any of examples 839 to 844. In example 845, the device stores a transaction record of transactions received and sent by the device, the transaction record to be shared with the DNAP.

Example 846 includes the subject matter of any of examples 839 to 845. In example 846, the device generates keys to indicate an origin of a packet sent from the device.

Example 847 includes the subject matter of any of examples 839 to 846. In example 847, the device is a block-chain enabled device and the device stores all transactions sent by the device and received by the device on the block-chain.

Example 848 includes the subject matter of any of examples 839 to 847. In example 848, descriptions of the device attributes are stored off of a block-chain.

Example 849 includes a method for secure communication with an internet-of-things (IoT) device. The method for secure communication with an internet-of-things (IoT) device includes generating a device identity for a device as a block-chain client, publishing a discovery broadcast message from the device, applying, from the device, to join a decentralized network access proxy (DNAP) network in response to the device receiving a response from a DNAP based on the published discovery broadcast message, describing the identity and attributes of the device to the DNAP, and sending a packet from the device through the network in response to access being granted to the device by the network based on the identity and attributes of the device.

Example 850 includes the subject matter of example 849. In example 850, the device requests tokens from the DNAP.

Example 851 includes the subject matter of either of examples 849 or 850. In example 851, tokens grant the device the ability to send and receive network data other than peer to peer.

Example 852 includes the subject matter of any of examples 849 to 851. In example 852, tokens grant the device the ability to send and receive data on a layer of an open system interconnection layer of a network.

Example 853 includes the subject matter of any of examples 849 to 852. In example 853, the packet appends a token and the combination of the packet and the token is to be sent to be DNAP for verification, where the DNAP rejects both the packet and the token in response to a detection that the token is not accepted by the DNAP.

Example 854 includes the subject matter of any of examples 849 to 853. In example 854, the token is valid to be used with at least one of a threshold number of packets, a threshold volume of data, and a threshold period of time.

Example 855 includes the subject matter of any of examples 849 to 854. In example 855, the device stores a transaction record of transactions received and sent by the device, the transaction record to be shared with the DNAP.

Example 856 includes the subject matter of any of examples 849 to 855. In example 856, the device generates keys to indicate an origin of a packet sent from the device.

Example 857 includes the subject matter of any of examples 849 to 856. In example 857, the device is a block-chain enabled device and the device stores all transactions sent by the device and received by the device on the block-chain.

Example 858 includes the subject matter of any of examples 849 to 857. In example 858, descriptions of the device attributes are stored off of a block-chain.

Example 859 includes a non-transitory, machine readable medium. The non-transitory, machine readable medium includes instructions that, when executed, direct a processor to generate a device identity for a device as a block-chain client, publish a discovery broadcast message from the device, apply, from the device, to join a decentralized network access proxy (DNAP) network in response to the device receiving a response from a DNAP based on the published discovery broadcast message, describe the identity and attributes of the device to the DNAP, and send a packet from the device through the network in response to access being granted to the device by the network based on the identity and attributes of the device.

Example 860 includes the subject matter of example 859. In example 860, the device requests tokens from the DNAP.

Example 861 includes the subject matter of either of examples 859 or 860. In example 861, tokens grant the device the ability to send and receive network data other than peer to peer.

Example 862 includes the subject matter of any of examples 859 to 861. In example 862, tokens grant the device the ability to send and receive data on a layer of an open system interconnection layer of a network.

Example 863 includes the subject matter of any of examples 859 to 862. In example 863, the packet appends a token and the combination of the packet and the token is to be sent to be DNAP for verification, where the DNAP rejects both the packet and the token in response to a detection that the token is not accepted by the DNAP.

Example 864 includes the subject matter of any of examples 859 to 863. In example 864, the token is valid to be used with at least one of a threshold number of packets, a threshold volume of data, and a threshold period of time.

Example 865 includes the subject matter of any of examples 859 to 864. In example 865, the device stores a transaction record of transactions received and sent by the device, the transaction record to be shared with the DNAP.

Example 866 includes the subject matter of any of examples 859 to 865. In example 866, the device generates keys to indicate an origin of a packet sent from the device.

Example 867 includes the subject matter of any of examples 859 to 866. In example 867, the device is a block-chain enabled device and the device stores all transactions sent by the device and received by the device on the block-chain.

Example 868 includes the subject matter of any of examples 859 to 867. In example 868, descriptions of the device attributes are stored off of a block-chain.

Example 869 includes an apparatus for use in an Internet-of-Things (IoT) network. The apparatus for use in an Internet-of-Things (IoT) network includes a device registrar to register a device to a first network through a portal to a second network, where the second network is authorized to access the first network, a device joiner to join a device to a permissions guide through agreement to obligations of the permissions guide, a token requestor to request a token using a function of the permissions guide, the token identifying the device as authenticated to access the second network, and a request sender to send an authentication request from the device to the first network, wherein the first network confirms the authentication in response to detecting the token.

Example 870 includes the subject matter of example 869. In example 870, the device executes a payment exchange to a wallet in the second network.

Example 871 includes the subject matter of either of examples 869 or 870. In example 871, the request for the token results in a reservation of coins on an accounting block-chain to correspond to a token generated on a side-chain.

Example 872 includes the subject matter of any of examples 869 to 871. In example 872, the token is consumed on a sidechain in response to authentication of the device by presentation by the device of the token to the first network.

Example 873 includes the subject matter of any of examples 869 to 872. In example 873, a coin of the block-chain is released in response to detecting a token being at least one of revoked and consumed by a sidechain.

Example 874 includes the subject matter of any of examples 869 to 873. In example 874, joining the permissions guide includes providing, from the device, attributes of the device to the permissions guide for an attribute filter to validate that the attributes of the device is allowed in the first network.

Example 875 includes the subject matter of any of examples 869 to 874. In example 875, the attributes include an attribute of a user profile active while the device is joining the permissions guide.

Example 876 includes the subject matter of any of examples 869 to 875. In example 876, the token destroys itself in response to being used as a form of authorization for the device.

Example 877 includes the subject matter of any of examples 869 to 876. In example 877, the device is authorized to access the first network based on authentication to the first network that the device has credentials to access to second network.

Example 878 includes the subject matter of any of examples 869 to 877. In example 878, the authorization of the device to use the first network expires based on at least one of number of accesses, volume of data accessed through the first network, and time of granted access.

Example 879 includes a method for decentralized authorization, authentication, and accounting with an internet-of-things (IoT) device. The method for decentralized authorization, authentication, and accounting with an internet-of-things (IoT) device includes registering a device to a first network through a portal to a second network, where the second network is authorized to access the first network, joining a device to a permissions guide through agreement to obligations of the permissions guide, requesting a token using a function of the permissions guide, the token identifying the device as authenticated to access the second network, and sending an authentication request from the device to the first network, wherein the first network confirms the authentication in response to detecting the token.

Example 880 includes the method of example 879. In example 879, the device executes a payment exchange to a wallet in the second network.

Example 881 includes the subject matter of either of examples 879 or 880. In example 881, the request for the token results in a reservation of coins on an accounting block-chain to correspond to a token generated on a side-chain.

Example 882 includes the subject matter of any of examples 879 to 881. In example 882, the token is consumed on a sidechain in response to authentication of the device by presentation by the device of the token to the first network.

Example 883 includes the subject matter of any of examples 879 to 882. In example 883, a coin of the block-chain is released in response to detecting a token being at least one of revoked and consumed by a sidechain.

Example 884 includes the subject matter of any of examples 879 to 883. In example 884, joining the permissions guide includes providing, from the device, attributes of the device to the permissions guide for an attribute filter to validate that the attributes of the device is allowed in the first network.

Example 885 includes the subject matter of any of examples 879 to 884. In example 885, the attributes include an attribute of a user profile active while the device is joining the permissions guide.

Example 886 includes the subject matter of any of examples 879 to 885. In example 886, the token destroys itself in response to being used as a form of authorization for the device.

Example 887 includes the subject matter of any of examples 879 to 886. In example 887, the device is authorized to access the first network based on authentication to the first network that the device has credentials to access to second network.

Example 888 includes the subject matter of any of examples 879 to 887. In example 888, the authorization of the device to use the first network has an expires based on at least one of number of accesses, volume of data accessed through the first network, and time of granted access.

Example 889 includes a non-transitory, machine readable medium. The non-transitory, machine readable medium includes instructions that, when executed, direct a processor to register a device to a first network through a portal to a second network, where the second network is authorized to access the first network, join a device to a permissions guide through agreement to obligations of the permissions guide, request a token using a function of the permissions guide, the token identifying the device as authenticated to access the second network, and send an authentication request from the device to the first network, wherein the first network confirms the authentication in response to detecting the token.

Example 890 includes the subject matter of examples 889. In example 890, the device executes a payment exchange to a wallet in the second network.

Example 891 includes the subject matter of either of examples 889 or 890. In example 891, the request for the token results in a reservation of coins on an accounting block-chain to correspond to a token generated on a side-chain.

Example 892 includes the subject matter of any of examples 889 to 891. In example 892, the token is consumed on a sidechain in response to authentication of the device by presentation by the device of the token to the first network.

Example 893 includes the subject matter of any of examples 889 to 892. In example 893, a coin of the block-chain is released in response to detecting a token being at least one of revoked and consumed by a sidechain.

Example 894 includes the subject matter of any of examples 889 to 893. In example 894, joining the permissions guide includes providing, from the device, attributes of the device to the permissions guide for an attribute filter to validate that the attributes of the device is allowed in the first network.

Example 895 includes the subject matter of any of examples 889 to 894. In example 895, the attributes include an attribute of a user profile active while the device is joining the permissions guide.

Example 896 includes the subject matter of any of examples 889 to 895. In example 896, the token destroys itself in response to being used as a form of authorization for the device.

Example 897 includes the subject matter of any of examples 889 to 896. In example 897, the device is authorized to access the first network based on authentication to the first network by the second network that the device has credentials to access to second network.

Example 898 includes the subject matter of any of examples 889 to 897. In example 898, the authorization of the device to use the first network has an expires based on at least one of number of accesses, volume of data accessed through the first network, and time of granted access.

Example 899 includes an apparatus for use in an Internet-of-Things (IoT) network. The apparatus for use in an Internet-of-Things (IoT) network includes an identity verifier to verifying the identity of a authentication request with a decentralized application program interface (API). The apparatus also includes the authentication request received from a Remote Authentication Dial-In User Service (RADIUS) client, the decentralized API to verify the identity by sending a request to a distributed ledger and returning, to a RADIUS server a response in response to receiving an identity verification response from the distributed ledger, a response returner to return a response to the authentication request to the RADIUS client in response to receiving the response from the decentralized API, and wherein the RADIUS client makes a transaction in response to a response of authenticated identity.

Example 900 includes the subject matter of example 899. In example 900, the transaction include at least one of username, password, and metadata.

Example 901 includes the subject matter of either of examples 899 or 900. In example 901, the transaction includes a value transaction.

Example 902 includes the subject matter of any of examples 899 to 901. In example 902, the transaction is a cryptocurrency transaction.

Example 903 includes the subject matter of any of examples 899 to 902. In example 903, the authentication request comprises a request for a network address.

Example 904 includes the subject matter of any of examples 899 to 903. In example 904, the network address includes at least one of a fully qualified domain name for the RADIUS server and an internet protocol address for the RADIUS server.

Example 905 includes the subject matter of any of examples 899 to 904. In example 905, the RADIUS server verifies a public key by requesting a location of the public key from a block-chain.

Example 906 includes the subject matter of any of examples 899 to 905. In example 906, the request to a RADIUS server occurs off chain, in response to a RADIUS client receiving a confirmation of authenticated identity.

Example 907 includes the subject matter of any of examples 899 to 906. In example 907, the RADIUS server performs logging and accounting of requests the RADIUS server receives.

Example 908 includes the subject matter of any of examples 899 to 907. In example 908, the response to the authentication request is stored in to a block-chain as an immutable record.

Example 909 includes a method for decentralized authorization, authentication, and accounting with an internet-of-things (IoT) device. The method for decentralized authorization, authentication, and accounting with an internet-of-things (IoT) device includes verifying the identity of a authentication request with a distributed ledger, the authentication request received from a Remote Authentication Dial-In User Service (RADIUS) client, sending a request to a RADIUS server in response to receiving a positive identity verification response from the distributed ledger, returning a response to the authentication request to the RADIUS client in response to receiving a response from the RADIUS server, and wherein the RADIUS client makes a transaction with the RADIUS server in response to a response of authenticated identity.

Example 910 includes the subject matter of examples 909. In example 910, the transaction include at least one of username, password, and metadata.

Example 911 includes the subject matter of either of examples 909 or 910. In example 911, the transaction includes a value transaction.

Example 912 includes the subject matter of any of examples 909 to 911. In example 912, the transaction is a cryptocurrency transaction.

Example 913 includes the subject matter of any of examples 909 to 912. In example 913, the authentication request includes a request for a network address.

Example 914 includes the subject matter of any of examples 909 to 913. In example 914, the network address includes at least one of a fully qualified domain name for the RADIUS server and an internet protocol address for the RADIUS server.

Example 915 includes the subject matter of any of examples 909 to 914. In example 915, the RADIUS server verifies a public key by requesting a location of the public key from a block-chain.

Example 916 includes the subject matter of any of examples 909 to 915. In example 916, the request to a RADIUS server occurs off chain, in response to a RADIUS client receiving a confirmation of authenticated identity.

Example 917 includes the subject matter of any of examples 909 to 916. In example 917, the RADIUS server performs logging and accounting of requests the RADIUS server receives.

Example 918 includes the subject matter of any of examples 917 to 917. In example 918, the response to the authentication request is stored in to a block-chain as an immutable record.

Example 919 includes a non-transitory, machine readable medium. The non-transitory, machine readable medium includes instructions that, when executed, direct a processor to verify the identity of a authentication request with a distributed ledger, the authentication request received from a Remote Authentication Dial-In User Service (RADIUS) client, send a request to a RADIUS server in response to receiving a positive identity verification response from the distributed ledger, return a response to the authentication request to the RADIUS client in response to receiving a response from the RADIUS server, and wherein the RADIUS client makes a transaction with the RADIUS server in response to a response of authenticated identity.

Example 920 includes the subject matter of examples 919. In example 920, the transaction include at least one of username, password, and metadata.

Example 921 includes the subject matter of either of examples 919 or 920. In example 921, the transaction includes a value transaction.

Example 922 includes the subject matter of any of examples 919 to 921. In example 922, the transaction is a cryptocurrency transaction.

Example 923 includes the subject matter of any of examples 919 to 922. In example 923, the authentication request includes a request for a network address.

Example 924 includes the subject matter of any of examples 919 to 923. In example 924, the network address includes at least one of a fully qualified domain name for the RADIUS server and an internet protocol address for the RADIUS server.

Example 925 includes the subject matter of any of examples 919 to 924. In example 925, the RADIUS server verifies a public key by requesting a location of the public key from a block-chain.

Example 926 includes the subject matter of any of examples 919 to 925. In example 926, the request to a RADIUS server occurs off chain, in response to a RADIUS client receiving a confirmation of authenticated identity.

Example 927 includes the subject matter of any of examples 919 to 926. In example 927, the RADIUS server performs logging and accounting of requests the RADIUS server receives.

Example 928 includes the subject matter of any of examples 919 to 927. In example 928, the response to the authentication request is stored in to a block-chain as an immutable record.

Example 929 includes an apparatus for use in an Internet-of-Things (IoT) network. The apparatus for use in an Internet-of-Things (IoT) network includes a device connector to connect a device to a network of a decentralized database, a namespace discoverer to discover a namespace of a node of the decentralized database, a partition creator to create a shared database partition in response to being accepted by the node, a service advertiser to advertise a service to the decentralized database, and a data router to route data received and generated during the execution of a service between a private database partition and a shared database partition.

Example 930 includes the subject matter of examples 929. In example 930, the shared database partition is at least one of permissioned and encrypted.

Example 931 includes the subject matter of either of examples 929 or 930. In example 931, copies of data stored in a shared database partition is replicated to a second node in response to the second node presenting privileges indicating the authority of the second node to copy the data.

Example 932 includes the subject matter of any of examples 929 to 931. In example 932, the device installs decentralized database software in response to connecting to the network of a decentralized database.

Example 933 includes the subject matter of any of examples 929 to 932. In example 933, the device creates a shared database partition in response to connecting to the network of a decentralized database.

Example 934 includes the subject matter of any of examples 929 to 933. In example 934, the device requests to join the decentralized database in response to discovering the namespace of the node of the decentralized database.

Example 935 includes the subject matter of any of examples 929 to 934. In example 935, the device replicates a shared node partition for storage in the shared database partition, in response to creating the shared database partition.

Example 936 includes the subject matter of any of examples 929 to 935. In example 936, the data in the shared partition is replicated for storage in a shared node partition in response to data being routed to the shared database partition.

Example 937 includes the subject matter of any of examples 929 to 936. In example 937, the device receives acceptance to the decentralized database in response to the node voting on acceptance of the device.

Example 938 includes the subject matter of any of examples 929 to 937. In example 938, the device is accepted to the decentralized database in response to discovering the namespace of the node of the decentralized database.

Example 939 includes a method for joining a decentralized database. The method for joining a decentralized database includes connecting a device to a network of a decentralized database, discovering a namespace of a node of the decentralized database, creating a shared database partition in response to being accepted by the node, advertising a service to the decentralized database, and routing data received and generated during the execution of a service between a private database partition and a shared database partition.

Example 940 includes the subject matter of example 939. In example 940, the shared database partition is at least one of permissioned and encrypted.

Example 941 includes the subject matter of either of examples 939 or 940. In example 941, copies of data stored in a shared database partition is replicated to a second node in response to the second node presenting privileges indicating the authority of the second node to copy the data.

Example 942 includes the subject matter of any of examples 939 to 941. In example 942, the device installs decentralized database software in response to connecting to the network of a decentralized database.

Example 943 includes the subject matter of any of examples 939 to 942. In example 943, the device creates a shared database partition in response to connecting to the network of a decentralized database.

Example 944 includes the subject matter of any of examples 939 to 943. In example 944, the device requests to join the decentralized database in response to discovering the namespace of the node of the decentralized database.

Example 945 includes the subject matter of any of examples 939 to 944. In example 945, the device replicates a shared node partition for storage in the shared database partition, in response to creating the shared database partition.

Example 946 includes the subject matter of any of examples 939 to 945. In example 946, the data in the shared partition is be replicated for storage in a shared node partition in response to data being routed to the shared database partition.

Example 947 includes the subject matter of any of examples 939 to 946. In example 947, the device receives acceptance to the decentralized database in response to the node voting on acceptance of the device.

Example 948 includes the subject matter of any of examples 939 to 947. In example 948, the device is accepted to the decentralized database in response to discovering the namespace of the node of the decentralized database.

Example 949 includes a non-transitory, machine readable medium. The non-transitory, machine readable medium includes instructions that, when executed, direct a processor to connect a device to a network of a decentralized database, discover a namespace of a node of the decentralized database, create a shared database partition in response to being accepted by the node, advertise a service to the decentralized database, and route data received and generated in response to execution of a service between a private database partition and a shared database partition.

Example 950 includes the subject matter of example 949. In example 950, the shared database partition is at least one of permissioned and encrypted.

Example 951 includes the subject matter of either of examples 949 or 950. In example 951, copies of data stored in a shared database partition is replicated to a second node in response to the second node presenting privileges indicating the authority of the second node to copy the data.

Example 952 includes the subject matter of any of examples 949 to 951. In example 952, the device installs decentralized database software in response to connecting to the network of a decentralized database.

Example 953 includes the subject matter of any of examples 949 to 952. In example 953, the device creates a shared database partition in response to connecting to the network of a decentralized database.

Example 954 includes the subject matter of any of examples 949 to 934. In example 954, the device requests to join the decentralized database in response to discovering the namespace of the node of the decentralized database.

Example 955 includes the subject matter of any of examples 949 to 954. In example 955, the device replicates a shared node partition for storage in the shared database partition, in response to creating the shared database partition.

Example 956 includes the subject matter of any of examples 949 to 955. In example 956, the data in the shared partition is replicated for storage in a shared node partition in response to data being routed to the shared database partition.

Example 957 includes the subject matter of any of examples 949 to 956. In example 957, the device receives acceptance to the decentralized database in response to the node voting on acceptance of the device.

Example 958 includes the subject matter of any of examples 949 to 957. In example 958, the device is accepted to the decentralized database in response to discovering the namespace of the node of the decentralized database.

Example 959 includes an apparatus for use in an Internet-of-Things (IoT) network. The apparatus for use in an Internet-of-Things (IoT) network includes a credential issuer to issue a credential to a caller entity, the credential including a plurality of layers of authorization structure, and an object entity provisioner to provision an object entity with an access control list specifying a reference to a target object and a permission. The apparatus also includes a credential presenter to present an authorization credential to the object entity and an access control list policy applier to apply an access control list policy to determine if access is allowed for an IoT device based on a comparison of if the credential overlaps the caller entity, if the target object overlaps a request, if a plurality of device layer identifications match a plurality of credential layer identifications, and if a plurality of target layer identifications match a plurality of request layer identifications.

Example 960 includes the subject matter of example 959. In example 960, the credential is a six layer permission.

Example 961 includes the subject matter of either of examples 959 or 960. In example 961, the six layer permission includes a platform layer, a device layer, a collection layer, a resource layer, a record layer, and a property layer.

Example 962 includes the subject matter of any of examples 959 to 961. In example 962, the plurality of layers includes a platform layer to reflect a physical instance of a computer and includes at least one of computational, networking, storage, sensing and actuation capabilities.

Example 963 includes the subject matter of any of examples 959 to 962. In example 963, the plurality of layers includes a device layer to reflect a logical instance of a computer including at least one of computational, networking, storage, sensing and actuation capabilities.

Example 964 includes the subject matter of any of examples 959 to 963. In example 964, the plurality of layers includes a collection layer to a logical structure of a resource, where the resource includes a logical structure for a record, where the record includes a logical structure of a property, and where the property includes at least one of an atomic data structure and a complex data structure.

Example 965 includes the subject matter of any of examples 959 to 964. In example 965, the property is a complex data structure, and the complex data structure is for a structure definable using a data modeling language.

Example 966 includes the subject matter of any of examples 959 to 965. In example 966, the property includes an atomic data structure, and the atomic data structure is at least one of a string, a number, and a date.

Example 967 includes the subject matter of any of examples 959 to 966. In example 967, the authorization credential to the object entity is limited by limitations placed on the object by a physicality of object data based on a Create, Read, Update, Delete, and Notify (CRUDN) life cycle notification.

Example 968 includes the subject matter of any of examples 959 to 967. In example 968, the credential indicates installation by a manufacturer.

Example 969 includes a method for access control in an IoT object. The method for access control in an IoT object includes issuing a credential to a caller entity, the credential including a plurality of layers of authorization structure, provisioning an object entity with an access control list specifying a reference to a target object and a permission, presenting an authorization credential to the object entity, and applying an access control list policy to determine if access is allowed for an IoT device based on a comparison of if the credential overlaps the caller entity, if the target object overlaps a request, if a plurality of device layer identifications match a plurality of credential layer identifications, and if a plurality of target layer identifications match a plurality of request layer identifications.

Example 970 includes the subject matter of example 969. In example 970, the credential is a six layer permission.

Example 971 includes the subject matter of either of examples 969 or 970. In example 971, the six layer permission includes a platform layer, a device layer, a collection layer, a resource layer, a record layer, and a property layer.

Example 972 includes the subject matter of any of examples 969 to 971. In example 972, the plurality of layers includes a platform layer to reflect a physical instance of a computer and includes at least one of computational, networking, storage, sensing and actuation capabilities.

Example 973 includes the subject matter of any of examples 969 to 972. In example 973, the plurality of layers includes a device layer to reflect a logical instance of a computer including at least one of computational, networking, storage, sensing and actuation capabilities.

Example 974 includes the subject matter of any of examples 969 to 973. In example 974, the plurality of layers includes a collection layer to a logical structure of a resource, where the resource includes a logical structure for a record, where the record includes a logical structure of a property, and where the property includes at least one of an atomic data structure and a complex data structure.

Example 975 includes the subject matter of any of examples 969 to 974. In example 975, the property is a complex data structure, and the complex data structure is for a structure definable using a data modeling language.

Example 976 includes the subject matter of any of examples 969 to 975. In example 976, the property includes an atomic data structure, and the atomic data structure is at least one of a string, a number, and a date.

Example 977 includes the subject matter of any of examples 969 to 976. In example 977, the authorization credential to the object entity is limited by limitations placed on the object by a physicality of object data based on a Create, Read, Update, Delete, and Notify (CRUDN) life cycle notification.

Example 978 includes the subject matter of any of examples 969 to 977. In example 978, the credential indicates installation by a manufacturer.

Example 979 includes a non-transitory, machine readable medium. The non-transitory, machine readable medium includes instructions that, when executed, direct a processor to issue a credential to a caller entity, the credential including a plurality of layers of authorization structure, provision an object entity with an access control list specifying a reference to a target object and a permission, present an authorization credential to the object entity, and apply an access control list policy to determine if access is allowed for an IoT device based on a comparison of if the credential overlaps the caller entity, if the target object overlaps a request, if a plurality of device layer identifications match a plurality of credential layer identifications, and if a plurality of target layer identifications match a plurality of request layer identifications.

Example 980 includes the subject matter of examples 979. In example 980, the credential is a six layer permission.

Example 981 includes the subject matter of either of examples 979 or 980. In example 981, the six layer permission includes a platform layer, a device layer, a collection layer, a resource layer, a record layer, and a property layer.

Example 982 includes the subject matter of any of examples 979 to 981. In example 982, the plurality of layers includes a platform layer to reflect a physical instance of a computer and includes at least one of computational, networking, storage, sensing and actuation capabilities.

Example 983 includes the subject matter of any of examples 979 to 982. In example 983, the plurality of layers includes a device layer to reflect a logical instance of a computer including at least one of computational, networking, storage, sensing and actuation capabilities.

Example 984 includes the subject matter of any of examples 979 to 983. In example 984, the plurality of layers includes a collection layer to a logical structure of a resource, where the resource includes a logical structure for a record, where the record includes a logical structure of a property, and where the property includes at least one of an atomic data structure and a complex data structure.

Example 985 includes the subject matter of any of examples 979 to 984. In example 985, the property is a complex data structure, and the complex data structure is for a structure definable using a data modeling language.

Example 986 includes the subject matter of any of examples 979 to 985. In example 986, the property includes an atomic data structure, and the atomic data structure is at least one of a string, a number, and a date.

Example 987 includes the subject matter of any of examples 979 to 986. In example 987, the authorization credential to the object entity is limited by limitations placed on the object by a physicality of object data based on a Create, Read, Update, Delete, and Notify (CRUDN) life cycle notification.

Example 988 includes the subject matter of any of examples 979 to 987. In example 988, the credential indicates installation by a manufacturer.

Example 989 includes an apparatus. The apparatus includes an Internet-of-Things (IoT) network, wherein the IoT network includes an IoT device. The IoT device also includes a resource hardware component identifier to identify a resource hardware component controlled by the IoT device, the resource hardware component having a capability threshold, a processor to process a received indication of an external module hardware requirement from an external module, an external module comparer to compare the external module hardware requirement to the capability threshold of the resource hardware component of the IoT device, and a transmitter to transmit a deactivation signal to the external module in response to the external module hardware requirement not satisfying the capability threshold of the resource hardware component.

Example 990 includes the subject matter of example 989. In example 990, the IoT device transmits a request to a master device in response to the external module hardware requirement not satisfying the capability threshold of the resource hardware component, the request to the master device to request a second resource hardware component be assigned to be controlled by the IoT device.

Example 991 includes the subject matter of either of examples 989 or 990. In example 991, the IoT device includes a second resource hardware component under control of the IoT, wherein a first resource hardware component and a second resource hardware component can be pooled such that the capability threshold is a sum of the capability threshold of the first resource hardware and the second resource hardware.

Example 992 includes the subject matter of any of examples 989 to 991. In example 992, the external module includes a module resource to be pooled with a first resource hardware component for use by the IoT device.

Example 993 includes the subject matter of any of examples 989 to 992. In example 993, the resource hardware component includes at least one of a power source, a processing resource, an integrated communication component, a context sensor, a context actuator, a signal conditioning circuit, a memory resource, or a storage resource.

Example 994 includes the subject matter of any of examples 989 to 993. In example 994, the capability threshold includes a minimum functional compatibility between the resource hardware component and the external module indicating an minimal ability to function together, and a full compatibility between the resource hardware component and the external module indicating an ability to function at the highest capabilities of the external module.

Example 995 includes the subject matter of any of examples 989 to 994. In example 995, the IoT device is to indicate an unsatisfied capability threshold by activating a visible indicator.

Example 996 includes the subject matter of any of examples 989 to 995. In example 996, the IoT device is to place the external module under control of the IoT device in response to satisfying the capability threshold.

Example 997 includes the subject matter of any of examples 989 to 996. In example 997, in response to an external module life time being less than an operational life of the IoT device, the IoT device is to transmit a request for an updated external module.

Example 998 includes the subject matter of any of examples 989 to 997. In example 998—in response to a resource hardware component life time being less than an operational life of the IoT device, the IoT device is to transmit a request for an updated resource hardware component.

Example 999 includes a method for using an internet-of-things (IoT) device to map resources and requirements of self-describing hardware. The method for using an internet-of-things (IoT) device to map resources and requirements of self-describing hardware includes identifying a resource hardware component controlled by the IoT device, the resource hardware component having a capability threshold, processing a received indication of an external module hardware requirement from an external module, comparing the external module hardware requirement to the capability threshold of the resource hardware component of the IoT device, and transmitting a deactivation signal to the external module in response to the external module hardware requirement not satisfying the capability threshold of the resource hardware component.

Example 1000 includes the subject matter of example 999. In example 1000, the method includes transmitting a request to a master device in response to the external module hardware requirement not satisfying the capability threshold of the resource hardware component, the request to the master device to request a second resource hardware component be assigned to be controlled by the IoT device.

Example 1001 includes the subject matter of either of examples 999 or 1000. In example 1001, the method includes a second resource hardware component under control of the IoT device, wherein a first resource hardware component and a second resource hardware component can be pooled such that the capability threshold is a sum of the capability threshold of the first resource hardware and the second resource hardware.

Example 1002 includes the subject matter of any of examples 999 to 1001. In example 1002, the external module includes a module resource to be pooled with a first resource hardware component for by the direction of the IoT device.

Example 1003 includes the subject matter of any of examples 999 to 1002. In example 1003, the resource hardware component includes at least one of a power source, a processing resource, an integrated communication component, a context sensor, a context actuator, a signal conditioning circuit, a memory resource, or a storage resource.

Example 1004 includes the subject matter of any of examples 999 to 1003. In example 1004, the capability threshold includes a minimum functional compatibility between the resource hardware component and the external module indicating an minimal ability to function together, and a full compatibility between the resource hardware component and the external module indicating an ability to function at full capabilities of the external module.

Example 1005 includes the subject matter of any of examples 999 to 1004. In example 1005, the method includes indicating an unsatisfied capability threshold by activating a visible indicator.

Example 1006 includes the subject matter of any of examples 999 to 1005. In example 1006, the method includes placing the external module under control of the IoT device in response to satisfying the capability threshold.

Example 1007 includes the subject matter of any of examples 999 to 1006. In example 1007, in response to an external module life time being less than an operational life of the IoT device, transmitting a request for an updated external module.

Example 1008 includes the subject matter of any of examples 999 to 1007. In example 1008, in response to an resource hardware component life time being less than an operational life of the IoT device, transmitting a request for an updated resource hardware component.

Example 1009 includes a non-transitory, machine readable medium that includes instructions that, when executed, direct a processor to identify a resource hardware component controlled by an IoT device, the resource hardware component having a capability threshold, process a received indication of an external module hardware requirement from an external module, compare the external module hardware requirement to the capability threshold of the resource hardware component of the IoT device, and transmit a deactivation signal to the external module in response to the external module hardware requirement not satisfying the capability threshold of the resource hardware component.

Example 1010 includes the subject matter of examples 1009. In example 1010, the non-transitory, machine readable medium includes instructions that, when executed, direct the processor to transmit a request to a master device in response to the external module hardware requirement not satisfying the capability threshold of the resource hardware component, the request to the master device to request a second resource hardware component be assigned to be controlled by the IoT device.

Example 1011 includes the subject matter of either of examples 1009 or 1010. In example 1011, the non-transitory, machine readable medium includes a second resource hardware component under control of the IoT device, wherein a first resource hardware component and a second resource hardware component can be pooled such that the capability threshold is a sum of the capability threshold of the first resource hardware and the second resource hardware.

Example 1012 includes the subject matter of any of examples 1009 to 1011. In example 1012, the external module includes a module resource to be pooled with a first resource hardware component for use by the IoT device.

Example 1013 includes the subject matter of any of examples 1009 to 1012. In example 1013, the resource hardware component includes at least one of a power source, a processing resource, an integrated communication component, a context sensor, a context actuator, a signal conditioning circuit, a memory resource, or a storage resource.

Example 1014 includes the subject matter of any of examples 1009 to 1013. In example 1014, the capability threshold includes a minimum functional compatibility between the resource hardware component and the external module indicating an minimal ability to function together, and a full compatibility between the resource hardware component and the external module indicating an ability to function at the highest capabilities of the external module.

Example 1015 includes the subject matter of any of examples 1009 to 1014. In example 1015, the non-transitory, machine readable medium includes instructions that, when executed, direct the processor to indicate an unsatisfied capability threshold by activating a visible indicator.

Example 1016 includes the subject matter of any of examples 1009 to 1015. In example 1016, the non-transitory, machine readable medium includes instructions that, when executed, direct the processor to place the external module under control of the IoT device in response to satisfying the capability threshold.

Example 1017 includes the subject matter of any of examples 1009 to 1016. In example 1017, the non-transitory, machine readable medium includes instructions that, when executed, direct the processor to, in response to an external module life time being less than an operational life of the IoT device, transmit a request for an updated external module.

Example 1018 includes the subject matter of any of examples 1009 to 1017. In example 1018, the non-transitory, machine readable medium includes instructions that, when executed, direct the processor to, in response to an resource hardware component life time being less than an operational life of the IoT device, transmit a request for an updated resource hardware component.

Example 1019 includes an apparatus for application energy calculation. The apparatus for application energy calculation includes an energy resource enumerator to enumerate energy resources for a device configured to power and control a plurality of modules and an energy requirement enumerator to enumerate energy requirements for the plurality of modules. The apparatus also includes an application decomposer to decompose an application into tasks that, when enacted, function completely on one module of the plurality of modules, a power consumption identifier to identify the power consumption of the one module in the plurality of modules, for each active time period, a task activation counter to count a number times the task activates the one module of the plurality of modules in a unit of time, and a total energy calculator to calculate the total energy used in the unit of time by the one module in of the plurality of modules based on the time the task is active, a time duration of the task completing on the one module, and the energy required by the module by the active time period.

Example 1020 includes the subject matter of examples 1019. In example 1020, the apparatus includes a device lifetime generator to generate a device lifetime based on the total energy used in the unit of time for the plurality of modules and on the energy resources for the device.

Example 1021 includes the subject matter of either of examples 1019 or 1020. In example 1021, the apparatus includes a device instructor to instruct the device to start the application in response to the device lifetime being calculated as greater than or equal to a minimum threshold of time as set before an application analysis begins for the device.

Example 1022 includes the subject matter of any of examples 1019 to 1021. In example 1022, the apparatus includes a device instructor to instruct a request for a new configuration be sent to a master device in response to the device lifetime being calculated as less than a minimum threshold of time as set before an application analysis begins for the device.

Example 1023 includes the subject matter of any of examples 1019 to 1022. In example 1023, the request for a new configuration includes a detailed listing of at least one of the following the energy use for the task on the module, energy used by the module over the unit time, and energy use for a module type in the plurality of modules.

Example 1024 includes the subject matter of any of examples 1019 to 1023. In example 1024, an activating step occurs prior to the enumerating of energy resources, wherein the activating step includes at least one of the following providing of power to the device, updating of a hardware configuration of the device, and an update to application code.

Example 1025 includes the subject matter of any of examples 1019 to 1024. In example 1025, the apparatus includes a device instructor to instruct the device to store the total energy per unit time as calculated for a first configuration, the device instructor to instruct the device to request from a master device a second configuration, a second total energy calculator to calculate a second total energy per unit for the second configuration of the device, a total energy comparer to compare the total energy per unit of the first configuration with the second total energy per unit for the second configuration, and the device instructor to instruct the device to request either the first configuration or the second configuration based on the comparison of the total energy per unit and the second total energy per unit.

Example 1026 includes the subject matter of any of examples 1019 to 1025. In example 1026, the apparatus includes a device instructor to instruct the device to start the application if it is determined that the device is powered by a wired resource.

Example 1027 includes the subject matter of any of examples 1019 to 1026. In example 1027, identifying the power consumption of the one module in the plurality of modules for each active time period includes the module retrieving historic energy usage values associated with the module for the task.

Example 1028 includes the subject matter of any of examples 1019 to 1027. In example 1028, the apparatus includes an application sleep mode identifier to identify if the application has a sleep mode function, a time counter to count the time the application will be in a sleep mode in a unit of time, and a total energy calculator to calculate the total energy used based on total power saved based on the time a processor for an application will be in sleep mode.

Example 1029 includes a method for determining application energy demand. The method for determining application energy demand includes enumerating energy resources for a device configured to power and control a plurality of modules, enumerating energy requirements for the plurality of modules, decomposing an application into tasks that, when enacted, function completely on one module of the plurality of modules, identifying power consumption of the one module in the plurality of modules, for each active time period, counting a number times the task activates the one module of the plurality of modules in a unit of time, and calculating total energy used in the unit of time by the one module in of the plurality of modules based on the time the task is active, a time duration of the task completing on the one module, and the energy required by the module by the active time period.

Example 1030 includes the subject matter of examples 1029. In example 1030, the method includes generating a device lifetime based on the total energy used in the unit of time for the plurality of modules and on the energy resources for the device.

Example 1031 includes the subject matter of either of examples 1029 or 1030. In example 1031, the method includes instructing the device to start the application, in response to the device lifetime being calculated as greater than or equal to a minimum threshold of time as set before an application analysis begins for the device.

Example 1032 includes the subject matter of any of examples 1029 to 1031. In example 1032, the method includes instructing a request for a new configuration be sent to a master device in response to the device lifetime being calculated as less than a minimum threshold of time as set before an application analysis begins for the device.

Example 1033 includes the subject matter of any of examples 1029 to 1032. In example 1033, the request for a new configuration includes a detailed listing of at least one of the following the energy use for the task on the module, energy used by the module over the unit time, and energy use for a module type in the plurality of modules.

Example 1034 includes the subject matter of any of examples 1029 to 1033. In example 1034, an activating step occurs prior to the enumerating of energy resources, wherein the activating step includes at least one of the following providing of power to the device, updating of a hardware configuration of the device, or an update to application code.

Example 1035 includes the subject matter of any of examples 1029 to 1034. In example 1035, the method includes instructing the device to store the total energy per unit time as calculated for a first configuration, instructing the device to request from a master device a second configuration, calculating a second total energy per unit for the second configuration of the device, comparing the total energy per unit of the first configuration with the second total energy per unit for the second configuration, and instructing the device to request either the first configuration or the second configuration based on the comparison of the total energy per unit and the second total energy per unit.

Example 1036 includes the subject matter of any of examples 1029 to 1035. In example 1036, the method includes instructing the device to start the application if it is determined that the device is powered by a wired resource.

Example 1037 includes the subject matter of any of examples 1029 to 1036. In example 1037, identifying the power consumption of the one module in the plurality of modules for each active time period includes the module retrieving historic energy usage values associated with the module for the task.

Example 1038 includes the subject matter of any of examples 1029 to 1037. In example 1038, the method includes identifying if the application has a sleep mode function, counting the time the application will be in a sleep mode in a unit of time, and calculating the total energy used based on total power saved based on the time a processor for an application will be in sleep mode.

Example 1039 includes a non-transitory, machine readable medium that includes instructions that, when executed, direct a processor to enumerate energy resources for a device configured to power and control a plurality of modules, enumerate energy requirements for the plurality of modules, decompose an application into tasks that, when enacted, function completely on one module of the plurality of modules, identify power consumption of the one module in the plurality of modules, for each active time period, count a number times the task activates the one module of the plurality of modules in a unit of time, and calculate total energy used in the unit of time by the one module in of the plurality of modules based on the time the task is active, a time duration of the task completing on the one module, and the energy required by the module by the active time period.

Example 1040 includes the subject matter of examples 1039. In example 1040, the non-transitory, machine readable medium includes instructions that, when executed, direct the processor to generate a device lifetime based on the total energy used in the unit of time for the plurality of modules and on the energy resources for the device.

Example 1041 includes the subject matter of either of examples 1039 or 1040. In example 1041, the non-transitory, machine readable medium includes instructions that, when executed, direct the processor to start the application, in response to the device lifetime being calculated as greater than or equal to a minimum threshold of time as set before an application analysis begins for the device.

Example 1042 includes the subject matter of any of examples 1039 to 1041. In example 1042, the non-transitory, machine readable medium includes instructions that, when executed, direct the processor to request a new configuration be sent to a master device in response to the device lifetime being calculated as less than a minimum threshold of time as set before an application analysis begins for the device.

Example 1043 includes the subject matter of any of examples 1039 to 1042. In example 1043, the request for a new configuration includes a detailed listing of at least one of the following the energy use for the task on the module, energy used by the module over the unit time, and energy use for a module type in the plurality of modules.

Example 1044 includes the subject matter of any of examples 1039 to 1043. In example 1044, an activating step occurs prior to the enumerating of energy resources, wherein the activating step includes at least one of the following providing of power to the device, updating of a hardware configuration of the device, and an update to application code.

Example 1045 includes the subject matter of any of examples 1039 to 1044. In example 1045, the non-transitory, machine readable medium includes instructions that, when executed, direct the processor to store the total energy per unit time as calculated for a first configuration, instruct the device to request from a master device a second configuration, calculate a second total energy per unit for the second configuration of the device, compare the total energy per unit of the first configuration with the second total energy per unit for the second configuration, and instruct the device to request either the first configuration or the second configuration based on the comparison of the total energy per unit and the second total energy per unit.

Example 1046 includes the subject matter of any of examples 1039 to 1045. In example 1046, the non-transitory, machine readable medium includes instructions that, when executed, direct the processor to start the application if it is determined that the device is powered by a wired resource.

Example 1047 includes the subject matter of any of examples 1039 to 1046. In example 1047, identifying power consumption of the one module in the plurality of modules for each active time period includes the module retrieving historic energy usage values associated with the module for the task.

Example 1048 includes the subject matter of any of examples 1039 to 1047. In example 1048, the non-transitory, machine readable medium includes instructions that, when executed, direct the processor to identify if the application has a sleep mode function, count the time the application will be in a sleep mode in a unit of time, and calculate the total energy used based on total power saved based on the time the processor for an application will be in sleep mode.

Example 1049 includes an apparatus for creation of custom hardware for signal conditioning. The apparatus for creation of custom hardware for signal conditioning includes a self-describing device. The apparatus also includes a field programmable gate array, to detect a connection to a self-describing sensor module, and a processor to process data received from the self-describing sensor module, the received data indicating signal conditioning information for the self-describing sensor module, generate field programmable gate array code to be implemented on the field programmable gate array of the self-describing device, and modify raw data received from the self-describing sensor module to generate signal conditioned data using the field programmable gate array based on the signal conditioning information.

Example 1050 includes the subject matter of examples 1049. In example 1050, the processor is to detect that the field programmable gate array cannot support the field programmable gate array code.

Example 1051 includes the subject matter of either of examples 1049 or 1050. In example 1051, the processor is to connect existing field programmable gate array blocks in response to detecting that the field programmable gate array blocks are sufficient for signal conditioning the raw data received from the self-describing sensor module.

Example 1052 includes the subject matter of any of examples 1049 to 1051. In example 1052, the processor is to transmit identified field programmable gate array characteristics and self-describing device characteristics.

Example 1053 includes the subject matter of any of examples 1049 to 1052. In example 1053, the processor is to transmit a request to a master device, the request to include field programmable gate array characteristics and self-describing device characteristics, the request to be sent in response to detecting that the self-describing device is constrained and detecting that the field programmable gate array of the self-describing device does not have sufficient configurable signal conditioning blocks.

Example 1054 includes the subject matter of any of examples 1049 to 1053. In example 1054, the request is to generate and return a master device generated field programmable gate array code.

Example 1055 includes the subject matter of any of examples 1049 to 1054. In example 1055, a self-describing device including at least one of a battery power source, an internet connection based on wireless technology, or a processor with a low power mode is considered a constrained self-describing device.

Example 1056 includes the subject matter of any of examples 1049 to 1055. In example 1056, the processor is to send the signal conditioning information for the self-describing sensor module and device information to an unconstrained device in response to a detection that the self-describing device is constrained.

Example 1057 includes the subject matter of any of examples 1049 to 1056. In example 1057, the processor is to transmit to the unconstrained device a request to generate a return field programmable gate array code to be implemented on the field programmable gate array of the self-describing device.

Example 1058 includes the subject matter of any of examples 1049 to 1057. In example 1058, the processor is to send the signal conditioning information for the self-describing sensor module and device information to a second constrained device in response to a detection that the self-describing device is constrained, wherein the second constrained device can access an unconstrained device.

Example 1059 includes a method to create custom signal conditioning hardware. The method to create custom signal conditioning hardware includes detecting a self-describing sensor module in response to a connection of the self-describing sensor module to a self-describing device, the self-describing device including a field programmable gate array, processing data received from the self-describing sensor module, the received data indicating signal conditioning information for the self-describing sensor module, generating field programmable gate array code to be implemented on the field programmable gate array of the self-describing device, and modifying raw data received from the self-describing sensor module to generate signal conditioned data using the field programmable gate array based on the signal conditioning information.

Example 1060 includes the subject matter of examples 1059. In example 1060, the method includes detecting that the field programmable gate array cannot support the field programmable gate array code.

Example 1061 includes the subject matter of either of examples 1059 or 1060. In example 1061, the method includes connecting existing field programmable gate array blocks in response to detecting that the field programmable gate array blocks are sufficient for signal conditioning the raw data received from the self-describing sensor module.

Example 1062 includes the subject matter of any of examples 1059 to 1061. In example 1062, the method includes transmitting identified field programmable gate array characteristics and self-describing device characteristics.

Example 1063 includes the subject matter of any of examples 1059 to 1062. In example 1063, the method includes transmitting a request to a master device, the request to include field programmable gate array characteristics and self-describing device characteristics, the request to be sent in response to detecting that the self-describing device is constrained and detecting that the field programmable gate array of the self-describing device does not have sufficient configurable signal conditioning blocks.

Example 1064 includes the subject matter of any of examples 1059 to 1063. In example 1064, the request is to generate and return a master device generated field programmable gate array code.

Example 1065 includes the subject matter of any of examples 1059 to 1064. In example 1065, a self-describing device including at least one of a battery power source, an internet connection based on wireless technology, or a processor with a low power mode is considered a constrained self-describing device.

Example 1066 includes the subject matter of any of examples 1059 to 1065. In example 1066, the method includes sending the signal conditioning information for the self-describing sensor module and device information to an unconstrained device in response to a detection that the self-describing device is constrained.

Example 1067 includes the subject matter of any of examples 1059 to 1066. In example 1067, the method includes transmitting to the unconstrained device a request to generate a return field programmable gate array code to be implemented on the field programmable gate array of the self-describing device.

Example 1068 includes the subject matter of any of examples 1059 to 1067. In example 1068, the method includes sending the signal conditioning information for the self-describing sensor module and device information to a second constrained device in response to a detection that the self-describing device is constrained, wherein the second constrained device can access an unconstrained device.

Example 1069 includes a non-transitory, machine readable medium that includes instructions that, when executed, direct a processor to detect a self-describing sensor module in response to a connection of the self-describing sensor module to a self-describing device, the self-describing device including a field programmable gate array, process data received from the self-describing sensor module, the received data indicating signal conditioning information for the self-describing sensor module, generate field programmable gate array code to be implemented on the field programmable gate array of the self-describing device, and modify raw data received from the self-describing sensor module to generate signal conditioned data using the field programmable gate array based on the signal conditioning information.

Example 1070 includes the subject matter of examples 1069. In example 1070, the machine readable medium includes instructions that, when executed, direct a processor to detect that the field programmable gate array cannot support the field programmable gate array code.

Example 1071 includes the subject matter of either of examples 1069 or 1070. In example 1071, the machine readable medium includes instructions that, when executed, direct a processor to connect existing field programmable gate array blocks in response to detecting that the field programmable gate array blocks are sufficient for signal conditioning the raw data received from the self-describing sensor module.

Example 1072 includes the subject matter of any of examples 1069 to 1071. In example 1072, the machine readable medium includes instructions that, when executed, direct a processor to transmit identified field programmable gate array characteristics and self-describing device characteristics.

Example 1073 includes the subject matter of any of examples 1069 to 1072. In example 1073, the machine readable medium includes instructions that, when executed, direct a processor to transmit a request to a master device, the request to include field programmable gate array characteristics and self-describing device characteristics, the request to be sent in response to detecting that the self-describing device is constrained and detecting that the field programmable gate array of the self-describing device does not have sufficient configurable signal conditioning blocks.

Example 1074 includes the subject matter of any of examples 1069 to 1073. In example 1074, the request is to generate and return a master device generated field programmable gate array code.

Example 1075 includes the subject matter of any of examples 1069 to 1074. In example 1075, a self-describing device including at least one of a battery power source, an internet connection based on wireless technology, or a processor with a low power mode is considered a constrained self-describing device.

Example 1076 includes the subject matter of any of examples 1069 to 1075. In example 1076, the machine readable medium includes instructions that, when executed, direct a processor to send the signal conditioning information for the self-describing sensor module and device information to an unconstrained device in response to a detection that the self-describing device is constrained.

Example 1077 includes the subject matter of any of examples 1069 to 1076. In example 1077, the machine readable medium includes instructions that, when executed, direct a processor to transmit to the unconstrained device a request to generate a return field programmable gate array code to be implemented on the field programmable gate array of the self-describing device.

Example 1078 includes the subject matter of any of examples 1069 to 1077. In example 1078, the machine readable medium includes instructions that, when executed, direct a processor to send the signal conditioning information for the self-describing sensor module and device information to a second constrained device in response to a detection that the self-describing device is constrained, wherein the second constrained device can access an unconstrained device.

Example 1079. includes an apparatus. The apparatus includes an Internet-of-Things (IoT) device. The IoT device includes a subnetwork health data requestor to request subnetwork health data from a subnetwork in response to a received network health request for a network, a network shadow filter modifier to modify a network shadow filter based on received subnetwork health data generated from block chain data, and a report provider to provide a report of network health based on the network shadow filter.

Example 1080 includes the subject matter of examples 1079. In example 1080, the subnetwork is to request device health data from a device in response to receiving the subnetwork health data request.

Example 1081 includes the subject matter of either of examples 1079 or 1080. In example 1081, the subnetwork is instructed to generate subnetwork health data by modifying a subnetwork shadow filter using block chain data generated from received device health data.

Example 1082 includes the subject matter of any of examples 1079 to 1081. In example 1082, the subnetwork is to request device healthy data from a plurality of devices in response to receiving the subnetwork health data request.

Example 1083 includes the subject matter of any of examples 1079 to 1082. In example 1083, the subnetwork is instructed to generate subnetwork health data by modifying the subnetwork shadow filter using a plurality of the received device health data through the use of a logical operator to compare the plurality of the received health data.

Example 1084 includes the subject matter of any of examples 1079 to 1083. In example 1084, the device returns device health data based on a device shadow filter, the device shadow filter to be generated based on a device bloom filter that tracks an absence of scheduled health messages on the device.

Example 1085 includes the subject matter of any of examples 1079 to 1084. In example 1085, the device shadow filter includes a plurality of shadow filters each corresponding to a time interval of a plurality of bloom filters.

Example 1086 includes the subject matter of any of examples 1079 to 1085. In example 1086, the network shadow filter operates through application of a logical operator applied to a set including at least the subnetwork and one other subnetwork.

Example 1087 includes the subject matter of any of examples 1079 to 1086. In example 1087, the apparatus includes a subnetwork health data requestor to request subnetwork health data from a plurality of subnetworks logically organized in the network, and a network shadow filter modifier to modify a network shadow filter based on a plurality of received subnetwork health data.

Example 1088 includes the subject matter of any of examples 1079 to 1087. In example 1088, the block chain data is based on bloom filters that can be included in a block chain transaction to establish a historical record of network health at each endpoint of a network topography.

Example 1089 includes a method for using an internet-of-things (IoT) device to report health of a network and network devices. The method for using an internet-of-things (IoT) device to report health of a network and network devices includes requesting subnetwork health data from a subnetwork in response to a received network health request for a network, modifying a network shadow filter based on received subnetwork health data generated from block chain data, and providing a report of network health based on the network shadow filter.

Example 1090 includes the subject matter of examples 1089. In example 1090, the subnetwork is to request device health data from a device in response to receiving the subnetwork health data request.

Example 1091 includes the subject matter of either of examples 1089 or 1090. In example 1091, the subnetwork is instructed to generate subnetwork health data by modifying a subnetwork shadow filter using block chain data generated from received device health data.

Example 1092 includes the subject matter of any of examples 1089 to 1091. In example 1092, the subnetwork is to request device healthy data from a plurality of devices in response to receiving the subnetwork health data request.

Example 1093 includes the subject matter of any of examples 1089 to 1092. In example 1093, the subnetwork is instructed to generate subnetwork health data by modifying the subnetwork shadow filter using a plurality of the received device health data through the use of a logical operator to compare the plurality of the received health data.

Example 1094 includes the subject matter of any of examples 1089 to 1093. In example 1094, the device returns device health data based on a device shadow filter, the device shadow filter to be generated based on a device bloom filter that tracks an absence of scheduled health messages on the device.

Example 1095 includes the subject matter of any of examples 1089 to 1094. In example 1095, the device shadow filter includes a plurality of shadow filters each corresponding to a time interval of a plurality of bloom filters.

Example 1096 includes the subject matter of any of examples 1089 to 1095. In example 1096, the network shadow filter operates through application of a logical operator applied to a set including at least the subnetwork and one other subnetwork.

Example 1097 includes the subject matter of any of examples 1089 to 1096. In example 1097, the method includes requesting subnetwork health data from a plurality of subnetworks logically organized in the network, and modifying a network shadow filter based on a plurality of received subnetwork health data.

Example 1098 includes the subject matter of any of examples 1089 to 1097. In example 1098, the block chain data is based on bloom filters that can be included in a block chain transaction to establish a historical record of network health at each endpoint of a network topography.

Example 1099 includes a non-transitory, machine readable medium that includes instructions that, when executed, direct a processor to request subnetwork health data from a subnetwork in response to a received network health request for a network, modify a network shadow filter based on received subnetwork health data generated from block chain data, and provide a report of network health based on the network shadow filter.

Example 1100 includes the subject matter of examples 1099. In example 1100, the subnetwork is to request device health data from a device in response to receiving the subnetwork health data request.

Example 1101 includes the subject matter of either of examples 1099 or 1100. In example 1101, the subnetwork is instructed to generate subnetwork health data by modifying a subnetwork shadow filter using block chain data generated from received device health data.

Example 1102 includes the subject matter of any of examples 1099 to 1101. In example 1102, the subnetwork is to request device healthy data from a plurality of devices in response to receiving the subnetwork health data request.

Example 1103 includes the subject matter of any of examples 1099 to 1102. In example 1103, the subnetwork is instructed to generate subnetwork health data by modifying the subnetwork shadow filter using a plurality of the received device health data through the use of a logical operator to compare the plurality of the received health data.

Example 1104 includes the subject matter of any of examples 1099 to 1103. In example 1104, the device returns device health data based on a device shadow filter, the device shadow filter to be generated based on a device bloom filter that tracks an absence of scheduled health messages on the device.

Example 1105 includes the subject matter of any of examples 1099 to 1104. In example 1105, the device shadow filter includes a plurality of shadow filters each corresponding to a time interval of a plurality of bloom filters.

Example 1106 includes the subject matter of any of examples 1099 to 1105. In example 1106, the network shadow filter operates through application of a logical operator applied to a set including at least the subnetwork and one other subnetwork.

Example 1107 includes the subject matter of any of examples 1099 to 1106. In example 1107, the machine readable medium includes instructions that, when executed, direct a processor to request subnetwork health data from a plurality of subnetworks logically organized in the network, and modify a network shadow filter based on a plurality of received subnetwork health data.

Example 1108 includes the subject matter of any of examples 1099 to 1107. In example 1108, the block chain data is based on bloom filters that can be included in a block chain transaction to establish a historical record of network health at each endpoint of a network topography.

Example 1109. includes an apparatus including an Internet-of-Things (IoT) device. The Internet-of-Things (IoT) device includes a control channel data inserter to insert control channel data into a wide area network frame, a frame transmitter to transmit the wide area network frame to a first device with a first transmission protocol and a second device with a second protocol, the control channel data to gain access to both the first device and first device protocol and second device and second device protocol, and a data modifier to modify a transmitting node data in response to the first device returning a detected transmission from a transmitting node.

Example 1110 includes the subject matter of any of examples 1109. In example 1110, the wide area network frame includes an application payload frame field to encapsulate the control channel data prior to and during transmission.

Example 1111 includes the subject matter of either of examples 1109 or 1110. In example 1111, the control channel data includes instructions for the first device to collect a payload from a transmitting node, extract a timestamp from the payload, and return payloads that include a timestamp and a zone ID.

Example 1112 includes the subject matter of any of examples 1109 to 1111. In example 1112, the frame transmitter transmits the wide area network frame to the second device through instructions to the first device to act as an intermediate transmitter and to resend to the second device.

Example 1113 includes the subject matter of any of examples 1109 to 1112. In example 1113, the control channel data includes a message header, a zone ID field, control message data field, and a security field.

Example 1114 includes the subject matter of any of examples 1109 to 1113. In example 1114, the modification of the transmitting node data is based on extracting a zone ID and a timestamp returning a detected transmission from a transmitting node.

Example 1115 includes the subject matter of any of examples 1109 to 1114. In example 1115, the control channel data includes instructions for the first device to return its zone ID and a plurality of timestamps from a transmitting node.

Example 1116 includes the subject matter of any of examples 1109 to 1115. In example 1116, the control channel data includes instructions for the second device to return to the first device its zone ID and a timestamp from a transmitting node, the second device to have no communication path to a server device except by passing through the first device.

Example 1117 includes the subject matter of any of examples 1109 to 1116. In example 1117, the apparatus includes a calculator to calculate a location of the transmitting node using a hyperbolic function and a plurality of timestamps of packages received by the first device and the second device as well as the zone ID of the first device and the second device.

Example 1118 includes the subject matter of any of examples 1109 to 1117. In example 1118, the apparatus includes a calculator to calculate a location of the transmitting node based on transmission transit time between a signal detecting device and a signal receiving device.

Example 1119 includes a method for using an internet-of-things (IoT) device to discover resources and geolocation sector identification. The method for using an internet-of-things (IoT) device to discover resources and geolocation sector identification includes inserting control channel data into a wide area network frame, transmitting the wide area network frame to a first device with a first transmission protocol and a second device with a second protocol, the control channel data to gain access to both the first device and first device protocol and second device and second device protocol, and modifying a transmitting node data in response to the first device returning a detected transmission from a transmitting node.

Example 1120 includes the subject matter of examples 1119. In example 1120, the wide area network frame includes an application payload frame field to encapsulate the control channel data prior to and during transmission.

Example 1121 includes the subject matter of either of examples 1119 or 1120. In example 1121, the control channel data includes instructions for the first device to collect a payload from a transmitting node, extract a timestamp from the payload, and return payloads that include a timestamp and a zone ID.

Example 1122 includes the subject matter of any of examples 1119 to 1121. In example 1122, the method includes transmitting the wide area network frame to the second device through instructions to the first device to act as an intermediate transmitter and to resend to the second device.

Example 1123 includes the subject matter of any of examples 1119 to 1122. In example 1123, the control channel data includes a message header, a zone ID field, control message data field, and a security field.

Example 1124 includes the subject matter of any of examples 1119 to 1123. In example 1124, the modification of the transmitting node data is based on extracting a zone ID and a timestamp returning a detected transmission from a transmitting node.

Example 1125 includes the subject matter of any of examples 1119 to 1124. In example 1125, the control channel data includes instructions for the first device to return its zone ID and a plurality of timestamps from a transmitting node.

Example 1126 includes the subject matter of any of examples 1119 to 1125. In example 1126, the control channel data includes instructions for the second device to return to the first device its zone ID and a timestamp from a transmitting node, the second device to have no communication path to a server device except by passing through the first device.

Example 1127 includes the subject matter of any of examples 1119 to 1126. In example 1127, the method includes calculation a location of the transmitting node using a hyperbolic function and a plurality of timestamps of packages received by the first device and the second device as well as the zone ID of the first device and the second device.

Example 1128 includes the subject matter of any of examples 1119 to 1127. In example 1128, the method includes calculating a location of the transmitting node based on transmission transit time between a signal detecting device and a signal receiving device.

Example 1129 includes a non-transitory, machine readable medium that includes instructions that, when executed, direct a processor to insert control channel data into a wide area network frame, transmit the wide area network frame to a first device with a first transmission protocol and a second device with a second protocol, the control channel data to gain access to both the first device and first device protocol and second device and second device protocol, and modify a transmitting node data in response to the first device returning a detected transmission from a transmitting node.

Example 1130 includes the subject matter of examples 1129. In example 1130, the wide area network frame includes an application payload frame field to encapsulate the control channel data prior to and during transmission.

Example 1131 includes the subject matter of either of examples 1129 or 1130. In example 1131, the control channel data includes instructions for the first device to collect a payload from a transmitting node, extract a timestamp from the payload, and return payloads that include a timestamp and a zone ID.

Example 1132 includes the subject matter of any of examples 1129 to 1131. In example 1132, the machine readable medium includes instructions that, when executed, direct a processor to transmit the wide area network frame to the second device through instructions to the first device to act as an intermediate transmitter and to resend to the second device.

Example 1133 includes the subject matter of any of examples 1129 to 1132. In example 1133, the control channel data includes a message header, a zone ID field, control message data field, and a security field.

Example 1134 includes the subject matter of any of examples 1129 to 1133. In example 1134, the modification of the transmitting node data is based on extracting a zone ID and a timestamp returning a detected transmission from a transmitting node.

Example 1135 includes the subject matter of any of examples 1129 to 1134. In example 1135, the control channel data includes instructions for the first device to return its zone ID and a plurality of timestamps from a transmitting node.

Example 1136 includes the subject matter of any of examples 1129 to 1135. In example 1136, the control channel data includes instructions for the second device to return to the first device its zone ID and a timestamp from a transmitting node, the second device to have no communication path to a server device except by passing through the first device.

Example 1137 includes the subject matter of any of examples 1129 to 1136. In example 1137, the machine readable medium includes instructions that, when executed, direct a processor to calculate a location of the transmitting node using a hyperbolic function and a plurality of timestamps of packages received by the first device and the second device as well as the zone ID of the first device and the second device.

Example 1138 includes the subject matter of any of examples 1129 to 1137. In example 1138, the machine readable medium includes instructions that, when executed, direct a processor to calculate a location of the transmitting node based on transmission transit time between a signal detecting device and a signal receiving device.

Example 1139 includes an apparatus including an Internet-of-Things (IoT) device. The Internet-of-Things (IoT) device includes a data loader to load data into a selected interactive analytics environment based on a representative data set from an environment, the interactive analytics environment to be at least one of a data mining environment and a data fusion environment, a fit determiner to determine if a proposed model fits data, the proposed model to include a workload of decomposable portions for processing on a plurality of devices, and a workload mapper to map the workload to a device for execution by the device.

Example 1140 includes the subject matter of example 1139. In example 1140, the data mining environment incorporates data from an application domain and from a stored knowledge base corresponding to the representative data set from an environment.

Example 1141 includes the subject matter of either of examples 1139 or 1140. In example 1141, the data is cleaned and organized prior to loading into a selected interactive analytics environment.

Example 1142 includes the subject matter of any of examples 1139 to 1141. In example 1142, the apparatus includes a decomposer to decompose the workload prior to mapping the workload to the device for execution by the device.

Example 1143 includes the subject matter of any of examples 1139 to 1142. In example 1143, the workload is decomposed through at least one of parallelism and a modular serially dependent task.

Example 1144 includes the subject matter of any of examples 1139 to 1143. In example 1144, the workload is decomposed for a classification task, where a pre-processing, feature extraction, and a classification task can be separated.

Example 1145 includes the subject matter of any of examples 1139 to 1144. In example 1145, the apparatus includes a processor to compute performance of a platform in terms of resources used subsequent to the mapping and an execution of the workload on the device.

Example 1146 includes the subject matter of any of examples 1139 to 1145. In example 1146, the interactive analytics indicates a temporal relationship between a first data sample and a second data sample, the interactive analytics further indicate a relationship between a first sample and a first sensor and the second data sample a second sensor.

Example 1147 includes the subject matter of any of examples 1139 to 1146. In example 1147, the workload includes a profile of computing requirements, memory requirements, and network requirements of the workload.

Example 1148 includes the subject matter of any of examples 1139 to 1147. In example 1148, the workload includes a plurality of sub-workloads on the device, the workload including an agreement with the devices obtained by sorting the workloads in terms of a resource required a resource available and pairing a workload to a device based on the resource required and the resource available.

Example 1149 includes a method providing data analytics of IoT systems. The method providing data analytics of IoT systems includes loading data into a selected interactive analytics environment based on a representative data set from an environment, the interactive analytics environment to be at least one of a data mining environment and a data fusion environment, determining if a proposed model fits data, the proposed model to include a workload of decomposable portions for processing on a plurality of devices, and mapping the workload to a device for execution by the device.

Example 1150 includes the subject matter of example 1149. In example 1150, the data mining environment incorporates data from an application domain and from a stored knowledge base corresponding to the representative data set from an environment.

Example 1151 includes the subject matter of either of examples 1149 or 1150. In example 1151, the data is cleaned and organized prior to loading into a selected interactive analytics environment.

Example 1152 includes the subject matter of any of examples 1149 to 1151. In example 1152, the method includes decomposing the workload prior to mapping the workload to the device for execution by the device.

Example 1153 includes the subject matter of any of examples 1149 to 1152. In example 1153, the workload is decomposed through at least one of parallelism and a modular serially dependent task.

Example 1154 includes the subject matter of any of examples 1149 to 1153. In example 1154, the workload is decomposed for a classification task, where a pre-processing, feature extraction, and a classification task can be separated.

Example 1155 includes the subject matter of any of examples 1149 to 1154. In example 1155, the method includes computing performance of a platform in terms of resources used subsequent to the mapping and an execution of the workload on the device.

Example 1156 includes the subject matter of any of examples 1149 to 1155. In example 1156, the interactive analytics indicates a temporal relationship between a first data sample and a second data sample, the interactive analytics further indicate a relationship between a first sample and a first sensor and the second data sample a second sensor.

Example 1157 includes the subject matter of any of examples 1149 to 1156. In example 1157, the workload includes a profile of computing requirements, memory requirements, and network requirements of the workload.

Example 1158 includes the subject matter of any of examples 1149 to 1157. In example 1158, the workload includes a plurality of sub-workloads on the device, the workload including an agreement with the devices obtained by sorting the workloads in terms of a resource required a resource available and pairing a workload to a device based on the resource required and the resource available.

Example 1159 includes a non-transitory, machine readable medium that includes instructions that, when executed, direct a processor to load data into a selected interactive analytics environment based on a representative data set from an environment, the interactive analytics environment to be at least one of a data mining environment and a data fusion environment, determine if a proposed model fits data, the proposed model to include a workload of decomposable portions for processing on a plurality of devices, and map the workload to a device for execution by the device.

Example 1160 includes the subject matter of example 1159. In example 1160, the data mining environment incorporates data from an application domain and from a stored knowledge base corresponding to the representative data set from an environment.

Example 1161 includes the subject matter of either of examples 1159 or 1160. In example 1161, the data is cleaned and organized prior to loading into a selected interactive analytics environment.

Example 1162 includes the subject matter of any of examples 1159 to 1161. In example 1162, the machine readable medium includes instructions that, when executed, direct a processor to decompose the workload prior to mapping the workload to the device for execution by the device.

Example 1163 includes the subject matter of any of examples 1159 to 1162. In example 1163, the workload is decomposed through at least one of parallelism and a modular serially dependent task.

Example 1164 includes the subject matter of any of examples 1159 to 1163. In example 1164, the workload is decomposed for a classification task, where a pre-processing, feature extraction, and a classification task can be separated.

Example 1165 includes the subject matter of any of examples 1159 to 1164. In example 1165, the machine readable medium includes instructions that, when executed, direct a processor to compute performance of a platform in terms of resources used subsequent to mapping and an execution of the workload on the device.

Example 1166 includes the subject matter of any of examples 1159 to 1165. In example 1166, the interactive analytics indicates a temporal relationship between a first data sample and a second data sample, the interactive analytics further indicate a relationship between a first sample and a first sensor and the second data sample a second sensor.

Example 1167 includes the subject matter of any of examples 1159 to 1166. In example 1167, the workload includes a profile of computing requirements, memory requirements, and network requirements of the workload.

Example 1168 includes the subject matter of any of examples 1159 to 1167. In example 1168, the workload includes a plurality of sub-workloads on the device, the workload including an agreement with the devices obtained by sorting the workloads in terms of a resource required a resource available and pairing a workload to a device based on the resource required and the resource available.

Example 1169 includes an apparatus. The apparatus includes an Internet-of-Things (IoT) network, wherein the IoT network includes an IoT device. The IoT device includes an IoT network topology identifier to identify an IoT network topology showing connections between a plurality of IoT nodes in an IoT network, an IoT node resource identifier to identify IoT node resources of each IoT node identified in the IoT network topology, a neural network topology identifier to identify a neural network topology of node distances and node locations, a mapping optimizer to optimize a mapping based on the IoT node resources, the node distances, and the node locations, and a decomposable task processor to process a decomposable task in the plurality of IoT nodes based on an overlay of the neural network topology on the IoT network.

Example 1170 includes the subject matter of example 1169. In example 1170, the neural network is an artificial neural network.

Example 1171 includes the subject matter of either of examples 1169 or 1170. In example 1171, the optimized mapping preserves a location of processing the decomposable task across the IoT network by using the node locations of the plurality of nodes to identify a node or the plurality of nodes located in a same physical location.

Example 1172 includes the subject matter of any of examples 1169 to 1171. In example 1172, the IoT network topology shows node characteristics including at least one of inter-node distances, clustering, dispersal information, received signal strengths, and signal to noise ratios.

Example 1173 includes the subject matter of any of examples 1169 to 1172. In example 1173, identifying the IoT network topology includes determining proximity of the plurality of nodes to each other, current power levels of the plurality of nodes, and a signal measurement for the plurality of nodes.

Example 1174 includes the subject matter of any of examples 1169 to 1173. In example 1174, retrieving the signal measurement of the plurality of nodes can be through retrieval of at least a received signal strength indicator or broadcasting power.

Example 1175 includes the subject matter of any of examples 1169 to 1174. In example 1175, the IoT node resources include at least one of a power level, an available storage space, a current processing load, networking capabilities, uptime, or node reliability information.

Example 1176 includes the subject matter of any of examples 1169 to 1175. In example 1176, the processing of a decomposable task in the plurality of IoT nodes includes dispatching portions of the decomposable task to the plurality of IoT nodes based on if the IoT nodes have identified being located in a physical location on a same network.

Example 1177 includes the subject matter of any of examples 1169 to 1176. In example 1177, the overlay of the neural network topology includes three layers including at least an input layer, a hidden layer, and an output layer.

Example 1178 includes the subject matter of any of examples 1169 to 1177. In example 1178, the optimizing a mapping includes a transmission time for transmission of information from input nodes to output nodes.

Example 1179 includes a method for using an internet-of-things (IoT) device for distributed neural network mapping and resource management. The method for using an internet-of-things (IoT) device for distributed neural network mapping and resource management includes identifying an IoT network topology showing connections between a plurality of IoT nodes in an IoT network, identifying IoT node resources of each IoT node identified in the IoT network topology, identifying a neural network topology of node distances and node locations, optimizing a mapping based on the IoT node resources, the node distances, and the node locations, and processing an decomposable task in the plurality of IoT nodes based on an overlay of the neural network topology on the IoT network.

Example 1180 includes the subject matter of example 1179. In example 1180, the neural network is an artificial neural network.

Example 1181 includes the subject matter of either of examples 1179 or 1180. In example 1181, the optimized mapping preserves a location of processing the decomposable task across the IoT network by using the node locations of the plurality of nodes to identify a node or the plurality of nodes located in a same physical location Example 1182 includes the subject matter of any of examples 1179 to 1181. In example 1182, the IoT network topology shows node characteristics including at least one of inter-node distances, clustering, dispersal information, received signal strengths, and signal to noise ratios.

Example 1183 includes the subject matter of any of examples 1179 to 1182. In example 1183, identifying the IoT network topology includes determining proximity of the plurality of nodes to each other, current power levels of the plurality of nodes, and a signal measurement for the plurality of nodes.

Example 1184 includes the subject matter of any of examples 1179 to 1183. In example 1184, retrieving the signal measurement of the plurality of nodes can be through retrieval of at least a received signal strength indicator or broadcasting power.

Example 1185 includes the subject matter of any of examples 1179 to 1184. In example 1185, the IoT node resources include at least one of a power level, an available storage space, a current processing load, networking capabilities, uptime, or node reliability information.

Example 1186 includes the subject matter of any of examples 1179 to 1185. In example 1186, the processing of a decomposable task in the plurality of IoT nodes includes dispatching portions of the decomposable task to the plurality of IoT nodes based on if the IoT nodes have identified being located in a physical location on a same network.

Example 1187 includes the subject matter of any of examples 1179 to 1186. In example 1187, the overlay of the neural network topology includes three layers including at least an input layer, a hidden layer, and an output layer.

Example 1188 includes the subject matter of any of examples 1179 to 1187. In example 1188, the optimizing a mapping includes a transmission time for transmission of information from input nodes to output nodes.

Example 1189 includes a non-transitory, machine readable medium including instructions that, when executed, direct a processor to identify an IoT network topology showing connections between a plurality of IoT nodes in an IoT network, identify IoT node resources of each IoT node identified in the IoT network topology, identify a neural network topology of node distances and node locations, optimize a mapping based on the IoT node resources, the node distances, and the node locations, and process a decomposable task in the plurality of IoT nodes based on an overlay of the neural network topology on the IoT network.

Example 1190 includes the subject matter of example 1189. In example 1190, the neural network is an artificial neural network.

Example 1191 includes the subject matter of either of examples 1189 or 1190. In example 1191, optimized mapping preserves a location of processing the decomposable task across the IoT network by using the node locations of the plurality of nodes to identify a node or the plurality of nodes located in a same physical location Example 1192 includes the subject matter of any of examples 1189 to 1191. In example 1192, the IoT network topology shows node characteristics including at least one of inter-node distances, clustering, dispersal information, received signal strengths, and signal to noise ratios.

Example 1193 includes the subject matter of any of examples 1189 to 1192. In example 1193, identifying the IoT network topology includes determining the proximity of plurality of nodes to each other, current power levels of the plurality of nodes, and a signal measurement for the plurality of nodes.

Example 1194 includes the subject matter of any of examples 1189 to 1193. In example 1194, retrieving the signal measurement of the plurality of nodes can be through retrieval of at least a received signal strength indicator or broadcasting power.

Example 1195 includes the subject matter of any of examples 1189 to 1194. In example 1195, the IoT node resources include at least one of a power level, an available storage space, a current processing load, networking capabilities, uptime, or node reliability information.

Example 1196 includes the subject matter of any of examples 1189 to 1195. In example 1196, the processing of a decomposable task in the plurality of IoT nodes includes dispatching portions of the decomposable task to the plurality of IoT nodes based on if the IoT nodes have identified being located in a physical location on a same network.

Example 1197 includes the subject matter of any of examples 1189 to 1196. In example 1197, the overlay of the neural network topology includes three layers including at least an input layer, a hidden layer, and an output layer.

Example 1198 includes the subject matter of any of examples 1189 to 1197. In example 1198, optimizing a mapping includes a transmission time for transmission of information from input nodes to output nodes.

Example 1199. includes an apparatus including an Internet-of-Things (IoT) device. The apparatus including an Internet-of-Things (IoT) device. The IoT device includes blockchain logic to maintain a blockchain in the IoT device and propagate the blockchain across other IoT devices, a Merkle tree including hash code entries associated with each block in the blockchain, wherein an entry in the Merkle tree includes a reference to a lower level Merkle tree associated with a lower level blockchain for a lower level network, and a locator to search the Merkle tree for a target hash code to locate a target block in the blockchain, wherein if the locator encounters the reference to the lower level Merkle tree, the locator is to search the lower level Merkle tree for the target block.

Example 1200 includes the subject matter of example 1199. In example 1200, the reference includes a network reference including a link to the lower level Merkle tree in the lower level network.

Example 1201 includes the subject matter of either of examples 1199 or 1200. In example 1201, the reference includes a link to a copy of the lower level Merkle tree in the IoT device.

Example 1202 includes the subject matter of any of examples 1199 to 1201. In example 1202, the apparatus includes an indexer to build the Merkle tree for the blockchain.

Example 1203 includes the subject matter of any of examples 1199 to 1202. In example 1203, the apparatus includes a cache creator to build a coherent cache in the IoT device, wherein the coherent cache includes a copy of the lower level Merkle tree.

Example 1204 includes the subject matter of any of examples 1199 to 1203. In example 1204, the apparatus includes a cache agent to maintain a coherent cache in the IoT device, wherein the cache agent subscribes to notifications from a device in the lower level network to inform the cache agent of cache coherency events.

Example 1205 includes the subject matter of any of examples 1199 to 1204. In example 1205, the cache agent is to publish cache coherency events to a higher level cache agent in a higher level network.

Example 1206 includes a method for locating a block in a hierarchical blockchain. The method for locating a block in a hierarchical blockchain includes obtaining a hash value for the block, setting a current blockchain to a root of a hierarchical blockchain at a current network level, comparing the block hash value to values in a Merkle tree for the current blockchain, determining if the hash value maps to a sync block for a child blockchain and, if so, setting the current blockchain to the child blockchain, locating the block in the current blockchain, and retrieving the block.

Example 1207 includes the subject matter of example 1206. In example 1207, obtaining the hash value includes looking up the hash value in a table.

Example 1208 includes the subject matter of either of examples 1206 or 1207. In example 1208, obtaining the hash value includes calculating the hash value.

Example 1209 includes the subject matter of any of examples 1206 to 1208. In example 1209, setting the current blockchain to the child blockchain includes setting a network reference to a lower level blockchain and continuing a search in the lower level blockchain.

Example 1210 includes the subject matter of any of examples 1206 to 1209. In example 1210, setting the current blockchain to the child blockchain includes setting a value for a pointer to a copy of the lower level blockchain in a coherent cache.

Example 1211 includes the subject matter of any of examples 1206 to 1210. In example 1211, locating the block in the current blockchain includes determining that the block hash value matches a value in a Merkle tree for the current blockchain, and obtaining a pointer to the block from the Merkle tree.

Example 1212 includes the subject matter of any of examples 1206 to 1211. In example 1212, the method includes constructing the hierarchical blockchain, including writing transactional data to a current blockchain for a local IoT network, determining if a block is a sync block, and if so constructing a transmission containing the hash of the sync block, sending the hash of the sync block to a next higher level IoT network, and committing the transmission to a current block in the next higher level network.

Example 1213 includes the subject matter of any of examples 1206 to 1212. In example 1213, the method includes constructing a coherent cache of the hierarchical blockchain, including subscribing the current blockchain to a publishing cache agent in a child blockchain, accepting registration of the current blockchain in the child blockchain, and waiting for publication events.

Example 1214 includes the subject matter of any of examples 1206 to 1213. In example 1214, the method includes maintaining a coherent cache of the hierarchical blockchain, including receiving a notification of a cache coherency event in a child blockchain, copying a Merkle tree path from the child blockchain and publishing it to a cache agent at a subscriber blockchain, and replacing a current cached Merkle tree path corresponding to the child blockchain.

Example 1215 includes the subject matter of any of examples 1206 to 1214. In example 1215, the method includes determining if the path forms a new branch of the Merkle tree path, and if so constructing a new local root in the current blockchain, making the current blockchain equal to the local root, and repeating the construction of the new local root until the local root is the same as a global root.

Example 1216 includes a non-transitory, machine readable medium that includes instructions that, when executed, direct a processor to construct a hierarchical blockchain, and constructing a hierarchical index of the hierarchical blockchain.

Example 1217 includes the subject matter of example 1216. In example 1217, the non-transitory, machine readable medium includes instructions that, when executed, direct the processor to insert a reference to a lower level blockchain in the hierarchical index.

Example 1218 includes the subject matter of either of examples 1216 or 1217. In example 1218, the non-transitory, machine readable medium includes instructions that, when executed, direct the processor to construct a coherent cache of Merkle trees at lower levels in an internet-of-things (IoT) network.

Example 1219 includes the subject matter of any of examples 1216 to 1218. In example 1219, the non-transitory, machine readable medium includes instructions that, when executed, direct the processor to copy Merkle trees from lower levels in an internet-of-things (IoT) to a current level in the IoT network.

Example 1220 includes the subject matter of any of examples 1216 to 1219. In example 1220, the non-transitory, machine readable medium includes instructions that, when executed, direct the processor to maintain a coherency of a cache of Merkle trees from lower levels in an IoT network.

Example 1221 includes an apparatus. The apparatus includes an Internet-of-Things (IoT) network, wherein the IoT network includes an IoT device. The IoT device includes a bloom filter topic list including a hash code of a topic, a subscription manager to compare the bloom filter topic list to a list of available content, and a content locator to provide content associated with a hash code.

Example 1222 includes the subject matter of example 1221. In example 1222, the IoT device includes a white list mask including hash codes of allowed content.

Example 1223 includes the subject matter of either of examples 1221 or 1222. In example 1223, the IoT device includes a blacklist mask including hash codes of prohibited content.

Example 1224 includes the subject matter of any of examples 1221 to 1223. In example 1224, the IoT device includes including a hash code calculator to obtain a hash code for a topic.

Example 1225 includes the subject matter of any of examples 1221 to 1224. In example 1225, the IoT device includes including a trusted platform module to establish a trusted execute environment.

Example 1226 includes the subject matter of any of examples 1221 to 1225. In example 1226, the IoT device includes a subscriber that is provided content from another device.

Example 1227 includes the subject matter of any of examples 1221 to 1226. In example 1227, the IoT device includes a publisher that provides content to another device.

Example 1228 includes the subject matter of any of examples 1221 to 1227. In example 1228, the IoT device includes a router that provides content to a plurality of devices.

Example 1229 includes the subject matter of any of examples 1221 to 1228. In example 1229, the plurality of devices includes subscribers, publishers, or routers, or any combinations thereof.

Example 1230 includes a method for implementing a publish subscribe content distribution model using bloom filters. The method for implementing a publish subscribe content distribution model using bloom filters includes receiving a registration of a subscriber bloom filter including a hash code of a topic, calculating a content intercept of the subscriber bloom filter with a publisher bloom filter including a plurality of hash codes of topics, and providing content to a subscriber for the hash code if the content intercept indicates a bit match between set bits in the subscriber bloom filter and set bits in the publisher bloom filter.

Example 1231 includes the subject matter of example 1230. In example 1231, the method includes calculating a white list intercept of the subscriber bloom filter with a white list mask including a plurality of hash codes of allowed topics.

Example 1232 includes the subject matter of either of examples 1230 or 1231. In example 1232, the method includes calculating the white list intercept by performing an AND function between the subscriber bloom filter and the white list mask.

Example 1233 includes the subject matter of any of examples 1230 to 1232. In example 1233, the method includes calculating a blacklist intercept of the subscriber bloom filter with a blacklist mask including a plurality of hash codes of prohibited topics.

Example 1234 includes the subject matter of any of examples 1230 to 1233. In example 1234, the method includes calculating the backlist intercept by calculating an intermediate bloom filter as a NAND function between the subscriber bloom filter and the blacklist mask, and calculating the blacklist intercept as an AND function between the intermediate bloom filter and the subscriber bloom filter.

Example 1235 includes the subject matter of any of examples 1230 to 1234. In example 1235, the method includes providing the content to the subscriber if a white list intercept indicates a bit match between set bits in the subscriber bloom filter and set bits in a white list mask, and a blacklist intercept indicates no bit match between set bits in the subscriber bloom filter and set bits in a blacklist mask.

Example 1236 includes the subject matter of any of examples 1230 to 1235. In example 1236, the method includes generating a bloom filter topic list by calculating a hash code of each of a plurality of topics and overwriting the hash code for each of the plurality of topics onto a bloom filter.

Example 1237 includes a non-transitory, machine readable medium that includes instructions that, when executed, direct a processor to register a subscription bloom filter, compute an intersection of the subscription bloom filter with a content filter, and if the intersection is not zero provide content associated with the subscription bloom filter.

Example 1238 includes the subject matter of example 1237. In example 1238, the non-transitory, machine readable medium includes instructions that, when executed, direct the processor to register a white list mask that indicates permitted content, and register a blacklist mask that indicates prohibited content.

Example 1239 includes the subject matter of either of examples 1237 or 1238. In example 1239, the non-transitory, machine readable medium includes instructions that, when executed, direct the processor to determine that a hash code of the subscription bloom filter has a nonzero intercept with the white list mask, and, if so, provide the content.

Example 1240 includes the subject matter of any of examples 1237 to 1239. In example 1240, the non-transitory, machine readable medium includes instructions that, when executed, direct the processor to determine that a hash code of the subscription bloom filter has a nonzero intercept with the blacklist mask, and, if so, block the content from being provided.

Example 1241 includes the subject matter of any of examples 1237 to 1240. In example 1241, the non-transitory, machine readable medium includes instructions that, when executed, direct the processor to determine a hash code for a topic, and write the hash code to the subscription bloom filter.

Example 1242 includes the subject matter of any of examples 1237 to 1241. In example 1242, the non-transitory, machine readable medium includes instructions that, when executed, direct the processor to determine a hash code for a topic, perform an XOR on the hash code and the subscription bloom filter to generate a new bloom filter, and replace the subscription bloom filter with the new bloom filter.

Example 1243 includes an apparatus. The apparatus includes an Internet-of-Things (IoT) network, wherein the IoT network includes an IoT device. The IoT device includes a topic classifier to determine that a topic includes encrypted content, a notifier to send a notification to other devices that the topic includes encrypted content, and a key subscriber to subscribe to the topic including a topic key for the encrypted content.

Example 1244 includes the subject matter of example 1243. In example 1244, the IoT network includes a publisher to provide the topic including the encrypted content.

Example 1245 includes the subject matter of either of examples 1243 or 1244. In example 1245, the IoT network includes a router in communication with a publisher to obtain the encrypted content for the topic.

Example 1246 includes the subject matter of any of examples 1243 to 1245. In example 1246, the router is to obtain the topic key from the publisher for the encrypted content.

Example 1247 includes the subject matter of any of examples 1243 to 1246. In example 1247, the IoT network includes a router in communication through a chain of routers to a publisher.

Example 1248 includes the subject matter of any of examples 1243 to 1247. In example 1248, the key subscriber of the router is to obtain the topic key from a peer node in the chain of routers.

Example 1249 includes the subject matter of any of examples 1243 to 1248. In example 1249, the router includes a cache for the topic key, wherein the key subscriber preemptively obtains the topic key from a peer node in the chain of routers to warm the cache.

Example 1250 includes the subject matter of any of examples 1243 to 1249. In example 1250, the IoT network includes a subscriber in communication with a router, wherein the subscriber includes a consumer of the encrypted content.

Example 1251 includes the subject matter of any of examples 1243 to 1250. In example 1251, the key subscriber of the subscriber is to obtain the topic key from the router.

Example 1252 includes the subject matter of any of examples 1243 to 1251. In example 1252, the subscriber includes a decryptor to decrypt the encrypted content using the topic key.

Example 1253 includes a method for managing encryption keys in a publication-subscription content distribution environment. The method for managing encryption keys in a publication-subscription content distribution environment includes receiving a topic notification that a topic including encrypted content is available, subscribing to a key management topic for a topic key, receiving a notification that the topic key is available, and requesting the topic key to preemptively warm a cache.

Example 1254 includes the subject matter of example 1253. In example 1254, the method includes receiving a request from a subscriber for the topic key, and providing the topic key from the cache.

Example 1255 includes the subject matter of either of examples 1253 or 1254. In example 1255, the method includes constructing the key management topic to notify devices regarding availability of the topic key.

Example 1256 includes the subject matter of any of examples 1253 to 1255. In example 1256, the method includes determining if the topic key is in the cache, and, if not, requesting the topic key from a peer node.

Example 1257 includes the subject matter of any of examples 1253 to 1256. In example 1257, the method includes constructing a bloom filter including hash codes of available published topics.

Example 1258 includes the subject matter of any of examples 1253 to 1257. In example 1258, requesting the topic key includes issuing a GET command to obtain the topic key.

Example 1259 includes the subject matter of any of examples 1253 to 1258. In example 1259, the method includes encrypting the topic key using a site specific key to protect the topic key from interception during transfers between routing nodes and subscriber nodes.

Example 1260 includes the subject matter of any of examples 1253 to 1259. In example 1260, the method includes downloading the encrypted content from a public repository.

Example 1261 includes the subject matter of any of examples 1253 to 1260. In example 1261, the method includes decrypting the encrypted content using the topic key.

Example 1262 includes a non-transitory, machine readable medium that includes instructions that, when executed, direct a processor to receive a topic notification of encrypted content, subscribe to key management topic upon receipt of the topic notification, and obtain the topic key from a peer node upon receipt of a key notification that the topic key is available.

Example 1263 includes the subject matter of example 1262. In example 1263, the non-transitory, machine readable medium includes instructions that, when executed, direct the processor to construct a bloom filter including hash codes of available content.

Example 1264 includes the subject matter of either of examples 1262 or 1263. In example 1264, the non-transitory, machine readable medium includes instructions that, when executed, direct the processor to send the topic notification to a peer router.

Example 1265 includes the subject matter of any of examples 1262 to 1264. In example 1265, the non-transitory, machine readable medium includes instructions that, when executed, direct the processor to notify subscribers of the topic including encrypted content.

Example 1266 includes the subject matter of any of examples 1262 to 1265. In example 1266, the non-transitory, machine readable medium includes instructions that, when executed, direct the processor to send the topic key to a subscriber upon receiving a request for the topic key from the subscriber.

Example 1267 includes an apparatus. The apparatus includes an Internet-of-Things (IoT) network, wherein the IoT network includes an IoT device. This also includes an attestator to provide a group membership credential for the IoT device to a key distribution center, and a subscriber to supply a bloom filter including a hash code of a topic of interest, and receive a key from the key distribution center to decrypt content of interest.

Example 1268 includes the subject matter of example 1267. In example 1268, the topic of interest includes a public topic, a private topic, a key management topic, or a security level topic, or any combinations thereof.

Example 1269 includes the subject matter of either of examples 1267 or 1268. In example 1269, the apparatus includes a topic naming server to enroll a device in a topic and issue the group membership credential to the IoT device.

Example 1270 includes the subject matter of any of examples 1267 to 1269. In example 1270, the apparatus includes the key distribution center to verify an identity of the IoT device and provide a topic group key to the IoT device.

Example 1271 includes the subject matter of any of examples 1267 to 1270. In example 1271, the apparatus includes an integrity enforcer to block read operations to a lower level, write operations to a higher level, or both.

Example 1272 includes the subject matter of any of examples 1267 to 1271. In example 1272, a level may be a security level, a network level, or both.

Example 1273 includes the subject matter of any of examples 1267 to 1272. In example 1273, the apparatus includes a confidentiality enforcer to block read operations to a higher level, write operations to a lower level, or both.

Example 1274 includes the subject matter of any of examples 1267 to 1273. In example 1274, a level may be a security level, a network level, or both.

Example 1275 includes a method for managing topic encryption in a publication-subscription environment. The method for managing topic encryption in a publication-subscription environment includes subscribing to an encrypted topic at a router, receiving a notification of the encrypted topic including encrypted content, sending a subscriber attestation message to a key distribution center (KDC), receiving a topic encryption key from the KDC, and decrypting the encrypted content using the topic encryption key.

Example 1276 includes the subject matter of example 1275. In example 1276, the method includes receiving a notification for the encrypted topic including further encrypted content, and decrypting the further encrypted content using the topic encryption key.

Example 1277 includes the subject matter of either of examples 1275 or 1276. In example 1277, the method includes generating the topic encryption key, pushing the topic encryption key to the KDC in a publisher attestation message, and publishing encrypted content to a router.

Example 1278 includes the subject matter of any of examples 1275 to 1277. In example 1278, the method includes receiving a subscription for the encrypted topic from a subscriber, receiving a publication of the encrypted topic from a publisher, and providing a notification of the publication with the encrypted content to the subscriber.

Example 1279 includes the subject matter of any of examples 1275 to 1278. In example 1279, the method includes enforcing an integrity policy by preventing reads down to a lower level, writes up to a higher level, or both.

Example 1280 includes the subject matter of any of examples 1275 to 1279. In example 1280, a level is a security level, a network level, or both.

Example 1281 includes the subject matter of any of examples 1275 to 1280. In example 1281, the method includes enforcing a confidentiality policy by preventing reads up to a higher level, writes down to a lower level, or both.

Example 1282 includes the subject matter of any of examples 1275 to 1281. In example 1282, a level is a security level, a network level, or both.

Example 1283 includes a non-transitory, machine readable medium that includes instructions that, when executed, direct a processor to generate a topic encryption key, push the topic encryption key to a key distribution center (KDC), and publish content encrypted using the topic encryption key to a router.

Example 1284 includes the subject matter of example 1283. In example 1284, the non-transitory, machine readable medium includes instructions that, when executed, direct the processor to send encrypted content to a subscriber.

Example 1285 includes the subject matter of either of examples 1283 or 1284. In example 1285, the non-transitory, machine readable medium includes instructions that, when executed, direct the processor to obtain the topic encryption key from the key distribution center.

Example 1286 includes the subject matter of any of examples 1283 to 1285. In example 1286, the non-transitory, machine readable medium includes instructions that, when executed, direct the processor to decrypt content using the topic encryption key.

Example 1287 includes the subject matter of any of examples 1283 to 1286. In example 1287, the non-transitory, machine readable medium includes instructions that, when executed, direct the processor to attest to an identity using a certificate provided by a topic naming server.

Example 1288 includes the subject matter of any of examples 1283 to 1287. In example 1288, the non-transitory, machine readable medium includes instructions that, when executed, direct the processor to enforce an integrity policy.

Example 1289 includes the subject matter of any of examples 1283 to 1288. In example 1289, the non-transitory, machine readable medium includes instructions that, when executed, direct the processor to enforce a confidentiality policy.

Example 1290 includes an apparatus. The apparatus includes an Internet-of-Things (IoT) network, wherein the IoT network includes a shy robot. The shy robot includes sensors to detect a presence, a propulsion system to move the shy robot, a context engine to use data from the sensors to control the propulsion system, based, at least in part, on the presence detected, and a network system to alert other devices to the presence.

Example 1291 includes the subject matter of example 1290. In example 1291, the sensors include a camera to obtain image data.

Example 1292 includes the subject matter of either of examples 1290 or 1291. In example 1292, the sensors include a thermal sensor to recognize a heat signature of a living being.

Example 1293 includes the subject matter of any of examples 1290 to 1292. In example 1293, the sensors include a microphone array to determine a location to a sound, a distance to a source of the sound, or both.

Example 1294 includes the subject matter of any of examples 1290 to 1293. In example 1294, the sensors include a radar sensor to determine the distance to objects.

Example 1295 includes the subject matter of any of examples 1290 to 1294. In example 1295, the presence includes an object in motion.

Example 1296 includes the subject matter of any of examples 1290 to 1295. In example 1296, the shy robot includes a geolocation system to use a global positioning system to determine a position, and orientation, or both.

Example 1297 includes the subject matter of any of examples 1290 to 1296. In example 1297, the shy robot includes a robotic system to control devices to pick up objects, to connect to a charging unit, to provide an external charging port, or any combinations thereof.

Example 1298 includes the subject matter of any of examples 1290 to 1297. In example 1298, the shy robot includes a charging system to automatically couple the shy robot to an external power supply for charging a battery.

Example 1299 includes the subject matter of any of examples 1290 to 1298. In example 1299, the shy robot includes a trusted execute environment (TEE).

Example 1300 includes the subject matter of any of examples 1290 to 1299. In example 1300, the shy robot includes a trusted platform module (TPM) to establish a trusted execute environment (TEE) during booting.

Example 1301 includes the subject matter of any of examples 1290 to 1300. In example 1301, the shy robot includes a power out system to provide power to external devices.

Example 1302 includes the subject matter of any of examples 1290 to 1301. In example 1302, the apparatus includes a swarm of robots in a similar geographic region to share information on a presence.

Example 1303 includes a method for controlling a shy robot in a robot swarm. The method for controlling a shy robot in a robot swarm includes detecting a presence proximate to the shy robot, commanding a propulsion system to stop the shy robot, if moving, and alerting other robots in a swarm to the presence.

Example 1304 includes the subject matter of example 1303. In example 1304, detecting the presence includes detecting a motion of an object in the vicinity of the shy robot, and classifying the object has a living being.

Example 1305 includes the subject matter of either of examples 1303 or 1304. In example 1305, detecting the presence includes obtaining an image of an object in vicinity of the shy robot, and processing the image to identify a human, or an animal in the image.

Example 1306 includes the subject matter of any of examples 1303 to 1305. In example 1306, detecting the presence includes receiving an alert message including a presence detected by another device.

Example 1307 includes the subject matter of any of examples 1303 to 1306. In example 1307, commanding the propulsion system to stop the shy robot includes moving the shy robot to a location outside of the path of oncoming traffic, and deactivating the propulsion system.

Example 1308 includes the subject matter of any of examples 1303 to 1307. In example 1308, the method includes detecting that a battery reserve is less than a preset limit, moving the shy robot to a charging station, and automatically coupling the shy robot to a charging device.

Example 1309 includes the subject matter of any of examples 1303 to 1308. In example 1309, the method includes determining that the shy robot is to move to new location, obtaining a current location, mapping a route to the new location, and moving the shy robot from the current location to the target location.

Example 1310 includes the subject matter of any of examples 1303 to 1309. In example 1310, moving the shy robot includes following a guideline.

Example 1311 includes the subject matter of any of examples 1303 to 1310. In example 1311, alerting the other robots includes detecting an object moving through a zone around the shy robot, and sending an alert to nearest neighboring robots to inform them of the detection.

Example 1312 includes the subject matter of any of examples 1303 to 1311. In example 1312, the alert includes a location of the object, a movement of the object, or a certainty of the detection of the object, or any combinations thereof.

Example 1313 includes a non-transitory, machine readable medium that includes instructions that, when executed, direct a processor to detect a presence of an object, determine that the object is in a list of objects in a policy, and communicate an alert of the presence to other robots in a swarm.

Example 1314 includes the subject matter of example 1313. In example 1314, the non-transitory, machine readable medium includes instructions that, when executed, direct a processor to determine that the object is a living being, and command a propulsion system to halt the shy robot.

Example 1315 includes the subject matter of either of examples 1313 or 1314. In example 1315, the non-transitory, machine readable medium includes instructions that, when executed, direct a processor to move the shy robot to a new location, and perform a function at the new location.

Example 1316 includes the subject matter of any of examples 1313 to 1315. In example 1316, the non-transitory, machine readable medium includes instructions that, when executed, direct a processor to boot the shy robot into a trusted execute environment (TEE), and initialize the shy robot by loading policies and starting a context engine.

Example 1317 includes the subject matter of any of examples 1313 to 1316. In example 1317, the non-transitory, machine readable medium includes instructions that, when executed, direct a processor to discover sensors coupled to the shy robot, and load drivers for the sensors.

Example 1318 includes an apparatus. The apparatus includes an Internet-of-Things (IoT) network, wherein the IoT network includes a pre-first responder device (PFRD), including a geolocation system to determine a location of the PFRD, a propulsion system to move the PFRD to an event scene, and a scene assessment controller to provide functionality to the PFRD.

Example 1319 includes the subject matter of example 1318. In example 1319, the functionality includes controlling motion, capturing and transferring images, or providing network communications to user devices, or any combinations thereof.

Example 1320 includes the subject matter of either of examples 1318 or 1319. In example 1320, the apparatus includes a network communications system to provide communications to the PFRD, communications between the PFRD and an emergency responder (ER), or communications between the PFRD and a base station, or any combinations thereof.

Example 1321 includes the subject matter of any of examples 1318 to 1320. In example 1321, the apparatus includes a trusted execute environment (TEE) to store an entropy multiplexing (EM) tree.

Example 1322 includes the subject matter of any of examples 1318 to 1321. In example 1322, the EM tree is to map to a waypoint at which a plurality of PFRDs may be commissioned to respond.

Example 1323 includes the subject matter of any of examples 1318 to 1322. In example 1323, the EM tree includes a location coordinate, and an anticipated time of arrival for each waypoint.

Example 1324 includes the subject matter of any of examples 1318 to 1323. In example 1324, the EM tree is to provide seed values for generating identification keys at a waypoint.

Example 1325 includes the subject matter of any of examples 1318 to 1324. In example 1325, the apparatus includes a trip planner to provide route information to a destination.

Example 1326 includes the subject matter of any of examples 1318 to 1325. In example 1326, the route information includes scenes, waypoints, locations, destinations, or intersections, or any combinations thereof.

Example 1327 includes the subject matter of any of examples 1318 to 1326. In example 1327, the route information includes alternate routes.

Example 1328 includes the subject matter of any of examples 1318 to 1327. In example 1328, the PFRD includes an unmanned aerial vehicle.

Example 1329 includes the subject matter of any of examples 1318 to 1328. In example 1329, the PFRD includes a key for communications within a single jurisdiction.

Example 1330 includes the subject matter of any of examples 1318 to 1329. In example 1330, the PFRD includes a plurality of keys for communications within multiple independent jurisdictions.

Example 1331 includes the subject matter of any of examples 1318 to 1330. In example 1331, the PFRD includes a multi-jurisdiction key for communications within overlapping jurisdictions.

Example 1332 includes a method for managing a pre-first responder device (PFRD). The method for managing a pre-first responder device (PFRD) includes receiving a command for the PFRD to participate in an event, obtaining a key for a jurisdiction, registering with the jurisdiction, and providing support to emergency responders at the event.

Example 1333 includes the subject matter of example 1332. In example 1333, the method includes determining if the PFRD is operating in a single jurisdiction, negotiating for a key from the single jurisdiction, registering the PFRD with the single jurisdiction using the key, and initiating communication with emergency responders if registration was successful.

Example 1334 includes the subject matter of either of examples 1332 or 1333. In example 1334, the method includes determining if the PFRD is operating in overlapping jurisdictions, negotiating for a shared key from the overlapping jurisdictions, registering the PFRD with each of the overlapping jurisdictions using the shared key, and initiating communication with emergency responders if registration with all of the overlapping jurisdictions was successful.

Example 1335 includes the subject matter of any of examples 1332 to 1334. In example 1335, the method includes determining if the PFRD is operating in multiple non-overlapping jurisdictions, negotiating for an individual key from each of the non-overlapping jurisdictions, registering the PFRD with each of the non-overlapping jurisdictions using the appropriate individual key, and initiating communication with emergency responders if registration with all of the non-overlapping jurisdictions was successful.

Example 1336 includes the subject matter of any of examples 1332 to 1335. In example 1336, the method includes determining that registration with a jurisdiction was not successful, and alerting a jurisdictional control network.

Example 1337 includes the subject matter of any of examples 1332 to 1336. In example 1337, the method includes retrieving policies from a secure store in a trusted execute environment, and activating an initial flight plan policy.

Example 1338 includes the subject matter of any of examples 1332 to 1337. In example 1338, the initial flight plan policy includes autonomous operations including detaching from an anchor point, hovering, capturing images, or performing image recognition, or any combinations thereof.

Example 1339 includes the subject matter of any of examples 1332 to 1338. In example 1339, the method includes determining if network connectivity is poor, and implementing connectivity policies to improve communication.

Example 1340 includes the subject matter of any of examples 1332 to 1339. In example 1340, the method includes retrieving remote management policies from a secure store in a trusted execute environment, and allowing remote flight management by emergency responders.

Example 1341 includes a non-transitory, machine readable medium that includes instructions that, when executed, direct a processor to trigger a pre-first responder device (PFRD) to respond to an event, retrieve policies for operations of the PFRD, and respond to the event.

Example 1342 includes the subject matter of example 1341. In example 1342, the non-transitory, machine readable medium includes instructions that, when executed, direct the processor to implement remote management policies in the PFRD, and allow remote operations management by an emergency responder.

Example 1343 includes the subject matter of either of examples 1341 or 1342. In example 1343, the non-transitory, machine readable medium includes instructions that, when executed, direct the processor to implement policies to improve communications.

Example 1344 includes the subject matter of any of examples 1341 to 1343. In example 1344, the non-transitory, machine readable medium includes instructions that, when executed, direct the processor to provide remote network access to emergency responders.

Example 1345 includes the subject matter of any of examples 1341 to 1344. In example 1345, the non-transitory, machine readable medium includes instructions that, when executed, direct the processor to accept trip plans from a trip planner.

Example 1346 includes an apparatus including means to perform a method as in any other Example.

Example 1347 includes machine-readable storage including machine-readable instructions, when executed, to implement a method or realize an apparatus as in any other Example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. At least one non-transitory machine readable medium comprising instructions that, when executed, cause at least one processor to at least:

- store a list of sub-objects for a group, the sub-objects including first sub-objects and second sub-objects of the first sub-objects, ones of the second sub-objects to form a first composite object, the second sub-objects including a third sub-object, the third sub-object is a second composite object formed from lower level sub-objects;
- calculate a collection group identifier for the group, the collection group identifier corresponding to the first composite object or the second composite object, the collection group identifier based on one or more names of either the ones of the second sub-objects or the third sub-object;
- commit the collection group identifier to a blockchain in a blockchain transaction;
- confirm with a group of devices in a network whether the blockchain transaction is valid;
- reject the blockchain transaction in response to confirming that the blockchain transaction is not valid; and
- provide group identity credentials to ones of the sub-objects in response to confirming that the blockchain transaction is valid.

2. The at least one non-transitory machine readable medium of claim 1, wherein the instructions, when executed, cause the at least one processor to act as a proxy server for one or more of the sub-objects.

3. The at least one non-transitory machine readable medium of claim 1, wherein the instructions, when executed, cause the at least one processor to migrate the blockchain to one or more devices in a mesh network.

4. The at least one non-transitory machine readable medium of claim 1, wherein the blockchain includes transaction blocks, a first one of the transaction blocks includes the collection group identifier.

5. The at least one non-transitory machine readable medium of claim 1, wherein at least one of one or more of the first sub-objects or one or more of the second sub-objects include an atomic object.

6. The at least one non-transitory machine readable medium of claim 1, wherein the instructions, when executed, cause the at least one processor to:

- generate a combination of one or more names of the sub-objects of the group; and
- generate a hash code of the combination, the collection group identifier based on the hash code.

7. The at least one non-transitory machine readable medium of claim 1, wherein the instructions, when executed, cause the at least one processor to communicate with an Enhanced Privacy ID (EPID) server.

8. The at least one non-transitory machine readable medium of claim 1, wherein the list of the sub-objects is stored in a device owner, and the instructions, when executed, cause the at least one processor to:

- receive a join request to the group from the third sub-object;
- determine whether membership to the group is private;
- in response to determining that the membership is private, confirm that the third sub-object is a group member; and
- in response to determining that the third sub-object is a group member, provide a group key to the third sub-object from the device owner, the device owner to act as a proxy server to the third sub-object.

9. An apparatus comprising:

memory;

instructions in the apparatus; and at least one processor to execute the instructions to:

- store a list of sub-objects for a group, the sub-objects including first sub-objects and second sub-objects of the first sub-objects, ones of the second sub-objects to form a first composite object, the second sub-objects including a third sub-object, the third sub-object is a second composite object formed from lower level sub-objects;
- calculate a collection group identifier for the group, the collection group identifier corresponding to the first composite object or the second composite object, the collection group identifier based on one or more names of either the ones of the second sub-objects or the third sub-object;
- commit the collection group identifier to a blockchain in a blockchain transaction;
- confirm with a group of devices in a network whether the blockchain transaction is valid;
- reject the blockchain transaction in response to confirming that the blockchain transaction is not valid; and
- provide group identity credentials to ones of the sub-objects in response to confirming that the blockchain transaction is valid.

10. The apparatus of claim 9, wherein the at least one processor is to execute the instructions to act as a proxy server for one or more of the sub-objects.

11. The apparatus of claim 9, wherein the at least one processor is to execute the instructions to migrate the blockchain to one or more devices in a mesh network.

12. The apparatus of claim 9, wherein the blockchain includes transaction blocks, and a first one of the transaction blocks includes the collection group identifier.

13. The apparatus of claim 9, wherein the at least one processor is to execute the instructions to:

- generate a combination of one or more names of the sub-objects of the group; and
- generate a hash code of the combination, the collection group identifier based on the hash code.

14. The apparatus of claim 9, wherein the at least one processor is to execute the instructions to communicate with an Enhanced Privacy ID (EPID) server.

15. The apparatus of claim 9, wherein the list of the sub-objects is stored in a device owner, and the at least one processor is to execute the instructions to:

- receive a join request to the group from the third sub-object;
- determine whether membership to the group is private;
- in response to determining that the membership is private, confirm that the third sub-object is a group member; and in response to determining that the third sub-object is a group member, provide a group key to the third sub-object from the device owner, the device owner to act as a proxy server to the third sub-object.

16. An apparatus comprising:

means for storing a list of sub-objects for a group, the sub-objects including first sub-objects and second sub-objects of the first sub-objects, ones of the second sub-objects to form a first composite object, the second sub-objects including a third sub-object, the third sub-object is a second composite object formed from lower level sub-objects;

means for calculating a collection group identifier for the group, the collection group identifier corresponding to the first composite object or the second composite object, the collection group identifier based on one or more names of either the ones of the second sub-objects or the third sub-object;

means for committing the collection group identifier to a blockchain in a blockchain transaction;

means for confirming with a group of devices in a network whether the blockchain transaction is valid;

means for rejecting the blockchain transaction in response to confirming that the blockchain transaction is not valid; and means for providing group identity credentials to ones of the sub-objects in response to confirming that the blockchain transaction is valid.

17. The apparatus of claim 16, further including means for migrating the blockchain to one or more devices in a mesh network.

18. The apparatus of claim 16, wherein at least one of one or more of the first sub-objects or one or more of the second sub-objects include an atomic object.

19. The apparatus of claim 16, further including means for generating, the means for generating to:

generate a combination of one or more names of the sub-objects of the group; and generate a hash code of the combination, the collection group identifier based on the hash code.

20. The apparatus of claim 16, further including means for interfacing with an Enhanced Privacy ID (EPID) server.

21. The apparatus of claim 16, wherein the list of the sub-objects is stored in a device owner, and further including:

means for receiving a join request to the group from the third sub-object;

means for determining whether membership to the group is private;

means for confirming that the third sub-object is a group member in response to a first determination that the membership is private; and means for providing a group key to the third sub-object from the device owner in response to a second determination that the third sub-object is a group member, the device owner to act as a proxy server to the third sub-object.

22. A method comprising:

storing a list of sub-objects for a group, the sub-objects including first sub-objects and second sub-objects of the first sub-objects, ones of the second sub-objects to form a first composite object, the second sub-objects including a third sub-object, the third sub-object is a second composite object formed from lower level sub-objects;

calculating a collection group identifier for the group, the collection group identifier corresponding to the first composite object or the second composite object, the collection group identifier based on one or more names of either the ones of the second sub-objects or the third sub-object;

committing the collection group identifier to a blockchain in a blockchain transaction;

confirming with a group of devices in a network whether the blockchain transaction is valid;

rejecting the blockchain transaction in response to confirming that the blockchain transaction is not valid; and providing group identity credentials to ones of the sub-objects in response to confirming that the blockchain transaction is valid.

23. The method of claim 22, further including acting as a proxy server for one or more of the sub-objects.

24. The method of claim 22, further including migrating the blockchain to one or more devices in a mesh network.

25. The method of claim 22, further including:

generating a combination of one or more names of the sub-objects of the group; and generating a hash code of the combination, the collection group identifier based on the hash code.

26. The method of claim 22, further including communicating with an Enhanced Privacy ID (EPID) server.

27. The method of claim 22, wherein the list of the sub-objects is stored in a device owner, and further including:

receiving a join request to the group from the third sub-object;

determining whether membership to the group is private;

confirming that the third sub-object is a group member in response to a first determination that the membership is private; and providing a group key to the third sub-object from the device owner in response to a second determination that the third sub-object is a group member, the device owner to act as a proxy server to the third sub-object.

* * * * *